[54] BUS ERROR DETECTION EMPLOYING PARITY VERIFICATION

[75] Inventors: Donald B. Bennett, Burnsville; Lee T. Thorsrud, Saint Paul; Thomas W. Petschauer, Bloomington, all of Minn.

[73] Assignee: Unisys Corporation, Blue Bell, Pa.

[21] Appl. No.: 98,634

[22] Filed: Nov. 16, 1987

Related U.S. Application Data

[60] Division of Ser. No. 898,810, Aug. 21, 1986, Pat. No. 4,734,909, which is a continuation of Ser. No. 356,051, Mar. 8, 1982, abandoned.

[51] Int. Cl.⁴ ............................................. G06F 11/10

[52] U.S. Cl. ........................................... 371/8; 371/49

[58] Field of Search ...................................... 371/8, 49

[56] References Cited

U.S. PATENT DOCUMENTS

| | | | |
|---|---|---|---|
| 3,102,253 | 8/1963 | Blodgett | 371/49 |
| 4,119,815 | 10/1978 | Frankfort et al. | 371/11 X |
| 4,346,474 | 8/1982 | Sze | 371/49 |
| 4,365,247 | 12/1982 | Bargeton et al. | 371/8 X |

*Primary Examiner*—Charles E. Atkinson

*Attorney, Agent, or Firm*—Glenn W. Bowen

[57] ABSTRACT

A bus error detection system is used to detect binary bus error signals. The bus lines include an odd parity line and an even parity line. A clock means provides at least two clock signal phases. An activatable driver drives both of the odd and the even parity lines to the same predefined logic level each time a first clock signal phase occurs. A parity checker coupled to the drive checks during a second clock signal phase the parity of the binary signals which appeared on said bus lines during a preceding first clock signal phase. The driver then drives either the odd or the even parity lines to a predefined logic state according to the parity determined by the parity checker during the second clock signal phase. A verification circuit verifies that only one of the odd and the even parity lines has been driven to a predefined logic state during said second clock phase, and that of both the odd and the even parity lines have been driven during said first clock signal phase to the same predefined logic level.

6 Claims, 255 Drawing Sheets

RENT'S RULE: $PINS = \frac{CONNECTIONS}{GATE} \times GATES^{GATE\ EXPONENT}$

WHERE TYPICAL VALUES: $\frac{CONNECTIONS}{GATE} = 2.5$ TO 3.6

RENT EXPONENT = 0.5 TO 0.7

| TECHNOLOGY | GEOMETRY IN IN MICRONS OF GATE FEATURE | GATES | MAXIMUM PINS FOR DIE SIZE @ 175u PAD SPACING | MOST OPTIMISTIC RENT'S RULE R=0.5, C=2.5 | PIN DEFICIT THIS RULE |
|---|---|---|---|---|---|
| ECL | 3.0 | 830 | 132 | 72 | -- |
| NMOS | 3.0 | 4,000 | 116 | 158 | 42 |
| CMOS | 3.0 | 4,500 | 156 | 168 | 12 |
| ECL | 1.25 | 4,800 | 124 | 173 | 49 |
| NMOS | 1.25 | 14,700 | 108 | 303 | 195 |
| CMOS | 1.25 | 15,000 | 140 | 306 | 166 |
| CMOS | 1.25 | 25,000 | 184 | 395 | 211 |
| ECL | 0.7 | 15,250 | 140 | 308 | 168 |
| NMOS | 0.7 | 47,620 | 120 | 545 | 425 |
| CMOS | 0.7 | 100,000 | 228 | 790 | 562 |

*Fig. 2*

| | ARBITRATION | | | SLAVE ID/ FUNCTION | | WAIT AND DATA | | |
|---|---|---|---|---|---|---|---|---|
| | I | II | III | IV | V | VI | VII | VIII |
| CONF. DIGIT | GROUP LINES | NO. OF GROUPS | ARB. CHOICES | SLAVE ID/ FUNCTION LINES | SLAVE ID/ FUNCTION CYCLES | WAIT LINES | DATA LINES | DATA WORD BITS |
| 6 | 16 | | | 16 | 16 | | 32 | 32 |
| 5 | 8 | 8 | | 8 | 8 | 4 | 16 | 16 |
| 4 | 4 | 4 | SPEC/ PPLD | 4 | 4 | 2 | 8 | 8 |
| 3 | 2 | 2 | SPEC/ MPX | 2 | 2 | 1 | 4 | 4 |
| 2 | 1 | 1 | FIXED/ PPLD | 1 | 1 | 0 | 2 | 2 |
| 1 | MPX | 0 | FIXED/ MPX | MPX | 0 | MPX | 1 | 1 |
| REF FIGURE | 20 | 20 | 20 | 22 | 22 | 23 | 24 | 24 |
| ASSOCIATED MAX. PIN COUNT | 8 | 0 | 0 | 8 | 0 | 1 | 16 | 0 |
| CONFIGURATION REG. BITS | 0-2 | 3-5 | 6-8 | 9-11 | 12-14 | 15-17 | 18-20 | 21-23 |

Fig. 3

FOUR LOWEST PRIORITY OF SIXTEEN POSSIBLE MASTERS OF IDENTIFICATIONS 0000----, 0001----, 0010----, AND 0011---- ARBITRATING ON ONE GROUP LINE DURING FOUR CYCLES

| IDENTIFICATION | C1 | C2 | C3 | C4 | INTERPRETATION |
|---|---|---|---|---|---|
| 0000---- | 0 | 0 | 0 | -- | STOPS AT C3 |
| 0001---- | 0 | 0 | 0 | -- | STOPS AT C3 |
| 0010---- | 0 | 0 | 1 | 0 | STOPS AT C4 |
| 0011---- | 0 | 0 | 1 | 1 | WINS AT C4 |
| ARBITRATION GROUP LINE | H | H | L | L | |

*Fig. 19a*

FOUR LOWEST PRIORITY OF EIGHTY-ONE POSSIBLE MASTERS OF IDENTIFICATIONS 00000000, 00000001, 00000011, AND 00000100 ARBITRATING ON TWO GROUP LINES DURING FOUR CYCLES

| IDENTIFICATION | C1 | C2 | C3 | C4 | INTERPRETATION |
|---|---|---|---|---|---|
| 00000000 | 00 | 00 | 00 | -- | STOPS AT C3 |
| 00000001 | 00 | 00 | 00 | -- | STOPS AT C3 |
| 00000011 | 00 | 00 | 00 | -- | STOPS AT C3 |
| 00000100 | 00 | 00 | 01 | 00 | WINS AT C4 |
| ARBITRATION GROUP LINE 0 | H | H | H | H | |
| ARBITRATION GROUP LINE 1 | H | H | L | H | |

*Fig. 19b*

NO. OF GROUPS (G)

| NO. OF GROUP LINES (N-1) | | 0 | 1 | 2 | 4 | 8 |
|---|---|---|---|---|---|---|
| | 1 | 1 | 2 | 4 | 16 | 256 |
| | 2 | | 3 | 9 | 81 | |
| | 4 | | 5 | 25 | 256* | |
| | 8 | | 9 | 81* | | |

*ARBITRATION CANNOT BE PIPELINED, MUST BE GROUP MULTIPLEXED IN TIME

| NO. OF SLAVE ID/FUNCTION LINES (PINS) | NO. OF SLAVE ID/FUNCTION CYCLES |
|---|---|
| 8 | 8 |
| 4 | 4 |
| 2 | 2 |
| 1 | 1 |
| MPX WITH DATA | 0 |

Fig. 22

| NO. OF WAIT LINES (PINS) | BINARY INTERPRETATION* | SQUARE INTERPRETATION* |
|---|---|---|
| 0 | 0 | 0 |
| 1 | 0, 1 | 0, 1 |
| 2 | 0, 1, 2, 3 | 0, 1, 4, 9 |
| 4 | 0 - 15 | 0 - 225 |

*NO. OF CLOCKS BEFORE A SUCCESSFUL TRANSACTION IS POSSIBLE.

Fig. 23

| NO. OF DATA LINES (PINS) | PEAK TRANSFER BANDWIDTH (M BYTES/SEC) |
|---|---|
| 1 | 3 1/8 |
| 2 | 6 1/4 |
| 4 | 12 1/2 |
| 8 | 25 |
| 16 | 50 |

Fig. 24

VERSATILE BUS INTERFACE LOGICS INTERFACE WITH USER

SIGNALS FROM USER

| SIGNAL NAME | REFERENCE FIGURE |
|---|---|
| [NORMAL USER OUTPUT SIGNALS] | |
| (H) INIT TRANS | 88D13 |
| (H) UMID 0 - | 92B01 |
| (H) UMID 7 | 92B15 |
| (H) USID 0 - | 11207 |
| (H) USID 7 | |
| (H) UDB 0 - | 123B05 |
| (H) UDB 15 | |
| [ADDITIONAL FOR NORMAL USER INPUT] | |
| (H) USER BUSY | 110A01 |
| (H) WAIT ON A - | 110A03 |
| (H) WAIT ON D | 110A09 |
| [SPECIAL CONTROL SIGNALS] | |
| (H) AUTO RETRY | 88D15 |
| (H) CANCEL PENDING TRANSACTIONS | 110E05 |
| (H) SINGLE INPUT | 110E03 |
| [BLOCK TRANSFER SIGNALS] | |
| (H) BLOCK TRANS | 122A13 |
| (H) UWK ≥ 16 | 122A11 |
| (H) UWK 0 - | 122A09 |
| (H) UWK 4 | 122A01 |
| [SET SLAVE IDENTIFICATION SIGNALS] | |
| (H) WRITE A - | 110F01 |
| (H) WRITE D | 110F07 |
| (H) WRITE MASK | 110F09 |

SIGNALS TO USER

| SIGNAL NAME | REFERENCE FIGURE |
|---|---|
| [NORMAL USER OUTPUT SIGNALS] | |
| (H) TRANSACTION ENABLE | 88A01 |
| (H) LOST FF | 88F05 |
| (H) STROBING SID | 88H13 |
| (H) WAIT TO USER | 110D01 |
| (H) STROBING DATA | 88L05 |
| (H) TRANSACTION COMPLETED | 88L07 |
| [ADDITIONAL FOR NORMAL USER INPUT] | |
| (H) WIDR 0 - | 108A01 |
| (H) WIDR 7 | |
| (H) WINNER'S ID AVAIL | 8701 |
| (H) UIDF0 - | 123A01 |
| (H) UIDF7 | |
| (H) SID/F AVAIL | 8705 |
| (L) CAM HIT | 110E01 |
| (H) HIT-A- | 110E03 |
| (H) HIT-D | 110E09 |
| (H) UIDR 0- | 123A01 |
| (H) UIDR 15 | 123A03 |
| (H) DATA AVAIL | 8703 |

*Fig. 51*

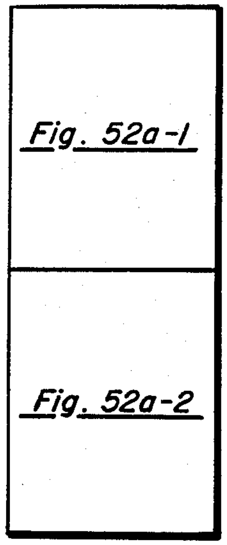
Fig. 52a
Fig. 52a-1
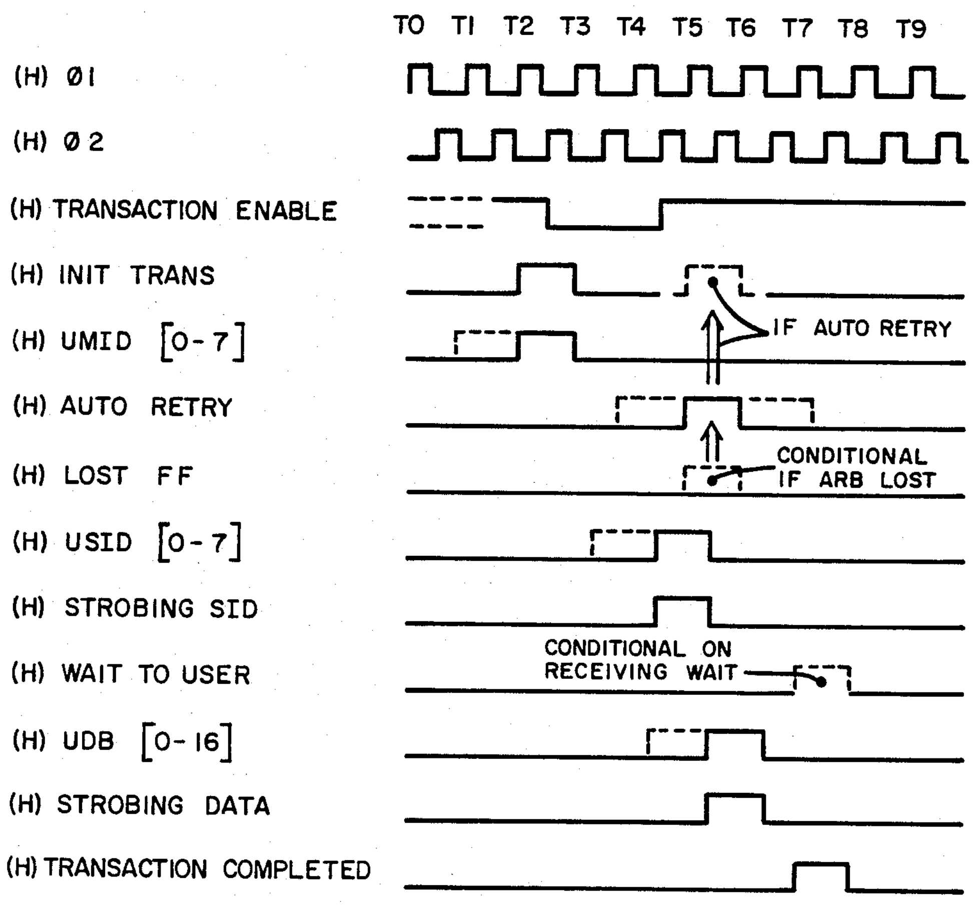

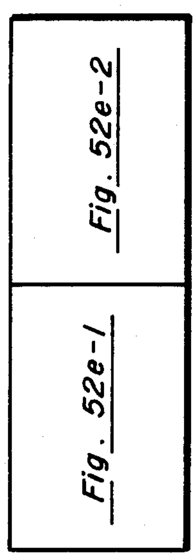
Fig. 52e
Fig. 52e-1
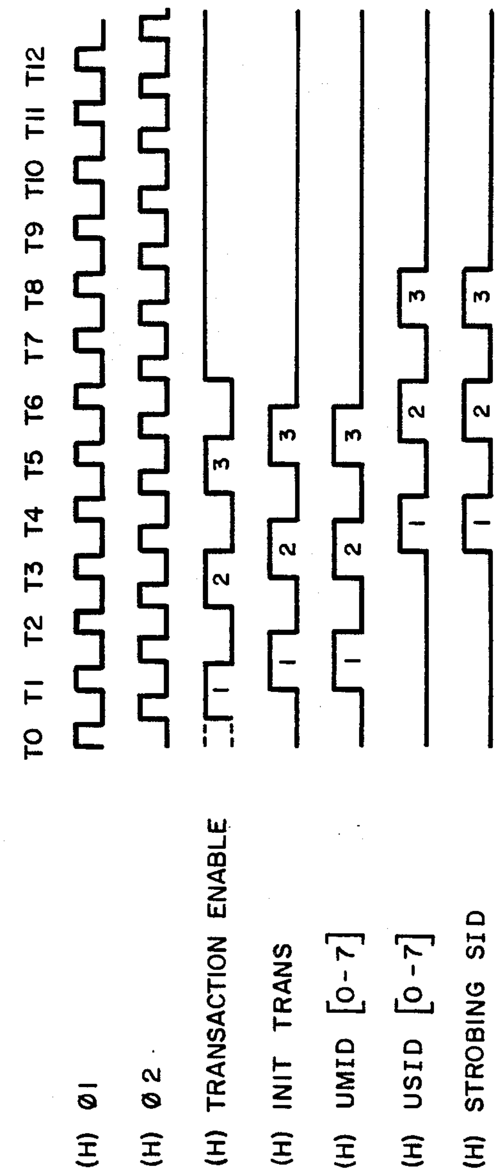

VERSATILE BUS INTERFACE LOGICS INTERFACE WITH VM NODE

SIGNALS FROM VM NODE

| SIGNAL NAME | REFERENCE FIGURE |
|---|---|
| [ALSO COMMON TO USER] | |
| (H) CLEAR | 13301 |
| (H) INIT (Ø1-Ø1) | 88B07 |
| [DIRECT FROM VM NODE] | |
| (H) IDENTIFY SLAVES (Ø1-Ø1) | 88B09 |
| (H) CONFIG STORED (Ø1-Ø1) | 88B11 |
| [SCAN/SET TEST, VIA USER] | |
| (H) SET DATA | 131B13 |
| (L) SCAN/SET ENABLE | 13731 |
| (L) SCAN/SET SELECT (L=SET) | 13733 |
| (H) SEL LOOP A | 13721 |
| (H) SEL LOOP B | 13723 |
| (H) SEL LOOP C | 13725 |
| (H) SEL LOOP D | 13727 |
| (H) SEL LOOP E | 13729 |
| (H) SEL LOOP F | 13721 |

SIGNALS TO VM NODE

| SIGNAL NAME | REFERENCE FIGURE |
|---|---|
| [DIRECT TO VM NODE] | |
| (H) BUS BUSY | 88B03 |
| (H) PARITY FAULT | 132B01 |
| (H) V BUS FAULT | 132B05 |
| (H) DOUBLE FAULT | 132B07 |
| (H) FAULT | 132B09 |
| [SCAN/SET TEST, VIA USER] | |
| (H) LOOP A SCAN DATA | |
| (H) LOOP B SCAN DATA | 132B03 |
| (H) LOOP C SCAN DATA | |
| (H) LOOP D SCAN DATA | 92B03 |
| (H) LOOP E SCAN DATA | |
| (H) LOOP F SCAN DATA | 91B01 |

*Fig. 53*

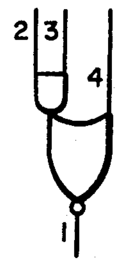
Fig. 54a
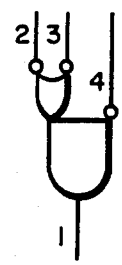
Fig. 54b
| 2 | 3 | 4 | 1 |
|---|---|---|---|
| L | X | L | H |
| X | L | L | H |
| H | H | X | L |
| X | X | H | L |
Fig. 54c
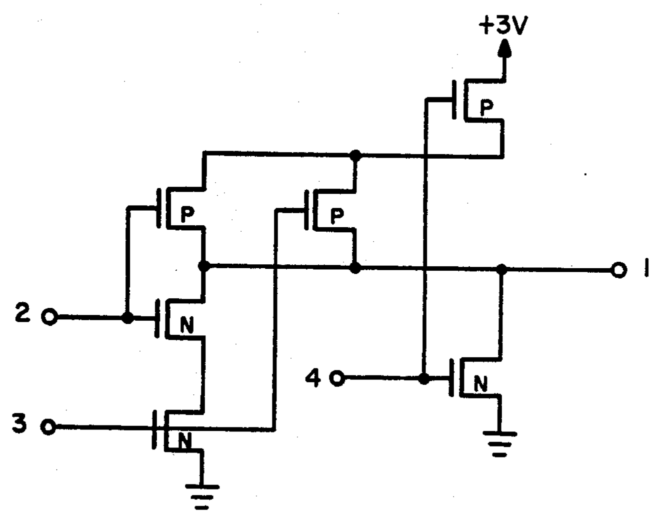
Fig. 54d
Fig. 58a
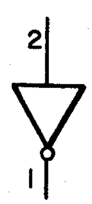
Fig. 58b
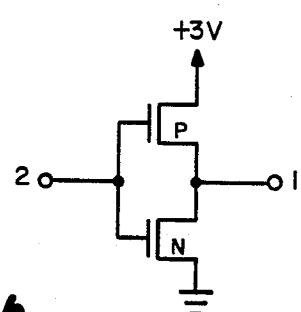
Fig. 58c
| 2 | 1 |
|---|---|
| H | L |
| L | H |
Fig. 58d

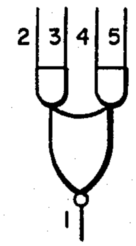
Fig. 55a
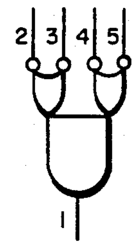
Fig. 55b
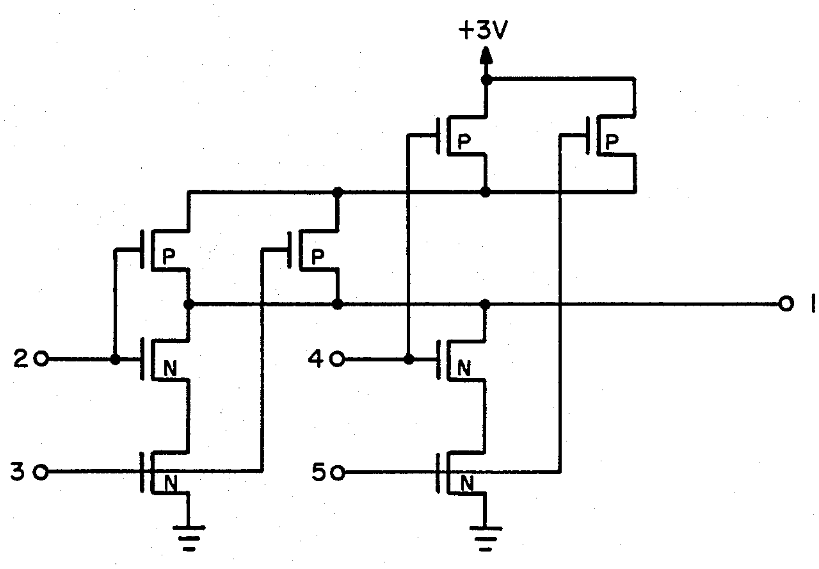
Fig. 55c
| 2 | 3 | 4 | 5 | 1 |
|---|---|---|---|---|
| L | X | L | X | H |
| L | X | X | L | H |
| X | L | L | X | H |
| X | L | X | L | H |
| H | H | X | X | L |
| X | X | H | H | L |
Fig. 55d

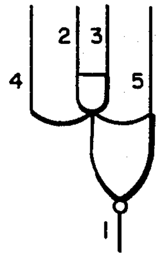
Fig. 56a
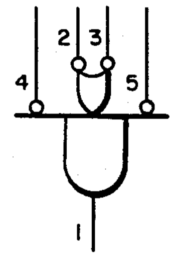
Fig. 56b
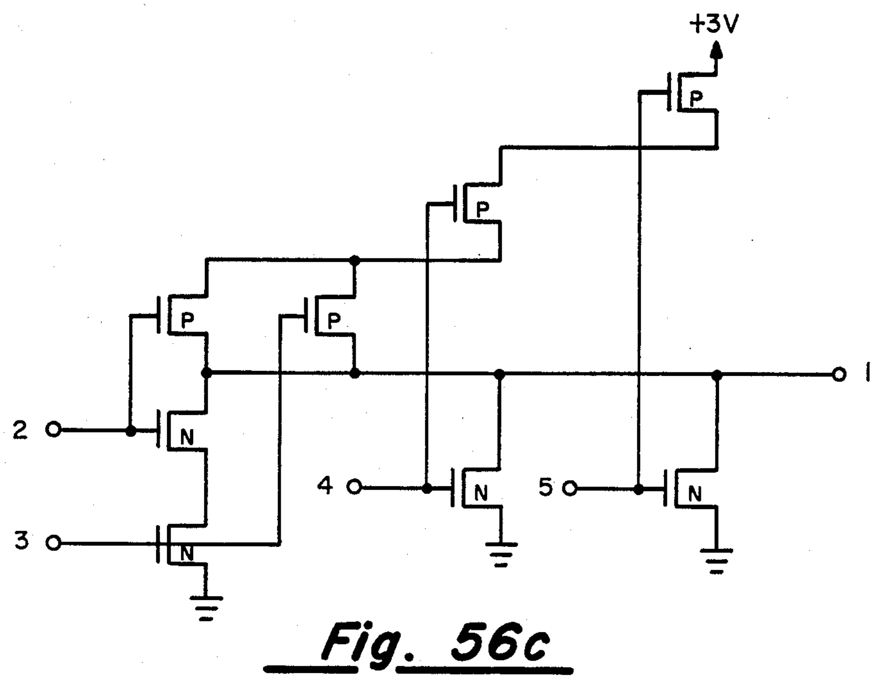
Fig. 56c
| 2 | 3 | 4 | 5 | 1 |
|---|---|---|---|---|
| L | X | L | L | H |
| X | L | L | L | H |
| H | H | X | X | L |
| X | X | H | X | L |
| X | X | X | H | L |
Fig. 56d

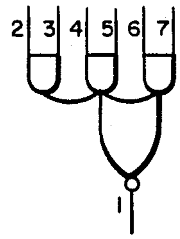
Fig. 57a
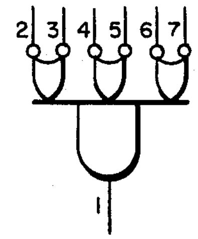
Fig. 57b
| 2 | 3 | 4 | 5 | 6 | 7 | 1 |
|---|---|---|---|---|---|---|
| L | X | L | X | L | X | H |
| X | L | L | X | L | X | H |
| L | X | X | L | L | X | H |
| L | X | L | X | X | L | H |
| L | X | X | L | X | L | H |
| X | L | X | L | L | X | H |
| X | L | X | L | X | L | H |
| X | L | L | X | X | L | H |
| H | H | X | X | X | X | L |
| X | X | H | H | X | X | L |
| X | X | X | X | H | H | L |
Fig. 57c
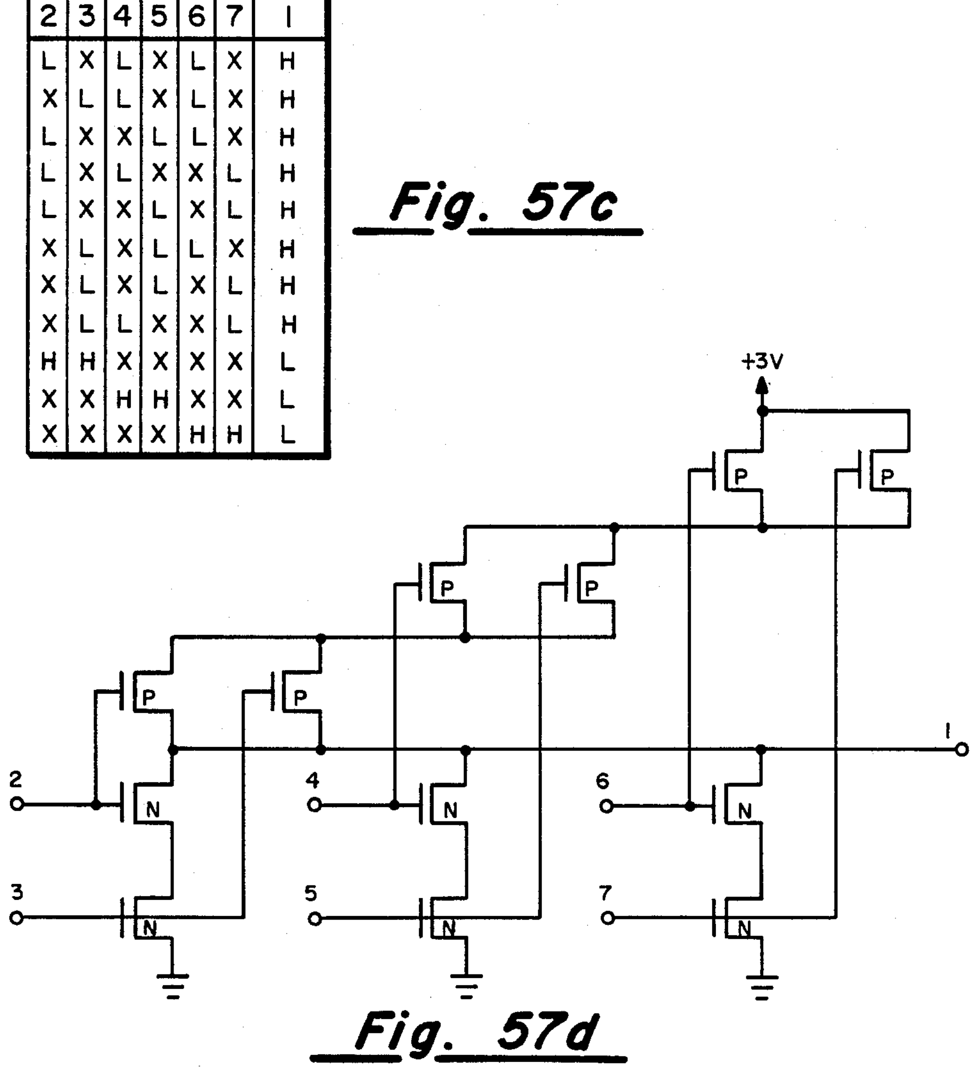
Fig. 57d

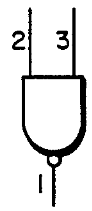
Fig. 59a
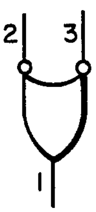
Fig. 59b
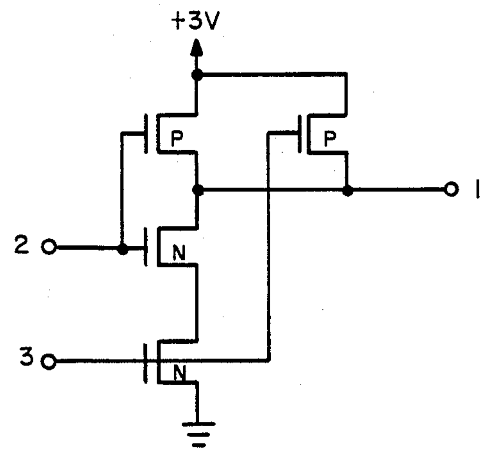
Fig. 59c
| 2 | 3 | 1 |
|---|---|---|
| L | X | H |
| X | L | H |
| H | H | L |
Fig. 59d
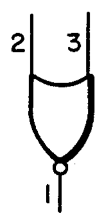
Fig. 60a
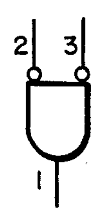
Fig. 60b
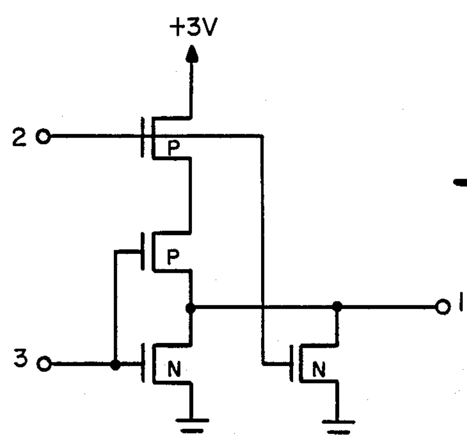
Fig. 60c
| 2 | 3 | 1 |
|---|---|---|
| H | X | L |
| X | H | L |
| L | L | H |
Fig. 60d

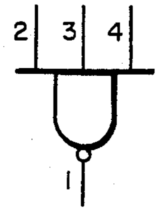
Fig. 61a
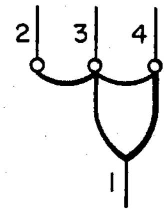
Fig. 61b
| 2 | 3 | 4 | 1 |
|---|---|---|---|
| L | X | X | H |
| X | L | X | H |
| X | X | L | H |
| H | H | H | L |
Fig. 61c
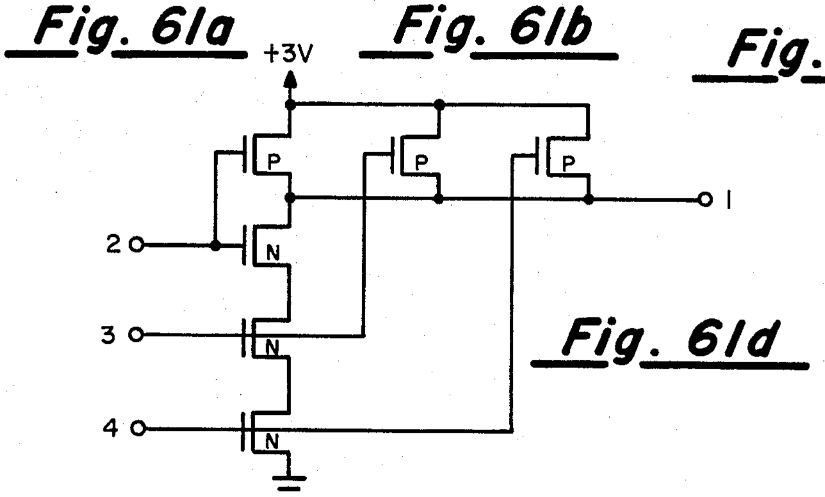
Fig. 61d
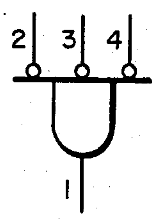
Fig. 62c
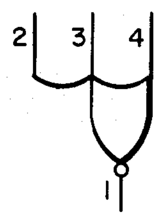
Fig. 62b
| 2 | 3 | 4 | 1 |
|---|---|---|---|
| H | X | X | L |
| X | H | X | L |
| X | X | H | L |
| L | L | L | H |
Fig. 62c
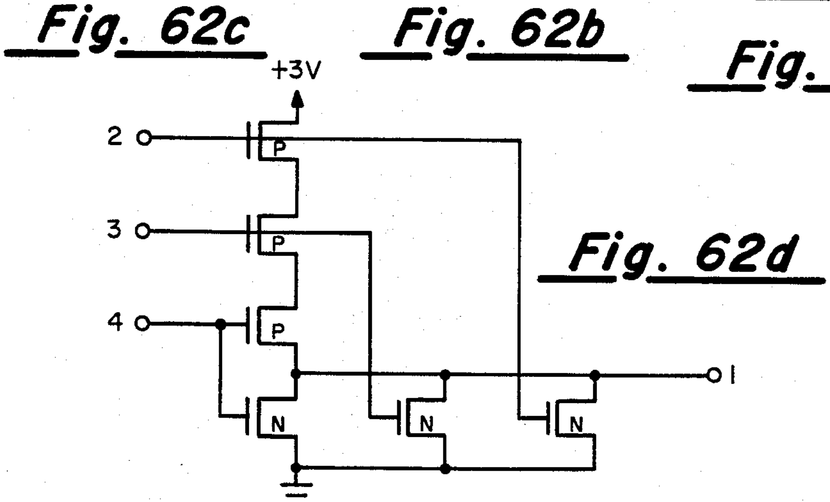
Fig. 62d

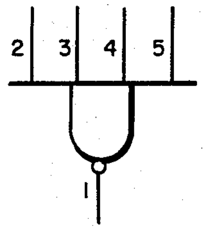
Fig. 63a
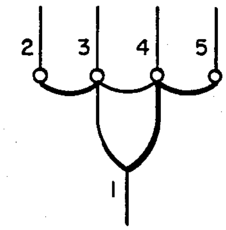
Fig. 63b
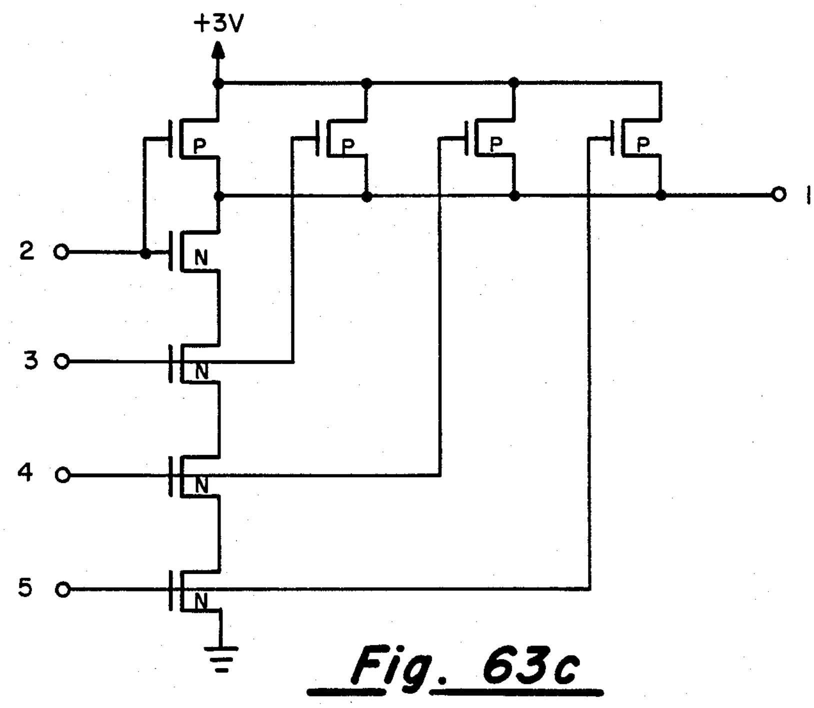
Fig. 63c
| 2 | 3 | 4 | 5 | 1 |
|---|---|---|---|---|
| L | X | X | X | H |
| X | L | X | X | H |
| X | X | L | X | H |
| X | X | X | L | H |
| H | H | H | H | L |
Fig. 63d

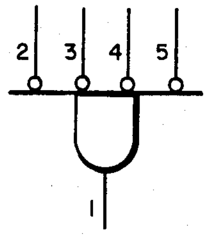
Fig. 64a
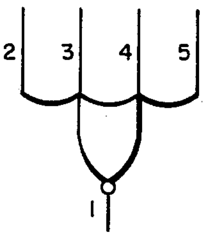
Fig. 64b
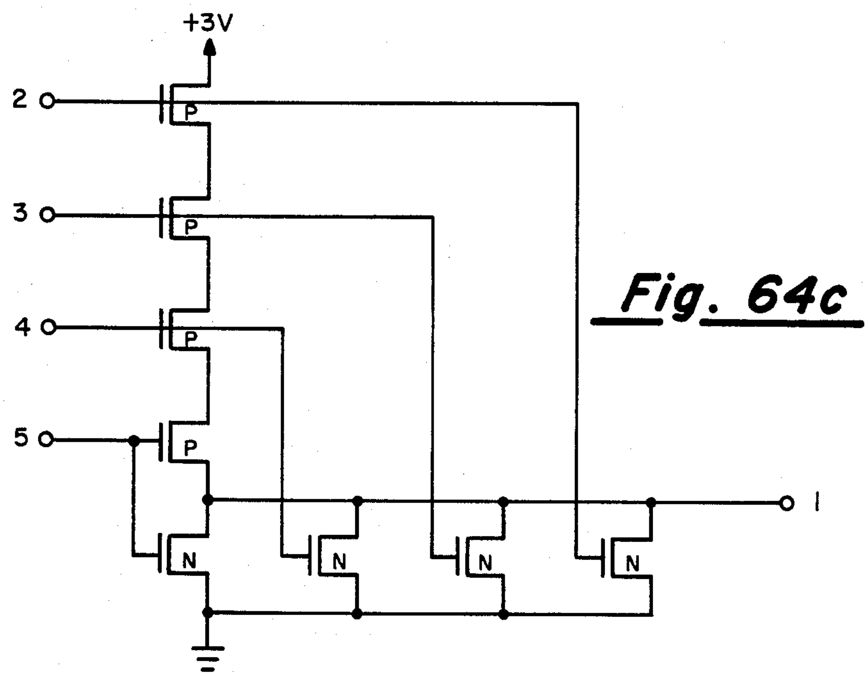
Fig. 64c
| 2 | 3 | 4 | 5 | 1 |
|---|---|---|---|---|
| H | X | X | X | L |
| X | H | X | X | L |
| X | X | H | X | L |
| X | X | X | H | L |
| L | L | L | L | H |
Fig. 64d

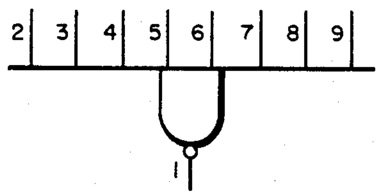
Fig. 65a
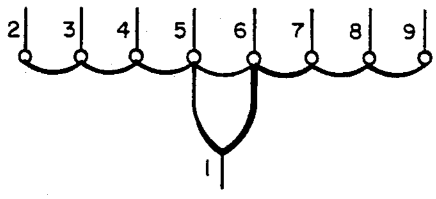
Fig. 65b
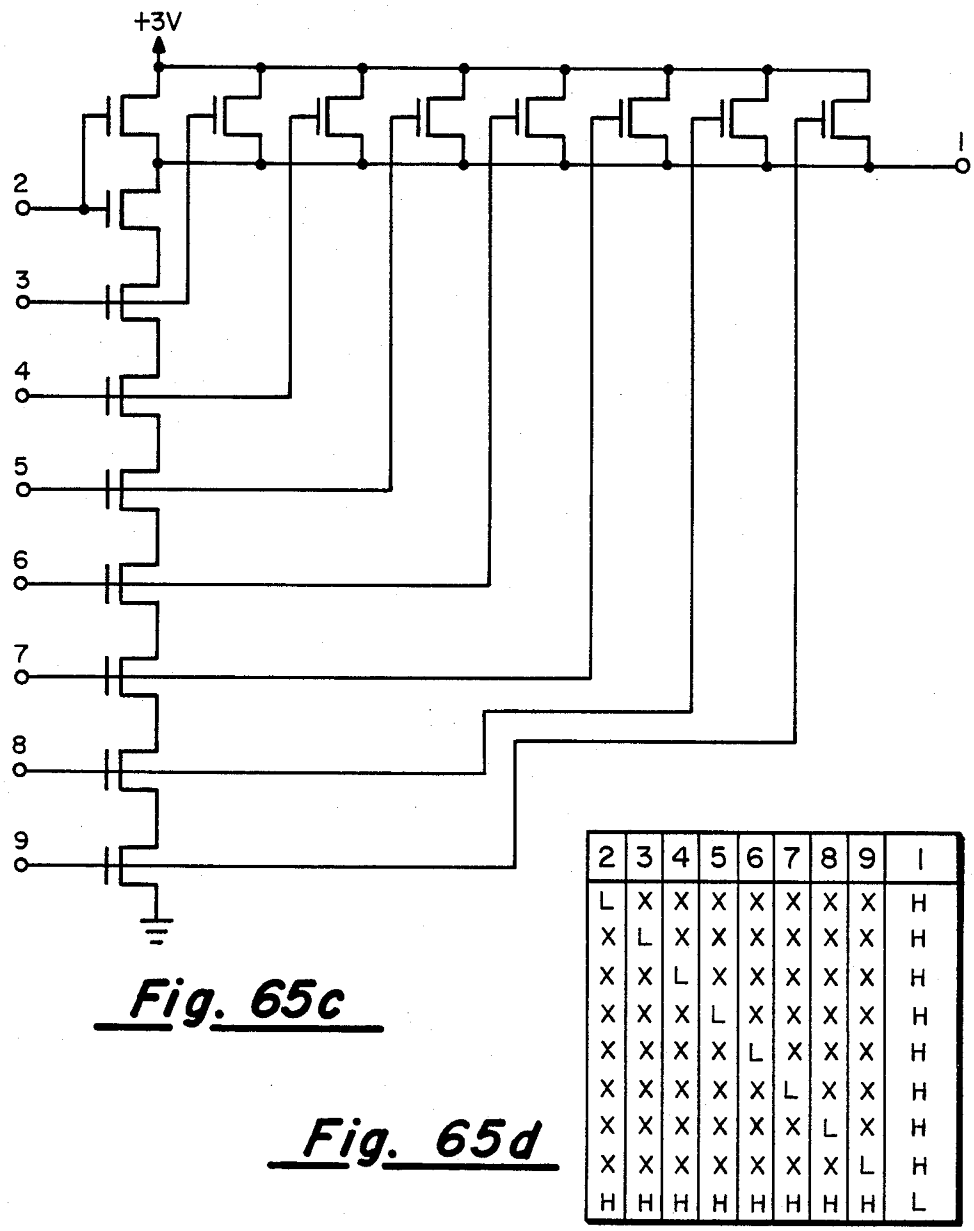
Fig. 65c
Fig. 65d
| 2 | 3 | 4 | 5 | 6 | 7 | 8 | 9 | 1 |
|---|---|---|---|---|---|---|---|---|
| L | X | X | X | X | X | X | X | H |
| X | L | X | X | X | X | X | X | H |
| X | X | L | X | X | X | X | X | H |
| X | X | X | L | X | X | X | X | H |
| X | X | X | X | L | X | X | X | H |
| X | X | X | X | X | L | X | X | H |
| X | X | X | X | X | X | L | X | H |
| X | X | X | X | X | X | X | L | H |
| H | H | H | H | H | H | H | H | L |

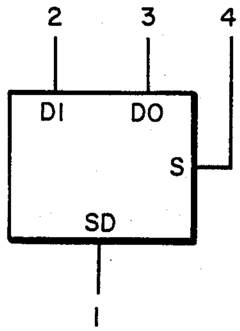
Fig. 66a
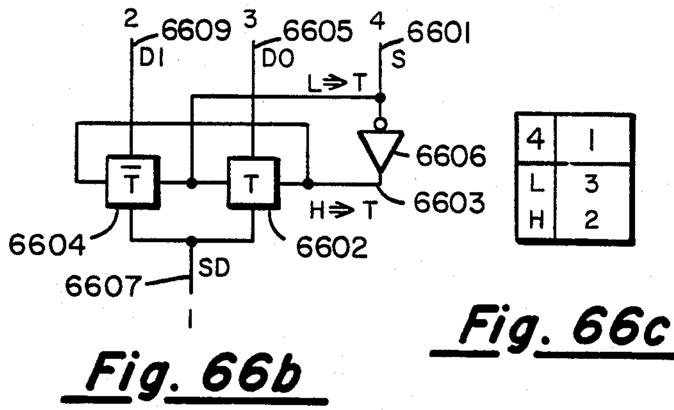
Fig. 66b
| 4 | 1 |
|---|---|
| L | 3 |
| H | 2 |
Fig. 66c
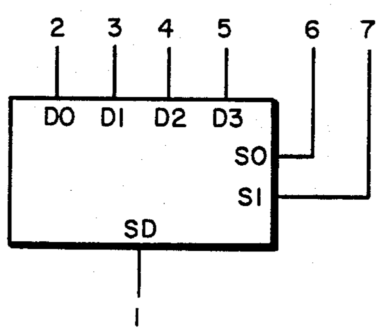
Fig. 68a
| 7 | 6 | 1 |
|---|---|---|
| L | L | 2 |
| L | H | 3 |
| H | L | 4 |
| H | H | 5 |
Fig. 68b
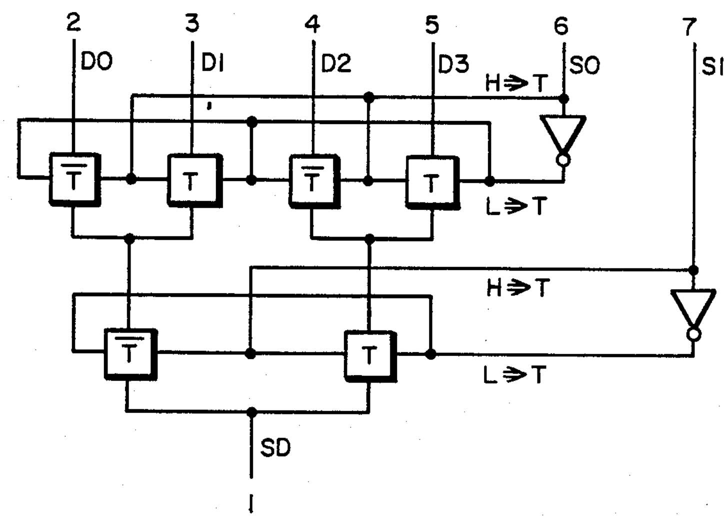
Fig. 68c

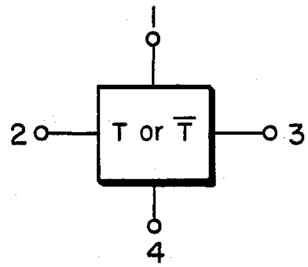
Fig. 67a
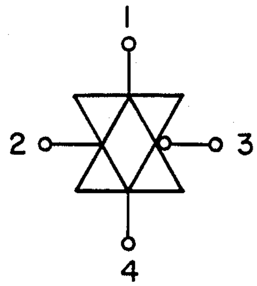
Fig. 67b
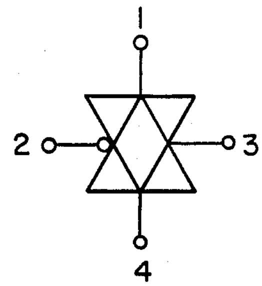
Fig. 67c
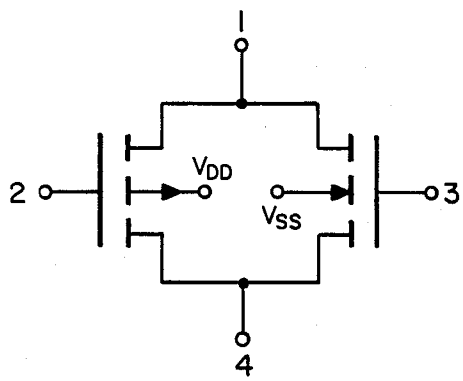
Fig. 67d
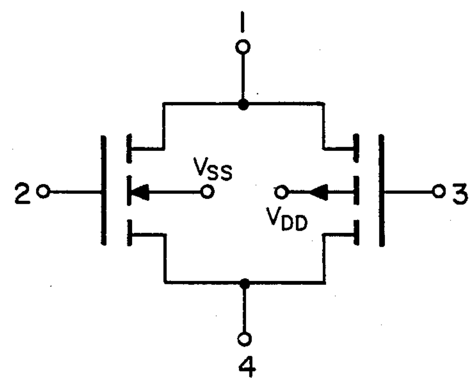
Fig. 67e
| 1 | 2 | 3 | 4 |
|---|---|---|---|
| H | H | L | H |
| L | H | L | L |
| H | L | H | HIGH Z |
| L | L | H | HIGH Z |
Fig. 67f
| 1 | 2 | 3 | 4 |
|---|---|---|---|
| H | H | L | HIGH Z |
| L | H | L | HIGH Z |
| H | L | H | H |
| L | L | H | L |
Fig. 67g

| SEL | OUTPUT |
|---|---|
| L | A |
| H | B |
Fig. 69b
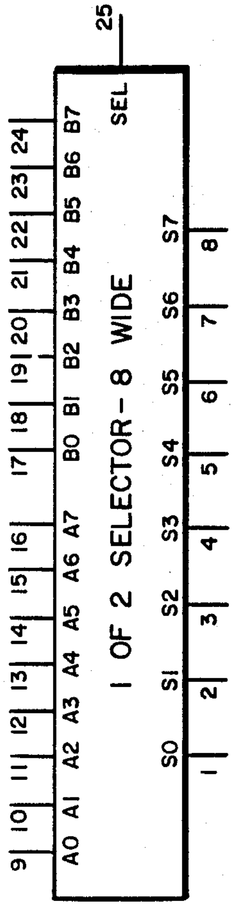
Fig. 69a
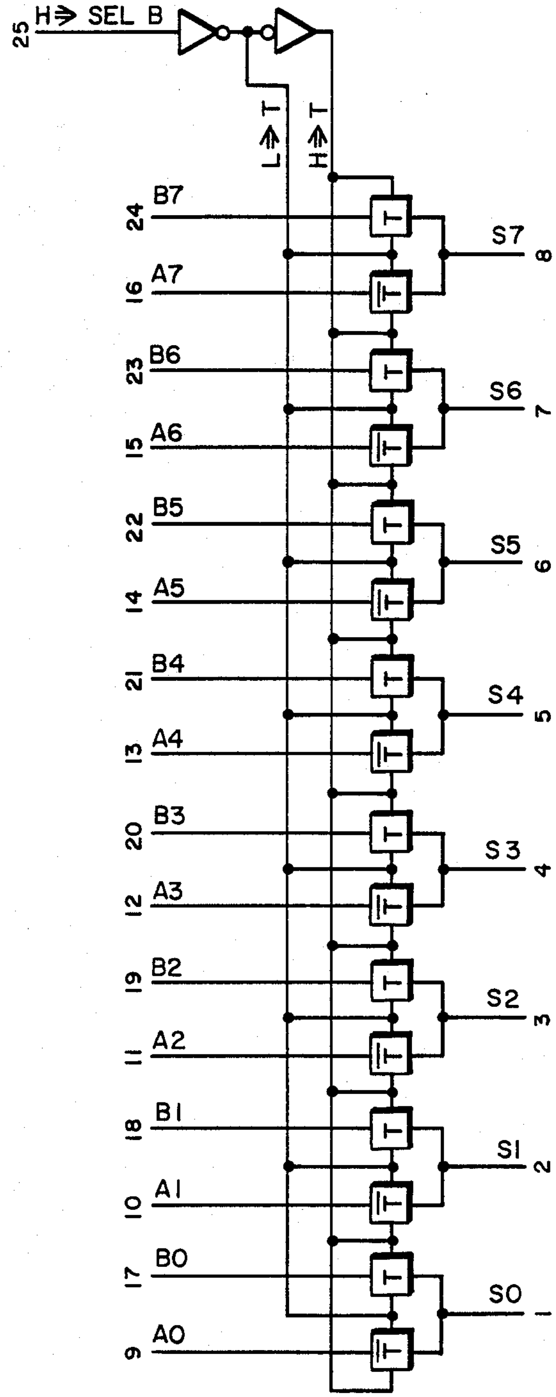
Fig. 69c

| INPUTS | | OUTPUTS | | | | | | | |
|---|---|---|---|---|---|---|---|---|---|
| TEST | SEL LOOP | S0 | S1 | S2 | S3 | S4 | S5 | S6 | S7 |
| L | X | A0 | A1 | A2 | A3 | A4 | A5 | A6 | A7 |
| H | L | B1 | B2 | B3 | B4 | B5 | B6 | B7 | LD |
| H | H | B1 | B2 | B3 | B4 | B5 | B6 | B7 | TD |
Fig. 70b
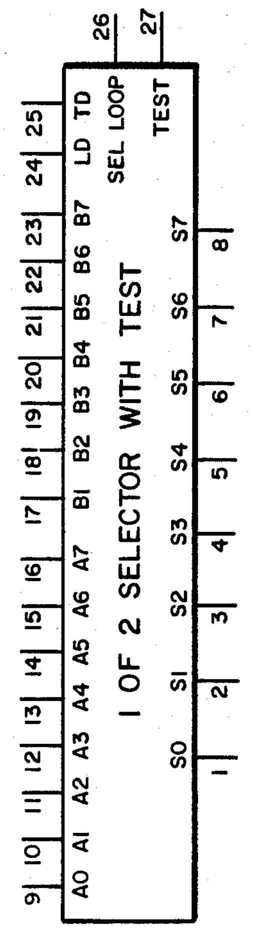
Fig. 70a
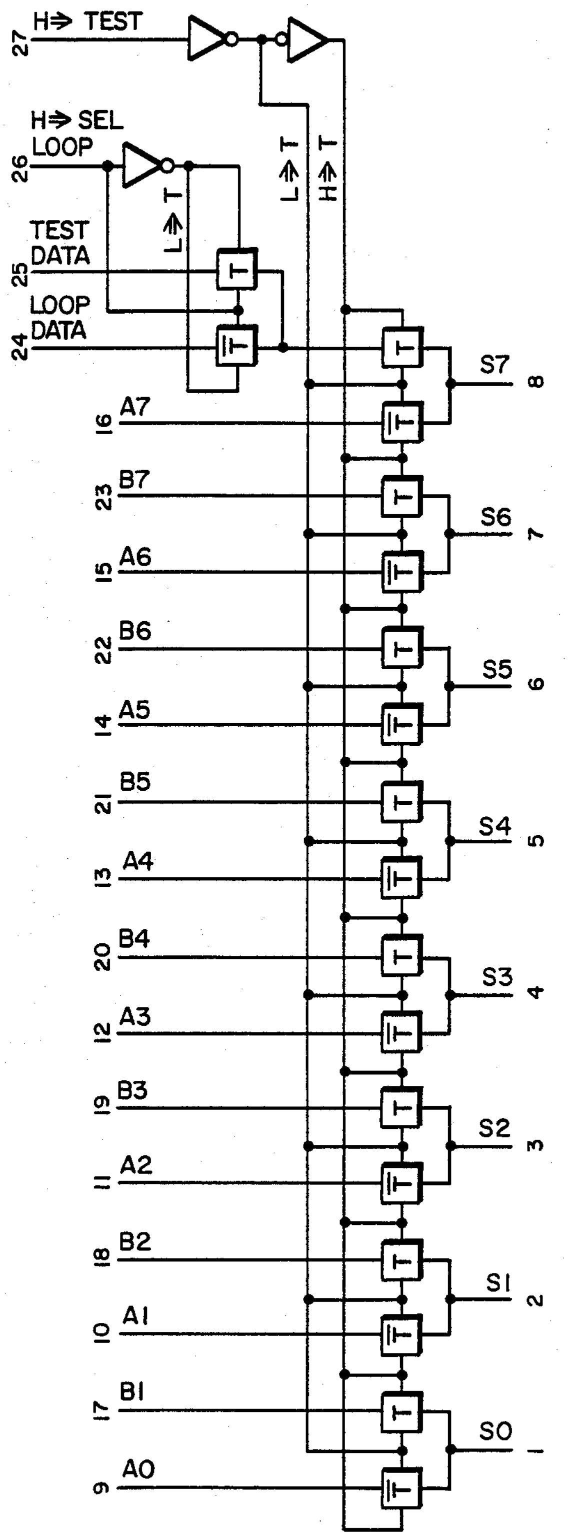
Fig. 70c

| SEL 1 | SEL 0 | OUT |
|---|---|---|
| 0 | 0 | A |
| 0 | 1 | B |
| 1 | 0 | C |
| 1 | 1 | D |

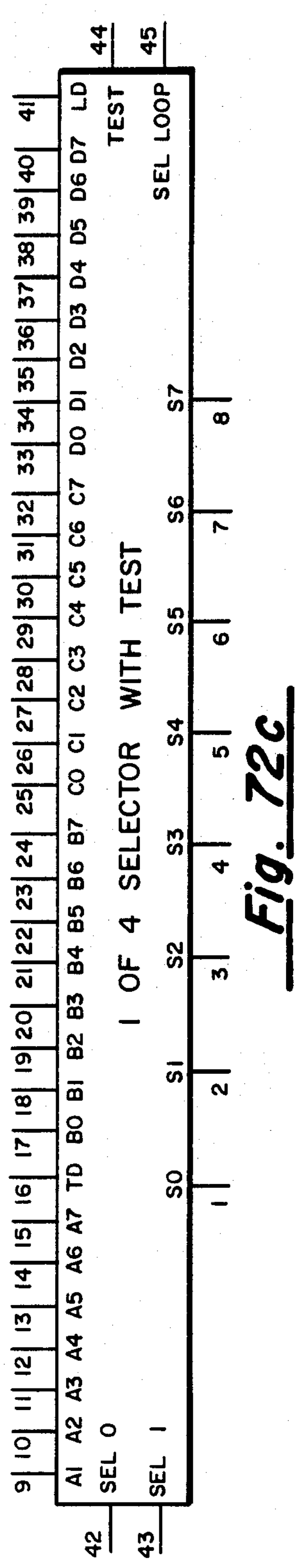
Fig. 72c
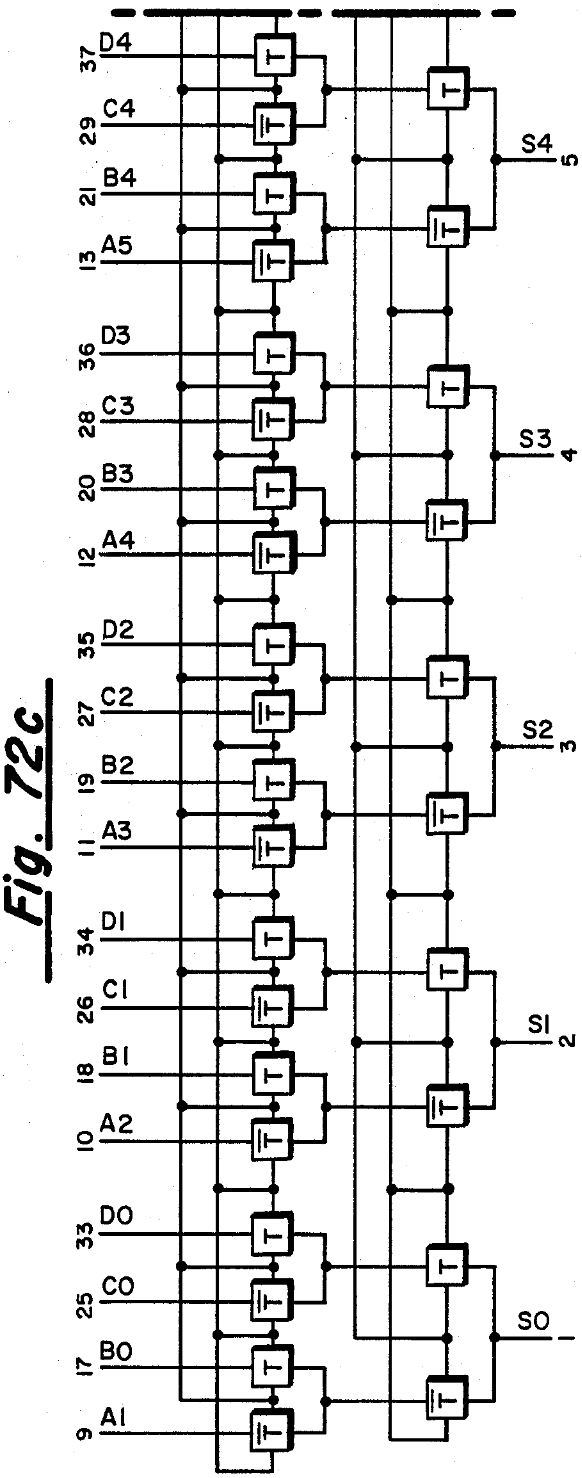
Fig. 72a
Fig. 72
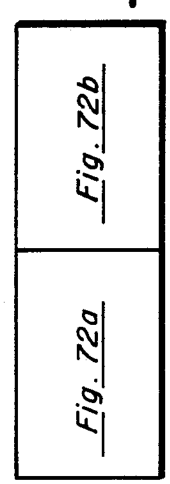

| TEST | SEL LOOP | SEL 0 | SEL 1 | S0-S6 | S7 |
|---|---|---|---|---|---|
| 1 | 0 | X | X | A1-A7 | LOOP DATA |
| 1 | 1 | X | X | A1-A7 | TEST DATA |
| 0 | 0 | 0 | 0 | A1-A7 | LOOP DATA |
| 0 | 1 | 0 | 0 | A1-A7 | TEST DATA |
| 0 | X | 0 | 1 | B0-B6 | B7 |
| 0 | X | 1 | 0 | C0-C6 | C7 |
| 0 | X | 1 | 1 | D0-D6 | D7 |

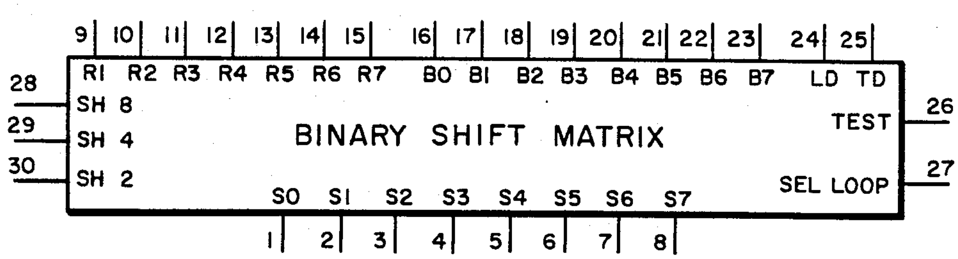
Fig. 73e
| INPUTS | | | | | OUTPUTS | | | | | | | |
|---|---|---|---|---|---|---|---|---|---|---|---|---|
| 8 | 4 | 2 | TEST | SEL LOOP | S0 | S1 | S2 | S3 | S4 | S5 | S6 | S7 |
| H | L | L | L | X | B0 | B1 | B2 | B3 | B4 | B5 | B6 | B7 |
| L | H | L | L | X | R4 | R5 | R6 | R7 | B0 | B1 | B2 | B3 |
| L | L | H | L | X | R2 | R3 | R4 | R5 | R6 | R7 | B0 | B1 |
| L | L | L | L | L | R1 | R2 | R3 | R4 | R5 | R6 | R7 | B0 |
| L | L | L | L | H | R1 | R2 | R3 | R4 | R5 | R6 | R7 | B0 |
| X | X | X | H | L | R1 | R2 | R3 | R4 | R5 | R6 | R7 | LD |
| X | X | X | H | H | R1 | R2 | R3 | R4 | R5 | R6 | R7 | TD |
Fig. 73f
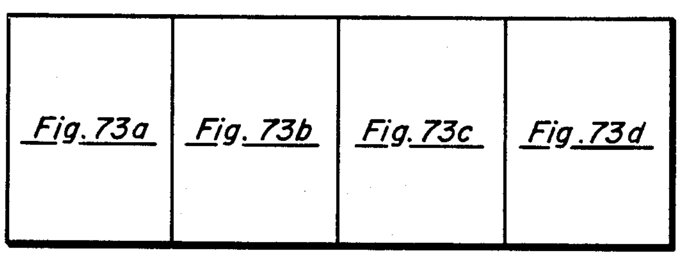
Fig. 73
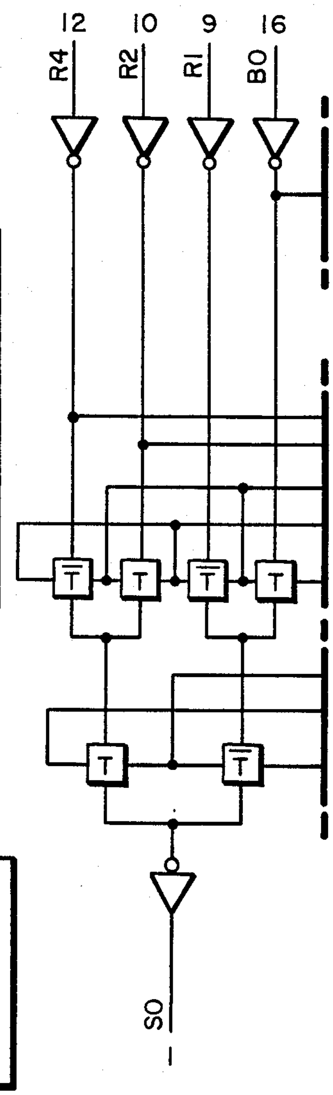
Fig. 73a

| CLEAR | CLK | EN | DATA IN | OUTPUT H⇒M |
|---|---|---|---|---|
| L | X | X | X | L |
| H | L | L | L | L |
| H | L | L | H | H |
| H | H | X | X | MO |
| H | X | H | X | MO |

| CLEAR | CLK | DATA IN | OUTPUT H⇒M |
|---|---|---|---|
| L | X | X | L |
| H | L | L | L |
| H | L | H | H |
| H | H | X | MO |

| FUNCTIONAL SECTION<br>FUNCTIONAL SUBSECTION | MNEMONIC | FIGURE |
|---|---|---|
| USER INTERFACE | | |
| RECEIVE CONTROL - USER INTERFACE | RC-UI | 87 |
| SEND CONTROL | SC | 88 |
| ARBITRATION | A | |
| GROUP COUNT AND SHIFT | A-GCS | 91 |
| MASTER ID REGISTER | A-MID | 92 |
| 1 LINE/GP AND 2 LINE/GP DECODER | A-LGD | 93 |
| 3 BIT CODE GENERATOR 3 TO 8 DECODER | A-LGD | 94 |
| ENCODED GROUP LINE SELECTOR | A-EGLS | 95 |
| GROUP LINE OUTPUT REGISTER | A-GLOR | *89 |
| GROUP LINE OUTPUT GATES | A-GLOG | *89 |
| MASK REGISTER | A-MR | *89 |
| MASK GENERATOR | A-MG | 96 |
| MASK ENABLE GENERATOR | A-MEG | 97 |
| GROUP LINE INPUT | GLI | |
| GROUP LINE INPUT REGISTER MASTER | GLI-MR | *89 |
| GROUP LINE INPUT REGISTER SLAVE | GLI-SR | *89 |
| GROUP LINE INPUT ENCODER | GLI-GLIE | 101 |
| TEST SELECTOR | GLI-TS | 102 |
| 36 BIT GROUP LINE MEMORY | GLI-GLM | 103 |
| INPUT MASTER ID SELECTOR | GLI-IMIDS | 107 |
| WINNERS MASTER ID REGISTER | GLI-WMID | 108 |
| SLAVE IDENTIFICATION/FUNCTION | SID | |

Fig. 85a

| FUNCTIONAL SECTION<br>FUNCTIONAL SUBSECTION | MNEMONIC | FIGURE |
|---|---|---|
| WAIT AND SID/F CONTROL | W | |
| CAM REGISTERS A-D | SID-CAM | *109 |
| CAM MASK REGISTER | SID-CAMM | *109 |
| BSSID INVERTERS | SID-BSSID | *109 |
| CAM COMPARATORS A-D | SID-CAMC | *109 |
| CAM AND WAIT CONTROL | | |
| WAIT DETECTION | W-WD | 110 |
| WAIT CONTROL | W-WC | 110 |
| CAM CONTROL | W-CC | 110 |
| SID/F CONTROL | W-SIDC | 111 |
| SLAVE ID/F MASTER REG. | SID-MR | *112 |
| SLAVE ID/F SLAVE REG. | SID-SR | *112 |
| USER INPUT SID/F SLAVE REG. | SID-UI | *112 |
| RECEIVE COUNTER CONTROL | RC | |
| ARB AND SID CYCLE COUNTER CONTROL | RC-ASCCC | 113 |
| DATA CYCLE COUNTER CONTROL | RC-DCCC | 114 |
| CYCLE COUNTERS | RC-CC | 115 |
| BUSY | BSY | |
| BUSY IN COUNTER CONTROL | BSY-BCC | 116 |
| BUSY IN COUNTER | BSY-BC | 117 |
| BUSY ENABLE | BSY-BE | 118 |
| SID BUSY COUNTER | BSY-SBC | 119 |
| WAIT BUSY COUNTER | BSY-WBC | 119 |
| DATA BUSY COUNTER CONTROL | BSY-DBCC | 120 |
| DATA BUSY COUNTER | BSY-DBC | 121 |
| WORD COUNT MULTIPLIER | BSY-WCM | 122 |
| DATA | D | |
| DATA MASTER REG. | D-DMR | *123 |
| DATA SLAVE REG. | D-DSR | *123 |
| DATA OUTPUT SELECTOR | D-DOS | 124 |
| USER INPUT DATA REG. | D-UIDR | *123 |

Fig. 85b

| FUNCTIONAL SECTION<br>FUNCTIONAL SUBSECTION | MNEMONIC | FIGURE |
|---|---|---|
| CONFIGURATION CONTROL | CC | |
| CONFIGURATION REGISTER | CC-CR | 125 |
| CONFIGURATION TRANSLATION | CC-CT | 126 |
| DRIVER/RECEIVERS | DR | 128,129,130 |
| ARBITRATION SECTION D/R'S | DR-A | 128A-B,129A,130A-B |
| BEGIN SECTION D/R | DR-BGN | 128C, 129A, 130B |
| SLAVE ID/F SECTION D/R'S | DR-SID | 128D-E,129B,130C-D |
| WAIT SECTION D/R | DR-W | 128F, 129B, 130D |
| DATA SECTION D/R's | DR-D | 128G-J,129C-D,130D-G |
| BUSY SECTION D/R | DR-BSY | 128K, 129D, 130H |
| PARITY SECTION D/R's | DR-P | 128L, 129D, 130H |
| PARITY FAULT DETECTION | FD | |
| PARITY GENERATION/PARITY ERROR DETECTION | FD-PGED | 131 |
| MISCELLANEOUS CONTROL | | |
| FAULT REGISTER | FR | 132 |
| CLEAR DISTRIBUTION | CLR | 133 |
| CLOCK DISTRIBUTION | CLK | 134 |
| TEST SIGNAL DISTRIBUTION | TS | 135 |
| SCAN/SET LOOP DATA | SSD | 136 |
| SCAN/SET LOOP CONTROL | SSC | 137 |

*Fig. 85c*

CLK
DR-BSY
(H) Ø1 (12)
(H) Ø2 (6)
(H) Ø1 (10)
(L) Ø1
(L) Ø2
(H) BUSY (IN)
128k01
13425
13439
13421
13401
13427
88g02
88g15
88g32
88g31
88g30
88g29
88g34
88g33
88g16
88g17
ARB IN PRO LATCH Ø1
88g04
88g24
88g06
88g08
88g10
88g36
88g23
88g19
88g21
88g25
88g05
88g27
88g22
88g18
88g20
ARB IN PRO LATCH Ø2
88g12
88g14
88g26
88g28
(H) INIT TRANS FF
(H) ARB IN PRO(Ø1) (1)
(H)ARB IN PRO(Ø1) (2)
(H)ARB IN PRO (Ø2)
(L)ARB IN PRO (Ø2)
(L)ARB IN PRO (Ø1)
(H) MUX ARB LINES
(L) ARB IN PRO FF (Ø1)
88g01
88g03
88g07
88g09
88g11
88g13
DR-A
D-DOS
BSY
W-WC
SID-MR

Fig. 88ℓ
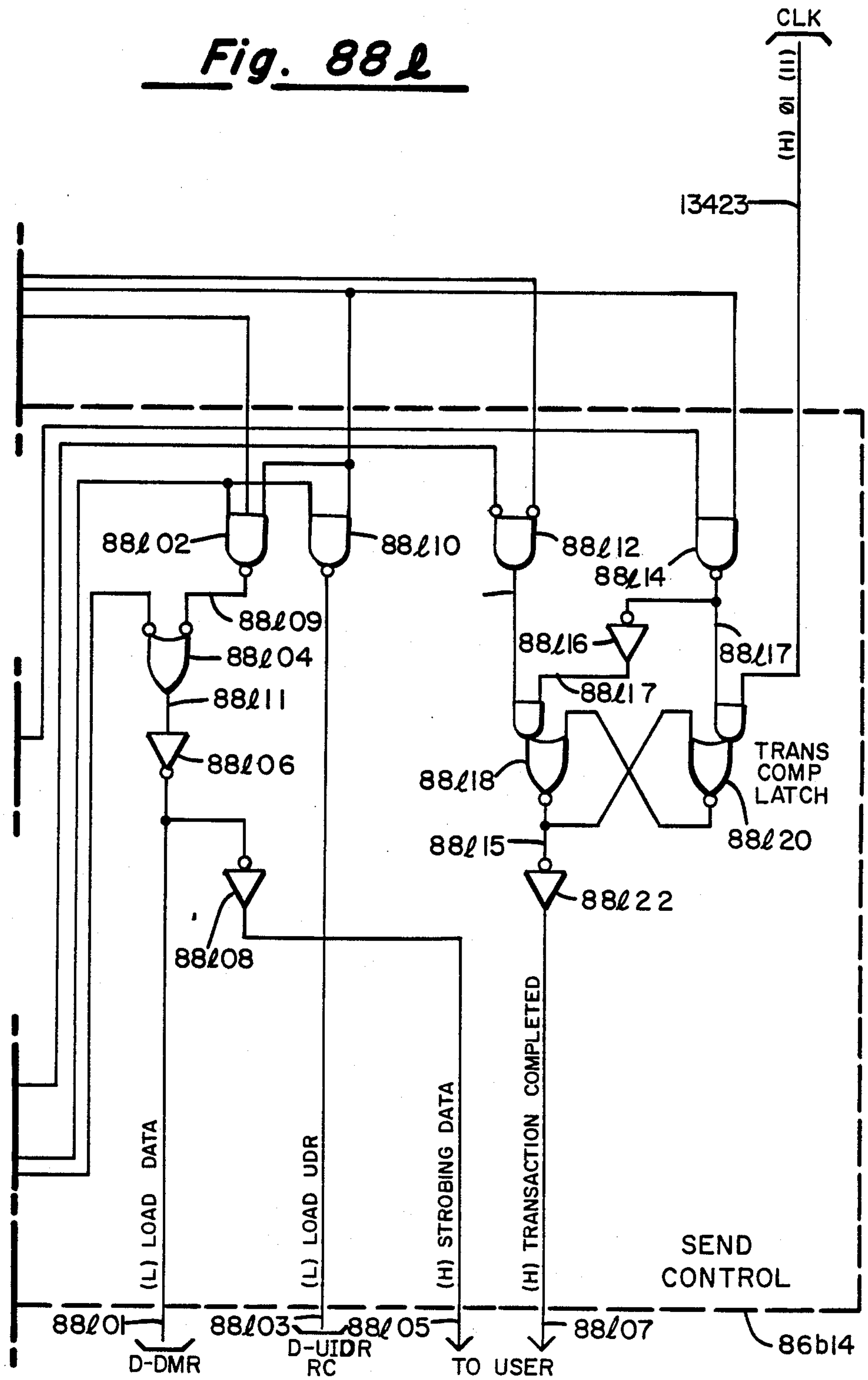

| NUMBER OF GROUPS | PIPELINED | | | | | | | | | | | | | | | |
|---|---|---|---|---|---|---|---|---|---|---|---|---|---|---|---|---|
| | 8 | | | | 4 | | | | 2 | | | | 1 | | | |
| SOURCE OF BIT X \ LINES / GP | 1 | 2 | 4 | 8 | 1 | 2 | 4 | 8 | 1 | 2 | 4 | 8 | 1 | 2 | 4 | 8 |
| 0 | R0 | — | — | — | R0 | R0 | — | — | R0 | R0 | D | — | R0 | R0 | D | B |
| 1 | R1 | — | — | — | R1 | D | — | — | R1 | D | H | — | — | D | H | J |
| 2 | R2 | — | — | — | R2 | R2 | — | — | — | R2 | — | — | — | — | — | K |
| 3 | R3 | — | — | — | R3 | E | — | — | — | E | B | — | — | — | B | A |
| 4 | R4 | — | — | — | — | R4 | — | — | — | — | F | — | — | — | — | — |
| 5 | R5 | — | — | — | — | F | — | — | — | — | I | — | — | — | — | — |
| 6 | R6 | — | — | — | — | R6 | — | — | — | — | — | — | — | — | — | — |
| 7 | R7 | — | — | — | — | G | — | — | — | — | C | — | — | — | — | — |

Fig. 98a

| NUMBER OF GROUPS | MULTIPLEXED | | | | | | | | | | | | | | | |
|---|---|---|---|---|---|---|---|---|---|---|---|---|---|---|---|---|
| | 8 | | | | 4 | | | | 2 | | | | 1 | | | |
| SOURCE OF BIT X \ LINES /GP | 1 | 2 | 4 | 8 | 1 | 2 | 4 | 8 | 1 | 2 | 4 | 8 | 1 | 2 | 4 | 8 |
| 0 | RO | — | — | — | RO | RO | D | — | RO | RO | D | B | RO | RO | D | B |
| 1 | RO | — | — | — | RO | D | H | — | RO | D | H | J | — | D | H | J |
| 2 | RO | — | — | — | RO | RO | D | — | — | RO | — | K | — | — | — | K |
| 3 | RO | — | — | — | RO | D | H | — | — | D | B | A | — | — | B | A |
| 4 | RO | — | — | — | — | RO | D | — | — | — | D | B | — | — | — | — |
| 5 | RO | — | — | — | — | D | H | — | — | — | H | J | — | — | — | — |
| 6 | RO | — | — | — | — | RO | D | — | — | — | — | K | — | — | — | — |
| 7 | RO | — | — | — | — | D | H | — | — | — | B | A | — | — | — | — |

Fig. 98b

1 OF 2 SELECTOR
1 OF 2 SELECTOR
101e01
101e02
101e03
101e04

(H) SELECT
MEMORY INPUTS
GLI-TS
(H)SMI 4
10209
36 BIT GROUP LINE MEMORY
S4 S5 S6 S7
CLR
MASTER REG.-
GP. LINE 4 MEMORY
M4 M4 M5 M5 M6 M6 M7 M7
103e02
M4 M4 M5 M5 M6 M6 M7 M7
CLR
CLK
SLAVE REG.-
GP. LINE 4 MEMORY
S4 S4 S5 S5 S6 S6 S7 S7
103e04
103e03
103e01
(H) GL4S 3
(H) GL4M 3
(H) GL4M 1
(H) GL4M 0
GLI-TS
(H) GROUP LINE
(RANK N) SLAVE BIT (X)
GLI-IMIDS
GROUP LINE
4 MEMORY

| NUMBER OF GROUPS | 8 | | | | 4 | | | | 2 | | | | 1 | | | |
|---|---|---|---|---|---|---|---|---|---|---|---|---|---|---|---|---|
| SOURCE OF BIT X \ LINES /GP | 1 | 2 | 4 | 8 | 1 | 2 | 4 | 8 | 1 | 2 | 4 | 8 | 1 | 2 | 4 | 8 |
| 0 | 0M7 | — | — | — | 0M3 | 0M3 | 0M3 | — | 0M1 | 0M1 | 0M1 | 0M1 | 0M0 | 0M0 | 0M0 | 0M0 |
| 1 | 1M6 | — | — | — | 1M2 | 1M3 | 1M3 | — | 1M0 | 1M1 | 1M1 | 1M1 | — | 1M0 | 1M0 | 1M0 |
| 2 | 2M5 | — | — | — | 2M1 | 2M2 | 2M2 | — | — | 2M0 | 2M1 | 2M1 | — | — | 2M0 | 2M0 |
| 3 | 3M4 | — | — | — | 3M0 | 3M2 | 3M2 | — | — | 3M0 | 3M1 | 3M1 | — | — | 3M0 | 3M0 |
| 4 | 4M3 | — | — | — | — | 4M1 | 4M1 | — | — | — | 4M0 | 4M0 | — | — | — | — |
| 5 | 5M2 | — | — | — | — | 5M1 | 5M1 | — | — | — | 5M0 | 5M0 | — | — | — | — |
| 6 | 6M1 | — | — | — | — | 6M0 | 6M0 | — | — | — | 6M0 | 6M0 | — | — | — | — |
| 7 | 7M0 | — | — | — | — | 7M0 | 7M0 | — | — | — | 7M0 | 7M0 | — | — | — | — |

Fig. 104

Fig. 109a
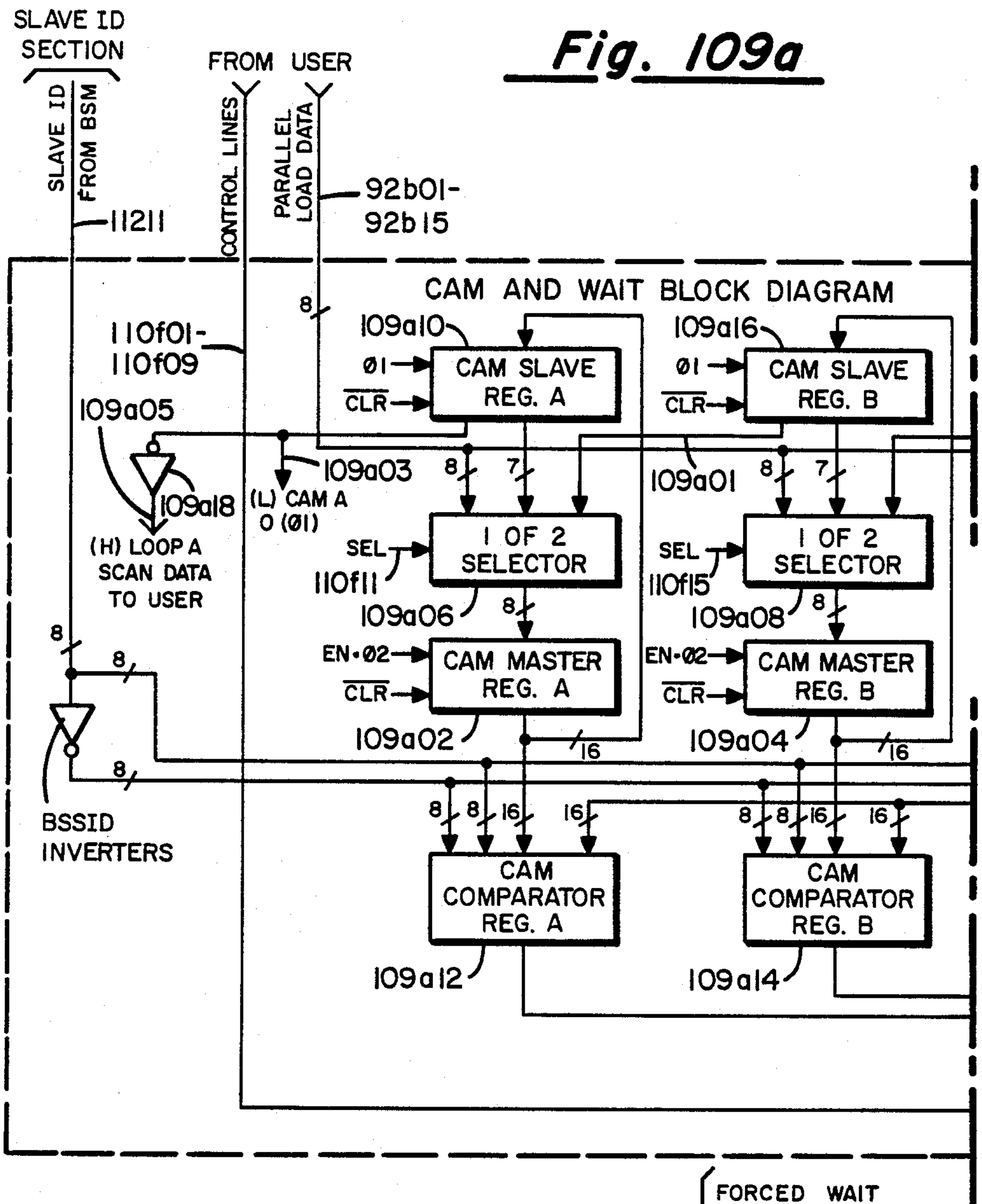
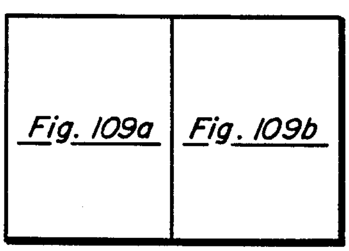
Fig. 109

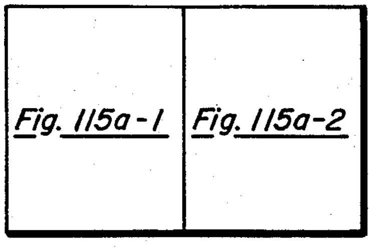
Fig. 115a
Fig. 115a-1
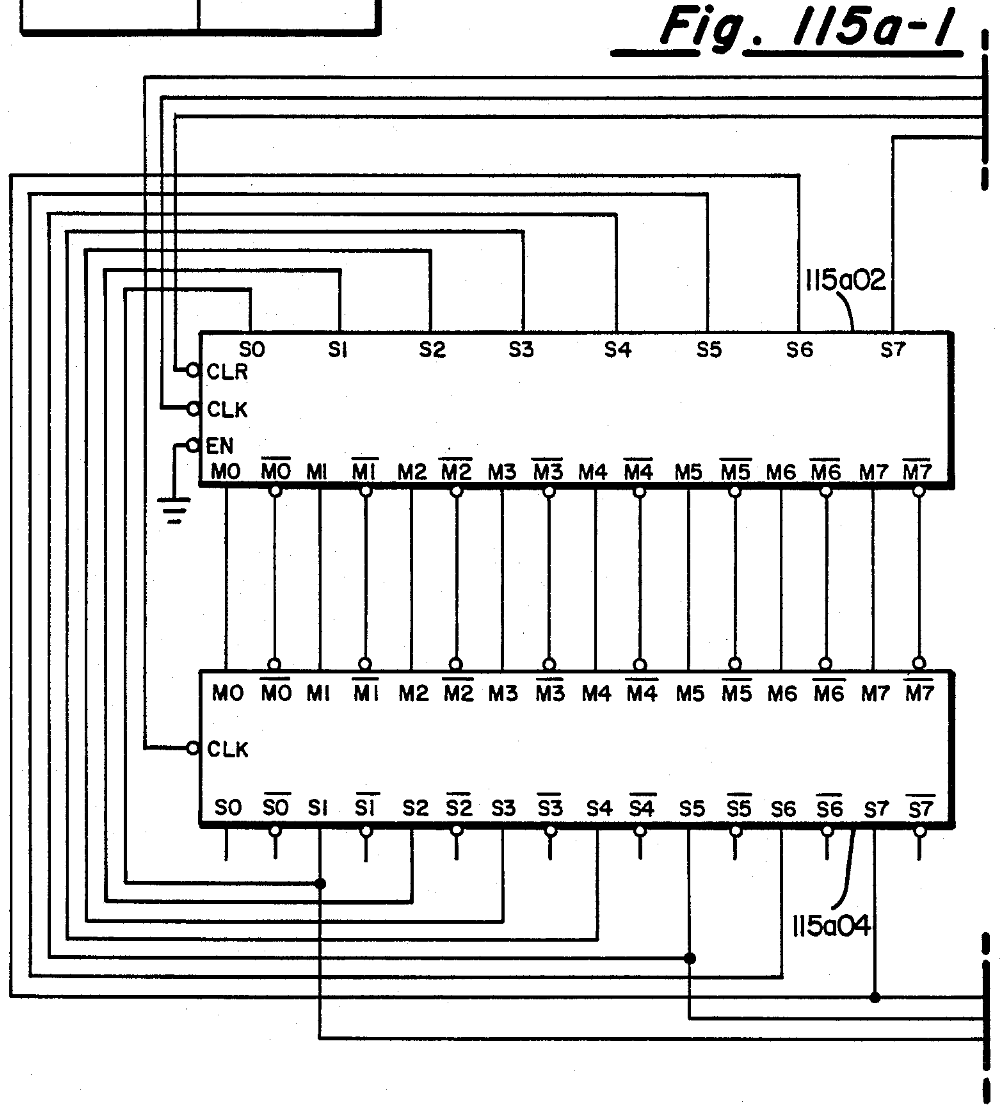

RC-DCCC
(H) DATA COUNT=1
114a05
(H) INIT DCK
114a03
115b02
115b04
CLR
CLK
EN
(L) DCK=8 (Ø1)
115b15
(L) DCK=4 (Ø1)
115b17
(L) DCK=2 (Ø1)
115b19
(L) DCK=1 (Ø1)
115b21
(L) DCK=16 (Ø1)
115b23
(L) SCK=1 (Ø2)
115a13
(L) DCK=1 (Ø2)
115b11
(H) DCK=8 (Ø2)
115b03
(H) DCK=4 (Ø2)
115b05
(H) DCK=16 (Ø2)
115b13
(H) DCK=2 (Ø2)
115b07
(H) DCK=1 (Ø2)
115b09
(L) DCK=1 (Ø2)
115b11
BSY-DBCC
SC
RC-DCCC

FROM USER
123b05
86b04
DATA SECTION
16
123b08
DATA SLAVE REG.-LOWER
Ø2
CLR
DATA SLAVE REG.-UPPER
123b12
123b22
123b05
(H) LOOP C-CARRY 5
126e01
(H) 16 DATA LINES
123b10
1 OF 2 SELECTOR
123b14
123b06
SHIFT COUNT
TEST
BINARY SHIFT MATRIX
123b16
123b04
(L) INIT DATA
88k01
123b18
123b02
DATA MASTER REG.-LOWER
Ø1
DATA MASTER REG.-UPPER
123b20
DATA OUTPUT SELECTOR
86b22
128h01
123b01
123b03
D/R (8)
86b20
128j01
VERSATILE BUS
86a01

| DRIVER/RECEIVER NUMBER | VERSATILE BUS SIGNAL NAME | VERSATILE BUS PIN NUMBER |
|---|---|---|
| DR1 | GROUP LINE 0 | 1 |
| DR2 | GROUP LINE 1 | 2 |
| DR3 | GROUP LINE 2 | 3 |
| DR4 | GROUP LINE 3 | 4 |
| DR5 | GROUP LINE 4 | 5 |
| DR6 | GROUP LINE 5 | 6 |
| DR7 | GROUP LINE 6 | 7 |
| DR8 | GROUP LINE 7 | 8 |
| DR9 | BEGIN | 9 |
| DR10 | SLAVE ID/FUNCTION 0 | 10 |
| DR11 | SLAVE ID/FUNCTION 1 | 11 |
| DR12 | SLAVE ID/FUNCTION 2 | 12 |
| DR13 | SLAVE ID/FUNCTION 3 | 13 |
| DR14 | SLAVE ID/FUNCTION 4 | 14 |
| DR15 | SLAVE ID/FUNCTION 5 | 15 |
| DR16 | SLAVE ID/FUNCTION 6 | 16 |
| DR17 | SLAVE ID/FUNCTION 7 | 17 |
| DR18 | WAIT | 18 |
| DR19 | DATA LINE 0 | 19 |
| DR20 | DATA LINE 1 | 20 |
| DR21 | DATA LINE 2 | 21 |
| DR22 | DATA LINE 3 | 22 |
| DR23 | DATA LINE 4 | 23 |
| DR24 | DATA LINE 5 | 24 |
| DR25 | DATA LINE 6 | 25 |
| DR26 | DATA LINE 7 | 26 |
| DR27 | DATA LINE 8 | 27 |
| DR28 | DATA LINE 9 | 28 |
| DR29 | DATA LINE 10 | 29 |

*Fig. 127d*

| DRIVER/RE-CEIVER NUMBER | VERSATILE BUS SIGNAL NAME | VERSATILE BUS PIN NUMBER |
|---|---|---|
| DR30 | DATA LINE 11 | 30 |
| DR31 | DATA LINE 12 | 31 |
| DR32 | DATA LINE 13 | 32 |
| DR33 | DATA LINE 14 | 33 |
| DR34 | DATA LINE 15 | 34 |
| DR35 | BUSY | 35 |
| DR36 | ODD PARITY | 36 |
| DR37 | EVEN PARITY | 37 |

Fig. 127e

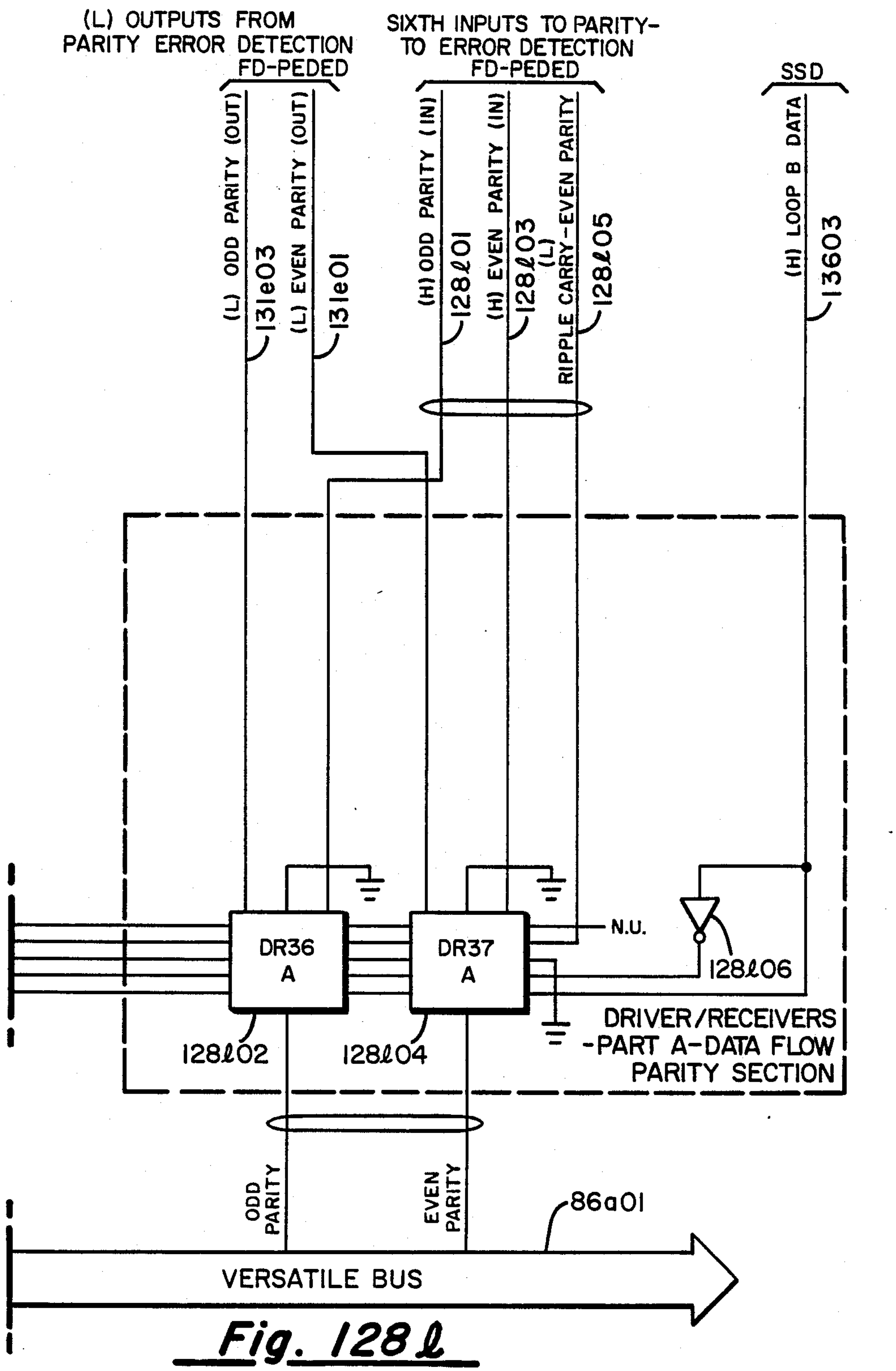
Fig. 128ℓ

Fig. 132a
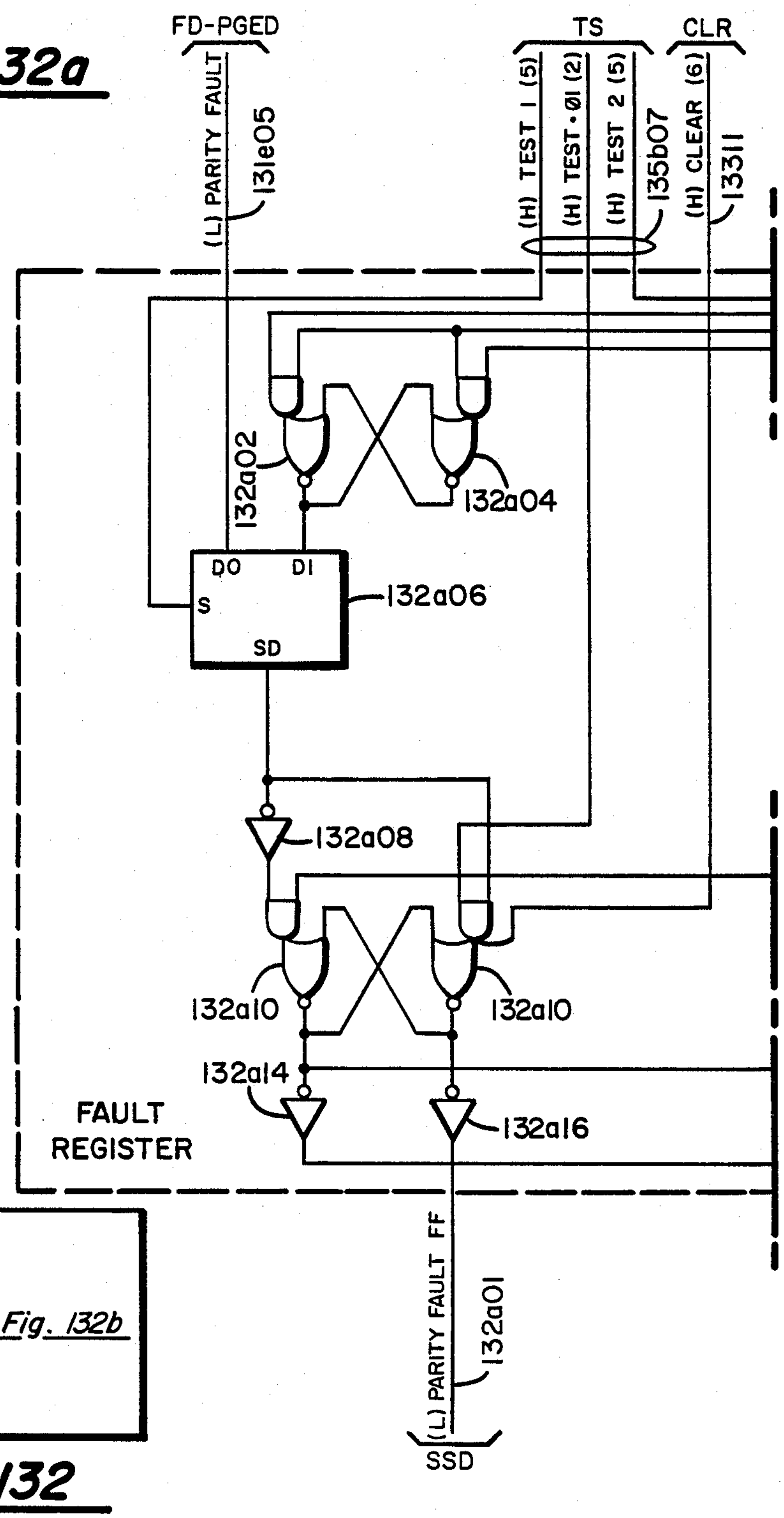
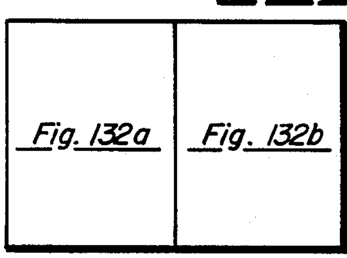
Fig. 132

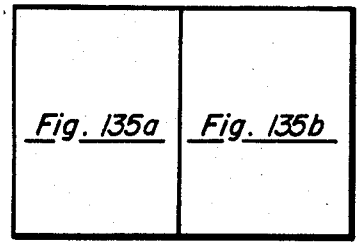
Fig. 135
Fig. 135a
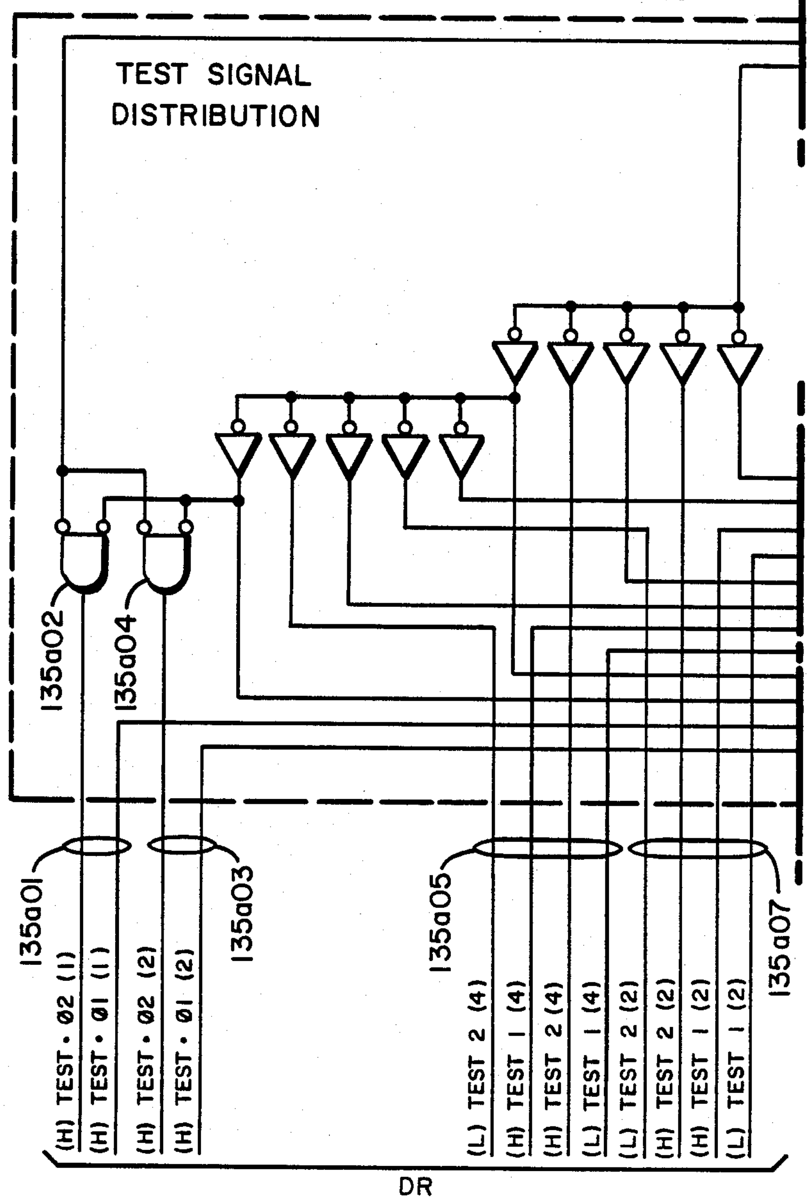

PERMISSIBLE COMBINATIONS OF CONFIGURATION PARAMETERS -- ARBITRATION

| PARAMETER I GROUP LINES | PARAMETER II NO. OF GROUPS | COMMENT |
|---|---|---|
| 8 | 2 | MPX ONLY |
| 8 | 1 | |
| 4 | 4 | MPX ONLY |
| 4 | 2, 1 | |
| 2 | 4, 2, 1 | |
| 1 | 8, 4, 2, 1 | |
| ANY(1, 2, 4, 8) | 0 | |

TOTAL COMBINATIONS = 12 MULTIPLEXED V BUS
10 PIPELINED V BUS
1 NULL CASE (NO ARBITRATION)

*Fig. 138a*

PERMISSIBLE COMBINATIONS OF CONFIGURATION PARAMETERS -- SLAVE ID/FUNCTION

| PARAMETER IV SLAVE ID/FUNCTION LINES | PARAMETER V SLAVE ID/FUNCTION CYCLES |
|---|---|
| 8 | 8, 4, 2, 1 |
| 4 | 8, 4, 2, 1 |
| 2 | 8, 4, 2, 1 |
| 1 | 8, 4, 2, 1 |
| ANY (1, 2, 4, 8) | 0 |

TOTAL COMBINATIONS = 17 (INCLUDING NULL CASE)

*Fig. 138b*

PERMISSIBLE COMBINATIONS OF CONFIGURATION PARAMETERS -- DATA

| PARAMETER VII DATA LINES | PARAMETER VIII DATA BITS |
|---|---|
| 1, 2, 4, 8, 16 | 16 |
| 1, 2, 4, 8 | 8 |
| 1, 2, 4 | 4 |
| 1, 2 | 2 |
| 1 | 1 |

Fig. 138c

TOTAL COMBINATIONS = 15 (NO NULL CASE EXISTS)

PERMISSIBLE COMBINATIONS OF CONFIGURATION PARAMETERS MULTIPLEXED SLAVE ID/FUNCTION

| PARAMETER IV = PARAMETER VII SLAVE ID/FUNCTION LINES = DATA LINES | PARAMETER V SLAVE ID/FUNCTION CYCLES | PARAMETER VIII DATA BITS |
|---|---|---|
| 16 | 8, 4, 2, 1, 0 | 16 |
| 8 | 8, 4, 2, 1, 0 | 16 |
| 8 | 8, 4, 2, 1, 0 | 8 |
| 4 | 8, 4, 2, 1, 0 | 16 |
| 4 | 8, 4, 2, 1, 0 | 8 |
| 4 | 8, 4, 2, 1, 0 | 4 |
| 2 | 8, 4, 2, 1, 0 | 16 |
| 2 | 8, 4, 2, 1, 0 | 8 |
| 2 | 8, 4, 2, 1, 0 | 4 |
| 2 | 8, 4, 2, 1, 0 | 2 |
| 1 | 8, 4, 2, 1, 0 | 16 |
| 1 | 8, 4, 2, 1, 0 | 8 |
| 1 | 8, 4, 2, 1, 0 | 4 |
| 1 | 8, 4, 2, 1, 0 | 2 |
| 1 | 8, 4, 2, 1, 0 | 1 |

TOTAL COMBINATIONS = 75 (NO NULL CASES EXIST)

Fig. 138d

PERMISSIBLE COMBINATIONS OF CONFIGURABLE PARAMETERS -- MULTIPLEXED ARBITRATION

| PARAMETER I = PARAMETER IV GROUP LINES = SLAVE ID/FUNCTION LINES | PARAMETER II NO. OF GROUPS | PARAMETER V SLAVE ID/FUNCTION CYCLES | COMMENT |
|---|---|---|---|
| 8 | 2 | 8, 4, 2, 1, 0 | MPX ONLY |
| 8 | 1 | 8, 4, 2, 1, 0 | |
| 8 | 0 | 8, 4, 2, 1 | |
| 4 | 4 | 8, 4, 2, 1, 0 | MPX ONLY |
| 4 | 2 | 8, 4, 2, 1, 0 | |
| 4 | 1 | 8, 4, 2, 1, 0 | |
| 4 | 0 | 8, 4, 2, 1 | |
| 2 | 4 | 8, 4, 2, 1, 0 | |
| 2 | 2 | 8, 4, 2, 1, 0 | |
| 2 | 1 | 8, 4, 2, 1, 0 | |
| 2 | 0 | 8, 4, 2, 1 | |
| 1 | 8 | 8, 4, 2, 1, 0 | |
| 1 | 4 | 8, 4, 2, 1, 0 | |
| 1 | 2 | 8, 4, 2, 1, 0 | |
| 1 | 1 | 8, 4, 2, 1, 0 | |
| 1 | 0 | 8, 4, 2, 1 | |
| ANY | 0 | 0 | |

TOTAL COMBINATIONS = 76 MULTIPLEXED V BUS
66 PIPELINED V BUS
1 DOUBLE NULL CASE (NO ARBITRATION, NO SLAVE ID/FUNCTION)

*Fig. 138e*

PERMISSIBLE COMBINATIONS OF CONFIGURATION PARAMETERS
ARBITRATION MULTIPLEXED AND SLAVE ID/FUNCTION MULTIPLEXED

| PARAMETER I =PARAMETER IV=PARAMETER VII=GROUP LINES=SLAVE ID/FUNCTION LINES=DATA LINES | PARAMETER II NO. OF GROUPS | PARAMETER V SLAVE ID/ FUNCTION CYCLES | PARAMETER VIII DATA BITS | COMMENT |
|---|---|---|---|---|
| 16 | 2 | 8,4,2,1,0 | 16 | MPX ONLY |
| 16 | 1,0 | 8,4,2,1,0 | 16 | |
| 8 | 2 | 8,4,2,1,0 | 16 | MPX ONLY |
| 8 | 1,0 | 8,4,2,1,0 | 16 | |
| 8 | 2 | 8,4,2,1,0 | 8 | MPX ONLY |
| 8 | 1,0 | 8,4,2,1,0 | 8 | |
| 4 | 4 | 8,4,2,1,0 | 16 | MPX ONLY |
| 4 | 2,1,0 | 8,4,2,1,0 | 16 | |
| 4 | 4 | 8,4,2,1,0 | 8 | MPX ONLY |
| 4 | 2,1,0 | 8,4,2,1,0 | 8 | |
| 4 | 4 | 8,4,2,1,0 | 4 | MPX ONLY |
| 4 | 2,1,0 | 8,4,2,1,0 | 4 | |
| 2 | 4,2,1,0 | 8,4,2,1,0 | 16 | |
| 2 | 4,2,1,0 | 8,4,2,1,0 | 8 | |
| 2 | 4,2,1,0 | 8,4,2,1,0 | 4 | |
| 2 | 4,2,1,0 | 8,4,2,1,0 | 2 | |
| 1 | 8,4,2,1,0 | 8,4,2,1,0 | 16 | |
| 1 | 8,4,2,1,0 | 8,4,2,1,0 | 8 | |
| 1 | 8,4,2,1,0 | 8,4,2,1,0 | 4 | |
| 1 | 8,4,2,1,0 | 8,4,2,1,0 | 2 | |
| 1 | 8,4,2,1,0 | 8,4,2,1,0 | 1 | |

TOTAL COMBINATIONS = 330 MULTIPLEXED V BUS
300 PIPELINED V BUS

*Fig. 138f*

| PIN MULTIPLEXING CONFIGURATION PARAMETERS I | IV | VI | PIPELINED/ MULTIPLEXED PARAMETERS III | POSSIBLE CHOICES FOR CONFIGURATION PARAMETERS (BY EACH CONFIGURATION PARAMETER) I II III IV V VI VII VIII | TOTAL COMBINATIONS |
|---|---|---|---|---|---|
| ≠1 | ≠1 | ≠1 | 1 | 12 : 1 : 17 : 2 : 15 | 6120 |
| ≠1 | ≠1 | ≠1 | 2 | 11 : 1 : 17 : 2 : 15 | 5610 |
| ≠1 | ≠1 | 1 | 1 | 12 : 1 : 17 : 1 : 15 | 3010 |
| ≠1 | ≠1 | 1 | 2 | 11 : 1 : 17 : 1 : 15 | 2805 |
| ≠1 | 1 | ≠1 | 1 | 12 : 1 : 1 : : 2 : 75 | 1800 |
| ≠1 | 1 | ≠1 | 2 | 11 : 1 : 1 : : 2 : 75 | 1650 |
| ≠1 | 1 | 1 | 1 | 12 : 1 : 1 : : 1 : 75 | 900 |
| ≠1 | 1 | 1 | 2 | 11 : 1 : 1 : : 1 : 75 | 825 |
| 1 | ≠1 | ≠1 | 1 | 1 : : 1 : 76 : 2 : 15 | 2280 |
| 1 | ≠1 | ≠1 | 2 | 1 : : 1 : 67 : 2 : 15 | 2010 |
| 1 | ≠1 | 1 | 1 | 1 : : 1 : 76 : 1 : 15 | 1140 |
| 1 | ≠1 | 1 | 2 | 1 : : 1 : 67 : 1 : 15 | 1005 |
| 1 | 1 | ≠1 | 1 | 1 : : 1 : 1 : 2 : 330 | 660 |
| 1 | 1 | ≠1 | 2 | 1 : : 1 : 1 : 2 : 300 | 600 |
| 1 | 1 | 1 | 1 | 1 : : 1 : 1 : 1 : 330 | 330 |
| 1 | 1 | 1 | 2 | 1 : : 1 : 1 : 1 : 300 | 300 |
| | | | | GRAND TOTAL COMBINATIONS | 31,045 |

Fig. 139

VERSATILE BUS INTERFACE LOGICS SCAN/SET INTERCONNECT

LOOP A -- CLOCK Φ1 USED

| LOOP SIGNAL ELEMENTS THREADED | SECTION MNEMONIC | REFERENCE DESIGNATION |
|---|---|---|
| (H) LOOP A DATA | SSD | 13601 |
| (CAM D) 1 OF 2 SELECTOR (102) | SID-CAM | 109B18 |
| CAM MASTER REG. D (MR8) | SID-CAM | 109B08 |
| CAM SLAVE REG. D (SR8) | SID-CAM | 109B74 |
| (H) CAMD -- 0 (SLAVE) | SID-CAM | 109B03 |
| (CAM C) 1 OF 2 SELECTOR (102) | SID-CAM | 109B16 |
| CAM MASTER REG. C (MR8) | SID-CAM | 109B06 |
| CAM SLAVE REG. C (SR8) | SID-CAM | 109B22 |
| (H) CAMC -- 0 (SLAVE) | SID-CAM | 109B05 |
| (CAM B) 1 OF 2 SELECTOR (102) | SID-CAM | 109A08 |
| CAM MASTER REG. B (MR8) | SID-CAM | 109A04 |
| CAM SLAVE REG. B (SR8) | SID-CAM | 109A16 |
| (H) CAMB -- 0 (SLAVE) | SID-CAM | 109A01 |
| (CAM A) 1 OF 2 SELECTOR (102) | SID-CAM | 109A06 |
| CAM MASTER REG. A (MR8) | SID-CAM | 109A02 |
| CAM SLAVE REG. A (SR8) | SID-CAM | 109A10 |
| (L) CAMA 0 (Φ1) [NOTE 1] | SID-CAM | 109A03 |
| (ONE OF TWO SELECTOR) (102) | SSD | 13602 |
| (INVERTER) (IN1) | SSD | 13604 |
| (H) LOOP A DATA | SSD | 13601 |

[NOTE 1]: OR BRANCH INSTEAD TO:

| | | |
|---|---|---|
| INVERTER (IN1) | SID-CAM | 109A18 |
| (H) LOOP A SCAN DATA [TO VM NODE] | SID-CAM | 109A05 |

Fig. 140

VERSATILE BUS INTERFACE LOGICS SCAN/SET INTERCONNECT

LOOP B -- CLOCK 01 USED

| LOOP SIGNAL<br>ELEMENTS THREADED | SECTION<br>MNEMONIC | REFERENCE<br>DESIGNATION |
|---|---|---|
| (H) LOOP B DATA | SSD | 13603 |
| DRIVER RECEIVER 37A (DR37A) | DR-P | 128L04 |
| DR36 A | DR-P | 128L02 |
| DR35 A | DR-BSY | 128K02 |
| DR34 A | DR-D | 128J08 |
| DR33 A | DR-D | 128J06 |
| DR32 A | DR-D | 128J04 |
| DR31 A | DR-D | 128J02 |
| • | • | • |
| • | • | • |
| • | • | • |
| DR6 A | DR-A | 128B04 |
| DR5 A | DR-A | 128B02 |
| DR4 A | DR-A | 128A08 |
| DR3 A | DR-A | 128A06 |
| DR2 A | DR-A | 128A04 |
| DR1 A | DR-A | 128A02 |
| (INVERTER) (IN1) | DR-A | 128A10 |
| (L) FAULT GLO | DR-A | 128A03 |
| (ONE OF TWO SELECTOR) (S12) | FR | 128B20 |
| (SLAVE LATCH) (IN1 + 2 AOI 2-1) | FR | 128B22, 128B24, 128B26 |
| (MASTER LATCH) (2 AOI 2-1) | FR | 128B28, 128B30 |
| (ONE ON TWO SELECTOR (S12) | FR | 132B04 |
| (SLAVE LATCH) (IN1 + 2 AOI 2-1) | FR | 132B06, 132B08, 132B10 |
| (MASTER LATCH) (2 AOI 2-1) | FR | 132B12, 132B14 |
| (SLAVE LATCH) (2 AOI 2-1) | FR | 132A02, 132A04 |
| (ONE OF TWO SELECTOR) (S12) | FR | 132A06 |
| (MASTER LATCH)(IN1 + 2 AOI 2-1) [NOTE 1] | FR | 132A08, 132A10, 132A12 |
| (INVERTER) (IN1) | FR | 132A16 |

Fig. 141a

| LOOP SIGNAL ELEMENTS THREADED | SECTION MNEMONIC | REFERENCE DESIGNATION |
|---|---|---|
| (L) PARITY FAULT FF | FR | 132A01 |
| (ONE OF TWO SELECTOR (S12) | SSD | 13606 |
| (INVERTER (IN1) | SSD | 13608 |
| (H) LOOP B DATA | SSD | 13603 |
| [NOTE 1] = OR BRANCH INSTEAD TO | | |
| INVERTER (IN1) | FR | 132B02 |
| (H) LOOP B SCAN DATA [TO VM NODE] | FR | 132B03 |

Fig. 141b

VERSATILE BUS INTERFACE LOGICS SCAN/SET INTERCONNECT
LOOP C -- CLOCK 01 USED

| LOOP SIGNAL<br>ELEMENTS THREADED | SECT.<br>MNEM. | REF.<br>DESIG. |
|---|---|---|
| (H) LOOP C DATA | SSD | 13605 |
| (USER INPUT DATA UPPER) 1 OF 2 SELECTOR (102) | D-UIDR | 123A10 |
| USER INPUT DATA REG. UPPER - MASTER (MR 8) | D-UIDR | 123A12 |
| USER INPUT DATA REG. UPPER - SLAVE (SR8) | D-UIDR | 123A08 |
| (H) UIDS 8 | D-UIDR | 123A01 |
| (USER INPUT DATA LOWER) 1 OF 2 SELECTOR (102) | D-UIDR | 123A04 |
| USER INPUT DATA REG. LOWER - MASTER (MR8) | D-UIDR | 123A06 |
| USER INPUT DATA REG. LOWER - SLAVE (SR8) | D-UIDR | 123A02 |
| (INVERTER) (IN1) | D-UIDR | 123A14 |
| (H) LOOP C - CARRY 6 | D-UIDR | 123A03 |
| (DATA UPPER) BINARY SHIFT MATRIX (BSM) | D | 123B16 |
| (DATA UPPER) 1 OF 2 SELECTOR (102) | D | 123B18 |
| DATA MASTER REG. - UPPER (MR8) | D | 123B20 |
| DATA SLAVE REG. - UPPER (SR8) | D | 123B12 |
| (DATA LOWER) 1 OF 2 SELECTOR (102) | D | 123B10 |
| (DATA LOWER) BINARY SHIFT MATRIX (BSM) | D | 123B06 |
| (DATA LOWER) 1 OF 2 SELECTOR (102) | D | 123B04 |
| DATA MASTER REG. - LOWER (MR8) | D | 123B02 |
| DATA SLAVE REG. - LOWER (SR8) | D | 123B08 |
| (INVERTER) (IN1) | D | 123B22 |
| (H) LOOP C - CARRY 5 | D | 123B05 |
| (USER INPUT SID) 1 OF 2 SELECTOR (102) | SID | 11212 |
| USER INPUT SID MASTER REG. (MR8) | SID | 11210 |
| USER INPUT SID SLAVE REG. (SR8) | SID | 11214 |
| (INVERTER)(IN1) | SID | 11216 |
| (H) LOOP C - CARRY 4 | SID | 11213 |
| (SLAVE ID/F) BINARY SHIFT MATRIX (BSM) | SID | 11204 |
| (SLAVE ID/F) 1 OF 2 SELECTOR (102) | SID | 11206 |
| SLAVE ID/F MASTER REG. (MR8) | SID | 11208 |
| SLAVE ID/F SLAVE REG. (SR8) | SID | 11202 |
| (INVERTER) (IN1) | SID | 11218 |

Fig. 142a

| LOOP SIGNAL<br>ELEMENTS THREADED | SECT.<br>MNEM. | REF.<br>DESIG. |
|---|---|---|
| (H) LOOP C - CARRY 3 | SID | 11215 |
| (WMID) 1 OF 2 SELECTOR (102) | GLI-WMID | 108A02 |
| SLAVE REG. - WMID (SR8) | GLI-WMID | 108B02 |
| (INVERTER) (IN1) | GLI-WMID | 108B04 |
| (H) LOOP C - CARRY 2 | GLI-WMID | 108B01 |
| (GROUP LINE INPUT) 1 OF 2 SELECTOR | GLI | 89D02 |
| (GROUP LINE INPUT MULTIPLEX) 1 OF 2 SELECTOR (S12) | GLI | 86A28 |
| MASTER REG. - GROUP LINE INPUT | GLI | 89D04 |
| SLAVE REG. - GROUP LINE INPUT | GLI | 89D06 |
| INVERTER (IN1) | GLI | 89D08 |
| (H) LOOP C - CARRY 1 | GLI | 89A05 |
| (ENCODED GROUP LINE) 1 OF 4 SELECTOR (104) | GLI | 89A06 |
| GROUP LINE OUTPUT REG. (MASTER) (MR8) | GLI | 89A10 |
| SLAVE REG. - GROUP LINE OUTPUT (SR8) | GLI | 89A12 |
| (L) GLOS 0 [NOTE 1] | GLI | 89A07 |
| (1 OF 2 SELECTOR) (S12) | SSD | 13610 |
| (INVERTER) (IN1) | SSD | 13612 |
| (H) LOOP C DATA | SSD | 13605 |

[NOTE 1] OR BRANCH INSTEAD TO:

| | | |
|---|---|---|
| (INVERTER) (IN1) | GLI | 89A16 |
| (H) LOOP C SCAN DATA [TO VM NODE] | GLI | 89A11 |

*Fig. 142b*

VERSATILE INTERFACE LOGICS SCAN/SET INTERCONNECT
LOOP D -- CLOCK Ø2 USED

| LOOP SIGNALS<br>ELEMENTS THREADED | SECT.<br>MNEM. | REF.<br>DESIG. |
|---|---|---|
| (H) LOOP D DATA | SSD | 13607 |
| (CONF. REG. BITS 24-27 MASTER) (MR4) | CC-CR | 125H02 |
| (CONF. REG BITS 24-27 SLAVE) (SR4) | CC-CR | 125G02 |
| (CONF. REG. BITS 23-16 MASTER) (MR8) | CC-CR | 125F02 |
| (CONF. REG. BITS 23-16 SLAVE) (SR8) | CC-CR | 125E02 |
| (CONF. REG. BITS 15-8 MASTER) (MR8) | CC-CR | 125D02 |
| (CONF. REG. BITS 15-8 SLAVE) (SR8) | CC-CR | 125C02 |
| (CONF. REG. BITS 7-0 MASTER) (MR8) | CC-CR | 125B02 |
| (CONF. REG. BITS 7-0 SLAVE) (SR8) | CC-CR | 125A02 |
| INVERTER (IN1) | CC-CR | 125A04 |
| (H) LOOP D - CARRY 6 | CC-CR | 124A01 |
| (DATA BUSY COUNTER) 1 OF 2 SELECTOR (102) | BSY-DBC | 121B08 |
| DATA BUSY COUNTER MASTER REG. (MR8) | BSY-DBC | 121B10 |
| DATA BUSY COUNTER SLAVE REG. (SR8) | BSY-DBC | 121B02 |
| (DATA BUSY COUNTER) 1 OF 2 | BSY-DBC | 121B04 |
| SELECTOR (102) | BSY-DBC | 121B04 |

*Fig. 143a*

| LOOP SIGNALS<br>ELEMENTS THREADED | SECT.<br>MNEM. | REF.<br>DESIG. |
|---|---|---|
| (H) LOOP D - CARRY 5 | BSY-DBC | 121B01 |
| (SID BUSY COUNTER) 1 OF 2 | BSY-SBC | 119C02 |
| SID BUSY COUNTER MASTER REG. (MR8) | BSY-SBC | 119C04 |
| SID BUSY COUNTER SLAVE REG. (SR8) | BSY-SBC | 119B02 |
| (SID BUSY COUNTER) 1 OF 2 SELECTOR (102) | BSY-SBC | 119B04 |
| (H) LOOP D - CARRY 4 | BSY-SBC | 119B01 |
| (CAM MASK) 1 OF 2 SELECTOR (102) | SID-CAMM | 109B20 |
| (CAM) MASTER REG. - MASK (MR8) | SID-CAMM | 109B10 |
| CAM SLAVE MASK (SR8) | SID-CAMM | 109B26 |
| (INVERTER) (IN1) | SID-CAMM | 109B28 |
| (H) LOOP D - CARRY 3 | SID-CAMM | 109B07 |
| TEST SELECTOR (102) | GLI-TS | 10202 |
| (H) SMI 7 | GLI-TS | 10215 |
| M-GL7M (MR8) | GLI-GLM | 103H02 |
| S-GL7M (SR8) | GLI-GLM | 103H04 |
| (H) GL7S 0 | GLI-GLM | 103H01 |
| TEST SELECTOR (102) | GLI-TS | 10202 |
| (H) SMI 6 | GLI-TS | 10213 |
| M-GL6M (MR8) | GLI-GLM | 103G02 |
| S-GL6M (SR8) | GLI-GLM | 103G04 |
| (H) GL6S 1 | GLI-GLM | 103G01 |
| TEST SELECTOR (102) | GLI-TS | 10202 |
| (H) SMI 5 | GLI-TS | 10211 |
| M-GL5M (MR8) | GLI-GLM | 103F02 |
| S-GL5M (SR8) | GLI-GLM | 103F04 |
| (H) GL5S 2 | GLI-GLM | 103F01 |
| TEST SELECTOR (102) | GLI-TS | 10101 |
| (H) SMI 4 | GLI-TS | 10209 |
| M-GP.L.4 MEM. (MR8) | GLI-GLM | 103E02 |
| S-GP.L.4 MEM. (SR8) | GLI-GLM | 103E04 |
| (H) GL4S 3 | GLI-GLM | 103E01 |
| TEST SELECTOR (102) | GLI-TS | 10202 |

Fig. 143b

| LOOP SIGNALS<br>ELEMENTS THREADED | SECT.<br>MNEM. | REF.<br>DESIG. |
|---|---|---|
| (H) SMI 3 | GLI-TS | 10207 |
| M-GP.L. 3 MEM. (MR8) | GLI-GLM | 103D02 |
| S-GP.L. 3 MEM. (SR8) | GLI-GLM | 103D04 |
| (H) GL3S 4 | GLI-GLM | 103D01 |
| TEST SELECTOR (102) | GLI-TS | 10202 |
| (H) SMI 2 | GLI-TS | 10205 |
| MASTER-GP. LINE 2 MEM. (MR8) | GLI-GLM | 103C02 |
| SLAVE-GP. LINE 2 MEM. (SR8) | GLI-GLM | 103C04 |
| (H) GL2S 5 | GLI-GLM | 103C01 |
| TEST SELECTOR (102) | GLI-TS | 10202 |
| (H) SMI 1 | GLI-TS | 10203 |
| MASTER-GROUP LINE 1 MEM. (MR8) | GLI-GLM | 103B02 |
| SLAVE-GROUP LINE 1 MEM. (SR8) | GLI-GLM | 103B04 |
| (H) GLIS 6 | GLI-GLM | 103B01 |
| TEST SELECTOR (102) | GLI-TS | 10202 |
| (H) SMI 0 | GLI-TS | 10201 |
| MASTER REG.-GROUP LINE 0 MEM. (MR8) | GLI-GLM | 103A02 |
| SLAVE REG.-GROUP LINE 0 MEM. (SR8) | GLI-GLM | 103A04 |
| INVERTER (IN1) | GLI-GLM | 103A06 |
| (H) LOOP D - CARRY 2 | GLI-GLM | 103A01 |
| (MASK) 1 OF 2 SELECTOR (102) | A-MR | 89B14 |
| MASTER REG. - MASK (MR8) | A-MR | 96B12 |
| SLAVE REG. - MASK (SR8) | A-MR | 89B16 |
| (INVERTER) (IN1) | A-MR | 89B18 |
| (H) LOOP D- CARRY 1 | A-MR | 89B07 |
| (MASTER ID) BINARY SHIFT MATRIX (BSM) | A-MID | 92A02 |
| MASTER REG. - MASTER ID (MR8) | A-MID | 92A04 |
| SLAVE REG. - MASTER ID (SR8) | A-MID | 92B02 |
| (H) MIDS 0 [NOTE 1] | A-MID | 92B01 |
| (1 OF 2 SELECTOR) (S12) | SSD | 13614 |
| (INVERTER) (IN1) | SSD | 13616 |

Fig. 143c

| LOOP SIGNALS<br>ELEMENTS THREADED | SECT.<br>MNEM. | REF.<br>DESIG. |
|---|---|---|
| (H) LOOP D DATA | SSD | 13607 |
| [NOTE 1] OR, BRANCH INSTEAD TO: | | |
| (INVERTER) | A-MID | 92B04 |
| (H) LOOP D SCAN DATA<br>[TO VM NODE] | A-MID | 92B03 |

Fig. 143d

VERSATILE BUS INTERFACE LOGICS SCAN/SET INTERCONNECT
LOOP E - CLOCK Φ1 USED

| LOOP SIGNALS<br>ELEMENTS THREADED | SECT.<br>MNEM. | REF.<br>DESIG. |
|---|---|---|
| (H)LOOP E DATA | SSD | 13609 |
| S12 | RC-ASCCC | 113B16 |
| S12 | RC-ASCCC | 113B14 |
| (H)INIT. ARB CYCLE COUNTER | RC-ASCCC | 113A09 |
| MR8 | RC-CC | 115A02 |
| SR8 | RC-CC | 115A04 |
| (H)ACK = 8 (Φ2) | RC-CC | 115A01 |
| S14 | RC-ASCCC | 113B08 |
| S12 | RC-ASCCC | 113A18 |
| (H)INIT. SID CYCLE COUNTER | RC-ASCCC | 113A07 |
| MR8 | RC-CC | 115A06 |
| SR8 | RC-CC | 115A08 |
| (H)SCK - 8 (Φ2) | RC-CC | 115A07 |
| S14 | RC-ASCCC | 113A10 |
| IN1 | RC-ASCCC | 113A12 |
| (L)SID CARRY | RC-ASCCC | 113A01 |
| S14 | RC-DCCC | 114B10 |
| (L)INIT. DATA CYCLE | RC-DCCC | 114B03 |
| AOI 2-1 | RC-DCCC | 114B18 |
| AOI 2-1 | RC-DCCC | 114B20 |
| AOI 2-1 | RC-DCCC | 114B26 |
| AOI 2-1 | RC-DCCC | 114B24 |
| (L)WAIT DELAY FF (Φ2) | RC-DCCC | 114B05 |
| S12 | RC-DCCC | 114B14 |
| NA2 | BSY-BE | 118A22 |
| (H)INIT. DCK | RC-DCCC | 114A03 |
| MR8 | RC-CC | 115B02 |
| SR8 | RC-CC | 115B04 |

Fig. 144a

| LOOP SIGNALS<br>ELEMENTS THREADED | SECT.<br>MNEM. | REF.<br>DESIG. |
|---|---|---|
| (H)DCK - 8 (Ø2) | RC-CC | 115B03 |
| MR8 | RC-CC | 115B06 |
| SR8 | RC-CC | 115B08 |
| (H)DCK - 16 (Ø2) | RC-CC | 115B13 |
| S14 | BSY-BE | 118A10 |
| S12 | BSY-BE | 118A12 |
| (H)INIT. TERM DATA | RC-DCCC | 114A01 |
| S12 | BSY-BCC | 116B14 |
| (H)INIT. BIK 1 | BSY-BCC | 116B03 |
| MR8 | BSY-BC | 11702 |
| SR8 | BSY-BC | 11704 |
| (H)BIK = 8 (Ø2) | BSY-BC | 11701 |
| S14 | BSY-BCC | 116B12 |
| S12 | BSY-BCC | 116B04 |
| (H)INIT. BIK 9 | BSY-BCC | 116B01 |
| MR8 | BSY-BC | 11706 |
| SR8 | BSY-BC | 11708 |
| (H)BIK = 16 (Ø2) | BSY-BC | 11709 |
| S14 | BSY-BCC | 116A22 |
| IN1 | BSY-BCC | 116A24 |
| S14 | BSY-BCC | 116A06 |
| IN1 | BSY-BCC | 116A08 |
| IN1 [NOTE 1] | BSY-BCC | 116A10 |
| (L)BUSY COUNT | BSY-BCC | 116A03 |
| S12 | SSD | 13618 |
| IN1 | SSD | 13620 |
| (H)LOOP E DATA | SSD | 13609 |

[NOTE 1] = OR, BRANCH INSTEAD TO:

| | | |
|---|---|---|
| IN1 | BSY-BCC | 116A12 |

(H)LOOP E SCAN DATA
[TO USER AND VM NODE/MAINTENANCE PROCESSOR]

Fig. 144b

VERSATILE BUS INTERFACE LOGICS SCAN/SET INTERCONNECT
LOOP F -- CLOCK Ø2 USED

| LOOP SIGNALS<br>ELEMENTS THREADED | SECT.<br>MNEM. | REF.<br>DESIG. |
|---|---|---|
| (H) LOOP F DATA | SSD | 13611 |
| GROUP COUNT AND SHIFT SELECTOR (102) | A-GCS | 91A02 |
| GROUP COUNT REGISTER - MASTER (MR8) | A-GCS | 91A04 |
| GROUP COUNT REGISTER - SLAVE (SR8) | A-GCS | 91B02 |
| (L) GKS 8 [NOTE 1] | A-GCS | 91B03 |
| (1 OF 2 SELECTOR) (S12) | SSD | 13622 |
| (INVERTER) (IN1) | SSD | 13624 |
| (H) LOOP F DATA | SSD | 13611 |
| [NOTE 1]: OR, BRANCH TO: | | |
| (INVERTER) | A-GCS | 91B04 |
| (H) LOOP F SCAN DATA<br>[TO VM NODE] | A-GCS | 91B01 |

Fig. 145

BUS ERROR DETECTION EMPLOYING PARITY VERIFICATION

This is a divisional of application Ser. No. 898,810, filed Aug. 21, 1986, now U.S. Pat. No. 4,734,909, which is a continuation application of Ser. No. 356,051, filed Mar. 8, 1982 and abandoned Sept. 29, 1986.

TABLE OF CONTENTS

REFERENCE TO RELATED APPLICATIONS

BACKGROUND OF THE INVENTION

1. Field of the Invention
2. Description of the Prior Art
   2.1. Bus Topology and Performance
   2.2. Bus Variability
      2.2.1. Fundamental Interconnect Requirements
      2.2.2. Parameters of Variation
      2.2.3. Prior Art Standards of Interconnect
   2.3. Requirements for a VLSIC Standard Interconnect and Pinout Problem
   2.4. Interconnect Efficiency
   2.5. Prior Art Error Detection and Correction
   2.6. Prior Art VLSI Wire-OR Interconnection

SUMMARY OF THE INVENTION

1. General Object
2. First Class of Specific Objects—High Performance Physical Layout and Interconnection
3. Second Class of Specific Objects—High Level Functionality
4. Third Class of Specific Objects—Versatile Configurability
5. Fourth Class of Specific Objects—Time-Phased Distributed Arbitration
6. Fifth Class of Specific Objects—Pipelining and Pin Multiplexing
7. Sixth Class of Specific Objects—Error Detection
8. Seventh Class of Specific Objects—Error Compensation

CONVENTIONS EMPLOYED

BRIEF DESCRIPTION OF THE DRAWINGS

DESCRIPTION OF THE PREFERRED EMBODIMENT

Figure 1:
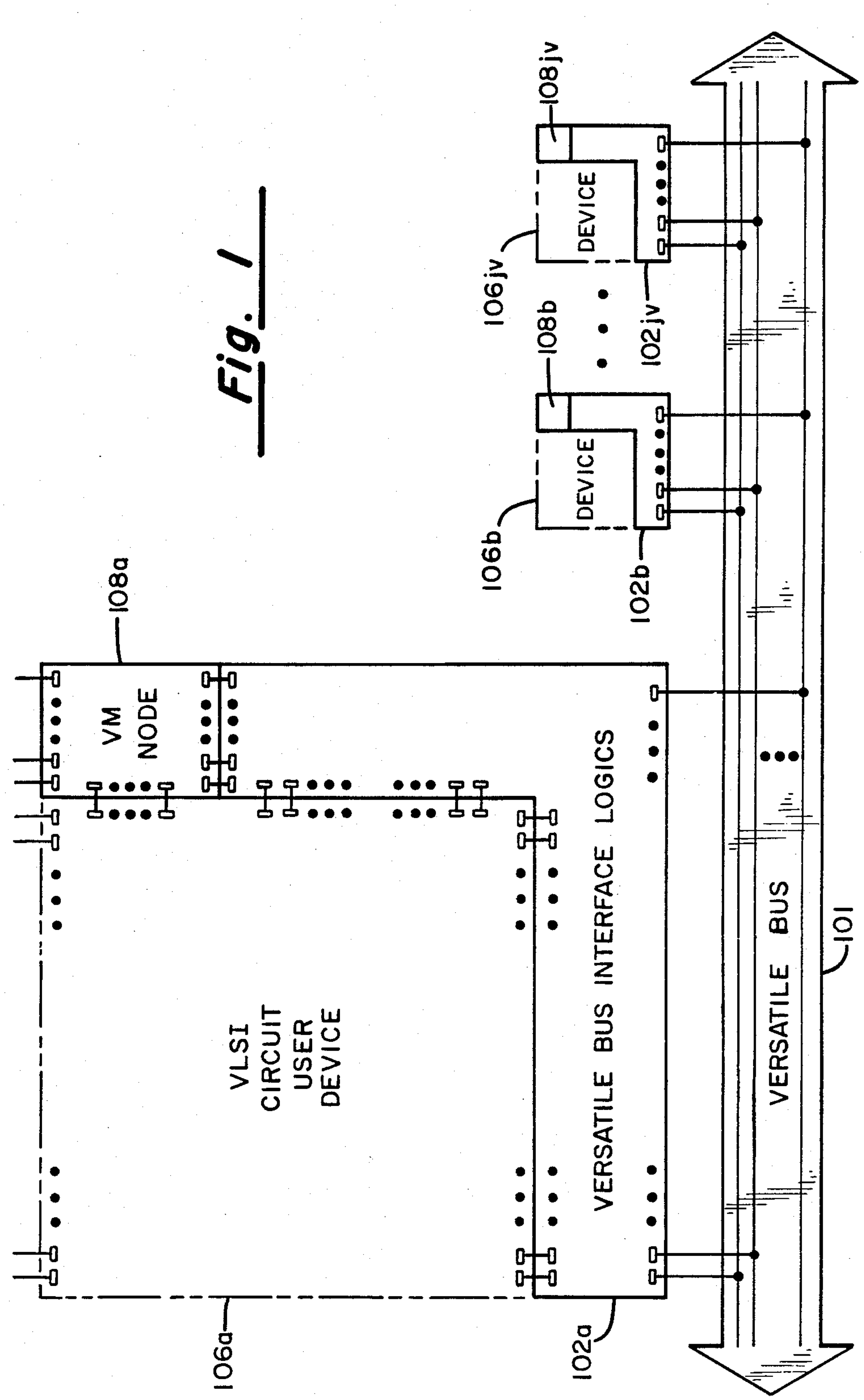

1. General Overview of the Invention
   1.1. Philosophy of the Invention
   1.2. Configuration of the Versatile Busy by Interconnection Primitives
   1.3. Functional Interfaces of the Versatile Bus
   1.4. Distributed, Time-Phased, Selectable Priority Arbitration
   1.5. Pin Multiplexed or Pipelined Operations
   1.6. Versatile Bus Logics Interface to User
   1.7. VLSI Wired-OR Logic and Two Phase Electrical Communication Protocol
   1.8. Error Detection and Ripple Switched Error Compensation
   1.9. Versatile Bus Logics Interface to VM Node for Initializing and Maintenance
   1.10. Parity Generation/Detection Logic Circuit from Transfer Gates
   1.11. Performance Summary of the Versatile Bus
2. The Versatile Bus Design Considerations and Resultant Definition
   2.1. Versatile Bus Design Definition at the First, Electrical Level
      2.1.1. Data Transfer Rate
      2.1.2. Fanout Capacity
      2.1.3. Wired-OR
      2.1.4. Collisions
      2.1.5. Power Off
   2.2. Versatile Bus Design Definition at the Second, Topological Level
      2.2.1. Interconnection
      2.2.2. Multiple Interconnection
      2.2.3. Synchronization
      2.2.4. Bit Sliced Interconnect
      2.2.5. Error Detection and Correction
3. Transaction Level Functioning of the Versatile Bus
   3.1. Sequencing of Transaction Activities
   3.2. Arbitration
      3.2.1. Arbitration Groups and Arbitration Lines
      3.2.2. The Default Winner
      3.2.3. Multiple Arbitration Groups
      3.2.4. Time-phased Arbitration
      3.2.5. Arbitration Configuration Parameters
   3.3. Slave Identification/Function
   3.4. Wait
   3.5. Data
   3.6. Activity Multiplexing
   3.7. Error Control
   3.8. Number of Configuration
   3.9. Manner of Configuring
      3.9.1. The Configuration of Arbitration
      3.9.2. Configuration for Slave Identification/Function
      3.9.3. Configuration for Wait
      3.9.4. Configuration for Data Transfer
      3.9.5. Configuration for Pin Multiplexing
      3.9.6. Pin (Line) Utilization of Configurations
   3.10. Timing of Versatile Bus Activity
      3.10.1. Timing of Multiplexed and Pipelined Transactions
      3.10.2. Timing of a Pipelined Versatile Bus Conducting Multiple Cycles of Time-Phased Arbitration
      3.10.3. Versatile Bus Timing with Activities of Multiple Cycles
      3.10.4. Timing of Versatile Buses with Null Activities
      3.10.5. Timing of Block Data Transfers
      3.10.6. Versatile Bus Timing and Pin Utilization
4. Sample Applications of the Versatile Bus
   4.1. Sample Memory Operations
   4.2. Sample Versatile Bus Configurations for Interfacing Requestors with Memory
      4.2.1. Sample Versatile Bus Configurations for Communication with a Fast Memory
      4.2.2. Sample Versatile Bus Configurations for Communication with a Large Memory
5. Interconnection of Multiple Versatile Buses
   5.1. Basic Approach
   5.2. Application Areas
      5.2.1. Interconnection of Different Versatile Buses
      5.2.2. Bidirectional Interconnect
      5.2.3. Interconnection of Differently Configured Versatile Buses
      5.2.4. Bit Sliced Systems
   5.3. Examples of Versatile Bus Transceiver Use
      5.3.1. The Matrix Swiltch Interface
      5.3.2. Single Scale Integrated Circuit Compatible Interfaces 5.4. Fault Tolerant Systems
5.4.1. Redundant Devices Upon the Versatile Bus
6. The Versatile Bus Interface Logics to User Interface
6.1. The Versatile Bus Interface Logics to User Interface for a Normal Transaction Upon the Versatile Bus
6.2. Versatile Bus Interface Logics to User Interface During Block Data Transfer
6.3. Versatile Bus Interface Logics to User Interface for Storing Slave Indentification Codes and a Mask Quantity
6.4. Versatile Bus Interface Logics to User Interface for the Configuration of No Arbitration and No Slave Indentification/Function Upon the Versatile Bus
6.5. Versatile Bus Interface Logics to User Interface for the Special Operation of Cancelling a Pending Transaction
7. The Versatile Bus Interface Logics to VM Node Interface
7.1. Interface Signals Between the Versatile Bus Interface Logics and the VM Node/Maintenance Processor
7.2. Versatile Bus Interface Logics to VM Node/-Maintenance Processor Interface for Initialization of a Versatile Bus System
8. VLSIC Standard Cells From Which the Versatile Bus Is Built
8.1. AND-OR INVERT 2-1 Logical Element
8.2. AND-OR-INVERT 2-2 Logical Element
8.3. AND-OR-INVERT 2-1-1 Logical Element
8.4. AND-OR-INVERT 2-2-2 Logical Element
8.5. INVERTOR Logical Element
8.6. NEGATIVE AND-2 Input Logical Element
8.7. NEGATIVE OR-2 Input Logical Element
8.8. NEGATIVE AND-3 Input Logical Element
8.9. NEGATIVE OR-3 Input Logical Element
8.10. NEGATIVE AND-4 Input Logical Element
8.11. NEGATIVE OR-4 Input Logical Element
8.12. NEGATIVE AND-8 Input Logical Element
8.13. SELECTOR-SINGLE 1 OF 2 Logical Element
8.14. The CMOS Transfer GAte
8.15. SELECTOR—Single 1 OF 4 Element
8.16. 1 OF 2 SELECTOR—8 WIDE Logical Element
8.17. 1 OF 2 SELECTOR WITH TEST—8 WIDE Logical Element
8.18. 1 OF 4 SELECTOR—8 WIDE Logical Element
8.19. 1 OF 4 SELECTOR WITH TEST—8 WIDE Logical Element
8.20. BINARY SHIFT MATRIX Logical Element
8.21. MINUS ONE SUBTRACTOR Logical Element
8.22. MASKED COMPARATOR—8 WIDE Logical Element
8.23. HOLDING REGISTER—8 WIDE MASTER Logical Element
8.24. HOLDING REGISTER—8 WIDE SLAVE Logical Element
8.25. DRIVER/RECEIVER Logical Element
9. Description of the Versatile Bus Interface Logics
9.1. Block Diagram of the Versatile Bus Interface Logics
9.2. Receive Control
9.3. Send Control
9.3.1. General Explanation of Send Control
9.3.2. Generation of Signal TRANSACTION ENABLE
9.3.3. Initialization of the Versatile Bus Interface Logics
9.3.4. Initiate Transaction
9.3.5. Termination of Arbitration and Capture of the Winner's Master Arbitration Identification Code
9.3.6. Initialization and Shift Control of the Arbitration Group Counter
9.3.7. Arbitration Won/Lost Latches
9.3.8. Arbitration in Process Latches
9.3.9. Initiation of Slave Identification/Function
9.3.10. Slave Identification/Function in Process Latches
9.3.11. Wait in Process Latch
9.3.12. Data in Process Latches
9.3.13. Strobing Data and Transaction Completed
9.4. Arbitration Section
9.4.1. Master ID Subsection
9.4.2. Code Generator and Decoders
9.4.3. Group Line Output Subsection
9.4.4. Arbitration Drive of the Versatile Bus
9.4.5. Receipt of Arbitration into Priority Logic
9.4.6. Mask Subsection and Group Count and Shift Subsection
9.4.7. Mask Enable Generator and Mask Generator
9.4.8. Winning or Losing Arbitration
9.4.9. Input Master ID Encoder
9.4.10. Input Master ID Selector and Winner's Master ID Subsection
9.5. Input Master ID Encoder Functional Subsection
9.5.1. Group Line Input Encoder and Selectors Block Diagrams
9.5.2. Test Selector
9.5.3. 36 Bit Group Line Memory
9.6. Group Count and Shift
9.7. Master ID
9.8. One Line per Group and Two Line per Group Decoders
9.9. 3 Bit Generator and 3 to 8 Decoder
9.10. Encoded Group Line Selector
9.11. Group Line Output
9.12. Group Line Output Gates
9.13. Mask Register
9.14. Mask Generator
9.15. Mask Enable Generator
9.16. Group Line Input Encoders
9.17. Test Selector
9.18. 36 Bit Group Line Memory
9.19. Input Master ID Selector
9.20. Winner's Master ID Register
9.21. CAM and WAIT Block Diagram
9.22. CAM and WAIT Control
9.23. Slave Identification/Function Input Control
9.24. Slave ID Section
9.25. Receive Counter Control
9.25.1. ARB and SID Cycle Counter Control
9.25.2. Data Cycle Counter Control
9.25.3. Cycle Counters
9.26. Busy Section
9.26.1. Busy In Counter Control
9.26.2. Busy In Counter
9.26.3. Busy Enable
9.26.4. Slave Identification/Function Busy Counter
9.26.5. Data Busy Counter Control
9.26.6. Data Busy Counter 9.26.7. Word Count Multiplier
9.27. Data Section
9.27.1 Data Output Selector
9.28. Configuration Register
9.29. Configuration Translation
9.30. Driver/Receivers
9.30.1. Driver/Receivers—Part A—Data Flow
9.30.2. Driver/Receivers—Part B—Driver Clock and Faults
9.30.3. Driver/Receivers—Part C—Clock and Test
9.31. Parity Generation and Fault Detection
9.32. Fault Register
9.33. Clear Distribution
9.34. Clock Distribution
9.35. Test Signal Distribution
9.36. Scan/Set Loop Data
9.37. Scan/Set Loop Control
10. Modifications and Variations to the Preferred Embodiment of the Invention
11. Versatile Bus Configurations Supported by the Preferred Embodiment of the Invention.
12. Scan/Set Test Loops.

REFERENCE TO RELATED APPLICATIONS

The instant application claims subject matter disclosed in other patent applications filed on the same day as the instant application, the other applications being further identified as:

U.S. Ser. No. 355,803 entitled "VLSI Wired-OR Drive/Receiver Circuit" filed in the name of D. B. Bennett, et al. issued Feb. 10, 1985, U.S. Pat. No. 4,500,988; and U.S. Ser. No. 355,804 entitled "Parity Generation/Detection Logic Circuit from Transfer Gates" filed in the name of L. T. Thorsrud, issued Oct. 16, 1984 as U.S. Pat. No. 4,477,904.

All three applications are assigned to common assignee Sperry Corporation, a corporation of the State of Delaware having a place of business at 1290 Avenue of the Americas, New York, N.Y. 10019.

BACKGROUND OF THE INVENTION

1. Field of the Invention

The invention relates to bused digital intercommunicating and interconnect, and more particularly to high performance interconnection of very large scale integrated circuit (VLSIC) logics.

2. Description of the Prior Art

The description of the prior art in the following sections presents an overview of the VLSIC interconnect problem, the parameters in consideration of which a VLSIC interconnect scheme should be configured, and some considerations which indicate that a standard electrical protocol is desirable for VLSIC interconnect while a number of communication protocols are required to efficiently service many types of VLSIC networks. The underlying situation in the prior art is that no digital bused intercommunication scheme or apparatus—from whatsoever area of the digital components or digital device or digital system prior art connects derived—is adequately versatile in satisifaction of the VLSIC interconnect problem. Versatility simply means that a single apparatus building block in VLSIC should efficiently and effectively service a broad spectrum of interconnect requirements: from few to many interconnected devices, from few to many bidders for bus access contending individually and collectively at low rates or high rates, from pin limited interconnects to bandwidth limited interconnects, from few to many addressable slave devices and/or slave commandable functions, from high data rates supported by wide words on many pins to severely pin limited data interfaces operating at lower data rates.

Although prior art attempting generalized satisfaction of the VLSIC interconnect problem, particularly in the versatility required, is not known to the inventors of the present invention, there exist certain individual prior art designs pertinent to various aspects of the present invention. A discussion of these prior art areas is amplified in this section so that the divergence, as well as the varying scope, of the present invention from prior art techniques may later be recognized.

2.1. Bus Topology and Performance

Very large scale integrated circuit (VLSIC) interconnect requirements span a wide range of topology and performance. Information must in some cases be transferred almost instantaneously between two chips with little if any preparation time for the transfer. In other cases a complex of information must be sent to any of dozens of possible recipients. The pins used to transfer the information on and off chips are always at a premium.

It is impossible to meet these requirements in a satisfactory way with any single definition of an information transfer path. Yet the use of several different definitions between different VLSIC chips may reduce the number of ways that available chips can be interconnected and will, therefore, reduce the usefulness of the chips.

Compared to the two or three printed circuit (PC) cards that it replaces, a VLSIC device will run at ten to one hundred times the speed, and consume 1/100 to 1/10,000th of the power. In order to derive these advantages, the costs of development must be absorbed. Here, too, there is a major difference between medium scale integration (MSI) and VLSI. The VLSI circuit device may involve development costs of up to ten times what implementation of the same function would cost on PC cards. In order to reduce the impact of high VLSI device development costs, both the supplier and the customer would like to be able to amortize these costs over several production units. The production volume required to do this might be greater than one program can guarantee, so that the device design would have to anticipate requirements which might be initially undefined. Interfaces are the chief impediment to this objective. In the environment where PC card design is relatively cheap, each designer has a tendency to optimize the interfaces between cards to best suit his immediate objectives. If this latitude were permitted with respect to VLSI devices, it would defeat the objective of minimizing development costs by creating new development costs in satisfaction of interface requirements. Furthermore, it would add still another part number to inventory, with those associated costs. Yet standardization on one interface or another always carries with it a penalty, the penalty of mismatch between the standard and the actual requirement. This is the familiar dilemma of optimization-versus-development cost.

Prior art digital interconnect bus topologies have generally traded flexibility in the information transfer path for data transfer performance. Data processors implemented in VLSIC typically require $10^6$ data transfers (words) per second, preprocessors may require $10^7$ data transfers per second, and signal processors may require $10^8$ data transfers per second. Bus interconnect at these performance levels is supported by crosspoint switches interconnecting two to eight devices (Users) and configurable gate arrays (CGA) usualy interconnecting two devices. Specification of the topology of a crosspoint switch or CGA is rigid; one apparatus will support one operational interface (communication protocol) in the interconnect of a network of rigid form (i.e., shared or point-to-point interconnect paths, hub of a wheel or daisy chain linkage). To therein obtain desired data transfer performance, communication to greater than a set number of network interconnects will be sharply proscribed. Conversely, digital interconnect buses offering flexibility in interconnect topology (such as types interconnecting functional sections of computer systems) do not support data transfer performance at the rates desired for VLSIC on the limited pins available to such circuitry. The pin limitations are further discussed in section 2.3.

2.2. Bus Variability

The requirements placed on interconnect paths in a system vary so widely that different solutions to their implementation are essential to efficient pin use (pins are a precious resource in VLSIC technology). On the other hand, there are many examples of differences in interconnect in today's technologies that add nothing to chips' usefulness and instead merely add to the need for "glue" chips. For example, there are TTL chips that use a positive-going clock while others use a negative-going clock. If both kinds of chips are used in a system, both clocks must be supplied, using more pins and "glue", and obtaining no new usefulness.

It is the intent of the present invention to accommodate the variability needed to meet different requirements without permitting extraneous variations. In order to approach the problem, the essential reasons for variability must be examined.

2.2.1. Fundamental Interconnect Requirements

The reason for interconnect is to transfer information among two or more physically separated locations, whether the information is a single status bit or a complex communication packet. It should be self-evident that the information rate and the amount of elapsed time allowable for a given transfer will affect the interconnect design.

The other major kind of variability has to do with the number of separate locations possibly involved in a transfer of information. Two devices may be directly interconnected for an information transfer facility. This facility might be used unidirectionally, with information always moving in the same direction. Or it might be bidirectional, with information moving in different directions at different times. These two cases have different requirements for coordinating the use of the transfer facility, and should be expected to require different capabilities in the transfer facility. These are three different cases: Transfer from Location 1 to 2 only, from 2 to 1 only, and bidirectional.

Imagine both the daisy chain (1 connects 2 connects 3 connects 1) and hub of a wheel (1 connects to 2 and 3, 2 connects to 1 and 3, 3 connects to 1 and 2) cases wherein three locations are interconnected. If they are connected as in a daisy chain, then each separate interconnect has the above three possibilities for a total of nine possibilities. If the three locations use a common transfer facility, as in the hub of a wheel interconnection, then the number of possibilities is no different. The nine possibilities must, however, be coordinated within the common transfer facility to avoid interference. As more devices are interconnected, the number of variations increases rapidly, creating significant coordination problems requiring a large amount of information transfer to solve. The complexity of the interconnect is strongly affected by the number of locations that are to be interconnected and by the directions of their information transfers. An efficient interconnect system cannot saddle simple interconnects with the coordination overhead required for the complex ones.

2.2.2. Parameters of Variation

Ideally, an optimum interconnect would be rigorously determined from the system requirements for the interconnect. This section discusses the parameters that might be used as input to such a rigorous determination.

A first parameter is the transfer rate. The rates at which information is transferred will be an important requirement. Normally, the peak rate is used, though an average rate can sometimes be useful if sufficient buffering is provided.

A second parameter is transfer latency. Latency is the amount of time that is permitted to elapse from the initial decision to send information until it has been completely sent. Because of pipelining and time overlapping methods, latency is somewhat independent of transfer rate and is therefore, separately specified.

A third parameter is the number of interconnected locations. As discussed above, the number of locations strongly affects complexity; therefore, an efficient interconnect must take it into account. It is useful to subdivide the locations into those that independently choose to use the interconnect, and those that only respond to information on the interconnect. The latter will be called "slaves" as they are subordinate to the master's selection of transaction and timing. The former are called "masters," and are also called "owners" when they control the interconnect. The number of locations that are masters has the strongest influence on interconnect complexity. If a single location can, at various times, serve as both a master and a slave it is called a master-slave.

2.2.3. Prior Art Standards of Interconnect

The creative designer sometimes finds himself restricted by some standard that stands in the way of his optimum design. It is in fact true that standards often provide for things that a particular design may not need, and in that sense force a non-optimum design. But well chosen standards provide a tremendous return for that inefficiency; they make it possible to design and build subsystems that can be stocked, and then latter combined into systems of greater complexity and specialization.

To illustrate, consider the transistor-transistor logic (TTL) families. Each TTL integrated circuit is designed so that its input and output pins obey certain voltage, current and capacitance standards. Then the devices are manufactured in volume for project designers who use logic design rules that incorporate fan-in, fan-out and delay times rather than voltage, current and capacitance. These rules are easier to use in digital design than are electrical rules, and the designer's task is therefore easier. The inefficiencies introduced into IC designs, as evidenced by the extra transistors, enabled the explosive growth of digital logic in today's systems.

Subfamilies have also grown within the major digital families. For example, there are edge triggered devices, with further subdivision into positive edge triggered and negative edge triggered. Bus drivers, receivers, transceivers, etc., have been developed to help interconnect TTL systems. These kinds of chips make it even easier to build the systems because they begin to form subfamilies that provide not only electrical standardization, but also electrical protocol standardization (e.g., positive edge triggering). More recent chips have also shown some concern for arrangement for pin assignments to simplify routing on the PC board. These improvements increase the applicability of digital logic.

A higher level of digital logic families have also evolved. These families are constructed on PC cards and use standard bus systems to interconnect them. Just as for TTL, the bus standards provide for easier use of the cards at a cost of extra logic on each card. The cards can be constructed ahead of time and stocked on the shelf. Examples of such families are the Sperry Univac ® RMF bus, Intel's Multi-bus, and the S-100 bus.

2.3. Requirements for a VLSIC Standard Interconnect and Pinout Problem

A major emphasis in VLSIC developmental programs is to achieve on-chip speed and density goals, that is, VLSIC development programs are semiconductor technology programs. But it is empty achievement to produce 100,000 unreachable gates, and there is also concern that useful chips be produced.

A family of VLSIC chip types (in the sense of family discussed above) would be a potent set of building blocks for future electronic systems. As in the TTL families, much versatility stems from the ability to interconnect the basic building blocks in many different ways. While some applications will always require gate array or custom implementation, many will be well served by off-the-shelf VLSIC chips.

But VLSIC chips have gate complexities comparable to cards in the bus families mentioned above. It would be just as impractical to require an interface device between VLSIC chips as it would be to require interface cards between each card of a bus interconnected family of cards. There are other analogies between VLSIC and bus interconnected families. The number of pins available is similar, and the functionality of VLSIC chips is often similar to that of cards today.

But there are important differences too. VLSIC technology promises much higher performance than that of cards. But it cannot currently provide for as much memory as can be placed on a card, and the development cost for a VLSIC chip is perhaps ten times higher than for a card.

These differences accentuate the need for a standard interconnect, but at the same time prohibit use of the present bus standards. The standards are too slow, for example, to connect a high speed processor and its memory while they use too many pins to allow more than one bus to connect to a chip.

Let us characterize the VLSIC interconnect requirements. The technology is projected to drive signals from chip to chip in 20 to 40 nanoseconds, with internal gate delays of 1 to 2 nanoseconds. Up to 120 signal pins is currently considered practical on each chip. Because the interchip time (rooted in the finite speed of electromagnetic propagation) is long compared to gate delay, it is an important performance limitation, and an acceptable interconnect had better not increase it.

Figures 2, 52A:
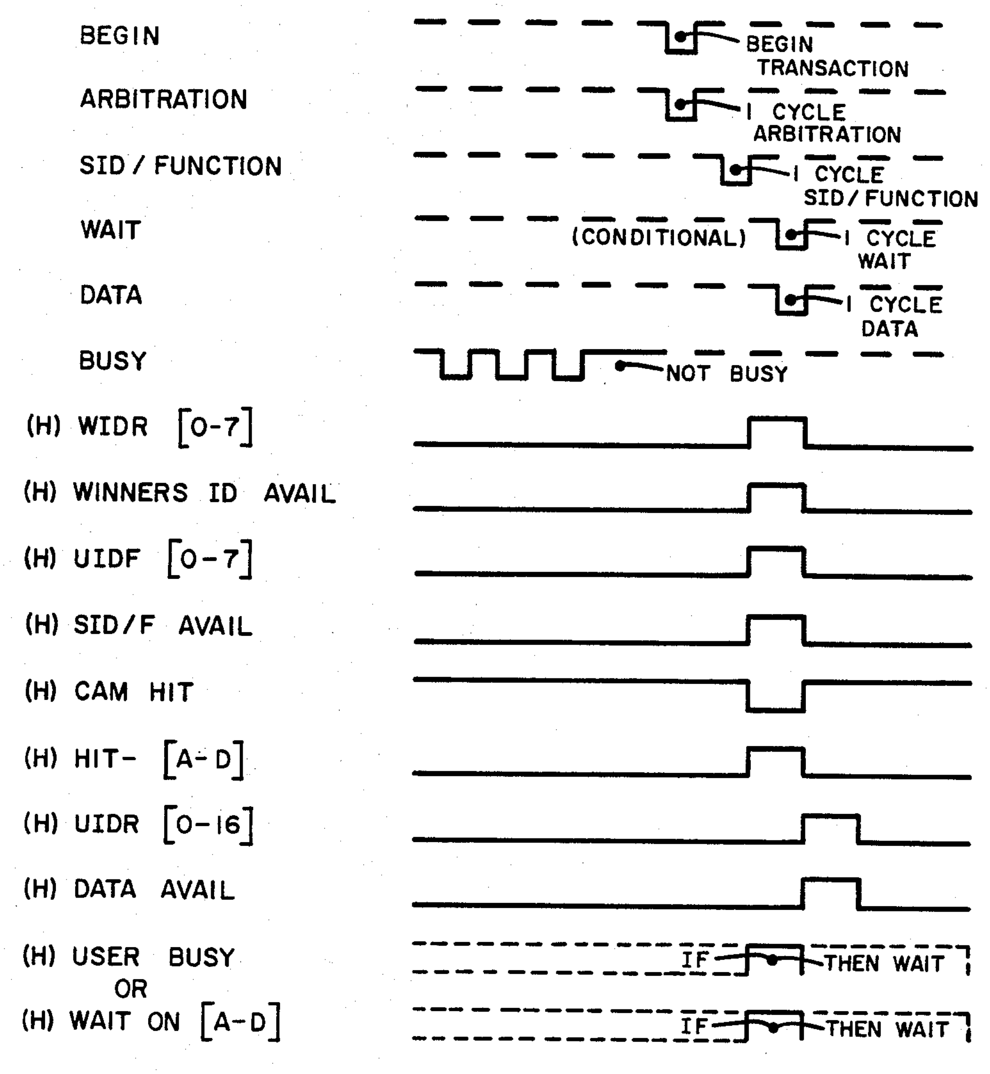

Another problem that emerges in VLSI is also related to interface—the pinout problem. The pinout problem has to do with the way in which the semiconductor die is mounted in a package. Wires emanate from the four edges of a die to pads on the edge of a carrier cavity or mounting surface. These wires must be far enough apart to prevent shorting during vibration or thermal expansion. The numer of wires is therefore limited by the perimeter of the die. One hundred seventy-five microns center-to-center is the current practical limit for pad spacing on the die. Therefore, a chip with edge dimensions of 250 mils can support no more than 136 wires (corners cannot be used). Chips could be made larger for no reason other than to increase their periphery, but a 400-mil chip, the largest contemplated in the next five years, will still only support 220 pins. Studies reported in the literature, based on observed data for PC cards, have been used to develop an empirical rule for the gate-to-pin relationship. This formula, known as Rent's rule indicates that for the various chip sizes and gate counts projected for the immediate future, there would be a shortage of pins if the same unrestricted use of interface pins employed in PC cards were to be allowed. This projection is shown in FIG. 2. With Rent's rule, even the most optimistic estimate for a 15,000-gate module is 306 pins. The die for 15,000 gates in 1.25 micron feature size Complementary Metal Oxide Semiconductor (CMOS) geometry has to be only 260 mils square, big enough for 140 pins only. Therefore there is a severe, 166 pin, deficit in the number of interface pins which would conservatively be required to connected to the logics within such a module.

2.4. Interconnect Efficiency

Any realizable interconnect imposes finite limitations on the amount of information that can be transferred in a given amount of time. A useful way of judging the efficiency of an interconnect is to compare its transfer capability with that of the underlying physical limitations, expressed, for example, in baud, bandwidth, or bits per second. Interconnect efficiency provides some idea of the cost of using a particular interconnect over a theoretically ideal one. For example, if the operational bandwidth of each line utilized in a bussed digital interface were 25 MHz, and such interface had the net effective capability of transferring 25 million data words per second, then the efficiency of such interface would be 100%. Unless control sequences and activities (if any) are time overlapped (i.e., pipelined) with data transfer sequences, an efficiency of 100% is impossible.

2.5. Prior Art Error Detection and Correction

The problem of avoiding system errors in the face of individual failed interconnect lines can be addressed with single error correct, double error detect (SEC/DED) Hamming codes if the data being sent on a set of lines all originates at one place. Under these conditions an appropriate check digit can be calculated, transmitted and decoded along with the data so that any single error, including one occurring in the check digit itself, can be corrected by the receiving chip(s). It is asserted that SEC/DED codes are practical that are compatible with the variable pin count characteristics of the present invention. Such accommodation of SEC/DED to variable word widths is neither taught in the literature of the prior art nor is it taught within this disclosure because a superior, alternative, method will be taught instead.

If conventional SEC/DED were to be employed for the bus apparatus of the present invention, then the number of pins needed to transmit a check digit for $2^n$ bits is $n+2$, and the amount of time needed to check for and correct errors at the receiver is on the order of one clock cycle. In practice, about 10 pins would be needed for check digits that would cover 75% of the intercommunication lines of the present invention. This is because data originating at multiple locations is by definition not available at any single point for generation of a check digit.

A more effective SEC/DED system has been invented instead for the bused interconnection purposes of the present disclosed apparatus. It is considered more effective because it eliminates the error checking delay when no error actually occurs, it provides 100% pin coverage, and requires only two extra pins. Correspondingly, this specification does not teach methods and apparatus of prior art error correction codes, including any adaptation of prior art SEC/DED to the variable word widths (i.e., variable pin count) of the present invention.

2.6 Prior Art VLSI Wired-OR Interconnection

The current invention will, through a special two-time phase electrical communication protocol plus the synergistic utilization of all interconnected drivers in combination to charge the interconnecting bus lines, take a communication method previously found only on VLSIC chip internal buses and expand such method and modify such method to allow high performance interchip communication—an area currently dominated by tri-state drivers. The discussion in the book "Introduction to VLSI Systems" © 1980 by Mead and Conway and published by Addison-Wesley is especially pertinent to an understanding of prior art VLSIC interconnect.

This prior art reference to both VLSIC chip internal and external buses is summarized in related U.S. Pat. No. 4,500,988 contents of which are expressly incorporated herein by reference.

For the purposes of the apparatus and communication method of this application it should be summarily noted that the prior art drive current and resultant size problem for prior art VLSIC tri-state pad (bus) driver stage output transistors is very severe. If 37 pads were to be driven on each VLSIC chip and a one meter bus interconnecting 20 chips supported, the equivalent current transistors might be as large as 1.25 microns$\times$800 microns for the N-type transistor and 1.25 microns$\times$2400 microns for the P-type transistor utilized within a tri-state driver. For a reasonable size VLSIC substrate this means that one-third of the available area is devoted to interconnecting lands, one-third to logics, and one-third to the two drive and one receive per bus line interface transistors. The apparatus and method of the present application will later be seen to be much more economical in the interface transistor size required. Moreover, for the purposes of the invention of this application it should be noted that all the capabilities of a prior art tri-state pad (bus) driver—the ability to charge, or drive high, a connected bus line; the ability to discharge, or drive low, a connected bus line; and the ability to do naught save present high impedance to a connected bus line—are alternatively achieved by the apparatus and method of the present disclosure. In particular, these capabilities mean that communication may be wired-OR between interconnected devices if the High condition of each bus line is defined as a logical "0". Wired-OR means simply that the logical OR function is enabled on bus communication lines when any interconnected device may drive a bus line Low or a logical "1", regardless of which state of three any other device is assuming. Such wired-OR communication, in an alternative manner to the tri-state drivers of the prior art, is continued to be implemented by the apparatus and method of the present disclosure. Certain inventions of this application, such as the communication activity of distributed arbitration, require this wired-OR capability. Therefore related U.S. Pat. No. 4,500,988 may be perceived of as teaching, amongst other things, how to do efficiently a certain wired-OR communication function which is integral to the invention of this application.

SUMMARY OF THE INVENTION

1. General Object

The paramount object of the present invention is to provide a scheme and an apparatus of bused digital communications interconnection, especially as between numbers of very large scale integrated (VLSI) circuit elements, which is of such high performance, so economical of resource, so comprehensive of functions enabled, so universal of functionality, so versatile of tailorable configuration, so exhaustively complete in verification of operational validity, and so flexible of initialization, error compensation recovery and test that it will become an interface standard embraced by diverse designers of myriad devices.

Initial conceptualization of the physical apparatus fulfilling these objects may be gained by momentary reference to FIG. 1. The apparatus of the invention for realizing the objects thereof is called the Versatile Bus Interface Logics 102*a* and is normally implemented in VLSI circuitry upon the same chip substrate as the VLSI User Device 106*a*. Each Versatile Bus Interface Logics is intermediary between the User logics, as may be connected through pads upon the same chip substrate, and other Versatile Bus Interface Logics on other chips as are interconnected through pins and lines, or lands, as a digital bus to be called the Versatile Bus 101. Each Versatile Bus Interface Logics also has an ancillary third type of connection to a Versatile Maintenance (VM) Node such as VM Node 108*a* for purposes of initialization, configuration, casualty recovery, and scan-set testing. Such third connection may be via pads to the VM Node logics on the same chip or, as is taught in the preferred embodiment of the invention, through pins to a maintenance processor.

2. First Class of Specific Objects—High Performance Physical Layout and Interconnection A first class of objects of the present invention is to provide a bused digital communication scheme and apparatus of basic operative characteristics such as universally besuit the physical performance requirements for communicative interconnection of myriad VLSI circuit, bus user, devices.

A paramount, first, physical objective is to minimize the number of VLSI circuit package pins required for high performance bused interconnection. The VLSI circuit pinout problem expressed in Rent's Rule is manifestly overcome in a preferred embodiment of the invention selectably configurable to offer complete, sophisticated, functionality of bused intercommunication on as few as three pins.

At a more sophisticated level, a second objective to to trade off pins for communication bandwidth with a highest efficiency. The selfsame preferred embodiment of the invention which can evidence three pin communication economy is, in multitudinous selectable configurations wherein pipelining is specified, 100% efficient of bus bandwidth utilization for data transfer activity and is correspondingly efficient for the time overlapped communication activities of arbitration and slave identification function. Bandwidth utilization efficiency of 100% means that when the bus interconnected device to bus interconnected device synchronous bus line communication rate is, say, 25 MHz (as in the preferred embodiment of the invention), then 16 data lines (as are specifiable as maximum configurations of the preferred embodiment of the invention), will transfer data amongst and between large number of dynamically communicatively interconnected devices at a sustained aggregate rate of 50 megabytes per second. In other words, this second objective is that the bus shall flow data at physically bandwidth limited communication rates irrespective of whether other communicative activities like arbitration and/or slave identification/function are performed.

A third physical objective is that the Versatile Bus Interface Logics should occupy a reasonable VLSI circuit substrate area. Extensive use of the very size efficient, very fast, Complementary Metal Oxide Semiconductor (CMOS) transfer gate logical element is made within the preferred embodiment of the invention. Even more importantly, bus drive is via a two phase electrical protocol wherein each interconnected device is synergistically interoperative in a first phase charging of the bus lines. Then all such interconnected devices may, during a second phase, communicate in a wired-OR fashion thereupon such bus lines—thusly saving much size and power as would be required by large unitary bus line driver transistors. With such distributed charging the bus is greatly physically electrically extensible. This two phase bus electrical protocol utilizing synergistic bus charging during a first phase and enabling wired-OR communication during a second phase is most completely explained in the aforementioned U.S. Pat. No. 4,500,988, the entirety of which is incorporated herein by reference. The two phase electrical communications protocol and the complete circuit apparatus, in both digital logical and bus transmission electrical design, is contained within this application and will be observed to meet this third physical objective and the following objective.

A fourth physical objective—which must be in consonance with the minimization of the size of the Versatile Bus Interface Logics, including bus line drives (up to thirty-seven in the preferred embodiment), which is the third physical objective—is that the present invention should interconnect useful numbers of VLSIC devices. The preferred embodiment of the invention electrically supports 25 MHz communication between up to twenty devices interconnected by up to one meter of bus processing 256 picofarads of capacitance or less per centimeter. (Logically the preferred embodiment of the invention supports communication between up to 256 devices. In abstract, the reason why the logical intercommunicative capacity of the preferred embodiment of the invention (256) should be sized, by choice, at variance with the electrical intercommunicative capacity (20) is simply that initially envisioned VLSIC networks will require interconnection of no more than that lesser number (20) of devices. When larger numbers of devices (to 256) are interconnected, repeater chips incorporating one cycle time of delay are necessary to interconnect successive buses of one meter in order that 256 total devices may be logically addressed and interconnected. Also, once the techniques of the present invention for realizing efficient, pipelined, communication in very large logical spaces (to 256 interconnected devices) at a vast number of configurable protocols (31,045) are recognized, then extensions of such technique to even larger logical spaces, added communications functions (such as acknowledge) and/or added configuration parameterizations producing an even greater number of communications protocol variations, and utilization of increased bus bandwidth (i.e., data lines greater than 16 and/or line transfer rates greater than 25 MHz) will become obvious).

3. Second Class of Specific Objects—High Level Functionality

A second class of objects of the present invention is to provide a bused digital communication scheme and apparatus of basic operative functional characteristics such as will universally besuit the logical, functional, requirements for communicative interconnection of myriad VLSI circuit, bus user, devices.

Within this second class of general objects for VLSI circuit communicative interconnection, it is a first logical object that the apparatus of the invention, the Versatile Bus Interface Logics, should offer a fixed format, simply controlled, powerfully featured interface to the user devices (usually upon the same chip substrate). This interface is capable of manipulation by fairly crude, slow, and constricted user devices in order to successfully participate in a sophisticated bus communication system. Yet sophisticated, fast, and wide user devices are, in this same fixed format interface, offered certain options (involving arbitration priority and slave address) plus high throughput performance for participation within the same sophisticated bus communication system. In other words, all VLSI circuit user devices have few problems getting on, or quickly through, this interface.

It is a general second logical object of the invention that such easily accessed ensuing bus communication should, itself, be functionally complete, powerful, and sophisticated. Arbitration betwen up to 256 master devices contending for bus ownership is supported by the preferred embodiment of the invention. The activity of slave identification/function wherein one or more additional, slave, devices are selected and/or directed for data transfer by the bus owner is similarly enabled between up to 256 addressable devices. A wait, or abort, signal from selected, or unselected, slave devices to the requesting master owner device is implemented. Finally, data is transferable in point-to-point, broadcast, and/or eavesdrop fashion.

It is a third logical object within the second class of general objects that all these communication activities should transpire efficiently contiguously, with minimal "wasted" communication bandwidth between activities (as well as the previously specified physical objective that communication activities, particularly data, are themselves 100% efficient in the utilization of such bandwidth). This seemingly innocuous third logical objective, which simply means "don't waste time," will be found to be exceedingly complex of realization once it is understood, as a later object, that the bus of the present invention is capable of operation within 31,045 protocols of communication. This third logical object of the invention thusly means that efficiency upon the bus of the invention will not be sacrificed for either the deep functional sophistication nor the broad versatility in communication thereupon said bus.

It is a fourth logical object within the second class of general object of the invention that the VLSI circuit interconnecting networks so creating will not be island universes unto themselves, howsoever individually meritorious in bused intercommunicative performance, but will readily accept interconnection to each other and emplacement within the real world of digital logics. As such, Versatile Bus networks will accept initialization and can be "powered up" in a rational manner. Separate Versatile Bus networks, including those differently configured as will be discussed, can (with minor interfacing elements) be unidirectionally or bidirectionally interconnected for the exchange of information between networks. A Versatile Bus network can, with a transceiver element, be interfaced to a matrix switch or even to small scale integrated devices. Versatile Bus networks can themselves be networked into fault tolerant systems. As would be expected from a prospective interface standard, the Versatile Bus networks not only effectively service those VLSI circuit devices which are communicatively interconnected by each, but also flexibly interface to each other and to outside logical structures.

4. Third Class of Specific Objects—Versatile Configurability

A third class of objects of the present invention is to provide a bused digital communication scheme and apparatus versatilely configurable in data widths, arbitration schemes, addressing and commanding schemes, transaction overlap (pipelining) or pin multiplexing, and latencies' formats as besuit the intercommunication requirements of those user devices being interconnected. In this manner the single, replicatable, logical structure of the preferred embodiment of the present invention may be easily configured, via the insertion of eight parameters into registers, in order that disparate user chips of disparate purposes, disparate operational function, and disparate capabilities may be communicably interconnected in consideration of the user chip types and the system function served.

The first object of this versatile configurability is to obtain universality of application to myriad user devices interconnected in myriad networks variously serving myriad purposes. The Versatile Bus can be configured so simply as to pass but a single bit of data from a single master device to a single slave device; or with ten deep pipelining of eight phases of time-phased arbitration (between 256 devices) time overlapped with slave identification/function (addressing and commanding of one(s) of 256 devices) time-overlapped with wait/data which be block data transferred, or streamed, across the bus. The versatility is from the trivial to the profound: 31,045 different operational configurations for bused communication are supported by the preferred embodiment of the invention.

The second object of this versatile configurability is to obtain standardization. One logical structure, one set of circuit masks, serves all users (at least logically compatible users). The user chip designer worries naught about chip communication save to, and through, the simple portals of the Versatile Bus Interface Logics. The system designer configures the bus(es) to operate as besuit the system purposes and capabilities. Interconnectivity of devices is simultaneously maximized and simplified.

A third object of this versatile configurability is to optimize bus communication network performance in consideration of any one(s) of eight configuration dimensions which are derived from, but do not identically replicate, the eight configuration parameters which may be observed as identifying the eight columns in FIG. 3. In discussing the configuration dimensions, parenthesized reference will be made to the configuration parameters I through VIII as appear above the columns of FIG. 3 for the purpose of clarification by example. Of course, a threshold to this third object of versatile configurability—that ones of eight configuration dimensions should be adjustable in order to optimize Versatile Bus performance within any particular system's particular network—is that the parameters of bus performance should be configurable, and optimizable, at all. Such third object is not delimited by those arbitrary, parenthesized, parameterizations, of the preferred embodiment of the invention which will be given in example. Rather, an entire scheme of tailored configuration of a digital communication bus is opened up by the teaching of this application.

In support of this third object the first, second and third configuration dimensions concern arbitration, that communication activity and process by which master devices contending for bus ownership do establish, under a priority order, that arbitration-winning master one device which owns the bus for one communication transaction. The numbers of pins or lines utilized for arbitration (configuration parameter I of four choices ranging up to eight pins), the number of communication cycle times across which arbitration—which, ergo, is thusly multi-phased or time-phased—may be performed (configuration parameter II of five choices ranging up to eight cycles), and whether such arbitration is multiplexed or pipelined (configuration parameter III of two choices) are the three mutually dependent arbitration dimensions (from the three dependent configuration parameters only 23 combinations are available, reference FIG. 136*a*). The fourth and fifth configuration dimensions concern slave identification/function, that communication activity by which the arbitration-winning bus-owning master one device does addressably link and/or command (a) slave device(s). The number of pins or lines utilized for slave identification/function (configuration parameter IV of four choices ranging up to eight pins) and the number of communication cycle times across which slave identification/function is performed (configuration parameter V of five choices ranging up to eight cycles) are the two mutually dependent slave identification/function dimensions (from the two configuration parameters only 17 combinations are available, reference FIG. 136*b*). The sixth configuration dimension concerns the existence, and time sequencing, of a communication of a latency quantity called wait. This wait quantity when transmitted wired-OR is the means by which any one or one(s) of slave devices inform a requesting bus-owning master device of their individual or collective incapacity to immediately receive data within the instant communication transaction (configuration parameter VI of two choices). In other words, in a simplistic sense wait means "abort" or "try again after a time."

The seventh configuration dimension in support of realizing this third object is the manner, in pins (lines) utilized during communication cycle times, by which data will be transmitted from master device to slave device(s) thereupon the Versatile Bus. Both the number of data pins or lines utilized each cycle (configuration parameter VII of five choices ranging up to sixteen pins) and the number of data bits in a data word (configuration parameter VIII of five choices ranging up to sixteen bits) are configured in this single, seventh, dimension. As with the pins and cycles parameterizations of both arbitration and slave identification/function; these pins and bits parameterizations of data transfer are not independent, but dependent. But the reason that arbitration and slave identification/function pins and cycles parameterizations each result in a configuration dimension is that, jointly and collectively, the amount of arbitration and slave identification/function is variable thereby such configuration parameterization. With data, conversely, the pins and bits parameterizations are inextricably intertwined into only one dimension of variability. Since parameterized pins times the number of data cycles utilized to transfer each data word must equal the fixed bit length parameter (equal to or less than sixteen bits in the preferred embodiment of the invention, such as is passed (albeit possibly truncated) to the user device) then this seventh configuration dimension may equivalently be thought of as pins times cycles, or just "data format". (This seventh configuration dimension as partitions the data word into pins (lines) and the number of cycles that such lines needs be exercised in order to formulate an entire data word should not be confused with the fact that single or multiple data words, one data word to millions of data words as block data, will be found to stream, or flow, on the Versatile Bus without any unique communications control protocol whatsoever, and most emphatically without any requirement for or relation to this seventh configuration dimension. The seventh configuration dimension is the format—the partitionment in pins times cycles as equals bits—of data words and is not the amount thereof.)

The eighth configuration dimension in support of realizing this third object is whether the communication activities of arbitration, slave identification/function, wait, and data should be pipelined (time overlapped) or pin-multiplexed upon the Versatile Bus. (This is established by certain values of configurable parameters I, III, IV, and VI producing 8 allowable combinations, reference FIGS. *25a–25h*.) Without further explanation, pipelining can generally be thought of as maximizing informational transfer by using more pins for more bus bandwidth (up to a modest thirty-seven) while pin multiplexing saves pins (down to a minimum of three required) at the expense of bus bandwidth for informational transfer.

When certain redundant, null, parameterizations are eliminated the total number of configuration alignments of the Versatile Bus obtainable within the eight dimensions equal, in the preferred embodiment, 31,045. Therefore, while every conceivable configuration variation is not embraced within the eight dimensions of the preferred embodiment of the invention, it is fairly obvious that the third objective of a bus versatilely configurable has been met in a broad and substantial manner.

5. Fourth Class of Specific Objects—Time-Phased Distributed Arbitration

A fourth class of objects of the present invention concerns the conduct of arbitration, being that communication activity upon the Versatile Bus wherein a single bus-owning master one device is chosen, from amongst a number of master devices contending for bus ownership, to control, or own, the Versatile Bus for the duration of a single communication transaction thereupon. After the activity of arbitration, additional communication activities, each of which may transpire across one or more cycle times, performed by the abitration-winning bus-owning master one device include the optional (configurable) transmission of slave identification/function information to (a) slave device(s), the optional receipt of wait information, and the mandatory transmission of data to (a) slave device(s). Such activities, in aggregate, comprise one communication transaction, which transpires across a contiguous multiple of cycle times.

It is a first object within the fourth class of objects to be met by arbitration that arbitration should be time-phased, or partitioned in time to transpire across a number of contiguous cycle times. If each of multiple cycles of such time-phased arbitration transpires upon the selfsame bus communication line(s), as is selectably configurable within the preferred embodiment of the invention, than a large number of devices contending for bus ownership can be arbitrated amongst on a small number of lines (pins)—for example, in the preferred embodiment 256 devices can be arbitrated amongst in 8 cycles of time-phased arbitration utilizing only one line. Conversely, if each of such multiple cycles of such time-phased arbitration transpires upon (a) different bus communication line(s), then such cycles may be pipelined. Such pipelining of arbitration, up to eight cycles deep representing eight arbitrations for eight communication transactions simultaneously in progress upon the Versatile Bus, is selectably configurable within the preferred embodiment of the invention. Such a pipelining capability falls within the next following, fifth, class of objects, but is enabled by the realization of the present first object of time-phased arbitration.

It is a second object within the fourth class of objects concerning arbitration that such time-phased arbitration should be distributed amongst all interconnected devices, and not centralized. In the preferred embodiment of the invention all arbitrating master devices both drive and sense wired-OR arbitration lines (across one or more cycle times) in the distributed conduct of arbitration in order that one only device may recognize itself, and be recognized, as the bus-owning device for one (only) communication transaction. Remarkably, in the preferred embodiment of the invention all interconnected devices, both arbitrating and non-arbitrating, will follow the totality of arbitrations (eight different ones of which may be in simultaneous, pipelined, progression) so that each such interconnected device, at its distributed location, does always know, from having followed the results of the distributed arbitrations, the identity of the bus owner within each communication transaction. Consequently, if any bus interconnected device is addressed and/or commanded and/or receives data from the bus owning device within a communication transaction it need not be redundantly informed of the identity of such bus owning device; it already knows such identity of the device with which it now communicates from having followed, at its variously distributed location, the distributed arbitration. Therefore the second object is met with arbitration totally distributed in both conduct and recognition of results.

It is a third object within the fourth class of objects that the number of cycles ("g") and the number of lines ("n") utilized for time-phased arbitration should be configurably specifiable at each bus interconnected device, such specification thereby establishing a variable number ("$n^g$") of devices which may be arbitrated amongst thereupon such bus. In the preferred embodiment of the invention, ten parameterizations of pipelined arbitration ("g" ranging from 1 to 8, "n" ranging from 1 to 8, and "$n^g$" to 256) and twelve parameterizations of time multiplexed arbitration ("g" ranging from 1 to 8, "n" ranging from 1 to 8, and "$n^g$" to 256), plus a null case of no arbitration at all, are permissible configurations.

It is a fourth object within the fourth class of objects concerning arbitration that arbitration (which may be selectably configured to transpire over "g" cycles wherein "g"≧1, therefore which arbitration is selectably configurably time-phased) should be maximally time overlapped, or pipelined, with other bus activities of slave identification/function and wait/data. In other words, arbitration, even time-phased arbitration, may transpire in time overlap with other bus activities. This means that arbitration (between up to 256 devices in the preferred embodiment of the invention) may be without time overhead to the transmission of data thereupon such bus.

It is a fifth object, as the obverse of the fourth object, that time-phased arbitration may be alternatively (to pipelining) selectably configured to be pin multiplexed onto lines (pins) which are elsetimes utilized for bus activities of slave identification/function and/or data. Such pin multiplexing trades increased cycle times in the completion of a communication transaction, including the arbitration activity, for economy in the number of lines (pins) required.

6. Fifth Class of Specific Objects—Pipelining and Pin Multiplexing

A fifth class of objects of the present invention is to provide a bused digital communication scheme and apparatus wherein communication activities may be selectably configurably pipelined (time overlapped) or pin multiplexed (overlapped onto the same physical bus lines (pins)).

A first object within the fifth class of objects is that the bus activities or arbitration (which may be time-phased), slave identification/function, and wait/data should be, in certain allowable combinations, time multiplexed, or pipelined, in occurrence upon the bus. In the preferred embodiment of the invention the time-phased arbitration activity associated with up to eight separate communication transactions may be time overlapped with the slave identification/function activity of a ninth communication transaction may be time overlapped with the wait/data activity of a tenth communication activity. In other words, the preferred embodiment of the invention may conduct communication activities pipelined up to ten deep. Such pipelining of activities, particularly of data and time-phased arbitration, makes the Versatile Bus very powerful for net effective high rate, high efficiency, information interchange between large numbers of devices dynamically linked. In other words, the large size of the bus arbitration and slave addressing spaces are no way in conflict with the throughput of data when the bus is pipelined.

A second object within the fifth class of objects, an object which is the obverse of said first object, is that the bus activities of arbitration (which may be time-phased), slave identification/function, wait, and data should be, in certain allowable combinations, pin multiplexed to transpire, in successive cycle times, upon the same lines (pins) of the bus. In the preferred embodiment of the invention full communications functionally may be maintained on as few as three lines (pins). The pin multiplexing capability of the present invention trades communication time for a bus bandwidth reduced in the number of lines (pins) required.

A third object within the fifth class of objects—a necessary object in order that both such first object and such second object can be met within the same bus structure—is that a bus should be versatilely configurable to selectively stage communication activities thereupon in a spectrum of pipelined and pin multiplexed orders, or protocols. The preferred embodiment of the present invention is selectably configurable at all interconnected devices in order that eight different combinations of staging the bus activities of arbitration, slave identification/function, wait, and data may be effected. These combinations range from fully pipelined activities (including potential multiple phases of time-phased arbitration) to fully pin multiplexed activities performed sequentially.

7. Sixth Class of Specific Objects—Error Detection

A sixth class of specific objects of the present invention is to provide a bused digital communication scheme and apparatus with comprehensive, no time overhead, error detection.

A first object within the sixth class of objects is that stuck low, or shorted to ground, bus lines (pins) should be error detected. In the preferred embodiment of the invention this is accomplished on all lines (pins) at all devices during, and without added time overhead to, all cycles upon the Versatile Bus.

A second object within the sixth class of objects is that stuck high bus lines (pins) should be error detected. In the preferred embodiment of the invention this is accomplished for each line that is driven low (representing transmission of a logical "1") at all devices (which may be more than one) so driving in a wired-OR manner during, and without added time overhead to, each and every communication cycle.

A third object within the sixth class of objects is that (certain) lines shorted together should be error detected. In the preferred embodiment of the invention all lines driven by a single source (the slave identification/-function and data lines which may be driven solely by the bus owning master device) are error detectable for being shorted to another line insofar as each detected line should be driven to a High (transmission of a logical "0") but is, instead, shorted to at least one line (which need not be one of those lines driven by such single source) which is logically Low. In other words, such detection of lines shorted to one another is beyond the first object detection of shorts to ground. Such third object detection is accomplished in the preferred embodiment of the invention to the maximum extent possible when, as is the case, this detection is also without time overhead to any of the each and every bus communication cycle within which it is performed.

A fourth object within the sixth class of objects is that open bus lines should be detected. This is accomplished within the preferred embodiment of the invention by parity error detection on all bus lines, at each bus interconnected device, without time overhead, and upon each communication cycle for the (potential parity) errors of the previous cycle. In other words, total all-line coverage (including two parity lines themselves, and on whatsoever variable number of lines are configurably utilized) and no time overhead detection of parity errors is "purchased" at the expense of one communication cycle in (parity) error before the next cycle recognition of the occurrence of such error. In order to realize this fourth object of the sixth class, the preferred embodiment of the invention will require at least one, and preferably two, bus lines devoted to odd parity and/or even parity. The Versatile Bus does not require the exercise of the parity detection option.

It is a fifth object within the sixth class of objects, such object as is an outgrowth of the system's application of an invention realizing the first four objects of this fifth class plus such invention as communicates in a wired-OR manner upon a digital bus, that two equivalent and redundant logic devices should be able to receive commands and/or data from the bus, act upon such commands and process such data equivalently to the same result, and for each such redundant logical devices to transmit their results during the same bus communication transaction, in full simultaneity and parallelsim, upon the bus. Furthermore, if either of the two redundant devices is to drive so much as one single control and/or data line upon the bus in a differential manner than its redundant device, it is the fifth object that this non-equivalency of results, manifesting itself in differing drive of the bus, should be known by the next subsequent communication cycle time to that communication cycle time upon which differing drive of the bus did occur.

8. Seventh Class of Specific Objects—Error Compensation

A seventh class of specific objects of the present invention is to provide a bused digital communication which compensates for single detected errors and detects double errors. The word "compensation" is used as opposed to the word "correction" because, under the scheme which will be utilized, that single communication cycle upon which an error was detected will not be reconstituted, or corrected, but will rather be thrown away and the entire communications bus will be operatively retrenched in a new, compensated, condition within which full communications functionality will be restored. In other words, the bus will be compensatorily "healed" of continuing faults while that one single communication detected in error will not be corrected. Lest the concept of even one single communication cycle in uncorrected error be adjudged to be unsatisfactory, it must be recalled that, in accordance with the objects of the sixth class, all bus communication lines—not just data lines upon which single error correction (although not at variable word widths) is conventional—are being comprehensively error detected upon all cycles at all bus interconnected devices. This last concept of error detection (such as can lead to error compensation) at all interconnected devices is especially crucial. Only a sending device can have knowledge of those lines which it uniquely controls. And no device can have total knowledge of lines driven in a wired-OR fashion. But it is certainly desirable to detect incipient errors at all devices—even slave devices and passive, non-transaction-participating devices. The only manner in which this can be done is to detect errors after the fact of a communicative interchange. If this after the fact detection is not to add time overhead to the effective bus communication time, it must be time overlapped with the next transaction. It is so overlapped within the preferred embodiment of the invention. Consequently, only compensation is possible and the past transaction in error is uncorrected (at least by the bus structure as embodied in the Versatile Bus Interface Logics).

It is a first object within the seventh class of objects that compensation for single errors as affect the integrity of single lines upon a bus should be in a ripple-shifted manner. Such ripple-shifted manner means that all physical communication paths are shifted in evasion of the failing path while all functional, logical, paths are preserved. The one physical communication line which has failed (at the situs of any one or ones of any devices connected thereto) will ultimately, effectively, be substituted for, in a ripple-shifted manner, by another physical communication line. In the preferred embodiment of the invention, this other physical communication line which will be effectively substitutionary for the failed line normally carries an even parity function. When the ripple-shifted error compensatory substitution is made, this particular even parity function is lost to the bus.

It is a second object within the seventh class of error compensation objects that double error detection—similar to "double error detection" within a single communication but actually double error detection resultant from a first error detection, an error compensation responsively thereto, and then a second error detection—should continue to occur after ripple-shifted compensation of the bus for a single error. In the preferred embodiment of the invention all stuck low, stuck high, and shorted line error detections are not only double but multiple—these errors can always be immediately recognized on any lines in any profusion regardless of whether the bus is in a ripple-shifted error compensation alignment or not. But to continue the fourth and final error detection—that of detecting open lines as is implemented through parity—unto that state wherein the bus is in a ripple-shifted error compensation alignment, then the preferred embodiment of the invention will utilize both an odd and an even parity line. Therefore, considering both the sixth and the seventh class of objects, when both a "single error" and a "double error" are being talked about, such errors are much broader than mere parity. The preferred embodiment of the invention achieves considerable operational validity through error detection and responsive compensation supported in great depth as regards types (4), lines (all), cycles (all), and device(s) location(s) of occurrence (all) for errors occurring upon the bus.

More particularly, the scope of the invention herein is not to be interpreted by the foregoing objects, which are exemplary only, but rather by the scope and limitations of the claims, only.

The foregoing and other objects, features, and advantages of the invention will be apparent from the following more particular description of the preferred embodiment thereof as illustrated in the accompanying drawings.

CONVENTIONS EMPLOYED

Throughout the following description and in the accompanying drawings there are certain conventions employed which are familiar to certain of those skilled in the art. Additional information concerning those conventions is as follows.

Throughout the drawings, reference designations are comprised of the figure number (up to three digits and one letter) followed by the reference numeral (up to two digits) indicating the unique location of the referenced element or first origin of the referenced wire net (line or cable). All logical elements and miscellaneous are assigned even reference numerals. All wire nets, signal lines, cables, pins, buses and like interconnects are assigned odd reference numerals. Such odd numeral reference designation indicates, in its entirety, the figure where the lead originates.

Each of twenty-nine standard cell logical elements of which the preferred embodiment of the invention is built in CMOS VLSIC is shown in the detailed logical structure, and with truth tables where appropriate to explanation, in separate Figures order that there be no ambiguity as to the logical function represented. Each logical cell has a uniquely characteristic shape and/or combination of labeled ports so that there is little difficulty in recognizing each element as logically utilized, even in those rare instances wherein transposition of the routine location of a connection to a labeled port is made in order to effect greater clarity in the drawings. For example, the CLK labeled port might rarely be transposed from left to the right side of a logic element without any possible attendant ambiguity as to the identity of the element or nature of the labeled port. Suggested pin numbers for the standard cell logical elements are once shown in the separate Figures, but not thereafter represented unless integral to explanation of the logical usage. As is routine in the digital arts, and "o" or bubble on an element logical input serves as an aid to recognition that a logical low, or 0 volts d.c. in the CMOS VLSIC logics, on that input port will contribute to satisfaction of the logical function, whereas no bubble indicates that a logical high, or +3 volts d.c., will contribute to satisfaction of the logical function. Similarly a satisfied, or made, logical element will generally exhibit a logical low output if the output port be accompanied by the "o" bubble indicator, and a logical high output elsewise. These bubble guides are for convenience and do not supersede the element logical function as given by circuit design, description and/or truth table. Obviously, reverse logic may be employed depending upon the particular logic elements utilized in implementing the invention.

The signal lines and cables are accorded unique descriptive names invariant at all points of usage. In the event of typographical errors in such names the assigned reference numerals are the controlling designations for all interconnections. The descriptive names are preceded by an (H) if a logical high level reflects the true state of the named condition and an (L) if a logical low level reflects the same true state. Signal lines generally enter at the top of logic diagrams and exit at the bottom. For those few FIG. 128 through FIG. 130 for which this convention cannot be followed notification will be given. Extensive mnemonics, listed in the table of FIG. 85, are employed as an aid to teaching functional signal flow between numerous sections of a large and complex device. These mnemonics appear upon brackets subtending a signal or signals either entering or leaving a Figure. Cross reference to those Figure number(s) associated with each mnemonic in the table of FIG. 85 does allow general access to the Figure(s) of either signal origin or signal destination. The mnemonics are less a routing guide than an aid to memory and understanding. As reference numbers controlled over signal names, so do reference numbers control over any incomplete or imprecise mnemonic guides to interconnection.

When a number of related signal lines into or out of a logic diagram are gathered within a bracket () or [ or horizontal equivalents) then the signal lines are jointly accorded a name designation which appears beside that bracket. Often the initials of this group designation are repeated in the individual signal line nomenclatures which are lettered proximately to the individual signal lines. This is in addition to the routing mnemonics. This "name of the group of signals" aids understanding.

Signals which enter or exit the Versatile Bus logics altogether from outside are accorded a further, final symbolism in order that they may be most clearly recognized. Signal lines flowing from or onto the Versatile Bus itself are represented in broad vectors in the block diagrams. Signal lines channeling signals received from the User are accorded a "Y"-like ingress symbol while signal lines exiting to the User are "V" tipped like arrows as an egress symbol.

Detail logic diagrams plus up to three stacked levels of block diagrams are variously used. Logical structures at all levels may be dotted line enclosed, numbered, and named to aid in recognition within higher level diagrams. On block diagrams, a slash (/) across an assemblage of related signals—nominally called a "cable'"—on a block diagram indicates, in the accompanying numeral, the number of signal lines comprising such cable. Cables may be bifurcated, split, and combined so that different numbers appear in different portions of a signal distribution net.

BRIEF DESCRIPTION OF THE DRAWINGS

FIG. 1 shows a pictorial representation of a sample physical layout and interconnections of a Versatile Bus Interface Logics as implemented in VLSIC.

FIG. 2 shows a table for the application of Rent's Rule to various chip sizes and gate counts.

FIG. 3 shows the Versatile Bus configuration matrix.

Figure 4:
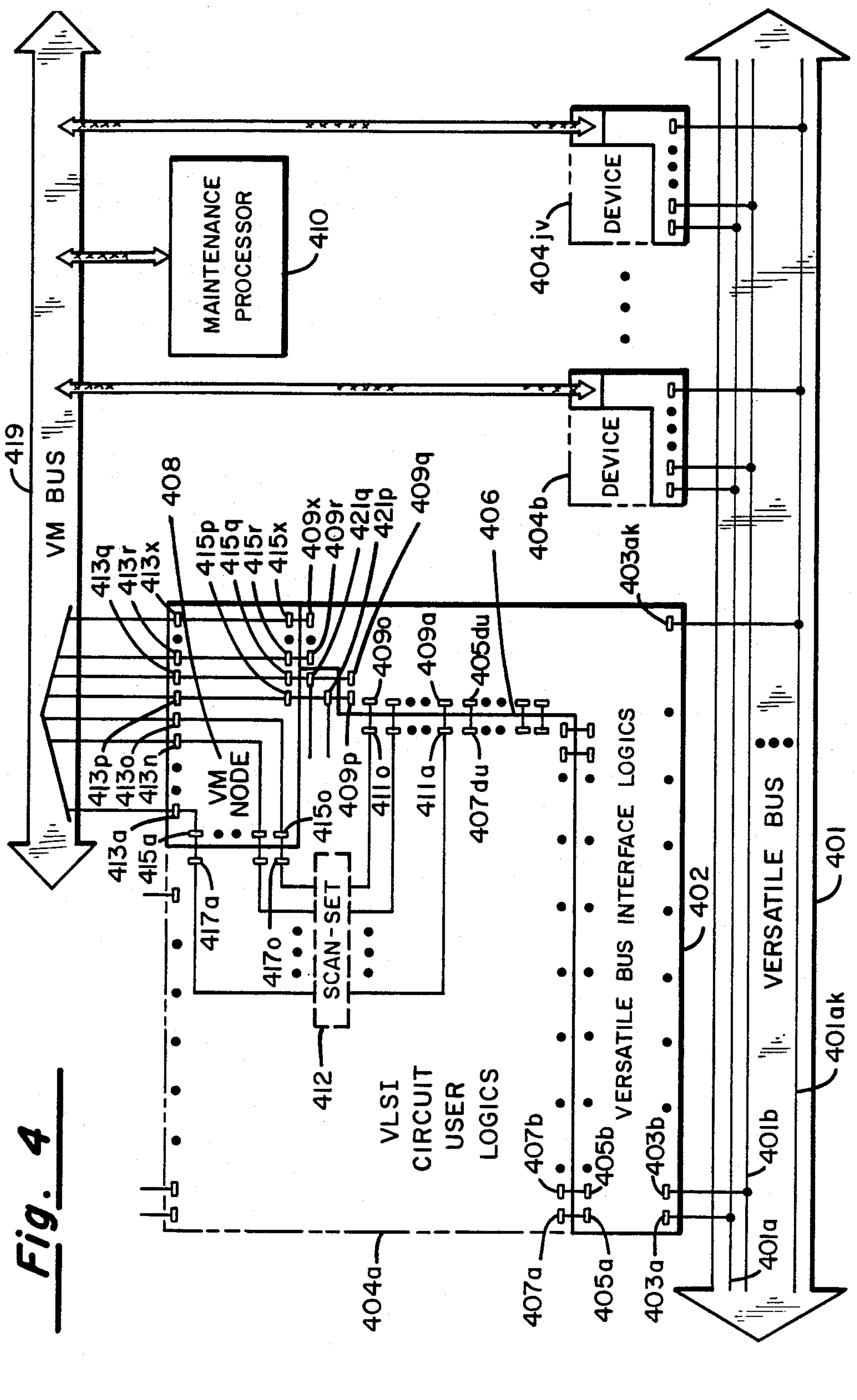

FIG. 4 shows an expanded pictorial representation of sample physical elements and interconnections of a Versatile Bus interface as implemented in VLSIC.

Figure 5:
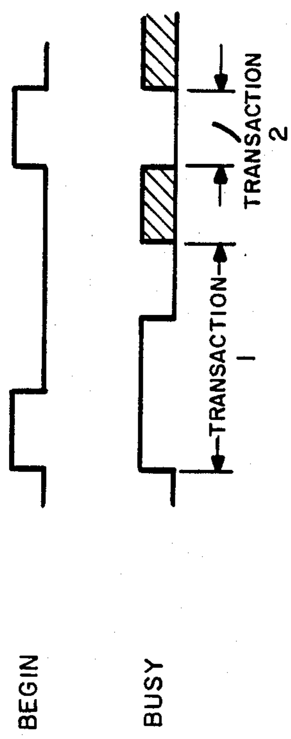

FIG. 5 shows the duration of a Versatile Bus transaction as delimited by the Begin and Busy signals plus one cycle.

Figure 6:
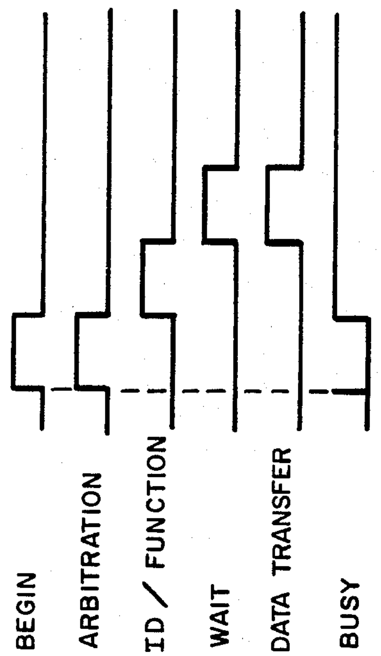

FIG. 6 shows the activities within a single pipelined transaction on the Versatile Bus.

Figure 7:
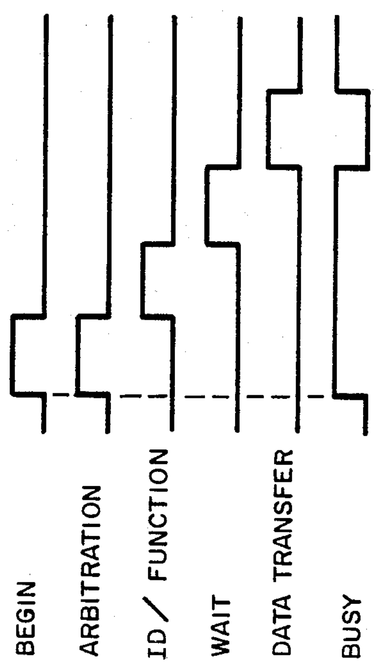

FIG. 7 shows the time relationship of pin multiplexed activities on the Versatile Bus.

Figure 8:
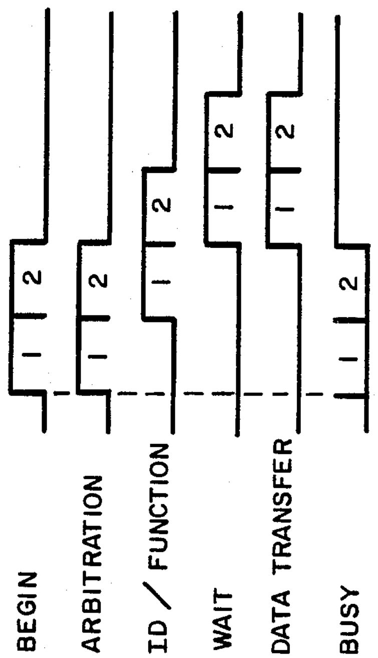

FIG. 8 shows multiple pipelined transactions on the Versatile Bus.

FIG. **9*a*** is a diagrammatic representation of normal line utilization during device to device intercommunication across a Versatile Bus.

FIG. **9*b*** is a diagrammatic representation of a ripple shifted error recovery technique for isolation and replacement of a failed line.

Figure 10:
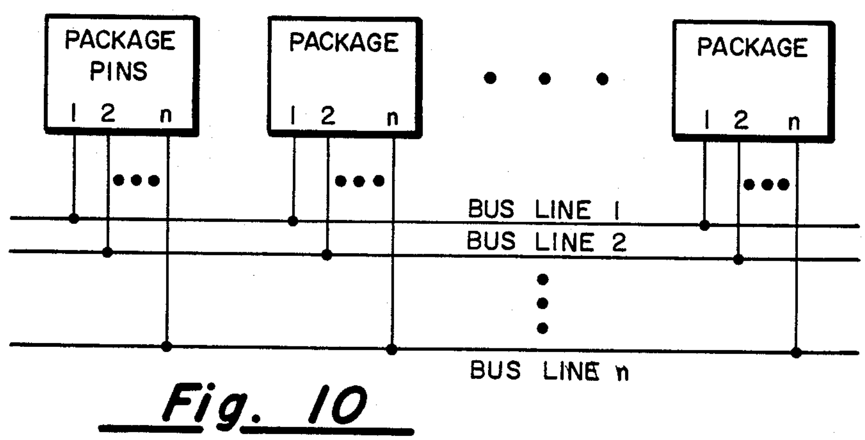

FIG. 10 shows examples of bus lines.

Figure 11:
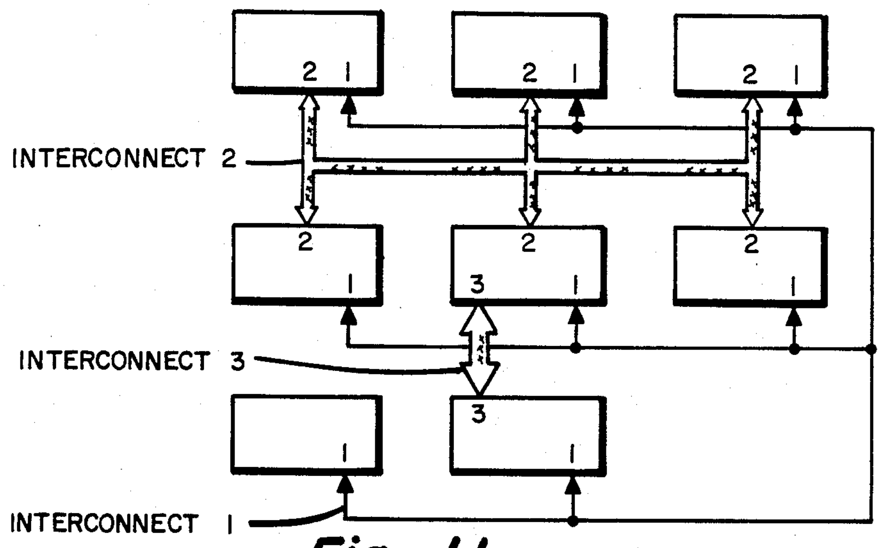

FIG. 11 shows multiple interconnects as demonstrate the need for efficient pin usage.

FIG. **12*a*** shows an asynchronously timed interconnect.

Figure 12A:
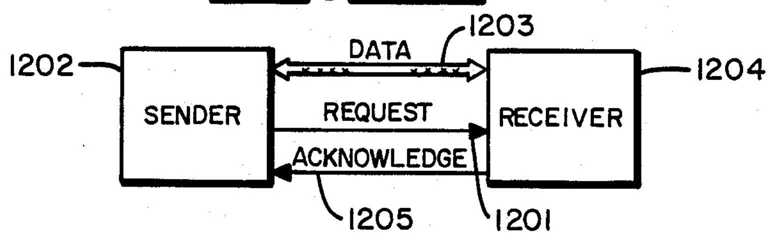

FIG. **12*b* shows the timing of the asynchronous interconnect of FIG. 12*a*** when the control signals are levels.

Figure 12B:
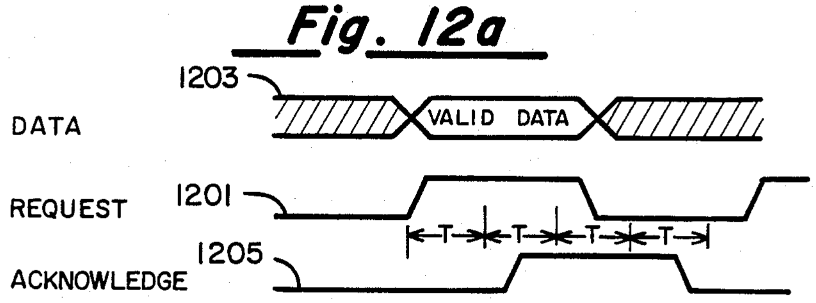

FIG. **12*c* shows the timing of the asynchronous interconnect of FIG. 12*b*** when the control signals are pulses.

Figure 13:
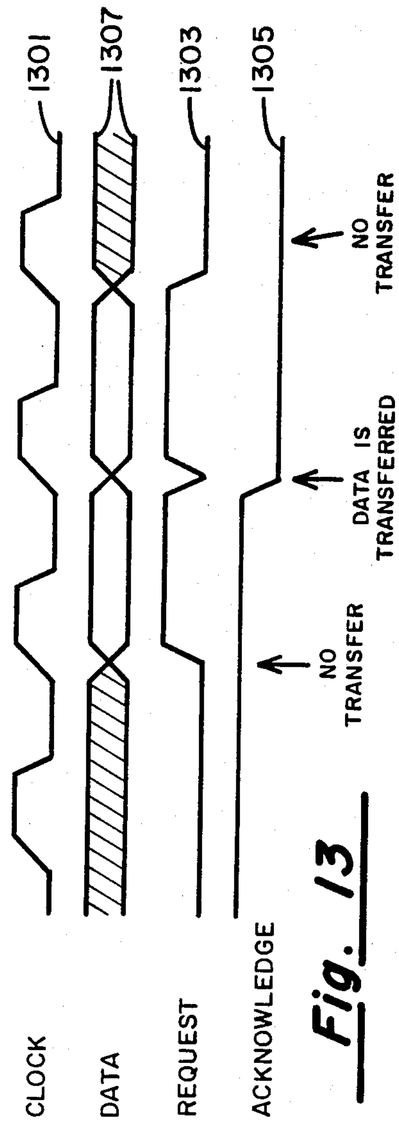

FIG. 13 shows a high pin efficiency synchronous bit transmission protocol.

Figure 14:
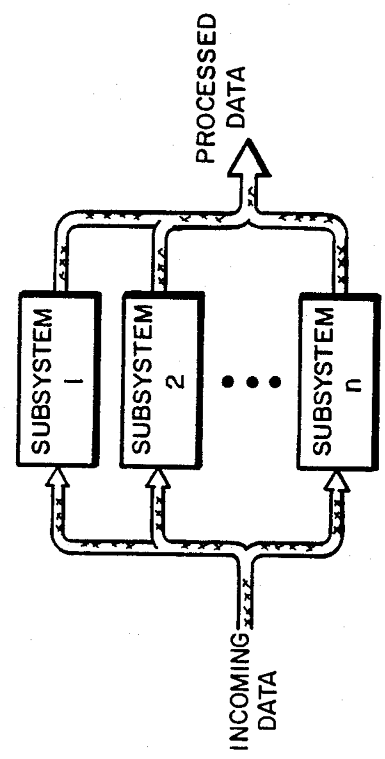

FIG. 14 shows data flow for bit sliced processing.

Figure 15:
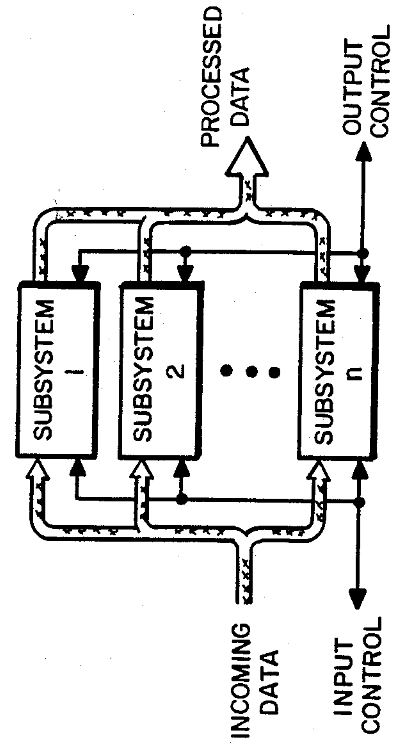

FIG. 15 shows bit sliced processing with controlled fan-in and fan-out.

FIG. **16*a* shows the pin multiplexing onto Pin Set A of the two non-timeadjacent activities 1 and 3**.

Figure 16A:
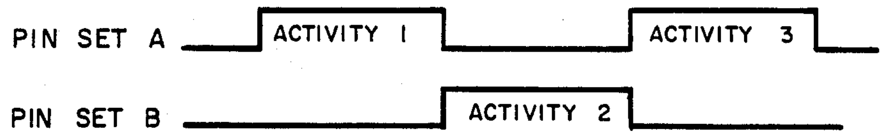

FIG. **16*b* shows a pin multiplexed configuration superior to the configuration of FIG. 16*a***.

Figure 17:
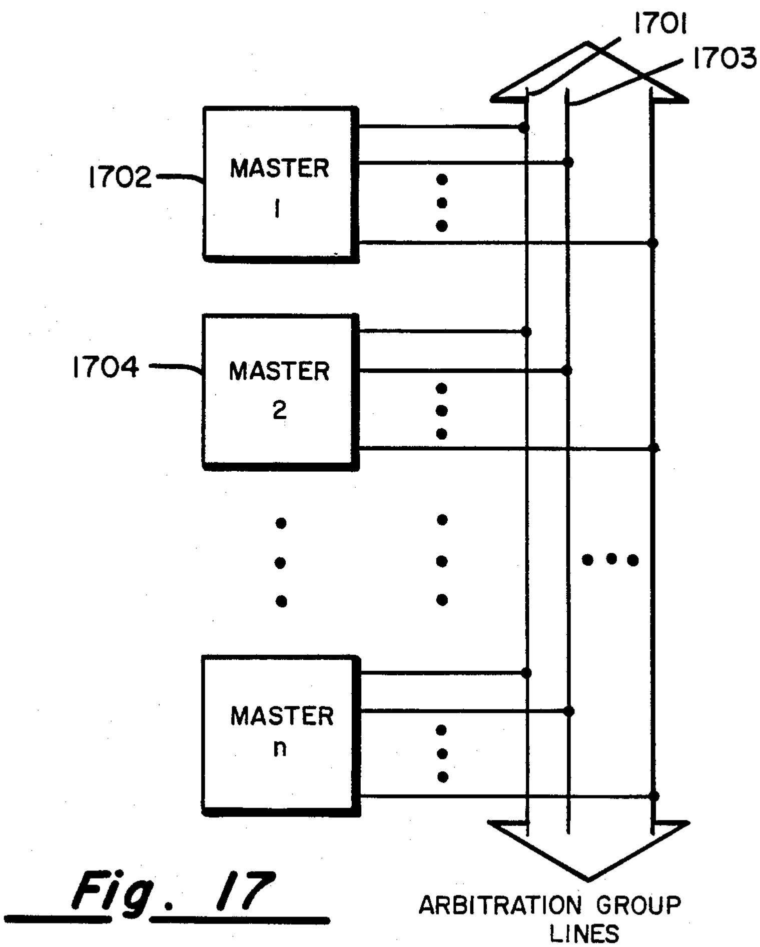

FIG. 17 shows Arbitration over Versatile Bus Group lines for a single set of master arbitrating in a single cycle.

FIG. **18*a*** shows a diagrammatic representation of an n-ary array of devices competing in arbitration for ownership of the Versatile Bus.

FIG. **18*b*** shows a diagrammatic representation of the group of devices selected after a first cycle of time-phased arbitration.

Figure 18A:
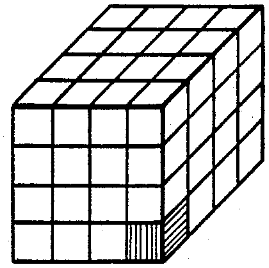
Figure 18B:
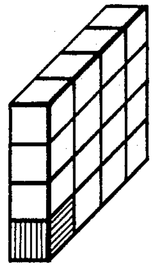
Figure 18C:
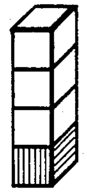

FIG. 18*c* shows a diagrammatic representation of a second group of devices selected after a second cycle of time-phased arbitration.

Figure 18D:

FIG. 18*d* shows a diagrammatic representation of a single arbitrationwinning device identified, in the manner of an n-ary search, after a third cycle of time-phased arbitration.

FIG. 19*a* shows the conduct of four cycles of time-phased arbitration upon one arbitration group line between four competing master devices of respective arbitration priority identification codes of 0000-, 0001-, 0010-, and 0011-.

FIG. 19*b* shows the conduct of four cycles of time-phased arbitration upon two arbitration group lines between four competing master devices of respective arbitration priority identification codes of 00000000, 00000001, 00000010, and 00000011.

Figures 20, 21:
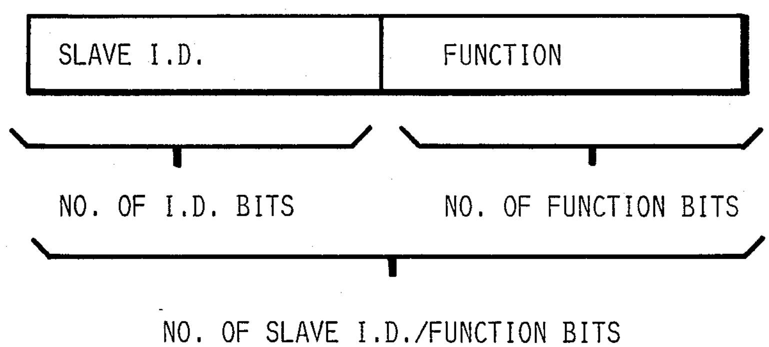

FIG. 20 shows a matrix of the maximum number of masters which can be arbitrated amongst by the preferred embodiment of the invention for allowable combinations of the two arbitration configuration parameters.

FIG. 21*a* shows the Slave Identification/Function format, the partitionment of which into identification and function such as is established solely by system convention between Owner(s) and Slave(s).

FIG. 22 shows the actual permissible values for the configuration parameters of number of Slave Identification/Function Lines and number of Slave Identification/Function Cycles.

FIG. 23 shows the hypothetically permissible values for a hypothetical extension of the Wait Lines configuration parameter and two possible User interpretations of information transmitted thereupon.

FIG. 24 shows the actual permissible values for the number of Data Lines configuration parameter and the peak Versatile Bus data transfer bandwidth resultant from each such specified value.

Figure 25B:
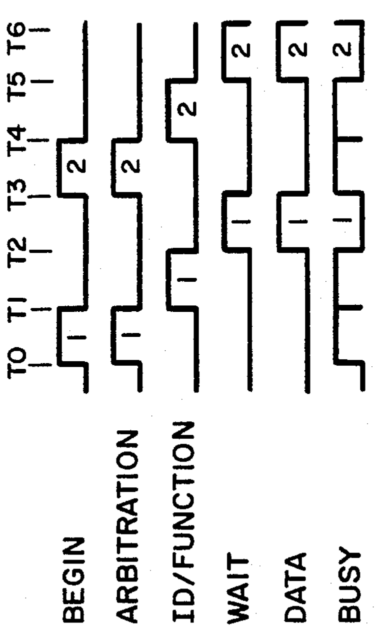
Figure 25D:
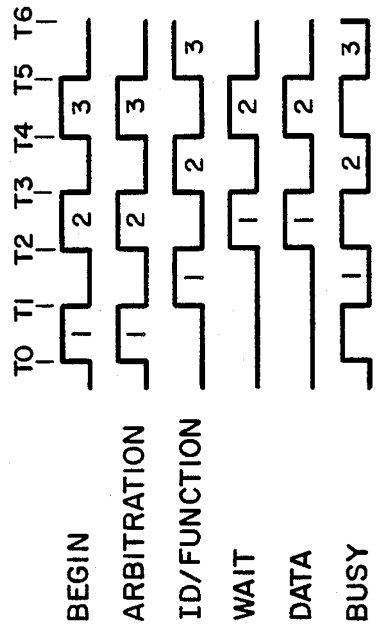
Figure 25A:
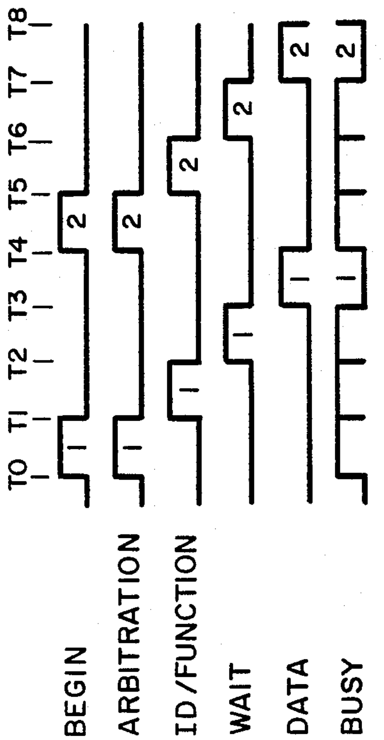

FIG. 25*a* shows Versatile Bus transaction timing when the activity of arbitration is pin multiplexed with the activity of slave identification/function is pin multiplexed with the activity of wait is pin multiplexed with the activity of data.

FIG. 25*b* shows Versatile Bus transaction timing when the activity of arbitration is pin multiplexed with the activity of slave identification/function is pin multiplexed with the activities of (wait plus data), or wait/-data.

Figure 25C:
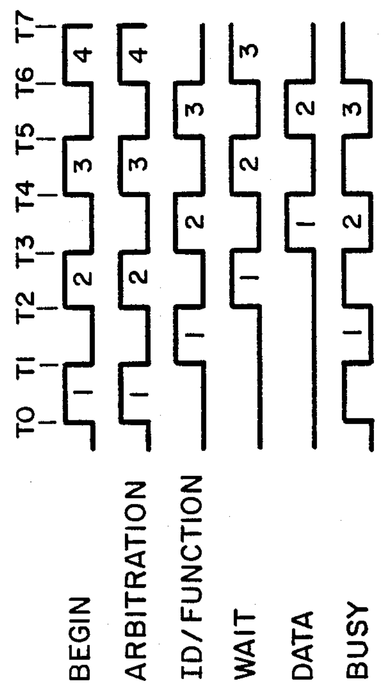

FIG. 25*c* shows Versatile Bus transaction timing when the activity of arbitration is pin multiplexed with the activity of slave identification/function is pipelined with the activity of wait which is pin multiplexed with the activity of data.

FIG. 25*d* shows Versatile Bus transaction timing when the activity of arbitration is pin multiplexed with the activity of arbitration is pin multiplexed with the activity of slave identification/function is pipelined with the activity of wait/data.

Figure 25F:
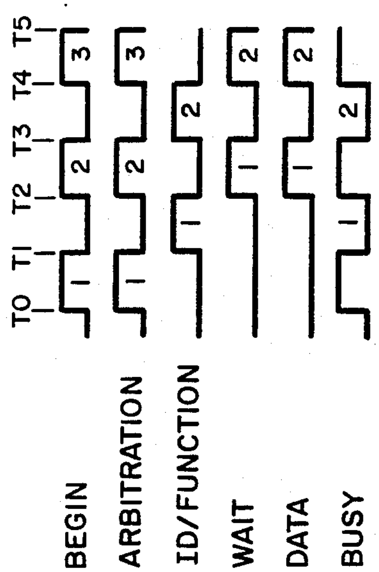
Figure 25H:
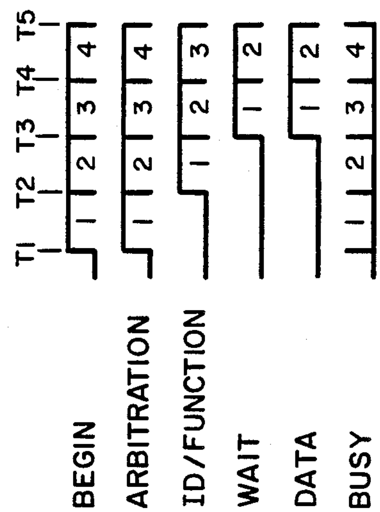
Figure 25E:
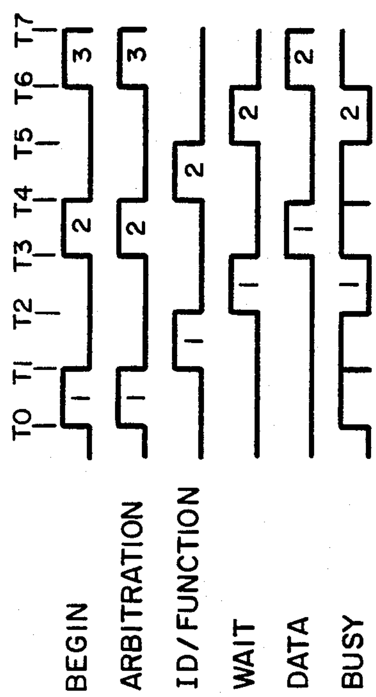

FIG. 25*e* shows Versatile Bus transaction timing when the activity of arbitration is pipelined with the activity of slave identification/function which is pin multiplexed with the activity of wait which is pin multiplexed with the activity of data.

FIG. 25*f* shows Versatile Bus transaction timing when the activity of arbitration is pipelined with the activity of slave identification/function which is pin multiplexed with the activity of wait/data.

Figure 25G:
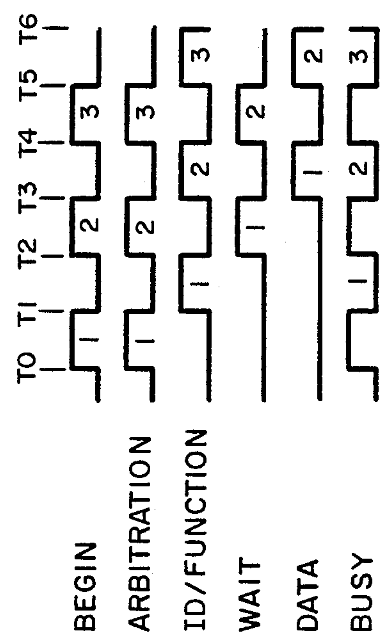

FIG. 25*g* shows Versatile Bus transaction timing when the activity of arbitration is pipelined with the activity of slave identification/function which is pipelined with the activity of wait which is pin multiplexed with the activity of data.

FIG. 25*h* shows Versatile Bus transaction timing when the activity of arbitration is pipelined with the activity of slave identification/function is pipelined with the activity of wait/data.

FIG. 16 shows Versatile Bus transaction timing on a pipelined Versatile Bus configured for multiple cycles of time-phased arbitration.

Figure 27:
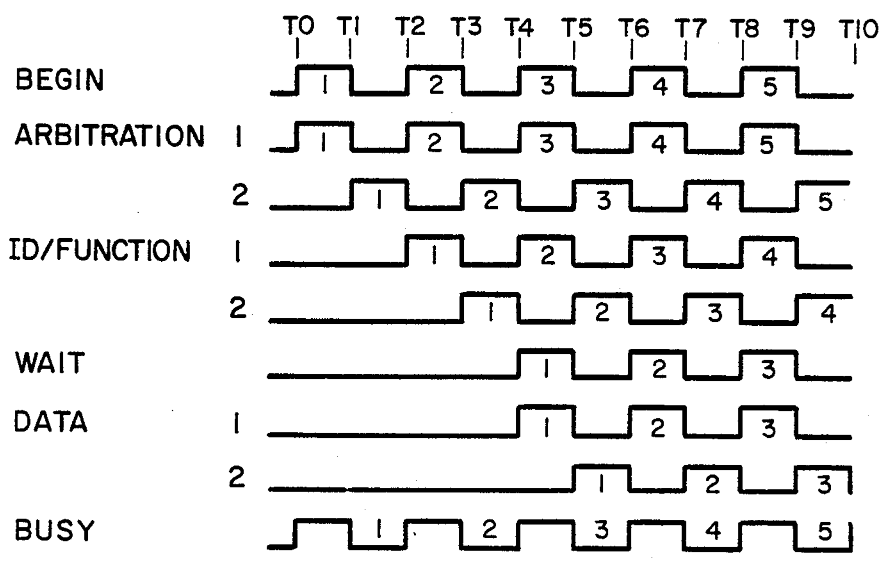

FIG. 27 shows Versatile Bus transaction timing wherein the activities of arbitration, slave identification/function, and data each transpire in two cycles.

Figure 28A:
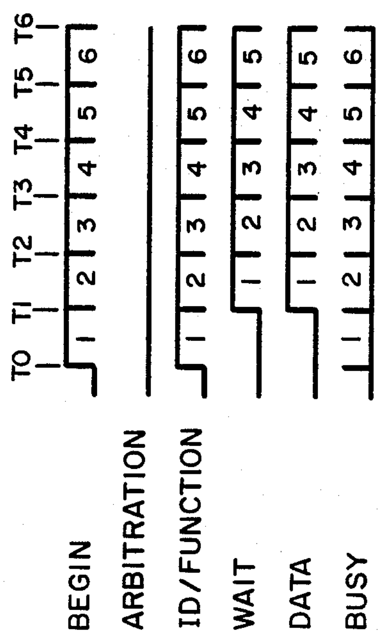

FIG. 28*a* shows Versatile Bus transaction timing wherein the bus is configured as pipelined and for not performing the activity of arbitration.

Figure 28B:
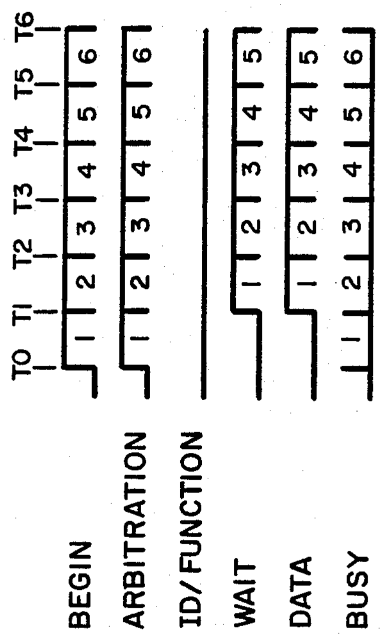

FIG. 28*b* shows Versatile Bus transaction timing wherein the bus is configured as pipelined and for not performing the activity of slave identification/function.

Figure 28C:
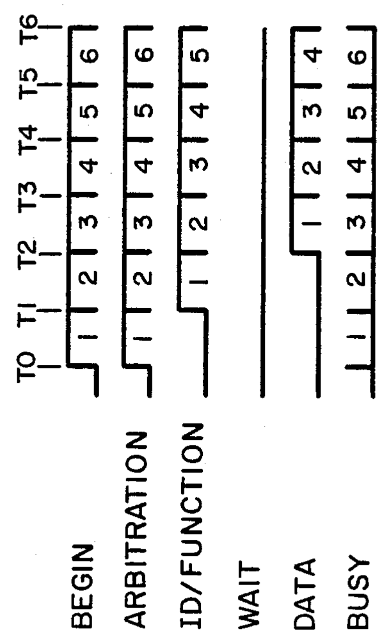

FIG. 28*c* shows Versatile Bus transaction timing wherein the bus is configured as pipelined and for not performing the activity of wait.

Figure 28D:
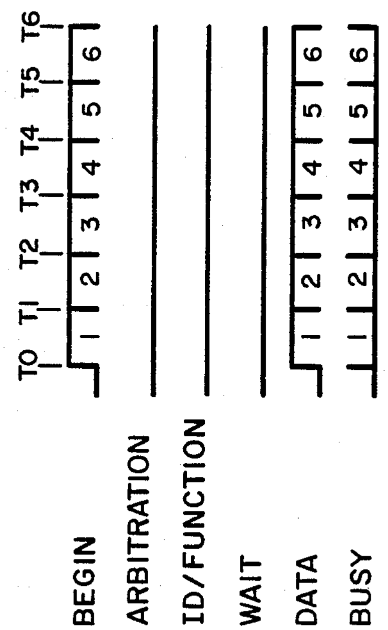

FIG. 28*d* shows Versatile Bus transaction timing wherein the bus is configured as pipelined and for not performing either the activity of arbitration nor the activity of slave identification/function nor the activity of wait.

Figure 29:
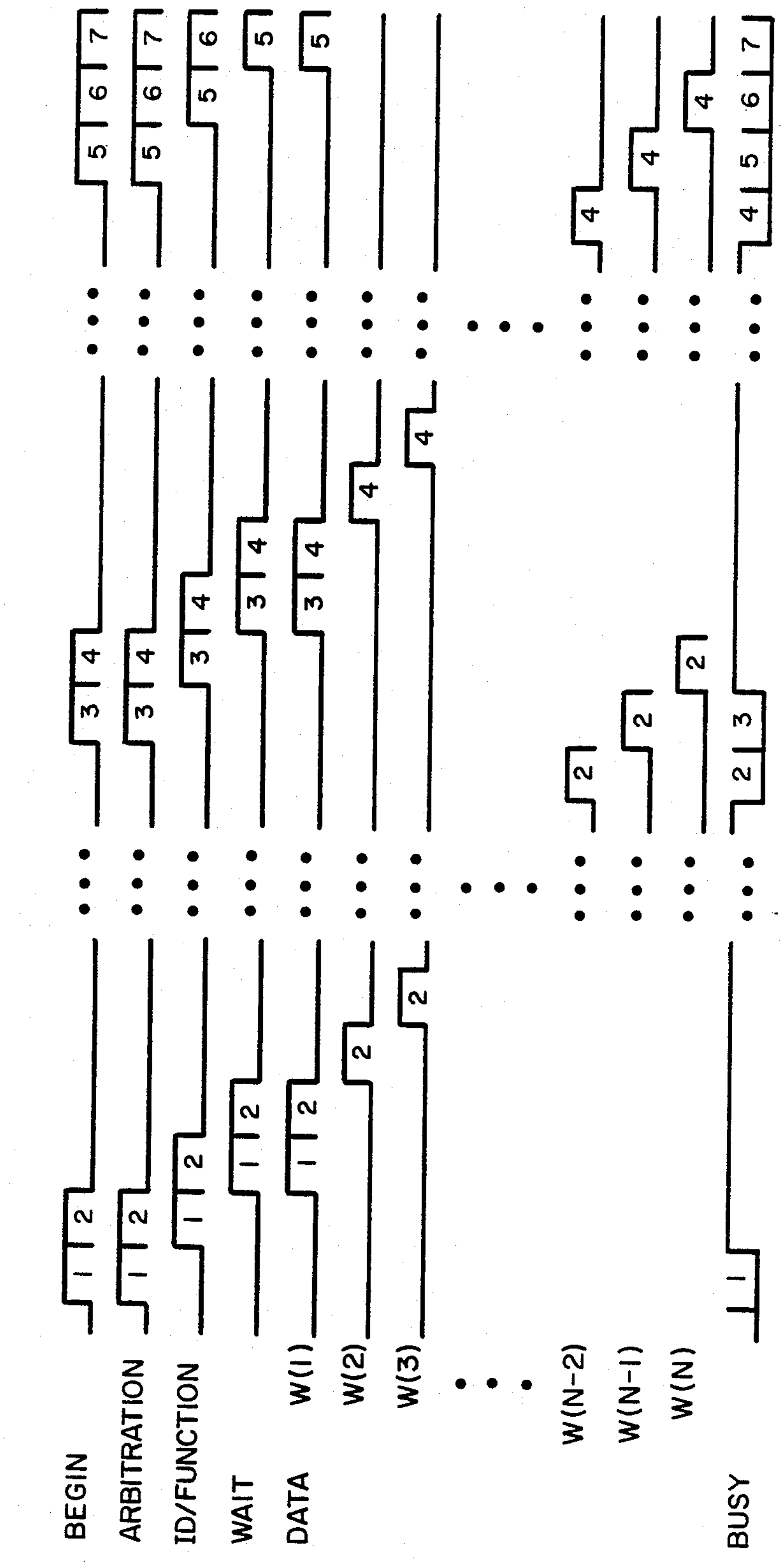

FIG. 29 shows Versatile Bus transaction timing wherein multiple word block data transfers transpire.

Figure 30:
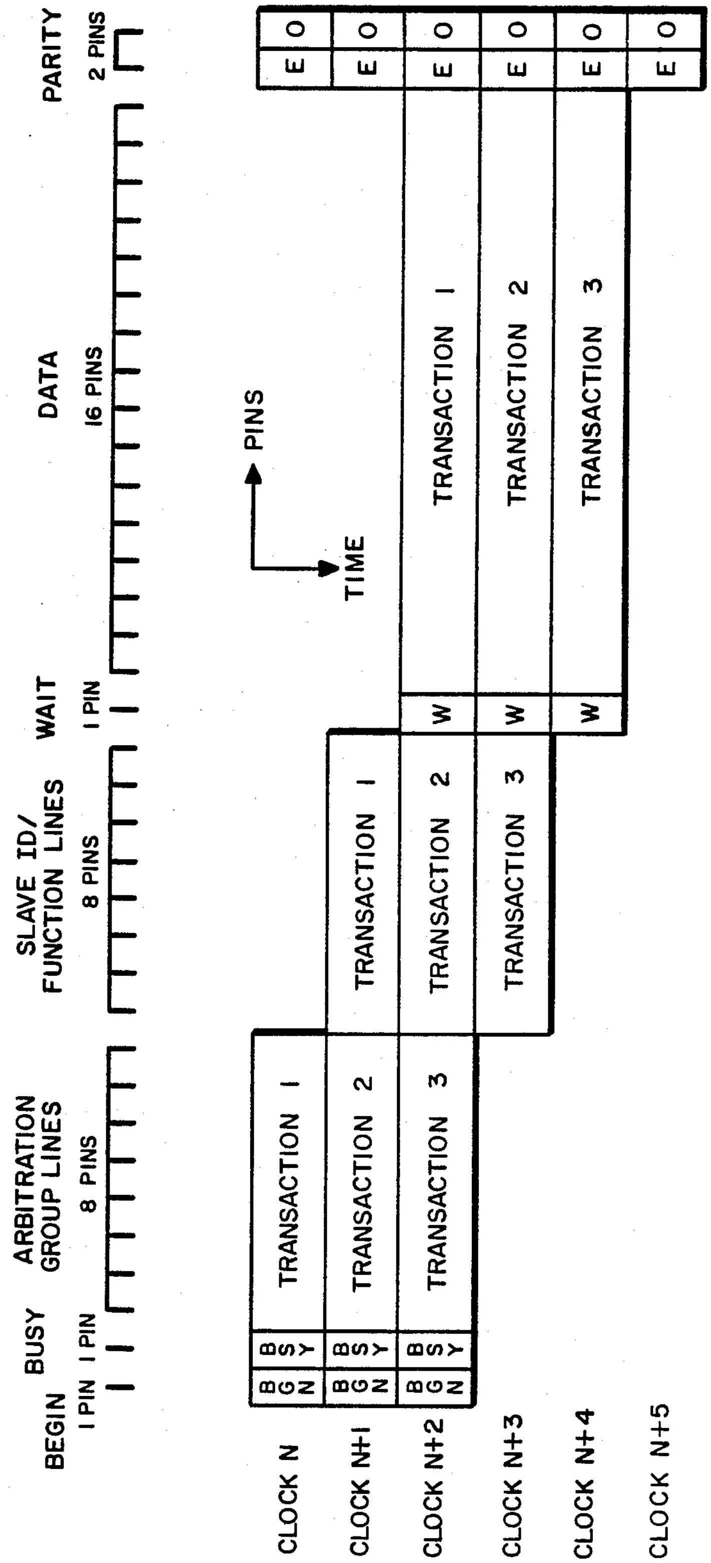

FIG. 30 shows an expanded diagrammatic manner of representing both pin utilization and timing for a Versatile Bus transaction.

Figure 31:
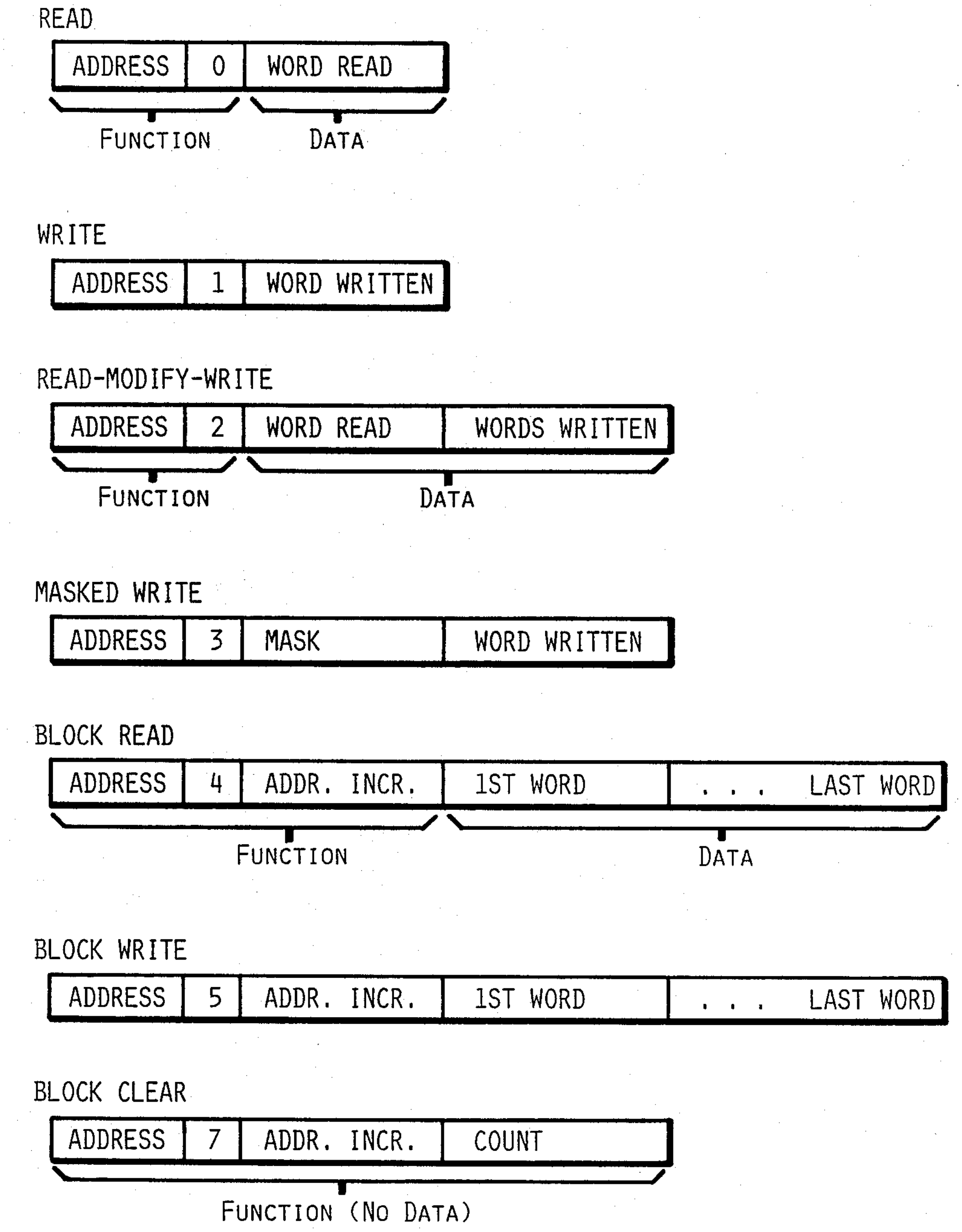

FIG. 31 shows the sequence of function and data transfers attending various sample operations as conducted with a fast memory.

Figure 32:
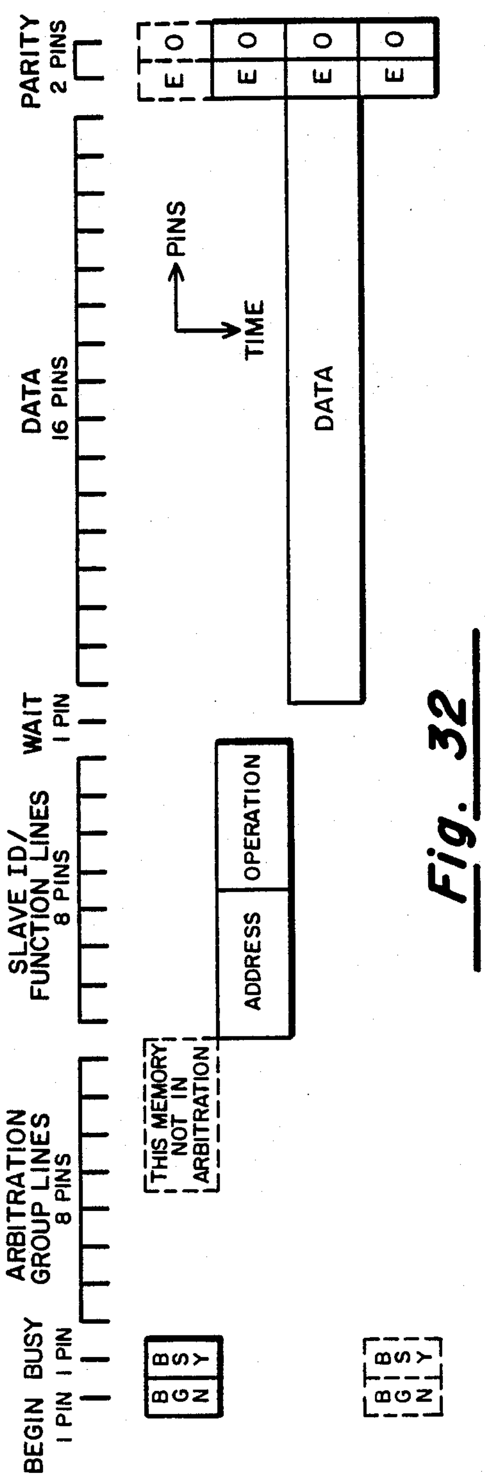

FIG. 32 shows pin utilization and activity timing for an operation Read or Write with a fast memory across a 42252255 configuration Versatile Bus.

Figure 33:
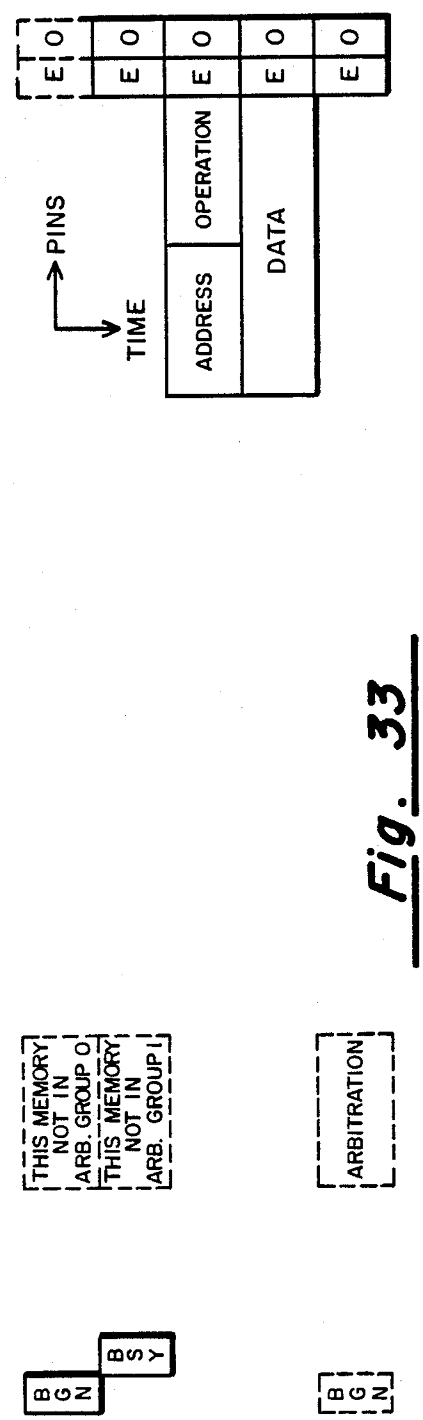

FIG. 33 shows pin utilization and activity timing for an operation Read or Write with a fast memory across a 43112244 configuration Versatile Bus.

Figure 34:
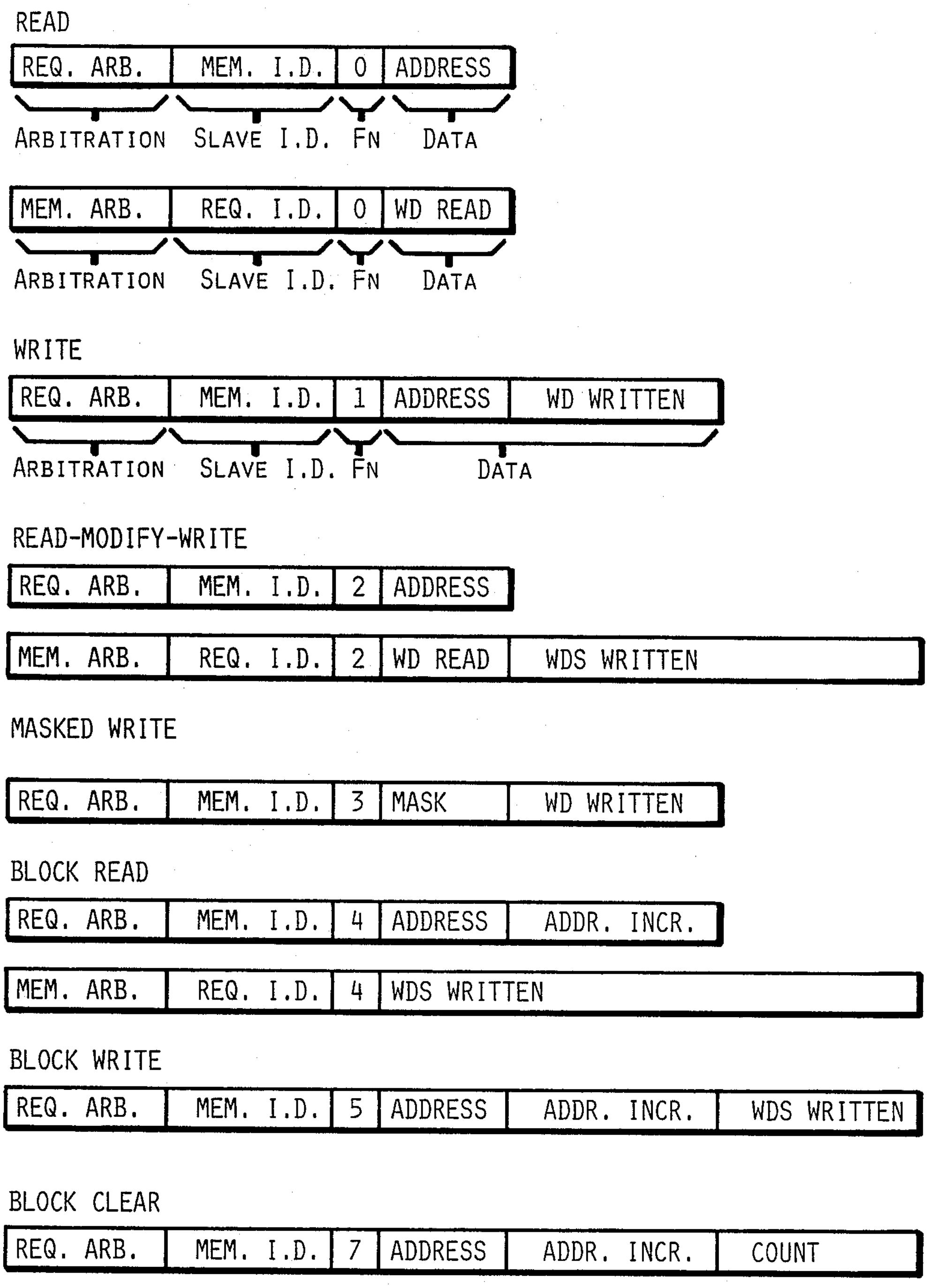

FIG. 34 shows the sequence of function and data transfers attending various sample operations as conducted with a large memory.

Figure 35:
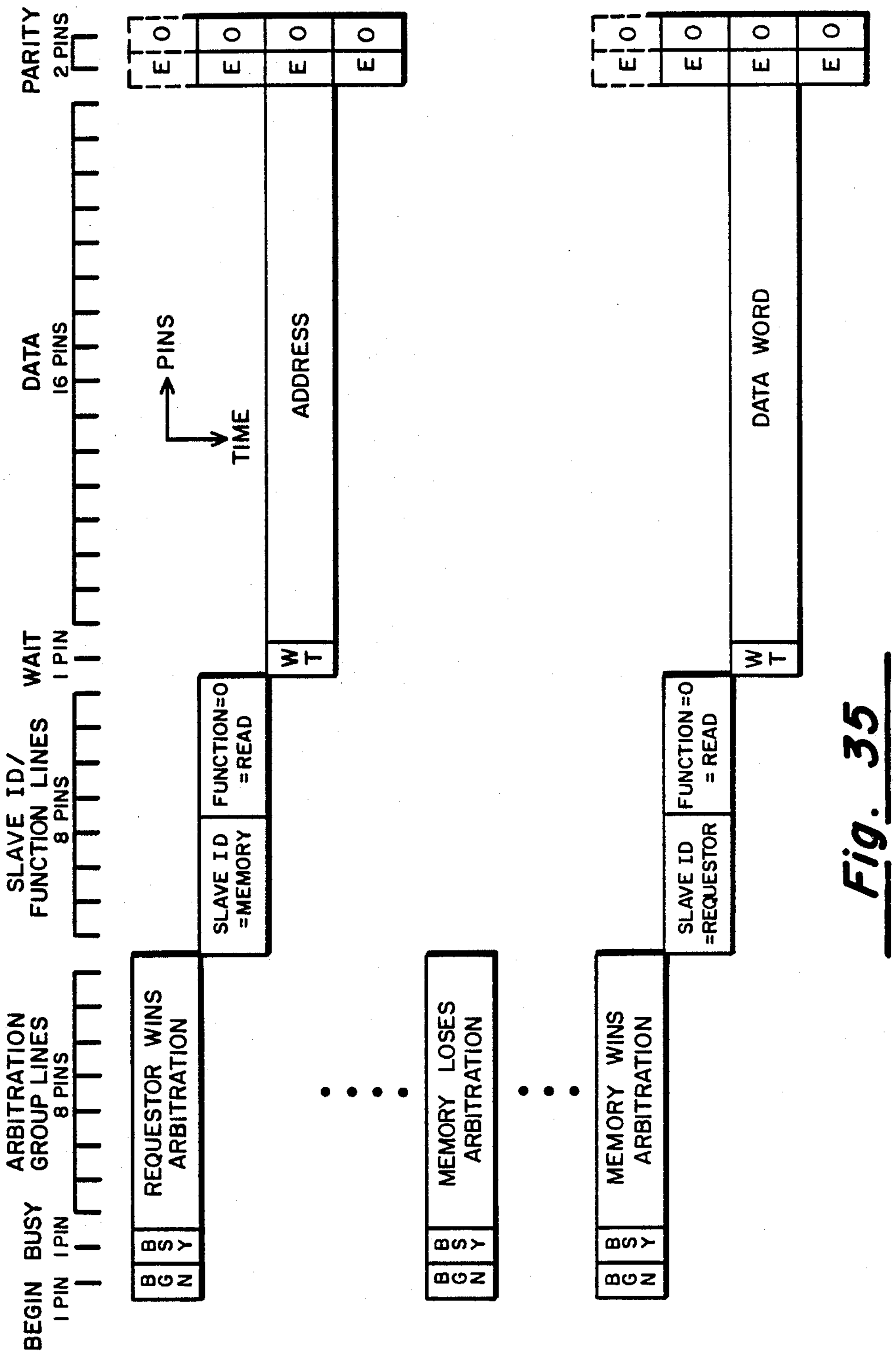

FIG. 35 shows pin utilization and activity timing for an operation Read conducted in a split command/response cycle to a large memory across a 52252355 configuration Versatile Bus.

Figure 36:
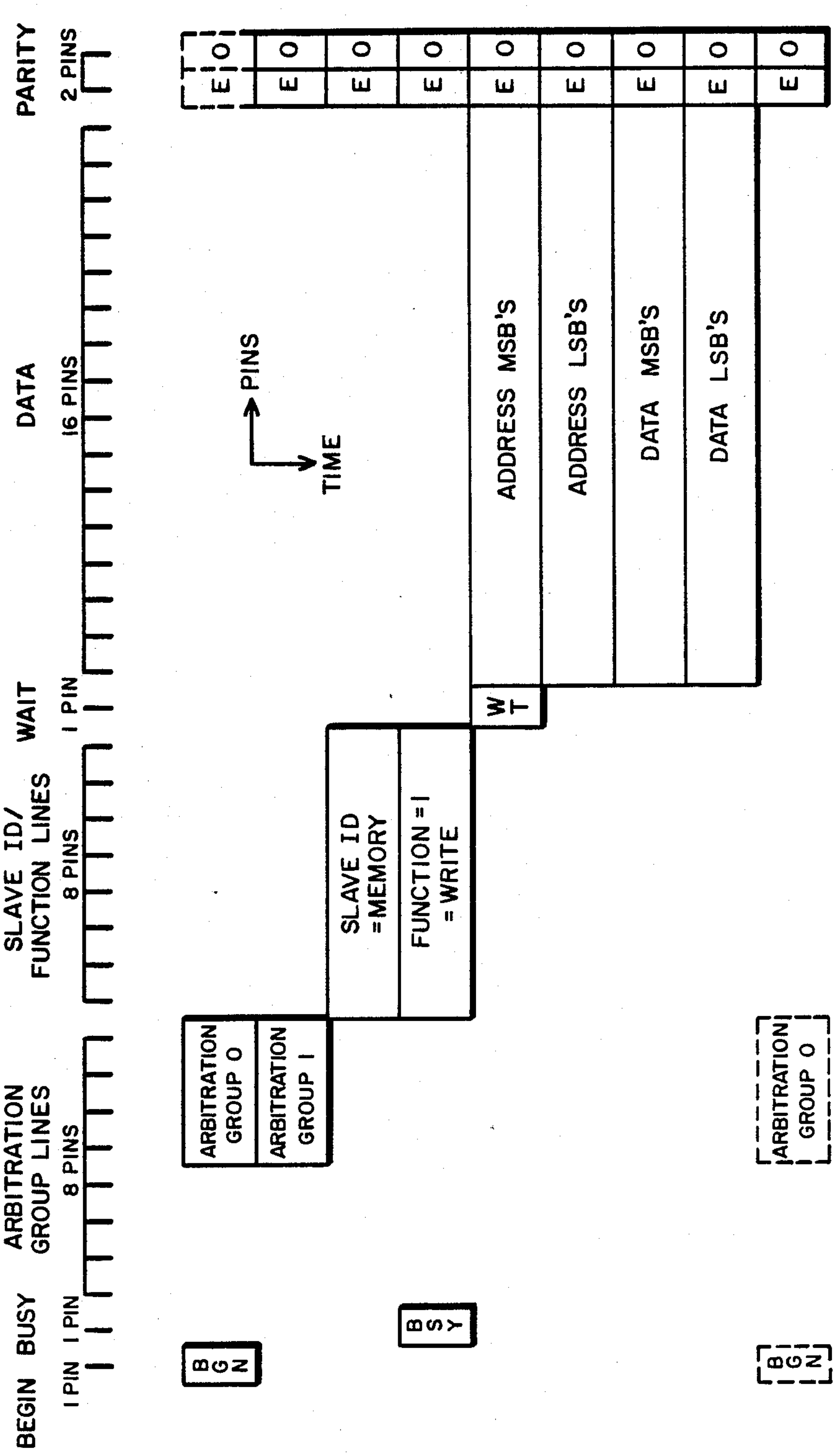

FIG. 36 shows pin utilization and activity timing for an operation Write conducted with a large memory across a 43153355 configuration Versatile Bus.

Figure 37:
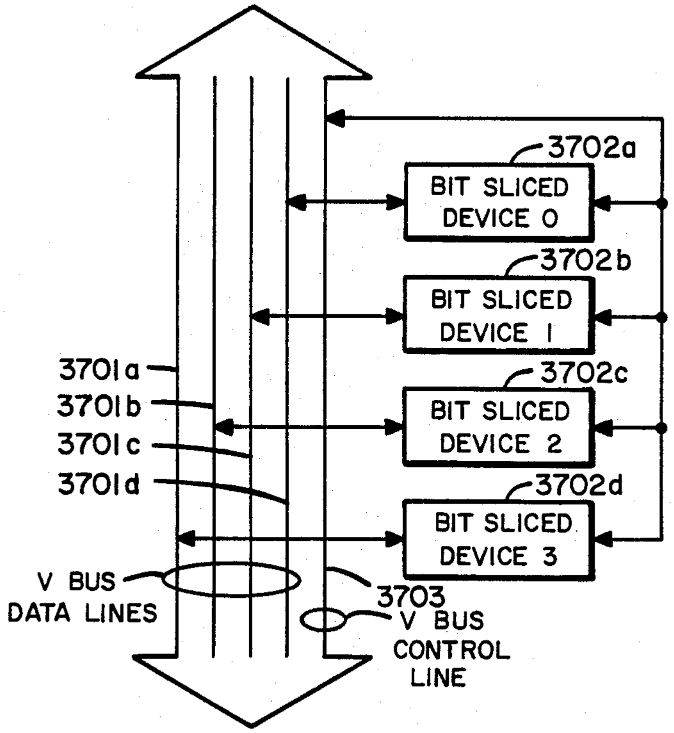

FIG. 37 shows the control fan-out problem resultant from an attempt to connect bit sliced devices to a Versatile Bus.

Figure 38:
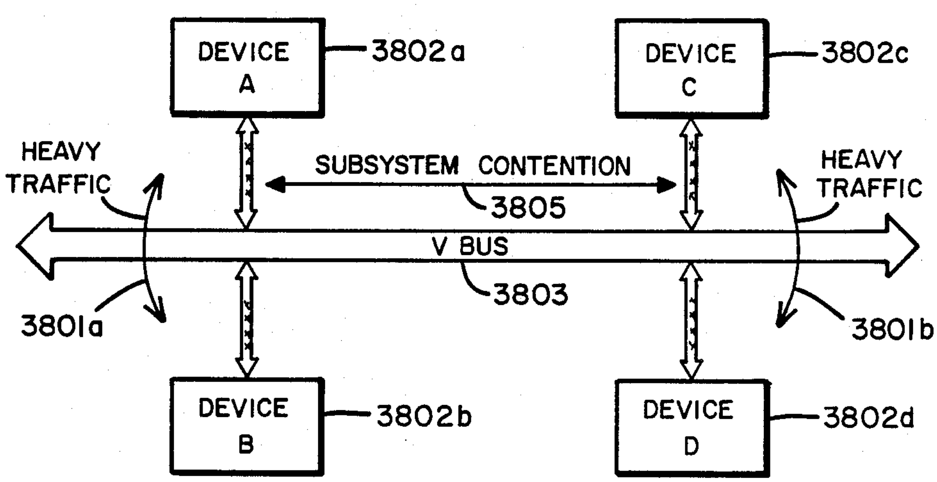

FIG. 38 shows localized heavy Versatile Bus traffic.

Figure 39:
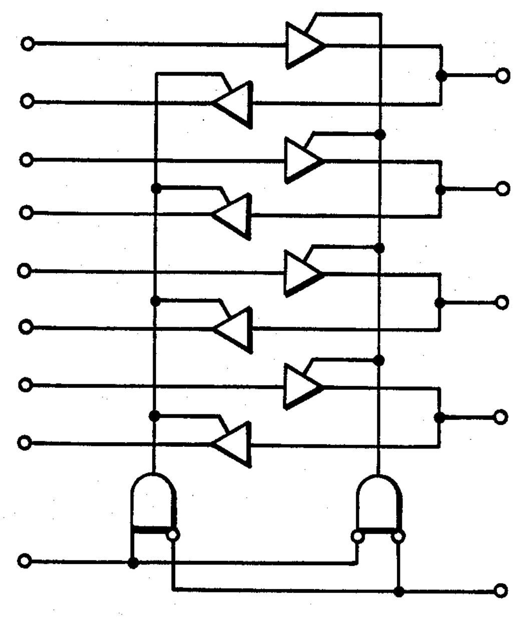

FIG. 39 shows a type M8216 MSI Unidirectional/-Bidirectional Converter.

Figure 40:
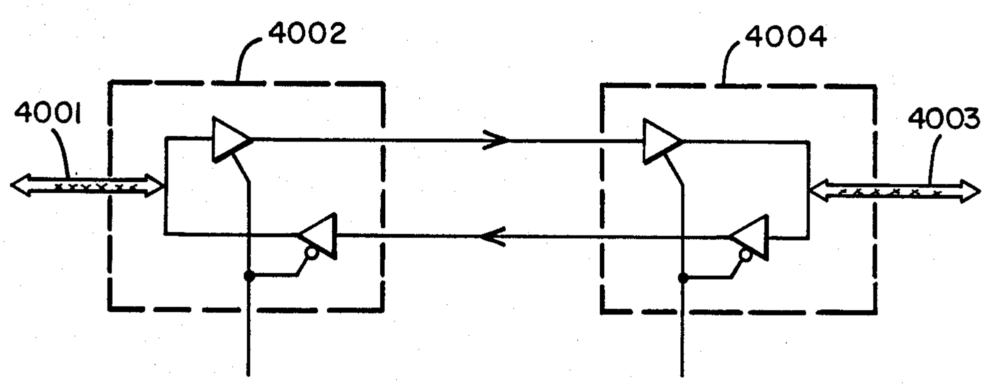

FIG. 40 shows how bidirectional buses can be connected using unidirectional lines.

Figure 41:
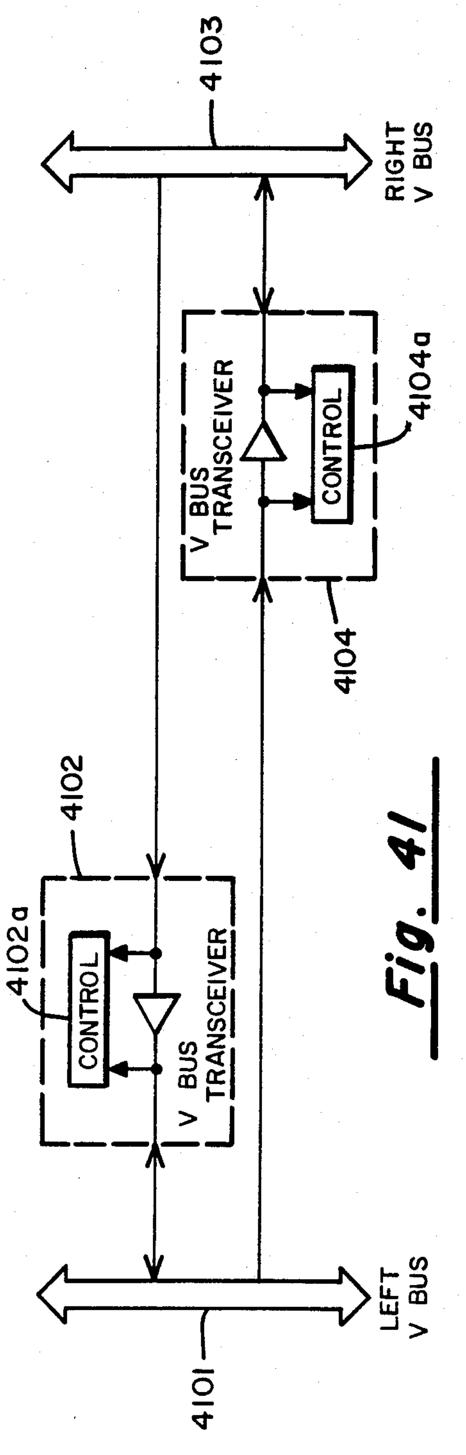

FIG. 41 shows an improved alternative interconnection of VLSIC bidirectional buses utilizing a unidirectional Versatile Bus Transceiver.

Figure 42:
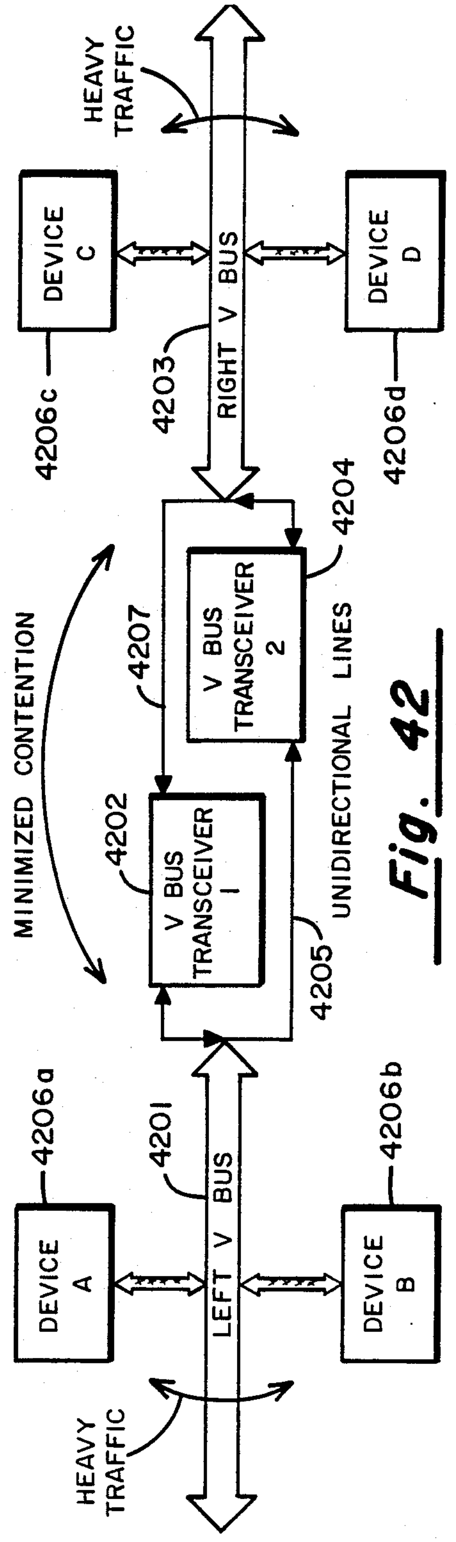

FIG. 42 shows utilization of a unidirectional Versatile Bus Transceiver to isolate localized Versatile Bus traffic.

Figure 43:
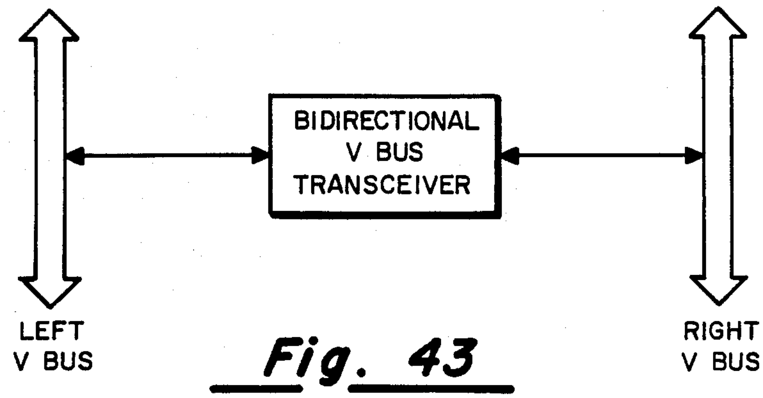

FIG. 43 shows optimized Versatile Bus isolation through a bidirectional Versatile Bus transceiver.

Figure 44A:
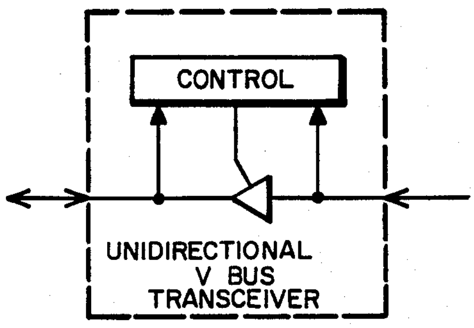

FIG. 44*a* shows a unidirectional Versatile Bus transceiver, including internal driver and receiver elements.

Figure 44B:
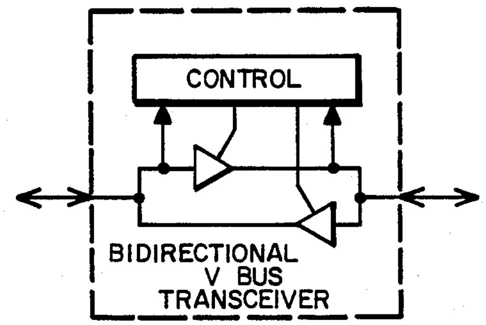

FIG. 44*b* shows a bidirectional Versatile Bus transceiver, including internal driver and receiver elements.

Figure 45:
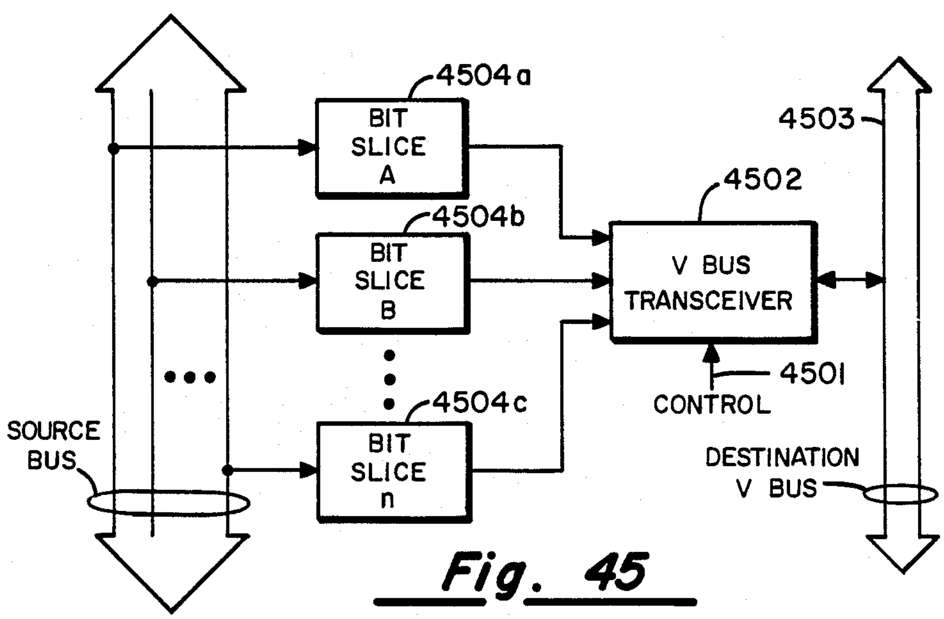

FIG. 45 shows how a Versatile Bus transceiver can be utilized to transparently connect bit sliced data to a Versatile Bus.

Figure 46:
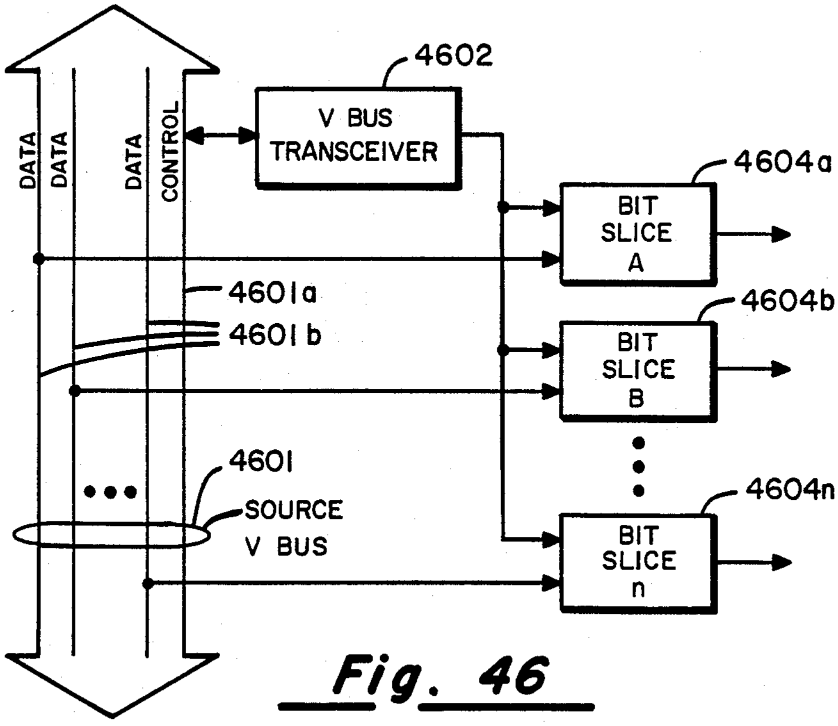

FIG. 46 shows a Versatile Bus transceiver utilized to control fan-out of bit sliced data.

Figure 47:
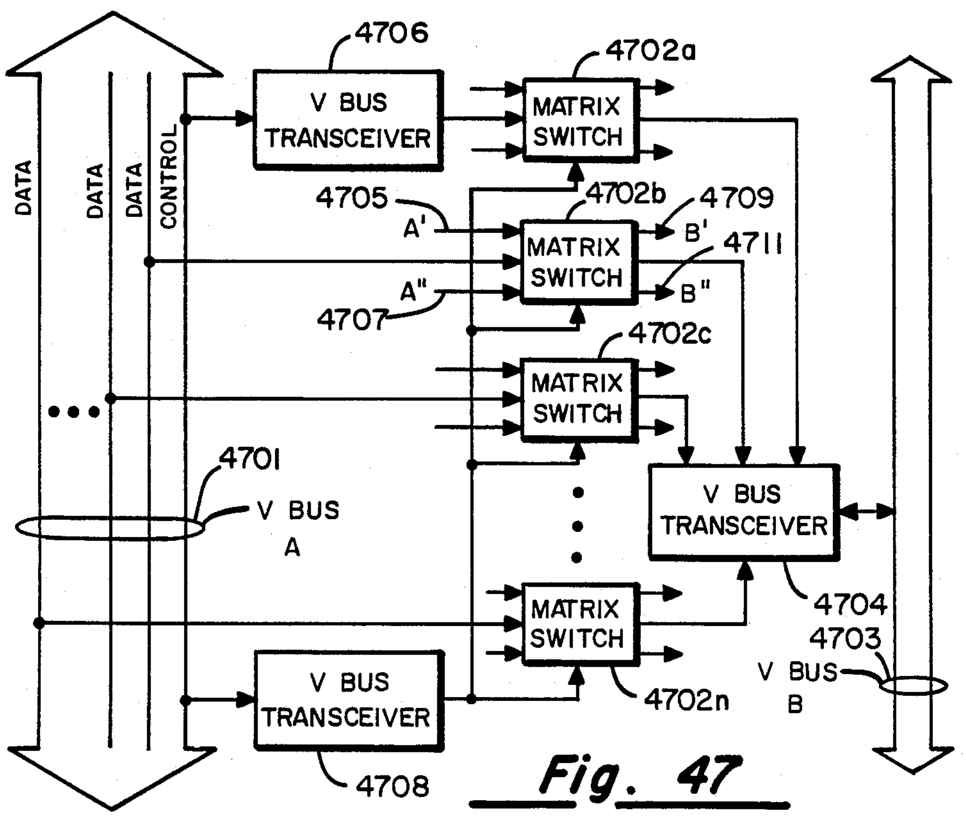

FIG. 47 shows unidirectional Versatile Bus connection to a matrix switch.

Figure 48:
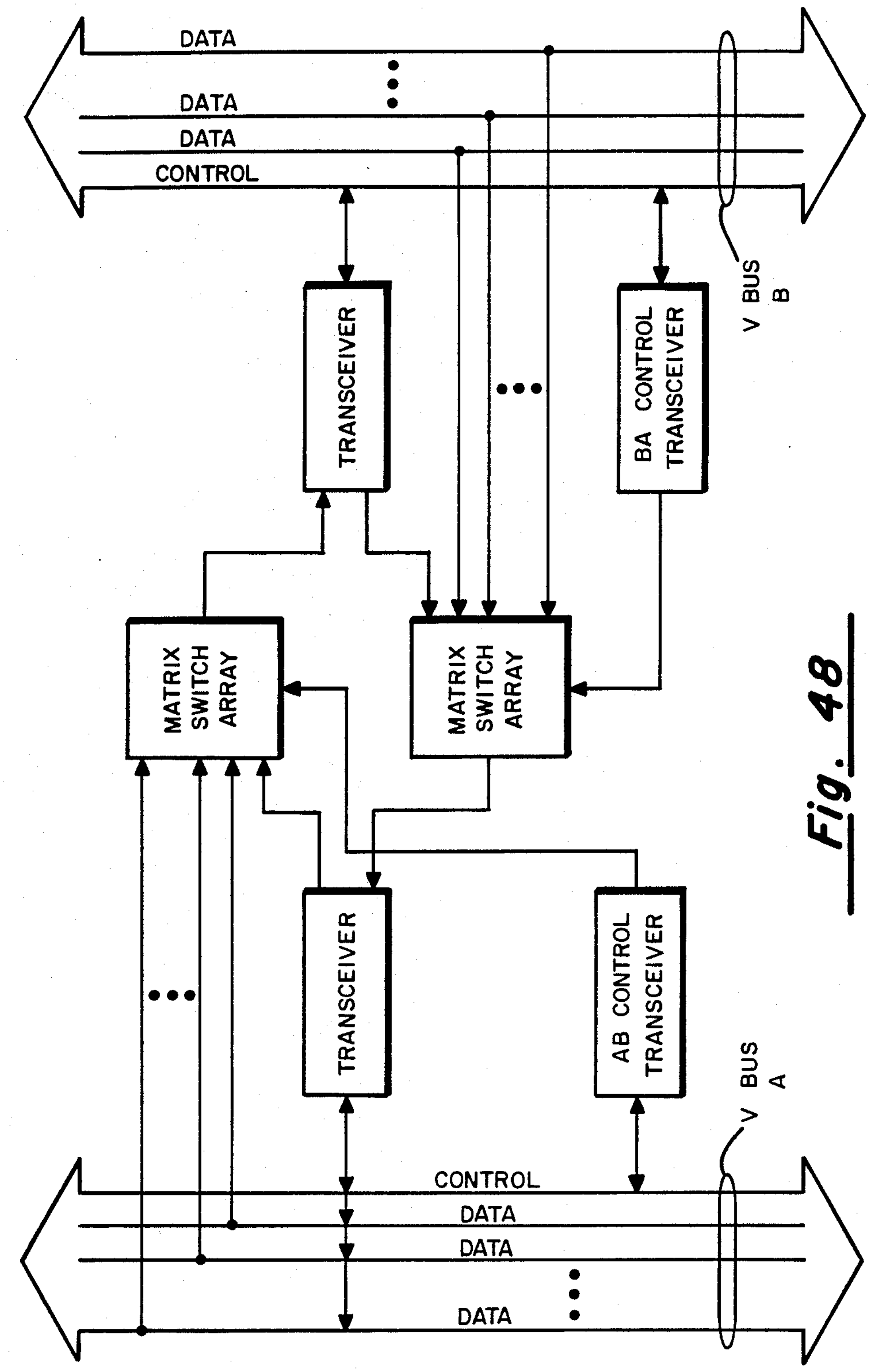

FIG. 48 shows bidirectional Versatile Bus connection to a matrix switch.

Figure 49:
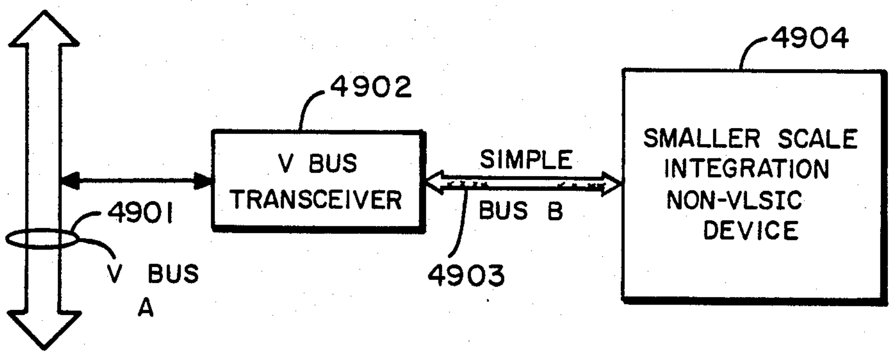

FIG. 49 shows how a Versatile Bus may be connected via a Versatile Bus transceiver to a single scale integration (SSI) non-VLSIC device.

Figure 50:
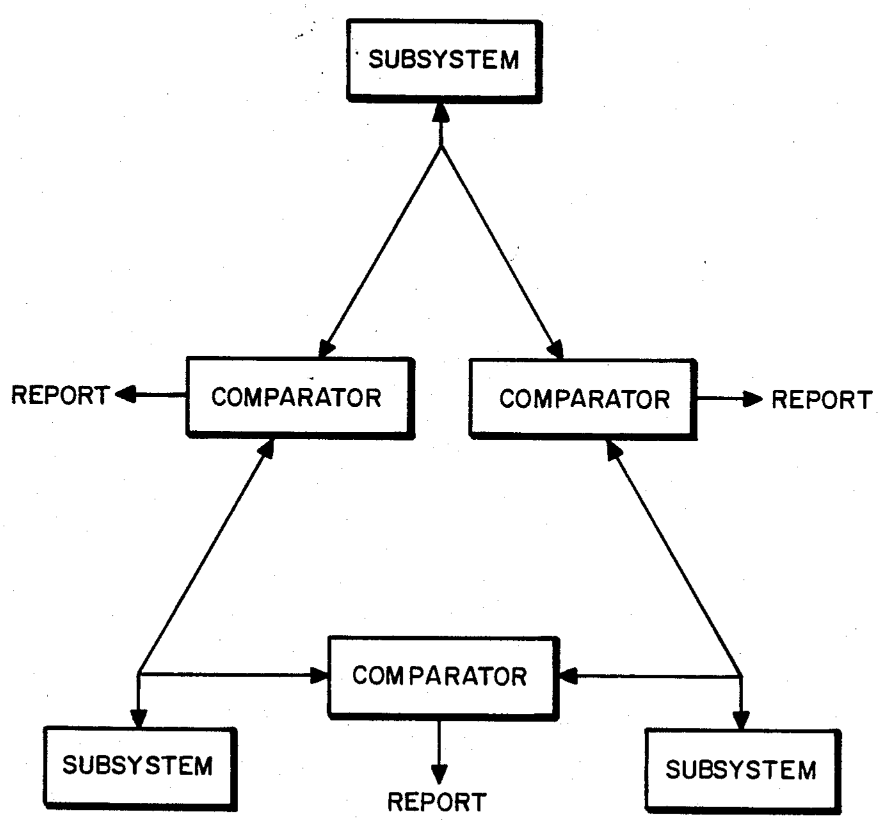

FIG. 50 shows a classical triple modular redundant (TMR) fault tolerant system based on Versatile Bus intercommunication.

FIG. 51 shows a table of the signals and associated figures of the Versatile Bus Interface Logics Interface with (the) User.

FIG. 52*a* shows a timing diagram for the normal exercise of the Versatile Bus Interface Logics to User Interface.

Figure 52B:
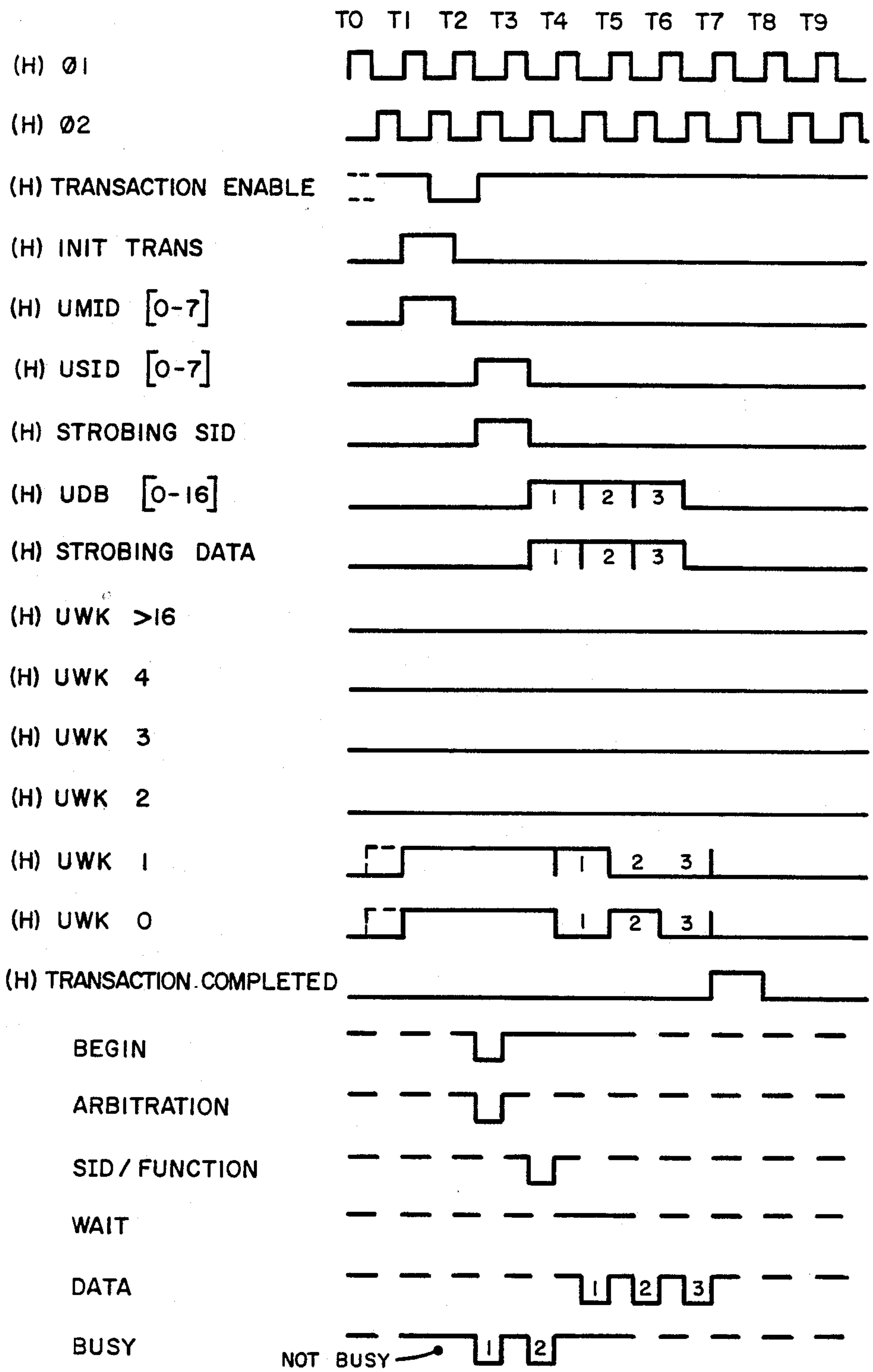

FIG. 52*b* shows a timing diagram for the exercise of the Versatile Bus Interface Logics to User interface for Block Data Transfer.

Figure 52C:
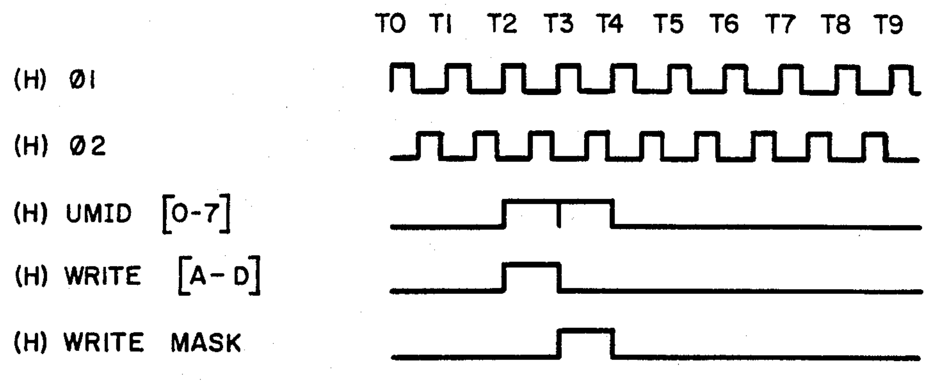

FIG. 52*c* shows a timing diagram for the exercise of the Versatile Bus Interface Logics to User interface for the storing of Slave Identification Codes and a Mask Quantity.

Figure 52D:
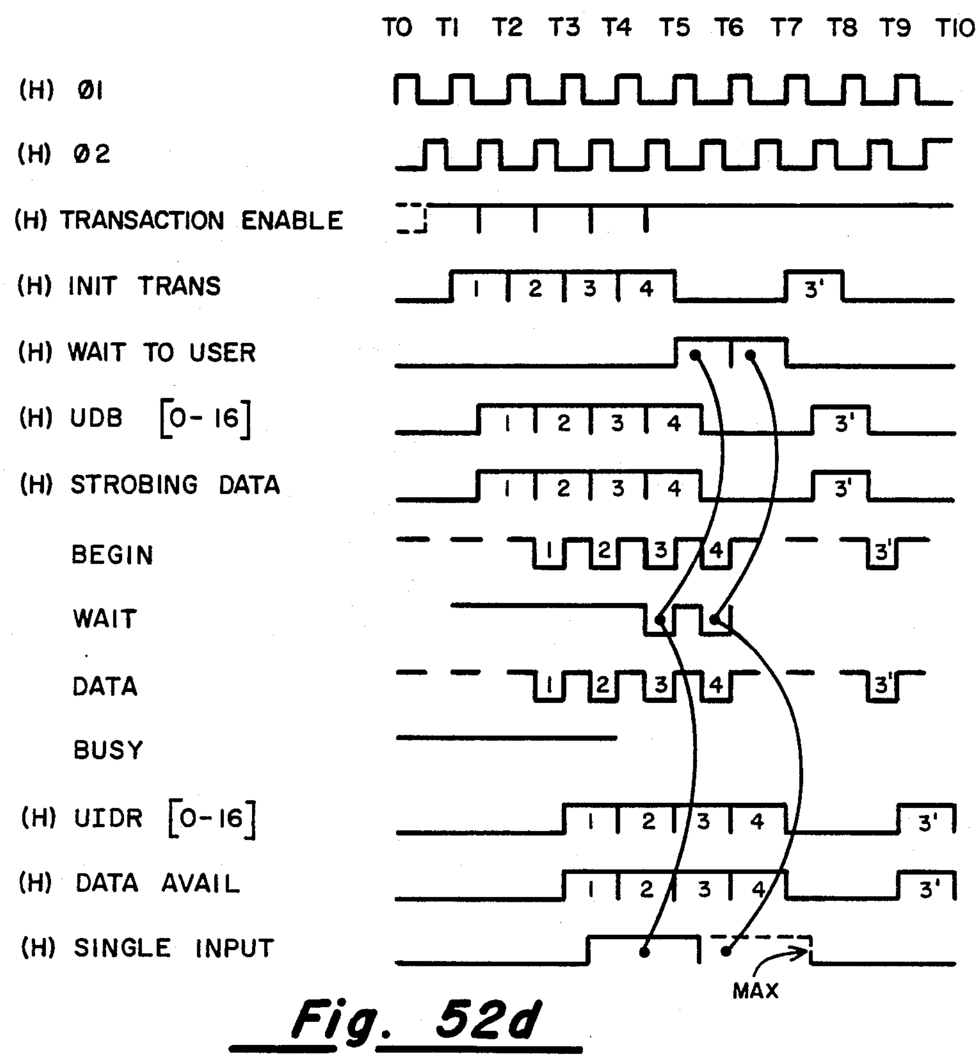

FIG. 52*d* shows a timing diagram for the exercise of the Versatile Bus Interface Logics to User interface for a single Master—single Slave system such as requires neither the configuration nor exercise of Arbitration nor of Slave Identification/Function activity upon the Versatile Bus.

Figures 2, 52E:
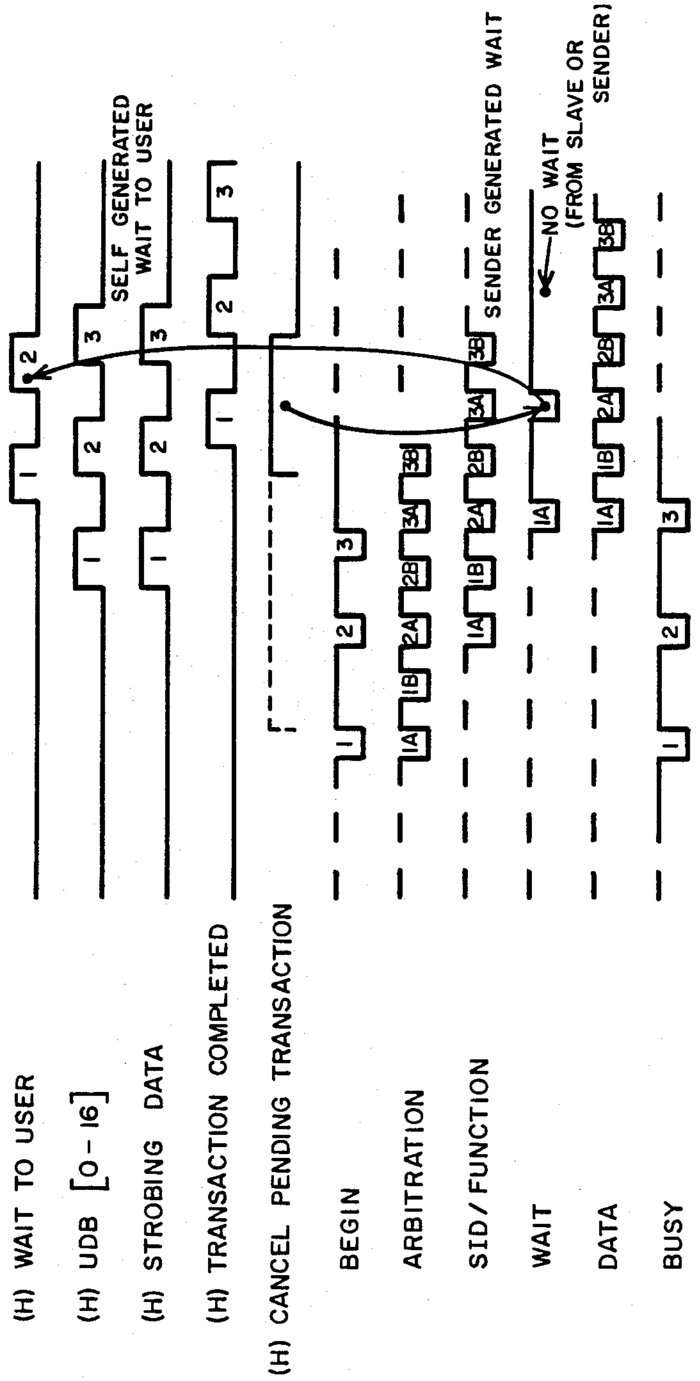
Figure 7L:
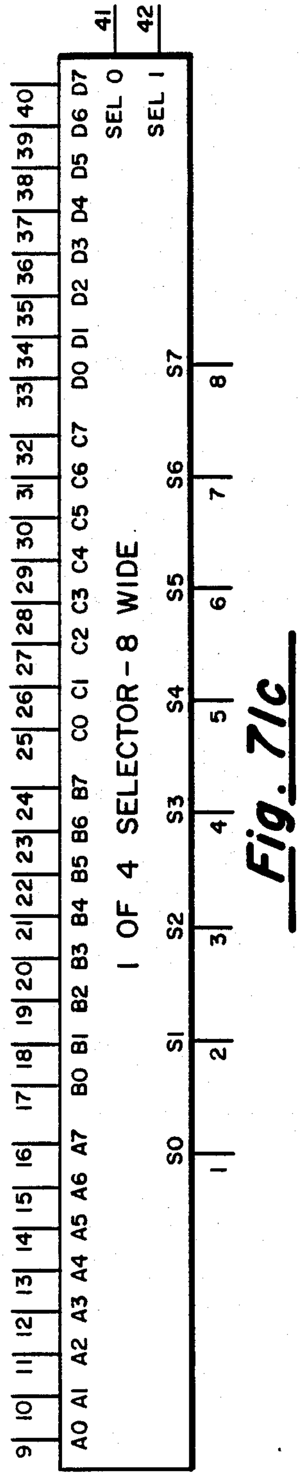
Figure 7L:
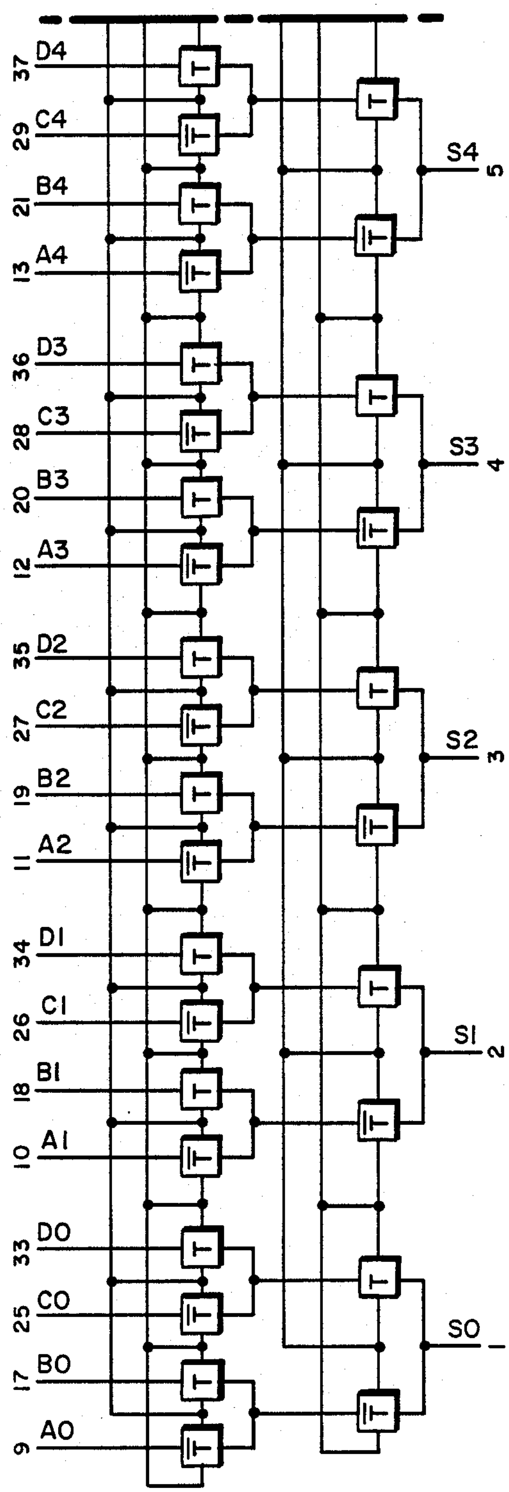
Figure 7L:
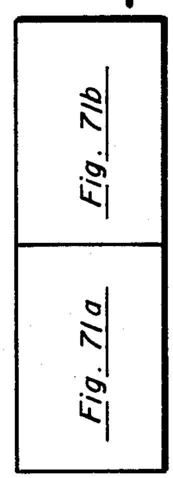

FIG. 52*e* shows a timing diagram for the exercise of the Versatile Bus Interface Logics to User interface for the special operation of cancelling a pending transaction.

FIG. 53 shows a table of the signals and associated figures of the Versatile Bus Interface Logics to VM Node interface.

FIG. 54*a* shows a first logical representation of an AND-OR-INVERT with 2+1 inputs, or AOI 2-1 logical element.

FIG. 54*b* shows a second logical representation of an AOI 2-1 logical element.

FIG. 54*c* shows a truth table for the AOI 2-1 logical element.

FIG. 54*d* shows a logical structure for the AOI 2-1 logical element.

FIG. 55*a* shows a first logical representation of an AND-OR-INVERT with 2+2 inputs, or AOI 2-2 logical element.

FIG. 55*b* shows a second logical representation of an AOI 2-2 logical element.

FIG. 55*c* shows the logical structure of the AOI 2-2 logical element.

FIG. 55*d* shows a truth table for the AOI 2-2 logical element.

FIG. 56*a* shows a first logical representation of an AND-OR-INVERT with 2+1+1 inputs, or AOI 2-1-1 logical element.

FIG. 56*b* shows a second logical representation of an AOI 2-1-1 logical element.

FIG. 56*c* shows the logical structure for the AOI 2-1-1 logical element.

FIG. 56*d* shows a truth table for the AOI 2-1-1 logical element.

FIG. 57*a* shows a first logical representation of an AND-OR-INVERT with 2+2+2 inputs, or AOI 2-2-2 logical element.

FIG. 57*b* shows a second logical representation of an AOI 2-2-2 logical element.

FIG. 57*c* shows a truth table for the AOI 2-2-2 logical element.

FIG. 57*d* shows a logical structure for the AOI 2-2-2 logical element.

FIG. 58*a* shows a first logical representation of an INVERTER, or IN1 logical element.

FIG. 58*b* shows a second logical representation of an IN1 logical element.

FIG. 58*c* shows the logical structure of the IN1 logical element.

FIG. 58*d* shows a truth table for the IN1 logical element.

FIG. 59*a* shows a first logical representation of a NEGATIVE AND-2 input, or NAND-2 input, or NA2 logical element.

FIG. 59*b* shows a second logical representation of a NA2 logical element.

FIG. 59*c* shows the logical structure of the NA2 logical element.

FIG. 59*d* shows a truth table for the NA2 logical element.

FIG. 60*a* shows a first logical representation of a NEGATIVE OR-2 input, or NOR-2 input, or NO2 logical element.

FIG. 60*b* shows a second logical representation of an NO2 logical element.

FIG. 60*c* shows the logical structure of the NO2 logical element.

FIG. 60*d* shows a truth table for the NO2 logical element.

FIG. 61*a* shows a first logical representation of a NEGATIVE AND-3 input, or NAND-3 input or NA3 logical element.

FIG. 61*b* shows a second logical representation of an NA3 logical element.

FIG. 61*c* shows a truth table for the NA3 logical element.

FIG. 61*d* shows the logical structure for the NA3 logical element.

FIG. 62*a* shows a first logical representation of a NEGATIVE OR-3 input, or NOR-3 input, or NO3 logical element.

FIG. 62*b* shows a second logical representation of a NO3 logical element.

FIG. 62*c* shows a truth table for the NO3 logical element.

FIG. 62*d* shows the logical structure of the NO3 logical element.

FIG. 63*a* shows a first logical representation of a NEGATIVE AND-4 input, or NAND-4 input, or NA4 logical element.

FIG. 63*b* shows a second logical representation of a NA4 logical element.

FIG. 63*c* shows the logical structure of the NA4 logical element.

FIG. 63*d* shows a truth table for the NA4 logical element.

FIG. 64*a* shows a first logical representation of a NEGATIVE OR-4 input, or NOR-4 input, or NO4 logical element.

FIG. 64*b* shows a second logical representation of an NO4 logical element.

FIG. 64*c* shows the logical structure of the NO4 logical element.

FIG. 64*d* shows a truth table for the NO4 logical element.

FIG. 65*a* shows a first logical representation of a NEGATIVE AND-8 input, or NAND-8 input, or NA8 logical element.

FIG. 65*b* shows a second logical representation of a NA8 logical element.

FIG. 65*c* shows the logical structure of the NA8 logical element.

FIG. 65*d* shows a truth table for the NA8 logical element.

FIG. 66*a* shows the logical representation of a SELECTOR SINGLE 1 of 2 or S12 logical element.

FIG. 66*b* shows the logical structure of the S12 logical element as constructed in inverter and transfer gates.

FIG. 66*c* shows a transfer table for the S12 logical element.

FIG. 67*a* shows the schematic representation of the CMOS VLSIC prior art logical structure of the transfer gate.

FIG. 67*b* shows an alternative prior art representation of a first variant of the transfer gate of FIG. 67*a*.

FIG. 67*c* shows an alternative prior art representation of a second variant of the transfer gate of FIG. 67*a*.

FIG. 67*d* shows a first physical and logical variant of the prior art structure of a transfer gate.

FIG. 67*e* shows a second physical and logical variant of the prior art structure of a transfer gate.

FIG. 67*f* shows the transfer table for the first transfer gate variant of FIG. 66*b*.

FIG. 67*g* shows the transfer table for the second transfer gate variant of FIG. 66*c*.

FIG. 68*a* shows a logical representation of the SELECTOR SINGLE 1 of 4, or S14 logical element.

FIG. 68*b* shows a truth table for the S14 logical element.

FIG. 68*c* shows the logical structure of the S14 logical element as constructed from inverter and transfer gates.

FIG. 69*a* shows the logical representation of the 1 of 2 selector-8 wide, 102 logical element.

FIG. 69*b* shows the transfer table for the 102 logical element.

FIG. 69*c* shows the logical construction of the 102 logical element as constructed from inverters and transfer gates.

FIG. 70*a* shows the logical representation of the 1 OF 2 SELECTOR WITH TEST, 1T2 logical element.

FIG. 70*b* shows the transfer table for the 1T2 logical element.

FIG. 70*c* shows the logical construction of the 1T2 logical element as constructed from inverters and transfer gates.

Figures 71B, 71D:
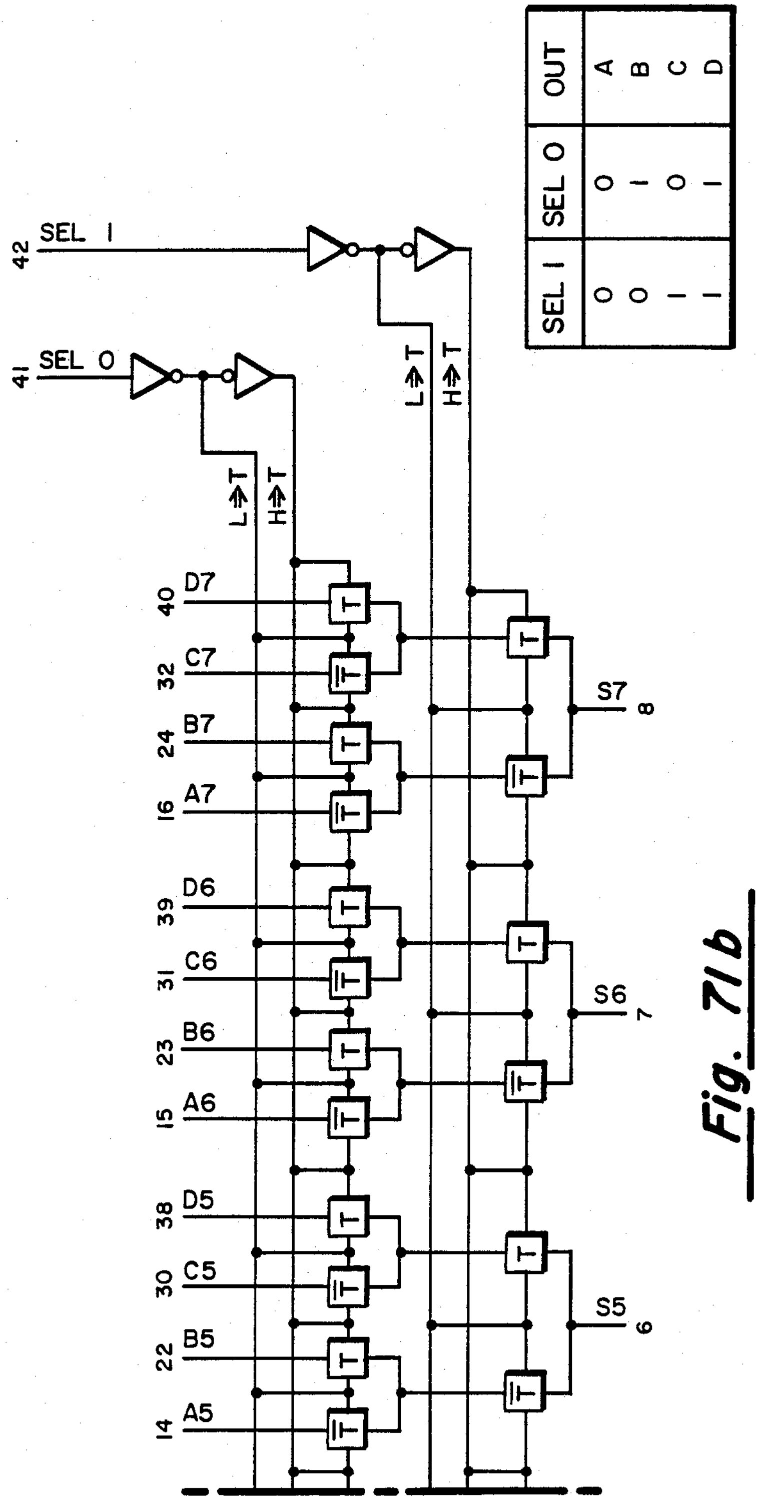

FIG. 71*a* and FIG. 71*b* show the logical structure of the 1 OF 4 SELECTOR-8 WIDE, 104, logical element as constructed from inverters and transfer gates.

FIG. 71*c* shows the logical representation of the 1 of 2 selector-8 wide, 102 logical element.

FIG. 71*d* shows the transfer table for the 102 logical element.

Figures 72B, 72D:
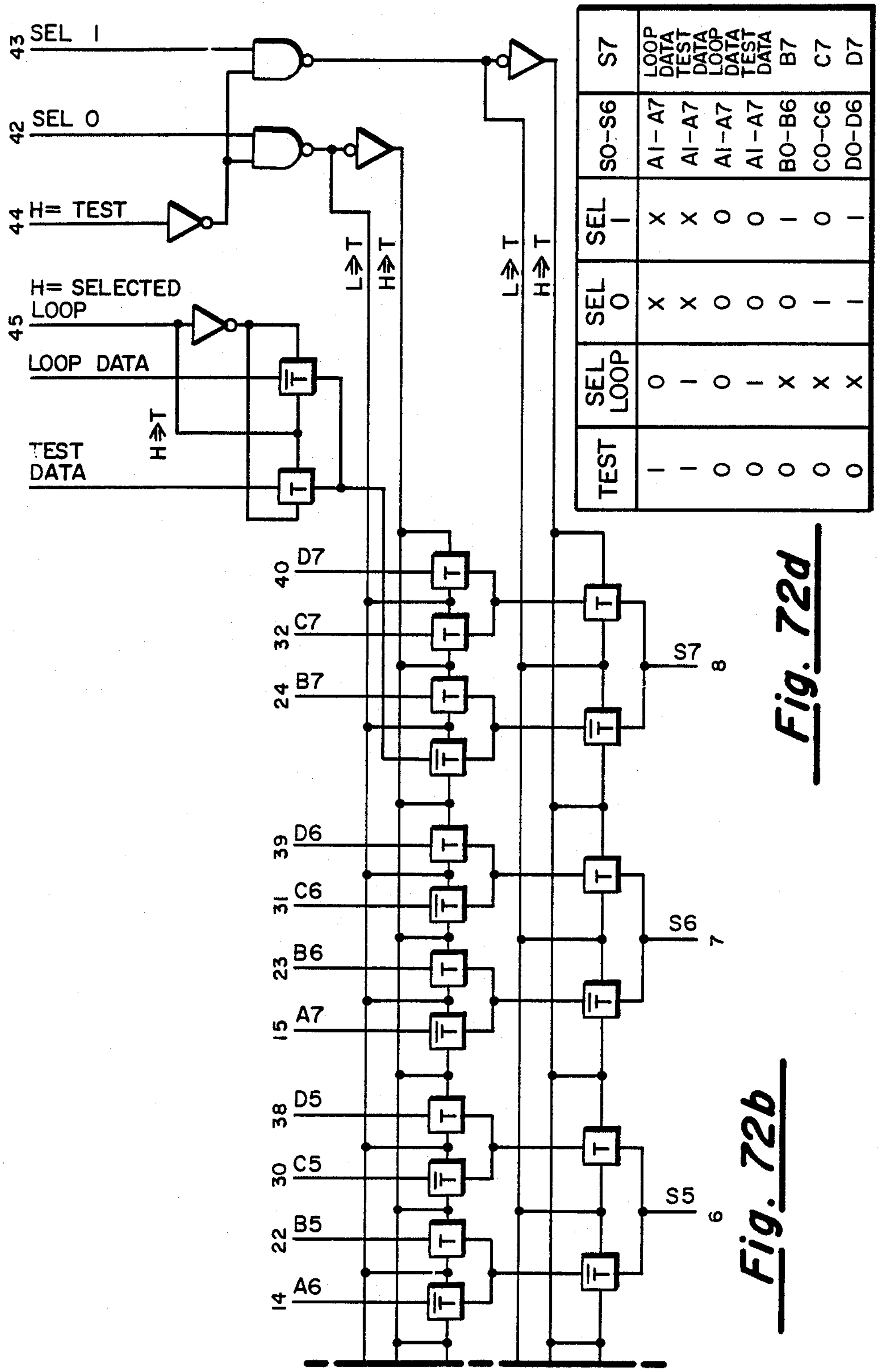

FIG. 72*a* and FIG. 72*b* show the logical structure for the 1 OF 4 SELECTOR-8 WIDE WITH TEST, 1T4, logical element as constructed from inverters and transfer gates.

FIG. 72*c* shows the logical representation of the 1 OF 4 SELECTOR-8 WIDE WITH TEST, 1T4 logical element.

FIG. 72*d* shows the transfer table for the 1T4 logical element.

FIG. 73*a* through 73*d* show the logical structure for the binary shift matrix, BSM logical element as constructed from inverters and transfer gates.

FIG. 73*e* shows the logical representation of the BINARY SHIFT MATRIX, BSM, logical element.

FIG. 73*f* shows the transfer table for the BSM logical element.

Figure 74B:
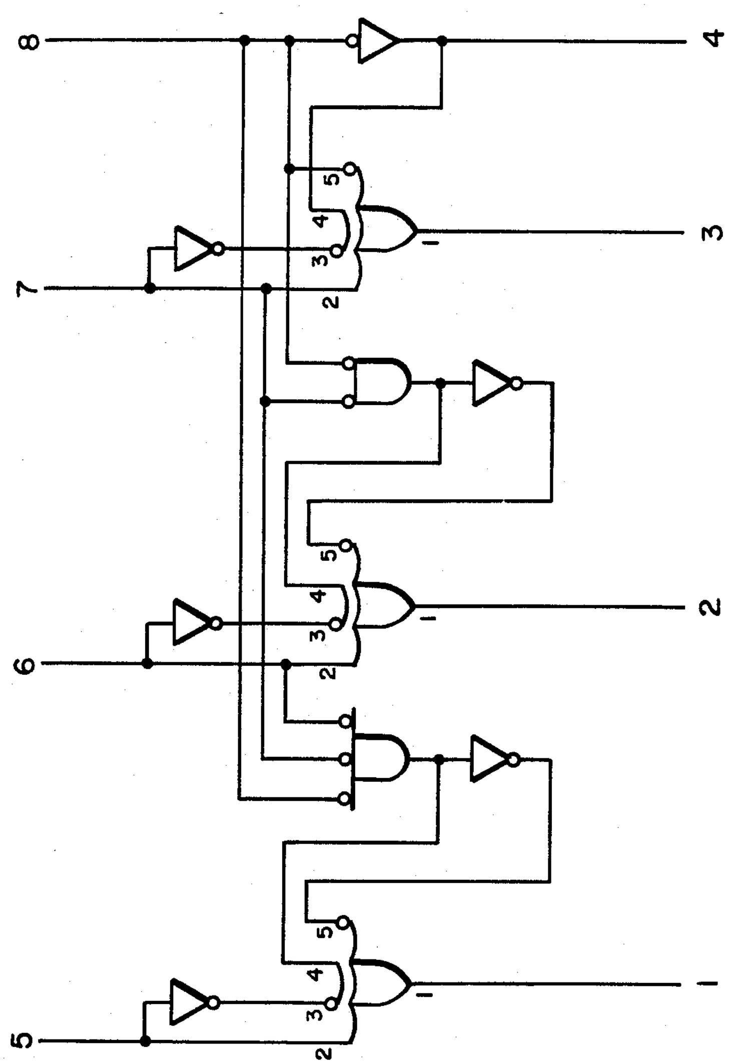
Figure 74A:
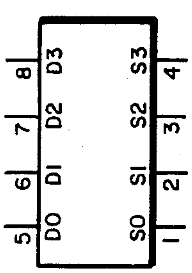

FIG. 74*a* shows the logical representation of the SUBTRACT ONE, SU1 logical element.

Figure 77A:
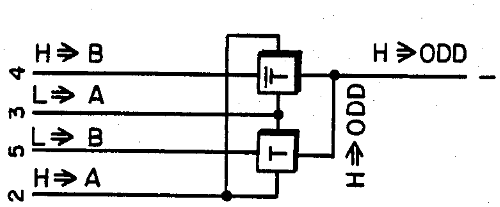
Figure 77B:
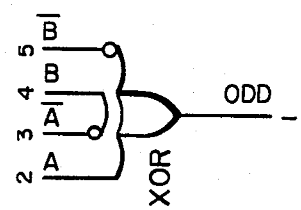

FIG. 7*b* shows the logical structure of the SU1 logical element as constructed from IN1, NO2, NO3, and three XOR elements as are shown in FIG. 77*b*.

Figure 74C:
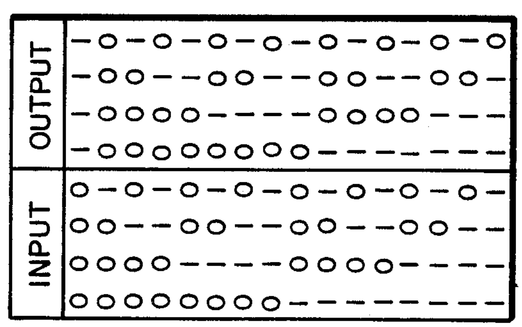

FIG. 74*c* shows a truth table for the SU1 logical element.

Figure 75A:
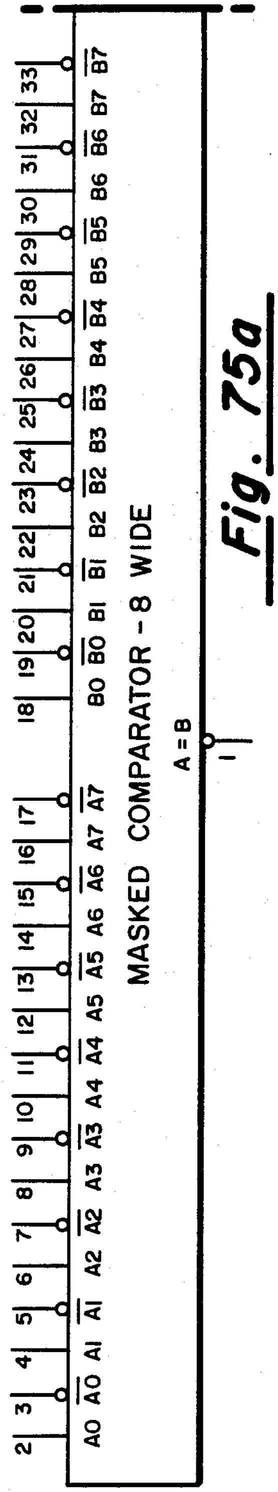
Figure 75C:
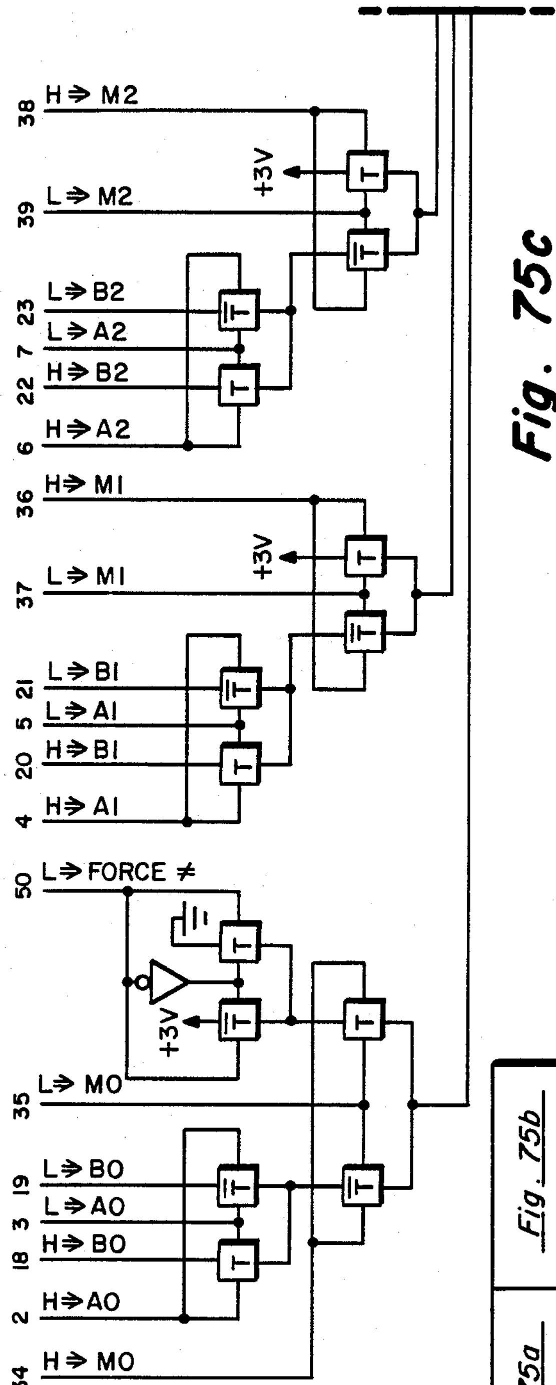
Figure 75:
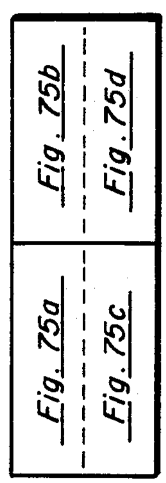
Figure 75B:
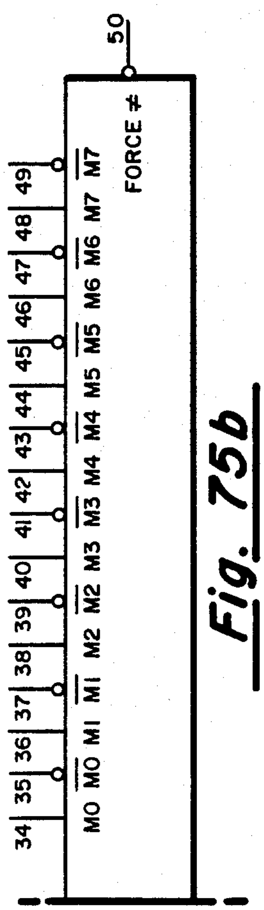

FIG. 75*a* and FIG. 75*b* show the logical representation of the MASKED COMPARATOR-8 WIDE, MC8, logical element.

Figure 75D:
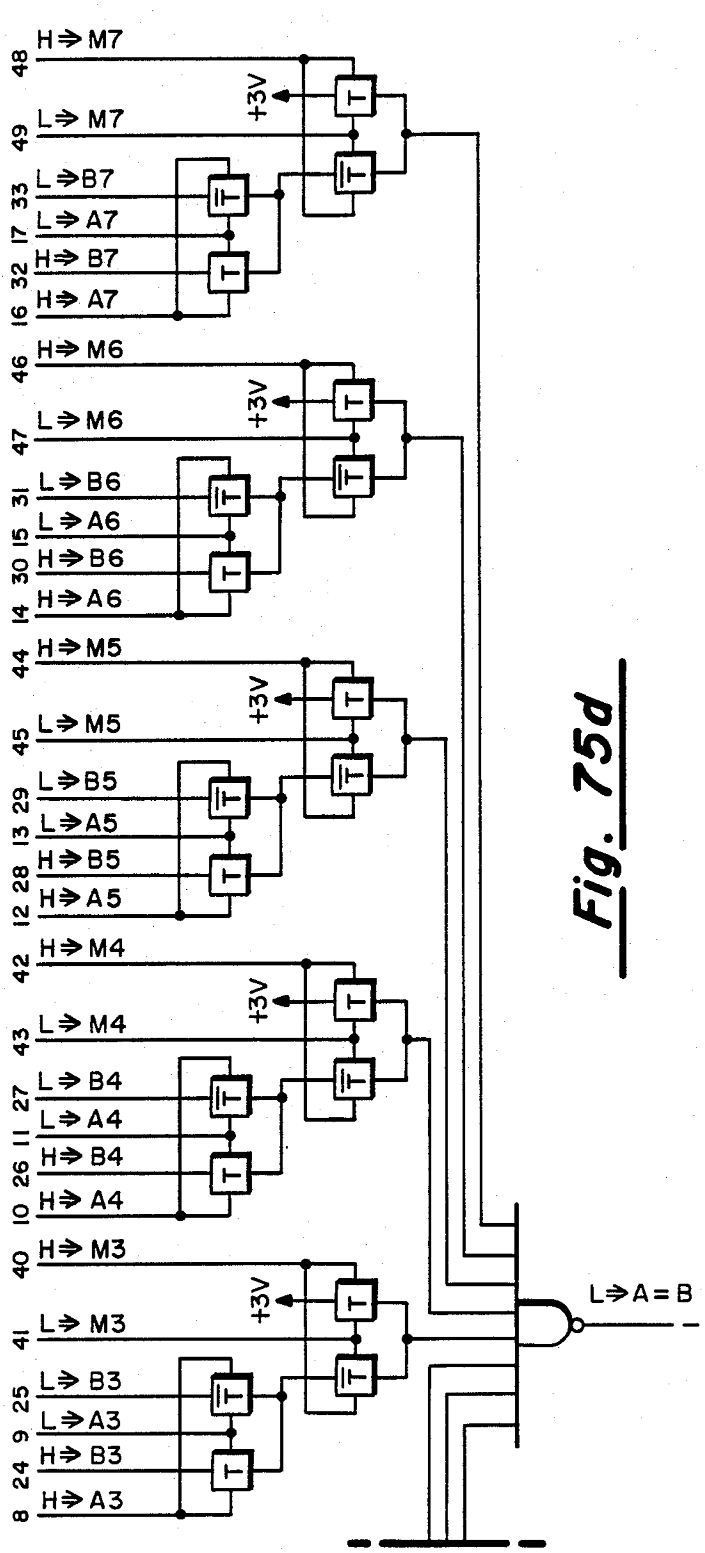

FIG. 75*c* and FIG. 75*d* show the logical structure of the MC8 logical element as constructed from inverters, transfer gates, and an 8 input NAND gate.

Figure 76C:
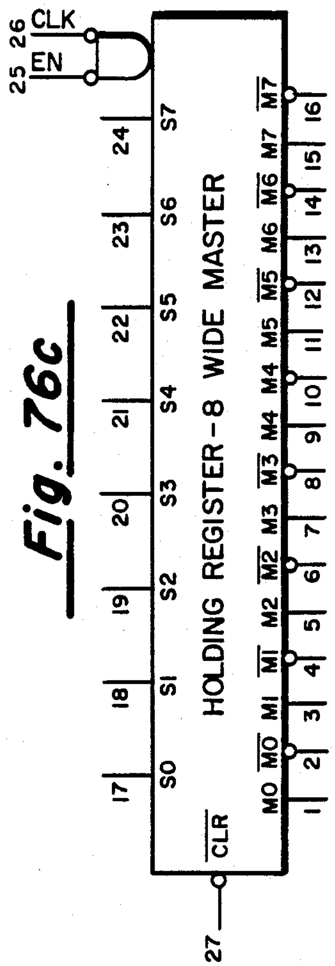
Figure 76:
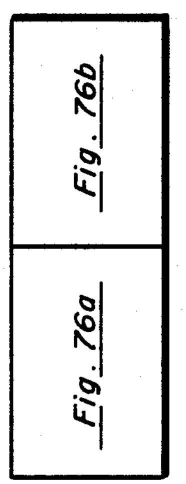
Figure 76A:
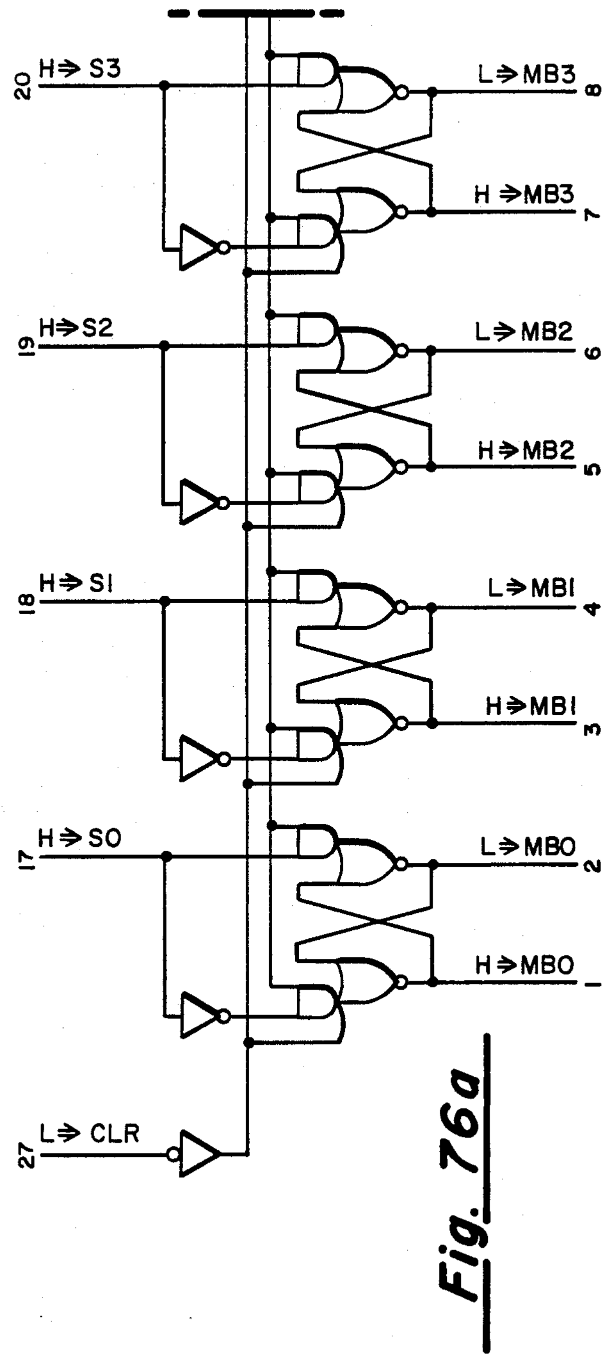
Figures 76B, 76D:
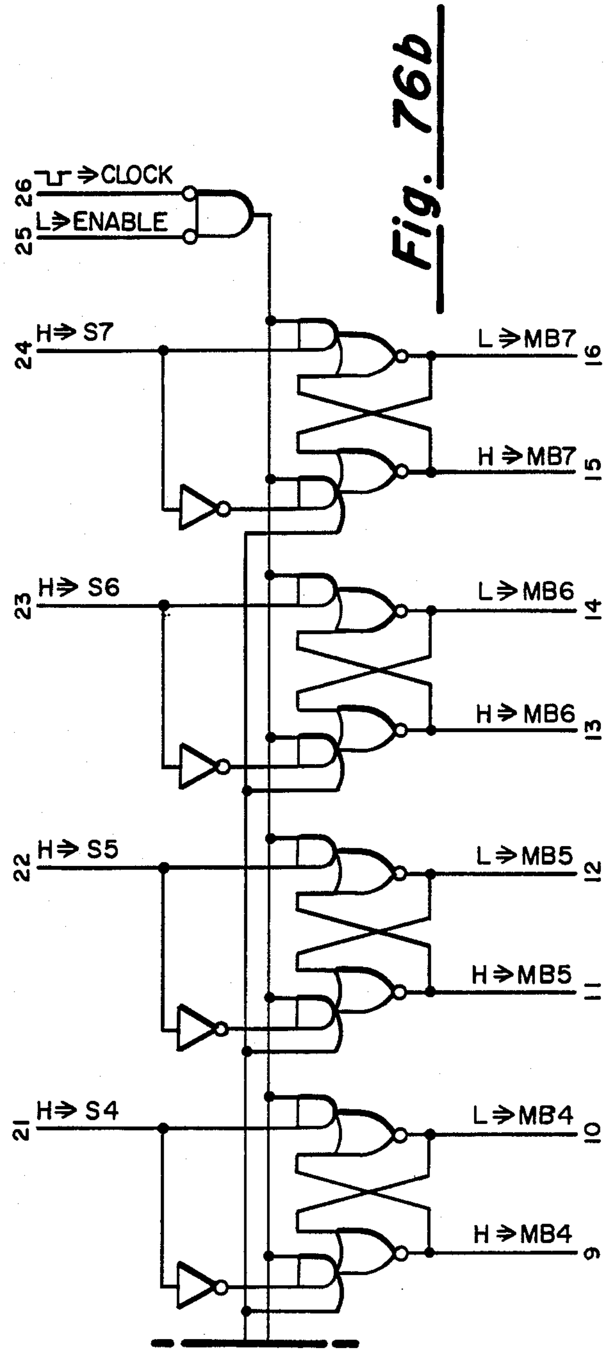

FIG. 76*a* and FIG. 76*b* show the logical structure of the HOLDING REGISTER-8 WIDE MASTER, MR8 logical element as constructed from inverters, AOI 2-1-1, and NO2 logical elements.

FIG. 76*c* shows the logical representation of the HOLDING REGISTER-8 WIDE MASTER, MR8, logical element.

FIG. 76*d* shows the function table for the MR8 logical element.

FIG. 77*a* shows the logical structure of the EXCLUSIVE OR, XOR logical element as implemented in transfer gates.

FIG. 77*b* shows the logical representation of the EXCLUSIVE OR, XOR logical element.

Figure 78A:
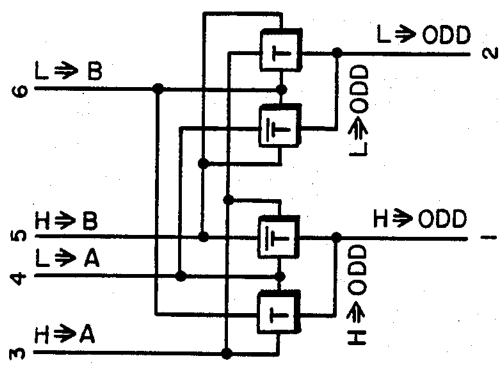

FIG. 78*a* shows the logical structure of the PARITY GENERATOR-2 INPUT, PG2, logical element as implemented in transfer gates.

Figure 78B:
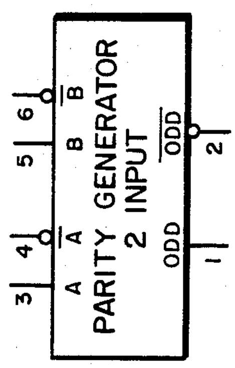

FIG. 78*b* shows the logical representation of the PARITY GENERATOR-2 INPUT, PG2, logical element.

Figure 79A:
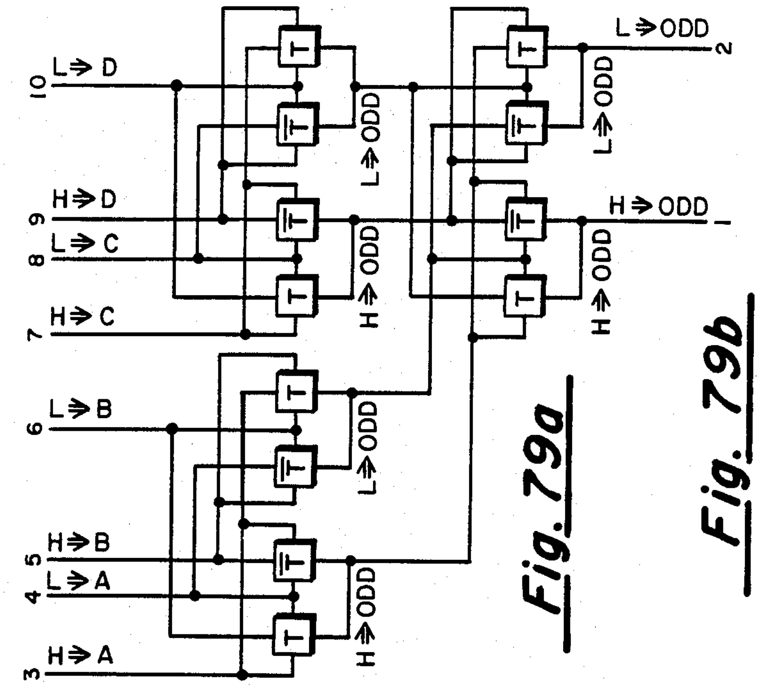

FIG. 79*a* shows the logical structure of the PARITY GENERATOR-4 INPUT, PG4, logical element as implemented in transfer gates.

Figure 79B:
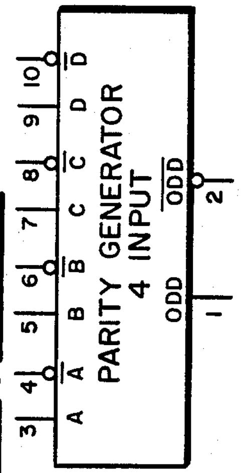

FIG. 79*b* shows the logical representation of the PARITY GENERATOR-4 INPUT, PG4, logical element.

Figures 80A, 80B:
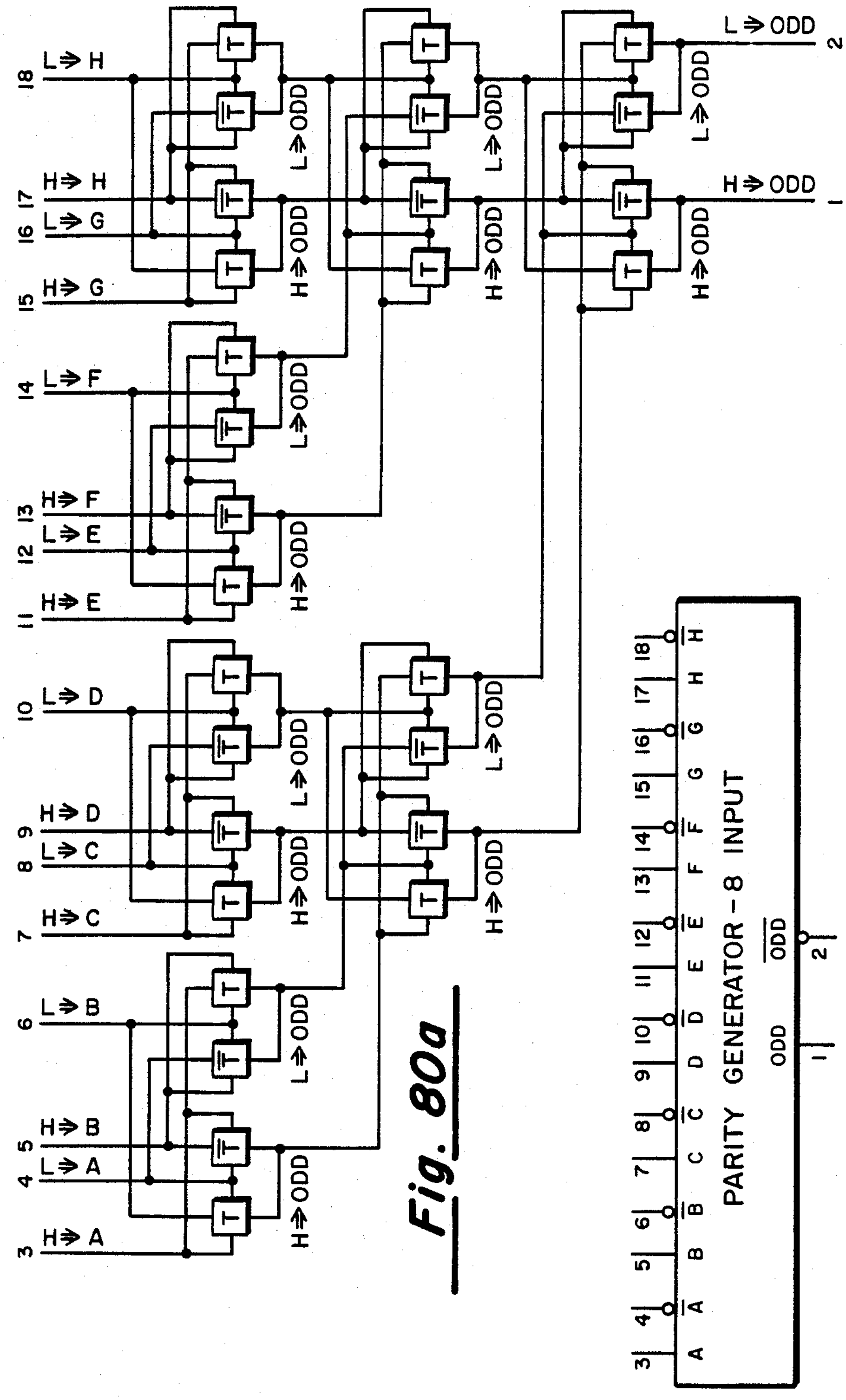

FIG. 80*a* shows the logical structure of the PARITY GENERATOR-8 INPUT, PG8, logical element as implemented in transfer gates.

FIG. 80*b* shows the logical representation of the PARITY GENERATOR-8 INPUT, PG8, logical element.

Figure 81C:
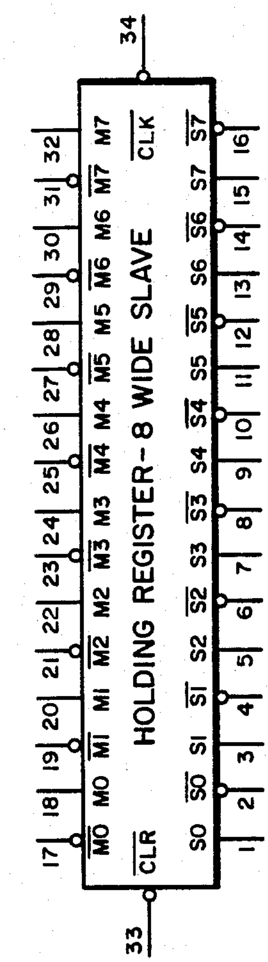
Figure 81:
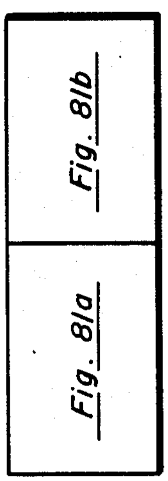
Figure 81A:
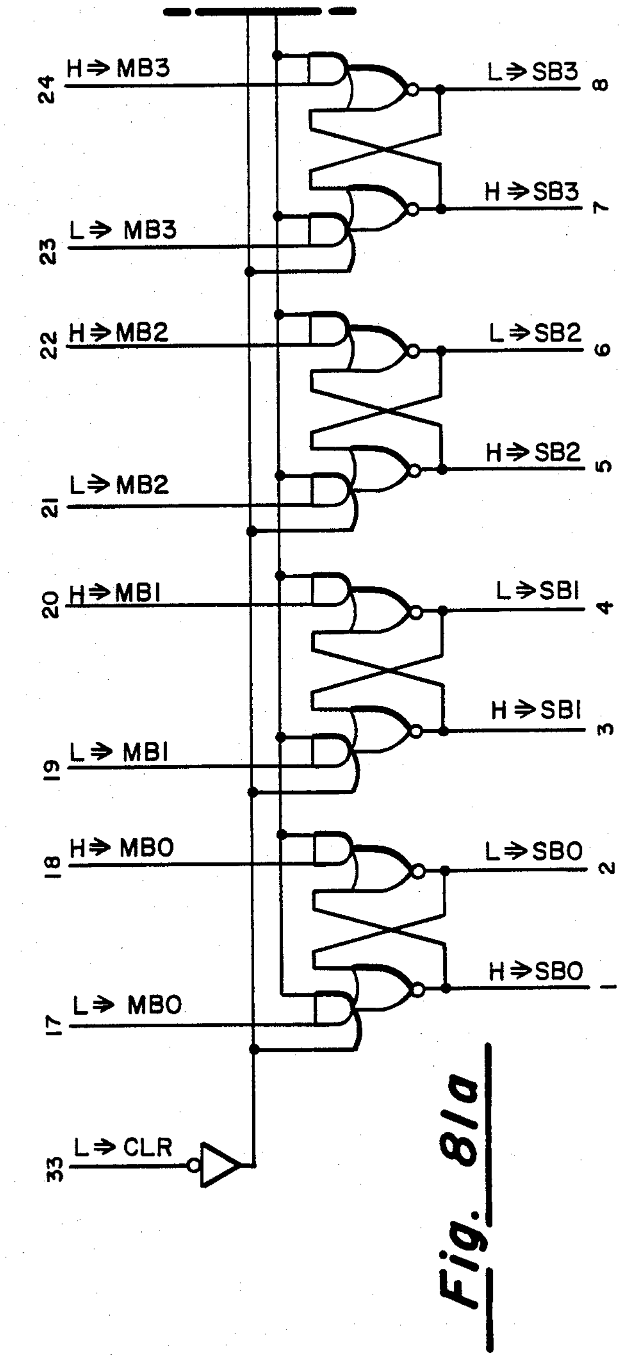
Figures 81B, 81D:
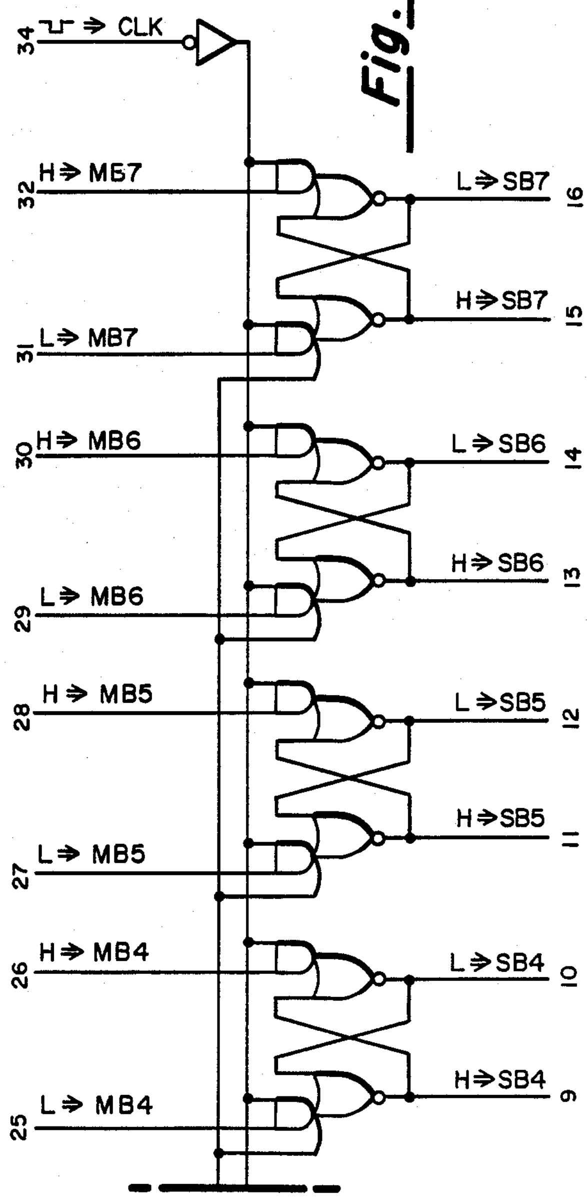

FIG. 81*a* and FIG. 81*b* show the logical structure of the HOLDING REGISTER-8 WIDE SLAVE, SR8, logical element as implemented from AOI 2-1-1 and IN1 logical elements.

FIG. 81*c* shows the logical representation of the HOLDING REGISTER-8 WIDE SLAVE, SR8, logical element.

FIG. **81*d*** shows the function table for the SR8 logical element.

Figure 82:
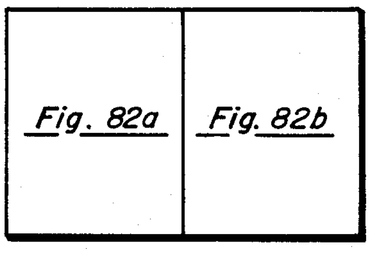
Figure 82A:
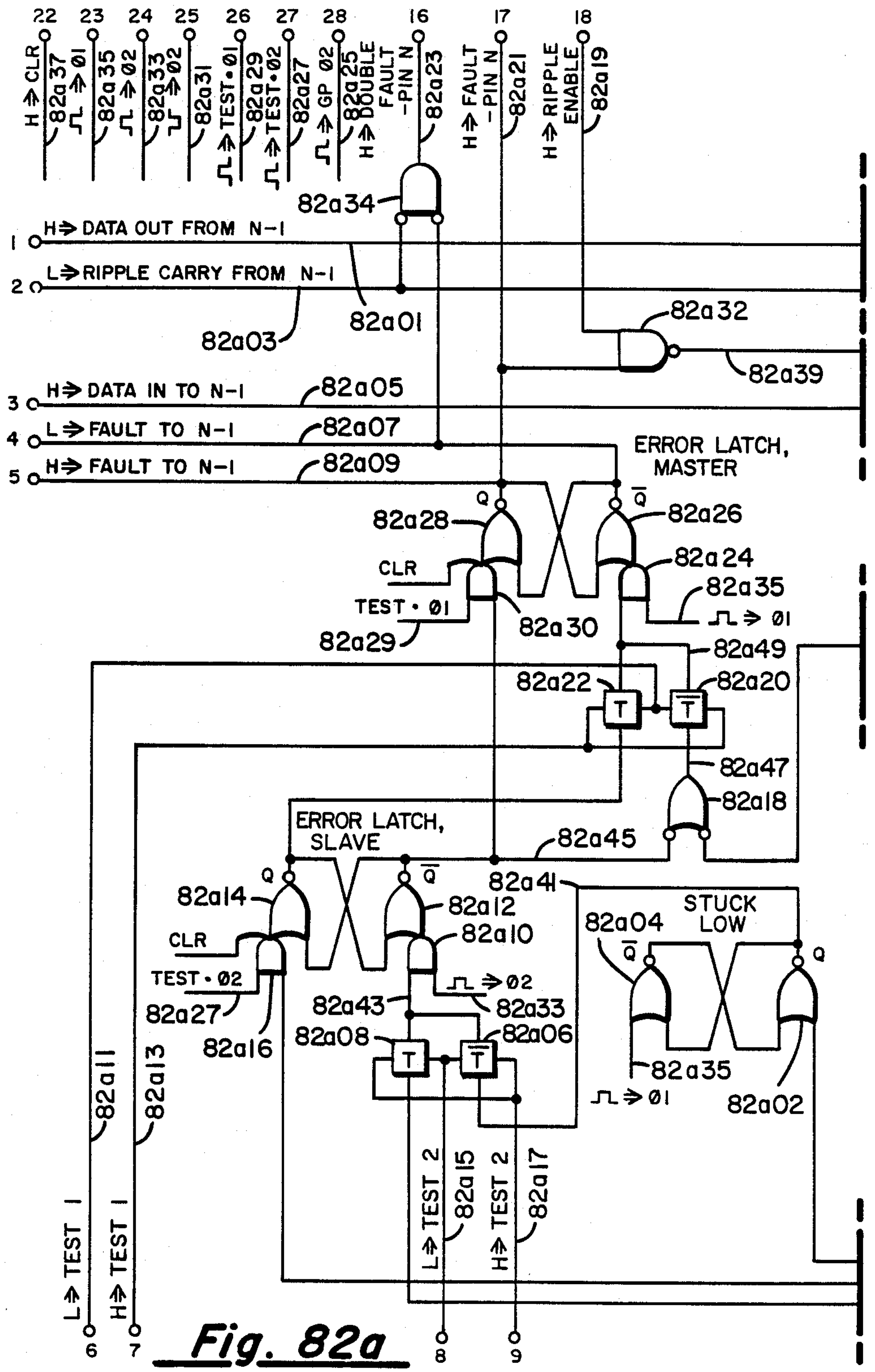
Figure 82B:
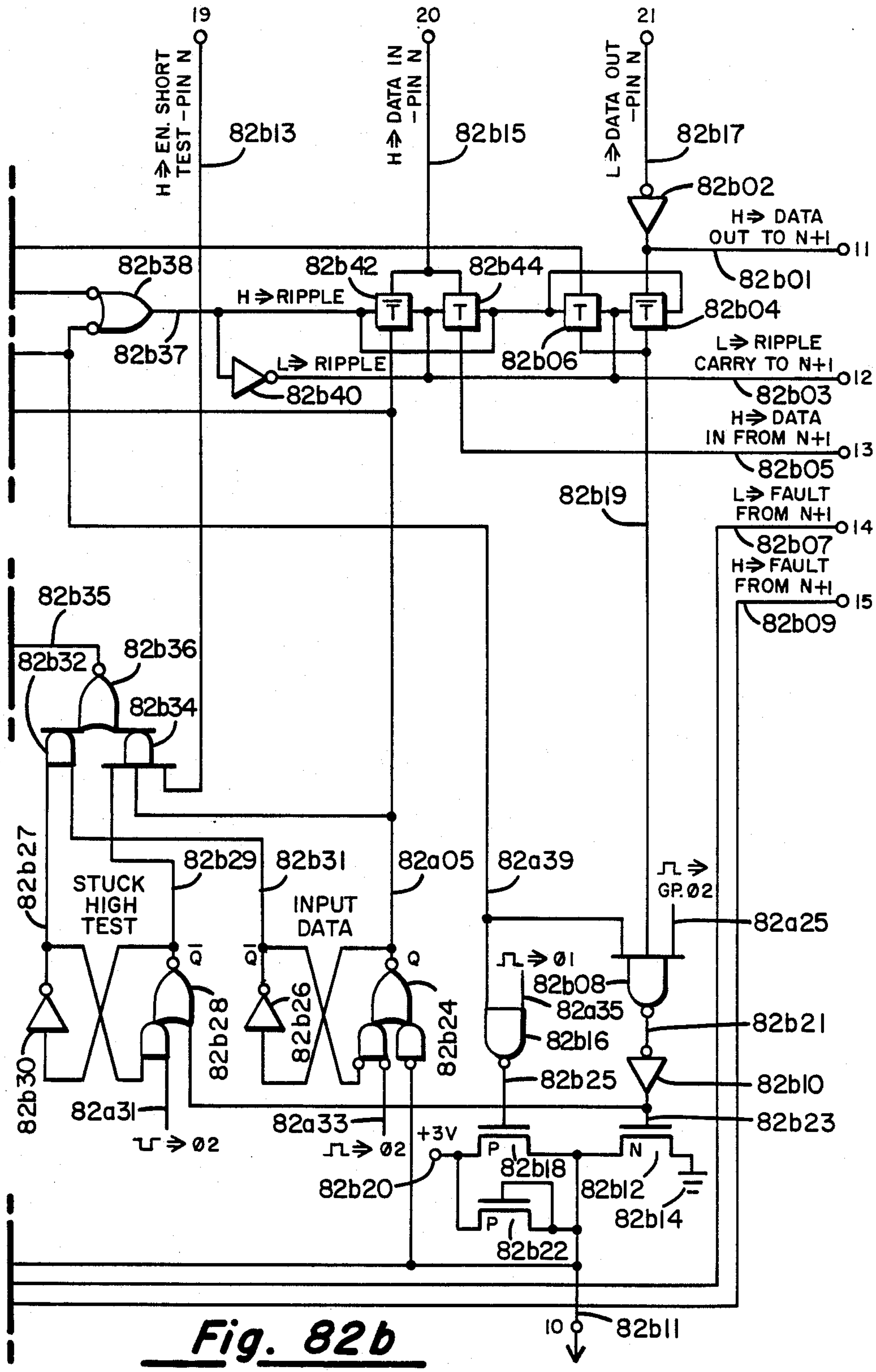

FIG. **82*a* and FIG. 82*b*** show the logical structure of the DRIVER/RECEIVER, DR1, logical element.

FIG. **83*a* shows an extracted, detailed view of that portion of the Versatile Bus DRIVER/RECEIVER circuit of FIG. 82** which accomplishes two phase wired-OR communication.

Figure 83A:
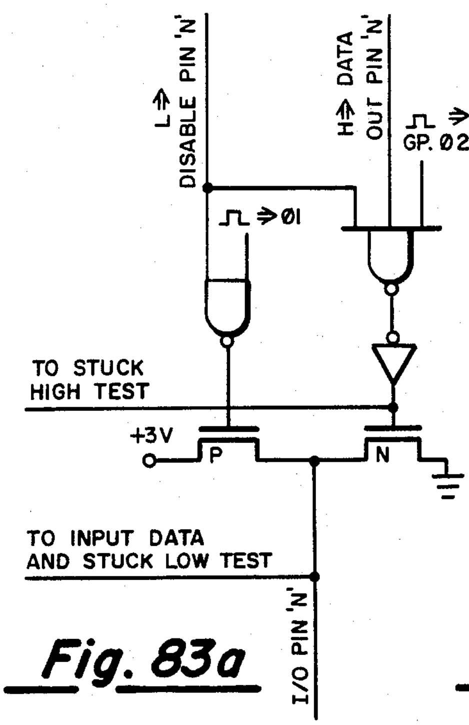
Figure 83B:
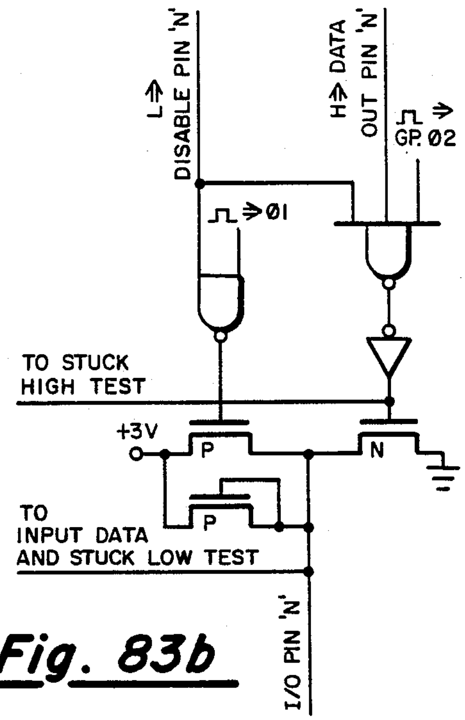

FIG. **83*b* shows a minor variant of the circuit of FIG. 83*a*.**

Figure 84:
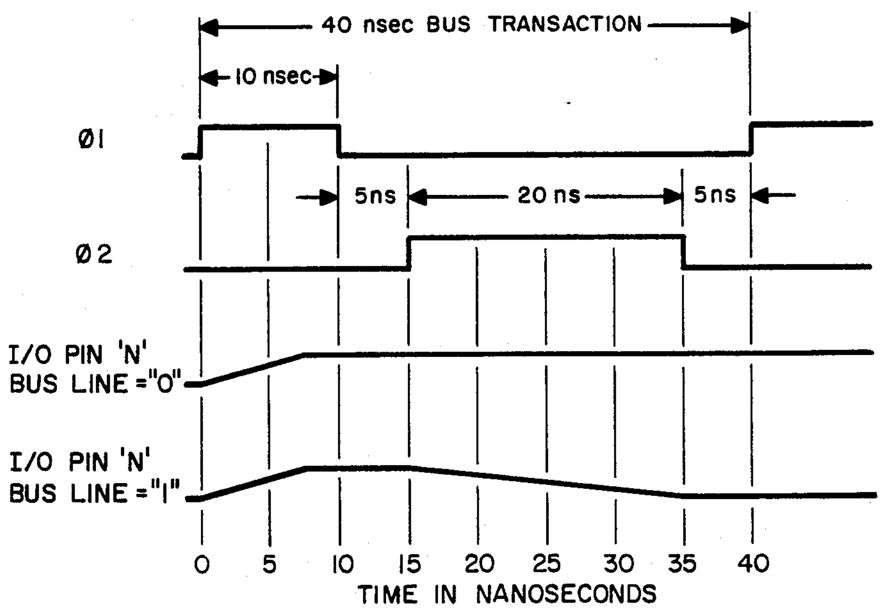

FIG. 84 shows the standard Versatile Bus timing and electrical protocol as is effectuated by the DRIVER/-RECEIVER circuit of FIG. 82.

FIG. **85*a* through FIG. 85*c*** shows a table cross-referencing the functional section and functional subsections of the preferred embodiment of the invention to the mnemomics utilized in the Figures, and also to the Figure numbers.

Figure 86:
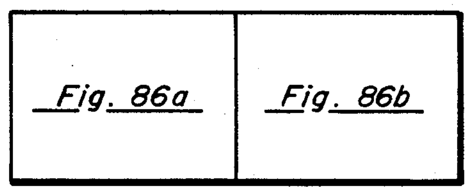
Figure 86A:
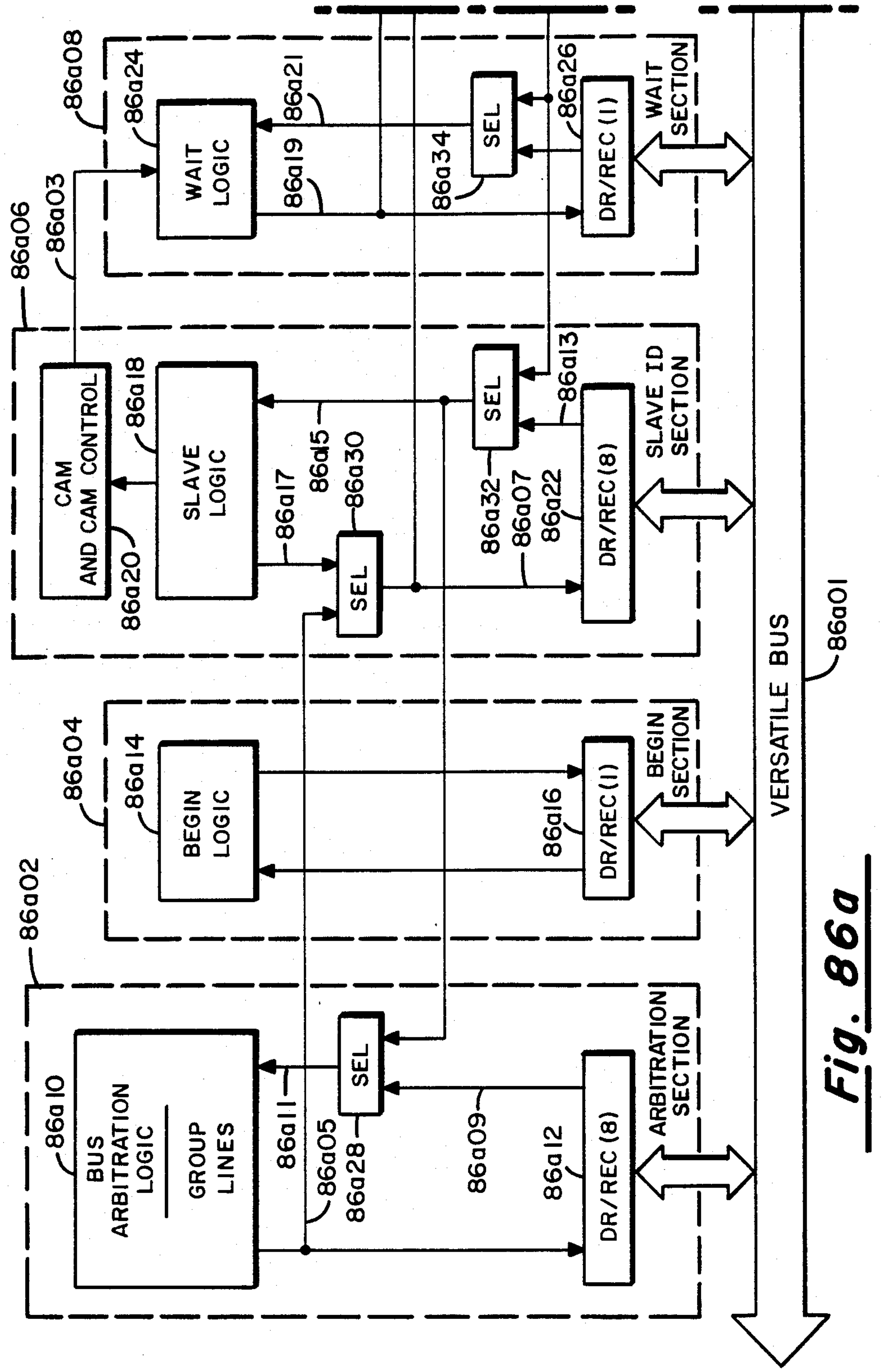
Figure 86B:
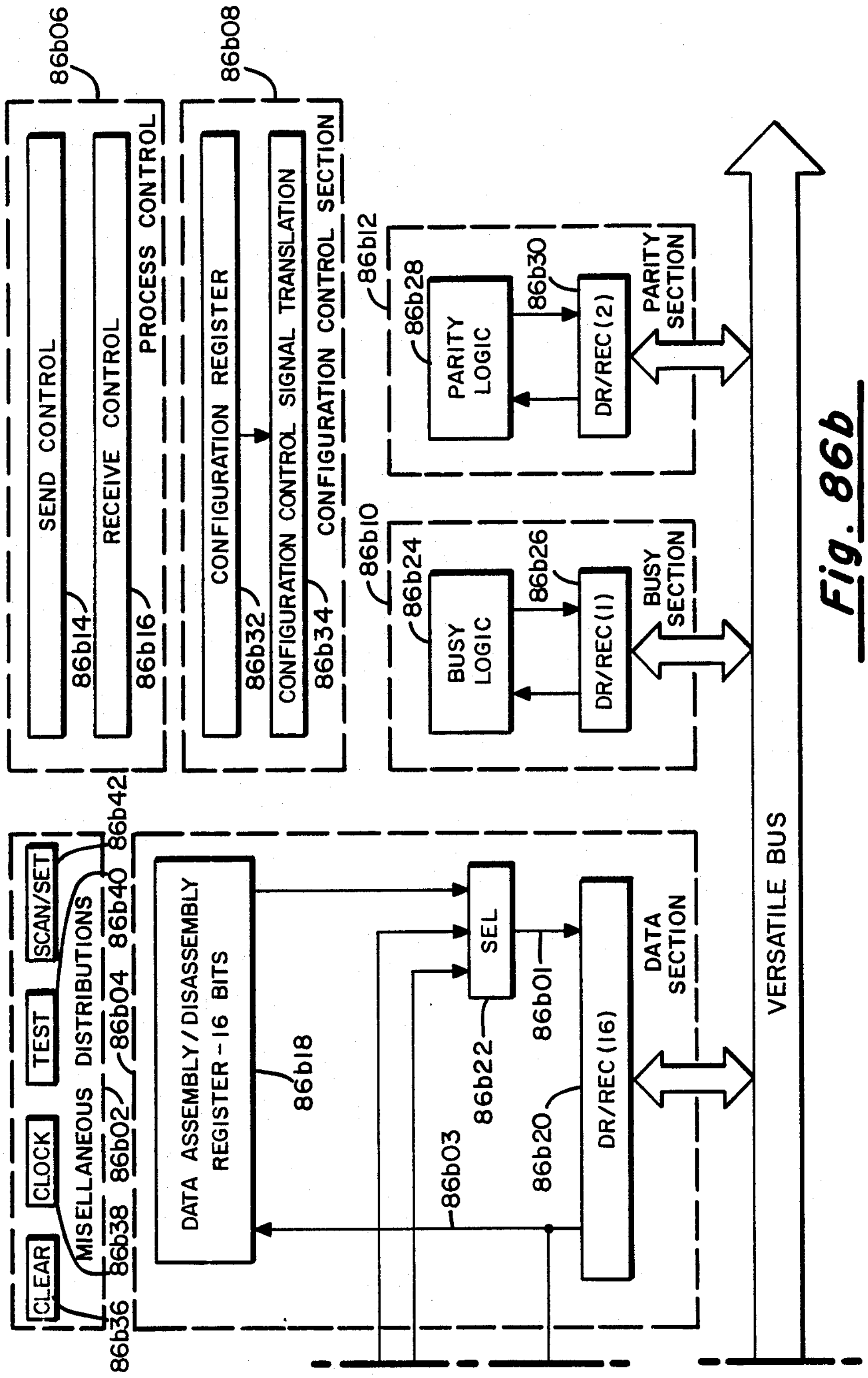

FIG. **86*a* and FIG. 86*b*** show a first level block diagram of the Versatile Bus.

Figure 87:
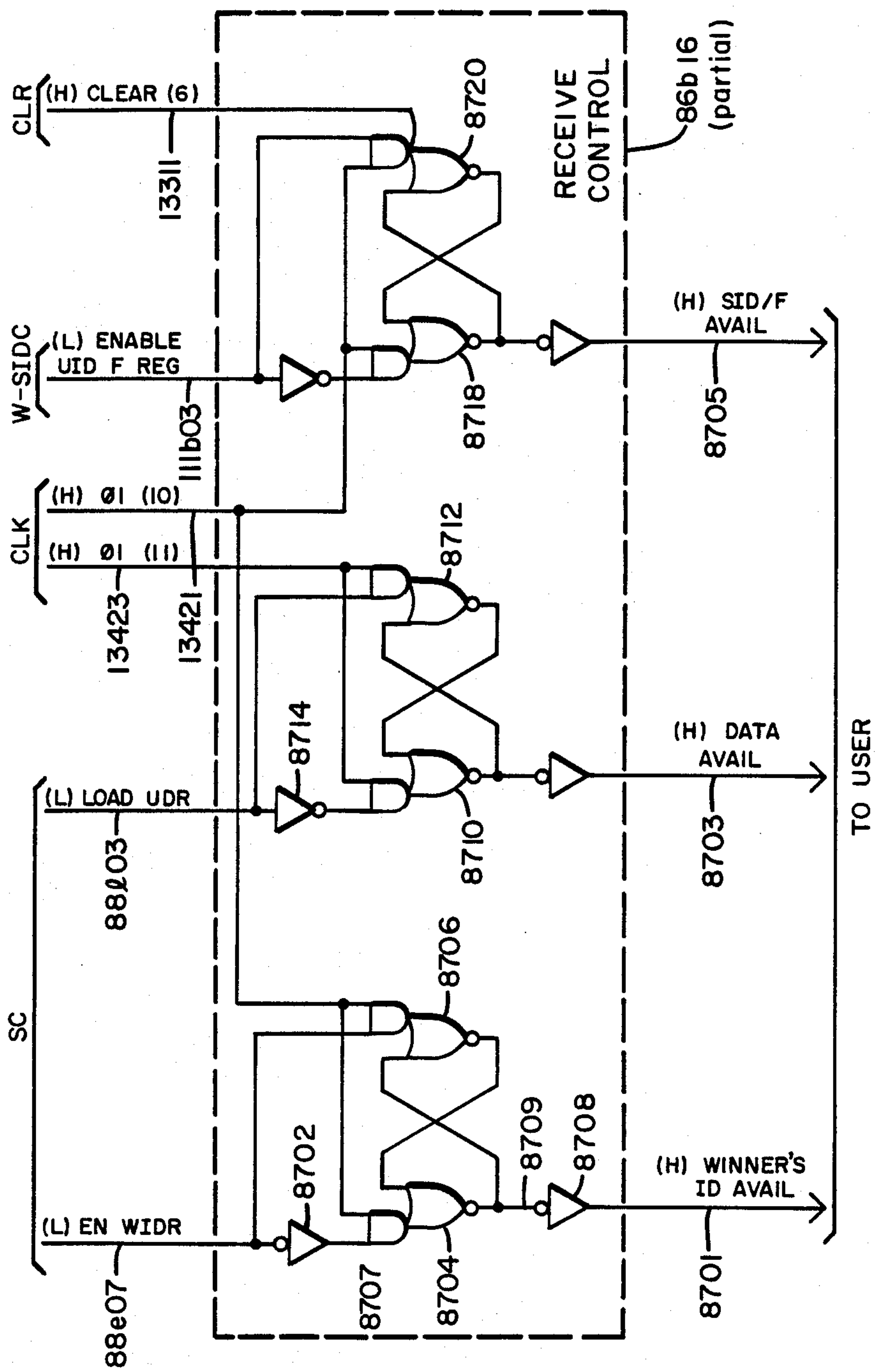

FIG. 87 shows a logic diagram of part of the Receive Control functional subsection of the Receive Control functional section.

FIGS. **88*a* through 88*l*** show a logic diagram of the Send Control functional subsection of the Send Control functional subsection.

Figure 89:
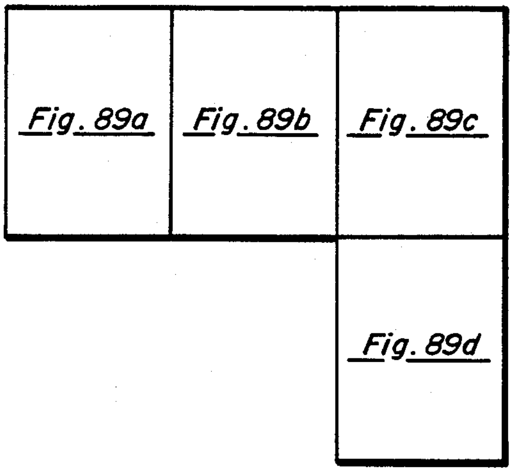
Figure 89A:
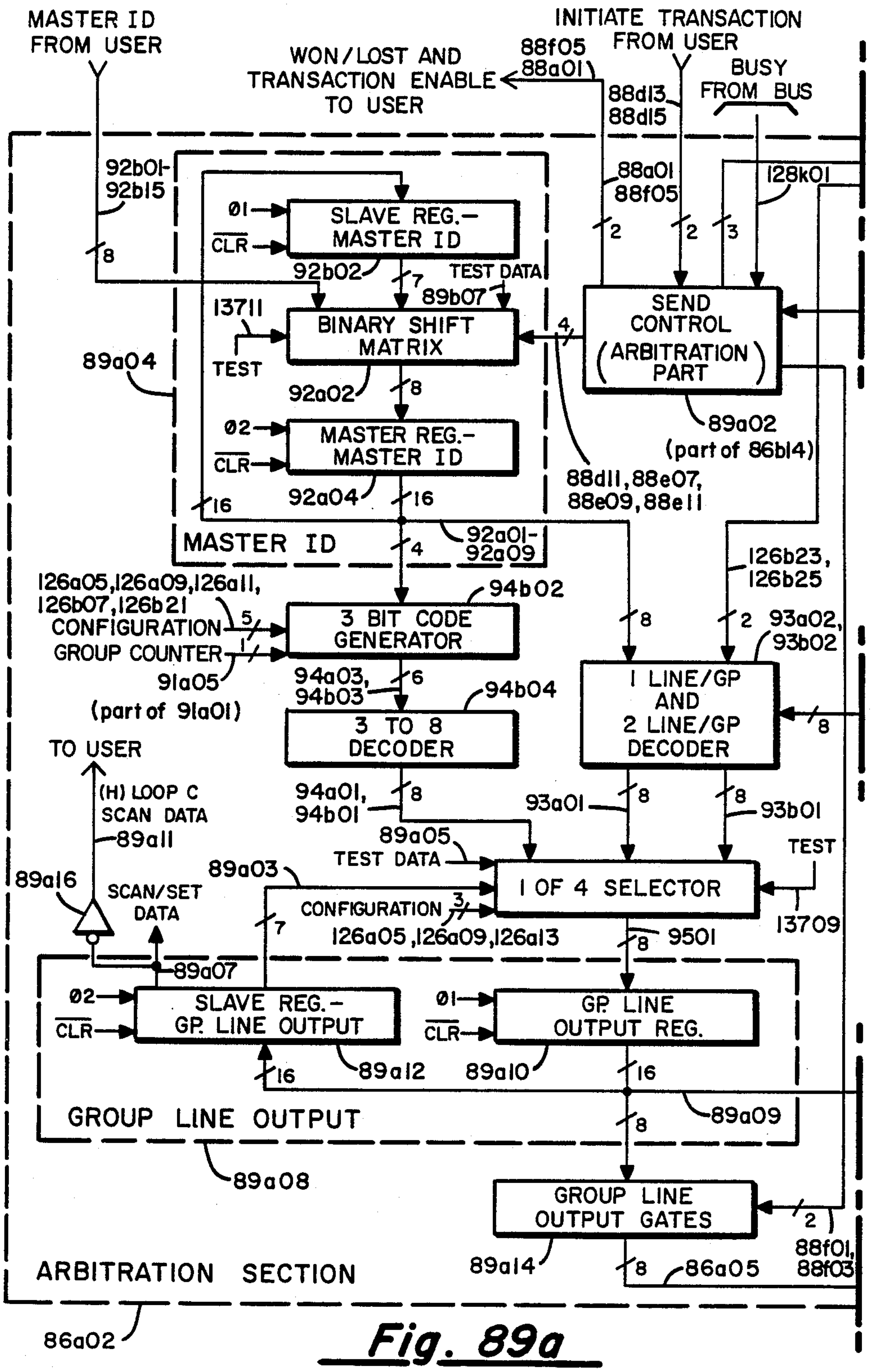
Figure 89B:
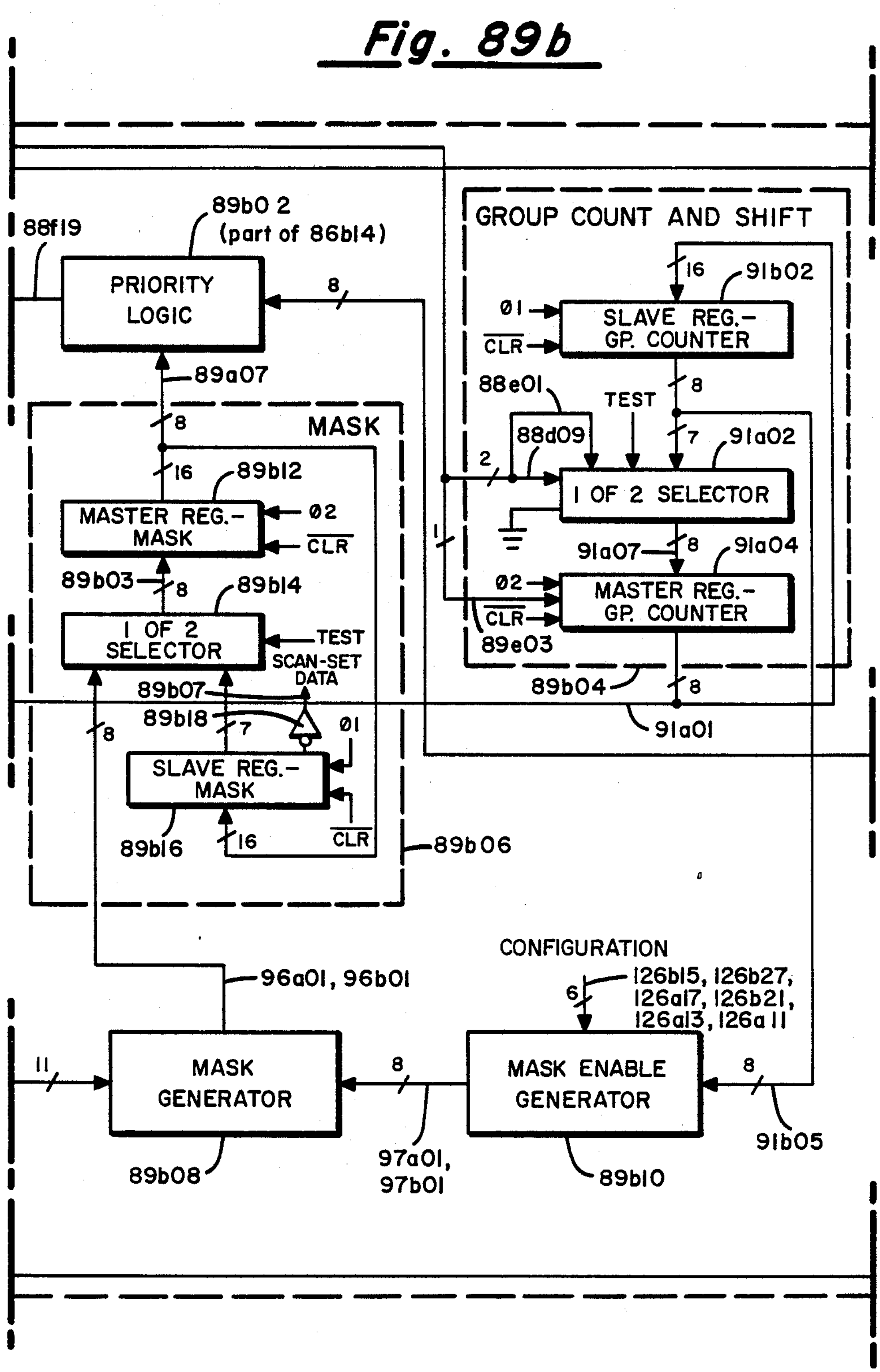
Figure 89C:
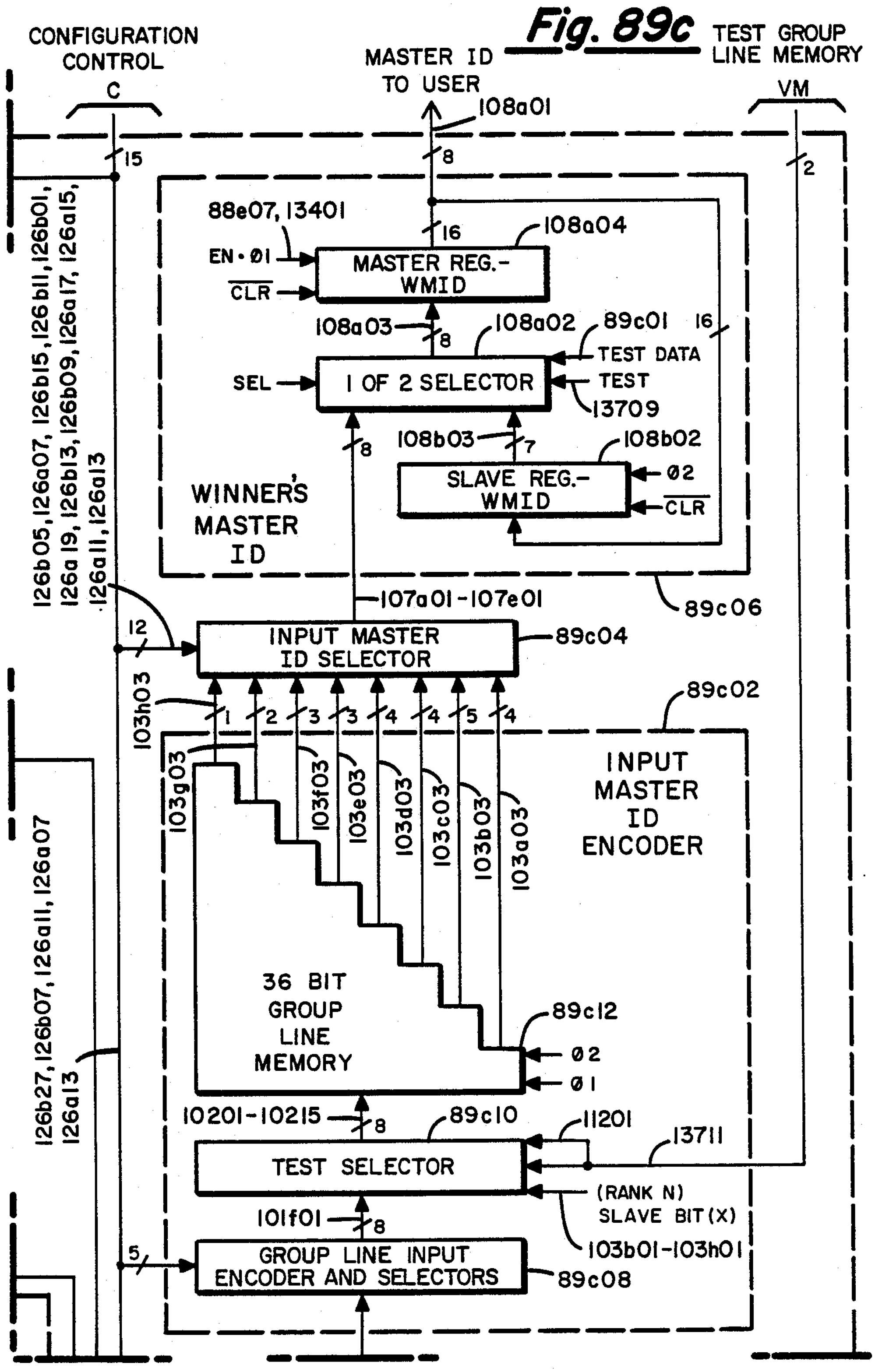
Figure 89D:
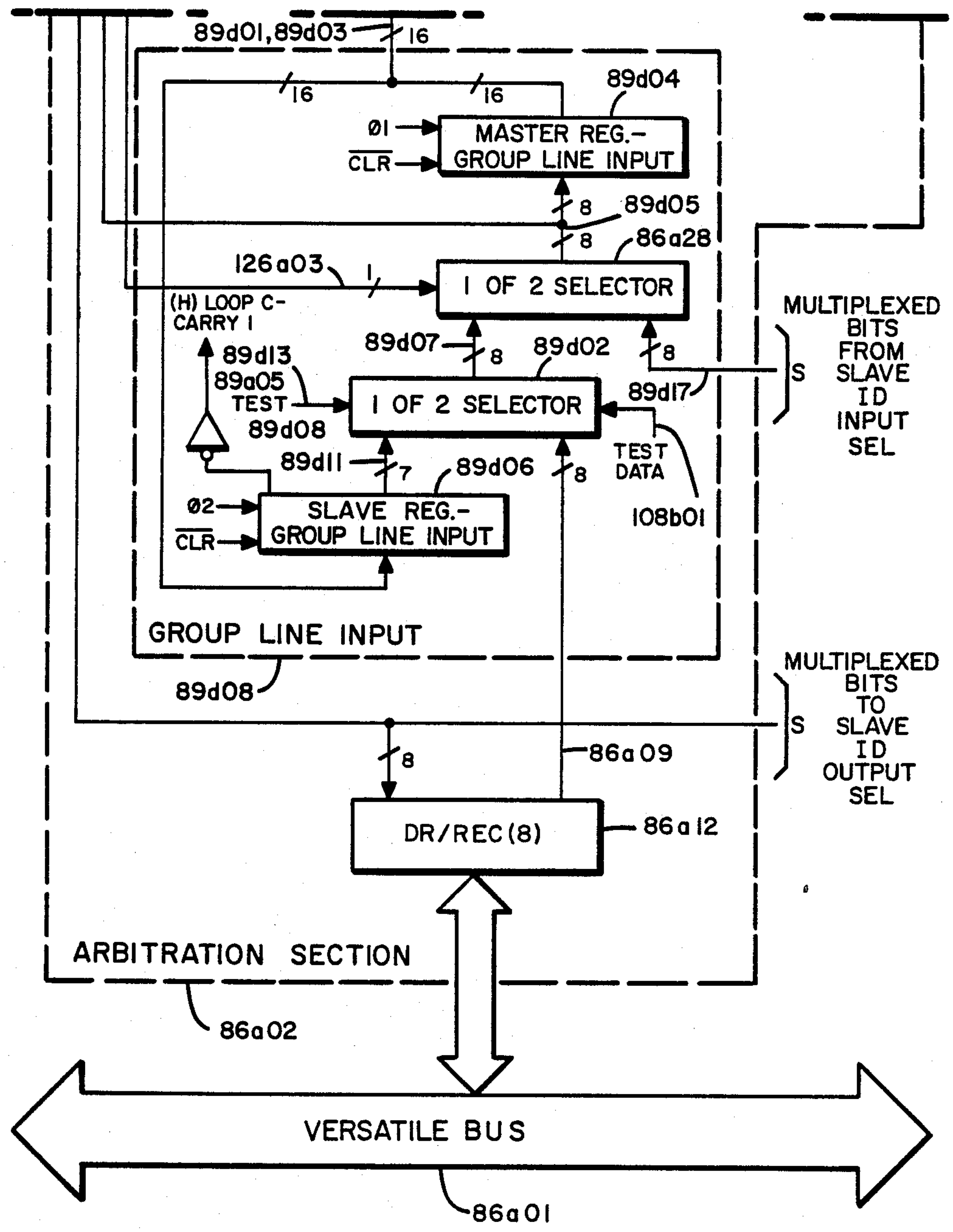

FIG. **89*a* through FIG. 89*d*** show a second level block diagram of the Arbitration section of the Versatile Bus.

Figure 90:
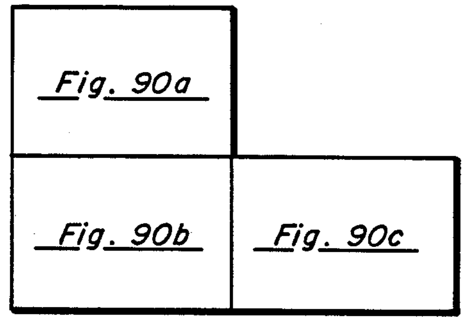
Figure 90A:
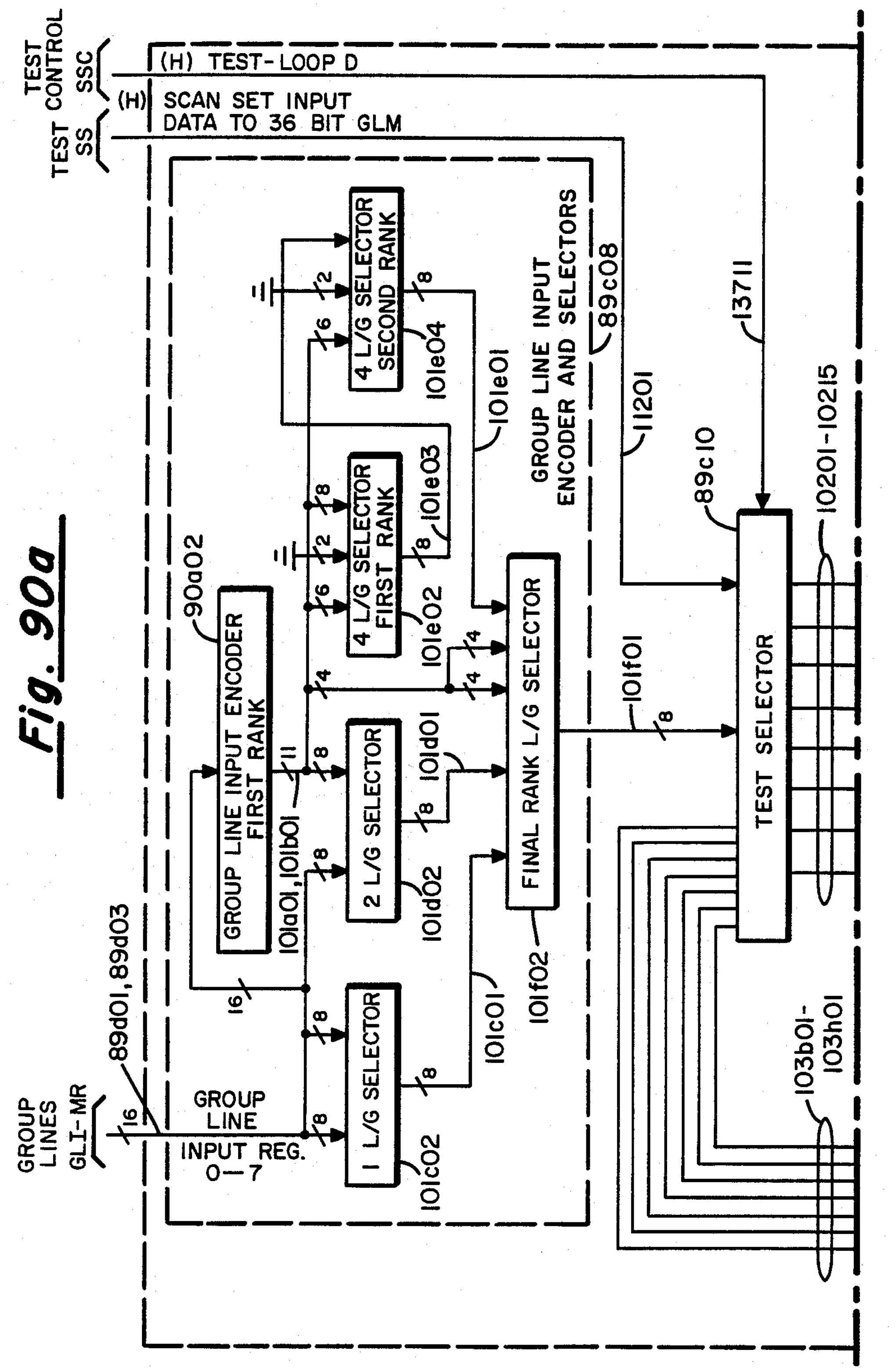
Figure 90B:
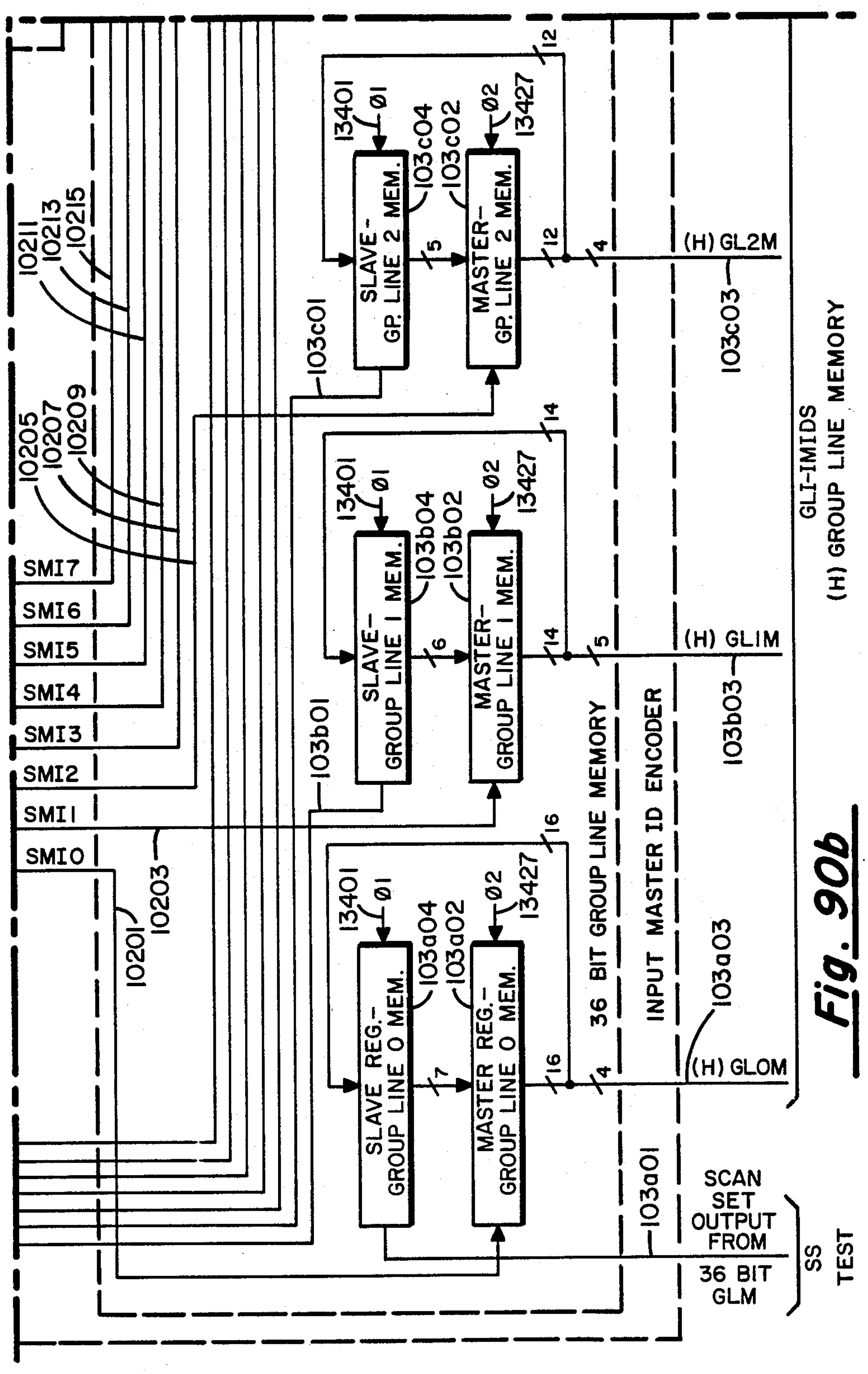
Figure 90C:
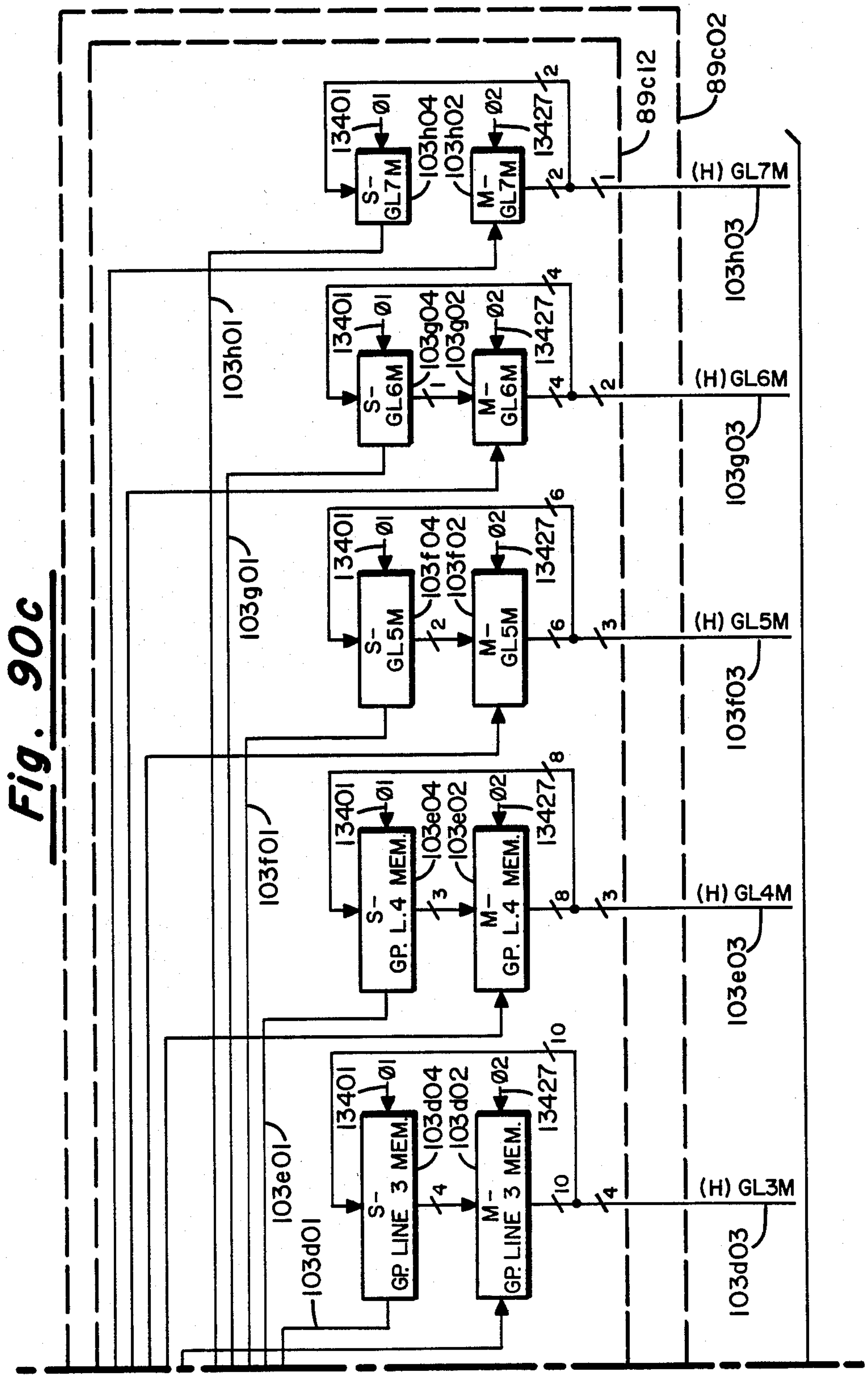

FIG. **90*a* through FIG. 90*c*** show a third level block diagram of the Input Master ID Encoder subsection of the Arbitration section of the Versatile Bus.

FIGS. **91*a* and 91*b*** show a logic diagram of the Group Count and Shift functional subsection of the Arbitration functional section.

Figure 92:
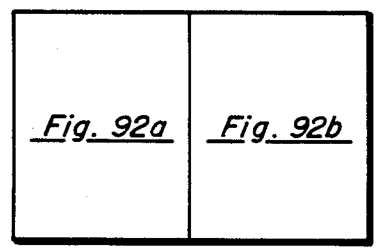
Figure 92A:
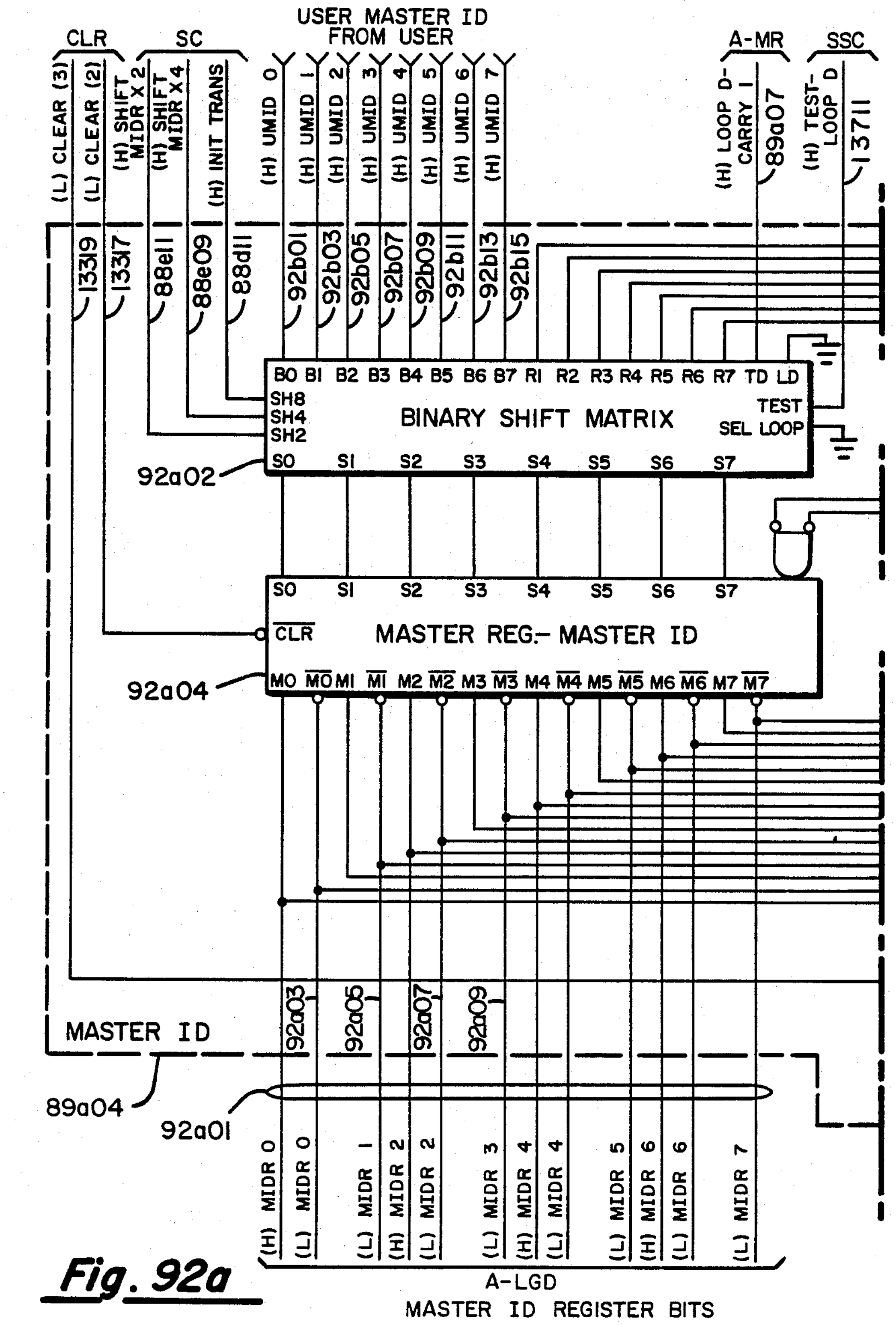
Figure 92B:
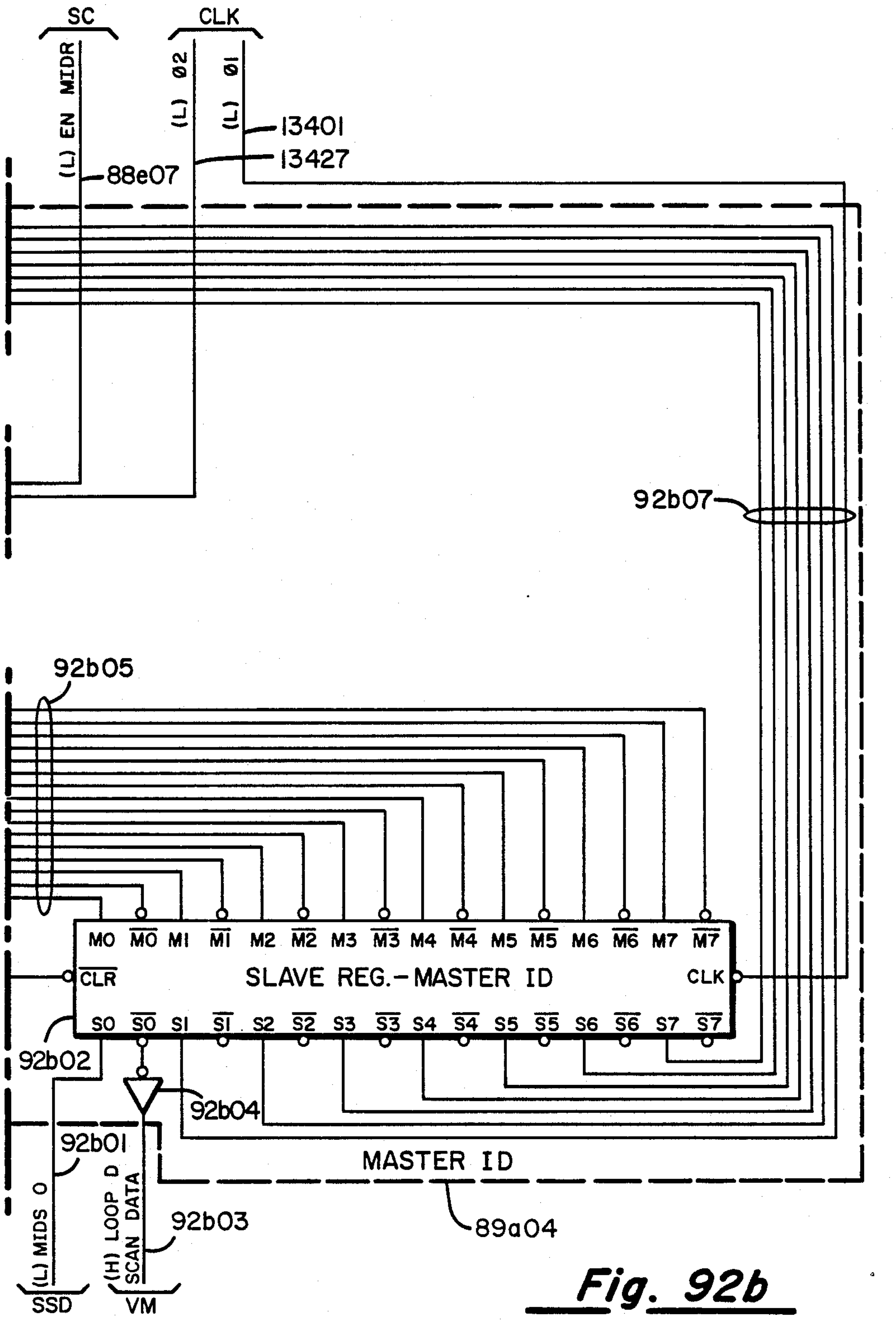

FIG. **92*a* and FIG. 92*b*** show a logic diagram of the Master ID Register functional subsection of the Arbitration functional section.

Figure 93:
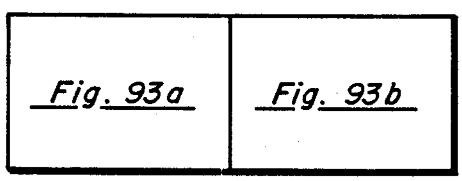
Figure 93A:
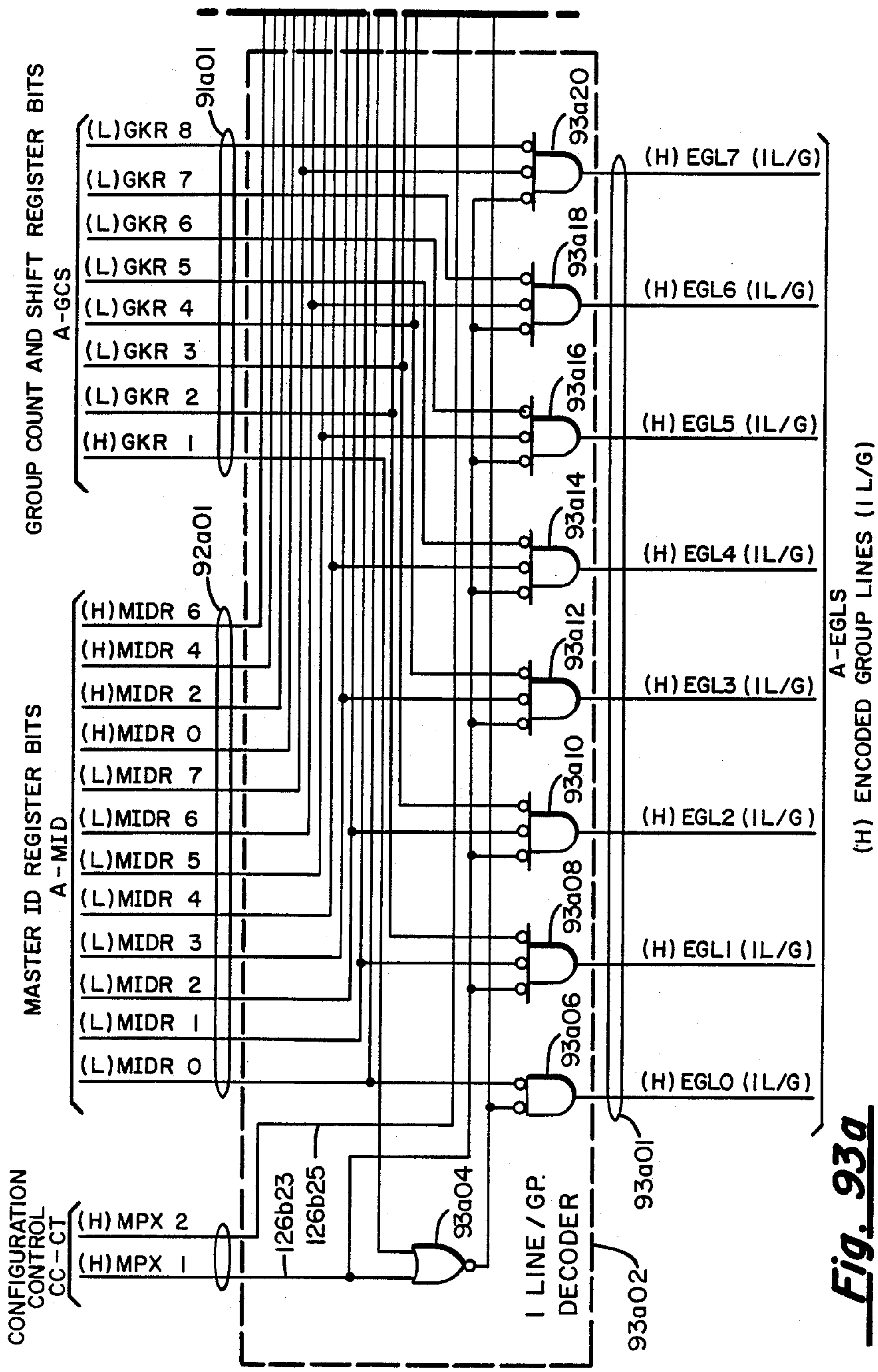
Figure 93B:
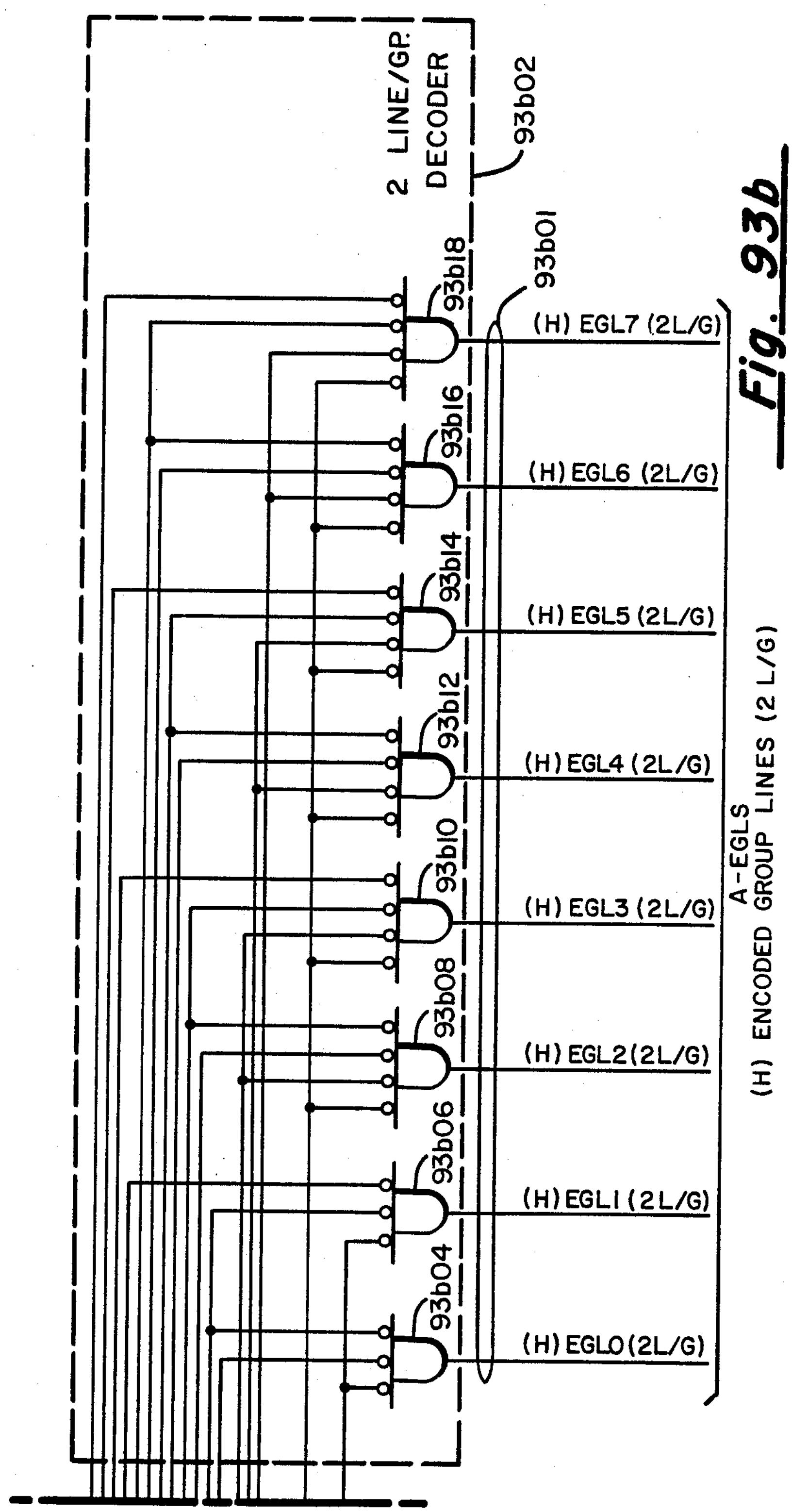

FIG. **93*a* and FIG. 93*b*** show a logic diagram of the respective 1 Line/GP and 2 Line/GP Decoder functional subsections of the Arbitration functional section.

FIGS. **94*a* and 94*b*** show a logic diagram of the 3 Bit Code Generator and 3 to 8 Decoder functional subsections of the Arbitration functional section.

Figure 95:
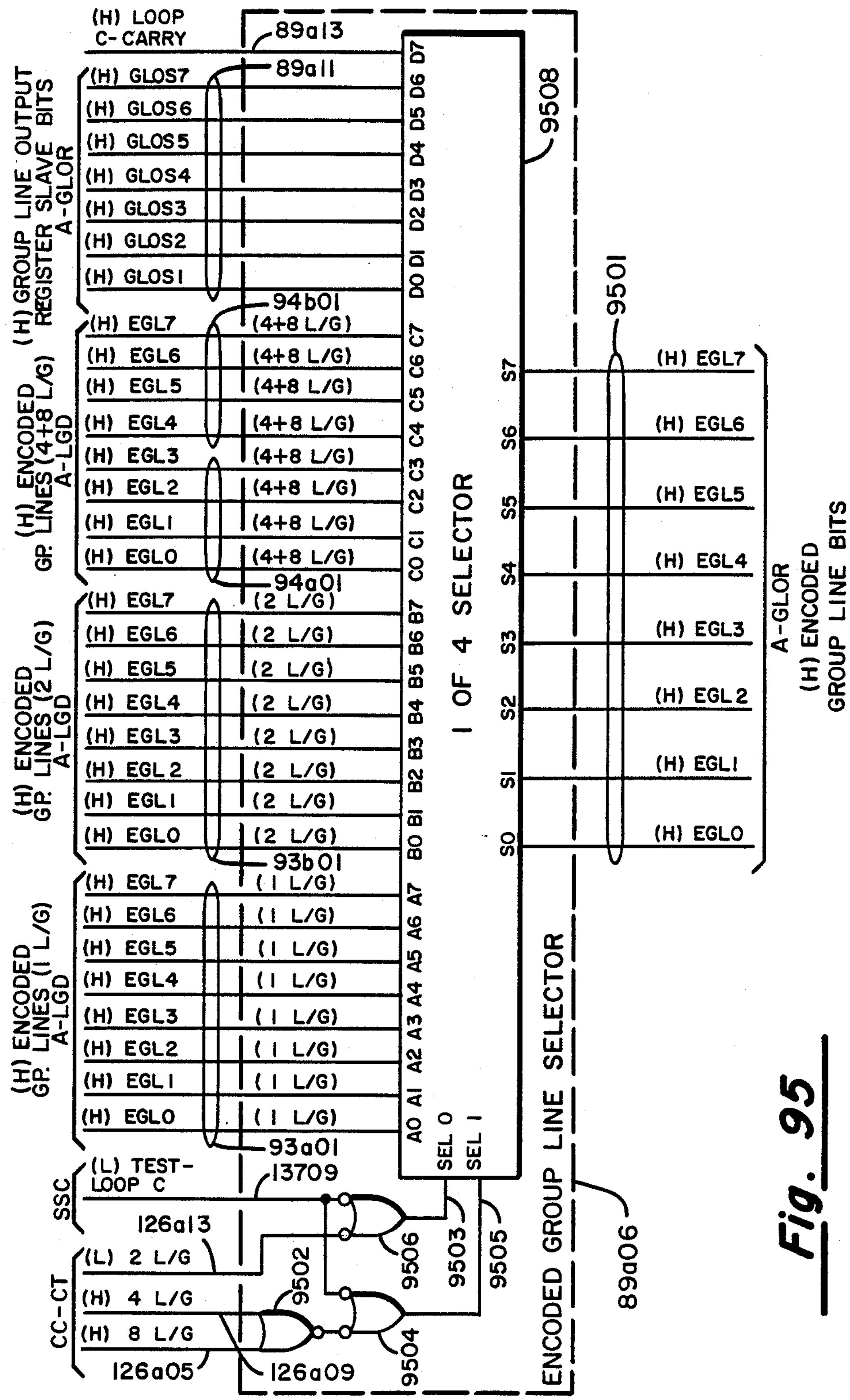

FIG. 95 shows a logic diagram of the Encoded Group Lines Selector functional subsection of the Arbitration functional section.

Figure 96:
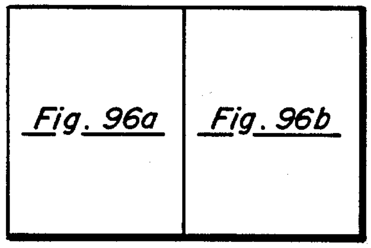
Figure 96A:
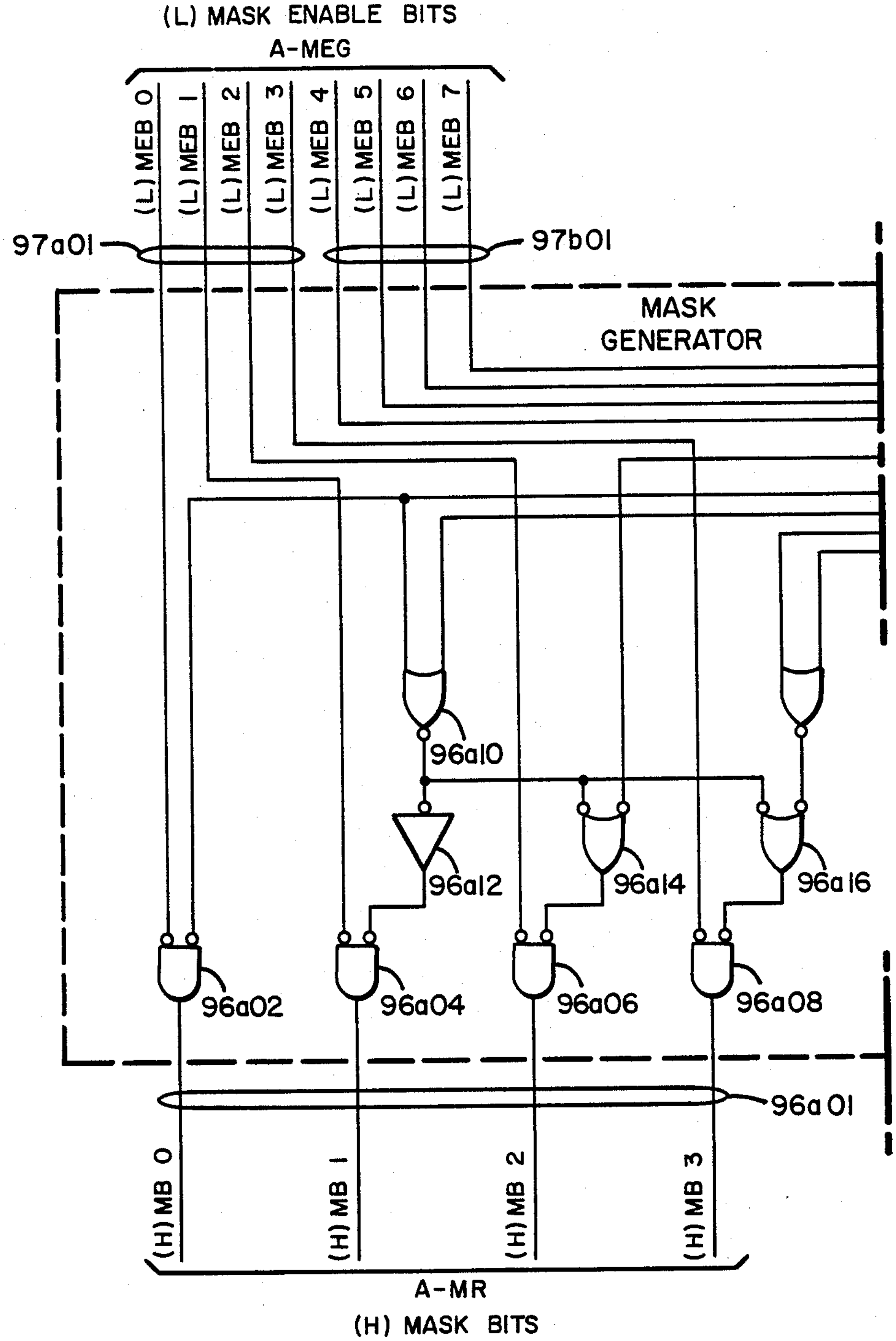
Figure 96B:
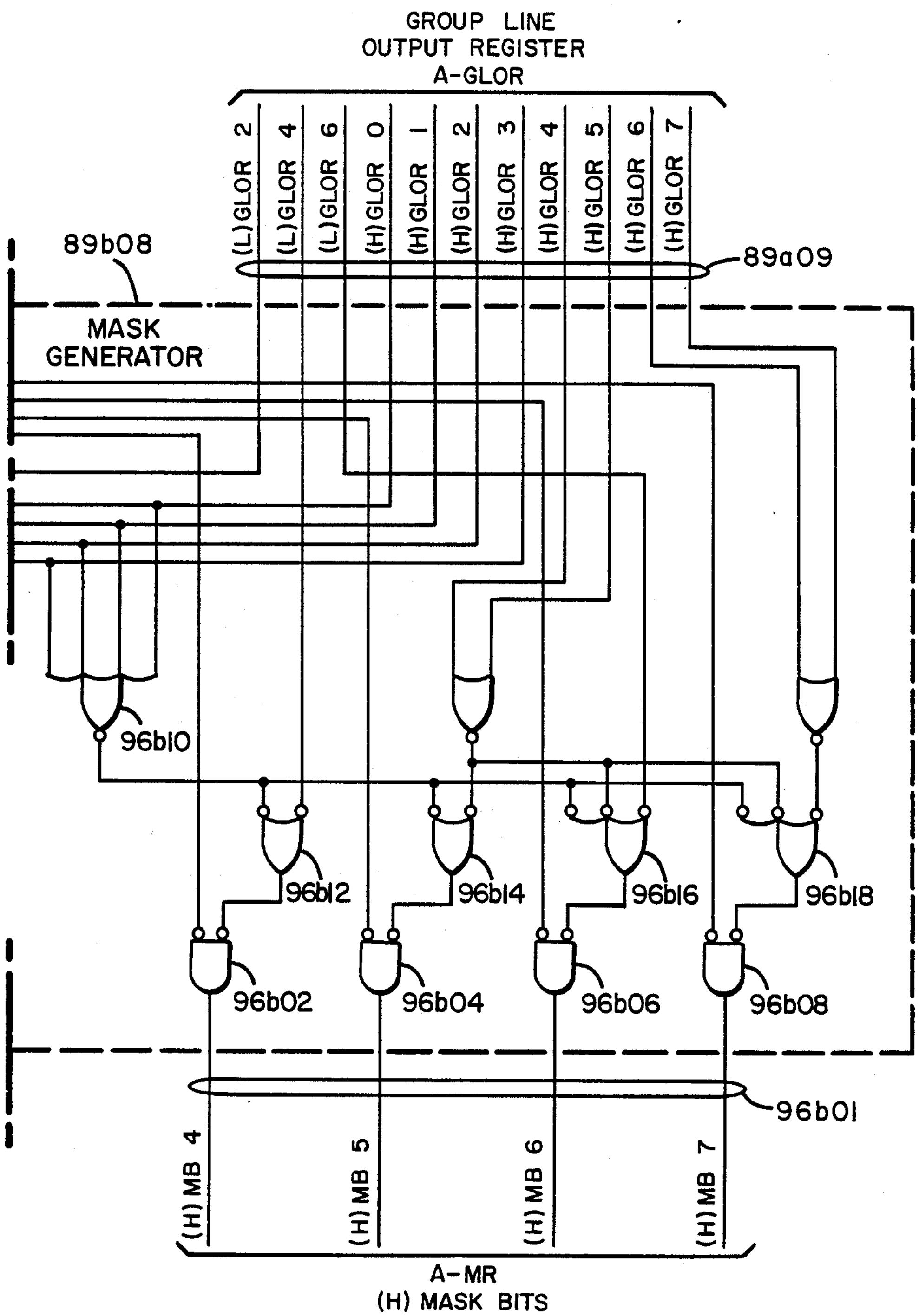

FIG. **96*a* and FIG. 96*b*** show a logic diagram of the Masked Generator functional subsection of the Arbitration functional section.

Figure 97:
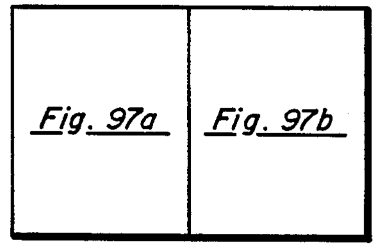
Figure 97A:
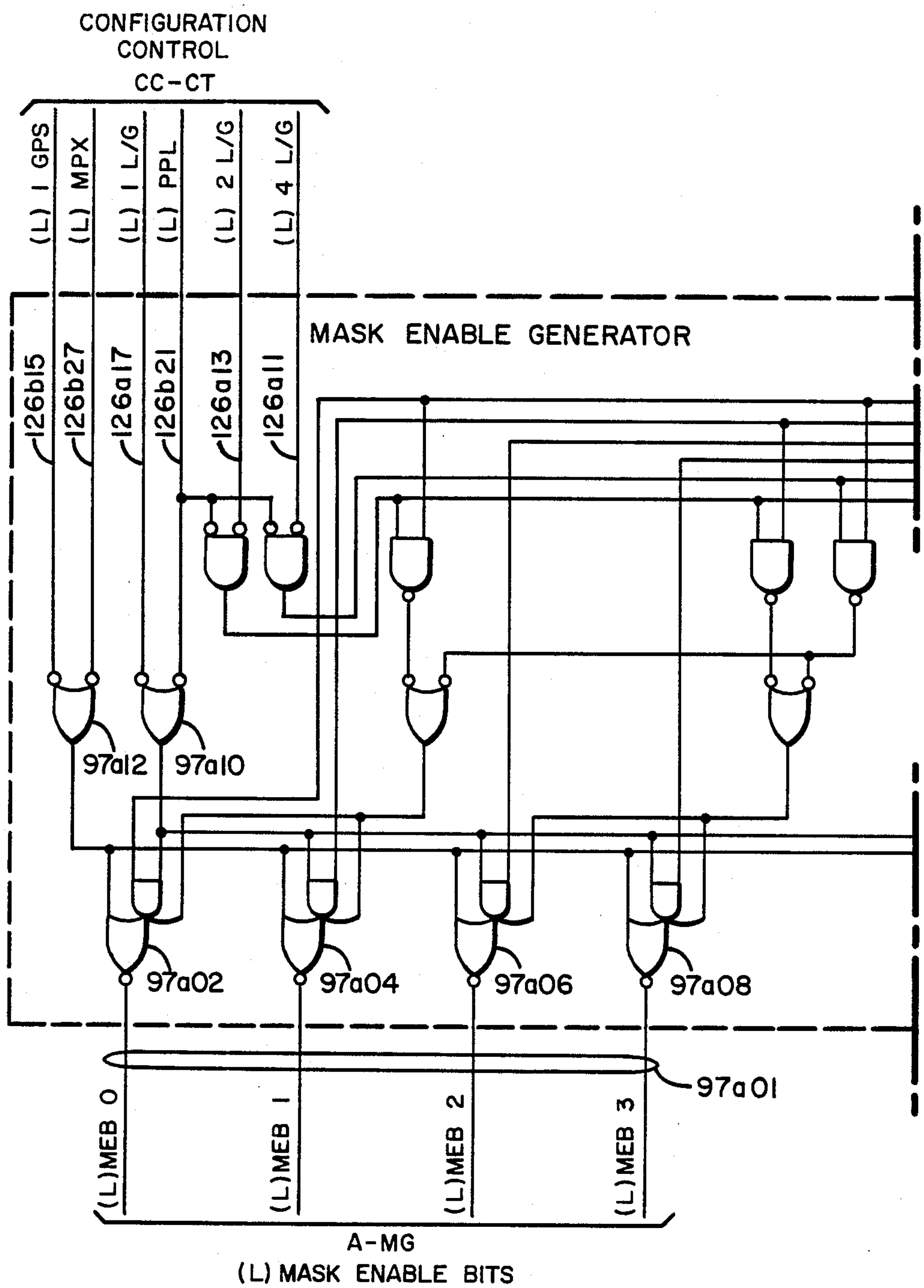
Figure 97B:
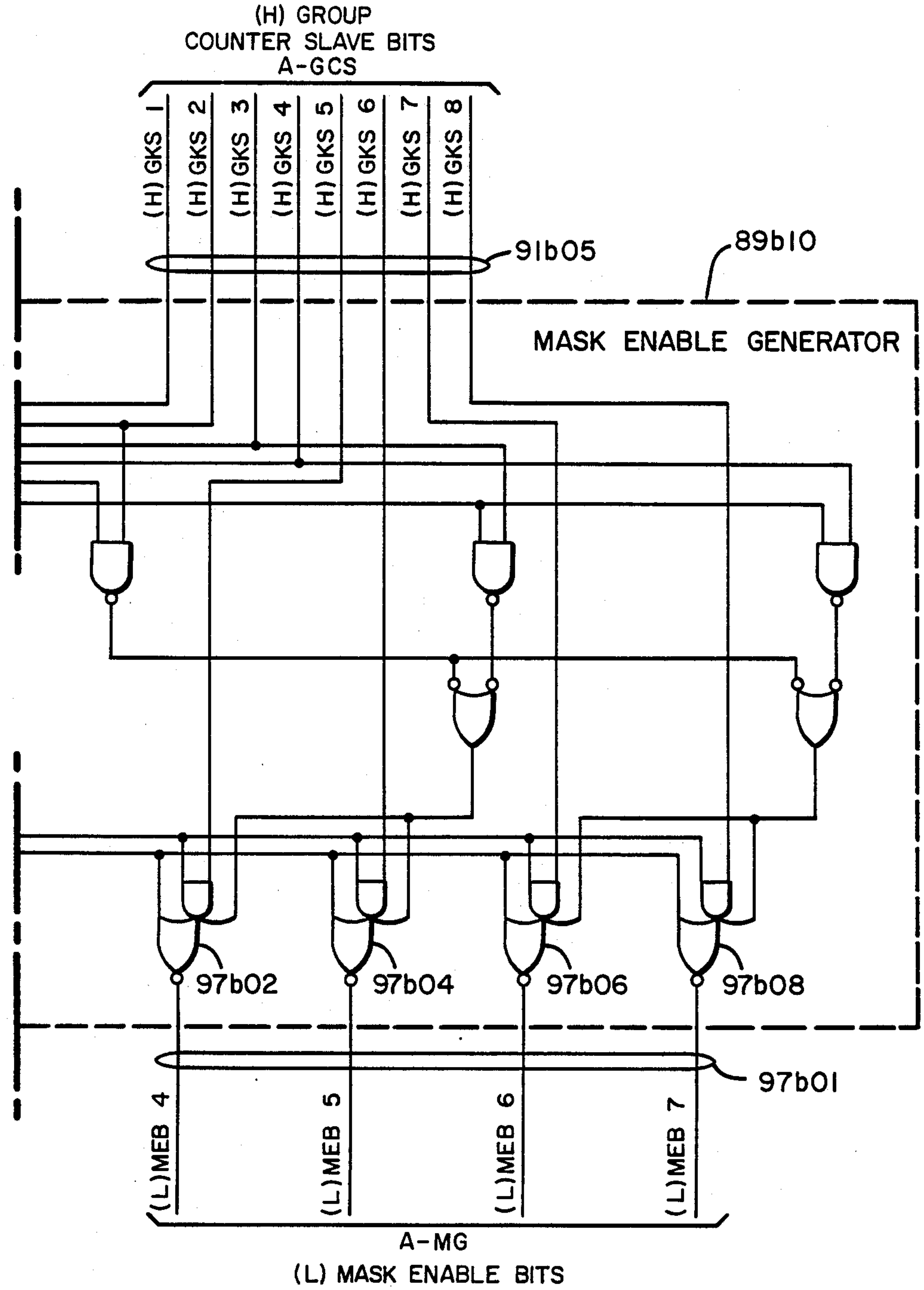

FIG. **97*a* and FIG. 97*b*** show a logic diagram of the Mask Enable Generator functional subsection of the Arbitration functional section.

FIG. **98*a* and FIG. 98*b* are tables such as respectively show the source of encoded group line bits for respective pipelined and multiplexed configurations of the Versatile Bus such bits aas are utilized by the selectors of the Group Line Input Encoder, such selectors as are shown at FIG. 101*c* through FIG. 101*f*.**

FIG. 99 shows in a diagrammatic fashion the location within the 36 bit group line memory of the Winner's Master Arbitration Identification Code such as extracted by the Input Master ID Selector.

Figure 100:
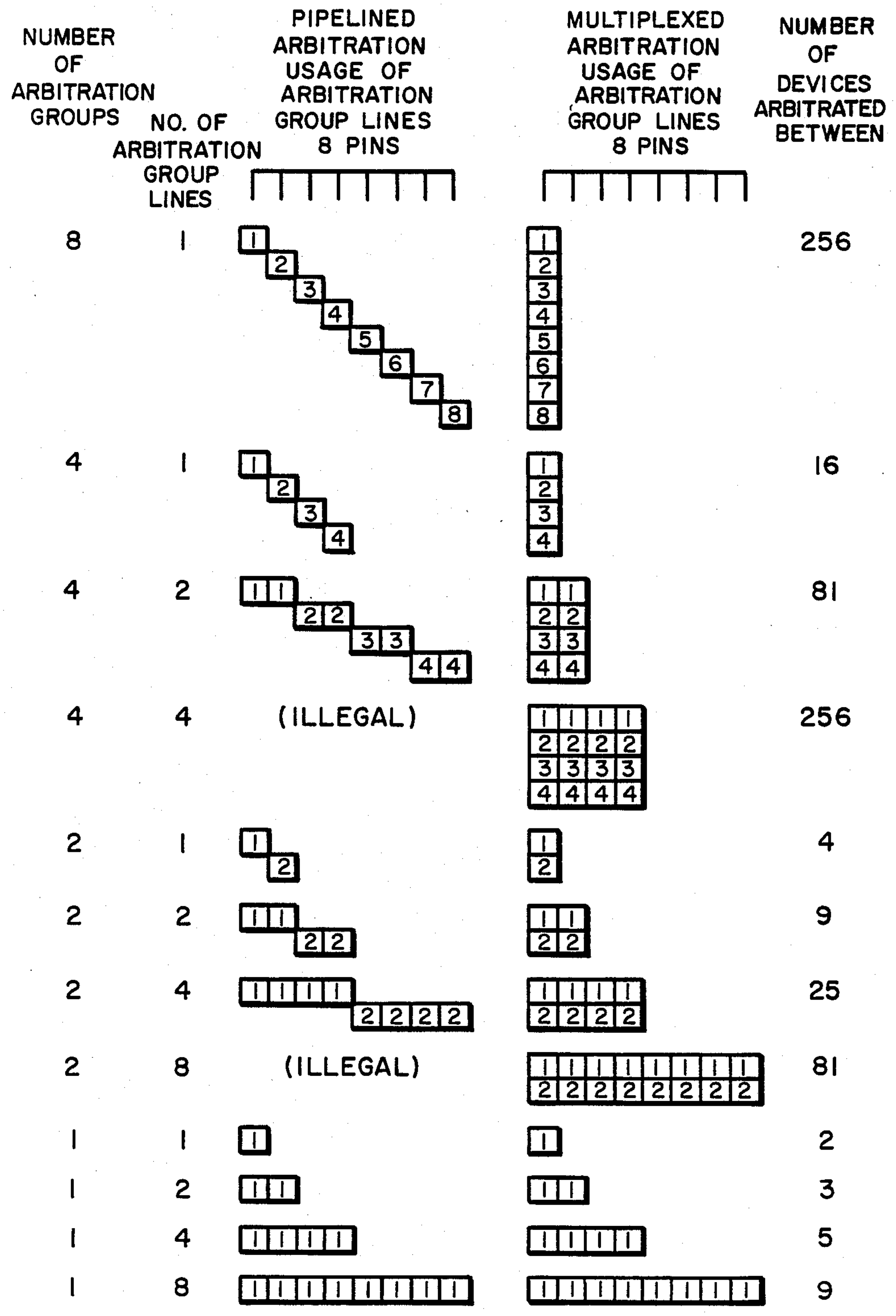

FIG. 100 shows in a diagrammatic manner the utilization of the arbitration group lines (pins) during various configurable cases of pipelined and multiplexed arbitration.

Figure 101:
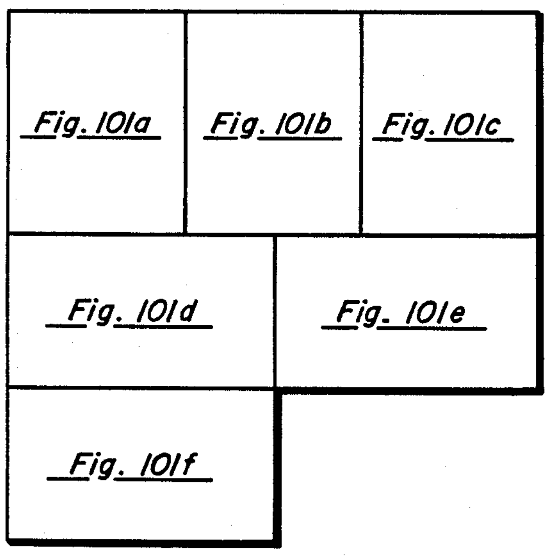
Figure 101A:
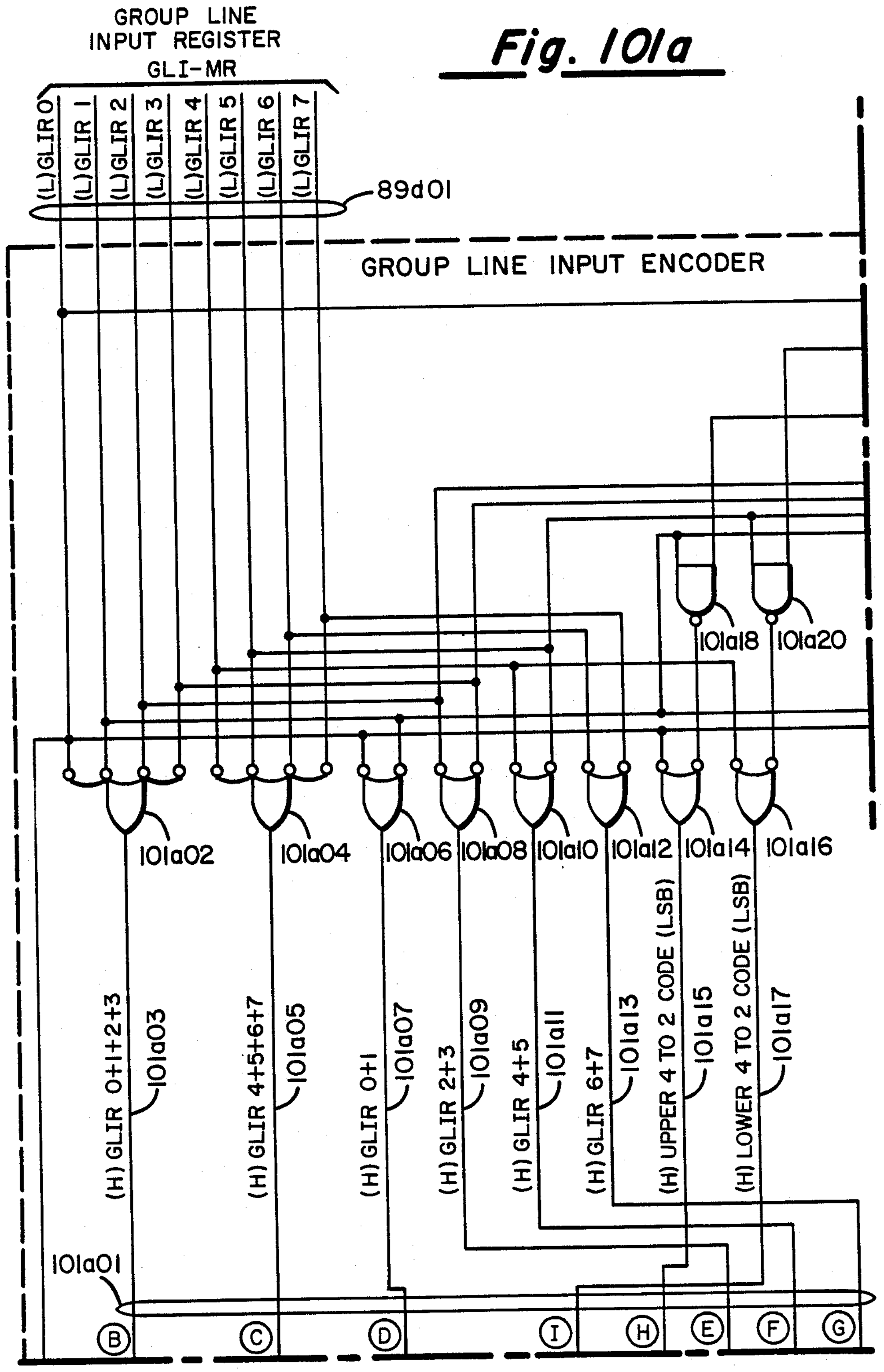
Figure 101B:
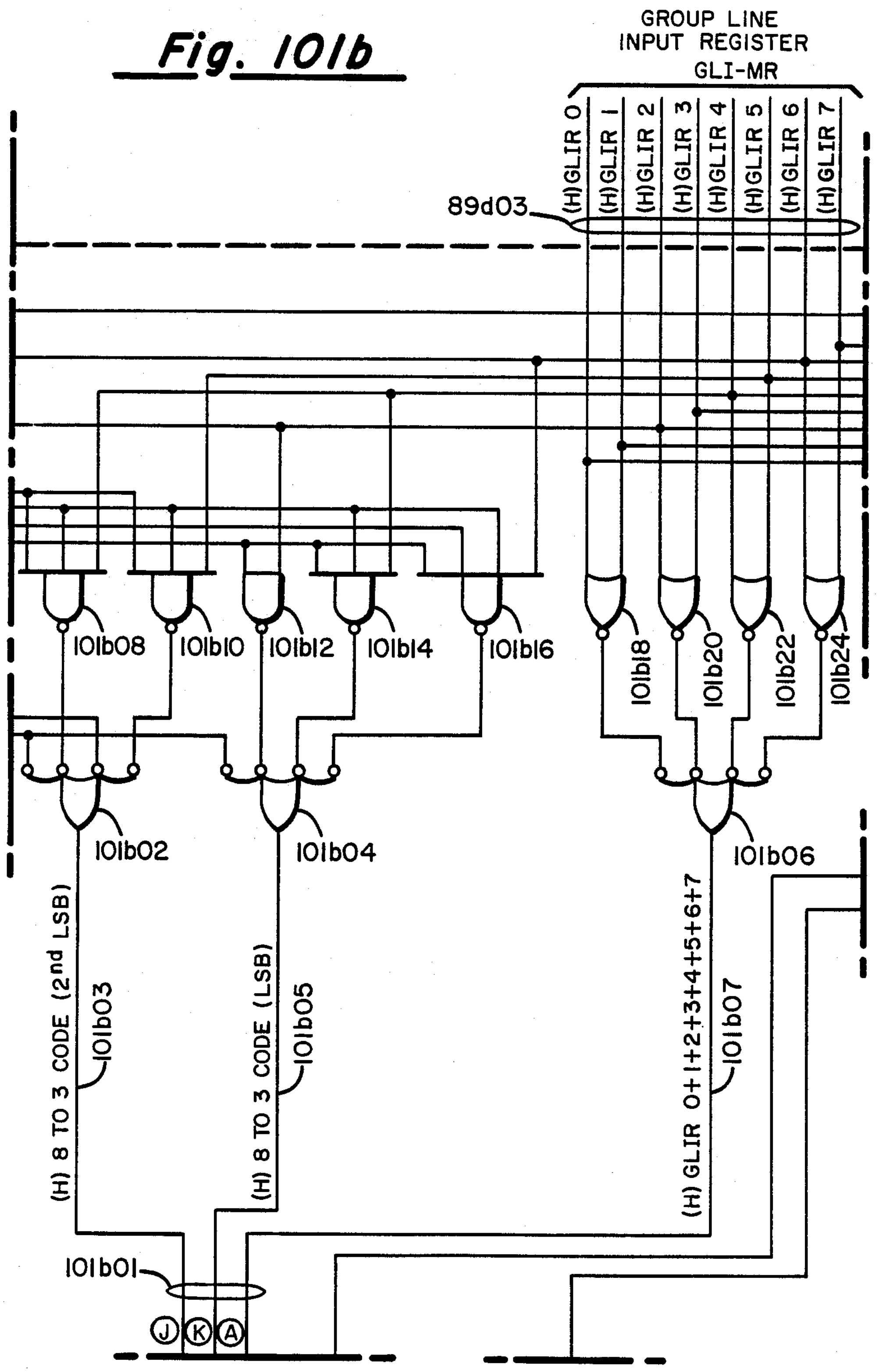
Figure 101C:
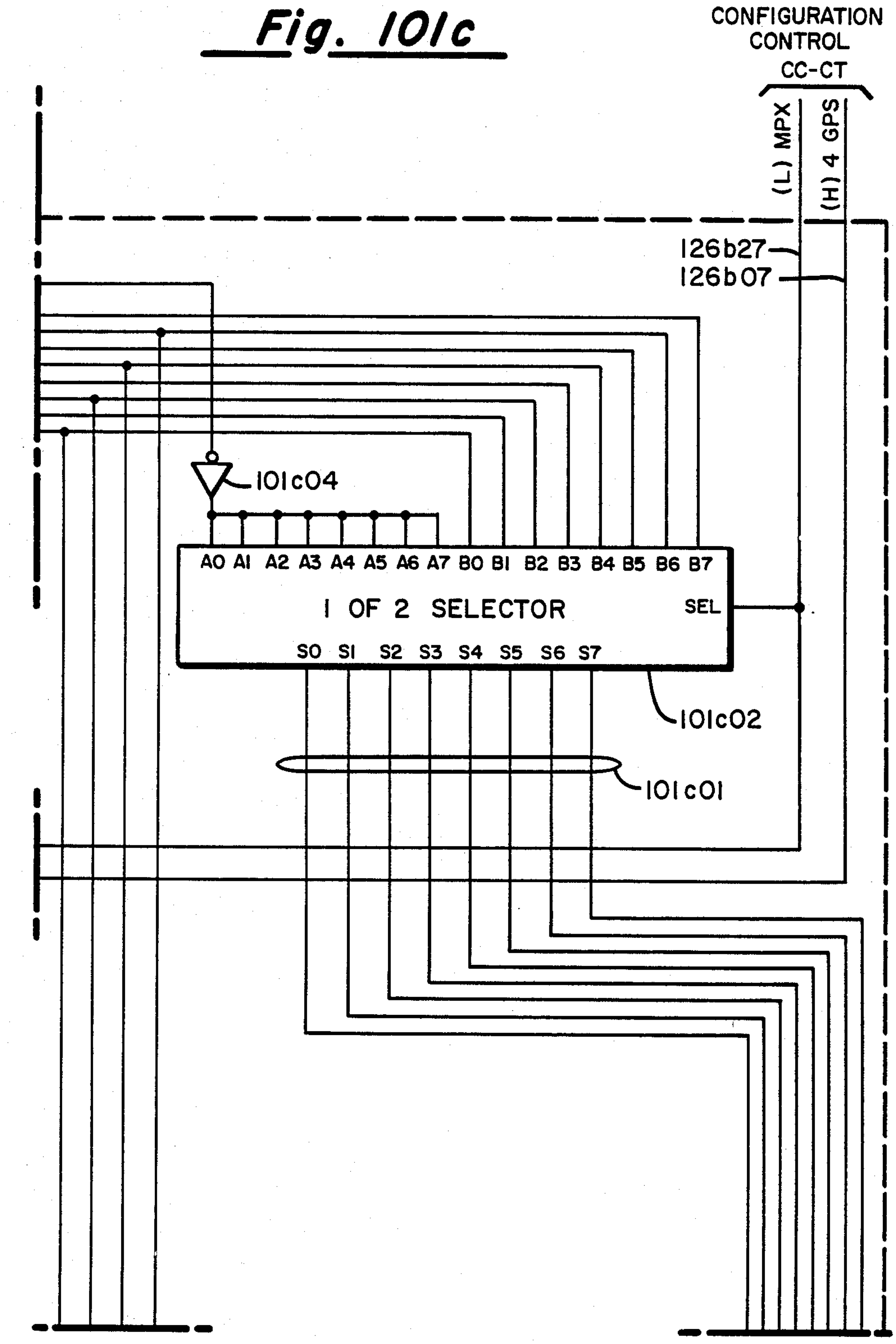
Figure 101D:
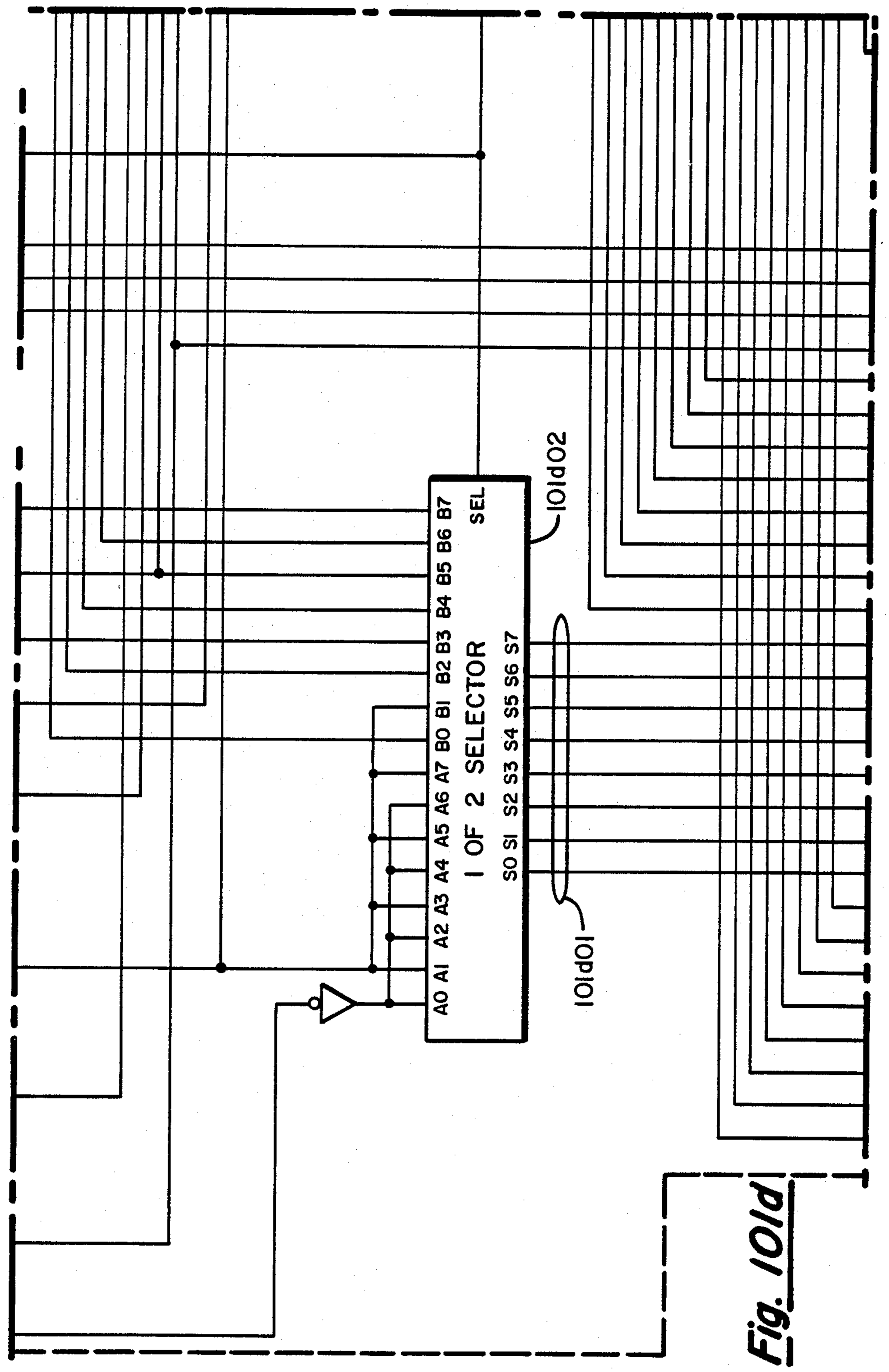
Figure 101E:
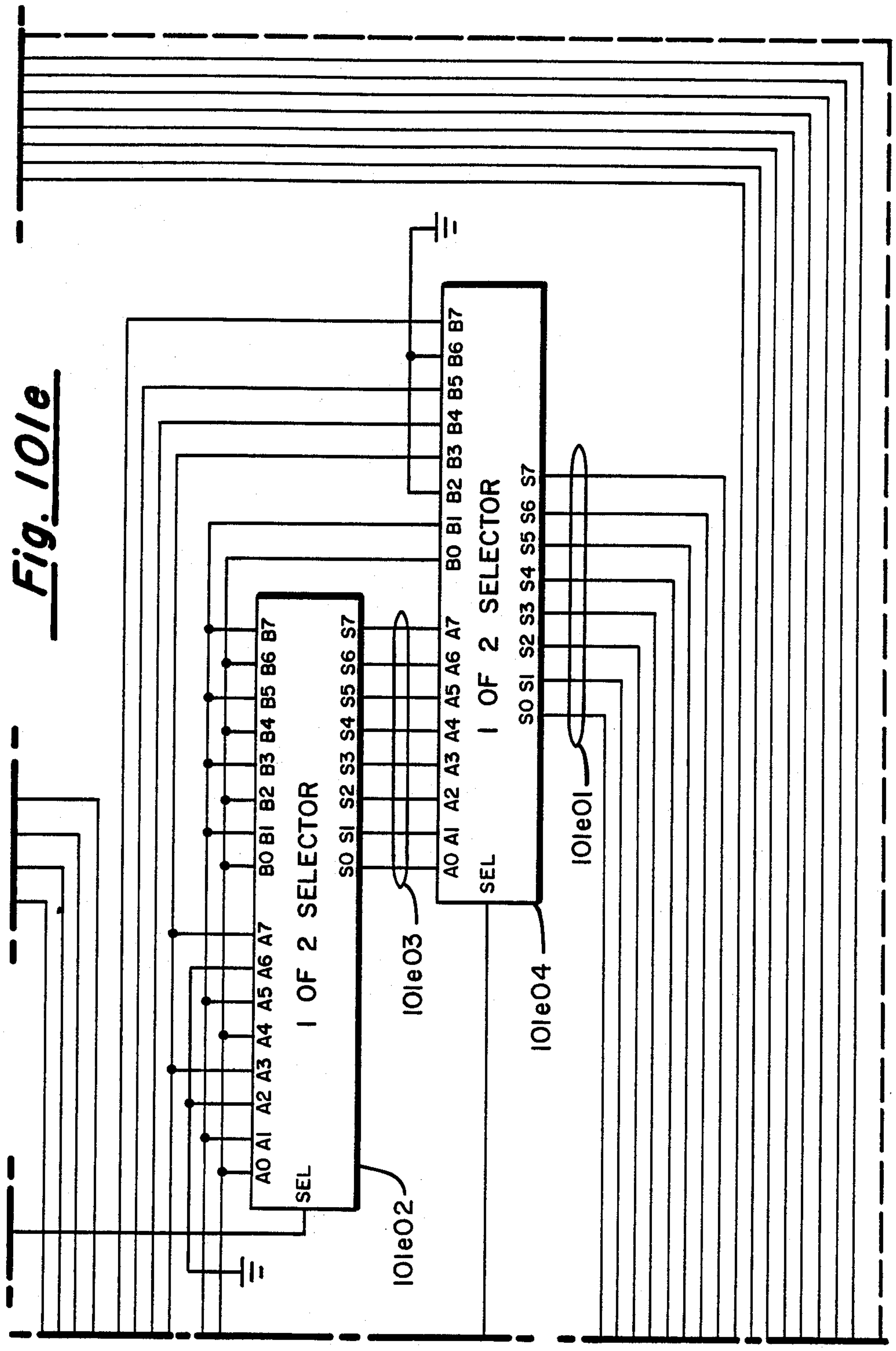
Figure 101F:
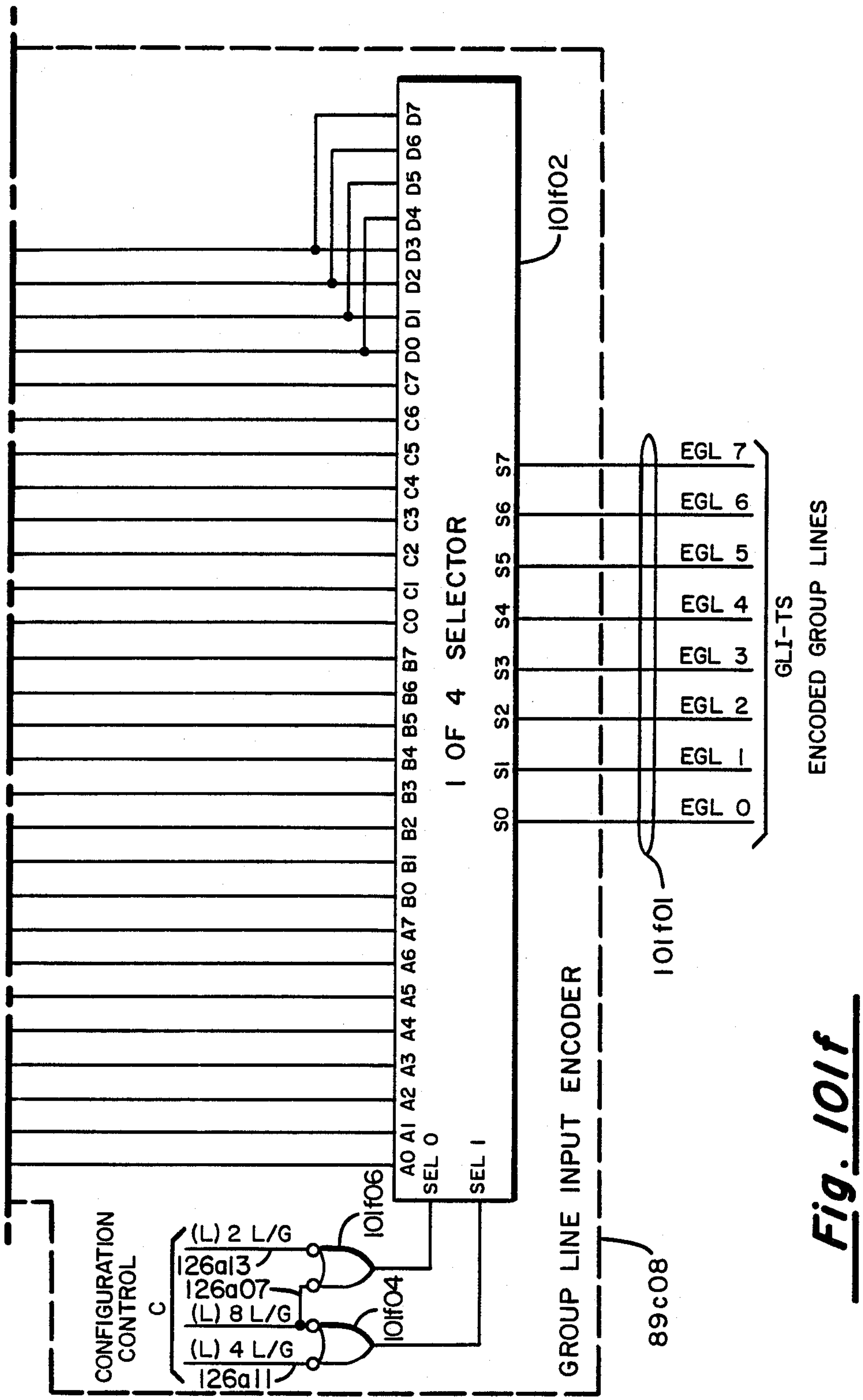

FIG. **101*a* through FIG. 101*f*** show a logic diagram of the Group Line Input Encoder functional subsection of the Group Line Input functional section.

Figure 102:
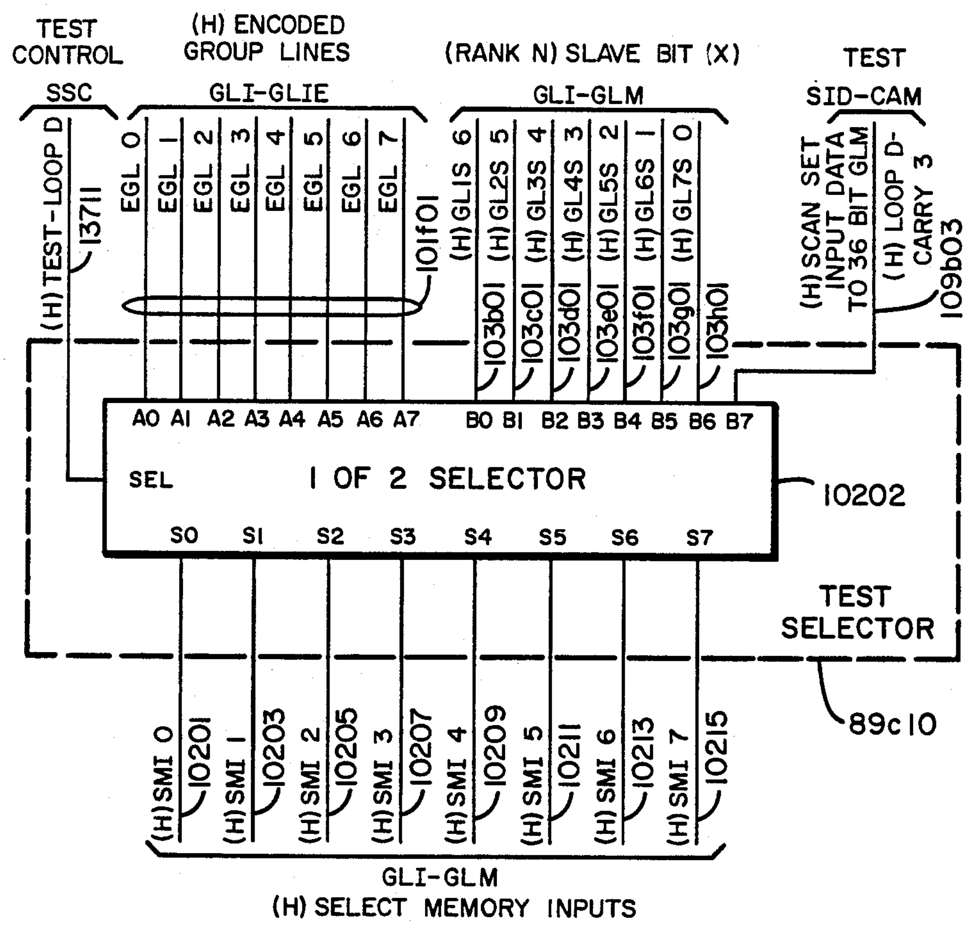

FIG. 102 shows a logic diagram of the Test Selector functional subsection of the Group Line Input functional section.

Figure 103:
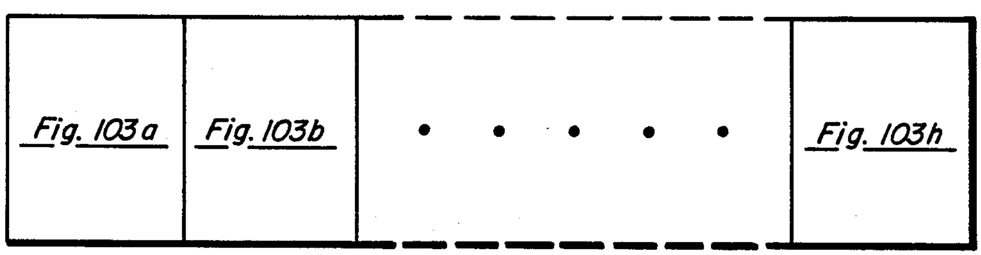
Figure 103A:
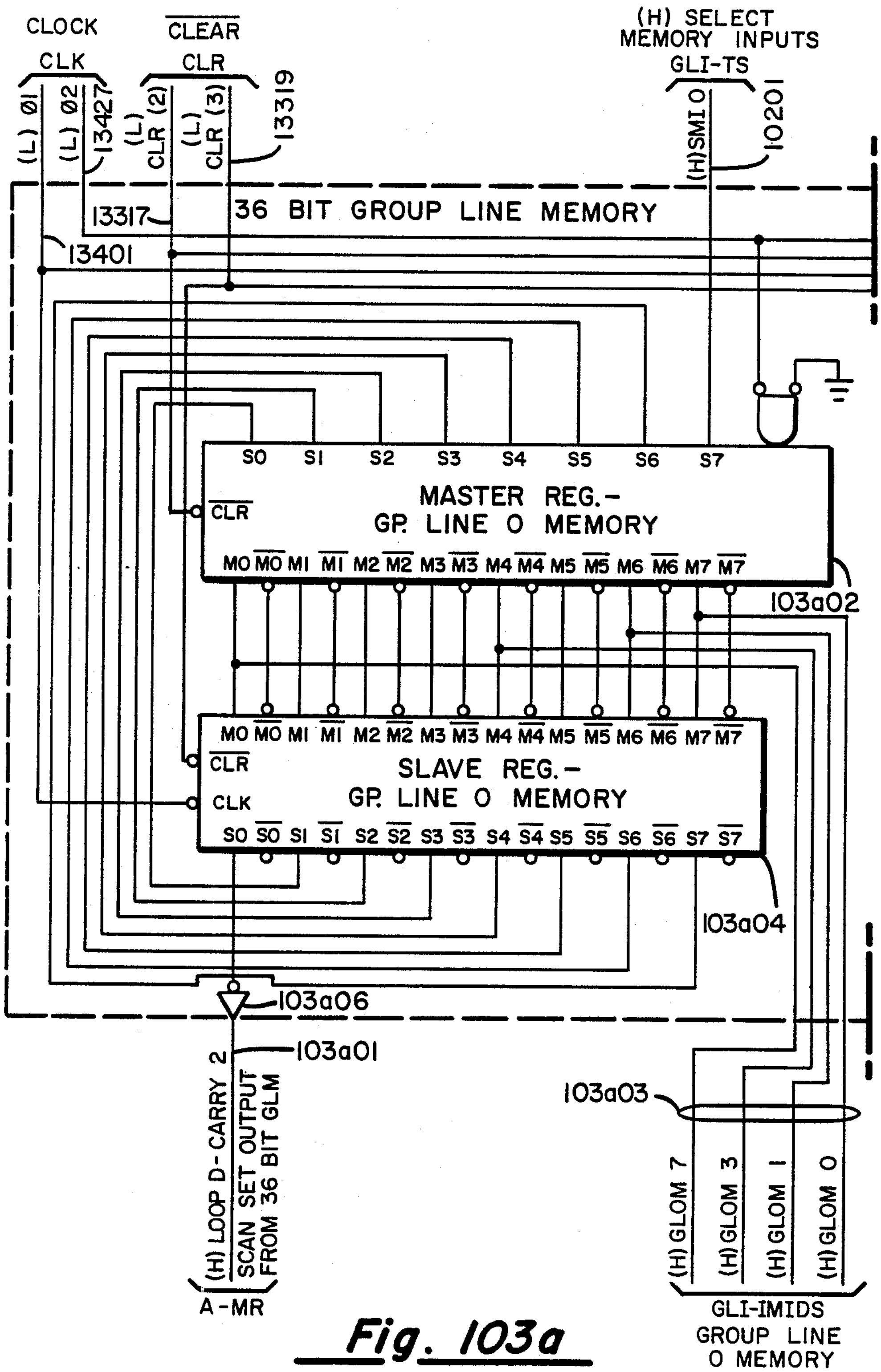
Figure 103B:
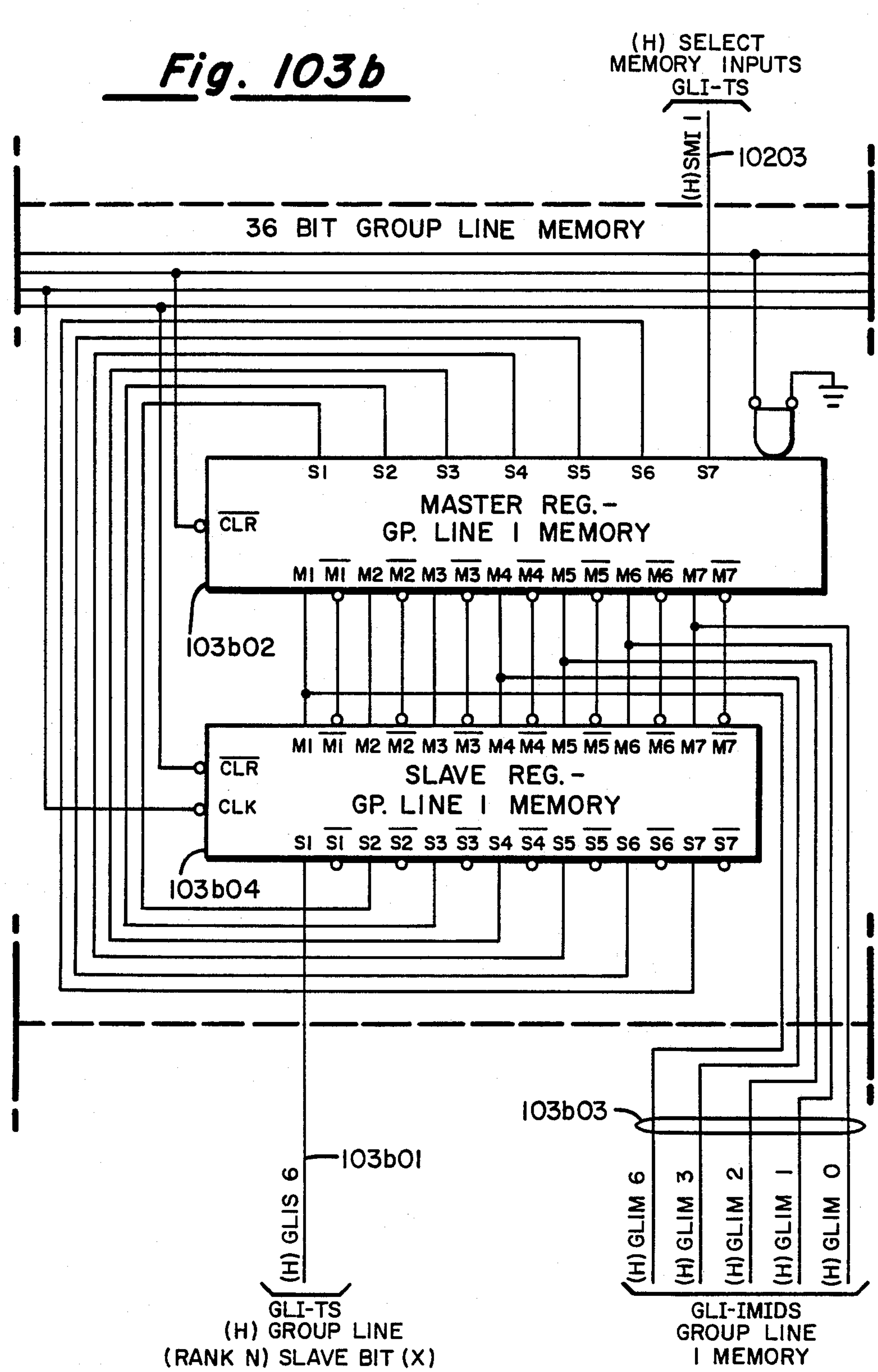
Figure 103C:
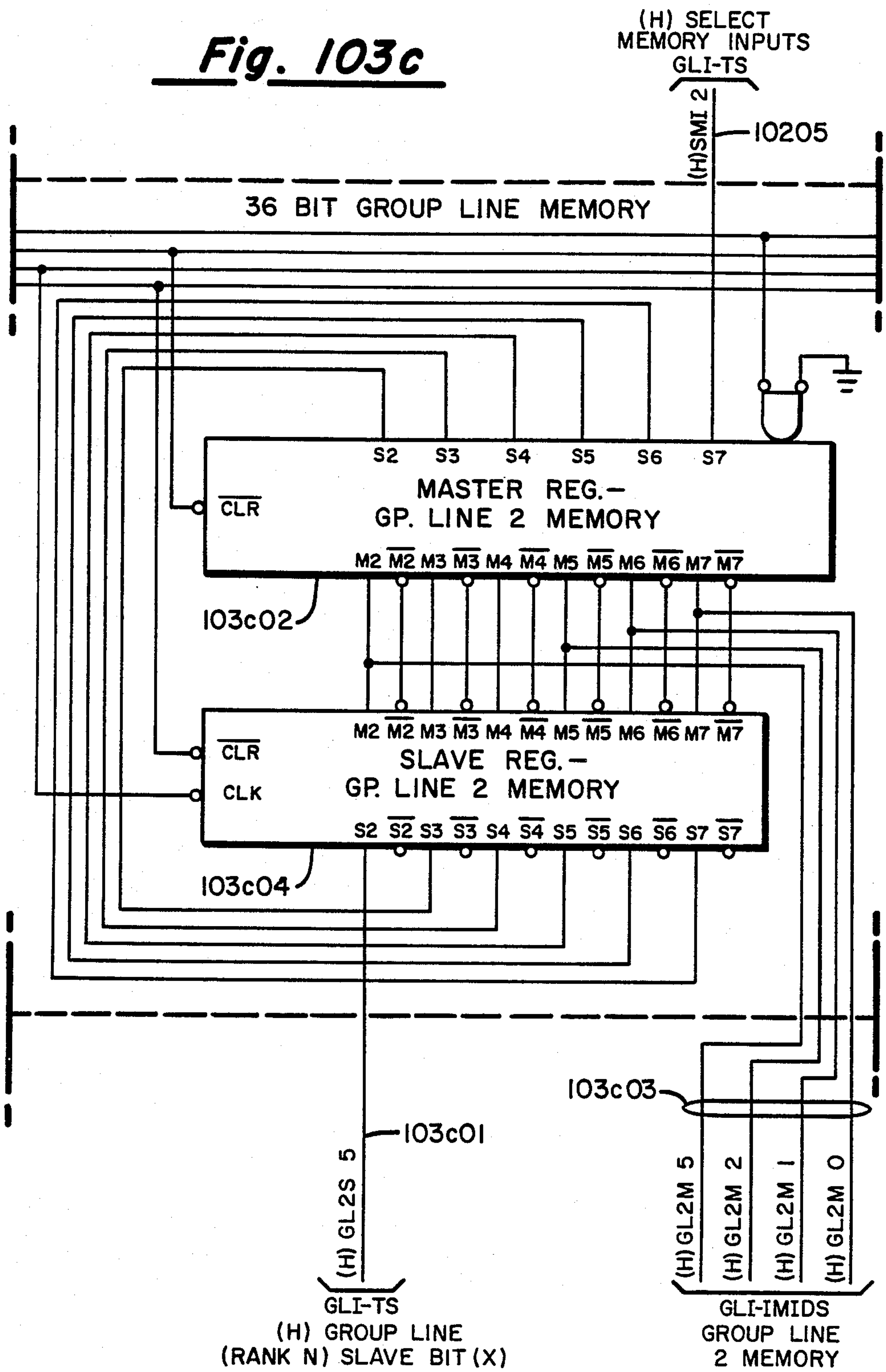
Figure 103D:
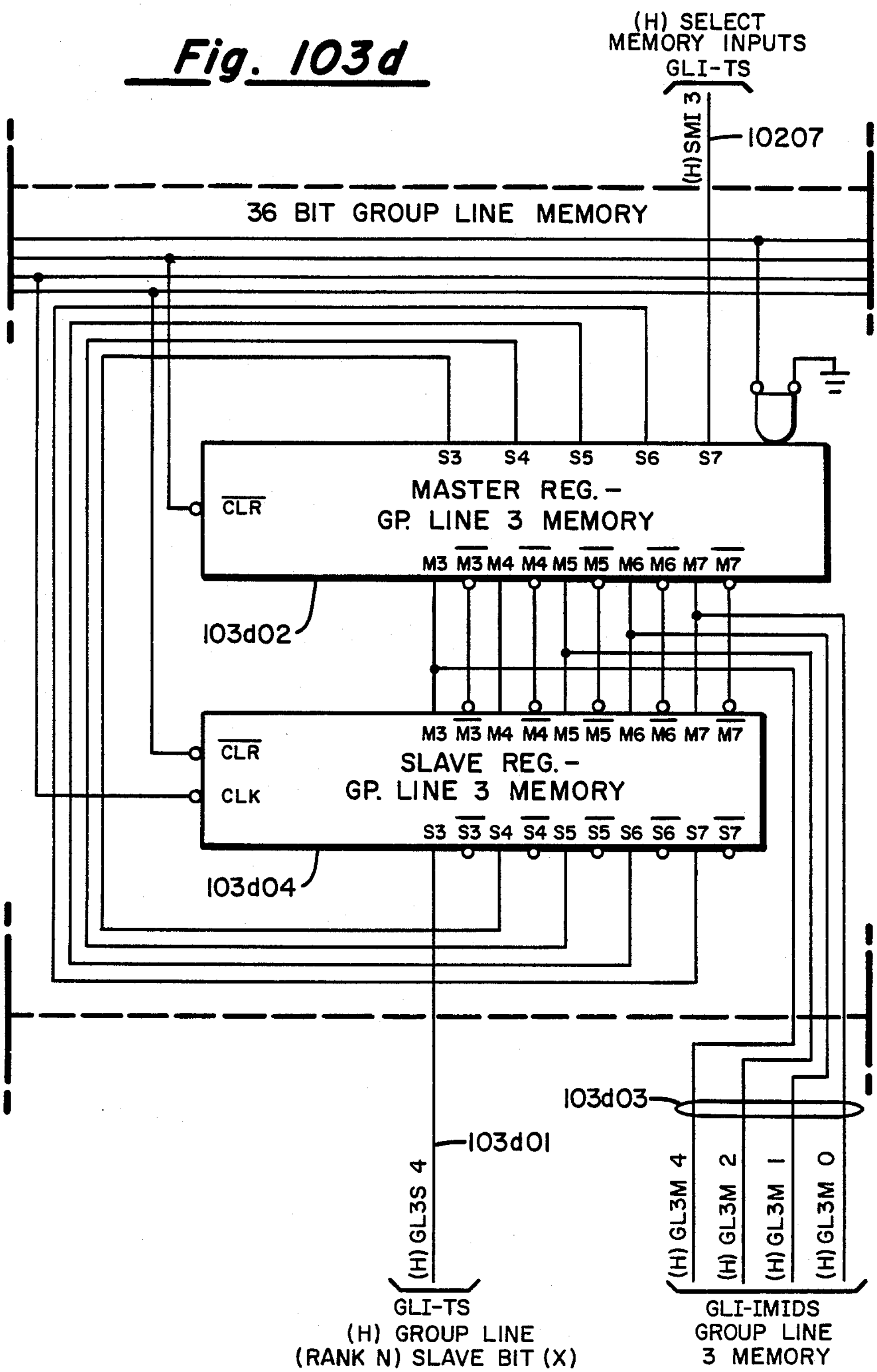
Figure 103E:
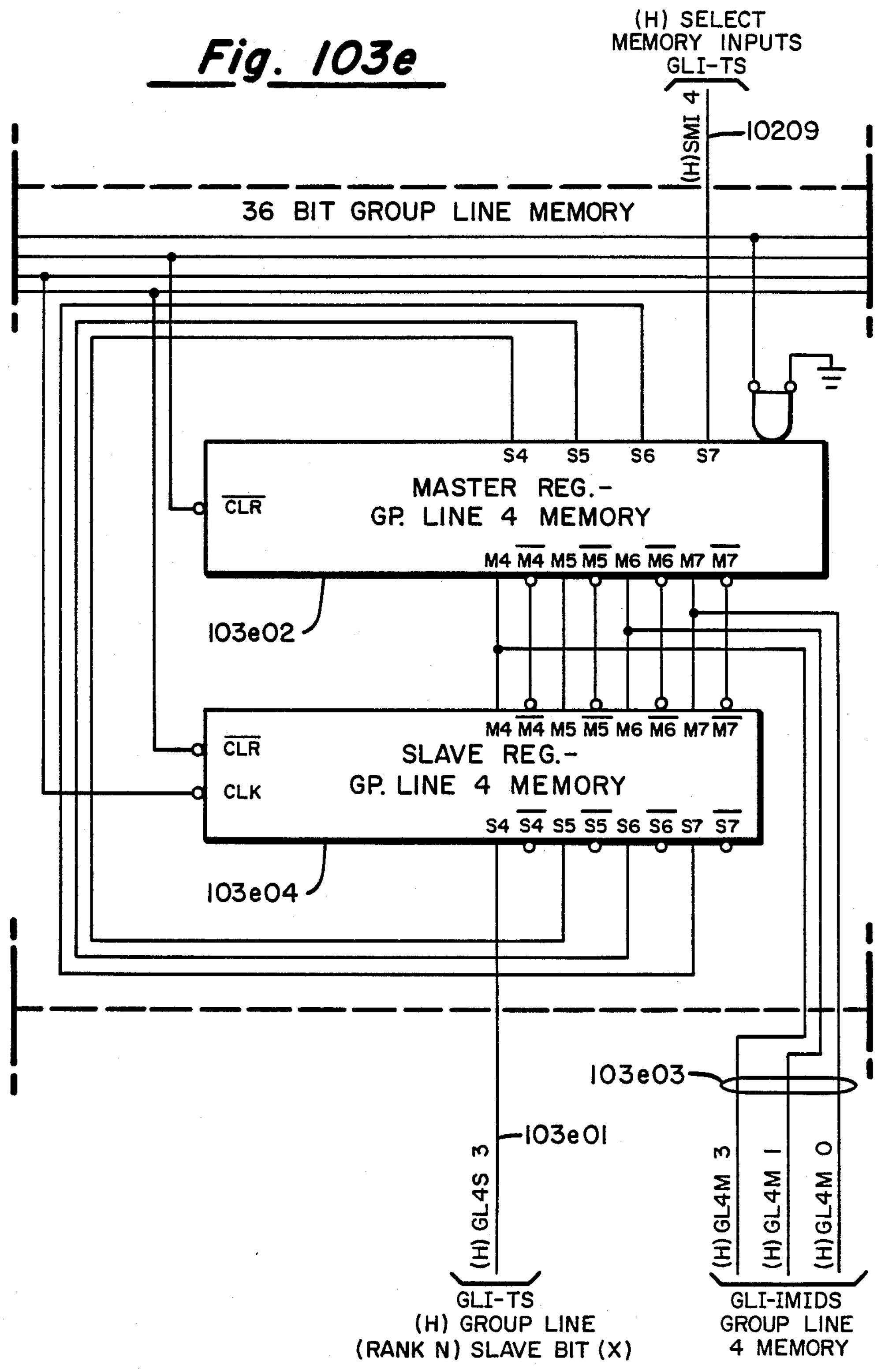
Figure 103F:
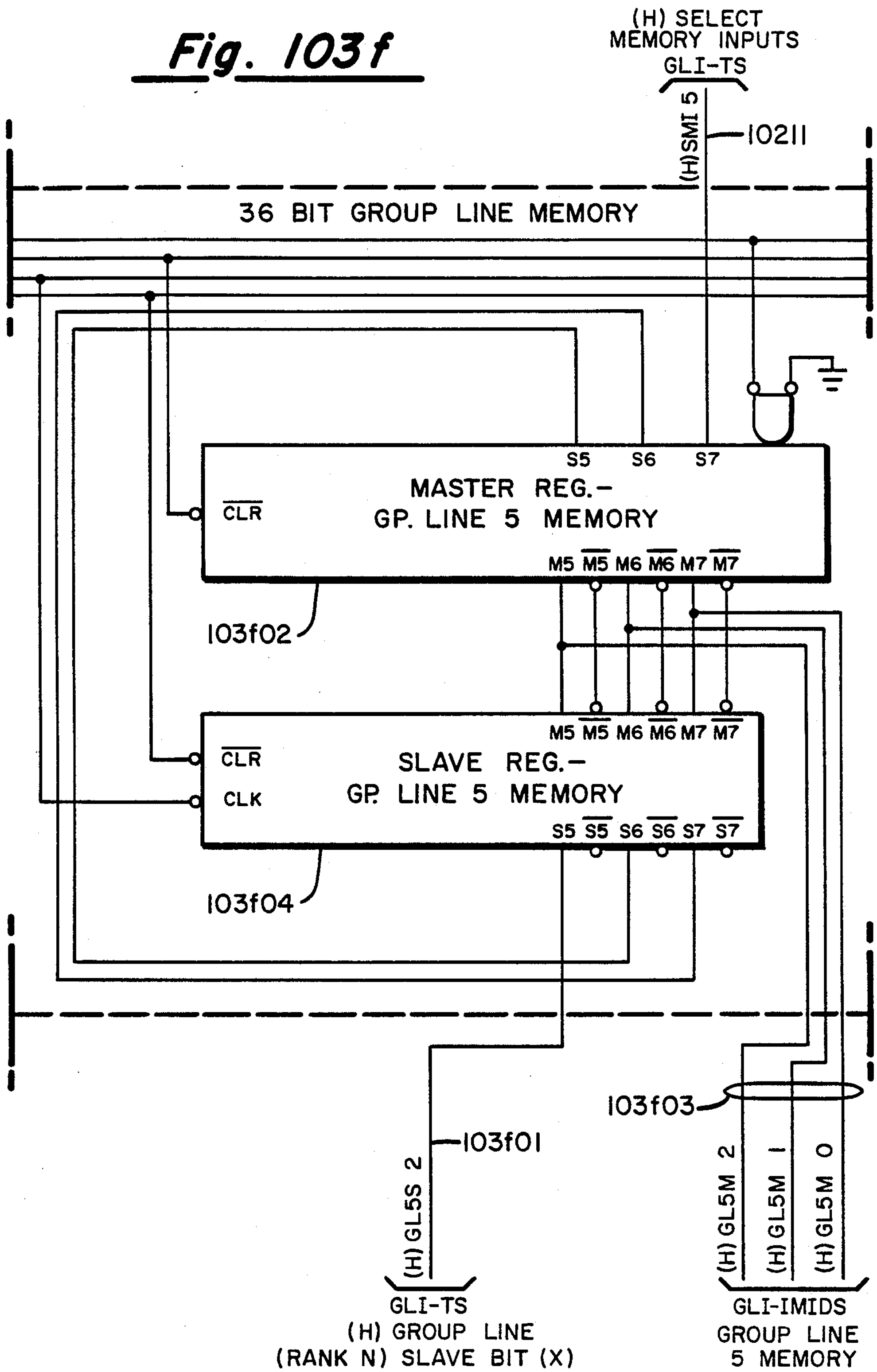
Figure 103G:
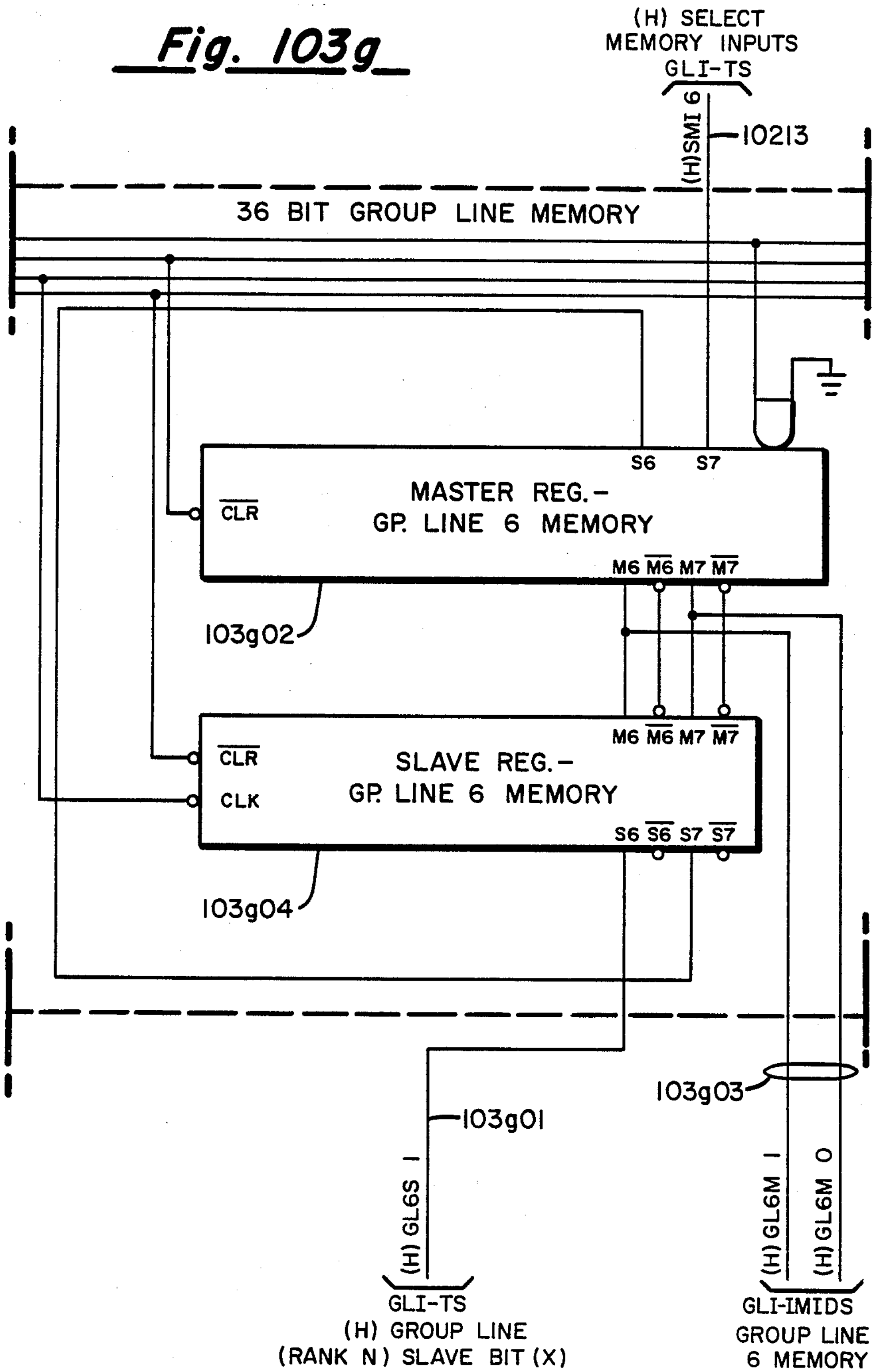
Figure 103H:
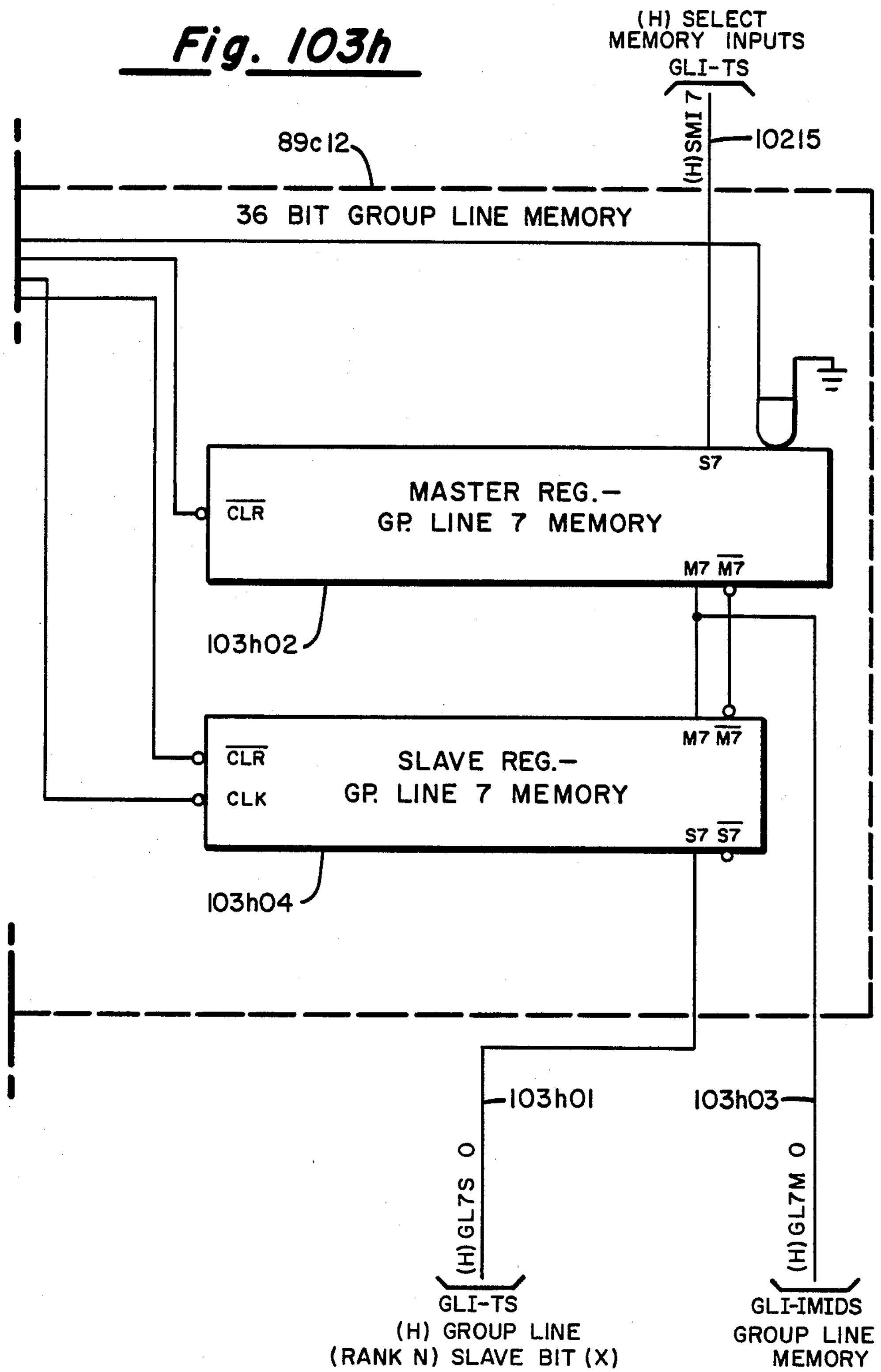

FIG. **103*a* through FIG. 103*h*** show a logic diagram of the 36 Bit Group Line Memory functional subsection of the Group Line Input functional section.

FIG. 104 shows the manner in which the Input Master ID Selector functional subsection will extract the contents of pertinent cells within the 36 Bit Group Line Memory in formation of the winner's master arbitration identification code.

FIG. **105*a*** shows the User's master arbitration identification code format for the conduct of arbitration configured at one line per group.

FIG. **105*b*** shows the User's master arbitration identification code format for the conduct of arbitration configured at two lines per group.

FIG. **105*c*** shows the User's master arbitration identification code format for the conduct of arbitration configured at four lines per group and four groups.

FIG. **105*d*** shows the User's master arbitration identification code format for the conduct of arbitration configured at four lines per group and one or two groups.

FIG. **105*e*** shows the User's master arbitration identification code format for the conduct of arbitration configured at eight lines per group.

Figure 106:
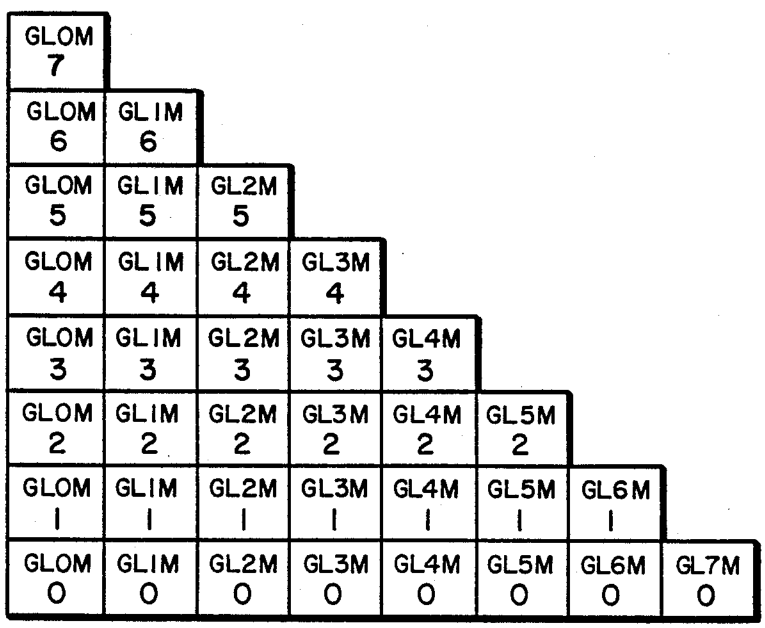

FIG. 106 shows shows the designation of each cell within the eight ranks 0 through 7 and the eight group line memories GL0M through GL7M of the 36 Bit Group Line Memory.

Figure 107:
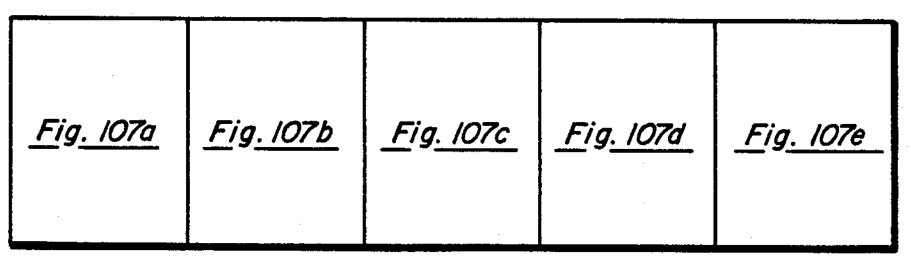
Figure 107A:
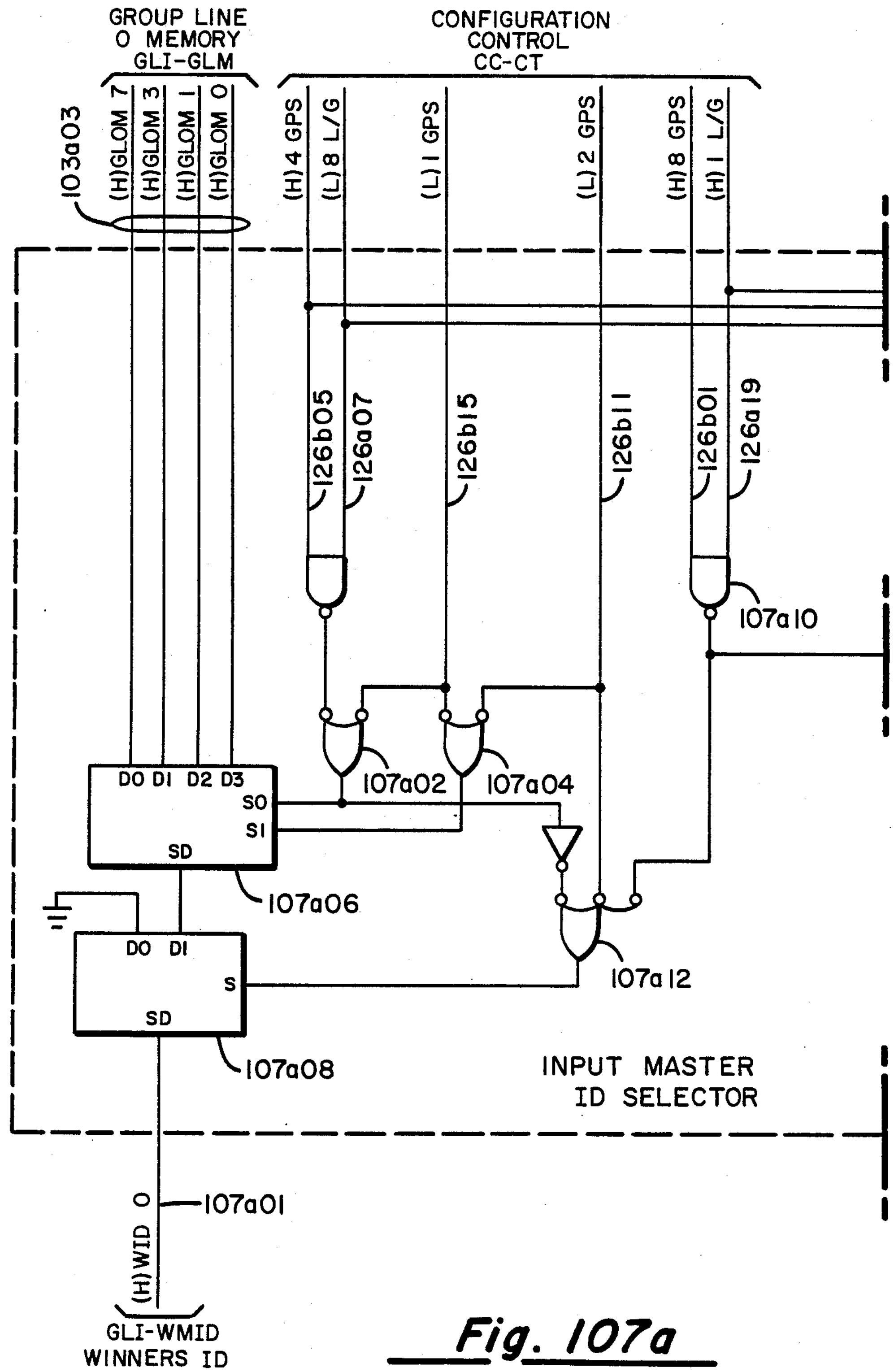
Figure 107B:
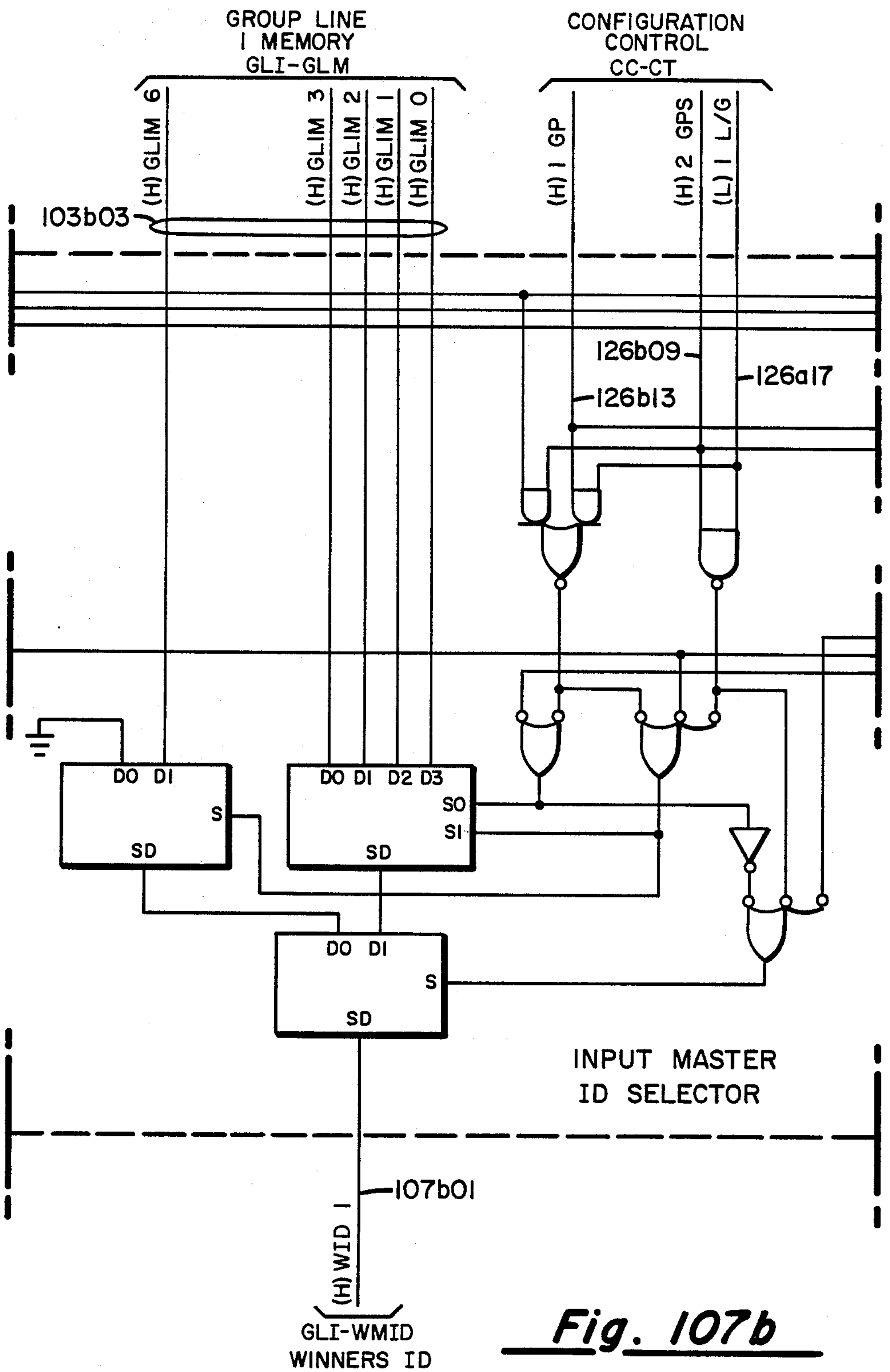
Figure 107C:
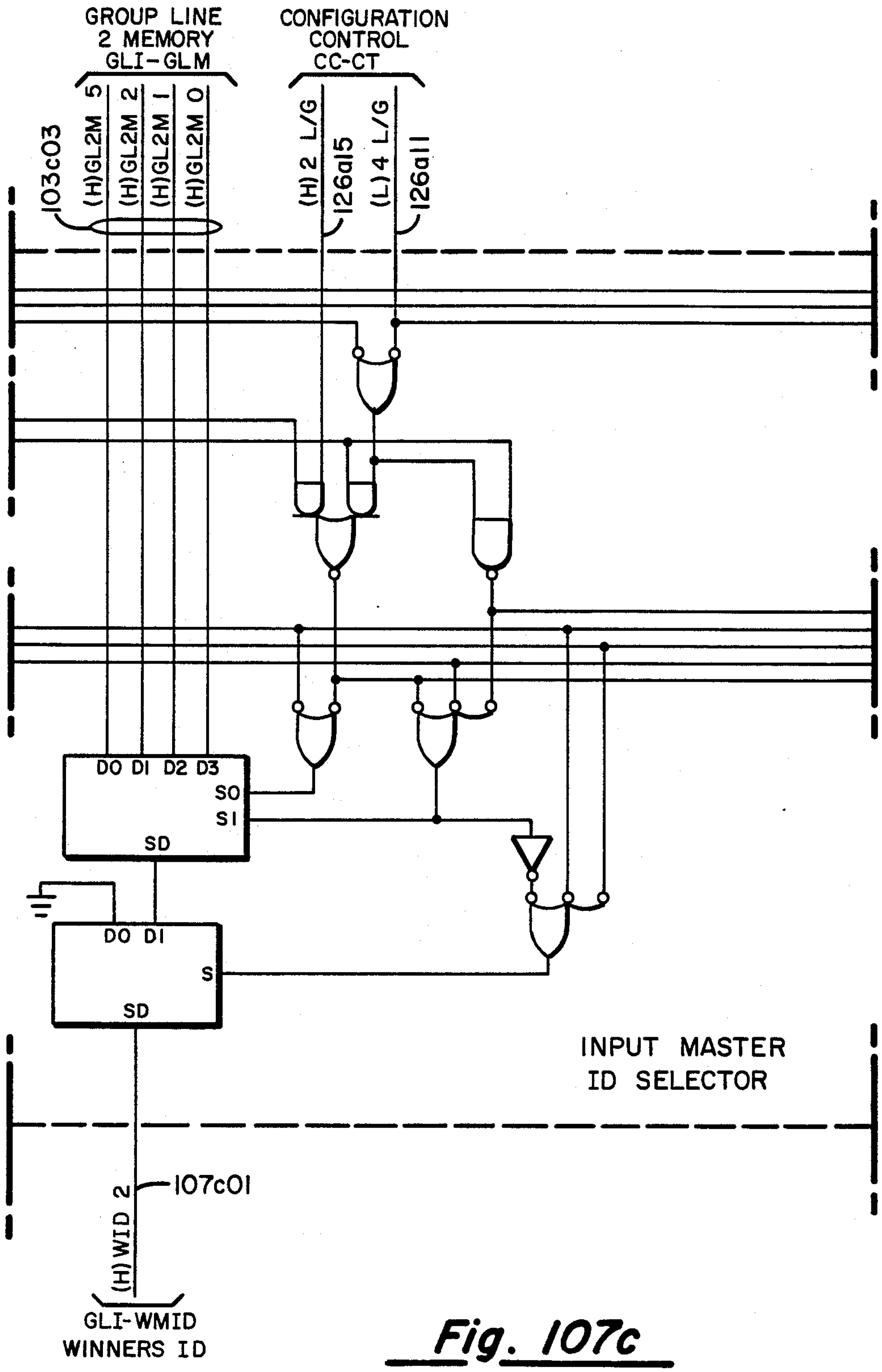
Figure 107D:
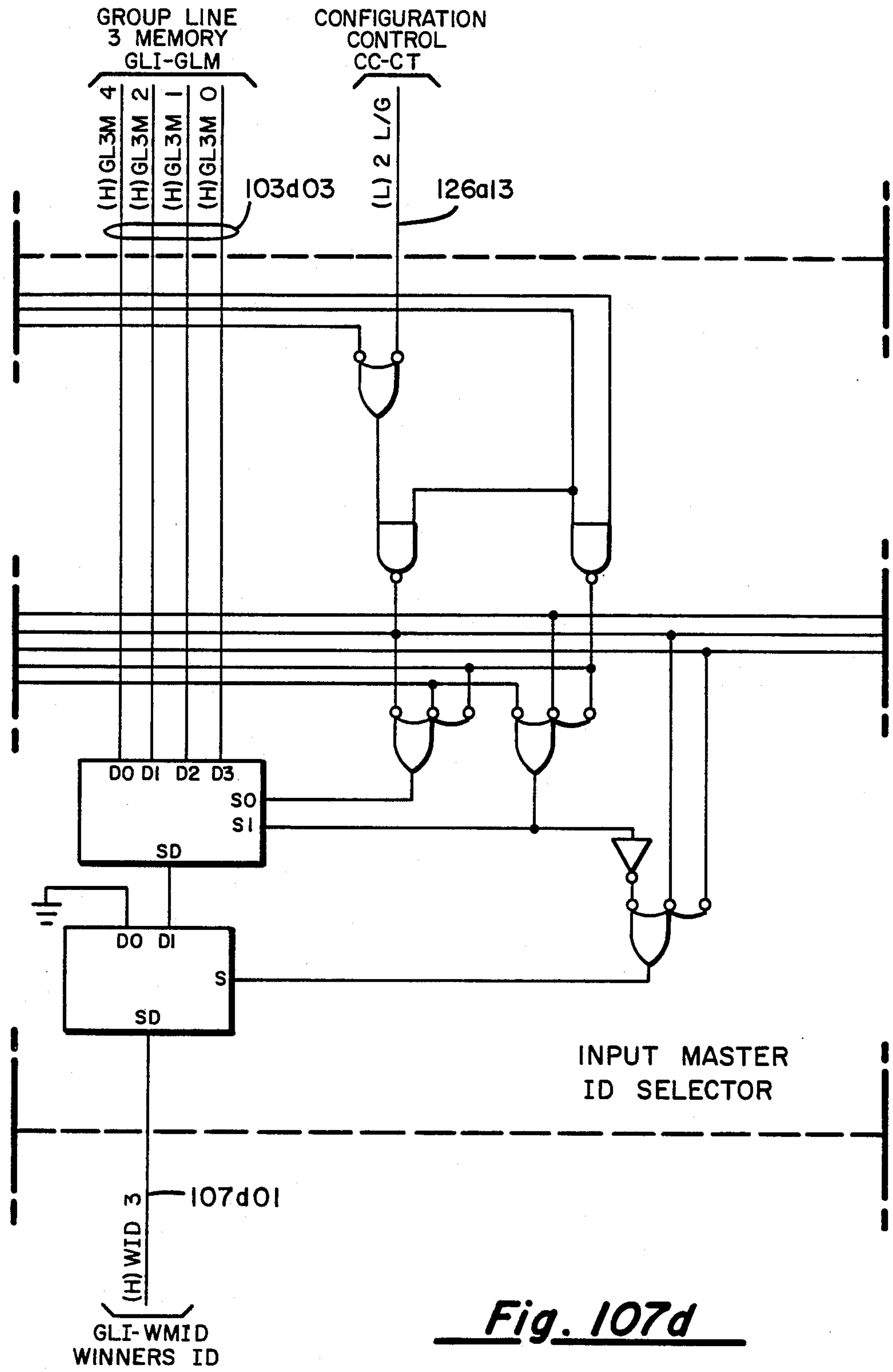
Figure 107E:
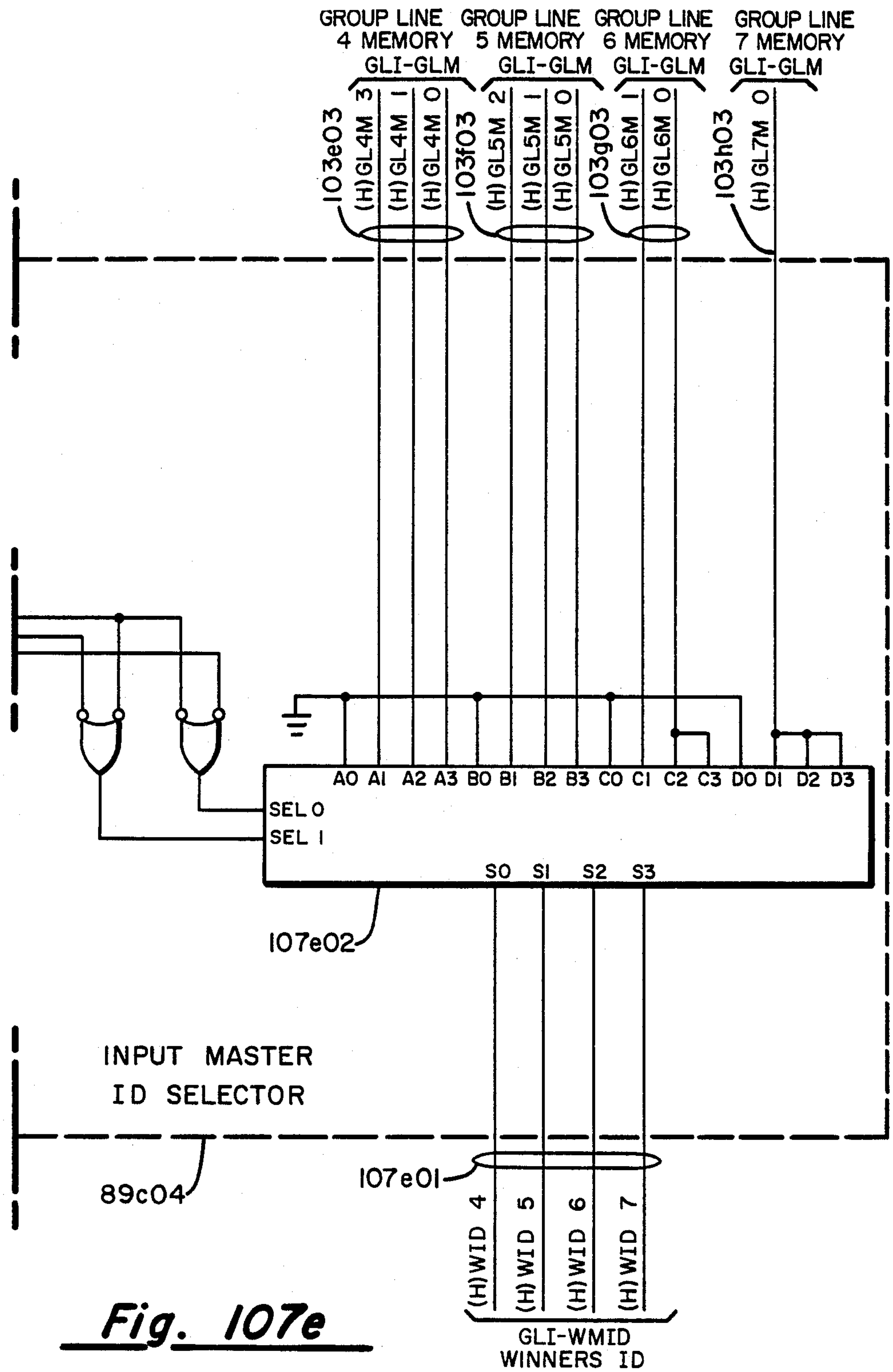

FIG. **107*a* through FIG. 107*e*** show a logic diagram of the Input Master ID Selector functional subsection of the Group Line Input functional section.

Figure 108:
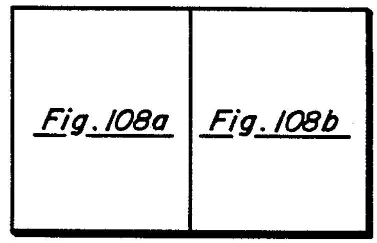
Figure 108A:
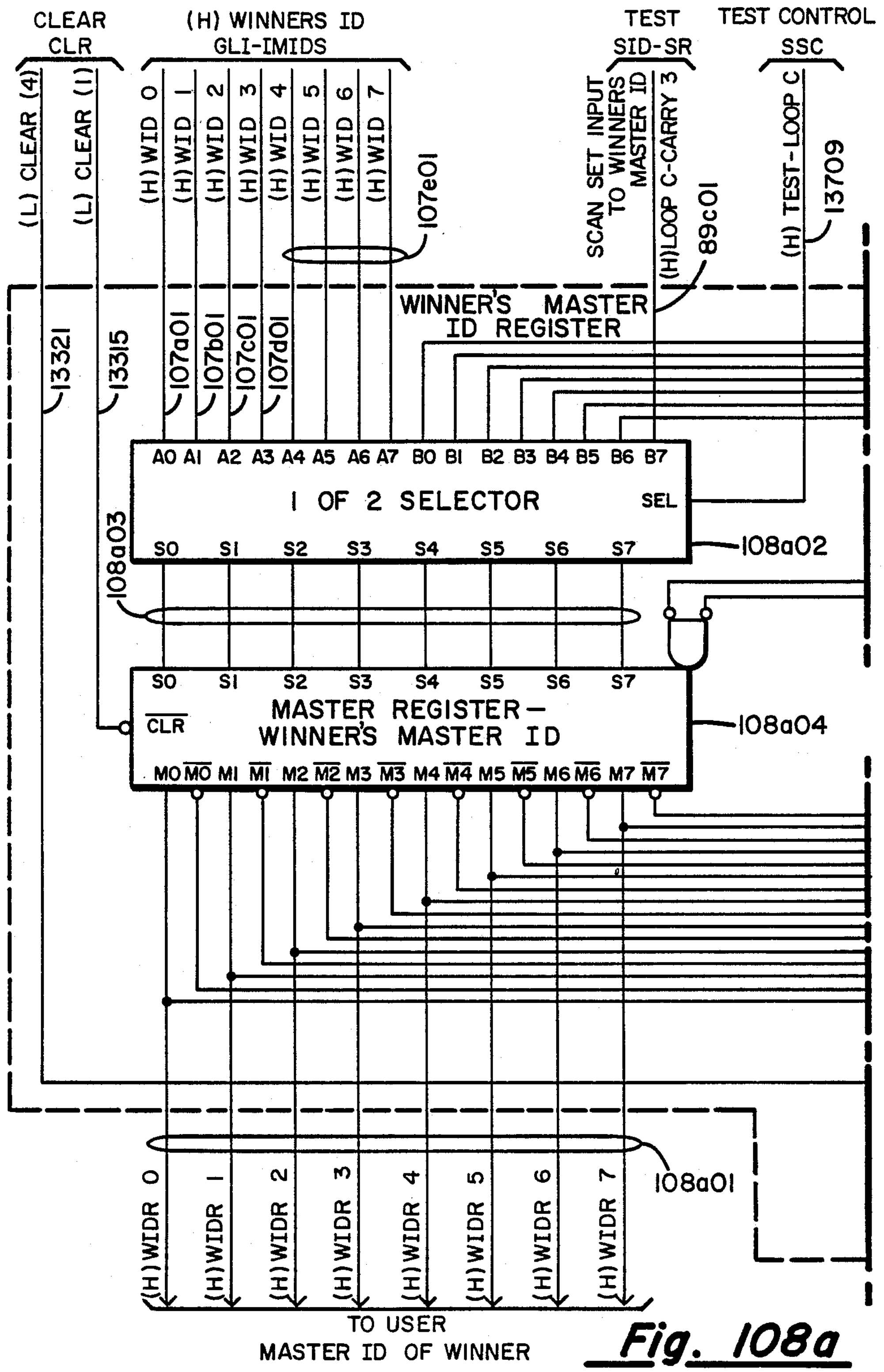
Figure 108B:
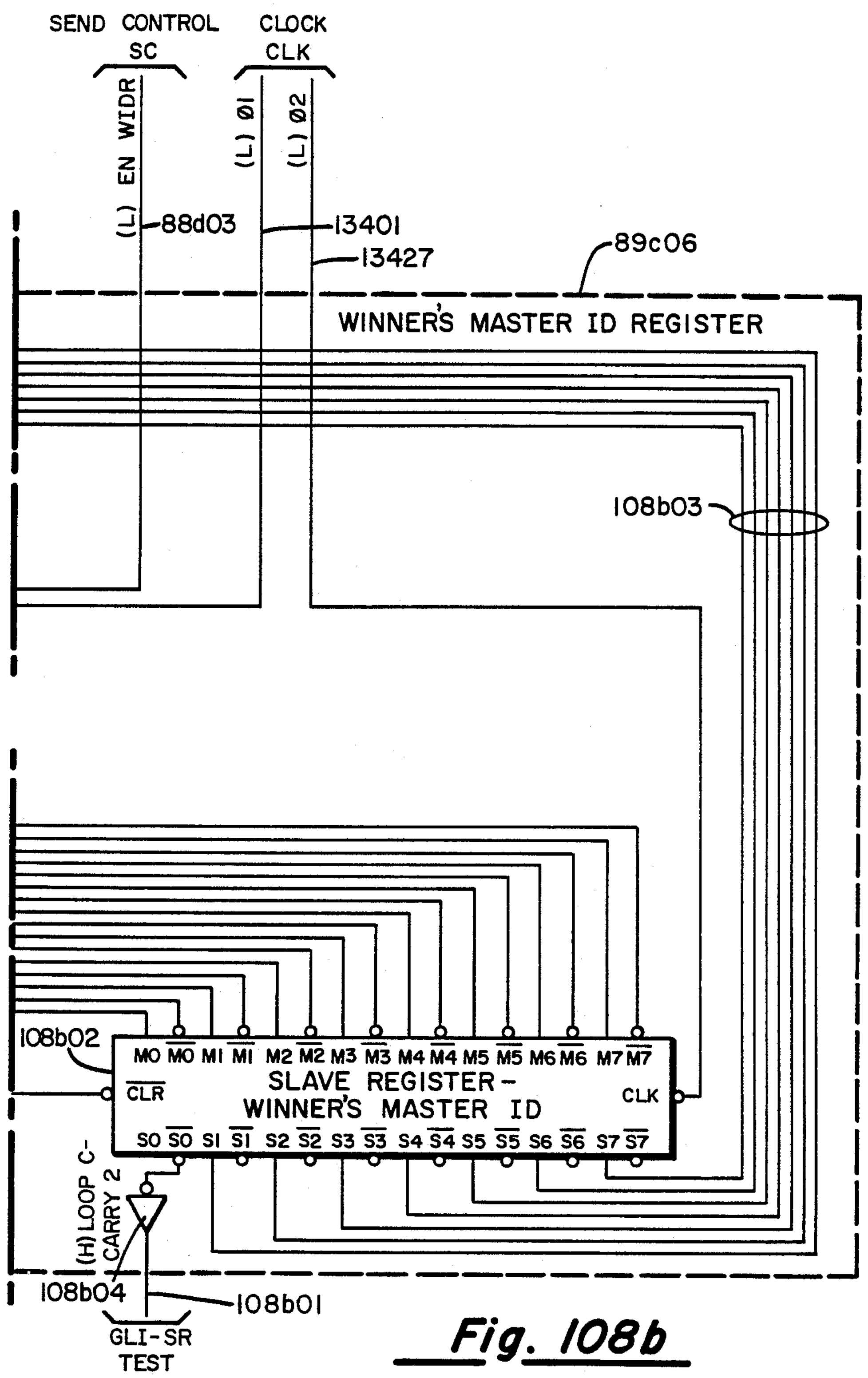

FIG. **108*a* and FIG. 108*b*** show a logic diagram of the Winners Master ID Register functional subsection of the Group Line Input functional section.

Figure 109B:
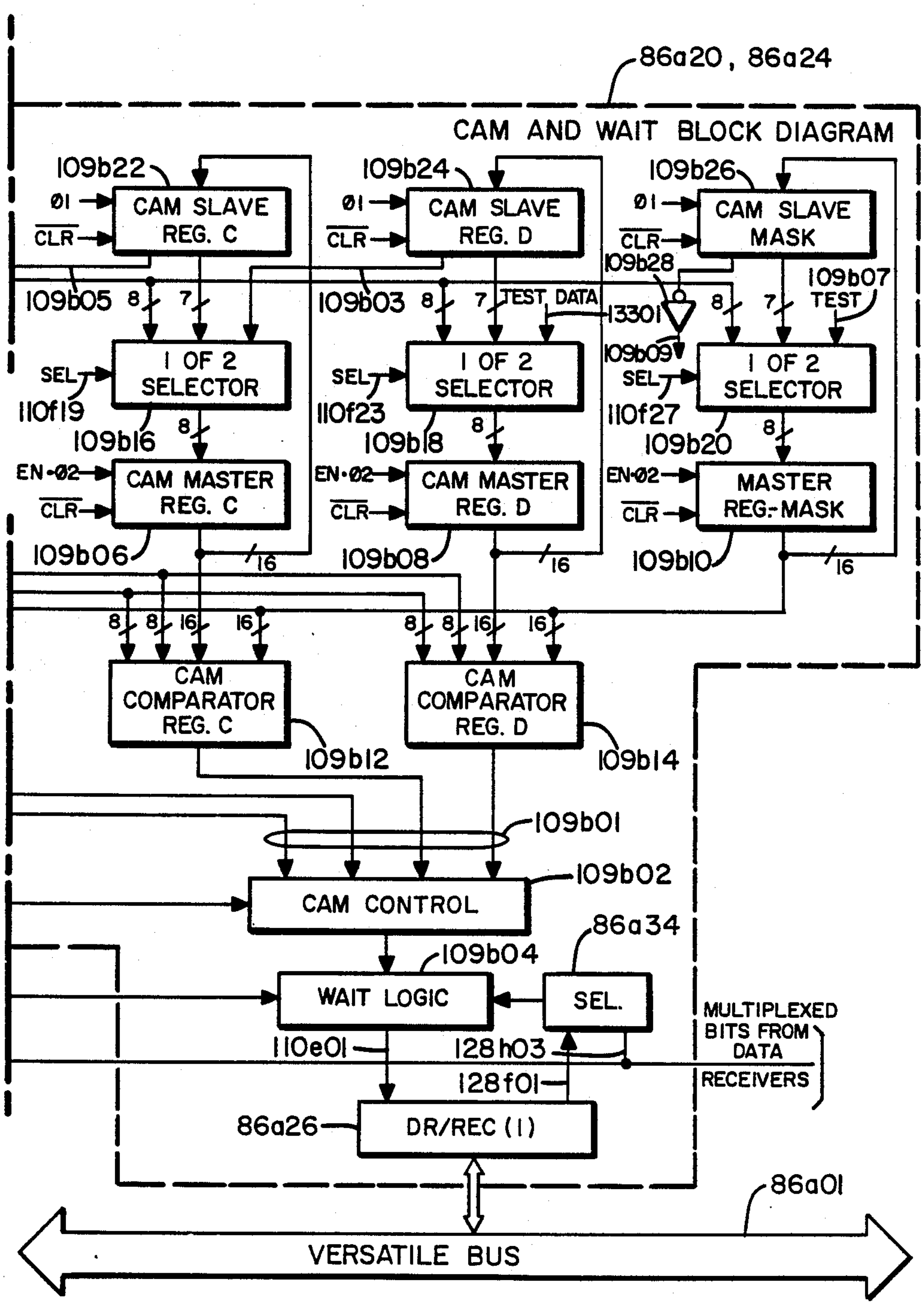

FIG. **109*a* and FIG. 109*b*** show a second level block diagram of the CAM and Wait Control functional section.

Figure 110:
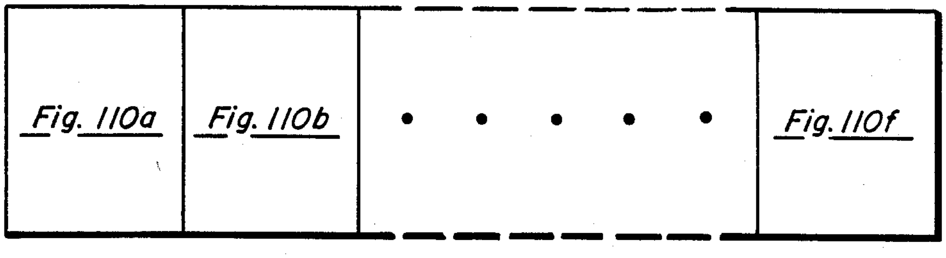
Figure 110A:
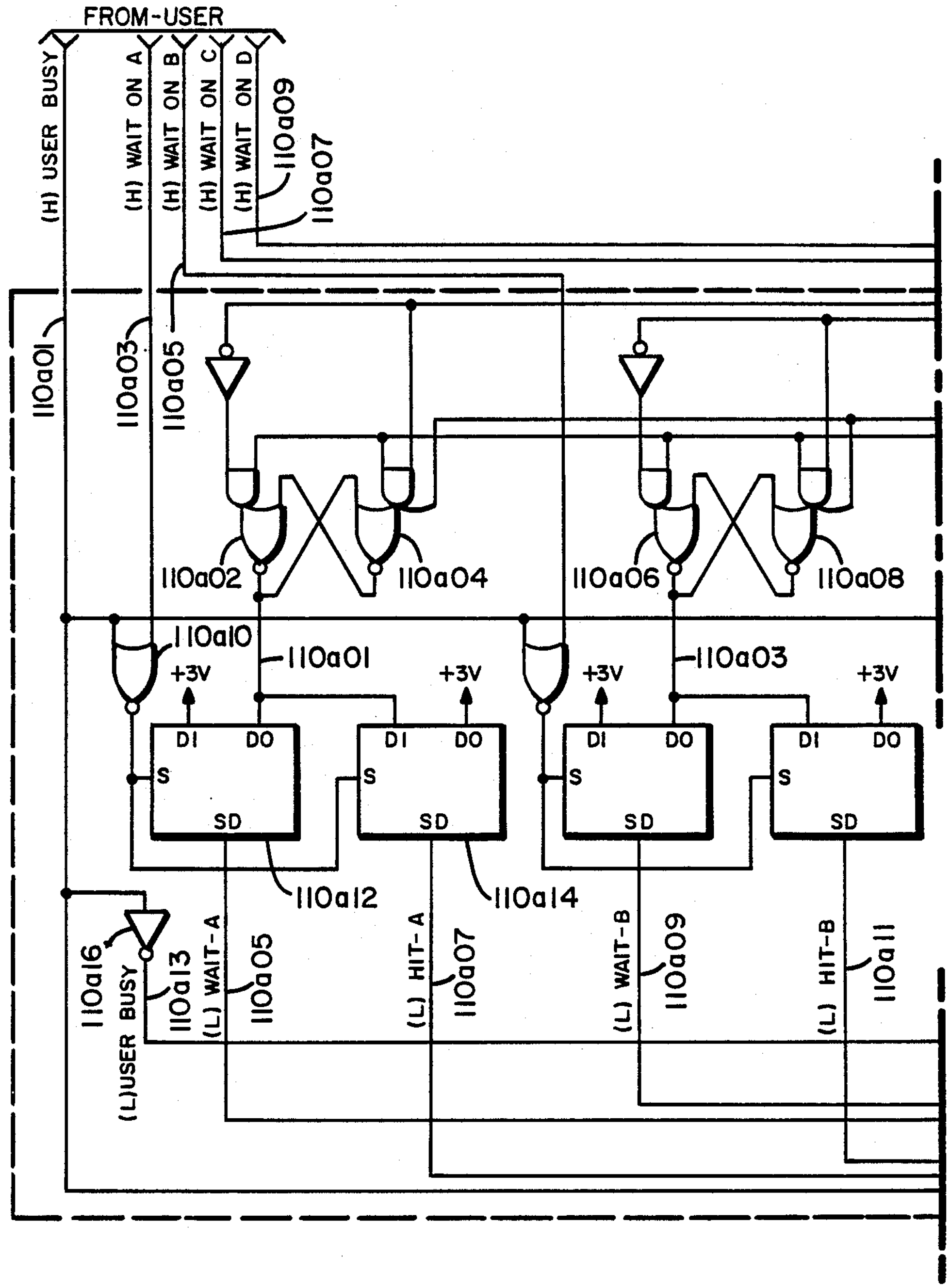
Figure 110B:
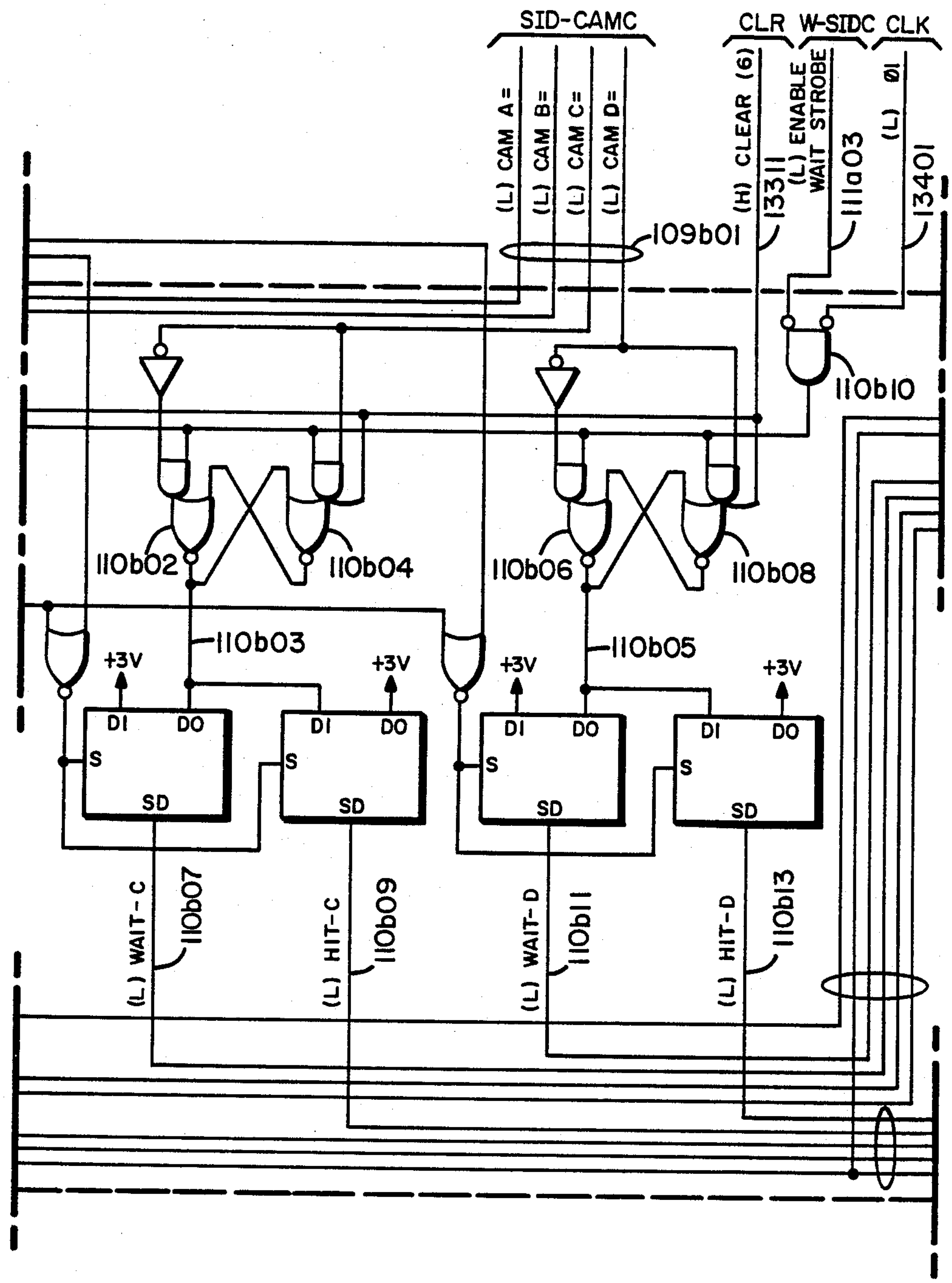
Figure 110C:
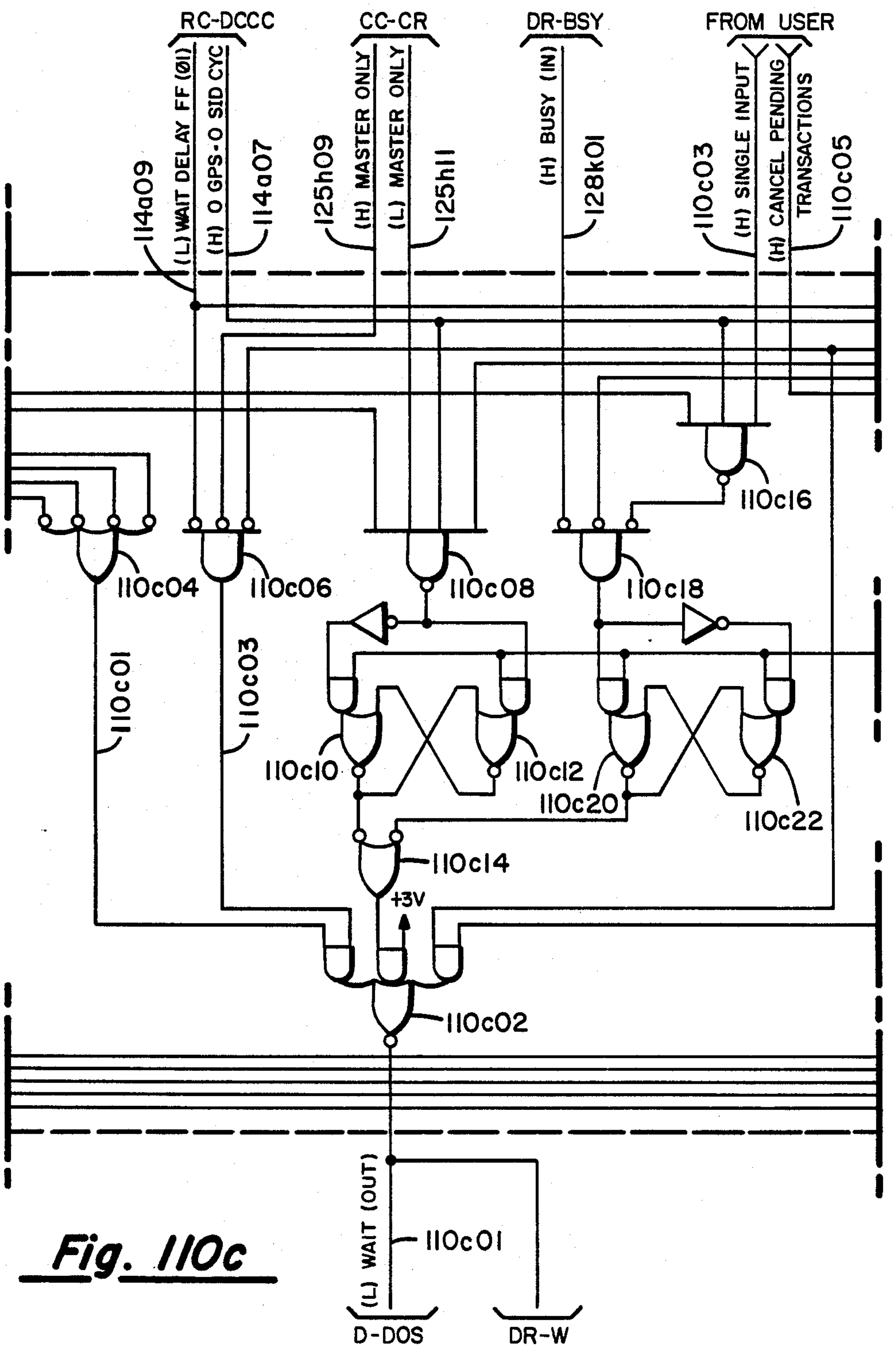
Figure 110D:
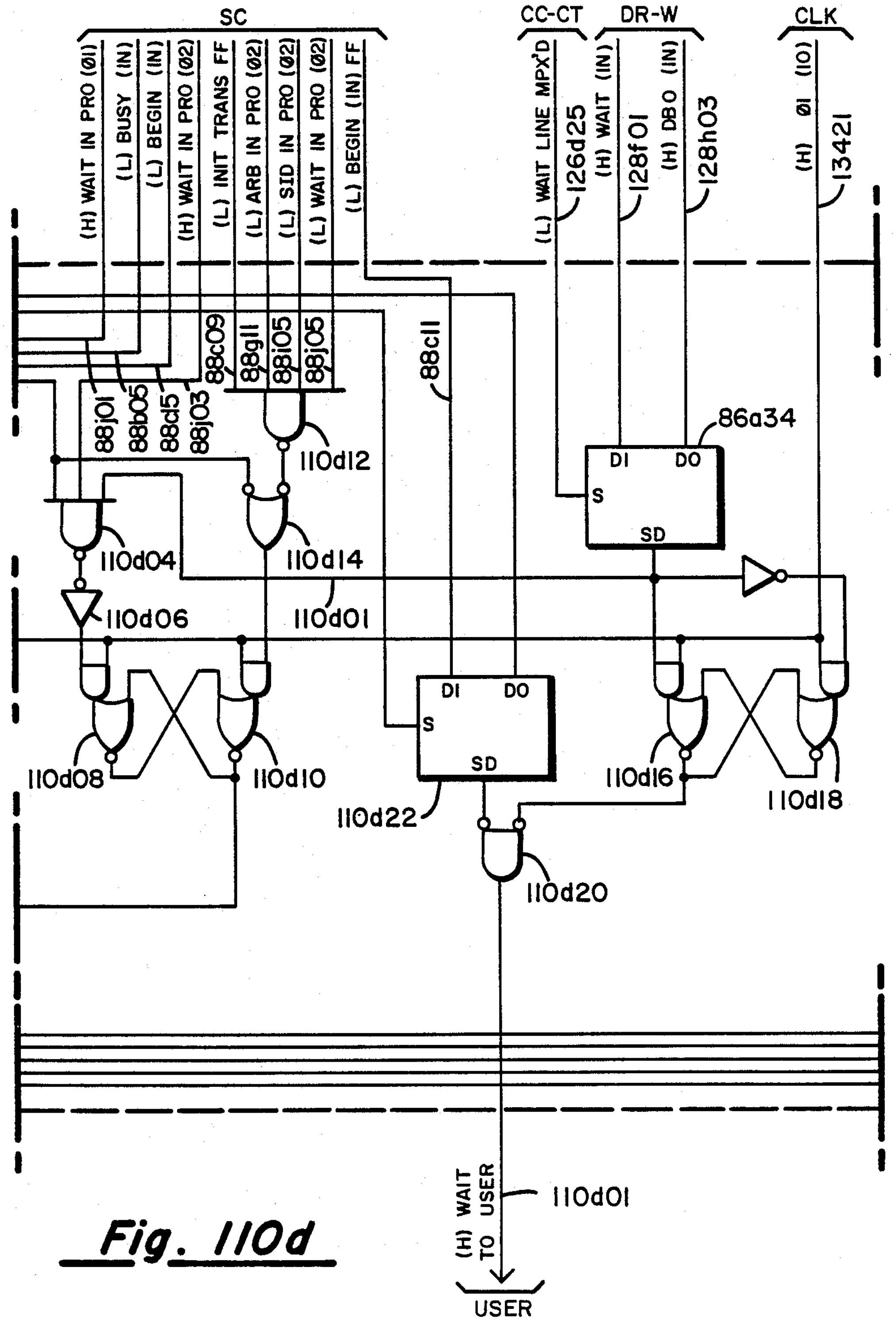
Figure 110E:
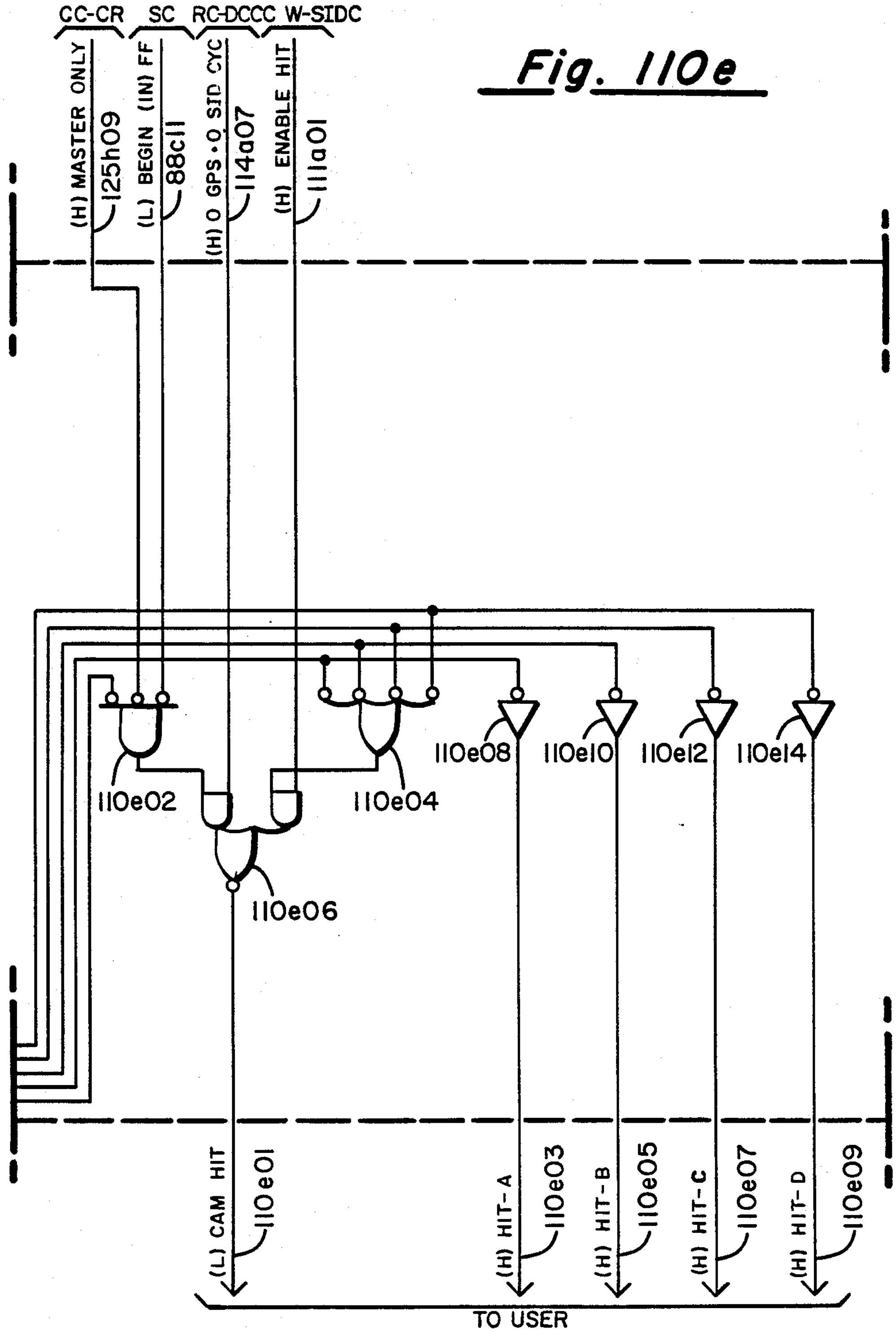
Figure 110F:
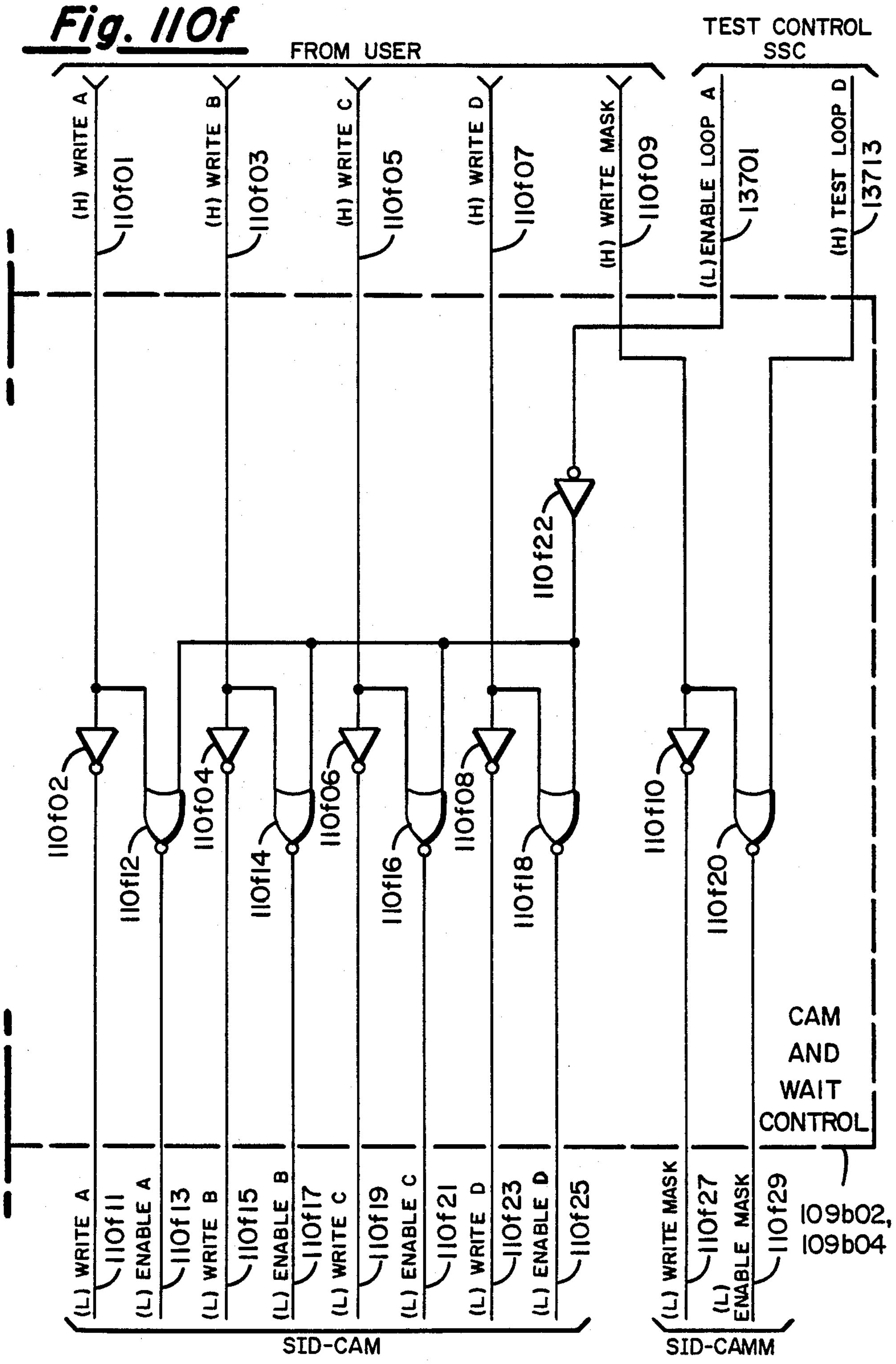

FIG. **110*a* through FIG. 110*f*** show a logic diagram of the Wait Detection, Wait Control, and CAM Control functional subsections collectively called the CAM and Wait Control functional section.

Figure 111:
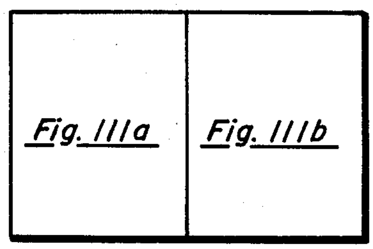
Figure 111A:
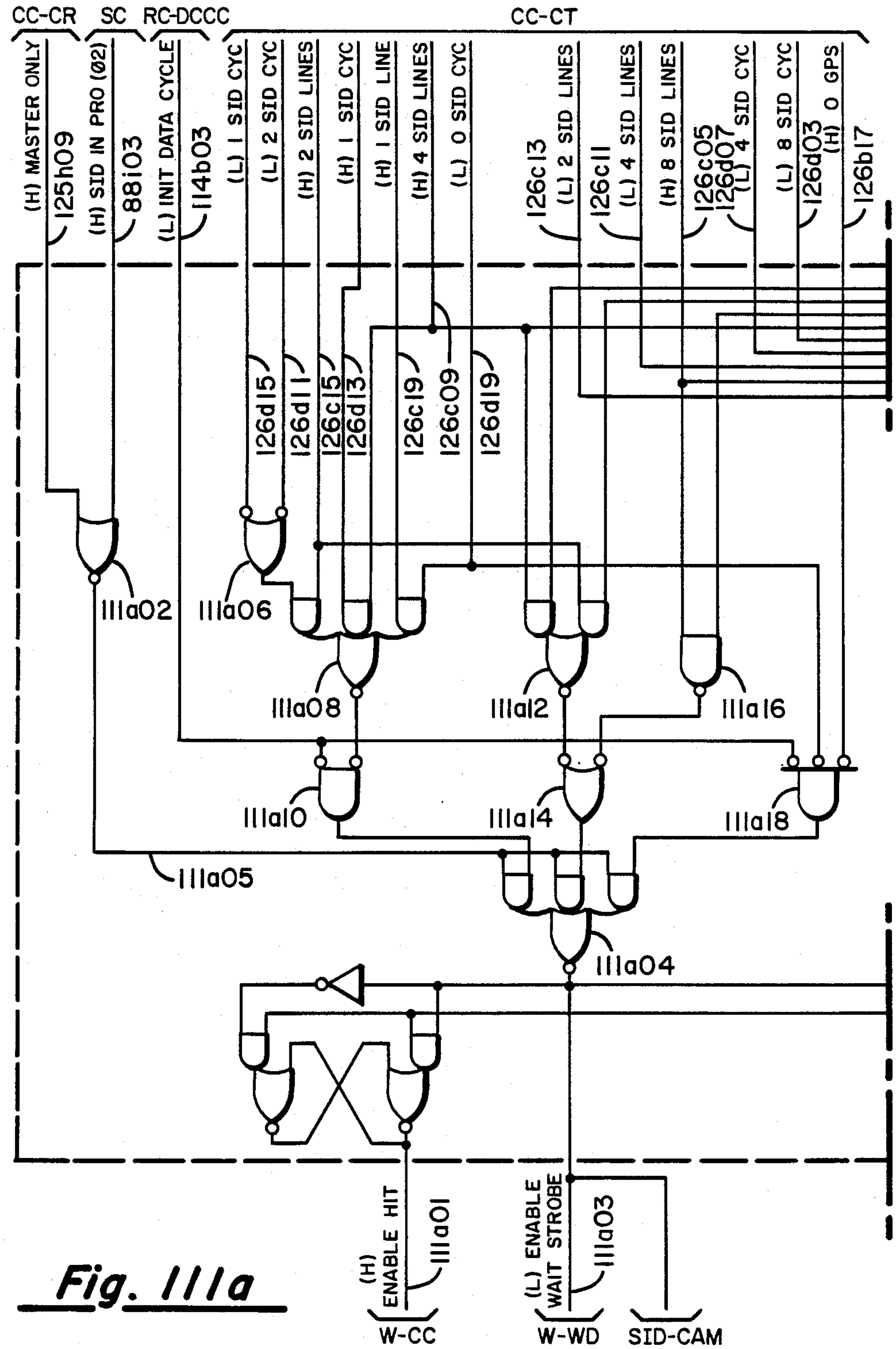
Figure 111B:
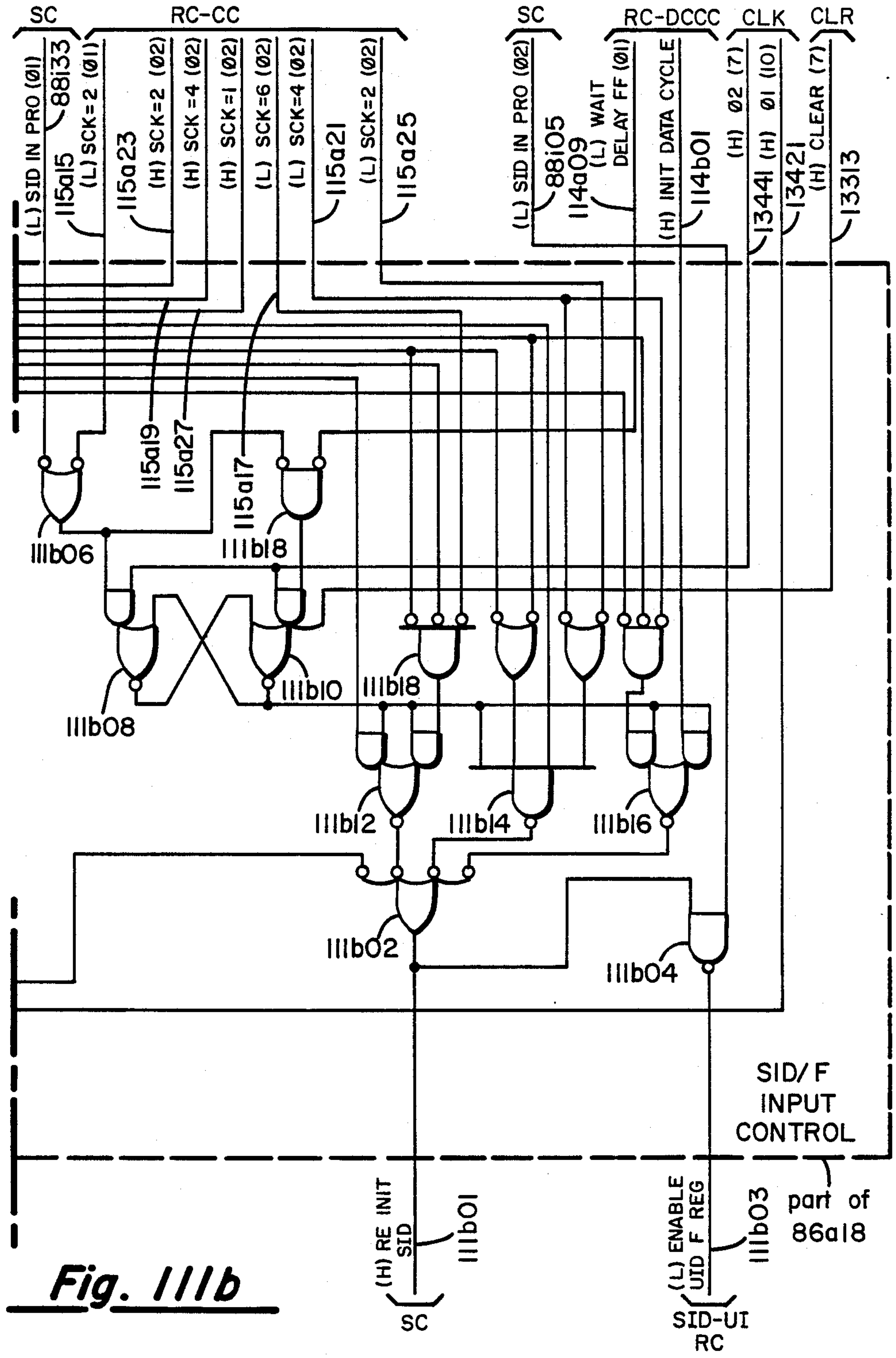

FIG. **111*a* and FIG. 111*b*** show a logic diagram of the SID/F Inut Control functional subsection of the Slave ID functional section.

Figure 112:
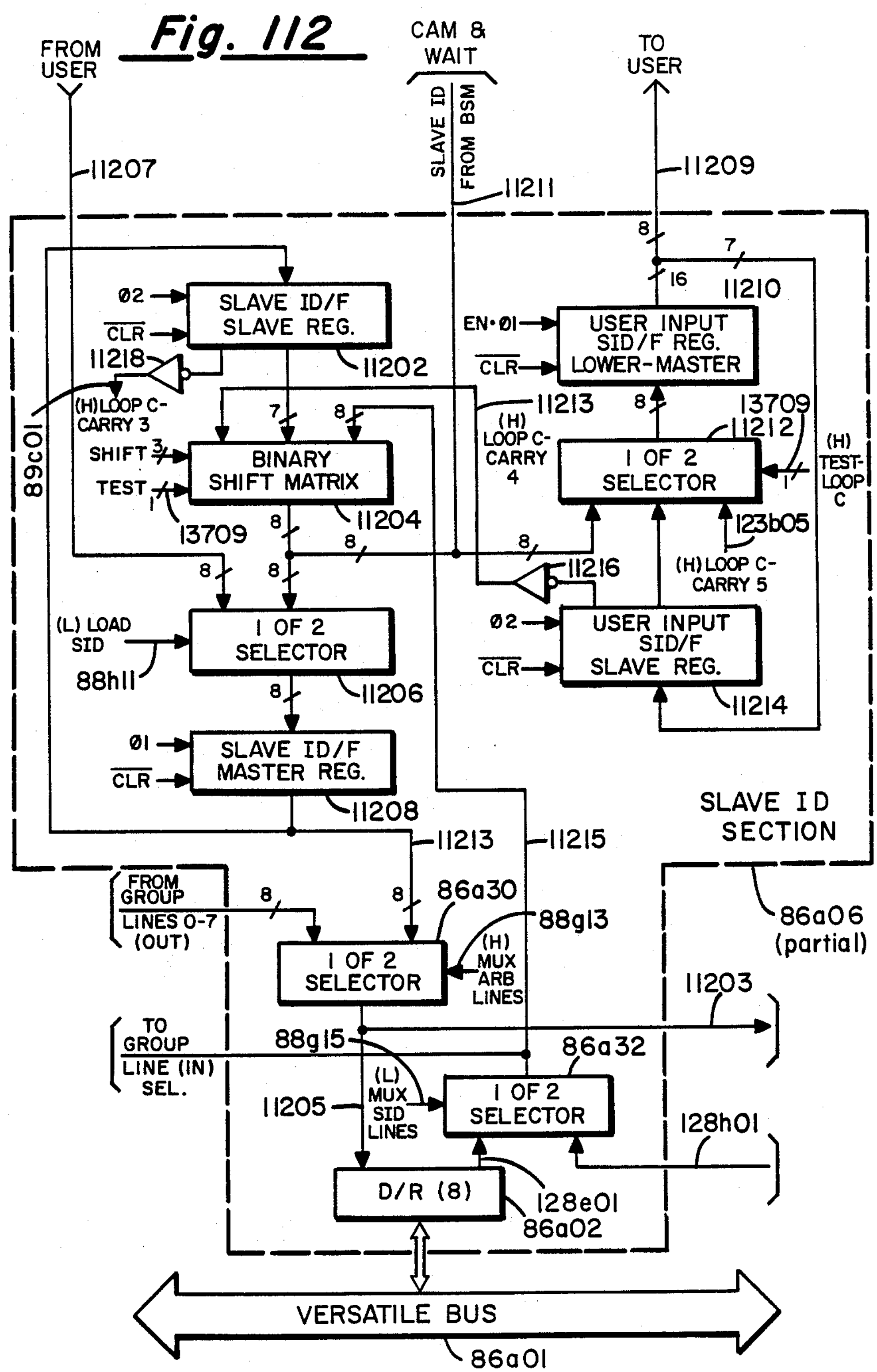

FIG. 112 shows a second level block diagram of the Slave Identification/Function functional section.

Figure 113:
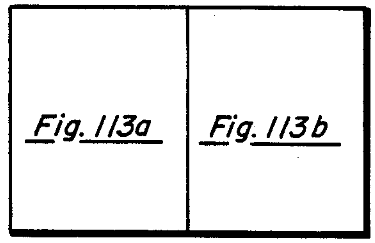
Figure 113A:
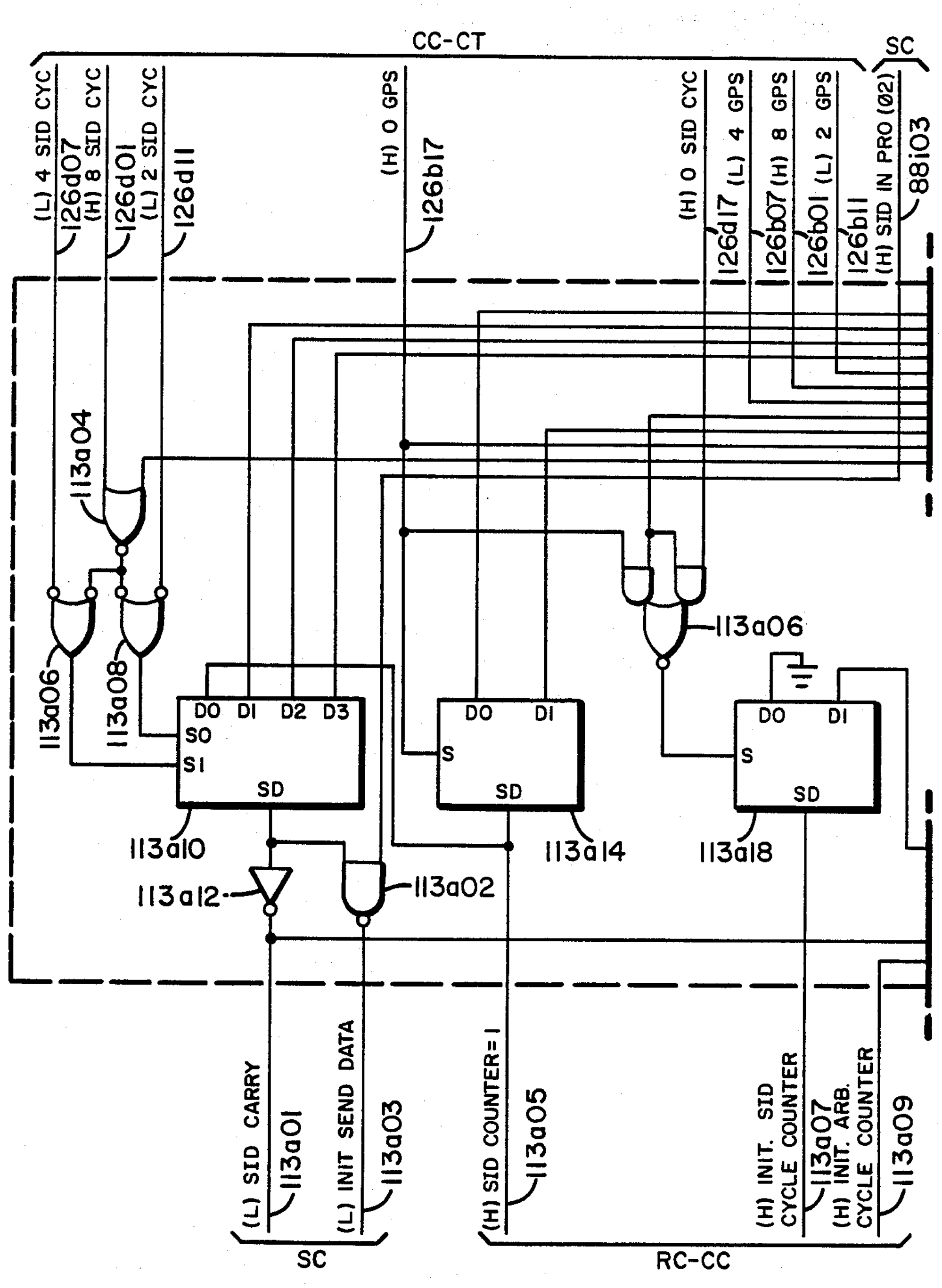
Figure 113B:
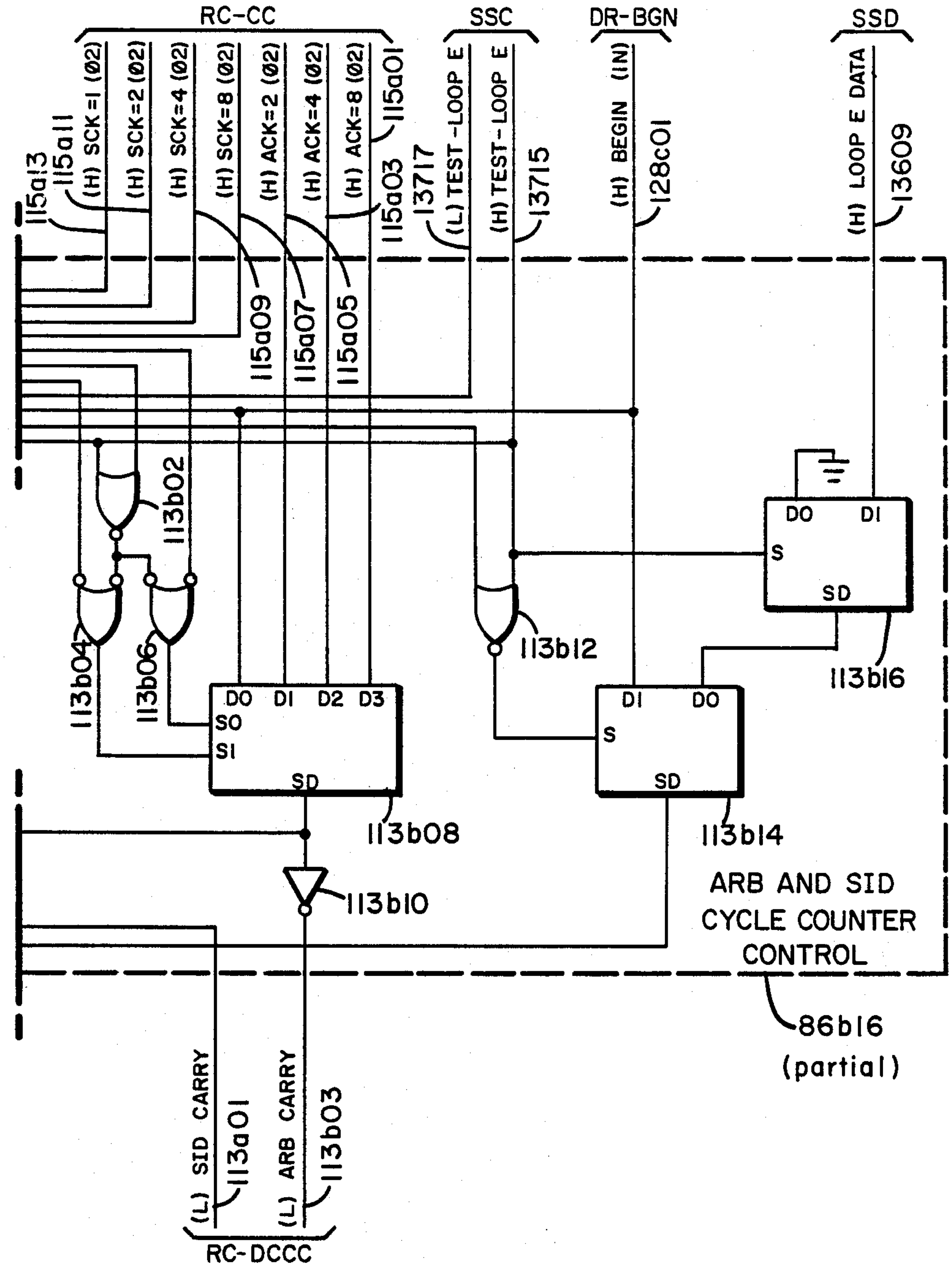

FIG. **113*a* and FIG. 113*b*** show a logic diagram of the ARB and SID Cycle Counter Control functional subsection of the Receive Counter Control functional section.

Figure 114:
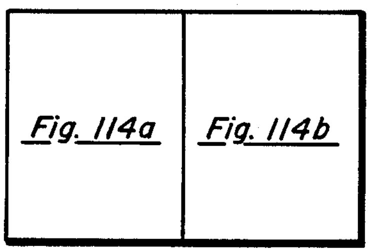

FIGS. 114 and **114*b*** show a logic diagram of the Data Cycle Counter Control functional subsection of the Receive Counter Control functional section.

Figures 2, 115A:
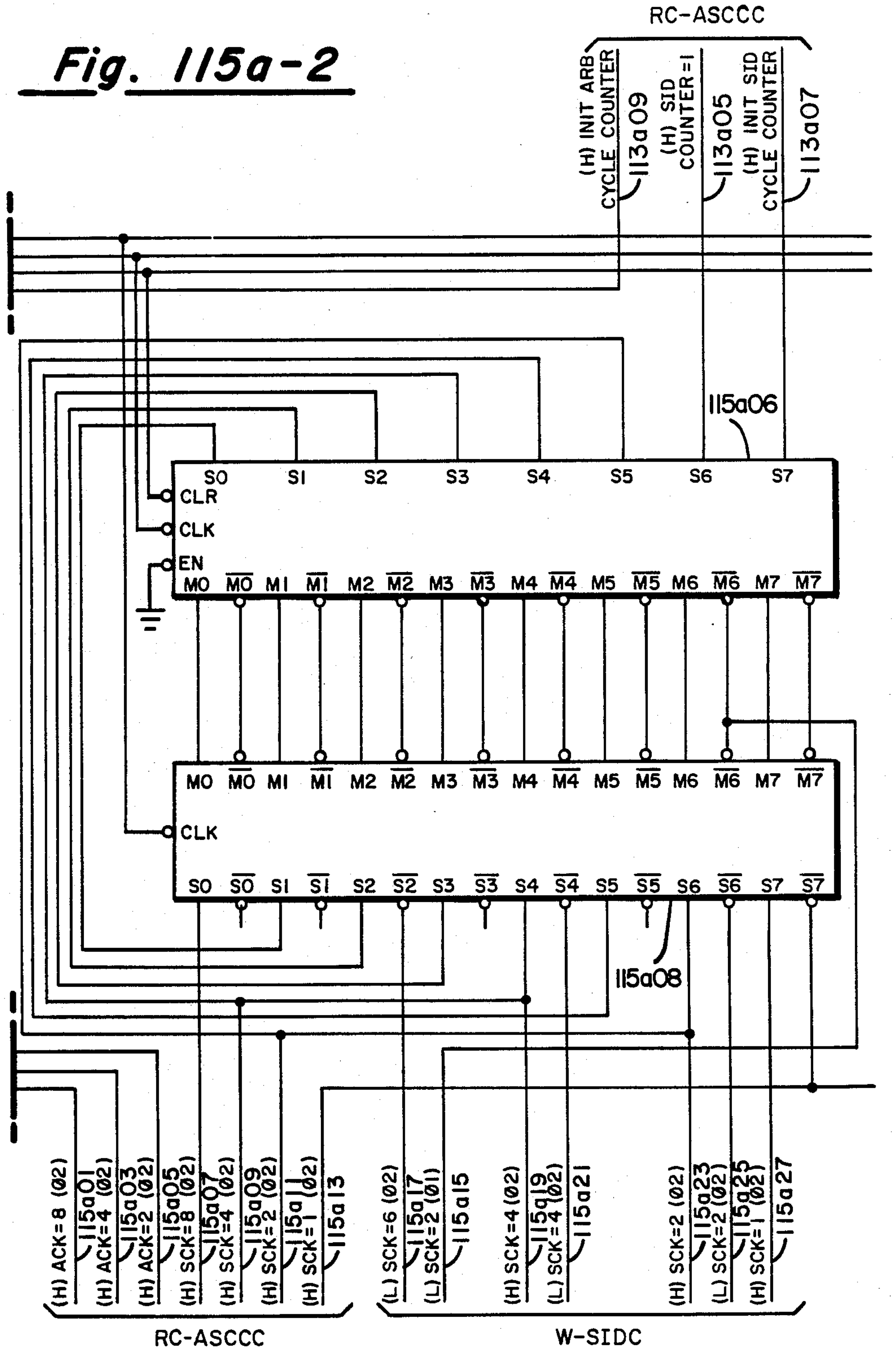
Figures 1, 2, 115B:
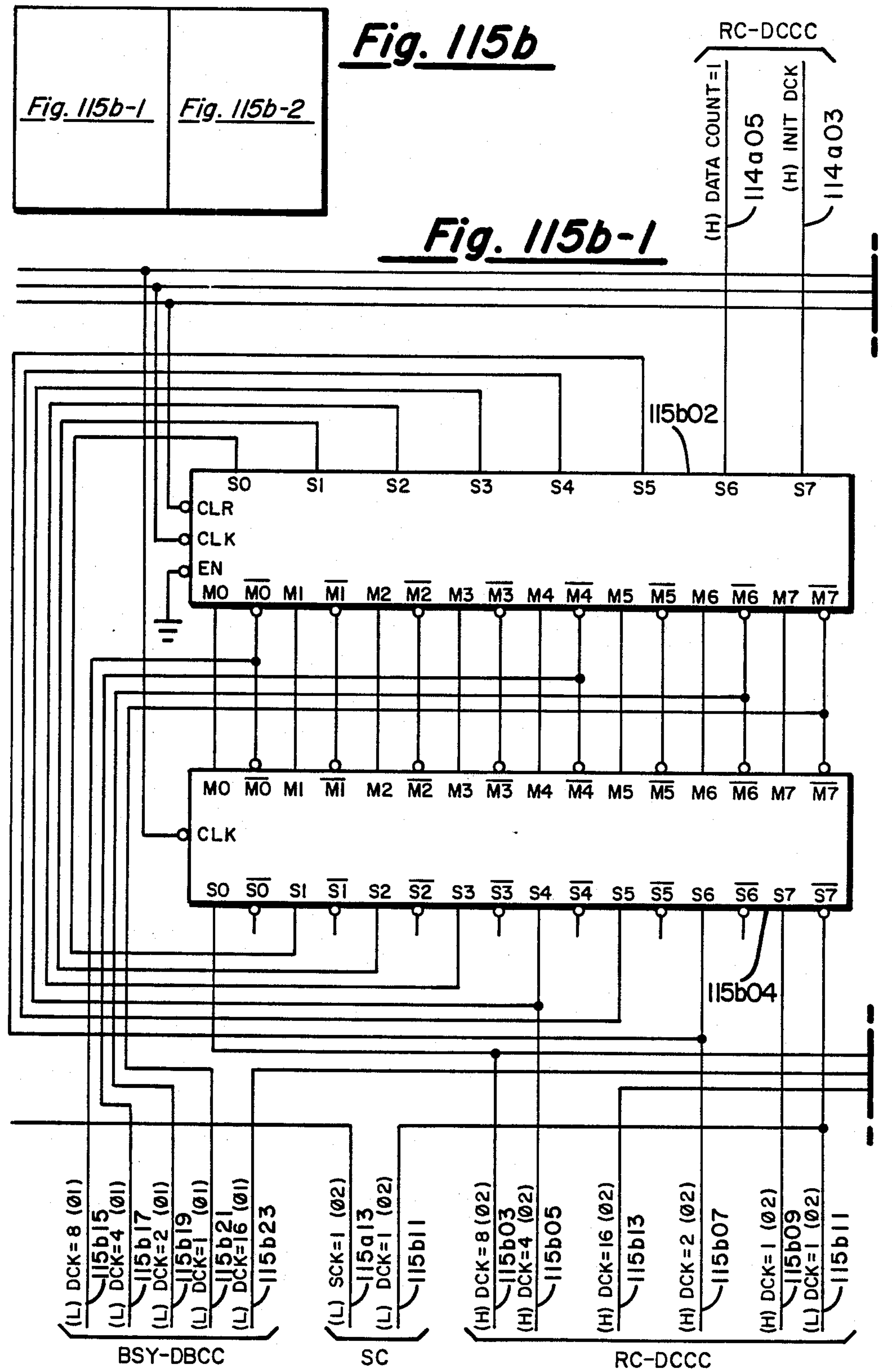

FIG. **115*a* and FIG. 115*b*** show the ARB, SID, and DATA Cycle Counter functional subsections of the Receive Control functional section.

Figure 116:
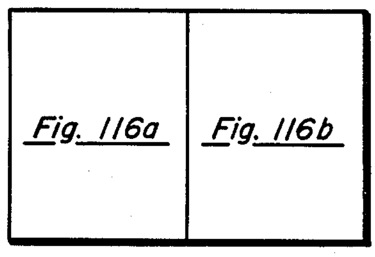
Figure 116A:
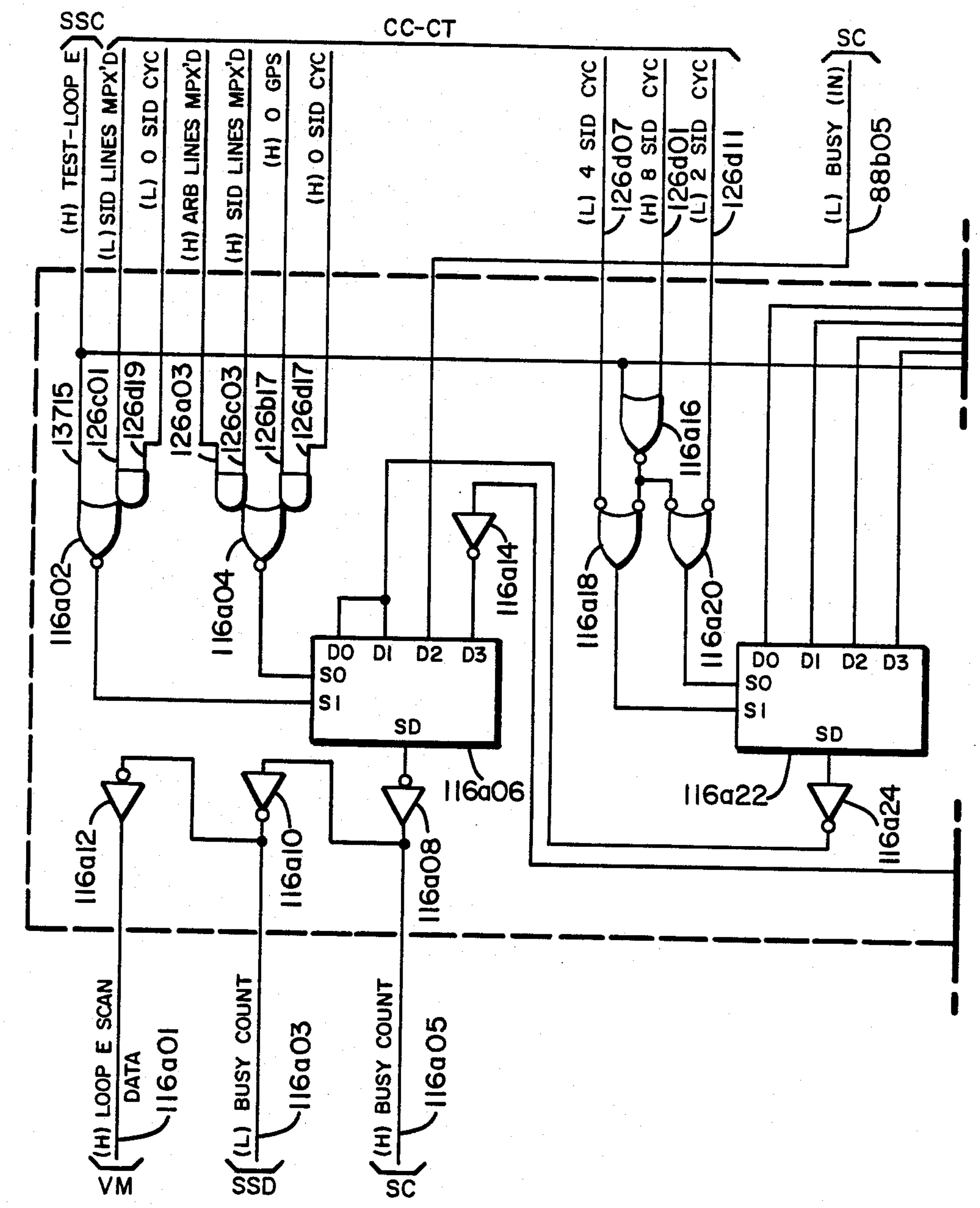
Figure 116B:
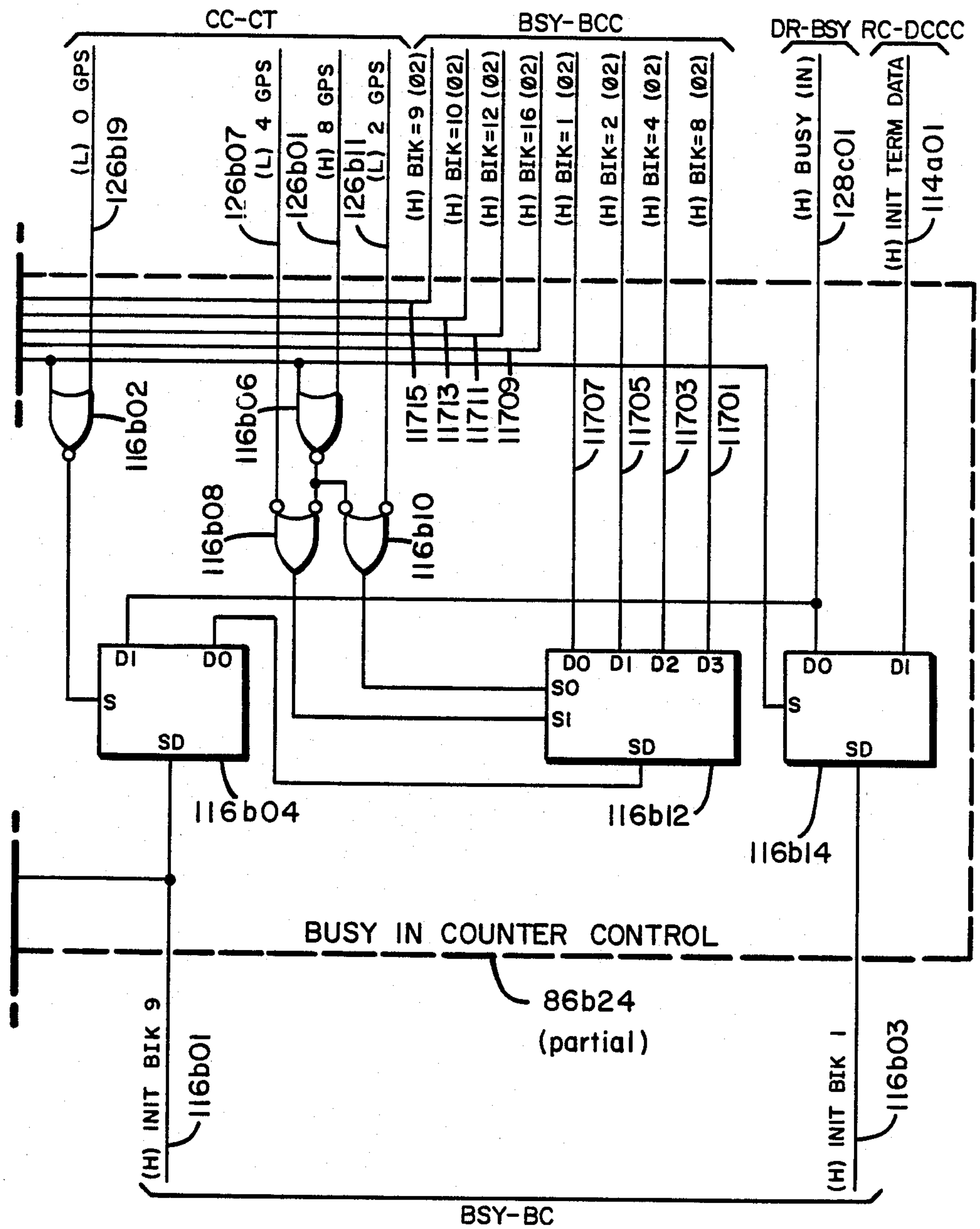

FIG. **116*a* and FIG. 116*b*** show the Busy In Counter Control functional subsection of the Busy functional section.

Figure 117A:
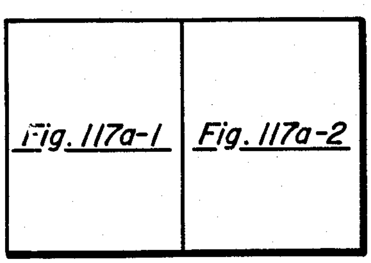
Figures 1, 117A:
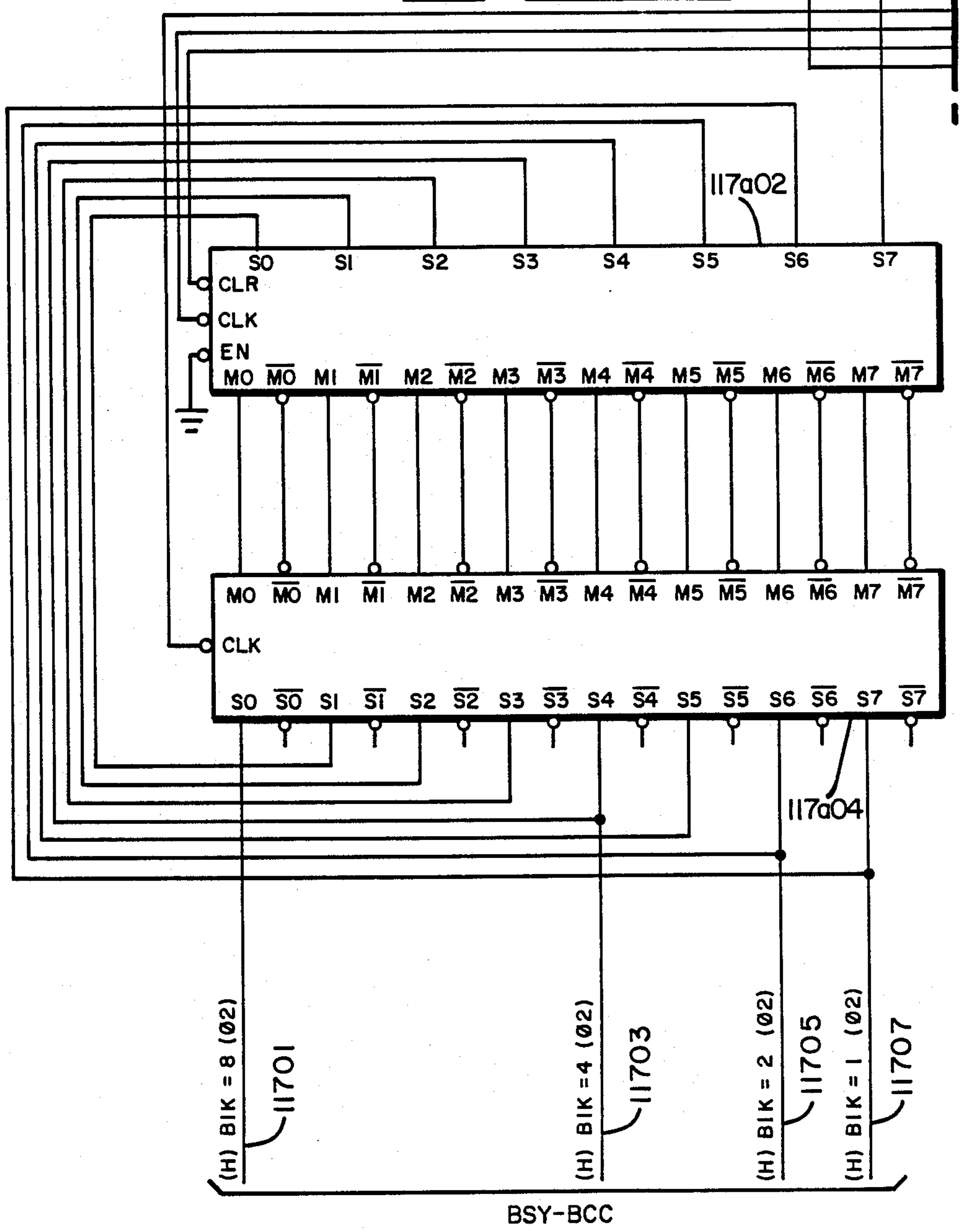
Figures 2, 117A:
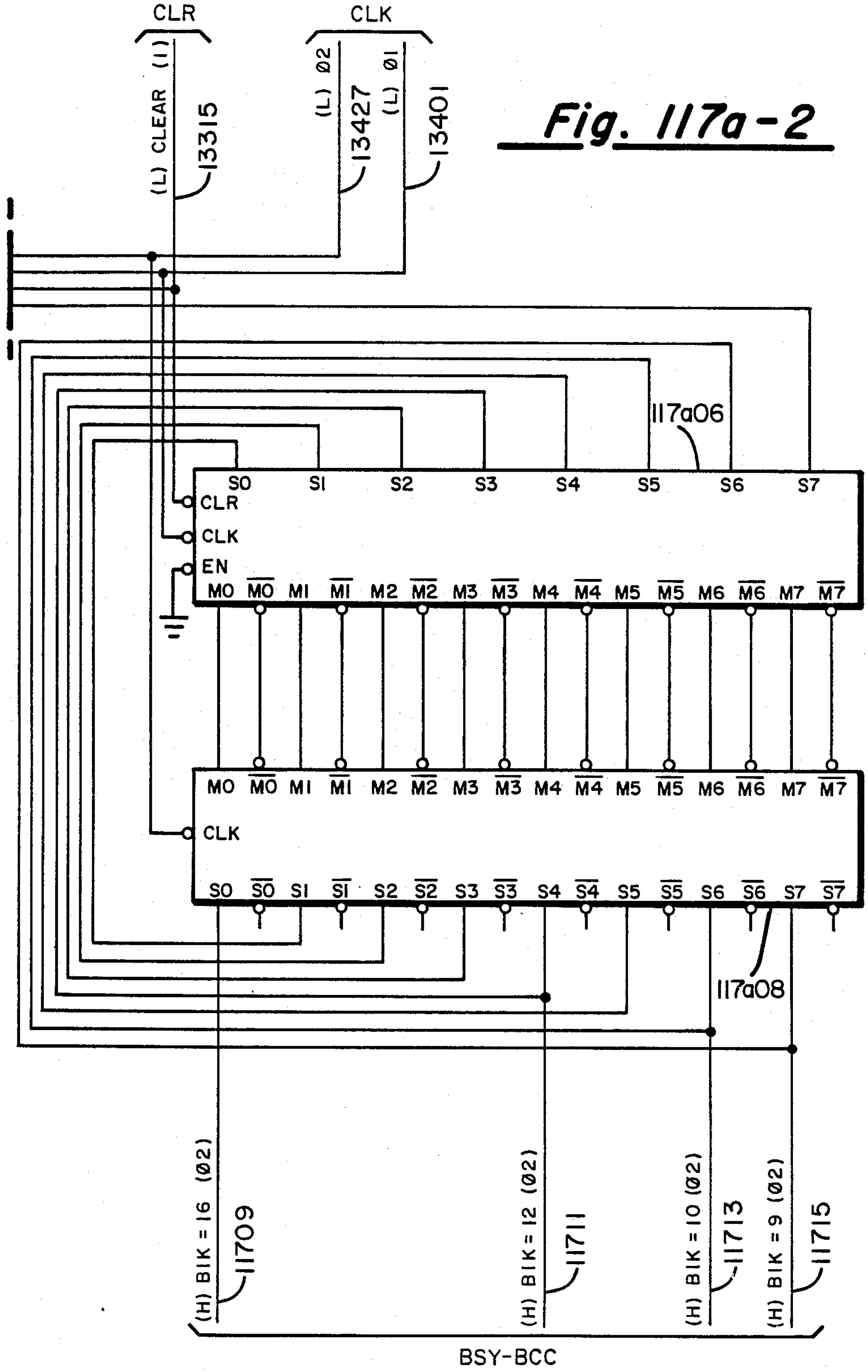

FIG. 117 shows a logic diagram of the Busy In Counter functional subsection of the Busy functional section.

Figure 118:
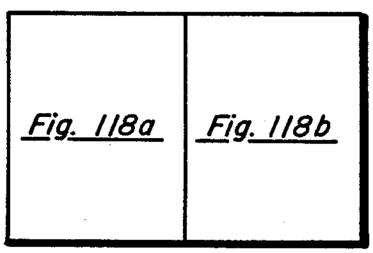
Figure 118A:
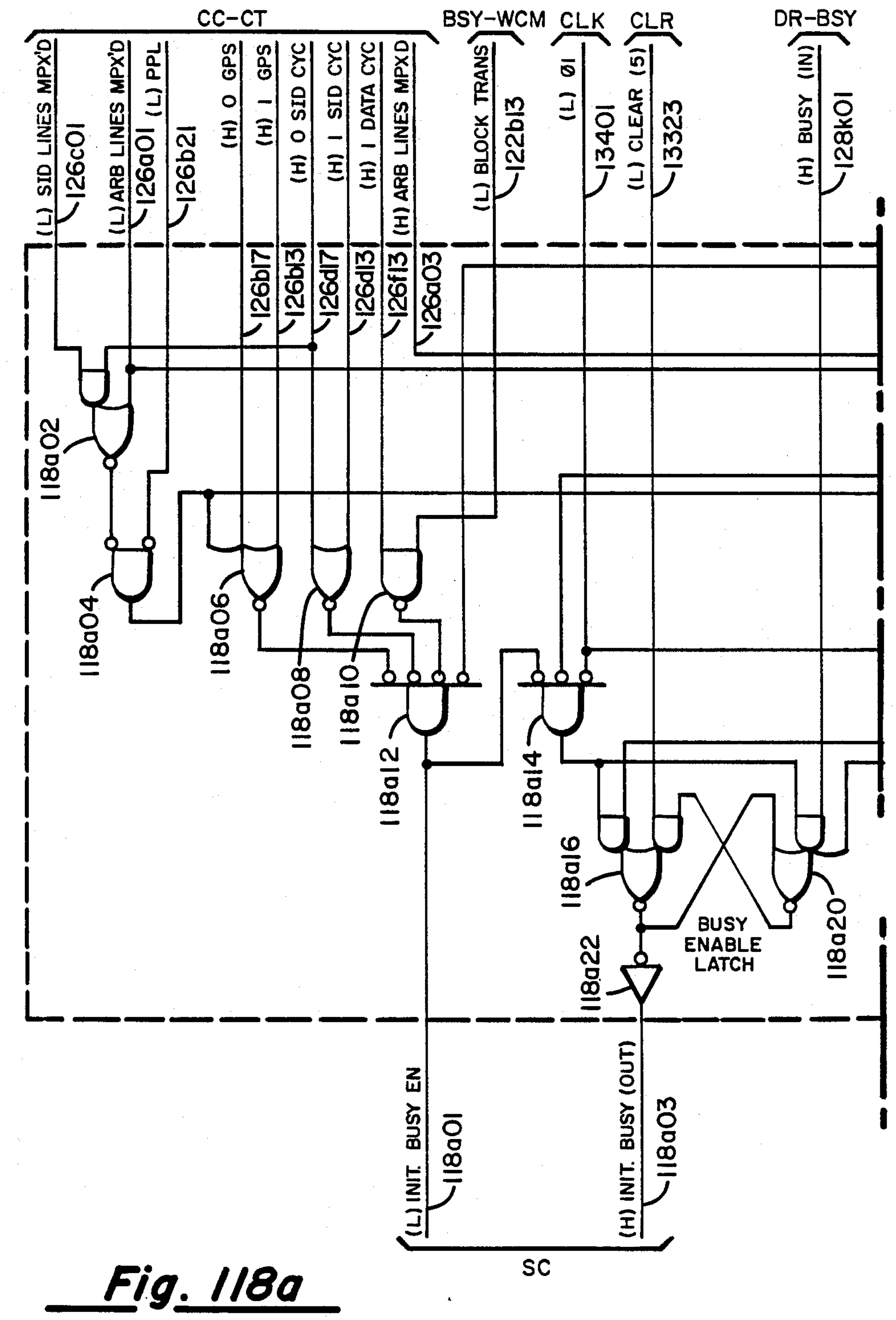
Figure 118B:
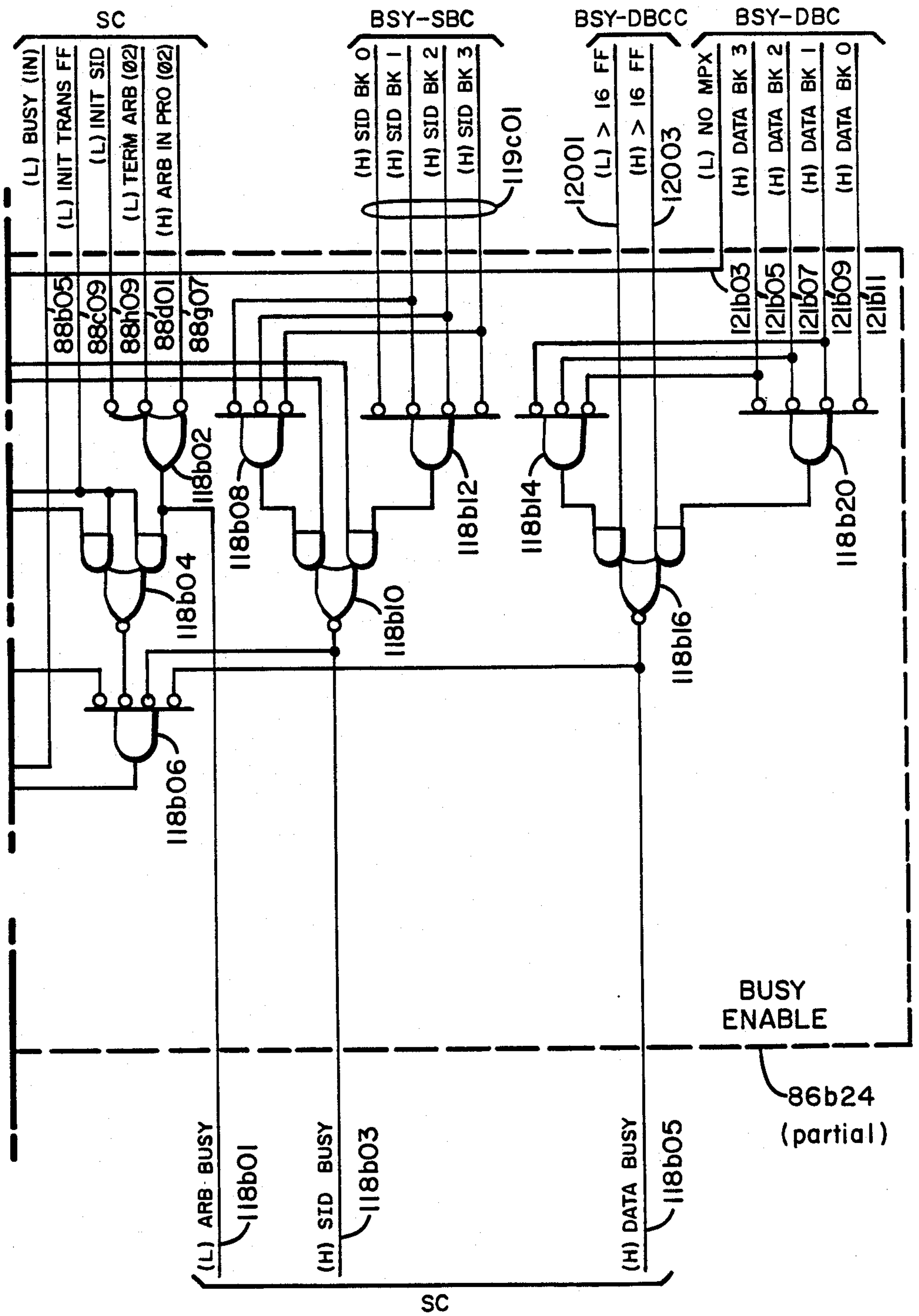

FIG. 118*a* and FIG. 118*b* show a logic diagram of the Busy Enable functional subsection of the Busy functional section.

Figure 119:
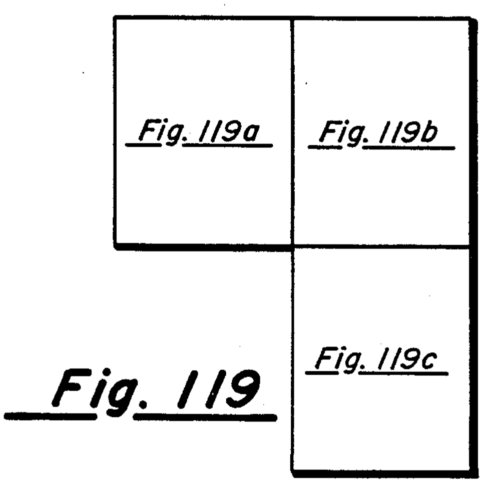
Figure 119A:
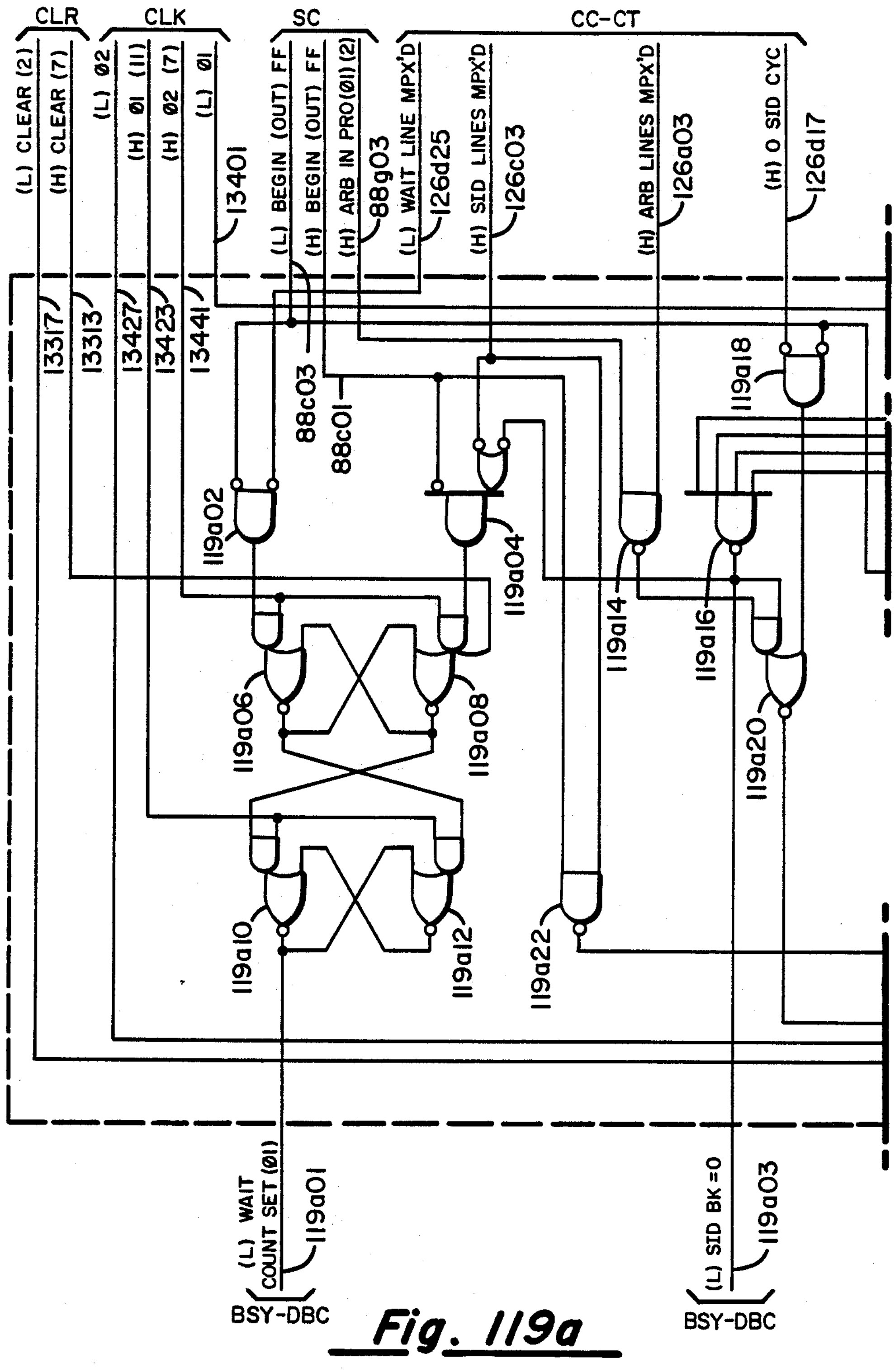
Figure 119B:
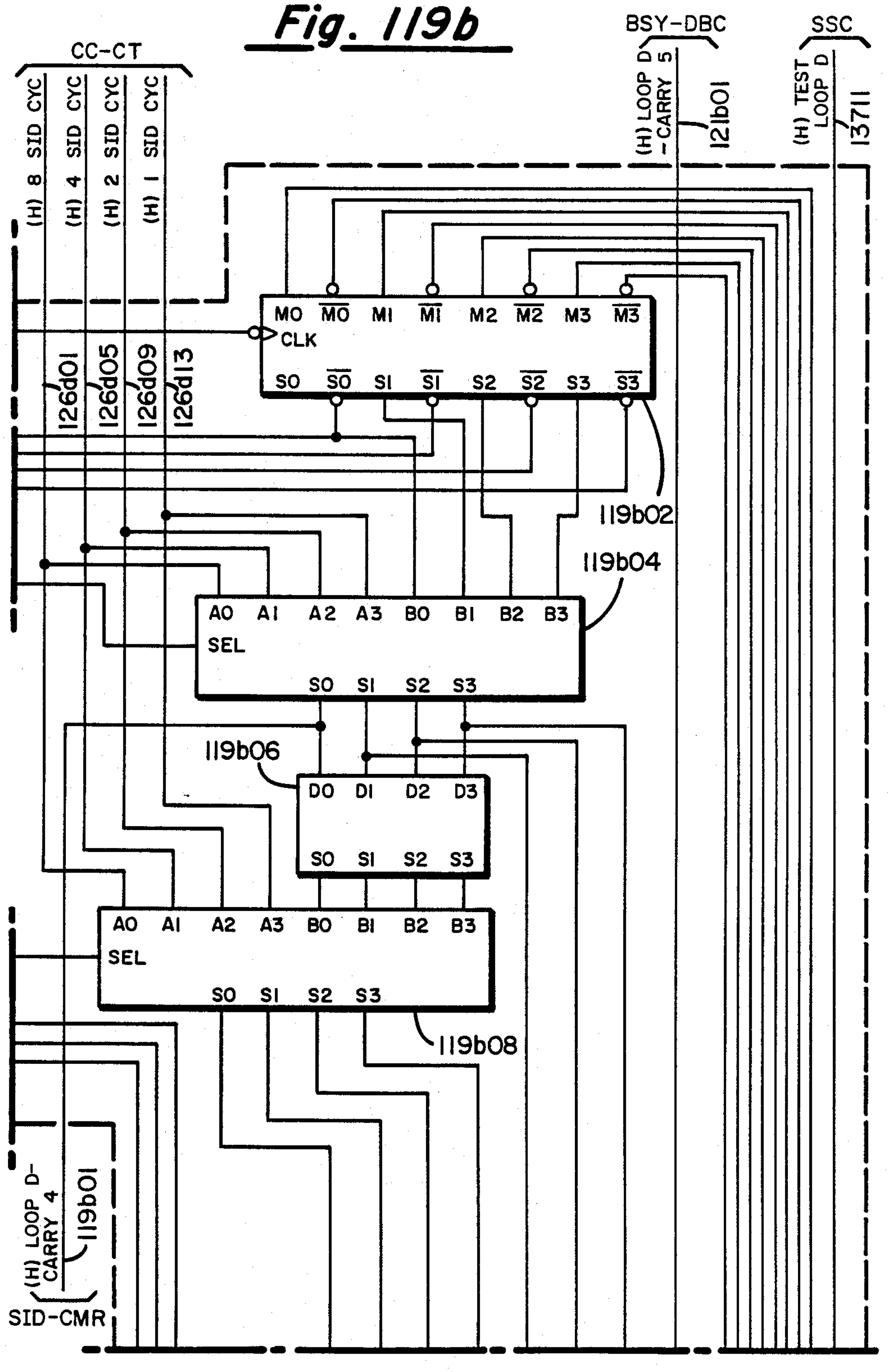
Figure 119C:
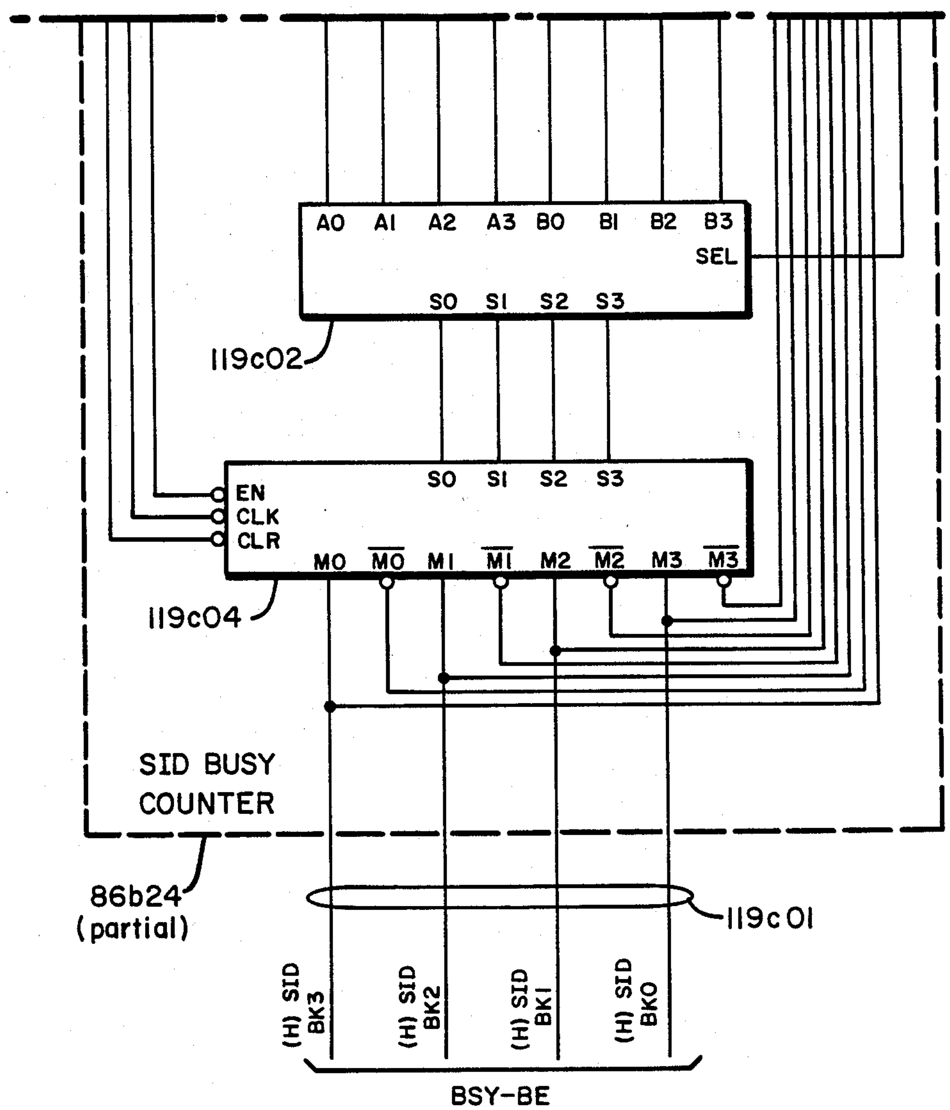

FIG. 119*a* through FIG. 119*c* show a logic diagram of the SID Busy Counter and the Wait Busy Counter functional subsections of the Busy functional section.

Figure 120:
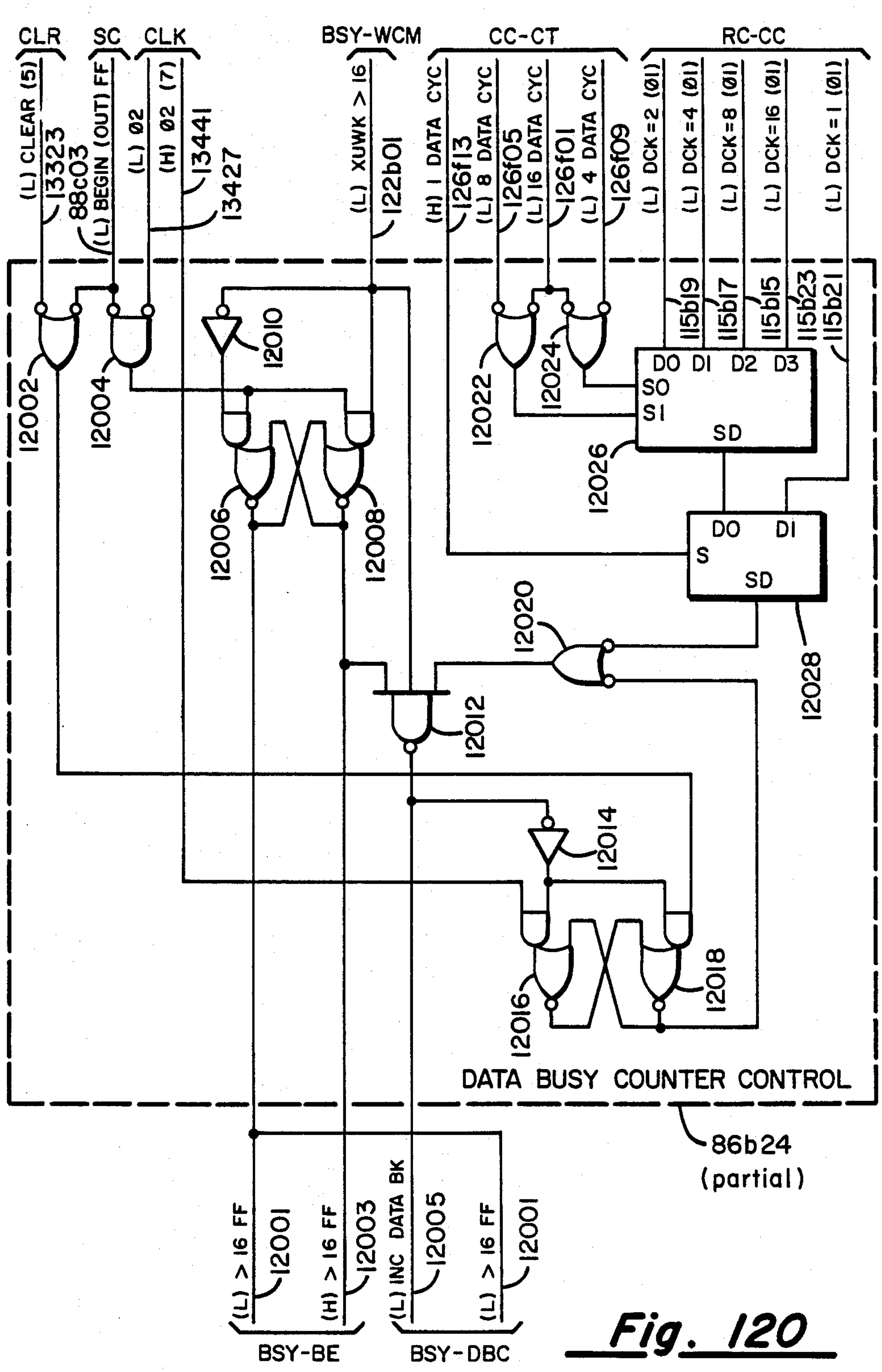

FIG. 120 shows a logic diagram of the Data Busy Counter Control functional subsection of the Busy functional section.

Figure 121A:
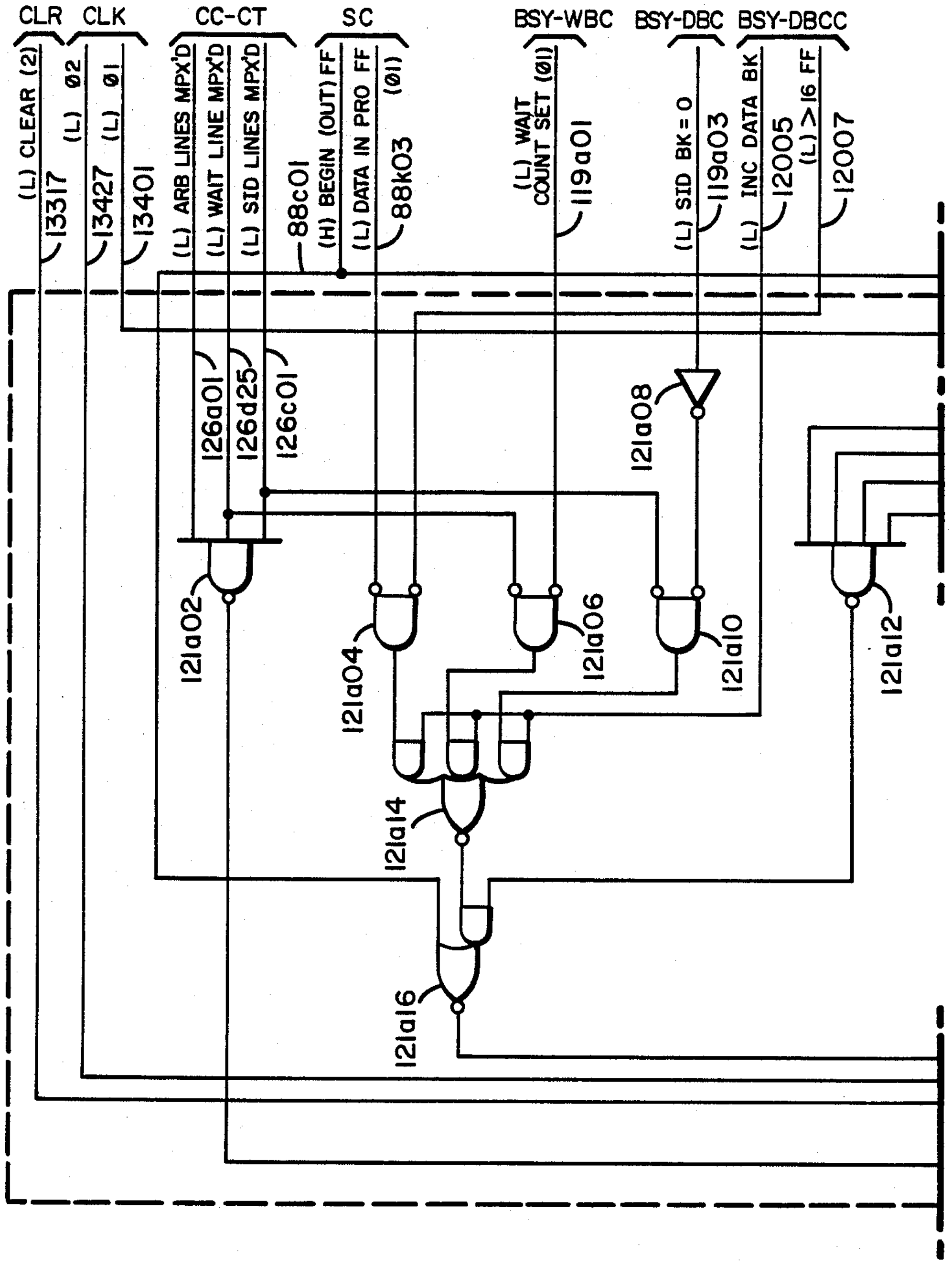
Figure 121B:
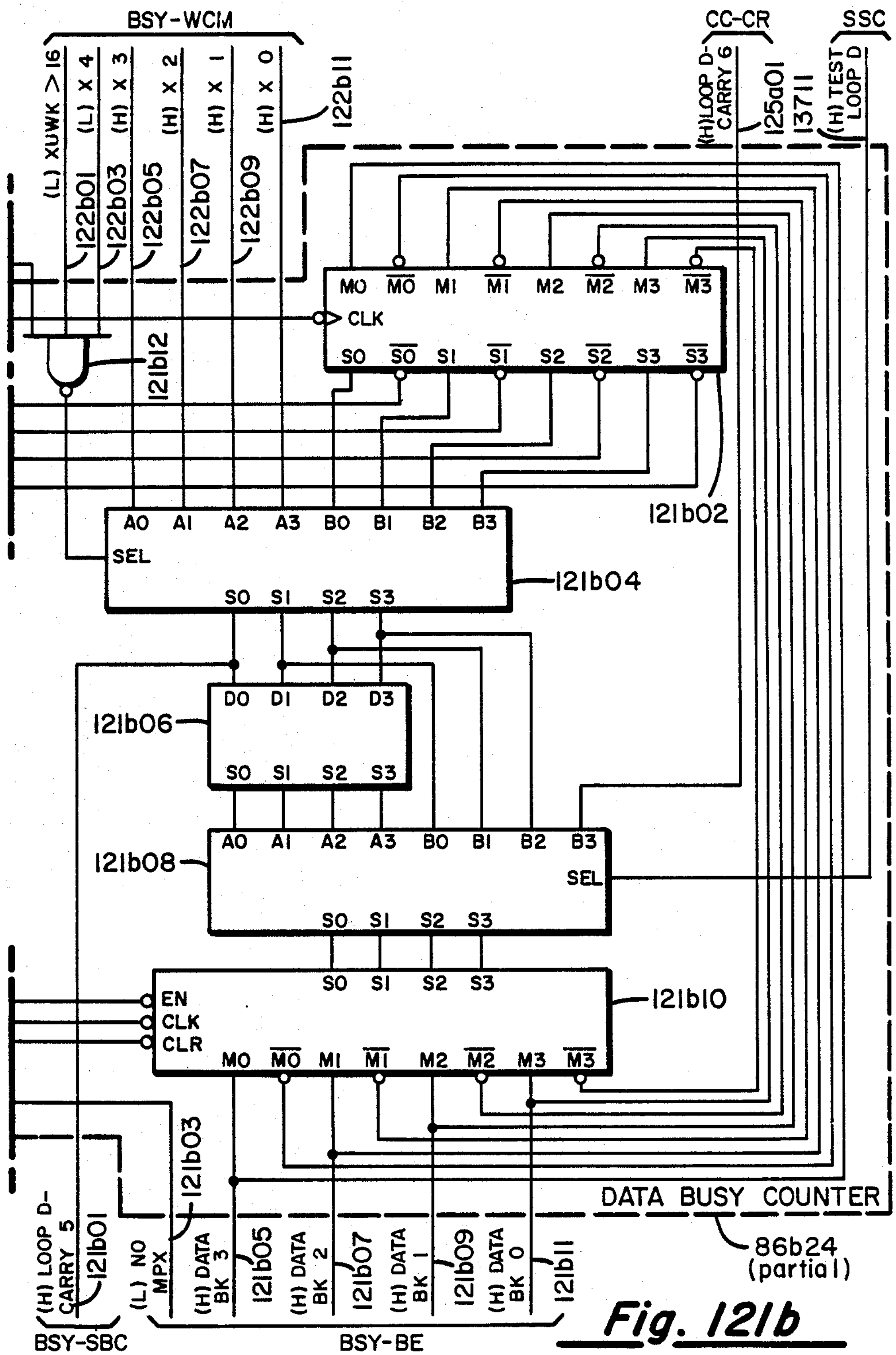

FIG. 121*a* and FIG. 121*b* show a logic diagram of the Data Busy Counter functional subsection of the Busy functional section.

Figures 121, 121A, 121B, 122, 122A, 122B, 125, 125A, 125B, 125F, 125G, 125H, 126, 126A, 126B, 126F, 128, 128A, 128B:
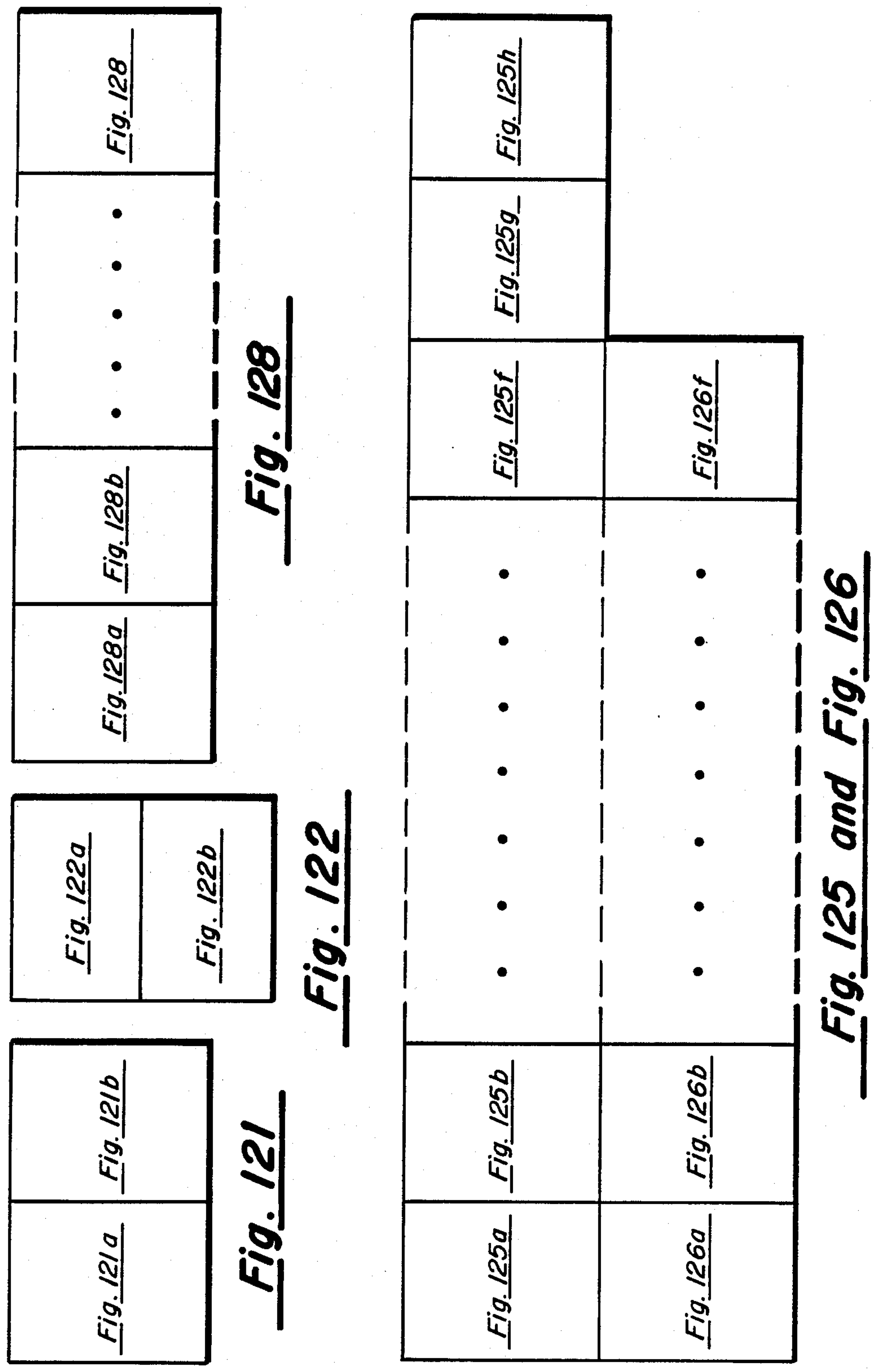
Figure 122A:
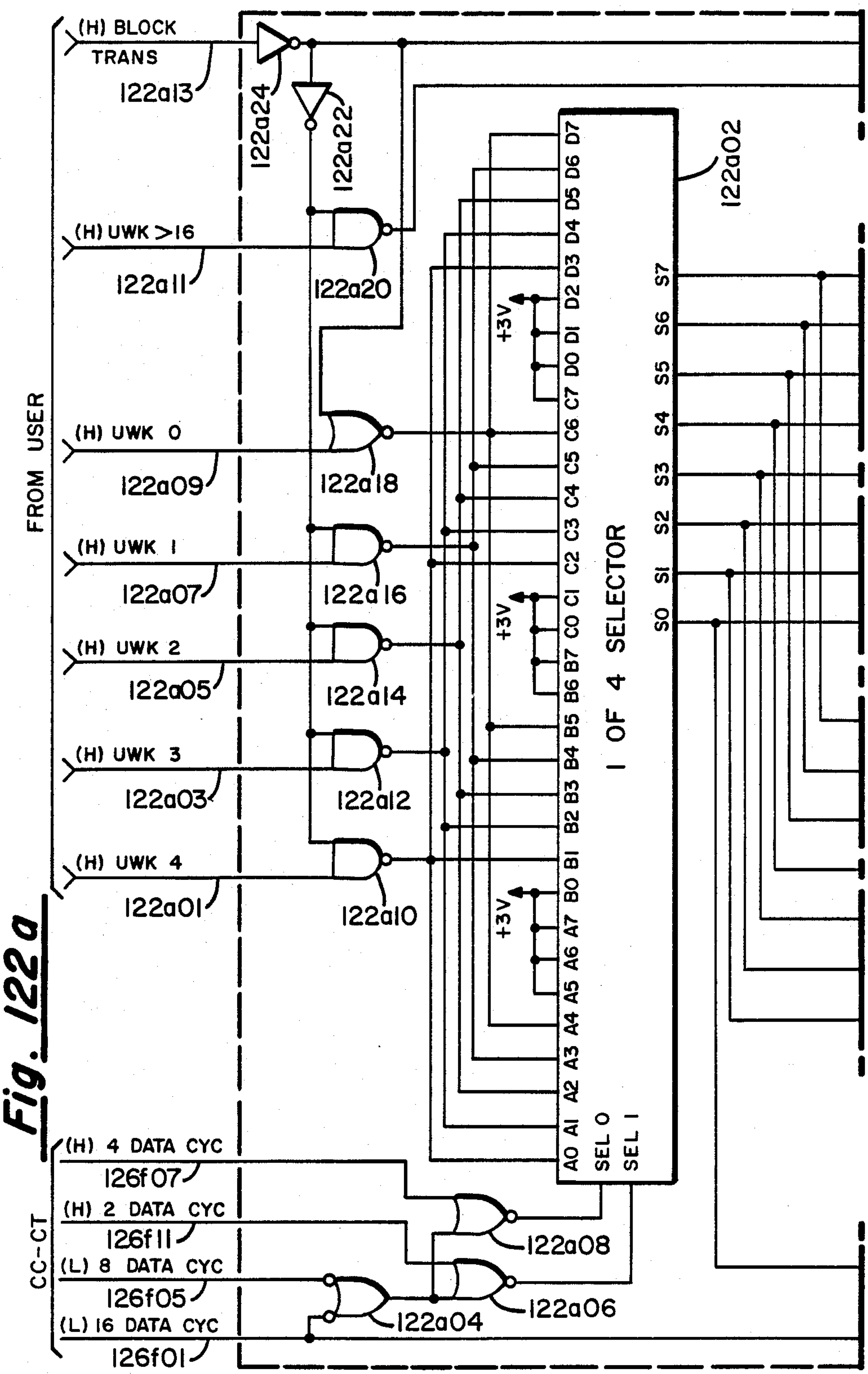
Figure 122B:
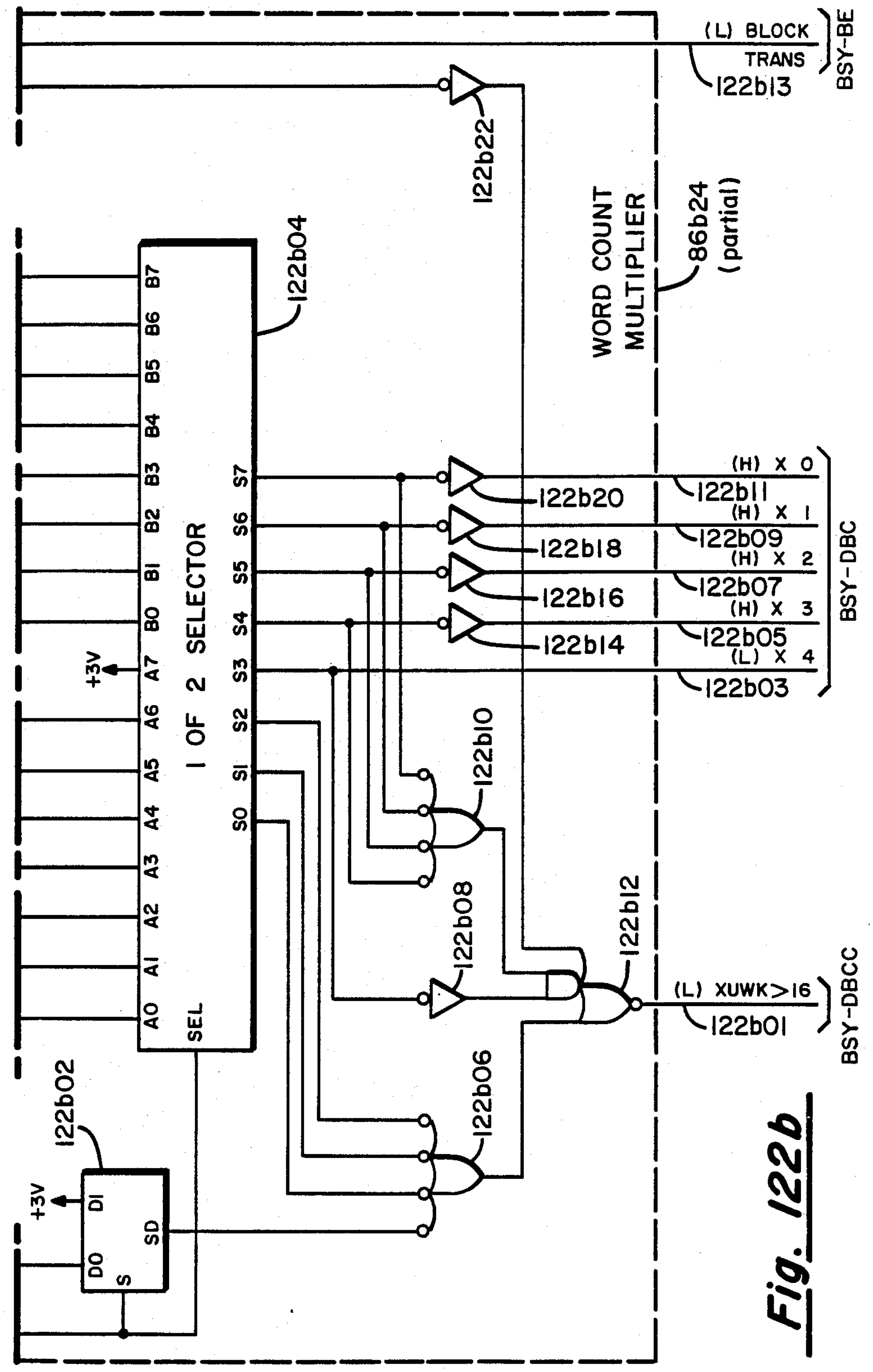

FIG. 122*a* and FIG. 122*b* show a logic diagram of the Word Count Multiplier function subsection of the Busy functional section.

Figure 123A:
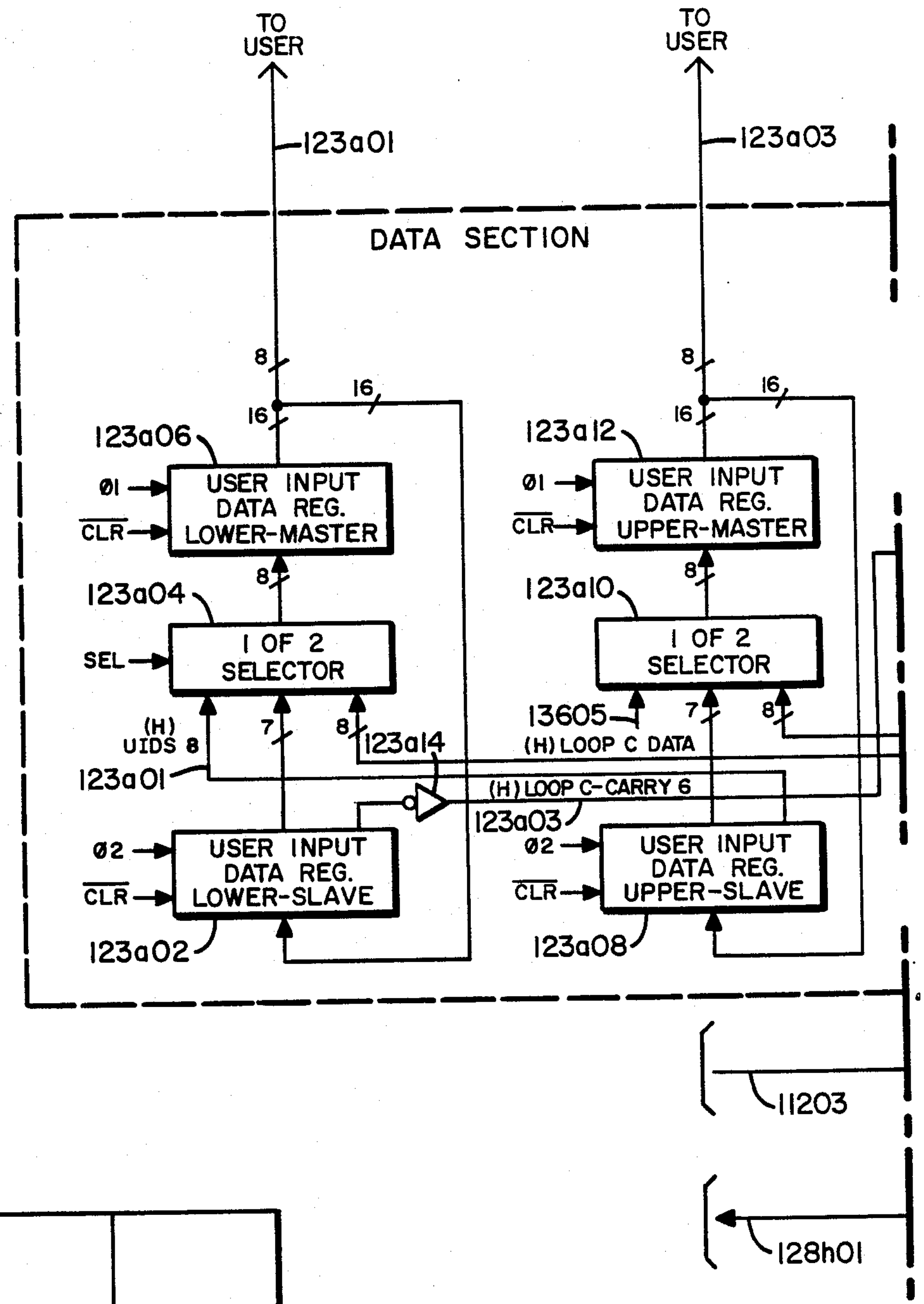
Figure 123:
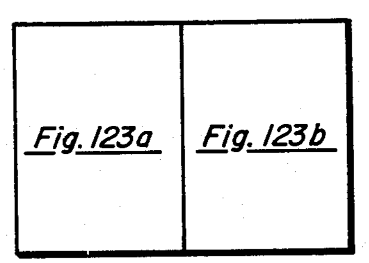

FIG. 123 shows a second level block diagram of the Data section.

Figure 124:
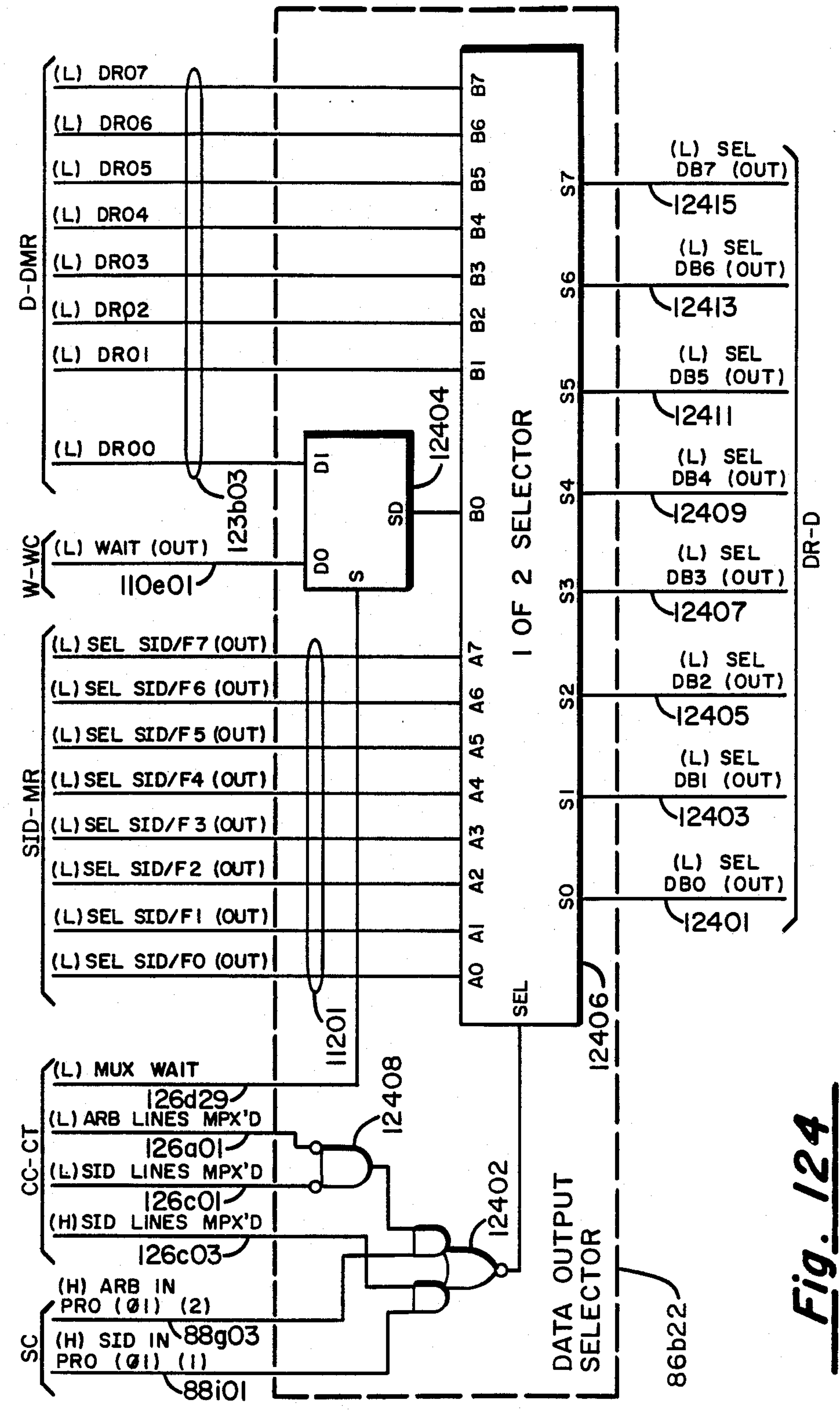
Figure 125A:
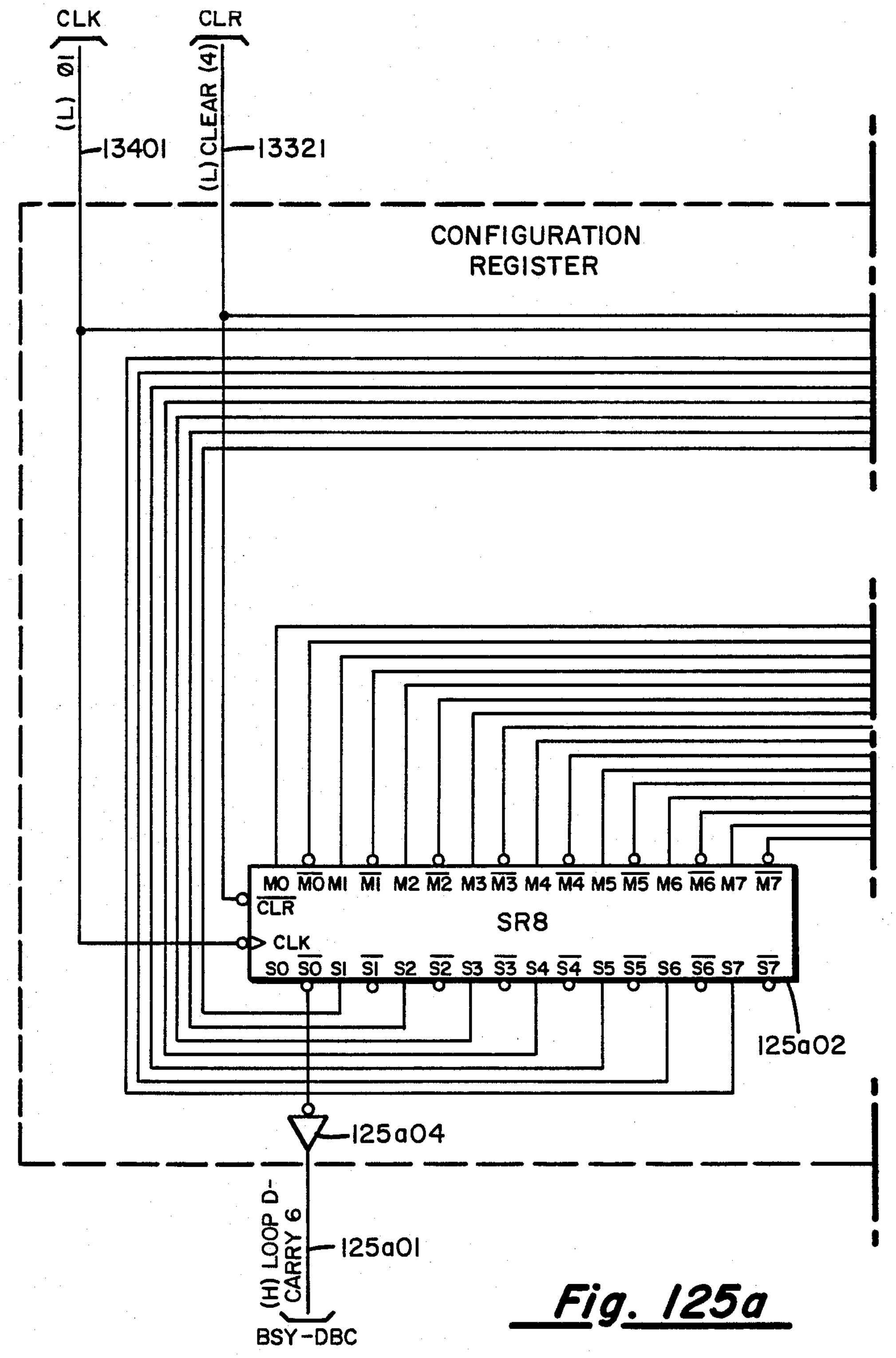
Figure 125B:
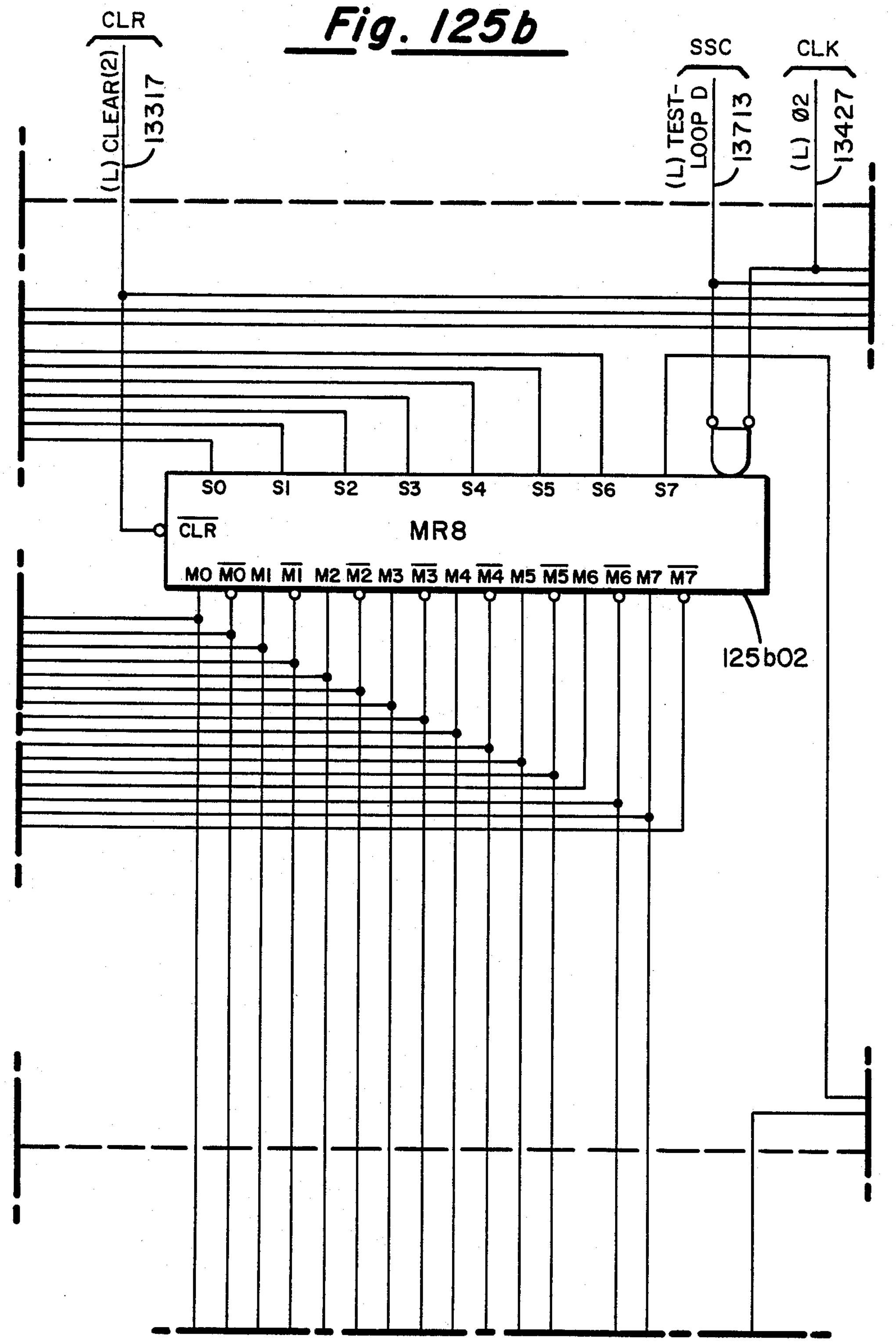
Figure 125C:
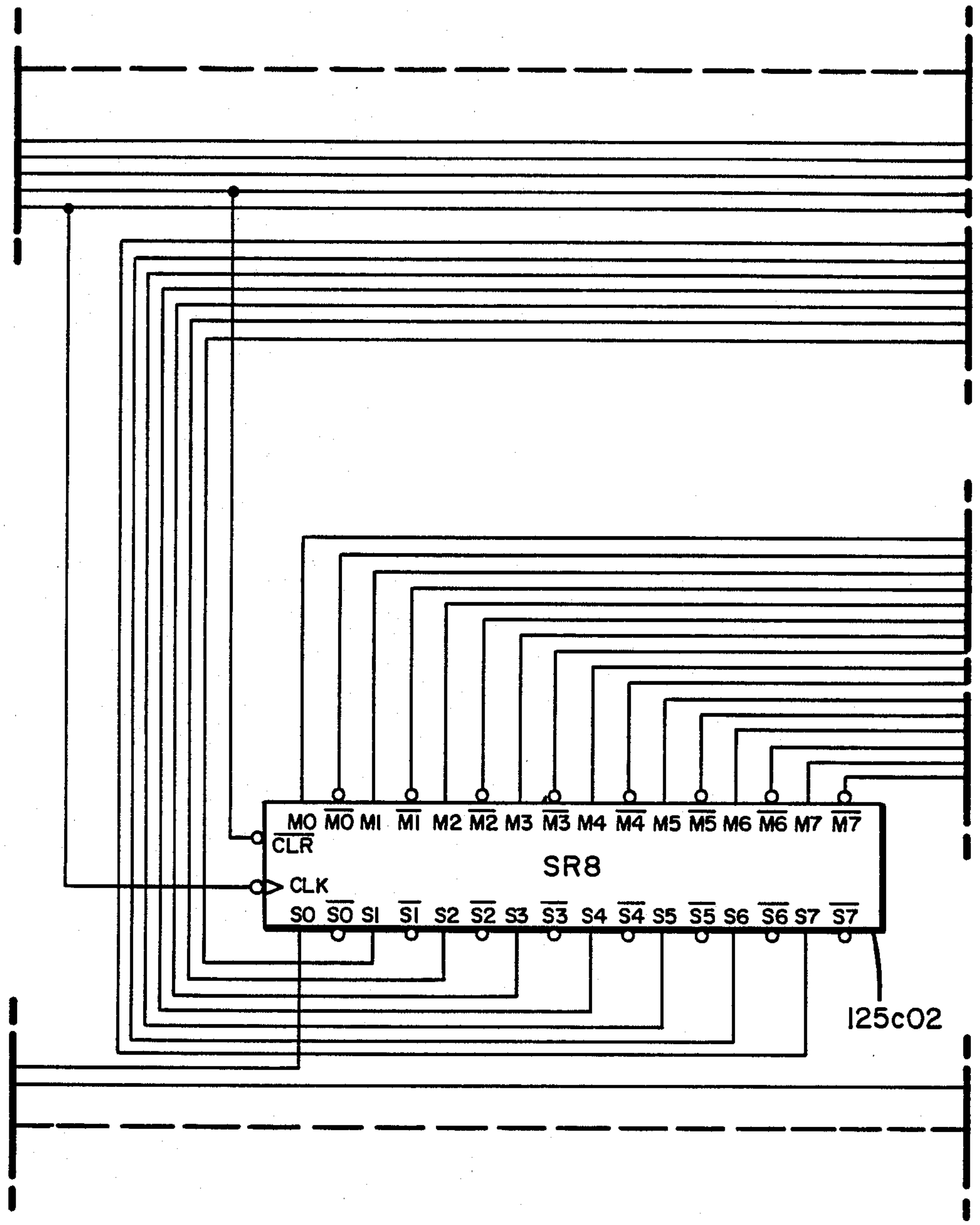
Figure 125D:
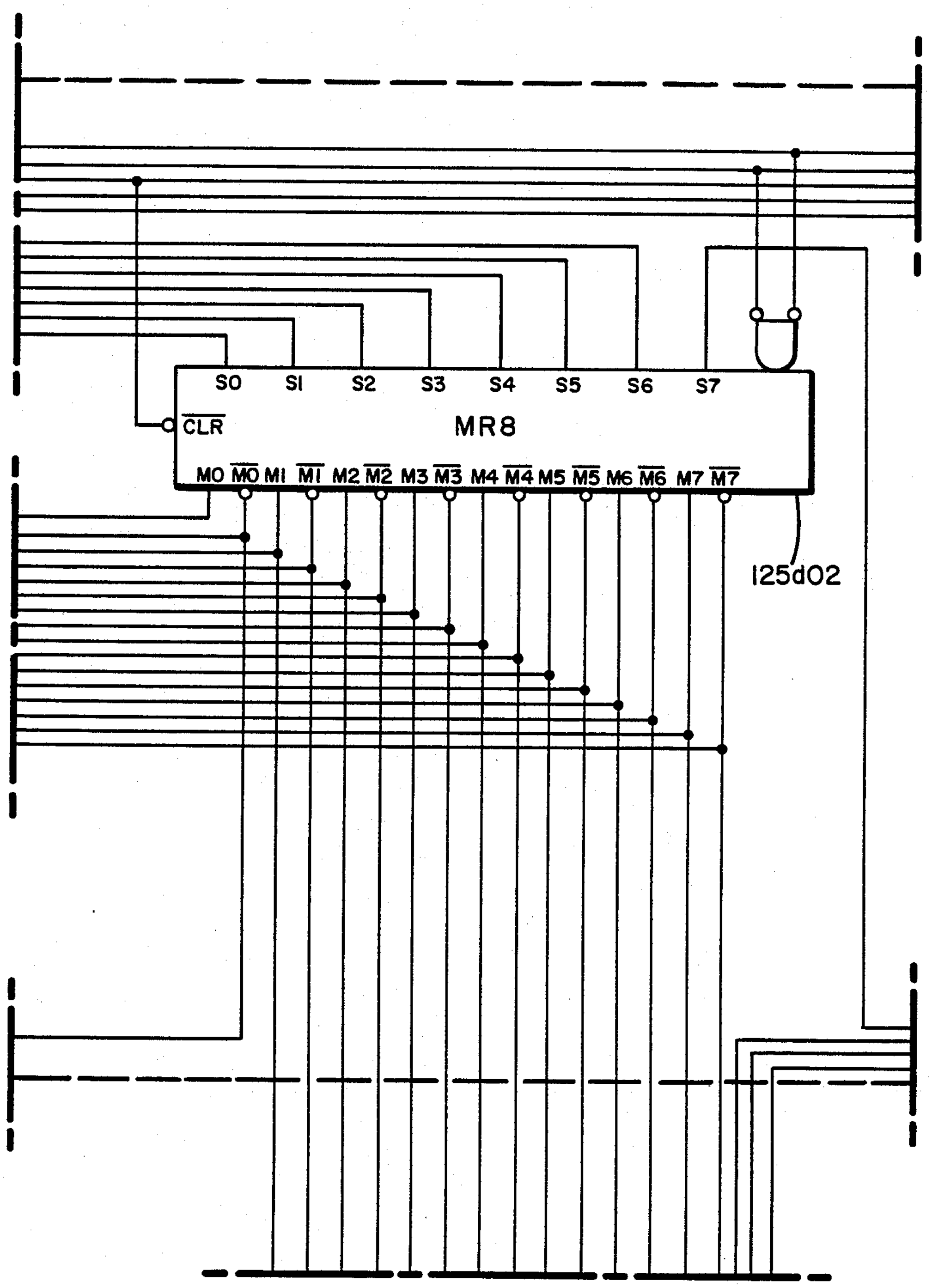
Figure 125E:
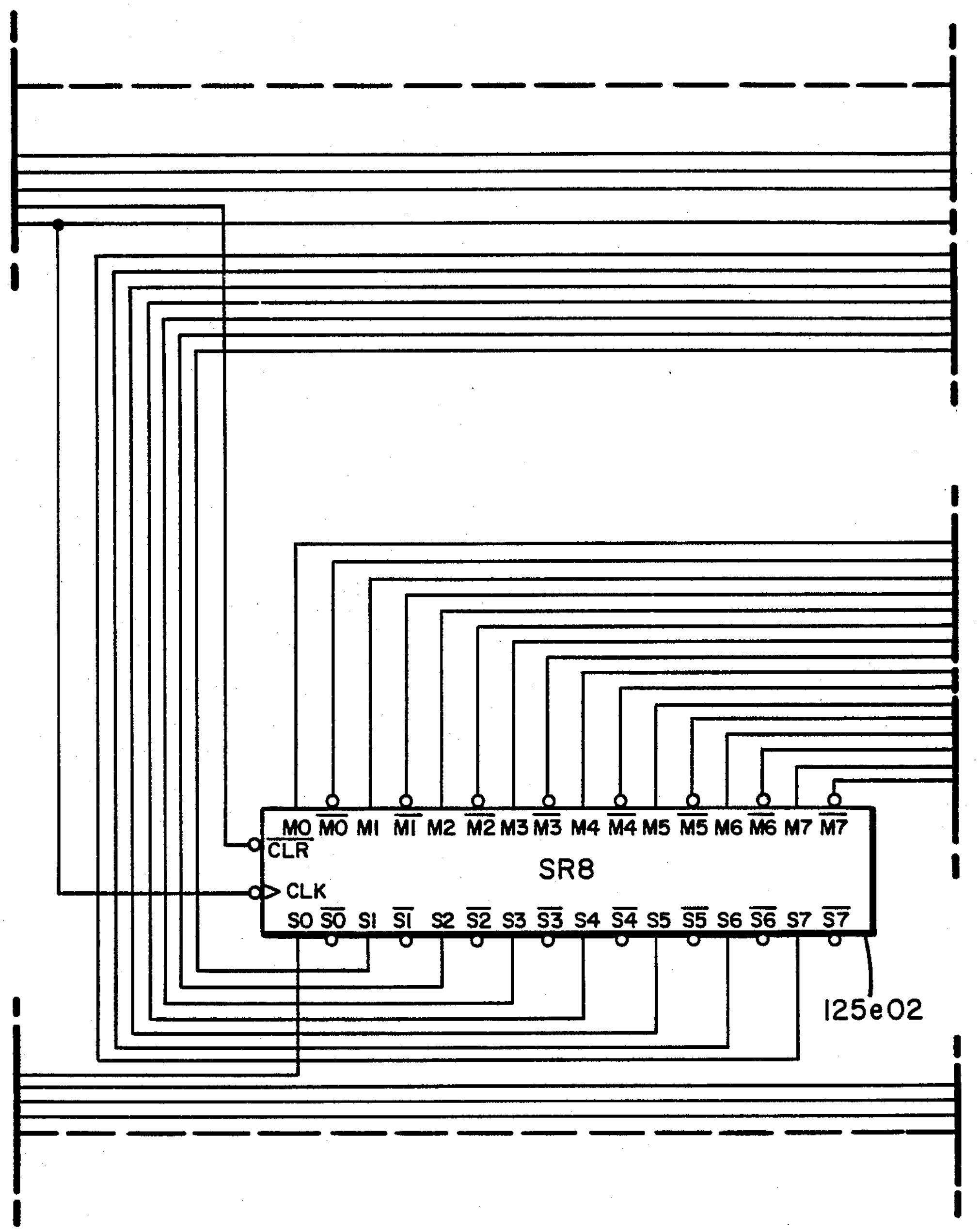
Figure 125F:
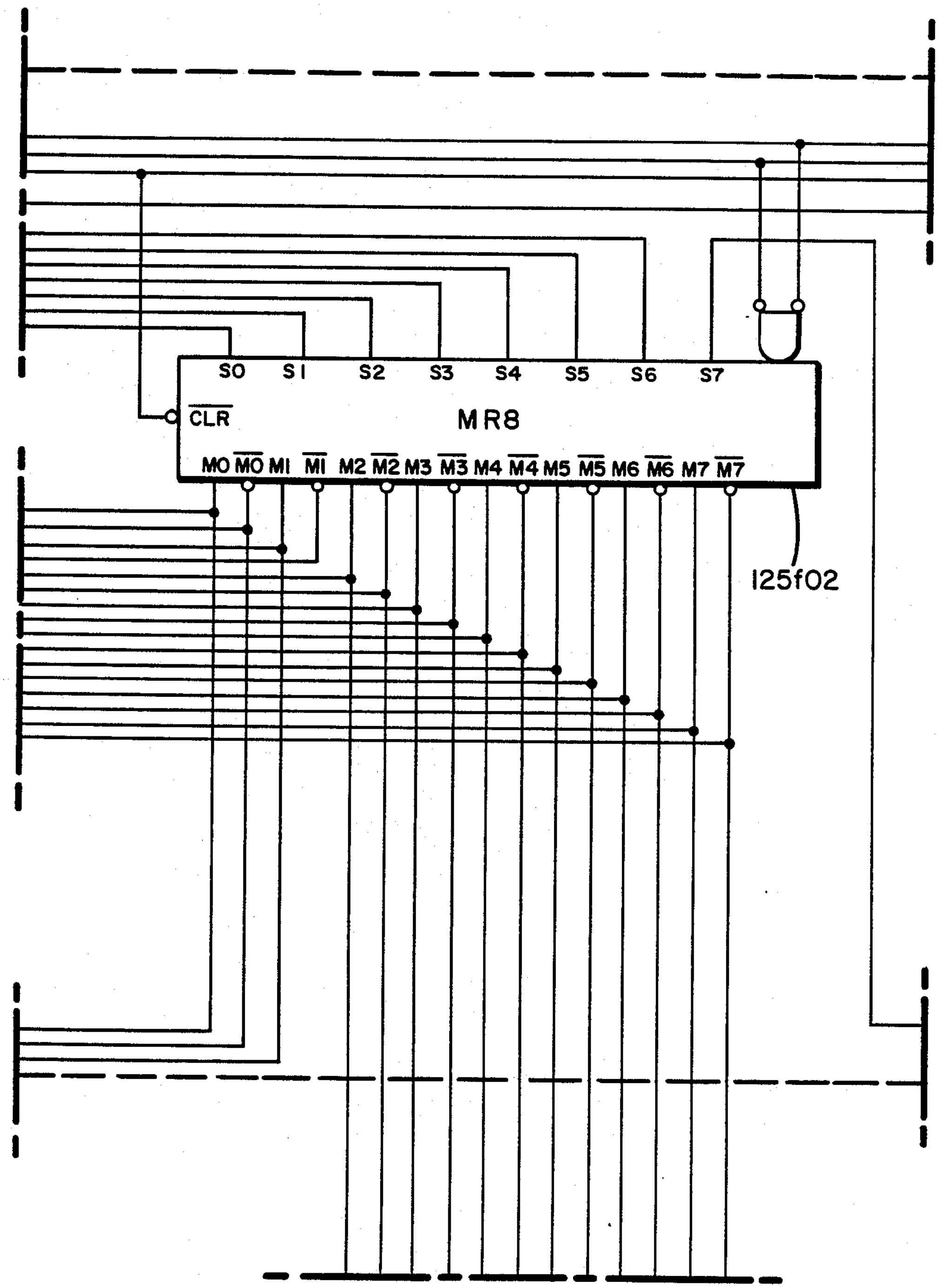
Figure 125G:
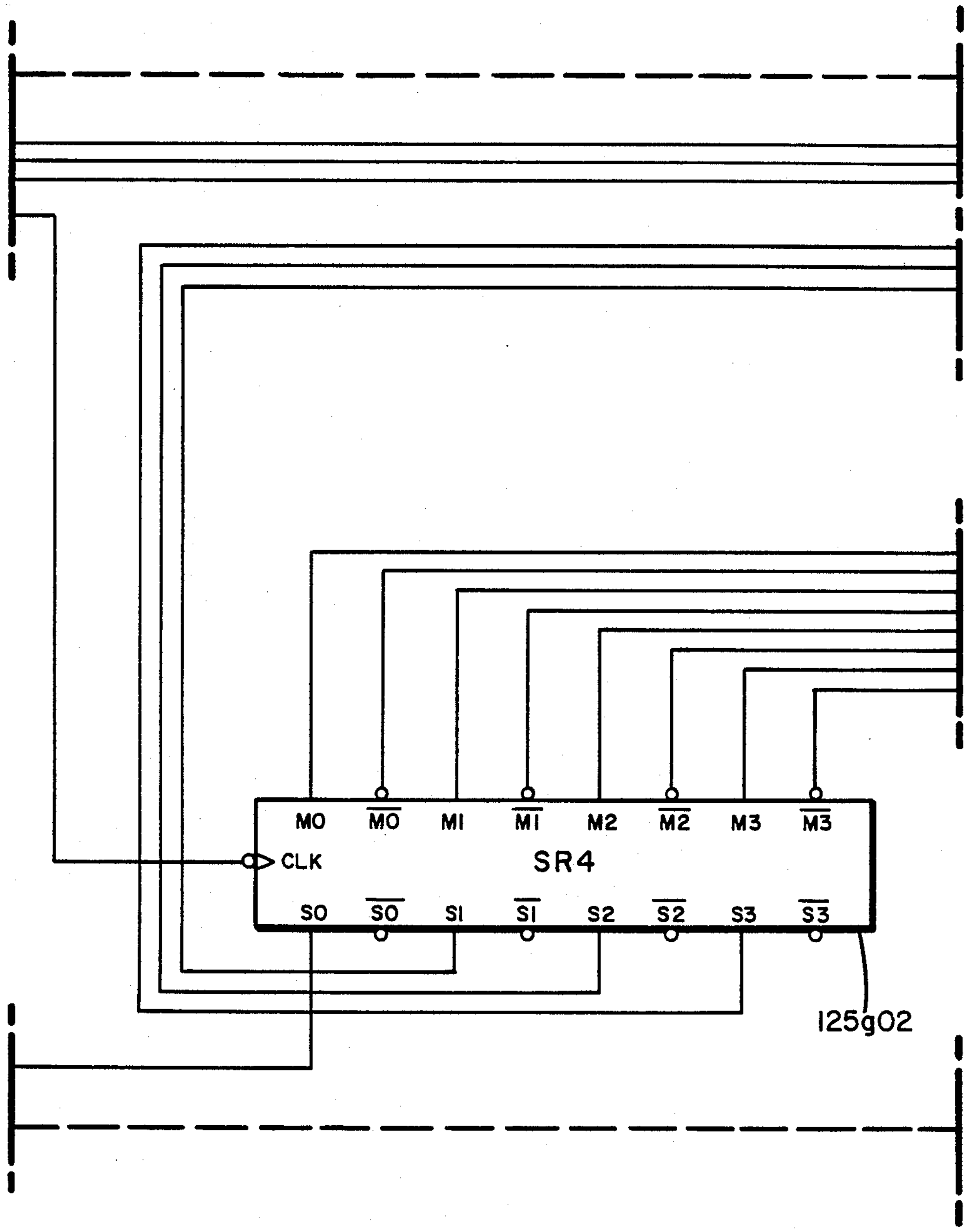
Figure 125H:
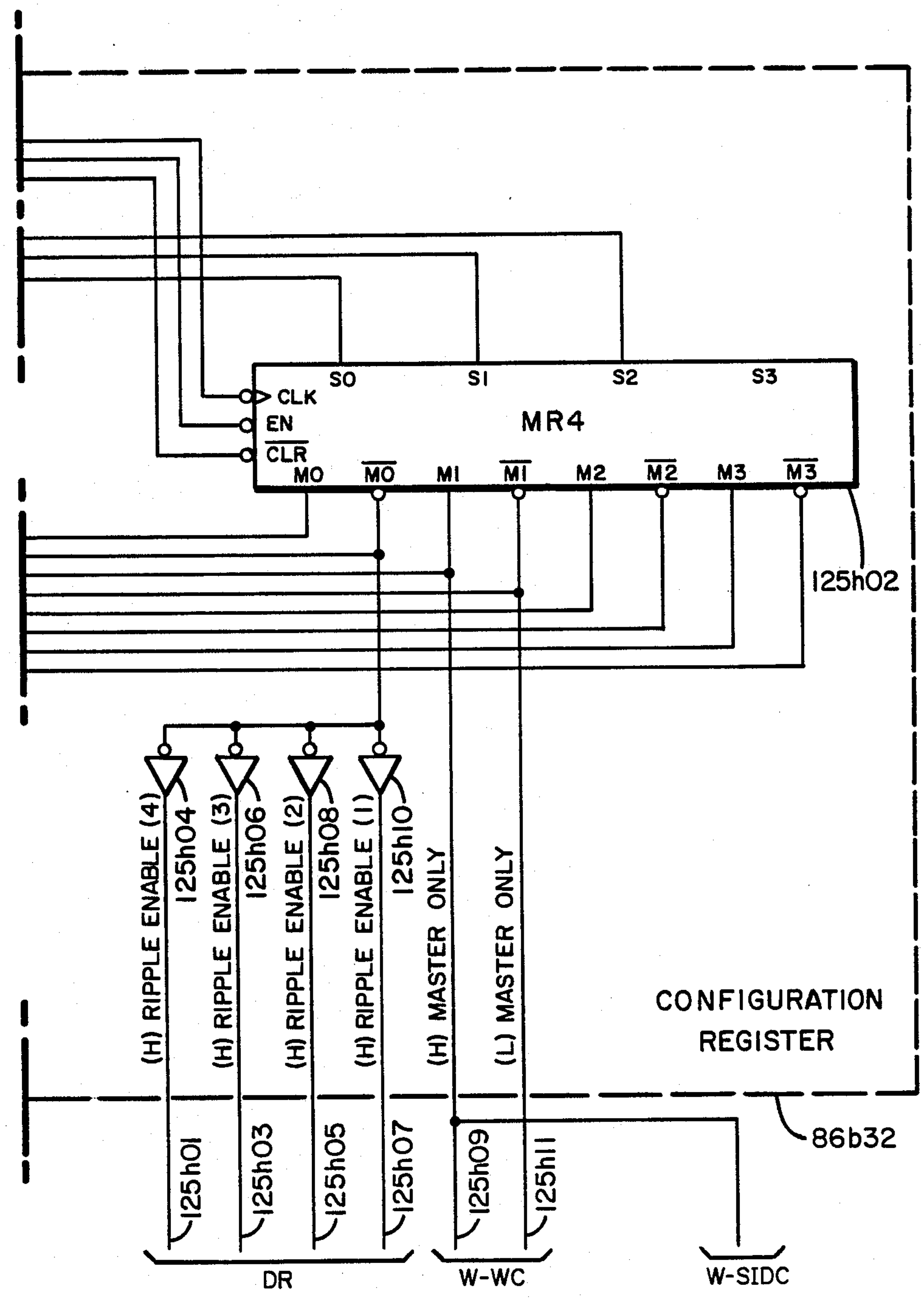

FIG. 124 shows a logic diagram of the Data Output Selector functional subsection of the Data functional section.

FIG. 125*a* through FIG. 125*h* show a logic diagram of the Configuration Register functional subsection of the Configuration Control functional section.

FIG. 126*a* through FIG. 126*f* show a logic diagram of the Configuration Translation functional subsection of the Configuration Control functional section.

Figure 127A:
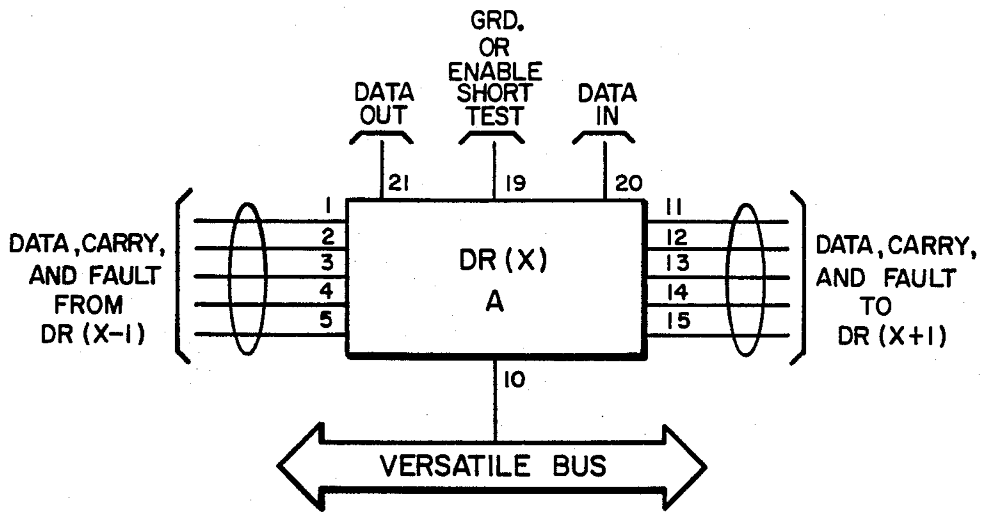

FIG. 127*a* shows a representation of the A, Data Flow, portion of the DRIVER/RECEIVER element as may be compared to the DRIVER/RECEIVER logical standard cell of FIG. 82.

Figure 127B:
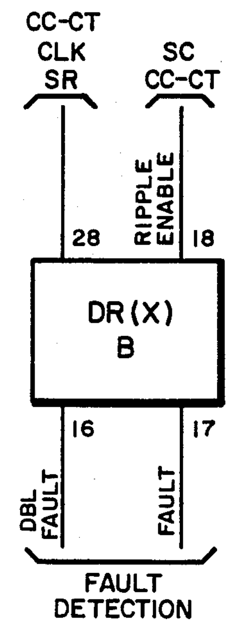

FIG. 127*b* shows a representation of the B, Driver Clock and Faults, DRIVER/RECEIVER element as may be referenced to the DRIVER/RECEIVER standard logical cell of FIG. 82.

Figure 127C:
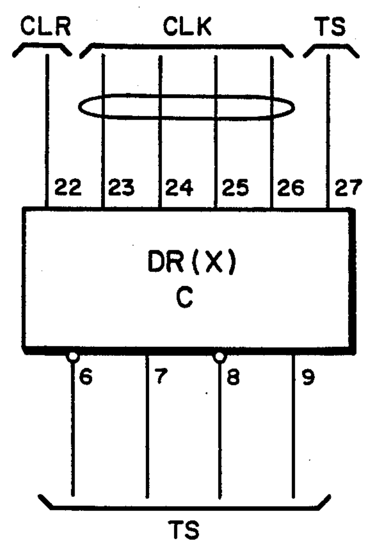

FIG. 127*c* shows a representation of the C, Clock and Test, DRIVER/RECEIVER as may be referenced to the DRIVER/RECEIVER standard logical cell of FIG. 82.

FIG. 127*d* and FIG. 127*e* show the association between the 37 DRIVER/RECEIVERS, the Versatile Bus Signal Names, and an arbitrarily assigned Versatile Bus Pin Number.

FIG. 128*a* through FIG. 128*l* show a logic diagram of the Data Flow functional subsection of the DRIVER/-RECEIVER functional section.

FIG. 129*a* through 129*d* show a logic diagram of the Driver Clock and Faults functional subsection of the DRIVER/RECEIVER functional section.

FIG. 129*e* through 129*h* show a logic diagram of the Faults Collection subsection of the DRIVER/-RECEIVER functional section.

FIG. 130*a* through 130*h* show a logic diagram of the Clock and Test functional subsection of the DRIVER/-RECEIVER functional section.

FIG. 131*a* through FIG. 131*e* show a logic diagram of the Parity Generation/Parity Error Detection functional subsection of the Parity/Fault Detection section.

Figure 132B:
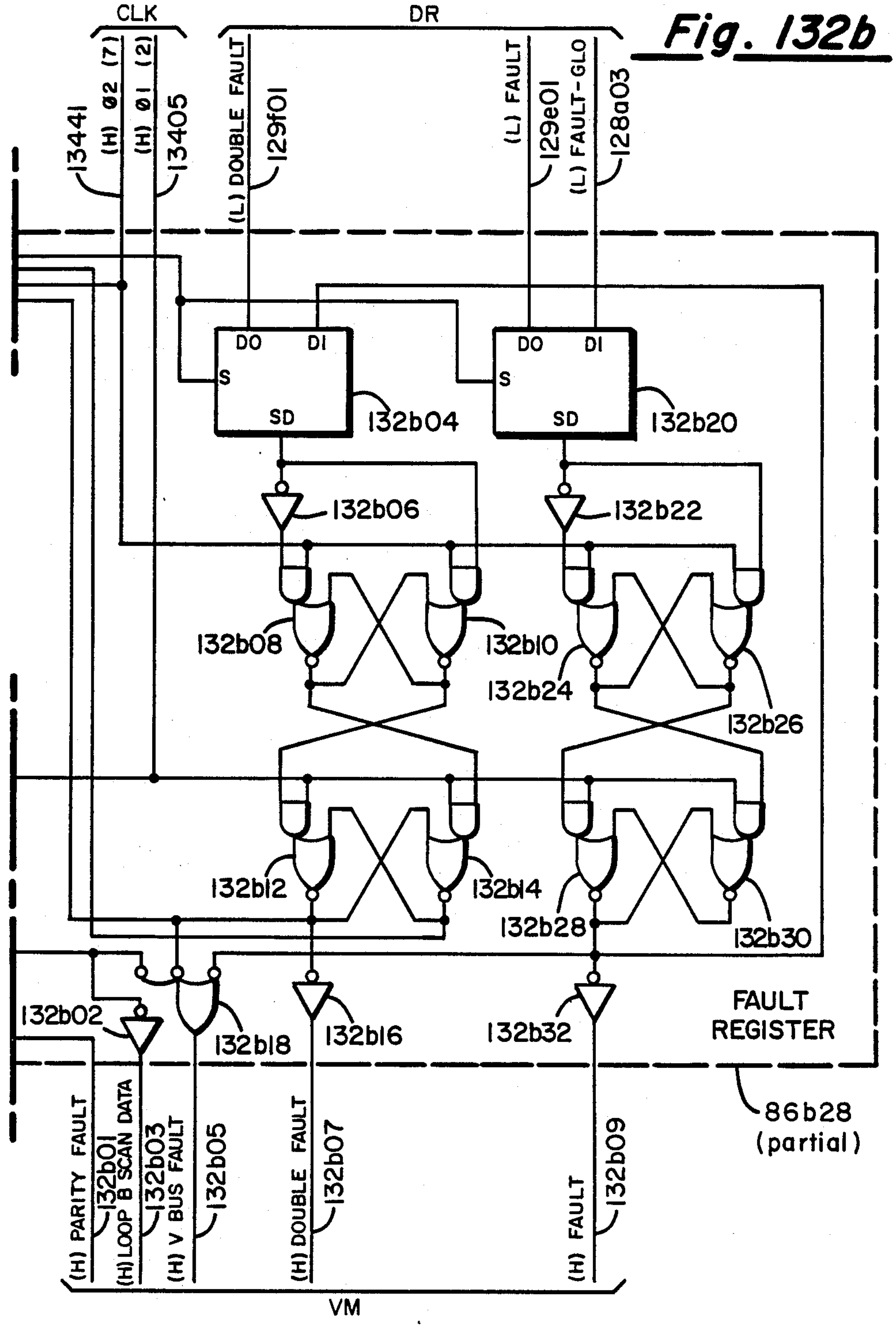

FIG. 132*a* and FIG. 132*b* show the Fault Register functional subsection of the Miscellaneous Control functional section.

Figure 133:
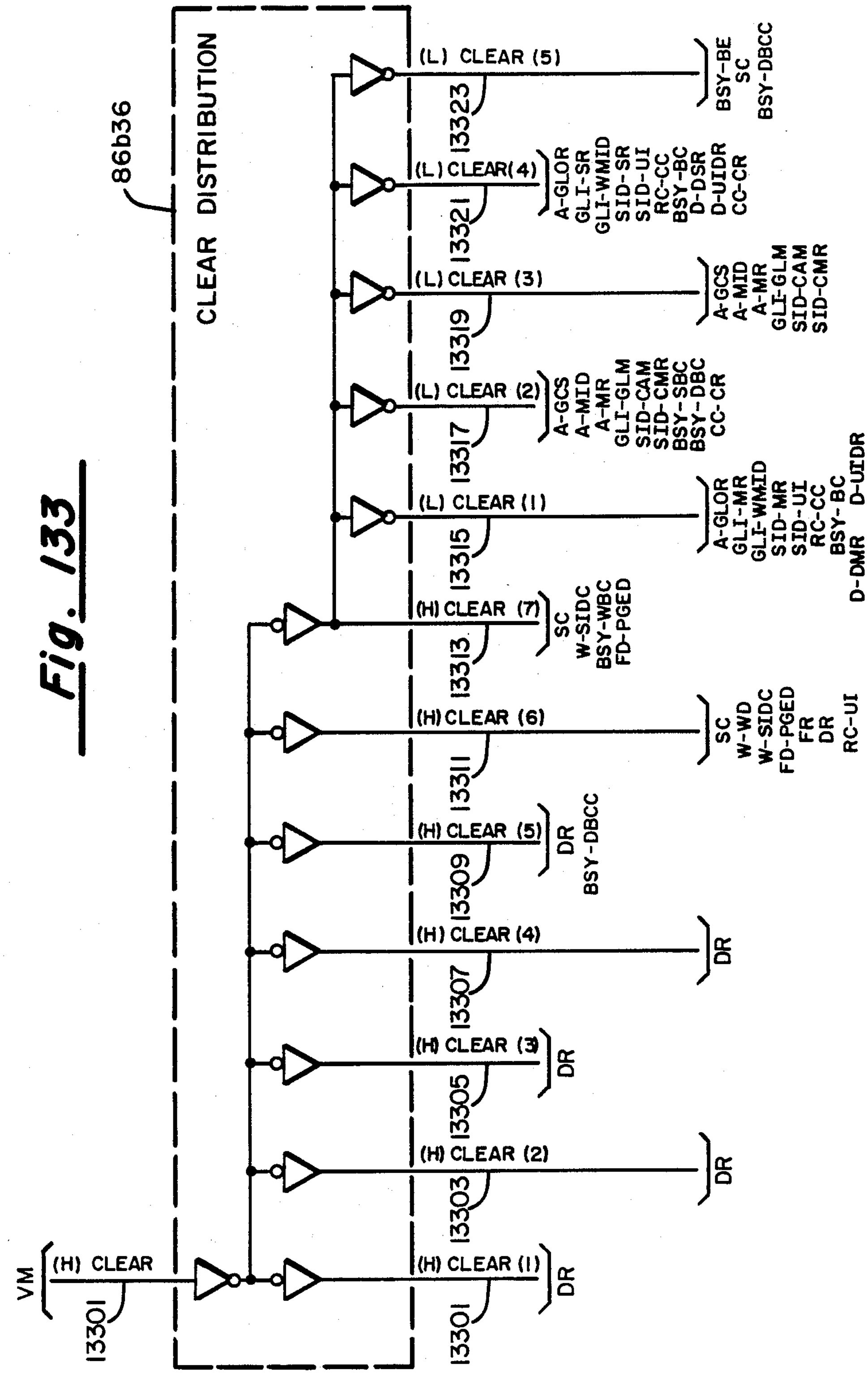

FIG. 133 shows a logic diagram of the Clear Distribution functional subsection of the Miscellaneous Control functional section.

Figure 134:
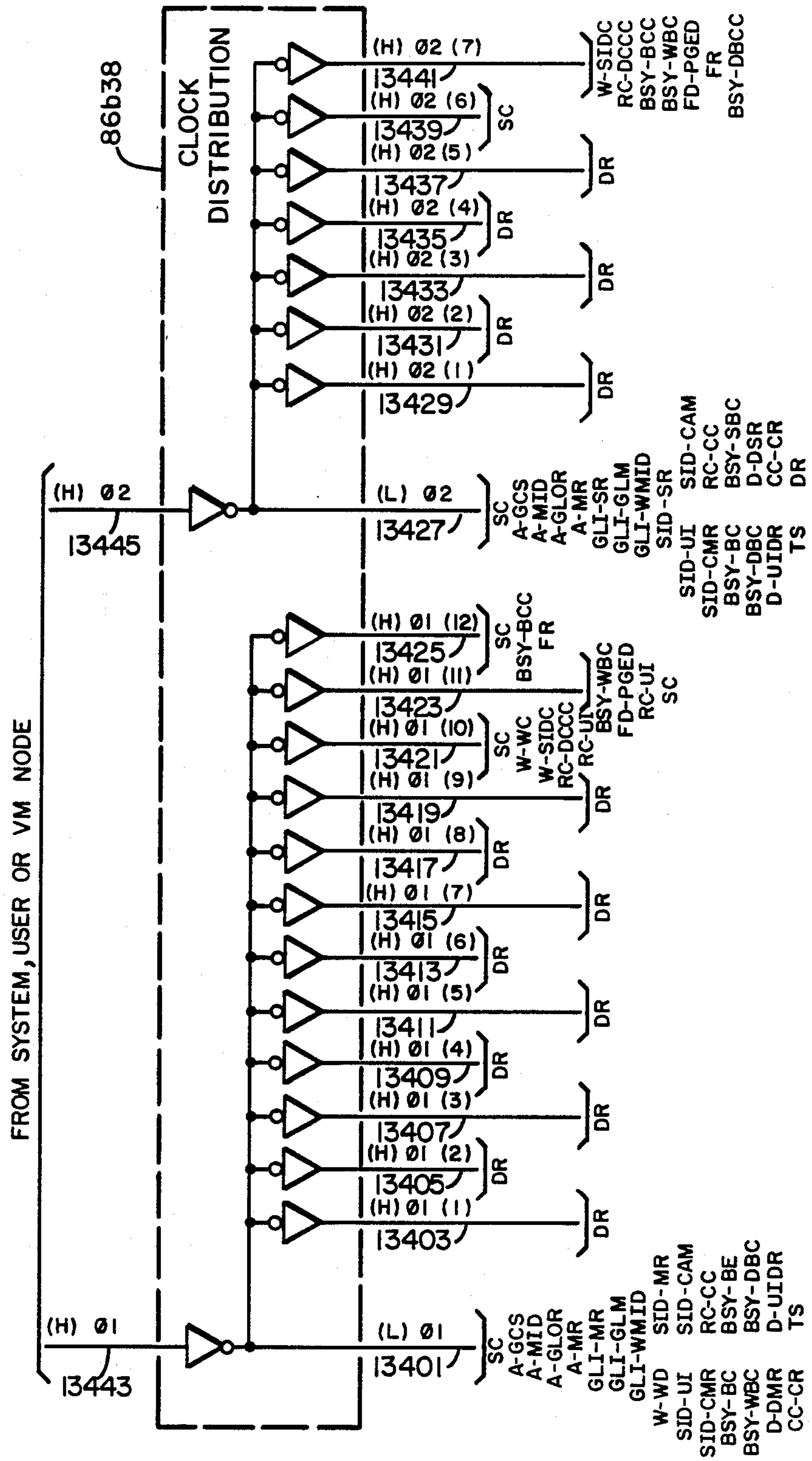

FIG. 134 shows a logic diagram of the Clock Distribution functional subsection of the Miscellaneous Control functional section.

Figure 135B:
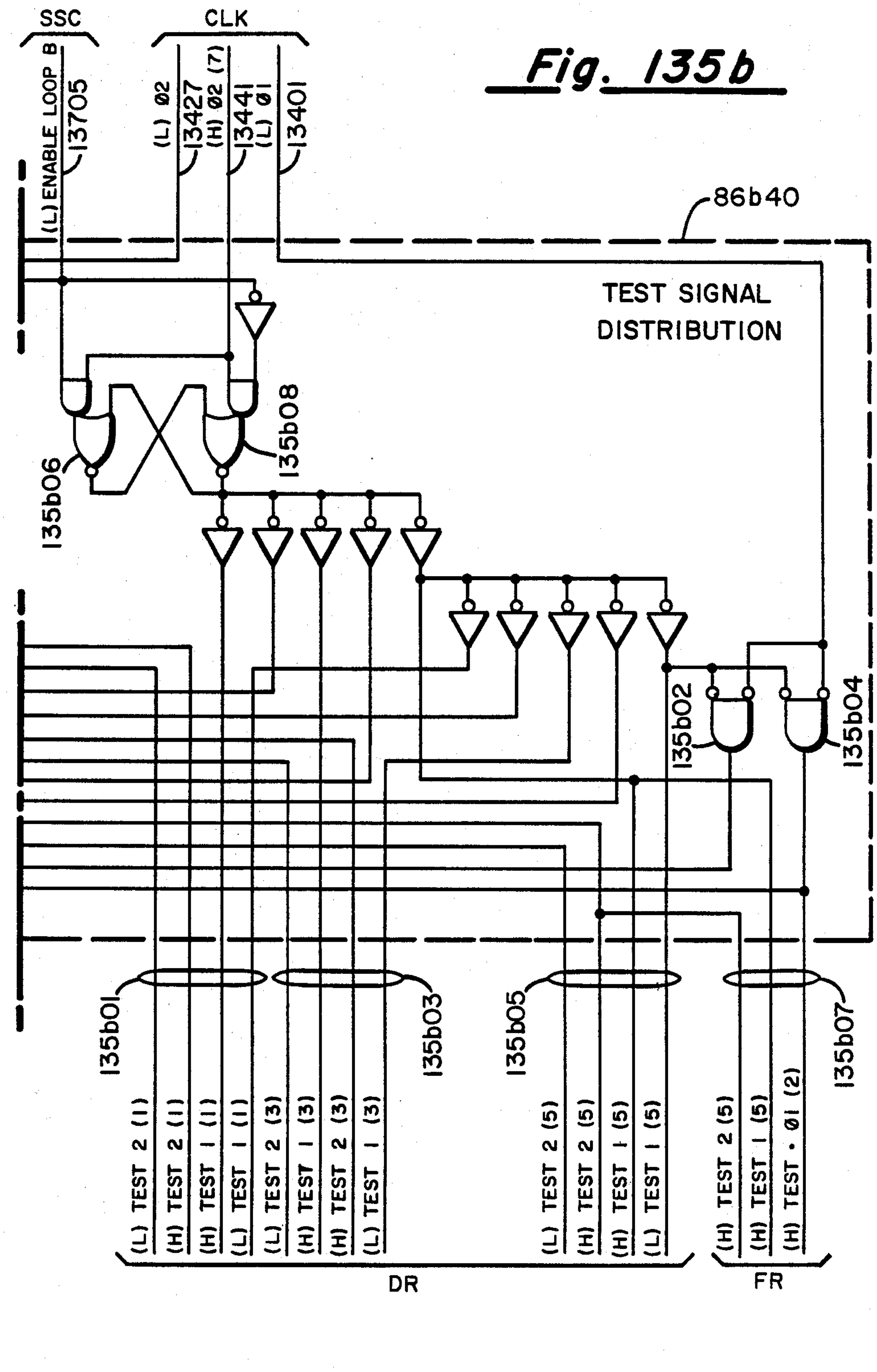

FIG. 135*a* and FIG. 135*b* show a logic diagram of the Test Signal Distribution functional subsection of the Miscellaneous Control functional section.

Figure 136:
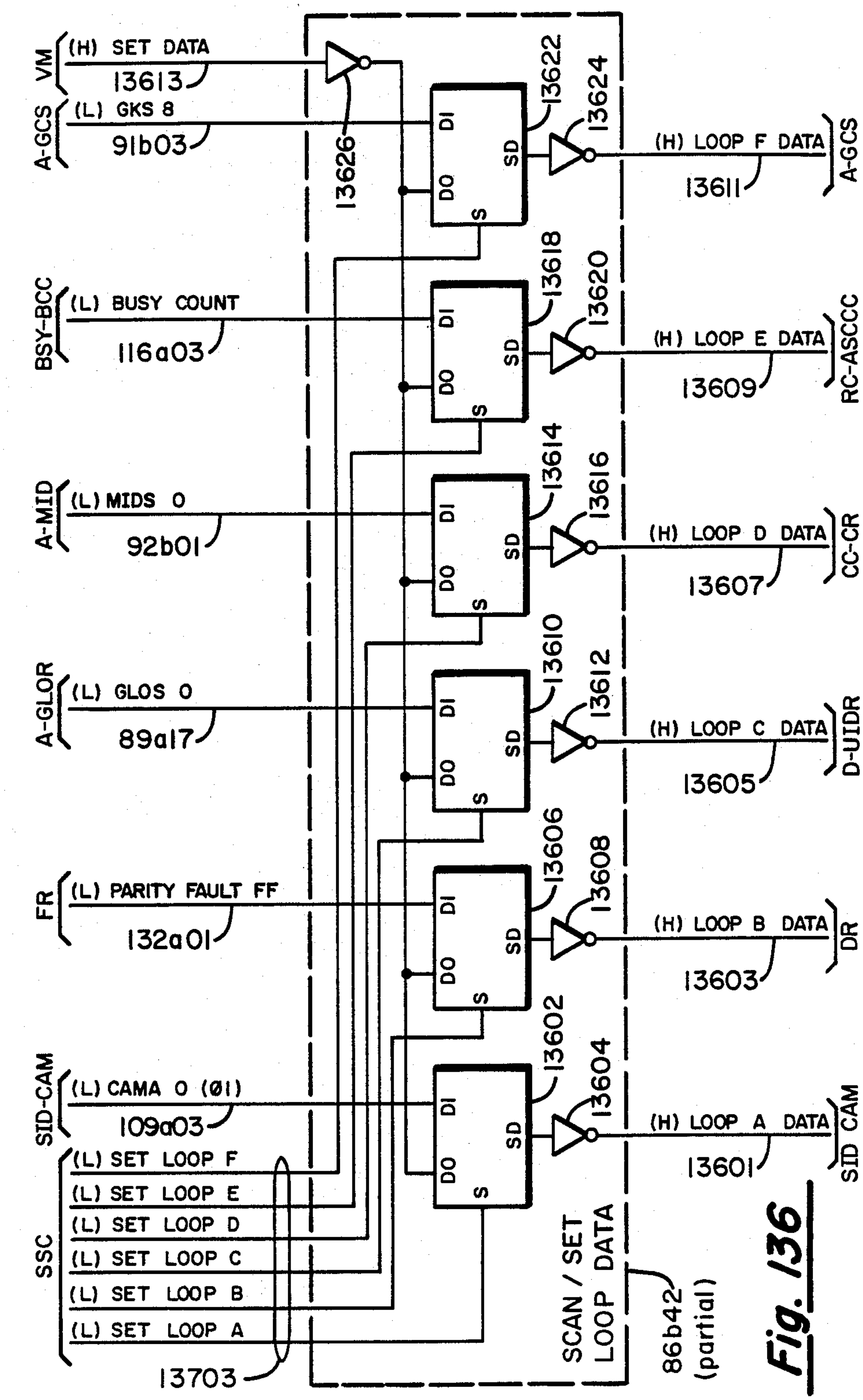

FIG. 136 shows a logic diagram of the Scan-Set Loop Data functional subsection of the Miscellaneous Control functional section.

Figure 137:
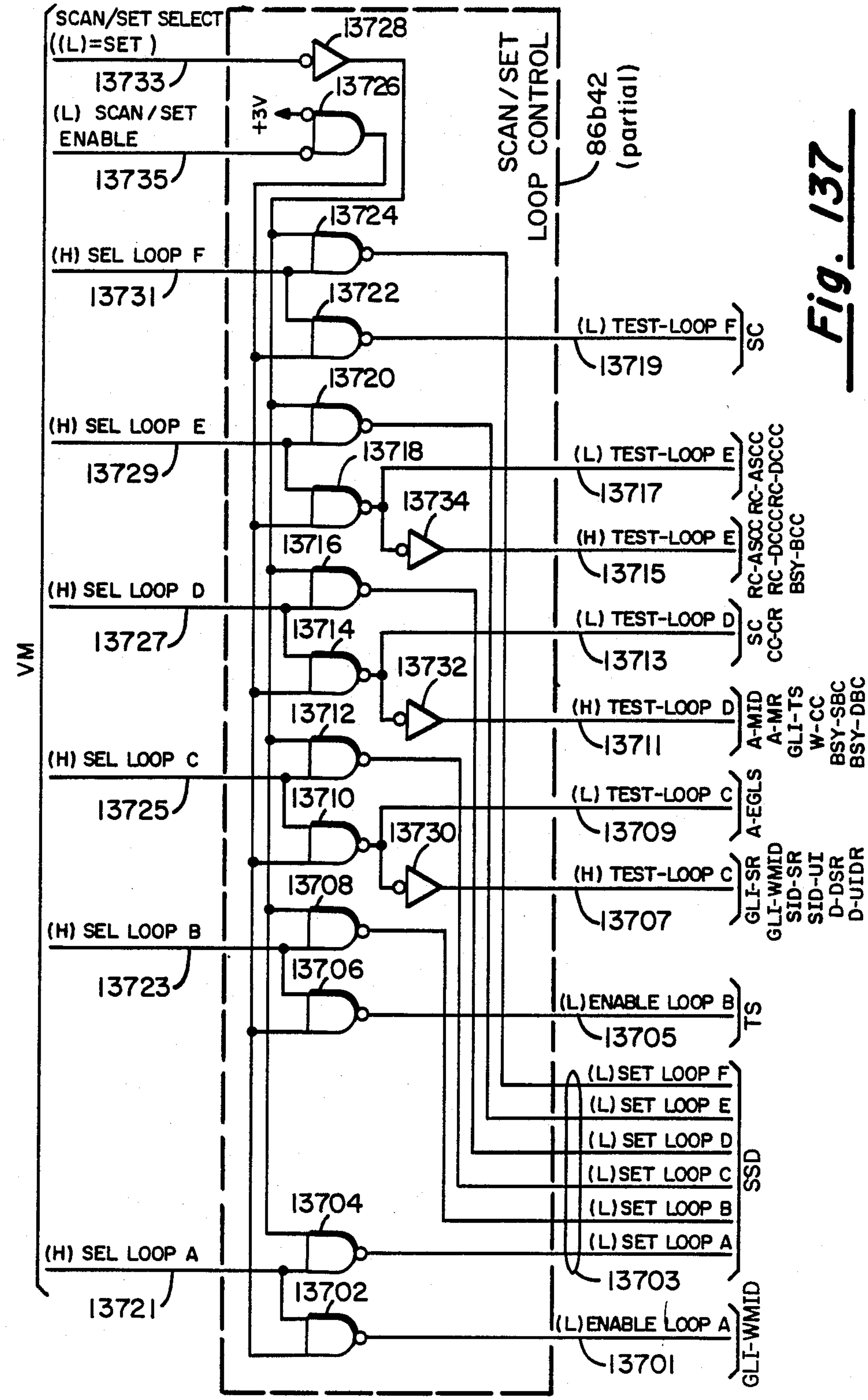

FIG. 137 shows a logic diagram of the Scan-Set Loop Control functional subsection of the Miscellanous Control functional section.

FIG. 138*a* shows a table of the permissible combinations of configuration parameters for arbitration.

FIG. 138*b* shows a table of the permissible combinations of configuration parameters for slave identification/function.

FIG. 138*c* shows a table of the permissible combinations of configuration parameters for data.

FIG. 138*d* shows a table of the permissible combinations of configuration parameters for pin multiplexed slave identification/function.

FIG. 138*e* shows a table of the permissible combinations of configuration parameters for pin multiplexed arbitration.

FIG. 138*f* shows a table of the permissible combinations of configuration parameters for pin multiplexed arbitration and pin multiplexed slave identification/-function.

FIG. 139 shows a table of the grand total permissible combinations of configuration parameterization of the preferred embodiment of the invention.

FIG. 140 shows the Versatile Bus Interface Logics Scan/Set Interconnect for test Loop A.

FIG. 141*a* and FIG. 141*b* show the Versatile Bus Interface Logics Scan/Set Interconnect for test Loop B.

FIG. 142*a* and FIG. 142*b* show the Versatile Bus Interface Logics Scan/Set Interconnect for test Loop C.

FIG. 143*a* through FIG. 143*d* shows the Versatile Bus Interface Logics Scan/Set Interconnect for test Loop D.

FIG. 144*a* and FIG. 144*b* show the Versatile Bus Interface Logics Scan/Set Interconnect for test Loop E.

FIG. 145 shows the Versatile Bus Interface Logics Scan/Set Interconnect for test Loop F.

DESCRIPTION OF THE PREFERRED EMBODIMENT

1. General Overview of the Invention

The following eleven sections are intended to present overall nature of the method and apparatus of the present invention. As such it is organized for understanding the purpose and environment of the invention as well as the novel aspects thereof.

1.1. Philosophy of the Invention

The effectiveness of VLSIC technology is constrained by our ability to interconnect VLSIC flexibility using small quantities of signal lines and pins. Also, the system advantages of minimizing the number of chip types are huge and include the large chip development time and cost and the life cycle costs of spares and similar logistics.

The purpose of the interconnection methodology of the present invention is to minimize the number of chip types whose differences are wholly related to different interconnection arrangements, and to minimize and standardize the necesary "glue" chips, that is, chips whose sole reason for existence is to pass information among other chips. All this must be achieved without unduly compromising VLSICS' potential performance and applicability.

The present invention is a standard digital interconnection methodology for VLSIC that is called the Versatile Bus interconnect. The Versatile Bus system does not attempt to provide a single interconnection communication protocol for all purposes. Instead, it provides many possible ways to interconnect chips, but within a formalized framework that meets a large class of interconnect needs while still preserving many of the system benefits of a single standard communication protocol.

The chip designer must decide the interconnect capabilities that are compatible with the chip's purposes and functions and then derive the corresponding subset of selectable Versatile Bus configurations that are reasonable to support such purposes and functions. It is expected that some of the chip's real estate, power, etc., can be applied in this manner to increase the chip's usefulness, just as additional internal functions are added for the same purpose.

The system designer will be able to use Versatile Bus interfaced chips in a variety of configurations without concern for the communications compatibility of the chips, in a manner analogous to today's logic designer's reduced concern for compatible signal levels in today's TTL logic families.

The Versatile Bus allows great flexibility for configuring interfaces that meet the exact needs of the system designer without requiring a redesign of the interface logic on the chips being interconnected. A Versatile Bus is standardized with respect to voltage levels and clock speeds, but it allows the system designer to select data widths, arbitration schemes, function codes, transaction overlap, latencies and acknowledge formats, that best suit his design requirement. No hardware redesign of the VLSIC devices he is employing is required. A Versatile Bus achieves this flexibility through a single design which can be configured for the applications requirements of diverse systems and devices, so that any of several different interconnect types may be accomplished using the same set of input/output pins. The system designer may set a Versatile Bus to his own requirements by setting a configuration register within each interconnected chip device. The configuration register may be set before the device is even soldered into a machine system, or it may be set and reset through an optional device maintenance interface. This maintenance and initialization interface, called the VM Node, is a separate interconnection to the Versatile Interface Logics from the bus itself. Ths VM Node maintenance interface also supports off-line test and on-line error correction/reconfiguration in response to fault conditions recognized during Versatile Bus operation.

The Versatile Buses family is a specification for a spectrum of configurably compatible interfaces intended to be built with a CPU, IOC, Memory, or similar User device for signal and data exchange. The exact manner of information interchange is not intended to be visible to the User. The Versatile Interface supports the communication traffic between the modules, called the Users, which go into the makeup of a processing system. These modules may themselves be implemented as VLSIC devices. The Versatile Buses family allows that a given module with a Versatile Bus interface can be versatilely accommodated to every type of interconnect structure, e.g., buses, distributors, concentrators, circuit switches, or point-to-point channels. For each of these interconnect structures, the excess interface capability required for operation in a more complicated structure can be disabled, allowing the Versatile Bus to run at the highest performance level that is consistent with the designer chosen complexity of the interface.

A pictorial repesentation of a sample physical layout and interconnections of a Versatile Bus as implemented in VLSIC is shown in FIG. 1. A physical bus 101 interfaces to and interconnects a multiple number of Versatile Bus Interface Logics 102*a* through 102*jv* and is thusly labeled in FIG. 1 as a Versatile Bus, such terms as really represents the entire distributed structure of both physical interconnections and logics which is pictorially outlined by normal drawing line in FIG. 1. Each Versatile Bus Interface Logics, for example Versatile Bus Interface Logics 102*a*, interfaces a User module, for example VLSI Circuit User Device 106*a* which is pictorially represented in shadow line within FIG. 1 as existing on the same VLSIC chip substrate as Versatile Bus Interface Logics 102*a*, to the Versatile Bus and onto physical bus 101. The Versatile Bus normally also includes (although such inclusion to any extent greater than the hardwiring of certain signal pads is not necessary to functionality of the Versatile Bus) maintenance and initialization logics called the VM Node. Such a VM Node 108*a* is proportionally represented in size relative to, and with connection to Versatile Bus Interface Logics 102*a* and to VLSI Circuit User Device 106*a*, and with off-chip connections (not via physical bus 101) as it might be implemented in FIG. 1.

At this point, the reader must not feel that he has, in the pictorial representation of FIG. 1, conceptualized the one and only physical layout and interconnection of the Versatile Bus. Generally, the Versatile Bus is "versatile" in its configurable capabilities, not in its physical layout which exists in fixed form upon each substrate type upon which the Versatile Bus Interface Logics and VM Node should be implemented. But FIG. 1 is not the pictorial representation of the only physical layout, only of a typical physical layout. In particular, the VM Node, shown pictorially as occupying substrate space in the representation of FIG. 1 will be taught as a nullity in this application—a mere conduit to an external maintenance processor which will perform all that function (largely optional) which could have been done by on-chip logics called a VM Node. This conduit function of the VM Node can be visualized by momentary reference to FIG. 4. It is desired to show the VM Node as occupying physical space in order that the concept should be advanced that logics associated with the initialization and maintenance functions of the Versatile Bus could exist on-chip. In another vein, it should not be assumed that the Versatile Bus Interface Logics—about 4211 gates of four equivalent transistors each within the preferred embodiment of the invention—will invariably occupy the FIG. 1 illustrated proportion of the total substrate area, nor that it should invariably lie along two sides of such substrate. In actuality, the modest thirty-seven pin requirement of the Versatile Bus will permit of many single VLSI Circuit User Devices which are possessed of, within presently available packages, three complete Versatile Bus Interface Logics such as interface such devices to three different Versatile Buses. Therefore, as the utility and power of each Versatile Bus interconnection network is developed further in this specification it should be remembered that—now it will become worthwhile to do so—such a structure can be massively replicated between devices of different types and different technologies and that it can be modestly replicated upon each single device.

Although the pin-efficient, flexible, variable multiple interconnection/intercommunication protocols of the Versatile Bus digital interconnection interface are implemented in and particularly useful for the interconnection of VLSIC, the high operational efficiency (nearly 100%), high limits to operational parameters such as arbitration (amongst up to 256 contenders per network in the preferred configuration and directly, straightforwardly, extendable to many more than 256) and sophistication (arbitration, slave identification, slave function, wait and data are implemented) make the scheme and logical apparatus of the present invention adaptable across the entire spectrum of bused digital interconnect up to and including functional section interconnect within a computer and even networking between computers.

1.2. Configuration of the Versatile Bus by Interconnection Primitives

The first observation about the prior art computer buses is that they are very general; many cards can be placed on the bus and communicate among themselves. Many of the pins are devoted to the handshaking required to accomplish this. There are also serial buses; both handshaking and data are sent serially over very few pins. Perhaps an interconnect solution in VLSIC would be to provide two kinds of interconnect (i.e., serial and parallel). The chip would be told which kind was to be used, according to each particular application.

It is clear that in VLSIC, however, there is need for more than two kinds of interconnect. There are many situations, for example, where exactly two chips are connected, and the multiunit handshaking is just so much excess baggage. Even the large supply of VLSIC gates will be used up if every kind of bus is attempted to be supported with individual sets of support logic.

The key to the problem is one of organization. The essential characteristic of all the different buses needs be organized in a sufficiently systematic way so that requirements for variations can be supported with a reasonable amount of logic.

That is in essence what the Versatile Bus concept is, an orderly arrangement of thousands of possible bus configurations that can all be implemented with a common set of logic.

With the present invetion the system designer is generally free to configure the Versatile Bus that makes the most sense for the functions his chip(s) will perform. He may trade off pin use vs. performance and flexibility. Yet because the Versatile Buses are ordered, the chip can always be connected to the other chips that support the Versatile Buses.

The set of all possible buses, however, doesn't readily admit to a convenient linear ordering scheme. For example, the number of devices on the bus cannot be a priori related to the number of bits in a word. Instead, the Versatile Buses are split into their individual characteristics, or primitives, and the primitives can be ordered in a reasonable way. The design rule for Versatile Bus interface logics is that any value may be chosen for each primitive, but then all smaller values for that primitive must also be supported. With this rule, it is always possible to find a value for each primitive that is supported by all the chips that are to be used together, and therefore there is always some Versatile Bus configuration that will allow their interconnection.

Primitives were derived by considering the range of requirements placed on interconnect systems, as seen by each node within such systems. It is clear that two or more nodes will exist on any useful interconnect, and that there can be many different data rates that might be best under various circumstances. Further, the amount of time allowed for each data transfer may vary. It turns out that each of these requirements has a strong impact on the number of pins needed to implement a bus.

There are eight primitives identified and implemented as parameters of configuration for the Versatile Buses. In various allowable combinations they produce 31,045 possible configurations, and resultant communication protocols, in the preferred embodiment implementation of the Versatile Bus.

A particular configuration is determined by three Arbitration parameters:

I. Number of Arbitration Lines per Group (and pins so devoted)

II. Number of Arbitration Groups

III. Arbitration Choices;

by two Slave Identification/Function parameters:

IV. Number of Slave ID/Function Lines (and pins so devoted)

V. Number of Slave ID/Function Cycles;

by one Wait parameter

VI. Number of Wait Lines (and pins so devoted); and by two Data parameters:

VII. Number of Data Lines (and pins so devoted);

VIII. Number of Data Bits;

These parameters are shown in the eight Roman numeraled columns of the configuration matrix shown in FIG. 3. Allowable configurations in these eight parameters for the preferred embodiment implementation of the present invention are shown below the dashed envelope line appearing across the eight columns of the configuration matrix. Each configuration Versatile Bus within the Versatile Buses family is assigned an eight digit number, and each digit of such number is that configuration digit in the first column of the configuration matrix of FIG. 3 which corresponds to the option selected in one of the eight configuration parameter columns. For example, the preferred embodiment configuration envelope is thusly seen to be a 55255355 Versatile Bus configuration. This is the configuration to which the preferred embodiment is designed, the maximum (save for a small reasonableness interactions between certain configuration parameters such limitations as will be later explained) configuration assumable by an operational Versatile Bus.

A Versatile Bus is configured by loading the eight digits of the configuration number, none of which exceed an octal 7, into eight three-binary-bit cells of a configuration register within the Versatile Bus Interface Logics at each interconnected chip. This configuration register is shown in the last row of FIG. 3. This loading, or setting, may be done by hardwiring certain internal pads to voltage or ground when each chip containing Versatile Bus Interface Logics is built. The configuration register is most commonly loaded, however, with variable quantity received through the VM Node (system supplied to the entire Versatile Bus network by a maintenance processor in the preferred embodiment of the invention) prior to exercise of a Versatile Bus network. If desired—such as to tune the performance, or to reconfigure the Versatile Bus from gross casualty (such as is not to be confused with an ability which will be discussed concerning ripple shifted error compensation such as will also be implemented through the VM Node but which is, generally, in response to casualties upon single lines)—an operational, configured, Versatile Bus Network can be stopped, reconfigured, and restarted.

The Versatile Bus chip is thusly parameterized in the eight configuration parameters. Unless the uncommon, but encompassable, effect of truncating certain Versatile Bus transaction fields and/or operations is desired, all interfacing Versatile Bus chips are set to the same configuration. In other words, a Versatile Bus chip, and Versatile Bus interconnected devices, communicate at some run time established configuration within the envelope configuration of FIG. 3. There are 31,045 different allowable configurations of the preferred embodiment of the invention. Each communicates in a manner separate and distinct in such indices as total lines (pins) used, lines (pins) devoted to each communication activity, the method(s) of performing an individual communication activity, and methods of staging communication activities (sequences) relative to one another both within a single transaction and between transactions. Thus the Versatile Bus may be run time configured, at the sites of each of the interconnected devices incorporating the Versatile Bus Interface logics, to operate at any one of 31,045 different communications protocols. A communications protocol is simply the what (what operations), when (in what relationship and/or sequence), and where (which lines and pins are used) of bussed digital communication activities. How much transpires, either in the duty cycle of Versatile Bus activities or in multi-data-word block transfers, is not considered to either alter, distinguish, or define a communications protocol. Indeed, the Versatile Bus actually effects single word to indefinitely large block data transfers without the transmission of control intelligence unique to, or particularly identifying of, such as a transfer. In other words, block data of any extent will "flow" on the Versatile Bus just like a single data word.

This concept that the Versatile Bus interface "glue" to VLSIC interconnect can be configured and applied, without more, in satisfaction of any interconnect requirement encompassable within 31,045 wide-ranging variations obviously comports with the philosophy and goal of the present invention to be a universal standard interconnect.

1.3. Functional Interfaces of the Versatile Bus

Before further explanation of the Versatile Bus function, some rudimentary definition and comprehension of the Versatile Bus interfaces is necessary. An expanded diagrammatic representation of the elements and interconnections involved in a Versatile Bus interface is contained in FIG. 4. This representation is pictorial and is intended merely to be suggestive of a physical layout involving chips, pads and interconnecting lands. The Versatile Bus comprises the interconnective bus structure 401 plus the Versatile Bus Interface Logics 402 which are replicated in each of interconnected devices **404*a* through 404*jv*. In the preferred embodiment of the invention, the Versatile Bus Interface Logics 402 connect through 37 pads 403*a* through 403*ak* to 37 interconnective lands or lines 401*a* through 401*ak* which comprise the interconnective physical bus structure 401. The Versatile Bus Interface Logics 402 can be controllably configured to communicate through as few as 3 pads and lines, but maximally pin or pad configured interfaces of the preferred embodiment may communicate across as many lines as the 37 lines 401*a* through 401*ak* illustrated in FIG. 4. The number of communicably interconnected devices logically supported by the preferred embodiment of the present invention, a number which has nothing to do with the controllable configuration of utilized pins/pads/lines from 3 to 37, is maximally controllably configured at 256 devices 404*a* through 408*jv*. Therefore since the envelope configurations of the Versatile Buses are variable, the illustration of FIG. 4 must also be thought of as representing only a particular, enveloped, one of a class of buses variable in the number of intercommunicating lines and interconnected devices. The particular Versatile Bus represented in FIG. 4 is typical of a maximum bandwith configuration of the preferred embodiment of the invention, a preferred embodiment which is a 55255355 configuration envelope Versatile Bus and which is configurable into 31,045 variations. FIG. 4 is intended to define and show the totality of functional interfaces to the Versatile Bus Interface Logics 402 such as are taught within this specification. These functional interfaces to the Versatile Bus Interface Logics 402 are the Versatile Bus 401 of 3 to 37 bidirectional signal lines, the 53 signals from plus the 46 signals to the User Logics 406 and the 13 signals ultimately from plus the 11 signals ultimately to the VM Node 408, and thence across a VM Bus 419 to a maintenance processor 410. Of these 24 functional signals to and from the VM Node 408, and thence to a connected maintenance processor 410, 7 are directly routed, 2 are also routed in parallel to the User Logics 406, and 15 signals concerning scan-set testing are normally multiplex gated within the User Logics 406 in their passage between the VM Node 408 and the Versatile Bus Interface Logics 402. These signals are illustrated in FIG. 4** as follows.

The Versatile Bus Interface Logics 402 such as are replicated in each Versatile Bus interfaced device **404*a* through 404*jv* have two major logically controlled interfaces as well as the interface across Versatile bus 401. The first of these is through 99 pads (or pins) 405*a* through 405*du* to a like correspondence of 99 pads (or pins) 407*a* through 407*du* upon the VLSI Circuit User Logics 406. The data and control signal flow upon these pads is unidirectional, with 53 of these interconnections carrying signals from Versatile Bus Interface Logics 402 to VLSI Circuit User Logics 406 and 46 of these interconnections carrying signals from VLSI Circuit User Logics 406 to Versatile Bus Interface Logics 402. A "User" is the logics (e.g., a central processor or a memory or whatever) which communicates through the Versatile Bus Interface Logics, such as are taught by this specification onto the Versatile Bus. This User interface is highly regular and simple enough for the crudest User yet accords powerful features in selectable arbitration priority, slave identification code, wait, and block data transfer to sophisticated Users. This User interface is further summarized in section 1.6**. The connections, signal flow, and manner of usage between the Versatile Bus Interface Logics and a connected User is rigorously defined in the section 6 of this specification.

Continuing in FIG. 4, the second major interface to the Versatile Bus Interface Logics 402 is through 24 pads (or pins) **409*a* through 409*x* ultimately to a like correspondence of 24 pads (or pins) 415*a* through 415*x* within VM Node 408. The "VM Node" is a "Versatile Maintenance" interconnection through which the Versatile Bus Interface Logics may also be configured, reconfigured, scan examined for occurrence and position of a Versatile Bus transmission error, set into a condition which will effectuate circumvention (compensation) of single transmission line faults (errors), and fully scan-set tested. It is not intended that the sophistication, howsoever modest, to perform these latter listed functions should reside with VM Node 408 as is diagrammatically represented in FIG. 4. Instead, the VM Node 408 and all like VM Nodes on other devices will employ a connection, which may be a bused connection, to a system centralized maintenance processor. This is intended to be represented by pads (or pins) 413***a* through 413*x* shown as providing external, not on the chip substrate interconnections to VM Node 408 in FIG. 4. The interconnection to these pads 413*a* through 413*x* is called a VM Bus. It is intended that further definition of the VM Node and the VM Bus should provide at least one essential capability—that chip devices so VM Bus interconnected shall be initializable as networks for Versatile Bus communication.

Wishing to teach all functions, including both essential initialization and non-essential support, such as are performed for the Versatile Bus Interface Logics 402 by or through the VM Node 408, this specification disclosure teaches in section 7 the connections, signal flow, and manner of usage of the 24 interconnections 409*a* through 409*x* between the Versatile Bus Interface Logics 402 and VM Node 408. Management of these 24 interconnects, 13 of which connect unidirectional signals from the VM Node and 11 of which connect unidirection signals to the VM Node, is easily accomplished by a microprocessor. Such a microprocessor may be defined as the Maintenance Processor 410 directly serving the Versatile Bus Interface Logics 402 of all Versatile Bus 401 interconnected devices 404*a* through 404*jv*. Thus the VM Node 408 becomes a nullity. In other words, interconnection pads or pins 409*a* through 409*x* may be considered to connect directly to a signal and control source, such as a microprocessor, capable of easily effectuating (under programmed control) simple control sequences across this interface such as will accomplish all the above-named functions. The only reason that this disclosure makes reference to a "VM Node" instead of an "Initialization and Mantenance Microprocessor Interface" is to sensitize the reader to the concept that some split of function might be possible between device associated logics—a VM Node—and device external logics—a Maintenance Processor—in an optimized system. It is asserted, but not taught within this application, that such a split is possible—that the VM Node could actually contain logics. Why should this abstract concept of a "split of function" matter? Why might it be interesting if a VM Node were, particularly, to perform such initializing function as is already "easily effectuated" by a microprocessor? The answer is that this Versatile Bus for interconnection of VLSIC devices is slated for thousands of separate interconnection networks to be replicated millions of times. Must each, or some number, or separate Versatile Bus networks be supported by a VM Bus 419 connected Maintenance Processor 410—such as costs money, space and power in each system? It is asserted that self-initialization of Versatile Bus networks is possible—but disclosure of such method and apparatus, such as is of obvious moment to system design, is beyond the content of the present application. Instead, as stated, this specification disclosure merely teaches the control and usage of interconnections 409*a* through 409*x*. This Versatile Bus Interface Logics interface to the VM Node is further summarized in section 1.9, and rigorously defined in the specification.

This concept of a VM Node and a VM Bus will be restated for clarity. The 24 interconnective pads (or pins) 409*a* through 409*x* are utilized to initialize, configure, single error correct and double error detect, and scan-set test the Versatile Bus Interface Logics 402. These interconnects can be managed, particularly for the initialization function, by real on-chip logics in an area called the VM Mode. In such a case, the VM Nodes 408 of as many User devices 404*a* through 404*jv* as exist will be interconnected by a structure called YM Bus 419. A Maintenance Processor 410 may also be connected to VM Bus 419 if more extensive function than mere initialization is desired to be effected on the Versatile Bus Interface Logics. Since all such added function will be taught anyhow in a section of this specification called the Versatile Bus Interface Logics to VM Node Interface, the function of initialization will also be taught to be accomplished by such Maintenance Processor 410. In such case the VM Node 408 is not a functional logic area, but rather a mere conduit of signals between, on one side, the Maintenance Processor 410 and, on the other side, the Versatile Bus Interface Logics 402 or the User Logics 406 or both.

The detail signal flow between the Versatile Bus Interface Logics 402 and the Maintenance Processor 410 include 7 direct lines, 2 lines which are also input to the User Logics 406, and 15 lines concerning scan-set testing which are gated through the User Logics 406. Referring to FIG. 4, Versatile Bus Interface Logics 402 pads 409*a* through 409*o* connecting the like pads 411*a* through 411*o* within the User Logics 406 are considered to carry 6 signals output from Versatile Bus Interface Logics 402 and 9 signals input to Versatile Bus Interface Logics 402, all of which are involved with scan-set testing. These signals may be multiplexed through dotted-line-enclosed scan-set area 412 within the User Logics for the very simple purpose that scan-set test patterns input from and output to Maintenance Processor 410 via VM Node 408 and VM Bus 419 may also be routed to and from scan-set test loops within the User Logics 406. In other words, the extensive, five test loop, scan-set test capability as will be implemented in the preferred embodiment of Versatile Bus Interface Logics 402 will probably be but a part of an overall system scan-set test scheme for User device 404*a* such as also includes User Logics 406. The multiplexing of scan-set test signals within this scan-set area 412 of the User Logics 406 may be obviated for the purposes of the present invention, and all signals appearing on Versatile Bus Interface Logics 402 pads 409*a* through 409*o* may be considered as transmitted directly to VM Node 408 pads 415*a* through 415*o*, and thence to VM Node 408 chip pads 413*a* through 413*o* (which are interconnect pads to User device 404*a*), and thence across VM Bus 419 to Maintenance Processor 410.

Similarly within the illustration of FIG. 4, Versatile Bus Interface Logics Pads 409*p* and 409*q* represent signals called (H) CLEAR and (H) INIT ($\phi$1-$\phi$1) from the Maintenance Processor 410 across VM Bus 419 into VM Node pads 413*p* and 413*q*, and thence respectively to both such pads 409*p* and 409*q* within the Versatile Bus Interface Logics 402 and to pads 421*p* and 421*q* within the User Logics. Thus these two signals, for such purposes of clearing and initializing as may be roughly surmised by their names, are distributed in parallel to both Versatile Bus Interface Logics 402 and User Logics 406. Finally, 7 signals connecting through Versatile Bus Interface Logics 402 pads 409*r* through 409*x* to VM Node 408 pads 415*r* through 415*x* to VM Node 408 pads 413*r* through 413*x* through VM Bus 419 do directly interconnect Versatile Bus Interface Logics 402 and Maintenance Processor 410. Such discrete signal flow makes it obvious VM Bus 419 is more an interconnection network than a digital bus, and Maintenance Processor 410 is managing a large number of discrete lines for the totality of User devices 404*a* through 404*jv*. Nevertheless, such management is simplistic and can be done by brute force. An astute reader will no doubt hypothesize that should some regularity by discerned within the Maintenance Processor 410 performed initialization/configuration/error correction/test function performed for Versatile Bus networked User devices 404*a* through 410*jv*, then it might be efficacious to install nodal logic within VM Node 408 and thusly to turn VM Bus 419 into a specialized communication bus as opposed to merely a massive interconnection network. Such VM Node logics are not part of this specification, which teaches 24 interface signals to present invention to be directly manageable by a maintenance processor which is but a simple device required simply to sense input lines and to set and clear output lines to effectuate desired initialization/configuration/error correction/test purposes. As an ultimate simplification, it will be taught that the Versatile Bus Interface Logics 402 and Versatile Bus 401 will still function if the 24 VM Node interface signals are not managed at all, and are simply hardwired. In such a case, however, considerable initialization/configuration/error correction/test versatility such as is, in part, the hallmark of the present invention of a versatile interconnection bus will be partially sacrificed.

The Versatile Bus Interface Logics interface to the VM Node is further summarized in section 1.9, and rigorously defined specification section 7. The Versatile Bus Interface Logics to User Interface is also rigorously defined in specification section 6.

1.4. Distributed, Time-Phased, Selectable Priority Arbitration

A Versatile Bus transaction is a set of activities on a Versatile Bus interconnect where one User chip or subsystem gains control of the interconnect, communicates with another chip or subsystem on the interconnect, and releases control. If more than one User chip or subsystem device can be in simultaneous contention for gaining control of the Versatile Bus to perform a transaction, then arbitration is necessary. Thus the first activity occurring in a transaction is arbitration. The purpose of arbitration is to select one of the contending Users to be a Master the Versatile Bus to control the remainder of the transaction. The Master so selected is called the Versatile Bus Owner for the remainder of the transaction.

A Master interested in being an owner is called a Bidder. Before arbitration, no chip know which masters will be Bidders. Just before a new arbitration begins, each master knows: (1) whether it wishes to become Owner, (2) how long the transaction would last if it should become the Owner, and (3) who should be Owner for any possible combination of Bidders.

Arbitration on the Versatile Bus is conducted on signal lines. Interpretation of and participation in arbitration is completely distributed, or decentralized, in all the interconnected Versatile Bus Interface Logics "chips". Each one of the Versatile Bus Interface Logics, as individually associated with individual User chips or subsystems desirous of sometimes communicating on the Versatile Bus, contains equal and complete arbitration logics. Not only will these arbitration logics enable a Bidder to know whether it has won or lost arbitration, but all interconnected Interface Logics, Bidders and non-Bidders alike, follow all the arbitration and know exactly who won. This concept is important, for it alleviates the need for redundant signal lines identifying the new Versatile Bus Owner in the upcoming transaction. To restate, at the end of distributed arbitration every Versatile Bus Interface Logics on the entire Versatile Bus knows the arbitration identification of the new Owner. If the new Owner now continues with the transaction by communicating to one (or in broadcast mode to several) device(s) than each linked device (how devices are addressed for linkage is discussed later) knows exactly from whom it is receiving communication. The device(s) may need to know this for their further function. But, most importantly, the current Master Owner to linked Slave Versatile Bus transaction will end, and the Versatile Bus be open to other transactions, before the linked Slave may respond. For example, a memory might be working for many multiples of the Versatile Bus transaction time before being ready to deliver back a word requested to be read. If the former linked Slave, in the example a memory device, now contends as a Master to go on the Versatile Bus and communicate (for delivery of a read word) with the initiating Owner of several transaction cycles past, then it needs to know and will know the identity of that Owner. This characteristic of some Versatile Bus communicating devices at various times to serve as both Masters and Slaves for communication on the bus is why they are called Master-Slaves.

Arbitration on the Versatile Bus may be run-time selectably configured (configuration parameter II in FIG. 3), to be time-phased. Time-phased arbitration is a way of time multiplexing arbitration onto a reduced number of lines and associated pins (pins are a scare resource in VLSIC). Generally, non-timed-phased arbitration amongst n potentil masters requires $n-1$ lines and associated pins, called an arbitration group. For large n, $n-1$ lines is too many in many system configurations. One would prefer to use fewer lines and more time to arbitrate among a larger number of Masters. This is done by exercising the arbitration group lines in time sequence. Each group operates under normal arbitration priority except that it deals with a set of Masters that is selected by the previous sequence. Each Master must know which set of Masters it belongs to for each arbitration sequence, so that it knows which line to drive. All Bidders in a single sequence drive the same line or lines in wired-OR manner. Thus, a set is a Bidder if any of its constituent Masters is a Bidder. The winning set of Masters is the only one that continues arbitrating; all other Bidders wait for another transaction. Ultimately, after the configuration-specified number of time-phased sequences, the Versatile Bus Owner is selected. The preferred embodiment of the invention can support time phasing of arbitration sequences to eight deep. At this eight deep level of time-phased arbitration only one arbitration line will suffice to arbitrate amongst 256 Versatile Bus Masters (the maximum number supported by the preferred embodiment of the invention).

The Versatile Bus Interface Logics offer multiple selectable arbitration priority to Users. Specifically, each User may arbitrate through its associated Versatile Bus Interface Logics on each and every single Versatile Bus transaction at whatsoever priority it chooses. Therefore reconciliation of the arbitration priority "IDs" to be assumed by devices interconnected by a Versatile Bus system becomes a system design task. This User determined priority of arbitration is established by a formatted code of up to eight bits transferred from the User to the Versatile Interface Logics. Normally simple Users will utilize only one, system designer assigned, priority of arbitration which may even be hardwired. Multiple priorities of arbitration are most useful to, and normally exercised by, User devices such as microprocessors that have the "intelligence" to discriminate in the urgency of their requests to go on the Versatile Bus as Owners. Even these User devices are usually system constrained to operate at a reasonable number of different priorities and probably operate on most transactions at the same priority. If a User does not wish to change, or update, its priority, it need not do so.

As a system design task, if multiple priorities are possessed by the Versatile Bus Interface Logics of a single User device, then that number of priorities is subtracted from the number available (maximum 256 in the preferred embodiment of the invention) in a particular Versatile Bus configuration. For example, if arbitration amongst sixteen assigned priorities (Masters) is supported by a particularly set Versatile Bus configuration, then only eight devices utilizing two priorities each would be interconnected. Normal system initialization accords unique priority identification or identifications to all devices contending for the Versatile Bus in arbitration. Some devices, such as transceivers operating to send only from one Versatile Bus network to another Versatile Bus network may be on a Versatile Bus but do not arbitrate and therefore require no arbitration priority identification. The concept of User selectable choice amongst multiple priorities for arbitration should not be confused with the overall hierarchy of priorities for arbitrating the Versatile Bus. Although a special hierarchy of arbitration is anticipated, it is not taught in the preferred embodiment which may be considered to straightforwardly arbitrate priority 1 as winner over priority 2 as winner over priority n (n equals a maximum of 256). Therefore a device arbitrating at priority 1 always wins the Versatile Bus ownership.

1.5. Pin Multiplexed or Pipelined Operation

The Versatile Bus can be selectively configured to pin multiplex up to four of the activities performed on the Versatile Bus onto the same lines (pins). These four activities are arbitration, slave identification/function, wait and data. Pin multiplexing requires, since the same pins (lines) are to be variously used at different times for different activies, that such activities transpire sequentially. The similar phrase "time multiplexing", although also entailing sequential transpiration in time, is normally reserved for a different concept: that a single activity such as arbitration might be "muliplexed" (i.e., performed in sequential phases) across time. One "time multiplexed" single activity, time-phased arbitration, may be performed on the Versatile Bus with and without pin multiplexing. Pin multiplexing on the Versatile Bus may be very extreme. Normally 37 pins are utilized by larger configured interfaces of the 31,045 supported by the preferred embodiment of the invention 55455355 configuration envelope. All the Versatile Bus functionality carried on up to 37 pins may be pin multiplexed through six intermediate cases (each subsuming thousands of different configurations) down to the final case where all four activities transpire upon the "data" lines. If the selected configuration within the case utilizes one data line, then only three total pins are used. That only three pins, including but a single data pin, are utilized for the Versatile Bus interface does not preclude maximum functional performance (although variations are slightly constrained): arbitration between 256 master-slaves, followed by slave identification of any of 256 devices, followed by data transfer which may be block and indefinitely long is entirely possible across only three pins. Of course, time is being sacrificed for pin economy. To repeat, a Versatile Bus can operate on as few as three pins at each interconnected device due to pin multiplexing.

Alternatively, the Versatile Bus can be selectably configured to operate in a two to ten deep pipeline with a latency of two to ten cycles. The most common pipeline, and a highly preferred Versatile Bus operational configuration, will be three deep with a latency of three cycles. In this case the three activities of arbitration, slave identification/function, and wait/data (wait on some lines at the same time as data is on other lines) as are associated with three different communications transactions will be time overlapped. Pipelining requires separate sets of pins to convey information about the different activities performed on the Versatile Bus. When arbitration is pipelined, up to eight deep, then activities associated with up to ten separate communication transactions may be simultaneously in progress. The concept is similar to time overlapping of functional sequences within digital logic devices such as microprocessors. In order to understand what a transaction is, what a cycle is, and what activities may be multiplexed or pipelined it is necessary to understand, at this point, at least the names and time sequencing of activities such as transpire on the Versatile Bus.

A Versatile Bus transaction is a set of activities on a Versatile Bus interconnect where one chip or subsystem gains control of the interconnect, communicates with another chip or subsystem on the interconnect, and releases control. Each transaction progresses through a sequence of activities separately defined and described below. Each activity may be expressed in one of several formats, depending on the particular Versatile Bus configuration, and may take anywhere from zero to an indefinitely large amount of time. An entire transaction can take one or more clock periods (cycle times), depending both on configuration and on individual types of transactions.

Referring to FIG. 5 a transaction may be recognized on a Versatile Bus interconnect by observing the activities of two lines, called BEGIN and BUSY. The active state of both lines is represented by the logically High level. The duration of one cycle time, forty nanoseconds in the preferred embodiment of the invention, is represented by the width of the active BEGIN signal. The effective (pipelined) cycle time duration of a complete communication transaction is given by the cycle time between when the BEGIN signal becomes active and that cycle time (which may be the selfsame cycle time) in which the BUSY signal becomes inactive, plus one cycle time. Therefore TRANSACTION 1 in FIG. 5 is two plus one, or three cycle times duration while TRANSACTION 2, showing an active BEGIN signal with a same cycle inactive BUSY signal is zero plus one, or one cycle time in length. Between TRANSACTION 1 and TRANSACTION 2 the shaded area represents inactivity of the Versatile Bus for one cycle time of forty nanoseconds. The BUSY signal is best thought of as meaning "busy next cycle." A transaction may not start with the active state of the BEGIN signal until the BUSY signal has been inactive, or not busy next cycle, for one cycle time. Thusly it is the inactive, logically Low state meaning bus not busy next cycle, of the BUSY signal which is of primary interest to demarking both the end of one transaction and the enablement of another. Consequently, and with momentary reference to FIG. 8, when the constituent parts of single transaction are numbered in later figures it will be this more interesting, transaction terminal, not busy, logically Low state of the BUSY signal which will receive a number designation.

All communication and control lines, including those dedicated uneliminatable two lines which carry the BEGIN signal and the BUSY signal, are driven in a wired-OR fashion. In order to accomplish such wired-OR communication, the logically "true" or "1" state will be transmitted a 0 volts d.c., or Low, upon the bus lines while the logically "false" or "0" state will be transmitted as 3 volts d.c., or High, upon the bus lines. The method of this transmission is contained in accompanying U.S. Pat. No. 4,500,988, the contents of which are incorporated herein by reference. Meanwhile, however, it is recommended that the reader not drop back all the way to the electrical communications protocol of the bus in order to understand the origin and function of the present signals, but simply keep in mind the well-known logical OR function. On a communication bus line, implementation of logically OR'ed function via wired-OR interconnection means that any interconnected device(s) may cause a logically true, or "1" condition—such as uniformly appears as the logically High level in all signals of FIGS. 5 through 8—while all devices must agree (none can transmit true) if any signal is to be seen as logically false, or "0" upon the Versatile Bus.

So considering the logically OR'ed nature of bus communication, including communication of the BEGIN signal and the BUSY signal, then the true, or High state of the BEGIN signal in FIG. 6, representing that a transaction can begin, may be driven by any one or ones of interconnected devices which desire to commence a communication transaction. Such device(s) so drive the BEGIN signal to the true condition only after the BUSY signal has been in the false, or Low state during the previous cycle time. How the BUSY signal gets into this not busy state will be dealt with imminently. All devices driving BEGIN to a true state are also responsible for driving the BUSY signal true for howsoever many cycle times minus one cycle in which any pins or set of pins (as are associated with any activity) will be utilized during that transaction. Multiple cycles of arbitration will be visible in later Figures: the important concept for present purposes is that all arbitrating devices are managing, in a wired-OR fashion, the individual signal BUSY. When one device wins arbitration then, should it not already have acquiesced with all other devices that the signal BUSY can be driven to the not-busy, low, state by all device acting in common, then such device may, unilaterally, keep the BUSY signal true, or high, until it (alone) knows that the transaction might run for multiple cycle times, as for multitime-phased activities and/or block data transfer, will be shown in later Figures. The important concept for the present purposes is that the BUSY signal is enforced in its true, or high, state meaning bus busy by any devices or device which knows this to be the case. Only when all devices, including the device which may or does own the bus and may thusly be possessed of unique knowledge concerning the cycle time duration of the transaction, agree that the bus will not be busy next cycle then is the wired-OR bus drive of all devices such that the bus not busy, false, or low state of the BUSY signal will be seen. When all devices see this not busy state of the BUSY signal, then any device or devices may (jointly) initiate the true, or high, condition of the BEGIN signal to commence another transaction. If no device desires to go on the bus, then correspondingly no device will (in knowledge of transaction duration) either upon that cycle time, or later, unilaterally institute the true, or high, or busy state of the BUSY signal. The BUSY signal remains low, or bus not busy, and any device or devices are still enabled to begin by raising the true, or high, state of the BEGIN signal upon a subsequent cycle time.

There are four separately identifiable activities that occur during a communication transaction. (By convention, when any of these activities is not used in a particular Versatile Bus configuration, we say that it is degenerate and takes no time and no pins to implement.) They are Arbitration, Slave Identification/Function, Wait, and Data. Of such of these activities as are selectably configured to be performed, Arbitration will always be completely performed before slave identification/function is completely performed before wait and data, which may be sequential or simultaneous, are performed within a single communication transaction. Such a sequential performance is illustrated in FIG. 6, wherein each of the four activities is configured to have uniquely dedicated pins (lines) upon the Versatile Bus. Since wait and data transfer need not be sequential if each is accorded bus line (pin) resource they are shown in FIG. 6 as transpiring during the same cycle time. When such is the case these two operations are jointly referred to as wait/data, not because a single conceptually unitary function is being performed as in "slave identification/function" but because both operations (which actually represent transmissions in different directions as between the bus owning master device and a slave device(s)) are proceeding simultaneously. Note in FIG. 6 that arbitration commenced in the same cycle time as the BEGIN signal went active. Note also that the BUSY signal was Low, or inactive, in the cycle before the BEGIN signal went high—such as enabled the transaction to begin upon the cycle which it did. Upon this beginning cycle time, the BUSY signal remained Low. This is because all activities, including the arbitration activity, on dedicated pins, are proceeding to completion in one cycle. This means that another transaction, leading off with arbitration upon those selfsame dedicated pins, could commence next cycle time. Before further examining this usage of pins dedicated to a particular function, which permits pipelining, it is illustrative to note the transaction timing, as demarked by the BEGIN and BUSY signals, when all activites are pin multiplexed onto the same pins.

If a set of pins is used to convey information about two or more activities, we say that those activities are pin-multiplexed onto the same lines (and pins) of the Versatile Bus. FIG. 7 shows the time relationships among the four activities when they are all multiplexed and on the same pins (the Begin and Busy lines are never multiplexed). The logically high level represents the occurrence of the associated activity. Note that BUSY signal was low or inactive in the cycle before BEGIN signal went high—in other words the bus was not busy allowing a transaction to begin next cycle. It is clear that the multiplexed pins can be in use by some activity at all times, as the Arbitration activity of the next transaction can begin in the clock cycle immediately following the old Data Transfer activity. FIGS. 5 through 7 are elementary diagrams meant to show only the time relationship of activities—in actuality such activities can occupy more than the single cycle times shown in those Figures and Versatile Bus timing will be dependent upon the amount of such activities.

If separate sets of pins are used to convey information about different activities, the activities can be configured to be "pipelined". FIG. 6 shows the time relationships among the activities when they are pipelined. They appear almost identical to FIG. 7, except for a difference in the overlap of Wait and Data Transfer and in the Busy line. This is a crucial difference, as shown in FIG. 8 which illustrates the activities within two transactions, numbered transactions 1 and 2. A new transaction can begin even before the current one is completed! Even though any one transaction may take several cycles to complete, the rate of new transactions is limited only by the longest single activity such longer activities as will be shown in later Figures. The pipelined/multiplexed choice can be generalized slightly by observing that one could multiplex some activities and pipeline others. More efficient Versatile Bus configurations can often be achieved this way when activities take differing amounts of time. New transactions are limited by the time of longest pin usage.

The pipelined operation mode is especially powerful and supports nearly 100% efficient communication utilization of the bus bandwidth between large numbers of actively contending and dynamically linking Master-Slaves. In the preferred embodiment of the invention the Versatile Bus repitition rate or bandwidth, is 25 megahertz; a single cycle time is 40 nanoseconds. Nearly 100% efficient utilization of this bandwidth means that nearly 25 mega-words of useful commands and/or data are transferred each second over the Versatile Bus interface. The "large numbers of actively contending and dynamically linking Master-Slaves" are the up to 256 devices which can be linked by the preferred embodiment of the invention. As a further illustration of the deep pipelining of which the preferred embodiment of the invention is capable, three deep pipelining of a 52252355 configured Versatile Bus is shown in momentary reference to FIG. 30, which should be associated with the more simplistic to FIG. 8. Although at this point pin utilization and the various activities have not yet been fully explained, it is possible to see in FIG. 30 that the three activities of arbitration overlapped with slave identification/function overlapped with wait and data may be simultaneously in progress, or pipelined, during a single cycle time of the Versatile Bus (note particularly CLOCK N+2). The parity activity as accompanies all transaction cycles on the Versatile Bus is generated in respect to all Versatile Bus lines and is therefore not related solely to the lines utilization of any single transaction. In other words, the EVEN and ODD parity signals and the BEGIN and BUSY signals are involved in Versatile Bus control and error detection, and support the pipelined transaction activities. Parity is discussed further in a subsequent section. Again, the important initial showing in FIG. 30 is the 100% duty cycle of pin utilization once pipelined transactions are in progress. Conversely, it may be observed that an individual transaction incurs a latency, or time to complete, of up to 3 clock cycles.

1.6. Versatile Bus Logics Interface to User

Each Versatile Bus Interface Logics services a User as well as communicating across the Versatile Bus with other Versatile Bus Interface Logics. Therefore an interface is presented to the User, which may be on a separate chip or, as is more common, will be on the same physical substrate upon which the Versatile Bus logics are implemented in VLSIC. The User and its Versatile Bus Interface Logics are together referred to as a Versatile Bus interconnected device.

The Versatile Bus logics offer the User a uniform interface which is simple of manipulation. The User interface is generally insensitive to Versatile Bus configuration. The sole area of exception is the arbitration ID of up to eight bits, which must be presented by the User to the Versatile Bus logics in one of five formats determined by the arbitration configuration of the Versatile Bus. That is, to arbitrate a User should know in which arbitration alignments (twelve pipelined, ten multiplexed) the Versatile Bus is configured. All else—slave identification and function, wait, and data—is invariant and opaque to the User regardless of the Versatile Bus interface configurations.

The following advanced features are implemented in the Versatile Bus logics to User interface. The arbitration ID is completely User selectable for each and every arbitration process. Sophisticated Users can bid for the Versatile Bus with different arbitration priorities at different times dependent upon the urgency of their access. Reconciliation of the up to 256 Versatile Bus priority ID's are left to the systems designer/programmer. Priorities within and between Versatile Bus interconnected devices are expected to be adjusted by clever allocation to minimize bottlenecks and maximize system throughput. Conversely, if a User does not desire to put the same or different arbitration ID's into the interfacing Versatile Bus logics for each transaction cycle, it can raise a signal called Auto Retry which leaves the Versatile Bus Interface Logics arbitrating at some priority upon each transaction to become Versatile Bus owner while the User can go on about its business.

Because of the staged sequences of arbitration, slave ID/function, and wait/data (which may be pipelined) on the Versatile Bus, the User can start a request to go onto the Versatile Bus through arbitration some transaction cycles ahead of when it will actually have the data ready for transmission. This ability to recognize the imminency of an upcoming transfer event is common in microprocessors and fully accommodated by the Versatile Bus.

The Versatile Bus itself carries no control intelligence uniquely associated with block data transfers (as opposed to single word data transfers). In other words, one word or one million can flow across a Versatile Bus linkage under identical protocol. This uniformity of control for all length transfers also appears at the Versatile Bus Logics to User interface. This is especially remarkable when it is remembered that the Versatile Bus need not even perform arbitration (e.g. there is only one master) and slave ID/function (e.g. broadcast mode is implemented) functions. Only data transfer is irrevocably necessary in a Versatile Bus transaction. A User which becomes a slave will not a priori know, and will not be differently interfacedly controlled from the Versatile Bus logics, whether it will receive one data word or many. To repeat, there is absolutely no special control associated with block data transfers.

1.7. VLSIC Wired-OR Logic and Two Phase Electrical Communication Protocol

The preferred embodiment of the Versatile Bus communicates at a 25 MHz data rate. To be more specific, a data bit presented to the interchip communication system must be usable on the next chip 40 nanoseconds later. A pin transmitting data at this rate is called 100% pin-efficient. Note that issues of current drive, gate delays, noise, error correct, etc., are intertwined here. The time to communicate is thus a function of the physical structures—CMOS VLSIC, printed circuit substrate printed wiring, etc.—in which the preferred embodiment of the Versatile Bus is implemented. The communication scheme and driver/receiver apparatus of the present invention are taught in accompanying U.S. Pat. No. 4,500,988 for a VLSI wired-OR Driver/-Receiver Circuit. The contents of that application are expressly incorporated herein by reference. For ease in utilizing the present application, the wired-OR communications scheme of the present invention as implemented in a two-phase electrical communications protocol is restated in the following paragraphs.

Data sent over the Versatile Bus interconnect of the preferred embodiment of the invention is readable by as many as 20 chips simultaneously. That is, there are situations where many chips wish to read the bit sent out by one driver. This fanout limitation of the preferred embodiment is not in conflict with the logically implemented capability of the preferred embodiment of the invention to logically support linkage for bussed communication between up to 256 devices. The logical capability is taught. If fanouts utilizing the full logically implemented arbitration and addressing spaces are desired, larger driver transistors or repeaters; or a slower clock, must be employed in place of those utilized in the preferred embodiment implementation of the invention.

All communication of the Versatile Bus is by the use of wired-OR logic amongst the interfacing logics. To support this wired-OR logic as implemented in high speed VLSIC technology, an electrical communications protocol utilizing time-phased active pull-up logics integrated into VLSI circuit devices, in conjunction with the unavoidable capacitance of the wire interconnection, was adopted. This scheme of time-phased active pull-up logics allows wired-OR logical communication of the Versatile Bus to transpire with several advantages. The scheme avoids the economic, space, weight, power, and reliability costs associated with external pull-up resistor packages. The active distributed pull-up logics avoid the speed limiting RC time constants of passive pull-up resistors. The numerous interconnected active pull-up logics can be individually constructed of less powerful transistor-types because they will be additive or reinforcing when operated jointly on each interconnected line of the Versatile Bus. The manner in which this active pull-up, time-phased, high speed VLSI wired-OR logical communication transpires is as follows.

A clock of two approximately equal phases, both within each 40 nanoseconds, is applied to every interfacing chip on a Versatile Bus. During a first phase all interfacing chip logics drive all Versatile Bus lines to a +3 volt d.c. logical High condition. During a second phase all drive is disconnected from the bus save for one or more Versatile Bus owning interfaces which may wish to drive certain lines to a +0 v.d.c. logical Low condition, a state which represents transmission of a logical "1" on the Versatile Bus lines. For any lines upon which (the) Versatile Bus owning interface(s) desire to transmita logical "0" the line is simply left alone. That is, the potential bus driver(s) as well as all other interfacing elements simply present a high impedance to the line. Versatile Bus Interface Logics not owning the Versatile Bus this transaction also do no driving, but simply present high impedance during this second phase. The net result is that if the Versatile Bus owner(s) of a line does (do) not drive it toward 0 v.d.c., the intrinsic unavoidable capacitance of the Versatile Bus line will keep it in essentially the +3 volt d.c., logical "0", state throughout the second clock phase and until the next first clock phase line charging. All interfacing logics gate the Versatile Bus line during this second clock phase. If the line has been driven toward 0 volt d.c. a logical "1" will be sensed. But if the line has not been so driven, and remains at essentially the +3 volt d.c. for at least the short duration of the second phase (a duration of approximately ½ of the 40 nanosecond total), then all interfacing logics sense a logical "0".

The wired-OR logics mean that data may be sent by more than one chip into the same line. In this case, the chips reading the line must read the logical OR of all drivers. The chips are always aware of when multiple drivers are possible; they may choose to drive the line in a different manner at those times, such as during the conduct of time-phased arbitration.

Collisions are encompassible without catastrophic failure. Under certain abnormal conditions, different chips may attempt to drive a single line in different directions. In these cases, the logical OR of driven information will be transferred on the line. The drivers will not suffer permanent damage, nor will other lines not in such conflict be caused to operate incorrectly.

1.8. Error Detection and Rippled Switched Error Compensation

As stated in the Background of the Invention section discussing prior art error detection and correction, an effective single error correction double error detection (SEC/DED) method has been selected for the Versatile Bus. It is considered more effective than prior art methods because it eliminates error checking delay to the pipelined transaction time when no error actually occurs (e.g., it is no time overhead SEC/DED), it provides 100% pin coverage, and it requires only two pins.

The chosen method provides optional error detection and error compensation facilities that are designed to handle errors occurring in the Versatile Bus interconnect network, that is, other than within individual User chips. Problems occurring in line drives and receivers, the internal package leads, and the pins and substrate wiring are included.

The method takes advantage of known characteristics of the V Bus bit transfer electrical protocol. Failures in the bus first manifest themselves as nonconformance to the electrical protocol if the failure is a short to ground. Quite simply, such a failure is detected at any interconnected device upon any line during clock phase 1 of the two clock cycles within each communication cycle time as the failure of a line to assume the +3 volt d.c. level. This means either that such line is experiencing a low resistance short to ground or, equivalently for purposes of compensation, sufficiently many of the synergistically cooperatively operative line charging transistors are inoperative that the line is not assuming the proper +3 volt d.c. level. This first error detection is called the stuck low test and is invarialy accomplished at all devices upon all lines during the cycles regardless of the concurrency of any error compensating ripple shifted alignment and regardless of the past or concurrent occurrence of any other number of this or like error. In other words, the stuck low test is always performed.

A second, stuck high, test is performed during clock phase 2 of the two clock cycles within each communication cycle time as another means of error detection. This test is implementable only at those devices and upon those lines which are being driven, during clock phase 2, to a 0 volt d.c. level (transmission of a binary "1"). Since each device so driving knows that the wired-OR communication line will assume the 0 volt d.c. level, regardless of the actions of other drivers, then it will compare its internal logical state (transmission of a binary "1") with the actual voltage assumed by the driven line. If the line fails to assume 0 volts d.c. because it is open to the driver, because the driving low has failed, or because it is shorted to power, or the like then the stuck high test has been failed. Like the stuck low test, the stuck high test is always performed to the maximum extent possible at all devices upon all lines during all cycles.

The normal meaning of error detection—parity error detection—is but the fourth test on the Versatile Bus. It is, after the other three tests have failed to detect error, particularly useful for the detection of open lines. Parity is generated across all Versatile Bus lines every clock cycle by every device, regardless of transaction activity. The result is sent by all devices, in the following cycle, on an odd parity line and on an even parity line using Versatile Bus wired-OR protocol as was discussed in the prior section. The result is also read by all devices and any discrepancies are detected and reported. An error, representative of an open line, will be detected at all devices for all lines save the parity lines. That is, an open circuit in the parity line itself will not be detected. This case, however, does not strictly represent a failure, in that the other lines are still valid. With both odd and even parity lines in use, all devices will recognize any failure on any line except the party line. If, with a parity in an undetected latent failure, or open, condition another Versatile Bus Line, not the remaining prity line, fails then some Versatile Bus interconnected device(s) will be able to detect the failure. All parity error detection is collected as a Versatile Bus fault, or failure, indication and supplied to the VM Node/Maintenance When only one parity line, the odd parity line, is in use following a ripple shifted error compensation of the Versatile Bus then, generally, either one (only) device or all devices save one will recognize the parity error. No recognizing device can know whether it is the cause of the error. Generally, these intricacies of the varying situs of error recognition are unimportant.

To effectuate corrective error compensation, by the ripple shifted manner such as will be described, from any errors, including parity, detected by any of the four tests it is of threshold necessity that the maintenance processor be alerted through the VM Node. Therefore it only starts to matter in extremely deep error recovery, two failures and more, which device has detected the parity eror. Normally upon the reporting of a parity error from anywhere(s), the Versatile Bus will be stopped, interrogated at interconnecting devices concerning the nature and line effectivity of errors, correctively compensated in ripple shifted circumvention of such errors, and restarted.

The concept that the parity bits of a given transaction really represent the parity assigned to the preceding transaction is important. In the first case, this means that absolutely all Versatile Bus lines—active and inactive and including the parity lines themselves—from the previous transaction are used to formulate the parity carried in the given transaction. In the second place, parity errors will be recognized one cycle after the failing transaction transmission. This is the price paid to avoid time overhead for parity checking within the pipeline of the Versatile Bus. System utilization of detected parity errors for corrective reconfiguration will be discussed, and system utilization of detected parity errors for post recovery will be generally discussed. Both future avoidance of error conditions and post recovery from error conditions will involve signals transmitted across a maintenance bus, the VM Bus, as will be discussed. But for post error recovery it should be considered that the Versatile Bus system, and Versatile Bus system User devices, should be designed to encompass the fact that one bad transaction could transpire on the Versatile Bus prior to a Versatile Bus system wide error alert and corrective reconfiguration.

To achieve corrective reconfiguration SEC/DED on the bus lines, the odd parity line is augmented by a similar even parity line. The two parity lines together make up a 1 of 2 code that assures that all devices are aware of a failure:

| Parity Lines | Situation |
|---|---|
| 00 | One or both of the parity lines are shorted to ground |
| 01 | Normal even parity |
| 10 | Normal odd parity |
| 11 | Parity error, or one or both parity lines are shorted to power |

The error situation of 00 occurs only upon power up master clear, during normal operation of the Versatile Bus any incipient short in a parity line (the only manner in which situation 00 could exist) will be detected during the stock high test.

Whenever the 11 case is detected by a device, it is reported. The reports and appropriate tests can be utilized to establish the specific nature and location of the failure. As for the odd parity line, an open in even parity line will have no effect on operation; a subsequent failure in another line will cause only a subset of error reports. An open in the odd parity line will also have no effect upon operation devices on each "side" of the open continuing to generate and see correct odd parity. If, however, a subsequent, second, line failure occurs then the latent open of the odd parity line will preclude ripple shifted error compensation.

Figure 9A:
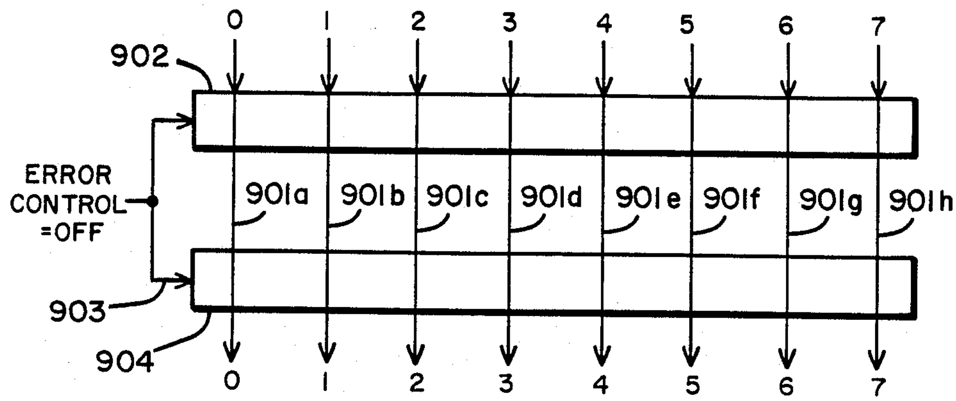

Compensation for hard errors is achieved by isolating the failed line and replacing it with a spare line. The spare line is actually the even parity line, so that Versatile Bus the system has only the odd parity line left after substitutionary replacement. FIG. 9 shows diagrammatically how the failed line can be isolated and replaced by the spare. Use of ripple shifted technique avoids any need for a large selector on any one line. In FIG. 9*a* the normal operation of a V Bus is diagrammatically represented. Driver/receiver 902, acting as a driver and part of the V Interface Logics, is communicating across eight bus lines 901*a* through 901*h* to Driver/receiver 904, acting as a receiver and part of the V Interface Logics of a connected device. Interface bus line 901*h* is the even parity line, which can be considered as a sort of spare interface communication line. Control line 903 is a diagrammatic representation of error control, which is Off, or inactive, in FIG. 9*a*. In the preferred embodiment of the invention error control comes from the maintenance processor via the VM Node.

Figure 9B:
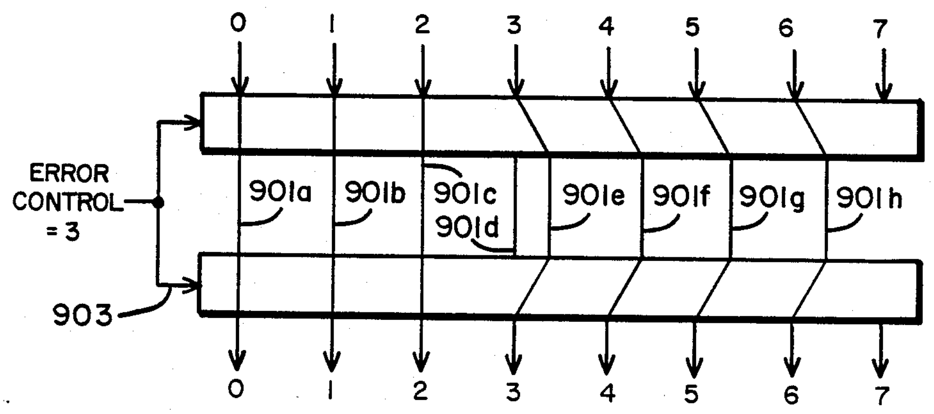

The ripple shifted replacement of a failed V Bus line, or interface driver/receiver is diagrammatically illustrated in FIG. 9*b*. An error has been reported through the VM Node to the Maintenance Processor by any device. The maintenance processor stops further Versatile Bus system communication activity through the VM Node and interrogates a line sensitive fault register within the error reporting device(s) as well as possibly looking at such register within all devices and/or running scan-set tests. For illustrative example, it is hypothesized between FIG. 9*a* and FIG. 9*b* that the maintenance processor directly recovers a pattern indicating, or is able to direct information exchange to straightforwardly diagnose, that the communication interface over bus line 901*d* has failed as detected by any of the four tests. The maintenance processor then feeds a realignment pattern—simply a string of binary bits of value "1" with a "0" in the position of a single inoperative line—to all interconnected Versatile Bus drivers/receivers, including Driver/receivers 902 and 904, indicating that interface bus line 3, line 901*d*, is inoperative. Responsively to such realignment pattern at each interconnected driver/receiver, including 902 and 904, interface lines of lower order significance are not disturbed. But all communication which would normally transpire on the failed line, bus line 3 (line 901*d*), and all higher order lines is ripple shifted to higher order bus lines in both the drivers and receivers to avoid the physical failure. The previously most significant, or rightmost signal is no longer communicated. This is the even parity signal. Note that the User interface to the Versatile Bus Interface Logics never sees variation in the order or format of data presented (the User never received the Versatile Bus even parity, a signal developed and used by the Versatile Bus logics in consideration of transaction activity, in any case). The ripple shifted error compensation is purely a Versatile Bus operation, and is opaque to the User. After realignment, the Versatile Bus system is re-enabled to run by the maintenance processor (the Versatile Bus starts itself with a BEGIN signal from some requestor).

The net effect of the ripple shifted error compensation operation is that the entire Versatile Bus is reconfigured around one failing line by a one time pattern insertion at each interconnected Versatile Bus Interface Logics such as will cause ripple shifted substitution for the failed interface line.

A second error can still be detected but the resultant second casualty reconfiguration, as may still be effected by the maintenance processor, becomes complex and system unique.Basically all existing techniques of disabling devices, recovering line sensitive error information and formulating the reconfiguration pattern for substitution of a single failed line may still be employed. But in the face of multiple errors the unique capability in the versatile and configurable Versatile Bus communication system, to reconfigure the actual interface communications protocol to a state utilizing reduced pins so as to circumvent error conditions is also called into play. Transfer word widths can be reduced at the expense of more time cycles. Activities can be multiplexed onto good pins. Recall that the Versatile Bus can be made to do everything in arbitration, slave identification and function, wait, and data on only three pins (lines) as it might elsewise and faster do on thirty-seven pins (lines). Obviously this Versatile Bus interface has in depth capability to recogize and encompass casualty which is similar to the more powerful computer mainframe and system buses, and appropriate to the interconnection of VLSIC devices which are themselves sophisticated functional entities such as processors and controllers.

Casualty control upon the Versatile Bus is philosphically similar to the board configurability of the Versatile Bus, and (as will be seen) suitability of Versatile Bus networks to flexible system level interconnection including redundant interconnection. Casualty control is similar in that range of response to failure is possible—no single response in inflexibly dictated. Some Versatile Bus utilizations in low priority applications (e.q., consumer products) may "heal" themselves through ripple shifted error compensation after a single fault and operatively continue in service, carrying a failure which has been circumvented, for many years. Some Versatile Bus utilizations in high priority applications (e.g., man-rated space missions) are hypothesized to have the ripple shifted error compensation technique (which can suffice for compensation of but a single line) combined in considerable sophistication with the reconfiguration technique (which can suffice for compensation of 37-3 or 34 lines) for bus error casualty control in great depth.

As an extreme, error detection and correction capability may be either designed into or left out of each individual type of Versatile Bus interfaced logics "chip". The full SEC/DED capability is implemented in the preferred embodiment of the invention. This capability can be simply deleted without affecting operability of the Versatility Bus for digital communication. In applications where chips with and without error correction are connected, the two parity pins are left unconnected on all chips and they will not interfere with bus activity. Then shorts in bus lines will be detected by the chip with the error facilities, though no ripple correction is possible, and open lines are undetectable.

1.9. Versatile Bus Logics Interface to VM Node for Initializing and Maintenance

Just as the Versatile Bus Interface Logics have a rigorously defined interface to the User, so also is there a rigorously defined interface through specified pads or pins called the VM Node. The device connected to this node has simple, set, responsibilities for (1) initializing the Versatile Bus and turning it loose to run and optionally for (2) dynamically reconfiguring the Versatile Bus Interface Logics to some one of the 31,044 configurations other than that 1 single simplistic configuration which arises upon power on master clear, (3) recognizing Versatile Bus transmission error reporting and, in response thereto, resetting the Versatile Bus Interface Logics for SEC/DED, and for (4) scan-set testing of the Versatile Bus Interface Logics. Responsibility (1) initializing and enabling of the Versatile Bus interface to run—is the only indispensable function. It is asserted that a particular scheme and particular actual VM Node logics, neither of which is taught by this specification disclosure, and which are logically much simpler than a microprocessor, are possible of implementation in order to accomplish only this limited first function. This particular scheme of interfacing actual logics within the VM Node with a VM Bus (that interconnection which now, in a twenty signal line form, runs to the maintenance processor) for the purpose of initialization without the aid or cost of a maintenance processor is not taught because, when the last three VM Node exercisable functions are performed by a maintenance processor, then the maintenance processor can also do the initialization function. Therefore, the present invention as disclosed herein provides a method and means for management of the VM Node for all four of the above-listed functions by a maintenance processor. In other words, a familiar device, a microprocessor, will be invoked to show that management of the twenty interface lines between each VM Node and the Versatile Bus Interface Logics is straightforward for the above four purposes.

It will become obvious as the control sequences are explained and as the Versatile Interface Logics are shown, that all four functions could be obviated at the expense of a less versatile and less capable, but still operative, Versatile Bus. In language which will be used during the explanation of function (1)—initialization—in the next paragraphs: it would be possible to hardwire slave ID's and to demand that Users be intrinsically knowledgeable of the other devices upon those Versatile Bus networks to which they interconnect. Function (2)—dynamic reconfiguration—could be obviated by simply specifying that the Versatile Bus Interface Logics taught can be configured into one of the 31,045 variations by hardwiring—a sort of a static initialization configuration. Function (3)—SEC/DED enablement—and Function (4)—scan-set test—are obviously not necessary to normal function. Therefore the Versatile Bus Interface Logics to the VM Node is for limited purposes and is not involved in normal on-going Versatile Bus operation.

The first function—initialization—will be summarized in some detail because this versatile bus is intended to be initialized as a communications network serving environments vastly different in numbers of interconnected devices and types of interconnected devices. The intent is that a Versatile Bus network shall be able to "come alive" without undue specialization within, or preknowledge of, the interconnect environment by the interconnected devices. This concept is important. We have already seen that a User device will, by and large, not know how (the communication protocol) it is Versatile Bus network intercommunicating. Now it will be seen that a chip part—say a microprocessor—will likely be as good in one Versatile Bus network—say one containing only a single slave memory—as the next Versatile Bus network—say one with 255 other devices of great diversity. Think of how a processor within a computer mainframe has a niche, if not a function, fixed by its physical address space. It interconnectively knows that there can be no more than two more processors, three more I/O controllers, sixteen more memories, etc. The Versatile Bus connected microprocessor chip knows nothing a priori. It is not desirous to customize the chip so that it may know the boundaries of its network environment. Therefore, the initialization function on Versatile Bus is directed toward telling each generalized User device where it is; the Versatile Bus address space in which it is now located that includes both the numbers identification (type) and location (addresses) of all other Versatile Bus interconnected devices.

In substantial detail, such first, initializing, function is simply this: upon power on a coherent central control (which may however be physically decentralized) firstly master clears all Versatile Bus Interface Logics. Secondly this central control reaches to each of an a priori indeterminate number of Versatile Bus interconnected devices and inserts into the Versatile Bus Interface Logics of each a device unique data pattern such as assigns each such interconnected device a system unique identification. Then this central control thirdly controls allowing each User to broadcast a Versatile Bus message whereby the User announces to all other Versatile Bus interconnected devices both this recently assigned, device unique, address and some arbitrary, system designer specified, code ID indicative of the User chip type (i.e., CPU or memory). Interested, generally more "intelligent," User devices are expected to absorb such of this information concerning the network as they desire. Finally, the central control, always operating through the VM Node, issues a broadcast run which allows the entire Versatile Bus "come to life" with a BEGIN signal from whatsoever device(s) desire access.

In order to clarify understanding this initialization function will be recapitulated and rephrased. The VM Node makes all the Versatile Bus Interface Logics master cleared upon power up. The Versatile Bus is nascent. No not BUSY signal has been seen, so that even should some importunate User go into its Versatile Bus Interface Logics to attempt to initiate a transaction, no BEGIN signal will issue. All configuration registers holding the slave ID(s) called the CAM register(s) are cleared to zero. Every device on the Versatile Bus looks like it is device number zero and knows naught of the existence of other devices. The central control, nominally a maintenance processor, then fills through the VM node in each Versatile Bus interconnected device one only first CAM register within the Versatile Bus Interface Logics of that device with a unique slave ID. If the maintenance processor is hypothesized to individually directly interface with each VM node, it is seen that this is but a simple matter of loading ID's 1 through n into n Versatile Bus devices. Each device now has a unique slave ID—it can be addressed. But no user device knows what or where or how many other devices are on the Versatile Bus. Therefore, the central control, operating through the VM Node into each of the Versatile Bus Interface Logics, will cause a reporting roll call of devices. Each User is enabled to in turn report it's newly assigned address and a chip-type ID code to all other Versatile Bus devices. Of course, if a User deigns to report or identify itself it is refusing to go on the Versatile Bus and cannot thereafter be recognized by other User devices as an addressable slave device. Normally all the sophisticated User devices such as processors are supplied information sufficient to fathom the entire run-time Versatile Bus network. Unsophisticated User devices such as memories with are not desirous of initiating threshold communication on the Versatile Bus may not much care what other devices are on the Versatile Bus network that they are entering. In any case, after all Versatile Bus participating devices have had the chance to be recognized for what type of device they are and where they may be addressed, the central control, maintenance processor always operating through the VM nodes, enables the Versatile Bus system to run.

1.10. Performance Summary of the Versatile Bus

The preferred embodiment of the invention is run time configurable to any of 31,045 communication protocols for bussed digital data transactions. Total pins (lines) utilized at each interconnected interface is configuration controllable from thirty-seven down to three, with full functional capability available at even the most pin constricted (3 pin) interface. A data transfer is mandatory. Activities of arbitration, slave identification/-function, and wait are optionally configured. If not selected, activities occupy no time. Bus activities of arbitration, slave identification/function, wait and data may be configured to be separately sequentially staged on separate pins (lines) (one non-pin-multiplexed configuration), may be configured to be multiplexed on some or all of the same pins (lines) (six pin-multiplexed configuration options), or may be time overlapped three activities deep (the pipelined configuration option).

The physical performance of the Versatile Bus, relative to which the logical performance will be related, is as follows. A communication cycle time is that interval, derived from and based upon the length, capacitance, and current drive of the Versatile Bus interconnection lines, within which one signaled communication can transpire. This length, capacitance, current drive and resultant communication cycle time is not integral to the present invention of a logical structure for bussed digital data intercommunication but such cycle time is, in the preferred embodiment VLSIC interconnect, 40 nanoseconds. A single communication transaction, which may transpire over as few as two but likely transpires over three and more cycle times, is that series of activities associated with a single related communication exchange (which may be one to many data words) on the Versatile Bus. Due to pipelining, communication efficiencies on the Versatile Bus approach 100%. That is, a useful data word may be communicated each cycle time (40 nanoseconds) during fully enabled and fully exercised Versatile Bus transaction activities. This logical performance will be returned to after such Versatile Bus transaction capabilities are more fully defined.

Arbitration can be conducted between devices equal to or less in numbers than the configurable arbitration levels of 0, 2, 3, 4, 5, 9, 16, 25, 81 or 256 devices. Arbitration is fully distributed and may be selectably configured to be time-phased, or conducted across arbitration group lines in a succession of transaction times. Arbitration may also, independently, be selectably configured to be time-multiplexed—meaning that time-phased arbitration utilizes the same arbitration pin(s) (line(s))—or pipelined—meaning that time-phased arbitration transpires on variable arbitration pin(s) (line(s)). The multiplexed/pipelining configuration choice has a small correlative bearing upon the other arbitration configuration parameters, namely the number of arbitration pin(s) (line(s)) utilized and the number of groups time-phased arbitrated between. For example, 256 devices can be arbitrated between on four pins (lines) in four transaction times only if arbitration is multiplexed (as well as time-phased). But ten alternative pipelined arbitration configurations and twelve alternative multiplexed arbitration configurations (both excluding the zero, or null arbitration option) comprise those total options which encompass all the device numbers to 256 which were previously listed. A more important difference is that arbitration configured to be pipelined can transpire in time overlapped arbitration sequences up to eight deep. This up to eight deep time overlap within the arbitration activity intermeshes with basic pipelined time overlap: the (last sequential) arbitration activity is overlapped with the slave identification/function activity is overlapped with wait/data activities of the Versatile Bus. Thus the Versatile Bus may be pipelined up to ten activities deep: eight sequences of time-phased arbitration plus slave identification/function plus wait/data. Such deep pipelining effectually means that essentially random, continuous, and high speed arbitration between very large numbers of devices contending for access to a digital bus may transpire without detriment to the data transfer capability of the bus. The Versatile Bus randomly, continously, interactively arbitrates between up to 256 active devices in time overlap with, and without interference to, 25 million word per second data transfers between any of such same 256 Versatile Bus linked devices. When bus arbitration, and slave identification/function, are available without detriment to effective bus data transfer capability due to bus pipelining, then they are "free" in time cost. Therefore it is not normal (although it is possible) for a non-data-transferring device to hold on to a Versatile Bus established linkage. As a normal example, a central processor might arbitrate onto the Versatile Bus as a bus-owning master and transmit a read command (a slave identification/-function activity) and a read address (a data activity) to a memory. The transaction closes. Many intervening Versatile Bus transactions later, the former slave memory will successfully arbitrate onto the Versatile Bus as a master, address and link the central processor, and send the requested read data.

The Versatile Bus supports optionally selectable slave identification/function activity configurable in number of pins (lines) used and number of cycles. Up to eight cycles of eight lines are configurable. Normally many fewer bits suffice. Since multiple cycles of slave identification/function use all assigned pins and are not time overlapped (pipelined), slave identification/function is often configured for but one cycle time which, however, allows selection amongst $2^8$ or 256 devices when eight pins (lines) are used. The User—that is, rest of a Versatile Bus interconnected device besides the Versatile Bus Interface Logics as are the subject of the present invention—can store 4 eight bit slave identification codes within the Versatile Bus Interface Logics. Furthermore a mask register of eight bits will be stored. Upon each slave identification/function activity the Versatile Bus Interface Logics will compare the first received word only with each of the four stored slave ID codes as masked by the mask register. If, and only if, a match is found then that particular User will be alerted, selectively in accordance with the ID matched, as to the occurrence of a matching identification. All slave identification/function information, which may include function bits within such first word or within up to seven additional words, is then given to the User. Obviously, reconciliation of slave identification codes and function codes, as well as the aforementioned arbitration priorities, remains the system design task which it has always been. If a User is not sophisticated it need not utilize parts or even the entirety of the slave identification/function capability which is elsewhere in use. Conversely, sophisticated slaves are well supported. Obviously eavesdropping and broadcast are but labels applied to the manner by which an interfacing device might recognize an activity, and resultantly respond or defer from responding, or belatedly respond, thereto. There are 17 slave identification/function protocols which can be configured. The Versatile Bus slave identification/function activity supports the identification of 1 of 256 devices at 1 to 256 at a time at up to 3 individual-bit-selectable identification codes (up to eight bits each) selectively masked, plus the simultaneous or following transmission of command function information. If multiple interfacing devices are identified and commanded they may receive data in broadcast mode. When pipelined with data transfer activity of an equal or greater number of cycle times, the slave identification/function activity, like the Arbitration activity, is also "free" in time cost and without detriment to effective bus data transfer capability.

A wait activity is implemented as a wired-OR signal by which any slave device(s)—addressed or not addressed, unilaterally are multilaterally—may inform the bus owning master device that the instant transaction cannot complete (at least in all parts to all recipients). The wait activity can be pin multiplexed to occur in one cycle, the first data cycles, upon bus lines which would be elsewise used for data. More commonly, the wait signal is transmitted upon a single dedicated bus line from slave device(s) to the bus-owning master device at the same time as data is being transmitted from the bus-owning master device to the slave device(s). In such a case the combined wait and data transfer activities occupy at least the same one cycle time, the first data cycle time, and are jointly called wait/data. Such wait/data activity may be pipelined with slave identification/function activity may be pipelined with arbitration activity upon the Versatile Bus. There are two wait protocols which can be configured: 0 lines of wait (the null case) or 1 line of wait.

Data transfer up the Versatile Bus requires that each data word—that quantity which is received from and issued to User device—should be 16 bits or less, although such word of 16 bits or less may subsequently be transferred across the Versatile Bus upon a variably configurably specifiable number of lines exercised in a variably configurably specifiable number of cycles. There are 15 different protocols by which such words up to 16 bits in length may be disassembled, transmitted, and reassembled. Not to be confused with the configurable communication protocol for Versatile Bus transmission of a single data word, the bus-owning data-transmitting master one device has complete control of the transaction duration—namely in the control of the BUSY signal —and may send multiple data words across the Versatile Bus during a single transaction. In other words, block data transfer transpires under the same BEGIN and BUSY control signals as the transmission of a single word—no special information transmission (such as block length) or control protocol is ever involved.

2. The Versatile Bus Design Considerations and Resultant Definition

This major section is a short refresher tutorial on design considerations in the design of digital buses. As such it is of primary usage to those learning principles of bussed interconnect from this specification, or to routineers who have been exposed to so many variations of synchronous and asynchronous timing, centralized and decentralized arbitration, error detection and correction schemes and like variations that they lose track of fundamental digital bus design considerations. If these considerations are clearly recognized then the design choices made for the current invention will be more obvious. This section has the outline of an interconnect definition for a digital bus. The design choice for the preferred embodiment of the present invention is clearly stated at each point in the Versatile Bus definition.

The reason that the present invention, a Versatile Bus, is defined or specified—e.g. subject to a specification document, just as a central processor might be defined by its form, fit, and function—in the first place is that the variety of ways in which separate locations can be connected, both physically and logically, is immense. Further, the areas of expertise involved in the design of the interconnect span several disciplines. The concept of levels has been used in communications networks to bring some order to the variety, and a comparable concept is introduced here. The definition (specification) of a bus, the Versatile Bus, is called an interconnect definition (specification). The separation of interconnect issues into levels permits development and resolution of them within each level by people with specialized expertise, while the interfaces between levels can be addressed by interdisciplinary people and groups of specialists. The following paragraphs define the interfaces between levels, discusses the facilities needed in the underlying levels to support them, the design considerations at each level and level interface, and the design choice for the Versatile Bus. All design choices stated are explicit or implicit in the transaction level function of the Versatile Bus taught commencing with section 3.0. If the reader is familiar with the electrical and topological considerations in digital bus design he may wish to skip to section 3.0.

2.1. Versatile Bus Design Definition at the First, Electrical, Level

Specialists at a first electrical and packaging level will utilize physical and materials sciences to develop information transfer capability. This level incorporates both the chip technology and packaging technology, and deals with parameters such as drive capability, noise tolerance, power and signal voltage levels, etc. This specification teaches and claims only the logic structure for a Versatile Bus; the methods for fabricating and packaging it as VLSIC are only implicit in this disclosure. The preferred implementation is in VLSI Complementary Metal Oxide Semiconductor (CMOS) logics on the same substrate as the User logics also implemented as VLSIC.

The interface to the next level has two major subsets: analog and digital. The analog interface, used for A/D and D/A converters, could be subject to an appropriate specification, but it is not further addressed within this specification disclosure which deals with a synchronous digital electrical implementation of the Versatile Bus. The digital interface, such as is taught, to the next second level is defined in five electrical criteria.

2.1.1. Data Transfer Rate

A first electrical criteria is the data transfer rate. Design considerations of current drive, gate delays, noise, ability to recognize and recover errors, etc. are intertwined here. The preferred embodiment of the Versatile Bus invention is designed for interchip connections. If normal printed circuit land and wire interconnect less than one meter in length are used, the synergistic Versatile Bus driver transistors specifically taught in this specification will allow data transfer at 25 MHz. To be more specific, a data bit presented to the interchip communication system must be usable on the next chip 40 nanoseconds later. A pin transmitting data at this rate is called 100% pin-efficient. The one meter, 25 MHz Versatile Bus encompasses up to 20 signal sinks at the up to 20 interconnected impedances of the up to 20 bus master-slave devices. The logical capability to expand to 256 interconnected devices (impedance) is fully taught in this Description of the Preferred Embodiment. If an electrical communicative capability greater than 20 devices is desired, the driver transistors need be enlarged and/or repeaters needs be utilized and/or the timing of bus signals must be lengthened (resulting in a decrease in bus bandwidth).

2.1.2. Fanout Capacity

A second electrical criteria is the broadcast mode fanout capacity. There are situations where many chips wish to read the bit (signal) sent out by one driver. Data on the Versatile Bus interconnect is readable by at least 20 chips simultaneously when implemented in CMOS VLSIC as taught in the driver-receiver section of this specification.

2.1.3. Wired-OR

A third electrical criteria is the implementation of wired-OR. Data may be sent by more than one chip into the same line. In this case, the chips reading the line must read the logical OR of all drivers. The chips are always aware of when multiple drivers are possible; they may choose to drive the line in a different manner at those times, such as during the conduct of distributed arbitration. The preferred embodiment of the present invention fully implements wired-OR in VLSIC. That is, any number of the interfacing Versatile Bus drivers up to 256 in number can drive a logical OR on any line in concert with any number (from 1 to 255) of the remaining drivers. If just one single driver out of 256 drives a logical "1" it will be so recognized by all.

2.1.4. Collisions

A fourth electrical criteria is the avoidance of damage from collisions. Under certain abnormal conditions, different chips may attempt to drive a single line in different directions. In these cases, no information need be transferred, but the drivers must not suffer permanent damage nor may other lines not in such conflict be caused to operate incorrectly. The preferred embodiment of the present invention so operates.

2.1.5. Power Off

A fifth electrical criteria is the ability of an interconnected device and its drivers to be powered off without disabling the bus. Most drivers will not be constantly active. They must be capable of being turned off at times in a manner such that they do affect the value of the information on the interconnect. The preferred embodiment of the present invention so functions.

2.2. Versatile Bus Design Definition at the Second, Topological, Level

This level establishes the connection paths between packages needed to construct an interconnect network. It also defines the conditions under which information can be sent and received.

2.2.1. Interconnection

A first design definition concerns the manner of interconnection. Bussed digital communication transpires over interconnecting signal lines. The lines in the interconnect are wired to all devices as shown in FIG. 10. These lines are called Bus lines and consideration should be given to arranging them in the same order on all packages as shown in FIG. 10. The present invention of a Versatile Bus is intended to be so ordered.

Different orders on different chips would complicate routing of interconnect lines, so that a significant on-chip advantage should be available to justify non-standard orders. The configurability of the present invention offers a more flexible potential for non-standard interconnect orders than is normal in the prior art. In particular, dynamic interactive monitoring of all Versatile Bus activities and transactions is possible by the non-standard interconnection of devices, usually central processors, to receive (via specification of the Versatile Bus Interface Logics of these monitor devices to be system uniquely pin multiplexed) arbitration and slave identification/function communications as data. The devices (e.g., central processors) so non-standardly connected could monitor master access, (arbitration results), slave identification, slave function, any data including addresses, duty cycles, conflicts, waits and general Versatile Bus activity and throughput of any nature whatsoever. To understand this, first note that it is possible to separately configure Versatile Bus interconnected packages differently so as to effectuate different bus line utilization without non-standard routing of interconnect lines. For example some User packages might wish to (uniquely) multiplex the Slave Identification/Function Lines onto the Data pins and so receive slave identification/function through a (singular) data "portal", or data interface from the Versatile Bus Interface Logics to the User. In general, these effects of system non-uniform configuration of the Versatile Bus are complex and unused. Similarly, the specification of configuration can interact with interconnect line routing. For example, suppose only one central processor communicated through one uniquely configured Versatile Bus Interface Logics which, unlike other interconnected interfaces, called for pin multiplexing the slave identification/function activity onto the data lines. Suppose also that the "data lines to the Versatile Bus Interface Logic of such central processor are really routed into those pins associated with the slave identification/-function activity. It is obvious that the uniquely configured, specially connected, Versatile Bus Interface Logics of this central processor will be seeing as multiple cycles of slave identification/function that information which the rest of the system sees as slave identification/function plus data. This means that the selectable three selectably masked slave ID's recognizable by this central processor could be, in part or up to a whole of eight bits, actually that information which the rest of the system considers data. Thus three "breakpoints" on the contents of data—an operand—have been created. This data, this operand, could be an address (such as would be sent by a requestor to a memory) or a mere datum (such as would be sent by a memory to the requestor). Such a feature is powerful beyond the normal conception of operand address or instruction address breakpoint. The key to all cycle monitoring, with selectable interrupt of the monitoring, device, of all types of all activities' information, by configuration and connection, into the slave identification/function pins of the Versatile Bus Interface Logics of the monitoring device. The Versatile Bus Interface Logics do the masked filtering in a constant, every cycle, search for up to three eight-bit quantities. The monitoring device might not work so fast as 3 bytes×25 MHz compared each second. But, without any work, it will be alerted immediately upon the occurrence of the Versatile Bus condition being sought. The system designer should do much thinking about specially configured, specially interfaced devices (which may be temporary) to a Versatile Bus network for the purposes of debugging (software and system input driven) operations and occurrences upon Versatile Bus networks. The fact that the Versatile Bus Interface Logics can offer expanded visibility of Versatile Bus occurrences for system level troubleshooting should not be confused with the maintenance of the hardware integrity thereupon such Versatile Bus by other error correction and compensation means.

To recapitulate, the present invention is taught as a configurable apparatus for versatilely effectuating bussed digital intercommunication. As such, each interconnected Versatile Bus Interface Logic, and associated User device is assumed to be connected to the interconnect lines in a standard and universal order. Connection of some devices in a non-standard order in a system's design consideration not directly addressed by the topological level Versatile Bus Design Definition. But the capability for each User device to be simultaneously configured in its Versatile Bus Interface Logics, particularly in the pin multiplexing and slave identification/function cycles parameters, allows in combination with non-standard line interconnection order some extremely interesting and powerful interfacings. Since a Versatile Bus interfaced device can be configured in the communications protocol employed, then a Versatile Bus system non-standard line interconnection can be adapted to serve a Versatile Bus system non-standardly configured in communication protocol. Bit sliced interconnect, redundancy for error detection and failsafe operation, interconnect for taking in only part(s) of a transaction and interconnects for taking activities other than data (e.g., arbitration, slave identification/-function) as data is possible in conjunction with the configurability of the Versatile Bus at each such specially interconnected device. Advanced, non-standard Versatile Bus systems' interconnect design will be more comprehensible after normal Versatile Bus configurability, and associated normal interconnection, are thoroughly understood.

2.2.2. Multiple Interconnection

The topological level of design definition secondly addresses multiple interconnection. Many, if not most VLSIC devices will require connection to more than one interconnect structure. These packages will have more than one set of pins devoted to interconnect, and the interconnects will, in general, be connected to different subsets of the system's devices. FIG. 11 shows an example of a three interconnect system. The existence of multiple interconnects underlines the need for efficient pin use. The preferred embodiment of the invention will be efficient in pin utilization, utilizing 37 down to 3 pins in various configurations. The high throughput rates of certain wide data path, pipelined, Versatile Bus configurations supported by the preferred embodiment of the invention dictate that multiple interconnects will seldom be required merely to encompass bus throughput requirements. The desire for multiple interconnects most often arises from variable device loadings, variable device speeds and capacities, variable device word widths and a desire to size, allocate, and isolate certain interrelated communication systems and functions performed thereon. The 31,045 available Versatile Bus configurations obviously support this variability in interconnect requirement. Note especially that multiple Versatile Bus interconnects serving single User devices as in FIG. 11, need not be at identical Versatile Bus configurations. Indeed, there are populous buses and sparsely populated (even dedicated master to slave) buses, wide buses and narrow buses, buses with high throughput and standby buses and even maintenance buses. The configurable Versatile Bus interface serves all multiple interconnects with efficient pin utilization.

2.2.3. Synchronization

A third design definition concerns system synchronization. In particular, a synchronous or an asynchronous bus must be chosen. A fundamental requirement of any interconnect implementation is that receiving devices have a way to know when valid data is presented, so that it may be read, that is, gated into the device. Similarly, a sending device must know when information held on the lines has been read by the receiver and may, therefore, be discarded.

Asynchronous systems use explicit means to supply this information as shown in FIG. 12*a*. The timing of this asynchronous system is shown in FIG. 12*b* when the control transmissions levels and in FIG. 12*c* for pulsed control transmissions. A separate request line is raised whenever the sender 1202 places information on the lines. Once the receiver 1204 has noticed the raised request line 1201 and read the data lines 1203, it raises the acknowledge line 1205, and the sender 1202 can drop the request line. When the acknowledge line 1205 is also dropped, the interconnect is available for a new transfer. The protocol of FIG. 12*b* requires 4T seconds to transfer a unit of data, where T is the time that a signal takes to propagate from one device to the other. It is apparent that the pin efficiency of this system would not be more than 25%.

Figure 12C:
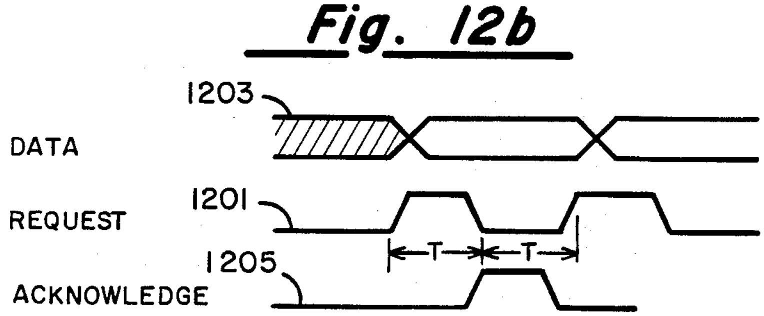

The situation can be improved somewhat by making the request and acknowledge lines send pulses rather than levels. FIG. 12*c* shows the modified timing. In this case only 2T is needed on the interconnect and pin efficiency is raised to 50%.

Another practical problem with asynchronous timing is related to multiple requests made almost simultaneously. It is physically impossible to always read the request lines and unambiguously decide whether they should be treated as simultaneous or not. Electronic devices applied to this task suffer the chance of ringing, or oscillating, well beyond the time it usually takes them to decide. In VLSIC technology this time of oscillation can easily be long compared to a 40 nanosecond clock period. This situation, called the metastable condition, has been treated extensively in the literature, yet is often ignored. An asynchronous system must generally operate more slowly to allow time for metastable conditions to die out (which has the practical effect of reducing the probability of them affecting circuit operation). This will reduce pin efficiency. Inadequate treatment of metastable conditions will cause random errors, a clearly unacceptable situation.

Both of these efficiency losses can be avoided by adopting a clocked, or synchronous, protocol. There is a price in pin efficiency for maintaining a consistent clock signal throughout a system, but this problem is both theoretically and practically solvable. A synchronously clocked system requires at least one signal pin per chip. Since a VLSIC chip has on the order of 100 pins, it appears that pin efficiency of a synchronously clocked system is only reduced to 99% if the clock is considered an overhead function.

FIG. 13 shows a synchronous bit transmission protocol that achieves high pin efficiency. Data is defined to be transferred at positive going clock transistions on line 1301 if both request line 1303 and acknowledge line 1305 are active. The scheme requires the receiver to gate the data lines 1307 in whenever it has raised the acknowledge line 1305. After the clock, it inspects the request line 1303 to see if it received valid data, and may choose to drop the acknowledge line 1305 to prevent overwriting the data at the next clock. The sender reads the acknowledge line to determine whether the data that it sent is being accepted by the receiver, and may take subsequent action accordingly. The data is transmitted, and both sender and receiver are appraised of the transfer in 1T. This protocol is 100% pin efficient, and is four or two times as efficient as the respective asynchronous protocols. The present invention utilizes a synchronous communication protocol.

1.2.4. Bit Sliced Interconnect

A fourth design definition concerns bit sliced interconnect. The functions of some packages require that they be connected to many different interconnect systems. Other chips or systems may wish to process data at rates beyond the capability of all the pins on a package, even at 100% pin efficiency. In these situations the problems can sometimes be subdivided as shown in FIG. 14, where each subsystem processes a portion or slice of the data in parallel with the others.

Depending on the requirements within the subsystem slices, problems can occur in the control structure. If incoming data is announced by a request signal, the signal must be broadcast to all slices, potentially creating both fan-out and pin efficiency problems in FIG. 15. FIG. 15 shows bit slice processing with controlled fan-in and fan-out. This can be avoided if the slices can operate harmlessly on invalid data, since they can then merely operate continuously. However, the slices then have no idea when their processed data is valid. This is more serious when the processed data must be placed on an interconnect that is sometimes used in other ways. It seems clear that an explicit method of identifying the valid processed data is necessary.

2.2.5. Error Detection and Correction A fifth design definition at the topological level concerns the number of lines to be devoted to error detection and correction. The problem of avoiding system errors in the face of individual failed interconnect lines can be addressed with single error correct, double error detect (SEC/DED) Hamming codes if the data being sent on a set of lines all originates at one place. Under these conditions an appropriate check digit can be calculated, transmitted and decoded along with the data so that any single error, including one occuring in the check digit itself, can be corrected by the receiving chip(s). It is asserted that SEC/DED codes are practical that are compatible with the variable pin count characteristics of the Versatile Bus system although such variable word width SEC/DED codes are not taught in this application.

The number of pins needed to transmit a check digit for $2^n$ bits is $n+2$, and the amount of time needed to check for and correct errors at the receiver is on the order of one clock cycle. In practice, about 10 pins are needed for check digits that cover 75% of the Versatile Bus lines. This is because data originating at multiple locations is by definition not available at any single point for generation of a check digit.

A more effective SEC/DED system has been invented instead for the Versatile Bus. It is considered more effective because it eliminates the error checking delay when no error actually occurs, it provides 100% pin coverage and requires only two extra pins. The method will be called Single Error Compensation/-Double Error Detection because on error compensation slightly different that the conventional error correction will be performed.

The method chosen first takes advantage of known characteristics of the Versatile Bus bit transfer protocol. Failures in the bus manifest themselves as nonconformance to the protocol, if the failure is shorted to another line or to power or ground. If the failure is an open circuit, either a broken wire or a failed receiver, then a parity system is secondly used for error detection. Each clock period, all of the bus lines are read and odd parity is calculated by all devices. The result is sent by all devices, in the following cycle, on at least an odd parity line using Versatile Bus wired-OR electrical protocol. The result is also read by all devices and any discrepancies are detected and reported. Note that an error will be detected by some but not necessarily all devices, and that an open circuit in the parity line itself will not be detected. This case, however, does not strictly represent a failure in that the other lines are still valid.

To achieve Single Error Compensation/Double Error Detection on the bus lines, the odd parity line is augmented by a similar even parity line. The two parity lines together make up a 1 to 2 code that assures that all devices are aware of a failure. The even and the odd parity lines respectively may assume the following logical values representing the following situations:

| Parity Lines | Situation |
|---|---|
| 00 | One or both of the parity lines are shorted to ground (illogical occurrence, resultant on power up) |
| 01 | Normal even parity |
| 10 | Normal odd parity |
| 11 | Parity error, or one or both parity lines are shorted to power |

As discussed in section 1.8, whenever the 11 case is detected by a device, it is reported through the VM node to the maintenance processor connected thereto. The reports and appropriate tests initiated by the maintenance processor can be utilized to establish the specific nature and location of the failure. As for the odd parity line, an open in the even parity line will have no effect on operation; a subsequent failure in another line will cause only a subset of error reports.

Correction of hard errors is achieved by isolating the failed line and replacing it with a spare line. The spare line is actually the even parity line, so that the system is equivalent to the single error detect configuration after replacement. FIG. 9 showed diagrammatically how the failed line can be isolated and replaced by the spare. Use of the ripple technique avoids any need for a large selector enabling signal transfer on any one line.

3. Transaction Level Functioning of the Versatile Bus

Earlier sections have established means by which digital data may be transferred from one interconnected device to another. This section explains the manner in which the present invention organizes the data transfers so that larger and more flexible collections of data may be efficiently transferred among two or more locations. Two definitions are preliminarily required. A Versatile Bus interconnect is defined as a collection of bus lines, each line connected to every chip or subsystem that is connected by the Versatile Bus interconnect. The bus lines are used according to the Versatile Bus communication protocol. A Versatile Bus transaction is defined as a set of activities on a Versatile Bus interconnect where one chip or subsystem gains control of the interconnect, communicates with another chip or subsystem on the interconnect, and releases control.

3.1. Sequencing of Transaction Activities

Each transaction progresses through a sequence of activities separately defined and described below. Each activity may be expressed in one of several formats, depending on the particular Versatile Bus configuration, and may take anywhere from zero to an idefinitely large amount of time. An entire transaction can take one or more clock periods, depending both on configuration and on individual types of transactions. A transaction may be recognized on a Versatile Bus interconnect by observing the activities of two lines called BEGIN and BUSY. The duration of a transaction is given by the time between the two lines' active, logically high, states, plus one cycle, as shown in FIG. 5. The cycle clock is not shown, but the shortest state shown in FIG. 5 (e.g. the BEGIN signal) is one clock cycle. BEGIN activity with BUSY specifies a transaction one cycle long.

There are four separately identifiable activities that occur during a transaction. (By convention, when any of these activities is not used in a particular Versatile Bus configuration, we say that it is degenerate and takes no time and no pins to implement.) They are Abitration, Slave Identification/Function, Wait, and Data. If a set of pins is used to convey information about two or more activities we say that those activities are multiplexed on the pins. FIG. 7 shows the time relationships among the four activities when they are all multiplexed on the same pins (the BEGIN and BUSY lines are never multiplexed). It is clear that the multiplexed pins can be in use by some activity at all times, as the Arbitration activity of the next transaction can begin in the clock cycle immediately following the old Data transfer activity.

If separate sets of pins are used to convey information about different activities, we say the activities are pipelined. FIG. 6 shows the time relationships among the activities when they are pipelined. They appear almost identical to FIG. 7 except for a difference in the BUSY line. This is a crucial difference, as shown in FIG. 820. A new transaction can begin even before the current one is completed. Even though any one transaction may take several cycles to complete, the rate of new transactions is limited only by the longest single activity.

Figure 16B:

The pipelined/multiplexed choice can be generalized slightly by observing that one could multiplex some activities and pipeline others. More efficient Versatile Bus configurations can often be achieved this way when activities take differing amounts of time. New transactions are limited by the time of longest pin usage. Finally, note that a configuration cannot be optimum if activities not adjacent in time are pin multiplexed. FIG. **16*a* shows the pin multiplexing of non-adjacent activities 1 and 3. FIG. 16*b*** shows a corresponding pin multiplexed configuration that operates as fast and requires fewer pins. Thus, there is no need to multiplex non-adjacent activities cutting down considerably the number of different useful Versatile Bus configurations. In other words, the Versatile Bus configuration options need, and do, accord only the ability to pin multiplex adjacent ones amongst the four ordered activities of Arbitration, Slave Identification/Function, Wait, and Data.

3.2. Arbitration

The first activity occurring in a transaction is Arbitration. The purpose of Arbitration is to select one of the masters connected to the Versatile Bus to control the remainder of the transaction. The master so selected is called the Versatile Bus Owner for the remainder of the transaction.

A master interested in being an owner is called a Bidder. Before Arbitration no chips know which masters will be Bidders.

Just before a new Arbitration begins, each master knows: (a) whether it wishes to become Owner, (b) how long the transaction would last if it should become Owner, and (c) who should be Owner for any possible combination of Bidders.

Any chip may begin an Arbitration activity whenever it reads that BUSY is inactive. This, of course, will happen no sooner than the next cycle after a transaction has ended, as shown in FIG. 5. Each chip that happens to begin arbitration in the same cycle is a Bidder in that transaction. If any of the Bidders contemplate a transaction more than one cycle long, they force the BUSY signal active. Note that any single Bidder can inhibit subsequent transactions because of the wired-OR logic of the BUSY line. Conversely, if each Bidder agrees that even should it win the arbitration and (possibly) continue on to conduct slave identification/function, and/or wait/data that no lines will be in use during the present transaction for more than one cycle, then no such Bidder will (possibly unilaterally) force the BUSY signal active. Then all devices will see the not busy state of the BUSY signal, and a subsequent transaction may begin upon the next cycle.

3.2.1. Arbitration Groups and Arbitration Lines

An arbitration group is a set of pins used to broadcast bidding information among sets of masters. Explanation is easiest if each master has exactly one associated arbitration line as is represented in FIG. 17.

Master 1702 drives line 1701 to a logical one if it is a Bidder, and to a zero if not. Similarly, Master 1704 drives line 1703, and so forth. All Masters read all lines of the group in addition to driving their individual lines. After one cycle all Masters will be aware of which Masters are Bidders. Each Master decodes the lines to determine the winning Bidder. If the Master discovers it is not the winner, it removes any drive it has on the BUSY line and waits until it can begin a new transaction as discussed above. If the Master discovers that it is the winner, it becomes the Owner and proceeds with the subsequent transaction activities.

3.3.2. The Default Winner

If the Masters are ordered, there is one of them that will lose in the bidding if any other Master is also bidding. This Master need not drive a line. If the chip is not a Bidder it is not involved in the Arbitration. If it is a Bidder it can win only if all other chips are not Bidders. This occurs when all driven lines are zero. Since there must be at least one Bidder, (otherwise the transaction would not have started) all chips can infer the correct winning Bidder.

With the above refinement an arbitration group that takes care of n Masters must have $n-1$ separate bus lines. It is at least as fast as any other approach, since it requires only one cycle, and zero cycles is physically impossible. This arbitration is fully distributed without any centralized arbitrator. This arbitration is not serial in time, but parallel with n Masters arbitrating across $n-1$ bus lines in a single cycle. This arbitration leaves every bus connected device, arbitrating or not, capable of inferring the identification of the new Owner.

3.2.3. Multiple Arbitration Groups

For large n, n−1 lines is too many in many configurations. One would prefer to use fewer lines and more time to arbitrate among a larger number of Masters. This is done by utilizing more than one arbitration group in sequence. The last group operates exactly as discussed above, except that it deals with a set of Masters that is selected by the previous group. The previous groups also operate as discussed above, with the following additional considerations: Each Master must know which set of Masters it belongs to for each arbitration group so that it knows which line to drive. All Bidders in a single set drive the same line in a wired-OR manner. Thus, a set is a Bidder if any of its constituent Masters is a Bidder. The winning set of Masters is the only one that continues arbitrating; all other Bidders go wait for another transaction.

Another way of viewing a multiple group arbitration is as an n-ary search; each arbitration group eliminates n−1 set of Masters from the bidding. FIGS. 18*a* through 18*d* graphically suggests how progressively smaller sets of Masters are excluded until only one Master remains. FIG. 18 illustrates how a large number of N masters, N=64, might be arbitrated amongst on n−1 lines, n=4 in g cycles. g=3, not because this particular arbitration configuration is supported by the preferred embodiment of the invention (it is not) but because it graphically suggests the n-ary search of multiple arbitration groups. FIG. 18*a* shows the original large group of N masters, N=64. After a first arbitration upon n−1 lines, n=4, this group is reduced into n parts and appears as the set in FIG. 18*b*. Upon a second arbitration upon n−1 lines, n=4, the set of masters in FIG. 18*b* is further reduced to the set illustrated as being reduced to the finally identified arbitration-winning bus-owning master one device diagrammatically illustrated in FIG. 18*d*.

It is obvious in this n-ary search that if N is the total number of Masters, g is the number of arbitration groups, and n is the number of sets that can be arbitrated in one group as discussed above, then arbitration is possible when:

$$N \leq n^g.$$

This relationship assumes that each group uses the same number of lines (pins). If the groups are multiplexed on the same lines (pins), this assumption is consistent with maximum pin efficiency, since different sizes would imply that some pins would be unused on some cycles. Even for the pipelined case, the largest number of Masters N can be accommodated with a given number of cycles and pins when each group is of the same size, so that there is no practical advantage to using groups of different sizes in a single configuration.

3.2.4. Time-Phased Arbitration

The manner by which wired-OR arbitration signal lines may be controlled in a succession of cycle times to perform multiple group arbitration as an n-ary search is illustrated for two sample cases in FIGS. 19*a* and 19*b*. The elementary case illustrated in FIG. 19*a* is for the arbitration between up to sixteen masters utilizing one only arbitration line across four consective arbitration cycle times. Arbitration so performed across a plurality of cycle times is called time-phased arbitration.

The illustrations of FIGS. 19*a* through 19*d* show only the interaction of four lowest priority arbitrating masters of arbitration identifications 0, 1, 2, and 3 but the principles remain uniform for an expanded number of master. The entire operation depends upon synchronization, such as is accomplished by the transaction initiating BEGIN signal in concert with the synchronous cycle clock timing of the entire Versatile Bus, plus the wired-OR nature of communication upon the arbitration lines.

The encoded arbitration group line pattern is transmitted, starting with the highest order parts and the arbitration group line pattern intended is compared with the actual arbitration group line response on the bus. If an unequal compare or an arbitration group line of higher significance than ny driver by the transmitting device is detected, transmission is terminated immediately, because another unit having higher priority was also transmitting.

Suppose the logic is such that a "1" signal clamps the data bus low and a "0" signal (in the absence of a "1") allows the data bus to go high. This means an address of all ones is the highest priority. Since an active control bus prevents other units from starting, contention will always be between simultaneous starts; that is, the arbitration group line drive of units in contention will be aligned in time. If two or more units are sending, an arbitration group line may be sensed in a condition not equal to the condition emplaced by a particular sender. At that time, the device of higher priority will be sending a one bit, and will compare equal with the bus. A device having a lower priority will be trying to send a zero bit; hence, the lower priority unit will see an unequal comparison between what it is trying to send and the level on the bus, and will stop sending.

Figure 105A:
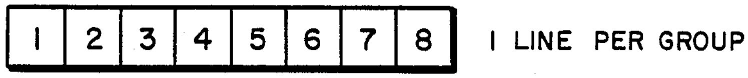

The actual implementation of time-phased arbitration utilizes this simple principle that a device either recognizes that it has lost arbitration, or else continues arbitrating. However, actual management of the configurable one to eight arbitration group lines is somewhat more complex. Arbitration is conducted by each arbitrating Versatile Bus Interface Logics in accordance with a User furnished User's master arbitration identification code of up to eight bits. These codes are of five formats as are shown in FIG. 105*a* through FIG., 105*e*. In the example of FIG. 19*a*, four Users are arbitrating on one group line. The appropriate User's master arbitration identification code format is that one shown in FIG. 105*a*, of which bits 1 through 4 as are required for use in the four cycles configured in the example of FIG. 19*a*, are specified. Thusly identifications 0000 - - - , 0001 - - - , 0010 - - - , and 0011 - - - are the four lowest priority User devices (of 16 possible). For the case of arbitration upon a single group line, the breakdown of this User's master arbitration identification code format of FIG. 105*a* for control of the single group line across up to eight cycles is simple. The most significant User's master arbitration identification code bit is driven upon a first cycle, the second most significant code bit upon a second cycle, and so on. Therefore each of the four Versatile Bus Interface Logics drives successive bits of the User's master arbitration identification code at which it is arbitrating through three cycles (C3). At cycle three (C3) two Versatile Bus Interface Logics (2 and 3) will drive the single arbitration group line to the logical a, u, or Low, condition. The two Versatile Bus Interface Logics not driving this condition (0 and 1) determine that they have lost arbitration and cease participation (indicated by a "−"). At the end of the fourth cycle of time-phased arbitration (C4) only one device (3) knows that it has won arbitration.

Figure 105B:
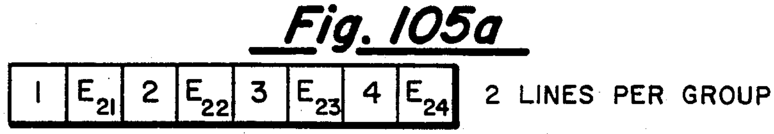

The example shown in FIG. 19b requires the pin-multiplexed control of the same two arbitration group lines each cycle in accordance with a User's master arbitration identification code of the format shown in FIG. 105b. This format—containing fields "$1E_{21}$", "$2E_{22}$", "$3E_{23}$", and "$4E_{24}$"—is broken down two bits at a time for the control of two arbitration group lines upon each cycle. The "E" bits are enablement bits—without an enablement bit the setting of the associated bit 1, 2, 3, or 4 is irrelevant to the driving of an arbitration groupline. If, however, for example $E_{23}$ is set than the most significant arbitration group line (arbitration group line 0) will be driven if accompanying field "3" is a binary "1" while the least significant arbitration group line (arbitration group line 1) will be driven if accompanying field "3" is a binary "0". In the example of FIG. 19b, the User device arbitrating at an arbitration priority code of 00000100 has, by reference to the format of FIG. 105b, field "$3E_{23}$" equal to binary "01". Therefore drive is enabled on the least significant of two arbitration group lines, arbitration group line 1. In the example of FIG. 19b, all other arbitrating devices see this drive and, recognizing that they have lost arbitration, cease further drive.

All User's master arbitration identification codes will reduce to the drive of but a single, or no, arbitration group line upon any single cycle of time-phased arbitration. The arbitrating Versatile Bus Interface Logics will assess the results on this line plus all arbitration group lines of higher priority which are pertinent to the present transaction in determining whether arbitration has been won or lost.

3.2.5. Arbitration Configuration Parameters

According to the above discussions, a wide range of requirements can be met by specifying a few arbitration configuration parameters enumerated below:

Group lines—The number of pins used in each arbitration group. This value is $n-1$ in the above discussions.

Number of Groups—This value is g above. Note that n and g determine the maximum N as discussed above.

Multiplexing—A choice must be made whether the groups are multiplexed or pipelined.

Prioritization—Selection of a method by which Masters will order themselves for bidding.

These configuration parameters are further limited to specific values to simplify the logic in the Master. The allowed configuration parameters of the preferred embodiment are shown in FIG. 20. Reference also the Versatile Bus configuration options in FIG. 3. An allowable combination of the first Versatile Bus configuration parameter—the number of arbitration group lines—and the second Versatile Bus configuration parameter—the number of arbitration group—is represented by a number entry, N, at the matrix intersections of FIG. 20. Absence of any entry indicates that a Versatile Bus is not so configurable for arbitration. Therefore there are 10 pipelined, 12 multiplexed, and 1 null case (0 groups means no arbitration) allowable combination(s) of the first two configuration parameters. Note that the concept of a default winner is not relevant within the arbitration cycles of time-phased arbitration, i.e., N is no greater than $n^g$. Note also that for $n=5$ (4 group lines) and $g=4$ (4 groups) that N is limited in the preferred embodiment to 256.

The parameterization of Group Lines and Number of Groups in increasing powers of two may seem incidental, natural, and/or inevitable. Actually, allowable parameter combinations were chosen not for symmetry but to deliver, at good pin and arbitration time efficiencies, the N's of 9, 16, 25 and 81. The inventors of the Versatile Bus believe that it will be effectively incorporated into many systems wherein the number of Masters to be arbitrated amongst will be within these ranges. Note then how there are two ways to have an N equal 9, one way to have an N of 16, one N of 25, and two ways to have an N equal 81—each alternative realization allowing a different tradeoff of performance for pins. And such choice of ways to perform time-phased arbitration does not include the choices of time multiplexing vs. pipelining such time-phased arbitration. Therefore it is initially hinted that the 31,045 Versatile Bus configurations will not turn out to be an immense surfeit, but that envisionable VLSIC systems might actually be based on hundreds of different protocols.

3.3. Slave Identification/Function

Once a Bidder has become an Owner, it must address and/or command the other devices with which it wants to communicate. This is done by driving some Slave Identification/Function lines with a bit pattern (address and/or command) that is recognized by the Slaves. All potential Slaves read the lines g cycles after the BEGIN line is active (where g is the number of arbitration groups) and participate in the transaction if the Slave Identification matches one of their configured values. The potential Slaves also read Function lines at the same time. The Slave thus has three pieces of information about the transaction: Owner (by decoding the arbitration groups), Slave Identification and Function. From this information the Slave must choose to participate in the transaction or not.

The Slave Identification/Function format is shown in FIG. 21. The possible parameterization of the Slave Identification/Function Activity in lines and cycles is shown in FIG. 22 and also in FIG. 3. All combinations of the Slave Identification/Function configuration parameters IV and V are possible. The number of bits that are transmitted over the Slave Identification/Function lines is indirectly specified by the configuration parameter IV—the number of Slave Identification/Function lines—and is further specified by mutual agreement between the Owner(s) and Slave(s) for a given kind of transaction. Note that no other chips need be aware of this agreement as they are no longer involved in the transaction. They are inactive with respect to the Versatile Bus at least until the BUSY signal drops becomes inactive.

The establishment of the Owner(s) and Slave(s) agree upon partitionment of the unitary Slave Indentification/Function word as shown in FIG. 21 is a system design task. Only the first word of possible multiple words (cycles) of Slave Identification/Function activity can be recognized for identification of a slave device. Since the maximum width of this word is the maximum eight Slave Identification/Function lines up to $2^8$ or 256 devices can be uniquely slave addressed. Subsequent of multiple Slave Identification/Function words to the first must be command words. Of course, this does not mean that the User device must respond to any command by doing anything, only that the Versatile Bus Interface Logics will be comparing up to four User specified slave identification codes of up to eight bits as individually masked by a single User specified mask of up to eight bits with each first slave identification/function word of up to eight bits. When the Versatile Bus Interface Logics recognize a masked compare between any of up to four stored slave identifications with that single slave Identification/Function activity first word then upon the Versatile Bus, then the User will be selectively alerted to which (of the up to four) slave identifications was matched and the entire initial slave identification/function word (and subsequent words, if any) will be passed to the User device. From this receipt the User device recognizes any functional commands which it may receive. Such command may be a nullity: if the User device has been addressed by a specific Master (arbitration results are known to the User through the Verstile Bus Interface Logics), or if the User device has been addressed at a specific slave identification, or if the User device only performs one (or access sequential circular) function(s) then any specific command by be unnecessary and irrelevant. Most often User devices are both (separately and collectively) addressed and differentially functionally commanded, as will later be shown by example. At the opposite extreme to addressing without command, a User device may mask all its slave identification in order to be a slave within every Versatile Bus transaction. Such (a) User device(s) could be receiving broadcast data from a Master, could be looking at each entire Slave Identification/Function transmission to search for some command function, or could be preparing to eavesdrop on the soon ensuing data transfer.

All variations in the word widths, cycle lengths, masking as creates partitionment into slave identification and function plus selectable address recognition, and User response to the net total arbitration and Slave Identification/Function information available to it show that the Slave Identification/Function activity upon the Versatile Bus is for linkage of (a) slave device(s) to a master device, is for commanding of (a) slave device(s) by a master device, and is for more such as broadcast, eavesdrop, monitoring, breakpoint, bus activity monitoring, and even data transfer activities. Basically a general purpose, selectably recognizable, information flow is inserted between the Versatile Bus activity of arbitration and the activity(ies) of wait/data (wait and data). The ultimate use of such a Slave Identification/Function activity is limited only by the system network design. Or the Slave Identification/Function activity may be configured as a nullity, and not performed at all.

3.4. Wait

The Wait information is sent by the slave to the owner, and it indicates whether the slave is able to accept data in the transaction. The Wait line(s) gives an indication of if and/or how long it will be before the specified transaction (data transfer) can be successfully carried out. A value of zero specifies that data transfer within the present transaction will be accepted; other values indicate the need for a re-try by the owner at a later time. The Wait (line(s) is (are) wired-OR. When the owner is broadcasting to more than one slave the owner will see zero on the Wait line(s) only when all slaves send the zero value of an accepted data transfer.

The preferred embodiment of the invention supports the interpretation of either zero (none) or one wait line, such one line as may, however, be pin multiplexed onto the most significant data line (pin). The meaning of such a single wait line can be a network wide convention, or it can assume a varying meaning to different master devices and even as such master devices address different slave device(s). Amongst the meanings attributable by agreement between network devices, to the single wait line are (1) irrevocable and perpetual inability of a slave device to respond to any master(s) request(s), (2) perpetual inability to respond to a specific master, (3) perpetual inability to respond to a specific request (command), (4) perpetual inability to respond to a specifically commanded transaction from a specific master, (5) temporary inability of indefinite duration to respond within master and request combinations (1) through (4), plus (6) temporary inability of a definite duration (i.e., indisposed for a maximum duration) to respond within master and request combinations (1) through (4). Thus there are a lot of meanings that can be ascribed to the wait line, all generally subsumed under the concept that a slave device is unable, unwilling, or indisposed from accepting the data transfer activity within a transaction. Under the more typical meanings and usages, occurrence of a Wait signal simply tells the User who is master that the currently outgoing data is failing to be absorbed by at least one slave User device and that the master User should (normally) try again after an interval to send the same data.

The non-implementation of an acknowledge signal or signals (on possible thirty-eight and successor pins) within the preferred embodiment of the invention highlights what the Wait activity cannot do, which is of use to understanding what it can do. An acknowledge signal would be required to determine if (an) addressed slave device(s) is completely non-responding, or "dead". The Wait activity cannot determine if (a) device(s) have "fallen off the Versatile Bus". An acknowledge signal indicates that one device will receive, or has received (depending upon acknowledge sequencing) the data within the current transaction. The Wait activity indicates that some device(s) will not receive the data within the current transaction. It is asserted that an acknowledge signal or signals can be implemented for the Versatile Bus. Such signals are the electrical inverse of the Wait signal and are logically developed in a conventional manner. The choice of a Wait activity over an acknowledge activity, or over both a Wait and an acknowledge activity, within the preferred embodiment of the inventor is based on the initially intended usage of the present invention for interconnection of certain VLSIC systems, and should not be interpreted to mean that a routineer in the computer arts could not readily implement the acknowledge activity within the scheme and apparatus of the present invention.

Similarly to the concept of an acknowledge activity which, although implementable within the framework of the present invention is not implemented within the preferred embodiment of the invention, it is illustrative to immediately note that the desigers of the present invention also contemplate that an embodiment of the present invention with more than one wait line would be eminent feasible. Such a hypothetical case is represented in FIG. 23 wherein multiple up to four) Wait lines are ordered from most significant to least significant. The amount of time represented by the lines should be ordered like the binary values transmitted upon the lines. For example, the amount of time represented by the transmission over four lines in binary form of the number 4 must be greater than that represented by transmission of the number 3. FIG. 23 shows hypothetically permitted plural Wait lines and two possible interpretations of them. This interpretation is made by the User. The column suggesting binary interpretation would directly interpret the wait line(s) transmitted count as the number of Versatile Bus cycle times (or other system wide and/or agree upon time intervalization) before a master User device could first expect to possibly complete a transaction with the responding User device(s). The column suggesting square interpretation would cause the master User device to delay a number of cycle times equal to the square of the Wait line(s) transmitted value.

Note that within both actual (preferred embodiment) and hypothetical implementations of the Wait activity that mismatches between User owner and User slave interpretation within the Versatile Bus constraints will not cause misoperation, but will rather cause slower system operation. If the owner Waits too briefly, it will again suffer an unsuccessful transaction, increasing the traffic on the bus. If the owner Waits too long, it will reduce the performance of itself and the slave.

Waits are always transmitted in one cycle except in the case of zero lines where they take zero cycles. Zero lines implies forced acceptance of the transaction by the slave.

If no device recognizes a slave identification, no device will drive the Wait lines and the master will likely conclude that its transaction was successful. Whether this is a desirable result depends on the application, and should be taken into account during system design.

3.5. Data

Data may be sent in either direction between slave and owner as mutually agreed upon according to system design. Examples of such system design for the meaning of transferred data will be introduced in Section 5. Data Transfers begin after Wait if multiplexed, or simultaneously with Wait if pipelined, and continue every clock cycle thereafter until the BUSY line marks the end of the transaction. Recall that in pipelined configurations BUSY drops sooner. Nevertheless, a configuration fixed number of cycles occurs between the BUSY signal and the last data word transferred. FIG. 24 shows the number of pins permitted for data transfer and the peak data transfer capacity which can be sustained on such pins when the Versatile Bus operates with a 40 nanosecond clock.

3.6. Activity Multiplexing

As discussed in Section 3.1 it is possible to configure Versatile Bus activities which are adjacent in time so that they use the same pins in a multiplexed fashion. The possible configurations are discussed below.

Arbitration can be pin-multiplexed with the Slave Identification/Function activity regardless of whether arbitration is itself configured (time) multiplexed or pipelined. In this case the number of lines in an arbitration group is the same as the number of lines in the Slave Identification/Function activity.

Slave Identification/Function can be pin-multiplexed with the Data activity. The number of lines used for Slave ID and Function is then the same as specified for Data to a maximum of eight lines. If Arbitration is also multiplexed, both activities use the Data lines.

Wait can be pin-multiplexed with the Data activity. The Wait activity transpires upon the for most significant Data line and the Data activity is delayed one cycle.

Exactly how this multiplexing is selectably configured will be reviewed in Section 3.9.

3.7. Error Control

The Versatile Bus configurations provide optional error detection and correction facilities that are designed to handle errors occurring in the interconnect network, that is, other than within individual chips. Problems occurring in line drivers and receivers, the internal package leads, and the pins and substrate wiring are included. Section 2.2.5 discusses techniques by which errors can be controlled. This section incorporates the techniques into the transaction.

Error detection and correction capability is designed into or left out of each individual type of chip. In applications where chips with and without error correction are connected, the two parity pins are left unconnected and they will not interfere with bus activity. Shorts in bus lines will be detected by the chip with the error facilities, though no ripple correction is possible and open lines are undetectable.

3.8. Number of Configurations

The several Versatile Bus communication line assignments can be summarized in a table and codified for easier reference. FIG. 3 shows an entire spectrum of possible parameterization of Versatile Buses. The left hand column, Configuration Digit, is an index number used to specify a selection of a particular configuration value in one of the other columns I through VIII. For example, a configuration digit of 5 in the position of group lines column I specifies that 8 lines are used in an arbitration group. A string of eight configuration digits will completely specify a Versatile Bus configuration. For example the string 43133355 specifies a Versatile Bus configuration with four group lines, 2 multiplexed groups using a (fixed priority) multiplexed scheme for the conduct of time-phased arbitration two Slave Identification/Function lines, 2 Slave Identification/Function cycles, 1 wait line and 16 data lines which must (necessarily to generate a sixteen bit word) be exercised for 1 data cycle.

Note that there are many combinations of configuration digits that are invalid (as will be explained) or inefficient. The configuration string is merely a concise means of specifying particular Versatile Bus Configurations. It also provides a means of clearly stating an important Veratile Bus system design rule: The chip designer may choose any valid configuration digits he wishes, to create an optimum configuration for the chip's operation. However, to assure that any chip can be connected to any other chip using a Versatile Bus configuration, the chip design must support any configuration whose configuration digits are all equal to or less than the corresponding chosen configuration digits for that particular Versatile Bus configured.

For example, the envelope, Versatile Bus configuration of 55255355 delineated by dashed envelope line across the eight columns of the Configuration Matrix in FIG. 3 is that which will be supported by the preferred embodiment Versatile Bus Interface Logics chip design subsequently described. This particular 55255355 interface would never be employed because for example, permitted arbitration configuration parameters, as shown in FIG. 20, will not permit or require eight groups (first configuration digit "5") of eight group lines each (second configuration digit "5") to arbitrate amongst 256 devices. But it must be recognized that this 55255355 Versatile Bus interface envelope of the preferred embodiment of the invention will support a great multitude of subset interfaces meeting the design rule. For example, the Versatile Bus configurations of 42252255 shown in FIG. 32, 43112244 shown in FIG. 33

52252355 shown in FIG. 35, and 43153352 shown in FIG. 36, will all be supported by 55255355 preferred embodiment Versatile Bus interface envelope as incorporated in the preferred embodiment Versatile Bus Interface Logics chip design.

The largest impact of the Versatile Bus design rule in terms of chip complexity is probably the need to provide for assembly and disassembly of words of information whenever the Versatile Bus configuration uses fewer lines than exist on the chip. There are also differences in timing caused by configuration changes that may have subtle effects on chip operation if they are not accounted for properly. The preferred embodiment Versatile Bus Interface Logics chip design to be described supports all subsets of the 55255355 Versatile Bus configuration envelope, limited only by the rules for permitting Arbitration configuration parameters as shown in FIG. 20, the rule that the Data Lines parameter should be less than or equal to the data bits parameter, and some rules concerning allowable pin-multiplexed and pipelined configurations.

Before explaining how a set of Versatile Bus configuration is established within the allowed envelope—at system run time and in the logics of the preferred embodiment chip design—it is absolutely essential that the Configuration Matrix shown in FIG. 3 should be carefully studied concerning the stupendous versatility that it brings to bused communication. Other than the previously mentioned Arbitration parameters I and II and the Data parameters VII and VIII, all the remaining parameters are basically independent of choice. When certain pin multiplexed configurations are parameterized certain parameters may be equated to each other and/or bounded. So independence does not mean that all choices for any eighth individual parameter shall be available regardless of the specification of the other seven parameters. However, other than the three Arbitration and the two Data parameters this is almost true; i.e., independence is almost total. This extreme latitude in configuration parameterization results in 31,045 distinct and unique operative configurations for bused intercommunication being supported by the preferred embodiment of the invention. Each of these 31,045 configurations communicates with an associated unique and distinct communications protocol. Of course, not all of these configurations are efficient. But the versatility evidenced will suffice to provide a customized "glue" between many different types of VLSI circuit devices.

The manner by which the number of different Versatile Bus configurations supported by the preferred embodiment to the invention is derived is contained in Appendix II which will be most easily understood only after consideration of the next subsection.

3.9. Manner of Configuring

The Versatile Bus configuration matrix shown in FIG. 3 may now be associated with the previously discussed Versatile Bus activities.

3.9.1. The Configuration of Arbitration

Arbitration is configured by configuration parameter III to be either FIXED/PPLD or FIXED/MPX. The word "fixed" does not mean that the contending arbiters will have fixed and immutable priorities. Indeed, contending arbiters may have multiple User designated priorities for arbitration contention. Such designation of the priority for arbitration can be done for each Versatile Bus transaction cycle by each of the interface Users in accordance with their current urgency to obtain bus access. The word "fixed" merely means that the hierarchy of arbitration is in a fixedly set order. In other words, a bus bidder bidding priority 1 comes before a bus bidder bidding priority 2 comes before a bus bidder priority 256. Fixed to be contrasted with special, or a configuration of the Versatile Bus interface to a nonstandard arbitration heirarchy. Special Arbitration is not supported by the preferred embodiment. It is included in the Configuration Matrix of FIG. 3 in order that a routineer in the art might think, as the preferred embodiment circuit is discussed, when and how special arbitration could and/or should be done.

Continuing with the two Arbitration Choices supported by the preferred embodiment 55255355 configuration envelope the words "Ppld" meaning pipelined and "Mpx" meaning multiplexed have to do, in the context of configuration parameter III, not with pin multiplexing but rather with the performance of time-phased distributed arbitration. When the Arbitration choice is Fixed/Mpx (a third configuration digit=1) then time-phased arbitration will transpire across the selfsame 1, 2, 4 or 8 group lines for as many arbitration cycles as there are configured arbitration groups (e.g. 2, 4, or 8). Reference the permitted Arbitration configuration parameters shown in FIG. 20. Zero arbitration groups mean zero arbitration cycles. Usually, this would be for a single Versatile Bus master who would always become bus owner. Howsoever many cycles that there are, only the selfsame configured number of Arbitration Group Lines will be repetitively involved. This time-phased mutliplexing of the arbitration process (configured as a third configuration digit=1) should not be confused with the pin usage multiplexing of the arbitration group lines (configured as first configuration digit=1). Time-phased multiplexing (or pipelining) of the arbitration activity may be specified regardless of whether pin multiplexing of the arbitration Group Lines with the Slave Identification/Function Lines is indicated. In other words, the first and third configuration parameters are independent.

When the Arbitration choice is Fixed/Ppld (a third configuration digit=2) then arbitration will transpire across a different 1, 2, or 4 group lines for as many arbitration cycles as there are configured arbitration groups (e.g. 2, 4, or 8). Again reference the permitted arbitration configuration parameters in FIG. 20. Howsoever many cycles that there are (at least two are required for time-phased arbitration), each cycle will utilize a configuration specified number of unique arbitration group lines. Since each of plural time-phased arbitration cycles utilize dedicated (to that cycle) arbitration group lines then the different cycles associated with different transactions may be simultaneous. Ergo, the entirety of the arbitration activity is pipelined as between transactions. Pipelining of the arbitration activity may be specified (via a third configuration digit=2) regardless of whether pin multiplexing of the arbitration Group Lines onto the Slave Identification/-Function Lines (via a first configuration digit=1) or even further onto the Data Lines (via a fourth configuration digit=1) should be specified.

The first and second configuration parameters are not, however, independent of the third configuration parameter. This is shown in FIG. 20 wherein not only are but 12 (plus one null case) permissible combinations of the first and second arbitration parameters shown but wherein the asterisk (*) signifies that 2 of these 12 combinations are not available for pipelined Versatile Bus operation. Specifically, first and second configuration digits of 44 (4 Group Lines and 4 Groups) or 53 (8 Group Lines and 2 Groups) will never be found linked with a third configuration digit of 2 (signifies FIXED/PPLD) since this would imply that sixteen arbitration group lines were available. Since 4 Group Lines for 1 Group and for 4 Groups but not for 2 Groups are implemented in the preferred embodiment of the invention, it may be correctly surmised that these limitations on arbitration parameterization represent mere implementing conventions and not fundamental insufficiencies or boundaries within the Versatile Bus design. As it was before explained that arbitration parameters were sized in expectation of real VLSIC system interconnect requirements, so are the combinations of such parameters being implemented for such real pipelined and multiplexed Versatile Bus system applications as are envisioned. The logical implementation of selectably configurable time-phased arbitration within the preferred embodiment of the invention should suffice as taught to enable a routineer in the art to construct minor variations, for example the support of 2 Groups of 4 Group Lines in pipelined operation.

Across all the eight configuration parameter columns of FIG. 3 the row entitled Associated Max. Pin Count is simply a reminder of those configuration parameters which (variably) call for the utilization of pin (line) resource upon the Versatile Bus. The thirty-three shown to be controllable by specification in FIG. 3 (from a mandatory 1 data line up to the maximum 33) must be added to the mandatory BEGIN and BUSY control lines plus the optional ODD and EVEN parity lines to derive the thirty-seven pin total which is considered the maximum total pin utilization of the preferred embodiment of the invention.

The three configuration register bits associated with each of the eight configuration parameters are shown in the Configuration Reg. Bits row. The binary values which will be emplaced, upon configuration initialization, by the maintenance processor through the associated VM Node interface into this configuration register within each Versatile Bus interconnected device are the eight configuration digits individually range from 1 to 5 in the preferred embodiment of the invention.

3.9.2. Configuration for Slave Identification/Function

The Slave Identification/Function activity is configurable, in accordance with FIGS. 3 and 20, of any of four different numbers of Slave Identification/Function Lines (configurable as 1, 2, 4 or 8 lines via configuration parameter IV) and, independently, at any of five different numbers of Slave Identification/Function cycles (configurable as 0, 1, 2, 4 or 8 cycles via configuration parameter V). Specification of the IV configuration parameter as MPX (fourth configuration digit=1) means that Slave Identification/Function is pin multiplexed onto the data lines.

3.9.3. Configuration for Wait

The Wait activity is either configured as pin multiplexed onto the most significant data line (sixth configuration digit=1 meaning MPX), a nullity not performed (sixth configuration digit=2), or to be performed upon one dedicated line (sixth configuration digit=3). In this third instance of conducting the Wait activity upon a dedicated line it is performed simultaneously with the first cycle time of data activity. This is why configuration parameters VI through VIII are jointly bracketed as Wait and Data in FIG. 3—more so that the simultaneous, pipelineable with other bus activities conduct of the joint activity of Wait/Data should be recalled than that the parameters VI through VIII are intertwined in the manner of Arbitration parameters I through III, or Slave Identification/Function parameters IV and V.

3.9.4. Configuration for Data Transfer

The allowable specifications of configuration parameter VII, the number of data lines, and configuration parameter VIII, the number of data bits are sharply constrained in that the configuration specified number of data lines (up to 16) must be less than or equal to the number of data bits (up to 16). This is because the data word assembly/disassembly being specified is for the extraction (or delivery) of words of sixteen bits or less from (to) the User logics. There may be an indefinitely large number of these words accepted from one User, disassembled (if necessary) in accordance with configuration and transmitted responsively to such configuration as data upon the Versatile Bus, assembled (if necessary) in accordance with configuration at the Versatile Bus Interface Logics of a second User, and finally transferred word by word, to this second User.

3.9.5. Configuration for Pin Multiplexing

Commencing in FIG. 3 with configuration parameter I—Arbitration Group Lines—the Mpx entry (corresponding to a first configuration digit=1) in the Group Lines column determines, when configuration selected, that the arbitration operation shall transpire on the pins normally assigned to Slave Identification/Function. The number of arbitration group lines interpreted, normally determined as 1, 2, 4 or 8 within the envelope configuration Group Lines, will then be equal to the number (1, 2, 4 and 8) of Slave Identification/Function Lines configured when this Group Lines Mpx entry dictates that arbitration is pin multiplexed onto the Slave Identification/Function pins. Note that the number of Arbitration Groups continues to be determined only by configuration parameter II.

Similarly, when the Slave Identification/Function configuration parameter IV selection is Mpx (corresponding to a fourth configuration digit=1), then the Slave Identification/Function activity will be multiplexed onto the Data Pins. Again similarly, the number of Slave Identification/Function lines interpreted will then be determined by the number (1, 2, 4, 8—or even the 16 line configuration selection which actually feeds only the maximum 8 lines into Slave Identification/-Function logics) of Data Lines specified by configuration parameter VII. Note that the number of Slave Identification/Function Cycles continues to be determined only by configuration parameter V howsoever many Slave Identification/Function lines (1, 2, 4 or 8) may ultimately be configured each cycle from (in this case of Mpx in column 4) by the choice of configuration parameter VII.

Finally, if both the Arbitration Group Lines are Mpx configured (corresponding to a first configuration digit=1) in column I and the Slave Identification/Function lines are Mpx configured (corresponding to a fourth configuration digit=1) in column IV, then first the Arbitration Group Lines and then the Slave Identification/Function Lines will be pin multiplexed onto the Data pins. Of course, data will also transpire on these pins. In this case the number of lines interpreted for arbitration (to a maximum of 8), Slave Identification/Function (to a maximum of 8), and Data will all be determined by the configuration selected Data Lines in column VII. Again, if configuration parameter VII is specified as equal to 16 Data Lines (seventh configuration digit=5) then only 8 lines will be interpreted for Arbitration and 8 lines for Slave Identification/Function.

the Mpx configuration for Wait (corresponding to a sixth configuration digit=1) means that the Wait Lines will be pin multiplexed onto the most significant pin of the column VII selected data interface. If only one Data Line is selected (seventh configuration digit=1) then this line will be utilized in one cycle time of Wait activity before the requisite Data activity (of at least one cycle on at least one line) can commence.

In the extension, untaught by this specification disclosure, of the Wait activity to more than one line then the selection of the Mpx configuration for Wait (sixth configuration digit=1) would mean that 1, 2, or 4 Wait Lines would be interpreted upon the same pins as would be respectively specified by choice of the Data Lines configuration parameter as 1, 2, or 4 lines (seventh configuration digit repsectively=1, 2, or 3). If 8 or 16 Data Lines were selected then 4 Wait Lines would be interpreted on the most significant pins of the data interface. Interpretations of more than one wait line will, however, not be taught within the preferred embodiment 55255355 configuration Versatile Bus Interface Logics chip apparatus. Note that the sixth configuration digit accords for only Mpx 0, or 1 Wait Lines in the preferred embodiment envelope of FIG. 3. The reason that the present apparatus does not extend to 2 and 4 wait lines is that the VLSI Circuit chips which will be "glued" together by the intended usage of the preferred embodiment Versatile Bus Interface Logics chip apparatus do not require such expanded flexibility in Wait control. Once implementation of the current three choices for configuration parameter VI are taught, further extensions are routine to a practitioner in the art. Similarly, it is obvious that there are entries in six columns of the Configuration Matrix shown in FIG. 3 which are above the preferred embodiment 55255355 Versatile Bus configuration envelope. In all cases except Arbitration Choices it may be correctly anticipated that extensions to greater multiples of the presently supported configuration parameterizations will represent more register extensions and the like without alteration of the underlying scheme. Such greater multiple choices are included in the Configuration Matrix of FIG. 3 so that the Versatile Bus interface being taught will be recognized as capable of being very large as well as very sophisticated.

3.9.6. Pin (Line) Utilization of the Configurations

The Maximum Pin Count appearing as a row in the Configuration Matrix of FIG. 3 shows the number of pins physically available to lines of the designated type within the preferred embodiment of the invention Versatile Bus 55255355 configuration envelope. Up to eight pins are available in the preferred embodiment implementation. to service up to eight Group Lines. The Number of Groups (second configuration parameter) and the Arbitration Choices (third configuration parameter) represent configuration parameterization of arbitration, by such method as was discussed, and do not specify Versatile Bus interface pins. Ergo, with no pins assigned to these parameters the reader may be reminded that configuration parameterization will not transpire through or on the Versatile Bus. The method of eight parameter configuration of the Versatile Bus in accordance with the options of the Configuration Matrix shown in FIG. 3 is through the VM Node and will be further discussed later. Similarly, up to eight Versatile Bus interface pins are devoted to the up to eight Slave Identification/Function Lines, up to one pin is devoted to the up to one Wait Line and up to sixteen pins are devoted to the up to sixteen Data Lines. One pin is optionally devoted to even parity and one pin to odd parity on the preferred embodiment Versatile Bus. This two bit parity is not parameterizable and thus does not show on the Versatile Bus Configuration Matrix. It exists on all Versatile bus configurations supported by the preferred embodiment. The option arises because parity is not however, indispensable to a Versatile Bus operation and either or both parity signals may be left unconnected to pins. One pin is devoted to the BEGIN signal and one pin to the BUSY signal which are indispensable to Versatile Bus operation. The total number of pins maximally utilized in the preferred configuration is therefore 8+8+1+16+2 parity+1 BEGIN+1 BUSY=37. Both the configuration of parameters and the configuration of pin multiplexing the arbitration, Slave Identification/Function, Wait and Data activities onto various of the pins will effect the required pin count. The pin count of 37 is the maximum utilized by the preferred embodiment Versatile Bus Interface Logics which support the preferred embodiment 55255355 configuration envelope as shown in FIG. 3.

It should be considered, however, just how few pins could be used in a Versatile Bus. The arbitration (though the selection of Mpx as the first configuration parameter) can be pin multiplexed onto Slave Identification/Function line(s) (pin(s)), and, progressively, onto the data line(s) (pin(s)) if Mpx is configured (as the fourth configuration parameter) for Slave Identification/Function Lines. The Slave Identification/Function Line(s) (pin(s)) can be pin multiplexed onto the Data Line(s) (pin(s)). The Wait Line can be multiplexed onto the Data line(s) (pin(s)). The Data Lines can be configured at a minimum of one utilizing one pin. In other words, Arbitration (up to eight cycles) and Slave Identification/Function (up to eight cycles) and Wait (one line) and Data (one line) may all come through one single line (pin). Of course, it may be unreasonable to configure a Versatile Bus within the 55255355 supported level of the preferred embodiment into such a degenerate state. But, just as it was suggested that a physical extension (as by register enlargement) of the preferred embodiment chip design would support parameters greater than the 55255355 configuration envelope, it is obvious that a logic design supporting the versatility of configurability as evidenced in the Configuration Matrix of FIG. 3 could have an extremely constricted pin interface to the external world, to-wit: a data pin plus two parity pins plus a BEGIN and a BUSY pin. If this pin constricted Versatile Bus logic design were disabled or disconnected from parity then a three pin Versatile Bus results. This is the ultimate pin degeneracy of the Versatile Bus, such degenerate communication mode (along with 31,044 others) as is fully supported by the preferred embodiment of the invention.

3.10. Timing of Versatile Bus Activity

The following six sections and accompanying FIGS. 25 through 30 explain the Versatile Bus transaction timing for the eight multiplexed/pipelined configuration alignments (FIG. 25*a*–25*h*), for a pipelined Versatile Bus configured for multiple cycles of time-phased arbitration (FIG. 26), for multiple cycle activities (FIG. 27), for Versatile Bus configurations wherein certain activities are not exercised (FIG. 28*a*–28*d*), for multiple word block data transfers (FIG. 29), and for three pipelined transactions (FIG. 30). Additionally, FIG. 30 is expanded to show the pin utilizations as well as the timing of transactions occurring upon the Versatile Bus.

3.10.1. Timing of Multiplexed and Pipelined Transactions

The timing transactions on the Versatile Bus for the eight possible configurations of pin multiplexing is shown in FIGS. 25*a*–25*h*. The progression of cases is from timing on the fully pin multiplexed Versatile Bus as shown in FIG. 25*a* through six intermediate cases to timing on the fully pipelined Versatile Bus as shown in FIG. 25*h*. In order to simplify presentation of timing concepts all Arbitration, Slave Identification/Function, and Data activities are assumed to be but one cycle. In other words, there is but one Arbitration Group and one cycle each of Slave Identification/Function Data. The timing of multiple cycles will be shown in FIGS. 27 and 201. The horizontal axis in FIGS. 25*a*–25*h* represents time, with the intervals between the timing marks T0, T1, T2, etc. as shown being equal to one Versatile Bus clock cycle time. In this preferred embodiment of the invention this period is 40 nanoseconds. Numeral indications of 1, 2 etc. within the pulse envelopes of FIGS. 25*a*–25*h* serve to indicate which transaction cycle that pulse is associated with. The active state of all activities is represented by the logically High condition. Note then that the BUSY signal, the sole signal which for some of the configurations in FIGS. 25*a*–25*h* will be active (logically High) for more than one cycle, is labeled with the transaction number (1, 2, etc.) not during the active (logically High) condition but instead during that signal cycle when the BUSY signal will drop inactive (logically Low) permitting the initiation of a next successive transaction with the BEGIN signal. Remember that the active state of the BUSY signal really means "busy next cycle time". Therefore it is the inactive state which is accorded the transaction number identification in FIG. 25*a*–25*h* for maximum clarity as to when the next transaction may begin (with the BEGIN signal). Time division lines within the duration of the BUSY signal are for time reference only, and do not mean that the actual BUSY signal is momentarily changed in level.

Timing of two transactions on a fully pin multiplexed Versatile Bus is shown in FIG. 25*a*. The configuration of this bus can be represented as 122121XX wherein the configuration digits have meaning as determined by the configuration matrix of FIG. 3, wherein the place holding "X" means any legal configuration digit as establishes any legal configuration parameter, and wherein, when subsequently used, place-holding "Y" will mean any legal configuration digit$\neq$1. Furthermore, when X appears for configuration digit seven and configuration digit eight (only) then X=X giving one data cycle. The third configuration digit (i.e. 2) indicates that insofar as possible, the Versatile Bus activities of Arbitration, Slave Identification/Function, and Data will be pipelined. Increasing progress toward maximally time efficient (but pin costly) pipelining will be made in those various Versatile Bus configurations culminating in the fully pipelined configuration for which the timing is represented in FIG. 25*h*. For the Versatile Bus configuration of FIG. 25*a*, however, the second, fifth and seventh/eighth configuration digits (2, 2 and X=X 2) firstly respectively show that Arbitration, Slave Identification/Function, and Data will transpire in one cycle each. More importantly to the present illustration, interpretation of the first, fourth and sixth configuration digits (1, 1 and 1) shows this Versatile Bus configuration to be completely pin multiplexed: Arbitration, Slave Identification/Function, Wait and Data all transpire upon the selfsame data pins (lines). Therefore the Versatile Bus timing for the 122121XX configuration as is shown in FIG. 25*a* must, and does, accord separate cycles to the four activities of Arbitration, Slave Identification/Function, Wait and Data as are multiplexed onto the same pins. The BEGIN and BUSY signals always occupy their own dedicated pins (lines) and may thusly be respectively time overlapped with the first (Arbitration) and all but the last (Data) activities. Note that BUSY had been logically Low, or inactive, the cycle before the initiation of transaction activity with the BEGIN signal. This inactive condition of the BUSY signal is necessary for any master(s) desiring Versatile Bus access to initiate the BEGIN signal. Note that the BUSY signal drops to the logically Low, or inactive state again at such cycle time as will correctly allow, upon the next cycle, the first activity (Arbitration) of a second subsequent cycle to commence upon the Versatile Bus lines. The effective time to complete each commence transaction of Arbitration, Slave Identification/-Function, Wait and Data in this fully pin multiplexed configuration is 4 clock cycles.

Timing of a 122123XX Versatile Bus configuration is shown in FIG. 25*b*. The sole change in configuration from that associated with FIG. 25*a* is that Wait is not pin multiplexed onto the Data Lines, but separately transmitted. Wait is, however, implemented which accounts for a sixth configuration digit of 3 equating to 1 Wait Line. The timing of this configuration shown in FIG. 25*b* reveals that the time overlap of the Wait activity with the Data activity allows reduction in total transaction cycle times from 4 clock cycles to 3 clock cycles.

The timing for a 122Y21XX configuration Versatile Bus is shown in FIG. 25*c*. The first, fourth and sixth configuration digits such as determine pin multiplexing are 1, 0, and 1 meaning that Arbitration is pin multiplexed onto the Slave Identification/Function Lines (pins) and Wait is pin multiplexed onto the Data Lines (pins). Therefore as soon as Slave Identification/Function of the first transaction is finished the Slave Identification/Function Lines (pins) are available to a second transaction. The timing of the BUSY signal in FIG. 25*c* shows how this time overlap of a first and a second transaction may now proceed. The net effective transaction time has now been reduced to 2 clock cycles.

The transaction timing for a 122Y23XX, Y22121XX, Y22123XX, and Y22Y21XX configuration Versatile Buses are respectively shown in FIGS. 25*d* through 25*g*. Analysis of these timing diagrams should proceed in realization that the first, fourth and sixth configuration parameters as respectively establish Arbitration, Slave Identification/Function, and Wait pin multiplexing are respectively 1Y3, Y11, Y13 and YY1 for these four configurations. Recognizing that 3$\neq$1, and that a "3" instead of "Y" is being specified for the sixth configuration parameter only to indicate that the Wait activity should not be a nullity (i.e., sixth configuration parameter=2), what is really being illustrated in all eight configuration of FIGS. 25*a* through 25*h* is the progression 111, 11Y, 1Y1, 1YY, Y11, Y, Y1Y, YY1, and YYY in the first, fourth, and sixth configuration parameters as establish pin multiplexing. If the reader finds it easier, this progression can be related to the 111, 110, 101, 100, 011, 010, 001, and 000 progression in order to conceptualize that FIGS. 25a through 25h are simply showing the eight possible cases in progressing from full pin multiplexing (shown in FIG. 25a) to full pipelining (shown in FIG. 25h) of activities upon the Versatile Bus.

In order to understand the timing resultant from these various intermediate pin multiplexed Versatile Bus configurations it is only necessary to keep in mind certain simple concepts. Activities must transpire in the order Arbitration, Slave Identification/Function, and Wait/-Data. If any activity within a sequence is pin multiplexed onto the same pins (lines) as the next sequential activity then such first activity must transpire before the next activity—the two activities cannot be time overlapped (simultaneous) because they both need the same lines (pins). In considering that cycle time in which a second transaction may initiate arbitration, it is only necessary to delay sufficiently so that no second transaction activity will require utilization of any set lines (pins) before the first transaction activity utilization is complete. In other words, the pin (line) set of longest utilization establishes the effective transaction time in cycles. If one or two pin (lines) sets are utilized for two activities in two cycles then the net effective pipelined transaction time is two cycles. If one set of lines, the Data Lines, (pins) are utilized for three or even four activities of one transaction each then pipelined transaction time will be three or four cycles.

The transaction timing for the Y22Y23XX Versatile Bus configuration is shown in FIG. 25h. This configuration is a fully pipelined Versatile Bus, with the first, fourth and sixth pin multiplexing configuration parameters equal to YY3. Each of the activities Arbitration, Slave Identification/Function, Wait, and Data transpire on dedicated lines (pins). Wait and Data may transpire during the same cycle. The order of a transaction is BEGIN with Arbitration, then Slave Identification/-Function, and then Wait with Data. Since no transaction activities are multiplexed onto the same lines (pins), but each activity rather utilizes dedicated lines (pins) for but one cycle, a subsequent transaction may commence each cycle as shown. Pipeline latency—that period of time before any transaction in progress will cycle to completion—is three cycles. Net effective pipelined transaction execution time is one cycle. Therefore note that in this pipelined Versatile Bus configuration such Arbitration and Slave Identification/Function and Wait activity as may be accomplished in one time overlapped (pipelined) cycle does not impact data transfer efficiency. In the timing of the fully pipelined configuration as is shown in FIG. 25h one data transfer is transpiring each clock cycle.

Figure 26:
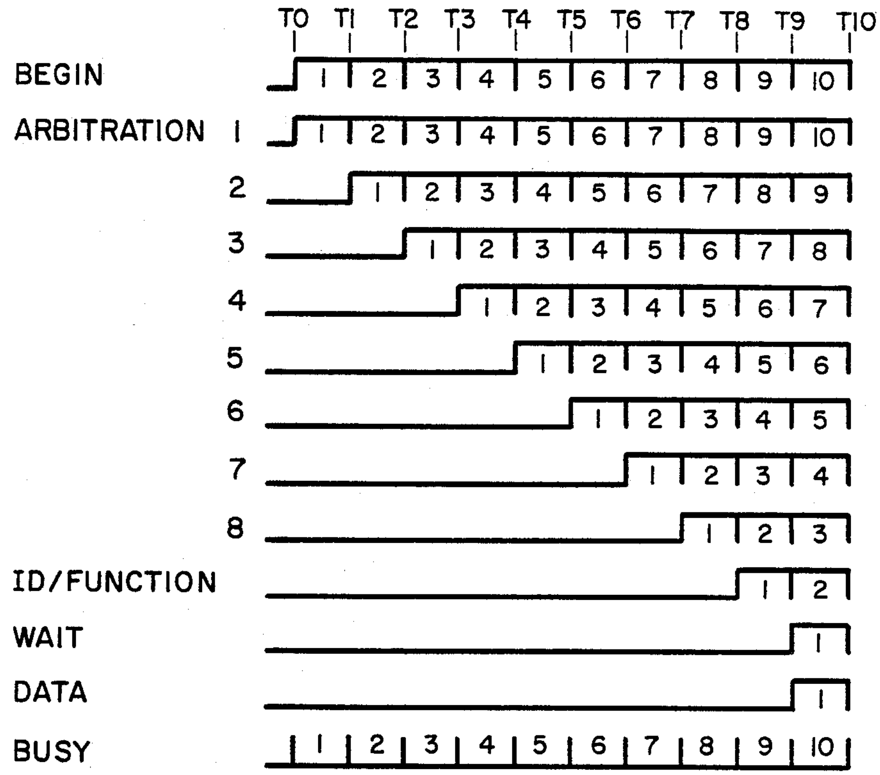

3.10.2. Timing of a Pipelined Versatile Bus Conducting Multiple Cycles of Time-Phased Arbitration A Versatile Bus may be configured as pipelined through a third configuration digit equaling two (reference FIG. 3) even if multiple Arbitration Groups, resulting in multiple Arbitration cycles, are specified by the second configuration parameter. The timing of a pipelined Versatile bus for this eventually is shown in FIG. 26, wherein timing is shown for a Versatile Bus configuration 252Y23XX. The second configuration digit of 5 establishes the 8 Arbitration Groups, and attendant 8 Arbitration cycles visible in the timing diagram of FIG. 26. It also establishes, by reference to the allowable Arbitration parameters in FIG. 20, that the first configuration digit equals 2 meaning that only 1 Group Line is used for arbitration. Remaining configuration digits merely establish the single cycles of Slave Identification/Function, Wait and Data as are visible in FIG. 26.

The teaching of FIG. 26 is that time-phased Arbitration on the Versatile Bus may be pipelined up to eight deep while bus activities of Slave Identifcation/Function and Wait/Data will still be pipelined with the last Arbitration cycle. Therefore the overall Versatile Bus is defined as being capable of being pipelined up to ten transactions deep—eight transaction of Arbitration plus one transaction of Slave Identification/Function plus one transaction of Wait/Data can be simultaneously in progress each cycle time. Latency may be up to ten cycles.

3.10.3. Versatile Bus Timing with Activities of Multiple Cycles

The timing of a Versatile Bus wherein several activities are configured for multiple cycles is shown in FIG. 27. Specifically, the Versatile Bus configuration for which timing is shown is Z32Y33XW (where W/X=2) which establishes 2 cycles each of Arbitration, Slave Identification/Function and Data activity. The place-holding character "Z" for the first configuration parameter merely represents those configuration digits 2, 3 or 4 which are legal with 2 pipelined Arbitration Groups—reference FIGS. 20 and 3.

The teaching of FIG. 27 is that pipelining transpires to that extent possible in those Versatile Bus configurations wherein activities of multiple cycles are specified. The net effective pipelined transaction time thusly becomes the number of cycles required for the longest activity. In FIG. 27 the effective pipelined transaction time is thusly two cycle times.

3.10.4. Timing of Versatile Buses with Null Activities

The timing of Versatile Bus configurations X12Y23XX, Y22X13XX, Y22Y22XX, and X12X12XX are respectively shown in FIGS. 28a through 28d. These configurations respectively establish 0 Arbitration Groups, 0 Slave Identification/Function Cycles, 0 Wait Lines, and the combination of all three (0 Arbitration Groups, 0 Slave Identification/Function Cycles, and 0 Wait Lines). When these configuration parameters are zeroed the associated activity is a nullity—it is not conducted. The timing diagrams of FIG. 28a through 28d simply show that if an activity is not conducted, then no time cycles will be occupied (as well as no pins (lines) utilized). Data activity can never be a nullity. FIG. 28d shows the timing for a Versatile Bus conducting only one cycle of Data activity and no other activities.

3.10.5. Timing of Block Data Transfers

The timing of multiple data word, block data transfers on a pipelined configuration Versatile Bus is shown in FIG. 29. The representation of W(1) through W(N) within DATA is intended to stand for the 1st through Nth transferred words. The particular configuration Versatile Bus for which timing is shown in FIG. 29 is a Y22Y23XX. Note that this configuration establishes one Data Cycle per word transfer. Block data transfer is equally feasible when there are multiple Data Cycles per word.

The sequence of activity illustrated in FIG. 29 is a first transaction transferring but a single data word time overlapped (due to pipelining) with a second transaction in which a multiple N of data words are transferred. There are no special signals nor any special protocol required to effectuate this block data transfer. Note simply that the BUSY signal does not become inactive until it is permissible that a pipelined third transaction should start—in this instance meaning that no third transaction activity (data transfer) should require the data lines (pins) until the last utilization (data transfer) of these selfsame data lines (pins) by the second transaction is comnplete. The third transaction is also shown to effect the transfer of but a single data word—although this need not be so and another block data transfer could be part of this third transaction. The fourth transaction is also illustrated as block data transfer, running on into time overlapped fifth, sixth and seventh transaction activities.

The teaching of FIG. 29 is not only that indefinitely long block data transfers may be intermixedly accomplished on a standardly configured Versatile Bus, but that no special signals or protocol initiate, accompany, or conclude such transfers. One data word or many flow on the Versatile Bus absolutely without control unique to the length of such transfers. Versatile Bus interconnected User devices can be designed to be cognizant of block data transfer limitations and/or boundaries or, preferably, to receive indefinitely flowing blocked data as easily as it may be transmitted via the Versatile Bus. Although a Versatile Bus interconnected device such as a fast memory which is capable of accepting (writing) or giving (reading) sixteen bit words at a 40 nanosecond pace may either have to be very wide or very fast or both, the inventors/designers of the Versatile Bus anticipate serving User devices which are quite compatible with high speed streamed data of a priori indeterminate length.

3.10.6. Versatile Bus Timing and Pin Utilization

A new and more complex form of timing diagram is introduced in FIG. 30. The figure represents both Versatile Bus transaction timing and the utilization of up to thirty-seven maximum Versatile Bus pins (lines) during successive activities of a transaction. Time increases by clock cycles, designated CLOCK N through CLOCK N+5, in the downwards vertical axis. The thirty-seven pins of the preferred embodiment of the invention are represented across the horizontal axis. The BGN below the BEGIN pin does represent the active state of the BEGIN signal but the BSY below the BUSY pin does not represent the active, but rather the inactive, state of the BUSY signal. The reason this convention is adopted for BSY is the same reason that the inactive BUSY signal state received the transaction number in FIGS. 25 through 29—quick study of Versatile Bus sequencing is best facilitated by knowing when a transaction ends in the not BUSY signal (inactive BUSY) and a new transaction may start. The occurrence of this "not BUSY" condition is abbreviated BSY in FIG. 30 and subsequent figures of this type because ease of reference and conceptualization is felt to be more important in such figures than some more exacting abbreviation like "NB".

The pin utilization for Arbitration, Slave Identification/Function, Wait and Data for three pipelined transactions is further represented in FIG. 30. The single cycle activities of the indicated widths indicate a pipelined Versatile Bus configuration of 52252355. This is a specific configuration of the general full pipelined class of YZZY23XX Versatile Bus configuration for which timing was shown in FIG. 25*h*. As in FIG. 25*h*, time overlapped (pipelined) activities of up to three transactions are in progress during each clock cycle while a single transaction takes three clock cycles to complete.

The rightmost pin utilizations illustrated, occur for even and odd parity, abbreviated E and O. Two bit parity accompanies every single clock cycle on a Versatile Bus. The parity which accompanies any single clock cycle is that which has been individually generated by each and every interconnected Versatile Bus Interface Logics as representative of the utilization of all thirty-seven interconnect lines in the immediately preceding cycle. The parity bits within each cycle really represent the parity generated from the transmissions of the previous cycle. For example, the parity bits transmitted during clock time N+3 are those developed from Transaction 3 Begin, Busy, and Arbitration; from Transaction 2 Slave Identification/Function and from Transaction 1 Wait and Data—all of the N+2 clock cycle. If a parity failure were detected at time N+3, tests would have to be performed (directed) in order to determine exactly which bit, and which activity associated with which transaction, had likely failed at previous time N+2. Because parity bit transmission reflective of the three illustrated transactions in FIG. 30 will transpire even within Clock N+5, the trailing parity occurring at that clock time is illustrated within FIG. 30.

4. Sample Applications of the Versatile Bus

Section 3 provided for the electrical connection of many chips on one bus, and for the time multiplexing of information transfer among subsets of these chips. Each chip recognizes the existence of the transactions and can avoid conflict in use of the bus whether or not it is involved in any particular transaction. Attention is turned in this section to the individual transactions to define how specific kinds of information is transferred and how activity is requested.

The Versatile Bus interconnection standards defined in section 3 form the basis of the more specific sample interconnections to be defined next. These definitions are examples of the connections which can be made with certain Versatile Bus configurations and subsets of connected VLSIC chip devices.

4.1. Sample Memory Operations

Many, if not most, applications of VLSIC technology are likely to include memory devices. To avoid a flexibility stifling proliferation of memory interfaces, a standard set of memory operations will likely be defined, or specified. A suggested sample set of memory operations are defined in this section. The data communication from a requestor to memory accompanying each operation is illustrated in FIG. 31. The bracketing of data communication within some of these operations into "function" and "data" is meant to highlight that the sample memory may be receiving addresses, operation codes, incrementation indexes, incrementation count, and the like as Slave Identification/Function information upon the Versatile Bus—but this need not be so. The sample memory may receive this "function" information as data. As may be surmised, the manner of receipt is purely a function of the communications conventions adopted by the interconnected devices, and the resultant configuration of the Versatile Bus. In all cases, however, that portion of the sample operations shown in FIG. 31 which is bracketed as "data" is extremely likely to be sent upon the data bus lines during the Data activity upon a Versatile Bus.

Memory devices perform a relatively small set of operations, making it possible to list and define them readily. Not all memory devices can perform all operations; for example, read only memory (ROM) cannot execute the write operations. Memories and memory subsystems must be selected to provide the operations needed in a specific design. Sample memory operations are defined in the following paragraphs.

For the Read operation the memory accepts an address provided with a Read operation request and retrieves an associated data word from the specified address.

For the Write operation the memory accepts an address and a data word associated with a Write operation request and stores the word at the specified address.

For the Read Modify Write operation the memory accepts an address provided with a Read Modify Write operation request and retrieves an associated first data word from the specified address, supplying it to the requestor. Then it receives and stores the second and subsequent data words, as supplied by the requestor, at the selfsame address. Note that the last data word stored is the one that remains in the memory. This permits more time consuming modification to the data word without releasing the Versatile Bus transaction linking the requestor to the memory.

For the Masked Write operation the memory accepts an address and two data words. For each bit in the first word that is set to one, the corresponding bit of the second word is written in the corresponding bit of the addressed memory location. Other bits in the memory word of the address location are left unchanged. Any parity or check digit associated with the memory word at the addressed location is modified to correspond to the new value of the word.

For the Block Clear operation the memory accepts an address and two integers and clears the number of words specified by the second integer. The first word cleared is the one at the specified address. The address of each subsequent word cleared is found by adding the first integer to the address of the most recently cleared word. If the second integer is zero, no words are cleared. For such a Block Clear operation the entirety of the transmission to memory (although effectuated as data), really amounts to a functional command and is so bracketed in FIG. 31. As was stated before, whether this entirety is to be transmitted upon an actually configured Versatile Bus as Slave Identification/Function, or as Data, or as both Slave Identification/Function and Data will depend upon the system requestor—memory communication conventions and the corresponding configuration of the Versatile Bus. The "function" and "data" labels in FIG. 31 are an aid to understanding the functional operations, not the manner in which they may be diversely communicated upon the Versatile Bus.

For the Block Read operation the memory accepts an address and an integer. While the BUSY line is active, a number of words are read and sent to the requestor. The first word is read at the specified address. The subsequent words' addresses are found by adding the integer to the address of the most recently read word. Dropping the BUSY line to inactive terminates the transaction.

For the Block Write operation the memory accepts an address, an integer and the number of data words to be written. The first data word is written at the specified address. Subsequent words are written at addresses found by adding the integer to the address of the most recently written word. The transaction is terminated by dropping the BUSY line to inactive.

For the Block Masked Write operation the memory accepts an address, an integer, a mask, and the data to be written. Each word is written in the same manner as the Masked Write. The first word is written at the specified address. Subsequent words are mask written at addresses found by adding the integer to the most recently used address. The transaction is terminated by dropping the BUSY line.

4.2. Sample Versatile Bus Configurations for Interfacing Requestors with Memory

Two sample functional configurations of the memory interface will be discussed. One is designed for use with relatively small fast memories, and the other for larger and relatively slower memories.

4.2.1. Sample Versatile Bus Configurations for Communication with a Fast Memory

The interface is intended for memory that is fast enough to respond to requests within a single Versatile Bus transaction. FIG. 31 shows the format of the fast memory transactions. FIGS. 32 and 33 show Versatile Bus pin utilization and timing for some sample configurations and a sample operation with a fast memory. A memory operating in the configurations of FIGS. 32 and 33 never originates a transaction (it is not a Master) so there is no connection to the arbitration lines. Instead, the memory decodes the BEGIN and Slave Identification/Function lines to begin its activities. The memory must, however, be aware of the number of arbitration groups configured so that it can match the correct Slave Identification/Function signals to the occurrence of the BEGIN signal.

FIG. 32 shows a Read or Write operation transaction with a fast memory across a 42252255 configuration Versatile Bus, such as is supported by and within the 55255355 envelope configuration of the preferred embodiment of the invention. Refer to FIG. 3 to note that the first two configuration digits of 42 indicate 1 Arbitration Group of 4 Group Lines. Referring to FIG. 20, it may be noted that this is sufficient for arbitration between up to 5 masters. The third configuration digit of 2 indicates a pipelined bus. The fourth and fifth configuration digits of 52 show 1 Slave Identification/-Function Cycle on 8 lines (pins). A sixth configuration digit of 2 equates to 0 Wait Lines. The seventh and eighth configuration digits establish that 16 data bits will be transferred in 1 Data Cycle. Therefore this 42252255 configuration could be characterized as a high speed (e.g., pipelined with no multiple cycle activities), no latency (no Wait, the slave test memory must accept data) interface suitable for use with a small arbitration group of 5 or fewer masters.

Continuing in FIG. 32, the downward vertical axis represents increasing time in activity cycles (clock cycles) while the horizontal axis of 37 pins is intended to indicate pin utilization during each activity of a single transaction. The illustrated transaction begins with a BEGIN signal, abbreviated BGN, which, due to pipelined operation with no multiply sequenced activities, is accompanied by a not BUSY signal, abbreviated BSY. This means that another pieplined transaction can begin the next clock cycle, such as can produce the dense bus line utilization shown in FIGS. 8, **25*h* and 30 but not shown in FIG. 32** for clarity. During the same clock cycle as the initiating BEGIN signal Arbitration transpires in one cycle over the indicated lower four out of eight available pins. Arbitration activity is dashed line enclosed as not directly involving our sample fast memory which is not participating and may not even be monitoring. Even and odd parity are dashed line enclosed not because the fast memory is not involved—it is involved and is computing parity each and every Versatile Bus cycle just like every other connected device—but because the parity signals accompanying this first cycle are carrying the parity of the previous transaction. To repeat, parity on the Versatile Bus is calculated and parity bits transmitted, and parity errors are recognized, one communications clock cycle after the actual information transmission with which the parity bits are associated.

Continuing in FIG. 32, the sample fast memory is addressed in the second clock cycle time of the illustrated transaction by eight bits of Slave Identification/-Function code. The partitionment of this field between identification and function is completely discretionary with the system designer in consideration of the User devices, herein a fast memory. It is suggested here that the sample fast memory desires no slave identification—as if it were a sole slave on a Versatile Bus to up to five masters. Instead it utilizes the entire eight bits of Slave Identification/Function as function herein both an address field arbitrarily sized at four bits and an operation field thusly sized at the remaining four bits. This is compatible with the definitions made for the Read and Write memory operations in subsection 4.1.

Continuing in FIG. 32, Data is transmitted across 16 pins during the third transaction cycle. Parity from the Arbitration activity of this transaction had accompanied the Slave Identification/Fuction cycle. Parity from the Slave Identification/Function activity of this cycle has accompanied the Data transfer cycle. Now parity associated with the Data shown in FIG. 32 will be transmitted in a next succeeding cycle. It is so illustrated in solid line as representing communicated intelligence having to do with the cycle illustrated. Of course, the formulated, transmitted, and verified parity is not exclusively associated with the information of the presently illustrated cycle. Other pipelined activities overlap the activities of the present transaction. And parity is for all bus lines each clock cycle, regardless of the fact that such aggregate bus lines normally bear successive activities of different transactions. The manner in which a parity error is reported will eventually be seen to support the identification of when, where and to what effect on what activity of what transaction the error occurred. A successor transaction BEGIN and not BUSY are dotted line illustrated not as the BEGIN and not BUSY of the next successive transaction on this pipelined bus, but merely to illustrate that other transactions surround the present one. In actuality, the next transaction on this pipelined Versatile Bus could have begun simultaneously with the illustrated Slave Identification/Function activity in FIG. 32—reference FIG. 30 for pipelined operations.

The same Read or Write operation as causes a transaction with a fast memory is shown in FIG. 33 for an alternative 43112244 configuration Versatile Bus. Referring to FIG. 3 for the interpretation of this configuration, it may be observed that two Arbitration Groups of 4 Group Lines each, such as are capable of arbitrating between up to 25 masters (reference FIG. 20) are specified. As is required for this arbitration configuration, the third configuration digit specifies arbitration to be time multiplexed and not pipelined. This time multiplexing of arbitration is observable in FIG. 33 because both cycles of time-phased arbitration utilize the same, lower 4, arbitration lines (pins). One Slave Identification/Function cycle is pin multiplexed onto the Data Lines (pins). No Wait Lines are employed. The number of Data Lines is eight, which is also the number of Slave Identification/Function Lines in this pin multiplexed configuration, while the number of Data Cycles is one. Thusly, this configuration uses multiple cycles on but few pins while permitting arbitration between up to 25 masters.

Continuing in FIG. 33, a sample Read or Write operation as causes a transaction involving the sample fast memory may be observed. That BUSY, abbreviated BSY, should lag BEGIN, abbreviated BGN, by one cycle in this transaction with activities (arbitration) comprising two cycles may be appreciated by study of FIG. 27. Both of the two cycles of arbitration as transpire on four pins do not involve our sample memory and are therefore shown enclosed in dashed lines. Parity is also illustrated as before. The manner by which Slave Identification/Function is pin multiplexed onto the Data Lines (pins) is illustrated. One cycle of Data is the final transaction activity save for the trailing parity. A successor cycle, not the next immediately successor cycle, is partially illustrated as dashed line enclosed.

4.2.2. Sample Versatile Bus Configurations for Communication with a Large Memory There are two inherent differences between a Fast Memory and a Large Memory that affect interface methodology. First, a much larger number of bits is necessary to transmit the larger addresses, and second, the slower speed sometimes warrants freeing the interconnect for other transactions between a memory request and its completion. FIG. 34 shows the transaction field and the transactions needed to perform Large Memory operations in the manner of subsection 4.1 and FIG. 31. Address width may be configured to 16, 24 or 32 bits to match the requirements.

The several read class operations shown in FIG. 34 (even-numbered operation fields) each require two transactions on the Versatile Bus to complete their activities. During the time between these transactions the Versatile Bus is available for any other transactions that might happen to occur. In particular, there could be additional transactions addressed to the memory. If the memory acknowledges such a transaction, it will process the request in a pipeline fashion, overlapping requests and responses. Note that memory operation pipelining is different from pipelined activities within a transaction of the Versatile Bus as described in Section 3.

The sample large memory must decode all Arbitration activities in the event that the transaction owner will send it a Read class request. In other words, it is mandatory that this memory shall monitor Arbitration. When that happens the owner's decoded ID becomes the Slave Identification in the response transaction, shown as "Req ID" in FIG. 34.

A complete Versatile Bus transaction to, and a complete Versatile Bus transaction from, a large memory such as communicates with requestors in a split command/response cycle is shown in FIG. 35. The Versatile Bus shown is of configuration 52252355. This means by reference to FIGS. 3 and 20, that Arbitration transpires between up to 9 bidders in one Arbitration cycle conducted across 8 Group Lines. Versatile Bus activity is specified to be pipelined. (Other activities than those associated with the illustrated transactions with the large memory are not shown in FIG. 35.) Slave Identification/Function transpires in 1 cycle across 8 lines (pins). One (1) Wait Line and 16 Data Lines utilized in one Data Cycle are configured.

The sequence of transactions illustrated in FIG. 35 is that a requestor, winning arbitration, links (via a Slave Identification field) and commands (via a function field) a large memory to take as data, a 16 bit address (addresses 64K words) by which the large memory shall address and read a stored data word. The Wait Line signal is returned from the large memory to the linked requestor and serves the requestor User to know something about the expected time of the large memory to respond or comply. Note that no transmission of any requestor identification code has transpired—the large memory knows the identity of this requestor Master which has commanded it because and only because, it has followed the Arbitration and knows the arbitration identification of the new, winning Owner.

FIG. 35 next illustrates the situation where the large memory enters, and loses, Arbitration in a first attempt to respond to the requestor with the read word. Finally, in a subsequent transaction, the large memory finally wins an arbitration and transmits a Slave Identification/Function to link and command the original requestor. It is suggested that the User large memory, possessed of the eight bit arbitration identification of the requestor, need only use four bits of this identification or some associated four bits as a unique slave identification to link the original requestor. It is also suggested that the large memory might return the original function code, Read=0, to the requestor as an aid to the requestor's recognition of what it is about to receive. This received quantity is a sixteen bit data word. Wait is bidirectionally implemented—from requestor to large memory as well as from large memory to requestor. The requestor might use Wait to control the pace of successive transfers arising from a single command (not a Block transfer, not the Block type operations, but rather successive transactions).

Effective Versatile Bus time required for the large memory Read shown in FIG. 35 has been two transactions which, when pipelined, use an equivalent one Versatile Bus cycle time each. One transaction of two cycle times would be required for a Write operation.

The configuration of a Versatile Bus as a multiplexed bus in order to encompass arbitration between many masters, addressing amongst many slaves, addressing within large memory spaces, and/or transferring large data words is shown in FIG. 36. The Versatile Bus configuration shown in 43153355. Again referring to FIGS. 3 and 20, the configuration accords arbitration between up to 25 masters through 2 Arbitration cycles conducted on 4 Group Lines. Arbitration is time multiplexed. Slave Identification/Function transpires in 2 cycles on 8 lines. One (1) Wait Line is implemented. One (1) data cycle transpires on 16 Data Lines for each word transfer. Four data words which constitute a four word block data transfer are shown in FIG. 36.

The type of transaction to a large memory of up to $2^{32}$ addresses of 32 bit words shown in FIG. 36 is for a Write operation. The not BUSY signal, abbreviated BSY, must occur as many cycles after the BEGIN signal, abbreviated BGN, as is required by the largest number of cycles (longest utilization) of any one(s) bus line(s). Obviously the Data Lines will be "busy" for 4 cycles. It is not necessary to consider why they are busy or what is transferred, to the Versatile Bus Interface Logics it simply looks like the User is block transferring 4 sixteen bit words (sixteen bits is the maximum User to Versatile Bus Interface Logics word size within the preferred embodiment of the invention). The not BUSY signal is properly sequenced in time by the interaction of the Versatile Bus Interface Logics and User exercise of the interface to the Versatile Bus Interface Logics.

The partitionment of the Slave Identification/Function transmission between Slave Identification and Function is equally as arbitrary, at least for the first word, for the two cycle transmission of FIG. 36 as it always has been for the bits of a single Slave Identification/Function cycle transmission. In FIG. 36 it is suggested that half of the total Slave Identification/Function be devoted to identification and the second word to function. Of course the first transmitted is always identification. You cannot command until you link (unless the slave User device controllably masks its Slave Identification so that it is linked to many or all for receipt of broadcasts or eavesdropping).

Continuing in FIG. 36, note that Wait is not time multiplexed and occurs during the first data cycle. It would be true that Wait should occur during but one cycle even should Wait be pin multiplexed onto the Data Lines. Wait transmission, over the designated number of lines, always transpires in but one cycle.

Continuing in FIG. 36 the Data Line utilization such as accompanies this large memory Write operation (refer to FIG. 34) dictates that the indicated two sixteen bit addresses will be followed by the indicated two sixteen bit data words. The Versatile Bus logics at both requestor and slave large memory respectively receive these sixteen bit quantities from, and issue these sixteen bit quantities to, such User requestor and such User large memory. The configuration that four total cycles should be utilized requires naught but some associated control between the Versatile Bus Interface Logic(s) and User(s). That the User should consider the first received halves as the most significant bits is mere convention. The Versatile Bus knows naught of what this information is, how much of it there should be, nor how it should be used. The Versatile Bus is simply handling data. In FIG. 36 a Versatile Bus of 43153355 configuration has handled a block of 4 sixteen bit data words.

5. Interconnection of Multiple Versatile Buses

Many applications of VLSIC technology will require device interconnections that go beyond the capabilities of the Versatile Buses. In particular, it can be unworkable to attach VLSIC bit sliced devices directly to a Versatile Bus because the control lines and fanout problems are prohibitive. Even where bit slicing isn't necessary, fanout, performance, and physical bus length issues may dictate the use of two or more Versatile Bus subsystems where only one is functionally necessary.

FIG. 37 illustrates the fanout problem associated with bit slice arrangements. In order that the device slices 3702*a* through 3702*d* have knowledge of when to send and receive on the Versatile Bus data lines 3701*a* through 3701*d*, they must each be connected to the Versatile Bus control lines 3703. More devices are connected to the control lines 3703 than are connected to the data lines 3701*a* through 3701*d*, creating the fanout problem. Also, the number of pins required on each device for the control lines can be large compared to the data pins, which reduces the advantage of using bit slice topology. Multiplexed control and data on the Versatile Bus creates insurmountable contradictions.

Another example, shown in FIG. 38, shows a situation in which heavy Versatile Bus traffic, diagrammatically illustrated by vectors 3801*a* and 3801*b*, exists among particular subsets of devices such as device A 3802*a* and device B 3802*b*, or as device C 3802*c* and device D 3802*d*, on the Versatile Bus 3803. But contention, diagrammatically illustrated as vector 3805, for ownership of the bus occurs among all of the devices 3802*a* through 3802*d* because they are all connected to the same Versatile Bus 3803. To be more concrete, suppose device A 3802*a* and device B 3802*b* are processors that predominently respectively reference memories device C 3802*c* and device D 3802*d*. The processors may, however, occasionally reference each other's memories, and for this purpose we would like to preserve the device addresses of the single bus.

5.1. Basic Approach

Study of the Versatile Bus protocols in section 3 leads to the conclusion that any device that will drive any of the Versatile Bus lines must be aware of the configurable protocols. This is true because no Versatile Bus line is always driven by the same device, so the driver must sometimes be active and sometimes inactive. Most VLSIC chips have access to all Versatile Bus lines and, therefore, the Versatile bus protocols.

For devices used in bit sliced configurations and for other devices incapable of following Versatile Bus protocols, a key observation forms an approach to Versatile Bus connection: Devices can be attached to Versatile Bus lines without knowledge of protocols if they never attempt to drive those lines. Thus, devices that only read the Versatile Bus lines may be attached without knowledge of the protocols (knowledge of when Versatile Bus data is valid still requries interpretation of the protocols). Read only lines are unidirectional; they always transmit data in the same direction. It is clear that some provision must be made for converting between unidirectional and the Versatile Bus bidirectional lines.

FIG. 39 shows in schematic form an existing medium scale integration (MSI) device type M8216 that performs this basic function. Such devices can be used in pairs, as suggested in FIG. 42 to transmit data between two bidirectional buses 4001 and 4003. The load placed on the bidirectional buses is at a minimum, consisting of the single device packages 4002 and 4004 each containing the driver and receiver. However, other considerations make this arrangement less than ideal for VLSIC interconnection via Versatile Buses. First, every signal must pass through both of the devices, and therefore, at least two cycles of delay will be necessary. Second, three pins are necessary on the package for each data path, limiting the number of bus lines per package. It would not be possible, for example, to connect unidirectional lines to a 37 pin Versatile Bus configuration with a single 64 pin packaged device, since $3\times37=111$ pins would be needed for data.

A more practical VLSIC arrangement is shown in FIG. 41. The number of packages traversed by data is reduced by one, and the number of pins needed per line is reduced to two. A control section 4102*a* and 4104*a* is respectively shown in each device 4102 and 4104 in FIG. 41. Each control section can read all lines of both Left V (Versatile) Bus 4101 and Right V (Versatile) Bus 4103 and therefore, can determine when data is available or expected on either bus. We will refer to each such device 4102 and 4104 as a Versatile Bus Transceiver. A suggested transceiver is simply a microprocessor chip with some internal buffer memory and at least two Versatile Bus interfaces. The letter "V" serves as an abbreviation for "Versatile" in FIG. 41 and following Figures.

5.2. Application Areas

There are several bus interconnection requirements that can potentially be met with the Versatile Bus Transceiver device introduced in FIG. 41. Some of the applications can be better met by making slight additions to the device, and others impose restrictions on the Versatile Bus transactions that pass through. These additions will make the use of the term "transceiver" more mnemonic than functional.

5.2.1. Interconnection of Different Versatile Buses

Perhaps the simplest application of the Versatile Bus Transceiver is the connection of two different Versatile Buses. The Versatile Bus Transceiver device would serve the needs discussed in section 5 associated with FIG. 38. One method of introducing the Versatile Bus Transceiver device in FIG. 38 is shown in FIG. 42. The arrangement of FIG. 42 shows the original system split into two parts, each using its own bus—Left Versatile Bus 4201 and Right Versatile Bus 4203—for most traffic.

Some of the necessary functionality of the Versatile Bus transceivers 4202 and 4204 can be derived from this application. Suppose device A 4206*a* wishes to perform a transaction with device D 4206*d*. The transaction clearly involves the two Versatile Bus Transceivers. Transceiver 1 4202 must recognize that the slave is device D4206*d* and must perform device D's part in the transaction, driving the Left Versatile Bus' lines 4201 according to Versatile Bus protocol. In particular, the Transceiver 4202 must be aware of device D's willingness to accept the transaction. Transceiver 2 4204 has concerns also. It must also recognize the designation of device D 4206*d* as the slave and must capture all of the transaction and pass it on to device D 4206*d*. It must arbitrate for the Right Versatile Bus 4203 and effectively become the master of the transaction just as device A 4206*a* would have, had it been directly connected. Because of bus contention and possible Wait responses from the slave, the Transceiver 4204 must be able to capture the transaction, save it, and later transmit it.

5.2.2. Bidirectional Interconnect

The arrangement shown in FIG. 42 preserved the exclusive use of unidirectional lines 4205 and 4207 to connect the two subsystems. In many applications this is unnecessary, and one of the transceivers can be omitted through use of bidirectional operation as shown in FIG. 43. FIG. 46*b* suggests the additional chip complexity needed for this capability. FIG. 44*a* shows a variant representation of the unidirectional Versatile Bus transceiver previously shown in FIG. 41 while FIG. 44*b* shows the bidirectional Versatile Bus transceiver. Since the control logic must be aware of both Versatile Bus connections anyway, the additional logic to control the bidirectional drivers should be relatively small.

5.2.3. Interconnection of Differently Configured Versatile Buses

Once a system has been split into different buses as in FIGS. 42 and 43, it is no longer necessary that the buses have the same Versatile Bus configurations. To interconnect different Versatile Bus configurations the transceiver must be prepared to translate master and slave identifications and to assemble and disassemble information as it passes through.

5.2.4. Bit Sliced Systems

The transceiver, with the capabilities discussed above, can be used to interface a bit sliced system to a Versatile Bus configuration. FIG. 45 shows a bit sliced subsystem that is transparent to data as discussed in section 5. The Versatile Bus transceiver's 4502 control lines 4501 might be connected to a separate control device or may be wired to indicate incessant data availability. In any event the Versatile Bus transceiver 4502 will negotiate appropriately for the Destination Versatile Bus 4503, calculate proper error code digits, and provide the bit slice subsystems 4504*a*, 4504*b*, through 4504*n* with a master identification (with which to arbitrate on Versatile Bus 4503).

Another bit slice subsystem might be more sensitive to the presence and absence of input data. FIG. 46 shows such a system connected to a source bus 4601 (destination of the data is not shown). The Versatile Bus transceiver 4602 serves two purposes here; it decodes the source bus' control signals on line 4601*a* to determine when data on line 4601*b* is available to the bit sliced subsystems 4604*a*, 4604*b*, through 4604*n*, and it provides fanout drive of the control information from the Versatile Bus to the bit sliced subsystems.

5.3. Examples of Versatile Bus Transceiver Use

The general arrangements discussed above can be used to satisfy several well-known nontrivial system interconnect issues. This section illustrates the transceiver's application in some of these areas.

5.3.1. The Matrix Switch Interface

The matrix switch chip is designed to be used with unidirectional lines and can be configured in bit sliced arrangements. The Versatile Bus transceiver can, therefore, play an important role in systems using the matrix switch by interfacing the matrix switch with Versatile Bus oriented devices or systems.

FIG. 47 shows the principles introduced in FIGS. 45 and 46 applied to a bit sliced matrix switch 4702*a* through 4702*n* configured to pass data from Versatile Bus A 4701 to Versatile Bus B 4703. Versatile Bus A 4701 is respectively connected to one of the input parts of the matrix switch 4702*a* through 4702*n* and Versatile Bus B 4703 receives data from one of the output parts through Versatile Bus transceiver 4704. Other input and output parts are connected to other buses as represented by A' 4705, A'' 4707, B' 4709, B'' 4711. The control information from Versatile Bus B 4703 (describing data presence, etc.) is passed by Versatile Bus transceiver 4706 to a matrix switch 4702*a* the same as data. Finally, the Versatile Bus transceiver 4708 plays another role by connecting the matrix switch control lines to the control lines 4701*a* of Versatile Bus A 4701, providing control handshaking and fanout drive.

With the basic arrangement shown in FIG. 47 for unidirectional transfer, an extension to bidirectional operation is straightforward. FIG. 48 shows the transceivers used to achieve bidirectional transfer between Versatile Buses A and B. Note that both transceivers are involved in data transfers in either direction. Also, the matrix switches are controlled separately, as they require control patterns that are, generally, different from each other.

5.3.2. Single Scale Integrated Circuit Compatible Interfaces

The transceiver can be used to simplify connections to Versatile Buses of devices that are constructed with lower levels of integration than VLSIC. To do this, the transceiver's ability to interconnect Versatile Buses of different configurations is utilized. The technique is illustrated in FIG. 49, in which the Versatile Bus A 4901 is connected through Versatile Bus transceiver 4902 to a simply configured Versatile Bus B 4903 which connects to the single scale integration (SSI), Non-VLSIC device 4904.

5.4. Fault Tolerant Systems

The transceiver has some interesting applications in systems that use redundancy to avoid system failures caused by incorrect operations of subsystems, i.e., fault tolerant systems. FIG. 50 shows a classical Triple Module Redundant (TMR) system. Each subsystem performs the same function and the comparative connections monitor for identical operation. If a subsystem fails, two of the three comparators will detect the failure. Since two failure reports are required to identify a failed subsystem, failure of a comparator cannot cause an incorrect failure report.

The transceiver chip can perform the comparative facility in a TMR system. In addition to reporting errors as discussed above, the transceivers can be reconfigured to transfer data if the system need not always operate in TMR form.

The approach can be extended to higher levels of redundancy to achieve fault tolerance to multiple errors.

5.4.1. Redundant Devices Upon the Versatile Bus

The Versatile Bus is exceptionally effective for the exercise and no-time-overhead comparing of results generated within redundant logic devices communicative upon the same Versatile Bus. Each of redundant devices upon the bus can simultaneously receive commands and/or data in a fully parallel manner in simultaneous time. Such receipt is called the parallel receipt of broadcast commands and/or data. Each redundant device, whether a memory or a central processor or whatever, can process the information in parallel to hopefully derive the identical result. Each device can be coordinated either by a command upon the Versatile Bus (originating at a third device or, in some sort or readiness message exchange between the redundant devices) or by simultaneous performance in equal time (such as when the redundant devices are physically identical) to deliver the processed information upon the Versatile Bus in a fully parallel manner in simultaneous time. Each redundant device would normally have an identical User's master arbitration identification code, would win arbitration upon the identical transaction, and would drive all slave identification/function and data information upon the Versatile Bus in full parallelism with the redundant device. If the drive of either device were, upon any line whether control or data, to disagree with the drive of any other redundant device then a shorted line or parity (open line) error would be detected upon the Versatile Bus. This error detection, occuring during a next subsequent communication cycle time, is without time overhead to the system's functional utilization of the processed information of the redundant devices. If an error were detected it could be analyzed, and bus interconnected devices could be stimulated to run test patterns, in determination of whether such error was resultant from a discrepancy of results between redundant devices or an actual communication error upon the Versatile Bus.

6. The Versatile Bus Interface Logics to User Interface

The Versatile Bus Interface Logics have a fixed protocol interface with the User logics, the physical interface of which was depicted in FIG. 1 and FIG. 4. This interface of unidirectional signals is the means by which a User device may communicate with the Versatile Bus Interface Logics, and thusly bidirectionally across the Versatile Bus with other User devices similarly interfaced.

The fifty-three signals from the User to the Versatile Bus Interface Logics are listed at the left-hand side of the table of FIG. 51 as Signals from User. The forty-six signals from the Versatile Bus Interface Logics to the User are listed at the right-hand side of the table of FIG. 51 as Signals to User. All signals are transmitted through pads between the User logics and the Versatile Bus Interface Logics in a single substrate implementation of both, or through pins and connective lands if the Versatile Bus Interface Logics and the User logics are implemented upon separate chip substrates. All signals within the table of FIG. 51 are accompanied by a reference figure number such as identifies the figure and the particular signal identification wherein the signal may later be found within the detailed logic diagrams. The Signals from the User to the Versatile Bus Interface Logics are generally grouped in five categories within the left-hand column of FIG. 51 for convenience in reference. This grouping identifies signals conventionally used with normal user output of data, signals additionally involved with normal User input of data, special control signals utilized in unique input and output situations, signals involved in User output of block data, and signals involved in the User specification of the slave identification codes within the Versatile Bus Interface Logics. Similarly, signals from the Versatile Bus Interface Logics to the User as appear in the right-hand column of FIG. 51 are grouped into those signals normally associated with the User output of data, plus such additional signals as are normally involved with User input of data across the Versatile Bus. These groupings are not the delimiting of signal function, but are merely for convenience. The meaning and utilization of these signals upon the Versatile Bus Interface Logics to User interface will become clear during the explanation of functions transpiring upon this interface within the following sections.

6.1. The Versatile Bus Interface Logics to User Interface for a Normal Transaction Upon the Versatile Bus The signals utilized in a conventional, single arbitration cycle, single slave identification/function cycle, single wait/data cycle, conventional communication transaction upon the Versatile Bus are identified in the table of FIG. 51 and are shown in the timing diagram of FIG. 52*a*. The timing diagram of FIG. 52*a* firstly shows as reference the signals (H) $\phi$1 and (H) $\phi$2 to which all communication between the Versatile Bus Interface Logics and the User, and upon the Versatile Bus, is synchronously referenced. The next eleven lines within the timing diagram of FIG. 52*a*, signals (H) TRANSACTION ENABLE through (H) TRANSACTION COMPLETED, show the timed activity between a sending User and the Versatile Bus Interface Logics. Remaining signals within the table of FIG. 51 as are used on the Versatile Bus Interface Logics to User Interface will not be utilized during this portion of sending activities upon such interface. The six lines BEGIN through BUSY represent associated signal activities upon the Versatile Bus. The eight signals (H) WIDR [0–7] through (H) DATA AVAIL represent activities between the Versatile Bus Interface Logics and the receiving User device during the communication transaction. The remaining signal (H) USER BUSY and/or (H) WAIT ON [A–D] represent possible activity upon the Versatile Bus Interface Logics to receiving User interface conditional upon the receiving User raising the WAIT signal during the example transaction. Remaining signals within the table of FIG. 51 as are used on the Versatile Bus Interface Logics to User Interface will not be utilized during this portion of receiving activities upon such interface.

Commencing with the functional analysis of the signals transmitted between the Verstaile Bus Interface Logics and the User during a conventional communication transaction upon the Versatile Bus as is illustrated in FIG. 52*a*, the signals (H) $\phi$1 and (H) $\phi$2 are firstly shown for time reference. These signals are not represented to have a fifty percent logically High duty cycle because, in actuality, their duration will be in accordance with latter explained FIG. 84. For purposes of the present explanation, it is sufficient to know that all Versatile Bus Interface Logics to User interface signals shown will be leading edge triggered by the logical High occurrence of either signal (H) $\phi$1 or (H) $\phi$2. The leading edges of timing signals (H) $\phi$1 and (H) $\phi$2 are separated by 20 nanoseconds (a timing variant such as can actually be realized within the preferred embodiment of the invention), and a total cycle time, such as is leading edge demarked by cycle time periods labeled T0 through T9, is thusly of duration 40 nanoseconds.

Continuing in FIG. 52*a*, the signal (H) TRANSACTION ENABLE assumes the logical High condition at $\phi$2 whenever the Versatile Bus Interface Logics are capable of accepting a new arbitration identification word and an associated command to initiate transaction which together comprise a User request to initiate a transaction upon the Versatile Bus. This signal (H) TRANSACTION ENABLE will remain in the logically High condition indefinitely until, having sensed this logically High condition during a clock $\phi$2 illustrated as $\phi$2 of T1, the User device transmits the signal (H) INIT TRANS in the logically High condition from clock $\phi$1 to clock $\phi$1 to the Versatile Bus Interface Logics, thereby indicating the initiation of a request to communicate upon the Versatile Bus. Responsively to such signal, the Versatile Bus Interface Logics will drop the signal (H) TRANSACTION ENABLE to the logically Low condition during the intervening $\phi$2, $\phi$2 of T2 within the example of FIG. 52*a*. The signal (H) TRANSACTION ENABLE will not be redriven to the logically High state by the Versatile Bus Interface Logics until the User's master identification register is capable of accepting a next, subsequent arbitration identification. This can only occur when the current arbitration identification is being emplaced upon the bus which, in the current example, will be seen to be delayed until $\phi$2 of T4. Therefore the Versatile Bus Interface Logics will be delayed in returning the signal (H) TRANSACTION ENABLE to the logically High condition until that time, $\phi$2 of T4, in the present example.

Continuing in FIG. 52*a*, along with the logically High transmission of the signal (H) INIT TRANS, the User must emplace the arbitration identification upon signal lines (H) UMID [0–7] during this $\phi$1 to $\phi$1 period, beginning at $\phi$1 or priorly. This arbitration identification appearing on the eight signal lines (H) UMID [0–7] will be gated into the Versatile Bus Interface Logics during intervening $\phi$2 of T2 in the example. No confirmation of the receipt of this arbitration identification quantity will be given by the Versatile Bus Interface Logics to the User.

Having received a request to initiate a transaction upon the Versatile Bus, and with the arbitration identification received, the Versatile Bus Interface Logics wait until a communication transaction can begin upon the Versatile Bus as indicated by the not busy state of the BUSY signal. In the timing diagram of FIG. 52*a* wherein the two time phase electrical protocol of communication upon the Versatile Bus may be particularly observed, it is illustrated that the first not busy, or logically High condition, of the BUSY signal occurs during φ2 of T3. Responsive to such not busy condition, the Versatile Bus Interface Logics commence a communication transaction with the BEGIN and ARBITRATION signals upon φ2 of the next following cycle time T4. Additionally resultant from this not busy condition upon the Versatile Bus, and necessitated by the time requirements which, due to pipelining, require that the slave identification/function information must be immediately and unconditionally available to the Versatile Bus Interface Logics, the signal (H) STROBING SID is issued in the logical High condition from the Versatile Bus Interface Logics to the User during the following φ2 to φ2, that is φ2 of T4 to φ2 of T5. The logicaly High condition of the signal (H) STROBING SID gates the slave identification/function information which must be provided by the User upon the signal lines (H) USID [0–7] during, and possibly commencing before, this period.

The results of the single cycle of arbitration occurring during φ2 of T4 are available to the User during the next following φ1 to φ1, that is φ1 of T5 to φ1 of T6. If the arbitration has been lost, the signal (H) LOST FF will be transmitted in the logically High condition from the Versatile Bus Interface Logics to the User during this T5 period. This logically High condition of the signal (H) LOST FF is additionally gated by the logical High condition of signal (H) AUTO RETRY, which may have been provided during this interval, potentially previously, and potentially subsequently, by the User logics to the Versatile Bus Interface Logics. If this signal (H) AUTO RETRY is in the logical High condition during the logical High occurrence of signal (H) LOST FF, then the φ1 to φ1 timed occurrence of the signal (H) LOST FF will be wrapped back into the Versatile Bus Interface Logics in simulation of the signal (H) INIT TRANS. This accomplishes the exact equivalent results as if the User logics had reinitiated an attempted transaction by the logical High state of the signal (H) INIT TRANS. The signal (H) LOST FF, and the effective second occurrence of signal (H) INIT TRANS due to the logical High condition of signal (H) AUTO RETRY are shown in dashed lines as conditional upon losing arbitration.

Considering instead that the arbitration has been won within the example of FIG. 52*a*, the Versatile Bus Interface Logics recognize the imminency of a requirement to place slave identification/function information upon the Versatile Bus. Such slave identification/function information, for howsoever many multiples of eight bit slave identification/function words as bus configuration dictates will be transferred, is obtained from the User under the gating control of the logically High condition of signal (H) STROBING SID. Each occurrence of this signal, illustrated to occur once only to recover one slave identificatin/function word within the example of FIG. 52*a*, gates the corresponding eight slave identification/function bits from the User as are carried on signal lines (H) USID [0–7]. Actual gating of the slave identification/function data into the Versatile Bus Interface Logics occurs at the φ1 leading edge of this φ2 to φ2 period, that is, φ1 of T5. The slave identification/function data, in part or in entirety, is emplaced upon the bus during the next following φ2 time, φ2 of T5 within the example of FIG. 52*a*.

Similarly to the timely recovery of slave identification/function data imminently priorly to immediate placement of the first slave identification/function word upon the Versatile Bus, the Versatile Bus Interface Logics, in imminency of the requirement of emplacing data upon the Versatile Bus, will recover a sixteen bit data word carried on signal lines (H) UDB [0–16] from the User under control of the logically High condition of gating signal (H) STROBING DATA. After the φ2 to φ2 occurrence of this signal (H) STROBING DATA, during which the output data is gated into the Versatile Bus Interface Logics during the intervening φ1 leading edge (φ1 of T6 in the example of FIG. 52*a*), the data is, in whole or in a first part, emplaced upon the Versatile Bus during the next φ2 period, φ2 of T6 within the example of FIG. 52*a*. The possibility that multiple sixteen bit words should be recovered from the User to the Versatile Bus Interface Logics and subsequently emplaced upon the Versatile Bus, in accordance with the configuration of the Versatile Bus, will be further dealt with within the example of FIG. 52*b*. In the present example one only sixteen bit word of data is recovered from the User and is transmitted in its entirety upon the Versatile Bus. Note that all this recovery of slave identification/function and data information from the sending User, and its subsequent emplacement upon the Versatile Bus, transpires well before any possibility that the sending User should be notified of the occurrence of a WAIT signal upon the bus from one(s) of the addressed slave devices. The occurrence of a WAIT signal during φ2 upon the bus will result in the logically High condition of signal (H) WAIT TO USER being transmitted during the next φ1 to φ1 period from the Versatile Bus Interface Logics to the User. The User will utilize this signal as an indication of the noncompletion of the current transaction.

Conceptually, what is transpiring is that the User device must be ready to supply slave identification/-function and data information to the Versatile Bus Interface Logics even should the progress of a transaction be delayed due to a BUSY condition upon the bus or even should the transaction not complete upon the occurrence of a WAIT signal from one(s) of the addressed slave devices. Although the immediacy of the requirement for the User supply of slave identification/function information to the Versatile Bus Interface Logics was delayed in the example of FIG. 52*a* due to activity in progress upon the Versatile Bus, the example of FIG. 52*b* will show that this information needs sometimes be supplied in the φ2 to φ2 period immediately following that φ1 to φ1 period in which the User has initiated the transaction and supplied the arbitration identification. Similarly, after the φ2 to φ2 supply of the slave identification/function information from the User to the Versatile Bus Interface Logics, the User must be capable of supplying data as soon as the next φ2 to φ2 period. Of course, the User tendered priority arbitration identification may not suffice to win arbitration upon the Versatile Bus, in which case it would then become the winner's master identification (i.e., the User is the busowing arbitrationwinning master). The User, in the event of losing arbitration, can continue to tender the same or can tender different arbitration identifications in accordance with its perceived urgency to win arbitration and go on to the Versatile Bus. Conversely, the User can raise the logical High condition of signal (H) AUTO RETRY and thence continue on about its business while the Versatile Bus Interface Logics will henceforth continue to arbitrate during each and every comminication transaction upon the Versatile Bus with the last tendered arbitration identification. If, and when, the Versatile Bus Interface Logics finally win arbitration upon the Versatile Bus, then, under control of up to eight occurrences of signal (H) STROBING SID each from $\phi$2 to $\phi$2, up to eight slave identification/function words of eight bits each can be consecutively gated into the Versatile Bus Interface Logics and consequently emplaced upon the Versatile Bus in accordance with configuration. The example illustrated in FIG. 52*a* is for the strobing of but a single word of slave identification/function which is subsequently emplaced upon the bus in its entirety, thereby meaning that one cycle of eight or fewer slave identification/function lines is in use upon the Versatile Bus. If the User has not already done so, it will have as little as 40 nanoseconds from the leading edge of the signal (H) STROBING SID to emplace up to sixteen bits of data on signal lines (H) UDB [0-16] which will be gated into the Versatile Bus Interface Logics under the control of signal (H) STROBING DATA. The Versatile Bus Interface Logics will, necessarily, control assembly (and disassembly) of larger slave identification/function and data quantities received from the User interface for transmission upon (and receipt from) the Versatile Bus. In the case of both slave identification/function and data quantities, the information will be extracted from the User at the last possible moment before timely emplacement upon the Versatile Bus. This manner of performance may be of advantage to certain Users which are able to formulate addresses in advance of having associated data transfers finalize. The Versatile Bus Interface Logics to User interface is not, however, a request-acknowledge-type interface, but instead operates under a rigorous timed protocol. Once a User initiates a transaction, it must be able to timely supply all subsequently required transaction quantities.

Continuing in FIG. 52*a*, the signals BEGIN, ARBITRATION, SID/FUNCTION, WAIT, DATA, and BUSY are shown for the occurrence of a single communication transaction upon the Versatile Bus. These signals are now represented in the two-phase drive electrical communication protocol of the Versatile Bus such as is explained in conjunction with FIG. 84 and in companion U.S. Pat. No. 4,500,988. Bus charging to the logically High level always occurs during $\phi$1, whereas communication of information transpires during $\phi$2. Phase 2 information communication signals of relevance to the present transaction are initiated with dots, and those $\phi$2 communication signals not of relevance to the present transaction are not shown at all. The true, or logically Low condition upon the bus, state of the six signals is illustrated for the present transaction. Note that the true state of the WAIT signal is conditional upon the WAIT response from the addressed slave device(s).

Continuing in FIG. 52*a*, the first notification which are received by a User device which has been addressed as a slave device within the ongoing Versatile Bus communication transaction are the logically High states of signals (H) WIDR [0-7], (H) WINNER'S ID AVAIL, (H) UIDF [0-7], (H) SID/F AVAIL, (H) HIT-[A-D], and the logically Low state of signal (L) CAM HIT. All signals occur from $\phi$1 to $\phi$1. If the slave User device is desirous of knowing the arbitration identification of the bus-owing arbitration-winning master one device, then it may gate in the eight bit winner's arbitration identification code on lines (H) WIDR [0-7] under control of gating signal (H) WINNER'S ID AVAIL. If this slave User device must depend upon such information to later reestablish communication with the master device during a split communication cycle, then it must recover this indicated arbitration identification information during the indicated period. Similarly, a User desirous of taking the transmitted slave identification/function information, such as might contain further functional demands to the User, will gate in the eight signal lines (H) UIDF [0-7] under control of gating signal (H) SID/F AVAIL. The User is informed of a masked match to one(s) of four possible slave identification codes of up to eight bits previously stored in an area of the Versatile Bus Interface Logics called CAM A through CAM D by the logical Low condition of signal (L) CAM HIT. Unique identification as to which one or ones of these stored slave identification codes has been maskedly matched is supplied to the User by the respective logical High condition of one or ones of the four control signals (H) HIT-[A-D]. Finally, the User is apprised of the availability of each and every sixteen bit data word upon assembly by the logical High condition of the signal (H) DATA AVAIL in conjunction with the data word upon the sixteen signal lines (H) UIDR [0-16]. In the example of FIG. 52*a* wherein only a single data word was transmitted within $\phi$2 of a single communication cycle, this data is supplied the User during the next consecutive $\phi$1 to $\phi$1 period. Note thusly, in this conventional pipelined communication transaction example of FIG. 52*a*, that the transmitting User device had to commence supplying data to its Versatile Bus Interface Logics during $\phi$2 of T5. The receiving User device will actually gate the inputted data at the midpoint of the signal (H) DATA AVAIL which is thusly the leading edge of $\phi$2 within T7. The sending User to receiving User data transmission time latency, through the sending Versatile Bus Interface Logics across the Versatile Bus through the receiving Versatile Bus Interface Logics, is thusly 80 nanoseconds. Of course, successive consecutive data word transmission after the linkage is established can transpire every 40 nanoseconds. Latency of data transmission upon the Versatile Bus is 80 nanoseconds, data transmission time is 40 nanoseconds.

Continuing in FIG. 52*a*, the final signals (H) USER BUSY and/or (H) WAIT ON [A-D] are used by the User device to inform the Versatile Bus Interface Logics of a BUSY condition such as will prevent the transaction from completing, and such as necessitates the generation of a WAIT signal upon the Versatile Bus. The Versatile Bus Interface Logics will inspect these signals at the leading edge of $\phi$2 prior to the transmission of the WAIT signal upon the Versatile Bus. In order that they should have assumed a valid stable state by that time, $\phi$2 of T6 within the example of FIG. 52*a*, it is intended to be illustrated that the signals should be emplaced in the appropriate state by the User device commencing at the previous $\phi$1, leading edge of $\phi$1 in T6 within the example of FIG. 52*a*. The signals may also be set to the logically High, WAIT-inducing, state prior to this $\phi$1 time. The Versatile Bus Interface Logics function to gate the logical Low or true condition of the signal (L) CAM HIT by the condition of signal (H)

USER BUSY. If the signal (H) USER BUSY is in the logical High state at the $\phi 2$ time of the logical Low occurrence of the signal (L) CAM HIT then a WAIT signal will be generated upon the bus during this $\phi 2$ time. Each of the four signals (H) HIT-[A–D] is similarly gated by the associated one of four gating signals (H) WAIT ON [A–D] to enable the generation of a WAIT condition upon the Versatile Bus. Therefore the User slave device is capable of aborting, or WAITing, all transactions or only those ones associated with selective slave identifications of the User slave device. These signals (H) USER BUSY and/or (H) WAIT ON [A–D] are often kept at levels by the User devices.

In summary, the general operation of the Versatile Bus Interface Logics to User interface for both the possible User roles of master and slave within a Versatile Bus communication transaction is as follows. A User wishing to go on the Versatile Bus as a master device looks at the signal (H) TRANSACTION ENABLE from the Versatile Bus Interface Logics, which indicates that there is room to store an arbitration identification code. In the presence of the enabling High condition of this signal (H) TRANSACTION ENABLE the master User device will transmit a logical High condition of signal (H) INIT TRANS accompanied by a correctly formatted arbitration identification code of up to eight bits upon signal lines (H) UMID [0–7]. The formats of such arbitration identification codes will be further discussed in conjunction with FIG. 105. Such formats represent the rare instance wherein the User must be apprised of the configuration of the Versatile Bus. Note that this arbitration identification code may be separately provided to the Versatile Bus Interface Logics during each and every attempt of a User to obtain bus ownership through arbitration. Conversely, if the User wishes to arbitrate only with a single arbitration code identification then the signal (H) AUTO RETRY may be emplaced in the logically High condition to force the Versatile Bus Interface Logics to repeatedly attempt to arbitrate for bus ownership. If the User device has not but a single arbitration identification, the signals (H) UMID [0–7] may even be hardwired. If one cycle of arbitration, slave identification/function, and wait/data are implemented upon the Versatile Bus, the User must be ready to supply up to eight bits of slave identification/function information upon signal lines (H) USID [0–7] within 60 nanoseconds of commencing signal (H) INIT TRANS. The sending User must then stand ready to supply up to sixteen bits of data on signal lines (H) UDB [0–16] within 40 nanoseconds after the supply of the slave identification/function information. Depending on the configuration of the Versatile Bus, the required time of provision for this information could either be slower, in the case of activity already in progress upon the bus or multicycled transfers of each information word provided by the User, or even faster, in the case of configured nonperformance of either arbitration or slave identification/function or both. A Versatile Bus Interface Logics will receive each of such possibly plural data words such as the master User device desires to transmit to a slave device and, after such configuration sensitive disassembly as is required, transmit them upon the Versatile Bus. Any WAIT signal received back across the Versatile Bus from the connected User slave devices will be channeled back to the User device. This WAIT signal will not reach a transmitting User device until one, or possibly more, data words have been attempted to be transmitted. It therefore behooves the transmitting User device not to destroy each message transmission until such time as it is assured of the receipt thereof across the Versatile Bus. A User may continue to send multiple words of data in the presence of a WAIT signal, but will generally abort further data communications in consideration of the non-receipt of such by one(s) of the User slave devices.

During each communication transaction the Versatile Bus Interface Logics to User interface performs as follows for the role of the User device as a slave device. The User slave device has preloaded four slave identification registers and a mask register within the Versatile Bus Interface Logics with such eight bit slave identification codes and with an eight bit mask quantity such as represent, combinationally, the masked slave identification code(s) by which the User device is willing to accept addressing. If the Versatile Bus Interface Logics ever obtain a masked match at the conclusion of any first word transfer within a slave identification/function activity, then the slave User device is alerted via the occurrence of the signal (L) CAM HIT in the logical Low condition plus (an) associated one(s) of signals (H) HIT-[A–D]. These signals (L) CAM HIT and (H) HIT-[A–D] are, respectively, gated by the Versatile Bus Interface Logics in respective consideration of signals (H) USER BUSY and (H) WAIT ON [A–D] in order to institute a WAIT signal upon the Versatile Bus. The slave User device is also supplied with the eight bits of the arbitration winner's identification on signal lines (H) WIDR [0–7] as gated by signal (H) WINNER'S ID AVAIL, and the entirety of the slave identification/function upon lines (H) UDIF [0–7], gated in howsoever many eight bit slave identification/function words exist by repetitive occurrences of signal (H) SID/F AVAIL. These signals indicative of the current arbitration winners identification and the last occurring slave identification/function information appearing upon the Versatile Bus are always available at the Versatile Bus Interface Logics to User interface of all Users. Normally, only addressed and/or commanded Users will care to utilize this information, although it remains available for any User device desiring to monitor activities upon the Versatile Bus. By utilizing this and data transmissions, a device may passively eavesdrop for receipt of information upon the Versatile Bus. The slave User device is transferred an up to sixteen bit data word on signal lines (H) UIDR [0–16] as gated by the logical High condition of signal (H) DATA AVAIL as each word is assembled, in accordance with Versatile Bus configuration, from transmissions upon the Versatile Bus.

6.2. Versatile Bus Interface Logics to User Interface During Block Data Transfer The signal communication across the Versatile Bus Interface Logics to the User device during occurrence of a block data transfer upon the Versatile Bus is illustrated in FIG. 52*b*. As in previous FIG. 51*a*, all signals are referenced relative to timing chains (H) $\phi 1$ and (H) $\phi 2$ which are common throughout the Versatile Bus system. The example shown is for the transfer upon the Versatile Bus of three data words of sixteen bits each, thereby equal to the three, sixteen bits words received across the Versatile Bus Interface Logics to User Interface. These three transfers are numbered on the Versatile Bus DATA signal lines as 1, 2 and 3 occurring during $\phi 2$ of cycle times T4, T5 and T6. Again, the notation for communication of the BEGIN, ARBI- TRATION, SID/FUNCTION, WAIT, DATA, and BUSY signals upon the Versatile Bus is now in accordance with the two phase communication protocol which will be discussed in conjunction with FIG. 84 and which is further explained in companion U.S. Pat. Ser. No. 4,500,988. Basically, during the exercise of the two phase Versatile Bus electrical communication protocol, the $\phi$1 of each cycle time T0 through T9 is utilized to charge the bus to the logically High condition as is indicated in the bus signal lines of FIG. 52*b*. Actual communication of intelligence transpires during $\phi$2. A logically Low signal condition upon the Versatile Bus during $\phi$2 represents the communication of a logical "1". Those $\phi$2 periods not involved in the current, three data word, communication transaction may involve the communication of intelligence which is pipelined with the intelligence of the present communication transaction. These $\phi$2 periods are shown as blank in FIG. 52*b* for not being of interest to the present illustration. The ultimate necessity that the User to Versatile Bus Interface Logics should enable proper control of a multiword communication transaction upon the Versatile Bus is not only that multiple words of data will be transferred upon the Versatile Bus, but also that the BUSY signal must assume the shown bus busy, or logically true, state until one commuication cycle from the termination of the communication transaction. In the present instance of three data words transmitted upon a fully pipelined Versatile Bus, two associated bus busy signals will transpire as are labeled 1 and 2 within FIG. 52*b*. The reason why a transmission of three data quantities should result in two excess BUSY signals may be recalled by momentary reference to FIG. 29.

Continuing in FIG. 52*b*, the communications signals between the User and the Versatile Bus Interface Logics for transmission of three data words upon the Versatile Bus are shown as (H) TRANSACTION ENABLE through (H) TRANSACTION COMPLETED. As before, responsively to a logical High condition of signal (H) TRANSACTION ENABLE the User device initiates a transaction by raising the logical High condition of signal (H) INIT TRANS and emplacing the arbitration identification upon the eight signal lines associated with signals (H) UMID [0–7]. Herein, no delay is shown in going onto the Versatile Bus. Consequently, the master User device supplied slave identification/function code is strobed into the Versatile Bus Interface Logics under the logically High condition of signal (H) STROBING SID which gates the up to eight slave identification/function bits represented by signals (H) USID [0–7].

Continuing in FIG. 52*b*, the User has, from the very initiation of the current transaction as began with the logical High condition of signal (H) INIT TRANS, emplaced a logically High condition on assorted ones of signals (H) UWK 16, (H) UWK 4, (H) UWK 3, (H) UWK 2, (H) UWK 1, and/or (H) UWK 0. These signals represent the count of sixteen bit words which the block transferring master User device desires to output. The reason that there is a breakover between discrete signals collectively representing a word transfer count of zero to fifteen decimal, and a single signal from the User device to the Versatile Bus Interface Logics representing that more than sixteen blocked data transfer words remain to be transferred across the interface, is because the Versatile Bus Interface Logics needs potentially formulate the dropping of the BUSY signal upon the Versatile Bus, in consideration of bus configuration for pipelined operation and activities of multiple cycles, up to fifteen cycle times prior to the receipt of the last data word from the User. In the example of FIG. 52*b*, the User has raised the logical High condition of signal line (H) UWK 1 and (H) UWK 0 such as respectively represent a binary count of two plus one, or a total of three, sixteen bit data words which the User is desirous of transmitting across its interface to the Versatile Bus Interface Logics and thence across the Versatile Bus. Upon the intermediary $\phi$1 leading edge within the $\phi$2 to $\phi$2 occurrence of the logical High condition of signal (H) STROBING DATA, the User will decrement the remaining word count as expressed in signals (H) UWK 0 through (H) UWK 16 by one word. In the example of FIG. 52*b* this dictates that signal (H) UWK 0 should assume the logical Low state of $\phi$1 of T5. Similarly, as each successive sixteen bit data word appearing on signal lines (H) UDB [0–16] is transferred from the User to the Versatile Bus Interface Logics under the logically High, $\phi$2 to $\phi$2, occurrence of signal (H) STROBING DATA, then the User device will correspondingly adjust the word count signals to represent the remaining number of sixteen bit words which it is desirous of block transferring. Upon $\phi$1 of T6 in the example of FIG. 52*b*, all word count signals (H) UWK 0 through (H) UWK>16 are uniformly decremented to the logically Low, "1", state. No further words than the three indicated will be further strobed from the User device for transmission upon the Versatile Bus. The $\phi$1 to $\phi$1 logically High transmission of signal (H) TRANSACTION COMPLETED is accomplished, as before, after the conclusion of the final $\phi$2 data transmission upon the Versatile Bus. The recipient slave User device, interface signals to which are not shown in FIG. 52*b*, can raise the WAIT signal at any time during the block data transfer. Subsequent response to the occurrence of such a WAIT signal by the transmitting User is discretionary. The User could immediately lower its word count signals as represented in signals (H) UWK 0 through (H) UWK>16 to the logical Low, "0", condition and thereby (prematurely) terminate ongoing block data transfer. For a normally complete block data transfer, however, the Versatile Bus Interface Logics will always manage the BUSY signal as needs appear on the Versatile Bus and dual consideration of both the remaining number of words to be block transferred and the established configuration of the Versatile Bus.

6.3. Versatile Bus Interface Logics to User Interface for Storing Slave Identification Codes and a Mask Quantity The signals and timing pertinent to the storing of up to four slave identification codes and one mask quantity within the Versatile Bus Interface Logics by the User device are shown within the timing diagram of FIG 52*c*. As before, all signals are referenced relative to timing waveforms (H) $\phi$1 and (H) $\phi$2 which are universal throughout a Versatile Bus interconnected system. In order to store slave identification codes and/or a slave identification mask, the User device should not have a transaction in progress upon the Versatile Bus. If slave identification codes and/or a slave identification mask must be written while there is some potential that a User device will be addressed, via a slave identification/function code, as a slave device upon an operational Versatile Bus, there may occur some indeterminacy as to which, new or old, slave identification code has resulted in the device recognition. A User which cares to discriminate between its recognition under a new and an old slave identification code and/or a masked slave identification would probably raise the (H) USER BUSY signal to the logical High condition so that potential transactions would be rejected during the duration of the internal change to the Versatile Bus Interface Logics.

The User device selectively writes one of the four slave identification code quantities which are held within CAM registers within the Versatile Bus Interface Logics by raising the associated one of signals (H) WRITE [A–D] to the logically High level from $\phi 1$ to $\phi 1$ while supplying the eight bit quantity to be stored therein signal lines (H) UMID [0–7] for the same period. The eight bit mask register within the Versatile Bus Interface Logics is similarly stored by the User device generation of the signal (H) WRITE MASK in the logically High condition from $\phi 1$ to $\phi 1$ while emplacing an eight bit data pattern upon signal lines (H) UMID [0–7]. Only those bit positions within each of the four slave identification codes, stored in CAM registers A through D, such as corresponds to a logical "1" bit within the mask word, as stored within the mask register, will subsequently be utilized for comparison with a like bit position of the first eight 1 bits received within the slave identification/function activity upon the Versatile Bus Obviously, under such a masked match the slave identification comparison performed may be of zero to eight bits in length and may occupy any field or fields within the first eight bits of any transmitted slave identification/function information. If transmission of slave identification/function information upon the Versatile Bus were to be thought of not as unique identification of a particular slave device resource, but rather as a sensitivity filter for the coupling of greater or lesser system resource, it is obvious that both adjustments of the transmitted slave identification/function codes and the mask within the recipient slave device(s) could suffice to allow greater or lesser system resource in the form of slave devices to be coupled into the problem flow transpiring upon the Versatile Bus. Such system design considerations are generally beyond the scope of this disclosure, but are of pertinence to a bus utilizable in signal as well as data processing through Very Large Scale Integrated circuit devices. 6.4. Versatile Bus Interface Logics to User Interface for the Configuration of No Arbitration and No Slave Identification/Function Upon the Versatile Bus The Versatile Bus Interface Logics to User interface as is involved in the conduct of data transfer upon the Versatile Bus without either accompanying arbitration or slave identification/function activities is shown in the timing diagram of FIG. 52*d*. The conduct of such a special case of activity upon the Versatile Bus will involve the utilization of the special control signal (H) SINGLE INPUT. The intent of the scheme represented is as follows. When no arbitration and no slave identification/function activities are configured to be performed upon the Versatile Bus, then there can only be but one master device and one slave device. In the communication between these two devices, which necessarily consists of data only, the slave device will not be permitted the normal 20 nanosecond period after the $\phi 1$ leading edge of the logical Low going signal (L) CAM HIT in which to raise the signal (H) USER BUSY and/or signals (H) WAIT ON [A–D], all such signals as will ultimately cause the generation of a WAIT signal upon the Versatile Bus and the resultant apprising of the transmitting master User device that the associated data word has not been received. In order to make timely use of the WAIT signal and its associated meaning of an uncompleted communication transaction during the special case of a single master User device communicating to a single slave device, a special control signal called (H) SINGLE INPUT will be employed within the slave User device. Upon such time as the slave User device recognizes that it is presently receiving the last data word save one which it is currently capable of accepting, such as by the filling up of an input buffer, the slave User device will raise this signal. For each subsequent attempted data communication during the duration of this signal the transmitting master User device will be timely informed, via the WAIT signal, of a non-receipt of the data transmitted. Normally, and is established by system convention between the single master User and single slave User devices, the transmitting master device will forego data transmission for a period until the slave device would be assured of capacity to reinitiate reception of data. Then the master User device will normally continue data transmission with the next word in sequence.

The utilization of the signal (H) SINGLE INPUT to control the wait operation during communication between a single master device and a single slave device such as require neither arbitration nor slave identification/function activity upon the Versatile Bus, is shown in the timing diagram of FIG. 52*d*. Four consecutive $\phi 1$ to $\phi 1$ logical High pulses of signal (H) INIT TRANS represent the attempt by the transmitting User device to stream four data words to the single slave device. Upon the next $\phi 2$ to $\phi 2$ period following the logical High raising of signal (H) INIT TRANS, the User will emplace a data word upon lines (H) UDB 0–16] and cause such to be gated into the Versatile Bus Interface Logics under the $\phi 2$ to $\phi 2$ duration of signal (H) STROBING DATA. Note by note momentary reference to FIG. 52*a* that the emplacement of the User's master identification code via signals (H) UMID [0–7] on lines as were gated by the signal (H) INIT TRANS was simultaneous with the $\phi 1$ to $\phi 1$ occurrence of that signal. Note also in FIG. 52*a* that the User's slave identification/function information as was emplaced upon signal lines (H) USID [0–7] and as was gated by signal (H) STROBING SID, as well as the User data as was emplaced upon signal lines (H) UDB [0–16] and as gated by signal (H) STROBING DATA, were transferred during a $\phi 2$ to $\phi 2$ period. These timing relationships, $\phi 1$ to $\phi 1$ for transmission of the arbitration identification and $\phi 2$ to $\phi 2$ for the transmission of slave identification/function and data information, always hold true. That is, if there is no arbitration activity and thusly no accompanying transmission of the User's master identification, then either the slave identification/function information or the data information or both will be emplaced on the interface to the Versatile Bus Interface Logics by the User only during the $\phi 2$ to $\phi 2$ period.

Continuing in FIG. 52*d*, since the Versatile Bus Interface Logics do not recover the data received from the User device until the leading edge of $\phi 1$ at time T2, then that earliest time within which such data can be emplaced upon the Versatile Bus accompanied by the BEGIN signal is $\phi 2$ of T2. The data is received off the Versatile Bus and transmitted to the User slave device on signal lines (H) UIDR [0–16] under the gating control of signal (H) DATA AVAILABLE during the next $\phi 1$ to $\phi 1$ time, that is T3. Upon receipt of this data input, it is illustrated in the example of FIG. 52*d* that the slave User device realizes that it only has one additional remaining word of input capacity. That is, the slave User device is now capable of accepting only one further, single, input. Therefore the slave User device immediately during $\phi$2 of T3 raises the signal (H) SINGLE INPUT to the logically High level. If the slave device has always had but one word of input capacity, then this signal should have already been in the logically High condition.

Continuing in FIG. 52*d*, transmitted word two will be transmitted upon the Versatile Bus, and accepted by the User slave device in the normal manner. Upon the occurrence of the BEGIN signal as accompanies transmitted word three, this signal, in consideration of the logically High condition of signal (H) SINGLE INPUT as is currently presented to the Versatile Bus Interface Logics, will be wrapped back onto the Versatile Bus as the occurrence of a WAIT signal. This WAIT signal is seen by the Versatile Bus Interface Logics of the master User device and transmitted to the master User device via the normal $\phi$1 to $\phi$1 logical High occurrence of signal (H) WAIT TO USER. Data transmission four, already in the pipeline, will similarly result, in consideration of the logical High level of signal (H) SINGLE INPUT as supplied by the slave User device to its Versatile Bus Interface Logics in the occurrence of a WAIT signal upon the Versatile Bus and the ultimate generation of a logically High condition of signal (H) WAIT TO USER to the transmitting User device.

In consideration of the occurrence of these WAIT signals, the master User device will normally, in consideration of the likely establishment of a system convection between itself and the slave User device, give such slave User device some respite recovery period. After such recovery period, it is intended to be illustrated in the example of FIG. 52*d* that the User master device resumes data transmission with the last unaccepted word, word three, as the new data transmission three prime. If the slave User device has lowered signal (H) SINGLE INPUT to the logical Low level at least 80 nanoseconds prior to the simultaneous occurrence of the BEGIN and DATA signals upon the Versatile Bus as accompanies this transmission of data quantity three prime, then this transmission will succeed in being passed to the slave User device.

In summary, the special control as transpires under signal (H) SINGLE INPUT as is illustrated in FIG. 52*d* does not obviate all requirements for intelligent utilization of the special configuration case of zero arbitration groups, and zero SID cycles as between a single master and a single slave device, but does permit such devices to operate with a minimum of prior knowledge of the exact nature to each other. The User sophistication required to be remaining is that a slave User device should apprise its Versatile Bus Interface Logics of a remaining capacity to accept but a single additional data word, whereas a master User device will not normally attempt to indefinitely submit data to a slave device which has indicated unreadiness. What is not required is that the master device should know the remaining number of words within the input buffer of the slave device. This universality and flexibility in actual communicative operation is obviously of value in a system intended to be a universal VLSI circuit interconnect.

6.5. Versatile Bus Interface Logics to User Interface for the Special Operation of Cancelling a Pending Transaction The signals, including signal (H) CANCEL PENDING TRANSACTION and signal timing involved in the cancelling of a pending transaction by the transmitting User device are shown in the timing diagram of FIG. 52*e*. The intent of the cancel pending transaction feature of the Versatile Bus Interface Logics to User interface is to encompass the fact that a transmitting User may have more than one transaction in a pipeline under certain configurable conditions of the Versatile Bus. These configuration conditions involve multiple cycles of the slave identification/function activity and/or the data activity upon the Versatile Bus. In the example of FIG. 52*e*, a Versatile Bus configured for 2 cycles of arbitration, 2 cycles of slave identification/function, and 2 cycles of data—exactly as was previously illustrated in FIG. 27—will be utilized in explanation of the cancel pending transaction feature. The cancel pending transaction feature accords that a master User device which is attempting to communicate multiple data words linearly sequentially, such data as would be without value if not received sequentially and/or in its entirety, may cancel already registered initiations of the Versatile Bus for transmission of latter data words in the event that earlier data words are not successfully received by the slave User device. In order to so cancel pending, latter data word, transmissions upon the Versatile Bus, the master User device will employ a special signal which will cause a WAIT condition to occur upon the Versatile Bus in association with the cancelled transaction(s). Although such latter data transmissions might elsewise be received by a slave User device, they are not suitable and/or valid for transmission out of sequence. The occurrence of this master User device generated WAIT signal upon the Versatile Bus informs all interconnected devices in a conventional manner, including the transmitting master User device itself, of the non-completion of the associated transaction.

The illustration of FIG. 52*e* is for the transmission by a master User device of three consecutive data words, words 1 and 2 of which, hypothetically, must go to the slave device in sequence and/or together in their entirety. Responsively to the logical High condition of signal (H) TRANSACTION ENABLE, the transmitting user initiates the first data transfer by raising signal (H) INT TRANS to the logically High condition accompanied by the arbitration identification upon signal lines (H) UMID [0–7]. Due to the not busy condition of the Versatile Bus during $\phi$2 of T1, the Versatile Bus Interface Logics arbitrate onto the bus during next earliest time which is $\phi$2 of T2. Since 2 cycles of arbitration are required in the sample configuration of the Versatile Bus, the $\phi$2 to $\phi$2 gating of the slave identification/function information from the User on lines (H) USID [0–7] under control of gating signal (H) STROBING SID does not transpire until $\phi$2 of T3. After 2 cycles of slave identification/function activities upon the Versatile Bus, the data word as is supplied on signal lines (H) UDB [0–16] is correspondingly gated from the User under control of signal (H) STROBING DATA at $\phi$2 of T5 until $\phi$2 of T6. Upon the transmission of the first half of this User data word upon the Versatile Bus during $\phi$2 of T6, the slave User device responds with a WAIT signal upon the Versatile Bus. Note that such a WAIT signal will never suspend further cycles of multicycled data transmission.

Continuing in FIG. 52*e*, the receipt by the Versatile Bus Interface Logics of the transmitting slave User device of such WAIT signal upon the Versatile Bus results in the logically High condition of signal (H) WAIT TO USER during $\phi 1$ to $\phi 1$ of T7. Meanwhile, under the control of the (H) TRANSACTION ENABLE signal in this 2 arbitration cycle, 2 slave identification/function cycle, 2 data cycle bus wherein 2 times 40 nanoseconds, or 80 nanoseconds total, time, is required in the pipelined execution of each single communication transaction, the master User device has initiated a second and even a third transaction. Indeed, the arbitration associated with communication transaction 2 has completed, and the slave identification/function activity associated with communication transaction 3 is in progress upon the Versatile Bus, at such time as the master User device is informed, via signal (H) WAIT TO USER, of the non-completion of transaction 1. Recognizing that it does not wish any User slave device to accept data quantity 2 upon the non-acceptance by the same, or any other slave device, of transaction data quantity one, the transmitting master User device raises the logical High level of signal (H) CANCEL PENDING TRANSACTION at $\phi 2$ of T7 responsively to the occurrence of the logical High condition on signal (H) WAIT TO USER at $\phi 1$ of T7.

In the presence of this logical High condition of signal (H) CANCEL PENDING TRANSACTION, the next subsequent first cycle of a data transmission upon the Versatile Bus will result in a WAIT signal being emplaced by the transmitting master User device upon the Versatile Bus. In the example illustrated in FIG. 52*e*, the presence of the (H) CANCEL PENDING TRANSACTION signal at $\phi 2$ of T8 results, upon the next subsequent first cycle of data transmission associated with data word 2, data transmission 2*a*, in the occurrence of a WAIT signal upon the Versatile Bus. This WAIT signal is conventionally interpreted by the transmitting User device and all other bus interconnected devices as the non-completion of the transaction 2. Received by the Versatile Bus Interface Logics of the transmitting User device, such WAIT signal upon the Versatile Bus results in the provision of a logically High signal (H) WAIT TO USER during T9.

If the transmitting User was desirous of cancelling only pending transaction 2, such as is illustrated in the timing diagram of FIG. 52*e*, then the signal (H) CANCEL PENDING TRANSACTION will be dropped to the logically Low condition at the conclusion of data transfers associated with the cancelled transaction. It is thusly illustrated that pipeline transaction 3 occurs normally upon the Versatile Bus and in the absence of any illustrated WAIT signal, is normally accepted by slave User devices.

In summary, it should be recalled that the User sophistication required to handle the signal (H) CANCEL PENDING TRANSACTION only comes into play for certain multicycled slave identification/function activity and/or multicycled data activity Versatile Bus configurations and, for master Users devices transmitting related sequential data. Obviously, not all transmitting master User devices will exercise this capability. Similarly, the ability of a master User device to operate utilizing signal (H) SINGLE INPUT as is required for the unique case of 0 arbitration groups and 0 slave identification/function cycles is uncommon of implementation. At an even more basic level, User devices can, of course, dispense with those signals associated with such arbitration, slave identification/function, and wait activities as a User is incapable of performing. Many passive User devices, such as memories, will be in this category. Even if certain arbitration and slave identification/functions are exercised by a User, the associated arbitration identification words as appearing on lines (H) UMID [0–7] and lines (H) USID [0–7] may be hardwired. Despite the number and complexity of timing diagrams within FIG. 52, the Versatile Bus Interface Logics to User interface can be extremely simple of implementation and exercise if correspondingly simple functions are performed. Conversely, sophisticated User devices can interact with the Versatile Bus Interface Logics in a manner whereby the total configurable capabilities of the Versatile Bus may be universally exercised.

7. The Versatile Bus Interface Logics to VM Node Interface

The purpose of the interface which the Versatile Bus Interface Logics exhibits to the VM Node are four in number: (1) initializing a Versatile Bus system, (2) configuration and, if desired, reconfiguration of the Versatile Bus Interface Logics to one of the 31,045 available configurations, (3) recognizing the detection of an error of any one or more of the Versatile Bus Interface Logics, interrogating the error detecting Versatile Bus Interface Logics so that the bit sensitivity of the transmission error may be understood, and resetting the Versatile Bus Interface Logics for ripple shifted line substitution in order to compensate for any such single error, and (4) scan-set testing of the Versatile Bus Interface Logics. Purpose "(1)" is absolutely indispensable. The simple concurrent performance of purpose "(2)" within the initializing steps will enable configuration of a Versatile Bus system to some valid interface protocol other than that invalid configuration which is the configuration "master cleared" state of the Versatile Bus Interface Logics.

Even indispensable purpose "(1)"—initialization—plus purpose "(2)"—configuration—could be simply accomplished by (1) demanding more intrinsic knowledgeability of the User device, and (2) hardwiring the configuration into each interconnected Versatile Bus Interface Logics. By "intrinsic knowledge-ability" it is mean that a User device should know not only what it is, but where it is within a Versatile Bus system (its Arbitration and Slave Identifications) plus what other device types are Versatile Bus interconnected at which respective addresses (both in the sense of Arbitration and Slave Identification/Function interconnection addresses). Although a hardwired Versatile Bus Interface Logics could fully and capably function, such rigidity in creation of a Versatile Bus network is not desirable. It is, however, desirable to take a universal User device chip, such as a microprocessor, with its universal Versatile Bus Interface Logics and emplace this chip in many different Versatile Bus systems. In order to do so, the Versatile Bus Interface Logics interface to the VM Node will support an ordered initialization procedure which will leave every User device, such as both desires and is capable of assimilating the information presented, with complete knowledgeability about the nature and address identifications of other interconnected devices. Of course, save for the limited requirements for formatting of the Arbitration identification, the User device does not know and need not known exactly which configuration the Versatile Bus, such as services User device to User device intercommunication, will be operating in. In other words, the Versatile Bus configuration could be hardwired, but is best "built" in all its physical and functional parameterization by an intelligence arising not at each or any individual User device but rather operating through the VM Node. Such an intelligence is called a maintenance processor. Such a maintenance processor can also perform purposes "(3)"—error recognition/correction—and "(4)"—test—for which the VM Node interface also exists.

During the course of the following explanation regarding the preferred mode of utilizing the VM Node and a maintenance processor connected thereto for all four purposes it will become obvious that intermediary cases exist between doing nothing across the VM Node (requiring User devices to be a priori system knowledgeable and hardwiring the Versatile Bus Interface Logics configuration) and going all the way to a comprehensive, although not unduly sophisticated, VM interface management scheme which serves all functions and incorporates all options. During the ensuing discussion the following "fallback" control scenario should always be kept in mind. If the VM Node connected maintenance processor wants to deal with the interface to the Versatile Bus Interface Logics simplistically, it need only adhere to the following: (1) all VM Node control signals are from clock φ1 to clock φ1 at normal, logic compatible, voltage and current drive levels; and (2) utilizing control and data signals as simply prescribed the maintenance processor can always deal with the VM Node connected Versatile Bus Interface Logics individually in rotation (instead of combinatorially and jointly). Such a simplistic requirement to emplace an appropriate binary stated signal on the VM Node Interface to the Versatile Bus Interface Logics in order to accomplish initialization, configuration, and the like ultimately means that a human operator could stagedly sequentially cause to be effected the selfsame inputs through the VM Node interface to the Versatile Bus Interface Logics as are normally effected under the programmed control of a maintenance processor.

The maintenance processor, of whatever sophistication, serves the Versatile Bus system by dealing with its constituent component parts—the Versatile Bus Interface Logics and the associated User devices. The initialization, configuration/reconfiguration, error recognition/correction and scan/set testing performed by the maintenance processor is relevent to system, and not device level, concerns. Therefore if it is desired to employ the preferred embodiment of the Versatile Bus Interface Logics in an unsophisticated system operating with an unsophisticated maintenance processor or less, then such Versatile Bus Interface Logics will still be inherently capable by logical design of dynamic initialization, configuration/reconfiguration, error recognition/correction, and scan/set testing even if the system design should not exercise one or more of these capabilities.

7.1. Interface Signals Between the Versatile Bus Interface Logics and the VM Node/Maintenance Processor The thirteen signals from the VM Node/maintenance processor to the Versatile Bus Interface Logics and the eleven signals from the Versatile Bus Interface Logics to the VM Node/maintenance processor are respectively listed in the left and right hand columns of the table of FIG. 53. The signal may be considered to connect to a "VM Node/maintenance processor" because, in accordance with the representation of FIG. 4, the VM Node is nullity within the present invention and a mere conduit of the signals as represented in the table of FIG. 53 to a system-wide maintenance processor. Momentarily referring to FIG. 4, the twenty-four total signals managed for the Versatile Bus Interface Logics and each of the VLSI circuit User device logics times the total possible number of such logics, up to 256, thereby means that the maintenance processor is managing, through the extensive VM bus interconnection net, a great number of individual signal lines. The manipulation of such signal lines will, however, be found to be routine, straightforward, and highly regular. Such uniformity and regularity is one reason why a VM Node might actually be configured to contain logics, as opposed to having a centralized performance of all logical function contained in a maintenance processor. To such extent as logical function is distributable into the VM Nodes, then the large number of pins, currently twenty-four, required to communicate with a maintenance processor could be correspondingly reduced. The manner of the distribution of such function into the VM Nodes, and the corresponding reduction of pins (pins are a scarce resource in very large scale integrated circuit interconnect) is not the subject of this application.

The signals enumerated within the table of FIG. 53 are transmitted through pads (in single substrate VLSIC implementation of User logics and Versatile Bus Interface Logics) or pins (if User logics are on a separate substrate from the Versatile Bus Interface Logics). Transmissions off the substrate and across the VM bus, actually a very large interconnection network, to the maintenance processor is via pins and lines. The signals from the VM Node to the Versatile Bus Interface Logics appearing in the left-hand column of the table of FIG. 53 are grouped into two control signals also distributed in common to the User logics, in two signals received only at the Versatile Bus Interface Logics, and into nine scan/set test related signals which are also passed through the User logics. The signals in the right-hand column of the table of FIG. 53 are grouped into five signals which connect directly to the VM Node/-maintenance processor from the Versatile Bus Interface Logics, and six signals involving the routing of scan data as obtained from scan/set testing of the Versatile Bus Interface Logics which also are passed to and through the User logics. The reference figure designations accompanying named signals within the table of FIG. 53 specify those figures and line identifications within the logic diagrams wherein these signals respectively enter and exit the Versatile Bus Interface Logics from the VM Node. Unlike the more complex timing accompanying the Versatile Bus Interface Logics to User device interface signal flow, all communication between the Versatile Bus Interface Logics and the VM Node transpires by signals, as listed in the table of FIG. 53, which can go High only upon the leading edge of clock φ1 and which can go Low only upon a subsequent clock φ1. Thus all signals, some of which may be at times levels, will be active for a minimum of φ1 to φ1 or 40 nanoseconds. The electrical voltage and current interface of the signals of the table of FIG. 53 is, of course, dependent upon the very large scale integrated circuit CMOS or other technology in which the Versatile Bus Interface Logics are implemented. For the preferred embodiment of the invention as implemented in CMOS VLSIC, a logical High, or "1", is +3 volts d.c., and a logical Low, or "0", is 0 volts d.c.

The nature of signals between the Versatile Bus Interface Logics and the VM Node as are listed in the table of FIG. 53 is as follows. The signal (H) CLEAR enables, when High, the clearing of the Versatile Bus Interface Logics and the User logics. The signal (H) INIT (φ1-φ1) directs the Versatile Bus Interface Logics to respond, in such manner as will be discussed within the next subsection, for initialization of the Versatile Bus system. This signal (H) INIT (φ1-φ1) is held logically High for the duration of the initialization operation upon the entire Versatile Bus system and logically Low elsewise as when the Versatile Bus is running. The signal (H) INIT (φ1-φ1) is normally the inverse of a run enablement to User logics, that is the logical Low condition of signal (H) INIT (φ1-φ1) is required to enable User logics to commence running within the Versatile Bus system. The signal (H) INIT (φ1-φ1) is distributed to all User logics and all Versatile Bus Interface Logics as comprise the Versatile Bus system for the duration of the initialization operation. The signal (H) IDENTIFY SLAVE (φ1-φ1) is raised during the initialization operation to a logical High condition from one φ1 to φ1 period to one Versatile Bus Interface Logics at a time, causing such logics to drive a single cycle of the BUSY signal upon the Versatile Bus. Such other Versatile Bus Interface Logics as connectedly receive upon the Versatile Bus such single cycle of the BUSY signal will, in the continuing presence of the logical High condition of signal (H) INIT (φ1-φ1), continuously drive the BUSY signal upon the Versatile Bus. The signal (H) CONFIG STORED (φ1-φ1) is rotated during the initialization operation in a logically High condition from one φ1 to φ1 period to each of such "other" Versatile Bus Interface Logics as are continuously driving the BUSY signal upon the Versatile Bus (responsively to having see the BUSY signal during the duration of the logically High condition of signal (H) INIT (φ1-φ1)). The logical High φ1 to φ1 occurrence of signal (H) CONFIG STORED (φ1-φ1) will cause each receiving Versatile Bus Interface Logics, rotationally in turn, to cease to continuously drive the BUSY signal upon the Versatile Bus. These four signals from the VM Node/maintenance processor to the Versatile Bus Interface Logics are concerned with initialization and configuration of the Versatile Bus Interface Logics. Also concerned with initialization is the signal (H) BUS BUSY from the Versatile Bus Interface Logics to the VM Node/maintenance processor. This signal (H) BUS BUSY is a logical High for those cycles wherein the Versatile Bus Interface Logics see a BUSY signal upon the Versatile Bus. The coordinated utilization of these signals plus scan/set test signals for initialization will be explained in next subsection 7.2.

Remaining signals direct from the Versatile Bus Interface Logics to the VM Node/maintenance processor within the table of FIG. 53—signals (H) PARITY FAULT, (H) V BUS FAULT, (H) DOUBLE FAULT, and (H) FAULT—are involved in the error detection capability of the Versatile Bus. The logically High condition of signal (H) V BUS FAULT indicates the occurrence of either a stuck high, stuck low, or line to line short fault condition upon the Versatile Bus as was detected at a DRIVER/RECEIVER element (to be discussed in conjunction with FIG. 82). Signal (H) FAULT is a logical High if such detection was the first occurring upon the Versatile Bus, whereas signal (H) DOUBLE FAULT is a logical High if the Bus is already in the ripple shifted error compensation configuration. The logically High condition of signal (H) PARITY FAULT indicates the occurrence of a parity error upon the Versatile Bus, such is normally associated with an open line.

Remaining signals within the table of FIG. 53 are related to the scan/set test capability of the Versatile Bus Interface Logics as is implemented through the VN Node/maintenance processor. Although the six scan/set loops as are particularly implemented within the preferred embodiment of the Versatile Bus Interface Logics are for verification of the operational integrity and validity thereof, and also routine inspection and maintenance, these loops also serve additional vital purposes. Within the initialization operation, the ability to set data patterns within scan/set testing of the Versatile Bus Interface Logics will firstly be utilized to set a Versatile Bus system unique slave identification code within a situs called the CAM register of each Versatile Bus Interface Logics. Another, longer, scan/set loop is similarly employed during initialization as the means by which the twenty-seven bit configuration register within each Versatile Bus Interface Logics is stored with the configuration parameterizations of the Versatile Bus. In implementation of the single error compensation/double error detection capability of the Versatile Bus, the scan capability implemented through the VM Node/Maintenance Processor is the means by which the bit sensitivity of line sensitive error faults occurring on the Versatile Bus may be extracted from fault reporting Versatile Bus Interface Logics (via fault flip-flops as will be discussed during the explanation of the DRIVER/RECEIVER logical elements in conjunction with FIG. 82). When such fault conditions are extracted from Versatile Bus Interface Logics via a scan loop, the maintenance processor will formulate a ripple shifted error compensation pattern in response to such a fault, and under the set mechanism of scan/set test insert an error compensation pattern within the DRIVER/RECEIVER logical elements of all interconnected Versatile Bus Interface Logics. Therefore the scan/set test mechanism is a basic method of data communication to and from the Versatile Bus Interface Logics. It is, additionally, a maintenance processor means of communication to the User. This is why all scan/set control and data signals as are contained within the table of FIG. 53 are indicated to be common between the User device and the Versatile Bus Interface Logics. The same signals (H) SEL LOOP A through (H) SEL LOOP F as select scan/set loops within the Versatile Bus Interface Logics may be extended to select corresponding scan/set test loops within the User logics. Indeed, it is logical that the scan/set loop selection should be transmitted from the maintenance processor to each Versatile Bus interconnected device as an encoded selection code, such as would be utilized within multiplexors of the User to gate the appropriate scan/set data loop, whether such scan/set loop actually resides within the User logics or the Versatile Bus Interface Logics.

Continuing in explanation of the scan/set test signals within the table of FIG. 53, the signal (L) SCAN/SET ENABLE will cause, when logically Low, a scan/set operation. Upon such occurrence loops A through F, as are respectively selected by a logical High condition of one of signals (H) SEL LOOP A through (H) SEL LOOP F, will circularly cyclically shift data within such selected loop. The clock phase, clock φ1 or clock φ2, at which the various scan/set loops will shift will be further referenced in the detailed discussion of such loops. The signal (L) SCAN/SET SELECT (L=SET)

will, when logically Low, cause the set capability of the scan/set operation. The logical High condition of this signal selects the scan capability of the scan/set test operation. In both cases, that scan/set loop as is respectively selected by a logical High on signals (H) SEL LOOP A through (H) SEL LOOP F, will circularly shift the loop contained data. Upon clock shift a logical High on the signal (H) SET DATA during selection of the set capability will cause, in each sequential clock cycle, each sequentially shifted position of the selected scan/set loop to become set to a logical "1" condition. Alternatively, if a set operation is in progress then each clocked occurrence of a logical Low for signal (H) SET DATA will cause a logical "0" to be stored in the associated sequentially shifted bit position of the scan/set loop. The scan/set test loop output signals (H) LOOP A SCAN DATA through (H) LOOP F SCAN DATA represent, when logically High, the scan of a "1" data bit from the associated scan/set test looo. The signal (L) SCAN/SET ENABLE must be in the logically Low condition to enable either the scan or the set capabilities of the scan/set operation.

7.2. Versatile Bus Interface Logics to VM Node/-Maintenance Processor Interface for Initialization of a Versatile Bus System The Versatile Bus Interface Logics has an interface with the VM Node/maintenance processor for the purposes of initializing the Versatile Bus system. This initialization has as a first purpose that all devices should be controlled in an orderly and coherent manner upon power on so that system operations may be initiated in the controlled manner. This initialization interface has as a second purpose that each Versatile Bus Interface Logics upon a Versatile Bus network should assume, at least initially in system operation, a system unique slave identification code. Such code, e.g., from 1 to 256, initially enables the unique slave addressing of each Versatile Bus interconnected device. It is a third function of initialization that each Versatile Bus interconnected Versatile Bus Interface Logics should selectably controllably be configured in all parameters as demark the operational configuration of the Versatile Bus. It is a fourth and final goal of initialization that each interconnected VLSI circuit User logics device should be apprised of the nature (type) and slave identification (address) of all other Versatile Bus network devices with which it can communicate. It should be noted that all initialization purposes other than the first, such as basically resides in the signal (H) CLEAR, could be dispensed with. A unique system-wide slave identification could be metalized within the Versatile Bus Interface Logics of each interconnected device, or could be impressed upon each device by pins. The configuration of each interconnected Versatile Bus Interface Logics could be hardwired in the configuration register. Finally, it could be demanded that each interconnected VLSI circuit User logics be a priori cognizant of all device types and devices addresses with which it will communicate within any Versatile Bus network system. The purposes of the present initialization regimen, however, besuit the universal employment of Versatile Bus Interface Logics interconnected User devices in multitudinous Versatile Bus networks and systems such as arise in service of multitudinous purposes. Conceptually, each Versatile Bus interconnected device will be identically manufactured for the utilization of such device within multitudinous Versatile Bus networks for multitudinous purposes, yet each will garner complete knowledgeability during the initialization process of where it resides, within what network it is able to communicate, and under which configuration communication will transpire. In the teaching of the present specification this knowledgeability, although exhaustive, is obtained at the considerable expense of the employment of a maintenance processor. Inventors of the current apparatus and scheme of a Versatile interconnection bus assert, however, that such knowledgeability is obtainable via a logical structure residing within the VM Nodes of all interconnected devices. Such a logical structure is not the subject of the current specification.

Momentarily referring to FIG. 4, the present specification instead teaches a maintenance processor to perform the four initialization purposes. Upon power on, the maintenance processor collectively distributes the signal (H) CLEAR in the logical High state from $\phi$1 to $\phi$1 to all interconnected VLSI circuit User logics and to each Versatile Bus Interface Logics connected with each User device (thereby to all interconnected Versatile Bus Interface Logics). The logical High $\phi$1 to $\phi$1 transmission of the signal (H) CLEAR will clear all registers within the Versatile Bus Interface Logics, including the configuration register. In such all zero status, the configuration register establishes a 00000000 configuration Versatile Bus, or an invalid configuration. It would be possible to build Versatile Bus Interface Logics wherrein some nominal valid configuration is assumed by the configuration upon the power on clear signal although such configuration register would remain alterable. Such nominal initialization circuitry is not taught in the preferred embodiment of the present invention, which utilizes the VM Node/Maintenance Processor for initialization of configuration.

The maintenance processor initially simultaneously distributes the logically High condition of the signal (H) INIT ($\phi$1-$\phi$1) commencing at the leading edge of clock cycle $\phi$1 to all interconnected User and Versatile Bus Interface Logics. The User devices see this signal as the converse of a run enablement, therefore the logically High condition of signal (H) INIT ($\phi$1-$\phi$1) will prevent any User from making a request of its Versatile Bus Interface Logics. No User has control of the Versatile Bus, no User will drive BUSY upon the Versatile Bus, and no Versatile Bus Interface Logics has any request pending in this quiescent cleared state. The signal (H) INIT ($\phi$1-$\phi$1) will be held in the logical High condition until the absolute completion of the initialization operations, upon which time it will be cleared to the logically Low level upon the leading edge of clock $\phi$1.

The maintenance processor next sequentially accesses each of the Versatile Bus Interface Logics to which it is connected for the purpose of emplacing a system unique slave identification code within each Versatile Bus Interface Logics via the set mechanism of scan/set test. The Versatile Bus Interface Logics sites of reception of such a slave identification code, the CAM registers A through D, are part of the contiguous scan/set test loop A. The maintenance processor simply emplaces the signal (L) SCAN/SET ENABLE to the logically Low condition, the signal (L) SCAN/SET SELECT (L=SET) to the logically Low level, the signal (H) SEL LOOP A to the logically High level, and transmits, at each clock $\phi$1 as besuits this scan/set loop A, the signal (H) SET DATA in the logically High condition as besuits each bit position in the scan/set data string in which it is desired to insert a logical "1". Each of up to four, eight bit slave identifications contained in the three CAM registers within the Versatile Bus Interface Logics, plus the eight bit mask register, may be set via this scan/set mechanism utilized for setting within scan/set test loop A. Normally, however, each interconnected Versatile Bus Interface Logics will be assigned but a single, Versatile Bus system unique, eight bit slave idenification code which will be lodged in register CAM A.

The maintenance processor next chooses one single device out of the large number to which it is connected to be the root node Versatile Bus Interface Logics and associated User device. Such first chosen device would normally be the device immediately previously assigned a slave identification "1", and that device which is connected to the least significant port of the maintenance processor. The maintenance processor raises the signal (H) IDENTIFY SLAVES ($\phi$1-$\phi$1) to this device to the logical High condition from $\phi$1 to $\phi$1, a duration of 40 nanoseconds. This occurrence causes the Versatile Bus Interface Logics to go onto the Versatile Bus with the logical true condition of the BUSY signal once only during the clock $\phi$2 which occurs during the duration of signal (H) IDENTIFY SLAVES. In the continuing presence of the logical High condition of signal (H) INIT ($\phi$1-$\phi$1) as is supplied to all Versatile Bus Interface Logics, such Versatile Bus Interface Logics as see the currently transmitted logically true condition of BUSY upon the Versatile Bus will drive signal (H) BUS BUSY, as is transmitted to the VM Node/maintenance processor, to the logical High condition and will, additionally, commence themselves to continuously drive the logical true condition of BUSY upon the Versatile Bus. Thus the single occurrence of the logical High condition of signal (H) IDENTIFY SLAVES ($\phi$1-$\phi$1) has caused an initial, root node, one of the interconnected Versatile Bus Interface Logics to raise a single BUSY signal upon the Versatile Bus, and subsequently all interconnected Versatile Bus Interface Logics as do see this signal will additionally continuously parrot it upon the Versatile Bus plus inform the VM Node/maintenance processor via the signal (H) BUS BUSY of their recognition of the initial and continuing BUSY transmission upon the Versatile Bus.

The maintenance processor next extracts the chip type identification, such as may be metalized upon the User logics substrate, via a scan loop to the User logics device. User logics not supporting a scan of any such unique device identification may simply deliver a null identification in response to the maintenance processor request to obtain such. The length, content, and nature of such a device identification is a system convention purely between the maintenance processor and the User logics, such convention as is not of concern to the current Versatile Bus Interface Logics to VM Node/maintenance processor interface. The maintenance processor may additionally extract, via the scan test capability exercised for test loop A, that slave identification code just emplaced within the designated root node Versatile Bus Interface Logics device if such maintenance processor does not already have remembrance of such. From the combination of the chip-type identification as was extracted from the User logics, and the potential extraction of the recently instilled slave identification code from the Versatile Bus Interface Logics, the maintenance processor will formulate a bit string which is a unique message identification of the current designated User device chip-type and its unique system-wide slave identity. The maintenance processor will next, conditional only to such User logics as are associated with Versatile Bus Interface Logics as are returning the signal (H) BUS BUSY in the logical High condition, set this chip-type and system level slave identification message via the set test mechanism into an appropriate register (selectable by scan/set loop select control) within each such individually associated User logics (such as are capable of accepting such a message). The maintenance processor concludes each directed distribution of the chip identification and system slave identification message as is being supplied via the set test mechanism to each interconnected User logics with the logical High transmission of the signal (H) CONFIG STORED ($\phi$1-$\phi$1) during one $\phi$1 to $\phi$1 period to both that User device which just received the message and to is associated Versatile Bus Interface Logics. Upon receipt of this signal (H) CONFIG STORED ($\phi$1-$\phi$1) in the logically High condition each respective Versatile Bus Interface Logics will cease to drive the BUSY line upon the Versatile Bus. Since the original designated root node, Versatile Bus Interface Logics had initially driven such BUSY signal only during the single second $\phi$2 which occurs during the duration of signal (H) IDENTIFY SLAVES to the stimulus of the logical High condition of signal (H) IDENTIFY SLAVES ($\phi$1-$\phi$1), ultimately the complete rotation of the signal (H) CONFIG STORED ($\phi$1-$\phi$1) to all Versatile Bus Interface Logics will result in no such Versatile Bus Interface Logics driving the BUSY signal upon the Versatile Bus.

A manner by which the individual chip identifications and system-wide slave identification code assignments may be sequentially suppplied to each interconnected User logics device is similar to the previous registration of the slave identities associated with a designated root node device. The maintenance processor steps amongst the sequentially ported Versatile Bus Interface Logics to which it is connected and raise the logical High condition of signal (H) IDENTIFY SLAVES ($\phi$1-$\phi$1) to each device for 40 nanoseconds. Each selected Versatile Bus Interface Logics will now be the one to go upon the Versatile Bus with the BUSY signal during the $\phi$2 which occurs during the duration of the signal (H) IDENTIFY SLAVES, such BUSY signal as will be recognized and parroted back upon the Versatile Bus by all devices interfacing to this initially driving device. For each of said devices as report their recognition of this system interconnection back to the maintenance procesor via the signal (H) BUS BUSY, the maintenance processor will dispense, in rotation, the subsequently assembled chip type and system slave identification code message to the User logics associated with each such reporting Versatile Bus Interface Logics. After each distribution of the chip and system slave identification message, via the set test mechanism, to each User logics then the Versatile Bus Interface Logics associated with such User logics will be disabled for continuing to drive the BUSY signal via the logical High transmission of signal (H) CONFIG STORED ($\phi$1-$\phi$1) to such Versatile Bus Interface Logics. As each Versatile Bus Interface Logics such as interfaces to the maintenance processor is, in rotational turn, established as an identifying node Versatile Bus Interface Logics then not all other Versatile Bus Interface Logics may, via the Versatile Bus BUSY signal, invariably recognizes an interface thereto. Such Versatile Bus Interface Logics as do not report, via the logical High occurrence of signal (H) BUS BUSY, a recognition of a Versatile Bus interface connection to the identifying Versatile Bus Interface Logics will, at the situs of their associated User logics, receive no chip identification and system slave identification message. When the maintenance processor concludes rotationally stepping through each Versatile Bus Interface Logics to which it is, by consecutive parts connected for (1) the purpose of causing such Versatile Bus Interface Logics to identify itself upon the Versatile Bus with a true drive of the BUSY signal, and (2) subsequently supplying the User logics of each Versatile Bus Interface Logics such as recognize a connection to such identifying logics with the chip identification and system slave identification, then each and every User logics within the system will be fully apprised of the chip types and slave identification codes of all other system User devices to which they interconnect. Of course, some system User logics may have been incapable of absorbing such information, incapable of utilizing it, indifferent to it, and/or without need for it. Nonetheless, each Versatile Bus interconnected User device will be fully apprised via Maintenance Processor messages of the chip type and slave address identification codes of all other devices with which it communicates upon the Versatile Bus.

As the final initialization task, the maintenance processor will set the configuration of the Versatile Bus network through the set test implemented load of a configuration register site within all Versatile Bus interconnected Versatile Bus Interface Logics. The configuration register within each Versatile Bus Interface Logics comprises, in both master register and slave register parts, the (2 times 28) equals 56 most significant bits of scan/set test loop D. The meaning of configuration register bits 0 through 23 is contained within the table of FIG. 3. Configuration register bit 24 is the ripple enable bit, such as is normally cleared and set only upon the occurrence of a ripple shifted error compensation condition. Configuration register bit 25 is denominated master only, and is set for the master device of two only which are, as a minimally small system, jointly communicative via a Versatile Bus. Bits 26 and 27 of the configuration register are spare bits. The maintenance processor effectuates the impressing of a pertinent bit pattern upon the configuration register within each Versatile Bus Interface Logics by respectively emplacing a logical Low on signal (L) SCAN/SET ENABLE, a logical Low on signal (L) SCAN/SET SELECT (L=SET), a logical High on signal (H) SEL LOOP D, and an appropriate logical High or Low level of signal (H) SET DATA as a respective logical "1" or "0" is desired to be set within each bit position of Loop D as gated by clock $\phi$2.

At the conclusion of initialization the maintenance processor has thusly cleared all pending Versatile Bus system activities, has instilled a unique slave identification code within each Versatile Bus Interface Logics, has informed each User Logics of the totality of User device types and associated slave identification codes of all User devices with which it communicates across the Versatile Bus, and has finally instilled a configuration of the Versatile Bus within each Versatile Bus Interface Logics. At the conclusion of all this activity, which may be quite time consuming, the maintenance processor will lower the signal (H) INIT ($\phi$1-$\phi$1) to the logical Low condition, permitting such master User devices as may desire to commence activity upon the Versatile Bus to commence to do so.

8. VLSIC Standard Cells from Which the Versatile Bus is Built

The Versatile Bus Interface Logics are built from twenty-six standard logical elements implemented in complementary metal oxide semiconductor (CMOS) very large scale integrated circuit (VLSIC) technology. The detailed logical schematics and truth tables, where appropriate, for the twenty-six standard cells are given in the following sub-sections in order that there may be no ambiguity as to the logical functions performed. During the course of explanation it may be noted that each logical cell is represented by one or more logical symbols which are unique from the logical symbols of all other cells. For certain of the logical cells this representational uniqueness is obtained through the designation of the associated input and output signals, as well as the logical symbol. When these logical cells are later utilized in the logical diagrams of the Versatile Bus Interface Logics they will be so uniquely identified by their representation, regardless of whether further individual nomenclature designation is supplied. Similarly, the pin numbers assigned to the standard logical elements within this section are purely nominal and augment the explanation of logical function within this section. Such pin numbers are not further shown when the standard logical elements are employed to implement the logics of the preferred embodiment of the invention.

8.1. AND-OR-INVERT 2-1 Logical Element

Two equivalent logical representations of the AND-OR-INVERT with 2+1 inputs, or AOI 2-1, logical element are shown in FIGS. 54*a* and 54*b*. The schematic of this AOI 2-1 logical element is shown in FIG. 54*d*. The P and N designations within the transistors of this figure indicate the associated P-type and N-type transistor implementations in CMOS VLSIC. The truth table for the logical function implemented by the AOI 2-1 logical element is shown in FIG. 54*d*. In this and following truth tables, a L represents a logical Low signal level of 0 volts d.c., a H represents a logical High signal level of +3 volts d.c., and and X represents a signal which may be either logically High or Low.

8.2. AND-OR-INVERT 2-2 Logical Element

Two equivalent logical representations of the AND-OR-INVERT with 2+2 inputs, or AOI 2-2, logical elements are shown in FIGS. 55*a* and 55*b*. The schematic for this AOI 2-2 logical element is shown in FIG. 55*c*. A logical function performed by this AOI 2-2 logical element is represented in the truth table of FIG. 55*d*.

8.3 AND-OR-INVERT 2-1-1 Logical Element

Two equivalent logical representations of the AND-OR-INVERT with 2+1+1 inputs, or AOI 2-1-1, logical element are shown in FIGS. 56*a* and 56*b*. The schematic of the AOI 2-1-1 logical element is shown in FIG. 56*c*. The truth table for the logical function performed by the AOI 2-1-1 logical element is shown in FIG. 56*d*.

8.4. AND-OR-INVERT 2-2-2 Logical Element

Two equivalent logical representations of the AND-OR-INVERT with 2+2+2 inputs, or AOI 2-2-2, logical element are shown in FIGS. 57*a* and 57*b*. The schematic for the AOI 2-2-2 logical element is shown in FIG. 57*d*. The truth table for the logical function performed by the AOI 2-2-2 logical element is shown in FIG. 57*c*.

8.5. INVERTOR Logical Element

Two equivalent logical representations of the INVERTOR, or IN1, logical element is shown in FIGS. 58*a* and 58*b*. The schematic for the IN1 logical element is shown in FIG. 58*c*. The truth table for the logical function performed by the IN1 logical element is shown in FIG. 58*d*.

8.6. NEGATIVE AND-2 Input Logical Element

Two equivalent logical representations of the NEGATIVE AND-2 input or NAND-2 input, or NA2 logical element is shown in FIGS. 59*a* and 59*b*. The logical schematic for the NA2 logical element is shown in FIG. 59*c*. The truth table for the logical function performed by the NA2 logical element is shown in FIG. 59*d*.

8.7. NEGATIVE OR-2 Input Logical Element

Two equivalent logical representations of the NEGATIVE OR-2 input, or NOR-2 input, or NO2 logical element are shown in FIGS. 60*a* and 60*b*. The schematic for the NO2 logical element is shown in FIG. 60*c*. The truth table for the logical function performed by the NO2 logical element is shown in FIG. 60*d*.

8.8. NEGATIVE AND-3 Input Logical Element

Two equivalent logical representations of the NEGATIVE AND-3 input, or NAND-3 input, or NA3 logical element are shown in FIGS. 61*a* and 61*b*. The schematic for the NA3 logical element is shown in FIG. 61*d*. The truth table for the logical function performed by the NA3 logical element is shown in FIG. 61*c*.

8.9 NEGATIVE OR-3 Input Logical Element

Two equivalent representations of the NEGATIVE OR-3 input, or NOR-3 input, or NO3 logical element are shown in FIGS. 62*a* and 62*b*. The schematic for the NO3 logical element is shown in FIG. 62*d*. The truth table for the logical function performed by the NO3 logical element is shown in FIG. 62*c*.

8.10. NEGATIVE AND-4 Input Logical Element

Two equivalent logical representations of the NEGATIVE AND-4 input, or NAND-4 input, or NA4 logical element are shown in FIGS. 63*a* and 63*b*. The schematic for the NA4 logical element is shown in FIG. 63*c*. The truth table for the logical function performed by the NA4 logical element is shown in FIG. 63*d*.

8.11. NEGATIVE OR-4 Input Logical Element

Two equivalent logical representations of the NEGATIVE OR-4 input, or NOR-4 input, or NO4 logical element are shown in FIGS. 64*a* and 64*b*. The schematic for the NO4 logical element is shown in FIG. 64*c*. The truth table for the logical function performed by the NO4 logical element is shown in FIG. 64*d*.

8.12. NEGATIVE AND-8 Input Logical Element

Two equivalent logical representations of the NEGATIVE AND-8 input, or NAND-8 input, or NA8, logical element are shown in FIGS. 65*a* and 65*b*. The schematic for the NA8 logical element is shown in FIG. 65*c*. The N-type and P-type transistors are in correspondence to the schematic of the NO4 logical element shown in FIG. 64*c*. The truth table for the logical function performed by the NA8 logical element is shown in FIG. 65*d*.

8.13. SELECTOR-SINGLE 1 OF 2 Logical Element

A SELECTOR-SINGLE 1 OF 2, or S12, logical element is shown in FIG. 66*a*. The select, or S, control signal input on pin 4 determines whether the data zero, D0, signal input on pin 3 or the data one, D1, signal input on pin 2 will be routed to the selected data, SD, signal output on pin 1. The transfer table for the S12 logical element is shown in FIG. 66*c*.

The logical structure of the S12 logical element, as implemented with dual transistor pair Complementary Metal Oxide Semiconductor (CMOS) logical structures called transfer gates is shown in FIG. 66*b*. Both the square block 6602 labeled T and the square block 6604 labeled $\overline{T}$ are identical transfer gates. Both the semiconductor makeup of the transfer gate, a relatively new CMOS logical structure, and that convention which can cause two identical transfer gates to be differentially labeled as T and $\overline{T}$ will be discussed in the next subsequent section 8.14. That convention, when next discussed, makes the logical function of a transfer gate within a circuit such as the S12 logical element shown in FIG. 66*b* very easy to describe. The transfer gate receives two gating signals as are represented to the left and to the right of the boxes labeled either T or $\overline{T}$. For example, signal L=T net 6601 is to the left and signal H=T net 6603 is to the right of transfer gate T 6602 in FIG. 66*b*. If the transfer gate is labeled T, as is transfer gate 6602 in FIG. 66*b*, the indicated levels of the left and right gating signals will cause the transfer gate to transfer the upper, input, signal (identified as signal D0 on net 6605 for transfer gate 6602) to the lower, output, port (identified as signal SD on net 6607 for transfer gate 6602). If the left and right gating signals are of reverse polarities to those identified as enabling transfer (a High on net 6601 and a low on net 6603) then the transfer gate T 6602 will output naught but a high impedance.

The logical function of a transfer gate labeled $\overline{T}$, for example transfer gate 6604 in FIG. 66*b*, is exactly the opposite relative to the indicated levels of the left and right transfer gating signals. When the signal on net 6603 is a logical High and the signal on net 6601 is a logical Low then transfer gate 6604 will present only a high impedance to output net 6607. When the gating signal polarities are the reverse of those indicated, that is a logical High signal on net 6601 and a logical Low signal on net 6603, then connected transfer gate $\overline{T}$, 6604, will transfer its input signal, signal D1 on net 6609, to the output port as signal SD on net 6607.

Thus, the logical transfer function of transfer gates labeled T and $\overline{T}$ is very easy to understand relative to the gating signals applied. If the gating signals are of the levels indicated within the signal name then a connected transfer gate labeled T will transfer while a connected transfer gate labeled $\overline{T}$ will not. If the applied gating signals are at the inverse, or complementary, logical level to the ascribed within the signal names then they will cause any connected transfer gate labeled $\overline{T}$ to transfer while a connected transfer gate labeled T will not transfer. When a transfer gate does transfer it directly transfers an input signal, whether a logically High or a Low signal, to an output port. When a transfer gate does not transfer it presents only a high impedance on such output port. When such a high impedance is logically wire OR'ed with any other signal net it will not effect either the logically High or the logically Low level signal as may be carried on such other signal net. When this logical function is kept in mind, the performance of the S12 logical circuit as shown in FIG. 66*b* to produce the transfer function as shown in the table of FIG. 66*c* becomes obvious.

8.14. The CMOS Transfer Gate

The transfer gate as shown in FIG. 67*a*, and as implemented in dual transistor Complementary Metal Oxide Semiconductor structure in either of the variants as shown in FIGS. 67*b* and 67*c*, is not, in itself, a standard logical cell utilized in the implementation of the invention. It is instead a mere building block constituent logical structural component with which some Versatile Bus standard cells, such as may be implemented with alternative structures and technologies, will be implemented. For the sake of completeness the physical nature of this device will be reviewed.

The transfer gate is a four port logical structure and is represented as shown in FIG. 67*a* save that only T or $\overline{T}$ will appear within the box. The reason that this simple FIG. 67*a* is not once replicated for T and once for $\overline{T}$ is to disabuse the reader of any notion that one such labeling should correspond to the physical variant shown in FIG. 67*b* while the alternative labeling corresponds to the variant shown in FIG. 67*c*. An individual transfer gate labeled or T or $\overline{T}$ may be either of the two physical structures as are shown in FIGS. 67*b* and 67*c*. Exact knowledge of which physical structure—that of FIG. 67*c* producing the transfer table shown in FIG. 67*d* or that of FIG. 67*c* producing the different transfer table as shown in FIG. 67*e*—is represented by an individual box labeled either T or $\overline{T}$ as in FIG. 67*a* is obtainable only from reference to the signals of the larger logical structure in which the T or $\overline{T}$ labeled transfer gate is lodged. This convention which makes it so that a transfer gate labeled T should sometimes be identical to a transfer gate labeled $\overline{T}$, the convention for labeling of transfer gates, is very different from the normal convention of absolutely identifying logical elements only from their labels and is consequently a very difficult convention if not clearly understood. The convention is this: a transfer gate assumes a unique identify as a CMOS logical structure only with reference to the circuit signals by which it is gated. These signals are shown to the left and to the right of the transfer gate, for example signal L=T net 6601 to the left and signal H=T net 6603 to the right of transfer gate T 6602 in FIG. 66*b*.

Once it is determined from circuit context whether a transfer gate is gated by a logically High left signal input and a logically Low right signal input, or vice versa, then, and only then, it is possible to unambiguously known which one of the physical structures as shown in FIGS. 67*b* and 67*c* is being referenced. By reference to the associated transfer table of FIG. 67*d* it may be noted that the structure within FIG. 67*b* is that which will transfer for a logically High left signal input and a logically Low right signal input. Therefore any transfer gate labeled T which is left gated by a signal labeled "H" (as in H=T, H=A, H=A, etc.) and which is right gated by a signal labeled "L" will be the structure shown in FIG. 67*b*. Therefore any transfer gated labeled T which is left gated by a signal labeled "L" (as in L=T, L=A, L=$\overline{A}$, etc.) and which is right gated by a signal labeled "H" will also be the structure shown in FIG. 67*b*.

Conversely, the structure of FIG. 67*c*, such as performs the transfer table of FIG. 67*e*, will transfer for the opposite conditions—a logically Low left signal input and a logically High right signal input. Therefore any transfer gate labeled T which is left gated by a signal labeled "L" and which is right gated by a signal labeled "H" will be the structure shown in FIG. 67*c*. Therefore any transfer gate labeled $\overline{T}$ which is left gated by a signal labeled "H" and which is right gated by a signal labeled "H" and which is right gated by a signal labeled "L" will also be the structure shown in FIG. 67*c*.

A transfer gate as implemented in CMOS logic with a positive supply voltage is merely the back-to-back, common source and common drain, P-type and N-type transistors as are schematically illustrated in FIGS. 67*b* and 67*c*. Within both structures the signal to be transferred is input on a single top input port, pin 1, and controllably gated to a bottom port labeled pin 4. Considering first the left side P-type transistor and right side N-type transistor logical structure shown in FIG. 67*c* which performs the transfer function shown in the table of FIG. 67*e*, it may be noted that signal transfer from the input port pin 1 to the output port pin 4 will occur for a Low signal input on left side pin 2 and a High signal input on right side pin 3. This is because a Low on pin 2 will enable the P-type transistor to conduct when common source pin 1 is logically Low while the High on pin 3 will enable the N-type transistor to conduct when common source pin 1 is logically High. In other words, when enabled, transfer transpires through only a single conducting one of the paired transistors. Conversely, when left side pin 2 is a logical High neither a logically Low nor a logically High signal on common source pin 1 may be conducted by the P-type transistor to drain output port pin 4. And when right side pin 3 is simultaneously a logical Low neither a logical Low nor a logical High on source pin 1 will suffice to turn on the N-type transistor. In this case of no conduction by either the N-type or the P-type transistor, and no transfer, then the common drain pin 4 essentially presents a high impedance to any connected logics. This is abbreviated as HIGH Z in the tables of FIGS. 67*d* and 67*e*. The transfer gate variant shown in FIG. 67*b* is simply the mirror image of the circuit of FIG. 67*c*, and the effects of the left gating signal on pin 2 and the right gating signal on pin 3 are correspondingly reversed. The transfer function of the circuit variant shown in FIG. 67*b* is contained within the table of FIG. 67*d*.

Transfer gates are very size efficient and fast VLSIC logical structures, delay time being about 0.9 nanoseconds when implemented in CMOS VLSI. Transfer gates represent only one standard load, or about 0.02 picofarads in CMOS VLSIC, to driving circuits while they are normally sized in the P-type and N-type transistors to be capable of driving the 1½ standard loads on their outputs. These loading and driving characteristics of the preferred embodiment transfer gate will be exploited to advantage in some of those further logical elements which are implemented with transfer gates.

As a final example of how the actual structure of a transfer gate may be recognized, and how such structure operates within an actual circuit, momentarily reference FIG. 66*b*. Recall that transfer gates 6602 and 6604 are differentially labeled only so that it may be highlighted that transfer control signals Low implies Transfer, L=T, on net 6601 and High implies Transfer H=T, on net 6603 are utilized in an exactly opposite or complementary manner between the two transfer gates. Considering transfer gate T, 6602, a logically Low left gating signal and a logically High right gating signal will cause a transfer (T). Therefore this transfer gate must be the variant represented in FIGS. 67*c* and 67*e*. Considering transfer gate $\overline{T}$ 6604, a logically High left gating signal and a logically Low right gating signal will cause no transfer ($\overline{T}$). Of course, this is an alternative way to stating that the transfer conditions are the same as those of transfer gate T 6602. These transfer gates are the same. Transfer gate $\overline{T}$ 6604 is also represented by FIGS. 67*c* and 67*e*. The alternative variant of transfer gate structure shown in FIG. 67*b* is not utilized in this S12 logical element as shown in FIG. 66*b*. It will be utilized in later elements wherein it is immediately and unambiguously identifiable for enabling a transfer (i.e., labeled T) when the left gating signal is High and the right gating signal Low (or for not enabling a transfer (i.e., labeled $\overline{T}$) when the left gating signal is Low and the right gating signal is High).

Returning to the schematic of the S12 logical element as shown in FIG. 66*b*, each transfer gate is merely back-to-back P-type and N-type transistors. Considering the function of transfer gate T 6602, the data zero input signal D0, on pin 3 is a common source input to both the P-type and N-type transistors of transfer gate T 6602. Transfer control signal L=T on net 6601 is the gate input to the P-type transistor of transfer gate T 6602. Transfer control signal H=T on net 6603 is the gate input to the N-type transistor of transfer gate T 6602. The drain output of both N-type and P-type transistors of transfer gate T 6602 are connected in common as output signal SD on pin 1.

In considering the logical function of single transfer gate T 6602 as shown in FIG. 66*b*, it must be remembered that a left side, P-type transistor is gate connected to net 6601 while a right side, N-type transistor is gate connected to net 6603. Now is a logical Low, indicated to represent transfer in the control signal L=T, is present on net 6601 while, due to the action of inverter 6606, a logical High, indicated to also represent transfer in the control signal H=T, is present on net 6603 then the signal D0 on pin 3 will be shorted, or transferred, in transfer gate T 6602 to the signal SD on pin 1. Visualize this as the complementary transfer control signals input to the left and right of the transfer gate are controlling whether the input top signal is to be transferred to be output at the bottom of the transfer gate. When transfer in transfer gate T 6602 is enabled by a Low on net 6601 and a High on net 6603 the signal on pin 3, whether High or Low, will be transferred to pin 1. This is because, in the working of that back-to-back P-type to N-type transistor pair which is transfer gate T 6602, the Low on net 6601 will enable the P-type transistor to conduct when common source pin 3 is logically Low while the High on net 6603 will enable the N-type transistor to conduct when common source pin 3 is logically High. Enabled transfer transpires through only one of the paired transistors. Conversely when transfer is not enabled because the signal on net 6601 is High and the signal on net 6603 is Low, then neither the P-type nor the N-type transistor can ever become forward biased by a source signal on pin 3 and transfer gate T 6602 will only present a high impedance on output pin 1.

Considering this operation of a transfer gate to either transfer an input signal to an output line, or else to present only high impedance to such output line, and remembering that T and $\overline{T}$ but represent identical transfer gate structures which are oppositely controlled then it will be obvious that the select signal S on pin 4 will cause, if Low, signal D0 on pin 3 to be transferred through transfer gate T 6602 to exit as signal SD on pin 2 while the opposite select signal S when High will cause signal D1 on pin 2 to be transferred through transfer gate $\overline{T}$ 6604 to exit as signal SD on pin 1. This one of two selection is shown in the transfer table of FIG. 66*c*.

8.15. SELECTOR-Single 1 OF 4 Element

The logical representation of the selector-Single 1 of 4, or S14, logical element is shown in FIG. 68*a*. The schematic of the S14 logical element such as is implemented from inverters and transfer gates is shown in FIG. 68*c*. The transfer function performed by the S14 logical element is shown in the table of FIG. 68*b*. It may be observed that the binary code impressed on select pins S0 and S1, pins 6 and 7, serve to select amongst the four data inputs D0 through D3, pins 2 through 5, to output a selected one of four quantities as signal selected data, SD on pin 1.

8.16. 1 OF 2 SELECTOR-8 WIDE Logical Element

The logical representation of the 1 of 2 Selector-8 wide, or 1O2 logical element is shown in FIG. 69*a*. The schematic for the 1O2 logical element such as is implemented from transfer gates and inverters is shown in FIG. 69*c*. The abbreviated transfer table for the function performed by the 1O2 logical element is shown in FIG. 69*b*. It may be observed that the single select, SEL, signal selects amongst the eight A inputs A0 through A7, and the eight B inputs, B0 through B7, to output one quantity as the selected signal outputs, S0 through S8.

8.17. 1 OF 2 SELECTOR WITH TEST-8 WIDE Logical Element

The logical representation of the ONE OF TWO SELECTOR WITH TEST-8 WIDE, or 1T2 Logical Element is shown in FIG. 70*a*. The schematic for the 1T2 Logical Element such as is implemented from transfer gates and inverters is shown in FIG. 70*c*. The transfer table for the function performed by the 1T2 Logical Element is shown in FIG. 70*b*. Note that there are 8 A signal inputs, A0 through A7, and 7 B signal inputs, B1 through B8. The 8 A signal inputs, A0 through A7 are selected to be output as the selected data signals, S0 through S7, by a logical Low on control signal TEST. When control signal TEST is a logical High then input signals B1 thorugh B7 are selectively transferred to be output as signals S0 through S6. The final output signal, S7 is selected as either the loop data signal, LD, or the test data signal, TD, by respectively logical Low and logical High conditions of control signal SEL LOOP.

8.18. 1 OF 4 SELECTOR-8 WIDE Logical Element

The logical representation of the 1 of 4 Selector-8 Wide, or 1O4 logical element is shown in FIG. 71*c*. The schematic for the 1O4 logical element such as is implemented from transfer gates and inverters is shown in FIG. 71*a* and FIG. 71*b*. The transfer table for the function performed by the 1O4 logical element is shown in FIG. 71*d*. It may be observed that the least significant select signal, SEL 0, and the most significant select signal, SEL 1, operate in concert to select either the 8 A signal inputs A0 through A7, the 8 B signal inputs B0 through B7, the 8 C signal inputs C0 through C7, or the 8 D signal inputs D0 through D7 to be selectively transferred as signal outputs S0 through S8.

8.19. 1 OF 4 SELECTOR WITH TEST-8 WIDE Logical Element

The logical representation of the 1 of 4 Selector with Test-8 Wide or IT4 logical element is shown in FIG. 72*c*. The schematic for the IT4 logical element such as is implemented from transfer gates, inverters, and NAND gates is shown in FIGS. 72*a* and 72*b*. The transfer table for the function performed by the IT4 logical element is shown in FIG. 72*d*.

8.20. BINARY SHIFT MATRIX Logical Element

Figure 73B:
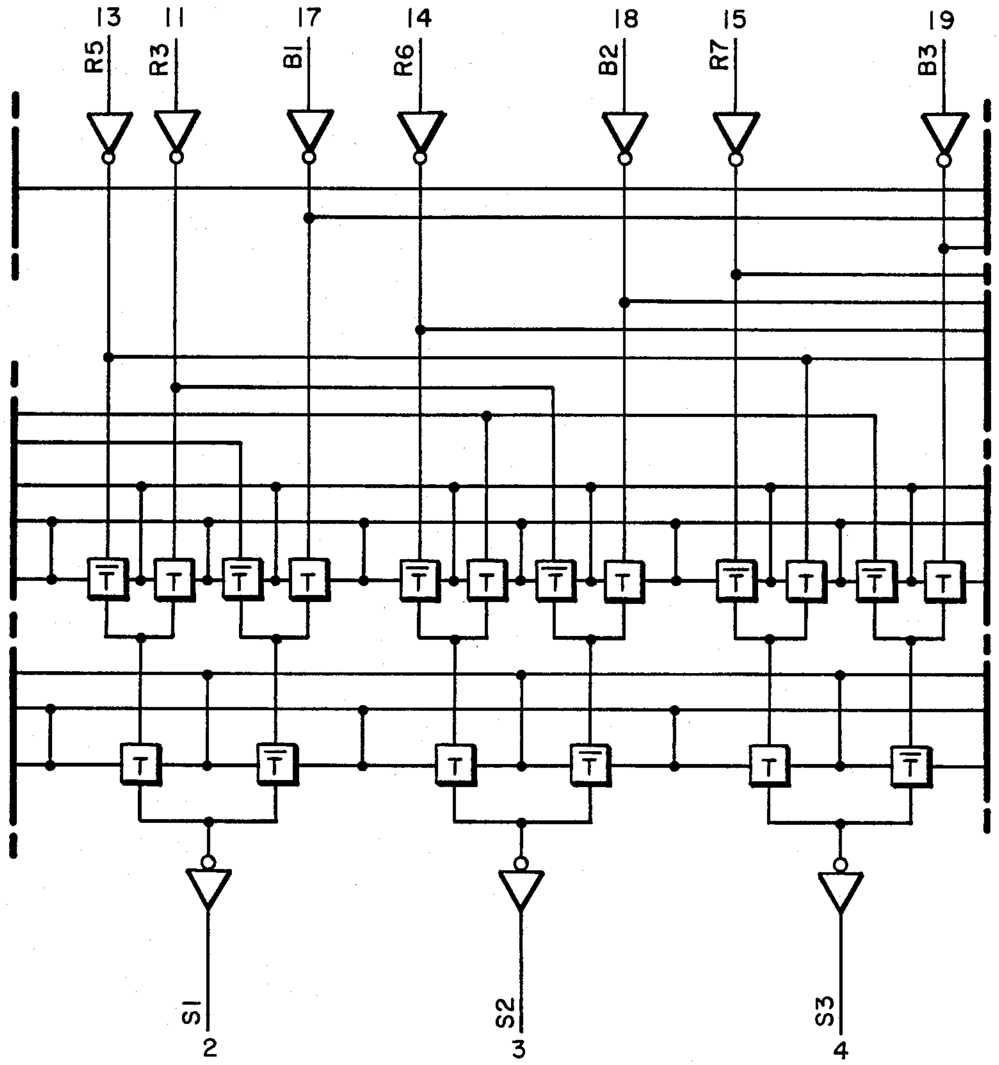
Figure 73C:
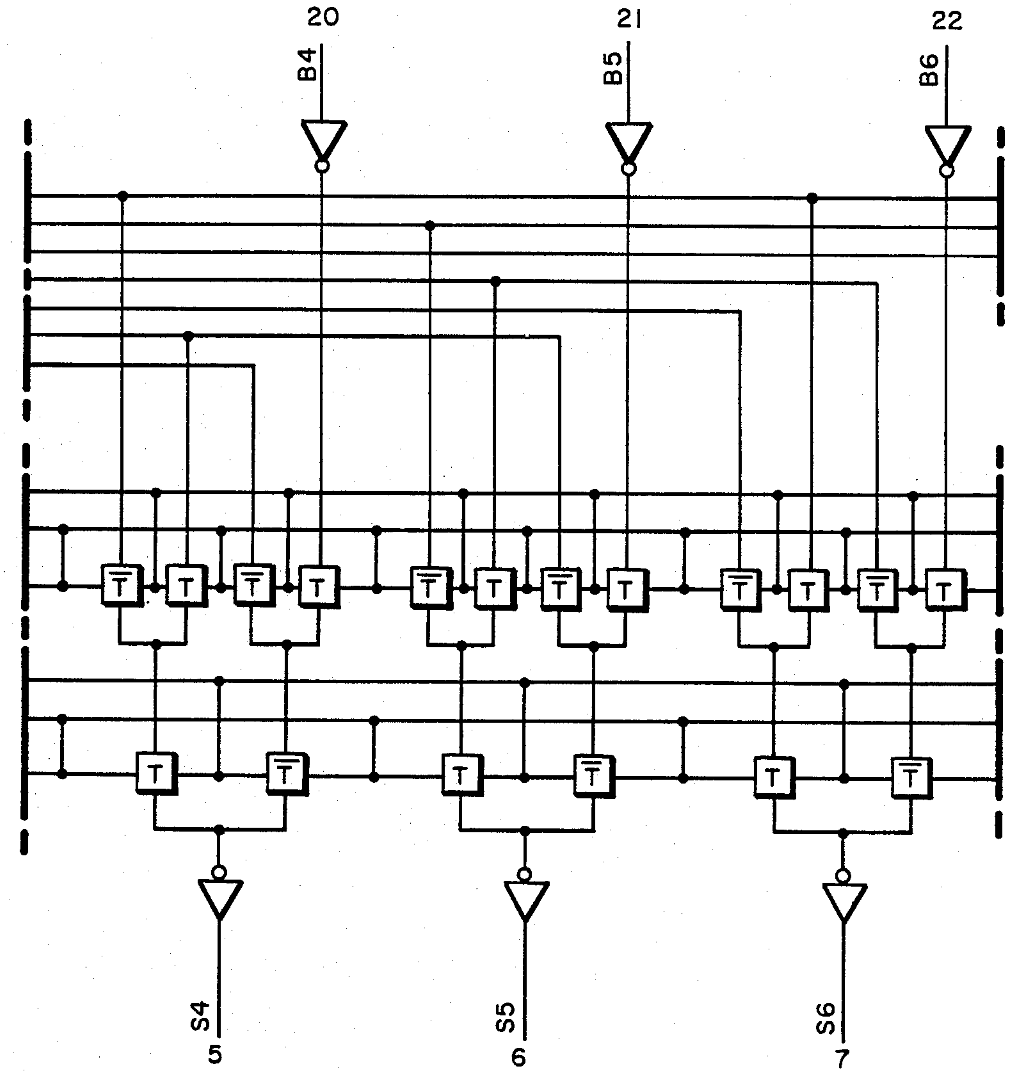
Figure 73D:
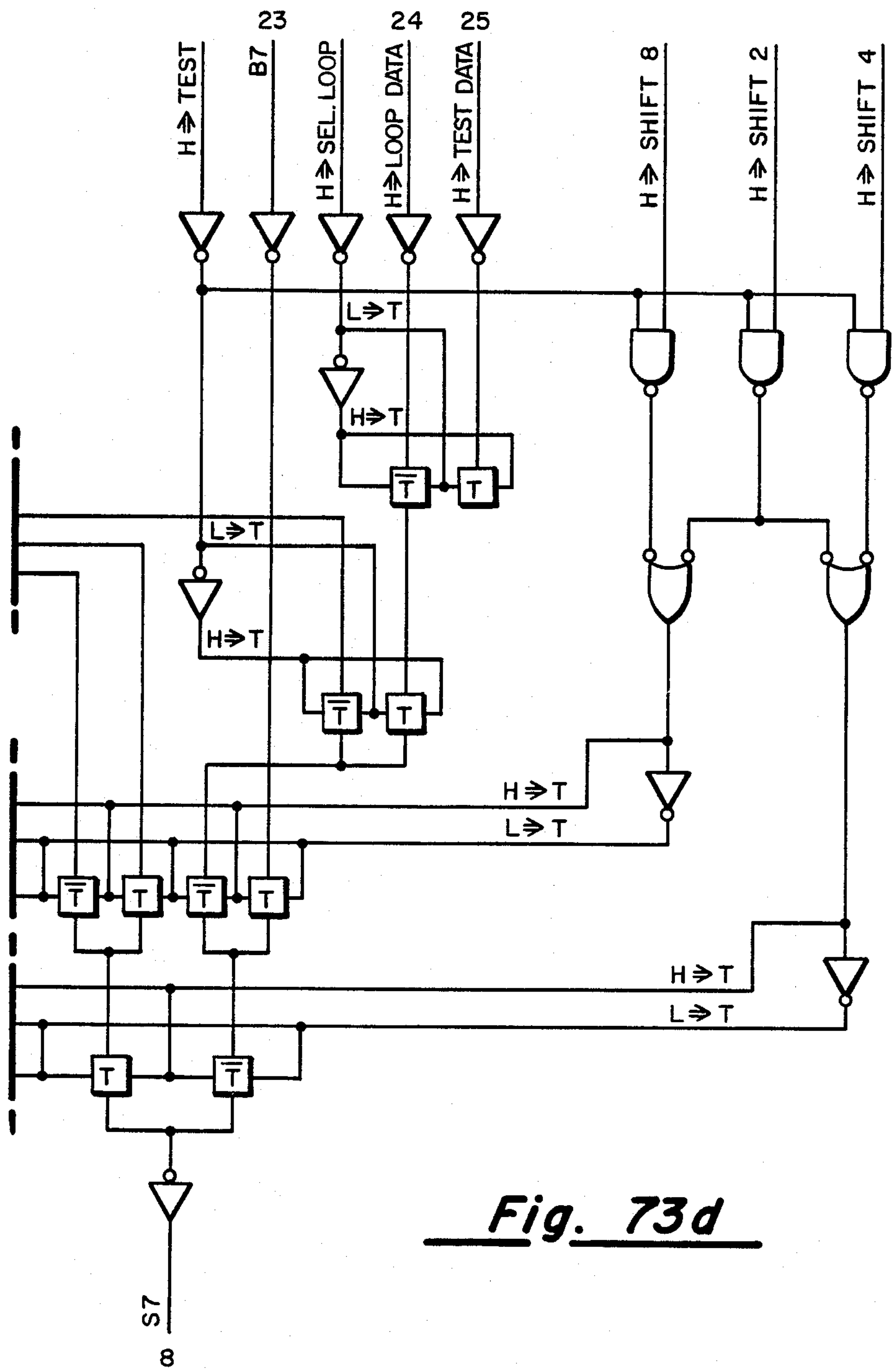

The logical representation of the BINARY SHIFT MATRIX, or BSM logical element is shown in FIG. 73*e*. The schematic for the BSM logical element such as is implemented from transfer gates, inverters, NAND gates, and NOR gates is shown in FIG. 73*d*. The transfer table for the function performed by the BSM logical element is shown in FIG. 73*f*. The BSM logical element left shifts input signals R1 through R7 and B0 through B7 either 1, 2, 4, or 8 places respectively as no shift signal is high, as shift signal SH 2 only is high, as shift signal SH 4 only is high, or as shift signal SH 8 only is high. Performance of the BSM logical element is indeterminate if more than one of the three shift signals is simultaneously high. The TEST and SEL LOOP control signals enable scan-set maintenance when this BSM logical element is incorporated within the preferred embodiment of the invention. When scan-set testing is enabled by a logical High condition of signal TEST then either signal LOOP DATA or signal TEST DATA will be respectively transferred to be output as signal S7 by the respective logical Low or the logical High condition signal SEL LOOP.

8.21. MINUS ONE SUBTRACTOR Logical Element

The logical representation of the MINUS ONE SUBTRACTOR, or SU1 logical element is shown in FIG. 74*a*. The schematic for the SU1 logical element as implemented from inverters, exclusive OR gates, a two input NOR gate, and a three input NOR gate is shown in FIG. 74*b*. The truth table for the function performed by the SU1 logical element is shown in FIG. 74*c*. The SU1 logical element operates on a four-bit binary encoded quantity as received upon most significant signal input D0 through least significant signal input D3 on pins 5 through 8 in order to develop a four-bit binary encoded quantity of value one less than the received quantity, and in order to signal such developed quantity as most significant output signal S0 through least significant output signal S3 on pins 1 through 4. The physical implementation of the exclusive OR gates within the SU1 logical element in the CMOS technology of the preferred embodiment of the invention is shown in FIG. 77, which further references the CMOS transfer gate logical element shown in FIG. 67*d*.

8.22. MASKED COMPARATOR-8 WIDE Logical Element

The logical representation of the MASKED COMPARATOR-8 WIDE, or MC8 logical element is shown in FIG. 75*a*. The schematic for the MC8 logical element as implemented from transfer gates and an 8 input NAND gate is shown in FIG. 75*c* and FIG. 75*d*. The logic driving this cell will be such that in all cases wherein both the true and false of a signal are input (e.g. H=A0 and L=A0) then these two signals will always be the inversion of each other. Each of the eight sets of two transfer gates each respectively receiving input signals A0 and B0 through A7 and B7 will produce a logically High output as the respective A and B inputs are equal. These outputs are each routed through a second tier transfer gate wherein they may be selectively substituted for under the control of masking signals M0 through M7. If the masking signals are not applied the results of the comparisons by twos will be applied to the final eight input NAND gate. Eight equal comparisons would provide eight logical High signals into this NAND gate and produce the indicated logical Low signal output indicating identical comparison between the A and B quantities. For each respective masked bit M0 through M7 such as is applied in the logical true, "1" condition, then the +3 volt logical High condition will be gated by the second tier transfer gate to the output NAND gate, thereby obviating the results of any comparison between the corresponding A and B inputs. Wherein a plus sign (+) represents the logical OR operation and a dot (.) represents the logical AND operation, the operation of the MC4 circuit may be expressed in the following equation: If [(A0=B0)+(M0="1")].[(A1=B1)+(M1="1")].[(A2=B2)+(M2="1")].[(A3=B3)+(M3="1")].[(A4=B4)+(M4="1")].[(A5=B5)+(M5="1")].[(A6=B6)+(M6="1")].[(A7=B7)+(M7="1")] then the signal output of the NAND gate will be logical Low. The additional capability of forcing a non-comparison resulting in a logical High for the output signal L=A=B is available by inputting signal FORCE≠in the logical Low condition.

8.23. HOLDING REGISTER-8 WIDE MASTER Logical Element

The logical representation of the HOLDING REGISTER-8 WIDE MASTER or MR8 logical element is shown in FIG. 76*c*. The schematic for the MR8 logical element is shown in FIG. 76*a* and FIG. 76*b*. The truth table for the function performed by the MR8 logical element is shown in FIG. 76*d*. Receipt of the clear, CLR, signal as a logical Low forces all 8 output signals to the logically false condition. When the CLR signal is not logically low, but both the clock, CLK, and enable EN, signals are logically Low, then the output signal MB0 through MB7 (e.g. H=MB0) and $\overline{\text{MB0}}$ through $\overline{\text{MB7}}$ (e.g. L=$\overline{\text{MB0}}$) will assume states in correspondence to input signals S0 through S7. Since each side of the 8 latches is the inversion of the other side, only the true sides are shown in the truth table of FIG. 76*d*. Finally, when either the clock, CLK, signal or the enable, EN, signals are logically High, then the output will remain at that state as previously established. This state is represented by the M0 entry in the truth table of FIG. 76*d*. The MR8 circuit generally functions as an array of 8 level sensitive latches, such as are capable of latching data only in the combined presence of a logically Low enable, EN, signal and a logically Low clock, CLK, signal.

8.24. HOLDING REGISTER-8 WIDE SLAVE Logical Element

The logical representation of a HOLDING REGISTER-8 WIDE SLAVE or SR8 logical element is shown in FIG. 81*c*. The schematic for the SR8 logical element is shown in FIG. 81*a* and 81*b*. The truth table for the function performed by the SR8 logical element is shown in FIG. 81*d*. A performance of this logical element may be observed to be substantially identical to that of the holding register-8 wide master, MR8, logical element previously discussed in section 8.23 and associated FIG. 76. The only change is that only the logical Low condition of the clock, CLK, signal suffices to gate input signal S0 to S7 in order to set the latches of the logical element, whereas both the clock, CLK, and enable, EN, signals are required for gating the latches of the previous MR8 logical element.

8.25. DRIVER/RECEIVER Logical Element

The schematic for the DRIVER/RECEIVER, DR1, logical element is shown in FIG. 82, consisting of FIG. 82*a* and FIG. 82*b*. This structure is integral to major features of the current invention, including VLSI Wired-OR commmunication, bus error detection, and ripple shifted error compensation. This standard logical element is replicated thirty-seven times, once for each of the thirty-seven bus lines, within the preferred embodiment of the invention.

Proceeding first in FIG. 82 to gain a general idea of the interconnections to this major cell, commence in the upper right-hand corner of FIG. 82*b*. Signals DATA IN—PIN N on line 82*b*15 and DATA OUT—PIN N on line 82*b*17 will be shortly seen to be major interconnections for data flow to and from the remaining Versatile Bus Interface Logics. Signal EN. SHORT TEST—PIN N on line **82*b*13 will be additionally be seen to be a control signal for enabling a particular one of the three bus transfer error detection tasks which are performable within this logical element. Comparing the named signals on lines 82*b*01 through 82*b*09 as appear on the right of FIG. 82*b* to the like named signals on lines 82*a*01 through 82*a*09 appearing on the left of FIG. 82*a*, a correspondence may be noted. When this DRIVER/RECEIVER logical element is in place within the preferred embodiment of the invention for control of a single line upon the Versatile Bus, it will connect upon the left side signal lines of FIG. 82*a* to the immediately adjacent next least significant DRIVER/RECEIVER cell, while it will connect upon the right side signal lines of FIG. 82*b* to the immediately adjacent next most significant DRIVER/RECEIVER cell. This connection to other DRIVER/RECEIVER cells upon each side of the present cell may be visualized by momentary reference to FIG. 127*a*. Continuing, the connection onto the Versatile Bus is affected through wire net 82*b*11 appearing at the lower right of FIG. 82*b*. Continuing in FIG. 82 in a clock-wise manner, test signals as appear on nets 82*a*11 through 82*a*17 are utilized in scanset interrogation and set of certain flip-flops within this cell, such as will be integral to localization of error faults and compensatory realignment. General clear and clock signals on lines 82*a*25 through line 82*a*37 appearing at the upper left of FIG. 82*a* are variously utilized at points within the cell, at such places as they are clearly identified. Signals on remaining lines 82*a*19 through 82*a*23** will later be seen to deal with the error detection and error compensation mechanizations.

Before commencing functional explanation of the DRIVER/RECEIVER cell shown in FIG. 82, at least a cursory familiarization with the bus electrical protocol of communications such as is effectuated by this cell is required. The complete explanation of such VLSI Wired-OR two-phase electrical communication protocol is contained in companion U.S. Pat. No. 4,500,988. For purposes of completeness within the present specification disclosure the final stage P-type and N-type transistor driver elements are shown in two major variants in FIGS. **83*a* and 83*b*. The second variant output stage may also be noted at the lower right of FIG. 82*b*. Additionally, the timing of the two bus phases, $\phi$1 and $\phi$2, plus the waveforms of a binary "0 and 1" signal transmission upon the Versatile Bus are shown in FIG. 84. For purposes of the explanation of the complete DRIVER/RECEIVER cell of FIG. 82, the following characteristics of the two-phase bus drive as explained in companion U.S. Pat. No. 4,500,988 should be recalled. During a first clock phase, $\phi$1, of approximately 10 nanoseconds all interfacing driver circuits additively drive, or pull up, connected Versatile Bus lines to a +3 volt d.c. logically High condition. During a second clock phase, $\phi$2, of approximately 20 nanoseconds during each 40 nanosecond Versatile Bus cycle time, DRIVER/RECEIVER circuits present a high impedance to charged bus lines, I/O PIN 'N', for maintenance of such logical High condition and resultant transmission of a logical "0", or else any interconnected DRIVER/RECEIVER circuit may drain the bus line charge toward 0 volt d.c. for transmission of a logical "1". Therefore clock phase 1, $\phi$1, is for copperative, synergistic, charging of the bus lines and clock phase 2, $\phi$2**, is for wired-OR data transmission upon the Versatile Bus.

Commencing the functional explanation of the DRIVER/RECEIVER logical element of FIG. 82, the signal L=DATA OUT−PIN N is received upon line **82*b*17 as an output data signal from within the Versatile Bus Interface Logics. This signal is inverted in inverter 82*b*02 and supplied via net 82*b*01 to transfer gate $\overline{T}$ 82*b*04 as well as, by comparison of the signal H=DATA OUT TO N+1 on net 82*b*01 to H=DATA OUT FROM N−1 on net 82*a*01, to transfer gate 82*b*06 of the next higher order DRIVER/RECEIVER cell. For the moment, this cross connection of signals to other, adjacent, DRIVER/RECEIVER cells is not of importance. It will be discussed later during explanation of the ripple shifted error compensation process. For the moment, it may be assumed the signal L=DATA OUT−PIN N now inverted by inverter 82*b*02 is subsequently passed via net 82*b*01 through transfer gate $\overline{T}$ 82*b*04 onto net 82*b*19. Along with this signal on net 82*b*19, the signal H=GP. $\phi$2 on net 82*a*25 and an unnamed signal on net 82*a*39, such as may be considered a disabling signal, are applied as the three signal inputs to three input NAND gate 82*b*08. When the signal level on net 82*a*39 is not a logical Low, meaning disable, then the inverted form of signal L=DATA OUT−PIN N now on net 82*b*19 will be gated through three input NAND gate 82*b*08 upon the occurrence of the logically High condition of signal H=GP. $\phi$2 on net 82*a*25. If the original signal L=DATA OUT−PIN N had been a logical Low, indicating the "1" state of output data, then net 82*b*11 will assume a logical Low condition during clock phase 2 responsively to three input NAND gate 82*b*08. This logical Low is inverted in inverter 82*b*10 and applied via net 82*b*23 to the base of N-type transistor 82*b*12, causing such transistor to turn-on. The conduction of N-type transistor 82*b*12 effectively connects the Versatile Bus line of net 82*b*11 to ground 82*b*14. This is consistent with the phase 2 transmission of a logical "1" upon the Versatile Bus, as may be affirmed by momentary reference to FIG. 84**.

Completing in the DRIVER/RECEIVER circuit of FIG. 82 the two phase electrical communication protocol of FIG. 84, the logical High condition of net **82*a*39, meaning no disablement, in conjunction with a logical High condition meaning clock phase 1, $\phi$1, on net 82*a*35 satisfies NAND gate 83*b*16 and causes a logical Low signal to appear on net 82*b*25 during entirety of each clock phase 1. This logical Low enables conduction of P-type transistor 82*b*18 and the charging of Versatile Bus net 82*b*11 from the +3 volt supply 82*b*20. Remaining P-type transistor 82*b*22 is a small pull up transistor such as has benefit in preventing the long-term gradual discharge of bus line net 82*b*11**.

Continuing in FIG. 82, the input data receiver and error detection capabilities of the DRIVER/RECEIVER element will be next discussed. Inverter element **88*b*26 in conjunction with multiple input OR element 88*b*24 comprises an INPUT DATA latch. Similarly inverter element 88*b*30 in conjunction with multiple input NOR element 88*b*28 comprises a STUCK HIGH TEST latch. The INPUT DATA latch receives via net 83*a*33 the H=$\phi$2 signal and the STUCK HIGH TEST latch receives via net 82*a*31 and L=$\phi$2 signal. It is imperative that both these phase 2 signals, although the inverse of each other, be exactly coincident with each other and totally exactly coincident with each other and totally exactly coincident with the H=GP. $\phi$2 signal on net 82*a*25 such as is applied to three input NAND gate 82*b*08. In the actual interconnection of the DRIVER/RECEIVER cell of FIG. 82 as part of the overall Versatile Bus Interface Logics, these phase 2** signals on nets **82*a*25, 82*a*31, and 82*a*33 will be rigorously controlled to be precisely coincident, at least within each single DRIVER/RECEIVER cell. The importance of this coincidence is that the phase 2 signals, as are respectively applied to the STUCK HIGH TEST latch via net 82*a*31 and to the INPUT DATA latch via 82*a*33 will clear both latches prior to the respective arrivals of the phase 2 gated data signal on net 82*b*23, and bus line driven form of this phase 2 gated data signal on line 82*b*11, at the respective latches. Upon the arrival of the gated output data signal on net 82*b*23, the STUCK HIGH TEST latch will assume the state of the gated output data signal as appears on net 82*b*23 via enablement of NOR element 88*b*28. Similarly, and at a slightly delayed time, the INPUT DATA latch will assume the actual state of the output data signal as appears upon the bus line 82*b*11 through enablement of OR gate 88*b*24. During phase 2, the STUCK HIGH TEST latch therefore assumes the state of such gated output data as is being signaled through net 82*b*23 within the current DRIVER/RECEIVER. During phase 2, the INPUT DATA latch assumes the state of the actual data such as appears upon net 82*b*11** of the Versatile Bus.

If a logical "1" was being driven by the current DRIVER/RECEIVER upon the bus, then net **82*b*23 will have assumed a logical High condition and the resultant setting of the STUCK HIGH TEST latch will cause a logical High signal on net 82*b*27 to be input to AND gate 82*b*32. Since the bus line, net 82*b*11, is driven in a wired-OR fashion, it should always assume a logical Low condition upon this occurrence of driving a logical "1". This will result in the INPUT DATA latch also becoming set and emplacing a logical Low on net 82*b*31 which also connects to AND gate 82*b*32. Such AND gate 82*b*32 will thusly not be made and will not cause a logically Low error signal on net 82*b*35 through error OR gate 82*b*36. If, however, the bus line 82*b*11 were to be stuck in the logically High condition, then the opposite state of the INPUT DATA latch will prevail, AND gate 82*b*32 will be made via a logically High signal on net 82*b*31, and an error will subsequently be reported from error OR gate 82*b*36 as a logical Low upon net 82*b*35**. Thus the first error detection, that of stuck High bus lines, is performed. The stuck High test is simply the detection that a bus line does not assume the logical "1" condition to which it is attempted to be driven by the DRIVER/RECEIVER element.

The false side signal of the STUCK HIGH TEST latch is applied via net **82*b*29 to three input AND gate 82*b*34, and the true side signal of the INPUT DATA latch is applied via net 82*a*05 to the same three input AND gate 82*b*34. That these two conditions should be the same, meaning that both the data drive of the bus from this individual DRIVER/RECEIVER element and the subsequent state assumed by the bus are identically a logical "0", can only be assured when this individual DRIVER/RECEIVER element is associated with the individual Versatile Bus Interface Logics which have sole and unitary control over this particular Versatile Bus line at this particular time. Remember that the Versatile Bus interconnection net 82*b*11 is being driven in a wired-OR fashion by the other interconnected DRIVER/RECEIVER elements as part of other interconnected Versatile Bus Interface Logics within the Versatile Bus network, thereby meaning that only for certain lines upon certain times can any individual DRIVER/RECEIVER element be assured of knowing that the bus line 82*b*11 should invariably assume the logical "0", or High, condition. Such a logical High signal condition means that the bus line 82*b*11 is not being driven to a logical Low signal level from any other interconnected device in a logically wired-OR fashion. This knowledge of the existence of unitary, exclusive, control can exist only for the Versatile Bus Interface Logics bus drive of the Slave Identification/-Function and Data lines. When Versatile Bus Interface Logics recognize such lines upon those particular cycles during which exclusive control is exerted, then the signal H=ENABLE SHORT TEST−PIN N on net 82*b*13 will be emplaced in the logically High condition. This means that three input AND gate 82*b*34 has the potential of being made if the logical "0" drive of the bus is not in accordance with the state assumed by the bus, that is, that bus line 82*b*11 does not correct a logically High condition. If the exclusive drive of a logical "0" were to result in a logical Low upon net 82*b*23 and the resultant clearing of the STUCK HIGH TEST latch, yet bus line 82*b*11 was to assume the logical "1" or logically Low condition resulting in the setting of the INPUT DATA latch, then the interpretation of the failure experienced would be that the bus line 82*b*11 is shorted to another line being driven Low by this Versatile Bus Interface Logics or some other interconnected device. Such a short between bus lines would be detected by a logical High signal on net 82*b*28 from the STUCK HIGH TEST latch plus a logical High signal on net 82*a*05 from the INPUT DATA latch, which in conjunction with a logical High signal H=EN. SHORT TEST=PIN N on net 82*b*13 would make the three input AND gate 82*b*34 and cause error collection OR gate 82*b*36 to output a logical Low signal on net 82*b*35**.

Continuing in FIG. 82, a final error detection is performed during each clock phase 1 in order to check that the connected bus line **82*b*11 correctly assumes a logically High condition. This test is enabled in cross coupled NOR gates 82*a*02 and 82*a*04 which together form the STUCK LOW latch. This latch is cleared during each clock phase 1 by the logical High input of the signal $\phi$1 on line 82*a*35. Similarly to the slightly delayed setting of the STUCK HIGH TEST latch by the signal upon net 82*b*23, and the even greater delay in setting of the INPUT DATA latch by the signal upon line 82*b*11 (both delays as compared to the occurrence of the signal H=BP. $\phi$2 upon net 82*a*25), so shall the setting of the STUCK LOW latch by the occurrence of the signal on line 82*b*11 be slightly delayed from the clearing of such STUCK LOW latch by the logical High occurrence of the signal $\phi$1 upon net 82*a*35. That is, due to propagation delays of the signal $\phi$1 upon net 82*a*35 through NAND gate 82*b*16 and P-type transistor 82*b*18, the NOR gate 82*a*02 will output a logical Low signal on net 82*a*41 at the conclusion of bus driving during phase 1 should the bus not be stuck in a logically Low condition. This output of the STUCK LOW latch, which is valid during the entirety of phase 2, is applied via net 82*a*41, through transfer gate T 82*a*06 normally enabled for direct passage thereof, and via net 82*a*43 to AND gate 82*a*10. When this NAND gate 82*a*10 is gated by the logically High state of signal $\phi$2 occurring upon line 82*a*33 then the ERROR LATCH, SLAVE consisting of cross-coupled NOR gates 82*a*12 and 82*a*14** will assume the cleared state indicative of the occurrence of a stuck low error. If there were a stuck low error resulting in a logical High output signal from NOR gate

82a02 on net 82a41 and the resilient satisfaction of AND gate 82a10, then this ERROR LATCH, SLAVE will assume a clear condition with a logical Low signal output on net 82a45. This ERROR LATCH, SLAVE will retain this error condition until it should be later cleared under the control of scan-set testing, such as will be discussed.

Continuing in FIG. 82, a logical Low signal on net 82a45 indicating occurrence of a stuck low error upon the bus line 82b11, and the logical Low signal on net 82b35 such as is resultant from either a stuck high error condition or a shorted line condition upon bus line 82b11, are jointly collected in second error collection NOR gate 82a18. Upon the occurrence of any of the three errors the logically High signal output from this NOR gate 82a18 is transferred via line 82a47 through transfer gate $\overline{T}$ 82a20 and via net 82a49 to AND gate 82a24. This error condition signal is gated at AND gate 82a24 by the occurrence of the logical High condition of signal $\phi$1 upon net 82a35 and serves to set the ERROR LATCH, MASTER consisting of cross-coupled NOR gate 82a26 and NOR gate 82a28. Note thusly that this ERROR LATCH, MASTER has been clocked during the occurrence of clock phase 1 following the phase 2 clocking of the ERROR LATCH, SLAVE at the location of AND gate 82a10. This means that the occurrence of a stuck low error condition upon the bus line 82b11 will be ultimately recognized upon the occurrence of the next phase 1 and the bus communication activities will not be aborted during the immediately following phase 2.

Occurrence of an error resulting in clearing of the ERROR LATCH MASTER consisting of cross-coupled NOR gates 82a26 and 82a28 will be reported to the Versatile Bus Interface Logics as a logical High condition of signal FAULT PIN N on net 82a21. This signal will be gathered in a fault collection logical tree and ultimately reported through the VM Node to the maintenance processor as the occurrence of a communication error upon the Versatile Bus. The type of error—stuck high, stuck low, or short, is undifferentiated in reporting. During this process, and at the time of such reporting, the bit sensitivity of the error is not localized to the maintenance processor. Instead, the maintenance processor—having first suspended further communication activities upon the Versatile Bus—will begin a program of interrogation of all Versatile Bus Interface Logics utilizing a regimen which will ultimately translate to scan-set control signals L=TEST 1 on net 82a11, H=TEST 1 on net 82a13, L=TEST 2 on net 82a15, and H=TEST 2 on net 82a17. All error flip-flops of all interconnected devices upon all intercommunicative lines will be scan tested to discern the device situs and bit sensitivity of the reported error. During the course of this interrogation ERROR LATCH SLAVE consisting of NOR gates 82a12 and 82a14 operates as the slave latch within a scan-set test loop, whereas ERROR LATCH MASTER consisting of NOR gates 82a26 and 82a28 operates as the master latch within a scan-set loop. During an initial scan operation the condition of all thirty-seven pairs of error latches upon the Versatile Bus is recovered in a continuous scan loop utilizing data transmission line 82a07, 82a09, 82b07, and 82b09. After an appropriately clocked number of scan cycles the maintenance processor will ultimately recover, through the VM Node, a thirty-seven bit pattern with a logical "1" in the position of the failing line. Interpreting said reported error condition to require ripple shifted error compensatory readjustment of the Versatile Bus, the maintenance processor will, through the VM Node and under the control eventually exercised by the same TEST 1 and TEST 2 signals will insert, via the scan-set mechanism, a logical "1" into the ERROR LATCH MASTER associated with the individual failing line at the location of al Versatile Bus interconnected devices. At this time, net 82a21 will thusly exhibit a logical High condition at the DRIVER/RECEIVER element associated with the single failing line at each interconnected device. The maintenance processor will then, finally, load a control area called the status register within the Versatile Bus Interface Logics so that a logical High will be provided as signal RIPPLE ENABLE on net 82a19 to all thirty-seven Versatile Bus DRIVER/RECEIVER elements.

Continuing in FIG. 82, this logically High condition of signal RIPPLE ENABLE ON NET 82a19 will suffice to satisfy AND gate 82a32 in only that individual DRIVER/RECEIVER element for which the ERROR LATCH MASTER is set, giving therein a logical High output signal on net 82a21. The resultant signal originating at this DRIVER/RECEIVER which has detected failure will be a logical Low signal on net 82a39; will firstly serve to disable all further clock phase 1 bus charging at the failed DRIVER/RECEIVER element due to disablement of NAND gate 82b16, and will secondly serve to disable all clock phase 2 data drive of the bus from the failed DRIVER/RECEIVER element due to disablement three input NAND gate 82b08. Satisfaction of NOR gate 82b38 by the logical Low signal on net 82a39 will cause a logically High RIPPLE signal on net 82b37, and a logically Low RIPPLE signal upon net 82b03 as inverted by inverter 82b40.

The normal output data path had been seen to be from net 82b01 through transfer gate 82b04 to net 82b19. The normal input data path was, correspondingly, from net 82a05 through transfer gate 82b42 to net 82b15. Now, upon the occurrence of the logically High signal H=RIPPLE and the logically Low signal L=RIPPLE, these transfer gates 82b04 and 82b42 are disabled for transfer and adjacent transfer gates 82b44 and 82b06 will be enabled for transferred connection of the associated signal nets. That is the signal on net 82a01 will be transferred to net 82b19 while the signal on net 82b05 will be transferred to net 82b15. All higher ordered DRIVER/RECEIVER elements than that single DRIVER/RECEIVER element at which the error condition is registered, will now receive the logical Low ripple error condition occurring on net 82b03 as the signal RIPPLE CARRY FROM N−1 on net 82a03. This signal and its progeny will satisfy NOR gate 82b38 at all higher order DRIVER/RECEIVER elements.

Therefore, upon alignment for rippled shifted error correction, the signal DATA IN FROM N+1 on net 82b05 will be connected via transfer gates 82b44 to net 82b15 in the failed and all higher order DRIVER/RECEIVER elements. Similarly, the signal DATA OUT−PIN N on net 82b17 which would have passed through inverter 83b02 and via net 83b01 through transfer gate 83b04 will instead connect, via said net 82b01, to net 82a01 of the next most significant DRIVER/RECEIVER cell. This net 82b01 will be connected through now enabled transfer gate 82b06 to net 82b19. Recalling that NAND gate 82b16 and 82b08 are disabled for that DRIVER/RECEIVER element which is the particular line situs of the failure, it will thusly be seen that the relationship of signals H=DATA IN—-PIN N on net **82*b*15 and L=DATA OUT—PIN N relative to the Versatile Bus signal line net 82*b*11** will be right ripple shifted one place at DRIVER/RECEIVER elements of higher order than the element latching error in compensation for the failure condition.

The remaining significant operational condition is that a second, subsequent, error should occur upon another communication line of the Versatile Bus. Such a "double error" can be recognized at DRIVER/-RECEIVER elements associated with bus lines of lesser or greater significance than that single bus line which is currently in error condition. When a second fault is recognized at a more significant DRIVER/-RECEIVER element than that previously registering error, then the clearing of the ERROR LATCH MASTER producing a logical Low signal on net **82*a*07, combined with the existence of the RIPPLE CARRY FROM N−1 upon net 82*a*03 as a logical Low signal will enable NAND gate 82*a*34 and produce the DOUBLE FAULT—PIN N signal upon net 82*a*23 to be a logical High condition, indicating occurrence of a DOUBLE FAULT. If the second error occurs at a lower significance DRIVER/RECEIVER element than that previously recognizing error, then the occurrence of a logical High on net 82*a*21 will cause, since the RIPPLE ENABLE signal on net 82*a*19 is in the logical High condition to all connected DRIVER/-RECEIVER elements, a logical Low level of signal RIPPLE CARRY to appear on net 82*a*39, satisfying NOR gate 82*b*38, and then via net 82*b*37 and through inverter 82*b*40 to thusly propagate to subsequent, higher order, stages upon net 82*b*03. When this signal RIPPLE CARRY TO N−1 reaches the priorly failed state as the signal RIPPLE CARRY FROM N−1 upon net 82*a*03 then NAND gate 82*a*34 will be satisfied within that stage. Consequently, the same signal DOUBLE FAULT—PIN N will be supplied as a logical upon net 82*a*21, gathered in a Double Fault collecton logical tree structure within the Versatile Bus Interface Logics and then supplied to the maintenance processor. The maintenance processor will be possessed of the same capability to scan, and to set, the error flip-flops upon the occurrence of a DOUBLE FAULT as it was possessed of upon the occurrence of a single fault. Therefore, the capability, albeit sophisticated, will exist to reconfigure the Versatile Bus in compensation for plural errors. Such reconfiguration will not be via the ripple shifted error compensation method, however, but must be via the reconfiguration of the bandwidth of certain bus communication. For example, if data bits 14 and 10** had failed within a 16 bit data communication configuration, then the data communication could be configured to transpire across eight lines.

9. Description of the Versatile Bus Interface Logics

The following sections contain the explanation of the first level block diagram, the second level block diagrams, a third level block diagram, and the detail logic diagrams, plus supportive tables and diagrams, such as show the logical function of the Versatile Bus Interface Logics.

A table listing all the functional sections and functional subsections of the preferred embodiment of the invention is shown in FIG. 85, consisting of FIG. **85*a* through FIG. 85*c***. Each subsection is accorded a descriptive mnemonic designation. The logical interconnection of the logics of the preferred embodiment of the invention is in accordance with the unique identification numbers associated with each signal line. The teaching of the routing of such lines in accomplishment of the function of the preferred embodiment of the invention is, however, facilitated if the mnemonics are studied until they can be readily associated with functional subsections. Whenever signal lines ingress or egress a logic diagram a mnemonic key, as well as the identification number, will aid in understanding that functional subsection(s) from which the signal is derived, or to which it is distributed. As a total understanding of the preferred embodiment of the invention is gained, it should become possible to understand and recall the function of each signal line and recall its interconnections and utilizations merely by reference to the line signal name and to these mnemonic keys to the distribution of such signal.

In the final column of FIG. **85*a* through FIG. 85*c*** the reference FIG. upon which the named logical subsection is shown in greatest detail is given. Those Figure references preceded by an asterisk (*) are block diagrams. Therefore, the ultimate teaching of the named subsection will be at the block diagram level. All subsections so taught are simplistic and routine of implementation, in general being registers and the like interconnected in a regular manner. Certain repetitive subsections are shown once in detailed logical interconnection, and subsequent replications are taught by block diagram.

9.1. Block Diagram of the Versatile Bus Interface Logics

A first level block diagram of the Versatile Bus Interface Logics is shown in FIG. 86 consisting of FIG. **86*a* and 86*b*. A first major functional logical section is ARBITRATION SECTION 86*a*02 wherein the BUS ARBITRATION LOGICS as control the GROUP LINES, both represented within block 86*a*10, interface onto the VERSATILE BUS 86*a*01 through up to eight driver/receiver elements, abbreviated DR/REC (8) 86*a*12. The BUS ARBITRATION LOGIC/GROUP LINES, 86*a*10 part of the ARBITRATION SECTION 86*a*02 comprises almost one-half of the approximately 4,200 gates utilized within the preferred embodiment implementation of the invention. The BUS ARBITRATION LOGIC/GROUP LINES 86*a*10 is concerned with both the participation in the activity of arbitration and the development of the winner's master arbitration identification code as the results of each arbitration activity upon VERSATILE BUS 86*a*01**.

A next major functional section, BEGIN SECTION **86*a*04, is shown proximate to the ARBITRATION SECTION 86*a*02 because of the transmission of the BEGIN signal upon the VERSATILE BUS 86*a*01 upon the commencement of arbitration by the VERSATILE BUS Interface Logics. BEGIN SECTION 86*a*04 is shown as comprising the BEGIN LOGIC of block 86*a*14 and a single driver/receiver element denominated DR/REC (1) 86*a*16**.

A next major functional section is the SLAVE ID SECTION **86*a*06. SLAVE LOGIC 86*a*18 can simultaneously control the data assembly and disassembly of an eight bit slave identification/function word or the configured portion thereof. In other words, both receipt of addressing upon the VERSATILE BUS 86*a*01 of the present Versatile Bus Interface Logics as a slave device, such as requires assembly of a slave identification/function word as received upon the VERSATILE BUS 86*a*01, can transpire simultaneously with the progressive disassembly of a slave identification/function word received from the User device for imminent subsequent transmission during a next pipelined slave identification/function cycle upon the VERSATILE BUS. Functional subsection CAM AND CAM CONTROL 86*a*20 represents four content addressable memories such as are capable of storing up to four slave identification codes plus a mask register. Control line 86*a*03 output therefrom to the WAIT functional section 86*a*08 is involved in the detection of a hit, or masked match, to one of the stored slave identification codes. Responsively to such slave addressing, the User may wish to enable the WAIT signal response upon the VERSATILE BUS 86*a*01. The SLAVE LOGICS 86*a*18 within the SLAVE ID SECTION 86*a*06 normally communicate onto the VERSATILE BUS 86*a*01 through eight dedicated driver/receivers labeled as DR/REC (8) 86*a*22**.

The major logical functional section WAIT SECTION **86*a*08 consists of WAIT LOGICS 86*a*24 and a single driver/receiver, denominiated DR/REC (1) 86*a*26. All functional subsections and associated logics, such as WAIT SECTION 86*a*098**, actually exist within the preferred embodiment of the invention even should the associated activities be configured as nullities and/or connected User devices never avail themselves of the associated functions.

Referencing in FIG. **86*b*, DATA SECTION 86*b*04 is shown as comprised of the DATA ASSEMBLY/DISASSEMBLY REGISTER-16 BITS 86*b*18 and an associated sixteen driver/receiver elements, denominiated as DR/REC (16) 86*b*20. An interrelationship between ARBITRATION SECTION 86*a*02, SLAVE ID SECTION 86*a*06, WAIT SECTION 86*a*08, and DATA SECTION 86*b*04 is noticeable through the coupling occurring in selectors called SEL: blocks 86*a*28, 86*a*30, 86*a*32, 86*a*34, and 86*b*22. These selectors are, and this first level block diagram of the Versatile Bus Interface Logics is, integral to the illustration of the capability to pin multiplex activities transpiring between the Versatile Bus Interface Logics through and upon the VERSATILE BUS. The drive of arbitration upon the arbitration group lines may be passed directly between the BUS ARBITRATION LOGIC/GROUP LINES 86*a*10 to dedicated driver/receiver elements DR/REC (8) 86*a*12 via line 86*a*05. In a pin multiplexed configuration for the bus activity of arbitration, however, the group line drive signals on line 86*a*05 will be gated through selector SEL 86*a*30 onto line 86*a*07 for drive upon the slave identification/function lines through driver/receiver DR/REC (8) 86*a*22. Similarly, if the slave identification/function activity is pin multiplexed onto the data lines then the signals upon line 86*a*07 may be gagted by selector SEL 86*b*22 onto line 86*b*01 to driver/receiver DR/REC (16) 86*b*20 and thence as drive of the data lines upon the VERSATILE BUS 86*a*01. Finally, pin multiplexing of the WAIT signal upon line 86*a*19 may be gated in selector SEL 86*b*22 to be applied via line 86*b*01 to the mst significant one of driver/receiver DR/REC (16) 86*b*20**.

The operation of configurations for pin multiplexing in the input, or receipt, of activity information upon VERSATILE BUS **86*a*01 is also visible within FIG. 86. In the event of arbitration activity, configured pin multiplexed arbitration activity information received upon the slave identification/function lines will be passed from driver/receivers DR/REC (8) 86*a*20 via line 86*a*13, selector SEL 86*a*32, line 86*a*15, and pin multiplexed enabled selector SEL 86*a*28 onto line 86*a*11 connecting to BUS ARBITRATION LOGIC/GROUP LINES 86*a*10. If the arbitration had been pin multiplexed to occur upon the data lines, then the receipt of arbitration information via driver/receiver DR/REC (16) 86*b*20 would pass via lines 86*b*03, pin multiplexed enabled selector SEL 86*a*32, line 86*a*15, pin multiplexed enabled selector SEL 86*a*28, and upon line 86*a*11 to the BUS ARBITRATION LOGICS/GROUP LINES 86*a*10. Similarly, in the event that the slave identification/function activity is pin multiplexed to occur upon the data lines, then receipt of slave identification/function information by driver/receiver DR/REC (16) 86*b*20 will pass via line 86*b*03 and pin multiplexed enabled selector SEL 86*a*32 and upon line 86*a*15 to the SLAVE LOGICS 86*a*18. Finally, receipt of a pin multiplexed WAIT signal would transpire through the most significant one of driver/receivers DR/REC (16) 86*b*20 via line 86*b*03 to pin multiplexed enabled selector SEL 86*a*34 and upon line 86*a*21 to WAIT LOGIC 86*a*24. Control of all selectors is, of course, dynamic, commensurate with where information attendant upon a particular cycle of activity upon VERSATILE BUS 86*a*01** is to be routed.

Continuing in FIG. **86*b*, the BUSY SECTION 86*b*10 is comprised of the BUSY LOGIC of block 86*b*24 and the single associated driver/receiver DR/REC (1) 86*b*26. The function of the BUSY SECTION 86*b*10 is to control the number and the timing of the drive of the BUSY signal upon VERSATILE BUS 86*a*01**.

The PARITY SECTION **86*b*12, consisting of PARITY LOGIC 86*b*28 and the two associated driver/receivers DR/REC (2) 86*b*30, is involved with the error detection of open lines during the communication upon the VERSATILE BUS 86*a*01. During each communication transaction upon the VERSATILE BUS 86*a*01, PARITY SECTION 86*b*12 will compute the parity of thirty-five lines and drive a single one of the odd and even parity lines connected to driver/receivers DR/REC (2) 86*b*30** during the next cycle time.

Functional section PROCESS CONTROL **86*b*06 consists of the SEND CONTROL LOGICS 86*b*14 and RECEIVE CONTROL LOGICS 86*b*16. The SEND CONTROL LOGICS 86*b*14 are the master timing chain for the control of sequential activities of arbitration, slave identification/function, wait and data upon the VERSATILE BUS 86*a*01. The SEND CONTROL LOGICS 86*b*14 consists of two latches each as are associated with the activities of arbitration, slave identification/function, wait, and data. These latches will set upon the appropriate initiation of the associated activity, remain set for the configuration controlled number of cycles of such activity, and clear upon the cessation of such activity by the Versatile Bus Interface Logics. The duration of the arbitration activity, as indicated by the setting of the associated latch pair within the SEND CONTROL LOGICS 86*b*14, will use a count of up to eight configuration control cycles developed in a counter called a Group Counter. The wait activity, if configured to be performed, will always occupy but a single cycle time. The activities of slave identification/function and data, as are respectively in progress during the duration of the setting of respective latch pairs within SEND CONTROL LOGICS 86*b*14, will be controlled in respective durations by the configurable cycle counts respectively counted in a SID counter and a DATA counter. Such SID counter and such DATA counter are actually the receive counters which are within the RECEIVE CONTROL LOGICS 86b16. Thus the SEND CONTROL LOGICS 86b14 manage the sequential control of activities as are performed by the Versatile Bus Interface Logics upon the VERSATILE BUS 86a01. The duration of up to eight cycles of arbitration activity is controlled under an ARBITRATION group counter which is part of the ARBITRATION functional subsection 86a02. The duration of the slave identification/function activity is controlled by a SID receive counter which is within RECEIVE CONTROL LOGICS 86b16. The duration of the data functional activity is controlled by a DATA receive counter which is within RECEIVE CONTROL LOGICS 86b16**.

Continuing in FIG. 86b, the RECEIVE CONTROL LOGICS 86b16, part of the PROCESS CONTROL functional logical section 86b06 are involved in counting the configuration controlled number of cycle times during which each activity upon the Versatile Bus will transpire. An ARBITRATION cycle counter within RECEIVE CONTROL LOGICS 86b16 is enabled to count up to a configuration specified eight cycles of arbitration activity. A SID receive counter within the RECEIVE CONTROL LOGICS of block 86b16 is enabled to count up to a configuration controlled eight cycles of slave identification/function activity. If the wait activity is pin multiplexed onto the data activity, the sequencing from the completion of the SID receive counter to initiation of a DATA receive counter will be delayed one cycle; ergo, a WAIT of zero or one cycles can be considered to be configurably controlled. A DATA receive counter within the RECEIVE CONTROL LOGICS of block 86b16 is capable of counting up to a configuration controlled sixteen cycles of data activity. Therefore the PROCESS CONTROLL LOGICS 86b06 in both the SEND CONTROL logics 86b14 and the RECEIVE CONTROL logics 86b16 comprise the master sequencing and timing control for the conduct of activities upon the VERSATILE BUS 86a01 by the Versatile Bus Interface Logics.

The CONFIGURATION CONTROL SECTION logics are shown within block 86b08. The CONFIGURATION REGISTER 86b32 is a twenty-seven bit register which is loaded during initialization, or reinitialization, through the scan/set capability as exercised through the VM Node/maintenance processor. The CONFIGURATION CONTROL SIGNAL TRANSLATION logics 86b34 translate the various fields within the CONFIGURATION REGISTER 86b32 into discrete signals as are utilized to effectuate configuration sensitive control within the remainder of the Versatile Bus Interface Logics.

The logic section of MISCELLANEOUS DISTRIBUTIONS shown in block 86b02 contains logical amplifier drivers for distribution of the clear signal received through the VM Node in CLEAR 86b36, and for distribution of the external clock received throughout the Versatile Bus system in the CLOCK 86b38. Logics within TEST 86b40 and SCAN/SET 86b32 are respectively intended to represent the scan/set test control and the scan/set test data, both of which are integral to the exercise of the scan/set test capability within the Versatile Bus Interface Logics.

9.2. Receive Control

The RECEIVE CONTROL functional subsection 86b16, part of PROCESS CONTROL FUNCTION SECTION 88b06 first seen in the first level block diagram of the Versatile Bus Interface Logics contained in FIG. 86, is partially shown in FIG. 87. Other parts of RECEIVE CONTROL functional subsection 88b16 will be shown in FIGS. 113 through 115. The logics of RECEIVE CONTROL 88b16 are only useful when the connected User device is a reference slave device within a Versatile Bus transaction. The logical High condition of output signals (H) WINNER'S ID AVAIL on line 8701, (H) SID/F AVAIL on line 8705, and (H) DATA AVAIL on line 8703 respectively indicate the availability of the winner's master arbitration identification code each eight bit slave identification/-function word, and each sixteen bit data word as are transferred to a slave User device resulant dfrom communication upon the Versatile Bus. These three signals are generated upon each availability of the associated word quantities regardless of whether the User should be an identified slave within the current Versatile Bus transaction and/or desirous of receiving the associated information. The reason that the three signals are referred to as being "useful" only when the User device is a reference slave device within a Versatile Bus transaction is because a User device will not normally care about the arbitration winner's identification code, the slave identification/function information and/or the data information unless it is participating within the Versatile Bus transaction as a slave device.

The RECEIVE CONTROL logics 88b16 generally consists of three latches comprised of cross-coupled AOI 2-1 logical elements. The configuration shown is extremely typical of the level sensitive latches which are exclusively utilized throughout the logical design of the Versatile Bus Interface Logics. As an aid to immediate recognition of these latches, wheresoever they shall occur, consider first the WINNER's ID AVAIL latch consisting of cross-coupled AOI 2-1 logical elements 8704 and 8706. Level sensitive latches such as the WINNER's ID AVAIL latch are always gated in both set and clear inputs by either clock $\phi$1 or clock $\phi$2, herein the locial High occurrence of clock $\phi$1 on signal (H) $\phi$1 (10) on line 13421. Level sensitive latches also normally receive their set or left side, and clear, or right side, signal inputs as the normal and inverted states of the selfsame input signal. In the WINNER's ID AVAIL latch of RECEIVE CONTROL 88b16, the clear side input signal is (L) INIT EN MIDR on line 88e07 and the inversion of this signal within IN1 logical element 8702 is applied via line 8707 to AOI 2-1 logical element 8704. The set side signal output of the WINNER'S ID AVAIL latch on line 8709, logically Low when the latch is set, is inverted in IN1 logical element 8708 and applied via net 8701 to the User device. The generalized logical description of such a latch is thusly that the logical Low occurrence of signal (L) ENWIDR as gated by clock $\phi$1 enables the setting of a WINNER'S ID AVAIL latch which will, through an inverter element, maintain a logical High condition for signal (H) WINNER'S ID AVAIL on line 8701.

In a like manner, it is described that the logical Low occurrence of signal (L) LOAD UDR as gated by clock $\phi$1 will cause the setting of a DATA AVAILABLE latch compose of cross-coupled AOI 2-1 logic elements 8710 and 8712, and the resultant logical High condition of signal (H) DATA AVAIL on net 8703. In such an abbreviated description of circuit functionality, it is assumed that the routineer in the art understands the obvious function of IN1 logical elements 8714 and 8716.

As the final logical element of RECEIVE CONTROL ((b16, and as a final illustration of the normal manner of expressing logical function, it may be said that a SID/F AVAIL level sensitive latch consisting of cross-coupled AOI 2-1 logical elements 8718 and 8720 is set by the logical Low occurrence of signal (L) ENABLE UID F REG as is received from the WAIT section—slave identification/function control, and, resultantly to such setting, supplies a logical High signal (H) SID/F AVAIL on line 8705. Occurrence of a logically High, clearing, condition for signal (H) CLEAR (6) on line 13311 clears the SID/F AVAIL level sensitive latch and results in the not true state, or logical Low condition, of signal (H) SID/F AVAIL as allows recognition of a slave identification/function code being supplied to the connected User device by such signal as appears on line 8705.

In summary, RECEIVE CONTROL logics **88*b*16 are merely three level sensitive holding latches which receive enabling setting signals from deeper within the Versatile Bus Interface Logics and gate such signals upon clock $\phi$1** for subsequent provision of output signals to the User logics in indication of the availability of the winner's master arbitration identification code, the slave identification/function words and the data words as are elsewheres supplied by the Versatile Bus Interface Logics to the User device.

9.3. Send Control

The SEND CONTROL logics **86*b*14 as were previously shown within the Versatile Bus Interface Logics block diagram of FIG. 86 are shown in FIGS. 88*a* through 88*l*. The SEND CONTROL logics 86*b*14** is the major process control and functional timing section of the Versatile Bus Interface Logics. The function of this control timing section is the sequencing of all communicative activities as are managed upon the Versatile Bus by the Versatile Bus Interface Logics. An initial conceptual understanding of the function of this complex section may be based upon the locating of certain latches as are associated with individual activities upon the Versatile Bus.

9.3.1. General Explanation of Send Control

Figure 88:
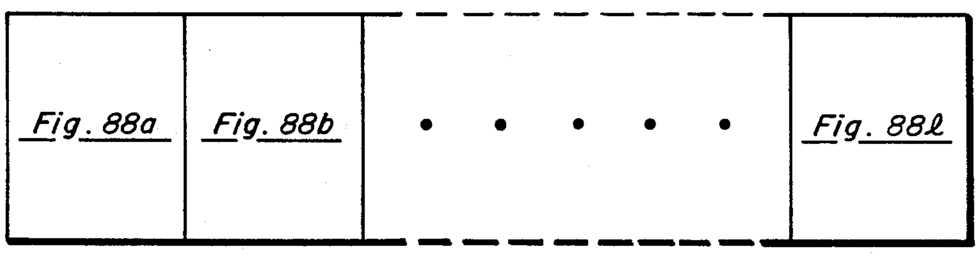
Figure 88A:
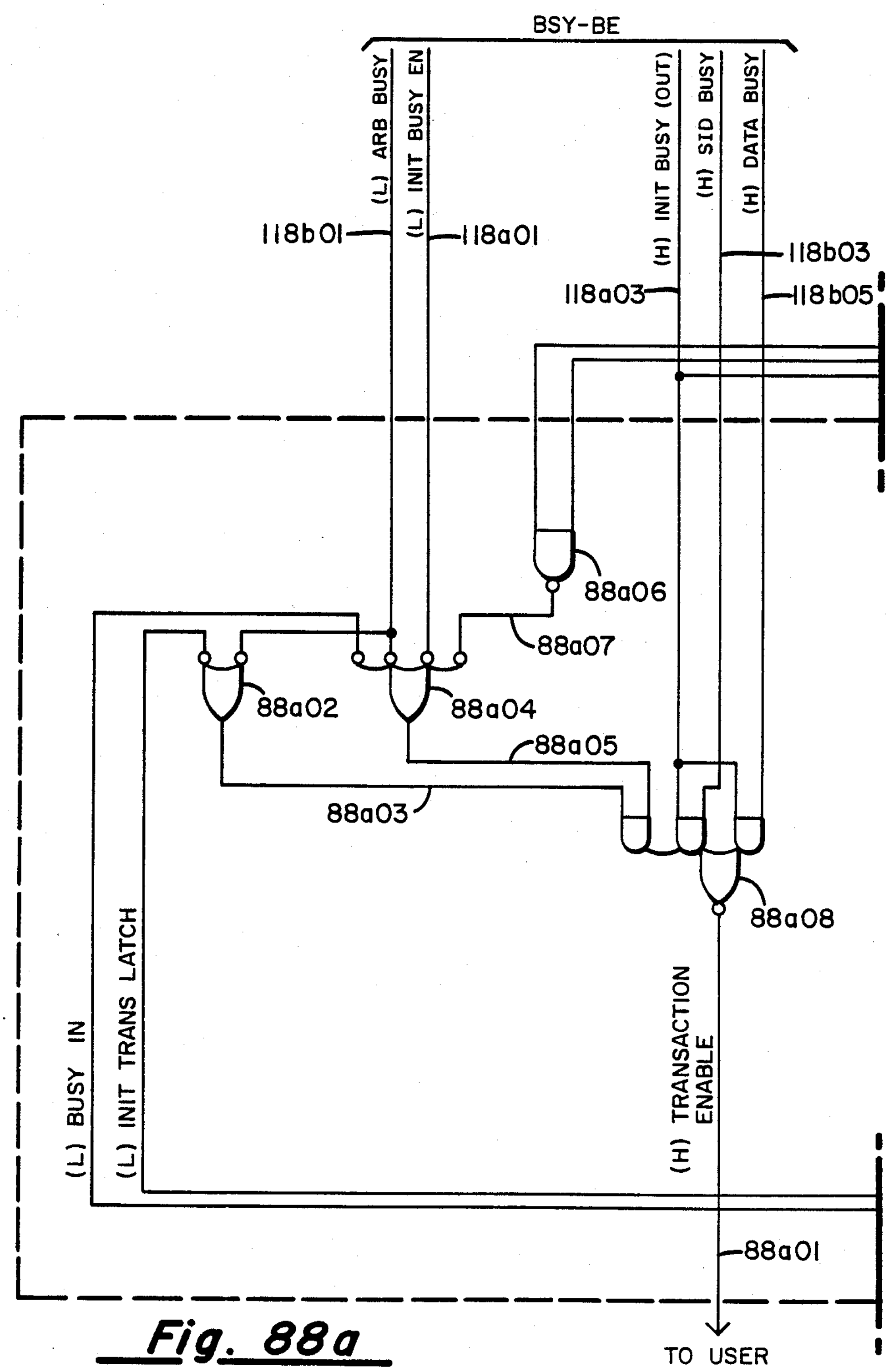
Figure 88B:
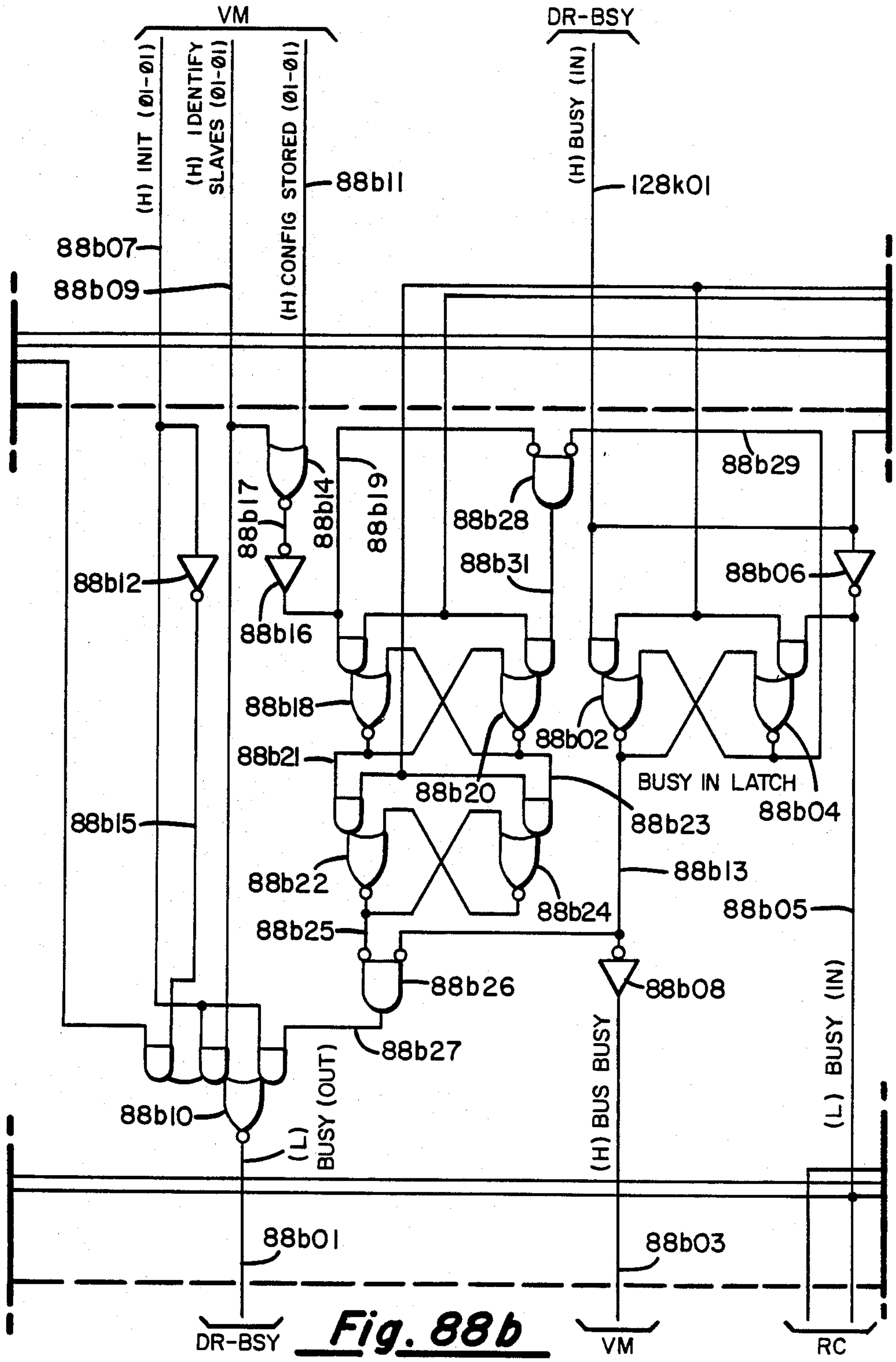
Figure 88C:
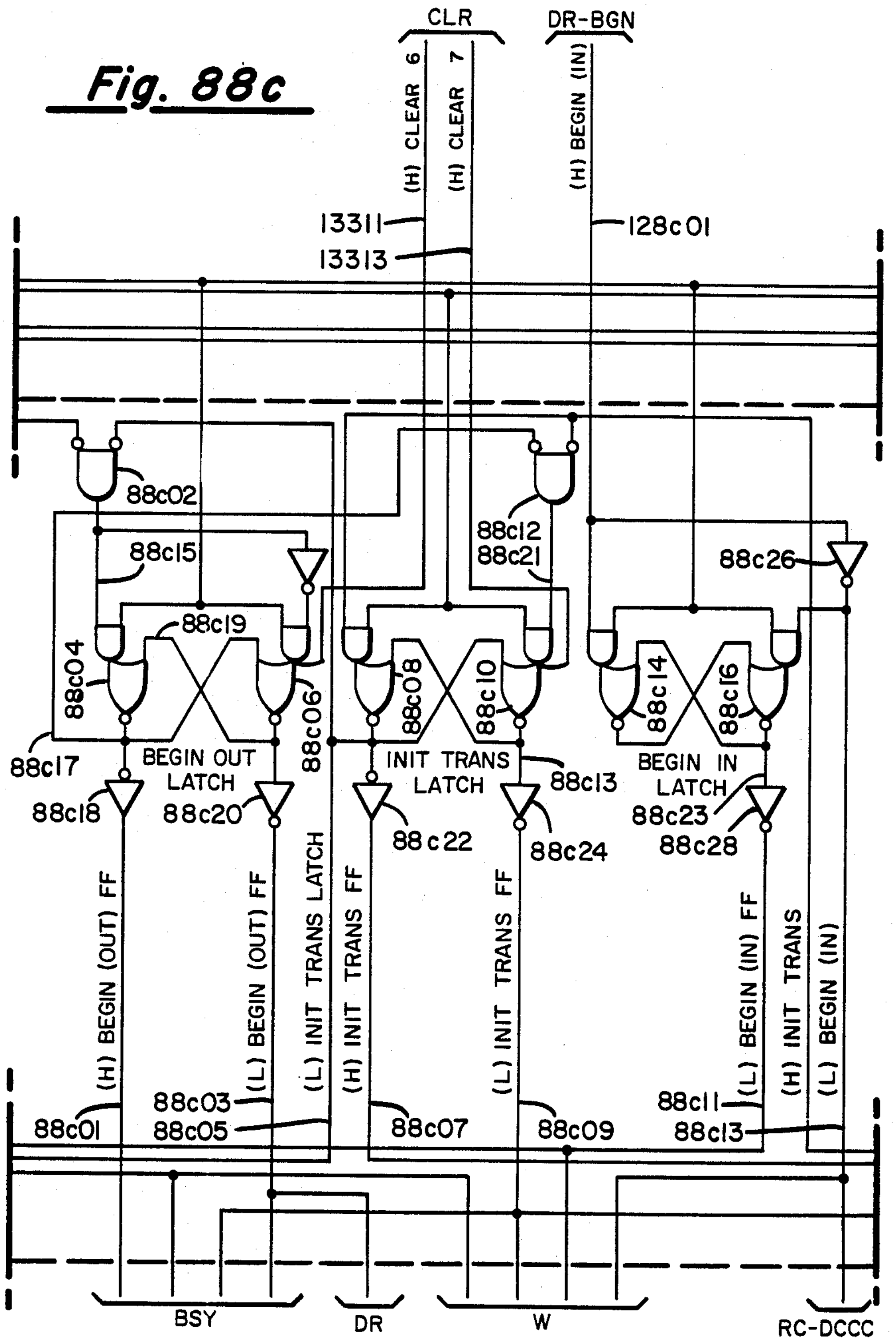
Figure 88D:
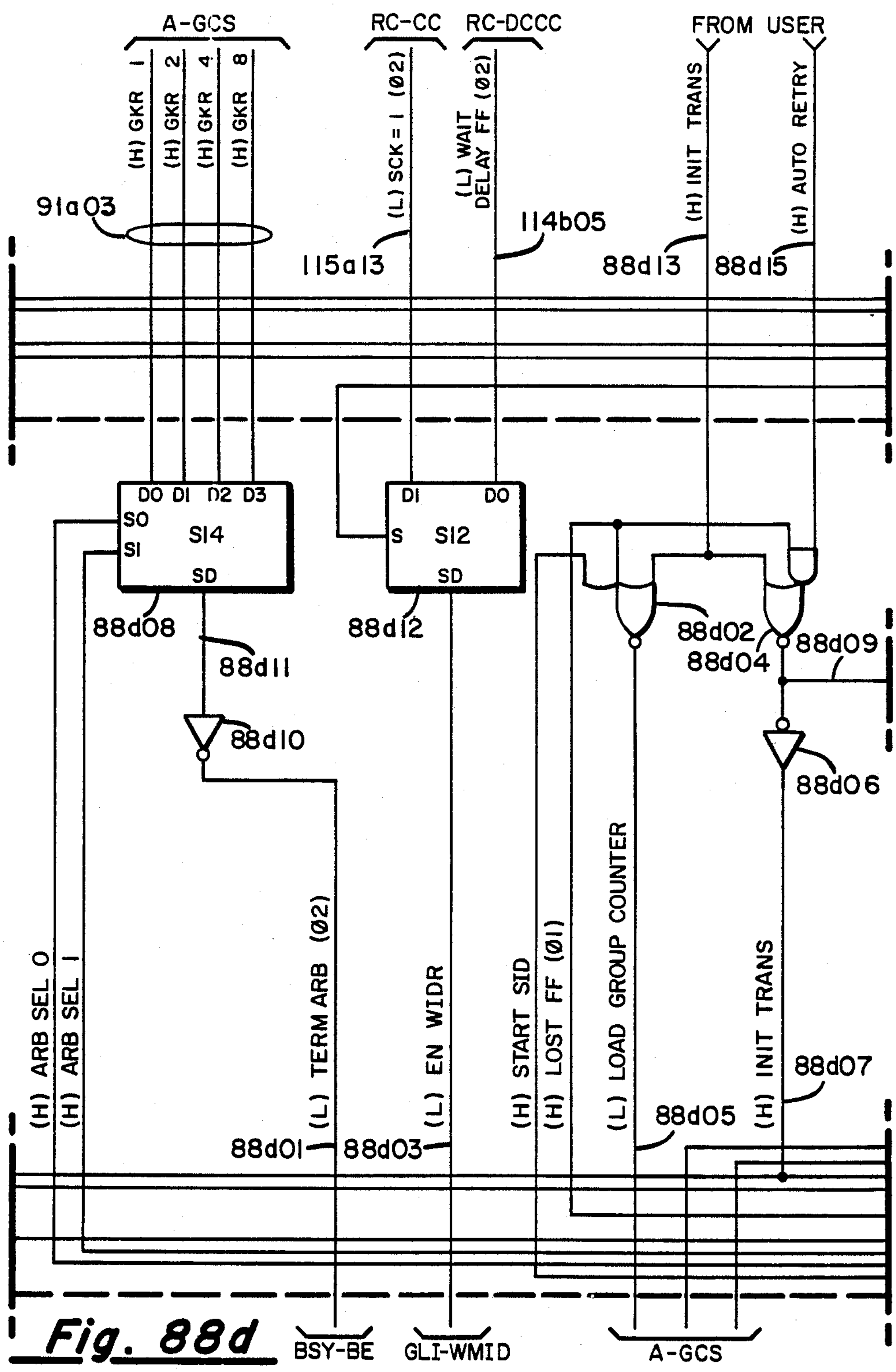
Figure 88E:
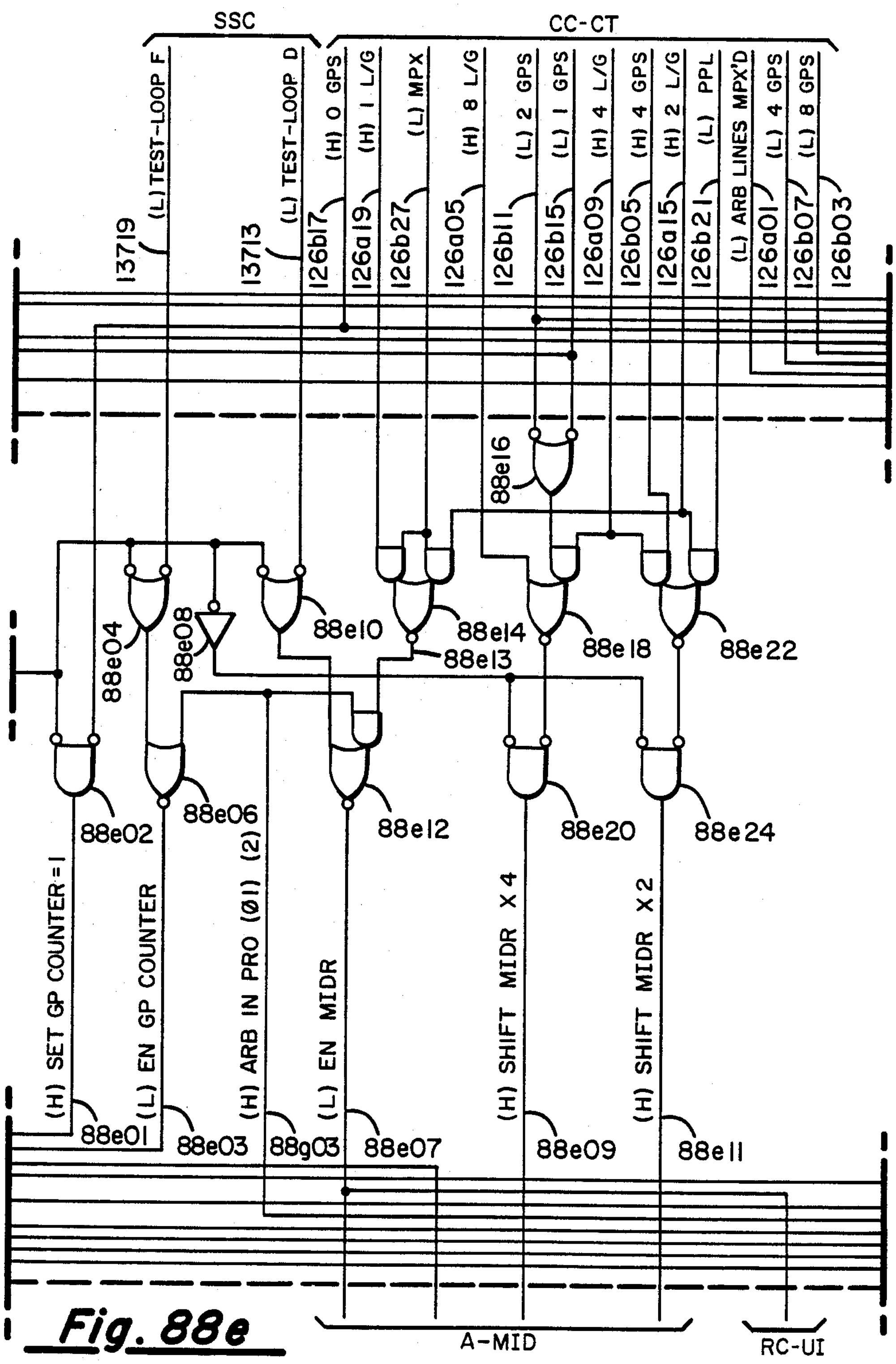
Figure 88F:
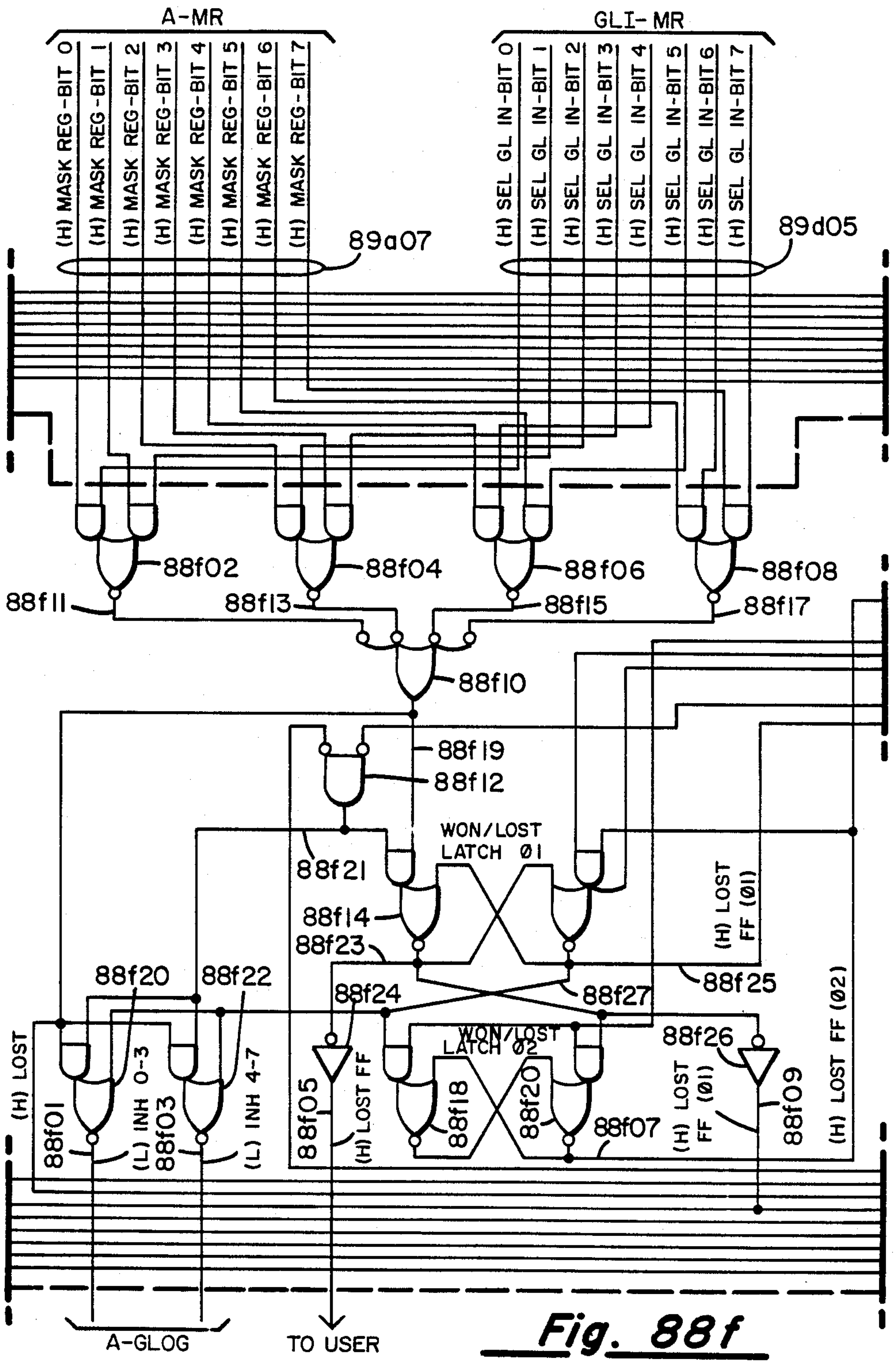
Figure 88G:
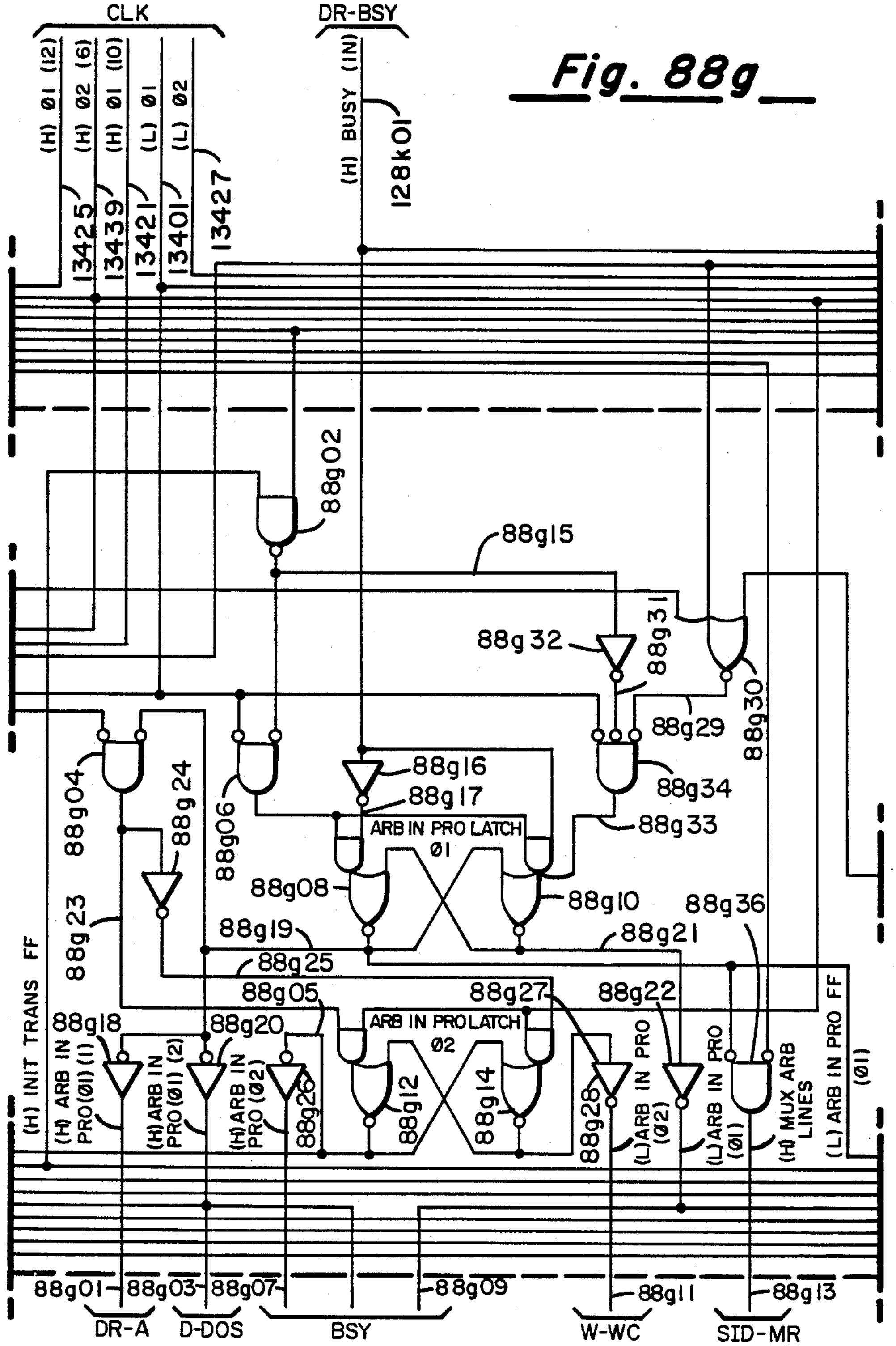

In general consideration of the logical function affected by SEND CONTROL **86*b*14, the latches ARB IN PRO LATCH $\phi$1 consisting of cross-coupled AOI 2-1 logical element 88*g*08 with AOI 2-1-1 logical element 88*g*10, plus ARB IN PRO LATCH $\phi$02 consisting of cross-coupled logical element AOI 2-1 88*g*12 with AOI 2-1 logical element 88*g*14 should firstly by reference in FIG. 88*g*. These two level sensitive latches, are as respectively set upon clock $\phi$1 and clock $\phi$2 at the initiation of an arbitration activity pon the Versatile Bus, will remain set for the duration of such arbitration activity upon the Versatile Bus. This means that both latches could remain set for up to eight cycles of 40 nanoseconds each in the conduct of arbitration, or a total of up to 320 nanoseconds. Similarly, the duration of the slave identidication/function activity upon the Versatile Bus is controlled through the setting of SID IN PRO LATCH $\phi$1 consisting of cross-coupled logical elements AOI 2-1 88*i*04 and AOI 2-1-1 88*i*06, and SID IN PRO LATCH $\phi$2 consisting of cross-coupled logical elements AOI 2-1 88*i*08 with AOI 2-1 88*i*1: as are shown in FIG. 88*i***. These latches are set during the duration of a slave identification/function activity upon the Versatile Bus, which may be up to eight cycles of 40 nanoseconds each cycle in duration, or a total of 320 nanoseconds. All logics surrounding these arbitration and slave identification/function latches are to control the setting, clearing and progressive sequencing of process control.

At the completion of a slave identification/function activity upon the Versatile Bus, as is controlled within the Versatile Bus Interface Logics by the setting of Latch SID IN PRO LATCH $\phi$1 and latch SID IN PRO LATCH $\phi$2, the next sequenced activity can either be data or wait. Conduct of the data activity is controlled by DATA IN PRO LATCH $\phi$1 consisting of cross-coupled logical elements AOI **2-2-2 88*k*12 with AOI 2-2-2 88*k*14, plus DATA IN PRO LATCH $\phi$2 consisting of logical elements AOI 2-1 88*k*16 with AOI 2-1 88*k*18, both latches as are shown in FIG. 88*k*. These latches will remain set for up to sixteen cycles of data activity of 40 nanoseconds each cycle or a total of 640 nanoseconds. If the wait activity is pin multiplexed with the data activity upon the Versatile Bus, then the wait activity must be separately timed intermediary between the slave identification/function activity and the commencement of the data activity. Timing of the wait activity, which is always of duration of but a single cycle of 40 nanoseconds, is accomplished in WAIT IN PRO latch $\phi$1 consisting of cross-coupled logical elements AOI 2-1 88*j*06 and AOI 2-1-1 88*j*08, plus WAIT IN PRO LATCH $\phi$2 consisting of cross-coupled logical elements AOI 2-1 88*j*10 with AOI 2-1 88*j*12, both latches as are shown in FIG. 88*j***.

Conceptually, therefore, the send control logics **86*b*14 represent a timing chain within which certain Versatile Bus activity-related latches will be controllably sequentially set and cleared as besuit the conduct of activities upon the Versatile Bus by the Versatile Bus Interface Logics. Extensive logic surrounding these activity controlling latches within the SEND CONTROL logics 86*b*14 as appear in FIGs. 88*a* through 88*l* are merely to control the orderly initiation, duration, termination, and sequencing of these activities. The role of SEND CONTROL logics 86*b*14 as the beginning, middle, and end of transaction control upon the Versatile Bus may also be observed by noting signal (H) INIT TRANS on line 88*d*13 as is received from the User device and signal (H) TRANSACTION COMPLETED, on line 88107 as is transmitted to the User device. The SEND CONTROL logics 86*b*14** thusly receive the request of a User to initiate communication transaction upon the Versatile Bus, and subsequently, having managed such a transaction, will inform the User of the successful completion thereof.

9.3.2. Generation of Signal TRANSACTION ENABLE

Commencing with the detailed explanation of the logical function of the Send Control logics **86*b*14, the logical elements 88*a*02 through 88*a*08 on FIG. 88*a* are concerned with the generation of signal (H) TRANSACTION ENABLE on line 88*a*01 which is supplied, as indicated, to the connected user device. As will be recalled from the explanation of the Versatile Bus Interface Logics to User Interface in section 6, the logical High condition of signal (H) TRANSACTION ENABLE indicates that the Versatile Bus Interface Logics are capable of accepting a User's master arbitration identification code from the connected User device and will, upon the Versatile Bus becoming not busy, utilize such arbitration identification code to arbitrate for ownership of the Versatile Bus for a communication transaction. Signals input on lines 88*a*03 and 88*a*05 to AOI 2-2-2 logical element 88*a*08 are concerned with disabling the logical High, or true, transmission of signal (H) TRANSACTION ENABLE in the event that initiation of a new transaction is unacceptable due to the pendency of arbitration. The presence of a logical Low signal (L) ARB BUSY on line 118*b*01, meaning that arbitration upon the Versatile Bus by this Versatile Bus Interface Logics is already in progress, is sufficient to enable NA2 gate 88*a*02 and NA4 gate 88*a*04, respectively causing logical highs on lines 88*a*03 and 88*a*05, and enabling gate AOI 2-1-1 8808 producing a logica Low signal (H) TRANSACTION ENABLE on line 88*a*01. If a transaction is already pending, but possibly not yet a progress, then signal (L) INIT TRANS LATCH on line 88*c*05 will be a logical Low, satisfying NA2 gate 88*a*02 and emplacing a logical High signal on line 88*a*03. If this initiated transaction is still pending due to the existence of a Busy signal upon the Versatile Bus, such as results in the logical Low condition of signal (L) BUSY (IN) on line 88*b*05, or the attempt of the current Versatile Bus Interface logics to so initiate a Busy signal upon the Versatile Bus which results in a logical Low condition for signal (L) INIT BUSY EN on line 118*a*01, then NA4 gate 88*a*04 will be satisfied, the resultant logical High signal level on line 88*a*05 in conjunction with the previously occurring logical High signal level on line 88*a*03 will satisfy AOI 2-2-2 88*a*08 and again produce the logical Low, disabling, occurrence of signal (H) TRANSACTION ENABLE on line 88*a*01. Signals (L) 0 GPS on line 126*b*19 and (L) 1 GPS on line 126*b*15 as applied to NA2 88*a*06 will produce a logical Low signal level on line 88*a*07 if arbitration is configured to transpire across more than 0 or 1 groups, or cycles. Occurrence of multicycled arbitration while the initiate transaction latch is still set as represented by the occurrence of a logical Low condition of signal (L) INIT TRANS LATCH on line 88*e*05 will again result in the simultaneous satisfaction of NA2 gate 8802 and NA4 gate 88*a*04, logical High signals on lines 88*a*03 and 88*a*05, the satisfaction of AOI 2-2-2 gate 88*a*08 and the resultant drive of signal (H) TRANSACTION ENABLE on line 88*a*01** in the logical Low, or disabling, state.

The logical High condition of signal (H) INIT BUSY (OUT) on line **118*a*03 represents the transmission of a Busy signal upon the Versatile Bus by the current Versatile Bus Interface Logics. If this condition is accompanied by either the logical High condition of signal (H) SID BUSY on line 118*b*03 or the logical High condition of signal (H) DATA BUSY on line 118*b*05, then AOI 2-2-2 logical gate 88*a*08 will be enabled and a logical Low signal (H) TRANSACTION ENABLE on line 88*a*01 will result. In summary, the signal (H) TRANSACTION ENABLE will be transmitted in the logical Low, or disabling state, to the connected User device if an arbitration is in progress or is pending, or the Versatile Bus is being driven Busy as would attend multicycled execution of the activities of slave identification/-function and/or data. When no arbitration is pending or in progress, the signal (H) TRANSACTION ENABLE will assume the logical High, transaction enabling, condition upon the occurrence of a logical Low condition for signal (H) INIT BUSY (OUT) on line 118*a*03. Since the busy condition is driven upon the Versatile Bus during clock $\phi$2, the signal (H) TRANSACTION ENABLE will assume the logical High condition during that phase in sufficient time so that no bus communication cycles will ever be wasted. Responsively to the logical High, enabling, condition of signal (H) TRANSACTION on line 88*a*01 the User may subsequently respond with a logical High of signal (H) INT TRANS on line 88*b*13 during the next subsequent clock $\phi$1**.

9.3.3. Initialization of the Versatile Bus Interface Logics

Continuing in the detailed logical explanation of the SEND CONTROL logics **86*b*14, the logical elements as appear in FIG. 88*b* are concerned with the initialization of the Versatile Bus at the sites of each interconnected Versatile Bus Interface Logics, and such as is accomplished through an interface to the VM Node/-maintenance processor. The signal (H) BUSY (IN) on line 128*k*01 is one of the thirty-seven signals received from the Versatile Bus by the DRIVER/RECEIVER elements. As with all signals representing received data upon the Versatile Bus Interface, this signal becomes valid during clock $\phi$2 and remains so until the following clock $\phi$2. Therefore this signal, as with all Versatile Bus received input signals, must be captured by gating during clock $\phi$1. It is so captured upon the logical High occurrenceof signal (H) $\phi$1 (12) on line 13425 in the BUSY IN LATCH consisting of cross-coupled logical elements AOI 2-1 88*b*02 and AOI 2-1 88*b*04. An inversion of signal (H) BUSY IN on line 128*k*01 occurring in IN1 element 88*b*06 is supplied as signal (L) BUSY (IN) on line 88*b*05 to the RECEIVE CONTROL functional subsection. The set side signal condition of the BUSY IN LATCH on line 88*b*13 is similarly inverted in IN1 88*b*08 and supplied to the VM Node/maintenance processor as signal (H) BUS BUSY on line 88*b*03**.

Continuing in FIG. **88*b*, management of the BUSY signal upon the Versatile Bus is provided through signal (L) BUSY (OUT) on line 88*b*01 as is driven by AOI 2-2-2 logical element 88*b*10. Similar to input signal (H) BUSY (IN) on line 128*k*01 received during clock $\phi$2 to clock $\phi$2 from one of the thirty-seven DRIVER/-RECEIVER logical elements, signal (L) BUSY (OUT) on line 88*b*01 is one of thirty-seven clock $\phi$1 to clock $\phi$1 output signals which cause the corresponding DRIVER/RECEIVER elements to drive the Versatile Bus lines during the intervening clock $\phi$2 period. during normal operational communication management of the BUSY signal upon the Versatile Bus, the signal (H) INIT ($\phi$1-$\phi$1) on et 88*b*07 from the VM Node/maintenance processor is logically Low, disabling the rightmost two AND gates on the input to logical element AOI 2-2-2 88*b*10. The normally logically Low condition of this signal (H) INIT ($\phi$1-$\phi$1) on line 88*b*07 is inverted in IN1 and supplied as an enabling logical High condition on line 88*b*15 to the left-most input AND gate of AOI 2-2-2 88*b*10. A clock $\phi$1 logically High occurrence of signal (H) INIT BUSY (OUT) on line 88*a*03 thusly satisfies this left-most AND gated input to logical element AOI 2-2-2 88*b*10 and produces a logically Low, true, output condition of signal (L) BUSY (OUT) on line 88*b*01**.

The remaining logical function in FIG. **88*b* has to do speicfically with the initialization of the Versatile Bus as is accomplished from the VM Node/maintenance processor. Commencing initialization, the logical High occurrence of signal (H) INT ($\phi$1-$\phi$1) on line 88*b*07 disables through IN1 88*b*12 and the resultant logical Low signal on line 88*b*15 any recognition of normal bus busy signal (H) INIT BUSY (OUT) within logical element AOI 2-2-2 88*b*10. During the duration of the logically High level of signal (H) INIT ($\phi$1-$\phi$1) on line 88*b*07, the clock $\phi$1 to clock $\phi$1 logically High occurrence of signal (H) IDENTIFY SLAVES ($\phi$1-$\phi$1) on line 88*b*09 satisfies the middle AND gate input to logical element AOI 2-2-2 and resulting produces a single, clock $\phi$1 to clock $\phi$1, logical Low going pulse of signal (L) BUSY (OUT) on 88*b*01. The clock $\phi$1 to clock $\phi$1 logical High occurrence of signal (H) IDENTIFY SLAVES ($\phi$1-$\phi$1) on net 88*b*09 is similarly inverted in logical element NA2 88*b*14, passed via line 88*b*17 to IN1 88*b*16, and then via line 88*b*19 as a first input to a latch consisting of cross-coupled AOI 2-1 logical elements 88*b*18 and 88*b*20. The logical High clock $\phi$1 to clock $\phi$1 occurrence of a signal on line 88*b*19 is ANDed with the intervening clock $\phi$2 logical High occurrence of signal (H) $\phi$2 (6) on line 13439 to enable the setting of this latch consisting of AOI 2-1 logical elements 88*b* 18 and 88*b*20. The resulting logical High signal on line 88*b*23 will, at the occurrence of the clock $\phi$1 logical High signal (H) $\phi$1 (12) on line 13425 enable the clearing of a latch consisting of cross-coupled AOI 2-1 logical elements 88*b*22 and 88*b*24. This cleared state means thata constant logical High signal is present upon line 88*b*25. Meanwhile, responsively to the clock $\phi$1 to clock $\phi$1 logical Low occurrence of signal (L) BUSY (OUT) on line 88*b*01 as is routed to the Busy DRIVER/-RECEIVER element, the signal (H) BUSY (IN) on line 128*k*01 as received from the same Busy DRIVER/-RECEIVER element will be logically High for a clock $\phi$2 to clock $\phi$2 period commencing with the drive of the busy line upon the Versatile Bus. When the BUSY IN LATCH consisting of cross-coupled AOI logical elements 88*b*02 and 88*b*04, is, at the intervening clock $\phi$1 time, set responsively thereto such signal, then a logical Low signal will result on net 88*b*13. This logical Low signal on net 88*b*13 is insufficient to satisfy logical element NO2 88*b*26 during the continuing presence of a logical High signal on line 88*b*25. Therefore the signal upon line 88*b*27 will remain a logical Low and but a single clock $\phi$1 to clock $\phi$1 logical Low pulse of signal (L) BUSY (OUT) on line 88*b*01 will have been driven responsively to the clock $\phi$1 to $\phi$1 logically High occurrence of signal (H) IDENTIFY SLAVES ($\phi$1-$\phi$1) on line 88*b*09 at these receiving Versatile Versatile Bus Interface Logics. When time signal (H) IDENTIFY SLAVES ($\phi$1 -$\phi$1) on line 88*b*09 returns to the logical Low condition, ultimately causing a logical Low signal condition on net 88*b*19, then NO2 logical element 88*b*28 cannot be satisfied to produce a logical High signal on net 88*b*31 because the remaining gating signal, as is supplied on net 88*b*29, will in the logical High condition responsive to the setting of the BUSY IN LATCH will not assume the logical Low condition until the next following clock $\phi$1. Therefore the latch consisting of cross-coupled AOI 2-1 logical elements 88*b*18 and 88*b*20, and the latch consisting of cross-coupled logical elements AOI 2-1 88*b*22 and 88*b*24, will remain in their respective set and cleared conditions. Therefore this Versatile Bus Interface Logics receiving the clock $\phi$1 to clock $\phi$1 logical High condition of signal (H) IDENTIFY SLAVES ($\phi$1-$\phi$1) will have output only one cycle time (40 nanoseconds) of the BUSY signal upon the Versatile Bus responsively thereto such At all other Versatile Bus Interface Logics such as receive neither signal (H) IDENTIFY SLAVES ($\phi$1-$\phi$1) on line 88*b*09 nor signal (H) CONFIG. STORED ($\phi$1-$\phi$1) on line 88*b*11 then NO2 logical element 88*b*14 is not satisfied, a logical High signal appears on line 88*b*17, and the inversion of such signal in IN1 logical element 88*b*16 results in a logical Low signal upon line 88*b*19. This logical Low signal upon line 88*b*19 will be combined with the logical Low signal occurring on line 88*b*29 (resultant from the receipt of a logical High signal (H) BUSY (IN) on line 128*k*01 as sets the BUSY IN LATCH) in NO2 logical element 88*b*28. The resultant logical High on line 88*b*31 is combined with the clock $\phi$2 logical High-going pulse (H) $\phi$2 (6) on line 3439 to clear the latch consisting of cross-coupled AOI 2-1 elements 88*b*18 and 88*b*20 upon clock $\phi$2. Upon the next clock $\phi$1, occurring as a logical High condition of signal (H) $\phi$1 (12) on line 13425, the latch consisting of cross-coupled AOI 2-1 logical elements 88*b*22 and 88*b*24 will be set, thereby emplacing a logical Low signal on line 88*b*25. This logical Low signal on line 88*b*25 in combination with the logical Low signal on Net 88*b*13 from the BUSY IN LATCH results in satisfaction of NO2 logical element 88*b*26 and a logical High signal on line 88*b*27. Therefore, during the duration of a logical High condition of signal (H) INIT ($\phi$1-$\phi$1) on line 88*b*07, each successive receipt of signal (H) BUSY (IN) on line 128*k*01 in the logically High condition, indicating BUSY upon the Versatile Bus, will maintain the BUSY IN LATCH in the set condition and result, through NO2 logically element 88*b*26, line 88*b*27, and AOI 2-2-2 logical element 88*b*10 in successive repetitive provisions of signal (L) BUSY (OUT) in the logical Low condition upon line 88*b*01**.

At such Versatile Bus Interface Logics as are repetitively driving the true condition of the BUSY signal upon the Versatile Bus responsively to the logical Low condition of signal (LO BUSY (OUT) on line **88*b*01, the logical High occurrence of signal (H) CONFIGU STORED ($\phi$1-$\phi$1) on line 88*b*11 will suffice to terminate this repetitive drive. Similar to the way that the logical High condition of signal (H) IDENTIFY SLAVES ($\phi$1-$\phi$1) on line 88*b*09 acted through NO2 logical element 88*b*14, line 88*b*17, IN1 logical element 88*b*16, and line 88*b*19 to set the latch consisting of cross-coupled logical elements AOI 2-1 88*b*18 and 88*b*20 and to clear the latch consisting of cross-coupled logical elements AOI 2-1 88*b*22 and 88Pi b24, the logical High occurrence of signal (H) CONFIG STORED ($\phi$1-$\phi$1) on line 88*b*11 will ultimately result in the maintenance of a logical High signal level on line 88*b*25. This logical high signal level will result in a failure to satisfy NO2 logical element 88*b*26 and a logical Low signal condition on line 88*b*27 regardless of the occurrence of a logical Low signal condition on line 88*b*27 regardless of the occurrence of a logical High condition for signal (H) BUSY (IN) on line 128*k*01 and the resultant setting of the BUSY IN LATCH providing a logical Low signal on line 88*b*13. Therefore, after the logical clock $\phi$1 to clock $\phi$1 logical High going occurrence of signal (H) CONFIG STORED ($\phi$1-$\phi$1) on line 88*b*11, the signal (L) BUSY (OUT) on line 88*b*01** will cease to be driven in the logical Low condition, thereby causing no drive of the true state of the BUSY signal upon the Versatile Bus.

9.3.4. Initiate Transaction

Continuing in the Send Control Logics **86*b*14 as is shown in FIG. 88, FIG. 88*c* and FIG. 88*d* are best considered jointly. The clock $\phi$1 to clock $\phi$1 logical High occurrence of signal (H) INIT TRANS on line 88*d*13 received from the User enables AOI 2-1 logical element 88*d*04 to produce a logical Low signal on line 88*d*09, which signal is inverted by IN1 logical element 88*d*06 and supplied as a logical High signal (H) INIT TRANS on line 88*d*07. This process represents initiation of a User request to commence a transaction upon the Versatile Bus. The logical High occurrence of signal (H) INIT TRANS on line 88$d$13 is also supplied to NO3 logical element 88$d$02 in conjunction with signal (H) LOST FF ($\phi$1) on line 88$f$09 and signal (H) START SID on line 88$h$05. This NO3 logical element 88$d$02 is satisfied for the simultaneous logical High occurrence of all three signals such as respectively mean the initiation of a transaction from the User, the absence of any lot condition from the WON/LOST latch and the ability to commence the slave identification/function activity as would indicate the successful disposition of any prior arbitration activity. The concurrence of these events is nessary to enable the receipt of an additional master's arbitration identification code from the User, such as is accomplished under gating control of the logical Low level of signal (L) LOAD GROUP COUNTER on line 88$d$05. The logical High level of signal (H) AUTO RETRY on line 88$d$15 as provided by the User, in combination with the clock $\phi$1 to clock $\phi$1 logical High occurrence of signal (H) LOST FF ($\phi$1) on line 88$f$09 suffices to satisfy AOI 2-1 logical element 88$d$04 identically to the occurrence of a logical High clock $\phi$1 to clock $\phi$1 signal (H) INIT TRANS on line 88$d$13**. Thusly, User exercise of the auto retry capability of the Versatile Bus interface Logics in the face of a lost arbitration attempt upon the Versatile Bus suffices to substitute for the reinitialization of a normal request to initiate a transaction upon the Versatile Bus.

Following signal (H) INIT TRANS on line 88$d$07 to its utilization within FIG. 88$c$ as an input to NO2 logical element 88$c$12, and as a set side input to the INIT TRANS LATCH consisting of a cross-coupled AOI 2-1 logical element 88$c$08 and AOI 2-1-1 logical element 88$c$10, the clock $\phi$1 to clock $\phi$1 logical High occurrence of such signal (H) INIT TRANS on line 88$d$07 is gated by the intervening clock $\phi$2 logical High occurrence of signal (H) $\phi$2 (6) on net 13439 to set the INIT TRANS LATCH. The respective set side and clear side signal outputs of this INIT TRANS LATCH on lines 88$c$05 and 88$c$13 are respectively inverted in IN1 logical elements 88$c$22 and 88$c$24 and supplied to remaining logics as respective signal (H) INIT TRANS FF on line 88$c$07 and (L) INIT TRANS FF on line 88$c$09. This clock $\phi$2 setting of the INIT TRANS LATCH will enable the capture of the User's master identification code and the setting of the group count register to a count of 1. The INIT TRANS LATCH will remain set until the occurrence of a not busy condition upon the Versatile Bus as results in the clock $\phi$2 to clock $\phi$2 logical Low condition of signal (H) BUSY (IN) on line 128$k$01. The logical Low condition of signal (H) BUSY (IN) on line 128$k$01 in conjunction with the logical Low condition existing for signal (L) INIT TRANS LATCH on line 88$c$05, due to the setting of the INIT TRANS LATCH, will result in the satisfaction of NO2 logical element 88$c$02 and the occurrence of a logical High signal level on line 88$c$15. This logical High signal is gated upon clock $\phi$1 by the logical High occurrence of signal (H) $\phi$1 (12) on line 13425 to set the BEGIN (OUT) LATCH consisting of cross-coupled AOI 2-1 logical element 88$c$04 and AOI 2-1-1 logical element 88$c$06. The respective set side and clear side outputs of this BEGIN (OUT) LATCH on respective lines 88$c$17 and 88$c$19 are respectively inverted in IN1 logical elements 88$c$18 and 88$c$20 to be supplied to remaining Versatile Bus Interface Logics as respective signal (H) BEGIN (OUT) FF on line 88$c$01 and (L) BEGIN (OUT) FF on line 88$c$03. The clock $\phi$2 setting of the BEGIN (OUT) LATCH emplaces a logical Low signal on line 88$c$17 which is combined with the now logical Low condition of signal of (H) INIT TRANS on line 88$d$07 in NO2 logical element 88$c$12 to produce a logical High signal on line 88$c$21. The next intervening clock $\phi$2, resulting in the logical High occurrence of signal (H) $\phi$2 (6) on line 13439, gates this logical High signal condition on line 88$c$21 to accomplish the clearing of the INIT TRANS LATCH. This cleared condition of the INIT TRANS LATCH will result in a logical high signal condition on line 88$c$05 and the resultant disablement of NO2 logical element 88$c$02. Consequently upon the next occurrence of clock $\phi$1, represented by a logical High condition for signal (H) $\phi$1 (12) on line 13425, the BEGIN (OUT) LATCH will be cleared. This means that signal (L) BEGIN (OUT) FF on line 88$c$03 had assumed the logical Low condition from clock $\phi$1 to clock $\phi$1. This signal is supplied to the DRIVER/RECEIVER element for subsequent drive upon the Versatile Bus as is noted by the "DR" notation in signal routing. As before stated, this clock $\phi$1 to clock $\phi$1 duration of signals supplied to the DRIVER/RECEIVER logical elements in order to cause the associated drive upon the Versatile Bus is standard. Therefore, the summary effect to this point of the initiation of a transaction from the User by the clock $\phi$1 to clock $\phi$1 logical High occurrence of signal (H) INIT TRANS on line 88$d$13 is that, upon such time as the Versatile bus was not busy, a single $\phi$1 to $\phi$1 logical Low occurrence of signal (L) BEGIN (OUT) FF was utilized to cause the connected DRIVER/RECEIVER element to emplace a logically true BEGIN signal upon the Versatile Bus.

The occurrence of a BEGIN signal upon the Versatile Bus, whether driven by this individual Versatile Bus Interface Logics and/or other connected Versatile Bus Interface Logics in a wired-OR fashion, results in the clock $\phi$2 to clock $\phi$2 logical high occurrence of signal (H) BEGIN (IN) on line 128$c$01. This logical High signal is gated by the intervening clock $\phi$1 occurrence of a logical High condition for signal (H) $\phi$1 (12) on line 13425 to set the BEGIN IN LATCH consisting of cross-coupled AOI 2-1 logical element 88$c$14 and AOI 2-1 logical element 88$c$16. The signal (H) BEGIN (IN) on line 128$c$01 is also inverted in IN1 logical element 88$c$26 and provided to remaining Versatile Bus Interface Logics as signal (L) BEGIN (IN) on line 88$c$13. The clear side signal output of the BEGIN IN LATCH on line 88$c$23 is inverted in IN1 logical element 88$c$28 and supplied as signal (L) BEGIN (IN) FF on line 88$c$11. Since the BEGIN IN LATCH will become cleared upon the first clock $\phi$1 occurrence of a logical High condition for signal (H) $\phi$1 (12) on line 13425 wherein no begin condition exits upon the Versatile Bus and a logical Low is thusly present for signal (H) BEGIN (IN) on line 128$c$01, the signal (L) BEGIN (IN) FF online 88$c$11 will exhibit a clock $\phi$1 to clock $\phi$1 duration, whereas the signal (L) BEGIN (IN) on line 88$c$13 will maintain the same clock $\phi$2 to clock $\phi$2 duration as was present for signal (H) BEGIN (IN) on line 128$c$01. This concept that a level-sensitive latch produces a 20 nanosecond phase shift of a signal is typical within the Versatile Bus Interface Logics.

9.3.5. Termination of Arbitration and Capture of the Winner's Master Arbitration Identification Code continuing in FIG. 88$d$, the somewhat isolated logical elements s14 88$d$08 and IN1 88$d$10 are involved in a termination of the arbitration activity, such activity as transpires responsively to the occurrence of the setting of the INIT TRANS flip-flop, and such as has not yet been dealt with. Nonetheless, the function of S14 logical element **88*d*08 is that signals (H) GKR 1 through (H) GKR 8 on cable 91*a*03 as represent the Group Count Register counts during the conduct of an arbitration activity and such as are derived, as indicated, from the Group Count and Shift functional subsection of the arbitration functional section—will be selected under the control of respective least significant and most significant select signals (H) ARB SEL 0 on line 88*h*03 and (H) ARB SEL 1 on line 88*h*01. The two signals (H) ARB SEL 0 on line 88*h*03 and (H) ARB SEL 1 on line 88*h*01 simply encode the four possible group configurations of arbitration within the preferred embodiment of the invention, that is, arbitration configured at either 1, 2, 4 or 8 groups. Selection of the arbitration group counter register signals, such as will later be discussed in the explanation of the arbitration functional section, by the arbitration configuration will allow recognition of the terminus condition of the arbitration functional activity upon the Versatile Bus. The termination of the arbitration activity will result in a logical High output signal on line 88*d*11, which signal is inverted in IN1 logical element 88*d*10 and supplied to remaining Versatile Bus Interface Logics as a logical Low signal (L) TERM ARB ($\phi$2) on line 88*d*01**.

Similarly somewhat isolated logical element **S12 88*d*12 is involved with the capture of the winner's master identification code from the arbitration activity in the event that no slave identification/function activity is configured to be performed upon the Versatile Bus. Logical element S12 88*d*12 is selected by signal (L) 0 SID CYC on line 126*d*19. The logical Low condition of this signal (L) 0 SID CYC on line 126*d*19 indicates that there is no slave identification/function activity configured to be performed and the winner's master identification code must be captured during the first cycle of data activity. The logical Low occurrence of signal (L) WAIT DELAY FF ($\phi$2) on line 114*b*04, which will not occur until the 40 nanosecond occurrence of the wait operation, if such should occur, is correspondingly then grated through logical element S12 88*d*12 as output signal (L) EN WIDR on line 88*d*03. This selection means that the winner's master arbitration identification will be timely captured upon the first data cycle when there have been no slave identification/function cycles. Conversely, if signal (L) 0 SID CYC on line 126*d*19 is a logical High indicating the conduct of some cycles of slave identification/function activity upon the Versatile Bus, then signal (L) SCK=1 ($\phi$2) on line 115*a*13 will be selected by S12 logical element 88*d*12 to be output as signal (L) EN WIDR on line 88*d*03. The signal (L) WAIT DELAY FF ($\phi$2) on line 114*b*05 is, as is indicated, from the data cycle counter control functional subsection of the received counter control functional section. Similarly signal (L) SCK=1 ($\phi$2) on line 115*a*13 is from, as indicated, the cycle counter functional subsection of the receive counter control functional section. These signals are simply involved in these cycle counter control management of the associated activities, and are logical Low going at appropriate points upon which to capture the winner's master identification through the logical Low condition of signal (L) EN WIDR on line 88*d*03**.

9.3.6. Initialization and Shift Control of the Arbitration Group Counter

Continuing with the detailed logical explanation of the Send Control logics **88*b*14 as are shown within FIG. 88, some logics concerned with the initialization and enablement of the arbitration group counter prior to commencing arbitration and the capture and disassembly of the master arbitration identification code fro the User are shown in FIG. 88*e*. Momentarily referencing FIG. 88*d*, the clock $\phi$1 to clock $\phi$1 logical high occurrence of signal (H) INIT TRANS on line 88*d*13 will result in a like clock $\phi$1 to clock $\phi$1 logical Low signal on line 88*d*09. Returning to FIG. 88*e*, the logical Low signal on line 88*d*09 will, in conjunction with logically Low signal (H) 0 GPS on line 126*b*17 satisfy NO2 logical element 88*e*02 and produce a logical High signal (H) SET GP COUNTER=1 on line 88*e*01. The logical Low signal on line 88*d*09 will also satisfy NA2 logical element 88*e*04 and subsequently enable NA2 logical element 88*e*06 to produce a logical Low signal (L) ENABLE GP COUNTER on line 88*e*03. The logical Low signal on line 88*d*09 will finally satisfy NA2 logical element 88*e*10, and subsequently NO2 logical element 88*e*12, and result in a logical Low signal (L) EN MIDR on line 88*e*07. Thusly the initiation of a transaction via logical High going clock $\phi$1 to clock $\phi$1 signal (H) INIT TRANS on line 88*d*13 from the User has resulted, in the configuration of some groups of arbitration, in the setting of the group counter to equal one via logical High occurrence of signal (H) SET GP COUNTER=1 on line 88*e*01, in the enabling of the group counter via the logical Low occurrence of signal (L) EN GP COUNTER on line 88*e*03, and in the enabling of the capture of the User master arbitration identification code into the master identification register of the Versatile Bus Interface Logics via the logical Low occurrence of signal (L) EN MIDR on line 88*e*07. Signals (L) TEST-LOOP F on line 13719 and (L) TEST-LOOP D on line 13713 as are respectively input to NA2 logical element 88*e*04 and NA2 logical element 88*e*10 are involved in scan/set testing and are not relevant to the current explanation of the logical function of the Versatile Bus Interface Logics. Signals MIDR on line 88*e*07, (H) SHIFT MIDR X4 on line 88*e*09, and (H) SHIFT MIDR X2 on line 88*e*11 are involved with the disassembly of the eight bit arbitration identification code supplied by the User and lodged within the master identification register of the Versatile Bus Interface Logics in the conduct of arbitration configured for multiple groups, which thus require multiple multiple cycles of time-phased arbitration upon the Versatile Bus. Various signals input from the configuration translation subsection of configuration control on lines 126*b*17 through 126*d*21 concern the configuration of the Versatile Bus for various numbers of arbitration groups, arbitration lines per group, and pipelining or multiplexing. These conditions are translated in logical elements 88*e*12 through 88*e*24 to control the shifting of the User's master arbitration identification code as is lodged in the master identification register functional subsection of the arbitration functional section. For example, the logical High occurrence of signal (L) MPX on line 126*b*27, indicating no configuration for multiplexing, in conjunction with either the logical High condition of either signal (H) 1 L/G on line 126*a*19 or signal (H) 2 L/G on line 126*a*15, as respectively indicate configuration for one or two arbitration lines per cycle, will suffice to satisfy AOI 2-2 logical element 88*e*14. The resultant logical Low signal on line 88*e*13 will not allow the satisfaction of AOI 2-1 logical element 88*e*12 by the logical High occurrence of signal (H) ARB IN PRO ($\phi$1) (2) on line 88*g*03. Conversely, if arbitration is accomplished as time multiplexed, or at other than one or two lines per group, then the logical High signal on line 88*e*13, in conjunction with the logical High occurrence of signal (H) ARB IN PRO (φ1) (2) on line 88*g*03 will satisfy logical element AOI 2-1 88*e*12 and result in the logical Low output of signal (L) EN MIDR on line 88*e*07. The utilization of this logically Low condition of signal (L) EN MIDR on line 88*e*07, and the logical High conditions of signal (H) SHIFT MIDR X4 on line 88*e*09 and (H) SHIFT MIDR X2 on line 88*e*11 as attend certain four and eight line per group configurations for arbitration, may be assessed by momentary reference to FIG. 92. Within FIG. 92***a*, it may be noted that the logical Low condition of signal (L) EN MIDR on line 88*e*07, in conjunction with the logical Low occurrence of clock φ2 as signal (L) φ2 on line 13727, gates the bnary shift matrix 92*a*02 into the master identification register 92*a*04. Also observable within FIG. 92, the utilization of signals (H) SHIFT MIDR X2 on line 88*e*11, (H) SHIFT MIDR X4 on line 88*e*09, and (H) INIT TRANS on line 88*d*11 as respective shift count inputs two, four, and eight to binary shift matrix 92*a*02 may be observed. The scheme being implemented by these control signals has to do with the eventual utilization of the master identification register bits collectively output on cable 92*a*01. These master identification register bits will be directly selectable by the arbitration configuration for appropriate output upon the Versatile Bus in the event of one or two arbitration lines per group. During the utilization of such User's master arbitration identification code as is lodged within master identification register 92*a*04 for arbitration upon the Versatile Bus at one or two arbitration lines per group, it is, of course, desirous that the arbitration register 92*a*04 will not be gated. This is effected by the logical High condition of signal (L) EN MIDR on line 88*e*07. Conversely, the User's master arbitration identification code needs be shifted in the loop consisting of the master arbitration identification register 92*a*04, the slave master arbitration identification register 92*b*02, and the binary shift matrix 92*a*02, during the occurrence of arbitration at four or eight lines per group. The logical High occurrence of signal (H) SHIFT MIDR X4 on line 88*e*09 will be utilized in justification of the arbitration code identification word occurring during arbitration at eight lines per group. The logical High condition of signal (H) SHIFT MIDR X2 on line 88*e*11 will be utilized in justification of the eight bit arbitration identification word occurring at arbitration at four lines per group. Upon such justification shifting as occurs in binary shift matrix 92*a*02 under the control of these signals, it is subsequently necessary to gate the shifted quantity into the master arbitration identification register 92*a*04 under control of the logically Low condition of signal (L) EN MIDR on line 88*e*07. This is accomplished through the logical High condition of signal (H) ARB IN PRO (φ1) (2) as satisfies AOI 2-1 logical element 88*e*12 and as additionally satisfies NO2 logical element 88*e*06.

Some discussion of the concept of counters within the Versatile Bus Interface Logics is useful before proceeding from FIG. 88*e* to further figures. The generation of the logical Low condition of signal (L) LOAD GROUP COUNTER on line 88*d*05, the logical High condition of (H) SET GP COUNTER=1 on line 88*e*01, and the logical Low condition of signal (L) EN GP COUNTER on line 88*e*03, have already been observed. Momentarily referring to FIG. 88*d*, signals (H) GKR 1 through (H) GKR 8 on cable 91*a*03 as are derived from the arbitration group counters, signal (L) SCK=1 (φ2) on line 115*a*13 as is derived from the cycle counter (slave identification/function activity related) and the signal (L) WAIT DELAY FF (φ2) on line 114*b*05 as is derived from the data cycle counter control functional section have already been observed. The concept of counters for the conduct of activities of arbitration, slave identification/function, wait, and data, upon the Versatile Bus is such that such counters should control the configured number of cycles utilized in the performance of each of these activities. In the introduction to the Send Control Logics 86*b*14 at the beginning of this specification section, certain latches related to the activity states of arbitration, slave identification/function, wait and data were identified. The counting such as occurs in the counters controls the advancement from one activity upon the Versatile Bus to the next. The arbitration cycle counter is capable of counting up to eight cycles in the conduct of time-phased arbitration, during the duration of which the ARB IN PRO LATCHes shown within FIG. 88*g* will remain set. Upon conclusion of arbitration, the SID IN PRO LATCHes shown in FIG. 88*i* will be enabled and the SID cycle counter will commence to count up to eight cycles of slave identification/function upon the Versatile Bus. At the conclusion of the configuration controlled number of slave identification/function cycles upon the Versatile Bus, the wait latch shown in FIG. 88*j* would be enabled if the wait activity is configurably selected. There is no wait counter, the wait latch sufficing to perform this function, because wait is always but a single 40 nanosecond communication cycle upon the Versatile Bus. Simultaneous with (pipelined) or subsequent to (multiplexed) the wait activity, the data latches shown in FIG. 88*k* will become set for the duration of up to sixteen cycles of data activity upon the Versatile Bus as will be registered in the data counter. Therefore the progressive sequencing of activities arbitration, slave identification/function, wait, and data, upon the Versatile Bus will occur at such times as the cycle counters respectively associated with arbitration, slave identification/function, wait and data, indicate that the next activity is in time sequence enabled. As was previously stated, extensive logics within the Send Control 86*b*14 surrounding the ARB IN PRO LATCHes, the SID IN PRO LATCHes, the WAIT IN PRO LATCHes, and the DATA IN PRO LATCHes, is concerned with the enabled, time-sequenced and sequential consecutive setting, maintenance, and clearing of these latches. The duration of time in which the ARB IN PRO LATCHes, the SID IN PRO LATCHes, and the DATA IN PRO LATCHes will be maintained set is respectively related to the countdown occurring in the ARB COUNTER, SID COUNTER and the DATA COUNTER.

9.3.7. Arbitration Won/Lost Latches

Continuing with a detailed logical analysis of the Send Control Logics 86*b*14 as are shown in FIG. 88, the WON/LOST LATCHes and associated control are shown in FIG. 88*f*. During the conduct of the arbitration activity upon the Versatile Bus, these latches are established in a condition which indicates that it has either been won or lost by the present Versatile bus Interface Logics. During the time of conducting time-phased arbitration upoin the Versatile Bus, the arbitration functional section will build a mask quantity within which for any arbitration line most significant arbitration Group Line 0 through least significant arbitration Group Line 7, upon which the present arbitrating Versatile Bus Interface Logics can lose arbitration upon the appearance of a logical "1", or true condition, upon such line, then there will be a set, or logical "1", condition of the associated bit within such mask. Such an eight bit mask is distributed to AOI 2-2 logical elements **88*f*02 through 88*f*08 as signals (H) MASK REG-BIT 0 through (H) MASK REG-BIT 7 on cable 89*a*07. At the same time the eight arbitration group line input signals are likewise distributed to AOI 2-2 logical elements 88*f*02 through 88*f*08 as signals (H) SEL GL IN-BIT 0 through (H) SEL GL IN-BIT 7 on cable 89*d*05. If a signal associated with a mask register bit is ever a logical High, indicating sensitivity to such bit within the current cycle time of arbitration at the current Versatile Bus Interface Logics, at the same time as received arbitration group line signal is a logical High, indicating that another arbitrating Versatile Bus Interface Logics has arbitrated, in that arbitration Group Line position, at a higher priority than the current device, then the associated AND gate within the input to AOI 2-2 logical elements 88*f*02 through 88*f*08 will be satisfied, and the logical Low signal output on one(s) of line 88*f*11 through 88*f*17 will satisfy NA4 logical element 88*f*10. The resultant logical High signal on net 88*f*19 will, in combination with the logical Low signal on net 88*g*05 resulting from the setting of the ARB IN PRO LATCH φ2 and the logical Low occurrence of signal clock φ1 as represented by signal (L) φ1 on line 13401 jointly satisfying NO2 logical element 88*f*12 and emplacing a logical High signal on line 134*f*21, cause the WON/LOST LATCH φ1 consisting of cross-coupled AOI 2-1 logical element 88*f*14 and AOI 2-1-1 logical element 88*f*16 to set. This set condition represents the loss of arbitration. The function of NO2 logical element 88*f*12 is not only to control the gating of the WON/LOST LATCH φ1 upon the occurrence of a clock φ1 signal, but also to disable this latch should this particular Versatile Bus Interface Logics not be in the process of arbitration. The occurrence of a logical High signal on line 88*f*19 indicating the loss of arbitration, in conjunction with the current performance thereof represented by a logical High signal on line 134*f*21, are used in satisfaction of AOI 2-1 logical elements 88*f*20 and 88*f*22. The resultant logical Low signals (L) INH 0-3 on line 88*f*01 and (L) INH 4-7 on line 88*f*03 are utilized at the point of providing the next signals, representative of the arbitration group lines to be next driven, to the DRIVER/-RECEIVER elements in order to force such to an all "1", or no arbitration code condition. These signals are developed in order that time-phase arbitration in progress may be timely ceased by and withdrawn from, by the present arbitrating Versatile Bus Interface Logics upon that next arbitration cycle from that in which it is recognized that arbitration has been lost. The normal interaction of the WON/LOST LATCHes with the ARB IN PRO LATCHes, such as will be discussed, is insufficiently fast to stop the development of the next cycle arbitration group line drive. Therefore the signals (L) INH 0-3 on line 88*f*01 and (L) INH 4-7 on line 88*f*03*f*** are used to inhibit such drive at the latest possible moment when it becomes recognized, through somewhat time consuming decode of the arbitration group lines, that the current Versatile Bus Interface Logics has just lost.

The logical low signal on line **88*f*23 as results from setting (establishing the arbitration lost state) of WON/-LOST LATCH φ1 is inverted within IN1 logical element 88*f*24 and supplied as the logically High signal (H) LOST FF to the User upon line 88*f*05. Upon the next clock φ2 following the clock φ1 setting of the WON/-LOST LATCH φ1, the logical High occurrence of signal (H) φ2 (6) on net 13439 will gate the WON/-LOST LATCH φ1 set side output on line 88*f*23 and the clear side output on line 88*f*25 to set the WON/LOST LATCH φ2 consisting of cross-coupled AOI 2-1 logical element 88*f*18 and 88*f*20. The resultant logical High signal (H) LOST FF (φ2) on line 88*f*07 will be gated by the logical High occurrence of signal (H) φ1 (10) on line 13421 to satisfy AOI 2-1-1 logical element 88*f*16 and clear the WON/LOST LATCH φ1. Therefore the WON/LOST LATCH φ1 has been set from time clock φ1 to time clock φ1. The logical Low signal resultantly occurring on line 88*f*27 will correspondingly disable AOI 2-1 logical elements 88*f*20 and 88*f*22, and signals (L) INH 0-3 on line 88*f*01 and (L) INH 4-7 on line 88*f*03 will return to the logical High level. The set side output of the WON/LOST LATCH φ1 on line 88*f*23 is also inverted within IN1 logical element 88*f*26 and provided upon line 88*f*09 as signal (H) LOST FF (φ1). The results that arbitration has been lost, as is reflected in the sequential settings of WON/LOST LATCH φ1 and WON/LOST LATCH φ2**, will not only be utilized to clear the arbitration in process latches, as will be shortly discussed, but will also be distributed to prevent the sequential conduct of slave identification/function, wait, and data activities which, should arbitration have been won, might elsewise be conducted by the present Versatile Bus Interface Logics as a master upon the Versatile Bus.

9.3.8. Arbitration in Process Latches

Continuing with the detailed logical explanation of SEND CONTROL logics **86*b*14 as shown in FIG. 88, the ARB IN PRO LATCH φ1 and ARB IN PRO LATCH φ2, which will be set for the duration of the activity of arbitration, are shown in FIG. 88*g*. Upon initiation of a transaction by the User, the logical High signal (H) INIT TRANS FF on line 88*c*07 will be combined with the logical High signal of (L) 0 GPS on line 126*b*19 (representing that arbitration is not configured as a zero groupnullity) in NA2 logical element 88*g*02 to produce a logical Low signal on line 88*g*15. This logically Low signal is clocked by the logical Low occurrence of signal (L) φ1 on line 13401 in NO2 logical element 88*g*06 and supplied as a logical High signal to the set side AOI 2-1 logical element 88*g*08 of ARB IN PRO LATCH φ1. A second utilization of signal (H) BUSY (IN) on line 128*k*01, also shown to be utilized as an input signal within FIG. 88*b*, is utilized to gate the setting of the ARB IN PRO LATCH φ1. A clock φ2 to clock φ2 logical Low occurrence of this signal (H) BUSY (IN) on line 128*k*01, such as indicates the not busy condition upon the Versatile Bus, is inverted in IN1 logical element 86*g*16 and applied via line 88*g*17 as a logical High enabling signal to AOI 2-1 logical element 88*g*08 part of ARB IN PRO LATCH φ1 which also consists of cross-coupled AOI 2-1-1 logical element 88*g*10**.

The set side output signal of ARB IN PRO LATCH φ1 is supplied as a logically Low signal on line **88*g*19 which is inverted in IN1 logical elements 88*g*18 and 88*g*20 and respectively supplied to further Versatile Bus Interface Logics as signal (H) ARB IN PRO (φ1) (1) on line 88*g*01 (H) ARB IN PRO (φ1) (2) on line 88*g*03. Similarly, the clear side logical Low signal output of ARB IN PRO LATCH $\phi 1$ on line 88*g*21 is inverted in IN1 logical element 88*g*22 and supplied to remaining Versatile Bus Interface Logics as signal (L) ARB IN PRO ($\phi 1$) on line 88*g*09. A logically Low signal on line 88*g*19 is also combined with signal (H) LOST FF ($\phi 1$) on line 88*f*25—logically Low until such time as the WON/LOST LATCH $\phi 1$ should become set equaling the loss of arbitration—in NO2 logical element 88*g*04. The resultant logical High signal on line 88*g*23 is supplied to AOI 2-1 logical element 88*g*12, and the inversion of this signal by IN1 logical element 88*g*24 is supplied via line 88*g*25 to the ARB IN PRO LATCH $\phi 2$ consisting of cross-coupled AOI 2-1 logical elements 88*g*12 and 88*g*14. This latch is gated set by the logical high occurrence of signal (H) $\phi 2$ (6) on line 13431. The set side output of this ARB IN PRO LATCH $\phi 2$, a logically low signal when the latch is set, is supplied via line 88*g*05 to IN1 logical element 88*g*26 and thence as signal (H) ARB IN PRO ($\phi 2$) on line 88*g*07 to remaining Versatile Bus Interface Logic. Similarly, the clear side output, a logical High signal when the latch is set, on line 88*g*27 is supplied to IN1 logical element 88*g*28 and thence as signal (L) ARB IN PRO ($\phi 2$) on line 88*g*11** to remaining Versatile Bus Interface Logics.

The setting of the WON/LOST LATCH $\phi 1$ and WON/LOST LATCH $\phi 2$ on FIG. **88*f* will respectively force the ARB IN PRO LATCH $\phi 2$ and ARB IN PRO $\phi 1$ as shown in FIG. 88*g* to the cleared state. When WON/LOST LATCH $\phi 1$ consisting of cross-coupled AOI 2-1 logical element 88*f*14 and AOI 2-1-1 logical element 88*f*16 sets, indicating the loss of arbitration, then the logical High signal (H) LOST FF ($\phi 1$) on line 88*f*25 will disable NO2 logical element 88*g*04 and cause a logical Low signal level on line 88*g*23. This logical Low signal level on line 88*g*23 will be inverted in IN1 logical element 88*g*24 and supplied as a logical High signal on line 88*g*25. Upon the next subsequent occurrence of logical High signal (H) $\phi 2$ (6) on line 13431, the AOI 2-1 logical element 88*g*14 will be satisfied and the ARB IN PRO LATCH $\phi 2$ will be cleared. Therefore the ARB IN PRO LATCH $\phi 2$ has been cleared upon the next subsequent clock $\phi 2$ to that clock $\phi 1$ upon which the WON/LOST LATCH $\phi 1$ was set. Similarly, when WON/LOST LATCH $\phi 2$ next sets upon the occurrence of clock $\phi 2$, then a logical High signal (H) LOST FF ($\phi 2$) on line 88*f*07 will be supplied in satisfaction of NO2 logical element 88*g*30 and cause a logical Low signal upon line 88*g*29. Clearing of the INIT TRANS LATCH shown within FIG. 88*c* will cause a logical Low signal (H) INIT TRANS FF on line 88*c*07 and the resultant disablement of NA2 logical element 88*g*02. The resultant logical High signal on line 88*g*15 is inverted in IN1 logical element 88*g*32 and supplied to NO3 logical element 88*g*34 via line 88*g*31. With a logical Low signal on line 88*g*29 also supplied to this NO3 logical element 88*g*34, the next logical Low occurrence of signal (L) $\phi 1$ on line 13401 will suffice to satisfy this element and produce a logical High signal on line 88*g*33**. Resultantly, ARB IN PRO LATCH $\phi 1$ will be cleared at this clock $\phi 1$ time. Therefore ARB IN PRO LATCH $\phi 1$ has been cleared upon the immediate subsequent clock $\phi 1$ to that clock $\phi 2$ upon which WON/LOST LATCH $\phi 2$ became set.

There is also another normal mechanism by which the ARB IN PRO LATCHes may become cleared. If arbitration upon the Versatile Bus completes without loss to the present arbitrating Versatile Bus interface Logics, then, as will shortly be seen, the INIT SID LATCH will become set and a logical High signal level will result upon line **88*h*15. This logical High signal is the right-most shown in satisfaction of NO3 logical element 88*g*30. Therefore the completion of arbitration and the commencement of slave identification/function will also suffice to clear the ARB IN PRO LATCHes. Note also that the signal (H) CLEAR 6 on line 13311 is also supplied to this NO3 logical element 88*g*30 which ultimately effectuates the clearing of ARB IN PRO LATCHes $\phi 1$ and $\phi 2$, as well as directly to the WON/-LOST LATCH $\phi 1$ at the clear side AOI 2-1-1 logical element 88*f*16**. As would resultantly be expected from the initiation through the VM Node/Maintenance Processor interface of clear operation upon the Versatile Bus Interface Logics, it may be noted that the WON/-LOST LATCHes and the ARB IN PRO LATCHes will be cleared responsively thereto.

Also shown in FIG. **88*g* is the combination of the set side signal output of ARB IN PRO LATCH $\phi 1$ on line 88*g*19 with the signal (L) ARB LINES MPX'D on line 126*a*01 in NO2 logical element 88*g*36. The resultant output signal (H) MUX ARB LINES on line 88*g*13 will assume the logical High level upon clock $\phi 1$ if the arbitration in process is multiplexed onto the slave identification/function lines. This signal is timely received by selectors connected to the slave identification/function line drivers so that data received thereon can be appropriately routed to the arbitration logics for interpretation within the arbitration process. This pin multiplexing capability of the Versatile Bus Interface Logics wherein data must be selectively shifted from certain Versatile Bus lines and associated DRIVER/-RECEIVER elements to certain functional sections within the Versatile Bus was previously illustrated in the first level block diagram of FIG. 86, and will be subsequently illustrated in the second level block diagram such as that of FIG. 112 which utilizes the signal (H) MUX ARB LINES on line 88*g*13**.

9.3.9. Initiation of Slave Identification/Function

Figure 88H:
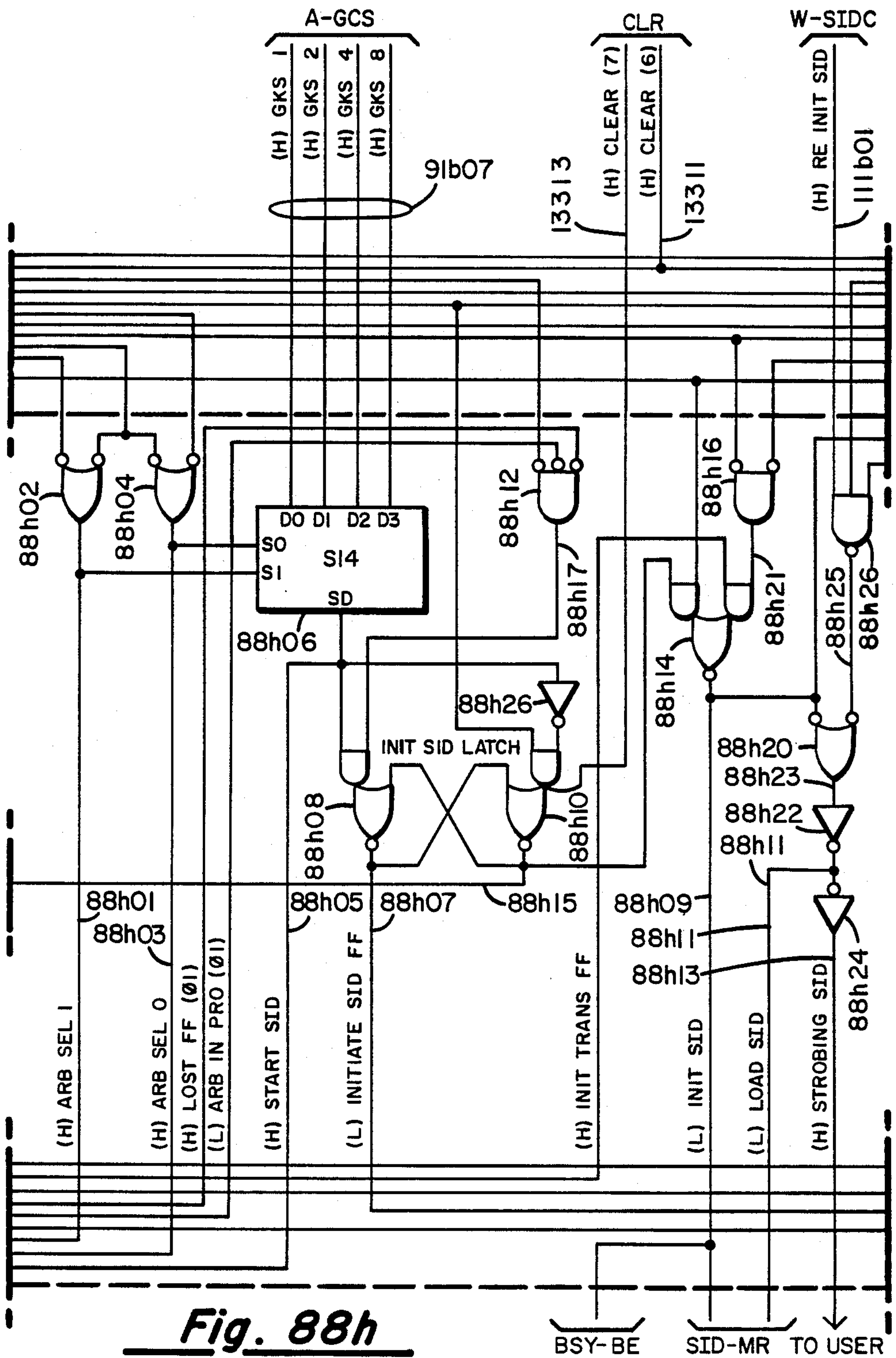
Figure 88I:
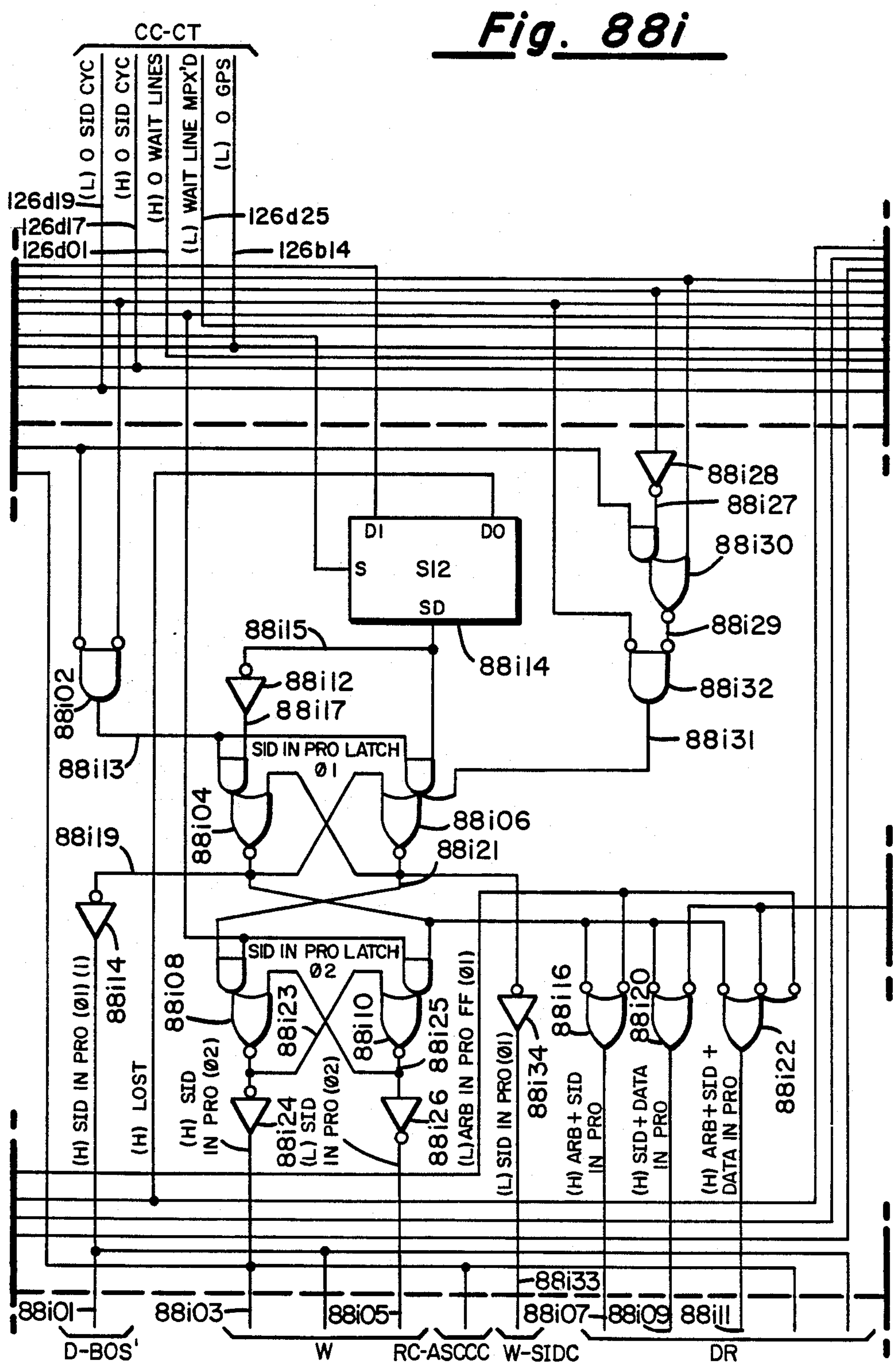
Figure 88J:
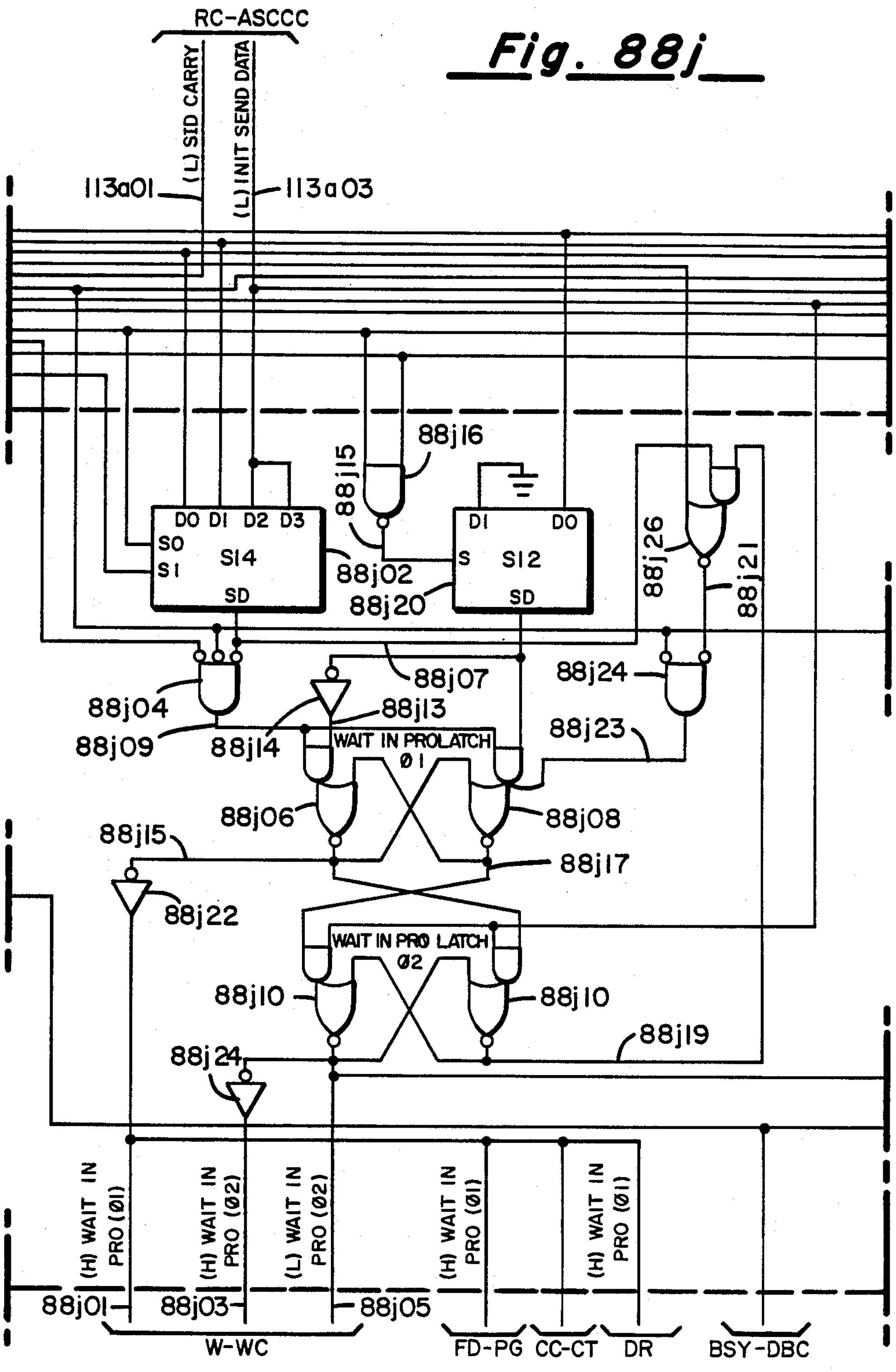
Figure 88K:
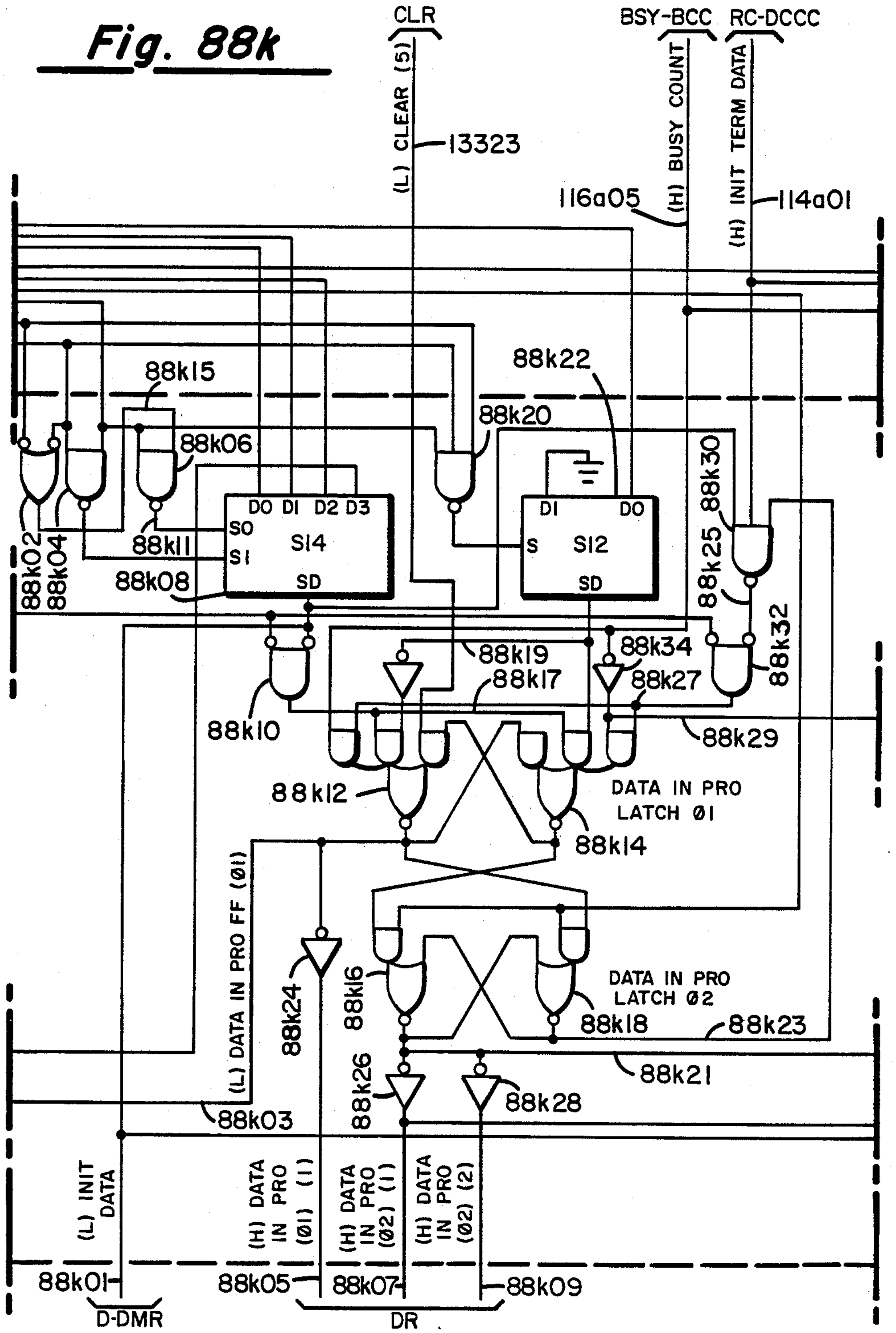

Continuing in the detailed logical explanation of SEND CONTROL **86*b*14 as is shown in FIG. 88, the time at which the arbitration activity is terminated and at which the slave identification/function activity is begun involves the INIT SID LATCH consisting of cross-coupled AOI 2-1 logical element 88*h*08 and AOI 2-1-1 logical element 88*h*10, shown in FIG. 88*h*. This INIT SID LATCH is not the slave identification/function in process latches, SID IN PRO LATCH $\phi 1$ and SID IN PRO LATCH $\phi 2$, as will next be shown within FIG. 88*i*, but is merely a latch needed to account for a 20 nanosecond delay in sequencing from pipelined arbitration activity to slave identification/function activity within the Versatile Bus Interface Logics. To visualize this delay, recall that ARB IN PRO LATCH $\phi 1$ both set and cleared upon clock $\phi 1$ while ARB IN PRO LATCH $\phi 2$ both set and cleared upon clock $\phi 2$. Similarly, SID IN PRO LATCH $\phi 1$ will set and clear upon clock $\phi 1$ and SID IN PRO LATCH $\phi 2$ will set and clear upon clock $\phi 2$. It is not possible, however, to abut the duration of the ARB IN PRO LATCH $\phi 1$ to the duration of the SID IN PRO LATCH $\phi 2$, nor the ARB IN PRO LATCH $\phi 2$ to the SID IN PRO LATCH $\phi 2$. In other words, it is not possible to set the slave identification/function in process latches immediately upon the clearing of the arbitration in process latches as it will later prove possible to set the wait in process latches, and/or the data in process latches, immediately upon the clearing of the slave identification/function in process latches. The necessary delay, the 20 nanosecond "pause" which is accounted for by the existence of INIT SID LATCH, is required by the length of the delay propagation paths within the extensive logics required for interpretation of arbitration. In other words, required translation time within this Versatile Bus Interface Logics for the activity of pipelined arbitration dictates that the Activity of slave identification/function may not logically sequentially commence immediately. This 20 nanosecond "pause" between the arbitration continuation with the slave identification/-function activity is more visible upon the Versatile Bus Interface Logics to the User, than it is within the Versatile Bus transaction timing itself. Momentary reference to FIG. 52***a* and 52*b* will show that the User Master Identification was supplied the Versatile Bus Interface Logics by the User during a clock $\phi$1 to clock $\phi$1 period. The slave identification/function information, and later the data information, are supplied during a clock $\phi$2 to clock $\phi$2, period, however, such as is separated from the supply of the arbitration identification code by at least 20 nanoseconds. The reason that this timing of the User interface, particularly visible within FIG. 52*b*, is not either uniformly clock $\phi$2 to clock $\phi$2, or uniformly clock $\phi$1 to clock $\phi$1, is due to the greater length of the logical paths associated with the arbitration activity within the Versatile Bus Interface Logics. The INIT SID LATCH shown within FIG. 88*h* accounts for this 20 nanoseconds of delay in sequencing from the arbitration in process activity to the slave identification/function in process activity.

Continuing in FIG. 88*h*, the signal (H) ARB SEL 0 on line 88*h*03 and (H) ARB SEL 1 on line 88*h*01, which were previously utilized at AOI 2-1 logical element 88*d*08 shown in FIG. 88*d*, are respectively developed in NA2 logical elements 88*h*04 and 88*h*02. The signal (H) ARB SEL 1 on line 88*h*01 will be a logical High when either signal (L) 4 GPS on line 126*b*07 or signal (L) 8 GPS on line 126*b*02 is a logical Low, respectively indicating configuration for arbitration at four or eight cycles. Similarly, signal (H) ARB SEL 0 on line 88*h*03 will be a logical High whenever signal (L) 4 GPS on line 126*b*07 or signal (L) 2 GPS on line 126*b*11 is a logical Low, respectively indicating arbitration at four or two cycles. Therefore, as previously explained within sction 9.3.5, these signals represent an encoding of the conduct of arbitration at two, four, and eight groups or cycles. These signals (H) ARB SEL 0 on line 88*h*03 and (H) ARB SEL 1 on line 88*h*01 are respectively utilized as the select 0 and select 1 inputs of S14 logical element 88*h*06 in selection amongst signals (H) GKS 1 through (H) GKS 8 on line 91*b*07 received by such S14 logical element 86*h*06 as data inputs 0 through 3 respectively. Similar to signals (H) GKR 1 through (H) GKR 8 on cable 91*a*03 as were selected amongst in S14 logical element 88*d*08 within FIG. 88*d*, signals (H) GKS 1 through (H) GKS 8 on cable 91*b*07 are representative of the arbitration counter. These signals are derived from the slave register of the arbitration counter within the group count and shift functional subsection of the arbitrational functional subsection in order that they should be valid during clock $\phi$2, such as will be of importance in the gating of the INIT SID LATCH. As selected amongst in accordance with configuration in S14 logical element 88*h*06, the appropriate signal from (H) GKS 1 through (H) GKS 8 on cable 91*b*06 will assume a logical High level at the termination of the arbitration activity. This logical High level will appear as a logically High signal (H) START SID on line 88*h*05, meaning the termination of the arbitration activity and the initiation of the slave identification/function activity upon the Versatile Bus. Meanwhile, logically Low signal (H) LOST FF ($\phi$1) (valid during $\phi$2) on line 88*f*09, meaning that arbitration has not been lost, the logical Low signal (L) ARB IN PRO ($\phi$1) on line 88*g*09, indicating that the present Versatile Bus Interface Logics are arbitrating, and the logical Low occurrence of gating signal (L) $\phi$2 on line 13427 will suffice to satisfy NO3 logical element 88*h*10 and produce at clock $\phi$2 a logical High signal upon line 88*h*17. This logically High signal in conjunction with the logical High signal (H) START SID on line 88*h*05 will set the INIT SID LATCH consisting of cross-coupled AOI 2-1 logical element 88*h*08 and AOI 2-1-1 logical element 88*h*10. The set side signal output is supplied as logical Low signal (L) INIT SID FF on line 88*h*07 to the remaining Versatile Bus Interface Logics.

Continuing in FIG. 88*h*, the clear side signal output of the set INIT SID LATCH is a logical High signal on line 88*h*19 which is combined with the logical High signal (L) 0 SID CYC on line 126*d*19, in the event that slave identification/function should not be configured a nullity, in AOI 2-2 logical element 88*h*14. If slave identification/function activity is enabled, signal (L) INIT SID on line 88*h*09 will assume a logical Low condition indicating initiation of the slave identification/function activity. Alternatively, the logical Low condition of signal (H) 0 SID CYC on line 126*d*17, again indicating that slave identification/function is not configured as a nullity, in conjunction with the logical Low condition of signal (L) 0 GPS on line 126*b*19, indicating that arbitration is configured as a nullity, may be combined in NO2 logical element 88*h*16 to produce a logical High signal level on line 88*h*21. In combination with a logical High level of signal (H) INIT TRANS FF on line 88*c*07, this logical High signal on line 88*h*21 will also suffice to satisfy AOI 2-2 logical element 88*h*14 and cause a logical Low signal (L) INIT SID on line 88*h*09. Therefore if a transaction is initiated by the User upon Versatile Bus Interface Logics wherein the arbitration activity is not configured, then the slave identification/-function activity will immediately be entered upon clock $\phi$2 through the setting of the INIT SID LATCH.

Continuing in FIG. 88*h* the logical Low condition of signal (L) INIT SID on line 88*h*09 satisfies NA2 logical element 88*h*20 and results in a logical High signal upon line 88*h*23 which is inverted in IN1 logical element 88*h*22 and supplied as logically Low signal (H) LOAD SID on line 88*h*11. This logical Low signal (L) LOAD SID on line 88*h*11 is itself inverted in IN1 logical element 88*h*24 and supplied to the User as logical High signal (H) STROBING SID on line 88*h*13. The clock $\phi$2 to clock $\phi$2 timing of this signal, including when the Versatile Bus Interface Logics are not configured for the conduct of arbitration, should be observed in the timing diagrams of FIGS. 52*a* through 52*e*, including especially FIG. 52*d*.

The conduct of multiple cycles of slave identification/function activity upon the Versatile Bus will require multiple recoveries of the slave identification/-function words from the User device under control of signal (H) STROBING SID on line 88*h*13. This capture of successive slave identification/function words is enabled under the presence of logically High signals (H) RE INIT SID on line 111*b*01 (L) SID CARRY on line 113*a*01 and (H) SID IN PRO ($\phi$2) on line 188*i*03 as collectively satisfy NA3 logical element **88*h*26. These signals collectively indicate that a slave identification/-function activity is still in progress wherein another whole word is required from the User. The logical High signal resultant on line 88*h*25 satisfies NA2 logical element 88*h*20 and results in a logical High signal upon line 88*h*23. This logical High signal is inverted in IN1 logical element 88*h*22 and supplied as the logical Low condition of signal (L) LOAD SID as accomplishes Versatile Bus Interface Logics recovery of this slave identification/function quantity from the User. The logical Low condition of signal (L) LOAD SID on line 88*h*11 is inverted in IN1 logical element 88*h*24 and supplied as logically High signal (H) STROBING SID on line 88*h*13** to the User to strobe the slave identification/-function quantity from the User device.

The INIT SID LATCH does not have to be cleared by any special conjunction of conditions as represent the initiation of a next subsequent activity within the Versatile Bus Interface Logics, as the logical High occurrence of signal (H) $\phi$2 (6) on line 13439 will be input to AOI 2-1-1 logical element **88*h*10 along with the inversion of signal (H) START SID on line 88*h*05 as accomplished by IN1 logical element 88*h*26 and via line 88*h*27. When signal (H) START SID on line 88*h*05 again becomes a logical Low, as indicative of the non-completion of the arbitration cycle, then the signal on line 88*h*27** will become a logical High and the INIT SID LATCH will be cleared. Therefore the INIT SID LATCH is always set from clock $\phi$2 to clock $\phi$2 for a duration of but 40 nanoseconds.

9.3.10. Slave Identification/Function in Process Latches

Continuing with the detailed logical explanation of the SEND CONTROL logics **86*b*14 as are shown in FIG. 88, the SID IN PRO LATCH $\phi$1 and SID IN PRO LATCH $\phi$2 as control the duration of the slave identification/function activity upon the Versatile Bus are shown in FIG. 88*i*. The logical Low condition of signal (L) INIT SID on line 88*h*09 resultant from the setting of the INIT SID LATCH during clock $\phi$2 is gated by logical Low occurrence of signal (L) $\phi$1 on line 13401 in NO2 logical element 88*i*02 and supplied as a logical High signal on line 88*i*13. This signal will set the SID IN PRO LATCH $\phi$1 consisting of cross-coupled logical elements AOI 2-1 88*i*04 and AOI 2-1-1 88*i*06. The enablement signal on line 88*i*17 is a logical High. Such an enablement signal is developed in S12 logical element 88*i*14 wherein a first data input consisting of signal (H) LOST on line 88*f*19, and the second data input consisting of signal (H) BUSY (IN) on line 128*k*01 are selected amongst by signal (H) 0 GPS on line 126*b*17. This S12 logical element 88*i*14 will provide upon line 88*i*15 a logical High output signal which is inverted by IN1 logical element 88*i*12 and supplied to SID IN PRO LATCH $\phi$1 via line 88*i*17 if, either, arbitration is configured as represented by the logical Low level of (H) 0 GPS on line 126*b*17 while such arbitration has been lost as represented by the logical Low level of signal (H) LOST on line 88*f*19, or if arbitration is configured as a nullity as represented by the logical High level of signal (H) 0 GPS on line 126*b*17 while the bus is still busy as represented by the logical High condition of signal (H) BUSY (IN) on line 128*k*01. If neither a bus busy condition in the absence of configured arbitration nor an arbitration loss condition in the event that arbitration is configured exists, then the signal upon line 88*i*15 will be a logical Low which will be inverted in IN1 logical element 88*i*12 and supplied via line 88*i*17 as a logical High signal to enable the clock $\phi$1 setting of SID IN PRO LATCH $\phi$1**.

Continuing in FIG. **88*i*, the set side signal output of SID IN PRO LATCH $\phi$1 will be supplied as a logically Low signal on line 88*i*19 when the latch is set to IN1 logical element 88*i*14 and thence as logically High signal (H) SID IN PRO ($\phi$1) (1) on line 88*i*01. The set side output of the SID IN PRO LATCH $\phi$1 on line 88*i*19 is also supplied to NA2 logical element 88*i*16, NA2 logical element 88*i*20, and NA3 logical element 88*i*22. This signal is combined with signal (L) ARB IN PRO FF ($\phi$1) on line 88*g*19 in NA2 logical element 88*i*16 to produce signal (H) ARB+SID IN PRO on line 88*i*07. This signal is combined with signal (L) DATA IN PRO FF ($\phi$1) on line 88*k*03 in NA2 logical element 88*i*20 to produce signal (H) SID+DATA IN PRO on line 88*i*09. Finally, this signal is combined both with signal (L) ARB IN PRO FF ($\phi$1) on line 88*g*19 and with signal (L) DATA IN PRO FF ($\phi$1) on line 88*k*03 in NA3 logical element 88*i*22 to produce signal (H) ARB+SID+DATA IN PRO on line 88*i*11. These signals, distributed to the DATA/RECEIVER functional section, are involved with enablement of the drivers (such as will also be selectably enabled by configuration). The signal (H) ARB+SID IN PRO is distributed to the slave identification/function drivers. The signal (H) SID+DATA IN PRO on line 88*i*09 is distributed to the data drivers. The signal (H) ARB+SID+DATA IN PRO on line 88*i*11** is distributed to the data drivers.

The set side output of the SID IN PRO LATCH $\phi$1 on line **88*i*11 and the clear side output on line 88*i*12 are also respectively connected to the SID IN PRO LATCH $\phi$2 at the points of cross-coupled logical elements AOI 2-1 88*i*10 and AOI 2-1 88*i*08. When these signals are gated by the logical High occurrence of signal (H) $\phi$2 (6) on line 13431, the SID IN PRO LATCH $\phi$2 will set and resultantly output a logical Low signal on line 88*i*23 and a logical High signal on line 88*i*25. These respective logical Low and logical High signals on lines 88*i*23 and 88*i*25 are respectively inverted in IN1 logical element 88*i*24 and IN1 logical element 88*i*26 and rspectively supplied as logical High signal (H) SID IN PRO ($\phi$2) on line 88*i*03 and logical Low signal (L) SID IN PRO ($\phi$2) on line 88*i*05 during the duration of the setting of the SID IN PRO LATCH $\phi$2**.

Continuing in FIG. **88*i*, remaining logical elements not yet discussed are involved with the clearing of the SID IN PRO LATCH $\phi$1 and the subsequent clock $\phi$2 clearing of the SID IN PRO LATCH $\phi$2. Signal (L) SID CARRY on line 113*a*01 comes from the receive cycle codunters as are used for cycle count during both receiving and transmitting of slave identification/function, wait, and data information upon the Versatile Bus. This signal will be a logical Low at the conclusion of each full word of slave identification/function information transmission upon the Versatile Bus. This logical Low condition of signal (L) SID CARRY on line 113*a*01 is inverted in IN1 logical element 88*i*28 and supplied via line 88*i*27 to AOI 2-1 logical element 88*i*30. The logical High signal condition on line 88*i*27 is gated by signal (L) INIT SID on line 88*h*09 which will serve in a logical Low signal condition, to disable satisfaction of AOI logical element 88*i*30 if another cycle of slave identification/function activity is in progress. In other words, the SID IN PRO LATCH $\phi$1, and subsequently the SID IN PRO LATCH $\phi$2, will not be cleared if another full word and attendant cycles of slave identification/function activity is to transpire. If such additional whole word of slave identification/function is not to transpire, then the logical High condition of signal (L) INIT SID on line 88*h*09 wil suffice to enable the logical High signal condition on line 88*i*27 and cause AOI 2-1 logical element 88*i*30 to output a logical Low signal on line 88*i*29. This signal is gated upon clock $\phi$1 by the logical Low occurrence of signal (L) $\phi$1 on line 13401 to satisfy NO2 logical element 88*i*32 and cause a logically High signal upon line 88*i*31. This signal, occurring at clock $\phi$1, will clear the SID IN PRO LATCH $\phi$1 consisting of cross-coupled AOI 2-1 logical element 88*i*04 and AOI 2-1-1 logical element 88*i*06. Resultant upon this clearing of the SID IN PRO LATCH $\phi$1, SID IN PRO LATCH $\phi$2 will also be cleared upon the next subsequent occurrence of the logical High condition of signal (H) $\phi$2 (6) on line 13439. Thus the SID IN PRO LATCH $\phi$1 is active, or set, from clock $\phi$1 to clock $\phi$1 during up to eight cycles of 40 nanoseconds each of slave identification/function activity upon the Versatile Bus. Similarly, the SID IN PRO LATCH $\phi$2 is set from clock $\phi$2 to clock $\phi$2** during the same duration of slave identification/function activity upon the Versatile Bus.

9.3.11. Wait in Process Latch

Continuing in the detailed logical explanation of SEND CONTROL logics 86*b*14 as are shown in FIG. 88, the WAIT IN PRO LATCH $\phi$1 and the WAIT IN PRO LATCH $\phi$2 are shown in FIG. **88*j*. Similarly to the previous setting of the SID IN PRO LATCH $\phi$1, the setting of the WAIT IN PRO LATCH $\phi$1, such as will accompany the configured performance of a wait operation upon the Versatile Bus is dependent upon a logical High signal on line 88*j*09 and a logical High signal on line 88*j*13. A logical High signal on line 88*j*09 is resultant from the satisfaction of the three input signal conditions to NO3 logical element 88*j*04. First input signal (H) 0 WAIT LINES on line 126*d*01 must be a logical Low as indicates that Wait is not configured as a nullity. Second input signal (L) $\phi$1 on line 13401 will assume a logical Low condition during each clock $\phi$1. The final, necessarily logical Low signal in order to effectuate the setting of the wait flip-flop, appears as the signal on line 88*j*07 which is the selected data output signal of S14 logical element 88*j*02. Within logical element S14 88*j*02 four data signal D0 through D3 are selected amongst under control of least significant signal (L) 0 GPS on line 126*b*19 and most significant selection signal (L) 0 SID CYC on line 126*b*19. When most significant selection signal (L) 0 SID CYC on line 126*d*19 is a logical Low and signal (L) 0 GPS on line 126*b*19 is also a logical Low, respectively indicating that neither slave identification/function nor arbitration activity is configured to be performed, then signal (L) INIT TRANS FF on line 88*c*09 will be selected within S14 logical element 88*j*02 to be transferred as the selected data signal on line 88*j*07. Under these conditions signal (L) INIT TRANS FF on line 88*c*09 needs be a logical Low, indicating that the current Versatile Bus Interface Logics are involved in a transaction, to enable NO3 logical element 88*j*04 via a logical Low signal on line 88*j*07. If most significant selection signal (L) 0 SID CYC on line 126*d*19 is a logical Low, while least significant selection signal (L) 0 GPS on line 126*b*19 is a logical High, indicating the configuration of arbitration but not slave identification/function activities, then signal (L) INITIATE SID FF on line 88*h*07 will be selected in S14 logical element 88*j*02 to be output as the selected data signal upon line 88*j*07. Signal (L) INITIATE SID FF on line 88*h*07 needs be a logical Low, under such conditions as were required for the setting of the INITIATE SID LATCH shown in FIG. 88*h*, in order that the signal upon line 88*j*07 may be a logical Low, as is required for the setting of the WAIT IN PRO LATCH $\phi$1. Finally, in the case that most significant gating signal (L) 0 SID CYC on line 126*d*19 is a logical High, and regardless of the logical High or Low state of least significant gating signal (L) 0 GPS on line 126*b*19 then the signal (L) INIT SEND DATA on line 113*a*03 will be selected as the data output signal of S14 logical element 88*j*02. By momentary reference to FIG. 113*a* and NA2 logical element 113*a*02 shown therein, it may be observed that the logical Low condition of signal (L) INIT SEND DATA on line 113*a*03 is merely representative of the logical Low condition of signal (L) SID CARRY on line 113*a*01 plus the logical High condition of signal (H) SID IN PRO ($\phi$2) on line 88*i*03. In other words, the logical Low condition of signal (L) INIT SEND DATA on line 113*a*03 represents the normal completion of the slave identification/function activity. When this logical Low signal is selected in S14 logical element 88*j*02 as the selected data output signal on one 88*j*07, and in the presence of a logical Low for signal (H) 0 WAIT LINES On line 126*d*01, then the logical Low occurrence of signal (L) $\phi$1 on line 13401 will satisfy NO3 logical element 88*j*04 and emplace a logical High signal on line 88*j*09**.

Continuing in FIG. **88*j*, the combination of signal (L) 0 GPS on line 126*b*19 and (H) 0 SID CYC on line 126*d*17 in NA2 logical element 88*j*16 dictates that a logical Low selection signal on line 88*j*15 will be input to S12 logical element 88*j*20 as a selection signal only when arbitration is configured to be performed but slave identification/function is configured to transpire across 0 cyles, or as a nullity. In the case of such null slave identification/function activity, the logical Low signal on line 88*j*15 will select signal (H) LOST on line 88*f*19 as the selected data output signal of S12 logical element 88*j*20 apearing on line 88*j*11. This signal must be a logical Low, indicating that arbitration has been won, in order that it should be inverted in IN1 logical element 88*j*14 and emplaced as an enabling logical High signal via line 88*j*13 to the set side of the WAIT IN PRO LATCH $\phi$1 consisting of cross-coupled AOI 2-1 logical element 88*j*06 and AOI 2-1-1 logical element 88*j*08**.

The set side output of the WAIT IN PRO LATCH $\phi$1, a logically Low signal when the latch is set, is transmitted on line **88*j*15 to IN1 logical element 88*j*22 and provided to remaining Versatile Bus Interface Logics as signal (H) WAIT IN PRO $\phi$1. Both the set side signal output of the WAIT IN PRO LATCH $\phi$1 appearing on line 88*j*15 and the clear side signal output of the WAIT IN PRO LATCH $\phi$1 appearing on line 88*j*17 are respectively supplied to cross-coupled AOI 2-1 logical element 88*j*12 and AOI 2-1 logical element 88*j*10 as jointly comprised the WAIT IN PRO LATCH $\phi$2. These signals are gated by the clock $\phi$2 logical High occurrence of signal (H) $\phi$2 (6) on line 13439 to accomplish the setting of the WAIT IN PRO LATCH $\phi$2. The set side signal output of the WAIT IN PRO LATCH $\phi$2, logically Low when the latch is set, is supplied as signal (L) WAIT IN PRO ($\phi$2) via line 88*j*05 to IN1 logical element 88*j*24 and thence as signal (H) WAIT IN PRO ($\phi$2) on line 88*j*03 to remaining Versatile Bus Interface Logics. The clear side signal output of the WAIT IN PRO LATCH ($\phi$2) appearing on line 88j19 is supplied to AOI 2-1 logical element 88j26 along with the enablement signal on line 88j07 as is output from S14 logical element 88j02. This signal on line 88j07 must be a logical High, most normally as arises from logical High of signal (L) INIT SEND DATA on line 113a03, before AOI 2-1 logical element 88j26 may be enabled to produce a logical Low signal on line 88j21. A logical High signal on line 88j07 indicates that the wait activity, which transpires only during but one cycle, is concluded. Conversely, a logical Low signal on line 88j07 would mean that successive cycles of wait as attend separate successive communication transactions are due to transpire upon a pipelined configuration of the Versatile Bus. In such case, the logical Low signal on line 88j07 would disable AOI 2-1 logical element 88j26 and prevent the clearing of the WAIT IN PRO LATCH $\phi$1 and subsequent clearing of the WAIT IN PRO LATCH $\phi$2. In other words, the WAIT activity is followed by the Wait activity in two transactions. A logical High signal on line 88j19 as is indicative of the setting of WAIT IN PRO LATCH $\phi$2, in combination with a logical High signal level on line 88j07, which is indicative of the completion of a wait transmission(s), will however, satisfy AOI 2-1 logical element 88j26 and cause a logical Low signal on line 88j21. This logical Low signal on line 88j21 is gated by the logical Low occurrence of signal (L) $\phi$1 on line 13401 to satisfy NO2 logical element 88j24 and cause a logical High signal on line 88j23 which will cause the clock $\phi$1 clearing of the WAIT IN PRO LATCH $\phi$1. Thereafter, upon the subsequent clock $\phi$2 logical High occurrence of signal (H) $\phi$2 (6) on line 13439, the WAIT IN PRO LATCH $\phi$2** will also become clear.

9.3.12. Data In Process Latches

Continuing with the detailed logical explanation of SWEND CONTROL logics 86b14 as are shown in FIG. 88, the DATA IN PRO LATCH $\phi$1 and the DATA IN PRO LATCH $\phi$2 are shown within FIG. 88k. The DATA IN PRO LATCH $\phi$1 is normally set at the same time as the WAIT IN PRO LATCH $\phi$1, the only exception occurring when wait is multiplexed onto the data lines and upon which case the start of data is delayed for 40 nanoseconds. The four different control timing sources for the setting of the DAT IN PRO LATCH $\phi$1 are, in general, the same as those utilized for the setting of the WAIT IN PRO LATCH $\phi$1. The respective four initiation enablements input as data signals D0 through D3 to S14 logical element 88k08 are (L) INIT TRANS FF on line 88c09, (L) INITIATE SID FF on line 88h07, (L) INIT SEND DATA On line 113a03, and (L) WAIT IN PRO ($\phi$2) on line 88j05. These signals are selected amongst in S14 logical element 88k08 by a least significant select signal on line 88k11 and a most significant select signal on line 88k13. Signals (L) 0 GPS on line 126b19 and (H) 0 SID CYC on line 126d17 are combined in NA2 logical element 88k05 to produce a signal on line 88k15 which is combined with signal (L) WAIT LINE MPX'D on line 126d25 in NA2 logical element 88k06. Signal (L) WAIT LINE MPX'D on line 126d25 is also combined with signal (H) 0 SID CYC on line 126d17 within NA2 logical element 88k04. As an example of the utilization of these signals to select the proper enablement through S14 logical elements 88k08 for the setting of the DATA IN PRO LATCH $\phi$1, consider the case of no arbitration, no slave identification/function, and no wait configured upon the Versatile Bus. Signal (L) WAIT LINE MPX'D on line 126d25 will be a logical High as besuits the null configuration of the wait activity. In conjunction with the logical High level of signal (H) 0 SID CYC on line 126d17, as reflects the null configuration of slave identification/function activity, NA2 logical element 88k04 will be satisfied and a logical Low signal will appear on line 88k13 as the most significant S1 select signal to S14 logical element 88k08. The logical Low condition of signal (L) 0 GPS on line 126b19 will satisfy NA2 logical element 88k02 and cause a logical High signal on line 88k15. In conjunction with the logical High level of signal (L) WAIT LINE MPX'D on line 126d25, this logical High signal on line 88k15 will satisfy NA2 logical element 88k06 causing a logical Low signal on line 88k11 which is the least significant, so select signal to S14 logical element 88k08. The logical Low condition of both the most and least significant select signals, as respectively appear on lines 88k13 and 88k11, will cause signal (L) INIT TRANS FF on line 88c09 to be selected within S14 logical element 88k08 and transmitted as the selected data (SD) output signal (L) INIT DATA on line 88k01. The logical Low condition of this signal (L) INIT DATA on line 88k01 is gated by the clock $\phi$1 logical Low occurrence of signal (L) $\phi$1 on line 13401 in NO2 logical element 88k10 to cause a logical High signal to appear on line 88k17.

In a similar manner to the function of NA2 logical element 88j16 and S12 logical element 88j20 in the enabling of the setting of the WAIT IN PRO LATCH $\phi$1, NA3 logical element 88k20 acting in concert with S12 logical element 88k22 controls enabling setting of the DATA IN PRO LATCH $\phi$1 in consideration of the loss of arbitration in the event that the data should be a next performed activity immediately upon completion of the arbitration activity. It should be noted that signal (L) WAIT LINE MPX'D on line 126d25, as is received by NA3 logical element 88k20, must be logical High indicating that no multiplexing of wait onto the data lines is configured else delay of the data activity will transpire. Similarly to the setting of the WAIT IN PRO LATCH $\phi$1, the DATA IN PRO LATCH $\phi$1, consisting of cross-coupled AOI 2-2-2 logical elements 88k12 and 88k14, will set upon the logical Low occurrence of signal (L) $\phi$1 on line 13401. The clear side signal output of this latch, signal (L) DATA IN PRO FF ($\phi$1) on line 88k03, is provided to IN1 logical element 88k24 and thence to Versatile Bus Interface Logics as signal (H) DATA IN PRO ($\phi$1)(1) on line 88k05. In a similar manner to the setting of the WAIT IN PRO LATCH $\phi$2, the DATA IN PRO LATCH $\phi$2 consisting of cross-coupled AOI 2-1 logical element 88k16 and 88k18, is gated set upon the logical High occurrence of signal (H) $\phi$2 (6) on line 13439. The set side signal output of this DATA IN PRO LATCH $\phi$2, logically Low when the latch is set, is provided via line 88k21 to IN1 logical elements 88k26 and 88k28, and thence respectively as signals (H) DATA IN PRO ($\phi$2) (1) on line 88k07 and (H) DATA IN PRO ($\phi$2) (2) on line 88k09 to remaining Versatile Bus Inteface Logics. In a similar manner to the reset clearing of the WAIT IN PRO LATCHES, the clear side signal output of the DATA IN PRO LATCH $\phi$2 is transmitted to NA3 logical element 88k30 via line 88k23. This NA3 logical element 88k30 is additionally enabled by the logical High occurrence of signal (H) INIT TERM DATA on line 114a01, as reflects the terminating sequence of data activity from the data cycle counter. As with the wait activity, it is not desirous to clear the DATA IN PROCESS LATCHes in the event that a next subsequent data activity upon a pipelined Versatile Bus is to immediately transpire. In such case the logical Low signal (L) INIT DATA on line 88k01 will serve to disable NA3 logical element 88k30 and prevent the clearing of DATA IN PRO LATCH $\phi$1. Elsewise, as attends the completion of the configuration controlled number of data cycles while a User is not supplying further block data transferred words, nor is another subsequent data communication to begin, the NA3 logical element 88k30 will be satisfied and a logical Low signal on line 88k25 will be received by NO2 logical element 88k32. At the occurrence of the logical Low condition of signal (L) $\phi$1 on line 13401, NO2 logical element 88k32 will be satisfied and the resultant logical High signal condition on line 88k27 will be applied to both AOI 2-2-2 elements 88k12 and 88k14 of the DATA IN PRO LATCH $\phi$1. This logical High signal on line 88k27 is gated in AOI 2-2-2 logical element 88k12 by signal (H) BUSY COUNT on line 116a05, and in AOI 2-2-2 logical element 88k14 by the inversion of this signal as occurs IN1 logical element 88k34. This signal (H) BUSY COUNT represents one final enablement of the clearing of the DATA IN PRO LATCH $\phi$1. This signal is a logical High condition, such as will maintain the DATA IN PRO LATCH $\phi$1 in the set condition, in the event that the User has successive words within a multiword block data transfer remaining to be transmitted as data upon the Versatile Bus. Conversely, the signal (H) BUSY COUNT on line 116a05 will be a logical Low—such signal level as is inverted in IN1 logical element 88k38 and applied as a logical High signal, in conjunction with a logical High signal on line 88k27, to AOI 2-2-2 logical element 88k14 to accomplish the clearing of the DATA IN PRO LATCH $\phi$1—in the event that no further data words than the current data word, the transmission of which has given rise to the logical High signal (H) INIT TERM DATA, are pending. Upon the clearing of the DATA IN PRO LATCH $\phi$1, the DATA IN PRO LATCH $\phi$2 will clear upon the next logical High occurrence of signal (H) $\phi$2 (6) on line 13439. Thusly the DATA IN PRO LATCH $\phi$1 and the DATA IN PRO LATCH $\phi$2 set upon respective clock phases 1 and 2 and remain set for the duration of cycles, up to a number of sixteen, as accompany each data word transmission upon the Versatile Bus, and for the duration of all such data words as may be transmitted as block data.

9.3.13. Strobing Data and Transaction Completed

Continuing in the detailed logical analysis of Send Control logics 86b14 as are shown in FIG. 88, some logics involved in the development of signals utilized in the transmission of data and the TRANSACTION COMPLETED LATCH are shown within FIG. 88l. The logical Low condition of signal (L) INIT DATA on line 88k01, as indicates the initiation of the data activity, satisfies NA2 logical element 88l04 and causes a logical High signal on line 88l11. This signal is inverted in IN1 logical element 88106 and supplied as signal (L) LOAD DATA to remaining Versatile Bus Interface Logics. The signal (L) LOAD DATA on line 88101, a logical Low when data will be gatedly recovered from a User device, is inverted in IN1 logical element 88l08 to be supplied as signal (H) STROBING DATA on line 88l05 to the User device. It will be recalled from the discussion of the Versatile Bus Interface Logics to User interface that signal (H) STROBING DATA on line 88l05 will be a logical high from $\phi$2 to $\phi$2 for each data word which the Versatile Bus Interface Logics will gate from a master User device for transmission upon the Versatile Bus. If the data activity is already in progress, as is indicated by the setting of the DATA IN PRO LATCH $\phi$1 and DATA IN PRO LATCH $\phi$2 and the occurrence of a logical High signal (H) DATA IN PRO ($\phi$2) (1) on line 88k07 as is received by NA3 logical element 88l02, then the logical High occurrence of signals (H) BUSY COUNT on line 116a05 and (H) INIT TERM DATA on line 114a01 indicate that upon termination of the configuration controlled of data cycles the User is desirous, under the logical High condition of signal (H) BUSY COUNT, of transferring additional, block data, words upon the Versatile Bus. These three logical High signal conditions will satisfy NA3 logical element 88l02 causing a logical Low signal on line 88l07 and the satisfaction of NA2 logical element 88l04. The resultant logical High signal on line 88l11 is inverted in IN1 logical element 88l06 and supplied as signal (L) LOAD DATA as previously. The additional inversion of signal (L) LOAD DATA on line 88l01 in IN1 logical element 88l08 is received by the User as signal (H) STROBING DATA on line 88l05.

Upon completion of the data activity within the Versatile Bus Interface Logics for the role of a User as a receiving slave device, the logical High condition of signal (H) DATA IN PRO ($\phi$2) (1) on line 88k07 in conjunction with the logical High signal (H) INIT TERM DATA on line 114a01, as are jointly received at NA2 logical element 88l10, will cause a logical Low signal (L) LOAD UDR on line 88l03 such as will accomplish the final loading of the User's input data register. The logical Low signal condition on line 88k21 as is resultant from the setting of the DATA IN PRO LATCH $\phi$2 in conjunction with the logical Low occurrence of signal (L) $\phi$1 on line 13401 satisfies NO2 logical element 88l12 and causes a logical High signal condition to be transmitted via line 88l13 to the TRANSACTION COMPLETED LATCH consisting of cross-coupled AOI 2-1 logical elements 88l18 and 88l20. The set signal side signal output of this TRANSACTION COMPLETED LATCH upon line 88l15, a logically Low signal upon the conclusion of the data activity, is inverted in IN1 logical element 88l22 and supplied as signal (H) TRANSACTION COMPLETED on line 88l07 to the User device. Unless signal (H) BUSY COUNT on line 116a05 is a logical High, indicating successive block data transferred data words are in progress, the signal upon line 88k29 will be a logical High which will, in concert with logical High signal (H) INIT TERM DATA on line 114a01, satisfy NA2 logical element 88l14 and cause, via a logical Low signal on line 88l17 and its inversion in IN1 logical element 88l16 as is transmitted via line 88l17, the clearing of the TRANSACTION COMPLETED LATCH.

9.4. ARBITRATION SECTION

The ARBITRATION SECTION 86a02 of the Versatile Bus Interface Logics is shown in a first level block diagram in FIG. 89, consisting of FIG. 89a through FIG. 89d. The ARBITRATION SECTION 86a02 is concerned with the management, in both active participation and passive detection, of the arbitration activity upon the Versatile Bus 86a01. The logics of the ARBITRATION SECTION 86a02 wil be firstly explained for active participation in, involving both drive control of the arbitration group lines and detection of the received arbitration results thereon, the activity of arbitration upon Versatile Bus **86*a*01. The receive portion of such activity involving the detection of the arbitration group lines, and the formation of a winner's master arbitration identification code therefrom, will always be performed, as such winner's master arbitration identification code is supplied to the User device for each and every arbitration activity upon the Versatile Bus 86*a*01**.

During examination of the ARBITRATION SECTION **86*a*02 logical function at the block diagram level of FIG. 89, it is useful to remember the convention for the labeling of signals and logical elements. Identification numbers within FIG. 89 which are not prefaced with "89" instead reference those figures wherein the detailed logics are shown. If a linkage and/or logical function is unclear at the block diagram level, it can, and will, be further developed and explained within the detailed logic diagrams. Conversely, those logical elements and interconnects prefaced with "89**", although referred to later during detailed explanation of the logics, are basically taught at the block diagram level. Numbered hash marks on cables, which may be referred to as lines, represent the number of separate signal paths and signals carried thereon.

9.4.1. Master ID Subsection

Commencing with the functional explanation of ARBITRATION SECTION **86*a*02 as shown within FIG. 89, arbitration commences with signals generically labeled INITIATE TRANSACTION FROM USER on lines 88*d*13 and 88*d*15 which are received into SEND CONTROL (ARBITRATION PART) 89*a*02 which is itself but a part of larger SEND CONTROL functional logical subsection 86*b*14. Herein, the manner of reference to signals and interconnect is immediately obvious. Line 88*d*13 carries signal (H) INIT TRANS and line 88*d*15 carries signal (H) AUTO RETRY which were previously observed in FIG. 88*d* during the explanation of SEND CONTROL functional logical subsection 86*b*14. Similarly, the element SEND CONTROL (ARBITRATION PART) 89*a*02 is not properly part of ARBITRATION SECTION 86*a*02 but rather represents that portion of the SEND CONTROL logics 86*b*14 which have previously been explained in conjunction with FIG. 88*d* and FIG. 88*e*. These logics, SEND CONTROL (ARBITRATION PART) 89*a*02 are shown herein for their involvement in the initialization and control of logics of ARBITRATION SECTION 86*a*02 during the conduct of the arbitration activity upon the Versatile Bus 86*a*01. Also upon the occurrence of signals INITIATE TRANSACTION FROM USER on line 88*d*13 and/or 88*d*15, eight signals generically labeled MASTER ID FROM USER on lines 92*b*01 through 92*b*15 will be recovered through BINARY SHIFT MATRIX 92*a*02 into MASTER REG.-MASTER ID 92*a*04 of functional logical subsection MASTER ID 89*a*04. The User's master identification code upon signal lines MASTER ID FROM USER 92*b*01 through 92*b*15 is valid from clock $\phi$1 to clock $\phi$1. It is gated into MASTER REG.-MASTER ID 92*a*04 upon the occurrence of the intervening clock $\phi$2. The MASTER REG.-MASTER ID 92*a*04 is circularly coupled via lines 92*a*01 through 92*a*09 to SLAVE REG.-MASTER ID 92*b*02 and thence to BINARY SHIFT MATRIX 92*a*02 and thence back to itself for the purpose of forming a shift network. Through the clocked shift capability of MASTER ID functional logical subsection 89*a*04, the eight bit User's master identification code as is lodged in MASTER REG.-MASTER ID 92*a*04 may, upon subsequent clock cycles, be positionally shifted in passage through clock $\phi$1 gated SLAVE REG.-MASTER ID 92*b*02 and BINARY SHIFT MATRIX 92*a*02 under shift count control from signals on lines 88*e*11, 88*d*11, 88*e*09, and 88*e*07 as arise at SEND CONTROL (ARBITRATION PART) 89*a*02. By momentary reference to FIG. 88*e*, it may be recalled that these signals enable the shift of the eight bit User's master arbitration identification code by two and by four places. Such shifting, enabled in consideration of configuration, is important only for arbitration at four and eight lines per group. The continuous loop path from MASTER REG.-MASTER ID 92*a*04 to SLAVE REG.-MASTER ID 92*b*02 through BINARY SHIFT MATRIX 92*a*02 and back to MASTER REG.-MASTER ID 92*a*04 also provides an eight bit shift register for scan/set test purposes. In such a scan/set test, signal TEST DATA on line 89*a*01 is received at the TEST DATA (TD) input to BINARY SHIFT MATRIX 92*a*02. Such a signal TEST DATA on line 89*a*01 is normally but a continuation of a scan/set test data loop which involves other clocked shift registers. Under control of signal TEST on line 13711 which is received at the TEST input to BINARY SHIFT MATRIX 92*a*02, the contents of SLAVE REG.-MASTER ID 92*b*02 will be left shifted one bit position during each passage through BINARY SHIFT MATRIX 92*a*02 to become lodged, upon the occurrence of clock $\phi$2, within MASTER REG.-MASTER ID 92*a*04. the scan/set data output from the eight bit shift register comprised of SLAVE REG.-MASTER ID 92*b*02 and MASTER REG.-MASTER ID 92*a*04 is derived from the least significant bit of SLAVE REG.-MASTER ID 92*b*02. The coupling of a clocked master register and a clocked slave register into a scan/set testable shift register structure is very common within the Versatile Bus Interface Logics. Most often such structure will have no other purpose than the enablement of scan/set test, which is to be distinguished from the normal function of the loop within MASTER ID functional logical subsection 89*a*04 in the alignment of the winner's master arbitration identification code as is contained in MASTER REG.-MASTER ID 92*a*04** for arbitration at four and eight lines per group.

9.4.2. Code Generator and Decoders

The User's master arbitration identification code, as has become lodged during clock $\phi$2 within MASTER REG.-MASTER ID **92*a*04, will be translated by logial structures 3 BIT CODE GENERATOR 94*b*02 and 3 TO 8 DECODER 94*b*04 to produce eight signals reflective of the necessary arbitration group line control for active participation in arbitration configured at four or eight lines per group. Two other, parallel, logical structures combined as 1 LINE/GP AND 2 LINE/GP DECODER 93*a*02, 93*b*02, are utilized for the translation of the winner's master arbitration identification code into the control of the eight arbitration group lines as transpires during each cycle of arbitration configured at one or two lines per group. The logical function of these translation logical structures 94*b*02, 94*b*04, 93*a*02, and 93*b*02 is to transform the one only User's master arbitration identification code as is lodged within MASTER REG.-MASTER ID 92*a*04 into those consecutive eight bit patterns as besuit the management of the arbitration group lines from this individual Versatile Bus Interface Logics during each cycle of time-phased arbitration. The five permissible formats of the User's master arbitration identification code should now be referenced in FIG. 105*a* through FIG. 105*e***. Arbitration at one line per group, on howsoever many cycles are configured, will merely means that bits one through (up to) eight of the winner's master arbitration identification code as is logically held in MASTER REG.-MASTER ID 92a04 will be respectively singly extracted one at a time upon lines 92a01 through 92a05 to the 1 LINE/GP AND 2 LINE/GP DECODER 93a02, 93b02 and thence via line 93a01 to 1 OF 4 SELECTOR 89a06. The appropriate eight bit pattern, for the control of the eight arbitration group lines during each cycle of time-phased arbitration, will be emplaced upon lines 93a01 by 1 LINE/GP AND 2 LINE/GP DECODER 93a02, 93b02 in consideration of two configuration control signals on lines 126b23 and 126b25 and eight group counter signals on line 91a01. Decode of the User's master arbitration identification at one line per group in respect of such configuration and count signals will result in an encoded group line pattern which, by reference to the one line per group format of the User's master arbitration identification as shown in FIG. 105a, will have a single bit 1, 2, . . . , 8 set for each of up to eight cycles of time-phased arbitration. The fact that only one bit, and possibly no bits, should be set within any single encoded pattern of the arbitration group lines as besuits any single cycle of time-phased arbitration will be true for arbitration at all line per group configurations as is respectively managed within logics 94b02, 94b04, 93a02, and 93b02. In other words, each arbitrating User device will at most drive but a single arbitration group line regardless of the configuration cycle, or priority of arbitration.

During configuration at two lines per group, the User's master arbitration identification as is held in MASTER REG.-MASTER ID 92a04 will be transferred two bits at a time, bits $1E_{21}$, then $2E_{22}$, then $3E_{23}$, then $4E_{24}$ within the two line per group winner's master arbitration identification format shown in FIG. 105b, via lines 92a01–92a09 to 1 LINE/GP AND 2 LINE/GP DECODER 93a02, 92b02, and thence as the encoded group line pattern via 93b01 to 1 OF 4 SELECTOR 89a06. The User's master arbitration identification code format at two (and more) lines per group (as are shown within the four formats of FIG. 105c through FIG. 105e), requires somewhat more complexity in decode than the mere extraction of a single bit. The uniform result will be, however, that in consideration of configuration signals carried on lines 126b23 and 126b25, and in consideration of the arbitration cycle count upon lines 91a01, the 1 LINE/GP AND 2 LINE/GP DECODER will produce the appropriate encoded group line pattern for each cycle of time-phased arbitration by the current Versatile Bus Interface Logics. No shifting, or justification, of the User's master arbitration identification code as held in MASTER REG.-MASTER ID 92a04 needs be accomplished for the decoding of such User's master arbitration identification code at one or two lines per group.

The User's master arbitration identification code as has been captured upon clock $\phi 2$ into MASTER REG.-MASTER ID 92a04 needs not be shifted upon a first utilization of such within 3 BIT CODE GENERATOR 94b02 during the conduct of arbitration configured at four or eight lines per group. The most significant two, or four, bits of the User's master arbitration identification code as is lodged in MASTER REG.-MASTER ID 92a04 is passed via lines 92a01–92a09 to 3 BIT CODE GENERATOR 94b02 in parallel with the simultaneous passage of such User master arbitration code to 1 LINE/GP AND 2 LINE/GP DECODER 93a02, 93b02. The selection of which encoded group line pattern, as are ultimately carried on lines 94a01 and 94b01, 93a01, and 93b01, will be employed will be made within 1 OF 4 SELECTOR 89a06. In accordance with five configuration signals carried on lines 126a05, 126a09, 126a11, 126b21 and one group counter signal on line 91a05 (which is a single line part of lines 91a01), the 3 BIT CODE GENERATOR 94b02 will operate upon either two bits of te "four lines per group—four groups only" master arbitration identification code format of FIG. 105c, four bits of the "four lines per group—1+2 groups" master arbitration identification code format of FIG. 105d, or four bits of the "eight lines per group" master arbitration identification cod format of FIG. 105c to produce three signals output in both normal and complementary form on lines 94a03 and 94b03 to 3 TO 8 DECODER 94b04. This three bit code received in both normal and complemented form via lines 94a03 and 94b03 is transformed in 3 TO 8 DECODER 94b04 into an eight bit encoded group line pattern which is transferred via lines 94a01 and 94b01 to 1 OF 4 SELECTOR 89a06. As successive cycles of time-phased arbitration at four or eight lines per group transpire, the User's master arbitration identification code as was held in MASTER REG.-MASTER ID 92a04 will be transferred through SLAVE REG.-MASTER ID 92b02 and shifted, (under control of signals on lines 88e11, 88d11, 88e09, and 88e07 from SEND CONTROL (ARBITRATION PART) 89a02) within BINARY SHIFT MATRIX 92a02 to be relodged in MASTER REG.-MASTER ID 92a04. Upon being shifted by two or four bit positions, as is controlled by configuration, new bit positions within the User's master arbitration identification code within MASTER REG.-MASTER ID 92a04 will be extracted via lines 92a01–92a09 to 3 BIT CODE GENERATOR 94b94 to support generation of new encoded group line arbitration patterns upon successive cycles of time-phased arbitration at four or eight lines per group.

The process of all such decoding as occurs in logical elements 94b02, 94b04, 93a02 and 93b02, is to produce from a single bit User's master arbitration identification code the encoded group line pattern as besuits each cycle of time-phased arbitration upon the Versatile Bus 86a01. The complex User's master arbitration identification code of a format shown in FIG. 105a through FIG. 105e is broken down, in consideration and arbitration cycle count, into successive patterns for the discrete management of each arbitration group line as needs transpire during possibly plural cycles of time-phased arbitration activity. The nature of the successive eight bit encoded group line patterns being developed for control of the group lines during each successive cycle of time-phased arbitration upon the Versatile Bus 86a01 may be referenced within FIG. 19. Any single arbitrating Versatile Bus Interface Logics will always develop an encoded group line pattern such as has but a single one, or possibly none, of the eight bits set, or such condition as will cause the logical true driving of but a single one of the up to eight utilized arbitration group lines. It is from comparison of this generated encoded group line pattern versus the actual received arbitration pattern, occurring as the logical OR of all connected arbitrating Versatile Bus Interface Logics upon the Versatile Bus 86a01, that the ultimate determination of the winning or losing of arbitration will be made.

9.4.3. Group Line Output Subsection

Under control of configuration signals on lines 126a05, and 126a09 and 126a13 1 of 4 SELECTOR 89a06 will gate either the eight bit encoded arbitration pattern on lines 94a01 and 94b01, that eight bit pattern on line 93a01, or that eight bit pattern on line 93b01, to GP. LINE OUTPUT REG. 89a10 via line 9501. Such encoded group line pattern is gated into GP. LINE OUTPUT REG. 89a01 on the clock $\phi$1 following that clock $\phi$2 upon which the User's master arbitration identification code had been initially gated into MASTER REG.-MASTER ID 92a04. For the purposes of scan/-set test only, a circular shift register path exists from GP LINE OUTPUT REG. 89a10 via line 89a09 to SLAVE REG.-GP OUTPUT 89a12 via line 89a03 to 1 OF 4 SELECTOR 89a06 and thence via line 9501 back to GP LINE OUTPUT REG. 89a10. In the exercise of such path for scan/set test operations, signal TEST DATA on line 89a05 would be input to 1 OF 4 SELECTOR 89a06 under control of TEST signal on line 137a09. Upon each successive clock $\phi$1 cycle of this scan/set shift register loop the most significant bit of GP LINE OUTPUT REG. 89a10 would be extracted as signal (SCAN/SET DATA) on line 89a07. Thusly within the group line output functional logical subsection 89a08 the SLAVE REG.-GP LINE OUTPUT 89a12 is seen to complete the eight bit scan/set shift register and has no additional function beyond the enablement of scan/-set test. That such additional logics will be exhaustively employed within the logical design of the present invention to enable scan/set testing is related to the intended implementation of the logics of the present invention as very large scale integrated circuitry, such as requires a complete and comprehensive test and validation scheme. The reoocurrence of these scan/set testable clock shift register structures may be ignored within the present explanation as being essentially irrelevant to the function of the logic design in the control of the Versatile Interface Bus.

9.4.3. Arbitration Drive of the Versatile Bus

The encoded arbitration group line pattern as is contained in GP LINE OUTPUT REG. 89a10 is passed via line 89a09 through GROUP LINE OUTPUT GATES 89a14 and via line 89a11 to the driver/receiver DR/REC (8) elements 86a12. The function of the GROUP LINE OUTPUT GATES 89a14 is to selectively block, under the control of signal (L) INH 0-3 on line 88f01 and signal (L) INH 4-7 on line 88f03, the passage of the encoded group line pattern upon line 89a09 to line 89a11 and thence to driver/receiver DR/REC (8) elements 86a12 in the event of non-participation in, or loss of, arbitration upon the Versatile Bus 86a01. The development of such inhibit signals, conditional upon the setting of WON/LOSS LATCH $\phi$1, may be momentarily reviewed within FIG. 88f. When the present Versatile Bus Interface Logics acting through its ARBITRATION SELECTION 86a02 is both engaged in, and has not yet lost, arbitration upon the Versatile Bus 86a01, then the encoded group line pattern appearing upon line 86a05 will be utilized by driver/receiver DR/REC (8) element 86a12 in the drive during clock $\phi$2 of up to eight arbitration group lines upon Versatile Bus 86a01. The encoded arbitration group line pattern as was either developed within 3 BIT CODE GENERATOR 94b02 and 3 to 8 DECODER 94b06 for either four or eight lines per group, or such as was developed in 1 LINE/GP AND 2 LINE/GP DECODER 93a02, 93b02 for arbitration at one and two lines per group, such as was selected by 1 OF 4 SELECTOR 89a06, such as was lodged within GP LINE OUTPUT REG. 89a10 upon clock $\phi$1, such as was gated through GROUP LINE OUTPUT GATES 89a14 and such as is now driven upon Versatile Bus 86a01 by driver/receiver DR/REC (8) element 86a12 is such that at most one, and possibly none, of the arbitration group lines will be driven to the logical "1", or true, condition by the ARBITRATION SECTION 86a02 of each individual arbitrating Versatile Bus Interface Logics. Of course, other ARABITRATION SECTIONS 86a02 within other arbitrating Versatile Bus Interface Logics may be driving the same, or other group lines to the logical "1", or true condition. The receipt of the abitration group line condition, which is accomplished in driver/receiver DR/REC (8) element 86a12 upon the same clock $\phi$2 time as the drive of such group lines, is of the wired-OR condition of each such group line as is driven from each arbitrating interconnected Versatile Bus Interface Logics. Whether the encoded group line pattern driven is identical to the encoded group line pattern detected will be instrumental in the determination of the winning or losing of the arbitration activity by the ARBITRATION SELECTION 86a02 within each and every interconnected Versatile Bus Interface Logics.

Continuing in the explanation of the ARBITRATION SECTION 86a02 as shown in FIG. 89d, the configuration of the Versatile Bus Interface Logics for pin multiplexing of the arbitration activity will dictate that the encoded group line pattern upon line 86a05 be transferred for drive upon the Versatile Bus to the SLAVE ID SECTION 86a06 as signals generically labeled MULTIPLEXED BITS TO SLAVE ID OUTPUT SEL. This connection had been previously shown within the block diagram of FIG. 86a. Similarly, 1 OF 2 SELECTOR 86a28 will, under the control of pin multiplexed configuration carried upon selector line 126a03, select either signals MULTIPLEXED BITS FROM SLAVE ID INPUT SEL on line 89d17, or signals from the normal, non-pin multiplexed, path for receipt of the arbitration group line data via line 89d07, 1 OF 2 SELECTOR 89d02, and line 86a09 from driver/receiver DR/REC (8) elements 86a12. Even should the arbitration group line activity be pin multiplexed onto driver/receiver elements and bus lines elsewise used for the slave identification/function activity upon the Versatile Bus, the wired-OR nature of arbitration signal communication will be preserved. As is evident within FIG. 89d, the configuration for pin multiplexing merely substitutes an alternative set of driver receiver elements for the normal arbitration driver/receiver elements shown as DR/REC (8) 86a12.

The timing of the ARBITRATION SECTION 86a02 for the participation upon the Versatile Bus 86a01 in the activity of arbitration as a competing master device will be summarized. The User's master arbitration identification code was emplaced upon line 92b01 through 92b15 as signals MASTER ID FROM USER during clock $\phi$1 to clock $\phi$1. This User's master arbitration identification code was gated into MASTER REG.-MASTER ID 92a04 upon the intervening clock $\phi$2. If necessary, this User's master arbitration identification code will be circularly shifted within the logical functional subsection of MASTER ID 89a04 so that it will assume the correct bit positions within such MASTER REG.-MASTER ID 92a04 upon each subsequent cycle of time-phased arbitration. The encoded group line pattern developed from the User's master arbitration identification code is gated into GP LINE OUTPUT REG. **89*a*10 upon the next successive clock $\phi$1 from each clock $\phi$2 wherein the current User master arbitration identification code becomes lodged in MASTER REG.-MASTER ID 92*a*04. The encoded group line pattern present within GP LINE OUTPUT REG. 89*a*10 is driven by driver/receiver DR/REC (8) element 86*a*12 in control of the arbitration group lines upon Versatile Bus 86*a*01 during each successive clock $\phi$2 to that clock $\phi$1 upon which such encoded group line pattern became lodged in GP LINE OUTPUT REG. 89*a*10. Therefore, that time from which the User initiated transaction under control of signals generically labeled INITIATE TRANSACTION FROM USER on lines 88*b*13, 88*d*15 until that clock $\phi$2 time wherein the arbitration group lines of Versatile Bus 86*a*01 are driven responsively thereto is 60 nanoseconds, such period as has previously been shown within the timing diagrams of FIG. 52**.

9.4.5. Receipt of Arbitration into Priority Logic

Continuing in the explanation of the ARBITRATION SECTION **86*a*02 as is shown within FIG. 89, the manner of the receipt and recognition of the arbitration activity as transpires upon Versatile Bus 86*a*01 will next be discussed. During that identical clock $\phi$2 period during which one, or possibly none, of the arbitration group lines are driven by driver/receiver elements DR/REC (8) 86*a*12 of the current Versatile Bus Interface Logics upon Versatile Bus 86*a*01, the received data from all eight arbitration group lines is emplaced as signals upon line 86*a*09. These signals upon line 86*a*09, representing the status of all eight arbitration group lines, are normally gated through 1 OF 2 SELECTOR 89*d*02 via line 89*d*07 and through 1 OF 2 SELECTOR 89*a*28 via line 89*d*07 to be gatedly lodged upon the intervening clock $\phi$1 into MASTER REG.-GROUP LINE INPUT 89*d*04. Within the functional logical subsection of GROUP LINE INPUT 89*d*08, the MASTER REG.-GROUP LINE INPUT 89*d*04 is connected via lines 89*d*01 and 89*d*03 to SLAVE REG.-GROUP LINE INPUT 89*d*06. Such SLAVE REG.-GROUP LINE INPUT 89*d*06 is turn connected via line 89*d*11 to 1 OF 2 SELECTOR 89*d*02, via line 89*d*07 to 1 OF 2 SELECTOR** 86*a*28, and via line **89*d*05 back to MASTER REG.-GROUP LINE INPUT thereby forming an eight bit shift register. Such an eight bit shift register is employed solely for scan/set testing, wherein signals TEST on line 89*d*13 and signal TEST DATA on line 89*d*15** are utilized.

Continuing in the explanation of the ARBITRATION SECTION **86*a*02 as is shown in FIG. 89, the utilization of the received group line data, such as is transmitted via line 89*d*05, for the purposes of the detection of the winning or the losing of arbitration will next be discussed. The group line input data signals upon line 89*d*05, valid from clock $\phi$2 to clock $\phi$2, are received within PRIORITY LOGIC 89*b*02, which is actually a part of SEND CONTROL 86*b*14. As with previous SEND CONTROL (ARBITRATION PART) 89*a*02, PRIORITY LOGIC 89*b*02 is not properly a part of ARBITRATION SECTION 86*a*02 but is shown therein for its relationship to the activities performed during the process of arbitration. The PRIORITY LOGIC 89*b*02 is intended to represent those comparison gates shown in FIG. 89*f* which were involved in the determination of the winning or losing of arbitration upon the Versatile Bus through comparison of the received group line data and the contents of a mask register. The PRIORITY LOGIC 89*b*02 generates a signal on line 88*f*19 which, by reference to FIG. 88*f*, controls the setting of the WON/LOST LATCH $\phi$1**.

9.4.6. Mask Subsection and Group Count and Shift Subsection

Continuing in the explanation of ARBITRATION SECTION **86*a*02, the comparison between the received arbitration group line data and a mask quantity such as is lodged within MASTER REG.-MASK 89*b*12, part of the MASK functional logical subsection 89*b*06, is shown in FIG. 89*b*. The generation of the mask quantity is dependent upon the arbitration cycle count as is maintained in GROUP COUNT AND SHIFT functional logical subsection 89*b*04. The initialization and enablement of the GROUP COUNT AND SHIFT functional logical subsection 89*b*04 is derived from three control signals transmitted from SEND CONTROL (ARBITRATION PART) 89*a*02. The signals on lines 88*e*01 and 88*e*09 accomplish emplacement of a count of 1 within 1 OF 2 SELECTOR 91*a*02. In the presence of an enablement signal on line 89*e*03, this initial count of 1 is captured within MASTER REG.-GP. COUNTER 91*a*04 upon the next subsequent clock $\phi$2. This first capture of a count of 1 is upon the same clock $\phi$2 during which the winner's master arbitration identification code was captured into MASTER REG.-MASTER ID 92*a*04. Upon each successive clock $\phi$1 and clock $\phi$2 cycle, a count represented by a single bit of sliding position within an eight bit word within MASTER REG.-GP. COUNTER 91*a*04 is transferred upon line 91*a*01 to SLAVE REG.-GP. COUNTER 91*b*02 and thence via line 91*b*05 to 1 OF 2 SELECTOR 91*a*02 and via line 89*b*01 back to MASTER REG.-GP. COUNTER in a left shifted one position. Therefore the eight bit positions of MASTER REG.-GP. COUNTER 91*a*04 account for the eight possible cycles, with the successive setting of each bit position representing the enablement of the corresponding cycle. The current group count, as is logically held within SLAVE REG.-GP. COUNTER during each clock $\phi$1 to clock $\phi$1 period, is supplied via line 91*b*05 to MASK ENABLE GENERATOR 89*b*10**.

9.4.7. Mask Enable Generator and Mask Generator

Continuing with the explanation of the development of the mask quantity within the block diagram of FIG. **89*b*, the MASK ENABLE GENERATOR 89*b*10 receives six inputs from configuration on lines 126*b*15, 126*b*27, 126*l*17, 126*b*21, 126*a*13, and 126*a*11, as well as the current shift count as a pattern with a single bit set upon line 91*b*05. The function of the MASK ENABLE GENERATOR 89*b*10 is to generate an eight bit pattern wherein bits are set, according to that single cycle of multi-cycled time-phased arbitration in which the present arbitration section 86*a*02 is currently actively participating as a master device, reflective of those arbitration group lines which are of interest within the current arbitration cycle. Simple of being envisioned, the eight bit patern output of MASK ENABLE GENERATOR 89*b*10 on lines 97*a*01 and 97*b*01 will be but a single bit for arbitration at one line per group. Such a bit will shift from a most significant arbitration group line position by ones to a least signficant arbitration group line position as up to eight cycles of arbitration are enabled. Similarly, when arbitration at two lines per group is configured, then the pattern developed by MASK ENABLE GENERATOR 89*b*10 will successively reflect bits 0 and 1, bits 2 and 3, bits 4 and 5, and bits 6 and 7**, through up to four cycles of time-phased arbitration.

Although multiple cycles of time-phased arbitration may be pipelined, and in simultaneous progress upon the arbitration group lines of the Versatile Bus 86a01 it should be noted that MASK ENABLE GENERATOR 89b10 needs formulate only that one cycle-sensitive pattern which is concerned with that single arbitration activity with which the current Versatile Bus Interface Logics can be engaged at any one time. In other words, for the active conduct of arbitration as a master device, only one arbitration activity will be in progress within ARBITRATION SECTION 86a02 at any one time and only certain arbitration group lines will be pertinent to interpretation of the winning or losing of such arbitration by the current Versatile Bus Interface Logics.

Continuing in the explanation of the development of the mask quantity within the logical structure of FIG. 89b part of the ARBITRATION SECTION 86a02, the MASK GENERATOR 89b08 receives on line 89a09 eleven signals as are merely representative of mixed, clear and set side, signal outputs of all eight bits of GP LINE OUTPUT REG. 89a10. From these signals MASK GENERATOR 89b08 may determine those bits (or no bits) corresponding to those arbitration group lines upon which results determinant of winning or losing the current cycle of time-phased arbitration (as is conducted in accordance with the User's master arbitration identification coded in use by the current Versatile Bus Interface Logics) will occur. In other words, MASK GENERATOR 89b08 receives from GP LINE OUTPUT REG. via line 89a09 that single bit, if any, which represents that arbitration group line which will be driven in arbitration by the present Versatile Bus Interface Logics upon the present arbitration cycle. By momentary reference to FIG. 19, it may be recalled that an arbitrating Versatile Bus Interface Logics will lose to the logical true drive of any arbitration group line of significance to the current cycle and of higher priority (if any such exist) than that arbitration group line (if any) which is being driven true by the present Versatile Bus Interface Logics. That pattern input from MASK ENABLE GENERATOR 89b10 via line 97b01 to MASK GENERATOR 89b08 is reflective of the totality of arbitration lines which are of interest within the present cycle. By combining these two quantities, MASK GENERATOR 89b08 will provide upon lines 96a01 and 96b01 signals reflective of those total arbitration group line positions wherein the occurrence of a signal during this cycle would mean that another, higher priority arbitrating device has won the arbitration. Therefore these signals represent, in aggregate, a mask of the totality of a maximal eight arbitration group lines which are both of interest within the current cycle of time-phased arbitration and which are of higher priority than that arbitration group line (if any) being driven by the present Versatile Bus Interface Logics.

9.4.8. Winning or Losing Arbitration

Recalling that the encoded group line pattern was gated into GP LINE OUTPUT REG. upon the occurrence of clock $\phi 1$ simultaneously with the gating of the current group count into SLAVE REG.-GP COUNTER 91b02, the mask formulated from both quantities is gated via lines 96a01 and 96b01 through 1 OF 2 SELECTOR 89b14 via line 89b03 into MASTER REG.-MASK 89b12 upon the occurrence of the next clock $\phi 2$. This clock $\phi 2$ is the same clock $\phi 2$ upon which the arbitration group lines will be driven upon Versatile Bus 86a01 through action of DRIVER/RECEIVER elements DR/REC (8) 86a12, and during which the wired-OR group line data pattern will be received. The mask quantity is supplied from MASTER REG.-MASK 89b12 to PRIORITY LOGIC 89b02 via line 89a07 while the received group line input data is provided to PRIORITY LOGIC 89b02 via line 89d05. They will be compared in accordance with the logics as previously discussed of FIG. 88f, and will result in the signal upon line 88f19 which sets the WON/LOST LATCH $\phi 1$. Herein such logics are illustrated to be part of SEND CONTROL (ARBITRATION PART) 89a02. Responsively to the loss of arbitration, SEND CONTROL (ARBITRATION PART) 89a02 will raise the inhibit signals on line 88f01 and 88f03 as are distributed to GROUP LINE OUTPUT gates 89a14 in order to prevent further encoded group line drive during further cycles of time-phased arbitration. The SEND CONTROL (ARBITRATION PART) 89a02 will also send either the won or lost signal, generically labeled as WON/LOST AND TRANSACTION ENABLE TO USER, to the User as reflects the respective winning or losing of arbitration at the conclusion of the activity.

9.4.9. Input Master ID Encoder

Continuing in the explanation of ARBITRATION SECTION 86a02 as shown in FIG. 89, the receipt of the encoded group line data and the development of the winner's master arbitration identification code therefrom will next be discussed. The arbitration group line input data as is resident from clock $\phi 1$ to clock $\phi 1$ within MASTER REG.-GROUP LINE INPUT 89d04 will be taken upon each of successive cycles into INPUT MASTER ID ENCODER 89c02 and thence to INPUT MASTER ID SELECTOR 89c04, and WINNERS MASTER ID functional logical subsection 89c06, before being issued to the User as signals MASTER ID TO USER upon line 108a01 upon the full completion of each and every arbitration activity upon the Versatile Bus 86a01. This receiving and encoding section of the arbitration logics, shown primarily within FIG. 89c, is constantly active for the development of the winner's master arbitration identification codes even if the current Versatile Bus Interface Logics is not activity arbitrating within such arbitration activity. The logic structure 36 BIT GROUP LINE MEMORY 89c12, part of the INPUT MASTER ID ENCODER functional logical subsection 89c02, is integral to the recovery of the winner's master arbitration identification code such as is developed in up to eight cycles of time-phased arbitration upon Versatile Bus 86a01, and such as may be developed and obtained while eight other time-phased arbitration activities are in simultaneous pipelined progression upon Versatile Bus 86a01. In support of the timely extraction of the winner's master arbitration identification code, as may be built in multiple pipelined cycles of arbitration activity upon the Versatile Bus, the 36 BIT GROUP LINE MEMORY 89c12 will store historical information reflective of the results of each cycle of time-phased arbitration activity.

Figure 99A:
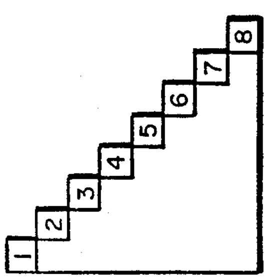

Commencing with the explanation of the INPUT MASTER ID ENCODER functional logical subsection 89c02 within the ARBITRATION SECTION 86a02 block diagram of FIG. 89, the GROUP LINE INPUT ENCODER AND SELECTORS 89c08 essentially reverse, this time for the entirety of eight arbitration group lines, the arbitration identification decode as was previously accomplished in 3 BIT CODE GENERATOR 94b02, 3 TO 8 DECODER, 94b04, and 1/LINE GP AND 2/LINE GP DECODER **93*a*02, 93*b*02. The GROUP LINE INPUT ENCODER AND SELECTORS 89*c*08 receives five configuration signals on lines 126*b*27, 126*b*07, 126*a*11, and 126*a*07 and 126*a*13. In accordance with such configuration signals, the GROUP LINE INPUT ENCODER AND SELECTORS 89*c*08 will reconstitute successive portions of the User's master arbitration identification codes, in this case the arbitration identification code(s) of those master User(s) which are in the process of winning arbitration upon the Versatile Bus. The function of GROUP LINE INPUT ENCODER AND SELECTORS 89*c*08 may be envisioned by momentary reference to FIG. 105*e*. If arbitration is configured at eight lines per group, then GROUP LINE INPUT ENCODER AND SELECTORS 89*c*08 will take the encoded group line data available on lines 89*d*01 and 89*d*03 from MASTER REG.-GROUP LINE INPUT 89*d*04 and formulate a four bit pattern corresponding to designate bits 111E$_{82}$ during a first cycle of arbitration upon eight lines, or corresponding to bits 222E$_{82}$ upon a second cycle of arbitration at eight lines per group. The encoded output signals of GROUP LINE INPUT ENCODER AND SELECTORS 89*c*08 will be transferred via line 101/01 to TEST SELECTOR 89*c*10 and via lines 10201 through 10215 into the lowest, bottom, rank of 36 BIT GROUP MEMORY 89*c*12 wherein they will be gated upon the occurrence of each clock $\phi$2. Each of eight ranks of 36 BIT GROUP LINE MEMORY 89*c*12 is composed of a master register gated upon clock $\phi$2 and a slave register gated upon clock $\phi$1. Successive ranks of the 36 BIT GROUP LINE MEMORY 89*c*12 above the first, or bottom, rank are progressively narrower culminating in a single bit eighth rank stage. During each clock cycle, encoded group line inputs stored in lower ranks are successively directly cycled to next higher ranks. Upon the occurrence of that particular cycle as completes each individual activity of time-phased arbitration, the appropriate encoded group line data within 36 BIT GROUP LINE MEMORY 89*c*12 will be withdrawn in a manner whereby the winners master arbitration identification code may be constituted. The manner by which this should be done may be gauged by momentary reference to FIG. 99*a* through FIG. 99*l*. The arbitration identification codes represented as extractable from 36 BIT GROUP LINE MEMORY 89*c*12 are in accordance with the five formats of FIG. 105*a* though FIG. 105*e*. The illustration of those cells within 36 BIT GROUP LINE MEMORY 89*c*12 wherein a winner's master arbitration identification code may be extraction for pipelined arbitration configured at eight groups utilizing one line per group as shown in FIG. 99*a* shows why the 36 BIT GROUP LINE MEMORY 89*c*12 assumes its represented staircase shape. The represented winner's master arbitration identification codes as satisfy the five permissible formats are shown diagrammatically in FIG. 99*a* through FIG. 99*l* in those cells which they will occupy at the conclusion of the time-phased arbitration activity. What should be conceptualized is that 36 BIT GROUP LINE MEMORY 89*c*12 also contains additional, immature, information besuiting the later development of further winner's master arbitration identification codes as attend further, pipelined, activities of arbitration upon the Versatile Bus. In other words, considering the extraction of a winners master arbitration identification code associated with arbitration of eight groups at one line per group as is illustrated in FIG. 99*a*, immediately under that "staircase" of bits 1 through 8 as represent a matured winner's master arbitration identification code there exist seven bits as are collectively the seven-eighths developed winner's master arbitration identification code of the next, pipelined, arbitration activity. In other words, information from up to eight cyles of time-phased arbitration may be stored within 36 BIT GROUP LINE MEMORY 89*c*12 at any one time. The encoded arbitration group line information derived from all eight group lines, such as may be used by a plurality of time-phased arbitration activities in progress, is initially emplaced in the lower rank of 36 BIT GROUP MEMORY 89*c*12 and successively transferred to higher levels upon the clock phases as attend further complete cycles of time-phased arbitration. Each time a winner's master arbitration identification is mature, it will be located as illustrated in those cell positions of 36 GROUP LINE MEMORY 89*c*12 as are diagrammed in FIG. 99*a* through FIG. 99*l*** for various cases of arbitration group and lines per group configuration.

Returning again to the GROUP LINE INPUT ENCODER AND SELECTORS **89*c*08, part of the INPUT MASTER ID ENCODER functional logical subsection 89*c*02, and with reference to FIG. 99*a* through FIG. 99*l* and FIG. 105*a* through FIG. 105*e* consider as an example arbitration configuration at two groups utilizing eight lines per group. From a first arbitration cycle as results in an eight bit group line input data quantity within MASTER REG-GROUP LINE INPUT 89*d*04, the GROUP LINE INPUT ENCODER AND SELECTORS 89*c*08 will develop, in accordance with configuration, a four bit pattern "111E$_{81}$" which will be gated upon clock $\phi$2 into the four most significant and four least significant latches of the master register of the least significant rank of 36 BIT GROUP LINE MEMORY 89*c*12. Upon the next $\phi$1, the group line input data quantity of the next successive arbitration cycle will be emplaced in MASTER REG-GROUP LINE INPUT 89*d*04. At the same time, quantity "111E$_{81}$" lodged within the most significant four and the least significant four latches of the master register of the lowest rank of 36 BIT GROUP LINE MEMORY 89*c*12 will be transferred to the slave latches of the same rank. This second arbitration group line input data quantity will be interpreted within GROUP LINE INPUT ENCODER AND SELECTORS 89*c*08 to result in encoded arbitration identification field "222E$_{82}$. This field "222E$_{82}$ is also placed, in replicate form, in both the upper and lower four latches of the eight latch master register lowest rank of 36 BIT GROUP LINE MEMORY 89*c*12 upon clock $\phi$2. The previously installed quantity "111E$_{81}$ is now gated to the next most significant, second, rank upon the same occurrence of clock $\phi$2. At this time INPUT MASTER ID SELECTOR 89*c*04 will extract the total eight bit winner's master arbitration identification code, in accordance with the correct format as is illustrated within FIG. 105, from appropriate bit positions within both the first and second ranks of 36 BIT GROUP LINE MEMORY 89*c*12 in the manner shown within FIG. 99*h***.

In further explanation of the INPUT MASTER ID ENCODER logical subsection **89*c*02 part of ARBITRATION SECTION 89*a*02, the TEST SELECTOR 89*c*10 is involved in making a thirty-six bit shift register out of 36 BIT GROUP LINE MEMORY 89*c*12. To this end, it is connected to the slave registers of all eight ranks of 36 BIT GROUP LINE MEMORY 89*c*12, such as is intended to be represented by signals (RANK N) SLAVE BIT (X) on lines 103*b*01 through 103*h*01. Similarly, scan/set control on line 13611 and scan/set data on line 11201 are received from the VM Node/maintenance processor. Thus this scan/set shift register test loop within the INPUT MASTER ID ENCODER logical subsection 89*c*02** is similar to all others save that it, per chance, is identifiably one end of a scan/test string which connects directly to the VM Node/-maintenance processor for data as well as control.

9.4.10. Input Master ID Selector and Winner's Master ID Subsection

Continuing in FIG. **89*c* the INPUT MASTER ID SELECTOR 89*c*04 performs the sophisticated extraction of the winners master arbitration identification code from 36 GROUP LINE MEMORY 89*c*12 via lines 103*a*03 through 103*h*03. The various width signal paths on lines 103*a*03 through 103*h*03 besuit extraction of certain bits within certain ranks of 36 BIT GROUP LINE MEMORY 89*c*12. This extraction is in accordance with twelve configuration signals received via lines 126*b*05, 126*a*07, 126*b*15, 126*b*11, 126*b*01, 126*a*19, 126*b*13, 126*b*09, 126*a*17, 126*a*15, 126*a*11 and 126*a*13. The extracted winner's master arbitration identification is passed from INPUT MASTER ID SELECTOR 89*c*04 via lines 107*a*01 through 107*e*01 to 1 OF 2 SELECTOR 108*a*02 and thence via line 108*a*03 to MASTER REG.-WMID 108*a*04 wherein it is gateably lodged upon the occurrence of clock $\phi$1 as enabled by signal (L) EN WIDR on line 88*e*07 from SEND CONTROL 86*b*14. Such winners master arbitration identification as is captured in MASTER REG.-WMID 108*a*04 upon the completion of each and every complete activity of arbitration upon Versatile Bus 86*a*01 is presented to the User on line 108*a*01. The path from MASTER REG-WMID 108*a*04 via line 108*a*01 to SLAVE REG-WMID 108*b*02 via line 108*b*03, through 1 OF 2 SELECTOR 108*a*02 via line 108*a*03, and back to MASTER REG-WMID 108*a*04 is involved with the creation of a scan/set testable eight bit shift register. Control signal TEST on line 13709 and data signals TEST DATA on line 89*c*01** are involved with enablement of this scan/set test process.

9.5. Input Master ID Encoder Functional Subsection

The second level block diagram for the INPUT MASTER ID ENCODER functional logical subsection **89*c*02 part of the ARBITRATION SECTION 86*a*02 is shown in FIG. 90, consisting of FIG. 90*a* through FIG. 90*c*. The INPUT MASTER ID ENCODER functional logical subsection 89*c*02 consists of major sections GROUP LINE INPUT ENCODER AND SELECTORS 89*c*08, TEST SELECTOR 89*c*10, and 36 BIT GROUP LINE MEMORY 89*c*12 as were previously seen within the first level block diagram of FIG. 89*c*. As was previously explained in conjunction with the first level block diagram of ARBITRATION SECTION 86*a*02, the logical function of the GROUP LINE INPUT ENCODER AND SELECTORS 89*c*08 is to re-encode the up to eight arbitration group lines as are utilized during each cycle of time-phased arbitration upon the Versatile Bus into the User format arbitration identification codes as are shown in FIG. 105*a* through 105*l*. This encoding transpires so that the results of arbitration upon each of up to eight group lines during each of potentially up to eight arbitration cycles can be stored as a reduced number of bits. After the configured number of arbitration cycles, a User's format arbitration master identification code will have been completely reconstructed. Such reconstructed arbitration identification code represents that of the arbitration-winning bus-owning master User device, and is called the winner's master arbitration identification code. Thegroup line input encoder section of GROUP LINE INPUT ENCODER AND SELECTORS 89*c*02 develops a part of such winner's master arbitration identification code during each cycle of time-phased arbitration. In the selector portion of GROUP LINE INPUT ENCODER AND SELECTORS 89*c*08 that portion encoded as besuits the lines per group configuration of the Versatile Bus Interface Logics will be gated for storage within the 36 BIT GROUP LINE MEMORY 89*c*12**.

The 36 BIT GROUP LINE MEMORY **89*c*12, part of the INPUT MASTER ID ENCODER functional logical subsection 89*c*02, is utilized for the storage of those partial portions of the winner's master arbitration identification code as are developed on each of up to eight cycles of time-phased arbitration. Such a memory is hierarchical. That partial portion of the winner's master arbitration identification code such as is formed by the GROUP LINE INPUT ENCODER AND SELECTORS 89*c*08 upon each cycle of time-phased arbitration is gated into a lowest rank of 36 BIT GROUP LINE MEMORY 89*c*12. Upon each subsequent cycle, this encoded information within the 36 BIT GROUP LINE MEMORY 89*c*12 is shifted to the next higher rank. Thus the 36 BIT GROUP LINE MEMORY 89*c*12 always contains historically developed portions of a single winner's master arbitration identification code as is developed across up to eight cycles of time-phased arbitration, and up to eight total such winner's master arbitration identification codes as are in progress of development during pipelined arbitration. As was shown in the first level block diagram of FIG. 89*c*, the extraction of the winner's master arbitration identification code from its variously distributed locations within 36 BIT GROUP LINE MEMORY 89*c*12 is effectuated in INPUT MASTER ID SELECTOR 89*c*04 under configuration control and at such appropriate time as is enabled by signal (L) EN WIDR 88*d*03 of SEND CONTROL logics 86*b*14. As will become apparent when such extraction of a completely formulated winner's master arbitration identification code under the control of INPUT MASTER ID SELECTOR 89*c*04 is explained, the 36 BIT GROUP LINE MEMORY 89*c*12 need not have uniform width to enable the storage of all winner's master arbitration identification code bit positions. Thus the memory assumes the staircase shape illustrated in FIG. 89*c* wherein the historical stores of each encoded bit of the winner's master arbitration identification codes will not be to equal depth. The staircase shape of 36 BIT GROUP LINE MEMORY 89*c*12 is ultimately determined by the formation of a winner's master arbitration identification code for arbitration configured at eight groups utilizing one arbitration group line. The ultimate wherein such particular eight bit winner's master arbitration identification code will be located within 36 BIT GROUP LINE MEMORY 89*c*12 upon the completion of arbitration is shown in FIG. 99*a***.

9.5.1. Group Line Input Encoder and Selectors Block Diagram

Figure 105C:
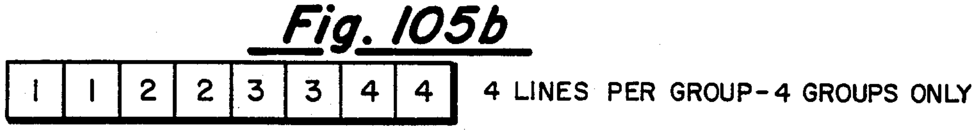
Figure 105D:
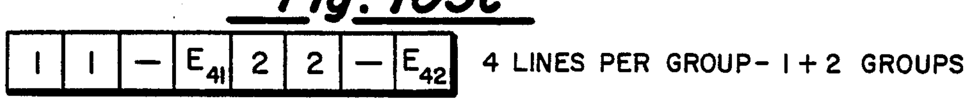

A second level block diagram of the GROUP LINE INPUT ENCODER AND SELECTORS **89*c*08 is shown in FIG. 90*a*. Both the set side and clear side signals representative of the arbitration group line input as captured in MASTER REG.-GROUP LINE INPUT 89*d*04 are received via lines 89*d*01 and 89*d*03 into 1L/G SELECTOR 101*c*02, 2L/G SELECTOR 101*d*02, and GROUP LINE INPUT ENCODER FIRST RANK 90*a*02 within GROUP LINE INPUT ENCODER AND SELECTORS 89*c*08. The 1L/G SELECTOR 101*c*02 is concerned with encoding eight arbitration group lines for Versatile Bus arbitration configurations of one arbitration line per group. The 2L/G SELECTOR 101*d*02 is concerned with encoding the arbitration group lines for configurations of two arbitration lines per group. Both 4L/G SELECTOR FIRST RANK 101*e*02 and 4L/G SELECTOR SECOND RANK 101*e*04 are concerned with the encoding of arbitration group lines when the Versatile Bus Interface are configured for four arbitration lines per group. The arbitration code identifications which are being encoded have formates as are shown in FIGS. 105*a* through 105*e*. The existence of two separate arbitration identification code formats for arbitration at four lines per group, as is shown in FIG. 105*c* and FIG. 105*d*, is the reason that a 4L/G SELECTOR FIRST RANK 101*e*02 and a 4L/G SELECTOR SECOND RANK 101*e*04** are both necessary.

The **1L/G SELECTOR 101*c*02 will be selected by the multiplexed or pipelined configuration of the Versatile Bus (signal not shown) to select appropriate ones of the arbitration group lines on lines 89*d*01 and 89*d*03 to be transferred to FINAL RANK L/G SELECTOR 101*f*02 via line 101*c*01. Basically, the results on up to eight arbitration lines are being reduced upon each arbitration cycle to a single bit which is inserted as bits 1 to 8, respective upon cycles 1 through 8, into the winner master arbitration identification code of format as shown in FIG. 105*a*. The remaining arbitration code identification formats as are shown in FIG. 105*b* through FIG. 105*e* exhibit greater complexity. This greater complexity, as will be later explained, requires a first rank of encoding within GROUP LINE INPUT ENCODER FIRST RANK 90*a*02 as will later be shown in FIG. 101*a* and FIG. 101*b*. This GROUP INPUT ENCODER FIRST RANK 90*a*02 contains one eight line to three line priority encoder with three signal outputs. It contains two, four line to two line priority encoders with two signal outputs each. Finally, translation of multiple arbitration group lines in production of the eight "E" or enablement, bits as appear in the formats of FIG., 105*b*, FIG. 105*d*, and FIG. 105*e* will be provided. Of the six total such "E" bits encoded, two will be signals in common with the aforementioned three signal line and two signal line outputs of the priority encoders. Therefore a total of eleven signals are developed in GROUP LINE INPUT ENCODER FIRST RANK 90*a*02 and emplaced upon lines 101*a*01 and 101*b*01** for use by the selectors.

Under selection control of a configuration either multiplexed or pipelined (signal not shown), **2L/G SELECTOR 101*d*02 will, respectively, select amongst certain ones of signals upon lines 89*d*01 and 89*d*03 or certain ones of signals upon lines 101*a*01 and 101*b*01 for passage via line 101*d*01 to FINAL RANK L/G SELECTOR 101*f*02. The construction of the winners master arbitration identification code in accordance with the format of FIG. 105*e* for arbitration at eight lines per group will not proceed differentially dependent upon whether the arbitration is configured to be multiplexed or pipelined. Thusly four signals occurring upon lines 101*a*01 and 101*b*01 will be passed directly to eight inputs of FINAL RANK L/G SELECTOR 101*f*02**.

Selection within **4L/G SELECTOR FIRST RANK 101*e*02 will transpire in accordance with arbitration configuration at (1 or 2) versus (4) groups (signal not shown). This first rank selection in accordance with the group configuration of arbitration is involved with the formulation of the two formats of arbitration identification codes as attend arbitration at four lines per group and such as are shown in FIG. 105*c* and FIG. 105*d*. The two ground, or zero, signals received by 4L/G SELECTOR FIRST RANK 101*e*02 will be selected by configuration at (1 or 2) groups (signal not shown) and will be utilized in formulation of the unused bits represented by the dashed lines within the format of FIG. 105*d*. The nucleus of a four lines per group arbitration code, such as is appropriate to arbitration at either (1+2) or (4) groups, is passed from 4L/G SELECTOR FIRST RANK 101*e*02 via line 101*e*03 to 4L/G SELECTOR SECOND RANK 101*e*04. Selection within 4L/G SELECTOR SECOND RANK 101*e*04 is in accordance with configuration either pipelined or multiplexed (signal not shown), such as respectively selects six signals upon lines 101*a*01 plus 101*b*01 in conjunction with two ground signals, or else selects the alternative eight signals upon line 101*e*03. The signals selected by 4L/G SELECTOR SECOND RANK 101*e*04 are passed via line 101*e*01 to FINAL RANK L/G SELECTOR 101*f*02**.

One of four selection within FINAL RANK L/G SELECTOR **101*f*02 is in accordance with configuration at one, two, four or eight lines per group to respectively select amongst the eight signals upon lines 101*c*01, 101*d*01, (101*a*01 and 101*b*01), or 101*e*01. The configuration selected signals passed from FINAL RANK L/G SELECTOR 101*f*02 via line 101*f*01 to TEST SELECTOR 89*c*10 and thence to 36 BIT GROUP LINE MEMORY 89*c*12 represent the appropriate, composite, formations of partial winner's master arbitration identification codes from arbitration cycle activities upon all eight group lines. Such codes are in the proper format respective of the configuration of arbitration at various lines per group and groups (as select amongst the five formats shown in FIG. 105*a* through FIG. 105*e*), and the appropriate code is left-justified if multiplexing has been selected. Such justification, if required for multiplexed configuration, exists, of course, not through any shifting but rather through the original construction of the bit positions of the appropriate code as respectively transpire within 1L/G SELECTOR 101*c*02, 2L/G SELECTOR 101*d*02, 4L/G SELECTOR SECOND RANK 101*e*04, and GROUP LINE INPUT ENCODER FIRST RANK 90*a*02** for arbitration at one, two, four or eight lines per group.

Figure 99B:
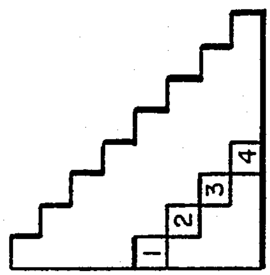
Figure 99C:
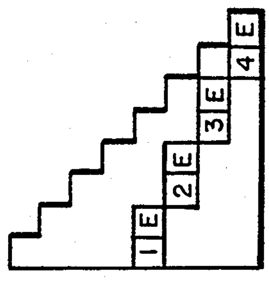
Figure 99D:
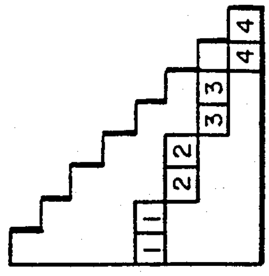
Figure 99E:
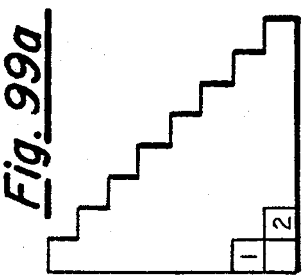
Figure 99F:
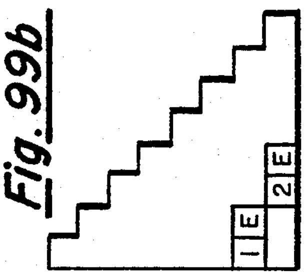
Figure 99G:
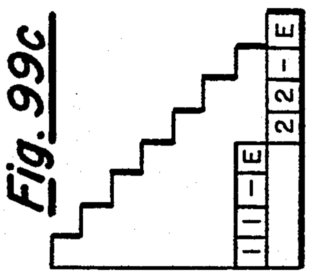
Figure 99H:
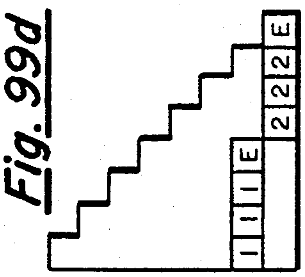
Figure 99I:
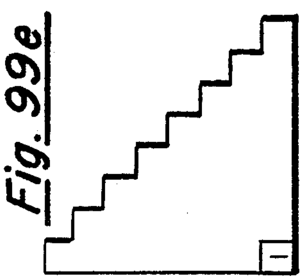
Figure 99J:
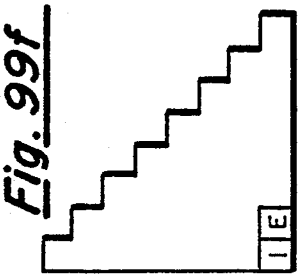
Figure 99K:
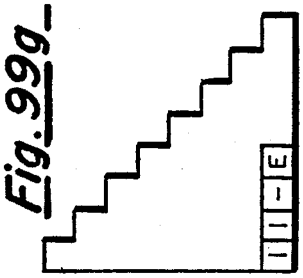
Figure 99L:
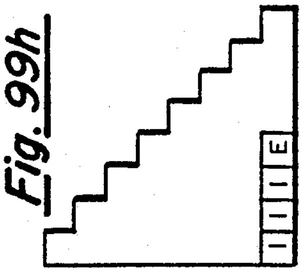

Momentary reference to FIG. **99*a* through FIG. 99*l* and to FIG. 100 may help to conceptualize the contents of such winner's master arbitration identification codes as are in portions passing through FINAL RANK L/G SELECTOR 101*f*02. The ultimate location of the winner's master arbitration identification codes within 36 BIT GROUP LINE MEMORY 89*c*12, such as is depicted in FIG. 99*a* through FIG. 99*l* and such as will be taught in conjunction with the extraction thereof through the INPUT MASTER ID SELECTOR 89*c*04, show arbitration identification codes recognizable by, and associated with, the five formats as shown in FIG. 105*a* through FIG. 105*e***. All the winner's master arbitration identification codes, as are shown in their final locations within 36 BIT GROUP LINE MEMORY 89c12 for the various arbitration configurations of the Versatile Bus in FIG. 99a through FIG. 99l, were entered in successive parts at the first, bottom, rank of 36 BIT GROUP LINE MEMORY 89c12 and shifted upwards upon each cycle of multicycled time-phased arbitration. When looking at the winner's master arbitration identification codes for the various configurations of arbitration as are associated with FIG. 99a through 99l, it must be immediately perceived that the 36 BIT GROUP LINE MEMORY 89c12 contains other immature, in progress, partial formulations of winner's master arbitration identification codes as attend arbitration activities not yet complete upon the Versatile Bus. For example, in the configuration for pipelined arbitration at one line per group and eight groups as is shown within FIG. 99a, an immature winner's master arbitration identification code complete to seven bits would lie directly under the staircase array of bits 1 through 8 as is shown.

It is thusly obvious that in the pipelined case, the eight bit quantity which is being cycled into the first, bottom, rank of 36 BIT GROUP LINE MEMORY 89c12 upon each arbitration cycle contains portions of multiple ultimate winner's master arbitration identification codes are attend multiple arbitration activities upon the Versatile Bus. Save for arbitration configured at one group as is illustrated in FIG. 99i, 99j, 99k, and 99l, the encoded arbitration group lines as are being passed from FINAL RANK L/G SELECTOR 101f02 will always contain portions of more than one winner's master arbitration identification code. Conversely, and as may be hinted at by reference to FIG. 100 (although such FIG. 100 shows the utilization of the arbitration group lines upon the Versatile Bus), during the conduct of multiplexed arbitration there can be, by definition, only one arbitration activity in progress upon a single cycle. Just as the same most significant, "left-justified", arbitration group lines are utilized upon the Versatile Bus (as shown in FIG. 100) then so also will the encoded master's arbitration identification code output from FINAL RANK L/G SELECTOR 101f02 represent only the portion of one single winner's master arbitration identification code, such portion as will be left-justified into the most significant bits. In other words, it is not desirable to alternatively differentially create, or to shift, those portions of the winner's master arbitration identification code as are developed during multiplied arbitration cycles upon the Versatile Bus so that such portions might be installed within 36 BIT GROUP LINE MEMORY 89c12 equivalently to the installation of winner's master arbitration codes within each memory for pipelined configurations of arbitration. The winner's master arbitration identification codes as are developed for multiplexed configurations of the Versatile Bus Interface Logics are still of the five formats as are shown in FIG. 105a through FIG. 105e. But such codes will be emplaced, arbitration cycle by arbitration cycle, winner's master arbitration identification code portion by winner's master arbitration identification code portion, in different alternative, left-justified, postions of 36 BIT GROUP LINE MEMORY 89c12 than such positions as will be occupied, under output patterns arising from FINAL RANK L/G SELECTOR 101f02, in the occurrence of pipelined arbitration. When the replicate encoded portions emplaced in 36 BIT GROUP LINE MEMORY 89c12 during the conduct of arbitration configured multiplexed are extracted from such 36 BIT GROUP LINE MEMORY 89c12 they will occupy the identical positions as are shown in FIG. 99a through FIG. 99l.

9.5.2. Test Selector

The purpose of the TEST SELECTOR 89c10 as shown in the second level block diagram of INPUT MASTER ID ENCODER 89c02 is to enable, under scan/set test control, the creation of a 36 bit shift register from 36 BIT GROUP LINE MEMORY 89c12. During normal operation of the Versatile Bus the TEST SELECTOR 89c10 passes the various encoded portions of the winner's master arbitration identification code as are received from FINAL RANK L/G SELECTOR 101f02, part of GROUP LINE INPUT ENCODER AND SELECTORS functional logical subsection 89c08, upon lines 101f01 during each cycle onto lines 10201 through 10215 as signals SM10 through SM17 to 36 BIT GROUP LINE MEMORY 89c12. The signals SM10 through SM17 on lines 10201 through 10215 are respectively received within the most significant bit of the master register of GROUP LINE 0 MEMORY through the most significant bit of the master register of GROUP LINE 7 MEMORY.

When the TEST SELECTOR 89c10 is enabled for scan/set test of the 36 BIT GROUP LINE MEMORY 89c12 under control of a logical High signal (H) TEST-LOOP D on line 13711 as is received from the scan/set test control section of the Versatile Bus Interface Logics, then data received as signal (H) SCAN/SET INPUT DATA TO 36 BIT GLM on line 11201 is received as the most significant bit of the selected input. Remaining selected signals from the least significant to the second most significant, respectively, arise from the most significant bit of the slave register of group line 1 memory through the most significant bit of the slave register of group line 7 memory. Since the most significant bits of these slave register vary with the corresponding size of the group line memories, such most significant bit will be the sixth bit from SLAVE-GROUP LINE 1 MEM. 103b04 and will be the zero bit from S-GL7M 103h04. Thusly, when scan/set test is selected within TEST SELECTOR 89c10 under the logical High condition of signal (H) TEST-LOOP D on line 13711, the signal (H) SCAN/SET INPUT DATA TO 36 BIT GLM on line 11201 will be connected to signal SMI7 on line 10215. The signal (H) GL7S 0 on line 103h01 will be transferred as signal SMI6 on line 10213 and so on. Thusly, the most significant bit of the seventh group line memory, S-GL7M 103h04, is being connected through TEST SELECTOR 89c10 to the most significant bit of the group line six memory master register, M-GL6M 103g02. This pattern continues until the entirety of the 36 BIT GROUP LINE MEMORY 89c12 is connected as a 36 BIT SHIFT REGISTER. The signal output from the 36 bit shift register created is carried friom SLAVE REG.-GROUP LINE 0 MEM. 103a04 on line 103a01 as quantity SCAN/SET OUTPUT FROM 36 BIT GLM. The actual name of the signal involved is (H) LOOP D-CARRY 2 which is distributed to further scan/settable latches within the scan/set test loop D. In other words, although signal (H) SCAN/SET INPUT DATA TO 36 BIT GLM on line 11201 was received directly from the SCAN/SET DATA functional logical subsection wherein it was connected to the VM Node/maintenance processor, the creation of a scan/set-table 36 bit memory from the 36 BIT GROUP LINE MEMORY 89c12 is not the end of scan/set test loop D, which incorporates further latches. The interconnect of the scan/set test loops within the logics of the current invention, and the entirety of the scan/set test process itself, is not vital, as a test process, to the logical function of the current invention. The interconnect of such loops between logics within the Versatile Bus Interface Logics, including **36 BIT GROUP LINE MEMORY 89*c*12 part of scan/set test loop D, will be later charted. For the purposes of the present explanation it is sufficient to note that logical structure TEST SELECTOR 89*c*10 exists solely in order to implement the scan/set test operation on 36 BIT GROUP LINE MEMORY 89*c*12**.

9.5.3. 36 Bit Group Line Memory

A second level block diagram of the 36 BIT GROUP LINE MEMORY **89*c*12, part of the INPUT MASTER ID ENCODER functional logical subsection 89*c*02, is shown in FIG. 90*b* and FIG. 90*c*. The correspondence between the Group Line Memories 0 through 7 illustrated, in both the master and slave parts, with the previously illustrated staircase form of 36 BIT GROUP LINE MEMORY 89*c*12 within the ARBITRATION SECTION 86*a*02 second level block diagram at FIG. 89*c*, is shown within FIG. 106. Within FIG. 106, it can be seen that the group line memories vary in size from 8 bits within group line 0 memory to 1 bit within group line 7 memory. This is intended to be illustrated within the second level block diagram of FIG. 90*b* and FIG. 90*c* by the variant widths of SLAVE REG.-GROUP LINE 0 MEM. 103*a*04 and MASTER REG.-GROUP LINE 0 MEM. 103*a*02 through S-GL7M 103*h*04 and M-GL7M 103*h*02. Within FIG. 106, the numbers 0 through 7 represent the tiers or ranks of 36 BIT GROUP LINE MEMORY 89*c*12. Information is gated in at the bottom, lowest, or 0th, rank of the GROUP LINE MEMORIES 0 through 7 and respectively cycled to higher ranks upon eacy cycle time consisting of clock φ1 and clock φ2. The manner by which this should be accomplished is illustrated in the second level block diagram of FIG. 90*b* and FIG. 90*c*. The encoded group line inputs are respectively received, as signals SMI0 on line 10201 through SMI7 on line 10215, into group line 0 through 7 memories respectively identified as MASTER REG.-GROUP LINE 0 MEM. 103*a*02 through M-GL7M 103*h*02 within FIG. 90*b* and 90*c*. Each signal SMI0 on line 10201 through SMI7 on line 10215 (meaning Select Memory Inputs) is respectively received at the most significant bit of the master register of the associated group line memory. By momentary reference to FIG. 89*c* and FIG. 89*d*, it may be recalled that these signals SMI0 through SMI7 which are the encoding of the group line inputs, valid within MASTER REG.-GROUP LINE INPUT 89*d*04 from clock φ1 to clock φ1, by GROUP LINE INPUT ENCODER AND SELECTORS 89*c*08, and are passed by TEST SELECTOR 89*c*10, are respectively gated into the master registers of the GROUP LINE MEMORIES 0 through 7 upon clock φ2, signal φ2 on line 13427. Upon the next subsequent occurrence of clock φ1, signal φ1 on line 13401, the contents of the master registers of group line 0 memory through group line 7 memory, of whatsoever width of eight through one bits, will be gated into the associated slave registers of group line 0 memory through group line 7 memory. Finally, when the contents of the slave registers of group line 0 memory through group line 6 memory are respectively gated to the master registers of group line 0 memory through group line 6 memory, the data is left shifted one bit position. Therefore, by momentary reference to FIG. 106, the encoded group line data is being shifted from the lowest rank, 0th level position to higher rank positions upon each complete clock cycle. Various numbers of signals are derived from the respective group line 0 through group line 7 master registers, signals (H) GL0M on line 103*a*03 from MASTER REG.-GROUP LINE 0 MEM. 103*a*02 through signal (H) GL7M on line 103*h*03 from M-GL7M 103*h*02, as the necessary signals to be supplied to next stage INPUT MASTER ID SELECTOR 89*c*04 for the composite formation of a single winner's master arbitration identification code. The numbers and associated bit positions within the group line 0 memory through group line 7 memory upon which these signals need be extracted for the formation of such a winners master arbitration identification code is a function both of the code formats as are shown in FIG. 105*a* through FIG. 105*e* and of the manner of such partial code formation and storage within the 36 BIT GROUP LINE MEMORY 89*c*12 as is illustrated in FIG. 99*a* through 99*c*, and FIG. 99*e* through FIG. 99*l* for eleven cases of pipelined or multiplexed configuration of the Versatile Bus, and in FIG. 99*d*** for a single case of multiplexed configuration for arbitration upon the Versatile Bus.

9.6. Group Count and Shift

Figure 91:
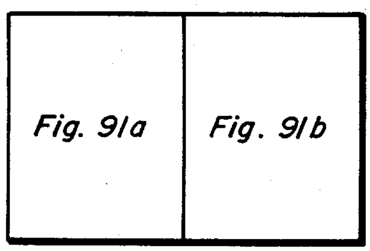
Figure 91A:
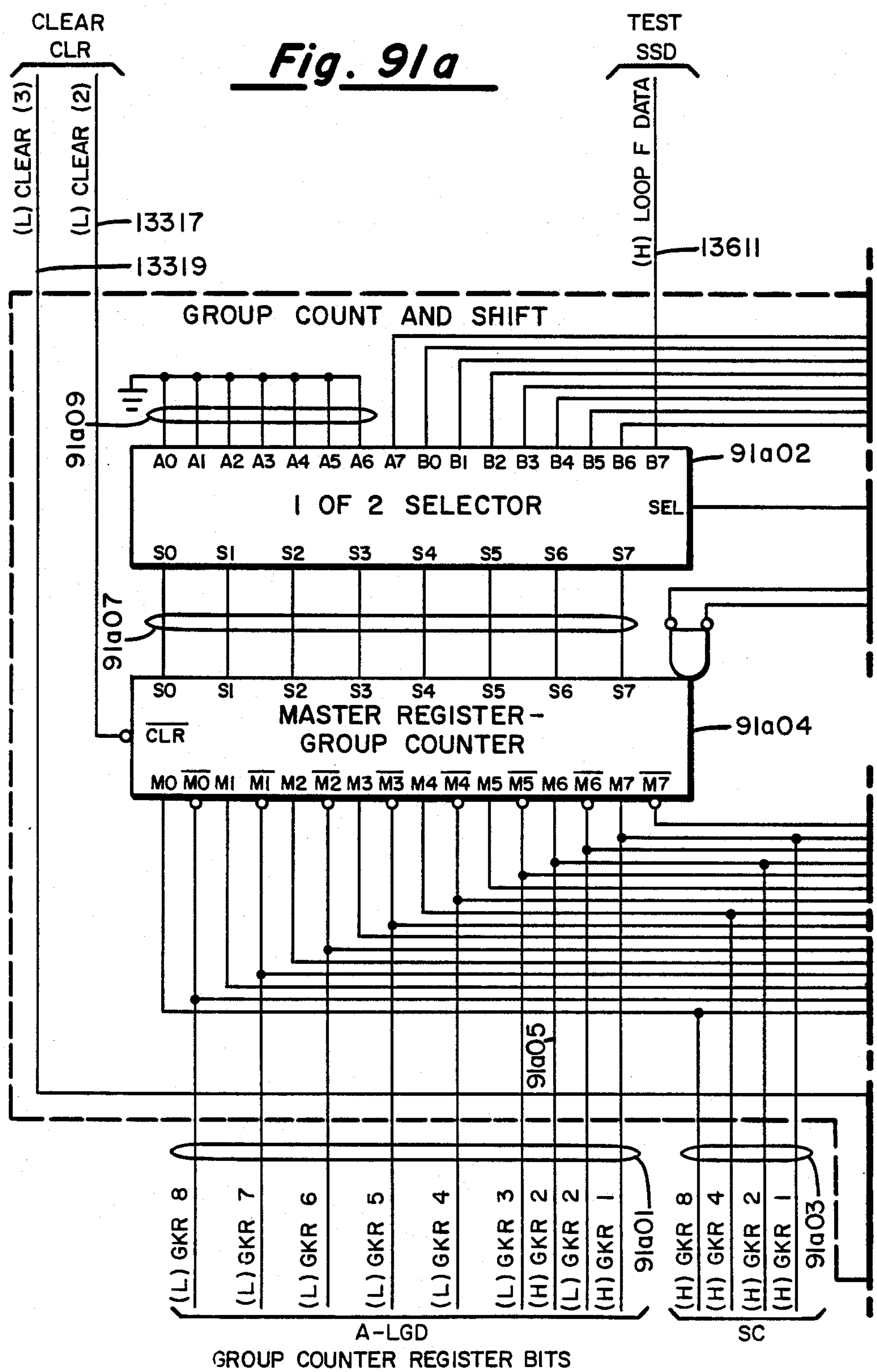
Figure 91B:
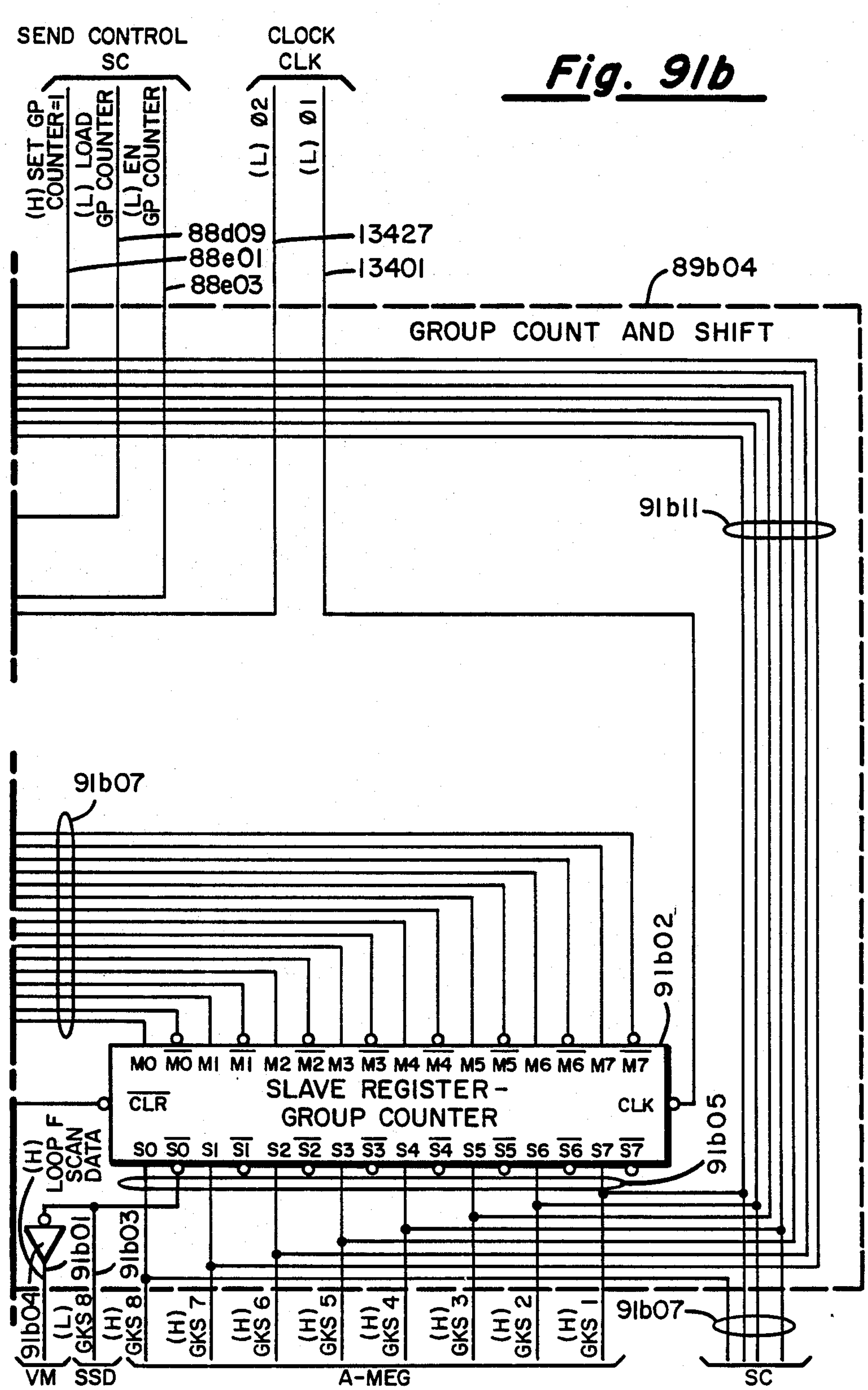

The logic diagram for the GROUP COUNT AND SHIFT functional logical subsection **89*b*04, previously seen in the second level block diagram of the ARBITRATION SECTION 86*a*02 at FIG. 89*b*, is shown within FIG. 91, consisting of FIG. 91*a* and FIG. 91*b*. As may be recalled from the discussion of GROUP COUNT AND SHIFT 89*b*04 in conjunction with the second level block diagram at 89*b*, the function of this logical section is to accept initialization at a count of one and thereafter, under continuing enablement, develop a pattern reflective of the total number of arbitration cycles completed since entrance into arbitration by the current Versatile Bus Interface Logics as an arbitrating master device. This count is simply a shifting bit position, a most significant bit output through a least significant bit output, as identifies a particular one of up to eight cycles of time-phased arbitration which is being participated within as a master device. In other words, GROUP COUNT AND SHIFT 89*b*04 is concerned with the management of the arbitration cycle count for the sending, transmitting, or active participation within that single activity of arbitration with which any one Versatile Bus Interface Logics can be involved as a master participating device at any one time. That a Versatile Bus Interface Logics should be engaged in only one arbitration activity as an arbitrating master, under the arbitration cycle count control as is derived in GROUP COUNT AND SHIFT 89*b*04, is not in conflict with the fact that the results of up to eight pipelined arbitration activities, wherein the present device may be a master device in one, are simultaneously developed within the GROUP LINE INPUT SECTION 89*d*08 and INPUT MASTER ID ENCODER SECTION 89*c*02 and WINNERS MASTER ID SECTION 89*c*06**.

The GROUP COUNT AND SHIFT logis **89*b*04 consist of a MASTER REGISTER-GROUP COUNTER MR8 logical element 89*a*08, a SLAVE REGISTER-GROUP COUNTER SR8 logical element 91*d*02, and an interconnecting 1 OF 2 SELECTOR 1O2 logical element 91*a*02. An initial arbitration group count of one, the setting of the most significant bit within MASTER REGISTER-GROUP COUNTER 91*a*04, is accomplished as follows. The signal (H) SET GP COUNTER=1 on line 88*e*01 is a logical High and the signal (L) LOAD GP COUNTER on line 89*d*09 is a logical Low, both signals as are derived from SEND CONTROL functional logical subsection 86*b*14. This respective A7 data input signal in conjunction with logically Low ground signals received on line 91*a*09 to data inputs A0 through A6, and the respective gating signal received as the select, SEL input signal to 1 OF 2 SELECTOR 1O2 logical element 91*a*02 will cause a single logically true, logically High signal to be transmitted as selected data S7 on cable 91*a*07. Under the logically Low condition of enablement signal (L) EN GP COUNTER on line 88*e*03 (derived from the SEND CONTROL functional logical subsection 86*e*14) and the logical Low occurrence of signal (L) $\phi$2 on line 13427 during clock $\phi$2, the MASTER REGISTER-GROUP COUNTER MR8 logical element 91*a*04 will be gated. As may be recalled by momentary reference to the second level block diagram of ARBITRATION SECTION 86*a*02 appearing in FIG. 89*b*, the arbitration group count signals appearing on cable 91*a*01 (valid from clock $\phi$2 to clock $\phi$2) are transmitted to the 1 LINE/GP and 2 LINE/GP DECODER 93*a*02 and 93*b*02. The signal (H) GKR 2 on line 91*a*05 will also be transmitted to 3 BIT CODE GENERATOR 94*b*02. Additionally, signals (H) GKR 1, (H) GKR 2, (H) GKR 4, and (H) GKR 8 are transmitted via cable 91*a*03 to the SEND CONTROL (ARBITRATION PART) functional logical subsection 89*a*02 part of SEND CONTROL logical subsection 86*b*14**.

All output signals $\overline{M0}$ through $\overline{M7}$ and M0 through M7 as are representative of the set and clear state of all eights within MASTER REGISTER-GROUP COUNTER MR8 logical element **91*a*04 are transmitted via cable 91*b*09 to SLAVE REGISTER-GROUP COUNTER SR8 logical element 91*b*02 wherein they are gatedly upon the logial Low occurrence of signal (L) $\phi$1 on line 13401. From the SLAVE REGISTER-GROUP COUNTER SR8 logical element 91*b*02 signals (H) GKS 1 through (H) GKS 7 are passed upon cable 91*b*05 to the MASK ENABLE GENERATOR 89*b*10, and selective ones of these signals are passed upon cable 91*b*07 to the SEND CONTROL (ARBITRATION PART) functional logical subsection 89*a*02 part of SEND CONTROL logical subsection 86*b*14. It may also be noted that signal (L) GKS 8 on line 91*b*03 output from the S0, least significant bit position of SLAVE REGISTER-GROUP COUNTER SR8 element 91*b*02 is passed to the SCAN/SET DATA functional logical subsection, and the inversion of this signal within IN1 logical element 91*b*04 as passed as signal (H) LOOP F SCAN DATA on line 91*b*01 to the VM Node/maintenance processor. This represents a typical data transmission path for a scan/set test loop. Correspondingly, the path for receipt of scan/set test data is at the point of 1 OF 2 SELECTOR 1O2 logical element 91*a*02. Scan/set test data received as signal (H) LOOP F DATA on line 13611 is selected by the logical High condition of signal (L) LOAD GP COUNTER on line 88*d*09 during enablement for scan/set test. Correspondingly, enablement signal (L) EN GP COUNTER on line 88*e*03 must continue to be a logical Low to enable MASTER REGISTER-GROUP COUNTER MR8 logical element 91*a*04 during the institution of a scan/set testable shift register. Momentary reference to FIG. 88*e*, wherein signal (L) TEST-LOOP F on line 13719 is utilized in the formation of these signals, will verify that the current GROUP COUNT AND SHIFT functional logical subsection 89*b*04** may be enabled for san/set test.

In the normal utilization of the GROUP COUNT AND SHIFT functional logical subsection **89*b*04 as appears in FIG. 91*a* and FIG. 91*b*, the left-shifted oen interconnection of SLAVE REGISTER-GROUP COUNTER SR8 logical element 91*b*02 via cable 91*b*11 to the B0 through B7, data inputs of 1 OF 2 SELECTOR 1O2 logical element 91*a*02 and thence via cable 91*a*07 back to MASTER REGISTER-GROUP COUNTER MR8 logical element 91*a*04 dictates that during each complete clock cycles, clock $\phi$1 and clock $\phi$2, the initial most significant bit within MASTER REGISTER-GROUP COUNTER MR8 logical element 91*a*04 will be left-shifted one bit position. To enable this continuation count signal (L) LOAD GP COUNTER on line 88*d*09 will be reset at the logical High condition by the SEND CONTROL logics 86*b*14 following the initialization of the group count. Therefore the arbitration group count as is valid from clock $\phi$2 to clock $\phi$2 within MASTER REGISTER-GROUP COUNTER MR8 logical element 91*a*04, and as is valid from clock $\phi$1 to clock $\phi$1 within SLAVE REGISTER-GROUP COUNTER SR8 logical element 91*b*02, resides simply within a shifting bit position of the signal output by both counters. Signals (L) CLEAR (3) on line 13319 and (L) CLEAR (2) on line 13317 may be respectively utilized to clear the SLAVE REGISTER-GROUP COUNTER SR8 loical element 91*b*02 and MASTER REGISTER-GROUP COUNTER MR8 logical element 91*a*04 only upon Veratile Bus Interface Logics initialization. The manner by which the GROUP COUNT AND SHIFT logics 89*b*04 are initialized and set under control of SEND CONTROL functional logical subsection 86*b*14** negates that clearing needs occur during normal Versatile Bus Interface Logics operation.

9.7. Master ID

Figure 105E:
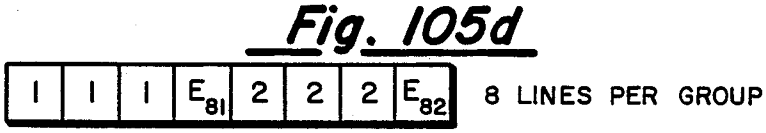

The logic diagram of the MASTER ID function logical subsection **89*a*04 part of ARBITRATION SECTION 86*a*02 is shown within FIG. 92, consisting of FIG. 92*a* and FIG. 92*b*. The interconnection of a master register, MASTER REG.-MASTER ID MR8 logical element 92*a*04, and a slave register, SLAVE REG.-MASTER ID SR8 logical element 92*b*02, is familiar from the just explained GROUP COUNT AND SHIFT functional logica subsection 89*b*04 shown in FIG. 91. Herein in the MASTER ID functional logical subsection 89*a*04 the intermediary connective element is not a 102 logical element, but rather a BINARY SHIFT MATRIX BSM logical element 92*a*02. Recalling the function of the MASTER ID functional logical subsection 89*a*08 by momentary reference to FIG. 89*a* and accompanying text, the User's master arbitration identification code will be held valid from clock $\phi$2 to clock $\phi$2 within MASTER REG.-MASTER ID MR8 logical element 92*a*04. Held therein, it is provided upon cable 92*a*01 as various signals (H) MIDR 0 through (L) MIDR 7 to the 3 BIT CODE GENERATOR 94*b*02 and the 1 LINE/GP AND 2 LINE/GP DECODERS 93*a*02, 93*b*02 all part of the group line decode functional logical subsection of the ARBITRATION SECTION. The remaining function of the MASTER ID functional logical subsection 89*a*04, such as it is enabled through BINARY SHIFT MATRIX BSM logical element 92*a*02 and associated interconnect, is to justify the User's master arbitration identification code, as needs subsequently be encoded for group line drive, during arbitration at four or eight lines per group. All User's master arbitration identification code recovery, and subsequent shifting thereof, is enabled from respective signals (H) INT TRANS on line 88*d*11, (H) SHIFT MIDR X4 on line 88*e*09, and (H) SHIFT MIDR X2 on line 88*e*11, and from SEND CONTROL functional logical subsection 86*b*14. Upon the logical High occurrence of signal (H) INT TRANS on line 88*d*11 combined with the logical Low condition of signals (H) SHIFT MIDR X4 on line 88*e*09 and (H) SHIFT MIDR X2 on line 88*e*11, signals (H) UMID 0 on line 92*b*01 through (H) UMID 7 on line 92*b*15 will allow recovery of the User's master arbitration identification code through BINARY SHIFT MATRIX BSM logical element 92*a*02 into MASTER REG.-MASTER ID MR8 logical element 92*a*04 upon the enablement of such MR8 element as is provided by the logical Low condition of signals (L) EN MIDR on line 88*e*07 and (L) $\phi$2 on line 13727. Thusly the User's master arbitration identification code is initially lodged, unshifted, within MASTER REG.-MASTER ID MR8 logical element 92*a*04 upon the User initiated transaction request to the present Versatile Bus Interface Logics. During each occurrence of a logical Low signal (L) $\phi$1 on line 13401 the eight bit contents of MASTER REG.-MASTER ID MR8 logical element 92*a*04, as are transmitted in both normal and complemented forms via sixteen signal lines of cable 92*b*05, will be gated into SLAVE REG.-MASTER ID SR8 logical element 92*b*02 upon the logical Low occurrence of signal (L) $\phi$1 on line 13401. Subsequently, data output signals S1 through S7 of SLAVE REG.-MASTER ID SR8 logical element 92*b*02 are supplied via cable 92*b*07 as data inouts R1 through R7 to BINARY SHIFT MATRIX BSM logical element 92*a*02. Recalling the manner of the shifting within a BINARY SHIFT MATRIX BSM logical element as is shown in FIG. 73*f*, the possibility exists of shifting the User's master arbitration identification code by two or four places before each subsequent recapture within MASTER REG.-MASTER ID MR8 logical element 92*a*04 upon the appropriate enablement and clock $\phi$2 occurrence. For arbitration configured at one or two lines per group this User's master arbitration identification code needs be, and will be, never shifted. For arbitration at four and eight lines per group, the winners master arbitration identification code will be, at the appropriate time, respectively shifted by two bit positions and by four bit positions in BINARY SHIFT MATRIX BSM logical element 92*a*02 before becoming relodged within MASTER REG.-MASTER ID MR8 logical element 92*a*04 upon each subsequent clock cycles beyond the first clock cycle of time-phased arbitration. Howsoever often this justification should happen for arbitration at four or eight lines per group is dependent upon the number of groups which are configured. This process may be reviewed by reference to the formation of signals (H) SHIFT MIDR X2 on line 88*e*11 and (H) SHIFT MIDR X4 on line 88*e*09 as shown in FIG. 88*e*. By momentary reference to the User's master arbitration identification code formats for four and eight lines per group as are shown in FIG. 105*c* through FIG. 105*e*, it may be noted that the code format of FIG. 105*c* has a utilization of two bits for encoded group line formation per arbitration cycle time whereas the formats of FIG. 105*d* and FIG. 105*e* each utilize four bits for the generation of the encoded group lines upon each cycle time. The manner by which the User's master arbitration identification code format of FIG. 105*c*, the arbitration code format for arbitration configured at four lines per group and four groups, should before left-justified by two's into the least significant bits of MASTER REG.-MASTER ID MR8 logical element 92*a*04 is via the logical Low condition of signal (H) INIT TRANS on line 88*d*11, the logical Low condition of signal (H) SHIFT MIDR X4 on line 88*e*09, and the logical High condition of signal (H) SHIFT MIDR X2 on line 88*e*11, such signals as are the shift control inputs to BINARY SHIFT MATRIX BSM logical element 92*a*02. The effect of such shift control signals in developing an output shifted by two places may be reviewed within the truth table for the BSM logical element occurring within FIG. 73*f*. Similarly, the User's master arbitration identification code formats of FIG. 105*d* and FIG. 105*e* will require, at the appropriate cycle time of utilizing the second half of the arbitration code word that left shifting by four bits shall occur in order to so justify these formats within the least significant bits of MASTER REG.-MASTER ID MR8 logical element 92*a*04. Such left shifting by four is accomplished under the logical Low condition of signal (H) INIT TRANS on line 88*d*11, the logical High condition of signal (H) SHIFT MIDR X4 on line 88*e*09 and the logical Low condition of signal (H) SHIFT MIDR X2 on line 88*e*11 as are collectively input as most significant, SH8, through least significant, SH2, shift signals to BINARY SHIFT MATRIX BSM logical element 92*a*02. The left-justified User's master arbitration identification code pattern which is passed, at either two or four bits, to 3 BIT CODE GENERATOR 94*b*02 during arbitration at four or eight lines per group is carried upon signals (L) MIDR 0 on line 92*a*03, signal (L) MIDR 1 on line 92*a*05, signal (L) MIDR 2 on line 92*a*07 and signal (L) MIDR 3 on line 92*a*09**.

The enablement of the MASTER ID functional logical subsection **89*a*04 for scan/set test of registers MASTER REG.-MASTER ID MR8 logical element 92*a*04 and SLAVE REG.-MASTER ID SR8 logical element 92*b*02 is accomplished via control signal (H) TEST-LOOP D on line 13711 and signal (H) LOOP D-CARRY 1 on line 89*a*09 as are respectively input to the test (TD) control and data inputs of BINARY SHIFT MATRIX BSM logical element 92*a*02. The shifted scan/set data is extracted from the least significant bits of SLAVE REG.-MASTER ID SR8 logical element 92*b*02 via the S0 output signal (L) MIDS 0 on line 92*b*01 to scan/set data functional logical subsection, and via the S0 logical output as inverted by IN1 logical element 92*b*04 and supplied as signal (H) LOOP D SCAN DATA upon line 92*b*03 to the VM Node/maintenance processor. The interconnection of test loops, in this case LOOP D, for enablement of the scan/set test operation is later covered. As with previous GROUP COUNT AND SHIFT functional logical subsection 89*b*04, the utilization of signal (L) CLEAR (3) on line 13319 and (L) CLEAR (2) on line 13317 by respective SLAVE REG.-MASTER ID SR8 logical element 92*b*02 and MASTER REG.-MASTER ID MR8 logical element 92*a*04 of MASTER ID functional logical subsection 89*a*04** is purely for initialization. The clear signals, as are ultimately derived from the VN Node/maintenance processor, are utilized throughout the Versatile Bus Interface Logics only for initialization and not during normal operation.

9.8. One Line per Group and Two Line per Group Decoders

The logic diagram of 1 LINE/GP DECODER **93*a*02 and 2 LINE/GP DECODER 93*b*02 part of ARBITRATION SECTION 86*a*02 is shown in FIG. 93, consisting of FIG. 93*a* and FIG. 93*b*. The purpose of 1 LINE/GP DECODER 93*a*02 is to encode the User's master arbitration identification received as MASTER ID REGISTER BITS on cable 92*a*01 into the encoded group line output signals (H) EGL0 (1L/G) through (H) EGL7 (1L/G) on cable 93*a*01. Such encoding is done in consideration of the current arbitration group count received as GROUP COUND AND SHIFT REGISTER BITS signals (H) GKR 1 through (L) GKR 8 on cable 91*a*01 and in consideration of whether the Versatile Bus is multiplexed under control of signal (H) MPX 1 on line 126*b*23. In the case of the configuration of arbitration at one line per group, the User's master arbitration identification code being encoded is of the format shown in FIG. 105*a*. This User's master arbitration identification code is utilized in up to eight bits, respectively bits 1 through 8 as shown in FIG. 105*a*, for the control of a single arbitration group line in up to eight cycles of time-phased arbitration. When a corresponding bit within the User's master arbitration identification code for one line per group as shown in FIG. 105*a* is set, then such arbitrating Versatile Bus Interface Logids will drive an arbitration group line to the logical true condition during the associated cycle of time-phased arbitration. When the associated bit 1 through 8 of the User's master arbitration identification code is not set, then the arbitrating Versatile Bus Interface Logics will not drive the arbitration group line. The detection of signals upon said arbitration group lines which were not driven by the current arbitrating Versatile Bus Interface Logics is an indication of the loss of arbitration as conducted at the current Versatile Bus Interface Logics under the current User's master arbitration identification code quantity. The manner by which a single arbitration group line will be driven during each cycle of up to eight cycles of time-phased arbitration is shown for arbitration at up to eight groups configured at one line per group in FIG. 100. The eight arbitration group lines are arrayed, as eight pins, from left to right as arbitration group line zero through arbitration group line seven. The conduct and results of arbitration on most significant arbitratio group line zero is of greater significance than the conduct and results of arbitration upon arbitration group line one and so on down to least significant arbitration group line seven. The conduct of pipelined arbitration at eight arbitration groups and one arbitration group line per group as illustrated in FIG. 100 shows a differential arbitration group line utilization for each of eight cycles. Conversely, during the multiplexed configuration of arbitration at eight groups and one group line per arbitration group the same arbitration group line, arbitration group line zero, is utilized throughout all cycles of multiplexed arbitration. From the pipelined utilization of the arbitration group lines it may be observed that up to eight total cycles of time overlapped pipelined arbitration may be simultaneously in progress upon VERSATILE BUS 86*a*01. Conversely, when arbitration is configured to be multiplexed there is but a single arbitration activity in progress upon the Versatile Bus at any one time. Regardless of the potential existence of a plurality of pipelined arbitration activities in progress, a single Versatile Bus Interface Logics interconnected device is concerned with the participation in but a single activity of arbitration as a master device at any one time. Such an activity is carried on by drive of the respective group lines through the respective cycles as are illustrated within the diagram of FIG. 100** for howsoever many number of cycles ensue before the present Versatile Bus Interface Logics either loses arbitration or recognizes the conclusion thereof, and its position as the bus-owning arbitration-winning master-owner device.

By comparison of the ultimate encoded utilization of the arbitration group lines utilizing one such group line for each of eight, four, two, or one arbitration groups as are separately illustrated in FIG. 100, the manner of the function of 1 LINE/GP DECODER **93*a*02 as shown in FIG. 93*a* may be anticipated. The signal (H) MPX 1 on line 126*b*23 from configuration control, a logically High signal of multiplexing is configured, is supplied directly to NO3 logical elements 93*a*08 through 93*a*20 and is inverted in NA2 logical element 93*a*04 for supply to NO2 logical element 93*a*06 and additional elements. The effect of the logical High, multiplexed, condition of signal (H) MPX 1 on line 126*b*23 is to disable for encoded group line drive all logical NO3 elements 93*a*08 through 93*a*20 while enabling the response of NO2 logical element 93*a*06 to the receipt of signal (L) MIDR 0 on cable 92*a*01 from the most significant bit position of MASTER REG.-MASTER ID 92*a*04. As the User's master arbitration identification code as contained in such MASTER REG.-MASTER ID 92*a*04 is left circularly shifted during each of up to eight cycles within functional logical subsection MASTER ID 89*a*04, such signal (L) MIDR 0 on cable 92*a*01 will successively assume the values as are represented by bits 1 through 8 of the such User's master arbitration identification code (reference FIG. 105*a*). The resultant signal (H) EGL0 (1L/G) part of cable 93*a*01 will effectuate the control of most significant arbitration group line zero in a manner as is shown for the multiplexed arbitration configuration cases in FIG. 100. If arbitration is not configured multiplexed, as represented by the logical Low condition of signal (H) MPX 1 on line 126*b*23, the NO3 logical elements 93*a*08 through 93*a*20 will be respectively enabled under receipt of logical Low signals (L) MIDR 1 through (L) MIDR 7 plus the group count and shift enablement; respective signals (L) GKR 2 through (L) GKR 7 on cable 91*a*01. If the appropriate arbitration master identification code bit is logically true, as represented by respective logical Low condition of signals (L) MIDR 1 through (L) MIDR 7 on cable 92*a*01, and the group count of arbitration, as represented by a single one of signals (L) GKR 2 through (L) GKR 8 is appropriate for the recognition of such signal, then the appropriate one of NO3 logical elements 93*a*08 through 93*a*20 may be enabled to produce a coded group line signal, (H) EGL1 (1L/g) through (H) EGL7 (1L/G) upon cable 93*a*01. When it is recalled, by momentary reference to FIG. 91*a*, that MASTER REG.-GROUP COUNTER 91*a*04 merely preserves the current arbitration group count as a single bit such as will result, with increasing count, in the respective logical High condition of signal (H) GKR 1 followed by successive respective logical Low conditions of signals (L) GKR 2 through (L) GKR 8 upon cable 91*a*01, then the sequence of signals (H) EGl0 (1L/G) through (H) EGL7 (1L/G) as are output upon cable 93*a*01 will be represented, in time sequence, by that arbitration group line utilization as is labeled 1 up to 8 within the four arbitration cases within FIG. 100** wherein the arbitration is configured pipelined upon a single group line.

Continuing in FIG. 93, the function of 2 LINE/GP DECODER 93b02 as shown in FIG. 93b is to decode the User's master arbitration identification code at two lines per group, of such format as is shown in FIG. 105b, into the encoded group line output signals (H) EGL0 (2L/G) through (H) EGL7 (2L/G) upon cable 93b01 in accordance with the group count and shift register bits upon signals (H) GKR 1 through (L) GKR 8 upon cable 91a01. During arbitration upon two group lines as is illustrated for the three cases of four, two and one arbitration groups within FIG. 100, successive pairs of arbitration group lines from most significant arbitration group lines 0 and 1 through least significant arbitration group lines 6 and 7 will be driven upon the Versatile Bus in the event of pipelined configuration, or the most significant arbitration group line 7 and next most significant arbitration group line 6 only will be driven throughout all cycles of time-phased arbitration in the event of a multiplexed configuration therefor. Referencing the User's master arbitration identification code format for arbitration configured for two lines per group as shown in FIG. 105b, bits $E_{21}$, $E_{22}$, $E_{23}$, and $E_{24}$ represent enablement bits for each of up to four groups of arbitration. If enablement bit $E_{21}$ is set, or equal to a logical "1", then the most significant arbitration group line 0 will be driven in the event that code bit 1 is a logical "1", else next most significant arbitration group line 6 will be driven in the event that code bit 1 is equal to a logical "0". In other words, allowable binary values of 00, 01, 10, and 11 for bits 1 and $E_{21}$ of the User's master arbitration identification code format of two lines per group are allowably decoded into a 00, 01, 00, and 10 respective drive of most significant arbitration group lines 0 and 1. Therefore, a code in two bits, bits 1 and $E_{21}$ of the User's master arbitration identification code, reduces to the drive of no, or but a single one, of the arbitration group lines. Considering, for example, the function of NO3 logical element 93b04, the signal (H) EGL0 (2L/G) within cable 93b01 will be generated only for User's master arbitration identification code bits of 1 and $E_{21}$ equal to logical "11" within the User's master arbitration identification code format of FIG. 105b. Such a logical "11" condition of these two arbitration code bits is received as logically Low signal (L) MIDR 0 and (L) MIDR 1 at NO3 logical element 93a04. The appropriate first cycle group count as represented by the logical High condition of signal (H) GKR 1 part of cable 91a01 is inverted in NO2 logical element 93a04 and furnished to NO3 logical element 93b04 in satisfaction thereof. The resultant logical High signal (H) EGL0 (2L/G) will ultimately cause the logical true drive of arbitration group line 0. In a similar manner, remaining NO3 logical element 93b06 and NO4 logical element 93b08 through 93b18 are respectively enabled for the associated enablement of arbitration group lines 1 through arbitration group line 7 in accordance with User's master arbitration identification code as is supplied as MASTER ID REGISTER BITS upon cable 92a01 and the arbitration group count as is supplied by GROUP COUNT AND SHIFT REGISTER BITS upon cable 91a01.

9.9. 3 Bit Code Generator and 3 To 8 Decoder

Figure 94:
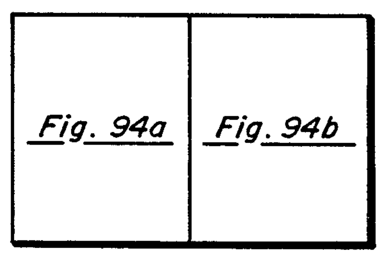
Figure 94A:
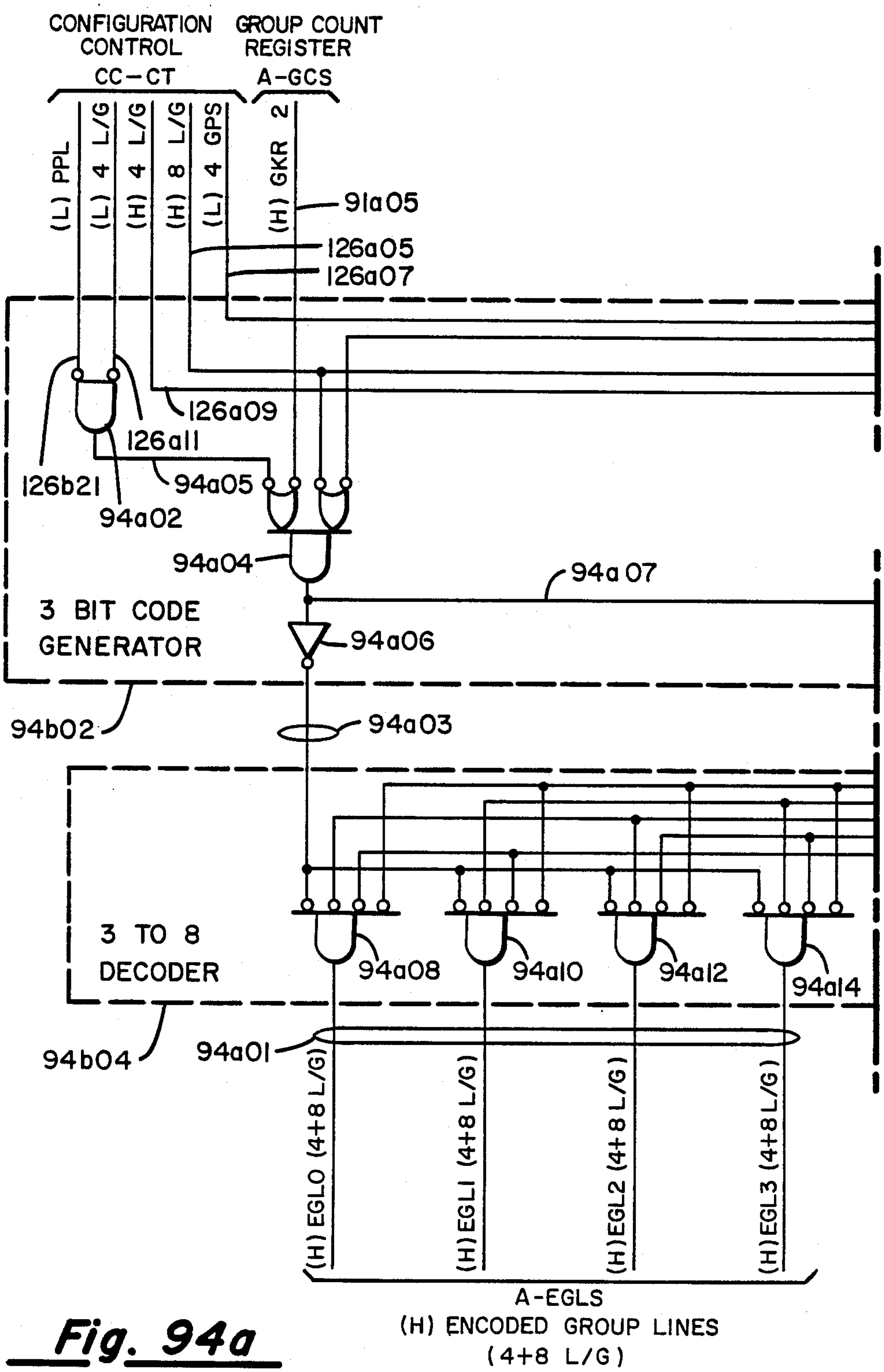
Figure 94B:
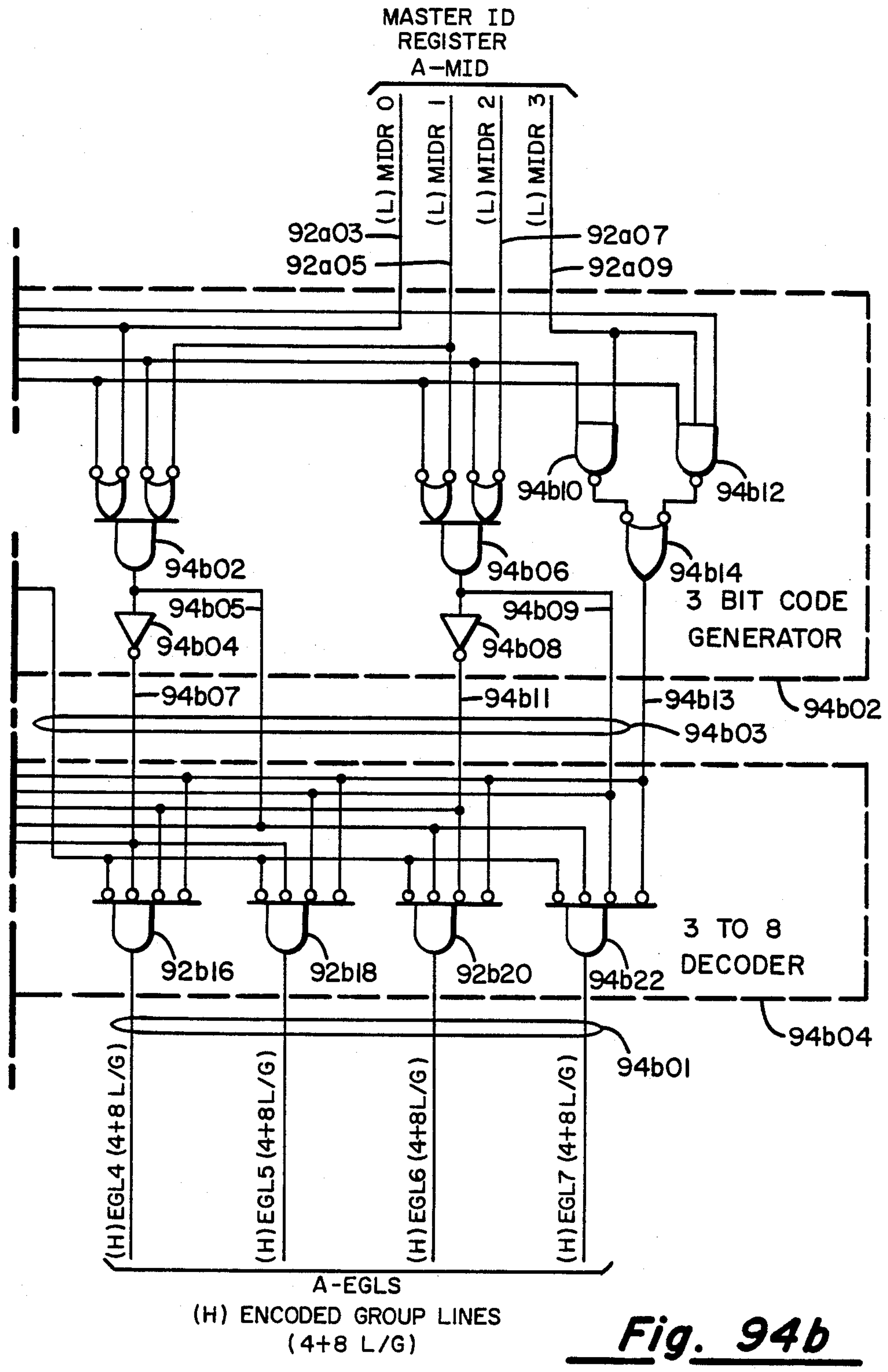

The logic diagram for the 3 BIT CODE GENERATOR 94b02 and the 3 TO 8 DECODER 94b04 part of ARBITRATION SECTION 86a02 is shown in FIG. 94, consisting of FIG. 94a and FIG. 94b. By momentary reference to the second level block diagram of FIG. 89a, and the accompanying discussion thereof, it may be recalled that these structures are involved in the formation of the encoded pattern for the arbitration group lines when the Versatile Bus Interface Logics is configured at four or eight arbitration lines per group. The User's master arbitration identification code formats for arbitration at four lines per group—four groups, four lines per group—one plus two groups, and eight lines per group are respectively shown in FIG. 105c, FIG. 105d, and FIG. 105e. For arbitration at four lines per group—four groups the User's master arbitration identification code, as is successively shifted by twos to the most significant bits of MASTER REG.-MASTER ID 92a04 part of the MASTER ID functional logical subsection 89a04, will be decoded two most significant bits at a time. For arbitration at four lines per group—one plus two groups or eight lines per group the upper most four bits from MASTER REG.—MASTER ID 92a04 will be decoded during a first and during a second (potential) cycle of time-phased aribration.

Commencing with the decode of the group lines for arbitration at four lines per group—four groups, it may be initially noted from the permissible combinations of arbitration table shown in FIG. 20 and from the utilization of arbitration group lines as shown in FIG. 100 that this configuration of four lines per group and four groups is permissible only when arbitration is multiplexed. In such a multiplexed case of four arbitration groups utilizing four group lines as is shown in FIG. 100, only encoded group lines 0 through 3 are utilized. Additionally it may be immediately noticed that for only the single case of pipelined arbitration configured at two groups and four group lines are the encoded group lines 4 through 7 ever utilized during a second phase of time-phased arbitration. Therefore the logical Low condition of signal (L) PPL on line 126b21 and the logical Low condition of signal (L) 4L/G on line 126a11 satisfies NO2 logical element 94a02 and emplaces a logical High signal condition on line 94a05. Upon a second cycle of the arbitration group count register wherein signal (H) GKR 2 on line 91a05 becomes a logical High, AOI 2-2 logical element 94a04 will not be satisfied from any input and a logical Low signal will result on line 94a97. This signal is received on NO4 logical elements 94b16 through 94b22 and enables the decode drive of signal lines (H) EGL4 (4+8L/G) through (H) EGL7 (4+8L/G) on cable 94b01. Conversely, during a first cycle of arbitration at four lines per group wherein signal (H) GKR 2 on line 91a05 is a logical Low, or during the multiplexed configuration of arbitration at four lines per group wherein signal (L) PPL on line 126b21 is a logical High forcing a logical Low signal on line 94a05, then AOI 2-2 logical element will be satisfied emplacing a logical High signal on line 94a07 disabling NO4 logical elements 94b16 through 94b22. When this logically High signal on line 94a07 is inverted in IN1 logical element 94a06 and applied via line 94a03 to NO4 logical element 94a08 through 94a14 then such signal serves as an enablement of such elements for respective production of signals (H) EGL0 (4+8L/G) through (H) EGL 3 (4+8L/G) on cable 94a01 for control of arbitration group lines 0 through 3. Therefore the first two inputs of AOI 2-2 logical element 94a04 have been concerned with the upper-half, lower-half control of arbitration group lines 0 through 7 for arbitration occurring at four lines per group.

Continuing in FIG. 94a, the right-most two inputs to AOI 2-2 logical element 94a04 are concerned with encoding of the most significant group line during arbitration configured at eight lines per group. Similarly, the right-most two inputs to AOI 2-2 logical element **94*b*02 are concerned with encoding the next most significant group line during arbitration configured at eight lines per group and the final right-most two inputs of AOI 2-2 logical element 94*b*06 are concerned with the generation of the least significant group line control during arbitration at eight lines per group. Meanwhile, the left most two inputs to AOI 2-2 logical element 94*b*02 are concerned with the encoding of the most significant group line drive for arbitration at four lines per group, whereas the left most two inputs to AOI 2-2 logical element 94*b*06 are concerned with the encoding of the least significant group line drive at arbitration configured for four lines per group. Remaining logical elements NA2 94*b*10, NA3 94*b*12, and NA2 94*b*15** and associated interconnected are concerned with the development of a four bit per group—one and two groups encoded arbitration group line drive in consideration of the enable bits appearing within that format.

In order to understand the logics by which the 3 BIT CODE GENERATOR **94*b*02, containing AOI 2-2 logical elements 94*a*04, 94*b*02, and 94*b*06 and 3 TO 8 DECODER 94*b*04 (containing NO4 logical elements 94*a*08-94*a*14, 94*b*16-94*b*22) develops the encoded arbitration group line drive, it is first necessary to consider the method of converting the User's master arbitration identification code formats for four and eight lines per group as are shown in FIG. 105*c* through 105*e* into encoded arbitration group line drive. The User's master arbitration identification code format for arbitration at four lines per group and four groups as shown in FIG. 105*c* needs translate into the multiplexed arbitration utilization of the arbitration group lines as is shown in FIG. 100. Each two bit code—11, 22, 33, and 44—within the User's master arbitration identification code format is translated upon a respective first through fourth arbitration cycle time into control of four group lines. Each two bit field within the User's master arbitration identification code format as shown in FIG. 105*c* is translated into one of four signals such as will control the logical true state of but a single arbitration group line. For the encoding of the arbitration group line drive for arbitration at four lines per group, one or two groups, the four bit first field consisting of 11-$E_{41}$ and the four bit second field consisting of 22-$E_{42}$ of the Users master arbitration identification code shown in FIG. 105*d* must be translated into the control of four arbitration group lines per cycle as illustrated for these configured cases in the chart of FIG. 100. The bit $E_{41}$ is an enablement bit such as will allow the encoding of any group line drive at all from the value contained in field 11, and the bit $E_{42}$ is similarly an enablement bit which will allow the encoding of any group line drive during a second cycle of arbitration from the contents of field 22. The one of four encoding of the binary fields "11" and "22" transpires as before, with the resultant encoding being gated under the control of the enablement bits. Note also within FIG. 100 that for arbitration configured pipelined at two groups of four lines per group the encoding of field "22" within the User's master arbitration identification code format of FIG. 105*d*, such encoding as is gated under control of enablement bit $E_{42}$, will be for the encoded group line drive of arbitration lines 4 through 7. Finally, the User's master arbitration identification code format for arbitration at eight lines per group as shown in FIG. 105*e* demands that the three bit fields "111" and "222" be respectively decoded under respective control of enablement bits $E_{81}$ and $E_{82}$, for the encoded arbitration group line drive of eight arbitration group lines upon a respective first and (a potentially configurable) respective second cycle of time-phased arbitration. The binary 000 value for these bit "111" and "222" fields of the eight line per group User's master arbitration identification code format as shown in FIG. 105*e* would cause the encoded group line drive of least significant arbitration group line 7. Conversely, the binary "111" value within these three bit fields would cause the encoded drive of most significant arbitration group line 0. Thusly, all User's master arbitration identification code formats as are shown in FIG. 105*a* through FIG. 105*e*** decode to the drive of but a single one, or potentially none, of the arbitration group lines by the present arbitrating Versatile Bus Interface Logics upon each single cycle of time-phased arbitration. Thusly, the fields within all formats have been seen adequate to encode the requisite number of arbitration group lines as are associated with each format.

Returning to FIG. 94, the decoding of first cycle of arbitration configured at four lines per group for one or two groups, such as utilizes the User's master arbitration identification code format as shown in FIG. **105*d*, will be given as an example of the function of 3 BIT CODE GENERATOR 94*b*02 and 3 TO 8 DECODER 94*b*04. By momentary reference to the arbitration group line utilization upon a first cycle of arbitration configured at four lines per group and either one or two groups as shown within FIG. 100, it may be ascertained that most significant arbitration group line 0 through 3 needs be encoded for a first cycle of arbitration so configured regardless of whether arbitration should be multiplexed or pipelined. Signal (H) GKR 2 on line 91*a*05 will be a logical Low for this first cycle count of arbitration upon four group lines thereby enabling AOI 2-2 logical element 94*a*04 regardless of the logical High or Low signal as may occur upon line 94*a*05 responsive to NO2 logical element 94*a*02. The resultant logical High signal on line 94*a*07 disables NO4 logical elements 94*b*16 through 94*b*22. The inversion of this logical High signal on line 94*a*07 within IN1 logical element 94*a*04 provides a logical Low signal upon line 94*a*03 to NO4 logical elements 94*a*08 through 94*a*14. The further respective satisfaction of these NO4 logical elements 94*a*08 through 94*a*14 will enable the respective generation of signals (H) EGL0 (4+8L/G) through signal (H) EGL3 (4+8L/G) on cable 94*a*01, such signals as control arbitration group lines 0 through 3. Such enabling signals to these NO4 logical elements 94*a*08 through 94*a*14 are developed within the logics of 3 BIT CODE GENERAOR 94*b*02 as appear in FIG. 94*b*. The logical Low condition of signal (H) 8 L/G on line 126*a*05 (because arbitration is configured in the example at four lines per group) is received at AOI 2-2 logical element 94*b*02, AOI 2-2 logical element 94*b*06 and NO2 logical element 94*b*10. This logically low condition of signal (H) 8 L/G on line 126*a*05 will satisfy the right half of AOI 2-2 logical elements 94*b*02 and 94*b*06 while disabling NO2 logical element 94*b*10. Since signal (H) 4 L/G on line 126*a*09 is a logical High as received by left side inputs of AOI 2-2 logical elements 94*b*02 and 94*b*06, such logical elements needs be respectively satisfied by left side inputs arising from signals (L) MIDR 0 on line 92*a*03 and (L) MIDR 1 on line 92*a*05. By momentary reference to the User's master arbitration identification code format as shown in FIG. 105***d*, these signals may be seen to be derived from the two bit "11" field within such format User's master arbitration identification code as is currently left-justified within MASTER REG.-MASTER ID 92*a*04. If both bits within field "11" were set to a binary "1", then both signals (L) MIDR 0 on line 92*a*03 and (L) MIDR 1 on line 92*a*05 would be logically Low responsively thereto. The resultant satisfaction of AOI 2-2 logical element 94*b*02 and AOI 2-2 logical element 94*b*06 would respectively emplace logically High signal conditions on lines 94*b*05 and 94*b*09. Such a logically High signal condition on line 94*b*09 would disable NO4 logical element 94*a*12 and 94*a*14. Similarly, the logically High signal condition on line 94*b*09 would disable NO4 logical element 94*a*10. Finally, the respective inversions of these logical High signals on lines 94*b*05 and 94*b*09 as respectively occur in IN1 logical elements 94*b*04 and 94*b*08 are provided to NO4 logical element 94*a*08 via lines 94*b*07 and 94*b*11 (part of cable 94*b*03). Meanwhile, and by momentary reference to FIG. 105*d*, the enablement bit "$E_{41}$" is supplied to NA3 logical element 94*b*12 as signal (L) MIDR 3 on line 92*a*09. If this signal (L) MIDR 3 on line 92*b*09 is logically Low, indicating enablement, the NA3 logical element 94*b*12 will not be satisfied regardless of the logical High condition of signal (H) 4 L/G on line 126*a*09 (indicating configuration at four lines per group) and the logical High condition of signal (L) 4 GPS on line 126*b*07 (indicating that one or two groups is configured as opposed to the four group configuration with an associated User's master arbitration identification code as is shown in FIG. 105*c*). Resultantly to the failure to satisfy either NA2 logical element 94*b*10 or NA3 logical element 94*b*12, NA2 logical element 94*b*14 will not be satisfied and a logical Low condition will be emplaced on line 94*b*13 connected to NO4 logical element 94*a*08 in satisfaction thereof. Resultantly, signal (H) EGL0 (4+8L/G) will be a logical High while signals (H) EGL1 (4+8L/G) through (H) EGL7 (4+8L/G) will be a logical Low. Thusly a User's master arbitration identification code format of the type as shown in FIG. 105*d* for configuration at four lines per group and one or two groups has decoded, under the binary 11-1 contents of the first four bit field therein, to the encoded group line drive of arbitration group line 0.

9.10. Encoded Group Line Selector

The logical diagram of the encoded group line selector subsection 89*a*06 part of ARBITRATION SECTION 86*a*02 and previously seen within the second level block diagram at FIG. 89*a* is shown within FIG. 95. From momentary reference to the second level block diagram of FIG. 89*a* and accompanying text, the function of encoded group line selector subsection 89*a*06 may be recalled to be the selection of the encoded group lines in accordance with the configuration at one, two, four or eight lines per group, and the enablement of a scan/set test loop between GP LINE OUTPUT REG. 89*a*10 and SLAVE REG.-GP. LINE OUTPUT 89*a*12. This selection function is performed in 104 logical element 95*a*08 under the control of a least significant, SEL 0, select signal upon line 9503 and a most significant, SEL 1, select signal upon line 9505. Such select signals are developed in NO2 logical element 9502 and NA2 logical elements 9504 and 9506 in consideration of signals (H) 8 L/G on line 126*a*05, (H) 4 L/G on line 126*a*09, and signal (L) 2 L/G on line 126*a*13. Such signals from configuration control, as variously encode configuration at one, two, four or eight lines per group depending on signal level, are translated into select inputs as respectively gate (H) ENCODED GP. LINES (1L/G) on cable 93*a*01, (H) ENCODED GP. LINES (2L/G) on cable 93*b*01, (H) ENCODED GP. LINES (4+8L/G) on cables 94*a*01 and 94*b*01, and again the selfsame signals (H) ENCODED GP. LINES (4+8L/G) on cables 94*a*01 and 94*b*01. Since the encoded group lines for configurations at both four and eight lines per group are developed through the single decode path consisting of 3 BIT CODE GENERATOR 94*b*02 and 3 TO 8 DECODER 94*b*04, such signals as appear on cables 94*a*01 and 94*b*01 collectively comprise one selectable data input, data inputs C0 through C7 to 104 logical element 9508. The configuration selected data output signals, signals S0 through S7, of 104 logical element 9508 appear as signals (H) EGL0 through (H) EGL7 on cable 9501.

When scan/set test is enabled, the signal (L) TEST-LOOP C on line 13709 will be inverted in NA2 logical elements 9504 and 9506 and supplied as a logically High select signal on lines 9503 and 9505 to respective least significant, SEL 0, and most significant, SEL 1, selection signal inputs of 104 logical elements 9508. Such selection control will enable selection of the D, D0 through D7, data inputs to 104 logical element 9508. The least significant six such input signals comprise signals (H) GLOS 1 through (H) GLOS 7 on cable 89*a*11 as are derived from SLAVE REG.-GP. LINE OUTPUT 89*a*12. The most significant, D7, input signal is signal (H) LOOP C-CARRY upon line 89*a*13. In combination with the entirety of the GROUP LINE OUTPUT functional logical subsection 89*a*08 structure as shown within the second level block diagram of FIG. 89*a*, such scan/set test loop control and data allow the creation of an eight bit shift register from GP. LINE OUTPUT REG. 89*a*10 and SLAVE REG.-GP. LINE OUTPUT 89*a*12. When the scan/set test loop interconnect is later discussed, such a scan/set testable structure will be seen to be part of scan/set test loop C.

9.11. Group Line Output

The GROUP LINE OUTPUT section 89*a*08 part of ARBITRATION SECTION 86*a*02, will be taught from the second level block diagram of FIG. 89*a*. The logical interconnect of such a two register, a master register and a slave register, structure implemented solely for the purposes of scan/set test has already been seen in conjunction with the logic diagram for the GROUP COUNT AND SHIFT 89*b*04 as is shown in FIG. 91. A similar structure utilizing a BINARY SHIFT MATRIX BSM intermediary logical structure between the master and slave registers was shown for the MASTER ID functional logical subsection 89*a*04 in FIG. 92. The GROUP LINE OUTPUT functional logical subsection 89*a*08 is simple of implementation as a GP. LINE OUTPUT REG. 89*a*10 MR8 logical element connected to a SLAVE REG.-GP. LINE OUTPUT 89*a*12 SR8 logical element. Both the master register MR8 and slave register SR8 logical elements respectively receive CLEAR signals upon initialization only; for example, signals (L) CLEAR (1) on line 13315 and signal (L) CLEAR (4) on line 13321. The master register MR8, logical element is gated on the occurrence of clock $\phi$1; for example, signal (L) $\phi$1 on line 13401. The slave register, SR8 logical element is gated upon the occurrence of clock $\phi$2, for example, signal (L) $\phi$2 on line 13427. When a scan/set test loop shift register is enabled through the coupling of 1 OF 4 SELECTOR 104 logical element 89*a*06, then the scan/set data output on line 89a07 is derived from the least significant bit of the slave register SR8, logical element.

9.12. Group Line Output Gates

The GROUP LINE OUTPUT GATES 89a14 part of ARBITRATION SECTION 86a02 are taught from the second level block diagram of FIG. 89a. The eight group line output gates as comprise logical structure 89a14 simply consist of an identical first four and second four NA2 logical elements. These eight NO2 logical elements respectively receive signals via line 89a09 representative of the encoded group line output as lodged in GP LINE OUTPUT REG. 89a10. Such right NO2 logical elements are enabled for gating of such signals, in a least significant four and a most significant four, by gating control signals (L) INH 0-3 on line 88f01 and signal (L) INH 4-7 on line 88f03. Such two gate control signals are not separately developed for the controllable partial passage of the encoded group line output, but rather represent the limitation of the logical fanout capability of a single signal drive. The simultaneous developments of both such signals in response to the losing of the arbitration as results in setting of WON/LOST LATCH $\phi$1 may be reviewed within FIG. 88f. The purpose of the group line output gates 89a14 is to disable further active participation within the arbitration activity by a Versatile Bus Interface Logics which has recognized during a previous arbitration cycle that it has lost that particular one arbitration activity in which it is currently participating.

9.13. Mask Register

The MASK functional logical subsection 89b06 part of ARBITRATION SECTION 86a02 is taught from the second level block diagram of FIG. 89b. In an equivalent manner to the group count and shift functional logical subsection 89b04 shown in detailed logic design in FIG. 91, the MASK functional logical subsection 89b06 consists of a MASTER REG.-MASK MR8 logical element 89b12, a SLAVE REG.-MASK SR8 logical element 89b16, and a 102 logical element 89b14 connected as a scan/set testable shift register. The master register, MR8, logical element 89b12 is gated by the occurrence of clock $\phi$2, for example signal (L) $\phi$2 on line 13427. The slave register, SR8, logical element 89b16 is gated by the logical Low occurrence of the clock $\phi$1 signal, for example signal (L) $\phi$1 on line 13401. Both master and slave register logical elements receive during initialization a logical Low clear signal, for example signals (L) CLEAR (2) on line 13303 and signal (L) CLEAR (3) on line 13305. Under scan/set test 102 logical element 89b14 will receive control signal (H) TEST-LOOP D on line 13711 and a data input as signal (H) LOOP D-CARRY 2 on line 103a01. Such signal (H) LOOP D-CARRY 3 on line 103a01 is the signal SCAN/SET OUTPUT from 36 BIT GLM previously seen within the third level block diagram of INPUT MASTER ID ENCODER 89c02 at FIG. 90b, and as will be in detail shown within 36 BIT GROUP LINE MEMORY 89c12 at the logic prints therefor shown in FIG. 103a. The signal output of the eight bit scan/set testable shift register so created is derived from the least significant bit of SLAVE REG.-MASK SR8 logical element 89b16 and inverted in IN 1 logical element 89b18 to be supplied as signal (H) LOOP D-CARRY 2 on line 89b07. Therefore the MASK functional logical subsection 89b06 is seen to comprise a scan/set testable loop which is appended to the 36 BIT GROUP LINE MEMORY 89c12 as a continuation of scan/set test loop D. There should be little difficulty involving the continuation of a scan/set test loop through the structures of a block diagram. At the conclusion of the logical explanation of the Versatile Bus Interface Logics, the interconnect of all scan/set test loops A–F will be charted. Such a scan/set test function is, of course, not integral to the logical function of the current invention. Indeed, if the reader is unfamiliar with the implementation of this concept it should be realized that the entirety of a structure such as MASK functional logical subsection 89b06 would be implemented as but a single clock $\phi$2 gated register should scan/set test capability not be implemented. That implementation of the scan/set test capability adds considerable logics to the preferred embodiment implementation of the invention is undeniable, however, such added logics create testability when this structure is implemented, as intended, in very large scale integrated circuitry.

9.14. Mask Generator

The MASK GENERATOR functional logical subsection 89b08 part of ARBITRATION SECTION 86a02, previously seen within the second level block diagram of FIG. 89b, is shown in FIG. 96, consisting of FIG. 96a and FIG. 96b. The function of the MASK GENERATOR functional logical subsection 89b08 is to generate an eight bit mask which will be lodged in the MASK functional logical subsection 89b06 and utilized by priority logic 89b02 part of SEND CONTROL 86b14 in the determination of the winning or losing of the current Versatile Bus Interface Logics participation within the activity of arbitration. Such a mask, generated as signals (H) MASK BITS on cables 96a01 and 96b01, will be a logical "1", or true, condition on all arbitration group lines which are both of concern within the current cycle of time-phased arbitration and which are also higher than any one arbitration group line which may be driven by the current Versatile Bus Interface Logics. In other words, such a mask denotes in those bits which are set the sensitivity to arbitration group lines which, should they manifest a logical true condition, which by definition cannot have been driven by the present Versatile Bus Interface Logics, mean that the present Versatile Bus Interface Logics will have lost arbitration. Signals (L) MEB 0 through (L) MEB 3 on line 97a01 and (L) MEB 4 through (L) MEB 7 on line 97b01 such as collectively represent the mask enable bits, or those arbitration group lines which are of concern within the current arbitration cycle, are respectively received at NO2 logical elements 96a02 through 96a08 and NO2 logical elements 96b02 through 96b08. The group line output register signals, signal (L) GLOR 2 through (H) GLOR 7 on cable 89a09 are combined in remaining logical elements of MASK GENERATOR functional logical subsection 89b08 in a manner whereby a logical Low signal will be supplied to those NO2 logical elements associated with all mask register bit positions higher than that register bit position of any single one, or possibly none, of those group lines which are being driven by the current Versatile Bus Interface Logics. For example, suppose that second most significant arbitration group line, arbitration group line one, is to be driven resulting in the logical High signal (H) GLOR 1 on cable 89a09. The resultant satisfaction of NO4 logical element 96b10, and the satisfaction thereafter of NA2 logical elements 96b12 and 96b14 as well as NA3 logical elements 96b16 and 96b18, will result in the disablement of NO2 logical elements 96b02 through 96b08 and the corresponding logical Low conditions of (H) MB 4 through (H) MB 7 on cable 96b01. Meanwhile the logically High condition of signal (H) GLOR 1 on cable **89*a*09 will also satisfy NO2 logical element 96*a*10 and thence IN1 logical element 96*a*12 plus NA2 logical element 96*a*14 and 96*a*16. Resultant therefrom NO2 logical elements 96*a*04 through 96*a*08 will be dissatisfied and signals (H) MB 1 through (H) MB 3 on cable 96*a*01 will be logically Low. Only NO2 logical element 96*a*02 shall be satisfied by the logical Low condition of signal (H) GLOR 0 on cable 89*a*09 in conjunction with the logical Low condition of signal (L) MEB 0 (should there be sensitivity to arbitration group line 0 within the present arbitration cycle) resultant in a logical High signal (H) MB 0 on cable 96*a*01. Thusly for this example of arbitration group line drive, as is representative of the setting of the group line output register for the driving of a true condition upon arbitration group line 1, only mask bit 0 as is transmitted by the logical High condition of logical (H) MB 0 on cable 96*a*01** is capable of formation.

9.15. Mask Enable Generator

The MASK ENABLE GENERATOR functional logical subsection **89*b*10 part of ARBITRATION SECTION 86*a*02, previously seen within the second level block diagram of FIG. 89*b*, is shown in FIG. 97, consisting of FIG. 97*a* and FIG. 97*b*. The purpose of the MASK ENABLE GENERATOR functional logical subsection 89*b*10 is to develop, in consideration of configuration and the current group counter and shift arbitration cycle count, a mask enable pattern representative of those arbitration group lines which are pertinent of consideration within the present cycle for the determination of the winning or the losing of arbitration by the present Versatile Bus Interface Logics as are participating therein. The results of such determination concerning which such arbitration group lines should be enabled of interpretive evaluation in the determination of winning or losing upon any cycle of time-phased arbitration as attends the various arbitration configurations may be obtained by momentary reference to FIG. 100. As a simple example, all arbitration group lines are shown to be pertinent of interpretive evaluation in the event that arbitration is configurated to be multiplexed within the diagram of FIG. 100. The enablement of this evaluation is accomplished within MASK ENABLE GENERATOR functional logical subsection 89*b*10 under the logical Low condition of signal (L) MPX on line 126*b*27 which firstly satisfies NA2 logical element 97*a*08 and thereafter AOI 2-1-1 logical elements 97*a*02 through 97*a*08 and 97*b*02 through 97*b*08. Similarly, and by reference to the arbitration configuration, and the associated arbitration group line utilizations as are shown within FIG. 100, when arbitration is configured for but a single group all group lines are enabled of interpretation. This is accomplished within the logics of MASK ENABLE GENERATOR functional logical subsection 89*b*10 under the control of the logical Low condition of signal (L) 1 GPS on line 126*b*15 as satisfies NA2 logical element 97*a*08 and thence AOI 2-1-1 logical element 97*a*02 through 97*a*08 and 97*b*02 through 97*b*08. Other enablements of AOI 2-1-1 logical elements 97*a*02 through 97*a*08 and 97*b*02 through 97*b*08 for various configurations and cycles of pipelined arbitration, the arbitration group line utilization for which are shown within the diagrams of FIG. 100, are only slightly more complex. For example, whenever arbitration is configured either pipelined, resultant in the logical Low condition of signal (L) PPL on line 126*b*21, or at one line per group, resulting in a logical Low condition of signal (L) 1 L/G on line 126*a*17, or both, then NA2 logical element 97*a*10 will be satisfied. The logical High signal resultantly produced thereby in conjunction with the logical High signal (H) GKS 1 on cable 91*b*05 will suffice for satisfaction of AOI 2-1-1 logical element 97*a*02 and the resultant logical Low signal (L) MEB 0 on cable 97*a*01. Momentary reference to FIG. 100 will verify that for all such configurations of arbitration either pipelined and/or with one arbitration line per group then during a first cycle of time-phased arbitration, such as is represented by an arbitration group counter bit one, sensitivity to the results on arbitration group line 0 will always exist and consequently mask enable bit 0 represented by signal (L) MEB 0** will always be set.

9.16. Group Line Input Encoder

The GROUP LINE INPUT ENCODER functional logical subsection part of GROUP LINE INPUT ENCODER AND SELECTORS functional logical subsection **89*c*08 part of INPUT MASTER ID ENCODER functional logical subsection 89*c*02 part of ARBITRATION SECTION 86*a*02 will be explained in four figures, FIG. 98 through FIG. 101. The location of GROUP LINE INPUT ENCODER AND SELECTORS 89*c*08 is visible within the first level block diagram of FIG. 89*c* and within the second level block diagram of FIG. 90*a*. The purpose of the GROUP LINE INPUT ENCODER is to encode the arbitration group lines (in accordance with configuration at one, two, four and eight lines per group) resultant on each cycle of time-phased arbitration in order that a configuration selected one of such encodings will be stored with 36 BIT GROUP LINE MEMORY 89*c*12 as a partially developed winner's master arbitration identification code. In such capacity, the GROUP LINE INPUT ENCODER represents the regeneration of the User format arbitration identification codes as shown in FIG. 105 from the results of arbitration upon the arbitration group lines. At the conclusion of the arbitration activity, the winner's master arbitration identification code, as has been developed and stored by parts within 36 BIT GROUP LINE MEMORY 89*c*12, will be extracted by INPUT MASTER ID SELECTOR functional logical subsection 89*c*04 and thence passed to WINNERS MASTER ID functional logical subsection 89*c*06** for issuance to the connected User device as the arbitration winner's master identification.

Working backwards within the four figures of interest, the logic of the GROUP LINE ENCODER functional logical subsection **89*c*08 is shown within FIG. 101, consisting of FIG. 101*a* through FIG. 101*f*. This GROUP LINE INPUT ENCODER functional logical subsection 89*c*08 will be encoding utilizations of the abitration group lines in accordance with the various allowable pipelined and multiplexed configurations for arbitration as shown in FIG. 100. Such winner's master arbitration identification codes as are partially developed upon each cycle of time-phased arbitration will be passed to 36 BIT GROUP LINE MEMORY 89*c*12 wherein they will ultimately occupy the locaions as shown in FIG. 99, consisting of FIG. 99*a* through FIG. 99*l*, upon the completion of a single arbitration activity. The tables of FIG. 98, consisting of FIG. 98*a* and FIG. 98*b*, are utilized to tabularize the many signal inputs to 1L/G SELECTOR 101*c*02, 2L/G SELECTOR 101*d*02, FINAL RANK L/G SELECTOR 101*f*02 (for configuration at eight groups), and 4L/G SELECTOR FIRST RANK 101*e*02—all such selectors as may be referenced within the third level block diagram of FIG. 90***a* and at FIG. 101*c* through FIG. 101*f*. In other words, the tables of FIG. 98*a* and FIG. 98*b* are utilized to explain the dense signal routing as may be particularly observed within FIG. 101*c* through FIG. 101*f*.

Commencing with the logical explanation of GROUP LINE INPUT ENCODER functional logical subsection 89*c*08 as is shown in FIG. 101*a* through FIG. 101*f*, such functional logical subsection receives both clear and set side output signals from MASTER REG.-GROUP LINE INPUT 89*d*04 part of GROUP LINE INPUT functional logical subsection 89*d*08 via cables 89*d*01 and 89*d*03. Such signals, valid from clock $\phi$1 to clock $\phi$1, represent the status of the arbitration lines upon the Versatile Bus 86*a*01 during the immediately previous clock $\phi$2 period drive thereof. These signals (L) GLIR 0 through (L) GLIR 7 on cable 89*d*01 and (H) GLIR 0 through (H) GLIR 7 on cable 89*d*03 need be encoded in order to, by parts, reconstitute the User format arbitration identification codes as are shown within FIG. 105*a* through FIG. 105*e*. A first step in so doing involves certain logic elements constituting priority encoders as are shown within FIG. 101*a* and FIG. 101*b*, such elements as collectively correspond to GROUP LINE INPUT ENCODER first rank 90*a*02 as is shown within the third level block diagram of FIG. 90*a*. A first, eight line to three line, priority encoder is composed of NA4 logical elements 101*a*02, 101*b*02 and 101*b*04. The function of such an eight line to three line priority encoder is similar to Texas Instrument Part No. SN54148, and should be comprehensible to a routineer in the computer arts. The utilization of such a eight line to three line encoded priority may be related to the encoded fields "111" and "222" of the arbitration code format for configuration at eight lines per group as is shown within FIG. 105*e*. The most significant bit of each developed three code is represented by signal (H) GLIR 0+1+2+3 on line 101*a*03, the second least significant bit by signal (H) 8 TO 3 CODE (2nd LSB) on line 101*b*03 and the least significant bit by signal (H) 8 TO 3 CODE (LSB) on line 101*b*05. The remaining bits as satisfy encoding in accordance with the eight line per group format as shown in FIG. 105*d* are the enablement bits $E_{81}$ and $E_{82}$. Since if any arbitration line is being driven, then the enablement bit $E_{81}$ or $E_{82}$ (such as are respectively appropriate to the current first or second cycle) within the bus-driving arbitrating device must be set, then such bits are each formed by the same signal (H) GLIR 0+1+2+3+4+5+6+7 on line 101*b*07 as is developed in NO4 logical element 101*b*06 and prior NO2 logical elements 101*b*18 through 101*b*24.

There are two, four line to two line priority encoders within the group line input encoder first rank 90*a*02 logical structure as shown within FIG. 101*a* and FIG. 101*b*. A first such four line to two line priority encoder is composed of NA2 logical elements 101*a*06 and 101*a*14. A second four line to two line priority encoder is comprised of NA2 logical elements 101*a*10 and 101*a*16. Both such four line to two line priority encoders are concerned with the development of the two bit field as appear in the User's master arbitration identification code formats as shown in FIG. 105*c* and FIG. 105*d*. By momentary reference to the utilization of the arbitration group lines when arbitration is configured at four lines per group in FIG. 100, it may be determined that either arbitration group lines 0 through 3 or arbitration group lines 4 through 7 will be interpreted during respective first and second cycle of time-phased arbitration. When the upper four, arbitration group line 0 through arbitration group line 3, arbitration lines are being interpreted then the four to two priority encoder comprised of NA2 logical elements 101*a*06 and 101*a*14 will be in use. When the least significant four arbitration group lines, arbitration group line 4 through arbitration group line 7, are being interpreted, then the four to two line priority encoder composed of NA2 logical element 101*a*10 and NA2 logical element 101*a*16 will be utilized. Remaining fields necessary of being encoded for arbitration at four lines per group are the $E_{41}$ and $E_{42}$ fields of the arbitration code format as shown in FIG. 105*d*. Referencing the arbitration group line utilization in FIG. 100 transpiring responsive to this format of FIG. 105*d*, it may be observed that most significant four arbitration group lines 0 through 3 are predominantly used but that the least significant arbitration group lines 4 through 7 are utilized upon the second cylce of arbitration configured to be pipelined on four group lines across two cycles. In this latter case, the $E_{42}$ field appearing within the format of FIG. 105*d* is developed by NA4 logical element 101*a*04 as signal (H) GLIR 4+5+6+7 on line 101*a*05. Commensurate with the previous explanation of these enablement bits, this signal development simply indicates that field $E_{42}$ should be a logical "1" should any of group lines 4 through 7 be logically true upon this second cycle of arbitration configured at two groups and four group lines. Similarly, for all arbitration at four lines per group upon the least significant four group lines, NA4 logical element 101*a*02 is utilized in the development of signal (H) GLIR 0+1+2+3 on line 101*a*03. This selfsame NA4 logical element 101*a*04 developed signal had previously been seen to be the most significant signal of the eight to three line priority encoder and the most significant bit of the three code developed therefrom. Thusly the signals as are developed in GROUP LINE INPUT ENCODER FIRST RANK 90*a*02 logical elements, which elements appear on FIG. 101*a* and FIG. 101*b*, are developed without redundancy. The combination, in subsequent 1L/G SELECTOR 101*c*02, 2L/G SELECTOR 101*d*02, FINAL RANK L/G SELECTOR 101*f*02 and 4L/G SELECTOR FIRST RANK 101*e*02 of the composite encoding of all arbitration code formats as are shown in FIG. 105*a* through FIG. 105*e* will later be explained in accordance with the signal routing tabularized within FIG. 98.

For the construction of the encoded arbitration formats for arbitration at one line per group and two lines per group as are respectively shown in FIG. 105*a* and FIG. 105*b*, no priority encoders are needed for the direct formation for the fields therein from the results of arbitration upon individual arbitration group lines. However, there needs be some two line to one line translation in production of the enablement bits—$E_{21}$, $E_{22}$, $E_{23}$, and $E_{24}$—as are present within the arbitration code format at two lines per group as shown in FIG. 105*b*. These enablement bits are respectively developed in NA2 logical elements 101*a*06, 101*a*08, 101*a*12. Commensurate with the meaning of the enablement bits, and the potential utilization of the arbitration group lines for all potential pipelined and multiplexed combinations of arbitration at two lines per group as are shown within FIG. 100, the signals developed by these NA2 logical elements—signals (H) GLIR 2+3 on line 101*a*09, (H) GLIR 4+5 on line 101*a*11, and signal (H) GLIR 6+7 on line 101*a*13—merely show whether either one or both lines of a pair of arbitration group lines were in use during a particular arbitration cycle. Again, it may be recalled that NA2 logical element 101*a*06 and NA2 logical element 101*a*10 were previously involved in the most significant bit formations of different two codes as were developed in separate four line to two line priority encoders. The appropriate combination of all such signals as are developed within the GROUP LINE INPUT ENCODER FIRST RANK 90*a*02 (which is represented by the composite logical elements as shown in FIGS. 101*a* and 101*b*) plus direct signals from the group line input register, will be the function of remaining selector logical elements as appear in FIG. 101*c* through FIG. 101*f.*

Continuing in the explanation of the detailed logical function of GROUP LINE INPUT ENCODER 89*c*08, the formation of the winner's master arbitration identification code, by successive parts, for arbitration at one line per group (thereby dictating the arbitration code format as shown in FIG. 105*a*) will transpire in 1L/G SELECTOR 1O2 logical element 101*c*02 as shown in FIG. 101*c*. The formation of the winner's master arbitration identification code, by parts upon each arbitration cycle, for arbitration at two lines per group will transpire in 2L/G SELECTOR 1O2 logical element 101*d*02 as shown in FIG. 101*d*. The formation of the winner's master arbitration identification code formats of FIG. 105*c* or FIG. 105*d*, as besuit arbitration configured at four lines per group, will transpire in 4L/G SELECTOR FIRST RANK 1O2 logical element 101*e*02 and successor 4L/G SELECTOR SECOND RANK 1O2 logical element 101*e*04, both of which are shown in FIG. 101*e*. Finally, configuration controlled selection amongst arbitration codes as besuit arbitration at one, two, four or eight lines per group will transpire in the FINAL RANK L/G SELECTOR 1O4 logical element 101*f*02 as shown in FIG. 101*f.* The manner by which signal routing to these selectors allows desired arbitration code formation is explained within the tables of FIG. 98, consisting of FIG. 98*a* and FIG. 98*b*.

To interpret the tables of FIG. 98, note that the signals output from GROUP LINE INPUT ENCODER FIRST RANK 90*a*02 upon cables 101*a*01 and 101*b*01 are given the abbreviated identifications A through K as are shown in FIG. 101*a* and FIG. 101*b*. These letter designations A through K correspond to the same designations within the tables of FIG. 98. The designations are R0 through R7 corrrespond to bits 0 through 7 of the group line input register, transmitted as signals (H) GLIR 0 through (H) GLIR 7 upon cable 89*d*03. Each of the tables in FIG. 98*a* and FIG. 98*b* shows the source of bits 0 through 7 of the winner's master arbitration identification code as will be formulated in the selectors shown in FIG. 101*c* to FIG. 101*f.* For example, consider the operation of 1L/G SELECTOR 1O2 logical element 101*c*02. Under the control of the logical High condition of signal (L) MPX on line 126*b*27 the 1L/G SELECTOR 1O2 logical elemenyt 101*c*02 will select signals (H) GLIR 0 through (H) GLIR 7 on cable 89*d*03 to be transferred upon cable 101*c*01. This is represented in the table of FIG. 98*a* for the case of pipelined operation of one, two, four or eight group(s) at one line per group by the respective R0, R0 and R1, R0 through R3, and R0 through R7, entries therein such table. That the winner's master arbitration identification code for arbitration at one line per group should be directly formed from the arbitration group line status may be confirmed by momentary reference to FIG. 105*a*. Alternatively, it may be observed that if signal (L) MPX is on line 126*b*27 is a logical Low, indicating multiplexing, then the inversion of signal (L) GLIR 0 on cable 89*d*01 within IN1 logical element 101*c*04 is supplied to all eight A0 through A7 data inputs of 1L/G SELECTOR 1O2 logical element 101*c*02, and thence onto all lines of cable 101*c*01. This is represented within the table of FIG. 98*b* by the uniform R0 entry occurring at all columns wherein arbitration is configured at one line per group (eight through one groups). If this winner's master arbitration identification code formation at one line per group is to be ultimately selected and emplaced within 36 BIT GROUP LINE MEMORY 89*c*12, visualization of this process in accordance with the diagrams of FIG. 99 is especially useful. The diagrams of FIG. 99 show the ultimate locations within the eight ranks of 36 BIT GROUP LINE MEMORY 89*c*12 from which bits will be extracted by INPUT MASTER ID SELECTOR 89*c*04 in the formation of the final composite winner's master arbitration identification code, such as will be issued to the Usder. As was previously explained, the 36 BIT GROUP LINE MEMORY 89*c*12 will be filled with partially developed winner's master arbitration identification codes associated with up to eight pipelined arbitration activities upon Versatile Bus 86*a*01. For purposes of understanding the group line input encoder functional logical subsection 89*c*08, it should be visualized how each such partial formation winner's master arbitration identification code is being entered into the eight bit wide lowest rank of 36 BIT GROUP LINE MEMORY 89*c*12. If the ultimate locations of winner's master arbitration identifcation codes shown within FIG. 99*a* through FIG. 99*c*, and FIG. 99*e* through FIG. 991, are considered to have arisen from pipelined operations upon the Versatile Bus 86*a*01, then each insertion of partially developed such codes at the eight wide first rank of 36 BIT GROUP LINE MEMORY 89*c*12 would merely be the mapping of the numbered patterns shown onto this first tier. For example, if arbitration is considered to be configured upon one group line for eight pipelined groups as shown in FIG. 99*a*, then the bit pattern inserted at the lowest rank during each successive one of eight arbitration cycles would simply be successive bits 1 through 1 through 8, representing the status of arbitration groups lines 0 through 7. This manner of loading 36 BIT GROUP LINE MEMORY 89*c*12 is tabularized in FIG. 98*a* for pipelined operation at one line per group across eight groups. If, however, arbitration is configured multiplexed, then the teaching of FIG. 98*b* for arbitration configured on one line per group across eight groups is that the selfsame bit, the status of arbitration group line 0, should be emplaced at all eight bits of the least significant rank of 36 BIT GROUP LINE MEMORY 89*c*12. As such repetitive bit patterns are successively shifted, upon each cycle of time multiplexed arbitration, to higher ranks within the 36 BIT GROUP LINE MEMORY 89*c*12, then the end resultant winner's master arbitration identification code format will assume the identical location as shown in FIG. 99*a*. In other words, entering the encoded group lines in a repetitive pattern across the lowest rank of 36 BIT GROUP LINE MEMORY 89*c*12 (in the event of arbitration configured multiplexed) allows the identical selection of the final winner's master arbitration identification code formats as are held within 36 BIT GROUP LINE MEMORY 89*c*12, regardless of whether such code formats were developed attendant upon multiplexed or pipelined arbitration. To repeat, if pipelined arbitration configured upon one group line or eight groups is in progress, then the first rank of 36 BIT GROUP LINE MEMORY 89c12 as diagrammatically represented in FIG. 99a would be differentially loaded in bits 1 through 7 (not shown) and bit 8 (shown). However, if arbitration is configured multiplexed upon one group line for eight groups then this least significant rank of 36 BIT GROUP LINE MEMORY 89c12 as shown within FIG. 99a will be loaded with bits 8888888 (not shown) plus bit 8 (shown). Thusly, for the example of loading 36 BIT GROUP LINE MEMORY 89c12 for arbitration configured upon four group lines across four groups, which needs be multiplexed, and such as is shown in FIG. 99d, then the first rank contents would always equal 444444 (not shown) plus 44 (shown). The manner of loading 36 BIT GROUP LINE MEMORY 89c12 for the configurations of pipelined and multiplexed arbitration thusly simplifies the matter of extracting the final winner's master arbitration identification codes as are ultimately developed and contained therein.

Returning to the GROUP LINE INPUT ENCODER functional logical subsection 89c08 as shown in FIG. 101 and the selector logical components thereof as shown in FIG. 101c through FIG. 101f, the utilization of such selectors in the formation of the encoded group line patterns, as will load 36 BIT GROUP LINE MEMORY 89c12 for the development of the winner's master arbitration identification code (in accordance with the formats of FIG. 105) therein, should now be obvious by reference to the tables of FIG. 98a and FIG. 98b. Referring to FIG. 101e and the second level block diagram of FIG. 98, it may be particularly noted that first L/G SELECTOR FIRST RANK 1O2 logical element 101e02 is selected by signal (L) MPX on line 126b27. Such selection will develop the encoded group line fields as reflect arbitration either pipelined or multiplexed at four lines per group. Further selection within 4L/G SELECTOR SECOND RANK 1O2 logical element 101e04 is in accordance with signal (H) 4 GPS on line 126b07. Such selection distinguishes between the differing formats as shown in FIG. 105c and FIG. 105d for arbitration at four groups versus one or two groups. For example, the encoded group line pattern being selected as B0 through B7 data inputs to 1O2 logical element 101e04 are in development of the arbitration identification code of format as shown in FIG. 105d. By reference to such format it may be noted that a third and a seventh bit are always logically "0". This is the reason why the B2 and B6 data inputs of 1O2 logical element 101e04 are shown to be tied to the logical Low, or ground level. In a similar manner, the formation of all fields of all formats of winner's master arbitration identification codes may be traced through the selectors of FIG. 101c through FIG. 101f. The FINAL RANK L/G SELECTOR 1O4 logical element 101f02 is selected by configuration signals (L) 4L/G on line 126a11 (L) 8L/G on line 126a07 and (H) 2L/G on line 126a13 as are combined in NA2 logical elements 101f04 and 101f06 into a most significant (SEL 1) and least significant (SEL 0) selects signals. The manner of such selection is that group lines encoded at one, two, four or eight lines per group will be respectively selected as the A, B, C or D data inputs to 1O4 logical element 101f02 and thence transferred as signals ELG0 through EGL7 on cable 101f01. Note in the D data inputs to 1O4 logical element 101f02 that the four bit encoded group line pattern which besuits arbitration at eight lines per group, and such as is developed in group line input encoder first rank 90a02 (logical elements of which are shown in FIG. 101a and FIG. 101b), is duplicated between the four most significant bits, D0 through D3, and four least significant bits D4 through D7, of the D data inputs. The manner by which this four bit encoded group line pattern should invariable be replicated upon the upper and lower four bits of the first rank of 36 BIT GROUP LINE MEMORY 89c02 may be understood by momentary reference to FIG. 99g, FIG. 99h, FIG. 99k and FIG. 99l.

9.17. Test Selector

The TEST SELECTOR functional logical subsection 89c10 part of INPUT MASTER ID ENCODER functional logical subsection 89c02 part of ARBITRATION SECTION 86a02, previously seen in the second level block diagram at FIG. 89c, is shown in FIG. 102. The purpose of the TEST SELECTOR functional logical subsection 89c10 consisting of a single 1O2 logical element 10202 is to interconnect the eight ranks of 36 BIT GROUP LINE MEMORY 89c12 as a 36 bit shift register for scan/set test. Under the normally Low condition of test control signal (H) TEST-LOOP D on line 13711, the encoded group line signals EGL0 through EGL7 on cable 101f01 are selected as output signals (H) SMI 0 through (H) SMI 7 on lines 10201 through 10205. If, however, the test control signal (H) TEST-LOOP D on line 13711 is a logical High enabling scan/set test operation, then signals (H) GL1S 6 through (H) GL7S 0 on lines 103b01 through 103h01 will be selected as data inputs B0 through B6 while signal (H) SCAN/SET INPUT DATA TO 36 BIT GLM on line 11201 will be selected as data input B7. Such a scan/set enabled interconnection couples the master and the slave registers of the 36 BIT GROUP LINE MEMORY 89c12 as a 36 bit shift register in the manner as is shown in third level block diagram of FIG. 90. The extraction of the scan/-set data output of such a 36 bit shift register is immediately upcoming in the explanation of FIG. 103a.

9.18. 36 Bit Group Line Memory

The 36 BIT GROUP LINE MEMORY functional logical subsection 89c12 part of INPUT MASTER ID ENCODER functional logical subsection 89c02 part of ARBITRATION SECTION 86a02, previously seen within the second level block diagram at FIG. 89c and the third level block diagram at FIG. 90b and FIG. 90c, is shown in FIG. 103, consisting of FIG. 103a through FIG. 103h. The 36 BIT GROUP LINE MEMORY functional logical subsection 89c12 is composed of MASTER REG.-GROUP LINE X MEMORY MR8 logical elements 103a02 through 103h02 and SLAVE REG.-GROUP LINE X MEMORY SR8 logical elements 103a04 through 103h04. As is diagrammatically illustrated in the third level block diagram at FIG. 90b and FIG. 90c, such group line memories vary in size from eight bits for group line 0 memory to one bit for group line 7 memory. When implemented in very large scale integrated circuitry, such cells may be of a standard physical type as is intended to be illustrated within the representation of FIG. 103a through FIG. 103h or such cells may be variably sized. Upon such case as the physical cells are larger than the logical utilizations thereof, unused bits do not detrimentally affect the logical performance of the 36 BIT GROUP LINE MEMORY functional logical subsection 89c12. Signals (H) SMI0 through (H) SMI7 on lines 10201 through 10215 are clocked into the most significant bits of MASTER REG.-GROUP LINE 0 MEMORY through MASTER REG.-GROUP LINE 7 MEMORY, logical elements **103*a*02 through 103*h*02 upon the logical Low occurrence of signal (L) $\phi$2 on line 13427. Set and clear side signal outputs from each of MASTER REG.-GP LINE 0 MEMORY 103*a*02 through MASTER REG.-GP LINE 7 MEMORY 103*h*02 are respectively received at SLAVE REG.-GP LINE 0 MEMORY 103*a*04 through SLAVE REG.-GP LINE 7 MEMORY 103*h*04, wherein they are gated upon the logical Low occurrence of signal (L) $\phi$1 on line 13401. Certain ones of these signals are additionally passed to INPUT MASTER ID SELECTOR functional logical subsection 89*c*04 via cables 103*a*03 through 103*h*03. Upon the next subsequent $\phi$2, set side signal outputs from each SLAVE REG.-GP LINE 0 MEMORY 103*a*04 through SLAVE REG.-GP LINE 7 MEMORY 103*h*07 are rrespectively re-entered in a left shifted one bit position into MASTER REG.-GP LINE 0 MEMORY 103*a*02 through MASTER REG.-GP LINE 7 MEMORY 103*h*02. Thusly upon each complete clock cycle consisting of clock $\phi$1 and clock $\phi$2, the encoded group line data resident within MASTER REG.-GP LINE 0 MEMORY 103*a*02 through MASTER REG.-GP LINE 7 MEMORY 103*h*02 is left shifted, or shifted to a higher rank, by one bit position. The manner in which bit positions within MASTER REG.-GP LINE 0 MEMORY 103*a*02 through MASTER REG.-GP LINE 7 MEMORY 103*h*02 correspond with the staircase structure of 36 BIT GROUP LINE MEMORY 89*c*12 may be evidenced by reference to FIG. 106. Within FIG. 106, labels "GLOM" through "GL7M" refer to the group line 0 memory through group line 7 memory whereas numbers "0" through "7" refer to bits 0 through 7 therein. Note, for example by reference to the signals (H) GLOM 0 through (H) GLOM 7 on cable 103*a*03 as shown in FIG. 103*a***, that the nomenclature "0" through "7" accorded individual bit positions of the group line memories are reversed from the normal ordering of the signals within the MR8 logical cells. For the present purposes of functional explanation, it is sufficient to remember that bit "0" within any of the group line memories represents the lowest rank, historically newest, encoded group line data as has been stored within such group line memory whereas bits "1" through "7" represent successively older historical group line encoded memory stores.

As final points of observation within the 36 BIT GROUP LINE MEMORY functional logical subsection **89*c*12, it may be noted that MASTER REG.-GP LINE 0 MEMORY 103*a*02 through MASTER REG.-GP LINE 7 MEMORY 103*h*02 are cleared responsive to the logical Low occurrence of signal (L) CLR (2) on line 13317. Correspondingly, SLAVE REG.-GP LINE 0 MEMORY 103*a*04 through SLAVE REG.-GP LINE 7 MEMORY 103*h*04 are cleared only during initialization responsively to the logical Low occurrence of signal (L) CLR (3) on line 13319. Additionally, scan/set data output from the 36 BIT GROUP LINE MEMORY functional logical subsection 89*c*12, when interconnected as a 36 bit shift register via TEST SELECTOR functional subsection 89*c*10, is by signal (H) LOOP D-CARRY 2 upon line 103*a*01. This signal actually connects to MASTER REG.-MASK 89*b*12 part of the MASK functional logical subsection 89*b*06 which was explained in section 9.13 from the secobnd level block diagram at FIG. 89*b*. The ultimate interconnect of the scan/set test loops for support of the function of scan/set test will be later discussed. Such interconnect for test purposes is not integral to functionality of the present logics. It may be again noted, moreover, within the 36 BIT GROUP LINE MEMORY functional logical subsection 89*c*12 that the existence of the considerable logics embodied in the slave register, SR8**, logical elements is primarily in support of the scan/set test process.

9.19. Input Master ID Selector

The INPUT MASTER ID SELECTOR functional logical subsection **89*c*04 part of ARBITRATION section 86*a*02, previously seen within the second level block diagram at FIG. 89*c*, is shown in FIG. 107, consisting of FIG. 107*a* through FIG. 107*e*. The purpose of the INPUT MASTER ID SELECTOR functional logical subsection 89*c*04 is to withdraw, under configuration control, the contents of various cells of 36 BIT GROUP LINE MEMORY 89*c*12 as in composite comprise the winner's master arbitration identification code at the time of a completion of an arbitration activity upon Versatile Bus 86*a*01. One such winners master arbitration identification code, at one of the five permissible formats as is shown in FIG. 105*a* through 105*e*, will be present within 36 BIT GROUP LINE MEMORY 89*c*12 at such cell positions as are in accordance with the appropriate one of the configuration sensitive patterns of storage (as are shown in FIG. 99*a* through FIG. 99*l*). For example, for arbitration configured at one line per group and eight groups, either multiplexed or pipelined, the winner's master arbitration identification code in the format of FIG. 105*a* will be withdrawn from 36 BIT GROUP LINE MEMORY 89*c*12 by INPUT MASTER ID SELECTOR functional logical subsection 89*c*04 from those cell positions, and in accordance with the selection, as is also diagrammatically illustrated within FIG. 99*a***.

The manner in which INPUT MASTER ID SELECTOR functional logical subsection **89*c*04 will extract the contents of the pertinent cells from 36 BIT GROUP LINE MEMORY 89*c*12 in the formation of the winner's master arbitration identification code will be explained through a table shown in FIG. 104. This table within FIG. 104 will be utilized in a similar manner to the previous tables within FIG. 98*a* and FIG. 98*b* which were utilized in explanation of the GROUP LINE INPUT ENCODER AND SELECTORS 89*c*08 which emplaced encoded arbitration group line patterns within 36 BIT GROUP LINE MEMORY 89*c*12. The table of FIG. 104 represents the source within 36 BIT GROUP LINE MEMORY 89*c*12 of each of eight bits within a winner's master arbitration identification code in accordance with the configuration of arbitration at eight, four, two or one groups and one, two, four or eight lines per group. An entry within the table of FIG. 104 such as "0M7" should be understood as representing group line 0 memory bit 7, the prefix "GL" being omitted. Thusly, for example, the winner's master arbitration identification code extraction from 36 BIT GROUP LINE MEMORY 89*c*12 as attends arbitration configured at eight groups and one line per group is represented within the left most column of the table of FIG. 104. The most significant bit of the winner's master arbitration identification code format extracted from group line 0 memory bit 7 (OM7), followed by a next most significant bit extracted from group line 1 memory bit 6 (1M6), and so on to the least significant bit extracted from group line 7 memory bit 0 (7M0), represent extraction in accordance with the diagrammatic representation in FIG. 99*a*. Similarly, remaining entries within the table of FIG. 104 show the manner of extracting the winner's master arbitration identification code from 36 BIT GROUP LINE MEMORY 89c12 in accordance with all allowable configuration cases as are represented in FIG. 99b through FIG. 99**l.

Continuing with the INPUT MASTER ID SELECTOR functional logical subsection 89c04 as shown in FIG. 107, the logical selection performed within such functional logical subsection is merely an implementation of the selection scheme as tabularized in FIG. 104. It may be immediately noticed that seven signals as are representative of the most significant bit to the least significant bit of the winner's master arbitration identification code are output as signals (H) WID 0 on line 107a01 through signal (H) WID 7 on cable 107e01. The manner of selecting each such signal is in accordance with configuration control signals as are received upon twelve different lines. The manner of configurably selecting each such winner's master arbitration identification code bit may be obtained by reference to the table of FIG. 104. By reference to the formation of winner's master arbitration identification code bit 0 as is shown by the first line of the table of FIG. 104, it may be noted that such bit is variously formulated, under certain configurations, only from group line 0 memory bit 7, group line 0 memory bit 3, group line 0 memory bit 1, or group line 0 memory bit 0. Returning to FIG. 107al these four source possibilities are represented by certain ones of the signals (H) GL0M 7 through (H) GL0M 0 on cable 103a03. Further selection amongst these signals, in accordance with configuration control signal input and logical translation thereof, is deemed to be traceable by a routineer in the art. For example, for arbitration configured at eight groups and one line per group, wherein the table of FIG. 104 dictates that group line 0 memory bit 7 needs be extracted as the winner's master arbitration identifcation code bit 0, neither NA2 logical element 107a02 nor NA2 logical element 107a04 will be enabled to produce a logically High select 0, S0, or select 1, S1, selection signal input to 1 OF 4 SELECTOR S14 logical element 107a06. These logically Low select signal inputs will cause signal (H) GL07 M on cable 103a03 to be gated to S12 logical element 107a08. Satisfaction of NA2 logical element 107a10 by the logically High signal (H) 8 GPS on line 126b01 and the logically High signal (H) 1 L/G on line 126a19 will enable subsequent satisfaction of NA3 logical element 107a12 and the logically High provision of a select, S, signal to S12 logical element 107a08. Thereby such logically High D1 input signal, signal (H) GL0M 7, will be gated as the selected data output signal (H) WID 0 upon line 107a01. Other selections within the remaining logics of INPUT MASTER ID SELECTOR functional logical subsection 89c04 are equally obvious. It may be noted that selection of winner's master arbitration identification code bits 4 through 7, as represented by signal (H) WID 4 through (H) WID 7 on cable 107e01 may be accomplished in 1O2 logical element 107e02 as shown in FIG. 107e. Such a selector 107e02 as shown in FIG. 107e is but a truncated utilization of a 1 OF 2 SELECTOR-8 WIDE 1O2 logical element which is a standard cell of the preferred embgodiment implementation of the present Versatile Bus Interface Logics.

9.20. Winner's Master ID Register

The WINNER'S MASTER ID functional logical subsection 89c06 part of ARBITRATION section 86a02, previously seen within the second level block diagram at FIG. 89c, is shown in FIG. 108, consisting of FIG. 108a and FIG. 108b. This scan/set testable structure comprised of a MASTER REGISTER-WINNER'S MASTER ID MR8 logical element 108a04, a SLAVE REGISTER-WINNER'S MASTER ID SR8 logical element 108b02, and an interconnecting 1 of 2 SELECTOR 1O2 logical element 108a02, should be completely familiar by comparison to the previous GROUP COUNT AND SHIFT functional logical subsection 89b04 as was shown in FIG. 91a and FIG. 91b. As may be recalled by reference to the second level block diagram at FIG. 89c and the accompanying text, the purpose of the WINNER'S MASTER ID functional logical subsection 89c06 was to hold the winner's master arbitration identification code, as is supplied from INPUT MASTER ID SELECTOR functional logical subsection 89c04 via lines 107a01 through 107e01, in MASTER REG.-EMID 108a04 wherein it is gated upon the occurrence of an enabled clock $\phi$1. Such enabled clock $\phi$1 is the combination of a logical Low signal (L) EN WIDR on line 88d03 and a logically Low signal (L) $\phi$1 on line 13401. By momentary reference to the SEND CONTROL functional logical subsection 86b14 at FIG. 88d wherein signal (L) EN WIDR is developed, it may be recalled that such signal is derived from the cycle counters when and wherein it is determinable that an arbitration activity has completed. Therefore the winner's master arbitration identification will be recovered into MASTER REG.-WINNER's MASTER ID MR8 logical element 108a04 upon that clock $\phi$1 time after such successive clock $\phi$2 times as the total winner's master arbitration identification code has become lodged within 36 BIT GROUP LINE MEMORY 89c12. Such winner's master arbitration identification code is supplied to the User as signals (H) WIDR 0 through (H) WIDR 7 on cable 108a01. It may be noted in passing that the WINNER's MASTER ID REGISTER functional logical subsection 89c06 is enabled for scan/set as an eight bit shift register part of scan/set test loop C. The interconnections of scan/set test loop C, and other scan/set test loops, will be discussed in Appendix 2.

9.21. CAM and WAIT Block Diagram

The second level block diagram labeled CAM AND WAIT BLOCK DIAGRAM as is shown in FIG. 109a and FIG. 109b must initially be compared with the second level block diagram labeled SLAVE ID section 86a06 as is shown in FIG. 112 for the purposes of the location and identification of this block diagrammed structure within the first level block diagram of the Versatile Bus Interface Logics as is shown in FIG. 86a. The CAM AND WAIT BLOCK DIAGRAM shown in FIG. 109a and 109b may be considered to be a combination of the CAM and CAM CONTROL block 86a20 represented as a logical part of SLAVE ID section 86a06 within the first level block diagram of FIG. 86a, plus the entirety of the WAIT section 86a08 appearing within such first level block diagram. The reason that the CAM and CAM CONTROL functional logical subsection 86a20 should be within the first level block diagram of FIG. 86a associated with the SLAVE ID section, 86a06 but that within the second level block diagram, CAM AND WAIT BLOCK DIAGRAM of FIG. 109a and FIG. 109b, the CAM and CAM CONTROL is blocked diagrammed with further logics of the WAIT section 86a08 is due to the dual purposes of the CAM registers and comparators in the recognition of addressing of the current Versatile Bus Interface Logics as a slave device, and the potential wait response thereto such addressing. This strong coupling between the CAM (meaning contact addressable memory) registers and comparators and the WAIT SECTION 86a08 is shown via line 86a03 within the first level block diagram of FIG. 86a.

Continuing with the explanation of the second level CAM AND WAIT BLOCK DIAGRAM shown in FIG. 109a and FIG. 109b, four content addressable memories labeled CAM MASTER REG. A 109a02 through CAM MASTER REG. D 109b04 plus one MASTER REG.-MASK 109b10 respectively represent four User loadable registers wherein four User selectable slave identification codes may be held plus one User loadable register wherein a mask quantity may be held. As well as being loadable from the User, CAM MASTER REG. A 109a02 through CAM MASTER REG. D 109b04 are part of scan/set test loop A. The MASTER REG.-MASK 109b10 is part of scan/set test loop D. Each such eight bit scan/set testable shift register part of scan/set test loops A or D so created, consists of an MR8 logical element, for example, CAM MASTER REG. A 109a02, plus a SR8 logical element, for example, CAM SLAVE REG. A 109a10, plus an 1O2 logical element, for example, 1 of 2 SELECTOR 109a06. The implementation of a scan/set testable register set should by this time be familiar to the reader.

The eight bit PARALLEL LOAD DATA from the User device on line 92b01 through 92b15 appears as signals (H) UMID 0 through (H) UMID 7 which were previously seen within FIG. 92a to also load, under appropriate control enablement, the User's master arbitration identification code into the MASTER ID functional logical subsection 89a04. In the case of loading a slave identification function code or mask quantity via these same signals, (H) UMID 0 through (H) UMID 7 on lines 92b 01 through 92b15, the User will enable via a select signal that 102 logical element, for example, 1O2 logical element 109a06, associated with that CAM or MASK register wherein it desires to load such pattern, for example, CAM MASTER REG. A 109a02. These select signals are respectively called (L) WRITE A on line 110f11, (L) WRITE B on line 110f15, (L) WRITE C on line 110f19, (L) WRITE D on line 110f23, and (L) WRITE MASK on line 110f27. They will shortly be seen within FIG. 110f to be derived from corresponding write enablements from the User. Similarly, each of CAM MASTER REG. A MR8 logical element 109a02 through CAM MASTER REG. D MR8 logical element 109b08 plus MASTER REG.-MASK MR8 logical element 109b10 must be enabled for entrance of data as well as clocked by clock $\phi$2. Such enablement signals are respectively called (L) ENABLE A on line 110f13, (L) ENABLE B on line 110f27, (L) ENABLE C on line 110f21, (L) ENAABLE D on line 110f25 and (L) ENABLE MASK on line 110f29. These signals are developed either during a User initiated write of the contents of the CAM or MASK registers or upon the enablement of the scan/set test function. Development of these signals is also whown in FIG. 110f. During normal operation of the Versatile Bus Interface Logics CAM MASTER REG. A MR8 logical element 109a02 through CAM MASTER REG. D MR8 logical element 109b08 plus MASTER REG.-MASK MR8 logical element 109b10 will remain with unchanging contents for significant periods of time, and supply d.c. signal levels to respective ones of CAM COMPARATOR REG. A MC8 logical element 109b12, CAM COMPARATOR REG. B MC8 logical element 109a14, CAM COMPARATOR REG. C MC8 logical element 109b12, and CAM COMPARATOR REG. D MC8 logical element 109b14. Each CAM COMPARATOR REG. A 109a12 through CAM COMPARATOR REG. D 109b14 firstly receives in both normal and inverted form, the current eight bit slave identification code (which may be formative and under development) from the BINARY SHIFT MATRIX 112a04 as is shown in the second level block diagram of the SLAVE ID section in FIG. 112. Such eight signals on line 11211 and the inversion of such signals in eight IN1 logical elements collectively called BSSID INVERTERS are received by CAM COMPARATOR REG. A 109a12 through CAM COMPARATOR REG. D 109b14. These signals represent the current slave identification function word received upon Versatile Bus 86a01 and ultimately originate in SLAVE ID/F SLAVE REG. 112a02 wherein they are valid from clock $\phi$2 to clock $\phi$2. Additionally each comparator, CAM COMPARATOR REG. A 109a12 through CAM COMPARTOR REG. D 109b14, receives respective signals representative of the contents of the respective CAM MASTER REG. A 109a02 through CAM MASTER REG. D 109b08. These signals are also valid from each clock $\phi$2 to clock $\phi$2, even should the contents of the CAM master registers be undergoing change by User load. Finally, each CAM comparator, CAM COMPARATOR REG. A 109a12 through CAM COMPARATOR REG. D 109b14 receives the mask quantity as signals valid from clock $\phi$2 to clock $\phi$2 from MASTER REG.-MASK 109b10. Responsively to such inputs the MASK COMPARATOR-8 WIDE, MC8, logical elements which are CAM COMPARATOR REG. A 109a12 through CAM COMPARATOR REG. D 109b12 will respectively output a single signal labeled (L) CAM A=- through CAM D=on cable 108b01 upon the occurrence of a mask compare. Neither the input signals to, nor this masked comparison output signal from, the four CAM comparators are gated; rather this recognition of a masked match will be accepted within CAM CONTROL functional logical subsection 109b02 only upon such time as it is recognized that the original SLAVE ID FROM BSM supplied via cable 11211 is in a complete and valid form.

The CAM CONTROL functional logical subsection 109b02 and the WAIT LOGIC functional logical subsection 109b04 shown within the second level block diagram of FIG. 109b will be jointly shown in greater logical detail in FIG. 110a through 110f. The function of the CAM CONTROL functional logical subsection 109b02 is to recognize the occurrence of a masked match in CAM COMPARATOR REG. A 109a12 through CAM COMPARATOR REG. D 109b14 and to notifiy the User of such a match. Responsive to User control, the function of the WAIT LOGIC functional logical subsection 109b04 is to issue a WAIT signal upon Versatile Bus 86a01 responsively to recognition of slave addressing, or to notify the User of the receipt of such a WAIT signal in the event that the User is operating as a master transmitting device upon Versatile Bus 86a01. The wait line driver/receiver logical element, DR/REC (1) 86a26, and the multiplex selector, SEL. logical element 86a34 (which allows the WAIT line to be multiplexed onto the data driver/receivers) were previously seen within the first level block diagram of FIG. 86a.

9.22. CAM and WAIT Control

The CAM CONTROL functional logical subsection 109b02 and the WAIT LOGIC functional logical subsection 109b04, previously seen within second level CAM AND WAIT BLOCK DIAGRAM 86a20 and 86a24 within FIG. 109b, are jointly shown as structure CAM AND WAIT CONTROL 109b02, 109b04 in FIG. 110, consisting of FIG. 110a through FIG. 110f. Commencing with the detailed explanation of the logical structure as shown in FIG. 110a and FIG. 110b, the masked match received from CAM COMPARATOR REG. A 109a12 through CAM COMPARATOR REG. D 109b14 as signals (L) CAM A=through (L) CAM D=on cable 109b01 will be gated, upon the appropriate assessment time, for the setting of four latches. These latches are respectively composed of crosscoupled AOI 2-1 logical element 110a02 and AOI 2-1-1 logical element 110a04, AOI 2-1 logical element 110a06 and AOI 2-1-1 logical element 110b08, AOI 2-1 logical element 110b02 and AOI 2-1-1 logical element 110b04, and AOI 2-1 logical element 110b06, and AOI 2-1-1 logical element 110b08. Signal (L) ENABLE WAIT STROBE on line 113a03 is logically Low, or true, from clock φ2 to clock φ2 after the last slave identification/-function drive on Versatile Bus 86a01. The development of this signal within the SID/F INPUT CONTROL functional logical subsection part of SLAVE CONTROL functional logical subsection 86a18 will shortly be shown within FIG. 111a. This signal is gated within NO2 logical element 110b10 by the intervening clock φ1 logical Low occurrence of signal (L) φ1 on line 13401. At such time a first complete slave identification/function word has been assembled from SID/F activity upon the Versatile Bus 86a01 and the results of CAM COMPARATOR REG. A 109a12 through CAM COMPARATOR REG. D 190b14 supplied as signals (L) CAM A=through (L) CAM D=on cable 109b01 are valid of assessment in the determination as to whether the current Versatile Bus Interface Logics has been addressed as a slave device. For such masked matches with the User stored slave identification/function codes as are obtained, latches A through D will set producing a corresponding logical Low signal outputs on line(s) 110a01, 110a03, 110b03, and/or 110b05. Each such logically Low output signal is gated in a first and in a second S12 logical element for the respective formation of a WAIT and a HIT signal for distribution to further logics. For example, the logically Low signal rising on the 110a01 from the setting of the latch consisting of cross-coupled AOI 2-1 logical element 110a02 and AOI 2-1-1 logical element 110a04 will be gated in S12 logical element 110a12 and S12 logical element 110a14 as the respective C0 and D1 data inputs thereto by a signal which is the inversion, arising in NO2 logical element 110a10, of either signal (H) USER BUSY on line 110a01 or signal (H) WAIT ON A on line 110a03. If the User is busy or if the User has directed that a matched mask on CAM A be responded to with a WAIT signal, then the logically Low signal on line 110a01 will be selected within S12 logical element 110a12 to be transmitted as the logically Low signal (L) WAIT-A on line 110a05. Meanwhile, the +3 volt logically High signal received as data input signal D0 to S12 logical element 110a14 will be transmitted as the logically High signal (L) HIT-A on line 110a07. Conversely, if the User is neither busy nor has order a WAIT signal responsively to recognition of addressing on the contents of CAM REGISTER A, then signal (L) WAIT-A on line 110a05 will be a logical High whereas signal (L) HIT-A on line 110a07 will be a logical Low. In a similar manner, all latches and selectors as are shown in FIG. 110a and FIG. 110b operate to produce either a logically Low, true, WAIT signal or a HIT signal, such signal as is appropriate to a masked match and the User directed WAIT control for which one each of the CAM REGISTERS A through D.

Continuing in the explanation of the logics of CAM AND WAIT CONTROL functional logical subsection part of SLAVE CONTROL functional logical subsection 86a18, shown in FIG. 110c and FIG. 110d, the development of signal (L) WAIT (OUT) on line 110c01 will next be considered. The AOI 2-2-2 logical element 110c02 represents the collection point for signal conditions as will require the driving of the WAIT signal upon the Versatile Bus 86a01. Upon either a wait on A, or C, or B, or D as is respectively represented by the logical Low condition of signal (L) WAIT-A on line 110a05, (L) WAIT-B on line 110a09, (L) WAIT-C on line 110b07 and/or (L) WAIT-D on line 110b11, then NA4 logical element 110c04 will be satisfied emplacing a logical High signal on line 110c01. If the current Versatile Bus Interface Logics is not configured as the master of a single master—single slave pair wherein signal (H) MASTER ONLY on line 125h09 would be a High, then the clock φ1 logical Low occurrence of signal (L) WAIT DELAY FF (φ1) on line 114a09 combined with the logical Low occurrence of signal (H) WAIT IN PRO (φ1) on line 88j01 (meaning that the present Versatile Bus Interface Logics are not the transmitting Versatile Bus Interface Logics such as would not desire to transmit a WAIT), then NO3 logical element 110c06 will be enabled and a logical High condition on line 110c03 in combination with the previous logical High condition on line 110c01 will satisfy AOI 2-2-2 logical element 110c02, causing logical Low signal (L) WAIT (OUT) on line 110c01. Such a manner of enabling the driving of WAIT upon Versatile Bus 86a01 is by far the most prevalent within prospective system utilization of the Versatile Bus.

The remaining logical elements on FIG. 110c have to do with the special case configuration alignment for the utilization of a Versatile Bus by a single master—single slave pair, and for the registration of the ability to accept but a single further data input by the slave one device of such pair. Those logical elements shown in FIG. 110d ultimately involved with the satisfaction of AOI 2-2-2 logical element 110c02 will be involved with the feature whereby a master transmitting device may cancel pending transactions. The purposes of these relatively difficult features should be reviewed within major section 6. The Versatile Bus Interface Logics to User Interface, before the detailed discussion of the present logics is undertaken. When signal (H) 0 GPS.0 SID CYC on line 114a07 is a logical High, meaning that no arbitration and no slave identification/function is configured which is possible only for Versatile Bus communication between a single master and a single slave device, while signal (L) MASTER ONLY on line 125h11 is a logical High, indicating that this Versatile Bus Interface Logics must thusly be the slave one of such paired devices, then, in accordance with the explanation of section 6, this slave device User will not have sufficient time to respond with a WAIT signal upon the Versatile Bus to a master User device transmitting to itself unless signal (H) USER BUSY on line 110a01 is, in the event that such slave User device is busy, priorly raised to the logical High condition. Upon such user busy condition, then the receipt of signal (L) BUSY (IN) on line 88b05 in the logical High condition, meaning Versatile Bus not busy, will mean that the master device is concluding a data transmission to this slave device. The combination of all such signals, as are valid from clock $\phi 2$ to clock $\phi 2$, within NA4 logical element 110c08 will result in the setting of the latch consisting of cross-coupled AOI 2-1 logical element 110c10 and AOI 2-1 logical element 110c12 upon the intervening logical High occurrence of signal (H) $\phi 1$ (10) on line 13421. Resultantly to the setting of such latch, NA2 logical element 110c14 will be satisfied, and thence, in conjunction with a +3 volt logical High applied signal, AOI 2-2-2 logical element 110c02 will be satisfied producing logical Low output signal (L) WAIT (OUT) on line 110e01. Thereby a slave User device of a single master-slave User pair which is busy can cause the provision of a WAIT signal on the Versatile Bus responsive to any User attempt to communicate. The institution of such a User Busy signal may be exerciseds by all Users, whether they be Versatile Bus interconnected as single slave devices or not.

A User device which has a variable length input buffer such as FIFO push down stack, and which communicates to a single master device across a Versatile Bus, must utilize signal (H) SINGLE INPUT on line 110c03 at the time of a next to the last data word transfer in order that the WAIT signal upon the Versatile Bus should be timely raised to the master device upon the last successive word transfer which the User slave device is currently able to accept. The manner by which a User slave device may timely generate the WAIT signal upon the Versatile Bus if it is connected as a single slave device or a master-slave pair of devices and it is capable of accepting only one additional input word from such master device, is shown in FIG. 110c. When the User device is not busy signal (H) USER BUSY on the line 110a01 is a logical low which is inverted in IN1 logical element 110a16 and provided upon line 110a13 as a logically High signal to NA3 logical element 110c16. If there is no arbitration activity nor any slave identification/function activity configured, as besuits a single master-slave communicating pair upon Versatile Bus 86a01, then signal (H) 0 GPS.0 SID CYC on line 114a07 will also be supplied as a logical High signal to NA3 logical element 110c16. When the User slave is capable of receiving but one additional data input, it will raise signal (H) SINGLE INPUT on line 110c03 to the logical High condition thereby satisfying NA3 logical element 110c16 and causing the emplacement of a first logical Low signal on NO3 logical element 110c18. if the transmission of data from the master User device to the slave User device is configured to transpire across multiple cycles per data word, then there will be no need to enable NO3 logical element 110c18 because the User slave device will have sufficient time to respond with the logical High condition of signal (H) USER BUSY on line 110a01 and thusly enable NO4 logical element 110c08 and produce the resultant logical Low signal (L) WAIT (OUT) on line 110c01 produced responsively thereto, If, however, the master User device is transmitting a final data word in but a single data cycle, then both signal (H) BUSY (IN) on line 128k01 and signal (L) BEGIN (IN) on line 88c15 will simultaneously be logically Low signals. This manner of controlling the Versatile Bus 86a01 for the configuration of null arbitration and null slave identification/function was illustrated within FIG. 88d. In such a case, NO3 logical element 110c18 will be enabled during clock $\phi 2$ to clock $\phi 2$ allowing the latch consisting of AOI 2-1 logical element 110c20 and AOI 2-1 logical element 110c22 to set upon the intervening occurrence of logical High signal (H) $\phi 1$ (10) on line 13421. The setting of this latch will also enable NA2 logical element 110c14, and subsequently AOI 2-2-2 logical element 110c02 causing the provision of a clock $\phi 1$ to clock $\phi 1$ logical Low signal (L) WAIT (OUT) on line 110c01 which, as distributed to the WAIT driver/receiver element, will cause the drive of WAIT upon the Versatile Bus 86a01.

Continuing with the detailed logical explanation of the CAM AND WAIT CONTROL functional logical subsection part of 86a18, the ability to generate a WAIT signal upon the Versatile Bus responsive to the cancellation of pending transaction is illustrated in FIG. 110d. Signals received at the respective WAIT and data bit 0 driver/receiver elements, signal (H) WAIT (IN) on line 128f01 and (H) DB0 (IN) on line 128h03 are respectively selected amongst in S12 logical element 86a34 dependent upon signal (L) WAIT LINE MPX'D on line 126d25. If a master User device knows that it must complete a plural number of transactions in ordered sequence, not necessarily to the same slave devices and not necessarily without interruption, it will have raised a single (H) CANCEL PENDING TRANSACTIONS on line 110c05 to the logical High condition for the collective duration of such transactions. This signal, in conjunction with the proper pin-multiplexed selected WAIT signal appearing upon the Versatile Bus as results in a logical High signal upon line 110d01, and in further conjunction with the logical High condition of signal (H) WAIT IN PRO ($\phi 2$) on line 88j03, will satisfy NA3 logical element 110d04. Signal (H) WAIT IN PRO ($\phi 2$) on line 88j03 is derived from SEND CONTROL 86b14 and will be a logical High only for the appropriate clock $\phi 2$ to clock $\phi 2$ WAIT sequence in a master transmitting device. The intent of signal (H) CANCEL PENDING TRANSACTIONS on line 110c05 is to allow a User device to "self-wait" itself upon Versatile Bus 86a01 for pending transactions, but only for its own pending transactions. The signal (H) WAIT IN PRO ($\phi 2$) on line 88j03 will not be a logical High unless the present User device has won arbitration ownership of the Versatile Bus. For such transaction or transactions as the master User device is both desirous of, and appropriately entitled to, cancel, then the enablement of NA3 logical element 110d04 producing a logical Low signal which is inverted by IN1 logical element 110d06 will allow the setting of a latch comprised of AOI 2-1 logical element 110d08 and cross-coupled AOI 2-1 logical element 110d10 upon the intervening occurrence of logical High signal (H) $\phi 1$ (10) on line 13421. When this latch sets under control of the logical High signal (H) WAIT IN PRO ($\phi 2$) on line 88j03, as is derived from WAIT IN PRO LATCH $\phi 2$ shown in FIG. 88j, the WAIT IN PRO LATCH $\phi 1$ also shown in FIG. 88j will have been cleared and signal (H) WAIT IN PRO ($\phi 1$) on line 88j01 will be a logical Low. Upon the next transaction wherein the present User device is a bus-owning master device the signal (H) WAIT IN PRO ($\phi 1$) on line 88j01 will be a logical High from clock $\phi 1$ to clock $\phi 1$, thereby satisfying, in conjunction with the setting of the latch consisting of AOI 2-1 logical elements 110d08 and 110d10, AOI 2-2-2 logical element 110c02 and causing the generation of logical Low signal (L) WAIT (OUT) on line 110c01. In this manner the bus-owning master User device desirous of cancelling pending transactions has "self-waited" itself and all other devices upon the Versatile Bus **86*a*01. The CANCEL PENDING TRANSACTIONS LATCH consisting of AOI 2-1 logical elements 110*d*08 and 110*d*12 will be cleared either as the User releases signal (H) CANCEL PENDING TRANSACTIONS on line 110*c*05 to the logical Low condition thereby satisfying NA2 logical element 110*d*14, or as all signals (L) INIT TRANS FF on line 88*c*09, (L) ARB IN PRO ($\phi$2) on line 88*g*11, (L) SID IN PRO ($\phi$2) on line 88*i*05, and (L) WAIT IN PRO ($\phi$2) on line 88*j*05 are logically Low, indicating that no further send activity is current progress at this User, such signals as collectively satisfy NA4 logical element 110*d*02 and thence NA2 logical element 110*d*14. By these two manners of satisfying NA2 logical element 110*d*14, the CANCEL PENDING TRANSACTIONS LATCH consisting of AOI 2-1 logical element 110*d*08 and 110*d*10 will be cleared upon the next logical High occurrence of signal (H) $\phi$1 (10) on line 13421**.

Continuing with the discussion of CAM AND WAIT control functional logical subsection **109*b*02 and 109*b*04 as shown in FIG. 110*d*, the development of signal (H) WAIT TO USER on line 110*d*01 will next be discussed. As before noted, the occurrence of a WAIT condition upon the Versatile Bus as either the logically High condition of signal (H) WAIT (IN) on line 128*f*01 or, in the event of pin multiplexing, the logical high occurrence of signal (H) DB0 (IN) on line 128*h*03, is selected in S12 logical element 86*a*34 under conrol of signal (L) WAIT LINE MPX'D on line 126*d*25 as arises at the configuration translation functional subsection. The clock $\phi$2 to clock $\phi$2 logically High signal selected through S12 logical element 86*a*34 in the event of a WAIT transmission upon the Versatile Bus will be gated upon the logical High occurrence of signal (H) $\phi$1 (10) on line 13421 during the intervening clock $\phi$1 to set a latch consisting of cross-coupled AOI 2-1 logical elements 110*d*16 and 110*d*18. The set side signal output of such latch, logically Low when the latch is set, is received at NO2 logical element 110*d*20. Meanwhile, conditional on signal (H) 0 GPS.0 SID CYC on line 114*a*07, S12 logical element 110*d*22 will select amongst either signal (L) WAIT DELAY FF ($\phi$1) on line 114*a*09, or signal (L) BEGIN (IN) FF on line 88*c*11 in the event that both arbitration and slave identification/-function are configured as a nullity. The clock $\phi$1 to clock $\phi$1 logical Low occurrence of these signals indicating the proper time at which the WAIT signal upon the Versatile Bus should be evaluated will, should the latch consisting of cross-coupled AOI 2-1 logical elements 110*d*16 and 110*d*18 be set, enable NO2 logical element 110*d*20 and produce logically High signal (H) WAIT TO USER on line 110*d*01. This clock $\phi$1 to clock $\phi$1 signal (H) WAIT TO USER on line 110*d*01 has previously been seen within the timing diagrams of FIG. 52, particularly FIG. 52*d*.**

Continuing with the explanation of the CAM AND WAIT CONTROL functional logical subsection **109*b*02, 109*b*04 as shown in FIG. 110*e*, the development of the signals (L) CAM HIT on line 110*e*01 and signals (H) HIT-A on line 110*e*03 through signal (H) HIT-D on line 110*e*09 will next be discussed. The signals (L) HIT-A on line 110*a*7, (L) HIT-B on line 110*a*11, (L) HIT-C on line 110*b*99 and (L) HIT-D on line 110*b*13, are respectively inverted in IN1 logical elements 110*e*08 through 110*e*14 and supplied to the User as signals (L) HIT-A on line 110*e*03, (L) HIT-B on line 110*e*05, (H) HIT-C on line 110*e*07, and (H) HIT-D on line 110*e*09. Any one or ones of the logical low signals (L) HIT-A on line 110*a*07 through (L) HIT-D on line 110*b*13 will satisfy NA4 logical element 110*e*04 and in the presence of the logical High condition of signal (H) ENABLE HIT on line 111*a*01 as is derived from the SID/F INPUT CONTROL functional logical subsection part of 86*a*18 as will be shown in FIG. 111*a*, will satisfy AOI 2-2 logical element 110*e*06 and cause signal (L) CAM HIT on line 110*e*01 to be transmitted to the User as a logical Low signal. In the event that no arbitration and no slave identification/function activities are configured, resulting in the logical High condition of signal (H) 0 GPS.0 SID CYC on line 114*a*07, then for the slave User device one of a master-slave pair of User devices signal (H) MASTER ONLY on line 125*h*09 will be a logical Low. At such a slave device if signal (H) USER BUSY on line 110*a*01 is a logical Low, indicating not busy, then each logical Low occurrence of signal (L) BEGIN (IN) FF on line 88*c*11 will satisfy NO2 logical element 110*e*02 and thence AOI 2-2 logical element 110*e*06 and result in logical Low signal (L) CAM HIT on line 110*e*01. For such a slave one User device, each setting of the BEGIN IN LATCH as is shown in FIG. 88*c* and such as gives rise to the logical Low condition of signal (L) BEGIN (IN) FF on line 88*c*11, is equivalent to a slave address resultant in logical Low signal (L) CAM HIT on line 110*e*01**.

Concluding the explanation of CAM AND WAIT control functional logical subsection **109*b*02, 109*b*04, certain utility signals are shown in FIG. 110*f*. Signals (H) WRITE A on line 110*f*01 through (H) WRITE D on line 110*f*07, plus signal (H) WRITE MASK on line 110*f*09 are received from the User and respectively inverted into IN1 logical elements 110*f*02 through 110*f*08, plus 110*f*10, and supplied to the respective one of two selectors associated with each of CAM MASTER REG. A 19*a*02 through CAM MASTER REG. D 109*b*08, plus MASTER REG.-MASK 109*d*10, as signals (L) WRITE A on line 110*f*11 through (L) WRITE D on line 110*f*23, plus signal (L) WRITE MASK on line 110*f*27. Such signals are utilized by the User to enable the writing of respective four content addressable memories A through D plus the mask register. The logical High condition of such signals (H) WRITE A on line 110*f*01 through (H) WRITE MASK on line 110*f*09 also satisfy NO2 logical elements 110*f*12 through 110*f*20 to respectively produce logical Low signals (L) ENABLE A on line 110*f*13 through (L) ENABLE MASK on line 110*f*29 as are received at CAM MASTER REG. A 109*a*02 through MASTER REG.-MASK 109*b*10 to allow the gating load thereof. Each CAM MASTER REG. A 109*a*02 through CAM MASTER REG. D 109*b*08 is also enabled for gating data under control of logical Low signal (L) ENABLE LOOP A on line 137*b*01 as inverted in IN1 logical element 110*f*22 and, as is supplied as a logically High signal to NO2 logical elements 110*f*12 through 110*f*18, which causes logically Low signals (L) ENABLE A on line 110*f*13 through (L) ENABLE D on line 110*f*25. Similarly, the logical High signal (H) TEST LOOP D on line 13713 enables NO2 logical element 110*f*20 and produces logically Low signal (L) ENABLE MASK on line 110*f*28. Through such test control, CAM MASTER REG. A 109*a*02 through CAM MASTER REG. D 109*b*08 are seen to be part of scan/set test loop A whereas MASTER REG.-MASK 109*b*10** is seen to be part of scan/set test loop D. Complete interconnection of the scan/set test loops is discussed in Appendix 2.

9.23. Slave Identification/Function Input Control

The SID/F INPUT CONTROL functional logical subsection part of SLAVE LOGICS 86a18, as was previously shown within the first level block diagram of FIG. 86a, is shown in FIG. 111, consisting of FIG. 111a and FIG. 111b. The remaining part of the SLAVE LOGIC functional logical subsection 86a18 part of SLAVE ID SECTION 86a06 as illustrated in the first block diagram of FIG. 86a is shown in the second level SLAVE ID SECTION block diagram of FIG. 112. The SID/F INPUT CONTROL functional logical subsection part of 86a18 is first concerned, as shown in FIG. 111a, with development of signal (L) ENABLE WAIT STROBE on line 111a03 and, if receiving, the development of signal (H) ENABLE HIT on line 111a01 therefrom. The logical Low condition of signal (L) ENABLE WAIT STROBE on line 111a03 will, if transmitting, be developed when the first eight bit slave identification/function word, or the entirety of a slave identification/function word if such word is less than eight bits, has been first received upon the Versatile Bus 86a01. The logical Low signal (L) ENABLE WAIT STROBE on line 111a03 is also received by NA4 logical element 111b02 to produce logically High signal (H) RE INIT SID on line 111b01. Alternative paths in satisfaction of NO4 logical element 111b02 will result in the logical High condition of signal (H) RE INIT SID on line 111b01 for each successive slave identification/function word received after a first such word. When received by SEND CONTROL functional logical subsection 86b14 as shown in FIG. 88h, the logical High condition of signal (H) RE INIT SID on line 111b01 becomes, if the User is transmitting, signal (H) STROBING SID on line 88h13 as is supplied to the User for gating of successive slave identification/function words into the Versatile Bus Interface Logics. If this Versatile Bus Interface Logics is receiving such slave identification/function words as a slave device, then signal (L) SID IN PRO ($\phi$2) on line 88i05 will be a logical High which, in conjunction with the logical High condition of signal (H) RE INIT SID on line 111b01, will produce logical Low signal (L) ENABLE UID F REG on line 111b03, which, as latched into RECEIVE CONTROL functional logical subsection 86b16 as shown in FIG. 87, will result in the supply of logical High signal (H) SID/F AVAIL on line 8705 to the User device for gating a slave identification/function word quantity into such User. In summary, the logics shown in FIG. 111a are concerned with the recognition of a first full or complete, slave identification/function word whereas the logics shown in FIG. 111b are concerned with recognition of subsequent ones of such slave identification/function words to said first slave identification/function word.

Commencing with the development of signal (L) ENABLE WRITE STROBE on line 111a03 as shown in FIG. 111a, the logical High condition of signal (H) MASTER ONLY on line 125h09, meaning that the present Versatile Bus Interface Logics is associated with a master one of a single master-single slave pair of such devices, or the logical High signal (H) SID IN PRO ($\phi$2) on line 88i03, meaning that the present Versatile Bus Interface Logics is part of a transmitting master device, will satisfy NO2 logical element 111a02 producing a logically Low signal on line 111a05 which will disable AOI 2-2-2 logical element 111a04. If the present Versatile Bus Interface Logics is neither transmitting nor associated with the only master device, there exist several additional avenues of satisfying AOI 2-2-2 logical element 111a04. These avenues are reflective of either the receipt of the entirety of a first slave identification/function word, or the receipt of the first eight bit word should there be more than one such slave identification/function word. As an example of the receipt of an entire slave identification/function word less than eight bits, if slave identification/function is configured at one or two cycles as produces logically Low signal (L) 1 SID CYC on line 126d15 or logically Low signal (L) 2 SID CYC on line 126d11, then NA2 logical element 111a06 will be satisfied. In conjunction with logically High signal (H) 2 SID LINES on line 126c15, such satisfaction of NA2 logical element 111a06 will result in satisfaction of AOI 2-2-2 logical element 111a08 and resultant logical Low signal input to NO2 logical element 111a10. In conjunction with the logical Low condition of signal (L) INIT DATA CYCLE on line 114b03, meaning that either said one or both said two slave identification/function cycles must have been completed, then NO2 logical element 111a10 will be satisfied and resultantly AOI 2-2-2 logical element 111a04 will be satisfied and signal (L) ENABLE WAIT STROBE on line 111a03 will assume the logical Low condition. As an example of the receipt of a complete slave identification/function word, note that the logical High condition of signal (H) 4 SID LINES on line 126c09, meaning that slave identification/function activity is configured to transpire at four lines per cycle while signal (H) SCK=2 ($\phi$2) on line 115a23 is also a logical High, meaning that two cycles of slave identification/function activity have transpired, will result in satisfying AOI 2-2 logical element 111a12, resultantly satisfying NA2 logical element 111a14, and finally satisfying AOI 2-2 logical element 111a04 thereby producing logical Low signal (L) ENABLE WAIT STROBE on line 111a03. Similarly, the logical High condition of signal (H) 8 SID LINES on line 126c05 coupled with the logical High condition of signal (H) SCK=1 ($\phi$2) on line 115a27 will satisfy NA2 logical element 111a16 and thereafter NA2 logical element 111a14 and thereafter AOI 2-2-2 logical element 111a04, again resulting in logical Low signal (L) ENABLE WAIT STROBE on line 111a03. Finally, if signal (L) 0 SID CYC on line 126d19 is a logical Low and signal (H) 0 GPS on line 126b17 is a logical Low, meaning that arbitration is configured to occur but that slave identification/function activity is configured as a nullity, then the logical Low occurrence of signal (L) INIT DATA CYCLE on line 114b03 will enable NO3 logical element 111a18 and thence AOI 2-2-2 logical element 111a04, producing logical Low signal (L) ENABLE WAIT STROBE on line 111a03.

Continuing with the explanation of the SID/F INPUT CONTROL functional logical subsection part of 86a18, the development of signal (H) RE INIT SID on line 111b01 as shown in FIG. 111b will next be discussed. The logics as shown in FIG. 111b are concerned with the development of this signal for subsequent words to the first word of slave identification/function received upon Versatile Bus 86a01. The logical Low condition of signal (L) SID IN PRO ($\phi$1) on line 88i33, as indicates the continuing setting of the SID IN PRO LATCH $\phi$1 as is shown in SEND CONTROL functional logical subsection 86b14 at FIG. 88i, indicates that the present Versatile Bus Interface Logics is transmitting additional words of slave identification/function. Alternatively, the logical Low condition of signal (L) SCK=2 ($\phi$1) on line **115*a*15 indicates that the receive cycle counter for slave identification/function activity has advanced upon the receipt of subsequent words. Either of these logical Low signal conditions will satisfy NA2 logical element 111*b*06 resulting in the setting of a latch, consisting of AOI 2-1 logical element 111*b*08 cross-coupled with AOI 2-1 logical element 111*b*10, upon the intervening logical High occurrence of signal (H) $\phi$2 (7) on line 13441. Upon becoming set, the clear side signal output of this latch will provide a logical High signal enabling AOI 2-2 logical element 111*b*12, NA4 logical element 111*b*14, and AOI 2-2 logical element 111*b*16. The purpose of these last three named logical elements is to collect such configuration and receive cycle counter combinations as indicate that an entire subsequent word of slave identification/function has been received upon Versatile Bus 86*a*01. For example, the setting of the latch consisting of cross-coupled AOI 2-1 logical element 111*b*08 and AOI 2-1-1 logical element 111*b*10, in conjunction with the logical High signal (H) 8 SID LINES on line 126*c*05, immediately satisfies AOI 2-2 logical element 111*b*12, and thence NA4 logical element 111*b*04, resulting in the continuing provision of a logically High signal (H) RE INIT SID on line 111*b*01 until such time as the latch should become cleared. As another example, the configuration of the slave identification/function activity to transpire upon four lines, as results in logically Low signal (L) SID LINES on line 126*c*11, and across four cycles, as results in logically Low signal (L) 4 SID CYC on line 126*d*07, will require that a new slave identification/function word be recognized upon a slave identification/function receive cycle counter of two, four or six. One such case, a cycle count of six, is accounted for in NO3 logical element 111*b*18 wherein logically Low signal (L) SCK=6 ($\phi$2) on line 115*a*17 satisfies such element, and thence AOI 2-2 logical element 111*b*12, and finally NA4 logical element 111*b*02 producing logically High signal (H) RE INIT SID on line 111*b*01. The reader should be able to account for himself that other combinations of configurations and cycles are accounted for within remaining paths through NA4 logical element 111*b*14 and AOI 2-2 logical element 111*b*16. A terminus cycle counter condition is always substituted for by the logically High condition of signal (H) INIT DATA CYCLE on line 114*b*01 which satisfies AOI 2-2 logical element 111*b*16 and then NA4 logical element 111*b*02 producing signal (H) RE INIT SID on line 111*b*01 for the final slave identification/function word as is received. Upon such time as the SID IN PRO LATCH $\phi$1 part of SEND CONTROL functional logical subsection 86*b*14 shown at FIG. 88*i*, is cleared, then signal (L) SID IN PRO ($\phi$1) on line 88*i*33 will become a logical High. Alternatively, in a receiving slave device signal (L) SCK=2 ($\phi$1) on line 115*a*15 will reassume a logical High condition as the slave identification/function cycle counter is reset. The resultant disablement of NA2 logical element 111*b*06 will provide a logical Low signal to NO2 logical element 111*b*18 which, in combination with logical Low signal (L) WAIT DELAY FF ($\phi$1) on line 114*a*09 as means that the WAIT is enabled and the slave identification/function activity is terminated, will cause the latch consisting of cross-coupled AOI 2-1 logical element 111*b*08 and AOI 2-1-1 logical element 111*b*10 be cleared. Responsively to the clear side signal output from such latch, AOI 2-2 logical element 111*b*12, NA4 logical element 111*b*14 and AOI 2-2 logical element 111*b*16 will be disabled. When it is remembered that the logical Low signal (L) ENABLE WAIT STROBE on line 111*a*03, as attended the first complete word of slave identification/function transmission, enabled NA4 logical element 111*b*02 which was also enabled during each subsequent full word of slave identification/function transmission, the signal (H) RE INIT SID on line 111*b*03 has assumed the logical High condition for each slave identification/function word either sent or received upon the Versatile Bus 86*a*01. This signal is supplied directly to SEND CONTROL functional logical subsection 86*b*14 as shown in FIG. 88*h*, wherein it becomes signal (H) STROBING SID on line 88*h*13 if the present Versatile Bus Interface Logics are transmitting slave identification/function words received from a User device. Alternatively, if the present Versatile Bus Interface Logics are receiving slave identification/function words addressed to a slave User device, then signal (L) SID IN PRO ($\phi$2) on line 88*i*05 will be a logical High, indicating no transmission in progress, thereby satisfying NA2 logical element 111*b*04 and producing logical Low signal (L) ENABLE UID F REG on line 111*b*03 upon each occurrence of logical High signal (H) RE INIT SID on line 111*b*01. This logical Low signal (L) ENABLE UID F REG on line 111*b*03 is latched in RECEIVE CONTROL functional logical subsection 86*b*16 as shown in FIG. 87, and thence provided as signal (H) SID/F AVAIL on line 8705** to the User to cause the User to receive each slave identification/function word as available.

9.24. Slave ID Section

A second level block diagram of the SLAVE ID section **86*a*06 in partial part is shown in FIG. 112. By momentary reference to the first level block diagram of the Versatile Bus Interface Logics as shown in FIG. 86*a*, it may be seen that 1 OF 2 SELECTOR 86*a*30, 1 OF 2 SELECTOR 86*a*32, driver/receiver element DR/REC (8) 86*a*22, and part of SLAVE LOGIC 86*a*18 are shown in the second level block diagram of FIG. 112. The remainder of SLAVE LOGIC 86*a*18 was observed within the second level block diagram of FIG. 109*a* and FIG. 109*b***.

The portion of the SLAVE ID SECTION **86*a*06 as is shown in the second level block diagram of FIG. 112 is concerned with the registers, selectors and binary shift matrix by which slave identification/function quantities are both received from the User for transmission upon Versatile Bus 86*a*01, and received from Versatile Bus 86*a*01 for transmission to the User. Considering first the transmission of a slave identification/function quantity, the User device raises signals (H) USID 0 through (H) USID 7 on line 11207. Under control of logical Low condition of signal (L) LOAD SID on line 88*h*11, this eight bit slave identification/function quantity is gated through 1 OF 2 SELECTOR 1O2 logical element 11206 into SLAVE ID/F MASTER REG. MR8 logical element 11208. The logical Low gating signal (L) LOAD SID on line 88*h*11 becomes active upon clock $\phi$2 prior to the setting of the SID IN PRO LATCH as shown in FIG. 88*i*. The SLAVE ID/F MASTER REG MR8 logical element 11208 is gated upon the next successive clock $\phi$1. The identification/function quantity, valid in SLAVE ID/F MASTER REG. MR8 logical element 11208 from clock $\phi$1 to clock $\phi$1, is transferred as signals via line 11213, through 1 OF 2 SELECTOR 1O2 logical element 86*a*30, and via line 11203, to be driven by driver/receiver D/R (8) logical element 86a02 as a slave identification/function transmission upon Versatile Bus 86a01. The select, SEL, signal into 1 OF 2 SELECTOR 1O2 logical element 86a30 on the 88g13 is signal (H) MUX ARB LINES which would be a logical High only during the process of arbitration specified to be pin-multiplexed onto the slave identification/function driver/receivers. Similarly, there is a possibility that the slave identification/function word transmission on line 11203 will actually be selected in data output selector 1O2 logical element 86b22 to transpire upon the driver/receiver, DR/REC (16) logical elements 86b20 as are shown associated with the data section 86b04 in FIG. 123b. In any case, whether those driver/receiver D/R (8) logical element 86a22 normally associated with SLAVE ID section 86a06 are employed for drive of the slave identification/function word upon Versatile Bus 86a01, or whether the data driver receivers are employed in a pin-multiplexed configuration for the drive of such slave identification/function word, the pertinent driver/receiver elements will be controlled by configuration to drive only so many slave identification/function lines as are specified by such configuration. Meanwhile, during the clock $\phi 2$ drive of the slave identification/function word upon howsoever many slave identification/function lines are configured on Versatile Bus 86a01, the slave identification/function word as was held in SLAVE ID/F MASTER REG. MR8 logical element 11208 will be gated into SLAVE ID/F SLAVE REG. logical element 11202 upon the same clock $\phi 2$. Subsequently it will pass through BINARY SHIFT MATRIX BSM logical element 11204, wherein it will be shifted under configuration control generated signals, and thence through 1 OF 2 SELECTOR 1O2 logical element 11206 (now disabled for loading new slave identification/function word from the User by the logical High condition of signal (L) LOAD SID on line 88b11) and back to SLAVE ID/F MASTER REG. MR8 logical element 11208 in a left-justified position. In such a justified position as was obtained through the previously described loop, a next partial word of the slave identification/function quantity will be gated through 1 OF 2 SELECTOR 1O2 86a30 and thence driven upon Versatile Bus 86a01 by driver/receiver elements D/R (8) 86a02. After an entire User supplied slave identification/function word has been driven upon Versatile Bus 86a01—and howsoever many of one, two, four, or eight cycles are specified per word transmission (reference FIG. 22)—the User device may again supply subsequent slave identification/function words under logical Low signal (L) LOAD SID on line 88h11**.

Figure 123B:
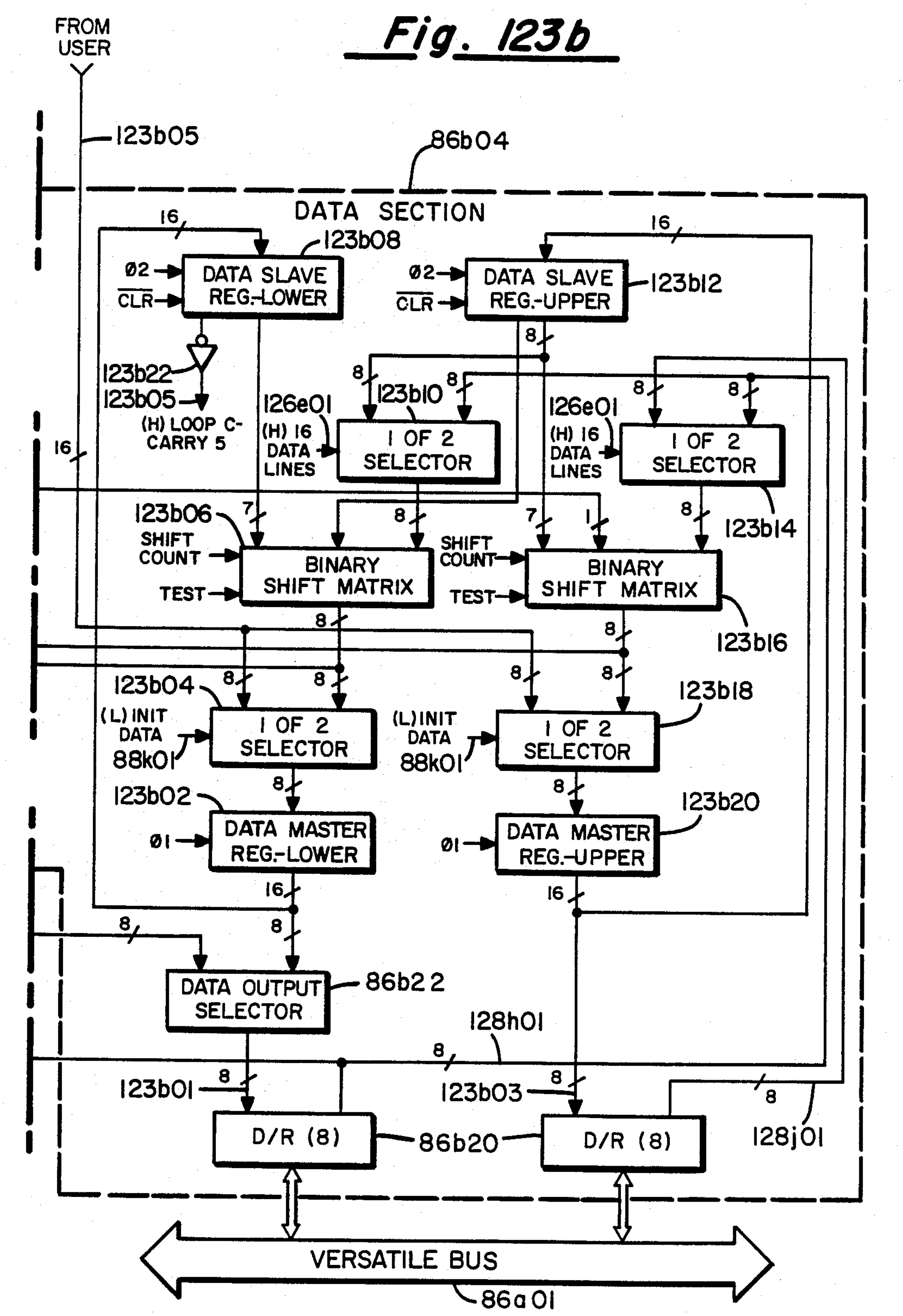

Continuing with the explanation of SLAVE ID section 86a06 as its shown in the second level block diagram of FIG. 112, the receipt of a slave identification/function transmission upon Versatile Bus 86a01 transpires either within driver/receiver D/R (8) logical elements 86a02 or, in the event that the pin-multiplexing of the slave identification/function activity is configured to be pin multiplexed, upon driver/receiver DR/REC (16) logical elements 86b20 associated with data section 86b04 as is shown in FIG. 86b and FIG. 123b. Selection amongst such input signals as made in 1 OF 2 SELECTOR 1O2 logical element 86a32 under the control of signal (L) MUX SID LINES on line 88g15. The signals representative of each received entire slave identification/function word, or assembled entire word, are transmitted via line 11215 to BINARY SHIFT MATRIX BSM logical element 11204, and thence through 1 OF 2 SELECTOR 1O2 logical element 11212, and thence, under enabling signals (L) ENABLE UID F REG on line 111b03 plus the intervening occurrence of clock $\phi 1$, into USER INPUT SID/F REG. LOWER-MASTER MR8 logical element 11210. This path is exercised when the entirety of the slave identification/function word is assembled. If a partial slave identification/function word is received, then it will be appropriately positionally justified under shift signals originating in configuration control, in BINARY SHIFT MATRIX BSM logical element 11204, passed through 1 OF 2 SELECTOR 1O2 logical element 11206, and lodged as an intermediate product in SLAVE ID/F MASTER REG. MR8 logical element 11208 upon clock $\phi 1$. As each successive partial word is retrieved from Versatile Bus 86a01 upon signals valid from clock $\phi 2$ to clock $\phi 2$ upon lines 11215, so also will the previously received partial words be held valid in SLAVE ID/F SLAVE REG. SR8 logical element 11202 wherein they are gated upon the same clock $\phi 2$. Priorly and currently received partial words are combined in passage through BINARY SHIFT MATRIX BSM logical element 11204. When the last, least significant bits, of each slave identification/function word are finally added as a final partial word portion of the entire slave identification/function word, then the eight bit entire word from BINARY SHIFT MATRIX BSM logical element 11204 will be passed through 1 OF 2 SELECTOR 1O2 logical element 11212 and become lodged in USER INPUT SID/F REG. LOWER-MASTER MR8 logical element 11210 under the logical Low conditions of signal (L) ENABLE UID F REG on line 11b03 and (L) $\phi 1$. At such time as a final entire one of such slave identification/function words is being passed from BINARY SHIFT MATRIX BSM logical element 11204 to 1 OF 2 SELECTOR 1O2 logical element 11212, whether such slave identification/function word had been obtained in its entirety in one cycle or by parts during several cycles, the 1 OF 2 SELECTOR 102 logical element 11206 may be, under control of logical Low signal (L) LOAD SID on line 88h11, enabled to capture a slave identification/function word from the User on line 11207. Therefore, when the slave identification/function activity is pipelined upon the Versatile Bus 86a01, the present SLAVE ID section 86a06 may enable the recognition of the slave addressing of the present User device at that immediately preceding activity and cycle time prior to such activity and cycle time as the User device may itself be going onto the bus as an arbitration winning master to conduct its own slave identification/function transmission. In other words, there is no conflict between the receipt of slave addressing as a slave device and the pipelined conduct of slave addressing as a master device in whatsoever order they should occur.

The received slave identification/function word(s) as held in USER INPUT SID/F REG. LOWER-MASTER MR8 logical element 11210 is (are) issued to the User as signals (H) UIDF0 through (H) UDIF7 on line 11209. The generation of signal (H) STROBING SID on line 8813, as accompanies the issuance of each complete slave identification/function word to the User, was previously seen within the SEND CONTROL functional logical subsection 86b14 at FIG. 88h.

The loop path through USER INPUT SID/F SLAVE REG. SR8 logical element 11214 through 1 OF 2 SELECTOR 1O2 logical element 11212 and back to USER INPUT SID/F REG. LOWER-MASTER MR8 logical element 11210 is purely for the enablement of an eight bit shift register to support scan/set testing of USER INPUT SID/F REG. LOWER-MASTER MR8 logical element 11210 as part of scan/set test loop C. Note that scan/set test data is received as signal (H) LOOP C-CARRY 5 on line 123b05. The clear side signal output of the least significant bit of USER INPUT SID/F SLAVE REG. SR8 logical element 11214 is inverted in IN1 logical elelemtn 11216 and supplied as signal (H) LOOP C-CARRY 4 on line 11213 to the LD input of BINARY SHIFT MATRIX BSM logical element 11204. In a similar manner to previous scan/set test loops, BINARY SHIFT MATRIX BSM logical element 11204, 1 OF 2 SELECTOR 1O2 logical element 11206, SLAVE ID/F MASTER REG. MR8 logical element 11208 and SLAVE ID/F SLAVE REG. SR8 logical element 11202 are interconnected as an eight bit shift register. The clear side signal output of the least significant bit of SLAVE ID/F SLAVE REG. SR8 logical element 11202 is inverted in IN1 logical element 11218 and supplied to further elements in scan/set test loop C as signal (H) LOOP C-CARRY 3 on line 89c01, which line was visible in the WINNER'S MASTER ID functional subsection 89c06 shown in the second level block diagram at FIG. 89c. The interconnection of the scan/set test loops is discussed in Appendix 2. Tracing a scan/set test loop, such as scan/set test loop C, through logical elements at the block diagram level should present no difficulty if the reader has familiarized himself with the basic manner of scan/set interconnection as is shown in the detailed drawings of the logics.

6.25. Receive Counter Control

Figure 114A:
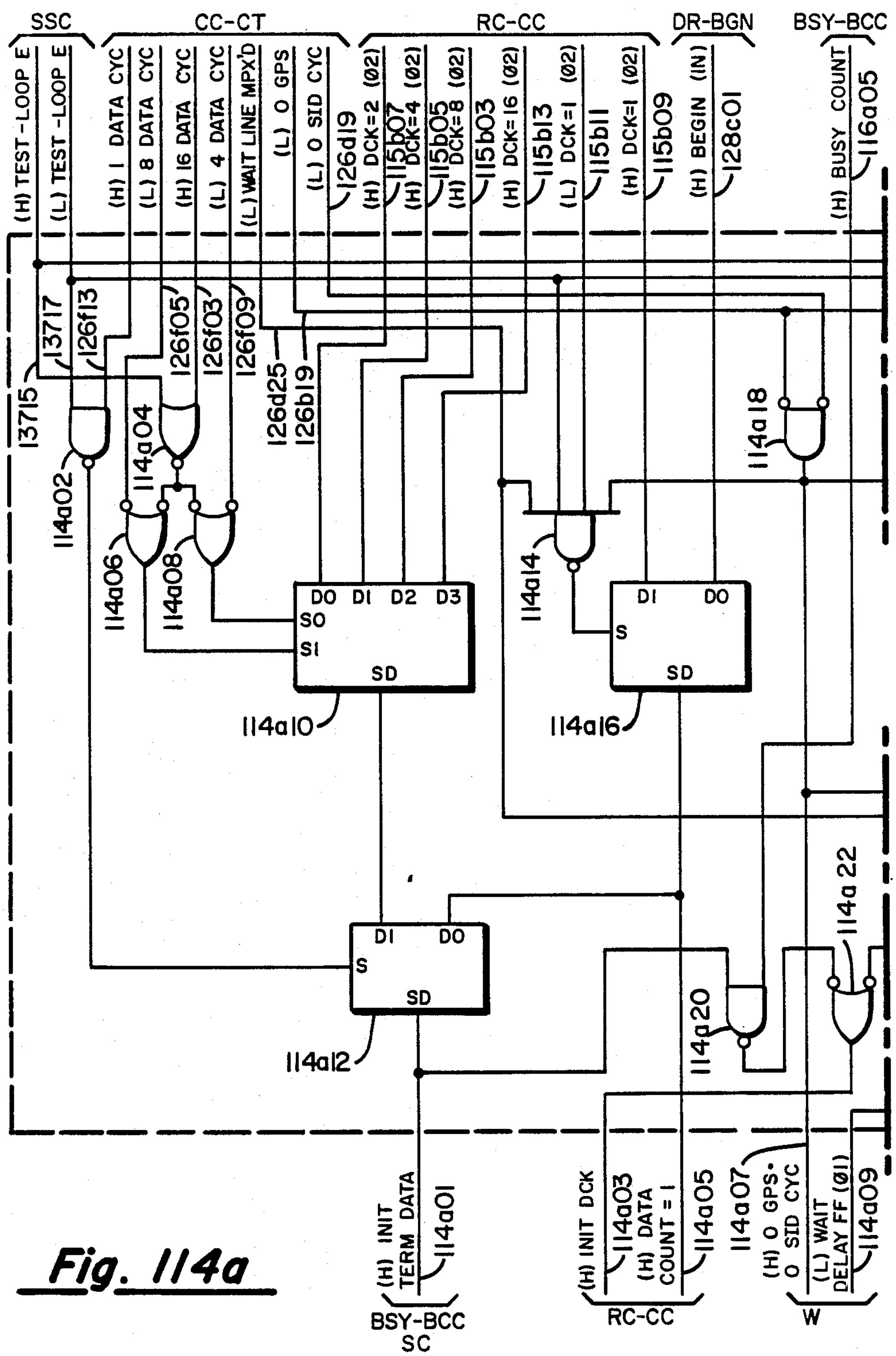
Figure 114B:
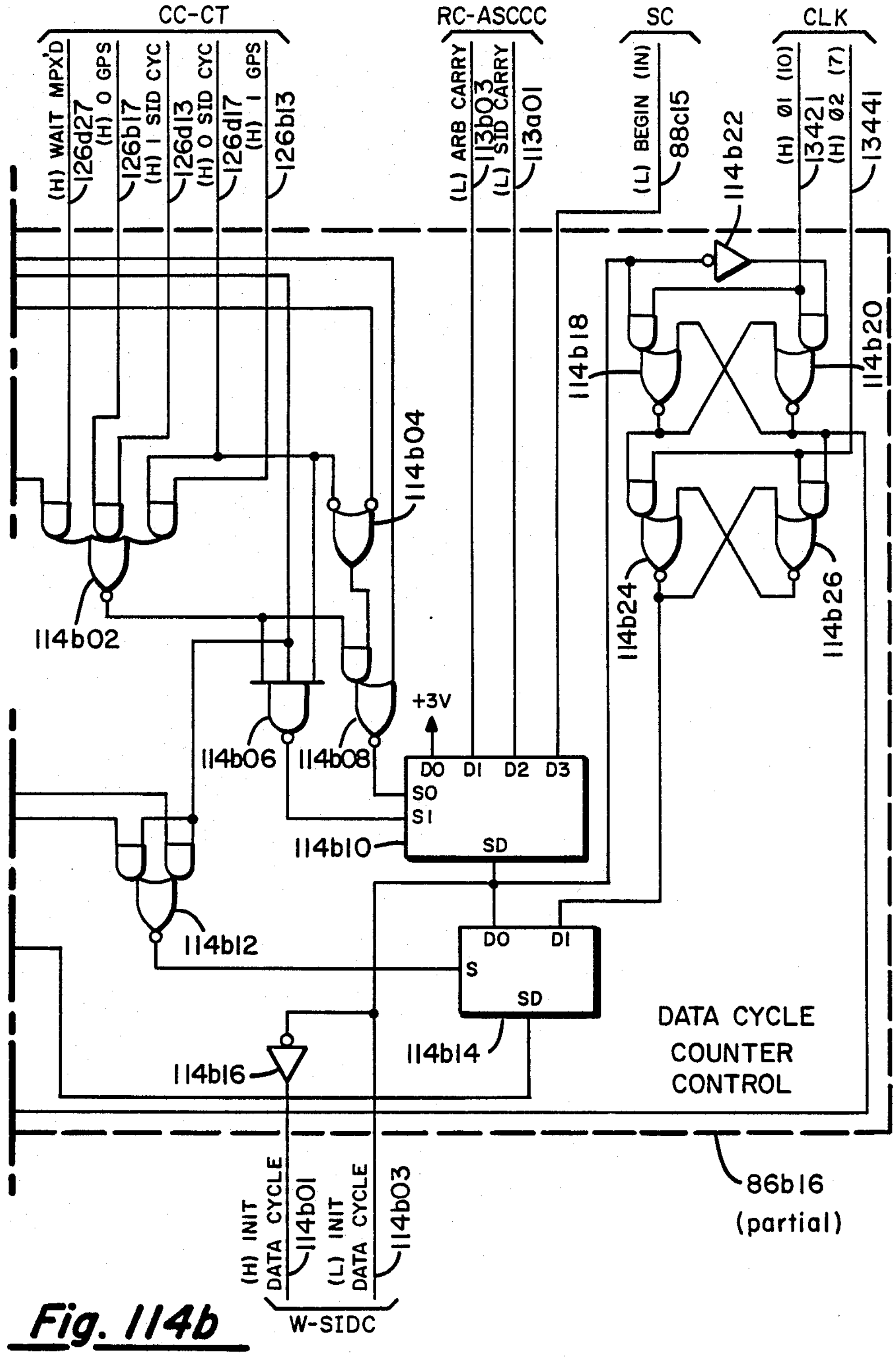

The RECEIVE COUNTER CONTROL functional logical subsection 86b16 is shown as ARB AND SID CYCLE COUNTER CONTROL in FIG. 113, consisting of FIG. 113a and FIG. 113b, plus DATA CYCLE COUNTER CONTROL in FIG. 114, consisting of FIG. 114a and FIG. 114b, plus the RECEIVE CYCLE COUNTERS shown in FIG. 115a, consisting of FIG. 115a-1 and FIG. 115a-2 and in FIG. 115b, consisting of FIG. 115b-1 and FIG. 115b-2. That minor remaining part of RECEIVE CONTROL 86b16 part of PROCESS CONTROL 86b06 (such as is shown in the first level block diagram of FIG. 86b) is that minor part concerned with a User interface shown in FIG. 87. The general function of the RECEIVE COUNTER CONTROL will be discussed prior to entering into a detailed explanation of the logics.

The function of RECEIVE COUNTER CONTROL functional logical subsection 86b16 is to keep track of the number of cycles within which the activities of arbitration, slave identificaiton/functiion, wait, and data will be engaged in by the Versatile Bus Interface Logics. A maximum count of thirty-two cycles is kept within the cycle counters shown in FIG. 115a and FIG. 115b. An additional single latch will control the cycle of wait, for a possible duration of the receive counter control equaling thirty-three cycles. By momentary reference to FIG. 115a, the eight count arbitration cycle counter is contained within MASTER REGISTER MR8 115a02 and SLAVE REGISTER SR8 115a04 shown in FIG. 115a-1. Similarly, a slave counter capable of maintaining up to eight counts is shown as MR8 logical element 115a06 and SR8 logical element 115a08 in FIG. 115a-2. A sixteen bit data cycle counter is seen as MR8 logical element 115b02, SR8 logical element 115b04, MR8 logical element 115b06 and SR8 logical element 115b08 in FIG. 115b-1 and FIG. 115b-2. The function of the ARB AND SID CYCLE COUNTER CONTROL logics shown in FIG. 113, and the DATA CYCLE COUNTER CONTROL logics, shown in FIG. 114, will be to control the initiation and sequencing of the RECEIVER CYCLE COUNTERS shown in FIG. 115.

9.25.1. ARB and SID Cycle Counter Control

Figures 2, 115B:
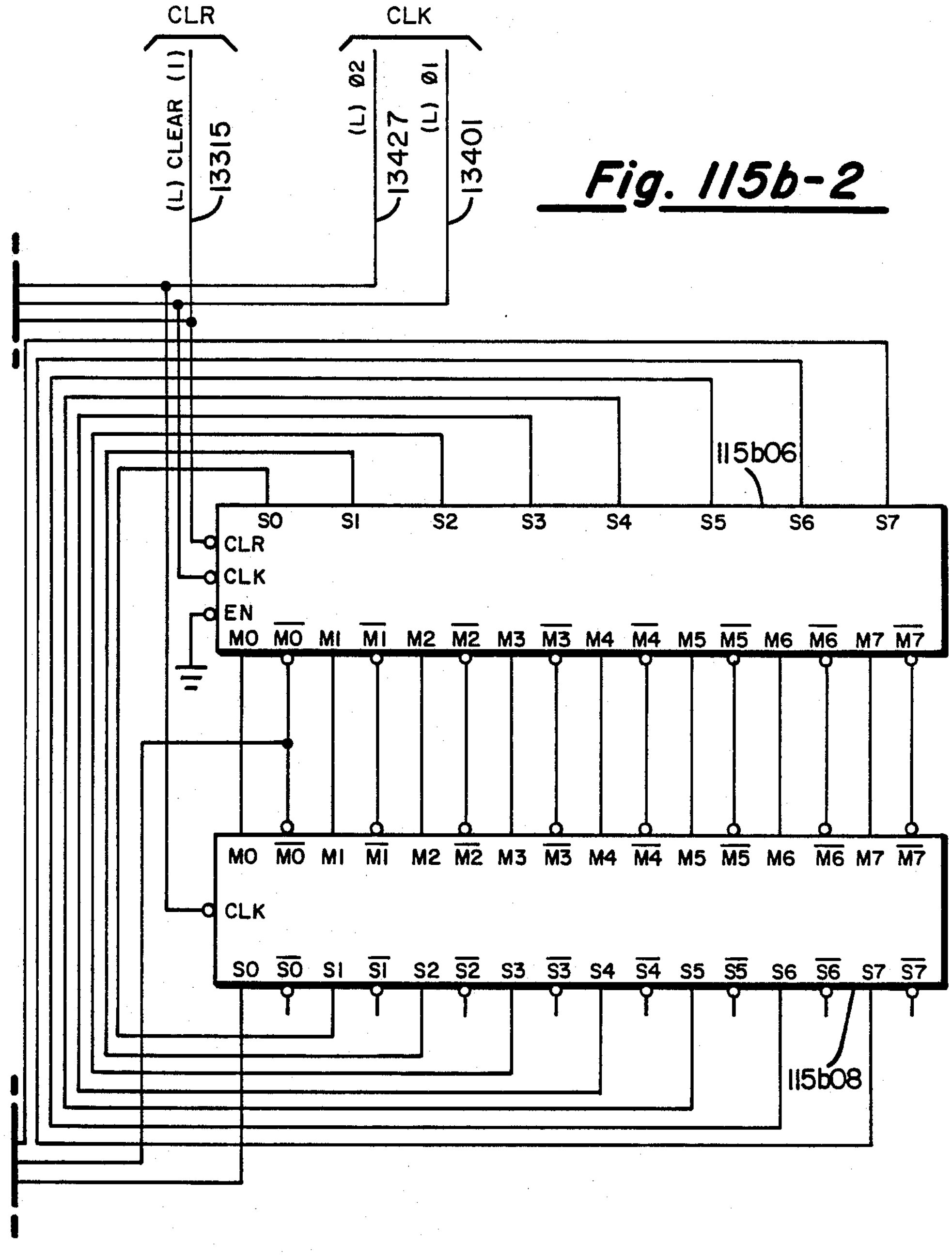

The ARB AND SID CYCLE COUNTER CONTROL functional logical subsection, part of RECEIVE COUNTER CONTROL functional logical subsection 86b16, is shown in FIG. 113, consisting of FIG. 113a and FIG. 113b. Commencing in FIG. 113b, signal (L) TEST-LOOP E on line 13717, (H) TEST-LOOP E on line 13715 and (H) LOOP E DATA on line 13609 are concerned with the implementation of the scan/set test process on the latches of the receive cycle counters as shown in FIGS. 115, and certain latches and elements of the present logical control sections as shown in FIG. 113 and FIG. 114. These test control and data signals, wheresoever employed, will have the uniform effect of forcing the counter to count to a maximum extension, therefore a maximum cycle count of 8+8+1+16 or 33. Concerned with the enablement of scan/set test, such signals may be substantially ignored for the purpose of the present explanation and considered to exist in the logical false condition. The logical Low condition of signal (H) TEST LOOP-E on line 13715 will select a ground, logically Low, D0 input in S12 logical element 113b16 which will subsequently be supplied as a logical Low signal to the D0 input of S12 logical element 113b14. A logical High condition of signal (H) 0 GPS on line 126b17 will satisfy NA2 logical element 113b02 and result in a logical Low select signal to S12 logical element 113b14, thereby selecting this logically Low signal originally developed in S12 logical element 113b16 from the selection of a ground. Resultantly, signal (H) INIT ARB CYCLE COUNTER on line 113a09 will be logically Low, indicating that the arbitration cycle counter will not be initiated should arbitration be configured as nullity. Normally, however, should signal (H) 0 GPS on line 126b17 be a logical Low then the select S, input signal to S12 logical element 113b 14 will be logically High, thereby selecting signal (H) BEGIN (IN) on line 128c01 to be transferred as logically High signal (H) ARB CYCLE COUNTER on line 113a09. By momentary reference to the arbitration cycle counter as shown in FIG. 115a-1, it may be seen that signal (H) INIT ARB CYCLE COUNTER on line 113a09 is received at the right most bit of a shift register consisting of MR8 logical element 115a02 and SR8 logical element 115a04. These logical elements will jointly constitute a left shifting shift register wherein each bit position, as shifted, accounts for activity within a corresponding cycle of arbitration. Signal outputs, normally taken from the slave register SR8 one of the master-slave cycle counter register pairs, are labeled in the normal sense associated with the represented cycle. For example, signal (H) ACK=2 (ϕ2) on line 115a05, (H) ACK=4 (ϕ2) on line 115a03, and (H) ACK=8 (ϕ2) on line 115a01 rspectively mean, in the logical High condition, that the second, fourth, or eighth cycle of arbitrtion is enabled.

Continuing with the explanation of the ARB AND SID CYCLE COUNTER CONTROL, part of RECEIVE COUNTER CONTROL 86b16, as shown in FIG. 113a and FIG. 113b, the development of signal (H) INIT SID CYCLE COUNTER on line 113_a_07 will next be discussed. Signals (L) 4 GPS on line 136_b_07, (H) 8 GPS on line 135_b_01, and (L) 2 GPS on line 136_b_11 are translated in NO2 logical element 113_b_02, and in NA2 logical elements 113_b_04 and 113_b_06, in order to produce the least and most significant select signals, S0 and S1, received by S14 logical element 113_b_08. the encoded select signals thusly developed represent arbitration at zero, two, four, or eight groups, and respectively select amongst signal (H) BEING (IN) on line 128_c_01, (H) ACK=a (φ2) on line 115_a_05, (H) ACK=4 (φ2) on line 115_a_03 or signal (H) ACK=8 (φ2) on line 115_a_01 which the extent to which the arbitration cycle counter will be advanced before initiation of SID cycle counter. Whatsoever signal is selected, as reflects zero, two, four, or eight groups of arbitration, it is inverted in IN1 logical element 113_b_10 and supplied as signal (L) ABR CARRY on line 113_b_03 for the purposes of initiating the date cycle counter should no slave identification/-function activity be configured. In the continuing presence of the logical High signal (L) TEST-LOOP E on line 13717, if no such slave identification/function activity is configured, as represented by logical High signal (H) 0 SID CYC on a line 136_d_17, then AO1 2-2 logical element 113_a_06 will be satisfied, emplacing a logical Low select signal on S12 logical element 113_a_18 and causing a ground, or logical Low, signal to be transmitted as selected data, SD, output signal (H) INIT SID CYCLE COUNTER on line 113_a_07. Alternatively, if slave identification/function is not configured as a nullity, then a logical High signal output from AOI 2-2 logical element 113_a_16 will cause S12 logical element 113_a_18 to select that signal, logically High at the appropriate cycle of arbitration as supplied by S14 logical element 113_b_08, to be passed as signal (H) INIT SID CYCLE COUNTER on line 113_a_07. Thusly the slave identification/function cycle counter is initiated upon the appropriate advancement of the arbitration cycle counter. If, however, there is then no arbitration, the initialization of the SID cycle counter will transpire via an alternative path. This path is concerned with the fact that although signal (H) BEGIN (IN) on line 128_c_01, as becomes logically High responsive to the BEGIN signal upon Versatile Bus 86_a_01, is timely to initiate the arbitration cycle counter, if such signal needs be gated by S14 logical element 113_b_08 and S12 logical element 113_a_18 before commencing the initiation of the SID CYCLE COUNTER, then it may be unsuitably delayed by the time of the clock φ1 gating of the master registe of such SID cycle counter. Therefore, when no arbitration is configured and the first cycle counter to be initialized will be that of the SID cycle counter, then signal (H) 0 GPS on line 126_b_17 will satisfy AOI 2-2 logical element 113_a_16 causing a logical Low select signal on S12 logical element 113_a_18, and thusly the section of ground, or logical Low, as signal (H) INIT SID CYCLE COUNTER on line 113_a_07. Meanwhile, this logical High signal (H) 0 GPS on line 136_b_17 will cause S12 logical element 113_a_14 to select signal (H) BEGIN (IN) on line 128_c_01 to be transferred as signal 'H) SID COUNTER=1 on line 113_a_05 to a second stage of the master register of the SID cycle counter, MR8 logical element 115_a_06. Note by momentary reference to the arbitration cycle counter as shown in FIG. 115_a_-1 that the normal means of updating the cycle count contained within such master register-slave register cycle counter pair will require that the most significant bit within the arbitration cycle counter slave register, SR8 logical element 115_a_04, be connected to the second most significant bit within arbitration cycle counter master register, MR8 logical element 115_a_06, So also with the slave identification cycle counter, when signal (H) 0 GPS on line 126_b_17 is a logical Low then signal (H) SCK=1 (φ2) on line 115_a_13 will be selected in S12 logical element 113_a_14 and passed as signal (H) SID COUNTER=1 on line 113_a_05. This path is simply the normal means by which the slave register of the SID cycle counter, SR8 logical element 115_a_08, should have its most significant bit connected to the second significant bit of the master register, MR8 logical element 115_a_06, of the SID cycle counter.

Just as the number of cycles through which the arbitration cycle counter shown in FIG. 115_a_-1 should advance before the SID cycle counter should be initiated was controlled by configuration selection occurring in S14 logical element 113_b_08, so also will the configuration of slave identification/function control, in S14 logical element 113_a_10, the initiation of the data cycle counter shown in FIG. 115_b_-1 and FIG. 115_b_-2 from the appropriate count of the SID cycle counter as shown in FIG. 115_a_2. Configuration control signals (L) 4 SID CYC on line 126_d_07, (H) 8 SID CYC on line 126_d_01, and (L) 2 SID CYC on line 126_d_11, are translated in NO2 logical element 113_a_04 and NA2 logical elements 113_a_06 and 113_a_18 into a least and most significant select signal, select signal S0 and select signal S1, for selection of S14 logical element 113_a_10. Either signal (H) SID COUNTER=1 on line 113_a_05, signal (H) SCK=2 (φ2) on line 115_a_11, signal (H) SCH=4 (φ2) on line 115_a_09, or signal (H) SCK=8 (φ2) on line 115_a_07 will be selected under such control in S14 logical element 113_a_10 to be transmitted to IN1 logical element 113_a_12, and then NA2 logical element 113_a_02 to be distributed as signal (L) INIT SEND DATA on line 113_a_03 in the logical High condition at such time as one, two, four or eight cycles of slave identification/-function have been counted. The selected signal from S14 logical element 113_a_10, logically High-going upon attainment of the requisite slave identification/function cycle count, is inverted in In1 logical element 113_a_12 and applied as logically Low signal (L) SID CARRY on line 113_a_01 both to SEND CONTROL 86_b_14, wherein it is concerned with the setting of the WAIT IN PRO LATCH φ1 as shown in FIG. 88_j_, and to the DATA CYCLE COUNTER CONTROL upcoming in FIG. 114_b_. If signal (H) SID IN PRO (φ2) on line 88_i_03 is a logical High, indicating that the present Versatile Bus Interface Logics is transmitting as a bus-owning master one device, then NA2 logical element 113_a_02 will be satisfied and signal (L) INIT SEND DATA on line 113_a_03 will be supplied in the logical Low condition to SEND CONTROL logics at FIG. 88_j_ and FIG. 88_k_, wherein it is also concerned with the next imminent setting of WAIT IN PRO LATCH φ1 and DATA IN PRO LATCH φ1. The interaction of such a SEND CONTROL 86_b_14 derived signal as (H) SID IN PRO (φ2) on line 88_i_03 with these logics of the RECEIVE CONTROL CYCLE COUNTER as is shown in FIG. 113_a_ is because the SID cycle counter (as shown in FIG. 115_a_-2) and the data cycle counter (as shown in FIG. 115_B_) are utilized for cycle count control upon both transmitting and receiving. The cycle count control for transmission of arbitration had been seen as the GROUP COUNT AND SHIFT functional logical subsection 89_b_04 appearing in the second level block diagram of ARBITRATION section 86_a_02 in FIG. 89_b_.

Conversely, the RECEIVE CONTROL 86b16 cycle counter for the activity of arbitration appears in FIG. 115a-1. This duality is necessitated because a Versatile Bus Interface Logics can be participating in one arbitration activity as a competing master device while it is receiving the arbitration group line results of up to eight such arbiration activities. Only one slave identification/function activity or one data activity is transpiring upon Versatile Bus 86a01 at any one time, however. Thusly, any Versatile Bus Interface Logics is concerned only with one such slave identification/function activity or data activity at any one time, whether such device's concern be as the transmitter or receiver of such information. Therefore the slave identification/function counter and data counter as are respectively shown in FIG. 115a-2, and FIG. 115b-1 plus FIG. 115b-2, are utilized for both transmittin and receiving cycle control of the associated activity.

9.25.2. Data Cycle Counter Control

The DATA CYCLE COUNTER CONTROL functional logical subsection part of RECEIVE CONTROL 86b16 is shown in FIG. 114, consisting of FIG. 114a and FIG. 114b. The function of the DATA CYCLE COUNTER CONTROL functional logical subsection is to control the initiation, reinitiation, and termination of the DATA CYCLE COUNTER as is shown in FIG. 115b-1 and FIG. 115b-2. Additionally, a wait cycle counter capable of counting one cycle of wait, ergo the potential thirty-third cycle count, is shown in FIG. 114b.

Commencing with the explanation of the DATA CYCLE COUNTER CONTROL functional logical subsection part of PROCESS COUNTER 86b16, the S14 logical element 114b10 will be involved in the selection amongst three sources as to when the DATA CYCLE COUNTER should be initiated. A fourth source of initiation of a data cycle counter will be selected in S12 logical element 118a16 as shown in FIG. 114a. signal (L) 0 GPS on line 126a19 and (L) 0 SID CYC on line 126a19 are combined in NO2 logical element 118a18 to produce signal (H) 0 GPS.0 SID CYC on line 114a07 in the logically High condition if neither arbitration nor slave identification/function activity is configured. The signal combinations occurring in AOI 2-2 logical element 114b02 are reflective of all cases wherein one only cycle of activity will transpire before the initiation of data activity. If the wait line is multiplexed onto the data line, thereby requiring that the wait activity proceed before the data activity, then signal (H) WAIT MPX'D on line 126d27 will be a logical High which, in conjunction with logically High signal (H) 0 GPS.0 SID CYC on line 114a07 will satisfy AOI 2-2 logical element 114b02 and supply a logical Low signal to NA3 logical element 114a06 and AOI 2-1 logical element 114b08. Alternatively, the combination of logical High signal (H) 0 GPS on line 126b17 with (H) 1 SID CYC on line 126b13, indicates one only cycle of slave identification/function activity, or the logical High signal (H) 0 SID CYC on line 126d17 in conjunction with logical High signal (H) 1 GPS on line 126b13, as collectively indicate one only cycle of arbitration, will suffice to satisfy AOI 2-2-2 logical element 114b02 and product the same logically Low signal. Considering that signal (H) TEST-LOOP E on line 13715 is a logical Low as received by AOI 2-1 logical element 114b08, then a logical Low signal output from AOI 2-2-2 logical element 114b02, such as in reflective of one only previous cycle of activity of any nature (wait, slave identification/function, or data) will disable NA3 logical element 114b06 and AOI 2-1 logical element 114b08 producing two logically High select signal, select signals S0 and S1, which are received by S14 logical element 114b10. These logically High select signals will select logically Low signal (L) BEING (IN) on line 88c15, such as reflects the receipt of the BEGIN signal upon the Versatile Bus 86;i a01, to be transferred as signal (L) INIT DATA CYCLE on line 114b03. When such logically Low signal (L) INIT DATA CYCLE on line 114b03 is subsequently selected in S12 logical element 114b14, and thence used in satisfaction of NA2 logical element 118a22, it will be transmitted in inverted form as signal (H) INIT DCK on line 114a03, which, by momentary reference to FIG. 115b-1, may be seen to be the initialization load of the DATA CYCLE COUNTER. Therefore, signal (L) BEGIN (IN) on line 88c15 timely suffices to provide signal (H) INIT DCK on line 114a03 for initialization of the DATA CYCLE COUNTER only when one previous cycle time of activity has transpired.

Continuing with the analysis of the selection of the source of the initiation of the DATA CYCLE COUNTER as occurs within S14 logical element 114b10, if some other number of activity cycles than one only has transpired prior to the desired initiation of the DATA CYCLE COUNTER, then AOI 2-2-2 logical element 114b02 will supply a logical High signal to NA3 logical element 114b06 and AOI 2-1 logical element 114b08. The logical High condition of signal (H) 0 SID CYC on line 126b17 will thusly satisfy NA3 logical element 114b06, while dissatisfying NA2 logical element 114b04 and thence AOI 2-1 logical element 114b08, producing a respective logical Low and logical High most significant, S1, and least significant S0, select signals to S14 logical element 114b10. In this event of the null configuration of slave identification/function, signal (L) ARB CARRY on line 113b03 will be selected in S14 logical element 114b10 to be transmitted as signal (L) INIT DATA CYCLE on line 114b03. Conversely, if signal (H) 0 SID CYC on line 126d17 had been logically Low, then the resultant select signal S1 and S0 would be respectively logically High and Low, which would cause S14 logical element 114b10 to select signal (L) SID CARRY on line 113a01 to be transmitted as signal (L) INIT DATA CYCLE on line 114b03. Therefore, signal (L) ARB CARRY on line 113;i b03, as was developed in consideration of the configured number of arbitration cycles in FIG. 114b, will be utilized to directly initiate the DATA CYCLE COUNTER in the event of null configuration of slave identification/function. Alternatively, signal (L) SID CARRY on line 113a03 will be utilized to initiate the DATA CYCLE COUNTER in the event that slave identification/function activity has both been configured and that the total cycles of all arbitration and slave identification/function and wait activities to this point are greater than one cycle. The selection of the initiation of the DATA CYCLE COUNTER occurring in S14 logical element 114b10 has not dealt with the initiation of such DATA CYCLE COUNTER in the event of the configuration of neither arbitration nor slave identification/function activity. This will later be dealt with during the explanation of S12 logical element 114a16.

Continuing with the explanation of DATA CYCLE COUNTER CONTROL functional logical subsection part of PROCESS CONTROL 86b16 as shown in FIG. 114b, signal (L) INIT DATA CYCLE on line 114b03 will be gated to effect the clearing of a latch consisting of cross-coupled AOI 2-1 logical elements 114;i b18 and **114*b*20 upon the logical High occurrence of signal (H) φ1 (10) on line 13421. The cleared condition of this latch will be subsequently gated upon the logical High occurrence of signal (H) φ2 (7) on line 13441 to set a latch consisting of cross-coupled AOI 2-1 logical element 114*b*24 and 114*b*26. These two latches may be considered as the wait latch φ1 and wait latch φ2, such as jointly provide 40 nanoseconds or one cycle time of delay. The clear side output signal of the latch consisting of cross-coupled AOI 2-1 logical elements 114*b*18 and 114*b*20 is provided as signal (L) WAIT DELAY FF (φ1) on line 114*a*09 to the CAM AND WAIT CONTROL functional logical subsection 109*b*02, 109*b*04 at FIG. 110*c* wherein it is used to control the driving of, or receipt of, wait activity upon Versatile Bus 86*a*01. The set side output signal of the latch (consisting of AOI 2-1 logical elements 114*b*24 and 114*b*26) is transferred to S12 logical element 114*b*14 as the data one, D1, input signal. In the continuing presence of the logical High signal (L) TEST-LOOP E on line 13717, either a logical High signal (L) WAIT LINE MPX'D on line 126*d*25 or logically High signal (H) 0 GPS.0 SID CYC on line 114*a*07 will suffice to satisfy AOI 2-2 logical element 114*b*12 and cause a logical Low, select, S, signal input to S12 logical element 114*b*14. Such a logically Low select signal, resultant either from the specification of wait which is not pin-multiplexed with data, or the specification of null activities of arbitration and slave identification/function, will result in selecting signal (L) INIT DATA CYCLE on line 114*b*03 in S12 logical element 114*b*14 for transmission to NA2 logical element 114*a*22. If, however, signal (L) WAIT LINE MPX'D on line 126*d*25 is a logical Low, indicating that specified wait acitivity is to be pin-multiplexed with data activity, and signal (H) 0 GPS.0 SID CYC on line 114*a*07 is a logical High, indicating that arbitrtion and slave identification/function activities are configured as nullities, then AOI 2-2 logical element 114;i b12 will apply a logically High select signal to S12 logical element 114*b*14, causing the set side output signal from the wait delay latch φ2 to be gated through such S12 logical element 114*b*14 and to be applied to NA2 logical element 114*a*22. Therefore such selection of the 40 nanosecond time delay as is effectuated in the wait latches (consisting of cross-coupled AOI 2-1 logical elements 114*b*18 and 114*b*20, and cross-coupled AOI 2-1 logical elements 114*b*24 and 114*b*26) will be accomplished whenever it is desirable to delay the formation of signal (H) INIT DCK on line 114*a*03 by the signal cycle time in which the wait activity will transpire under control of signal (L) WAIT DELAY FF (φ1) on line 114*a*09**.

Continuing with the logical explanation of the DATA CYCLE COUNTER CONTROL functional logical subsection part of RECEIVE CONTROL **86*b*16 as shown in FIG. 114*a*, the development of signal (H) DATA COUNT=1 on line 114*a*05 wil next be considered. In the continuing presence of logical High signal (L) TEST-LOOP E on line 13717, if signal (H) 0 GPS.0 SID CYC on line 114*a*07 is logically High, indicating that neither arbitration or slave identification/function activity is configured, while signal (L) WAIT LINE MPX'D on line 126*d*25 is logically High indicating that wait activity is not pin-multiplexed with data, then NA4 logical element 114*a*14 will be satisfied upon the logical High occurrence of signal (L) DCK=1 (φ2) on line 115*b*11. Such satisfaction of NA4 logical element 114*a*14 will cause a logically Low select S, signal to be applied to S12 logical element 114Li a16, and will cause (H) BEING (IN) on line 128*c*01 to be selected as signal (H) DATA CONTROL=1 on line 114*a*05. In the same manner by which timely utilization of signal (H) BEGIN (IN) on line 128*c*01 in the event of the null configuration of arbitration was required to be applied, through signal (H) SID COUNTER=1 on line 113*a*05 as selected in S12 logical element 113*a*14 (both shown in FIG. 113*a*), to the second most significant bit of the SID counter master register MR8 logical element 115*a*06 as shown in FIG. 115*a*-2, so also is the timely utilization of signal (H) BEING (IN) on line 128*c*01 in the event of null configuration of arbitration and null configuration of slave identification/function and no conduct of pin-multiplexed wait, required to be applied as signal (H) DATQA COUNT=1 on line 114*a*05 to the second most significant bit of the data cycle counter master register MR8 logical element 115*b*02 as is shown in FIG. 115*b*-1. Since it is desirous to use signal (H) BEGIN (IN) on line 128*c*01 to set the data counter equal to one via signal (H) DATA COUNT=1 on line 114*a*05 only once, signal (L) DCK=2 (φ2) on line 115*b*11 will become a logical Low, thereby disabling NA4 logical element 114*a*14 and causing a logical High select signal to S12 logical element 114*a*16, thereby causing signal (H) DCK=1 (100 2) on line** 115*b*09 to be gated as signal (H) DATA COUNT=1 on line **114*a*05 for all initializations of the DATA COUNTER other than the first such initialization. That the DATA COUNTER can be reinitialized for the transference of block data words will shortly be dealt with in conjunction with signal (H) BUSY COUNT on lin 116*a*05, such as gives rise to signal (H) INIT DCK on line 114*a*03** in the event of block data transfer.

Continuing in the explanation of the DATA CYCLE COUNTER CONTROL functional logical subsection of PROCESS CONTROL **86*b*16 as shown in FIG. 114*a*, the development of signal (H) INIT TERM DATA on line 114*a*01 as will terminate the data cycle counter advancement will next be discussed. Signals (L) 8 DATA CYC on line 126*f*05, (H) 16 DATA CYC on line 126*f*03, and signal (L) 4 DATA CYC on line 126*f*09 are applied to NO2 logical element 114*a*04 and to NA2 logical element 114*a*06 and 114*a*08 in the development of two select signals, signal S0 and S1, to S14 logical element 114*a*10. These configuration controlled select signals will cause S14 logical element 114*a*10 to variously select amongst signal (H) DCK=2 (φ2) on line 115*b*07, (H) DCK=4 (φ2) on line 115*b*02, (H) DCK=8 (φ2) on line 115*b*03 or (H) DCK=16 (φ2) on line 115*b*13 respectively as the data activity is either configured for two, four, eight or sixteen cycles per data word. The selected signal, logically High going upon the attainment of the associated data cycle count, is transferred to S12 logical element 114*a*12 as the data one, D1, input signal. During the logical High continuance of signal (L) TEST-LOOP E on line 13717, signal (H) 1 DATA CYC on line 126*f*13 either satisfies, if logically High, or dissatisfies, if logically Low, NA2 logical element 114*a*02 and provides a respective logical Low or High select signal to S12 logical element 114*a*12. Thereby either signal (H) DATA COUNT=1 on line 114*a*05, or another selected signal transferred via S14 logical element 114*a*10 such as reflects data cycle counts of two, four eight of sixteen, is selected in S12 logical element 114*a*12 for transference as signal (H) INIT TERM DATA on line 114*a*01**. If signal (H)

BUSY COUNT on line **116*a*05 is logically High, as attends the continuing activation of the busy counter during the transference of multiple words of data, then NA2 logical element 114*a*20 will be satisfied upon the logical High occurrence of signal (H) INIT TERM DATA on line 114*a*01 causing Low signal to be applied to NA2 logical element 114*a*22 and a resultant logical High signal (H) INIT DCK on line 114*a*03. Thus, upon the logical High continuance of signal (H) BUSY COUNT on line 116*a*05, as reflects the bus busy condition during transfer of multiple, block, words of data, each logical High occurrence of signal (H) INIT TERM DATA on line 114*a*01 will result in the reinitialization of the data cycle counter via logically High signal (H) INIT DCK on line 114*a*03**.

Signal (H) TEST-LOOP E on line 13715 and (L) TEST-LOOP E on line 13717 as appeared in both ARB and SID CYCLE COUNTER CONTROL at FIG. **113*b*and DATA CYCLE COUNTER CONTROL at FIG. 114*a*, are utilized for control during the scan/set test operations. The effect of these signal is to maximize the count enablement of all cycle counters. The master and slave registers as comprise a thirty-two bit cycle counter shown in FIG. 115*a* and FIG. 115*b*, plus the wait delay latch shown in FIG. 114*B* as a thirty-third cycle count, may, under logical High condition of signal (H) TEST-LOOP E on line 13715 and the logical Low condition of signal (L) TEST-LOOP E on line 13717**, be exercised as a thirty-three bit shift register for scan/set test purposes.

9.25.3. Cycle Counters

The eight bit position arbitration cycle is shown as master register MR8 logical element **115*a*02 and slave register SR8 logical element 115*a*04 in FIG. 115*a*-1. The eight bit slave identification/function cycle counter is shown as master register MR8 logical element 115*a*06 and slave register SR8 logical element 115*a*08 in FIG. 115*a*-2. The sixteen bit position data cycle counter is shown as master register MR8 logical element 115*b*02, slave register SR8 115*b*04, master register MR8 logical element 115*b*06 and slave register SR8 logical element 115*b*08 in FIG. 115*b*, consisting of FIG. 115*b*-1 and FIG. 115*b*-2. Each set of master and slave registers operate as a left shifting shift register wherein a single data bit input at the most significant bit position of the master register, MR8, logical element is left shifted by one bit position upon each complete cycle of clock $\phi$1 and clock $\phi$2. Signals derived from the master register(s) of each of the cycle counters are valid from clock $\phi$1 to clock $\phi$1. Signals derived from the slave register(s) of each cycle counter are valid from clock $\phi$2 to clock $\phi$2. The cycle counters are variously initialized by signals as have been discussed in conjunction with FIG. 113 and FIG. 114. Signal (L) CLEAR (1) on line 13315** is utilized in a logical Low state to clear the cycle counters only during initialization of the Versatile Bus Interface Logics.

9.26. Busy Section

The BUSY SECTION **86*b*10, previously seen in the first level block diagram at FIG. 89*b*, will be shown in the area of BUSY LOGIC 86*b*24 in FIG. 116 through FIG. 122. The BUSY LOGIC 86*b*24 is concerned with the receipt of the BUSY signal upon the Versatile Bus 86*a*01 in order that the number of data words to be received may be determined. When transmitting upon Versatile Bus 86*a*01, the generation of the BUSY signal will determine when the DATA IN PRO LATCH is reset, meaning that the data transmission activity is terminated. The logical development of that signal time cycle wherein a bus-owning master one device should issue the not BUSY signal upon the Versatile Bus 86*a*01 for the termination of a transaction is complex not only because of the ability of the present Versatile Bus intercommunication system to transmit block data words under a uniform communication interface protocol, but also because no time will be wasted between pipelined transactions which are variously configurable in the number and type of activities performed. That the Versatile Bus Interface Logics should not only be variable of configuration as to the communication protocol employed, but should also be uniformly of maximum efficiency of operation within each such protocol, will be a function of the BUSY SECTION 86*bb*10**.

9.26.1. Busy in Counter Control

The BUSY IN COUNTER CONTROL functional logical subsection part of BUSY LOGICS **86*b*24 is shown in FIG. 116, consisting of FIG. 116*a* and FIG. 116*b*. The function of the BUSY IN COUNTER CONTROL, and the busy counter which is controlled by this functional logical subsection and is shown in FIG. 117*a* and FIG. 117*b*, is to develop, in response to the occurrence of a BUSY signal upon Versatile Bus 86*a*01, signal (H) BUSY COUNT on line 116*a*05 from clock $\phi$2 to clock $\phi$2 coincident with the receipt of a first, and each subsequent, data work as is transmitted upon Versatile Bus 86*a*01. The signal (H) BUSY COUNT on line 116*a*05 wll, in its logically High inception and duration, determine when data is to be accepted from Versatile Bus 86*a*01** and how many data words are to be consecutively accepted.

Commencing with the logical explanation of the BUSY IN COUNTER CONTROL part of BUSY LOGICS **86*b*24 in FIG. 116*b*, during the logical Low duration of signal (L) TEST-LOOP E on line 13715, signal (H) BUSY (IN) on line 128*c*01 will be selected in S12 logical element 116*b*14 for transmission as signal (H) INIT BIK 1 on line 116*b*03. This logical High signal (H) INIT BIK 1 on line 116*b*03 sets an initial busy count of one in the arbitration section of the busy in counter consisting of master register MR8 logical element 11702 and slave register SR8 logical element 117*a*04 as shown in FIG. 117*a*. The busy counter, in the master and slave registers, subsequently shifts this initial one count insertion, in howsoever many multiplicities it should be inserted under logically High signal (H) BUSY (IN) on line 128*c*01 by one left shifted bit position upon each occurrence of clock cycle (L) $\phi$1 on line 13401 and (L) $\phi$2 on line 13427. Under control of arbitration configuration signals (L) 4 GPS on line 126*b*07, (H) 8 GPS on line 126*b*01 and (L) 2 GPS on line 126*b*11 as translated in NO2 logical element 116*b*06 and NA2 logical elements 116*b*08 and 116*b*10, S14 logical element 116*b*12 is enabled to select amongst busy in counter signals (H) BIK=1 ($\phi$2) on line 11707, (H) BIK=2 ($\phi$2) on line 11705, (H) BIK=4 ($\phi$2) on line 11703 of (H) BIK=8 ($\phi$2) on line 11701, dependent on whether arbitration is configured to transpire across one, two, four or eight groups or cycles. Similarly, S12 logical element 116*b*04 is selected by the inversion of signal (L) 0 GPS on line 126*b*19 within NO2 logical element 116*b*02 to select amongst signal (H) BUSY (IN) on line 128*c*01 or that busy in counter signal logically High going upon the attainment of the associated count, which is supplied with S14 logical element 116*b*12. The appropriate selected signal in S12 logical element 116*b*04—signal (H) BUSY (IN) on line 128*c*01 in the event that arbitration is configured as a nullity, else the appropriate count of the busy in counter as selected in accordance with the configuration of arbitration—is transmitted as signal (H) INIT BIK 9 on line 116b01 to cause the setting of busy in counter bit 9, or the first bit of the busy in counter for slave identification/function cycle count. Such signal (H) INIT BIK 9 on line 116b01 is received at the busy in counter for slave identification/function count which consists of master register MR8 logical element 117b06 and slave register SR8 logical element 117b08 as are shown in FIG. 117b**.

In a like manner to the configuration control selection of the busy in count for arbitration, signals (L) 4 SID CYC on line 126d07, (H) 8 SID CYC on line 126d01, and (L) 2 SID CYC on line 126d11 are translated NO2 logical element 116a16 and NA2 logical elements 116a18 and 116a20 to produce the select signals as allow S14 logical element 116a22 to select amongst signals (H) BIK=9 ($\phi$2) on line 11715, (H) BIK=10 ($\phi$2) on line 11713, (H) BIK=12 ($\phi$2) on line 11711, of (H) BIK=6 ($\phi$2) on line 11709, respectively according to the conduct of slave identification/function at one, two, four or eight configured cycles. The selected busy in counter signal, logically High going upon the attainment of the appropriate busy count, is inverted in IN1 logical element 116a24 and applied to S14 logical element 116a06 as the data zero and data one, D0 and D1, input signals. In the continuing presence of logical Low signal (H) TEST-LOOP E on line 13715, a logical Low signal (L) SID LINES MPX'D on line 126c01 or a logical Low signal (L) 0 SID CYC on line 126d19 will disable AOI 2-1 logical element 116a02 and cause a logically High select one, S1, signal to be applied to S14 logical element 116a06. If both the arbitration and the slave identification/function lines are pin multiplexed onto the data lines, as is represented by logical High signals (H) ARB LINES MPX'D on line 126a03 and (H) SID LINES MPX'D on line 126c03, or, if arbitration and slave identification/function are configured as nullities, as is represented by logical High signals (H) O GPS on line 126b17 and (H) 0 SID CYC on line 126d17, then AOI 2-2 logical element 116a04 will be satisfied, emplacing a logical low select zero, S0, signal on S14 logical element 116a06. In such case signal (L) BUSY (IN) on line 88b05, such signal as is merely the inversion of signal (H) BUSY (IN) on line 128c01, will be selected in S14 logical element 116a06 for transmission to subsequent In1 logical element 116a08, and thence as signal (H) BUSY COUNT on line 116a05. Conversely, if slave identification/function is configured not pin-multiplexed, allowing the continuing satisfaction of AOI 2-1 logical element 116a02, while either arbitration or slave identification/function activity is not pin-multiplexed plus one of such arbitration or slave identification/function activities is cofigured to occure, casuing a logical High signal output from AOI 2-2 logical element 116a04, then signal (H) INIT BIK 9 on line 116b01 as is inverted by IN1 logical element 116a14 will be selected as the third data, D3, input signal to S14 logical element 116a06. Finally, in the event that slave identification/function is configured neither as a nullity nor multiplexed, resulting in logically High signals (L) 0 SID CYC on line 126d19 and (L) SID LINES MPX'D on line 126c01, then AOI 2-1 logical element 116a02 will be satisfied emplacing a logical Low select one, S1, signal on S14 logical element 116a06 thereby causing the signal received from IN1 logical element 116a24 to be selected. This signal, as priorly explained, is the total cycle count of arbitration and slave identification/function activity. The appropriately selected signal in S14 logical element 116a06, logically High going upon that clock $\phi$2 to clock $\phi$2 coincident with the first receipt of data upon the Versatile Bus 86a01, is inverted in In1 logical element 116a08 and supplied as signal (H) BUSY COUNT on line 116a05 to SEND CONTROL section 86a14, and to the DATA CYCLE COUNTER CONTROL part of RECEIVE CONTROL section 86a16. Signal (H) BUSY COUNT on lines 116a05 is inverted in IN1 logical element 116a10 and supplied as signal (L) BUSY COUNT on line 116a03 to the scan/set data functional subsection for purposes of scan/set testing. Similarly, signal (L) BUSY COUNT on line 116a03 is inverted in IN1 logical element 116a12 and supplied to the VM Node (in common with the User) as signal (H) LOOP E SCAN DATA on line 116a01, also in implementation of the scan/set test process.

9.26.2. Busy in Counter

The busy in counter part of BUSY IN LOGIC 86b24 is shown in FIG. 117, consisting of FIG. 117a-1 and FIG. 117a-2. A counter for the first eight busy in counts is constructed as MR8 logical element 117a02 in conjunction with SR8 logical element 117a04, acting as a left shift register of eight bits. A vusy count of nine to sixteen is enabled in MR8 logical element 117a06, in conjunction with SR8 logical element 117b08, acting as a next successive left shift register of eight bits. Whatsoeveer patterns are inserted in the shift registers under control of signals (H) INIT BIK 1 on line 116b03 and (H) INIT BIK 9 on line 116b01 will be left shifted by one bit position upon the logical low occurrence of signals (L) $\phi$1 on line 13401 and (L) $\phi$2 on line 13427. The logical Low occurrence of signal (L) CLEAR (1) on line 13315 is utilized for the initialization clearing of the busy in counter only during initialization of the Versatile Bus Interface Logics.

9.26.3. Busy Enable

The BUSY ENABLE functional logical subsection part of BUSY LOGICS 86b24 is shown in FIG. 118, consisting of FIG. 118A and FIG. 118b. The function of the BUSY ENABLE subsection is to control a latch consisting of cross-coupled AOI 2-2 logical element 118a16 and AOI 2-1-1 logical element 118a20 which will, as the BUSY ENABLE latch, control the driving of the BUSY signal from this Verstaile Bus Interface Logics upon Versatile Bus 86a01.

Commencing with the explanation of the BUSY ENABLE functional logical subsection as shown in FIG. 118a, the setting of the BUSY ENABLE LATCH composed of cross-coupled AOI 2-2 logical element 118a16 and AOI 2-1-1 logical on line 118a03 from the setting of such latch, will first be discussed. The BUSY ENABLE LATCH will become set upon the logical High occurrence of signal (L) BUSY (IN) on lin 88b05, such logically High signal as represents the not busy condition upon the Versatile Bus 86a01 in conjunction with the simultaneous satisfaction of NO3 logical element 118a14. The satisfaction of NO3 logical element 118a14 requires a logical Low signal (L) $\phi$1 on line 13401, meaning that the BUSY ENABLE LATCH will become set upon clock $\phi$1, plus the logically Low signal (L) INIT TRANS FF on line 88c09, meaning that the current device is desirous of going on the bus as a master device to initiate a communication transaction, plus the logical low signal (L) INIT BUSY EN on line 118a01 resultant from the dissatisfaction of NO4 logical element 118a12. Conversely, all four input signals into NO4 logical element 118a12 need be logically Low in order to satisfy this latch and thus prevent the setting of the BUSY ENABLE LATCH consisting of cross-coupled AOI 2-2 logical element 118a16 and AOI 2-1-1 logical element 118a20. In other words, satisfaction of NO4 logical element 118a12 is necessary to cause any Versatile Bus Interface Logics which are entering upon the Versatile Bus, under control of logically Low signal (L) INIT TRANS FF on line 88c09, not to issue a BUSY signal upon the Versatile Bus. Such a BUSY signal need not be issued only for certain pipelined configurations of the Versatile Bus Interface Logics, the timing for which configurations is illustrated in FIG. 25h and in FIG. 28a through FIG. 28d. As a first criteria to disable the setting of the BUSY ENABLE LATCH, signal (L) NO MPX on line 121b03 must be a logical Low indicating that no pin-multiplexing of any nature is configured. Should any such pin-multiplexing be configured, it is obvious from the timing diagrams of FIG. 25a through FIG. 25h that not all bus activities could transpire within a single cycle time. Next, signal (L) BLOCK TRANS on line 122b13 must be logically High indicating that no block transfer of data is ensuing while signal (H) 1 DATA CYC on line 126f13 must be also a logically High indicating that only one data cycle is configured, in order to satisfy NA2 logical element 118a10 and produce a logical Low signal input into NO4 logical element 118a12. Either signal (H) 0 SID CYC on line 126d17 or signal (H) 1 SID CYC on line 126d13 must be logically High, respectively indicating configuration at zero or one slave identification/function cycles, in order to satisfy NO2 logical element 118a08 and produce a logical Low signal which is received at NO4 logical element 118a12. Finally, NO3 logical element 118a06 may firstly be satisfied by a logical High signal (H) 0 GPS on line 126b17, or by a logical High signal (H) 1 GPS on line 126b13, as respectively indicate that arbitration is configured at zero or one groups. The enablement developed in AOI 2-1 logical element 118a02 and NO2 logical element 118a04 which is applied as a third input signal to NO3 logical element 118a06, concerns a particular configuration case. If the slave identification/function activity is not multiplexed onto the data activity and zero slave identification/function groups are specified, then it is permissible to pin-multiplex the arbitration activity onto the slave identification/function activity without the necessity of issuing a BUSY signal upon the Versatile Bus. This concept that it should be permissible to utilize the normal slave identification/function lines for arbitration without impact on the efficiency of bus timing may be reviewed within FIG. 16a and FIG. 16b and FIG. 24b. Firstly, if signal (L) SID LINES MPX'D on line 126c01 is logically High, indicating that the slave identification/function activity is not pin-multiplexed onto the data lines, while signal (H) 0 SID CYC on line 126d17 is also logically High indicating that zero slave identification/function cycles are configured, then AOI 2-1 logical element 118a02 will be satisfied emplacing a logical Low signal on NO2 logical element 118a04 which, in conjunction with logical Low signal (L) PPL on line 126b21, indicating that arbitration is pipelined, will satisfy NO2 logical element 118a04 and thence NO3 logical element 118a06. Secondly, if signal (L) ARB LINES MPX'D on line 126a01 is logically High, indicating that arbitration is not pin-multiplexed, thereby satisfying AOI 2-1 logical element 118a02 and emplacing a first logical Low signal on NO2 logical element 118a04, while signal (L) PPL on line 126b21 is logically Low, indicating that arbitration activity is pipelined, then NO2 logical element 118a04 will be satisfied resultantly satisfying NO3 logical element 118a06. Thereby, NO4 logical element 118a12 collects signal conditions concerned with the configurations for multicycled activities, pin-multiplexing, and the pipelining of arbitration in order to develop signal (L) INIT BUSY EN on line 118a01 such as needs be logically Low in order to satisfy NO3 logical element 118a14 and subsequently permit the setting of the BUSY ENABLE LATCH, consisting of cross-coupled AOI 2-2 logical element 118a16 and AOI 2-1-1 logical element 118a20, upon the logical Low occurrence of signals (L) $\phi$1 on line 13401 and (L) INIT TRANS FF on line 88c09. The set side output signal of the BUSY ENABLE LATCH, logically low when the latch is set, is inverted in IN1 logical element 118a22 and transmitted as signal (H) INIT BUSY (OUT) on line 118a03 in a logically High condition for howsoever long that the BUSY ENABLE LATCH should remain set. This signal (H) INIT BUSY (OUT) on line 118a03 is received at SEND CONTROL functional logical subsection 86b14 as shown in FIG. 88a, wherein, save for certain special utilizations, occurring during the initialization process, it is utilized in development of signal (L) BUSY (OUT) on line 88b01 such as will cause the busy driver/-receiver element to drive the BUSY signal upon the Versatile Bus 86a01.

Continuing with the explanation of the BUSY ENABLE functional logical subsection part of BUSY LOGICS 86b24, the logics by which the BUSY ENABLE LATCH should become cleared are shown in FIG. 118b. Satisfaction of NO4 logical element 119b06 is necessary to produce a logical High output signal therefrom which as received at AOI 2-1-1 logical element 118a20 part of the BUSY ENABLE LATCH will cause the clearing of such latch. A first signal received at NO4 logical element 118b06, such as needs be a logical Low to satisfy such element, is signal (L) $\phi$1 on line 13401. Thereby the BUSY ENABLE LATCH is seen to be gated clear upon the occurrence of clock 100 1 in a similar manner to which it was gated set by the occurrence of a prior clock $\phi$1 as received at NO3 logical element 119a14. Next, AOI 2-2 logical element 118d04 must be satisfied in order to emplace a second, logically Low, enabling signal on NO4 logical element 118b06. The condition of signal (L) ARB BUSY on line 118b01 as reflects the in process activity of arbitration within the present Versatile Bus Interface Logics will not be developed from activity counters, in the manner in which slave identification/function and data activity will when shortly discussed but is rather derived from the process flip-flops within SEND CONTROL functional logical subsection 86b14. The logical low condition of signal (H) ARB IN PRO ($\phi$2) on line 88d07, as satisfies NA3 logical element 118b02 and produces logical High signal (L) ARB BUSY on line 118b01, meaning that arbitration is not busy, is essentially substitutionary for a cycle counter for the activity of arbitration. The logical Low occurrence of signals (L) INIT SID on line 88h09 or (L) TERM ARB ($\phi$2) on line 88d01 as alternatively satisfy NA3 logical element 118b02 and which equivalently result in logical High signal (L) ARB BUSY on line 118b01 will, when arbitration has been in process, foreshorten the recognition of the clearing of the ARB IN PRO LATCH $\phi$2 (as shown in FIG. 88g and such as gives origin to signal (H)

ARB IN PRO (φ2) on line 88g07) by one cycle time, or 40 nanoseconds. Therefore signal (L) ARB BUSY on line 118b01 will be logically Low for the duration of the arbitration activity minus one cycle count. In other words, should arbitration be configured to occupy eight cycle counts, then signal (L) ARB BUSY on line 118b01 will be logically Low only for the first seven cycle counts. In a similar manner, it will soon be seen at signal (H) SID BUSY on line 118b03 and (H) DATA BUSY on line 118b05 will be logically High only for the duration of the associated activities minus one cycle count. It is ultimately effected in this manner that signal (H) INIT BUSY (OUT) on line 118a03 as is derived from the BUSY ENABLE LATCH will go logically Low, enabling the cessation of the BUSY signal drive upon Versatile Bus 86a01, one net cycle time before the terminal utilization of such Versatile Bus 86a01 by the current Versatile Bus Interface Logics within the current transaction. The logical Low condition of signal (L) INIT TRANS FF on line 88c09 serves to disable AOI 2-2 logical element 118b04 in the event that the present Versatile Bus Interface Logics are waiting to go on the Versatile Bus 86a01 to initiate a communication transaction. However, if the signal developed from NO2 logical element 118a04 is a logical High, such as is derived from logical Low signal (L) PPL on line 126b21 (from the configuration for pipelining of arbitration) plus certain combinations of the pin-multiplexing of the arbitration and slave identification/function lines, then the conduct ofarbitration, regardless of the satisfaction of NA3 logical element 118b02, cannot be the cause for the drive of BUSY upon the Versatile Bus. Therefore, in summary, AOI 2-2 logical element 118b04 can be satisfied in the presence of logical High signal (L) INIT TRANS FF on line 88c09 by either a logical High signal received from NO2 logical element 118a04 such as indicates that arbitration activity should not be the cause of driving the BUSY signal upon the Versatile Bus or the logically High signal (L) ARB BUSY on line 118b01 as indicates that arbitration activity is within one cycle of termination.

Continuing the BUSY ENABLE functional logical subsection part of BUSY LOGICS 86b24, the satisfaction of NO4 logical element 118b06 whereby the BUSY ENABLE LATCH may thence be cleared, will require that AOI 2-2 logical element 118b10 be satisfied producing logical Low signal (H) SID BUSY on line 118b03. The two avenues for satisfaction of this latch are selected by signal (L) ARB LINE MPX'D on line 126a01 and signal (H) ARB LINES MPX'D on line 126a03. That side of AOI 2-2 logical element 118b10 which is enabled when arbitration is specified to be pin-multiplexed with slave identification/function also receives a signal from NO4 logical element 118b12 which signal is the ANDed condition of signals (H) SID BK0 through (H) SID BK3 on line 119c01. Such signals (H) SID BK0 through (H) SID BK3 on line 119c01 represent the associated counts within the SID BUSY COUNTER and will be logically Low, enabling satisfaction of NO4 logical element 118b12 and thence AOI 2-2 logical element 118b10 only when the SID BUSY COUNT is logically zero. Such SID busy count as received from the SID BUSY COUNTER, will be at any time the currently remaining number of cycles of the slave identification/function activity. These count signals are derived from busy counters which are loaded at the same time as the present Versatile Bus Interface Logics issues BEGIN, upon the initial cycle upon Versatile Bus 86a01. Therefore, in the event that signal (L) ARB LINES MPX'D on line 126a01 is a logical High indicating the non-pin-multiplexing of arbitration onto the slave identification/function lines, signal (H) SID BK1 through (H) SID BK3 on line 119c01 will be utilized in satisfaction of NO3 logical element 118b08 and thence AOI 2-2 logical element 118b10. Thereby si gnal (H) SID BUSY on line 118b03 as is developed in AOI 2-2 logical element 118b10 will be logically High for the duration of the slave identification/function busy counter count minus one terminal cycle. In a similar manner, signal (L) ARB BUSY on line 118b01 was seen to be logically true for the duration of the arbitration cycle count minus one, terminal cycle count. However, if the activity of arbitration is pin-multiplexed onto the slave identification/function lines, then the combined duration of both such activities will not be the number of arbitration cycle counts minus one, plus the number of slave identification/function cycle counts minus one, thereby equaling the sum of such arbitration cycles and such slave identification/function cycles minus two cycles, but will rather be the sum of such arbitration cycles and such slave identification/function cycles minus one cycle. The alternative manner of the formation of signal (H) SID BUSY on line 118b03 to account for this pin-multiplexed configuration requiring the drive of the BUSY signal upon the Versatile Bus is accomplished under control of logically High signal (H) ARB LINES MPX'PD on line 126a03 in conjunction with the signal output of NO4 logical element 118b12 as received at AOI 2-2 logical element 118b10. In such a configuration of pin-multiplexed arbitration and slave identification/function activities all signals (H) SID BK0 through (H) SID BK3 on line 119c01 will be utilized in the formation of a full slave identification/function cycle count which will appear as logically High signal (H) SID BUSY on line 118b03. In other words, if the activity of arbitration is pin-multiplexed onto the slave identification/function lines, then the SID BUSY COUNTER will be forced to count to zero instead of one before signal (H) SID BUSY on line 118b03 will become logically Low to contribute to satisfaction of NO4 logical element 118b06 and thence the clearing of the BUSY ENABLE LATCH.

Continuing with the explanation of the BUSY ENABLE functional logical subsection part of BUSY LOGICS 86b24, the development of signal (H) DATA BUSY on line 118b05, as will be logically High for the duration of the data activity minus one cycle will next be discussed. Signals (L)>16 FF on line 12001 and (H)>16 FF on line 12003 are respectively Low and High as a latch which latch is upcoming within DATA BUSY COUNTER CONTROL part of BUSY LOGICS 86b24 as shown in FIG. 120, is set indicating the existence of more than sixteen remaining data cycles. If such a latch is never set, as when the number of block words to be transferred times the number of cycles per word required for each transfer is less than or equal to sixteen, then signal (L)>16 FF on line 12001 will be a logical High enabling the gating of the output signal from NO3 logical element 118b14 in satisfaction of AOI 2-2 logical element 118b16. Such a logically High output signal from NO3 logical element 118b14 is developed from logically Low signals (H) DATA BK 3 on line 121b05, (H) DATA BK 2 on line 121b07 and (H) DATA BK 1 on line 121b09, such signals as will be in combination logically Low upon the next to last arbitration cycle count. Thusly, when the initial arbitration cycle count as is developed from the number of block data words to be transferred times the number of cycles required per word is less than or equal to sixteen, then signal (H) DATA BUSY on line 118b05 will be logically High for the duration of such data cycle count minus one cycle count. If the initial cycle count had been greater than sixteen, then signal (H)>16 FF on line 12003 will have been logically High from the inception of the data activity. As will be seen in the upcoming explanation of the DATA BUSY COUNTER part of the BUSY LOGICS 86b24 as shown in FIG. 121a and FIG. 121b, the DATA CYCLE COUNTER will not decrement until such time as sixteen or less data cycle counts remain, and upon such time as decrementation commences the contents of the DATA CYCLE COUNTER will be the number of remaining data cycle counts minus one. Upon such time as can only be resultant from block data transfer, signal (H)>16 FF on line 12003 resultant from the setting of a latch will remain logically High. Upon such decrementation of the DATA BUSY COUNTER counting down the final data cycle counts of the final word or words transferred in block, then those signals (H) DATA BK 3 on line 121b05 through (H) DATA BK 0 on line 121b11 will decrement to the uniform logical Low or zero state, satisfyiing NO4 logical element 118b20 and resultantly satisfying AOI 2-2 logical element 118b16 and causing logical Low signal (H) DATA BUSY on line 118b05.

Therefore signal (L) ARB BUSY on line 118b01 will be logically Low, and signals (H) SID BUSY on line 118b03 and (H) DATA BUSY on line 118b05 will be logically High, for the duration of the arbitration cycles minus one cycle, or the slave identification/function cycles minus one cycle, or the data cycles minus one cycle upon the Versatile Bus 86a01. When the three input signals to NO4 logical element 118b96 as respectively represent the activities of arbitration and slave identification/function and data upon the Versatile Bus are all logically false, or logical Low conditions, then such NO4 logical element 118b06 will be satisfied thereby emplacing a logical High signal upon AOI 2-1-1 logical element 118a20 and causing the clearing of the BUSY ENABLE LATCH. The logically High set side output signal resultant from such BUSY ENABLE LATCH responsively to such clearing will be inverted in IN1 logical element 118a22 and supplied as logically Low signal (H) INIT BUSY (OUT) on line 118a03 such signal as will ultimately cause the driving of the not busy condition upon Versatile Bus 86a01. In such a manner, the BUSY signal upon the Versatile Bus 86a01 is driven to the not busy condition one cycle before the terminus of the last activity performed by the current Versatile Bus Interface Logics as part of a Versatile Bus transaction.

9.26.4. Slave Identification/Function Busy Counter

The SID BUSY COUNTER part of BUSY LOGICS 86b24 is shown in FIG. 119, consisting of FIG. 119a through FIG. 119c. The SID BUSY COUNTER proper consists of the loop connected logical structures as are visible in FIG. 119b and FIG. 119c. Under the logical Low condition of signal (L) BEGIN (OUT) FF on line 88c03 such as indicates the driving of the BEGIN signal upon the Versatile Bus 86a01 by the current Versatile Bus Interface Logics, a first truncated 1 OF 2 SELECTOR, truncated 102 logical element 119b04 will be enabled for selection of signals (H) 8 SID CYC on the line 126d01 through (H) 1 SID CYC on line 126d 13 for gating to subtractor SU1 logical element 119b06. Signals (H) 8 SID CYC on line 126d01, (H) 4 SID CYC on line 126d05, (H) 2 SID CYC on line 126d09 and (H) 1 SID CYC on line 126d13 are derived from configuration translation and indicate the number of slave identification/function cycles configured. As selectively gated through truncated 102 logical element 119b04 upon the logical Low occurrence of signal (L) BEGIN (OUT) FF on line 88c03 the cycle count represented by these signals is decremented by one cycle count within subtractor SU1 logical element 119b06 and then transmitted to the B, B0 through B3, data inputs to truncated 1 OF 2 SELECTOR truncated 102 logical element 119b08. Truncated 1 OF 2 SELECTOR, truncated 102 logical element 119b08, allows an alternative path for the recovery of the initial slave identification/function cycle count via signals (H) 8 SID CYC on line 126d01 through (H) 1 SID CYC on line 126d13. Such an alternative initialization selction of an undecremented slave identification/function cycle count is enabled from a logically Low select signal developed in NA2 logical element 119a22. Such a logical Low select signal is developed in NA2 logical element 119a22 as the combination of logical High signals (H) BEGIN (OUT) FF on line 88c01 and (H) SID LINES MPX'D on line 126c03.

The purpose of loading such an undecremented SID CYCLE COUNT in the event that the slave identification/function activity is pin-multiplexed onto the data lines may be envisioned by momentary reference to FIG. 118b. It may be recalled that under control of signal (L) ARB LINES MPX'D on line 126a01 and signal (H) ARB LINES MPX'D on line 126a03, two alternative slave identification/function cycle counts as developed in NO3 logical element 118b08 and NO4 logical element 118b12 were respectively gated in AOI 2-2 logical element 118b10 in formation of signal (H) SID BUSY on line 118b03. The explanation for this alternative SID CYCLE COUNT gating and resultant generation of signal (H) SID BUSY on line 118b03 was that the SID CYCLE COUNTER needs be counted down for one further count should the arbitration activity be pin-multiplexed onto the slave identification/function activity. In other words, signal (L) ARB BUSY on line 118b01 is logically Low for the specified number of arbitration cycle counts minus one cycle count, while signal (H) SID BUSY on line 118b03 is normally logically High for the duration of the SID cycle count minus one cycle count. If the activity of arbitration is pin-multiplexed with the activity of slave identification/function then the ultimate combinational duration of such signals are respectively disable NO4 logical element 118b06 is not desired to be the number of arbitration cycle counts minus one cycle count plus the number of slave identification/function cycle count minus one cycle count, thusly equaling the combined number of such cycle counts minus two cycle counts. It is rather desired that the BUSY signal should be driven upon Versatile Bus 86a01 for the number of arbitration cycle counts plus the number of slave identification/function cycle counts minus one cycle count. This alternative total cycle count formation in the event of the pin-multiplexing of the activities of arbitration and slave identification/function was enabled through a path involving NO4 logical element 118b12. Continuing in FIG. 118b, no such accommodation to the combinatorial cycle count to be developed in the event of the pin-multiplexing of the slave identification/function activity and the data activity was seen in the gating of AOI 2-2 logical element 118b16.

The manner by which such compensation shoul be obtained, in a similar manner to the pin-multiplexing of arbitration and slave identification/function activity, when the activity of slave identification/function is pin-multiplexed with the activity of data, is accomplished in the truncated 1 OF 2 SELECTOR truncated 102 logical element 119b08 as shown in FIG. 119b. When the slave identification/function activity is pin multiplexed with the data activity, then signal (H) SID LINES MPX'D on line 126c03 will be a logical High, which upon the logical High occurrence of signal (H) BEGIN (OUT) FF on line 88c01 will satisfy NA2 logical element 119a22 emplacing a logical Low select, SEL signal on truncated 102 logical element 119b08 and causing the selection of an undecremented slave identification/function cycle count as is contained in signals (H) 8 SID CYC on line 126d01 through (H) 1 SID CYC on line 126d13.

The initially selected slave identification/function cycle count is transferred from truncated 102 logical element 119b08 through truncated 102 logcal element 119c02, which is utilized exclusively for the implementation of a scan/set test loop and gated into the SID BUSY COUNTER master register truncated MR8 logical element 119c04 under a logical Low enablement signal and the logical Low occurrence of signal (L) $\phi$2 on line 13427. Upon the logical Low occurrence of signal (L) $\phi$1 on line 13401 the contents of the SID BUSY COUNTER master register truncated MR8 logical element 119c04 will be gated into the SID BUSY COUNTER slave register truncated SR8 logical element 119d02. Thereafter, under the logical High occurrence of signal (L) BEGIN (OUT) FF on line 88c03 such signals will be gated through truncated 102 logical element 119b04, decremented in passage to SU1 logical element 119b06, selected to pass through truncated 102 logical elements 119b08 and 119c02 and relodged in SID BUSY COUNTER master register truncated MR8 logical element 119c04 decremented by minus one count. The enablement of such a SID BUSY COUNTER decrementation loop shown in FIG. 119b and FIG. 119c is dependent upon a logical Low signal output from AOI 2-1 logical element 119a20 which signal serves to enable the SID BUSY COUNTER master register truncated MR8 logical element 119c04. In the presence of logical Low signal (H) 0 SID CYC on line 126d17, indicating that slave identification/function is configured other than a nullity and that the SID BUSY COUNTER should thus be decremented, the logical Low occurrence of signal (L) BEGIN (OUT) FF on line 88c03 will satisfy NO2 logical element 119a18, thereby emplacing a logical High signal into AOI 2-1 logical element 119a20 and causing a logical Low, enabling enablement (EN) signal to be applied to SID BUSY COUNTER master register truncated MR8 logical element 119c04. If signal (H) ARB LINES MPX'D on line 126a03 is a logical High, indicating that the arbitration activity is pin-multiplexed with the slave identification/function activity, then for the duration of the arbitration activity as represented by logically High signal (H) ARB IN PRO ($\phi$1) ($\phi$2) on line 88g03 NA2 logical element 119a14 will be satisfied emplacing a logical Low signal on AOI 2-1 logical element 119a20 and thusly resulting in a logically High, disabling, enablement signal into SID BUSY COUNTER master register truncated MR8 logical element 119c04 and resulting in the prevention of the decrementation of the SID BUSY COUNTER during the duration of the pin-multiplexed arbitration activity. Upon such time as the pin-multiplexed arbitration activity is terminated, or should such activity never have been pin-multiplexed at all, the complemented signal outputs from truncated SID BUSY COUNTER slave register truncated SR8 logical element 119b02 are collected in NA4 logical element 119a16 to produce a logical High signal into AOI 2-1 logical element 119a20 until such time as the SID cycle counter has decremented through positive zero to a binary all one's value. Until such time as NA4 logical element 119a16 is satisfied by the decrementation to such an all one's SID cycle count value, AOI 2-1 logical element 119a20 will be satisfied producing a logical Low enablement signal into SID BUSY COUNTER master register truncated MR8 logical element 119c04 which will allow decrementation of the slave identification/function cycle count upon each occurrence of both clock $\phi$1 and clock $\phi$2.

The remaining logical elements appearing in FIG. 119a are concerned with the wait cycle count. If signal (L) WAIT LINE MPX'D on line 126d≅is logically Low, indicating that the wait line is pin-multiplexed onto the data line, then the logical Low occurrence of signal (L) BEGIN (OUT) FF on line 88c03 will satisfy NO2 logical element 19a02 and result, upon the logical High occurrence of signal (H) $\phi$2 (7) on line 13441, in the setting of the wait count latch $\phi$1 consisting of cross-coupled AOI 2-1 logical element 119a06 and AOI 2-1-1 logical element 119a08. The setting of such wait count latch $\phi$1 will be gated upon the next logical High occurrence of signal (H) $\phi$1 (11) on line 13424 to set the wait count latch $\phi$2 consisting of cross-coupled AOI 2-1 logical elements 119a10 and 119a12. For the duration of the time that such wait count latch $\phi$2 remains set, the set side output signal will be supplied as logically Low signal (L) WAIT COUNT SET ($\phi$1) on line 119a01, which signal ultimately allows the issurance of a BUSY signal upon the Versatile Bus due to pin-multiplexed wait activity. If the slave identification/function activity is also pin-multiplexed onto the data lines, then the logical High signal (H) SID LINES MPX'D on line 126c03 will prevent satisfaction of AOI 2-1 logical element 119a04 until the collective slave identification count as derived in NA4 logical element 119a16 has decremented through zero to an all one's value. In such case of a pin-multiplxed slave identification/funciton activity as well as the pin-multiplexing of the wait activity, then AOI 2-1 logical element 119a04 will not be satisfied until the conclusion of the slave identification/-function activity. Resultantly wait count latch $\phi$1 and thence wait count latch $\phi$2 will not be cleared until that cycle time following the completion of the slave identification/function cycles. In summary, a generation of the BUSY signal upon the Versatile Bus responsively to the conduct of the wait activity will not be generated, reponsive to the setting of the wait count latch $\phi$1 and wait count latch $\phi$2, unless such wait activity is pin-multiplexed with data.

9.26.5. Data Busy Counter Control

THE DATA BUSY COUNTER CONTROL functional logical subsection part of BUSY LOGICS 86b24 is shown in FIG. 120. The DATA BUSY COUNTER CONTROL is concerned with the management of a latch which denotes that the total number of data cycles to be required within the present transaction is greater than sixteen, and the development of a signal (L) INC DATA BK on line 12005 which signal will go logically Low to enable the data cycle counter to decrement for the last sixteen cycles of all such cycles as are in total required.

Commencing with the functional explanation of the DATA BUSY COUNTER CONTROL as shown in FIG. 120, the logical Low occurence of signal (L) BEGIN (OUT) FF on line **88*c*03 in conjunction with logical Low signal (L) $\phi$2 on lin 13427 satisfies NO2 logical element 12004 emplacing a logical High gating signal upon the >16 LATCH consisting of cross-coupled AOI 2-1 logical elements 12006 and 12008. If signal (L) XUWK>16 on line 122*b*01, such signal as is developed in the word count multiplier as the number of data words to be transferred times the number of data cycles required per word, is logically Low, indicating that such total number of data cycles to ensure is greater than sixteen, than the >16 LATCH, consisting of cross-coupled AOI 2-1 logical elements 12006 and 12008 will set causing signal (L)>16 FF on line 12001 to be logically Low, and signal (H)>16 FF on line 12003 to be logically High. Meanwhile, under the occurrence of logically High signal (H) $\phi$2 (7) on line 13441 the latch consisting of cross-coupled AOI 2-1 logical elements 12016 and 12018 will have become set, causing a logical High clear side output signal to be received at NA2 logical element 12020. In conjunction with an initially zero data cycle counter count, such as results in a logically High input signal to the other port of NA2 logical element 12020, this NA2 logical element will generate a logical Low signal which is received at NA3 logical element 12012. During the logical Low duration of signal (L) XUWK>16 on line 122*b*01 the data cycle counter will count the cycles of data activity but the data busy counter, such as will be shown in upcoming FIG. 121*a* and FIG. 121*b*, will be prevented from decrementing under the logical High condition of signal (L) INC DATA BK on line 12005. When signal (L) XUWK>16 on line 122*b*01 becomes logically High then the User supplied remaining integral word count times the number of data cycles required to communicate each such word is equal to or less than sixteen. Since, by momentary reference to FIG. 52*b*, it may be observed that the User will have changed the integral remaining word count upon the issuance of each full word to the Versatile Bus Interface Logics, the current Versatile Bus Interface Logics may have some cycles of data activity remaining before the current word in progress can be completely transmitted. For example, signal (L) XUWK>16 on line 122*b*01 could have gone logically High upon the Versatile Bus Interface Logics receipt of fifth word (remaining word counts goes to four) with four and three quarters such words remaining to be transmitted at four data cycles each. The logical path involved in generation of logical Low signal (L) INC DATA BK on line 12005,** such signal as will allow the decrementation of the final data busy count will be concerned with allowing the remaining three cycles of this example fifth word to transpire before the final countdown of the remaining sixteen cycles, as are attendant upon the issuance of the final four words.

Continuing with the explanation of the DATA BUSY COUNTER CONTROL part of BUSY LOGICS **86*b*24 as shown in FIG. 120, the development of a logically Low signal (L) INC DATA BK on line 12005 which allows the decrementation of the data busy counter will next be dicussed. When signal (L) XUWX>16 on line 122*b*01 becomes logically High, indicating that the total number of data cycles in transmission of the total number of User specified remaining words is equal to or less than sixteen, then the >16 LATCH consisting of cross-coupled AOI 2-1 logical elements 12006 and 12008 will not be cleared but to a logically High condition of signal (L) BEGIN (OUT) FF on line 88*c*03. Thus signal (L) XUWK>16 on line 12201 and signal (H)>16 FF on the line 12003 will be supplied to NA3 logical element 12002 at the logically High level. At this time that data cycle count which attends the issuance of the last integral word before those remaining integral word(s) which have resulted in a net total remaining cycle count less than or equal to sixteen, will be in progress. In the example of the previous paragraph this was a fifth word, the final three cycle counts of which are now in progress. As translated in NA2 logical elements 12022 and 12024 signals (L) 8 DATA CYC on line 126*f*05, (L) 16 DATA CYC on line 126*f*01, and (L) 4 DATA CYC on line 126*f*09 are utilized to develop two select signals, S0 and S1, allowing S14 logical element 12026 to select amongs signals (L) DCK=2 ($\phi$1) on line 115*b*19 through signal (L) DCK=16 ($\phi$1) on ($\phi$1) on line 115*b*23. The selected signal output from S14 logical element 12026 is applied to S12 logical element 12028 along with signal (L) DCK=1 ($\phi$1) on line 115*b*21. One of these signals is selected under control of select signal (H) 1 DATA CYC on line 126*f*13. The net configuration selected data cycle count, a logically Low going signal when the cycle count equivalent to the issuance of an integral data word is achieved, is transmitted from S12 logical element 12028 to NA2 logical element 12020 in satisfaction thereof. In the example of a fifth word transpiring across four data cycles, signal (L) DCK=4 ($\phi$1) on line 115*b*17 would be selected in S14 logical element 12026 and S12 logical element 12028 to be applied in logically Low satisfaction of NA2 logical element 12020 at the occurrence of the fourth and final data cycle of the fifth word remaining to be transmitted. The logically High signal developed by NA2 logical element 12020 resultant from its satisfaction will in turn satisfy NA3 logical element 12012 and result in logically Low signal (L) INC DATA BK on line 12005. This logically Low signal (L) INC DATA BK on line 12005 will be inverted in IN1 logical element 12014 and gated upon the next logical High occurrence of signal (H) $\phi$2 (7) on line 13441 to set the latch consisting of cross-coupled AOI 2-1 logical elements 12016 and 12018. The resultant logical Low clear side output signal from this latch will satisfy NA2 logical element 12020 maintaining the third input signal to NA3 logical element 12012 in the logically High condition, and thereby maintaing from this time forward signal (L) INC DATA BK on line 12005 in the logical Low condition. This logically Low condition of signal (L) INC DATA BK on line 12005 enables the decrementation of the DATA BLOCK COUNTER, such as had been previously noted to be installed with an all one's count, which is equivalent to sixteen remaining data cycles, under control of logically Low signal (L) XUWK>16 on line 122*b*01.** Thereby the DATA BUSY COUNTER is enabled to count off the remaining number of cycles as attend the issuance of the remaining integral number of words, in the current example four words of four cycles per word.

9.26.6. Data Busy Counter

The DATA BUSY COUNTER functional logical subsection part of BUSY LOGICS **86*b*24 is shown in FIG. 121, consisting of FIG. 121*a* and FIG. 121*b*.** The DATA BUSY COUNTER proper shown in FIG. 121*b* is similr to the SID BUSY COUNTER shown in FIG. 119*b* and FIG. 119*c* minus the additional truncated 1 of 2 SELECTOR, truncated 102 logical element 1196*b*08, which was necessary within the SID BUSY COUNTER to effectuate an alternative initialization load of the slave identification/function cycle count. In the presence of either logically Low signal (L) X4 on line 122*b*03 which indicates sixteen decimal remaining cycle counts or logically Low signal (L) XUWK>16 on line 122*b*01 which indicates greater than sixteen remaining cycle counts, NA3 logical element 121*b*12 will not be satisfied and will emplace a logically High select SEL, signal on truncated 1 OF 2 SELECTOR truncated 102 logical element 121*b*04. Such a logically High select signal will cause truncated 1 OF 2 SELECTOR truncated at 102 logical element 121*b*04 to gate the signal inputs received from the DATA BUSY COUNTER slave register truncated SR8 logcal element 121*b*02 which signals will represent an all one's quality resultant from the previous underflow of the DATA BUSY COUNTER through zero. Alternatively, if signal (L) X4 on line 122*b*03 and signal (L) XUWK>16 on line 122*b*01 are logically High than the logical High occurrence of signal (H) BEGIN (OUT) FF on line 88*c*01 will satisfy NA3 logical element 121*b*12 and cause a logical Low select signal on truncated 1 OF 2 SELECTOR, truncated 102 logical element 121*b*04. Such a logically Low select, SEL, signal will select in initialization the busy count carried upon signals (H) X3 on line 122*b*05 through (H) X0 on line 122*b*11, such signals respectively indicate busy counts of eight, four, two and one in the logically High condition. Thusly, as with the SID BUSY COUNTER as shown in FIG. 119*b* and FIG. 119*c*, the initialization load of such counters is respectively with a quantity one less than the net total number of cycle times associated with the corresponding slave identification/function and data activities. This is because a first such cycle time is coincident with the logical High occurrence of signal (H) BEGIN (OUT) FF on line 88*c*01. Thusly the maximum cycle count which can be loaded, such maximum cycle count as would result from the logical High condition of signal (H) X3 on line 122*b*05 through the logically High condition of signal (H) X0 on line 122*b*11, would be a count of decimal fifteen. The busy count selected in truncated 1 OF 2 SELECTOR truncated 102 logical element 121*b*04 is decremented in passage through subtract one, SU1, logical element 121*b*06, then gated in passage through truncated 1 OF 2 SELECTOR, truncated 102 logical element 121*b*08, and finally lodged in DATA BUSY COUNTER Truncated master register, truncated MR8 logical element 121*b*10, upon the logically Low condition of the enablement, EN and clock, CLK signals. The current data busy count, valid from clock $\phi$2 to clock $\phi$2, is supplied from this DATA BUSY COUNTER truncated master register, truncated MR8 logical element 121*b*10, as signals (H) DATA BK3 on line 121*b*05 through signal (H) DATA BK0 on line 121*b*11. These data busy count signals are gated into the DATA BUSY COUNTER truncated slave register, truncated SR8 logical element 121*b*02, upon the logical Low occurrence of signal (L) $\phi$1 on line 13401. Subsequently, signals from this SR8 logical element 121*b*02 representative of the current day busy count are selected in truncated 1 OF 2 SELECTOR, truncated 102 logical element 121*b*04, decremented by one in SUBTRACT 1, SU1 logical element 121*b*06, selected in truncated 1 OF 2 SELECTOR, truncated 102 logical element 121*b*08, and relodged in DATA BUSY COUNTER truncated master register, truncated MR8 logical element 121*b*10, upon the next occurrence of logically Low signal (L) $\phi$2 on line 13427 during the persistence of a logical Low enablement signal.

Continuing with the explanation of the DATA BUSY COUNTER functional logical subsection part of BUSY LOGICS 86*b*24, the control of such DATA BUSY COUNTER is shown within FIG. 121*a*. The enablement signal to the DATA BUSY COUNTER truncated master register, truncated MR8 logical element 121*b*10, is developed in AOI 2-1 logical element 121*a*16 and need be logically Low for enablement of the DATA BUSY COUNTER decrementation loop. During the initial load of the DATA BUSY COUNTER truncated master register, truncated MR8 logical element 121*b*10, the logical High occurrence of signal (H) BEGIN (OUT) FF on line 88*c*01 is inverted in AOI 2-1 logical element 121*a*16 and supplied as a logically Low, enabling enablement signal to such truncated MR8 logical element 121*b*10. For howsoever long thereafter as the signal outputs of AOI 2-2-2 logical element 121*a*14 and NA4 logical element 121*a*12 are logically High, thereby enabling AOI 2-1 logical element 121*a*16, the DATA BUSY COUNTER will continue to decrement. The signal output from NA4 logical element 121*a*12 will remain logically High, enabling continuing decrementation of the DATA BUSY COUNTER, until such time as each of the signals received into such element from each inverted bit position of the DATA BUSY COUNTER truncated slave register, truncated SR8 logical element 121*b*02 is a logically high signal. Such a condition represents a DATA BUSY COUNTER slave register truncated SR8 logical element 121*b*02 contents of all one's such as will occur when the data busy count underflows through zero. The logical Low condition of signal (L) INC DATA BK on line 12005 will dissatisy AOI 2-2-2 logical element 121*a*14 and resultantly, during the duration of a non-zero busy count, enable the decrementation of the DATA BUSY COUNTER. During the logical High condition of signal (L) INC DATA BK on line 12005, such as will attend all cases when the total data cycle count is equal to or less than sixteen, then AOI 2-2-2 may be satisfied by a logically High signal condition resultant from either of NO2 logical elements 121*a*04, 121*a*06, or 121*a*10. During the presence of logical Low signal (L) 16 FF on line 12007, such as results from the setting of the >16 LATCH as shown in FIG. 120, the logical Low condition of signal (L) DATA IN PRO FF ($\phi$1) on line 88*k*03, such as indicates data in progress and which is controlled by SEND CONTROL LOGICS 86*b*14 as is shown in FIG. 88*k*, will satisfy NO2 logical element 121*a*04 and provide a logical High input signal to AOI 2-2-2 logical element 121*a*14 which input signal will be gated in satisfaction of such AOI 2-2-2 logical element contingent upon the state of signal (L) INC DATA BK on line 12005. Such signal (L) INC DATA BK on line 12005 will be logically High, inhibiting the incrementation of the DATA BUSY COUNTER, until those final data cycles attending the final data words to be transmitted within a block data transfer. The logical High of such signal (L) INC DATA BK on line 12005 will satisfy, in conjunction with the logical High signal output of NO2 logical element 121*a*04, AOI 2-2-2 logical element 121*a*14 thereby producing a logical Low signal output therefrom, which when received at AOI 2-2-1 logical element **121*a*16 will dissatisfy such element producing a logical High, disabling, enablement signal input to DATA BUSY COUNTER truncated master register, truncated MR8 logical element 121*b*10. If the wait activity is configured to transpire pin-multiplexed upon the data lines, then the logical Low signal (L) WAIT LINE MPX'D on line 126*d*25 will satisfy NO2 logical element 121*a*06 during the duration of logically Low signal (L) WAIT COUNT SET ($\phi$1) on line 119*a*01 which signal sill be logically Low until the completion of the WAIT activity. Similarly, in the event that the slave identification/function activity is configured to be pin-multiplexed onto the data lines, the logical Low condition of signal (L) SID LINES MPX'D on line 126*c*01 will satisfy NO2 logical element 121*a*10 for the duration of logically High signal (L) SID BK=0 on line 119*a*03 as inverted in IN1 logical element 121*a*08. Thusly the DATA BUSY COUNTER is prevented from decrementing from the duration of pin-multiplexed wait and slave identification/function activities. The combination of signals (L) ARB LINES MPX'D on line 126*a*01, (L) WAIT LINE MPX'D on line 126*d*25, and (L) SID LINES MPX'D on line 126*c*01, as developed in NA3 logical element 121*a*02 is supplied as signal (L) NO MPX on line 121*b*03** to remaining BUSY section logics.

9.26.7. Word Count Multiplier

The logic diagram of the WORD COUNT MULTIPLIER functional logical subsection part of BUSY LOGICS **89*b*24 is shown in FIG. 122, consisting of FIG. 122*a* and FIG. 122*b***. The function of the WORD COUNT MULTIPLIER functional logical subsection is to develop the number of data busy cycles, such as are supplied to the DATA BUSY COUNTER, in consideration of the User supplied number of data words to be transferred and in consideration of the configuration of the Versatile Bus for the number of data cycles required for the transfer of each such word.

Commencing with the logical explanation of the WORD COUNT MULTIPLIER functional logical subsection as shown in FIG. **122*a* and FIG. 122*b*, signal (H) BLOCK TRANS on line 122*a*13, logically High if a block data transfer is in progress, is received from the User and inverted in IN1 logical element 122*a*24 from distribution to remaining busy enable logics as signal (L) BLOCK TRANS on line 122*b*13. This signal (L) BLOCK TRANS on line 122*b*13 is also supplied to NO2 logical element 122*a*18 in conjunction with signal (H) UWK 0 on line 122*a*09, while an inversion of this signal within IN1 logical element 122*a*22 is supplied to respective NA2 logical elements 122*a*10 through 122*a*16 and plus 122*a*20 for respective gating of signals (H) UWK 4 on line 122*a*01 through (H) UWK 1 on line 122*a*07 plus signal (H) UWK>16 on line 122*a*11. As may be recalled from explanation of the Versatile Bus Interface Logics to User Interface accompanying FIG. 52*b*, signals (H) UWK 0 on line 122*a*09 through (H) UWK 4 on line 124*a*01 plus signal (H) UWK>16 on line 122*a*11 respectively represent the User supplied remaining word count binary encoded digits zero through four plus a single signal representative of remaining word count greater than sixteen. In the presence of a logical High signal (H) BLOCK TRANS on line 122*a*13, indicating a Use specified block transfer, signals (H) UWK 4 on line 122*a*01 through (H) UWK 1 on line 122*a*07 as are respectively gated in NA2 logical elements 122*a*10 through 122*a*16 are variously supplied to data inputs of 1 OF 4 SELECTOR 104 logical element 122*a*02. Signal (H) UWK>16 on line 122*a*11 is also gated in NA2 logical element 122*a*20, subsequently inverted in IN1 logical element 120*b*22, and supplied in partial satisfaction of AIO 2-1-1 logical element 120*b*12 toward generation of logicallyLow signal (L) XUWK>16 on line 122*b*01. If signal (H) BLOCK TRANS on line 122*a*13 is logically Low, as might be perpetually the case with a User not enabled to transfer block data, the inversion of such signal in IN1 logical element 122*a*24 will satisfy NO2 logical element 122*a*18 and suffice to substitute for signal (H) UWK 0 on line 122*a*09 as indicates a User specified word count of one. In other words, if all such signals from the User device as are illustrated in FIG. 122*a*** were unexercised by such User device and were permanently logical Low, the Versatile Bus Interface Logics would thereby be directed to the transmission of one data word per User initiated transaction.

Continuing with the explanation of the WORD COUNT MULTIPLIER functional logical subsection part of BUSY LOGICS **86*b*24, signals (L) 16 DATA CYC on line 126*f*01, (L) 8 DATA CYC on line 126*f*05, (H) 2 DATA CYC on line 126*f*11 and (H) 4 DATA CYC on line 126*f*07 are translated in NA2 logical element 122*a*04 and NO2 logical elements 122*a*06 and 122*a*08 in generation of a select one and select zero, SEL 1 and SEL 0, selection signals to 1 OF 4 SELECTOR 104 logical element 122*a*02. In a manner common in the digital computer arts, these selection signals will select amongst various combinations of gated word count signals (H) UWK 4 on line 122*a*01 through (H) UWK 0 on line 122*a*:9 to effectuate multiplication by selection at one, two, four or eight times dependent upon the data activity being configured to transpire at one, two, four or eight cycles. The first multiplied word count signal outputs of 1 OF 4 SELECTOR 104 logical element 122*a*02 are applied as signal inputs to successive 1 OF 2 SELECTOR 102 logical element 122*b*04. Such 1 OF 2 SELECTOR 102 logical element 122*b*04 will, in conjunction with S12 logical element 122*b*02, suffice to formulate the data cycle count when data is configured to transpire at sixteen cycles per data word. If signal (L) 16 DATA CYC on line 126*f*01 is logically Low, indicating configuration for sixteen data cycles, then the select, SEL, signal to 1 OF 2 SELECTOR 102 logical element 122*b*04 will cause that multiplied cycle count as is received from 1 OF 4 SELECTOR 104 logical element 122*a*02 to be left shifted in receipt or multiplied by two. Thereby the multiplication by eight occurring in 1 OF 4 SELECTOR 104 logical element 122*a*02 in conjunction with the multiplication by two occurring within 1 OF 2 SELECTOR 102 logical element 122*b*04 effectuates multiplication by sixteen. Meanwhile, the logically Low condition of signal (L9 16 DATA CYC on line 126*f*01 will have selected the most significant, S0, cycle output signal from 1 OF 4 SELECTOR 104 logical element 122*a*02 to be gated as selected data to NA4 logical element 120*b*06. If an overflow beyond fifteen cycle counts has occurred in 1 OF 4 SELECTOR 104 logical element 122*a*02, the logical Low condition of this signal will satisfy NA4 logical element 120*b*06 and thence AOI 2-1-1 logical element 120*b*12 resulting in logical Low signal (L) XUWK>16 on line 122*b*01**. Cycle count output signals S0 through S2, such as represent the three most significant bits of an eight bit formulated data cycle count are also supplied to NA4 logical element 120b06 and will result in the satisfaction thereof and resultant satisfaction of AOI 2-1-1 logical element 120b12 in the event that the formulated cycle count is greater than sixteen. If signal output S3, signal (L) X 4 on line 122b03, from 1 OF 2 SELECTOR 102 logical element 122b04 is logically Low, indicating a data cycle count of sixteen, while any of signal outputs S4 through S7 are also logically Low, indicating further cycle counts above sixteen, then the total cycle count is such as must result in development of logically Low signal (L) XUWK>16 on line 122b01. This is accomplished by the inversion of signal (L) X 4 on line 122b03 in IN1 logical element 120b08 accompanied by the collection of 1 OF 2 SELECTOR 102 logical element 122b04 output signals S4 through S7 in NA4 logical element 120b10 which, as jointly supplied signals to AOI 2-1-1 logical element 120b12, will satisfy such element and produce logically Low signal (L) XUWK>16 on line 122b01 for shift counts greater than sixteen. The binary encoded data cycle count is supplied as signal (L) X 4 on line 122b03 and, as respectively generated in IN1 logical elements 120b14 through 120b20, signals (H) X 3 on lines 122b05 through (H) X 0 on line 122b11.

9.27. Data Section

The DATA SECTION 86b04, previously seen within the first level block diagram at FIG. 87a, is shown in FIG. 123, consisting of FIG. 123a and FIG. 123b. The function of the DATA SECTION 86b04 is the disassembly of data words supplied by the User for transmission upon the Versatile Bus, and the assembly of partial data word transmissions received from the Versatile Bus 86a01 for delivery to the User as assembled data words.

Commencing with the explanation of the operation of DATA SECTION 86b04 for the transmission of data upon Versatile Bus 86a01, signal (H) UDB 0 through (H) UDB 15 as were shown in FIG. 51 are received from the User on line 123b05 and are, in the most significant eight signals, gated through lower 1 OF 2 SELECTOR 102 logical element 123b04, and, in the least eight significant signals, gated through upper 1 OF 2 SELECTOR 102 logical element 123b18 under the logical Low occurrence of selfsame select signal (L) INIT DATA on line 88k01. Under selection resultant from logical Low signal (L) INIT DATA on line 88k01 as originates in SEND CONTROL functional logical subsection 89b14 shown in FIG. 88k, the User input data quantity is passed through 1 OF 2 SELECTOR 102 logical elements 123b04 and 123b18 to become gated, in a most significant eight bit and a least significant eight bit half, within DATA MASTER REG.-LOWER MR8 logical element 123b02 and DATA MASTER REG-UPPER MR8 logical element 123b20 upon the occurrence of clock $\phi$1. The DATA OUTPUT SELECTOR 102 logical element 86b22, previously seen within the first level block diagram at FIG. 86b, enables the pin-multiplexing of the arbitration, slave identification/function, and wait activities onto the data driver/receivers and data lines. During such time as is appropriate for the conduct of the data activity, the User supplied data word resident within DATA MASTER REG-LOWER MR8 logical element 123b02 will be gated through DATA OUTPUT SELECTOR 102 logical element 86b22 and applied via line 123b01 as signals to the eight most significant data driver/receivers D/R 8 logical element 86b20. Meanwhile, the least significant portion of the User supplied data word, if required by a User data word of sixteen bits will be supplied from DATA MASTER REG-UPPER MR8 logical element 123b20 directly to the least significant driver/receiver elements D/R (8) logical elements 86b20 via line 123b03. If one, two, four or eight data lines are driven upon Versatile Bus 86a01 during each successive data cycle then one, two, four or all eight successive left most ones of those driver/receivers D/R (8) logical elements 86b20 as receive output signals via line 123b01 will be enabled for drive of the Versatile Bus 86a01. As the data activity is configured to transpire on sixteen data lines per cycle, then those data driver/receivers D/R (8) logical element 86b20 such as receive signals from DATA MASTER REG-UPPER MR8 logical element 123b20 via line 123b02 will be enabled for signal drive upon Versatile Bus 86a01. As with the slave identificaiton/function and arbitration activities, the enablement of the data driver/receivers D/R (8) logical element 86b20 for the drive of Versatile Bus 86a01 in accordance with the number of data lines configured is supplied directly to such data driver/-receiver D/R (8) logical elements 86b20 from the configuration translation functional section. The disassembly of a User supplied data word, such as allows such word to be transmitted in a successive number of dat cycles upon Versatile Bus 86a01, is accomplished by successive left justifications of each data word within DATA MASTER REG-LOWER MR 8 logical element 123b02, and, if necessary, in DATA MASTER REG-UPPER MR8 logical element 123b20. These successive left justifications of the entire User supplied data word as a joint quantity transpires within a data lower shift loop and a data upper shift loop. The contents of DATA MASTER REG-LOWER MR8 logical element 123b02, which is valid from clock $\phi$1 to clock $\phi$1, will be gated during that selfsame clock $\phi$2 upon which a word may be partially driven upon Versatile Bus 86s01 into DATA SLAVE REG-LOWER SR8 logical element 123b08. The least significant seven bits of such DATA SLAVE REG-LOWER SR8 logical element 123b08 are gated through BINARY SHIFT MATRIX BSM logical element 123b06 under a shift count control effectuating left shifting of one, two, or four bit positions (as data is configured to transpire on one, two, or four lines) and thence through 1 OF 2 SELECTOR 102 logical element 123b04, and thence back to DATA MASTER REG-LOWER MR8 logical element 123b02 in a left justified position. In a similar manner, the contents of DATA MASTER REG-UPPER MR8 logical element 123b20 are gated into DATA SLAVE REG-UPPER SR8 logical element 123b12 upon the selfsame clock $\phi$2. Howsoever many most significant bits of such quantity are needed to substitute for bits being shifted in BINARY SHIFT MATRIX BSM logical element 123b06 are transmitted from DATA SLAVE REG-UPPER SR8 logical element 123b12 via 1 OF 2 SELECTOR 102 logical element 123b10 to such least significant bit positions of BINARY SHIFT MATRIX BSM logical element 123b06 in positions wherein they contribute to formulation of that currently left justified data quantity. This data quantity is supplied from BINARY SHIFT MATRIX BSM logical element 123b06 through 1 OF 2 SELECTOR 102 logical element 123b04 to become lodged in DATA MASTER REG-LOWER MR8 logical element 123b02 as that current data word quantity, which is being driven, in successive parts, upon Versatile Bus 86a01. Meanwhile, the least significant seven bits of the quantity within DATA SLAVE REG-UPPER SR8 logical element **123*b*12 are applied to BINARY SHIFT MATRIX BSM logical element 123*b*16 wherein they are shifted left one, two, or four bit positions depending on the configuration of the data activity at one, two, or four lines. The least significant seven bits are thence gated through 1 OF 2 SELECTOR 102 logical element 123*b*18 and relodged within the DATA MASTER REG-UPPER MR8 logical element 123*b*20. In such a manner, as should be familiar to a practitioner of the computer arts, the data word of up to sixteen bits originally received from User via line 123*b*05 is successively left shifted as resident within DATA MASTER REG-LOWER MR8 logical element 123*b*02 and DATA MASTER REG-UPPER MR8 logical element 123*b*20 so that it may be driven, in successive parts, by the left most, most significant, driver/receiver D/R (8) logical elements 86*b*20 upon the most significant data lines of Versatile Bus 86*a*01**.

Next considering the operation of the DATA SECTION **86*b*04 as shown in FIG. 123 for the receipt of data upon Versatile Bus 86*a*01, the data word as received in upper and lower parts driver/receiver in D/R (8) driver/receiver element 86*b*20 is transmitted as signals representing data bit 0 through data bit 7 on line 128*h*01 and signals representing data bit 8 through data bit 15 on line 128*j*01. In the presence of logically High signal (H) DATA LINES on line 126*e*01, signals on lines 128*h*01 are selected in 1 OF 2 SELECTOR 102 logical element 123*b*10 to be transferred through BINARY SHIFT MATRIX BSM logical element 123*b*06. Similarly, under the logical High condition of selfsame select signal (H) 16 DATA LINES on line 126*e*01 as applied to 1 OF 2 SELECTOR 102 logical element 123*b*14, signals upon line 128*j*01 will be gated through such selector to BINARY SHIFT MATRIX, BSM logical element 123*b*16. If such a received data quantity, which as selected and as needs not be shifted in passage through BINARY SHIFT MATRIX BSM logical elements 123*b*06 and 123*b*16, then the signals from BINARY SHIFT MATRIX BSM logical element 123*b*06 will be selected within 1 OF 2 SELECTOR 102 logical element 123*a*04 to become lodged in USER INPUT DATA REG-LOWER-MASTER MR8 logical element 123*a*06 upon the occurrence of clock $\phi$1. Similarly, the signals transmitted through BINARY SHIFT MATRIX BSM logical element 123*b*16 will be selected in 1 OF 2 SELECTOR 102 logical element 123*a*10 and become lodged in USER INPUT DATA REG-UPPER-MASTER MR8 logical element 123*a*12 upon the occurrence of clock $\phi$1. Within such USER INPUT DATA REG-LOWER-MASTER MR8 logical element 123*a*06 and such USER INPUT DATA REG-UPPER-MASTER MR8 logical element 123*a*12, the input data word in the most significant eight bits and least significant eight bits is respectively issued to the User upon lines 123*a*01 and 123*a*03. If the data word was complete, the outputs of the BINARY SHIFT MATRIX BSM logical elements 123*b*06 and 123*b*16 were not selected in 1 OF 2 SELECTOR 102 logical element 123*b*04 nor in 1 OF 2 SELECTOR 102 logical element 123*b*18 which selectors moreover, might well have been involved with a pipelined transaction in progress from the present User wherein such User is now commencing to transmit its own data word upon Versatile Bus 86*a*01**.

Continuing with the explanation of DATA SECTION **86*b*04, if a data word is transmitted and received in parts and the totality of such word has not yet been received, then such parts as are channeled through BINARY SHIFT MATRIX BSM logical elements 123*b*06 and 123*b*16 will be respectively selected in 1 OF 2 SELECTOR 102 logical elements 123*b*04 and 123*b*18 to become lodged in DATA MASTER REG-LOWER MR8 logical element 123*b*02 and DATA MASTER REG-UPPER MR8 logical element 123*b*20 upon that intermediary clock $\phi$1 to that clock $\phi$2 to clock $\phi$2 period within which the data signals upon lines 128*h*01 and 128*j*01 are valid as received from driver/receiver D/R (8) logical elements 86*b*20. At the same clock $\phi$2 time as a next successive partial word of data is being received from Versatile Bus 86*a*01, the current partially formed data word as resident within DATA MASTER REG-LOWER MR8 logical element 123*b*02 and DATA MASTER REG-UPPER MR8 logical element 123*b*20 will be respectively gated into DATA SLAVE REG-LOWER SR8 logical element 123*b*08 and DATA SLAVE REG-UPPER SR8 logical element 123*b*12. In a like manner to the progressive disassembly of a data word for transmission upon Versatile Bus 86*a*01, successive partial data words received are incorporated in the successive right most, least significant, bit positions in those quantities successively developed within BINARY SHIFT MATRIX BSM logical elements 123*b*06 and 123*b*16. Upon receipt of the final partial data word, such as comes via signals representative of the final bit positions upon lines 128*h*01 through 1 OF 2 SELECTOR 102 logical logical element 123*b*14 and thence through BINARY SHIFT MATRIX BSM logical element 123*b*16, the entirety of such data word as may be represented by signals from both BINARY SHIFT MATRIX BSM logical elements 123*b*06 and 123*b*16 is channeled as before, through 1 OF 2 SELECTOR 102 logical elements 123*a*04 and 123*a*10 into USER INPUT DATA REG-LOWER MASTER MR8 logical element 123*a*06 and USER INPUT DATA REG-UPPER-MASTER MR8 logical element 123*a*12. The received data word, as well as the previous winner's master arbitration identification code word and the slave identification/function word, are buffered on the User Interface and held as signal levels valid from clock $\phi$1** because an unknown amount of interconnect needs be driven across such interface to connect to myriad User logics.

The inclusion of USER INPUT DATA REG-LOWER-SLAVE SR8 logical element **123*a*02 and USER INPUT DATA REG-UPPER-SLAVE SR8 logical element 123*a*08 is solely for the implementation of two, eight bit scan/set testable shift registers. An extensive scan/set testable path part of SCAN/SET TEST LOOP C begins with data signal (H) LOOP C DATA on line 13605 as is received by 1 OF 2 SELECTOR 102 logical element 123*a*10. An output scan/set test signal from this eight bit shift register involving USER INPUT DATA REG-UPPER is signal (H) UIDS 8 on line 123*a*01 such as is received by 1 OF 2 SELECTOR 102 logical element 123*a*04. The scan/set test data output from USER INPUT DATA REG-LOWER-SLAVE SR8 logical element 123*a*02 is inverted in IN1 logical element 123*a*14 and supplied as signal (H) LOOP C-CARRY 6 on line 125*a*03 to BINARY SHIFT MATRIX BSM logical element 123*b*16. The scan/set test data exit from the eight bit path entered thereupon involving DATA MASTER REG-UPPER is via a signal leaving DATA SLAVE REG-UPPER SR8 logical element 123*b*12 which is routed to BINARY SHIFT MATRIX BSM logical element 123*b*06**.

After threading the eight bit shift register created as a loop from DATA SLAVE REG-LOWER SR8 logical element **123*b*08 plus DATA MASTER REG-LOWER MR8 logical element 123*b*02 and associated selector elements, the scan/set test signal as leaves the most significant bit of DATA SLAVE REG-LOWER SR8 logical element 123*b*08 is inverted in IN1 logical element 123*b*22 and supplied as signal (H) LOOP C-CARRY 5 via line 123*b*05 to remaining scan/set testable logics. Herein the scan/set test function irrelevant to the operative functionality of DATA SECTION 86*b*04**, is observed to add logical structure and interconnected signal routing to even this second level block diagram. The implementation of scan/set testability is taught within the present specification because, in the intended implementation in very large scale integrated circuitry, the apparatus of the present invention requires such scan/set testability for verification of operative integrity.

9.27.1. Data Output Selector

The DATA OUTPUT SELECTOR functional logical subsection **86*b*22, part of DATA SECTION 86*b*04, previously seen within the second level block diagram at FIG. 123*b*, is shown in FIG. 124. This logical structure is shown in detail as the sole structure within the entirety of the second level block diagram of the DATA SECTION 86*b*04 as appears on FIG. 123*a* and FIG. 123*b* which embodies any subtlety whatsoever. Additionally, such a selector structure allows review of the implementation of pin-multiplexing. Signal (L) SID/FO (OUT) through (L) SEL SID/F7 (OUT) on cable 11201 are either slave identification/function output signals or maybe arbitration group line output signals, dependent upon the selection of 1 OF 2 SELECTOR logical element 86*a*30 as may be observed by momentary reference to FIG. 86*a*. If the slave identification/function activity is pin-multiplexed onto the data lines, such as is represented by the logical High condition of signal (H) SID LINES MPX'D on line 126*c*03, then during the logical High duration of signal (H) SID IN PRO ($\phi$1) (1) on line 88*i*01, such as represents the in process progress of slave identification/function, AOI 2-2 logical element 12402 will be satisfied emplacing a logical Low select, SEL, signal on 1 OF 2 SELECTOR 102 logical element 12406. This logically Low select signal will gate signals (L) SEL SID/F0 (OUT) through (L) SEL SID/F7 (OUT) on cable 11201 as respective signal (L) SEL DB0 (OUT) on line 12401 through signal (L) SEL DB7 (OUT) on line 12415. Similarly, if the arbitration activity is pin-multiplexed onto the slave identification/function activitywhich is pin-multiplexed onto the data lines, then signals (L) ARB LINES MPX'D on line 126*a*01 and (L) SID LINE MPX'D on line 126*c*01 will be logically Low satisfying NO2 logical element 12408. During the logical High duration of signal (H) ARB IN PRO ($\phi$1) (2) on line 88*g*03 AOI 2-1 logical element 12402 will be satisfied again resulting in the selection of those signals on cable 11201 within 1 OF 2 SELECTOR 102 logical element 12406. Finally, if signal (L) MUX WAIT on line 126*d*29 is logically Low, indicating the pin-multiplexing of the wait activity upon the most significant data line, then signal (L) WAIT (OUT) on line 110*e*01 will be selected within S12 logical element 12404 to be passed as a B0 data input to 1 OF 2 SELECTOR 102 logical element 12406 and thence passed by such selector as signal (L) SEL DB0 (OUT) on lien 12401. Signals (L) DRO0 through (L) DRO7 on cable 123*b*03 are those normal signals received from DATA MASTER REG-LOWER MR8 logical element 123*b*02 which, as selected in 1 OF 2 SELECTOR 102 logical element 12406 are respectively supplied as signals (L) SEL DB0 (OUT) on line 12401 through signal (L) SEL DB7 (OUT) on line 12415 to the driver/receiver D/R (8) logical element 86*b*20.**

9.28. Configuration Register

The CONFIGURATION REGISTER functional logical subsection **86*b*32 part of CONFIGURATION CONTROL SECTION 86*b*08, previously seen within the first level block diagram at FIG. 86*b*, is shown in FIG. 125, consisting of FIG. 125*a* through FIG. 125*h*. The purpose of the twenty-eight bit configuration register 86*b*32 is to hold the VM Node/maintenance processor loadable configuration information which establishes one of the allowable configurations of the Versatile Bus Interface Logics. The CONFIGURATION REGISTER is composed of three, eight bit MASTER REGISTER MR8 logical elements-MR8 logical elements 125*b*02, 125*d*02, and 125*f*02-plus an associated three slave register SR8 logical elements-SR8 logical elements 125*a*02, 125*a*02, and 125*e*02, plus one, four bit master register MR4 logical element 125*h*02 and an associated four bit slave register SR4 logical element 125*g*02. The utilization of bits 0 through 23 of the CONFIGURATION REGISTER is shown in the bottom labeled CONFIGURATION REG. BITS shown in the table of FIG. 3. Each of eight, three bit fields within the first twenty-four bits of the CONFIGURATION REGISTER will be loaded with a binary code such as will uniquely associate with a configuration digit value of one through five. Later interpretation of each such field within the configuration translation functional logical subsection 86*b*34 will establish the necessary configuration control signals for distribution to the Versatile Bus Interface Logics. By momentary reference to FIG. 125*h*, it may be observed that CONFIGURATION REGISTER bit 24 is the ripple enable bit and CONFIGURATION REGISTER bit 25 is the master only bit. CONFIGURATION REGISTER bits 26 and bit 27 are spare bits, unused within the present embodiment of the invention. The complemented signal output from CONFIGURATION REGISTER bit 24, the ripple enable bit, is inverted in IN1 logical elements 125*h*04 through 125*h*10 and supplied as signals (H) RIPPLE ENABLE (4) through (H) RIPPLE ENABLE (1) on lines 125*h*01 through 125*h*07 to the driver/receiver elements of the Versatile Bus Interface Logics. Signals (H) MASTER ONLY on line 125*h*09 and (L) MASTER ONLY on line 125*h*11 are respectively generated from the normal and inverted signal outputs arising from CONFIGURATION REGISTER bit 25, the master only bit. The CONFIGURATION REGISTER is loaded as a twenty-eight bit scan/settable shift register under the logical Low condition of signal (L) TEST-LOOP D on line 13713 and (L) $\phi$2 on line 13427. During each complete cycle time consisting of logically Low signals (L) $\phi$2 on line 13427 and (L) $\phi$1 on line 13401 a next most significant bit, from the most significant 0th one to the least significant 27th one, will be successively clocked into the CONFIGURATION REGISTER. The scan/set test loop signal output from the twenty-eight bit CONFIGURATION REGISTER is obtained as the clear side output signal of the least significant bit within slave register SR8 logical element 125*a*02 inverted by IN1 logical element 125*a*04 and supplied to the next successive scan/set test register as signal (H) LOOP D-CARRY 6 on line 125*a*01. Signals (L) CLEAR (4) on line 13321 and (L) CLEAR (2) on line 13317 are logically Low, such as accomplishes clearing of the configuration register, only during initialization of the Versatile Bus Interface Logics. If the present Versatile Bus Interface Logics were to be perpetually set at but a single, unitary configuration (thereby making the bus somewhat less than versatile) the necessity for a CONFIGURATION REGISTER could be obviated and such signals arising therein as are subsequently passed to configuration control signal translation functional logical subsection 86*a*34** could be simply hardwired to appropriate logical ground and voltage signals.

9.29. Configuration Translation

Figure 126A:
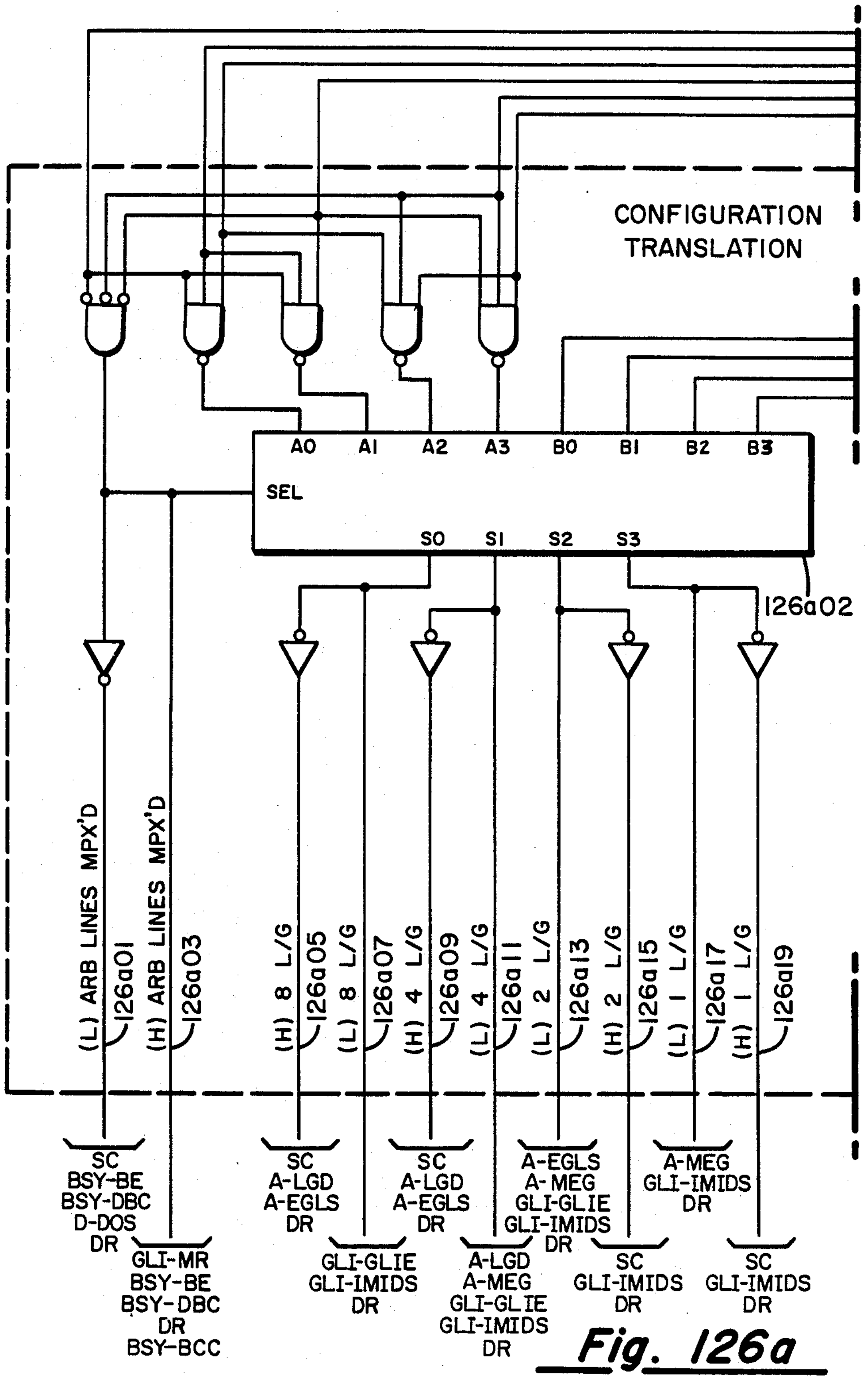
Figure 126B:
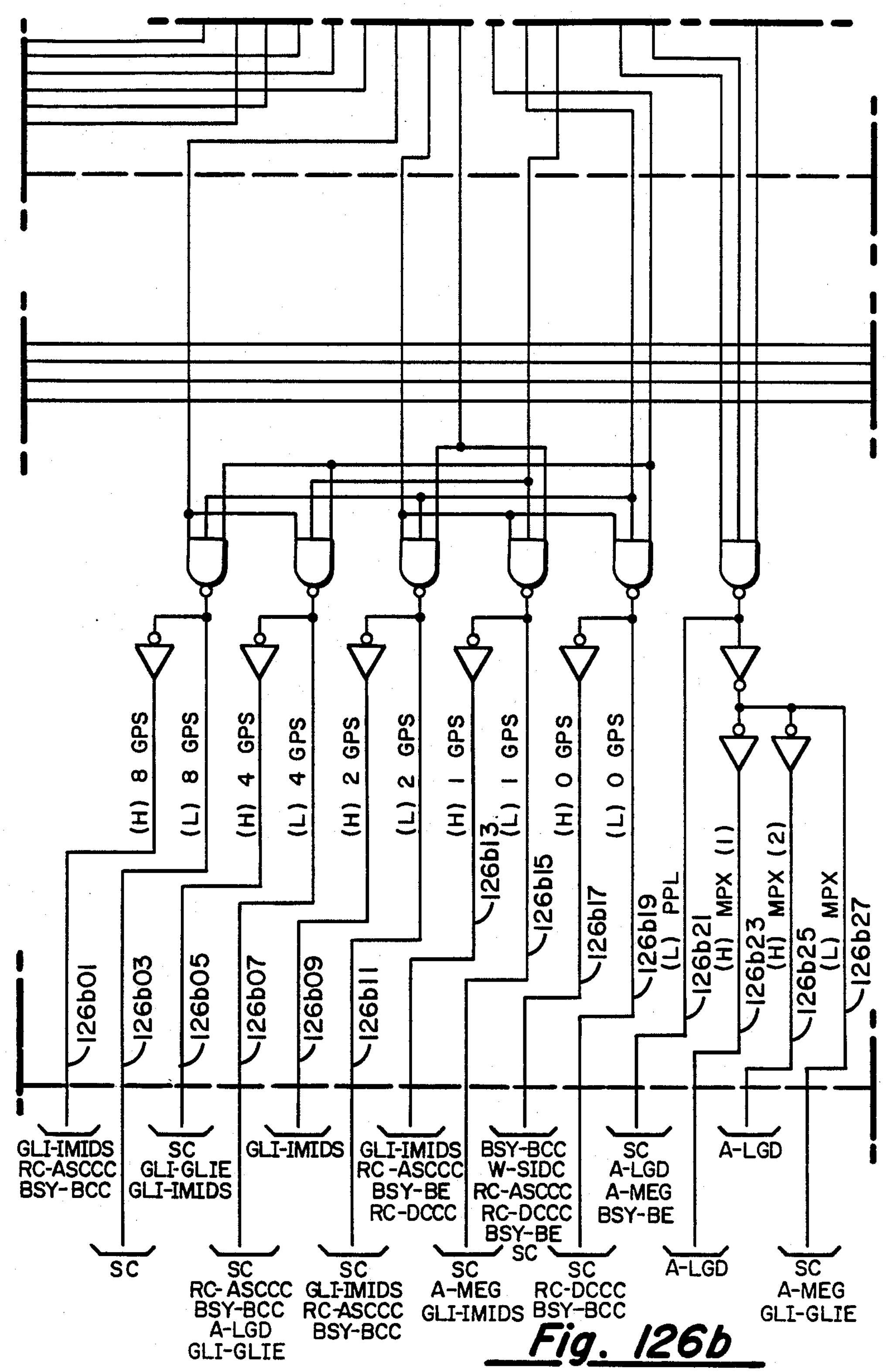
Figure 126C:
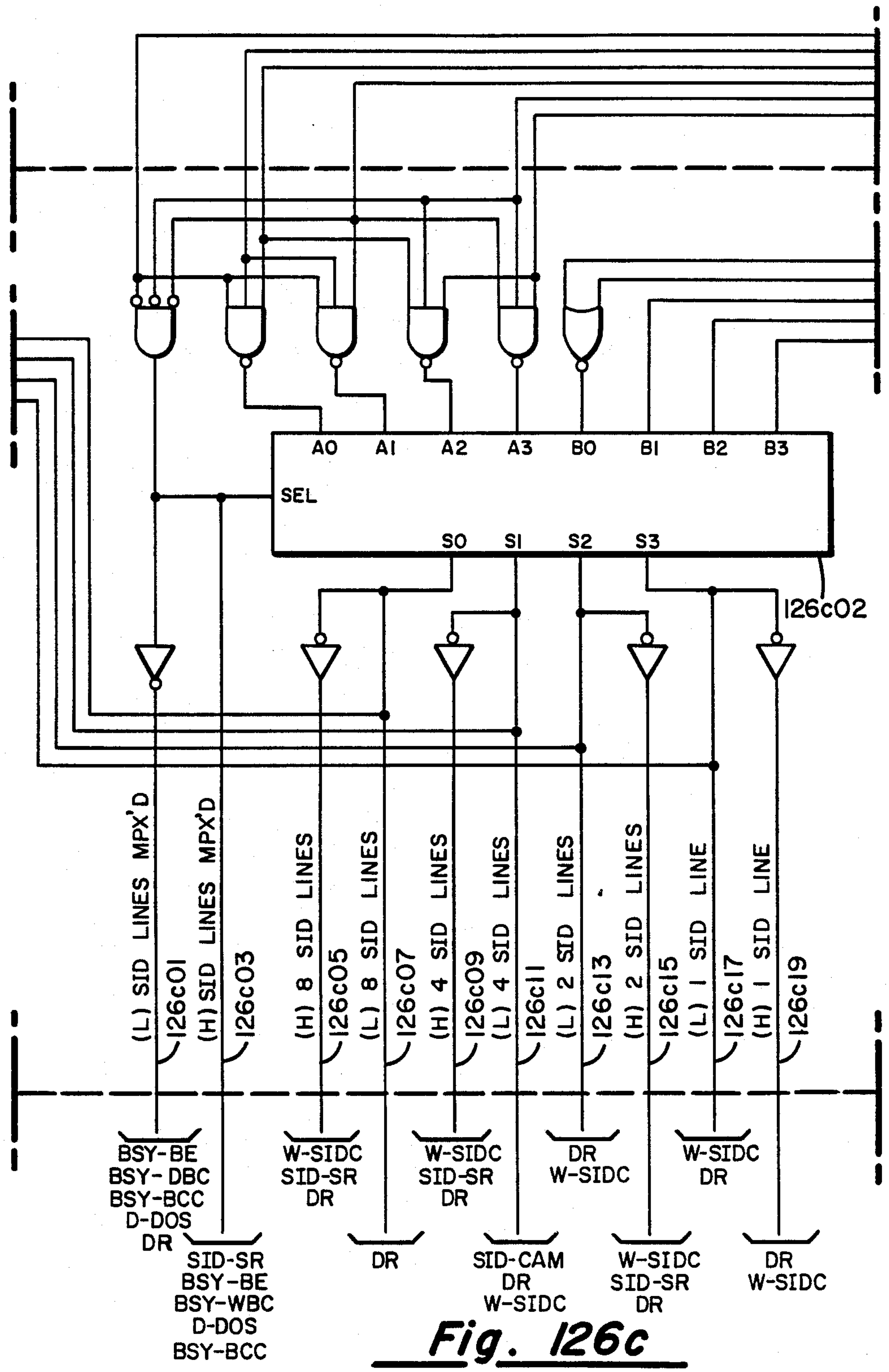
Figure 126D:
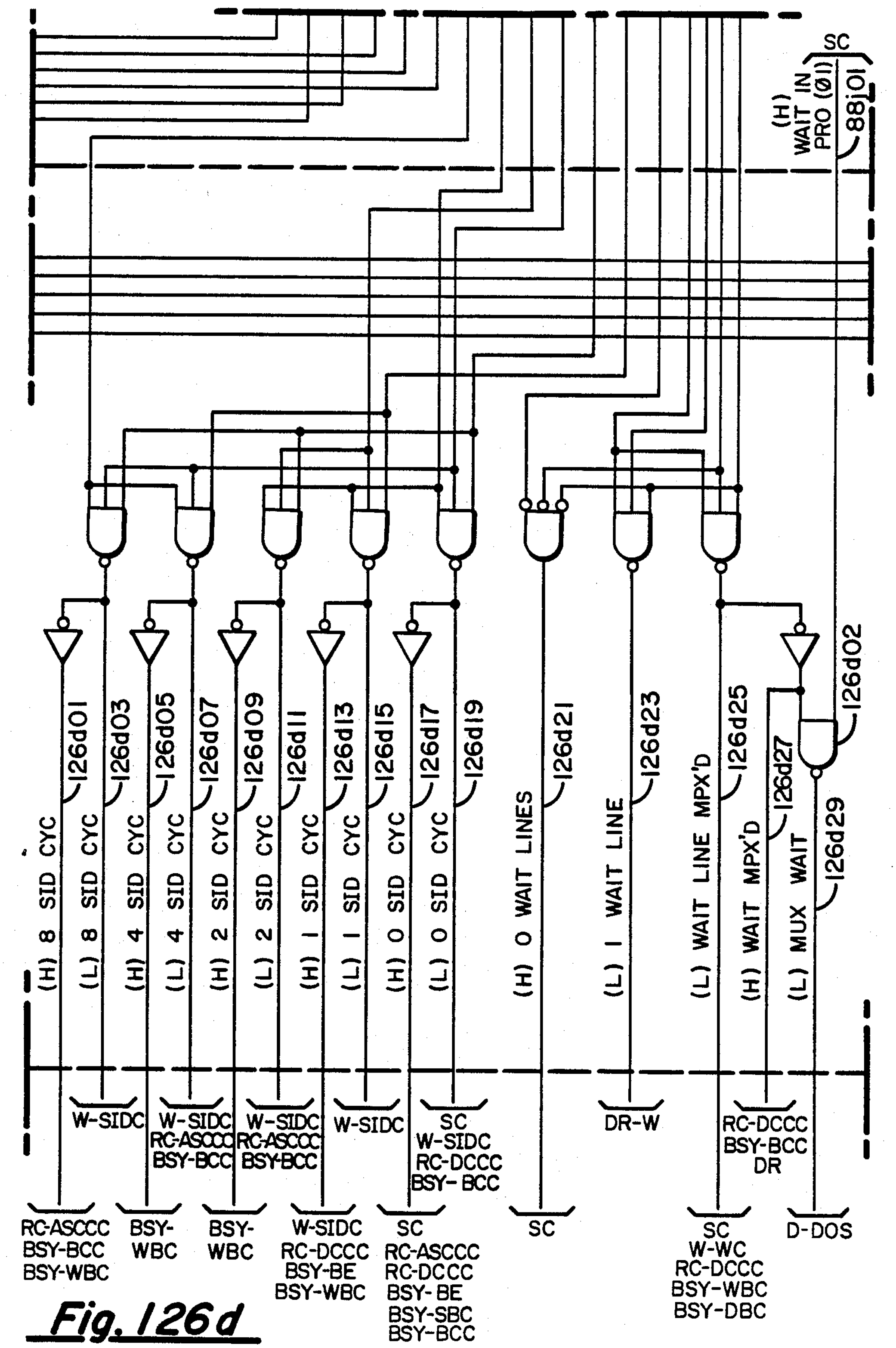
Figure 126E:
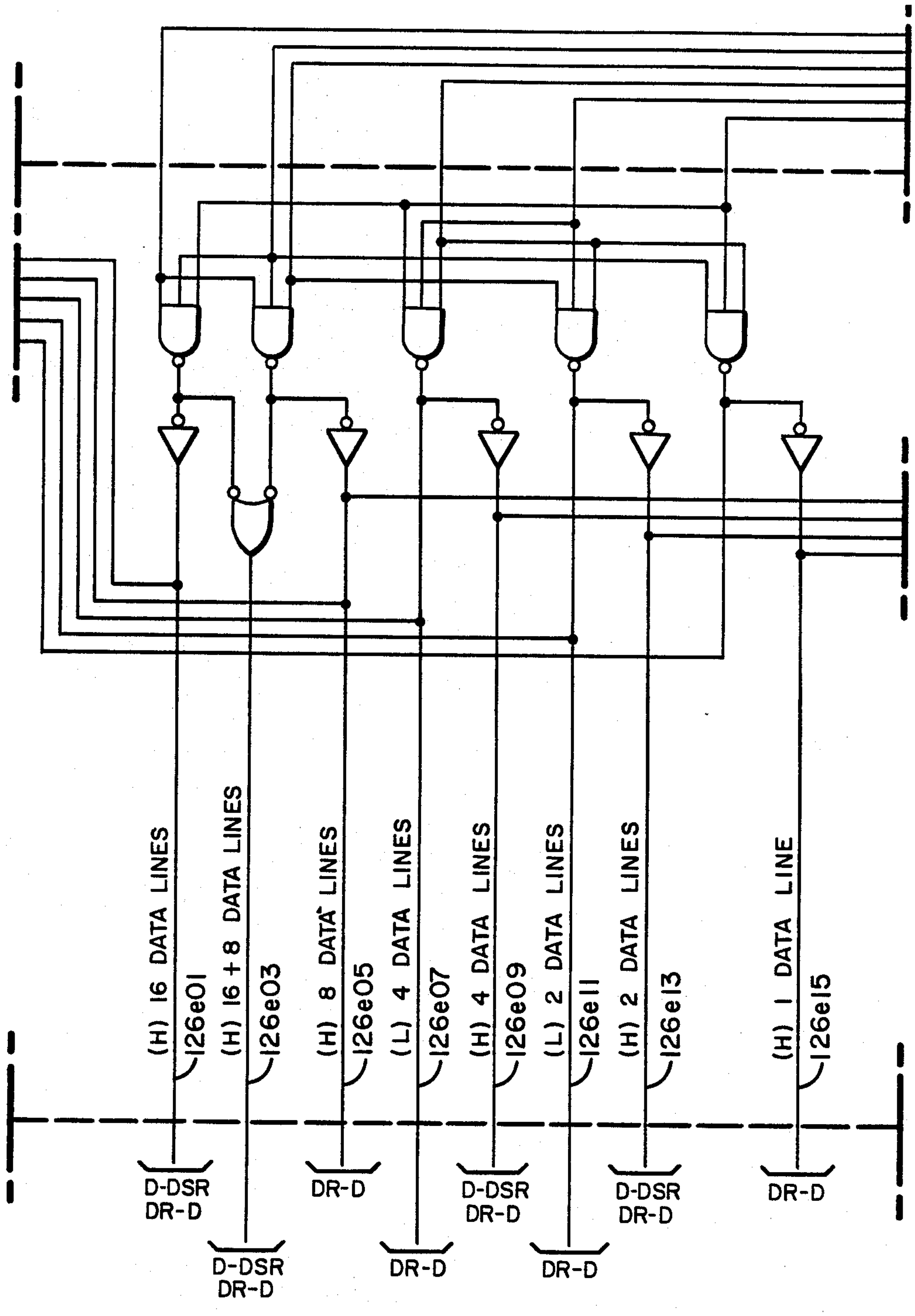
Figure 126F:
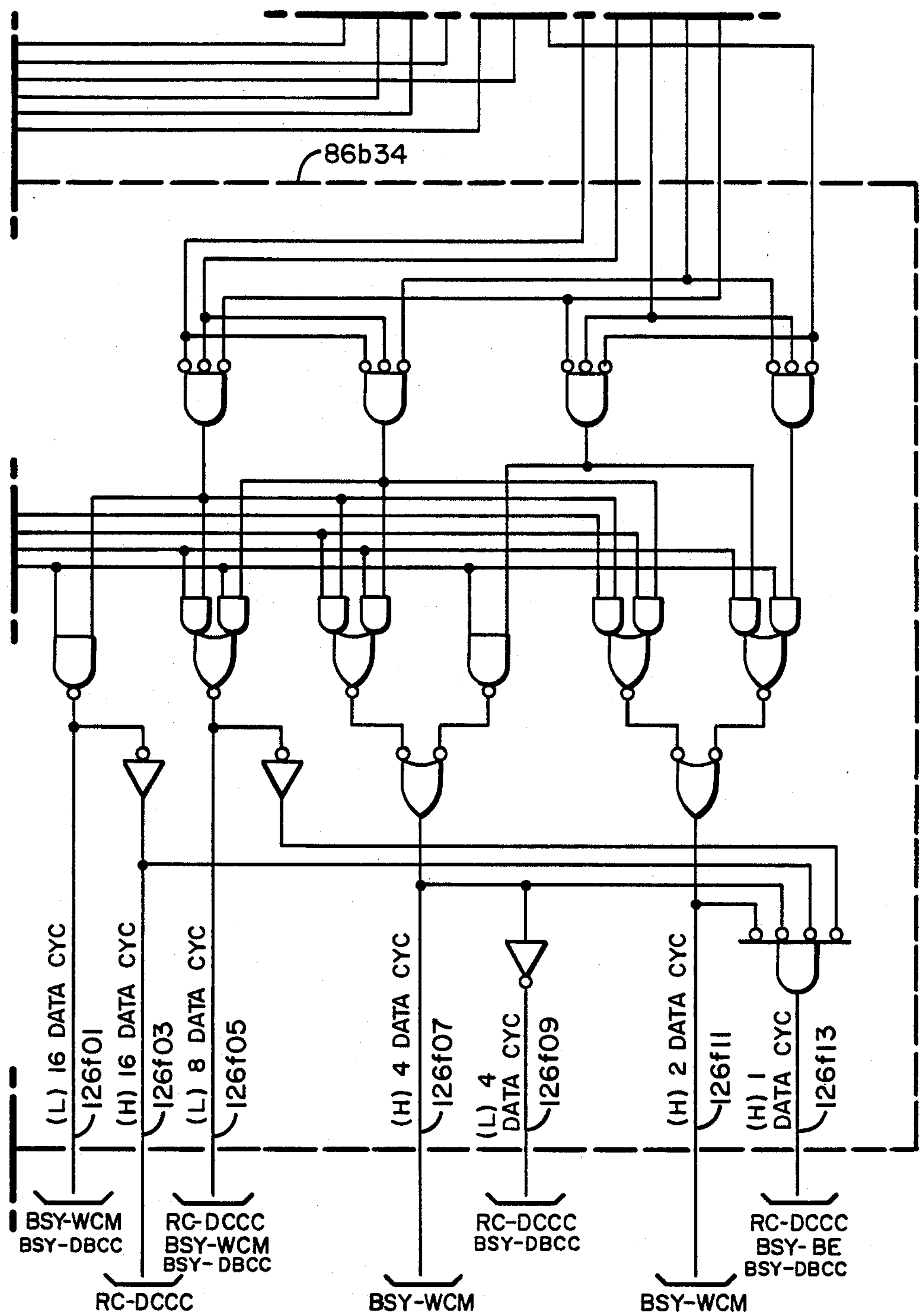

The CONFIGURATION TRANSLATION functional logical subsection, also called CONFIGURATION CONTROL SIGNAL TRANSLATION **86*b*34 part of CONFIGURATION CONTROL section 86*b*08, previously seen within the first level block diagram of FIG. 86*b*, is shown in FIG. 126, consisting of FIG. 126*a* through FIG. 126*f*. The CONFIGURATION TRANSLATION functional logical subsection 86*b*34 shown n FIg. 126 adjoins the CONFIGURATION REGISTER functional logical subsection 86*b*32 shown in FIg. 125. The first nine bits of the CONFIGURATION REGISTER, configuration register bits 0 through 8, such as concern the configuration of arbitration are translated within those logical elements of CONFIGURATION TRANSLATION functional logical subsection 86*b*34 which are shown in FIG. 126*a* and FIG. 126*b*. The next nine bits of the configuration register, configuration register bit 9 through configuration register bit 17, such as are concerned with the configuration of the slave identification/function and wait activities, are translated within those logical elements of the CONFIGURATION TRANSLATION functional logical subsection 86*b*34 which are shown in FIg. 126*c* and FIG. 126*d*. The next six bits of the configuration register, configuration register bit 18 through configuration register bit 23, such as are concerned with configuration of the data activity, are translated in those logical elements of the CONFIGURATION TRANSLATION functional logical subsection 86*b*34 which are shown in FIG. 126*e* and FIG. 126*f*. The manner by which each of the eight 3 bit fields of the CONFIGURATION REGISTER 86*b*32 should be interpreted in the development of the configuration translated signals is indicated in the table of FIG. 3. The combinatorial logical development of all such signals as are output from CONFIGURATION TRANSLATION functional logical subsection 86*b*34, which signals as are shown in FIG. 126*a* through FIG. 126*f*, is deemed to be obvious to a routineer in the computer sciences. Note, for example, that if signal (H) ARB LINES MPX'D on line 126*a*03 is logically High, indicating the pin-multiplexing of the arbitration activity on to the slave identification/function lines then signals (L) 8 SID lines on line 126*c*07, (L) 4 SID lines on line 126*c*11, (L) 2 SID lines on line 126*c*13, and (L) 1 SID line on line 126*c*17 will be gated within truncated 102 logical element 126*a*02 to provide the arbitration line per group configuration signals. This is because when the arbitration activity is configured, under control of configuration register bit 0 through 2 equaling binary 001, to be pin-multiplexed on to the slave identification/function lines, then the configuration for the number of arbitration lines is derived not from configuration register bits 0 through 2, the normal bits for configuration of arbitration group lines, but rather from configuration register bits 9 through 11, such as normally configure the slave identification/function lines. Similarly, in the event that slave identification/function activity is configured to transpire pin-multiplexed upon the data lines, signal (H) SID LINES MPX'D on line 126*c*03 will, when logically high, cause the selection of the configuration register derived translation of the number of data lines to be selected in truncated 102 logical element 126*c*02 for transmission as the configuration translation signals concerning the number of slave identification/function lines. If both the activities of arbitration and slave identification/function are configured pin-multiplexed to transpire upon the data lines, then those data line configuration translation signals shown as generated within FIG. 126*e* will be selected within the truncated 102 logical element 126*c*02 as shown within FIG. 126*c* and again within the truncated 102 logical element 126*a*02 as shown in FIg. 126*a*. As a final feature of the configuration translation functional logical subsection 86*b*34, signal (H) WAIT MPX'D on line 126*d*27 is a standardly derived configuration translated signal whereas signal (L) MUX WAIT on line 126*d*29 represents the timed gating of such signal (H) WAIT MPX'D on line 126*d*27 in NO2 logical element 126*d*02 by ligically High signal (H) WAIT IN PRO $\phi$1 on line 88*j*01. Signal (L) MUX WAIT on line 126*d*29, a timed signal involved in the pin-multiplexing of the wait activity on to the most significant data line, is distributed to S12 logical element 12404, part of DATA OUTPUT SELECTOR functional logical subsection 86*b*22 as previously seen within FIG. 124** in order to effectuate the pin-multiplexing of the wait activity onto the most significant data line.

9.30. Driver/Receivers

The thirty-seven replications of the Driver/Receiver standard cell previously seen within FIG. 82, such as occur within the Versatile Bus Interface Logics are represented, in the following 128 through FIG. 130, in three logical sections. The sectional divisions of the representation of each Driver/Receiver cell are illustrated in FIG. **127*a* through 127*c*. The pin numbers of each sectional representation, DR(X)A shown in FIG. 127*a*, DR(X)B shown in FIG. 127*b*, and DR(X)C shown in FIG. 127*c*, may be associated with the entirety of the pin numbers for the Driver/Receiver standard logical cell shown in FIG. 82. The division of the Driver/Receiver cell into three logically related subsections is necessary so that manageable wire routing densities are achievable within the logic diagrams of FIG. 128 through FIG. 130. Direct comparison of each of the sectional representations shown in FIG. 127*a* through FIg. 127*c* should be made to the overall Driver/-Receiver cell illustrated in FIG. 82. The sectional representation of DR(X)A shown in FIG. 127*a* incorporates the ports to the Driver/Reciver of DATA OUT on pin 21, DATA IN on pin 20, and the interconnection signal line to the Versatile Bus on pin 10. Additionally, the GROUND OR ENABLE SHORT TEST pin 19 is shown associated with this section of the Driver/-Receiver element. Five signals from the next least significant Driver/Receiver elements are received on pins 1 through 5 and a like correspondence of 5 signals are transmitted to a next most significant Driver/Receiver element on pins 11 through 15. The utilization of all such signals as connect to the DR(X) functional section of the Driver/Receiver element shown in FIg. 127*a*** should be reviewed in FIg. 82 and the accompanying text.

The second section of the Driver/Receiver elements represented as DR(X) shown in FIg. 127*b*, will be associated with the gathering of detected single and double faults, as are respectively output on pins 17 and 16, and which are gathered in a tree structure for detection of overall fault within each operating Versatile Bus Interface Logics. The RIPPLE ENABLE input on pin 18 will be a ripple shifted error compensation alignment input to each such DR(X)B section. Finally, the gated Clock $\phi$2 which will cause each Driver/Receiver element to drive information upon the Versatile Bus is supplied to DR(X)B on pin 28.

The DR(X)C logical section of the Driver/Receiver element shown in FIG. 127*c* is concerned with the reception of clear and clock signals at such Driver/-Receiver element and the alignment, occurring under signals received at pins 6 through 9, of the Driver/-Receiver element for Scan/Set Test. Pin 27 supplies a test function gated Clock $\phi$2 pulse to the Driver/-Receiver element. The sectional representation of each of the thirty seven Driver/Receiver cells as will be shown in FIG. 128 through FIG. 130 may be referenced to the like format form as shown in FIg. 127*a* through FIG. 127*c* and thence to the individual Driver/-Receiver cell schematic as shown in FIG. 82 in order that the detail utilization of each signal interconnect may be understood.

The ordering of the thirty-seven Driver/Receiver elements utilized within the preferred mbodiment implementation of the invention is shown within the table of FIG. 127*d*. Each unique Versatile Bus signal function as is respectively handled by ech of the thirty-seven Driver/Receivers is assigned an arbitrary Versatile Bus pin number. Of course, such pin needs not actually be used in any integrated circuit packaging of a very large scale integrated circuit substrate containing the present apparatusif the associated signals are not desirous of being utilized in any configurations to which the Versatile Bus interface logics of the contained device will conceivably be set. In the ultimate pin degenerate mode only signal BEGIN, signal DATA LINE 0, and signal BUSY need be connected for the implementation of a Versatile Bus intercommunication structure. Such a ultimately pin-degenerate connection can, under pin-multiplexing, support the bus activities of arbitration and slave identification/function as well as data. Communication bandwidth is thusly more limited by the pin degenerate modes than communication flexibility, and the open line error detection/single failed line error compensation capability of the Versatile Bus as is implemented in connected signals odd parity and even parity is sacrificed when these connections are eliminated.

9.30.1. Driver/Receivers-Part A-Data Flow

The Driver/Receiver elements, Part A, as are concerned with the data flow through such Driver/Receivers to and from Versatile Bus 86*a*01 are shown in FIG. 128, consisting of FIG. 128*a* through FIG. 128*l*. Each Driver/Receiver element A, DR1 A 128*a*02 through DR37 A 128104, is shown to be connected in a like manner to the representation of the DR(X)A is to the Versatile Bus 86*a*01 and is labeled with the functional signal name carried upon each line. Three signal ports carrying signals both to and from the DR(X)A elements are shown at the top of each such element. This is, of course, different from the normal logical convention wherein signals are received at the top of a logical element and output only at the bottom of such logical element. In a like manner to FIG. 127*a*, each Driver/-Receiver element is seen to be connected by five signal lines on its left side and five signal lines on its right side to and from Driver/Receiver (X)A logical elements of lesser and greater significance. It is suggested that FIG. 127*a* and 82 be simultaneously referred in interpretation of the interconnections of DR(X)A elements as are shown in FIG. 128.

Figure 128A:
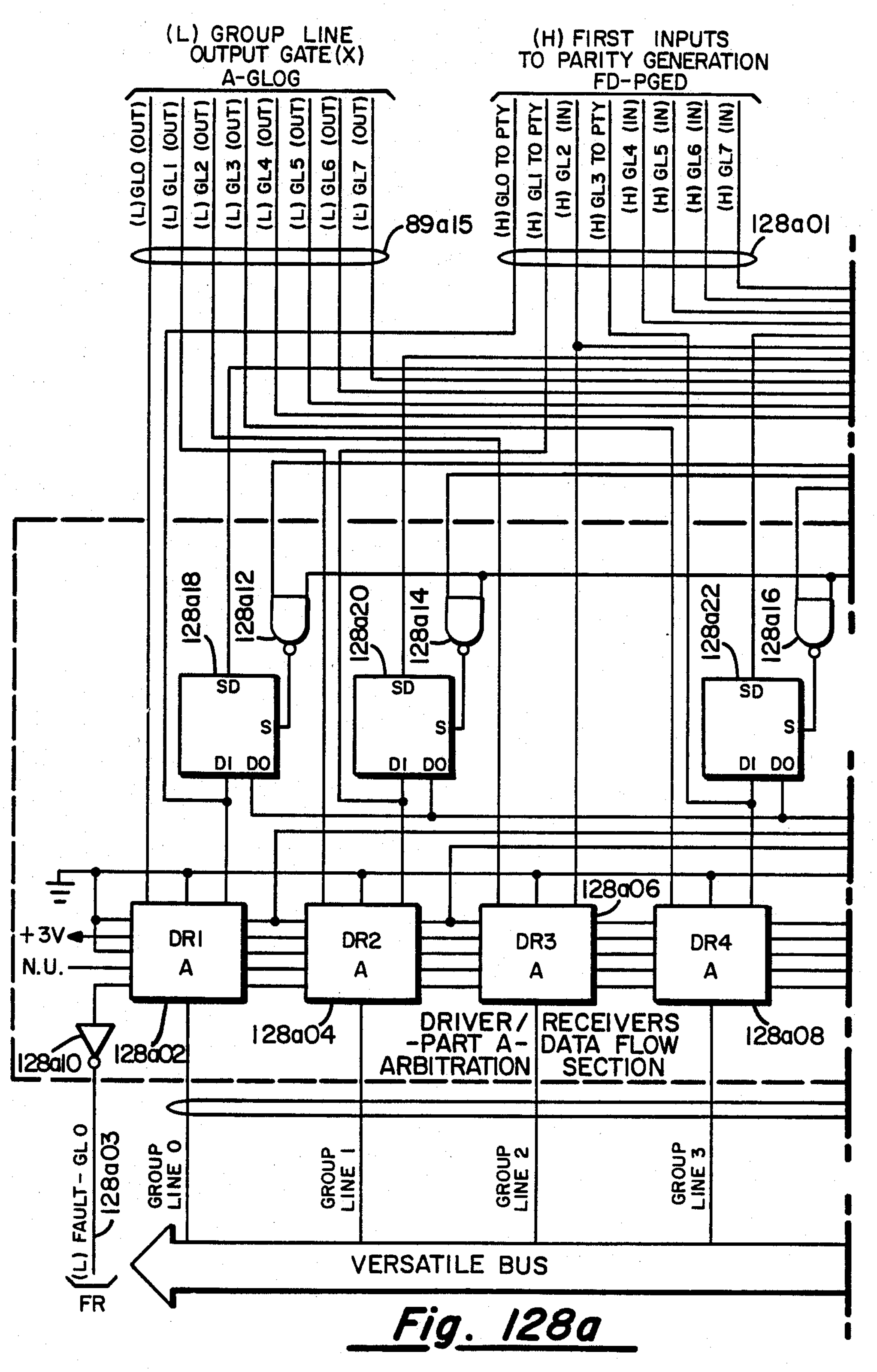
Figure 128B:
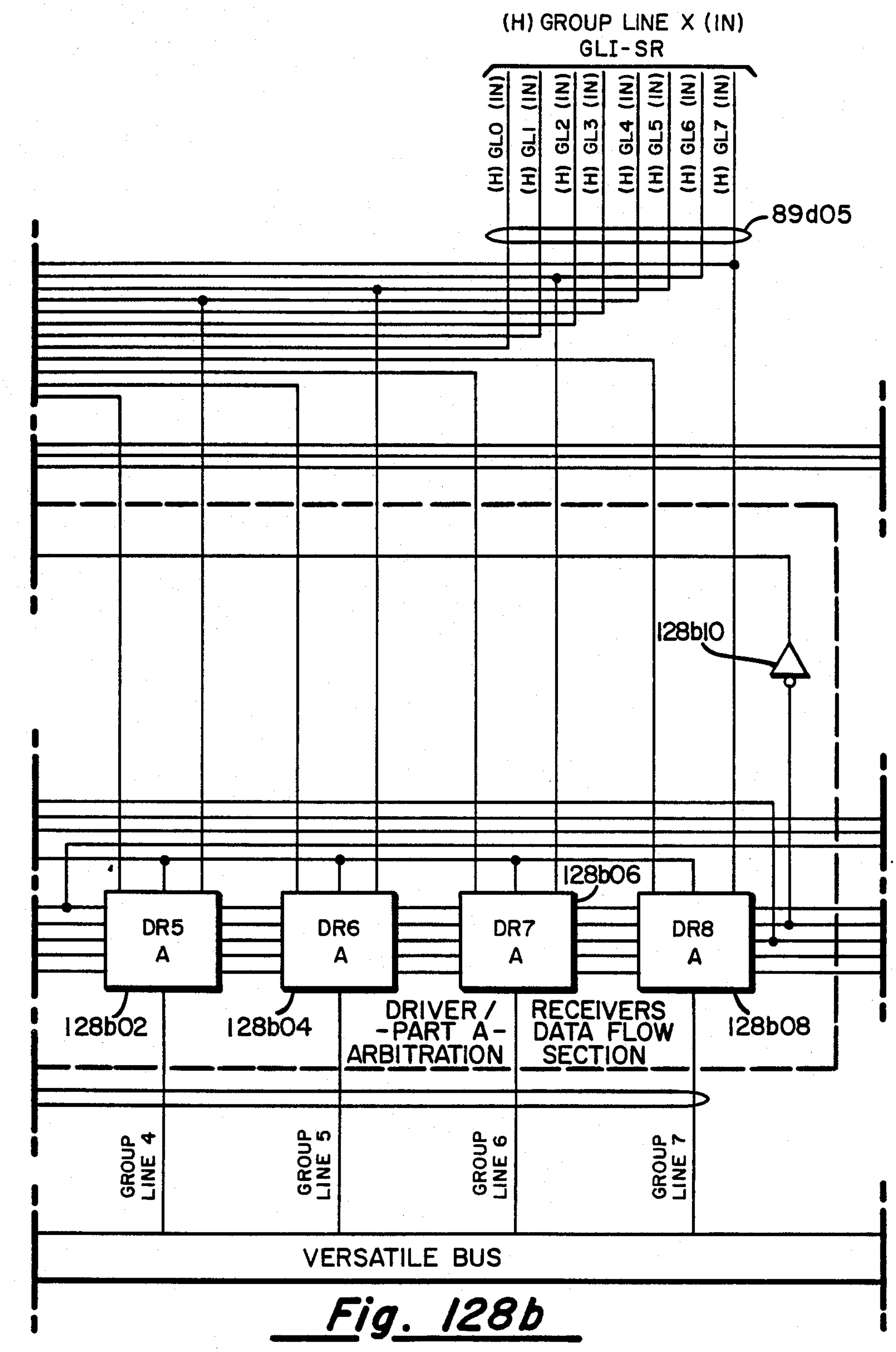
Figure 128C:
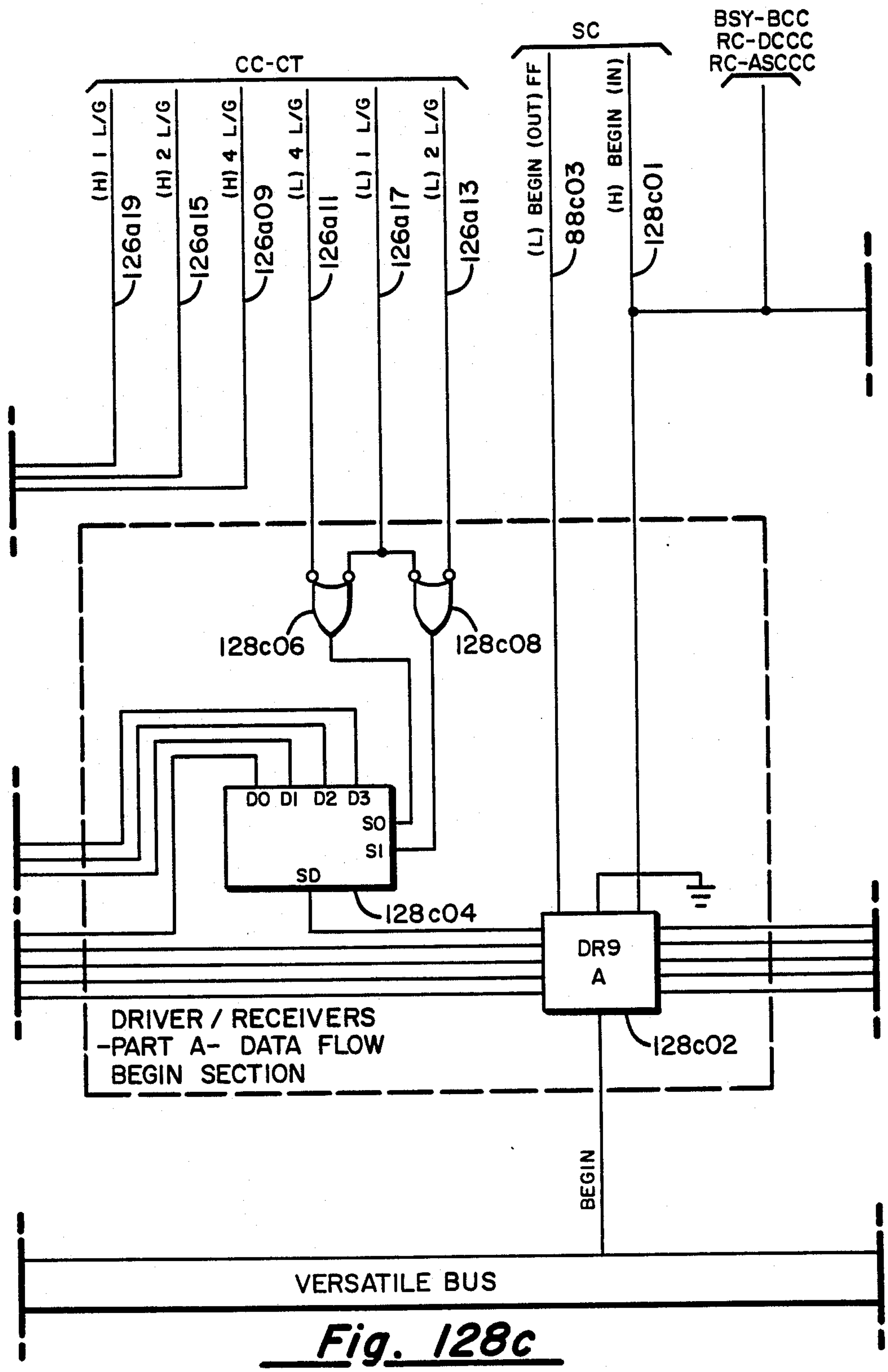
Figure 128D:
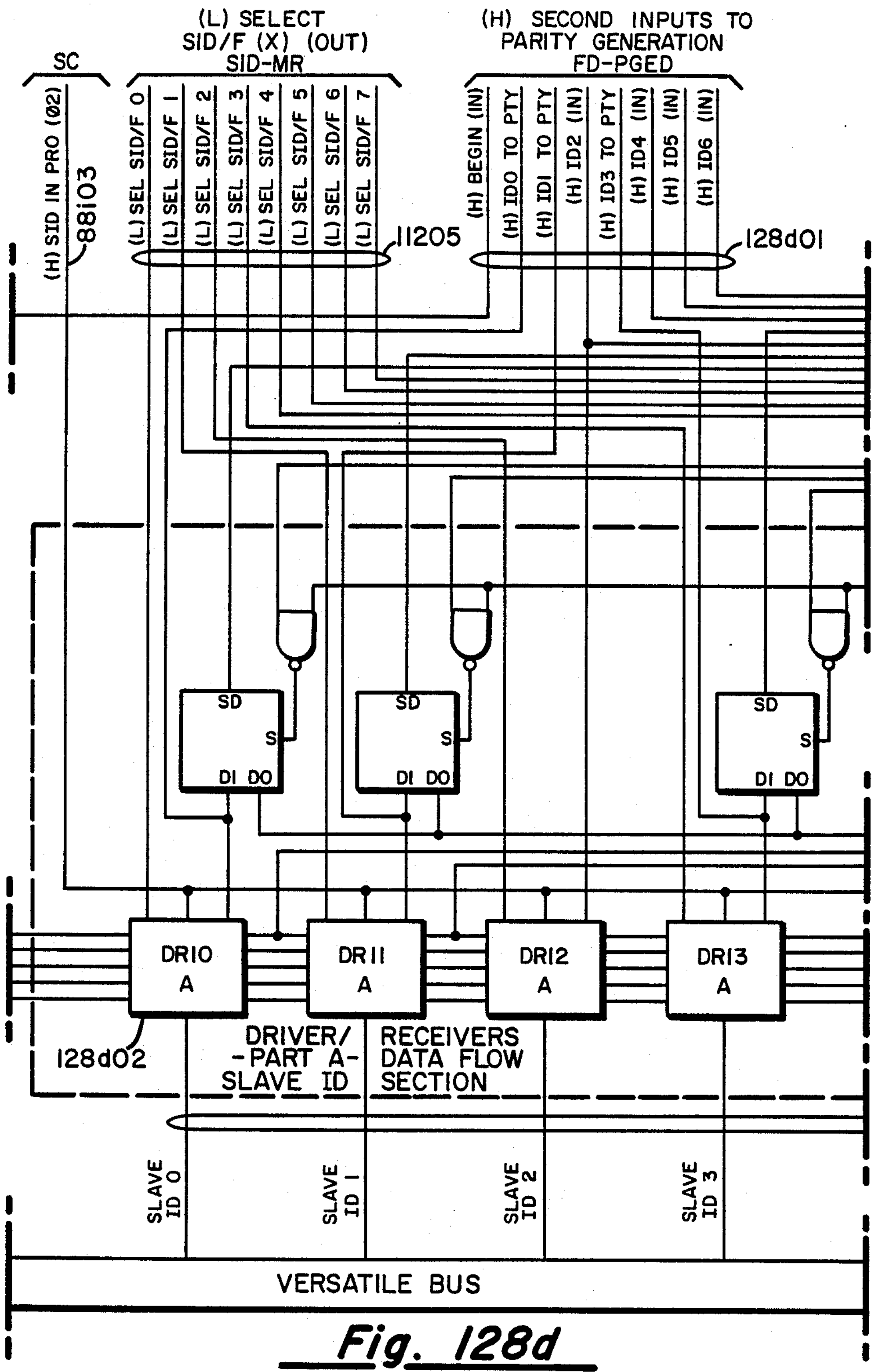
Figure 128E:
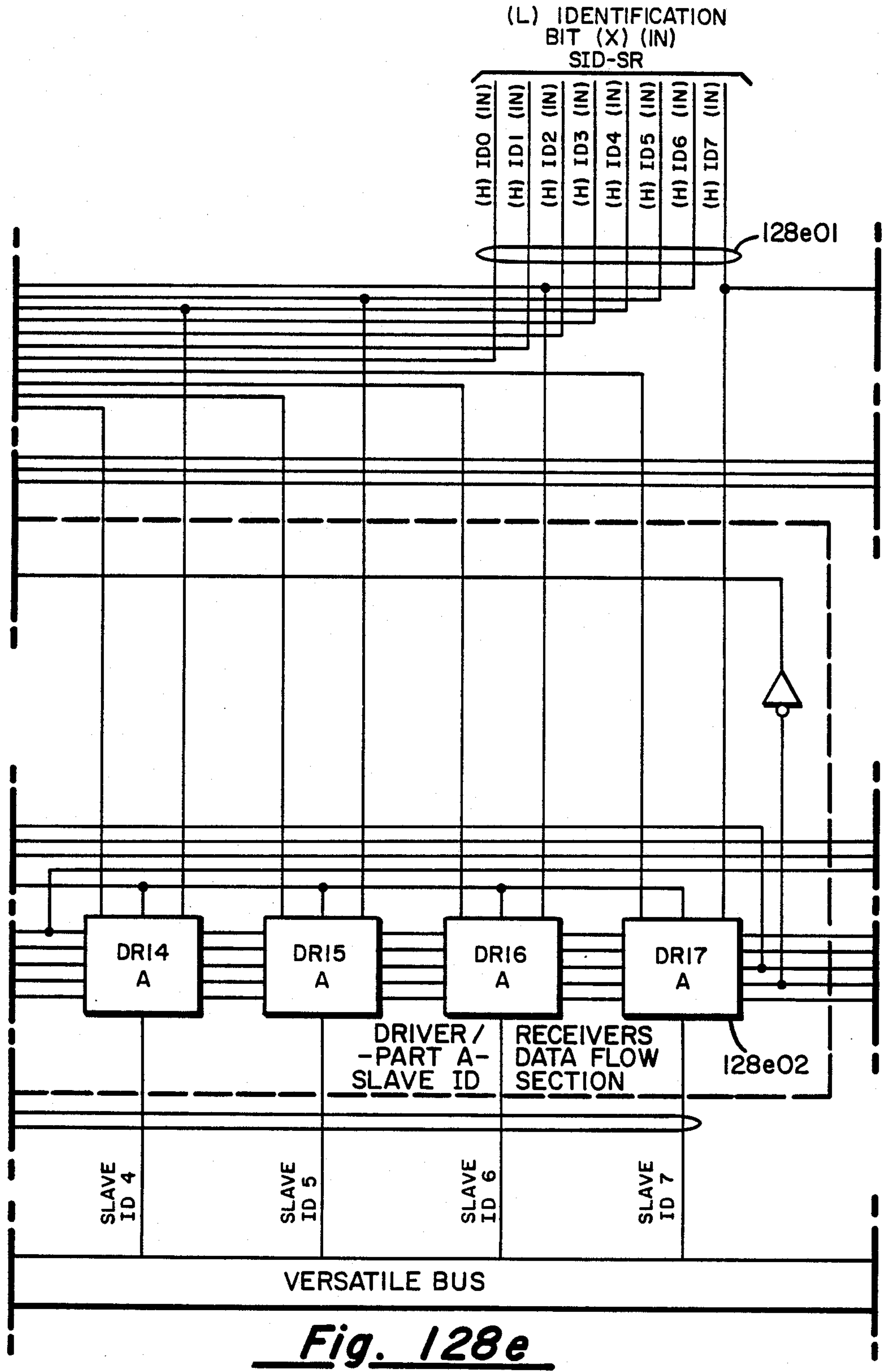
Figure 128F:
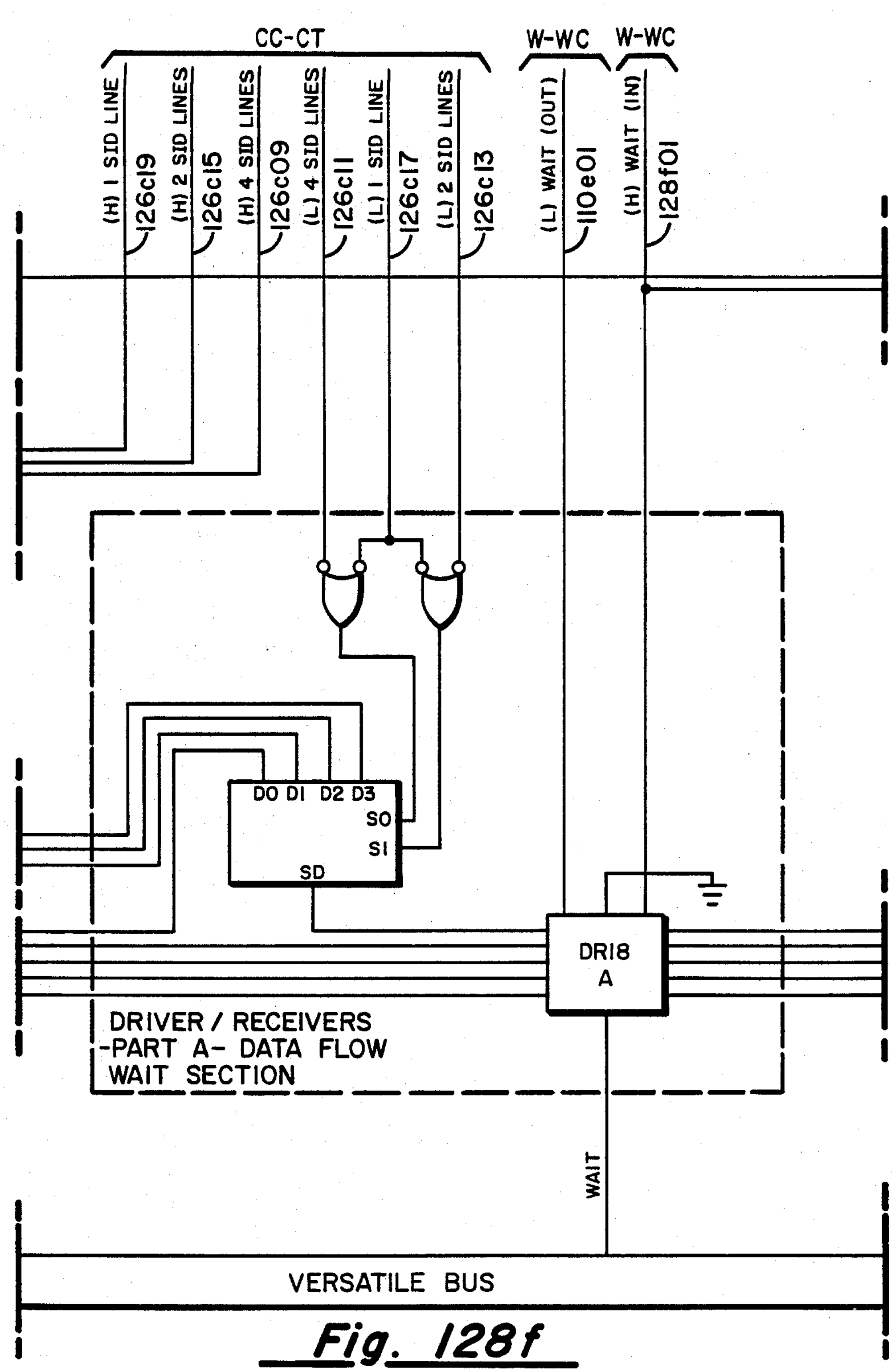
Figure 128G:
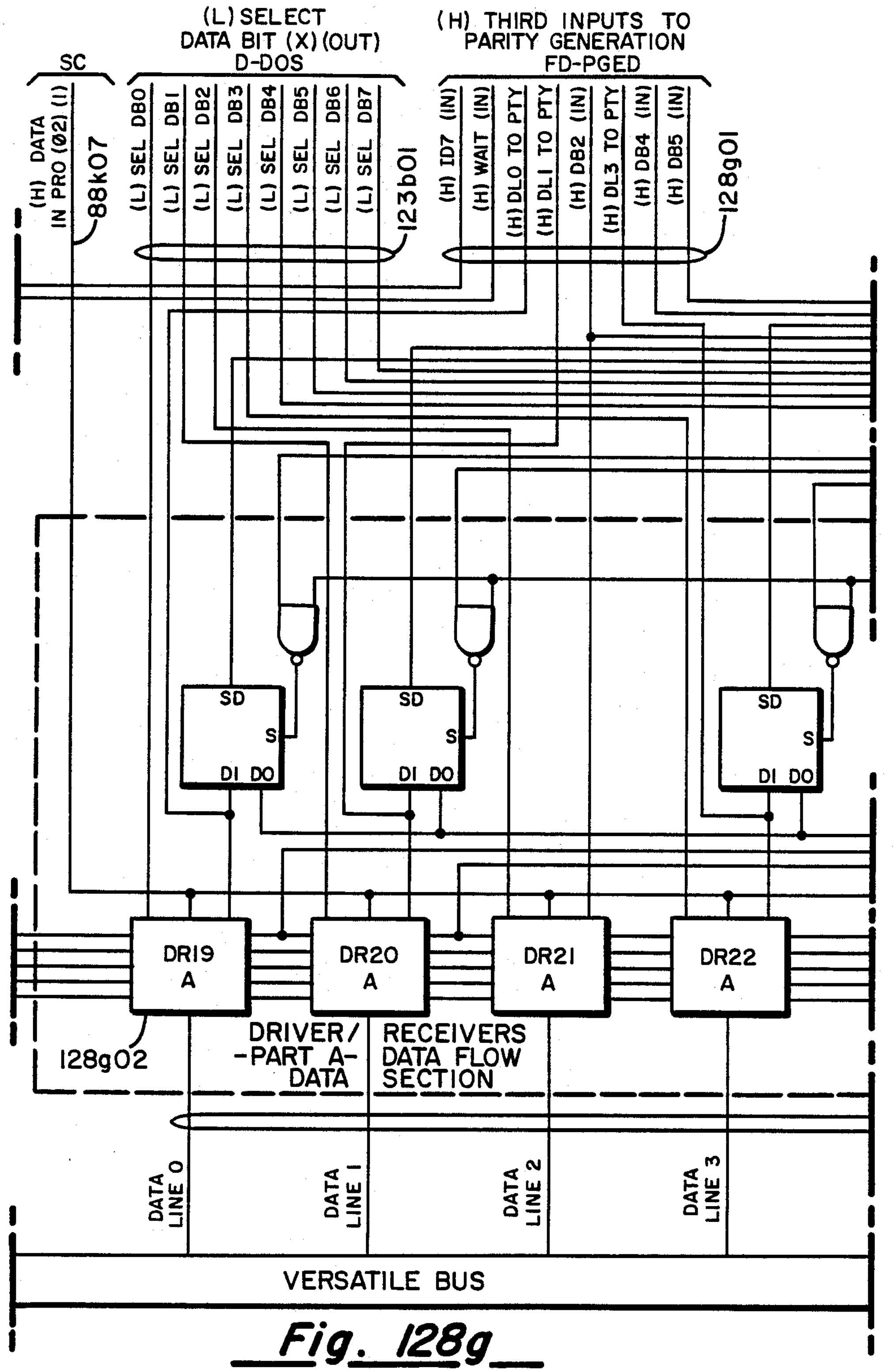
Figure 128H:
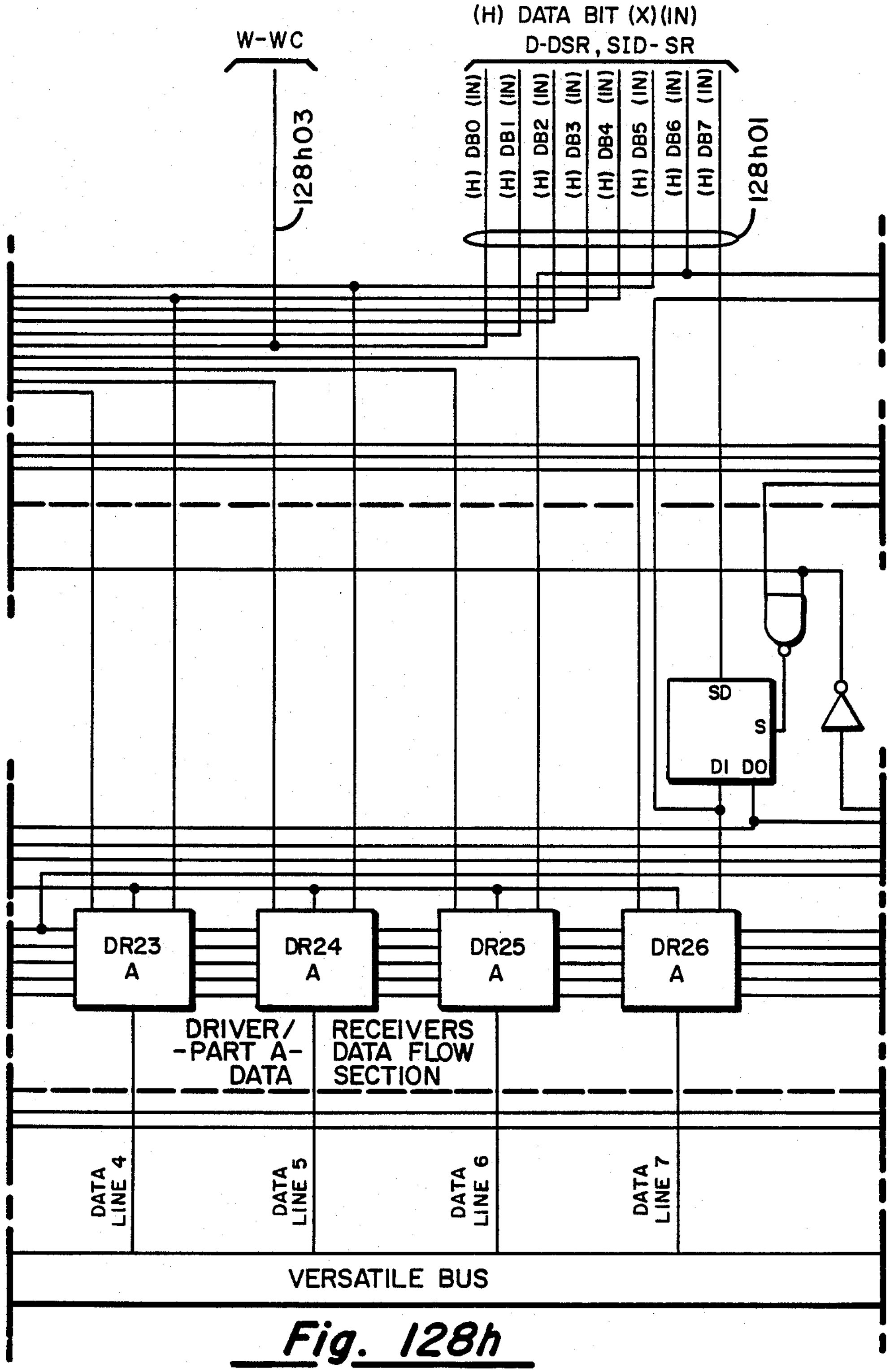
Figure 128I:
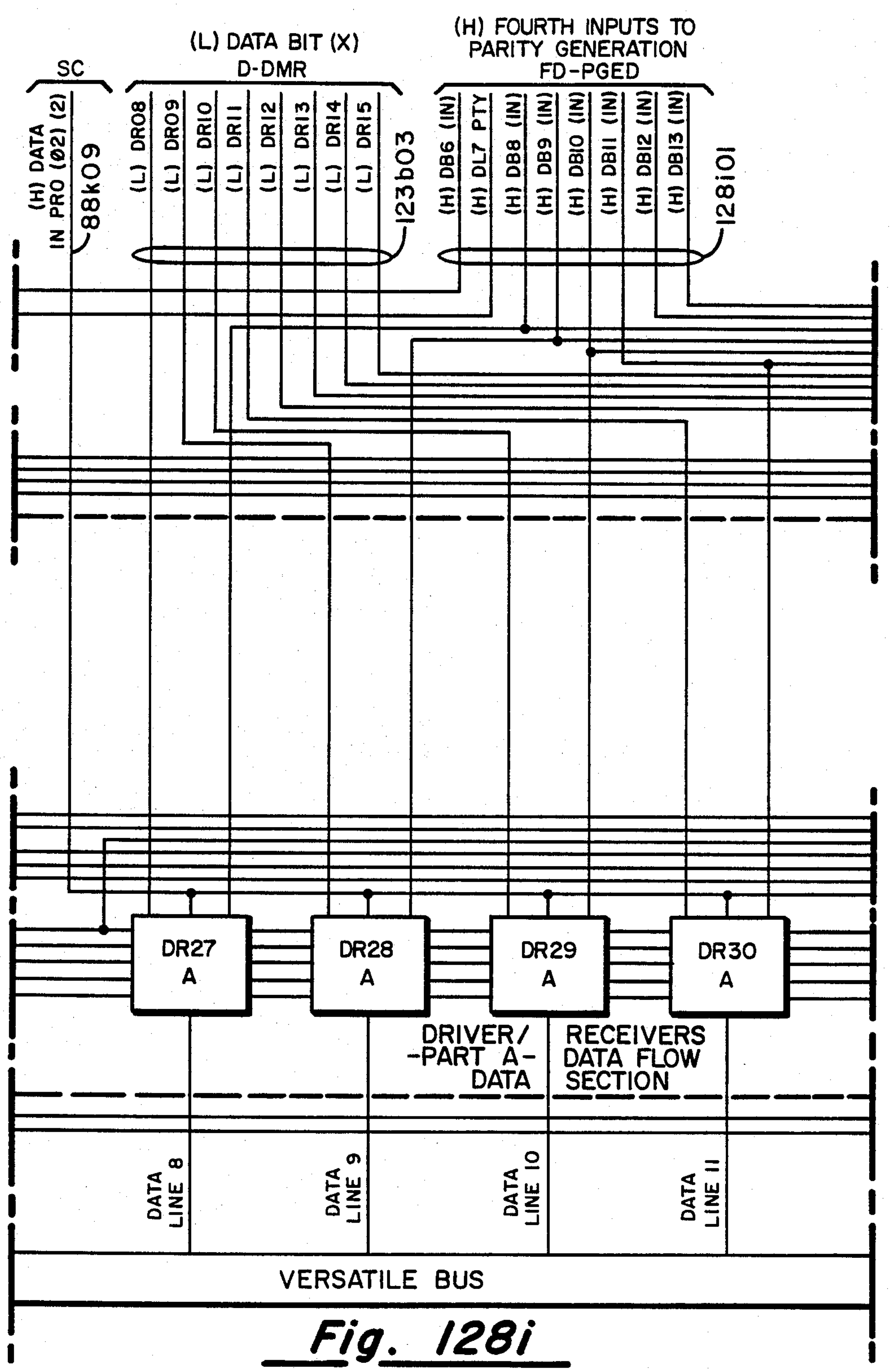
Figure 128J:
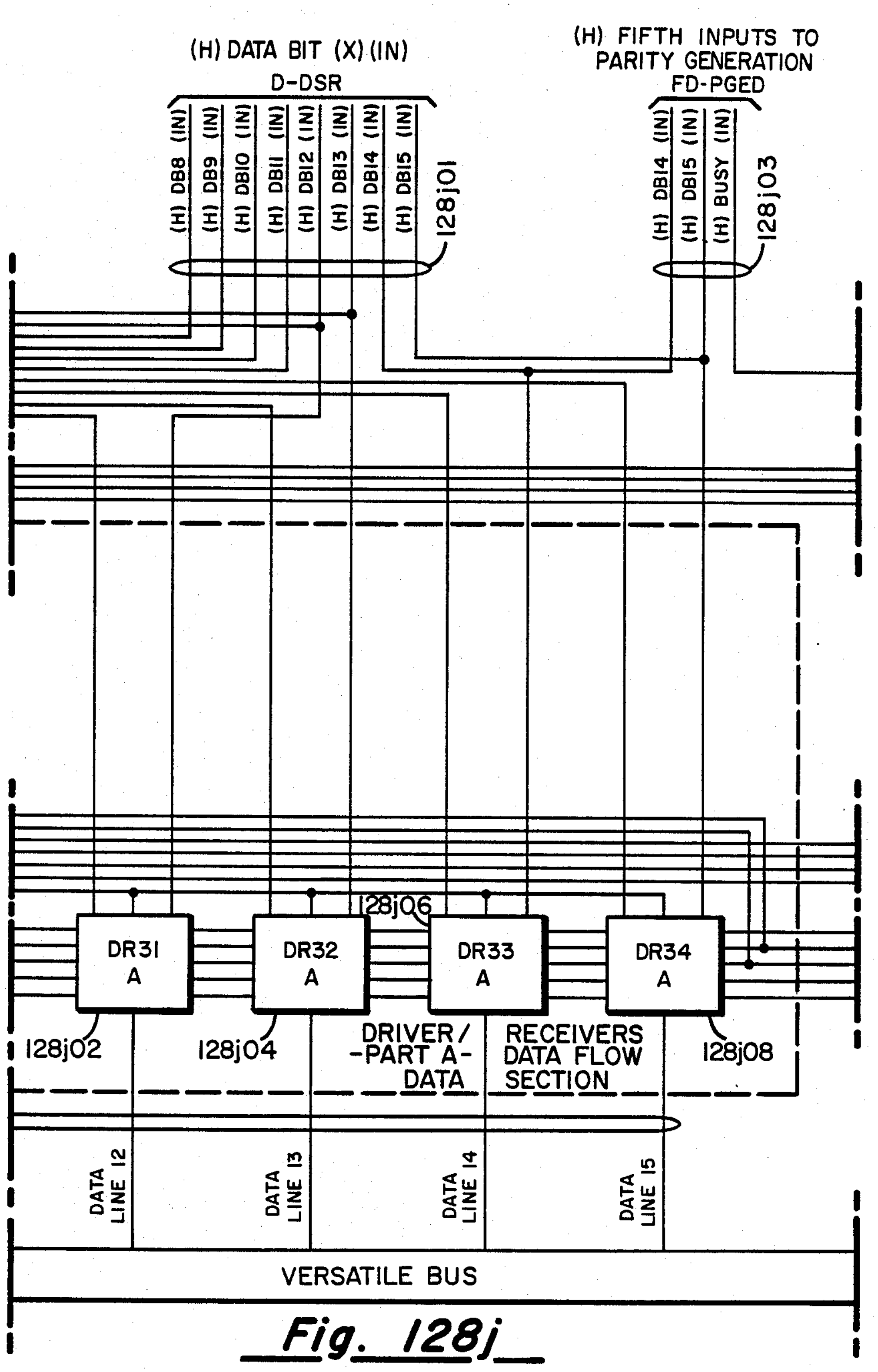
Figure 128K:
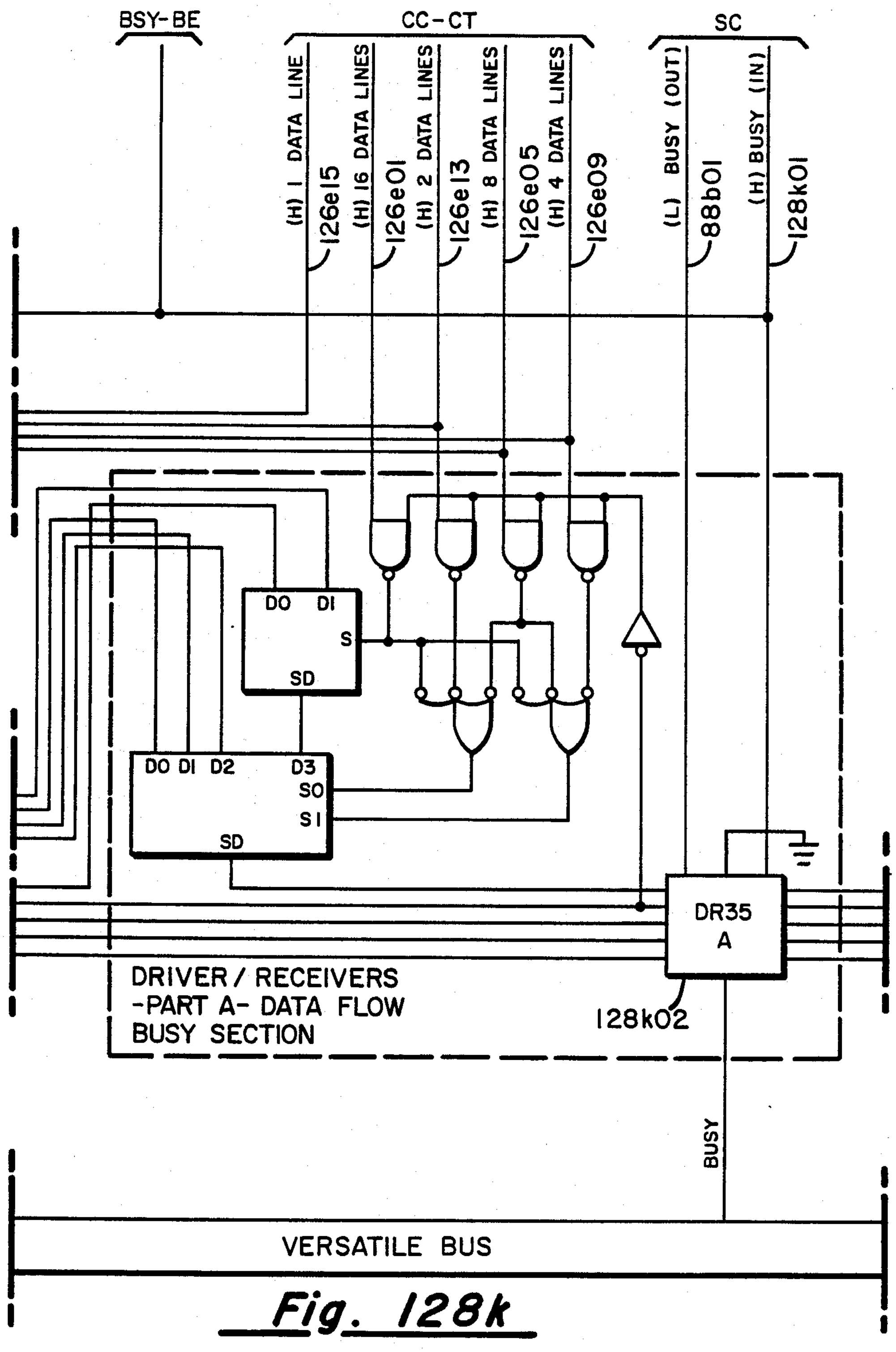

Commencing with a sample DR(X)A one of the thirty-seven such Driver/Receiver element's section A in FIG. 128 through FIG. 128*l*, DR9 A 128*c*02 shown in FIG. 128*c* handles the BEGIN line upon the Versatile Bus. Signal (L) BEGIN (OUT) FF on line 88*c*03 is received as the signal from remaining Versatile Bus Interface Logics which will cause this Driver/Receiver element, upon the receipt of a gated clock pulse as will be seen in conjunction with FIG. 127*c*, to drive the BEGIN signal line upon Versatile Bus 86*a*01. The received status of the BEGIN line upon Versatile Bus 86*a*01 during each clock $\phi$2 is supplied by DR9 A 128*c*02 to the remaining Versatile Bus interface logics as signal (H) BEGIN (IN) on line 128*c*01. By momentary reference FIG. 82*b*, it may be seen that pin 19 as receives SIGNAL H=EN. SHORT TEST −PIN N is grounded, thereby disabling the implementation of the short test upon the BEGIN line. This is necessary because, as with arbitration, wait, the BUSY signal, and parity, no signal Versatile Bus interface logics can have exclusive control over these wired-OR signal lines. By comparison to FIG. 82, it may be noted that the DATA, CARRY, AND FAULT SIGNALS as are received from, and output to, Driver/Receiver elements respectively of lesser and greater significance respectively connect DR9 A 128*c*02 to DR8 A 128*b*08 and DR10 A 128*d*02.

Referring to FIG. 128*a* through FIG. 128*c* in unison, the logical structure involving S12, NA2, IN1, and S14 logical elements as is seen above DR1 A 128*a*02 through DR9 A 128*c*02 is involved with the selection of the appropriate input and output signals when the bus is in a ripple shifted error compensation condition. In the event of the full width configuration of the ARBITRATION activity to transpire upon eight group lines, and later the slave identification/function activity to transpire upon eight slave identification/function lines and the data activity to transpire upon 16 data lines, absolutely no compensation needs transpire outside of the Driver/Receiver elements themselves, DR1 A 128*a*02 through DR37 A 128104, in order to encompass that each signal received from and transmitted to remaining Versatile Bus interface logics will be properly located during ripple shifted error compensation alignment. The nature of the signal ripple-switched cross-interconnect within the transfer gates as shown in FIG. 82*b* should be reviewed to note that signal flow to and from remaining Versatile Bus interface logics is identical regardless of the alignment of the 37 Driver/Receiver elements in the ripple shifted error compensation condition. If, however, a Versatile Bus is not fully interconnected upon 37 pins, such as by not even providing metalization to DR3 A 128*a*06 through DR8 A 128*b*08 in the example of limiting arbitration to transpire solely upon group line 0 and group line 1, then the flow of ripple shifted data between the Driver/Receiver elements must be altered to bypass physically missing interconnective lands and/or pins. The manner by which the ripple shifted data interconnect should be altered in the event of unused, unconnected Driver/Receiver elements is as follows: Note by reference to FIG. 127*a* and FIG. 82*b* that the uppermost right side signal output from each of the DR(X) A logical elements is the ripple shifted data output signal. Note that the signal at this location as is generated within DR1 A logical element 128*a*02, DR2 A logical element 128*a*04, DR4 A logical element 128*a*08, and DR8 A logical element 128*b*08 are collected in 1 of 4 Selector S14 logical element 128*c*04. Therein these four signals, as respectively represent the received arbitration information from group line 0, group line 1, group line 3, and group line 7, are selected amongst in accordance with configuration translation of signals (L) 4 L/G on line 126*a*11, (L) 1 L/G on line 126*a*17, and (L) 2 L/G on line 126*a*13 as accomplished by NA2 logical elements 128*c*06 and 128*c*08. The signal selected within 1 of 4 Selector S14 logical element 128*c*04 is transferred to DR9 A logical element 128*c*02 in that position which, by momentary reference to FIG. 127*a* and FIG. 82*a*, is seen to be the location of the receipt of the ripple shifted data input. Ergo, if arbitration is configured to transpire at less than eight arbitration group lines, potentially physically missing arbitration group line interconnections will be bypassed in the ripple shifted error compensation data exchange between Driver/Receiver elements. For the receipt of data in a ripple shifted error compensation condition, note, by reference to FIG. 82*a* and FIG. 127*a*, that the RIPPLE CARRY signal from DR9 A logical element 128*c*02 is inverted in IN1 logical element 128*b*10 and applied to NA2 logical elements 128*a*12 through 128*a*16. Meanwhile, again by reference to FIG. 82*a* and FIG. 127*a*, the ripple shifted data output from DR9 A logical element 128*c*02 is applied to the data zero, D0, input of each of 1 of 2 Selector S12 logical elements 128*a*18 through 128*a*22. As the data 1, D1, input signal each such 1 of 2 Selector S12 logical element 128*a*18 through 128*a*22 repectively receives the input signals received through DR1 A 128*a*02, DR2 A 128*a*04, and DR4 A 128*a*08. Under the control of configuration signals (H) 1 L/G on line 126*a*19, (H) 2 L/G on line 126*a*15, and (H) 4 L/G on line 126*a*09, as respectively satisfy NA2 Logical elements 128*a*12 through 128*a*16 in the event of RIPPLE CARRY from DR9 A logical element 128*c*02, each of S12 logical elements 128*a*18 through 128*a*22 wil select either the group line signal normally received from the associated Driver/-Receiver element, or the signal derived from DR9 A logical element 128*c*02. Thusly, under configuration control, only the most significant group line signal is being substituted for in the ripple shifted error compensation alignment. The adaptation of the ripple error compensation scheme to configuration at less than eight arbitration lines, and that adaptation by like stuctures as are shown in FIG. 128*d* through FIG. 128*k* to less than eight slave identification/function and/or less than 16 data lines, permits the ripple shifted error compensation scheme to be operative on a Versatile Bus Interface Logics physically interconnected, as well as logically configured, for communication across less than thirty-seven pins. Of course, the effectuation of ripple shifted error compensation ultimately demands at least one spare Versatile Bus communication line and associated Driver/Receiver, normally the even parity line and associated DR37 A logical element 128104 as are shown in FIG. 1281.

The enablement of the short test on the slave identification/function driver/receivers DR10 A logical element 128*d*02 through DR17 A logical element 128*e*02 is enabled under the logical High condition of signal (H) SID IN PRO $\phi$2 on line 8803. The enablement of the short test for data line 0 through data line 15, as are drived by DR19 A logical element 128*g*02 through DR34 A logical element 128*j*08, is enabled under the logical High condition of signal (H) DATA IN PRO ($\phi$2) (1) on line 88*k*07.

The scan/set data input signal to the thirty-seven driver/receiver elements DR1 A logical element 128*a*02 through DR37 A logicaL element 128*l*04, is received as signal (H) LOOP D DATA on line 13603. This signal (H) LOOP B DATA on line 13603 is supplied directly to driver/receiver DR37A logical element 128*l*04 and, as inverted in IN1 logical element 128*l*06, also to such driver/receiver DR37 A logical element 128*l*04 in the inverted form. The data output signal from the thirty-seven bit scan/set test loop composed of the thirty-seven driver/receiver elements DR1 A logical element 128*a*02 through DR37 A logical element 128*l*04 is inverted in IN1 logical element 128*a*10 and supplied to remaining loop B scan/set testable registers as signal (L) FAULT-GL0 on line 128*a*03.

9.30.2. Driver/Receivers—Part B—Driver Clock and Faults

Figure 129:
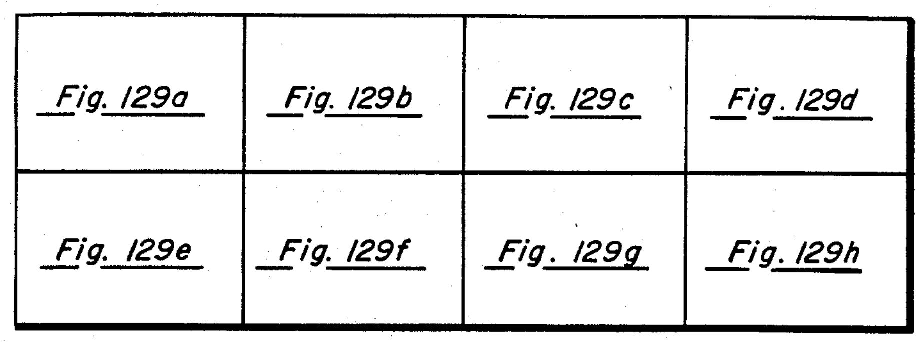
Figure 129A:
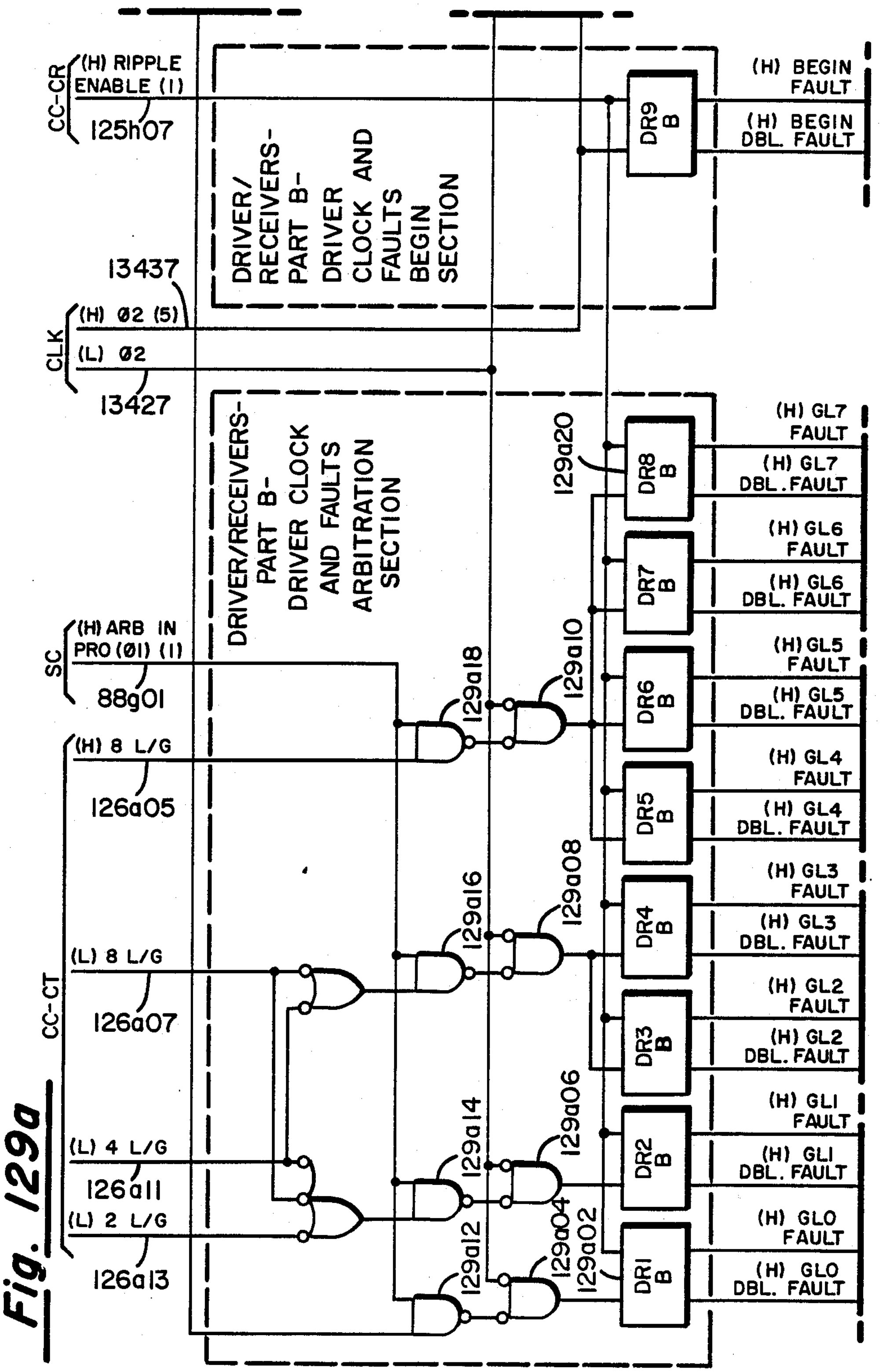
Figure 129B:
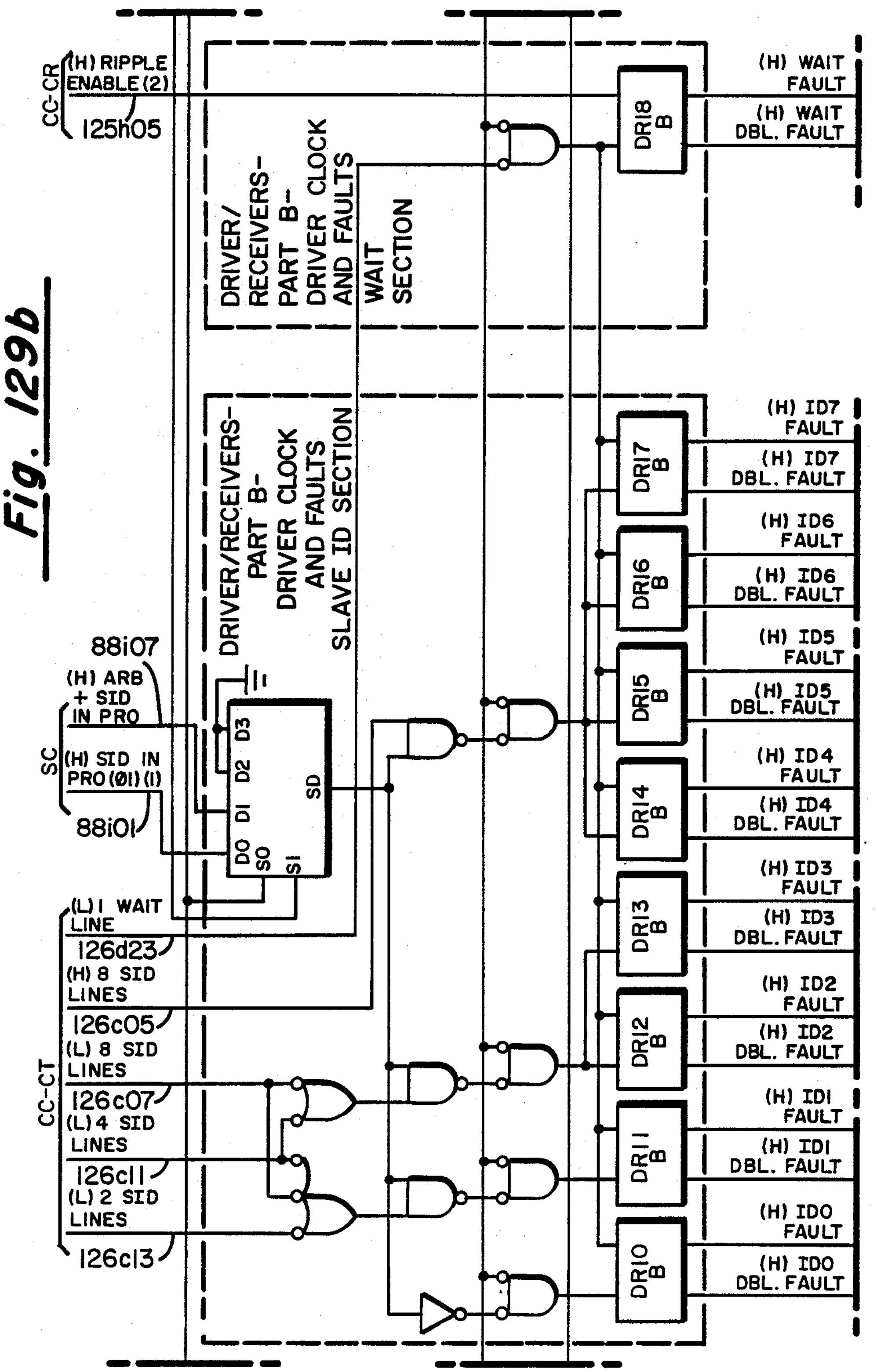
Figure 129C:
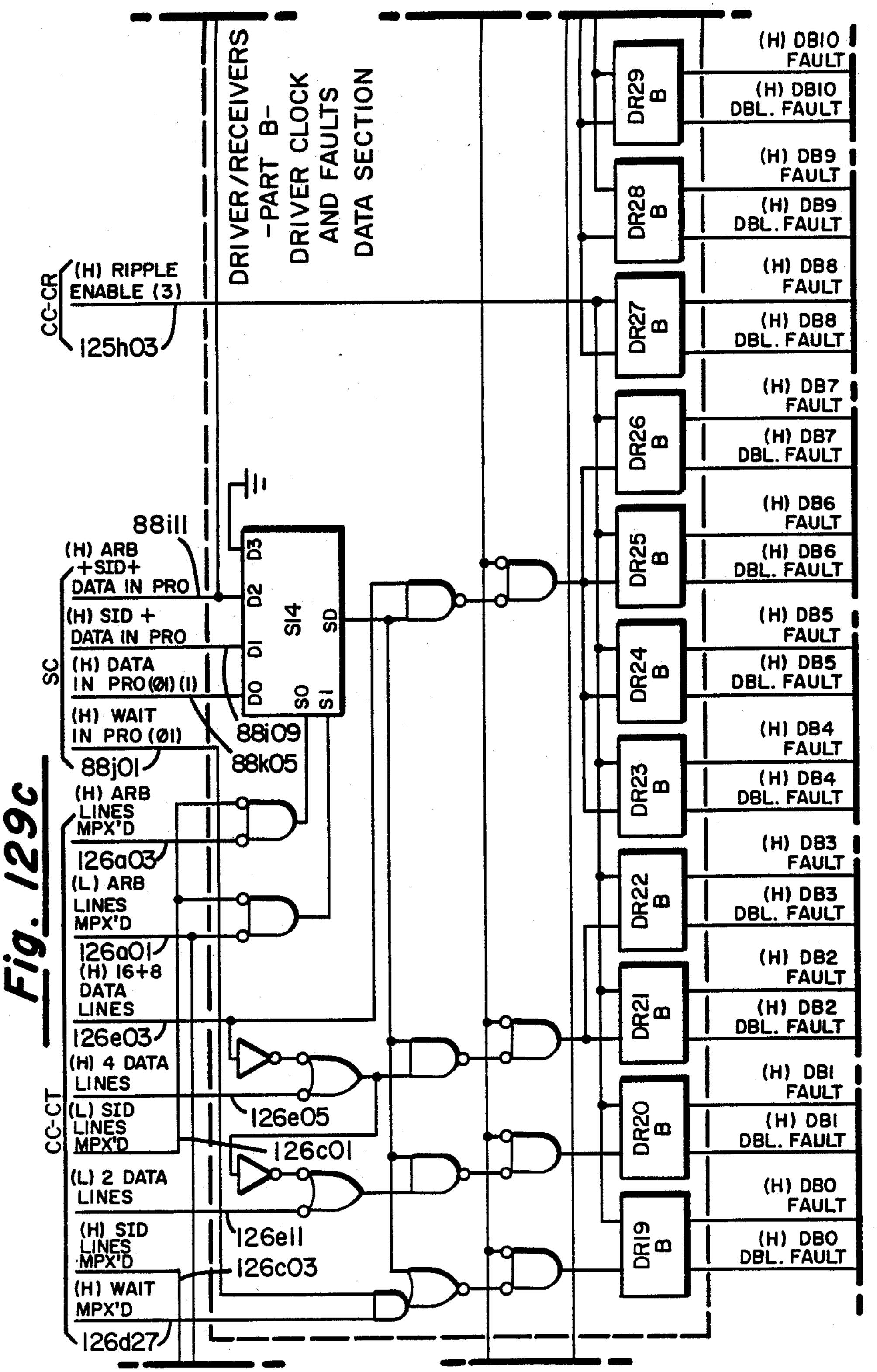
Figure 129D:
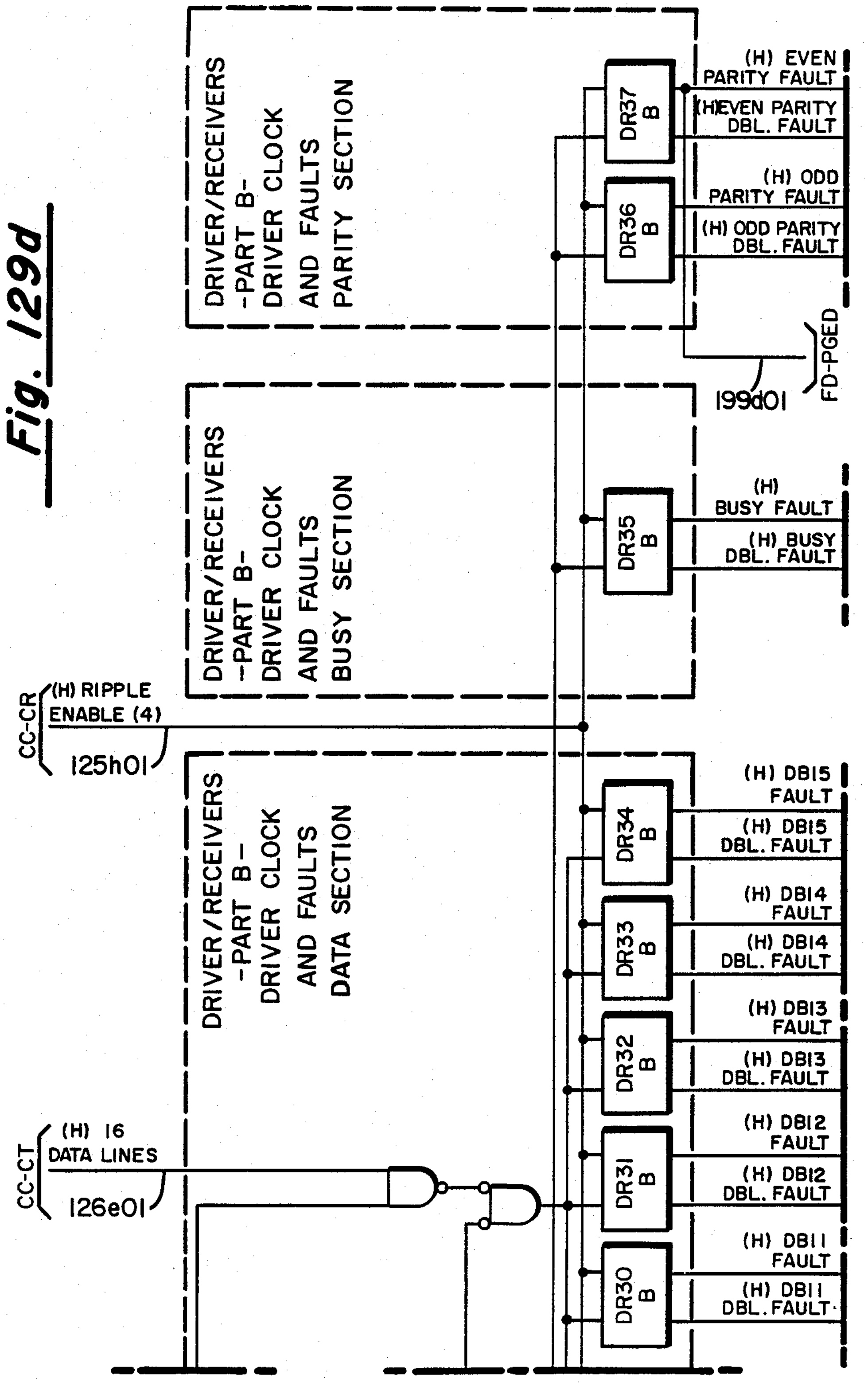
Figure 129E:
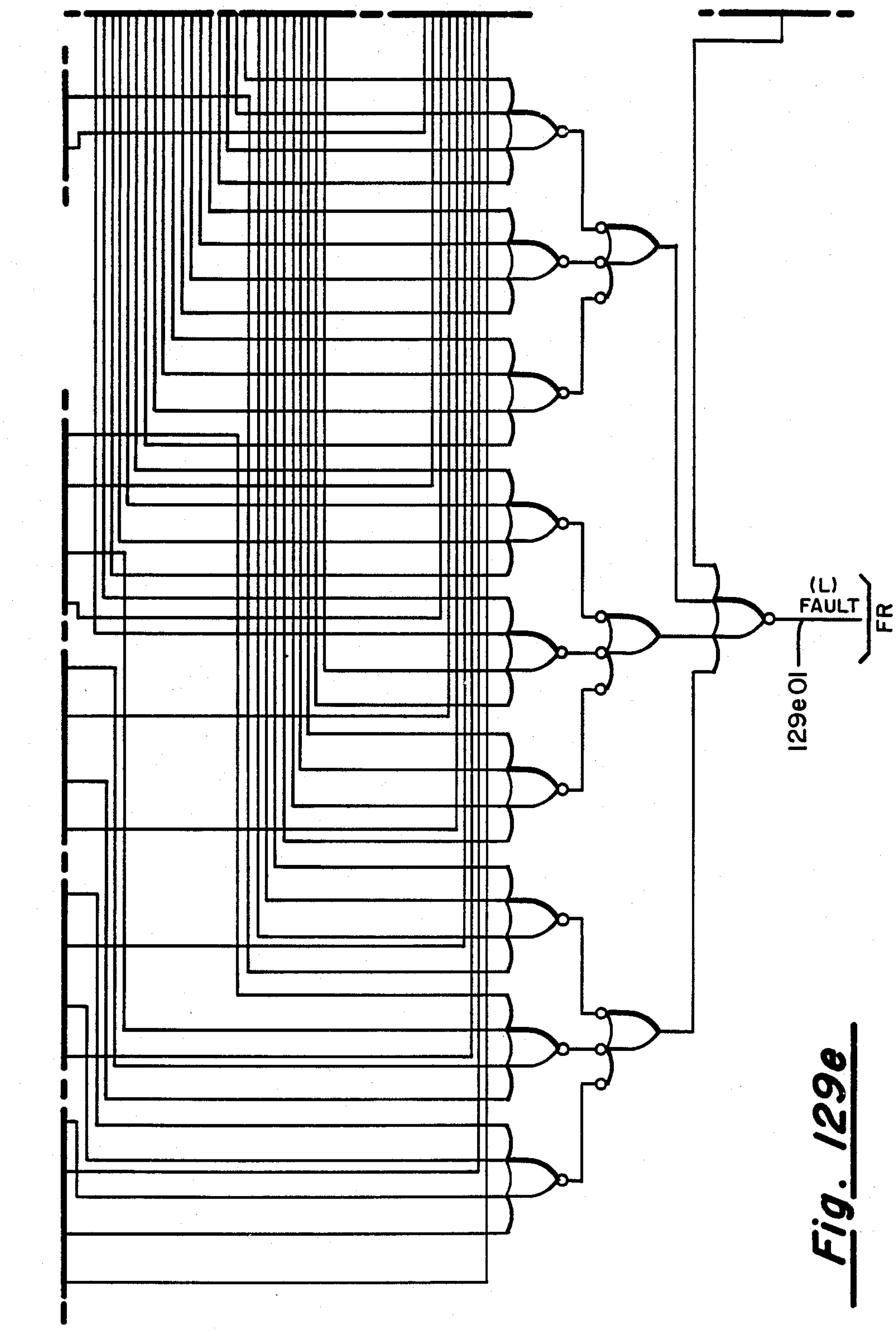
Figure 129F:
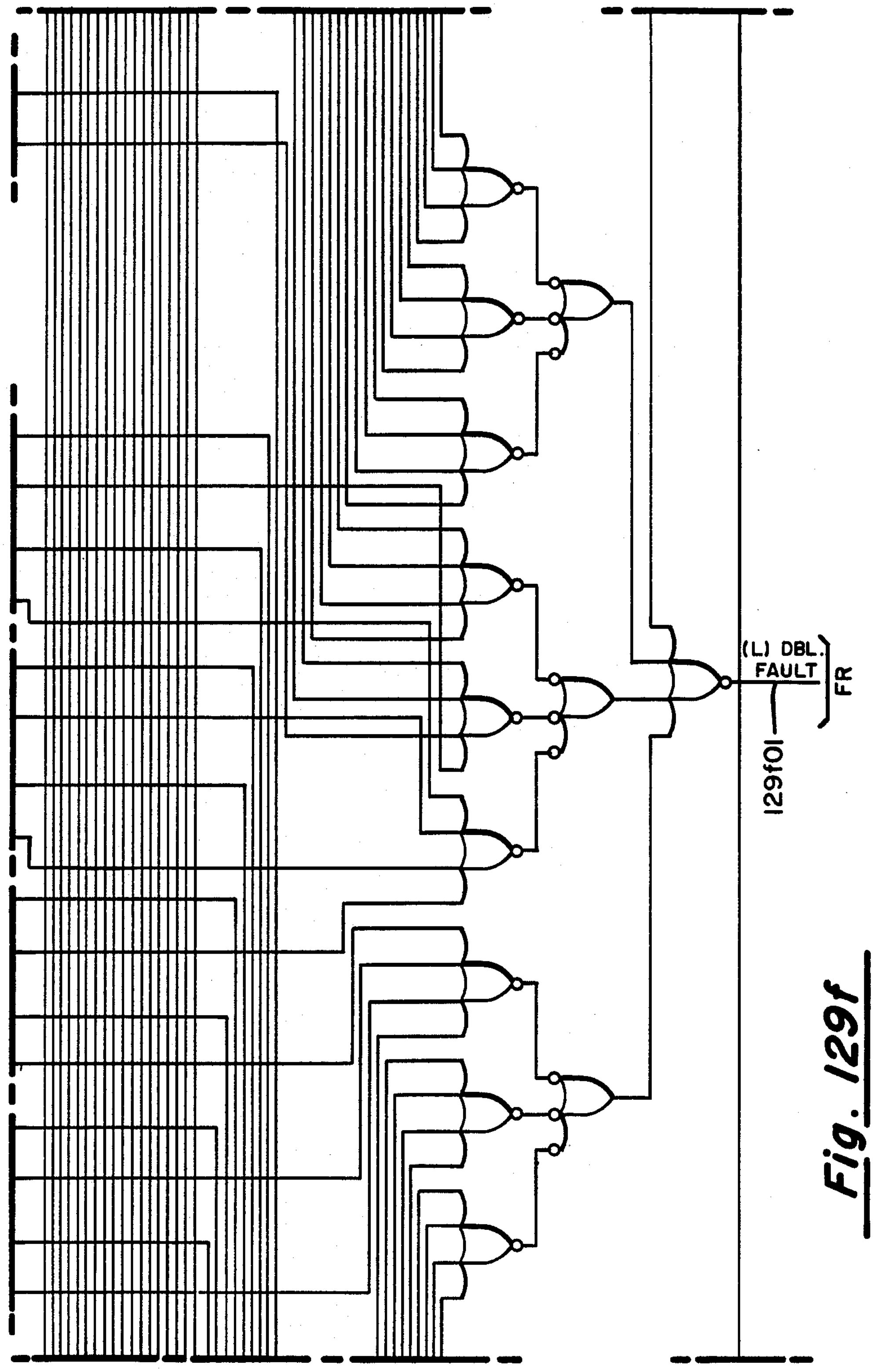
Figure 129G:
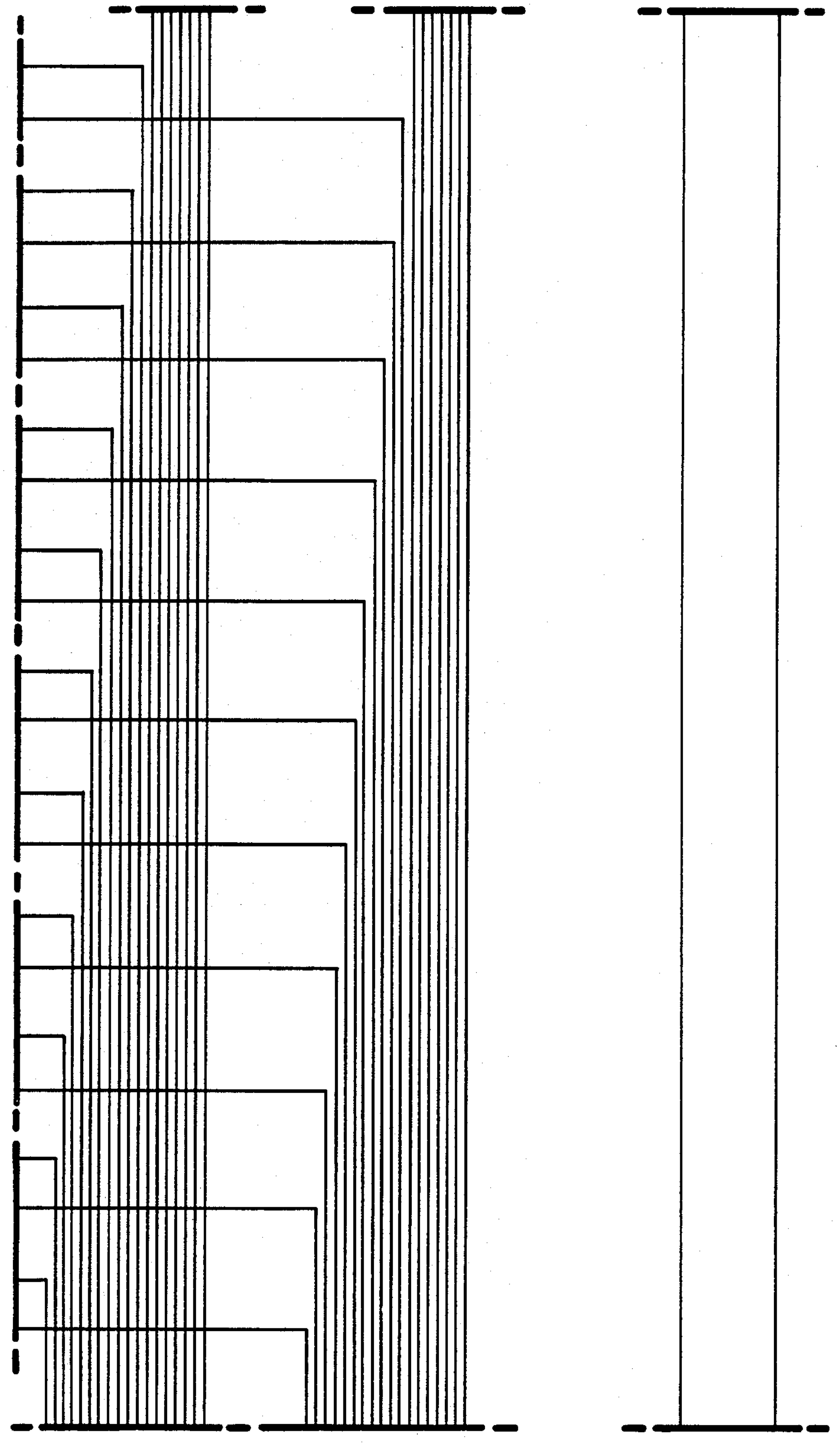
Figure 129H:
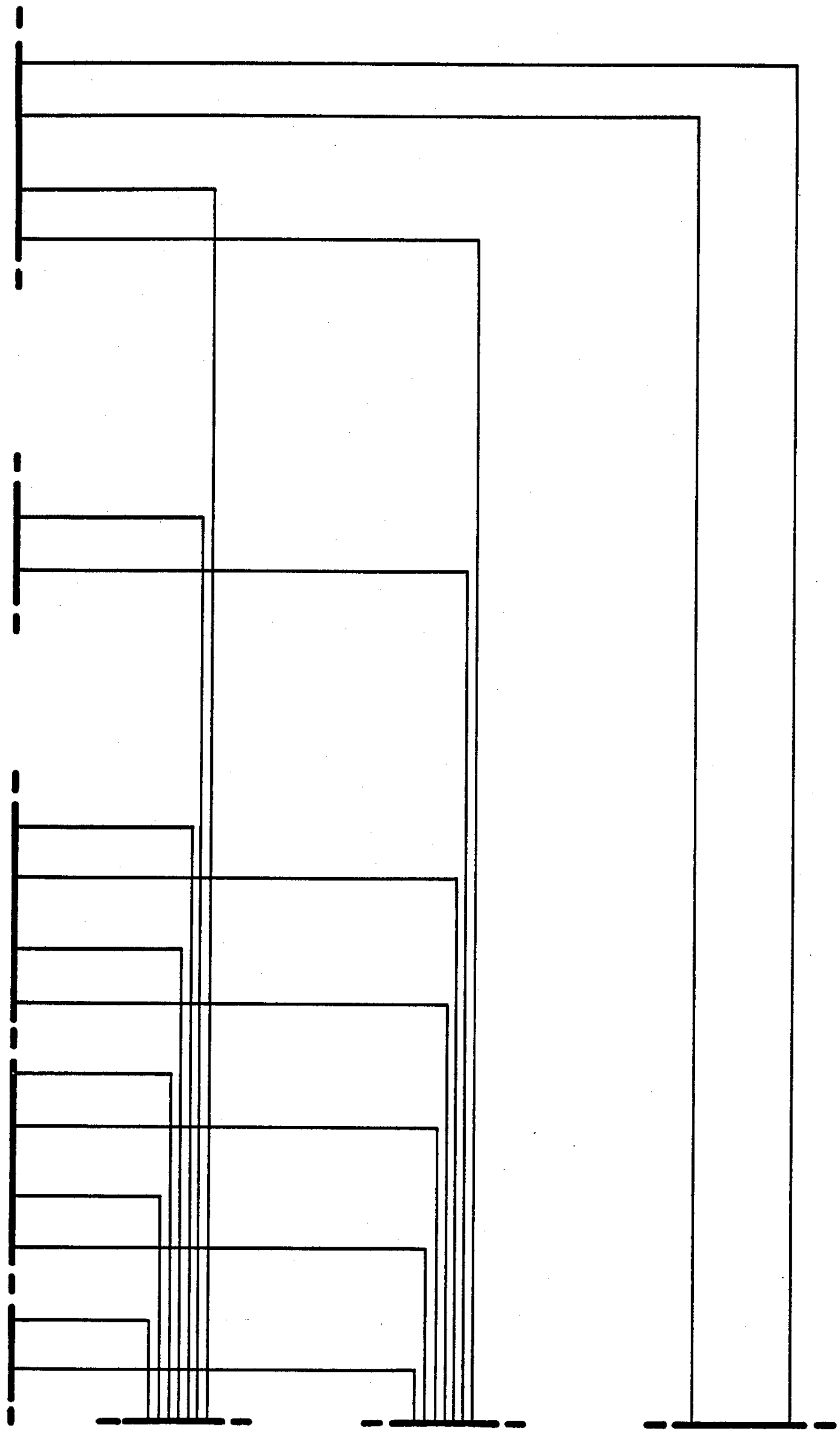
Figure 130A:
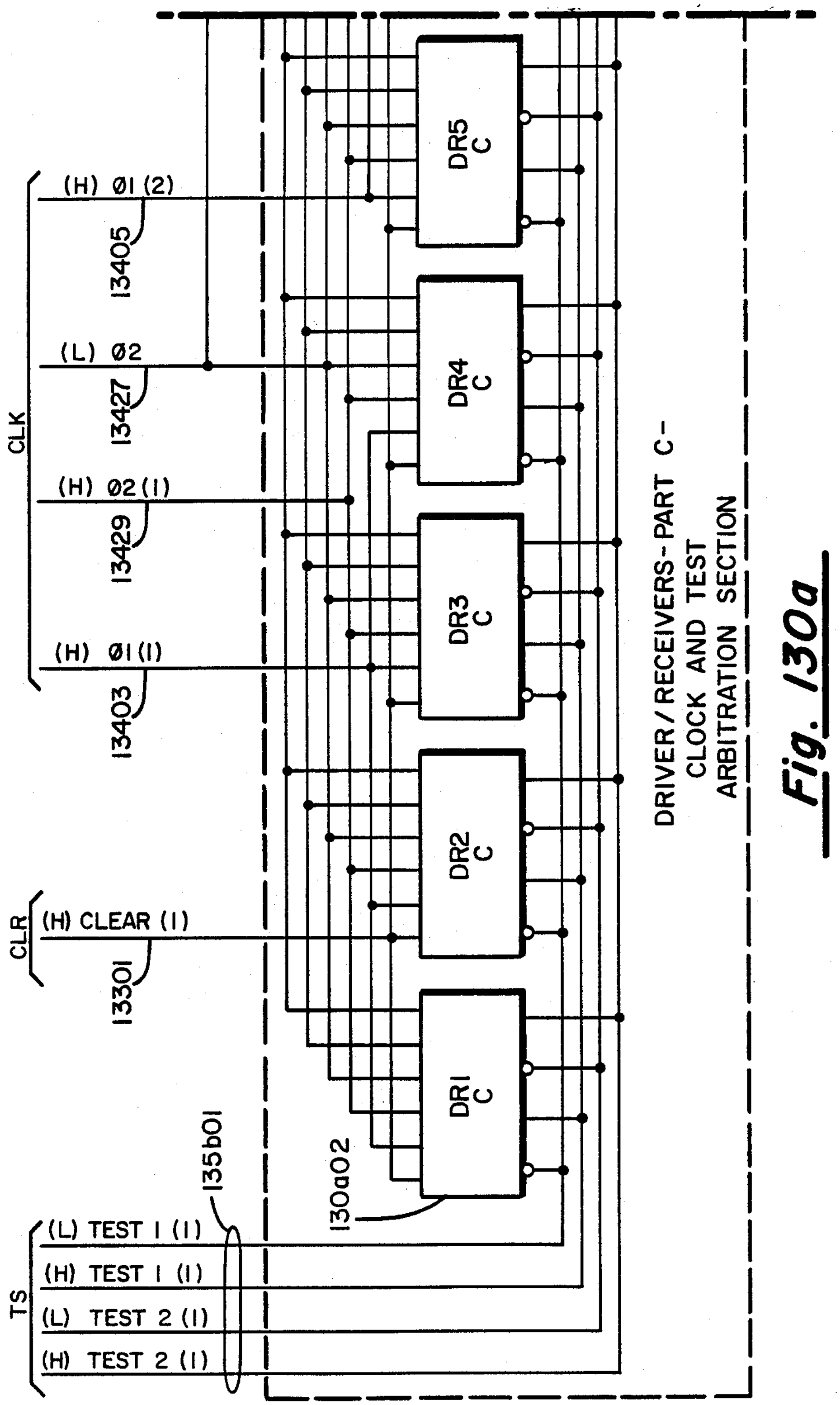
Figure 130B:
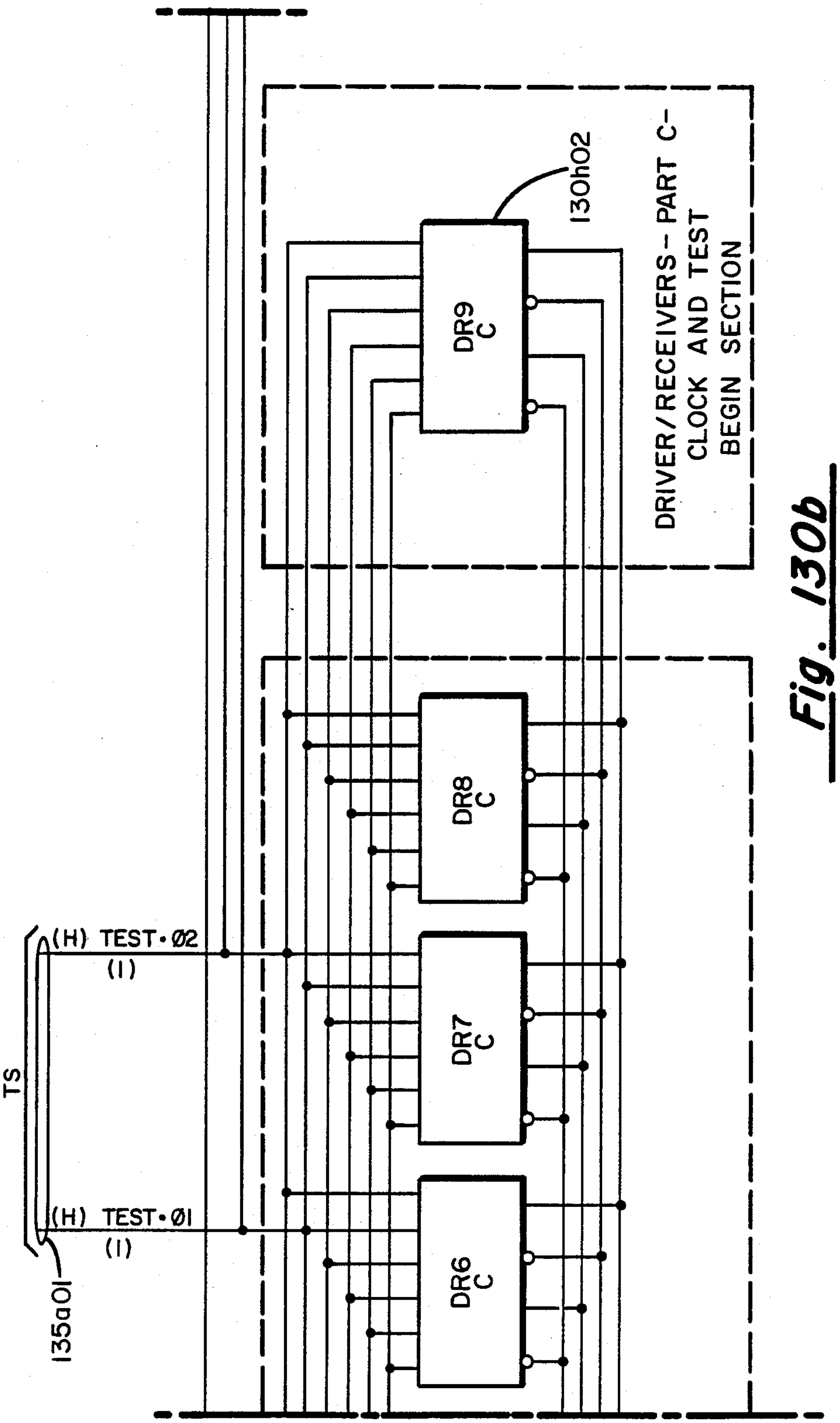
Figure 130C:
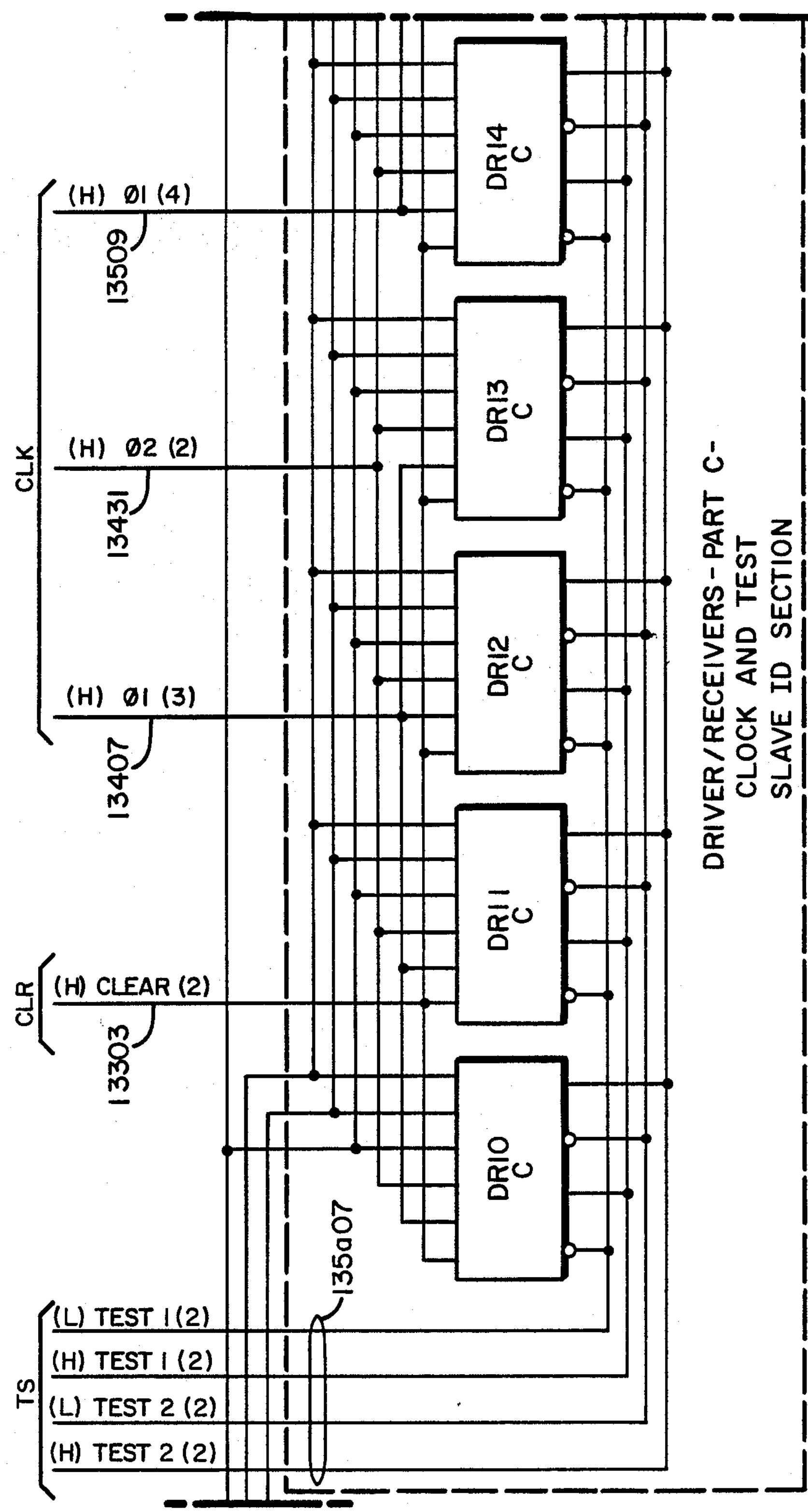
Figure 130D:
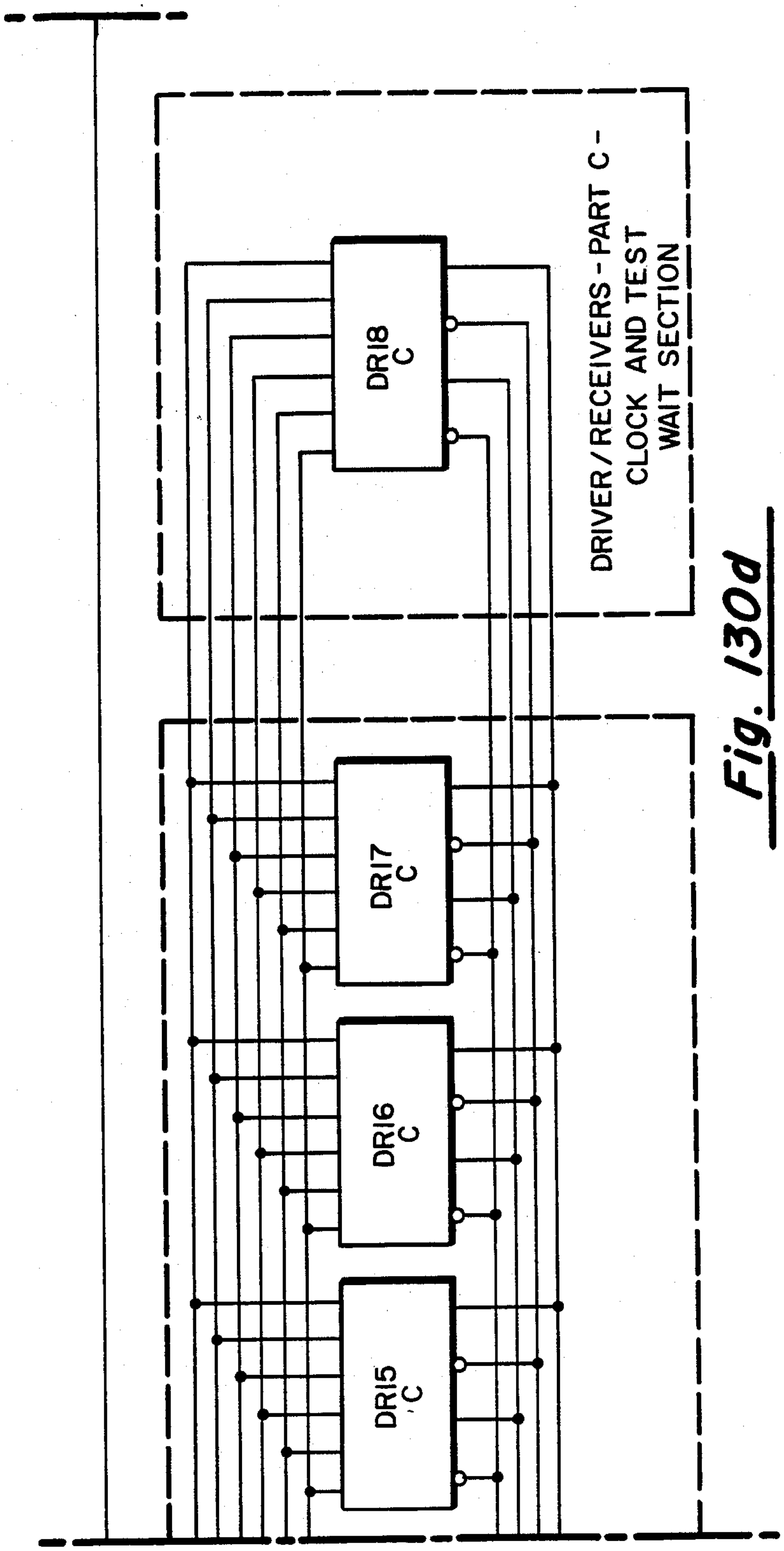
Figure 130E:
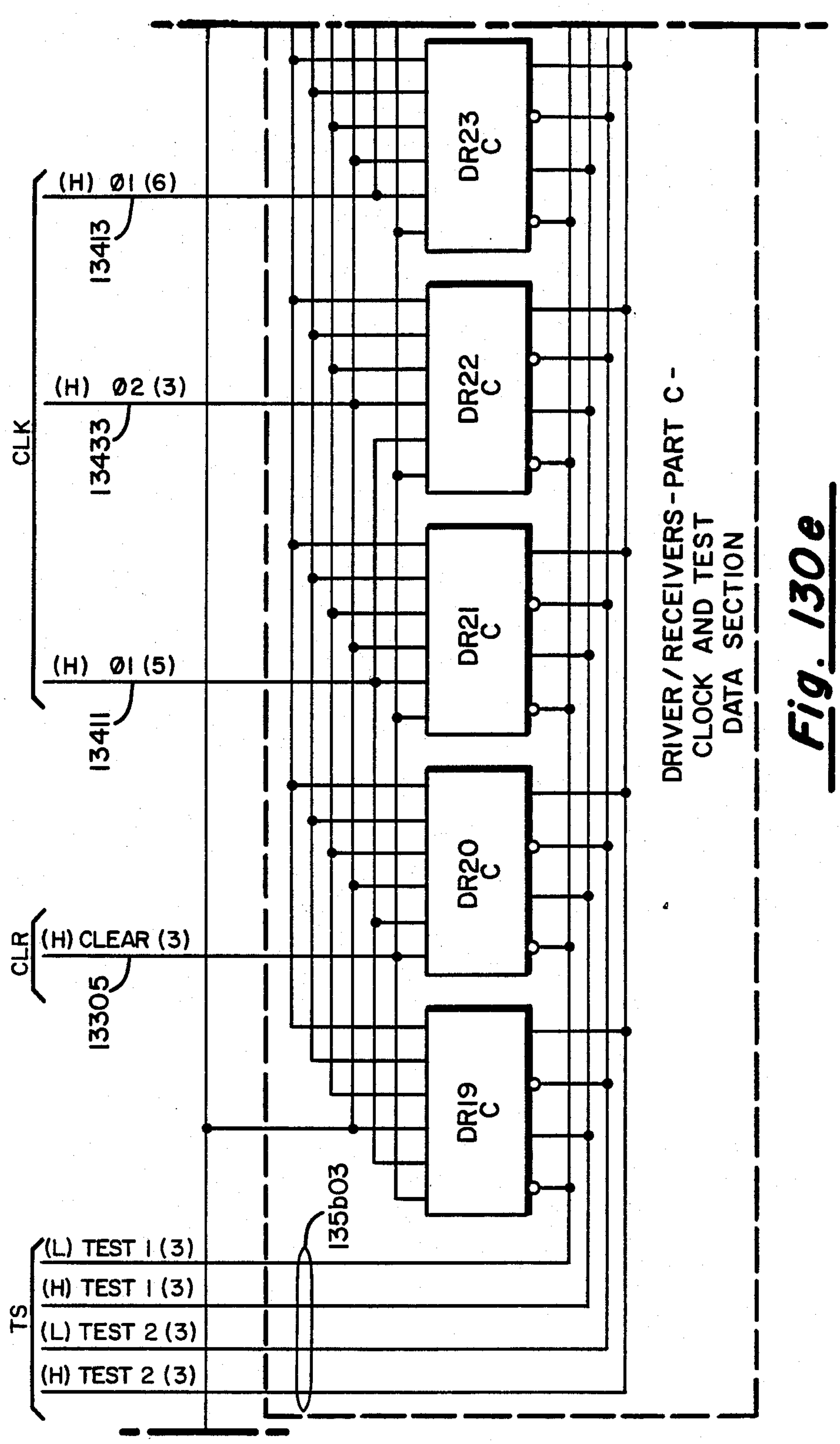
Figure 130F:
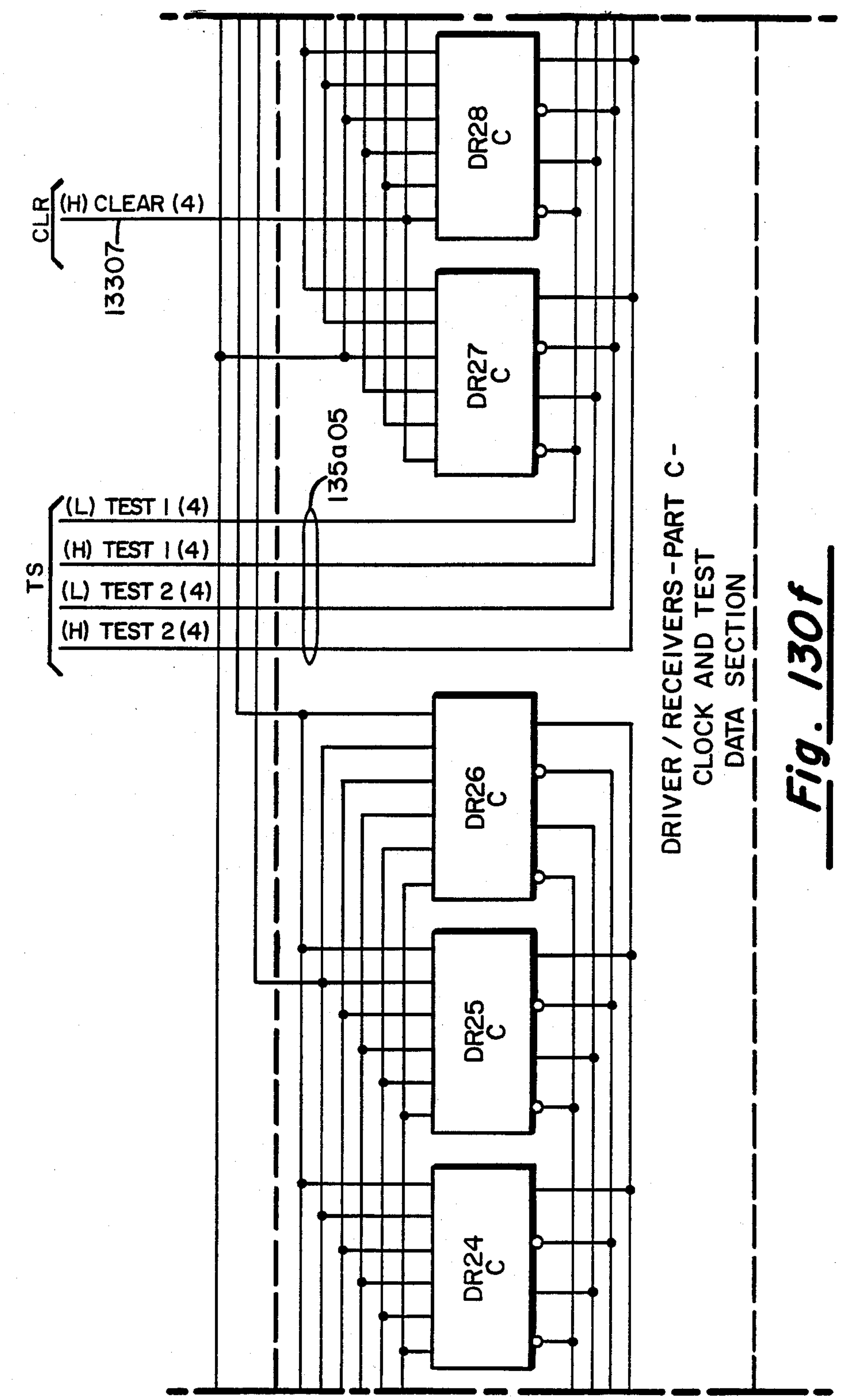
Figure 130G:
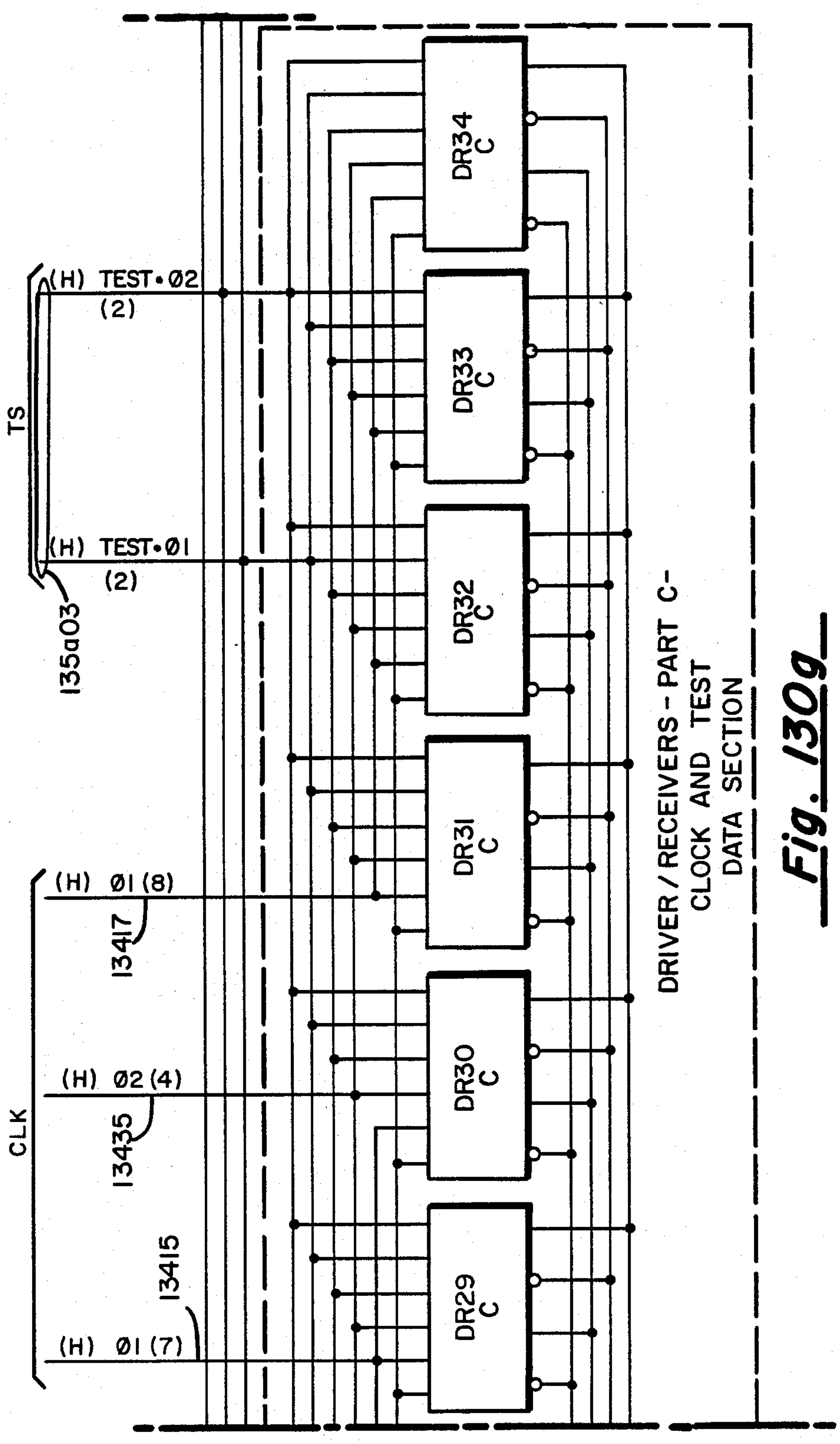
Figure 130H:
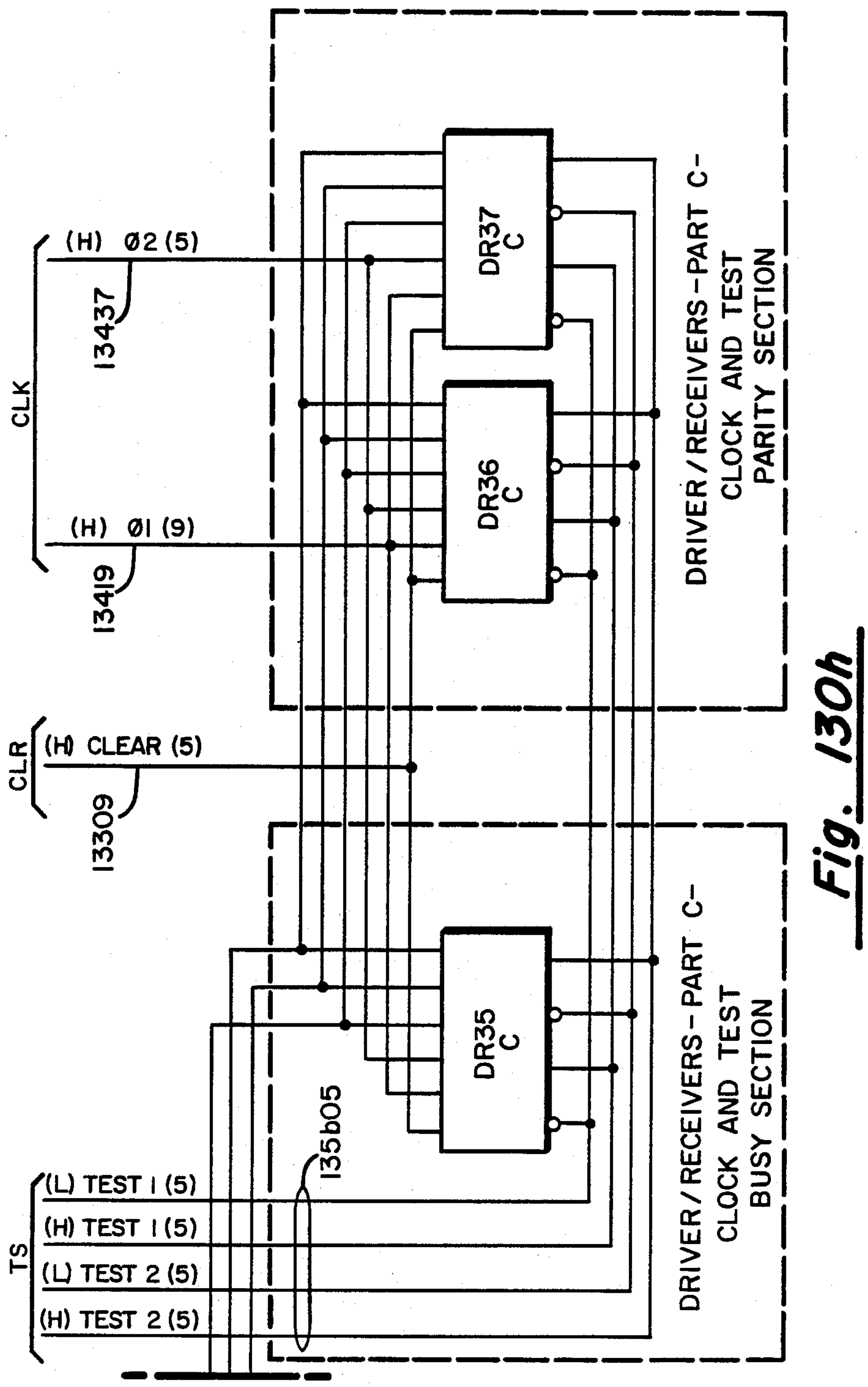

The interconnection to the clock and faults subsection DR(X) B of the thirty-seven driver/receiver elements, DR1 B, logical element 129*a*02 to DR37 B, logical element 129*d*02, is shown in FIG. 129, consisting of FIG. 129*a* through 129*d*. The collection of the single and double faults as are recognized at all such thirty-seven driver/receivers, DR1 B, logical element 129*a*02 through DR37 B, logical element 129*d*02 is collected in a series of NO4 and NA3 gates as are shown in FIG. 129*e* in the production of composite signals (L) FAULT on line 129*e*01 and (L) DBL FAULT on line 129*f*01.

Various distributions of Clock $\phi$2 to the thirty-seven driver/receiver elements, such as is used to control the active drive signals upon the Versatile Bus 86*a*01, are gated by the configuration and the occurrence of appropriate transmission activities. For example, signal (L) $\phi$2 on line 13427 is distributed to NO2 logical elements 129*a*04 through 129*a*10. In order that the driver/-receiver element, DR1 B logical element 129*a*02 through DR8 B loigcal element 129*a*20, may be enabled to drive the arbitration lines upon the Versatile Bus, it is necessary that the corresponding connected ones of NO2 logical elements 129*a*04 through 129*a*10 be enabled to gate such clock phase 2 signal. Each such NO2 logical element 129*a*04 through 129*a*10 is respectively enabled for gating such clock $\phi$2 signal under control of a logical Low signal as received from NA2 logical elements 129*a*12 through 129*a*18. Each such NA2 logical element 129*a*12 through 129*a*18 is enabled under logically High signal (H) ARB IN PRO ($\phi$1) (1) on line 88*g*01 and various combinations of signals (L) 2 L/G on line 126*a*13 through (H) 8 L/G on line 126*a*05 (such as established configuration) and signal (L) ARB LINES MPX'D on line 126*a*01 (such as establishes the enabling of the arbitration group lines for communication drive). The enablement of various ones of the thirty-seven driver/receiver element DR1 B logical element 129*a*02 through DR37 B logical element 129*d*02, in accordance with the activity being performed and the configuration for number of lines utilized and the pinmultiplexing of such lines, should be obvious to a routineer in the computer sciences. Signal (H) RIPPLE ENABLE (1) on line 125*h*07 through signal (H) RIPPLE ENABLE (4)

on line 125h01 represent four distributions of the Ripple Enable signal such as accounts for the loading of each such signal.

The logical Low condition of signal (L) FAULT on line 129e01, such as indicates a detected fault within any of thirty-seven driver/receiver elements DR1 B 129a02 through DR37 B 129d02, is formed in a tree structure as the logical OR of the fault signals output from each such thirty-seven driver/receiver elements. Similarly, the logical Low condition of signal (L) DBL FAULT on line 129f01 is formed in a tree structure from the collection of the double fault signals as arise at each of the thirty-seven driver/receiver elements DR1 B logical element 129a02 through DR37 B 129d02, and indicates the detection of a next subsequent, or second, or double, fault when the thirty-seven driver/receiver elements are already in the ripple error compensation alignment.

9.30.3. Driver/Receivers—Part C—Clock and Test

Figure 130:
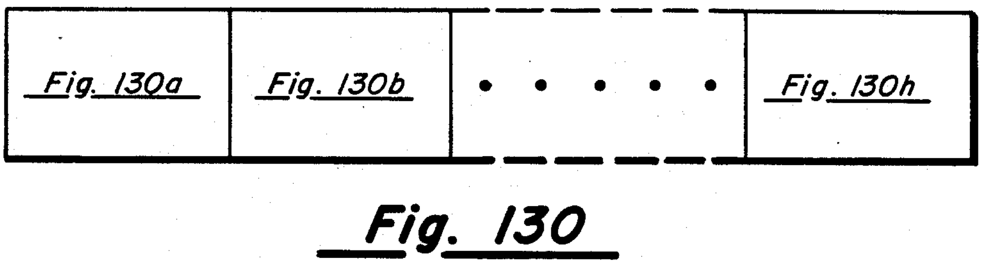

The manner by which the thirty-seven driver/receiver elements, DR1 C logical element 130a02 through DR37C logical element 130h02 should receive the clear, clock and test signal inputs is shown in FIG. 130, consisting of FIG. 130a through FIG. 130h. By momentary reference to FIG. 82a, it may be recalled that the test signals are associated with the alignment of the thirty-seven driver/receivers as a thirty-seven bit shift register for the purposes of scan/set test. The clear signals are utilized only for initializtion of the driver/receiver elements during the initialization of the Versatile Bus interface logics. The clock signals are utilized for various time sequencing purposes within the driver/receiver elements.

9.31. Parity Generation and Fault Detection

Figure 131:
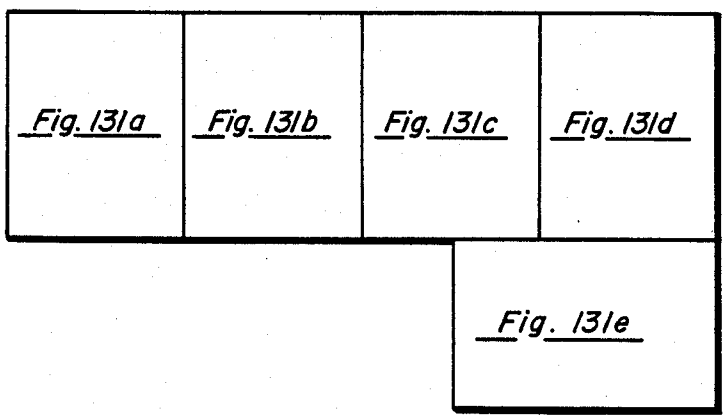

The Parity Generation/Parity Error Detection functional logical subsection is shown in FIG. 131, consisting of FIG. 131a through 131e. The subsection accomplishes the parity generation upon the thirty-five signal lines, exclusive of the two parity lines, of the Versatile Bus during each communication cycle upon such bus. The resultant parity generation will be latched and subsequently used to compare to the detected bus parity upon the next communication cycle. If there is an error between the generated and the received parity a transmission fault has occurred on any of the thirty-seven Versatile Bus communication lines.

The thirty-two input signals on cables 128a01, 128d01, 128g01 and 128i01 as are develped in the thirty-tow driver/receiver elements DR1 A logical element 128a02 through DR32 A logical element 128j04, are received, in both normal and inverted form, into parity generation circuit PG8 131A02 through PG8 131D02. An additional three input signals appearing on cable 128j03 are received in two bit parity generator circuits PG2 logical elements 131d04 and 131d06. The parity generation resultant from eight signals input in both normal and inverted form in each of the four 8-bit parity generation circuits, parity generation 1 through parity generation 4, PG8 logical element 131a02 to 131d02, are gated for storage in latches 131a04, 131b04, 131c04, and 131d08, upon the logical high occurrence of signal (H) $\phi$1 (11) on line 13423. The results of the parity generation upon three lines as is generated in parity generator PG2 logical element 131d06 is gated to latch 131d10 upon the logical high occurrence of same signal (H) $\phi$1 (11) on line 13423. Thusly, the parity developed from signals valid from clock $\phi$2 to clock $\phi$2 is latdched during the intervening clock $\phi$1.

The set side and clear side output signals, the even and the odd parity signals, as are derived from each of the five latches 131a04, 131b04, 131c04, 131d08, and 131d10, are collected in parity generator PG4 logical element 131e02 and in parity generator PG2 logical element 131e04, and supplied, as signals (L) EVEN PARITY (OUT) on line 131e01 and signal (L) ODD PARITY (OUT) on line 131e03, to the parity driver/receiver for drive of the parity lines upon the next cycle of the Versatile Bus, and to a parity latch consisting of cross-coupled AOI 2-1-1 logical element 131306 and AOI 2-1 logical element 131e08. Signals (L) EVEN PARITY (OUT) on line 131e01 and (L) ODD PARITY (OUT) on 131e03, valid from clock $\phi$1 to clock $\phi$1, are gated to the parity latch upon the interveining logical High occurrence of signal (H) $\phi$2 (7) on line 13441. During each communication cycle upon the Versatile Bus 86a01, signal (H) ODD PARITY (IN) on line 128e01 and (H) EVEN PARITY (IN) on line 128e03, such as are derived from the parity driver/receiver elements DR36 A 128/02 and DR37 A 128/04, and such as are valid clock $\phi$2 to clock $\phi$2, will be compared with the setting of the parity latch consisting of cross-coupled AOI 2-1-1 logical element 131e06 and AOI 2-1 logical element 131e08, such signal as is also valid from clock $\phi$2 to clock $\phi$2. If the Versatile Bus is not in the ripple shifted error compensation alignment, signal (L) RIPPLE CARRY—EVEN PARITY on line 128/05 will be logically High, causing S12 logical element 131e20 to select the data 1, D1, input signal. This signal is simply the logical AND of signals (H) ODD PARITY (IN) on line 128e01 and (H) EVEN PARITY (IN) on line 128e03 within NA2 logical element 131e10. Such signal resultant in NA2 logical element 131e10 will be selected in S12 logical element 131e20 to be transmitted as signal (L) PARITY FAULT on line 131e05 to the fault register. Such signal (L) PARITY FAULT on line 131e05 will be logically Low if signals (H) ODD PARITY (IN) on line 128e01 and (H) EVEN PARITY (IN) on line 128e03 are of the same level, whether logically High or logically Low, thereby indicating the occurrence of a parity error upon the Versatile Bus.

Figure 131A:
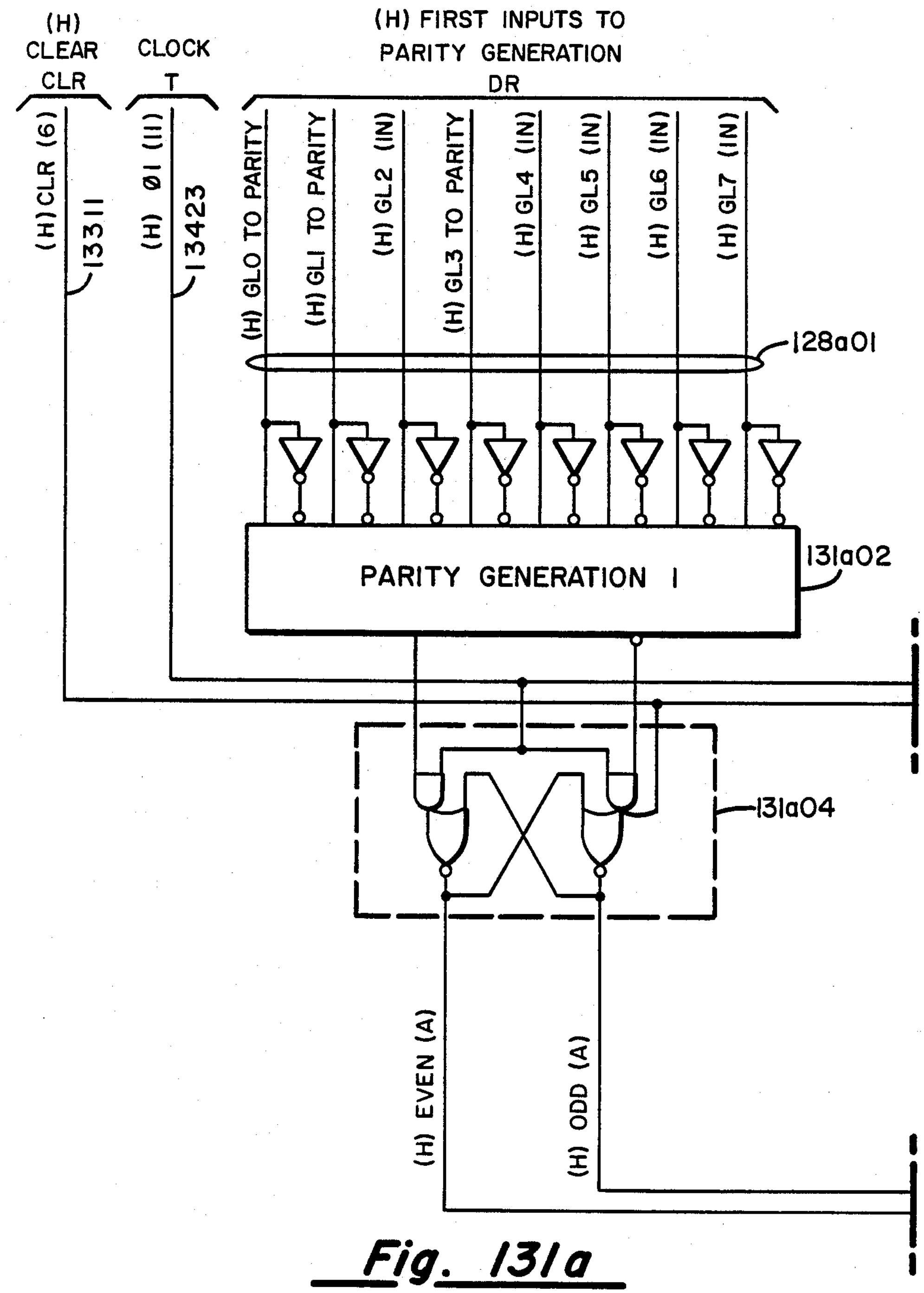
Figure 131B:
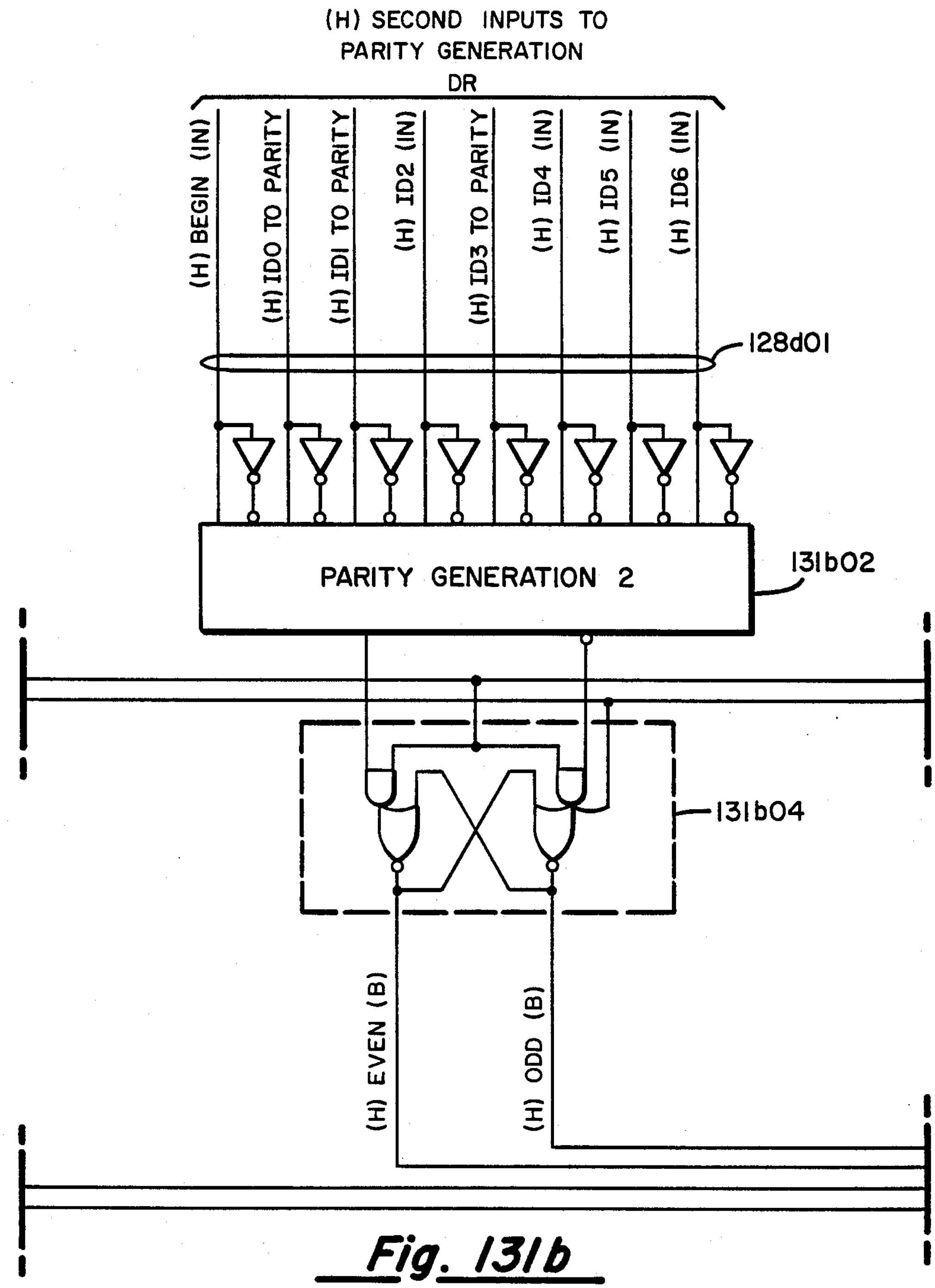
Figure 131C:
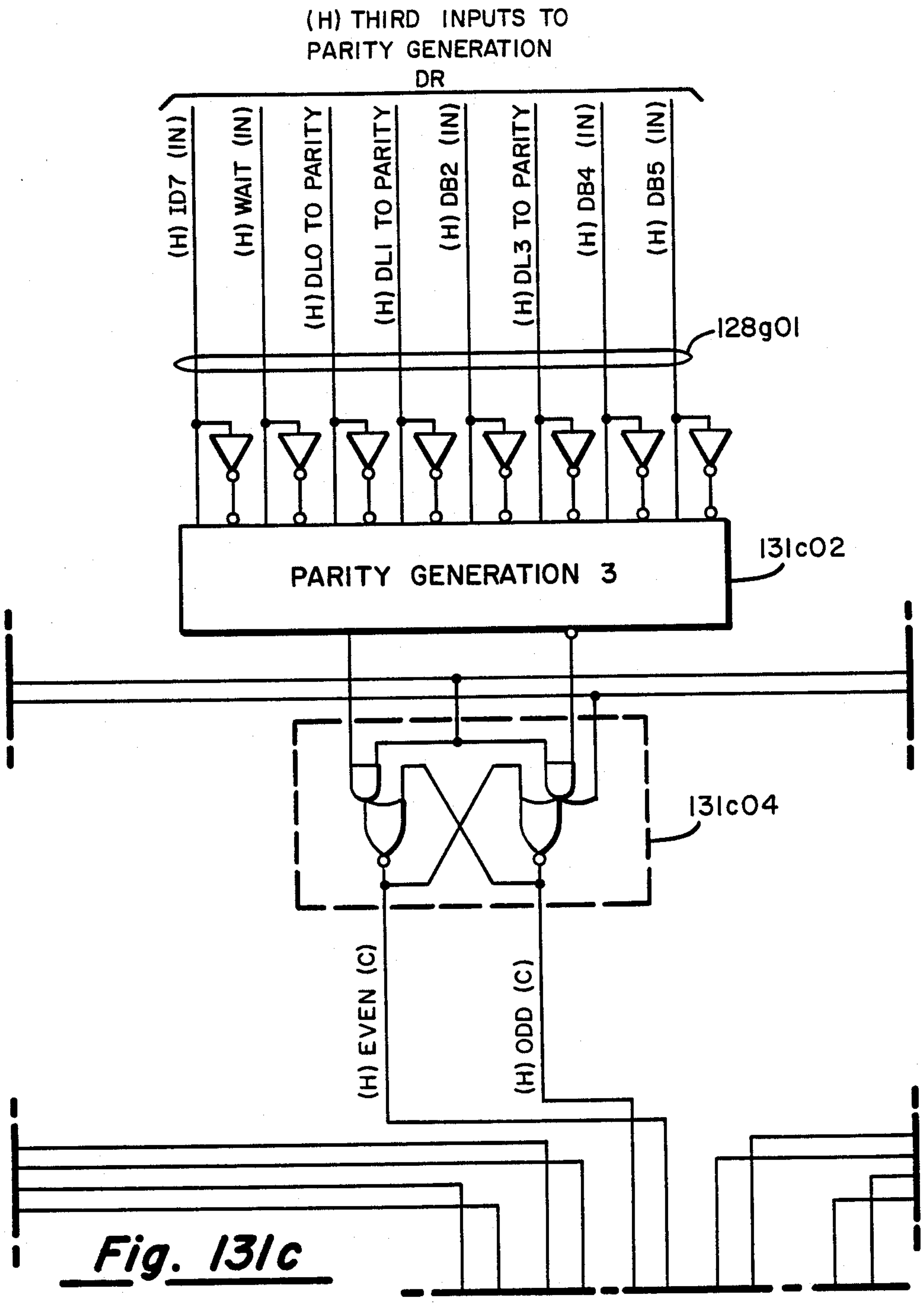
Figure 131D:
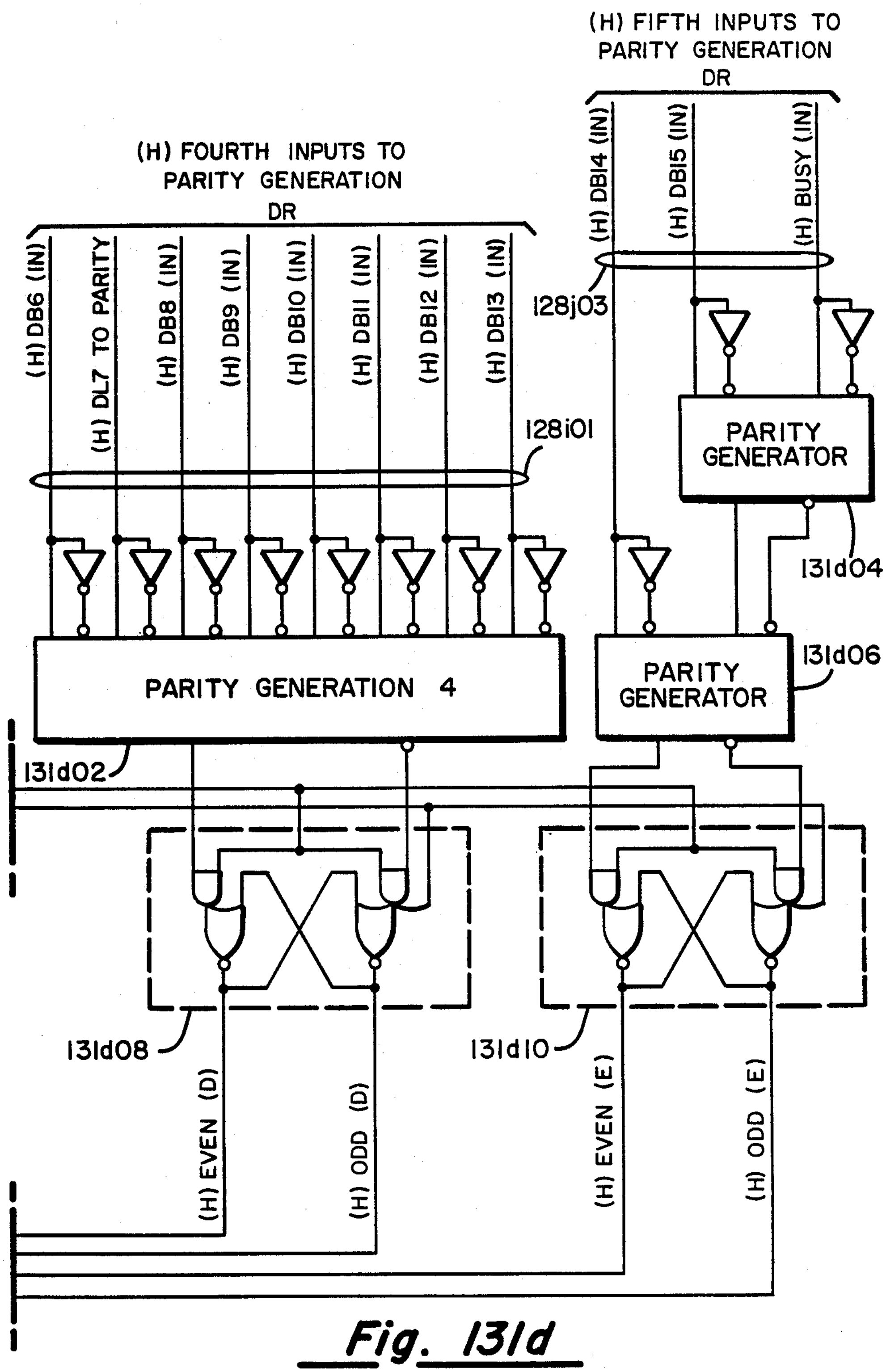
Figure 131E:
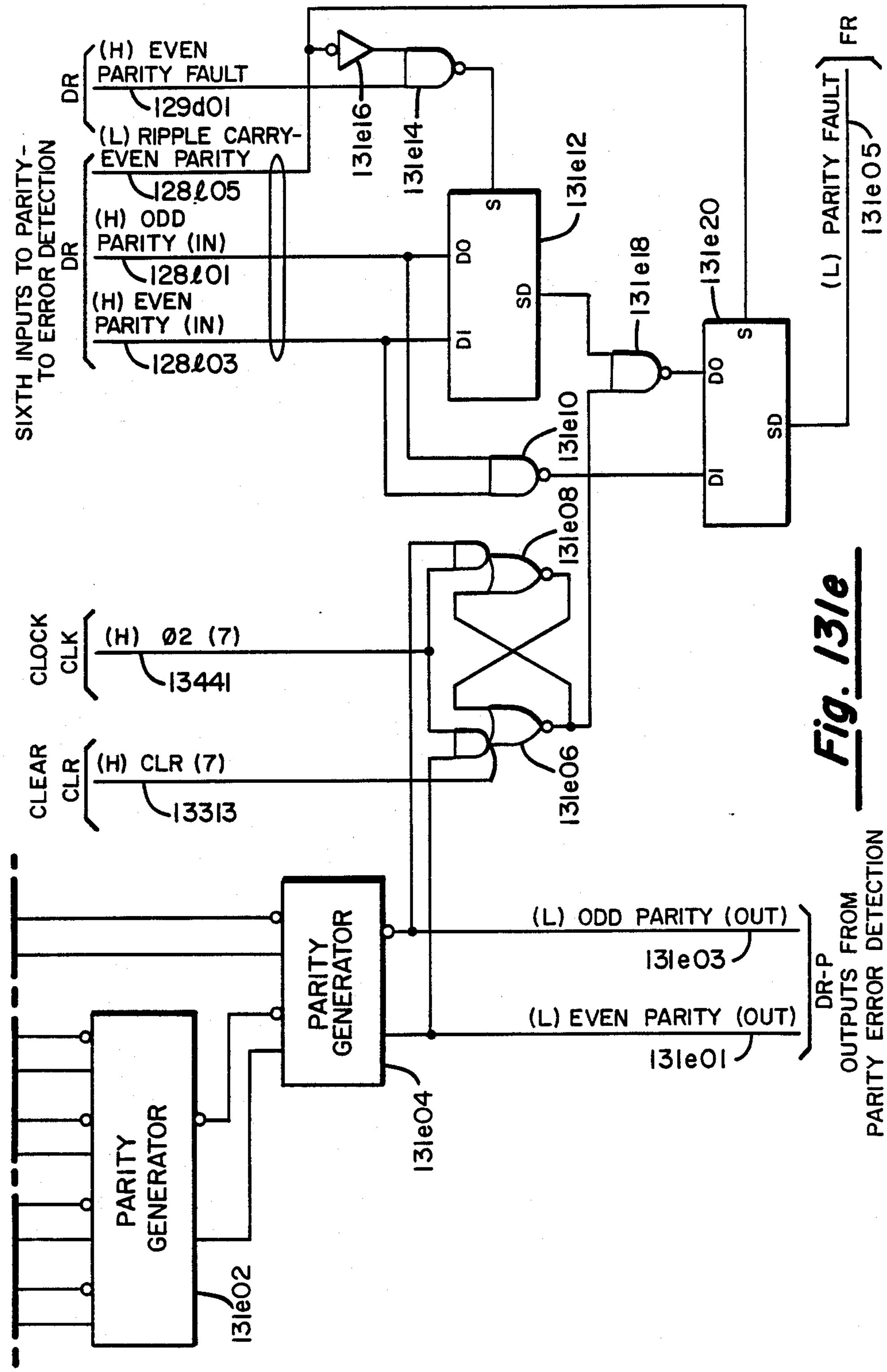

In the event that the Versatile Bus is already in the ripple shifted error compensation alignment, the detection of a second, double, parity becomes more complex. In such case, there is no even parity signal, the even parity line having sufficed as a substitutionary replacement line for the failed line, and the only evaluation of a subsequent, second, double parity fault needs proceed from evaluation of the odd parity signal. But all signals as appear in FIG. 131e are labeled in accordance with their normal, non-ripple- shifted, origins. In the event of ripple shifted error compensation alignment, signal (H) EVEN PARITY (IN) on line 128e03 is really this odd parity signal, the remaining sole parity signal in the ripple shifted realignment condition.

In considering how the remaining signal (H) EVEN PARITY (IN) on line 128e03 should utilized in the detection of a second, subsequent parity error in a bus already in ripple shifted realignment, consider that signal (H) EVEN PARITY FAULT on line 129e01 is initialy logically Low, such as represents that the single driver/receiver element which has been the cause of such ripple shifted error compensation is not that sole driver/receiver element DR37 for the even parity line upon the Versatile Bus. In such case, NA2 logical element 131e14 is dissatisfied, emplacing a logical High signal on S12 logical element 131e12, which will cause the gating of signal (H) EVEN PARITY (IN) on line 128e03 to NA2 logical element 131e18. The set side output signal of the parity latch consisting of cross-coupled AOI 2-1-1 logical element 131e06 and AOI 2-1 logical element 131e08, logically Low if signal (L) ODD PARITY (OUT) on line 131e03 had been logically High during the previous clock $\phi 2$, is also supplied to NA2 logical element 131e18. Therefore, if signal (L) ODD PARITY (OUT) on line 131e03 had been ligically High the previous cycle, and now the receipt of signal (H) EVEN PARITY (IN) on line 128e03, such signal as really represents the receipt of odd parity upon the ripple shifted error compensated bus, is also logically High, then NA2 logical element 131e18 will not be satisfied, emplacing a logical High signal on S12 logical element 131e20 which be gated as signal (L) PARITY FAULT on line 131e05. Conversely, if the sent parity had been different than the received parity, then NA2 logical element 131e18 would have been satisfied and signal (L) PARITY FAULT on line 131e05 would have resultantly been a logical Low signal.

In the singular unique case, one out of thirty-seven such possible cases, that the driver/receiver element, DR37, associated with the even parity line is detected in error fault then signal (H) EVEN PARITY FAULT on line 129d01 will be logically High. In conjunction with the logically Low signal (H) RIPPLE CARRY—EVEN PARITY on line 128105 as inverted in IN1 logical element 131e16 and applied to NA2 logical element 131e14, this logically High signal (H) EVEN PARITY FAULT on line 129b01 will cause such NA2 logical element 131e14 to emplace a logically Low select, S, signal on S12 logical element 131e12. This selection will gate signal (H) ODD PARITY (IN) on line 128101 to NA2 logical element 131e18 for comparison with signal that input to such NA2 logical element 131e18 as arises from the set side signal output from the parity latch. In the event that the single 37th, even parity line, driver/receiver has been in fault, this driver/receiver element is disabled and all lines remain as before with the exception that even parity transmissions are not enabled. In such case, signal (H) ODD PARITY (IN) on line 128101 is still the signal of interest in the detection of a second, subsequent, PARITY FAULT.

9.32. Fault Register

The FAULT REGISTER functional logical subsection is shown in FIG. 132, consisting of 132a and FIG. 132b. The FAULT REGISTER consists of three latches such as are respectively involved with parity faults, double faults, and single faults other than parity such as are detected during communication upon the Versatile Bus. The parity fault latch consists of cross-coupled AOI 2-1 logical element 132a10 and AO 2-1-1 logical element 132a12. The double fault latch consists of cross-coupled AOI 2-1 logical elements 132b12 and 132b14. The fault latch consists of cross couples AOI 2-1 logical element 128b28 and 128b30. All these latches are gated upon the logical High occurrence of signal (H) $\phi 1$ (2) on line 13405, and thusly hold the associated fault information valid from Clock $\phi 1$ to Clock $\phi 1$. The set side output of the parity fault latch as inverted in IN1 logical element 132a14 is supplied to the VM Node/Maintenance Processor as signal (H) PARITY FAULT on line 132b01. The set side signal output of the double fault latch as inverted in IN1 logical element 132b16 is applied to the VM Node/Maintenance Processor as signal (H) DOUBLE FAULT on line 132b07. The set side signal output of the fault latch as inverted in IN1 logical element 132b32, is suplied to the VM Node/Maintenance Processor as signal (H) FAULT on line 132b09. The collection of the set side signal outputs from all three latches in NA3 logical element 132b18 is supplied to the VM Node/Maintenance Processor as signal (H) BUS FAULT on line 132b05.

Each of the three fault latche—parity fault, double fault, and fault—is part of a scan/set testable loop comprised of a second latch and an S12 selector element. The parity fault latch, consisting of cross-coupled AOI 2-1 logical element 132a10 and AOI 2-1-1 logical element 132a12, becomes set directly upon the logical Low occurrence of Signal (L) PARITY FAULT on line 131e01, which is gated in S12 logical element 132a06 and utilized to set such PARITY FAULT latch upon the occurrence of signal (H) $\phi 1$ (2) on line 13405. Signals (L) DOUBLE FAULT on line 129f01 and (L) FAULT on line 129e01, such as are valid from clock $\phi 1$ to clock $\phi 1$ are respectively selected in S12 logical elements 132b04 and 132b20 and gated to set respective latches consisting of cross-coupled AOI 2-1 logical elements 132b08 and 132b10, and 132b24 and 132b26, upon the logical High occurrence of signal (H) $\phi 2$ (7) on line 13441. Upon the next subsequent occurrence of logical High signal (H) $\phi 1$ (2) on line 13405, these latches are respectively gated to set the double fault and fault latches. The two stage of latches utilized in the development of signal (H) DOUBLE FAULT on line 132b07 and (H) FAULT on line 132b09 thusly allow these signals to be initially valid upon clock $\phi 1$. Moreover, the double latches as implemented throughout are exercised in accordance with test signals as appear on lines 135b07, as a 3-bit scan/set testable shift register. The three fault latches are part of the scan/set testable thirty-seven bit position driver/receiver scan/set test loop. The received scan/set test data signal is signal (L) FAULT-GL0 on line 128a03 such as originates with the driver/receiver DR0, and the output scan/set test data signal is signal (L) PARITY FAULT FF on line 132a01, such as allows a scan loop, or signal (H) LOOP B SCAN DATA on line 132b03, such as allows the recovery of the contents of the fault latches to the VM Node/Maintenance Processor. Only signal (H) CLEAR (6) on line 13311 will suffice to clear the fault latches once they have become set.

9.33. Clear Distribution

The distribution of signal (H) CLEAR on line 13301 such as is received from the VM Node/Maintenance Processor, is shown in FIG. 133. Alternative distributions are possible commensurate with the size of the drive transistors utilized and the impedances driven within the logics of the Versatile Bus Interface Logics.

9.34. Clock Distribution

The amplification and distribution of signals (H) $\phi 1$ on line 13443 and (H) $\phi 2$ on line 13445, such as are received from the system or the user, and/or the VM Node (and which are normally synchronous at all such locations) is shown in FIG. 134. Alternative distributions are possible commensurate with the size of the drive transistors utilized and the various distributed impedances within the Versatile Bus Interface Logics such as are driven by each distributed signal.

9.35. Test Signal Distribution

The amplification and distribution of the signal (L) ENABLE LOOP B on line 13705, such signal as will be seen within signal 137 to originate at the VM Node, is shown in FIG. 135, consisting of FIG. 135a and FIG. 135b. This signal (L) ENABLE LOOP B on line 13705 will be caused, by the VM Node/Maintenance Processor, to be logically Low or 40 clock cycles commencing and ending upon clock $\phi 1$ in order that the 37 driver/-receiver and three fault latches may be interrogated in a scan/set shiftable test loop wherein the latched contents of one such element are shifted during each clock cycle. The logical Low occurrence of signal (L) $\phi 2$ on line 13427 is utilized in NO2 logical elements **135*a*02 and 135*a*04 to formulate some clock phase gated variants of the test signal, such variants as are utilized within the driver/receiver elements. Similarly, the logical Low occurrence of signal (L) $\phi 1$ on line 13401 is utilized in NO2 logical elements 135*b*02 and 135*b*04 in the production of test signals gated upon clock $\phi 1$. The clock $\phi 1$ logical Low going signal (L) ENABLE LOOP B on line 13705 is gated into a latch consisting of cross-coupled AOI 2-1 logical elements 135*b*06 and 135*b*08 upon the logical High occurrence of signal (H) $\phi 2$ (&) on line 13441. The latch will remain in the cleared condition until that clock $\phi 2$ following the cycle, some 40 cycles later, at which signal (L) ENABLE LOOP B on line 13705** returns to the logical High condition.

9.36. Scan/Set Loop Data

The SCAN/SET LOOP DATA functional logical subsection **86*b*42, previously seen within the first level block diagram of FIG. 86*b*, is shown in FIG. 136. Each of six scan/set test loops, scan/set test loop A through scan/set loop F, originates and terminates in this section. The single signal (H) SET DATA on line 13613 received from the VM Node/Maintenance Processor, logically High or Low, depending upon whether a logical "1" or "0" bit is to be set within a scan/set testable loop, is inverted in IN1 logical element 13626 and supplied as the Data 0, D0, Input Signal to S12 logical elements 13602, 13606, 13610, 13614, 13618, and 13622. Various signals, from (L) CAMA 0 ($\phi 1$) on line 10903 through (L) GKS 8 on line 91*b*03, as are input to the Data 1, D1, inputs of the same S12 selectors, represent the various terminous data signals of the six scan/set test loops. Under control of signals (L) SET LOOP A through (L) SET LOOP F on line 13703, as originate at the scan/set loop control upcoming within FIG. 137, S12 logical elements 13602 through 13622 are enabled to select either those Versatile Bus Interface Logics internally generated signals which are carrying the scan shifted data, or that signal which carries the set data from the VM Node/Maintenance Processor. The selected signals within S12 logical elements 13602 through 13622 are respectively inverted in IN1 logical elements 13604 through 13624 and supplied to the six scan/set test loops of the Versatile Bus Interface Logics as signal (H) LOOP A DATA on line 13601 through signal (H) LOOP F DATA on line 13611**.

9.37. Scan/Set Loop Control

The SCAN/SET LOOP CONTROL functional logical subsection **86*b*42, previously seen within the first level block diagram as FIG. 86*b*, is shown within FIG. 137**. The purpose of the SCAN/SET LOOP CONTROL functional logical subsection is to develop the various set and test signals such as will cause the Versatile Bus Interface Logics, under the control of the VM Node/Maintenance Processor, to effectuate the scan/-set test operation on each of six scan/set testable loops.

The scan/set test operation is enabled under the logical Low condition of signal (L) SCAN/SET ENABLE on line 13731 which, as supplied from the VM Node/-Maintenance Processor, in conjunction with an applied logically High signal from satisfied N02 logical element 13726, provides one enabling input to NA2 logical elements 13702, 13706, 13710, 13714, 13718, and 13722. A single logically High one of signals (H) SEL LOOP A on line 13721 to (H) SEL LOOP F on line 13731 will respectively satisfy one of such NA2 logical elements 13702, 13706, 13710, 13714, 13718 or 13722. The respective signals produced by such NA2 logical elements 13702 through 13722, and the inversion of those signals produced by NO2 logical elements 13710, 13714, and 13718 and IN1 logical elements 13730, 13732, and 13734, are collectively supplied to the Versatile Bus Interface Logics to enable the selections which will establish the overall scan/set test loop linkages for data flow control. Signal SCAN/SET SELECT ((L)=SET) on line 13733 from the VM Node/Maintenance Processor is logically Low if the set portion of the scan/set test operation is enabled. Such a logically Low signal is inverted in IN1 logical element 13728 and applied to NA2 logical elements 13704, 13708, 13712, 13716, and 13720, and 13724. In conjunction with logically High signals (H) SEL LOOP A on line 13721 through (H) SEL LOOP F on line 13731 such NA2 logical elements are satisfied respectively producing signals (L) SET LOOP A through (L) SET LOOP F on line 13703. As previously seen within the scan/set loop data functional subsection data shown in FIG. 136, these signals (L) SET LOOP A through (L) SET LOOP F allow the substitution of the set data derived from the VM Node/Maintenance Processor for the normal shifted data derived from the internal scan/set testable shift register loop within the Versatile Bus Interface Logics.

10. Modifications and Variations to the Preferred Embodiment of the Invention

Various modifications and variations falling within the scope and spirit of this invention will occur to those skilled in the computer arts. The Versatile Bus is accordingly not to be thought of as limited to that exact construction of the preferred embodiment as set forth for illustrative purposes, nor to only those 31,045 variations of interface communication protocol which are enabled thereby such preferred embodiment construction.

As a first manner of a variant construction of the Versatile Bus Interface Logics in the Versatile Bus intercommunication scheme implemented thereby, it would be possible to construct a Versatile Bus without implementation of a BEGIN line. In such a case, the BUSY line and all arbitration group lines would be logically OR'ed within each Versatile Bus Interface Logics in order to recognize the beginning of a communication transaction,. A sacrifice needs be made to avoid the utilization of a BEGIN signal and the associated pin, however. It would not be possible to have the default case on a first arbitration group if the Versatile Bus were configured such as to not issue any BUSY signal. Such configurations wherein the BUSY signal needs not be employed are discussed in conjunction with the logics at FIG. **118*a***.

It has similarly been noted in the specification disclosure that the Versatile Bus Interface Logics could have been implemented with an acknowledge line, or both an acknowledge and a WAIT line, as opposed to the WAIT line only such as is used within the preferred embodiment of the invention. The construction of an acknowledge signal transmission as the inverse of a WAIT signal transmission is deemed to be within the skills of a routineer in the computer bus communication arts.

As in a third example of an alternative construction of the Versatile Bus, it is obvious that many fields could be varied in width and designated utilization types once the general technique of construction of a pipelined bus is recognized. Existing arbitration, slave identification/-function, and data fields could be of expanded width. The naming of a new function, such as a function called "interrupt" should not obscure its relationship to existent features of the invention. For example, if one word of the content addressable memories were assigned as an interrup address, then each such device could be addressed, or "interrupt" through such address under its own control to lock out recognition thereby. Therefore, the naming of such activities as are taught to transpire on the Versatile Bus is not so important as the conceptual manner in which they are handled in a configurable and specifiable manner.

As a final example of the alteration of the preferred embodiment of the invention, the electrical timing of the bus is capable of being altered. The current clock timing of the Versatile Bus as is shown in FIG. 84 is a balance between the length of the internal logical paths which needs transpire primarily during clock $\phi\mathbf{1}$ and the charge and discharge time of a Versatile Bus of one meter length by transistors of the specified size. In particular, the clock $\phi\mathbf{1}$ and clock $\phi\mathbf{2}$ may be of 50% duty cycle as well as of the specified periodicity of 40 nanoseconds.

What is claimed is:

1. A bus error detection system for detecting errors in binary bus signals comprising a bus having a plurality of lines each coupled to one of a plurality of digital means, said bus lines including an odd parity line and an even parity line, said system comprising clock means which provides at least two clock signal phases, wherein said digital means comprises activatable drive means for driving both of said odd and even parity lines to the same predefined logic level each time said first clock signal phase occurs, parity checking means coupled to said drive means for checking during a second clock signal phase the parity of the binary signals which appeared on said bus lines during a preceding first clock signal phase, and for activating said drive means for driving either said odd or said even parity lines to a predefined logic state according to the parity determined by said parity checking means during said second clock signal phase, and verification means constructed to normally verify that only one of said odd and even parity lines has been driven by said digital means to said predefined logic state during said second clock phase, and that both said odd and said even parity lines have been driven by said drive means during said first clock signal phase to the same predefined logic level.

2. A bus error detection system as claimed in claim 1 further comprising error correction means coupled to said verification means for replacing faulty bus lines, comprising switching means for switching a faulty bus line out of said bus and for replacing said faulty bus line with an adjoining bus line.

3. A bus error detection system as claimed in claim 2 wherein said switching means switches each higher ordered bus line above a faulty bus line with its next higher ordered bus line until the highest ordered non-parity bus line is reached, and then for replacing the said highest ordered non-parity bus line with one of said odd or even parity lines, and an error correction modification means for modifying the operation of said verification means so that it thereafter operates in accordance with a single odd or even bus line parity error detection scheme as long as said faulty bus line remains replaced.

4. A bus error detection system as claimed in claim 1 wherein said verification means comprises means for determining if any bus line is open, or if any bus line is stuck high, or if any bus line is stuck low, or if any two or more bus lines are shorted together.

5. A bus error detection system as claimed in claim 4 further comprising error correction means coupled to said verification means for replacing faulty bus lines, comprising switching means for switching a faulty bus linen out of said bus and for replacing said faulty bus line with an adjoining bus line.

6. A bus error detection system as claimed in claim 5 wherein said switching means switches each higher ordered bus line above faulty bus line with its next higher ordered bus line until the highest ordered non-parity bus line is reached, and then for replacing the said highest ordered non-parity bus line with one of said odd or even parity lines, and an error correction modification means for modifying the operation of said verification means so that it thereafter operates in accordance with a single odd or even bus line parity error detection scheme as long as said faulty bus line remains replaced.

* * * * *